US007167181B2

(12) United States Patent
Duluk, Jr. et al.

(10) Patent No.: US 7,167,181 B2
(45) **Date of Patent: *Jan. 23, 2007**

(54) DEFERRED SHADING GRAPHICS PIPELINE PROCESSOR HAVING ADVANCED FEATURES

(75) Inventors: Jerome F. Duluk, Jr., Palo Alto, CA (US); Richard E. Hessel, Pleasanton, CA (US); Vaughn T. Arnold, Scotts Valley, CA (US); Jack Benkual, Cupertino, CA (US); Joseph P. Bratt, San Jose, CA (US); George Cuan, Sunnyvale, CA (US); Stephen L. Dodgen, Boulder Creek, CA (US); Emerson S. Fang, Fremont, CA (US); Zhaoyu Gong, Cupertino, CA (US); Thomas Y. Ho, Fremont, CA (US); Hengwei Hsu, Fremont, CA (US); Sidong Li, San Jose, CA (US); Sam Ng, Fremont, CA (US); Matthew N. Papakipos, Menlo Park, CA (US); Jason R. Redgrave, Mountain View, CA (US); Sushma S. Trivedi, Sunnyvale, CA (US); Nathan D. Tuck, San Diego, CA (US); Shun Wai Go, Milpitas, CA (US); Lindy Fung, Sunnyvale, CA (US); Tuan D. Nguyen, San Jose, CA (US); Joseph P. Grass, Menlo Park, CA (US); Bo Hong, San Jose, CA (US); Abraham Mammen, Pleasanton, CA (US); Abbas Rashid, Fremont, CA (US); Albert Suan-Wei Tsay, Fremont, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,493

(22) Filed: Jun. 9, 2003
(Under 37 CFR 1.47)

(65) Prior Publication Data

US 2004/0130552 A1 Jul. 8, 2004

Related U.S. Application Data

(63) Continuation of application No. 09/377,503, filed on Aug. 20, 1999, now Pat. No. 6,717,576.

(60) Provisional application No. 60/097,336, filed on Aug. 20, 1998.

(51) Int. Cl.
*G06T 1/20* (2006.01)
*G06T 15/40* (2006.01)
*G09G 5/00* (2006.01)

(52) U.S. Cl. ..................... 345/506; 345/421; 345/613; 345/614

(58) Field of Classification Search ................ 345/501, 345/502, 505, 506, 419, 421, 422, 426, 427, 345/522, 553, 546, 545, 552, 537, 530, 428, 345/581, 582, 589, 596, 619, 611–614, 620, 345/625, 628, 691, 694
See application file for complete search history.

(56) References Cited

U.S. PATENT DOCUMENTS

| | | | |
|---|---|---|---|
| 4,115,865 | A | 9/1978 | Beauvais et al. |
| 4,449,193 | A | 5/1984 | Tournois |
| 4,484,346 | A | 11/1984 | Sternberg et al. |
| 4,532,606 | A | 7/1985 | Phelps |
| 4,559,618 | A | 12/1985 | Houseman et al. |
| 4,564,952 | A | 1/1986 | Karabinis et al. |
| 4,581,760 | A | 4/1986 | Schiller et al. |
| 4,594,673 | A | 6/1986 | Holly |
| 4,622,653 | A | 11/1986 | McElroy |
| 4,669,054 | A | 5/1987 | Schlunt et al. |
| 4,670,858 | A | 6/1987 | Almy |
| 4,694,404 | A | 9/1987 | Meagher |
| 4,695,973 | A | 9/1987 | Yu |
| 4,758,982 | A | 7/1988 | Price |
| 4,783,829 | A | 11/1988 | Miyakawa et al. |
| 4,794,559 | A | 12/1988 | Greenberger |

| | | | |
|---|---|---|---|
| 4,825,391 | A | 4/1989 | Merz |
| 4,841,467 | A | 6/1989 | Ho et al. |
| 4,847,789 | A | 7/1989 | Kelly et al. |
| 4,888,583 | A | 12/1989 | Ligocki et al. |
| 4,888,712 | A | 12/1989 | Barkans et al. |
| 4,890,242 | A | 12/1989 | Sinha et al. |
| 4,945,500 | A | 7/1990 | Deering |
| 4,961,581 | A | 10/1990 | Barnes et al. |
| 4,970,636 | A | 11/1990 | Snodgrass et al. |
| 4,996,666 | A | 2/1991 | Duluk, Jr. |
| 4,998,286 | A | 3/1991 | Tsujiuchi et al. |
| 5,031,038 | A | 7/1991 | Guillemot et al. |
| 5,040,223 | A | 8/1991 | Kamiya et al. |
| 5,050,220 | A | 9/1991 | Marsh et al. |
| 5,054,090 | A | 10/1991 | Knight et al. |
| 5,067,162 | A | 11/1991 | Driscoll, Jr. et al. |
| 5,083,287 | A | 1/1992 | Obata et al. |
| 5,123,084 | A | 6/1992 | Prevost et al. |
| 5,123,085 | A | 6/1992 | Wells et al. |
| 5,128,888 | A | 7/1992 | Tamura et al. |
| 5,129,051 | A | 7/1992 | Cain |
| 5,129,060 | A | 7/1992 | Pfeiffer et al. |
| 5,133,052 | A | 7/1992 | Bier et al. |
| 5,146,592 | A | 9/1992 | Pfeiffer et al. |
| 5,189,712 | A | 2/1993 | Kajiwara et al. |
| 5,245,700 | A | 9/1993 | Fossum |
| 5,247,586 | A | 9/1993 | Gobert et al. |
| 5,265,222 | A | 11/1993 | Nishya et al. |
| 5,278,948 | A | 1/1994 | Luken, Jr. |
| 5,289,567 | A | 2/1994 | Roth |
| 5,293,467 | A | 3/1994 | Buchner et al. |
| 5,295,235 | A | 3/1994 | Newman |
| 5,299,139 | A | 3/1994 | Baisuck et al. |
| 5,315,537 | A | 5/1994 | Blacker |
| 5,319,743 | A | 6/1994 | Dutta et al. |
| 5,338,200 | A | 8/1994 | Olive |
| 5,347,619 | A | 9/1994 | Erb |
| 5,363,475 | A | 11/1994 | Baker et al. |
| 5,369,734 | A | 11/1994 | Suzuki et al. |
| 5,394,516 | A | 2/1995 | Winser |
| 5,402,532 | A | 3/1995 | Epstein et al. |
| 5,448,690 | A | 9/1995 | Shiraishi et al. |
| 5,455,900 | A | 10/1995 | Shiraishi et al. |
| 5,481,669 | A | 1/1996 | Poulton et al. |
| 5,493,644 | A | 2/1996 | Thayer et al. |
| 5,509,110 | A | 4/1996 | Latham |
| 5,535,288 | A | 7/1996 | Chen et al. |
| 5,544,306 | A | 8/1996 | Deering et al. |
| 5,546,194 | A | 8/1996 | Ross |
| 5,572,634 | A | 11/1996 | Duluk, Jr. |
| 5,574,835 | A | 11/1996 | Duluk, Jr. et al. |
| 5,574,836 | A | 11/1996 | Broemmelsiek |
| 5,579,455 | A | 11/1996 | Greene et al. |
| 5,596,686 | A | 1/1997 | Duluk, Jr. |
| 5,613,050 | A | 3/1997 | Hochmuth et al. |
| 5,621,866 | A | 4/1997 | Murata et al. |
| 5,623,628 | A | 4/1997 | Brayton et al. |
| 5,664,071 | A | 9/1997 | Nagashima |
| 5,669,010 | A | 9/1997 | Duluk, Jr. |
| 5,684,939 | A | 11/1997 | Foran et al. |
| 5,699,497 | A | 12/1997 | Erdahl et al. |
| 5,710,876 | A | 1/1998 | Peercy et al. |
| 5,734,806 | A | 3/1998 | Narayanaswami |
| 5,751,291 | A | 5/1998 | Olsen et al. |
| 5,767,589 | A | 6/1998 | Lake et al. |
| 5,767,859 | A | 6/1998 | Rossin et al. |
| 5,778,245 | A | 7/1998 | Papworth et al. |
| 5,798,770 | A | 8/1998 | Baldwin |
| 5,828,378 | A | 10/1998 | Shiraishi |
| 5,841,447 | A | 11/1998 | Drews |
| 5,850,225 | A | 12/1998 | Cosman |
| 5,852,451 | A | 12/1998 | Cox et al. |
| 5,854,631 | A | 12/1998 | Akeley et al. |
| 5,860,158 | A | 1/1999 | Pai et al. |
| 5,864,342 | A | 1/1999 | Kajiya et al. |
| 5,870,095 | A | 2/1999 | Albaugh et al. |
| RE36,145 | E | 3/1999 | DeAguiar et al. |
| 5,880,736 | A | 3/1999 | Peercy et al. |
| 5,889,997 | A | 3/1999 | Strunk |
| 5,920,326 | A | 7/1999 | Rentschler et al. |
| 5,936,629 | A | 8/1999 | Brown et al. |
| 5,949,424 | A | 9/1999 | Cabral et al. |
| 5,949,428 | A | 9/1999 | Toelle et al. |
| 5,977,977 | A | 11/1999 | Kajiya et al. |
| 5,977,987 | A | 11/1999 | Duluk, Jr. |
| 5,990,904 | A | 11/1999 | Griffin |
| 6,002,410 | A | 12/1999 | Battle |
| 6,002,412 | A | 12/1999 | Schinnerer |
| 6,046,746 | A | 4/2000 | Deering |
| 6,084,591 | A | 7/2000 | Aleksic |
| 6,111,582 | A | 8/2000 | Jenkins |
| 6,118,452 | A | 9/2000 | Gannett |
| 6,128,000 | A | 10/2000 | Jouppi et al. |
| 6,167,143 | A | 12/2000 | Badiqué |
| 6,167,486 | A | 12/2000 | Lee et al. |
| 6,201,540 | B1 | 3/2001 | Gallup et al. |
| 6,204,859 | B1 | 3/2001 | Jouppi et al. |
| 6,216,004 | B1 | 4/2001 | Tiedemann et al. |
| 6,228,730 | B1 | 5/2001 | Chen et al. |
| 6,229,553 | B1 | 5/2001 | Duluk, Jr. et al. |
| 6,243,488 | B1 | 6/2001 | Penna |
| 6,243,744 | B1 | 6/2001 | Snaman, Jr. et al. |
| 6,246,415 | B1 | 6/2001 | Grossman et al. |
| 6,259,452 | B1 | 7/2001 | Coorg et al. |
| 6,259,460 | B1 | 7/2001 | Gossett et al. |
| 6,263,493 | B1 | 7/2001 | Ehrman |
| 6,268,875 | B1 | 7/2001 | Duluk, Jr. et al. |
| 6,275,235 | B1 | 8/2001 | Morgan, III |
| 6,285,378 | B1 | 9/2001 | Duluk, Jr. |
| 6,288,730 | B1 | 9/2001 | Duluk, Jr. et al. |
| 6,331,856 | B1 | 12/2001 | Van Hook et al. |
| 6,476,807 | B1 | 11/2002 | Duluk, Jr. et al. |
| 6,525,737 | B1 | 2/2003 | Duluk, Jr. et al. |
| RE38,078 | E | 4/2003 | Duluk, Jr. |
| 6,552,723 | B1 | 4/2003 | Duluk, Jr. et al. |
| 6,577,305 | B1 | 6/2003 | Duluk, Jr. et al. |
| 6,577,317 | B1 | 6/2003 | Duluk, Jr. et al. |
| 6,597,363 | B1 | 7/2003 | Duluk, Jr. et al. |
| 6,614,444 | B1 | 9/2003 | Duluk, Jr. et al. |
| 6,650,327 | B1 * | 11/2003 | Airey et al. ................ 345/422 |
| 6,671,747 | B1 | 12/2003 | Benkual et al. |
| 6,693,639 | B1 | 2/2004 | Duluk, Jr. et al. |
| 6,697,063 | B1 * | 2/2004 | Zhu ........................... 345/421 |
| 6,717,576 | B1 | 4/2004 | Duluk, Jr. et al. |
| 6,771,264 | B1 | 8/2004 | Duluk et al. |

FOREIGN PATENT DOCUMENTS

| | | |
|---|---|---|
| EP | 0166577 | 1/1986 |
| EP | 0870282 | 5/2003 |
| WO | WO 90/004849 | 5/1990 |
| WO | WO 95/027263 | 10/1995 |

OTHER PUBLICATIONS

Angel, E., *Interactive Computer Graphics: A Top-Down Approach with OpenGL*, sections 6.8 & 7.7.2, Addison Wesley Longman, Inc.: Reading, MA (1997).

Foley, et al., "Illumination and shading," *Computer Graphics Principles and Practice*, 2nd ed. in C, ch. 16, pp. 721-814, Addison Wesley Longman, Inc.: Reading, MA (1996).

Lathrop, O., "Chapter 7: Rendering (Converting a Scene to Pixels)," *The Way Computer Graphics Work*, pp. 93-150, John Wiley & Sons, Inc.: New York, NY (1997).

Peercy, M., et al., "Efficient Bump Mapping Hardware," *Computer Graphics Proc., SIGGRAPH 97: Ann. Conf. Series*, 303-306 (Aug. 3-8, 1997).

Schilling et al., "Texram: a smart memory for texturing," *IEEE Computer Graphics & Applications*, 32-41 (May 1996).
Segal, M., "Hardware sorting chip steps up software pace," *Electronic Des.* 34(15):85-91 (Jun. 1986).
Watt, "Chapter 4: Reflection and Illumination Models," *3D Computer Graphics*, 2nd ed., 89-126.
Akeley, K., "RealityEngine Graphics", Computer Graphics Proceedings, Annual Conference Series, pp. 109-116, Aug. 1-6, 1993.
Carpenter, L., "The A-buffer, An Antialaised Hidden Surface Method", Computer Graphics, vol. 18, No. 3, pp. 103-108, Jul. 1984.
Clark, J., "Hierarchical Geometric Models for Visible Surface Algorithms", Communications of the ACM, vol. 19, No. 10, pp. 547-554, Oct. 1976.
Clark et al., "Distributed Proc in High Performance Smart Image Memory", LAMDA 4th Quarter, pp. 40-45, Oct. 1990.
Cook et al., "The Reyes Image Rendering Architecture", Computer Graphics, vol. 21, No. 4, pp. 95-102, Jul. 1987.
Das et al., "A systolic algorithm for hidden surface removal", Parallel Computing, vol. 15, pp. 277-289, 1990.
Deering et al., "Leo: A System for Cost Effective 3D Shaded Graphics", Computer Graphics Proceedings, Annual Conference Series, pp. 101-108, Aug. 1-6, 1993.
Demetrescu, S., "High Speed Image Rasterization Using a Highly Parallel Smart Bulk Memory", Stanford Tech Report, pp. 83-244, Jun. 1983.
Demetrescu, S., "High Speed Image Rasterization Using Scan Line Access Memories", Chapel Hill Conference on VLSI, pp. 221-243, 1985.
Duluk et al., "VLSI Processors for Signal Detection in SETI", Presented at XXXVIIth International Astronautical Congress, Innsbruck, Austria, Oct. 4-11, 1986.
Franklin, W., "A Linear Time Exact Hidden Surface Algorithm", Computer Graphics, pp. 117-123, Jul. 1980.
Franklin et al., "Parallel Object-Space Hidden Surface Removal", Computer Graphics, vol. 24, No. 4, pp. 87-94, Aug. 1990.
Fuchs et al., "Pixel-Planes 5: A Heterogeneous Multiprocessor Graphics System Using Processor-Enhanced Memories", Computer Graphics, vol. 23, No. 3, pp. 79-88, Jul. 1989.
Gharachorloo et al., "A Characterization of Ten Rasterization Techniques", Computer Graphics, vol. 23, No. 3, pp. 355-368, Jul. 1989.
Gharachorloo et al., "Super Buffer: A Systolic VLSI Graphics Engine for Real Time Raster Image Generation", Chaper Hill Conference on VLSI, Computer Science Press, pp. 285-305, 1985.
Gharachorloo et al., "Subnanosecond Pixel Rendering with Million Transistor Chips", Computer Graphics, vol. 22, No. 4, pp. 41-49, Aug. 1988.
Gharachorloo et al., "A Million Transistor Systolic Array Graphics Engine", Proceedings of the International Conference on Systolic Arrays, San Diego, CA, pp. 193-202, May 25-27, 1988.
Goris et al., "A Configurable Pixel Cache for Fast Image Generation", IEEE Computer Graphics & Applications, Mar. 1987.
Greene et al., "Hierarchial Z-Buffer Visibility", Computer Graphics Proceedings, Annual Conference Series, pp. 231-238, Aug. 1-6, 1993.
Gupta et al., "A VLSI Architecture for Updating Raster-Scan Displays", Computer Graphics, vol. 15, No. 3, pp. 71-78, Aug. 1981.
Gupta, S., "PS: Polygon Streams, A Distributed Architecture for Incremental Computation Applied to Graphics", Advances in Computer Graphics Hardware IV, ISBN 0387534733, Springer-Verlag, pp. 91-111, May 1, 1991.
Hall, E., "Computer Image Processing and Recognition", Academic Press, pp. 468-484, 1979.
Hu et al., "Parallel Processing Approaches to Hidden-Surface Removal in Image Space", Computer and Graphics, vol. 9, No. 3, pp. 303-317, 1985.
Hubbard, P., "Interactive Collision Detection", Brown University, ACM SIGGRAPH 94, Course 2, Jul. 24-29, 1994.
Jackel, D. "The Graphics PARCUM System: A 3D Memory Based Computer Architecture for Processing and Display of Solid Models", Computer Graphics Forum, vol. 4, pp. 21-32, 1985.
Kaplan et al., "Parallel Processing Techniques for Hidden Surface Removal" SIGGRAPH 1979 Conference Proceedings, p. 300.
Kaufman, A., "A Two-Dimensional Frame Buffer Processor", Advances in Com. Graphics Hardware II, ISBN 0-387-50109-6, Springer-Verlag, pp. 67-83.
Linscott et al., "Artificial Signal Detectors," International Astronomical Union Colloquium No. 99, Lake Balaton Hungary, Stanford University, Jun. 15, 1987.
Linscott et al., "Artificial Signal Detectors," Bioastronomy—The Next Steps, pp. 319-355, 1988.
Linscott et al., "The MCSA II—A Broadband, High Resolution, 60 Mchannel Spectrometer," Nov. 1990.
Naylor, B., "Binary Space Partitioning Trees, A Tutorial", (included in the course notes Computational Representations of Geometry), Course 23, ACM SIGGRAPH 94, Jul. 24-29, 1994.
Nishizawa et al., "A Hidden Surface Processor for 3-Dimension Graphics", IEEE, ISSCC, pp. 166-167 and 351, 1988.
Ohhashi et al., "A 32b 3-D Graphics Processor Chip with 10M Pixels/s Gouraud Shading", IEEE ISSCC, pp. 168-169 and 351, 1988.
Oldfield et al., "Content Addressable Memories for Storing and Processing Recursively Subdivided Images and Trees", Electronics Letters, vol. 23, No. 6, pp. 262-263, Mar. 1987.
Parke, F., "Simulation and Expected Performance of Multiple Processor Z-Buffer Systems", SIGGRAPH '80 Conference Proceedings, pp. 48-56, 1980.
Pineda, J., "A Parallel Algorithm for Polygon Rasterization", SIGGRAPH 1988 Conference Proceedings, Aug. 1988.
Potmesil et al., "The Pixel Machine: A Highly Parallel Image Computer", Computer Graphics, vol. 23, No. 3, pp. 69-78, Jul. 1989.
Poulton et al. "Pixel-Planes: Building a VLSI-Based Graphic System", Chapel Hill Conference on VLSI, Computer Science Press, Inc., pp. 35-60, 1985.
Rao et al., "Discrete Cosine Transform: Algorithms, Advantages, Applications," Academic Press, Inc., pp. 242-247, 1990.
Rossignac et al., "Depth-Buffering Display Techniques for Constructive Solid Geometry", IEEE, Computer Graphics & Applications, pp. 29-39, Sep. 1986.
Samet et al., "Data Structures 59: Hierarchical Data Structures and Algorithms for Computer Graphics", IEEE , Computer Graphics & Applications, pp. 59-75, Jul. 1988.
Schneider, B., "Towards A Taxonomy for Display Processors", Advances in Computer Graphics Hardware IV, ISBN 0387534733, Springer-Verlag, pp. 91-111, May 1, 1991.
Schneider et al., "Advances In Computer Graphics Hardware III", Chapter 9, Proof: An Architecture for Rendering in Object Space, ISBN 387534881, Springer-Verlag, pp. 67-83, Jun. 1, 1991.
Shephard et al., "Real-time Hidden Surface Removal in a Flight Simulator", Proceedings of the Pacific Rim Conference on Communications, Compute and Signal Processing, Victoria, CA, pp. 607-610, May 9-10, 1991.
Soderberg et al., "Image Generation Design for Ground-Based Network Training Environments", International Training Equipment Conference, London, May 4-6, 1993.
Sutherland et al., "A Characterization of ten Hidden-Surface Algorithms" Computing Surveys, vol. 6, No. 1, pp. 1-55, Mar. 1974.
Torborg, G., "A Parallel Processor Architecture for Graphics Arithmetic Operations", Computer Graphics, vol. 21, No. 4,, pp. 197-204, Jul. 1987.
Warnock, "A Hidden Surface Algorithm for Computer Generated Halftone Pictures", Univerity of Utah Doctoral Thesis, 1969.
Weiler et al., "Hidden Surface Removal Using Polygon Area Sorting", vol. 11, No. 2, pp. 214-222, Jul. 1977.
Whelan, D., "A Rectangular Area Filling Display System Architecture", Computer Graphics, vol. 16, No. 3, pp. 147-153, Jul. 1982.

* cited by examiner

*Primary Examiner*—Kee M. Tung
*Assistant Examiner*—Hau Nguyen
(74) *Attorney, Agent, or Firm*—Dorsey & Whitney LLP

(57) ABSTRACT

A deferred shading graphics pipeline processor and method are provided encompassing numerous substructures. Embodiments of the processor and method may include one or more of deferred shading, a tiled frame buffer, and multiple?stage hidden surface removal processing. In the deferred shading graphics pipeline, hidden surface removal is completed before pixel coloring is done. The pipeline processor comprises a command fetch and decode unit, a geometry unit, a mode extraction unit, a sort unit, a setup unit, a cull unit, a mode injection unit, a fragment unit, a texture unit, a Phong lighting unit, a pixel unit, and a backend unit.

10 Claims, 221 Drawing Sheets

THE FOLLOWING PACKETS WILL BE SENT TO MEX IN TIME ORDER:

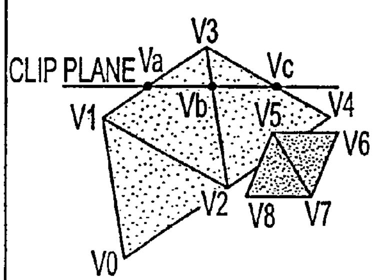

| VERTEX | PACKET | REUSE | TYPE | FRONTFACE |
|---|---|---|---|---|
| | CULLMODE1 | | | |
| | MATFRONT1 | | | |
| | MATBACK1 | | | |
| | PIXMODE1 | | | |
| | VTXMODE | | | |
| V0 | COLOR | M | N | 1 |
| V0 | SORT | M | N | 1 |
| V1 | COLOR | M | N | 1 |
| V1 | SORT | M | N | 1 |
| V2 | COLOR | M | T | 1 |
| | VTXMODE | | | |
| V2 | SORT | M | T | 1 |
| V3 | COLOR | M | T | 1 |
| V1 | SORT | M | N | 1 |
| Va | SORT | M | N | 1 |
| Vb | SORT | O | T | 1 |
| V2 | SORT | O | T | 1 |
| V4 | COLOR | M | T | 1 |
| V2 | SORT | M | N | 1 |
| Vb | SORT | M | N | 1 |
| Vc | SORT | O | T | 1 |
| | CULLMODE2 | | | |
| | MATFRONT2 | | | |
| | TEXAFRONT2 | | | |
| | LIGHT1 | | | |
| V5 | COLOR | O | N | 0 |
| V5 | SORT | O | N | 0 |
| V6 | COLOR | O | N | 0 |
| V6 | SORT | O | N | 0 |
| V7 | COLOR | O | T | 0 |
| V7 | SORT | O | T | 0 |
| V8 | COLOR | M | T | 0 |
| V8 | SORT | M | T | 0 |

M: KEEP MIDDLE
O: KEEP OLDEST

N: NOT COMPLETE
P: POINT L: LINE
T: TRIANGLE

FIG. 24

| STATE PARAMETER SET | DESCRIPTION | APPROXIMATE SIZE (IN 144 BIT WORDS) |
|---|---|---|
| TEXTUREAFRONT | IF THE FRONT (OR BACK) FACING PRIMITIVES ARE NOT CULLED OUT, SOFTWARE MAY CHOOSE TO ATTACH DIFFERENT TEXTURE AND MATERIAL PARAMETER TO THE FRONT AND BACK FACING PRIMITIVES. TEXTUREAFRONT PARTITION OF THE STATE VECTOR CONTAINS THE TEXA STATE APPLICABLE IF THE CURRENT PRIMITIVE IS FRONT FACING. | 2 |
| TEXTUREBFRONT | TEXTUREBFRONT PARTITION OF THE STATE VECTOR CONTAINS THE TEXB STATE APPLICABLE IF THE CURRENT PRIMITIVE IS FRONT FACING. | 6 |
| TEXTUREABACK | TEXTUREABACK PARTITION OF THE STATE VECTOR CONTAINS THE TEXA STATE APPLICABLE IF THE CURRENT PRIMITIVE IS BACK FACING. | 2 |
| TEXTUREBBACK | TEXTUREBBACK PARTITION OF THE STATE VECTOR CONTAINS THE TEXB STATE APPLICABLE IF THE CURRENT PRIMITIVE IS BACK FACING. | 6 |
| MATERIALFRONT | MATERIALFRONT PARTITION OF THE STATE VECTOR CONTAINS THE MATERIAL STATE APPLICABLE IF THE CURRENT PRIMITIVE IS FRONT FACING. | 10 |
| MATERIALBACK | MATERIALBACK PARTITION OF THE STATE VECTOR CONTAINS THE MATERIAL STATE APPLICABLE IF THE CURRENT PRIMITIVE IS BACK FACING. | 10 |
| LIGHT | CONTAINS THE CURRENT LIGHT STATE. | 18 |
| PIXELMODES | CONTAINS THE CURRENT PIXEL MODES. | 2 |
| STIPPLE | CONTAINS CURRENT STIPPLE PATTERN | 8 |
| CULLMODES | CONTAINS CURRENT CULL MODES | 0.33 |

FIG. 25

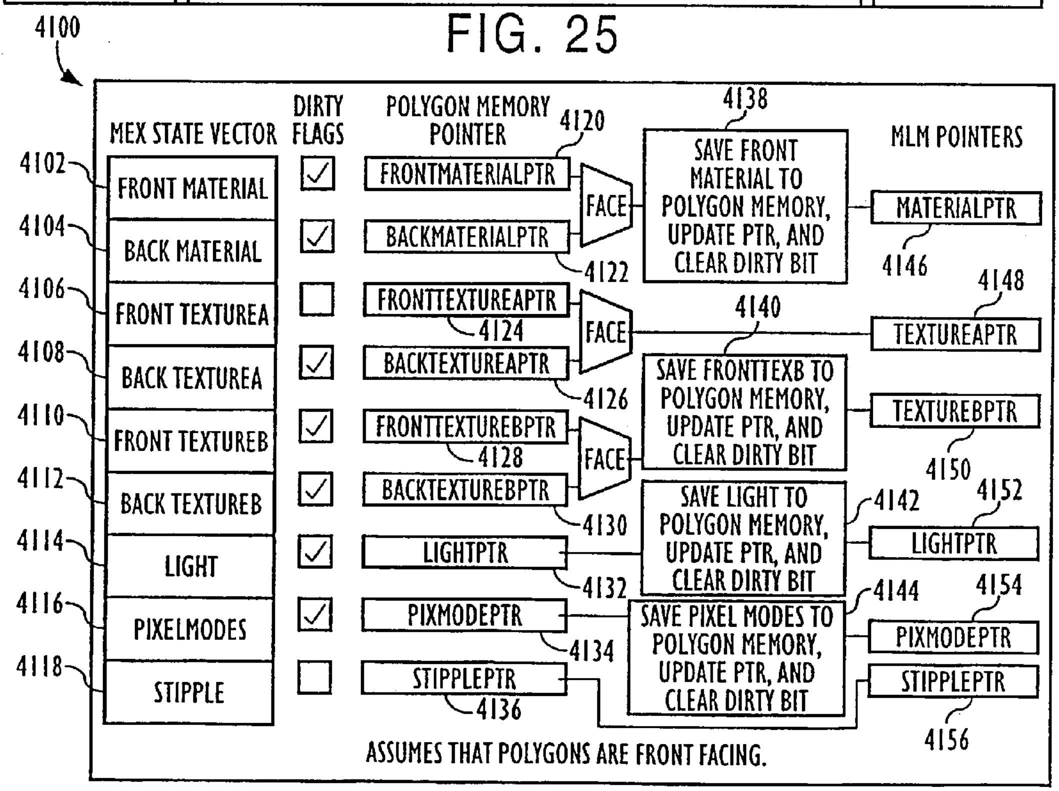

FIG. 26

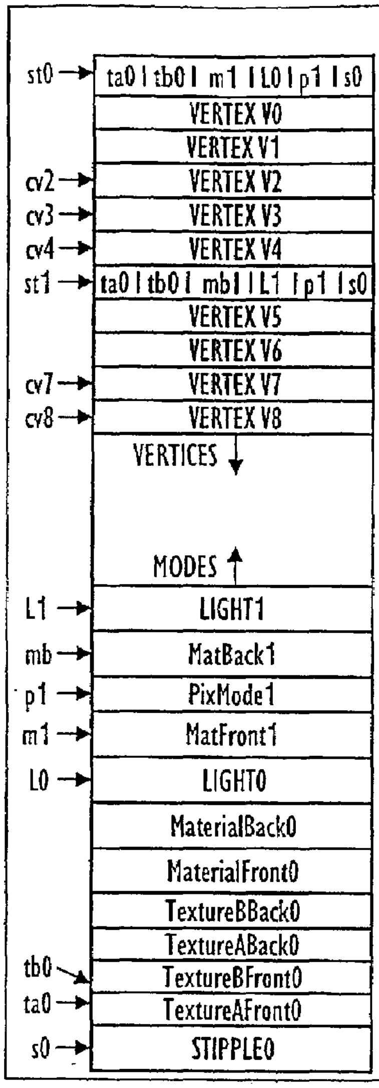

THE FOLLOWING PACKETS WILL BE SENT TO MEX IN TIME ORDER:

| VERTEX | PACKET | REUSE | TYPE | FRONT | COLOR OFFSET |
|---|---|---|---|---|---|
| | CullMode1 | | | | |
| | MatFront1 | | | | |
| | MatBack1 | | | | |
| | PixMode1 | | | | |
| V0 | COLOR | M | N | 1 | |
| V0 | SORT | M | N | 1 | cv2 |
| V1 | COLOR | M | N | 1 | |
| V1 | SORT | M | N | 1 | cv2 |
| V2 | COLOR | M | T | 1 | |
| V2 | SORT | M | T | 1 | cv2 |
| V3 | COLOR | M | T | 1 | |
| V1 | SORT | M | N | 1 | cv3 |
| Va | SORT | M | N | 1 | cv3 |
| Vb | SORT | 0 | T | 1 | cv3 |
| V2 | SORT | 0 | T | 1 | cv3 |
| V4 | COLOR | M | T | 1 | |
| V2 | SORT | M | N | 1 | cv4 |
| Vb | SORT | M | N | 1 | cv4 |
| Vc | SORT | 0 | T | 1 | cv4 |
| V4 | SORT | 0 | T | 1 | cv4 |
| | CullMode2 | | | | |
| | MatFront2 | | | | |
| | TexAFront2 | | | | |
| | Light1 | | | | |
| V5 | COLOR | 0 | N | 0 | |
| V5 | SORT | 0 | N | 0 | cv7 |
| V6 | COLOR | 0 | N | 0 | |
| V6 | SORT | 0 | N | 0 | cv7 |
| V7 | COLOR | 0 | T | 0 | |
| V7 | SORT | 0 | T | 0 | cv7 |
| V8 | COLOR | 0 | T | 0 | |
| V8 | SORT | 0 | T | 0 | cv8 |

FIG. 27

| DATA ITEM | BITS / ITEM | ITEMS / PACKET | BITS / PACKET | BYTES / PACKET | NOTES |
|---|---|---|---|---|---|
| COLOR ADDRESS | 23 | 1 | 23 | 2.875 | POINTS TO DUALOCT ADDRESS OF CURRENT VERTEX |
| COLOR OFFSET | 8 | 1 | 8 | 1 | NUMBER OF VERTICES SEPARATING THE CURRENT VERTEX AND THE LAST MLM POINTER |
| COLOR TYPE (FORMAT) | 4 | 1 | 4 | 0.5 | SEE COLOR TYPE TABLE |
| | | | 35 | 4.375 | |

FIG. 28

| BIT VALUE | MEANING | BIT VALUE | MEANING |
|---|---|---|---|
| 00xx | 2 DUAL OCTS | xx00 | TRIANGLE STRIP |
| 01xx | 4 DUAL OCTS | xx01 | TRIANGLE FAN |
| 10xx | 6 DUAL OCTS | xx10 | LINE |
| 11xx | 9 DUAL OCTS | xx11 | POINT |

FIG. 29

| DATA ITEM | BITS / ITEM | ITEMS / PACKET | BITS / PACKET | BYTES / PACKET |
|---|---|---|---|---|
| MATERIAL POINTER | 23 | 1 | 23 | 2.875 |
| MODE POINTER | 23 | 1 | 23 | 2.875 |
| LIGHT POINTER | 23 | 1 | 23 | 2.875 |
| textureA POINTER | 23 | 1 | 23 | 2.875 |
| textureB POINTER | 23 | 1 | 23 | 2.875 |
| STIPPLE POINTER | 23 | 1 | 23 | 2.875 |
| | | | 138 | 17.25 |

FIG. 30

| | CACHE | BLOCK | # ENTRIES | DATA CACHELINE SIZE IN (DUALOCTS) |
|---|---|---|---|---|
| 10012 | COLORVERTEX | MIJ | .32 | 2 - 9 |
| 10014 | MLM_PTR | MIJ | 32 | 1 |
| 10016 | COLORDATA | FRG | 64 - 256 | 6 - 27 |
| 10018 | TEXTUREA | TEX | 32 | 2 |
| 10020 | TEXTUREB | TEX | 8 | 6 |
| 10022 | MATERIAL | PHG | 32 | 10 |
| 10024 | LIGHT | PHG | 8 | 18 |
| 10026 | PIXELMODE | PIX | 16 | 2 |
| 10028 | STIPPLE | PIX | 4 | 8 |

FIG. 55 pMASK 1000
sMASK 1000, 0000, 0000, 0000
COVERAGE 1/4, 0, 0, 0 pMASK 0100
sMASK 0000, 1110, 0000, 0000
COVERAGE 0, 3/4, 0, 0 pMASK 1000
sMASK 0010, 0000, 0000, 0000
COVERAGE 1/4, 0, 0, 0 pMASK 1111
sMASK 1111, 0001, 1100, 1100
COVERAGE 1, 1/4, 1/2, 1/2

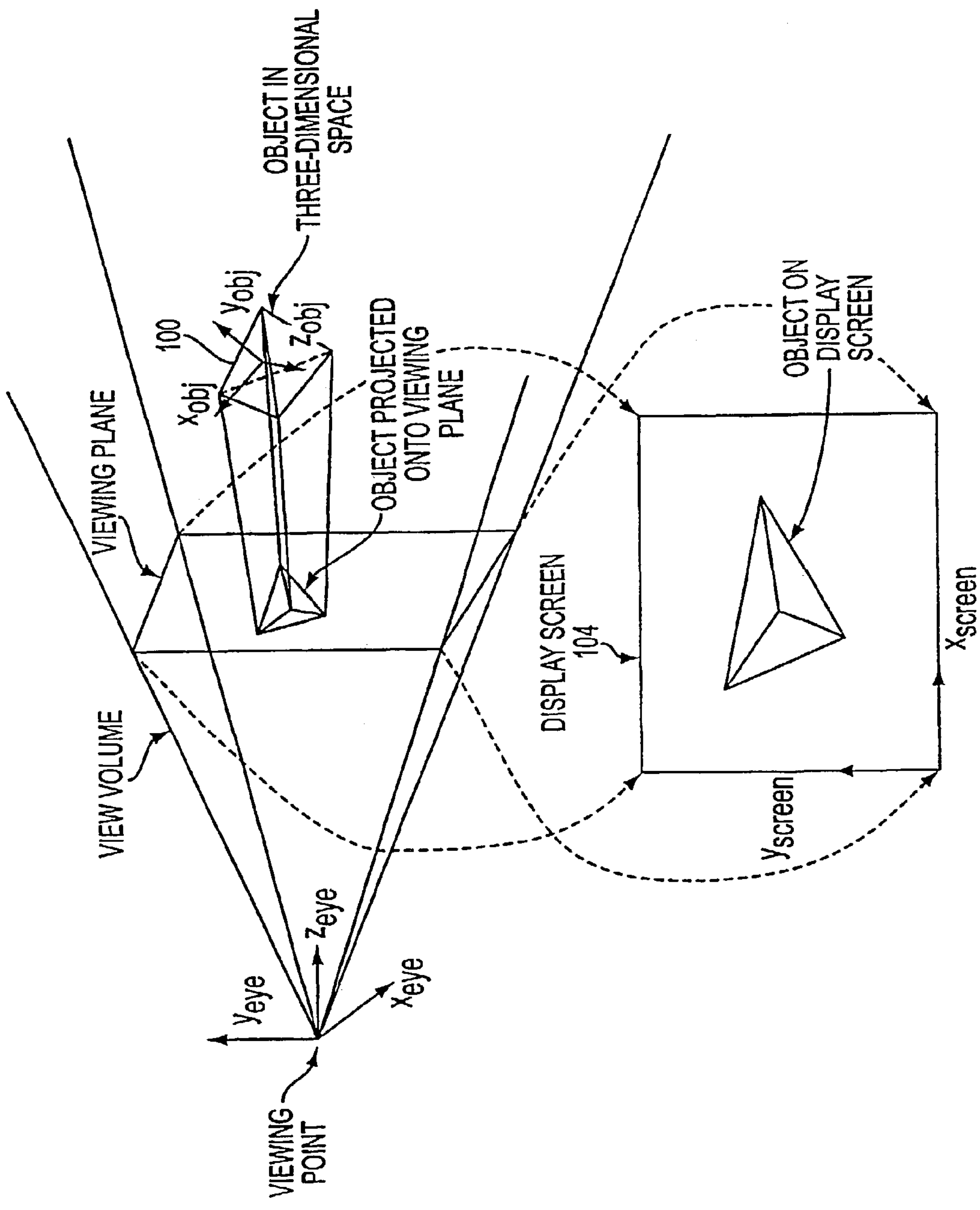
FIG. A1

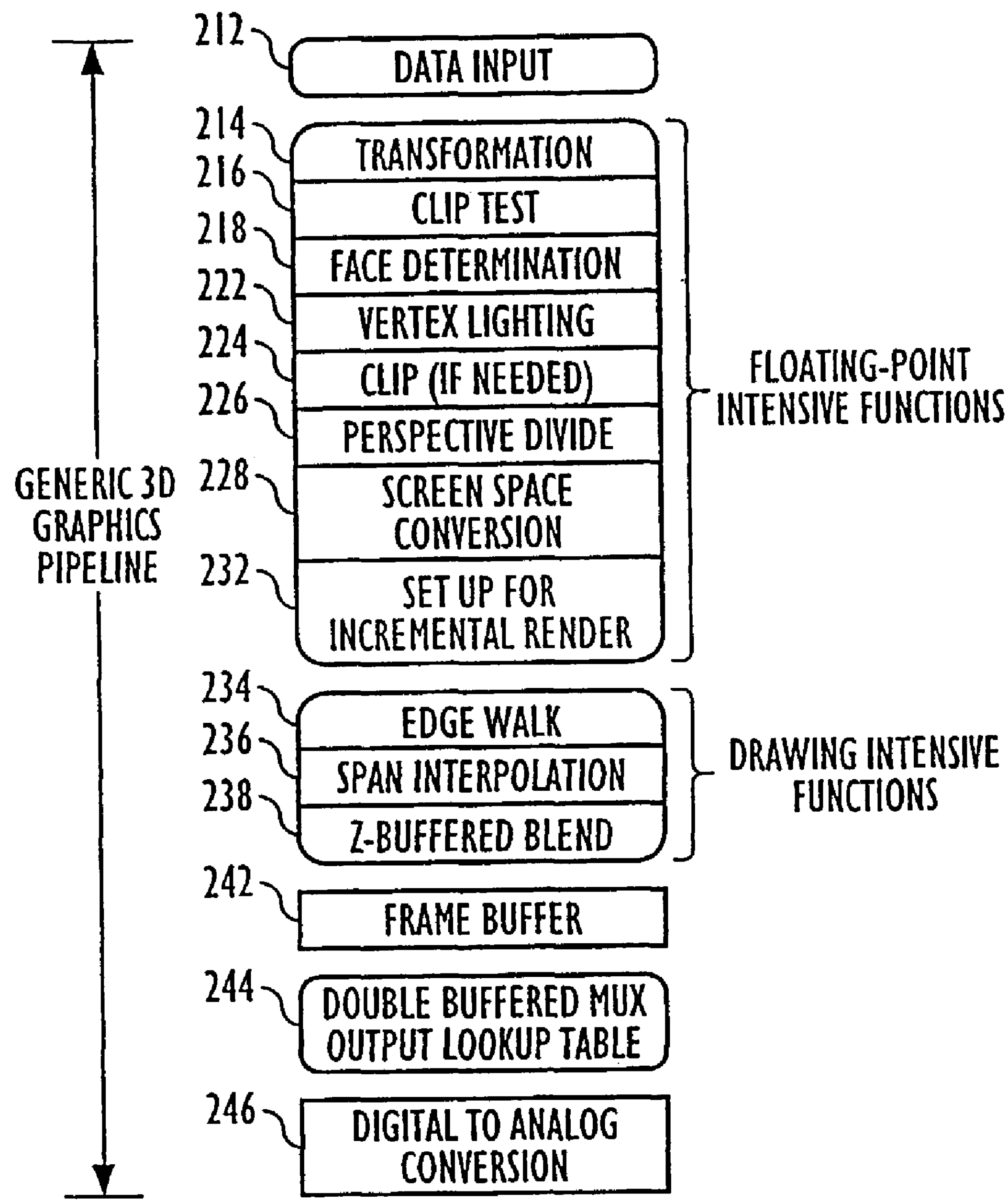
FIG. A2

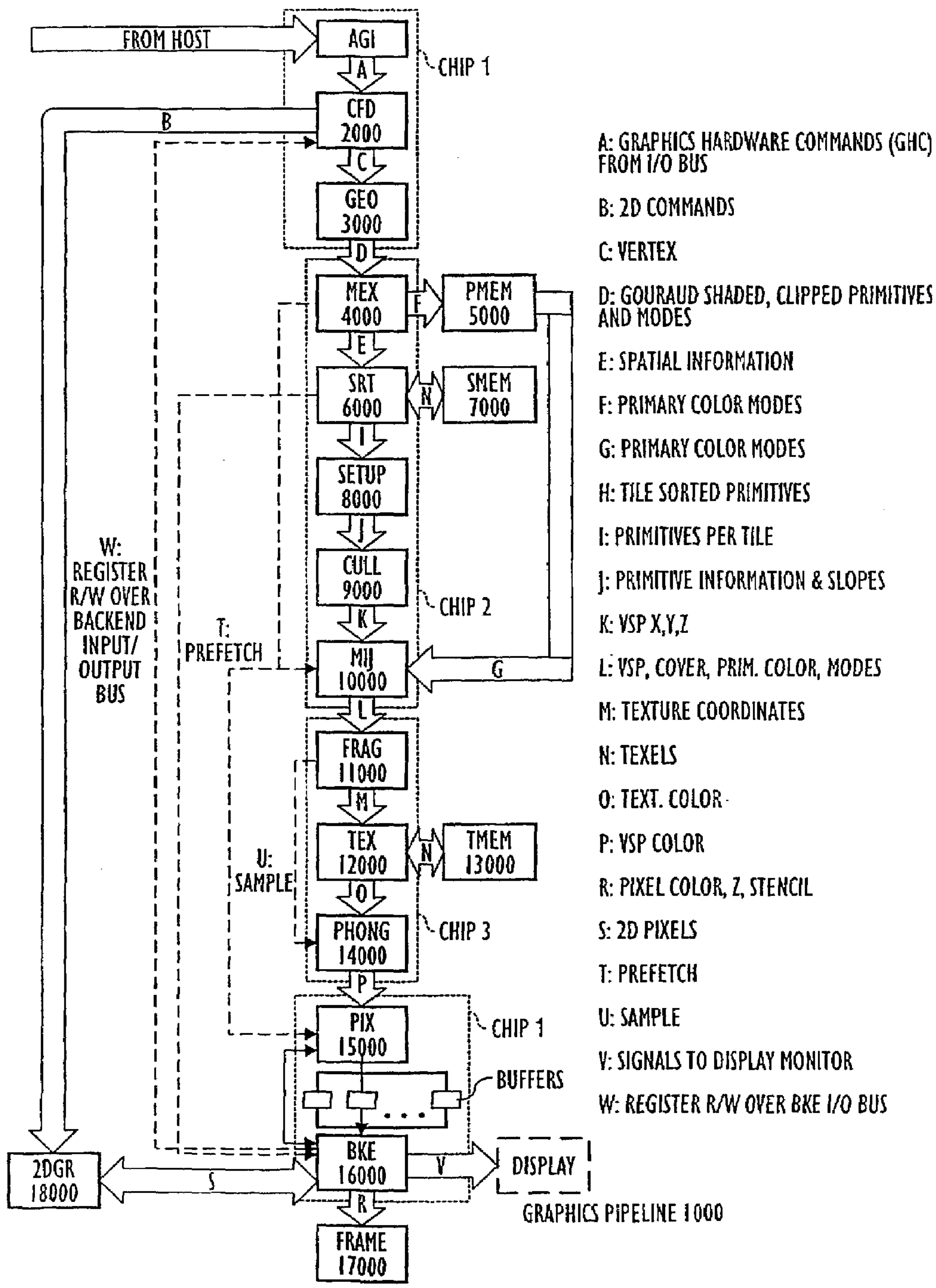
FIG. A3

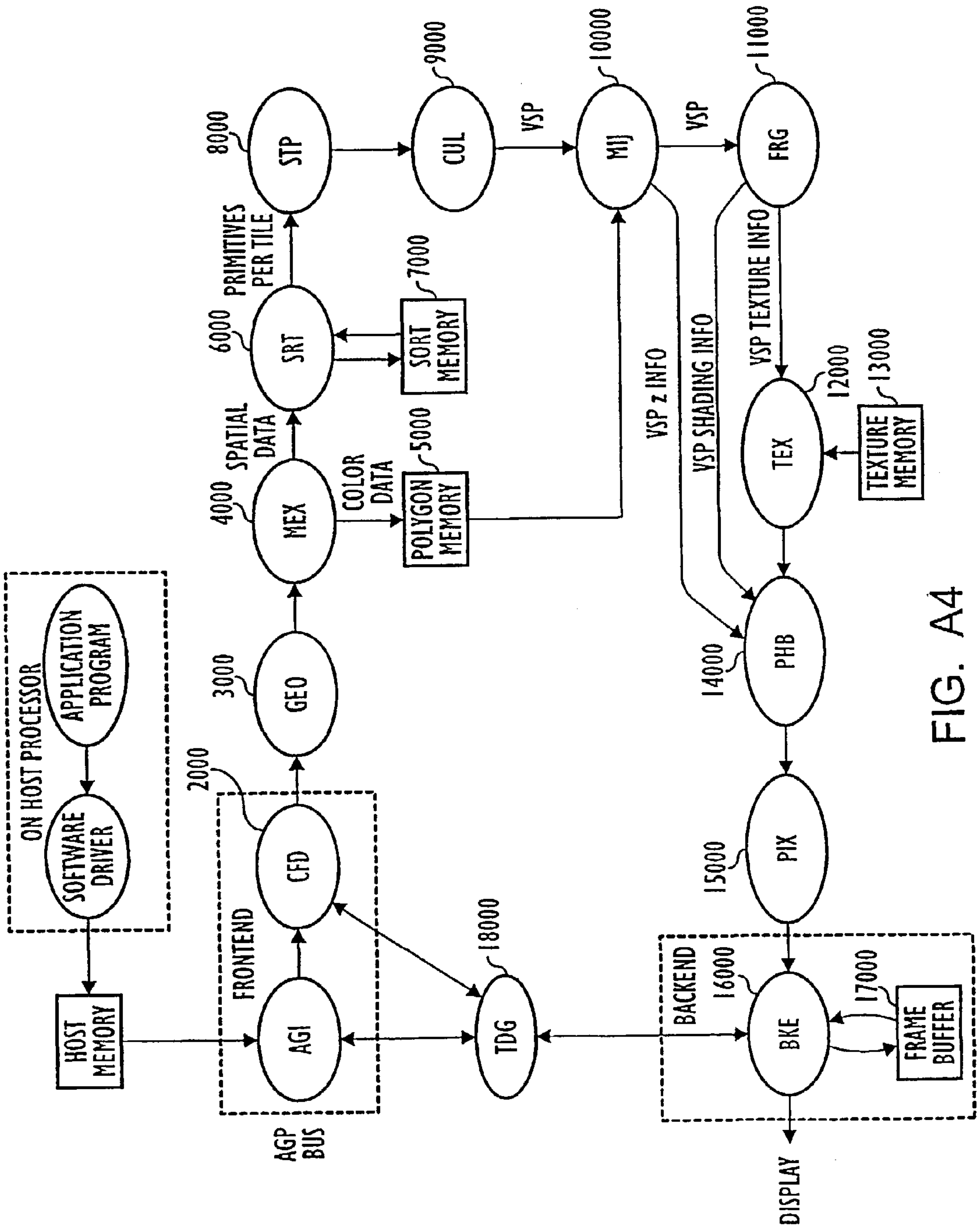
FIG. A4

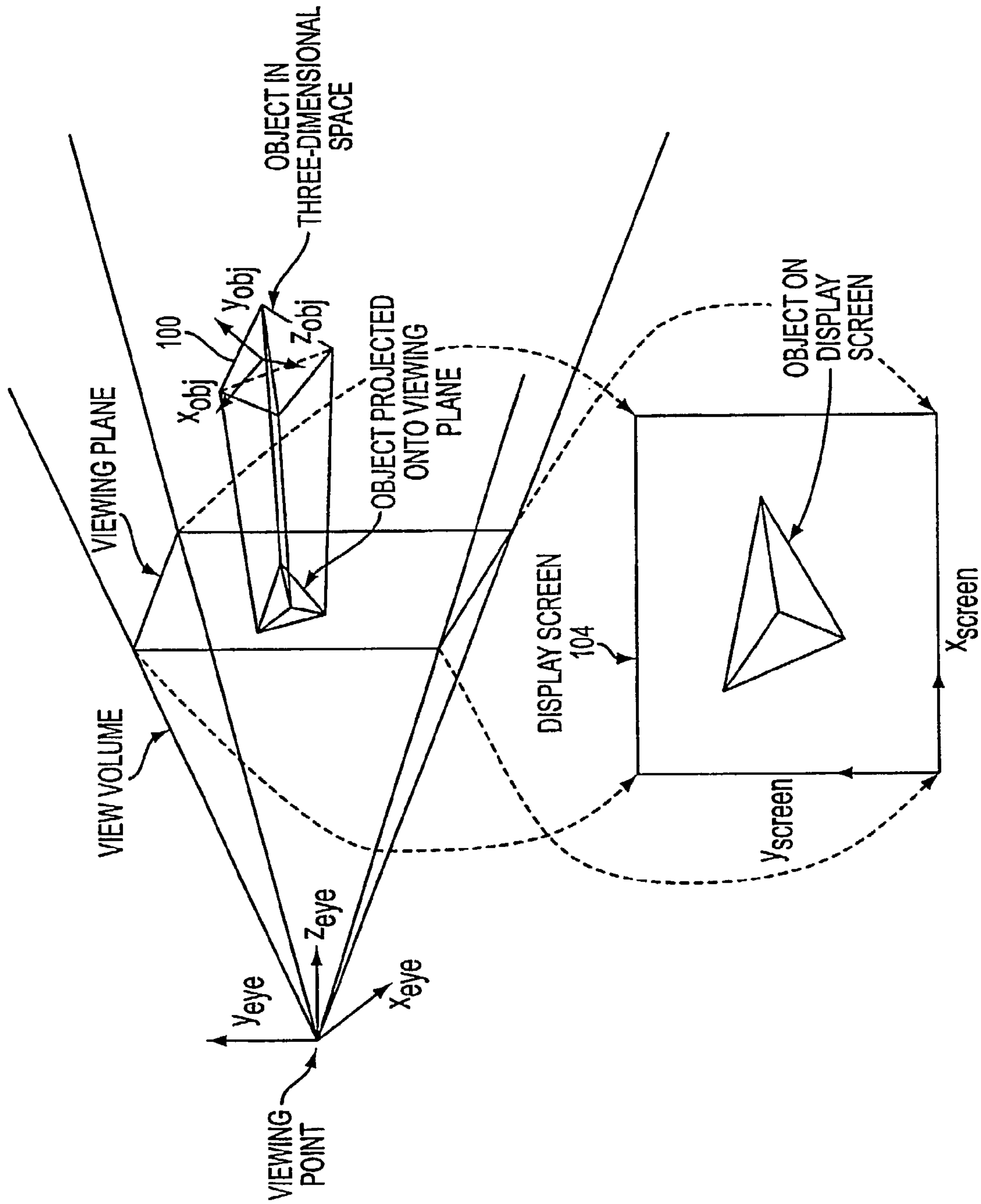
FIG. B1

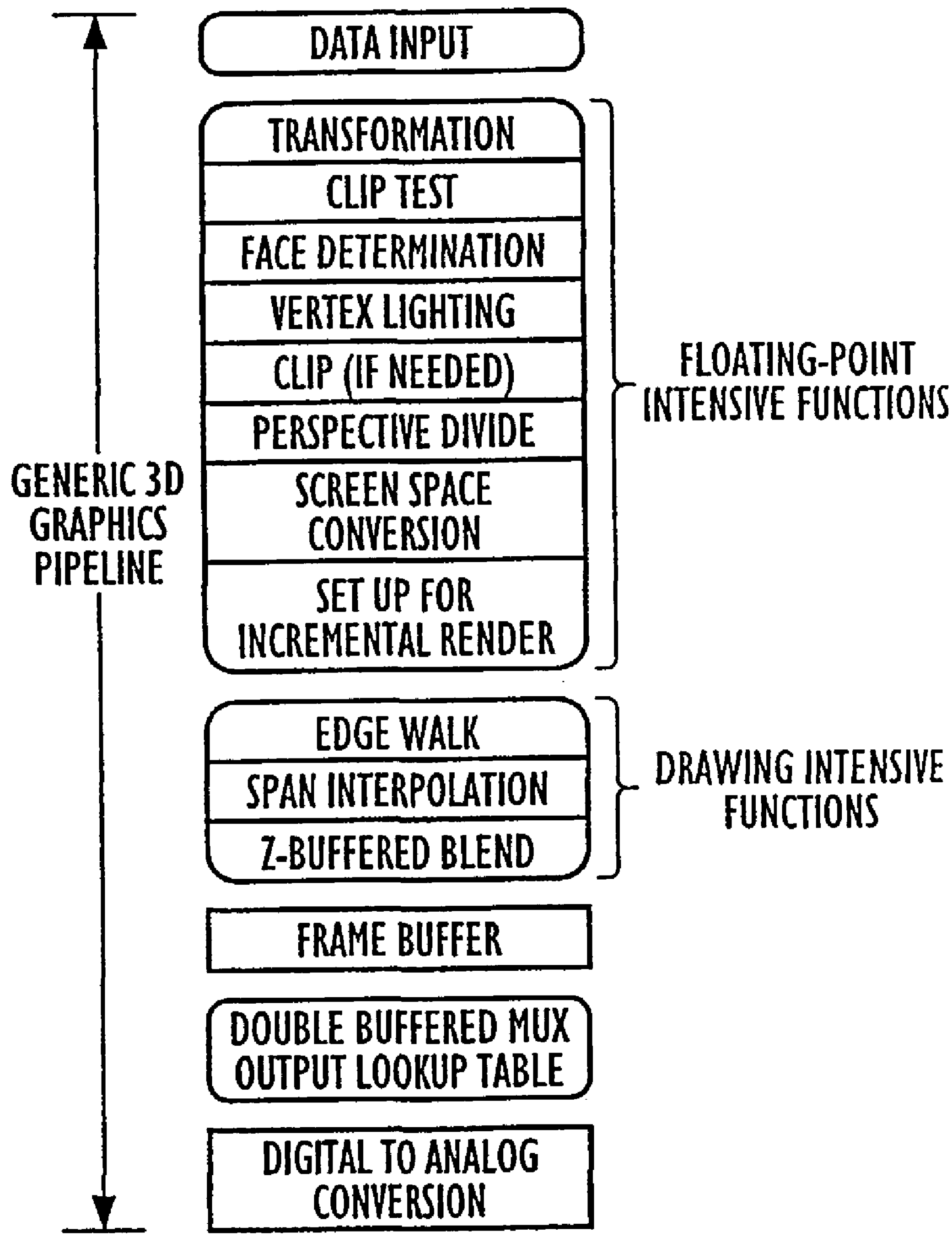
FIG. B2
(PRIOR ART)

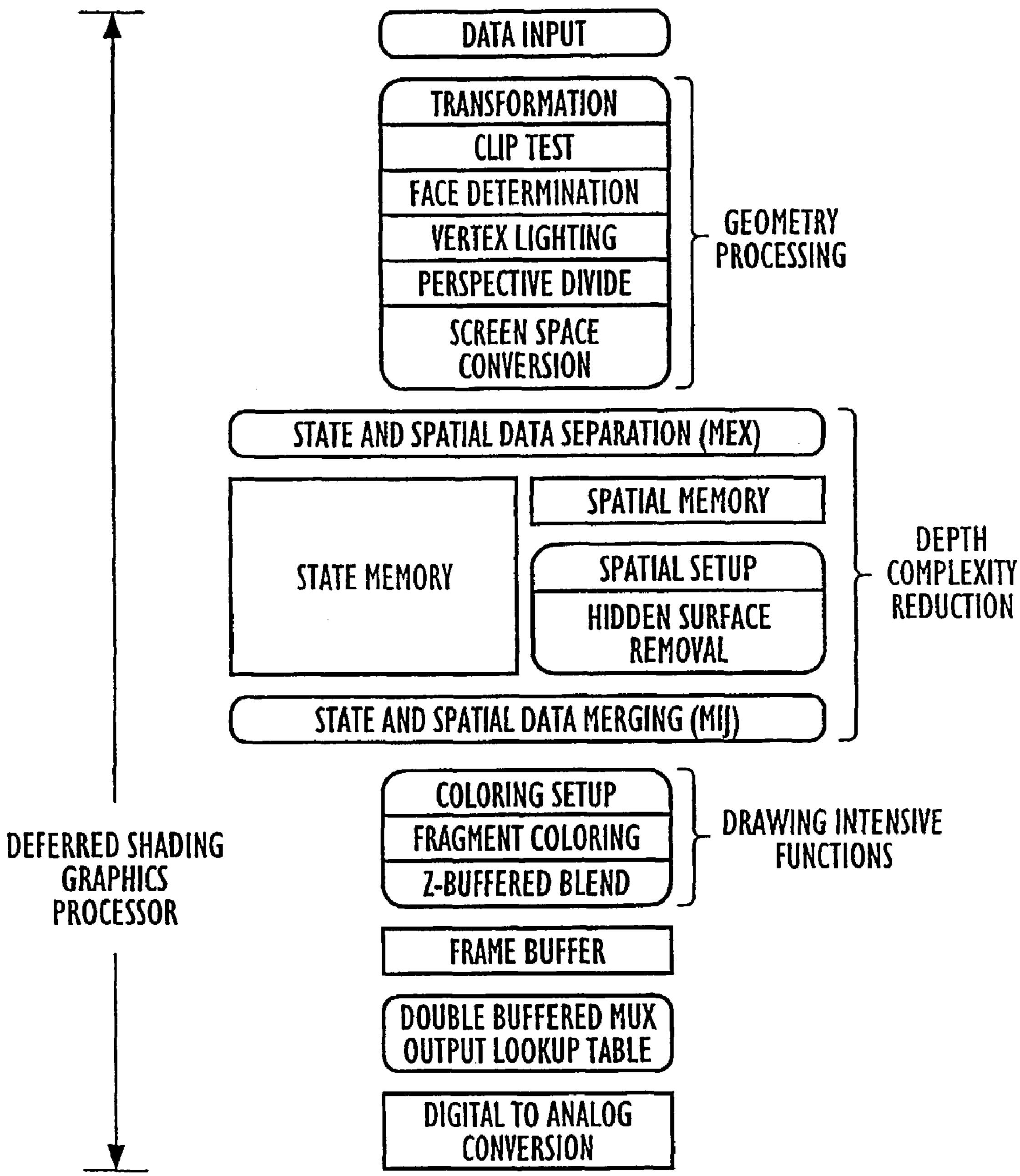
FIG. B3

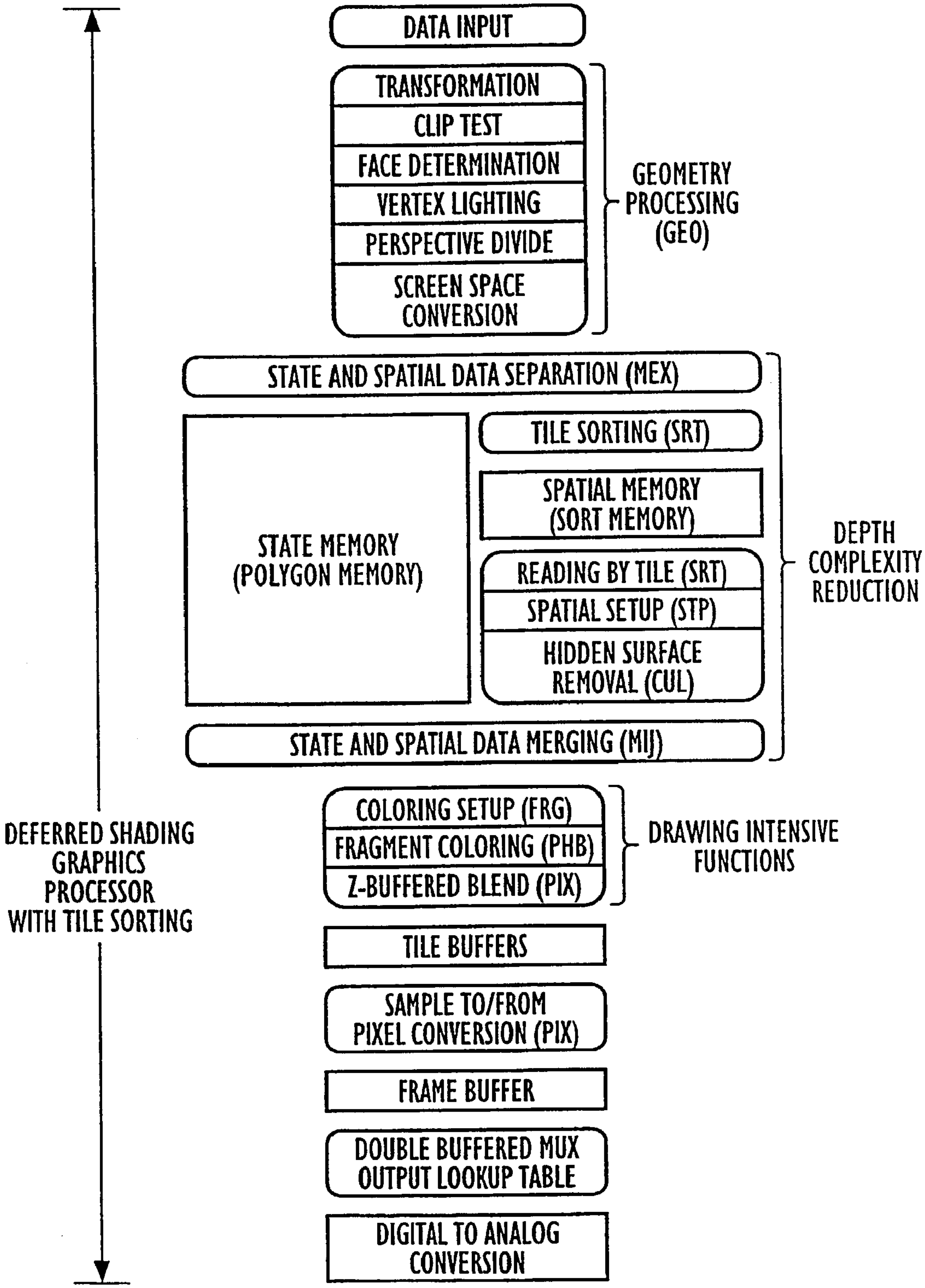
FIG. B4

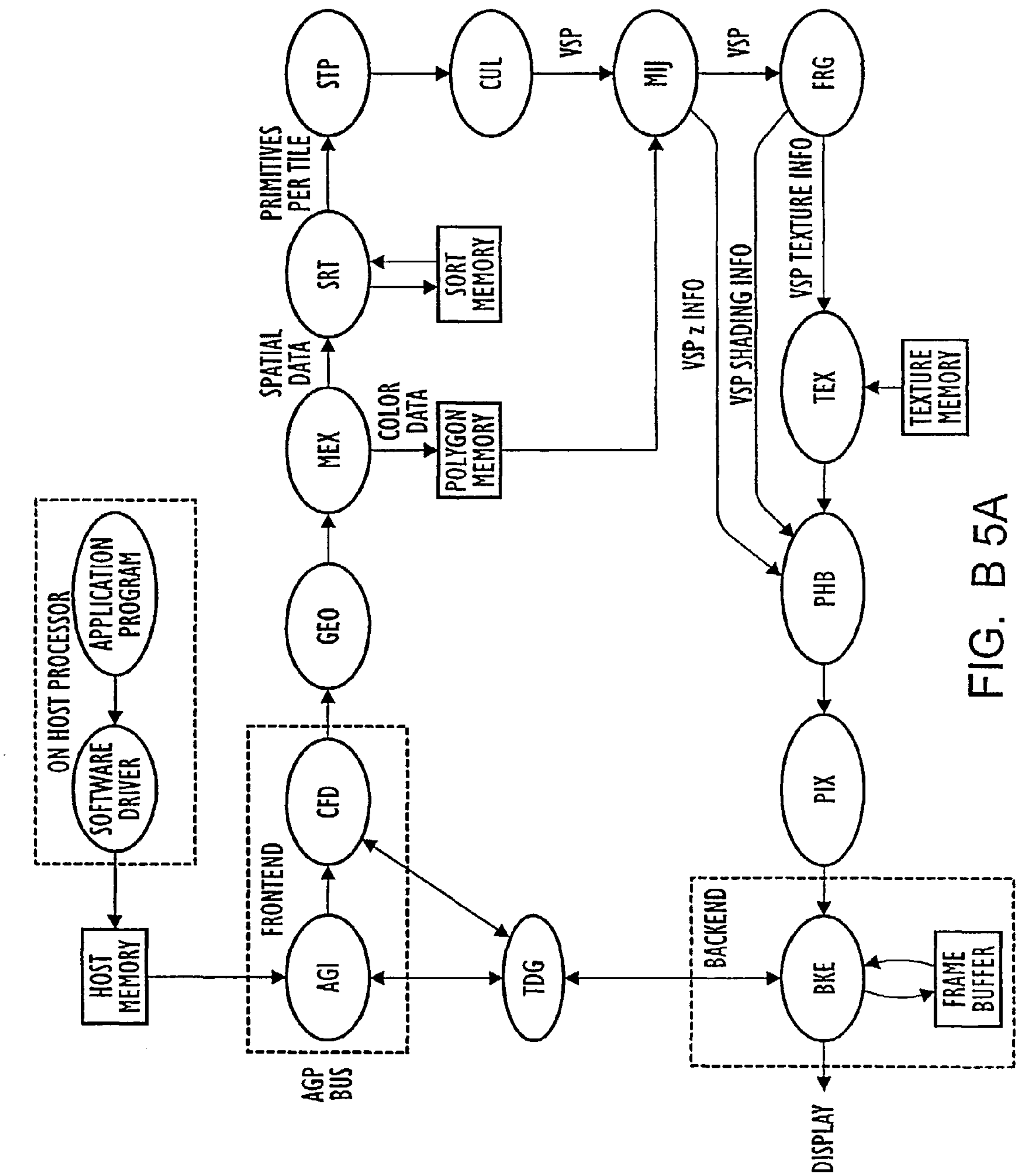
FIG. B 5A

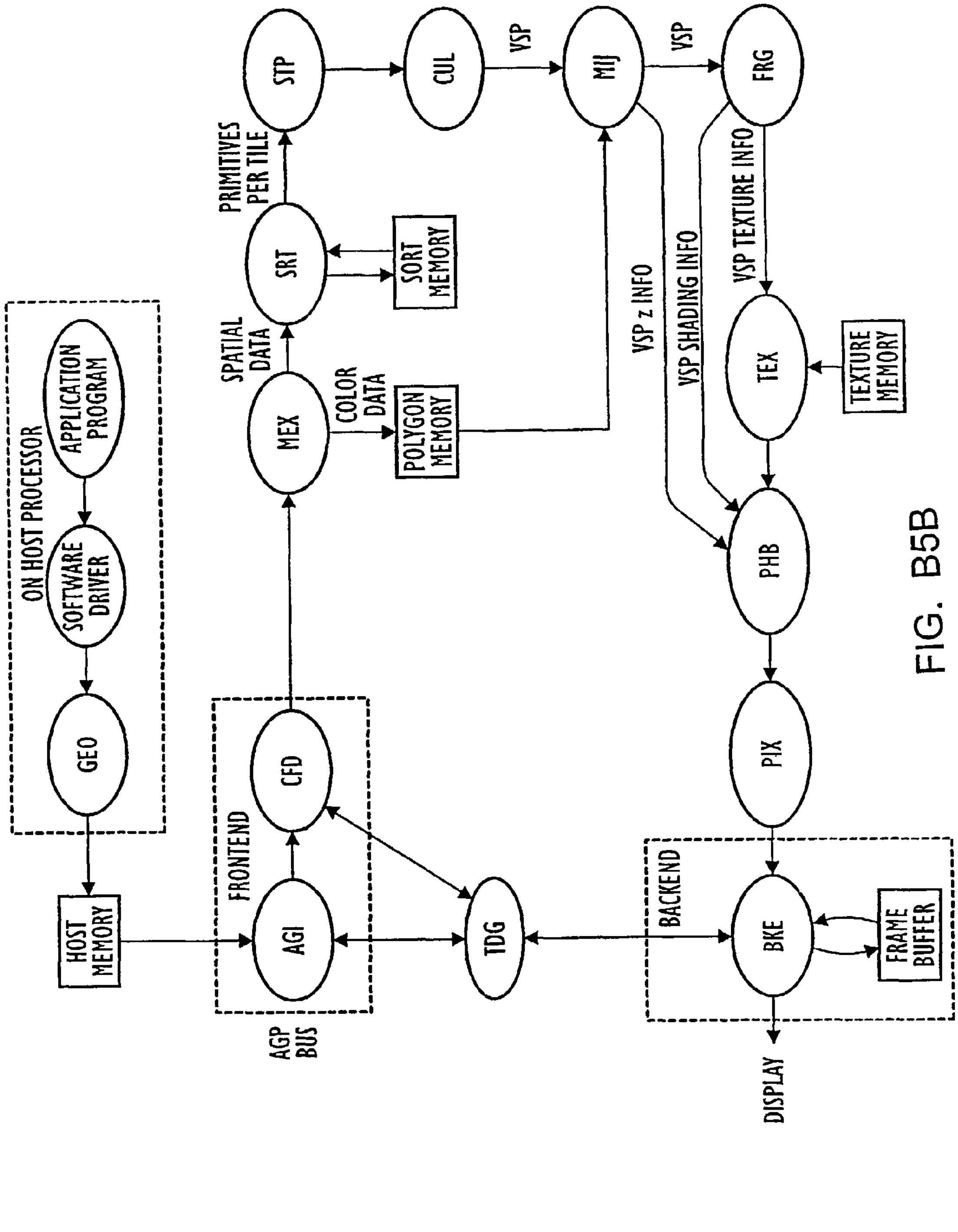
FIG. B5B

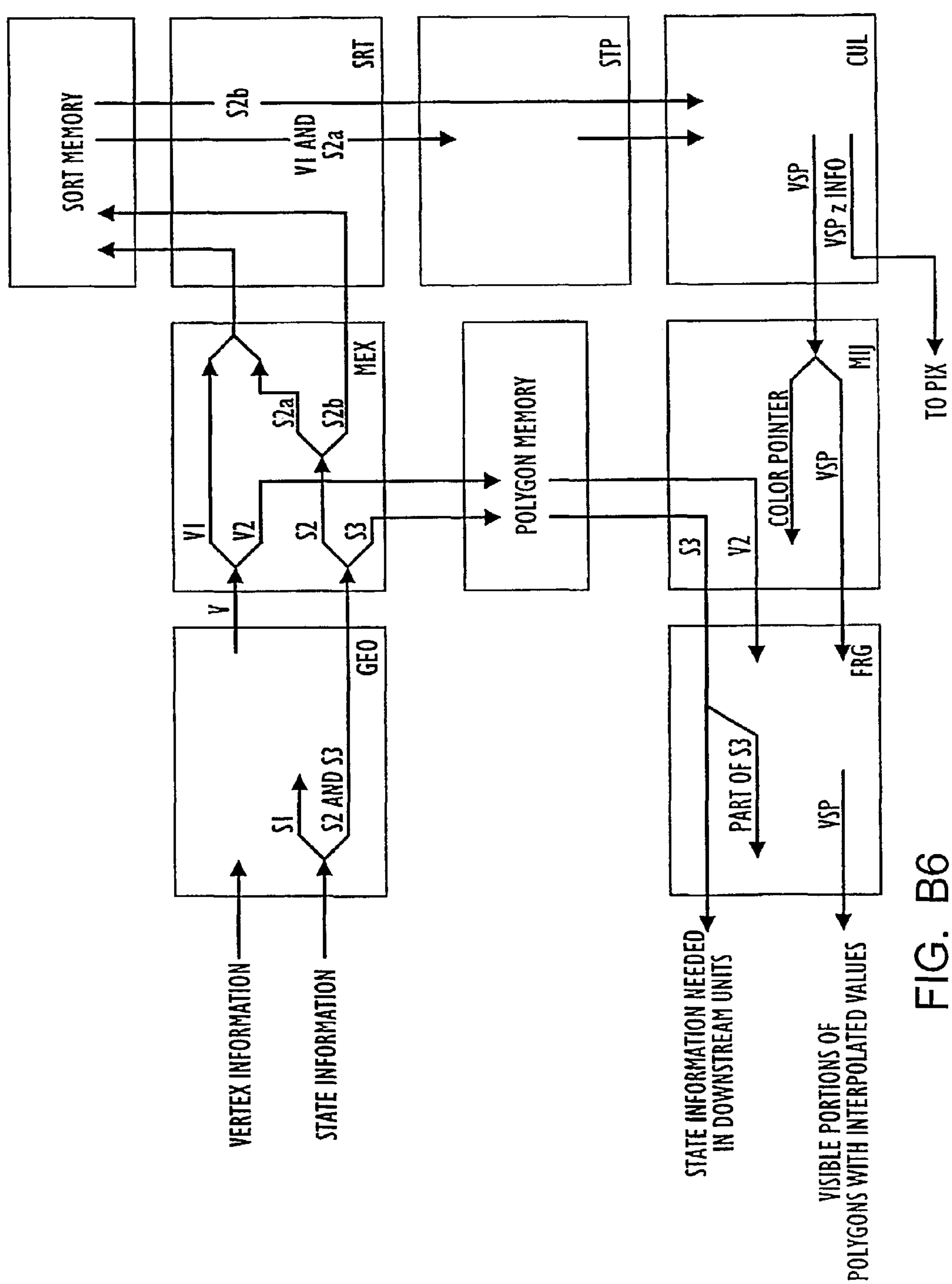
FIG. B6

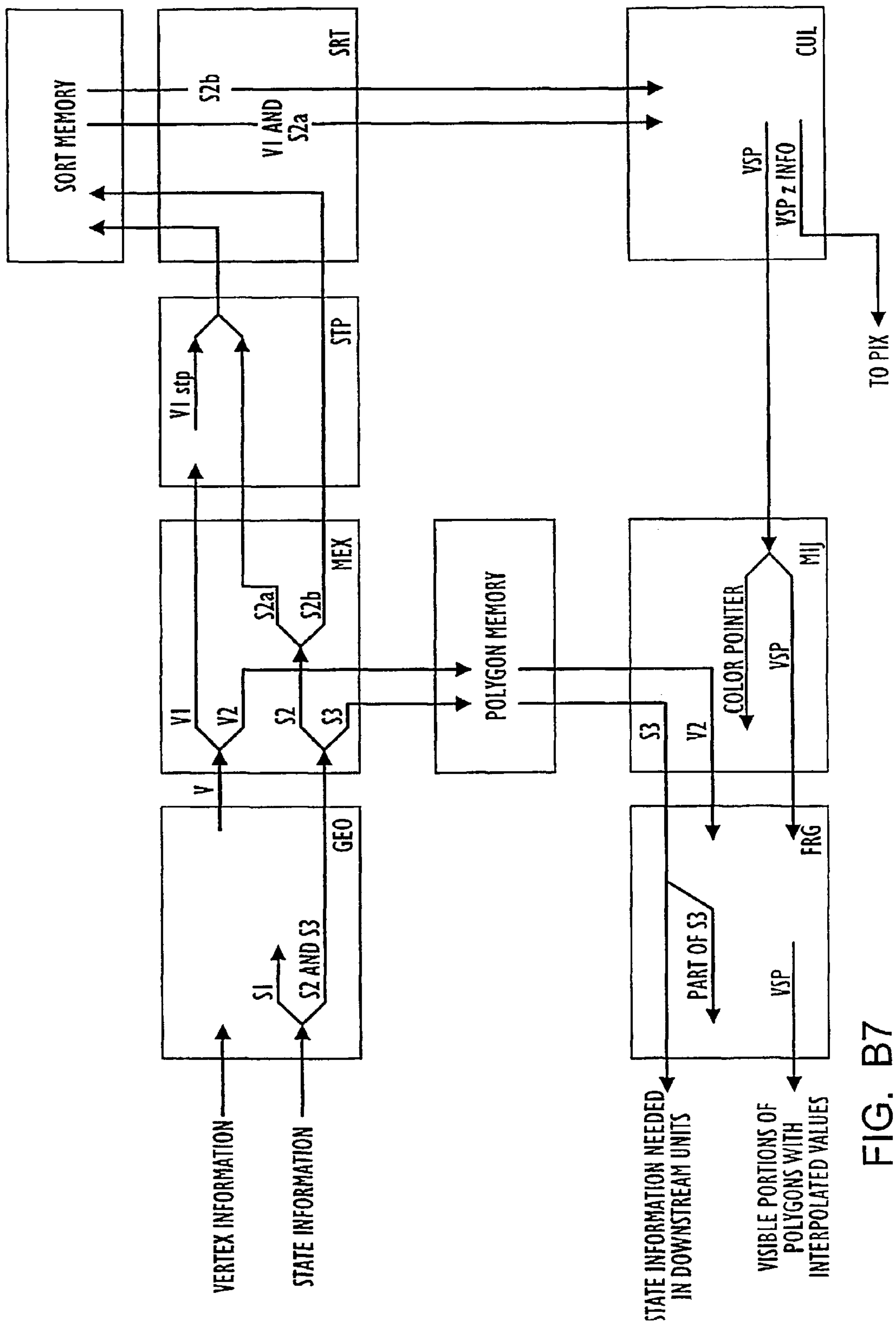
FIG. B7

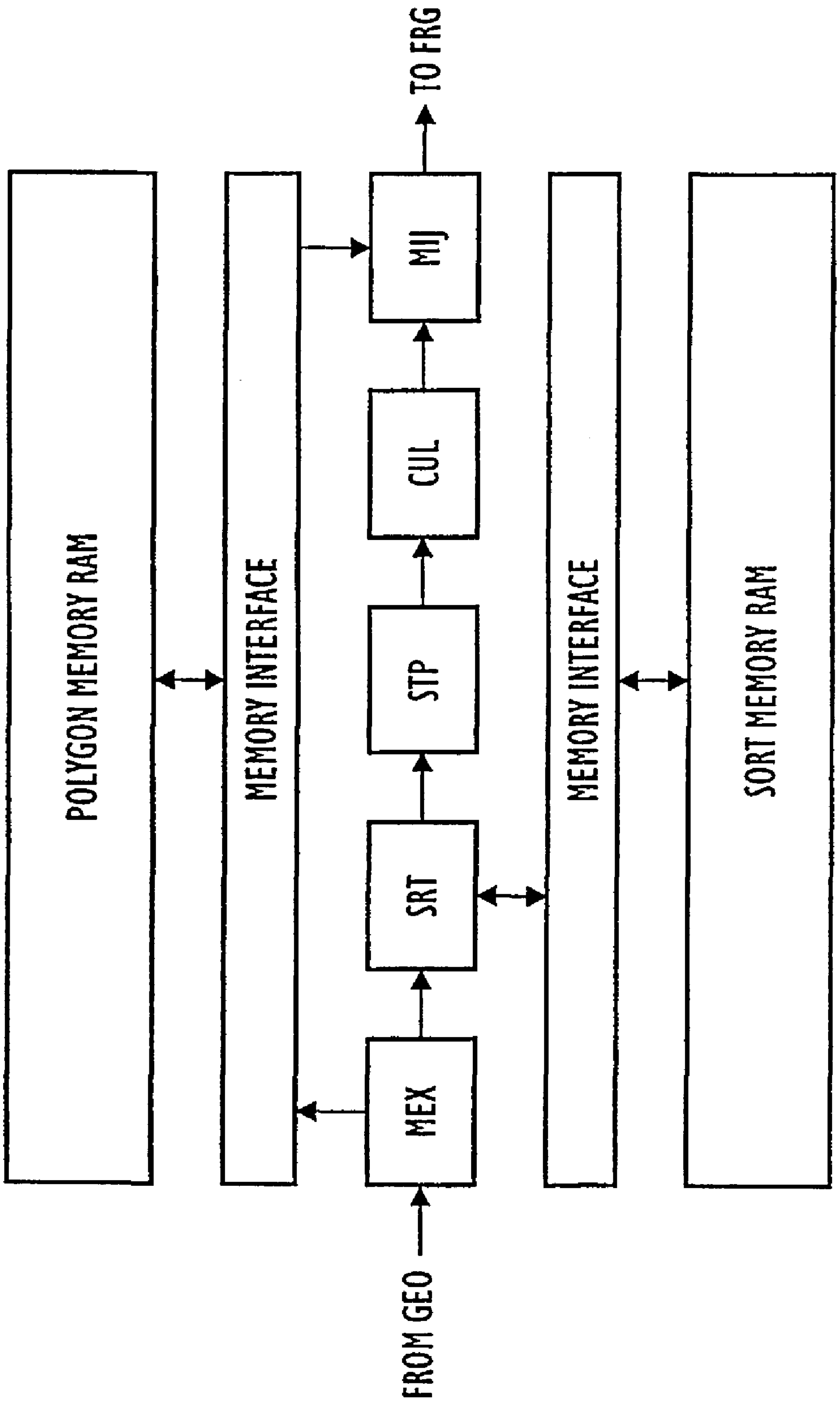
FIG. B8

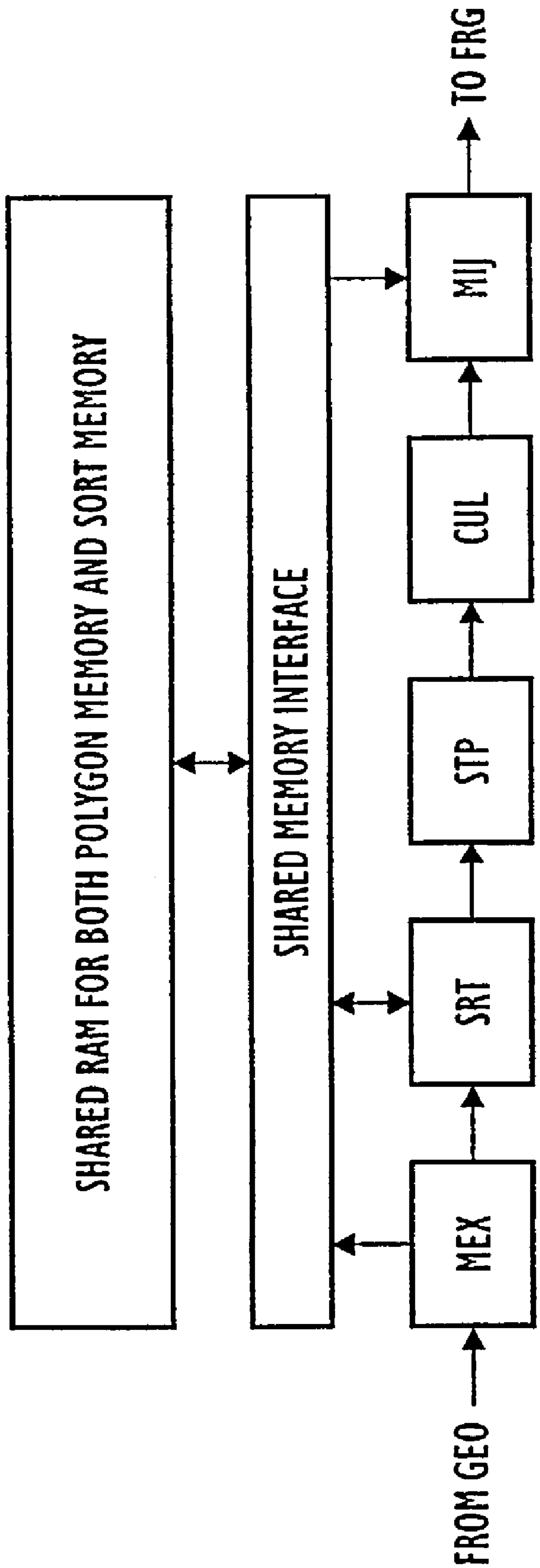
FIG. B9

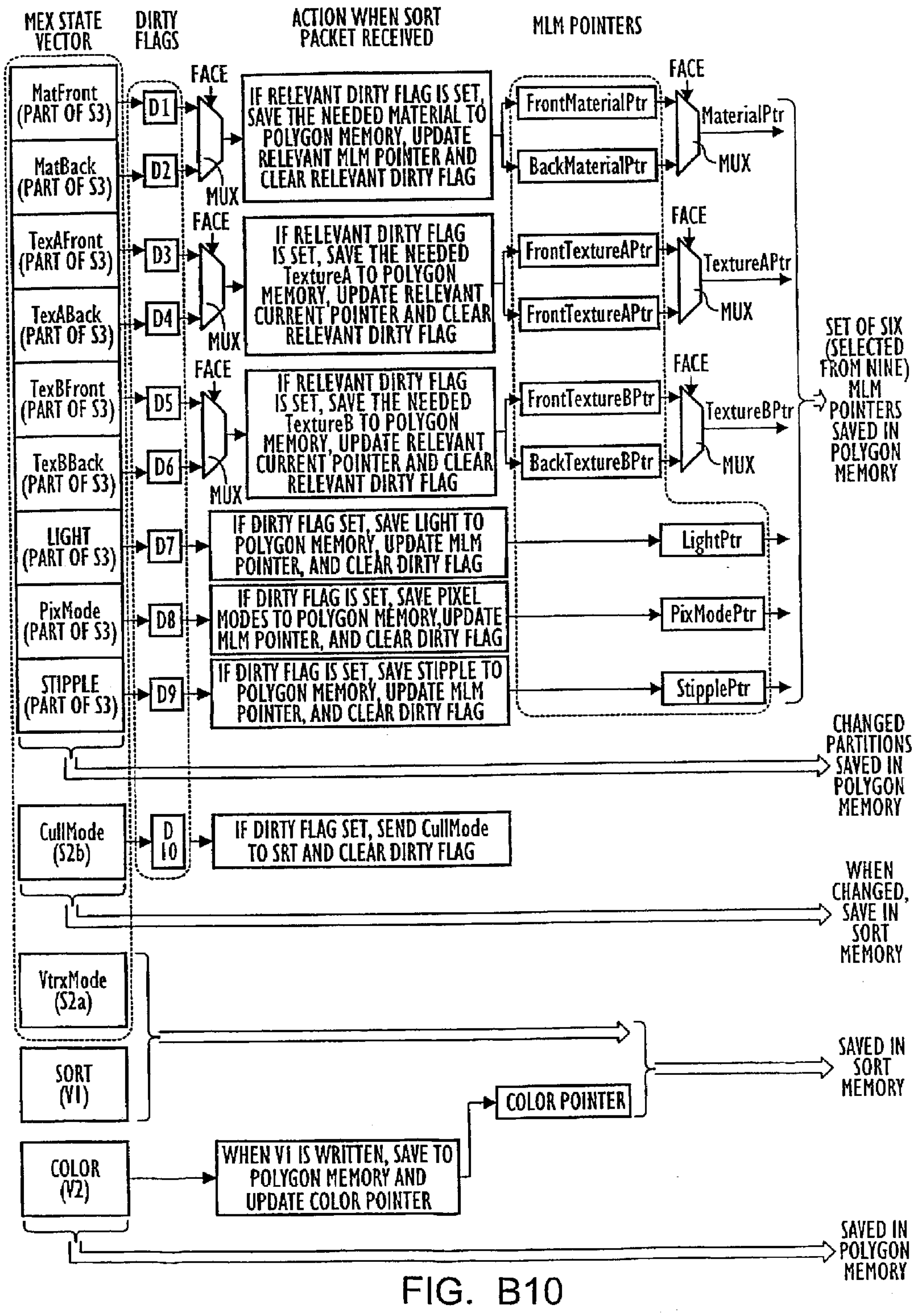
FIG. B10

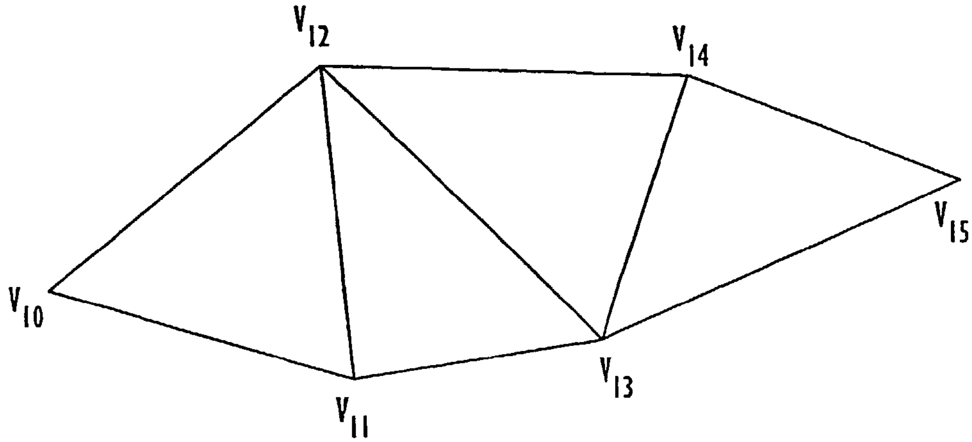

FIG. B11A

| | VERTEX INFORMATION V1 | SORT PRIMITIVE TYPE | STATE INFORMATION S2a | COLORADDRESS | COLOROFFSET | COLORTYPE | COLORSIZE |
|---|---|---|---|---|---|---|---|
| $V_{10}$ | V1 FOR $V_{10}$ | tri_strip | S2a | 0x00103D | 0x00 | tri_strip | 0x02 |
| $V_{11}$ | V1 FOR $V_{11}$ | tri_strip | S2a | 0x00103F | 0x01 | tri_strip | 0x02 |
| $V_{12}$ | V1 FOR $V_{12}$ | tri_strip | S2a | 0x001041 | 0x02 | tri_strip | 0x02 |
| $V_{13}$ | V1 FOR $V_{13}$ | tri_strip | S2a | 0x001043 | 0x03 | tri_strip | 0x02 |
| $V_{14}$ | V1 FOR $V_{14}$ | tri_strip | S2a | 0x001045 | 0x04 | tri_strip | 0x02 |
| $V_{15}$ | V1 FOR $V_{15}$ | tri_strip | S2a | 0x001047 | 0x05 | tri_strip | 0x02 |

SIX VERTEX ENTRIES IN SORT MEMORY

COLOR POINTERS

FIG. B11B

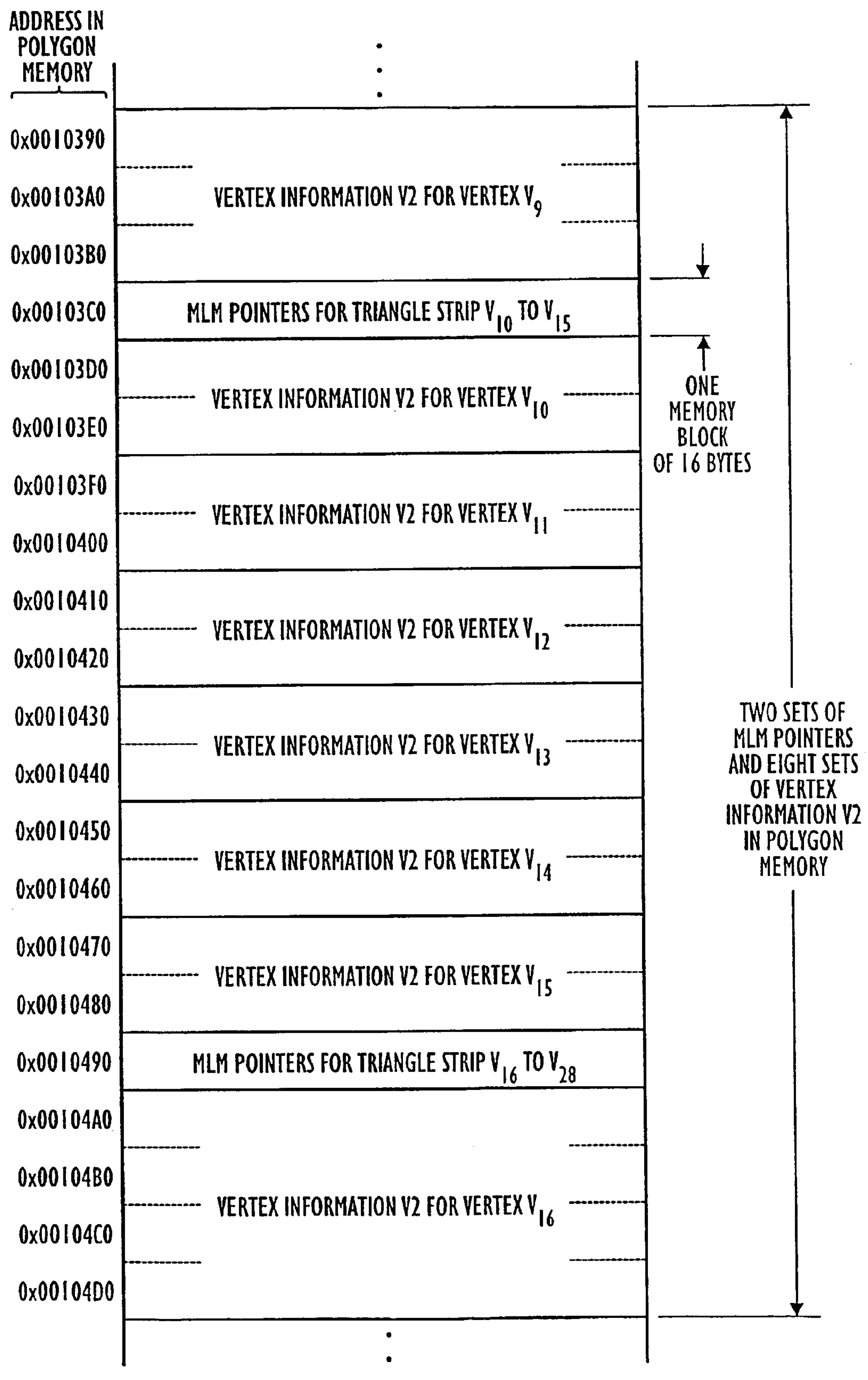
FIG. B12

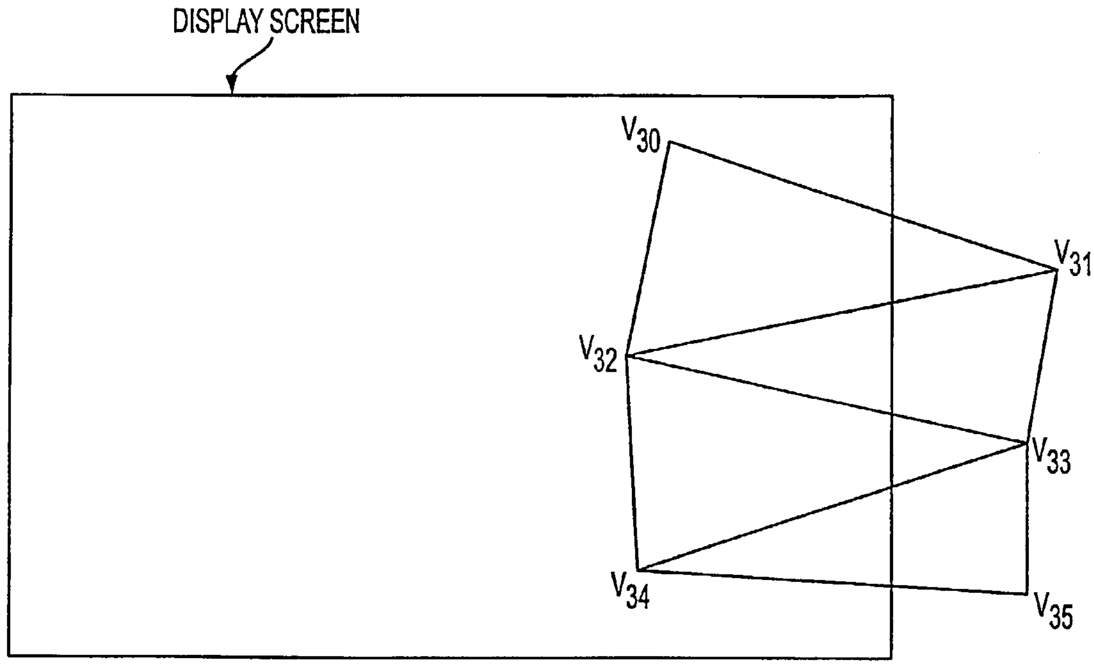
FIG. B13A
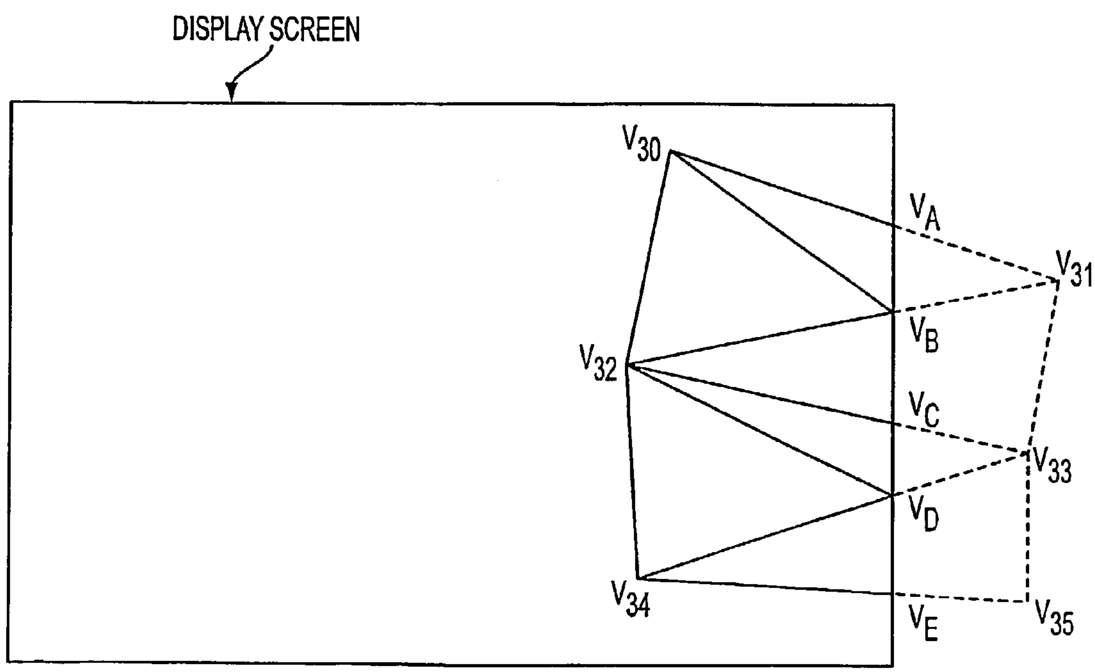
FIG. B13B

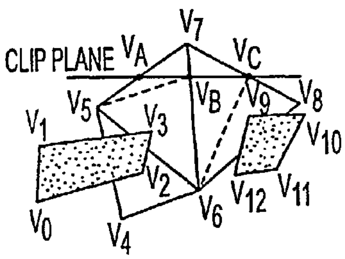

FIG. B14A

| PACKET NUMBER | PACKET TYPE | VERTEX NUMBER | REUSE | TYPE | FrontFace | COMPLETED PRIMITVE FOR SRT | COMPLETED PRIMITVE FOR MEX |
|---|---|---|---|---|---|---|---|
| 1 | BeginFrame | | | | | | |
| 2 | CullMode | | | | | | |
| 3 | MatFront | | | | | | |
| 4 | MatBack | | | | | | |
| 5 | TexAFront | | | | | | |
| 6 | TexABack | | | | | | |
| 7 | TexBFront | | | | | | |
| 8 | TexBBack | | | | | | |
| 9 | PixMode | | | | | | |
| 10 | LIGHT | | | | | | |
| 11 | STIPPLE | | | | | | |
| 12 | VtxMode | | | | | | |
| 13 | CLEAR | | | | | | |
| 14 | MatFront | | | | | | |
| 15 | TexAFront | | | | | | |
| 16 | COLOR | $V_0$ | M | N | 1 | | |
| 17 | SORT | $V_0$ | M | N | 1 | | |
| 18 | COLOR | $V_1$ | M | N | 1 | | |
| 19 | SORT | $V_1$ | M | N | 1 | | |
| 20 | COLOR | $V_2$ | M | T | 1 | | $V_2$-$V_1$-$V_0$ |
| 21 | SORT | $V_2$ | M | T | 1 | $V_2$-$V_1$-$V_0$ | |
| 22 | COLOR | $V_3$ | M | T | 1 | | $V_3$-$V_2$-$V_1$ |
| 23 | SORT | $V_3$ | M | T | 1 | $V_3$-$V_2$-$V_1$ | |
| 24 | MatFront | | | | | | |
| 25 | TexAFront | | | | | | |
| 26 | COLOR | $V_4$ | M | N | 1 | | |
| 27 | SORT | $V_4$ | M | N | 1 | | |
| 28 | COLOR | $V_5$ | M | N | 1 | | |
| 29 | SORT | $V_5$ | M | N | 1 | | |
| 30 | COLOR | $V_6$ | M | T | 1 | | $V_6$-$V_5$-$V_4$ |
| 31 | SORT | $V_6$ | M | T | 1 | $V_6$-$V_5$-$V_4$ | |
| 32 | COLOR | $V_7$ | M | T | 1 | | $V_7$-$V_6$-$V_5$ |
| 33 | SORT | $V_5$ | M | N | 1 | | |
| 34 | SORT | $V_A$ | M | N | 1 | | |
| 35 | SORT | $V_B$ | M | T | 1 | $V_B$-$V_A$-$V_5$ | |
| 36 | SORT | $V_6$ | O | T | 1 | $V_6$-$V_B$-$V_5$ | |
| 37 | COLOR | $V_8$ | M | T | 1 | | $V_8$-$V_7$-$V_6$ |
| 38 | SORT | $V_6$ | M | N | 1 | | |
| 39 | SORT | $V_B$ | M | N | 1 | | |
| 40 | SORT | $V_C$ | M | T | 1 | $V_C$-$V_B$-$V_6$ | |
| 41 | SORT | $V_8$ | O | T | 1 | $V_8$-$V_C$-$V_6$ | |
| 42 | CullMode | | | | | | |
| 43 | MatFront | | | | | | |
| 44 | TexAFront | | | | | | |
| 45 | LIGHT | | | | | | |
| 46 | VtxMode | | | | | | |
| 47 | COLOR | $V_9$ | M | N | 0 | | |
| 48 | SORT | $V_9$ | M | N | 0 | | |
| 49 | COLOR | $V_{10}$ | M | N | 0 | | |
| 50 | SORT | $V_{10}$ | M | N | 0 | | |
| 51 | COLOR | $V_{11}$ | M | T | 0 | | $V_{11}$-$V_{10}$-$V_9$ |
| 52 | SORT | $V_{11}$ | M | T | 0 | $V_{11}$-$V_{10}$-$V_9$ | |
| 53 | COLOR | $V_{12}$ | O | T | 0 | | $V_{12}$-$V_{11}$-$V_9$ |
| 54 | SORT | $V_{12}$ | O | T | 0 | $V_{12}$-$V_{11}$-$V_9$ | |
| 55 | EndFrame | | | | | | |

FIG. B14B

| ADDRESS IN SORT MEMORY | VERTEX INFORMATION V1 | SORT PRIMITIVE TYPE | STATE INFORMATION S2a | COLORADDRESS | COLOROFFSET | COLORTYPE | COLORSIZE |
|---|---|---|---|---|---|---|---|
| 0x0000000 | CullMode pkt 2 | | | | | | |
| 0x0000010 | Clear pkt 13, ColorAddress = 0xFFFFFF FOR PixMode DATA ONLY | | | | | | |
| 0x0000020 | V1 FOR $V_0$ | DON'T CARE | pkt 12 | DON'T CARE | DON'T CARE | DON'T CARE | 0x02 |
| 0x0000030 | V1 FOR $V_1$ | DON'T CARE | pkt 12 | DON'T CARE | DON'T CARE | DON'T CARE | 0x02 |
| 0x0000040 | V1 FOR $V_2$ | tri_strip | pkt 12 | 0x000005 | 0x02 | tri_strip | 0x02 |
| 0x0000050 | V1 FOR $V_3$ | tri_strip | pkt 12 | 0x000007 | 0x03 | tri_strip | 0x02 |
| 0x0000060 | V1 FOR $V_4$ | DON'T CARE | pkt 12 | 0x00000A | DON'T CARE | DON'T CARE | 0x01 |
| 0x0000070 | V1 FOR $V_5$ | DON'T CARE | pkt 12 | 0X00000B | DON'T CARE | DON'T CARE | 0x01 |
| 0x0000080 | V1 FOR $V_6$ | tri_strip | pkt 12 | 0X00000C | 0x02 | tri_strip | 0x01 |
| 0x0000090 | V1 FOR $V_5$ | DON'T CARE | pkt 12 | DON'T CARE | DON'T CARE | DON'T CARE | 0x01 |
| 0x00000A0 | V1 FOR $V_A$ | DON'T CARE | pkt 12 | DON'T CARE | DON'T CARE | DON'T CARE | 0x01 |
| 0x00000B0 | V1 FOR $V_B$ | tri_fan | pkt 12 | 0x00000D | 0x03 | tri_strip | 0x01 |
| 0x00000C0 | V1 FOR $V_6$ | tri_fan | pkt 12 | 0x00000D | 0x03 | tri_strip | 0x01 |
| 0x00000D0 | V1 FOR $V_6$ | DON'T CARE | pkt 12 | DON'T CARE | DON'T CARE | DON'T CARE | 0x01 |
| 0x00000E0 | V1 FOR $V_B$ | DON'T CARE | pkt 12 | DON'T CARE | DON'T CARE | DON'T CARE | 0x01 |
| 0x00000F0 | V1 FOR $V_C$ | tri_fan | pkt 12 | 0x00000E | 0x04 | tri_strip | 0x01 |
| 0x0000100 | V1 FOR $V_8$ | tri_fan | pkt 12 | 0x00000E | 0x04 | tri_strip | 0x01 |
| 0x0000110 | CullMode pkt 42 | | | | | | |
| 0x0000120 | V1 FOR $V_9$ | DON'T CARE | pkt 46 | DON'T CARE | DON'T CARE | DON'T CARE | 0x02 |
| 0x0000130 | V1 FOR $V_{10}$ | DON'T CARE | pkt 46 | DON'T CARE | DON'T CARE | DON'T CARE | 0x02 |
| 0x0000140 | V1 FOR $V_{11}$ | tri_fan | pkt 46 | 0x000014 | 0x02 | tri_fan | 0x02 |
| 0x0000150 | V1 FOR $V_{12}$ | tri_fan | pkt 46 | 0x000016 | 0x03 | tri_fan | 0x02 |
| ⋮ | | | | | | | |

FIG. B15

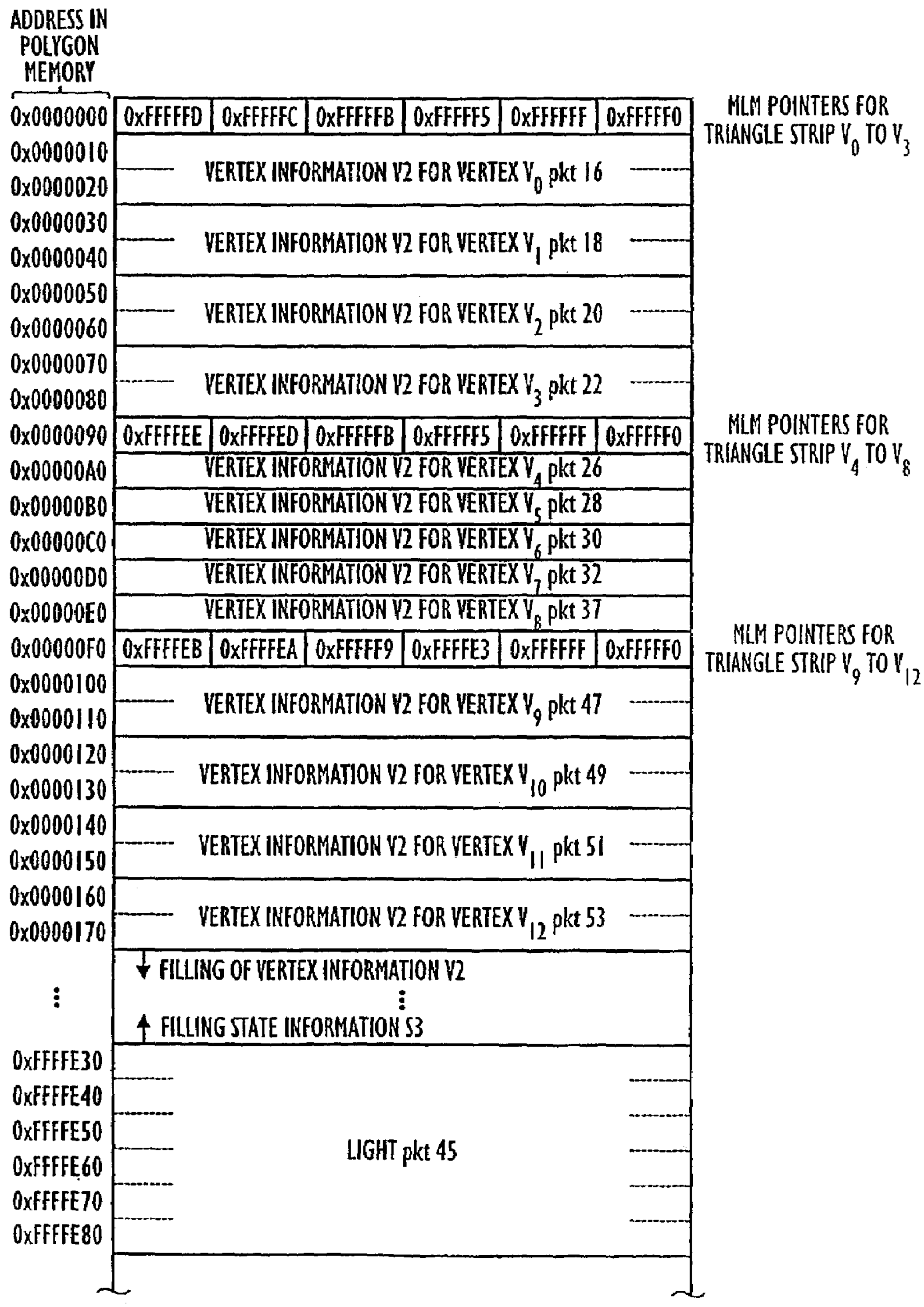
FIG. B16A

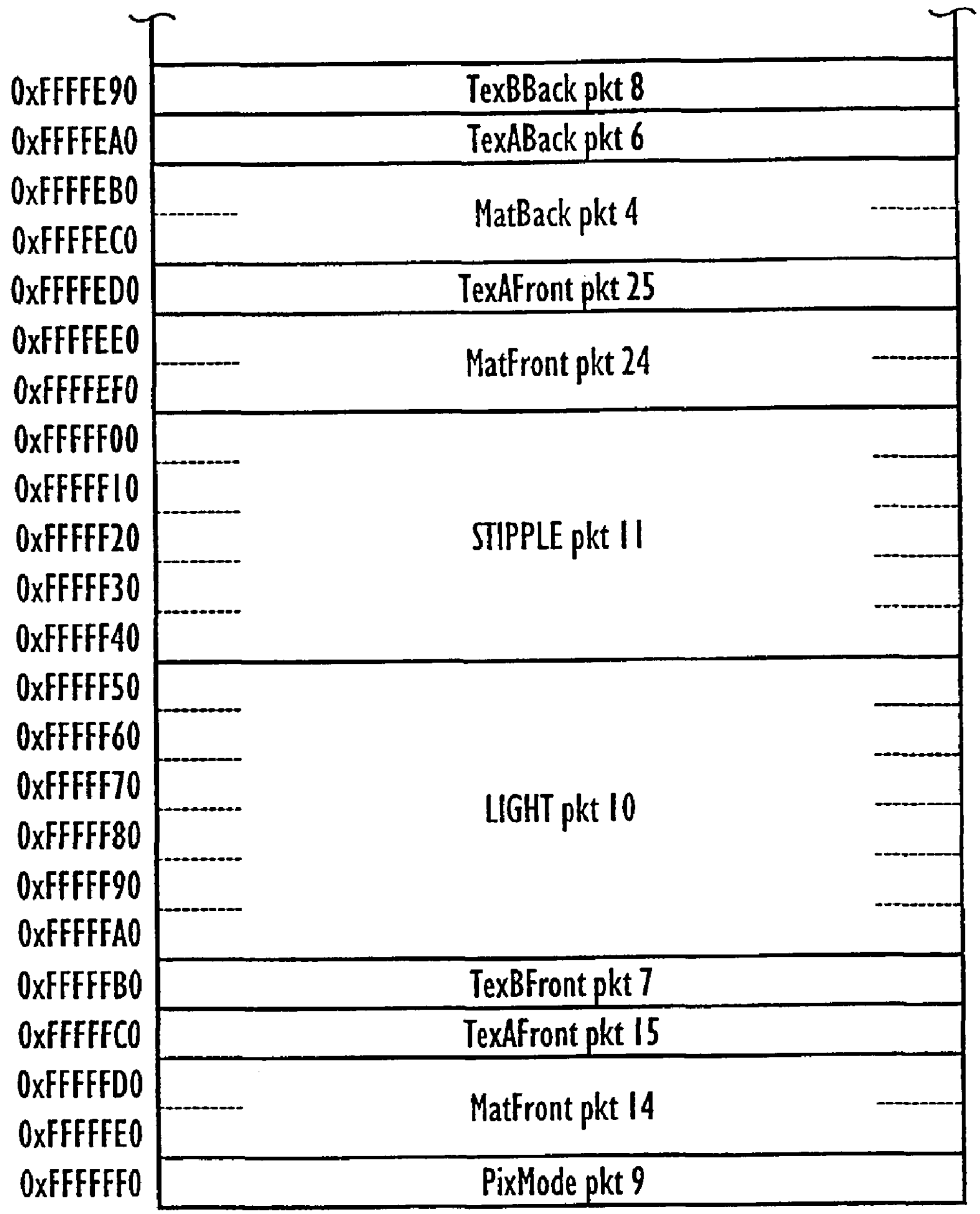
FIG. B16B

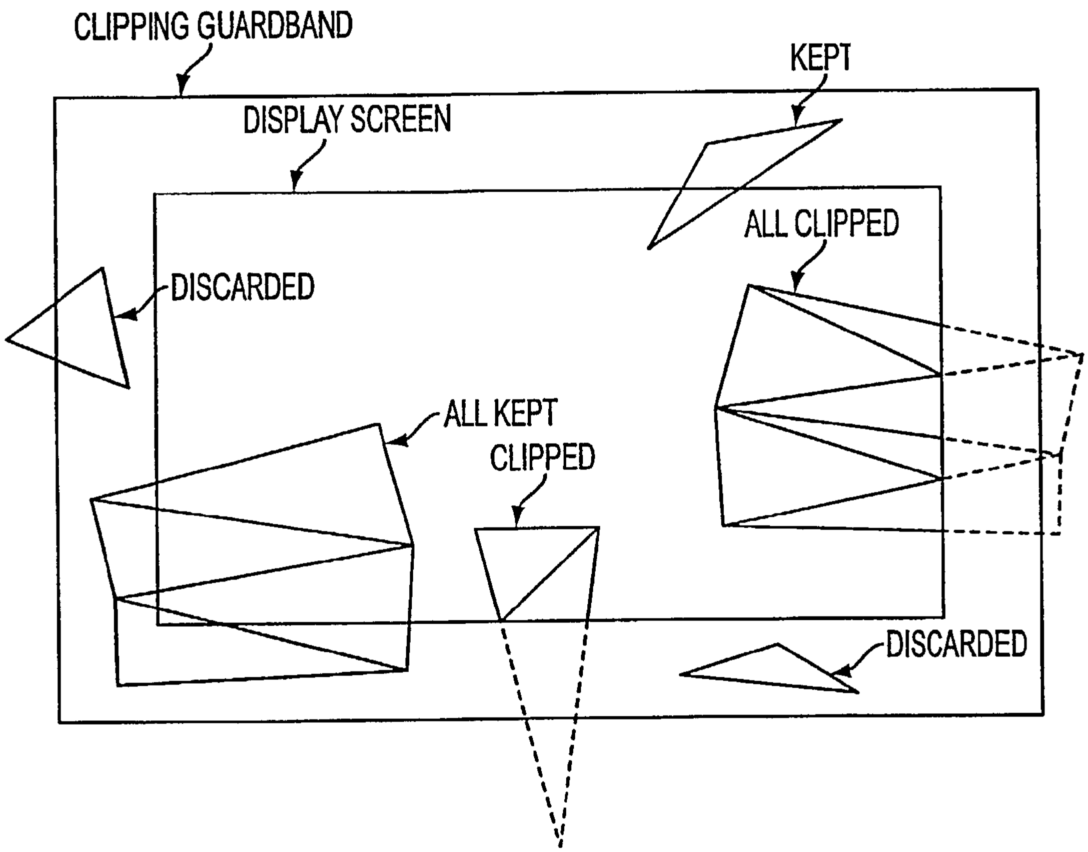
FIG. B17

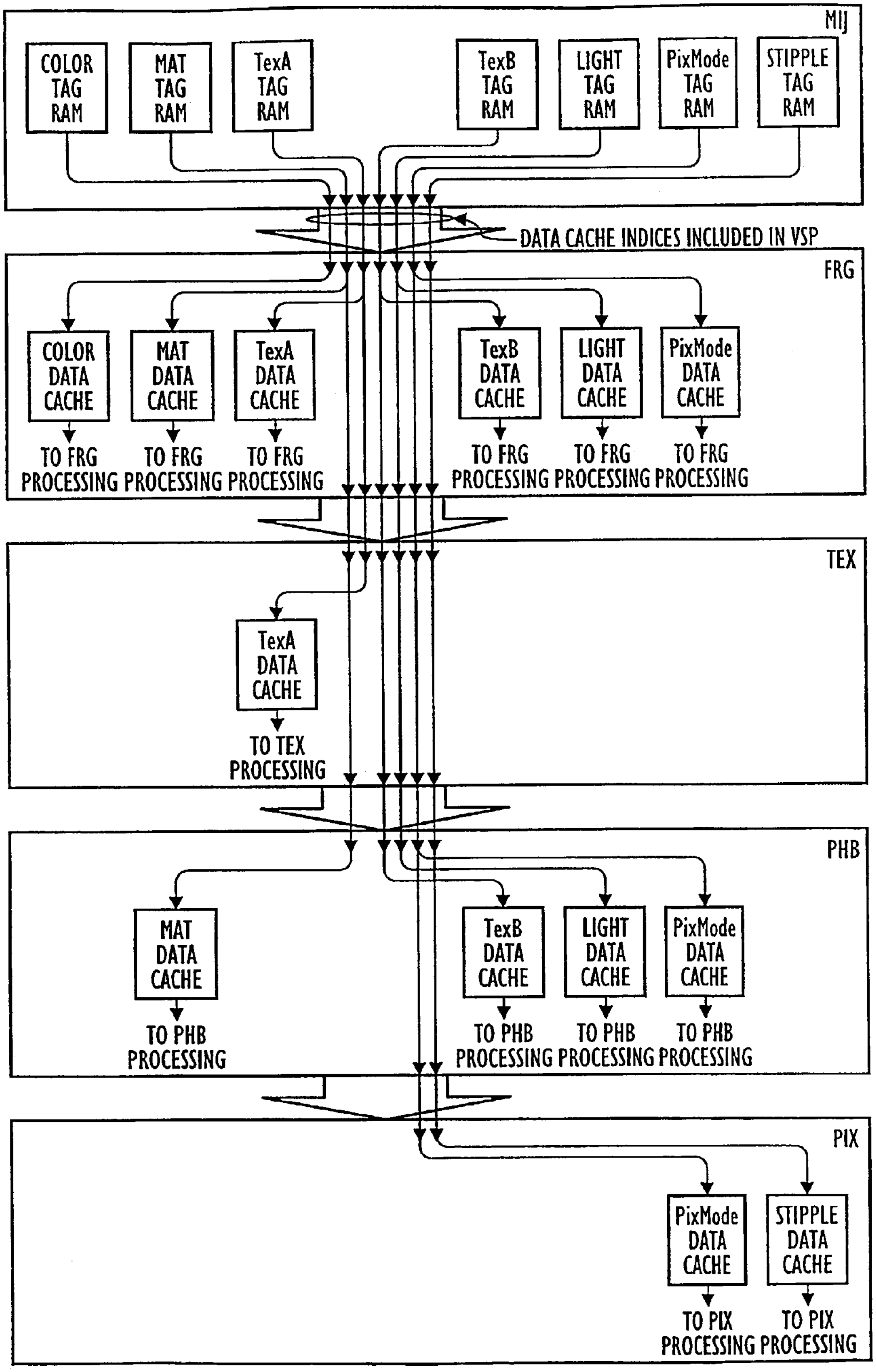
FIG. B18

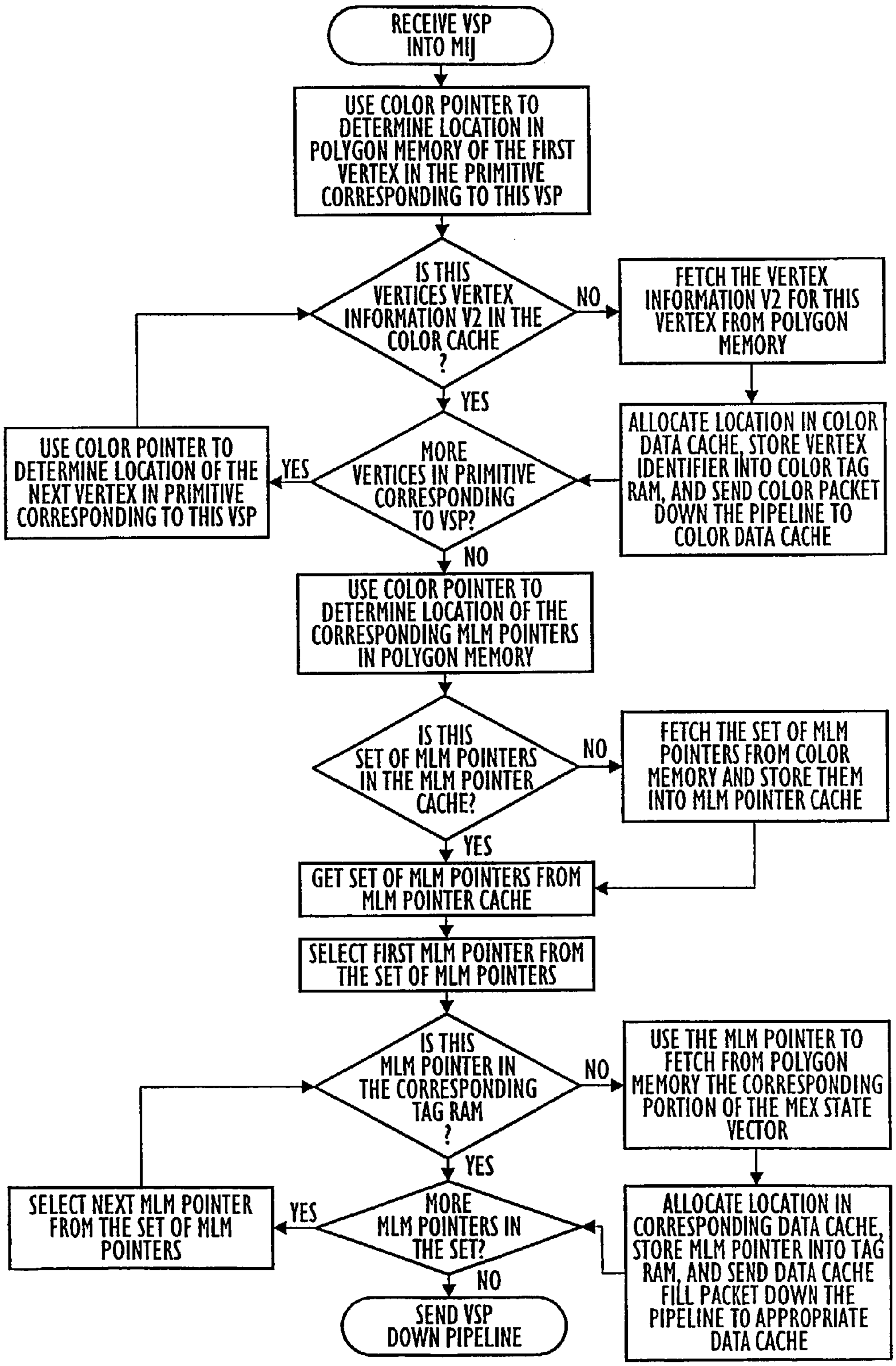
FIG. B19

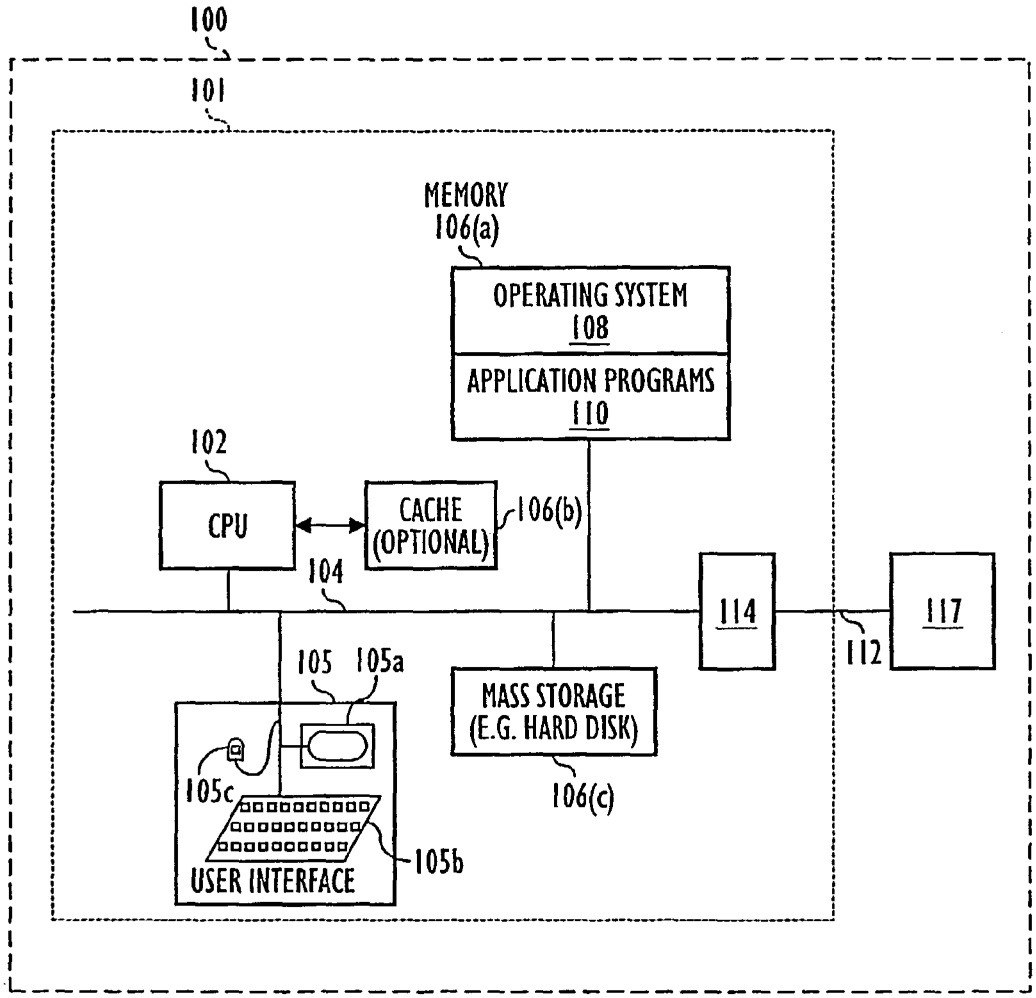
FIG. C1

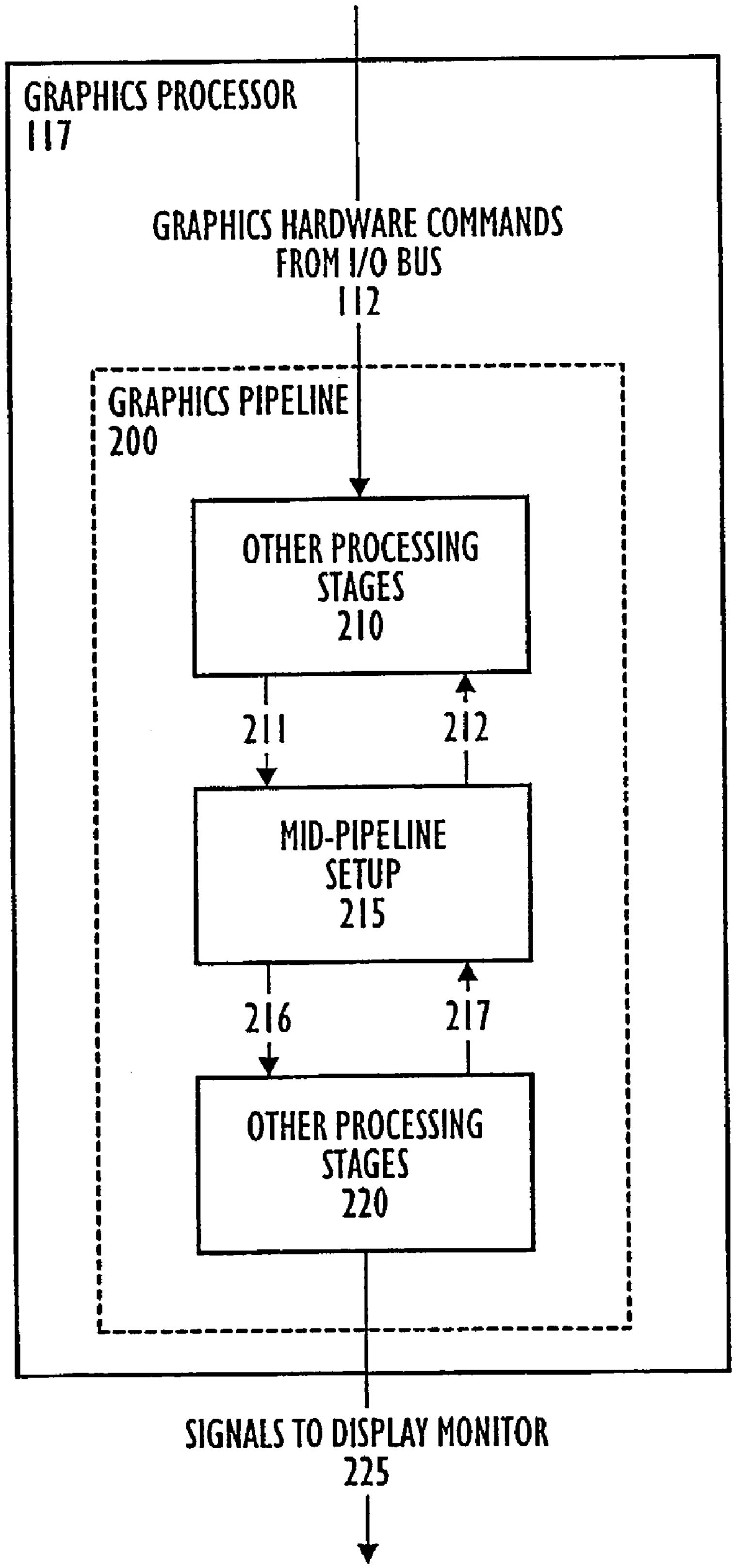
FIG. C2

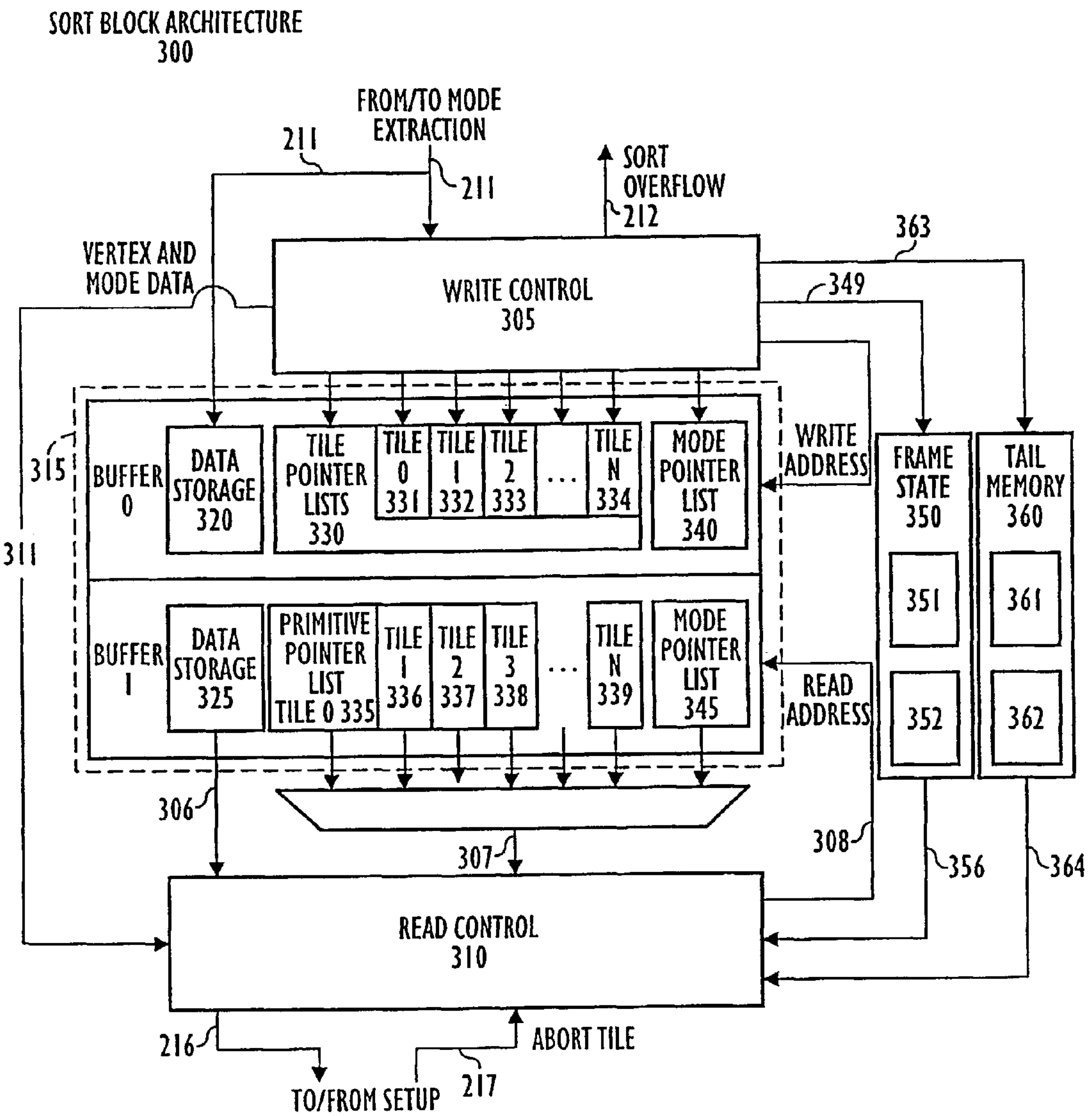
FIG. C3

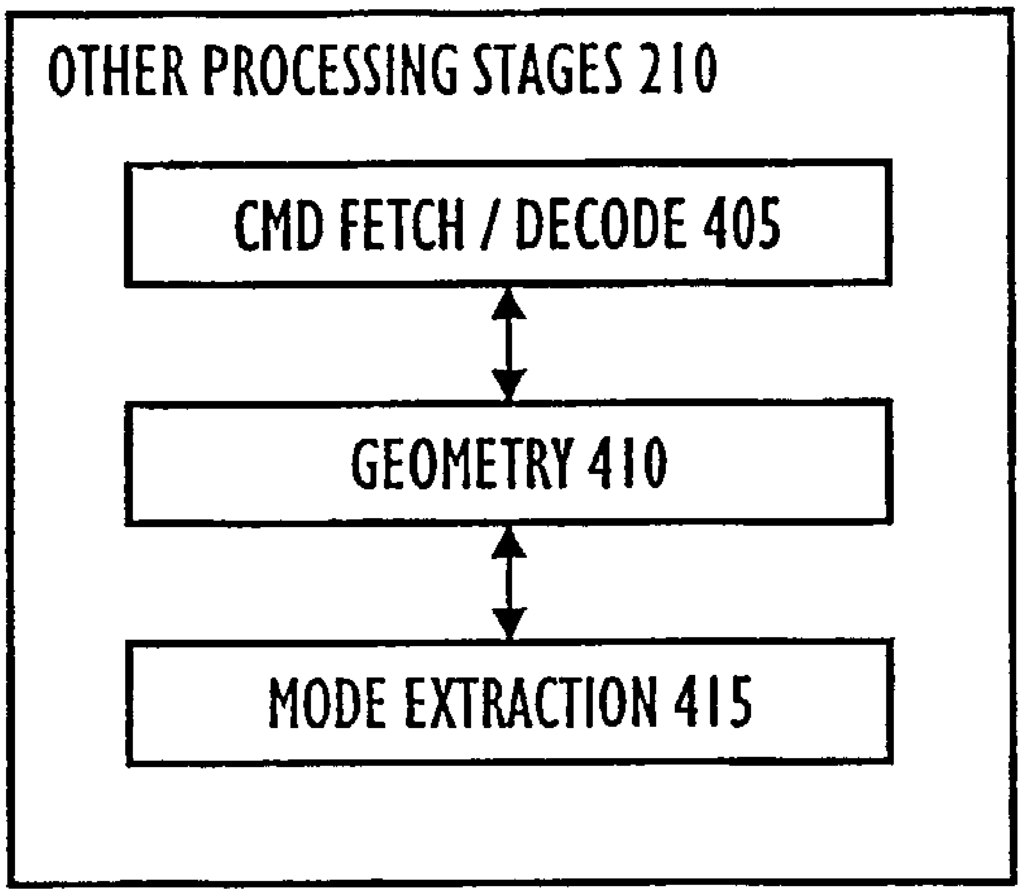
FIG. C4

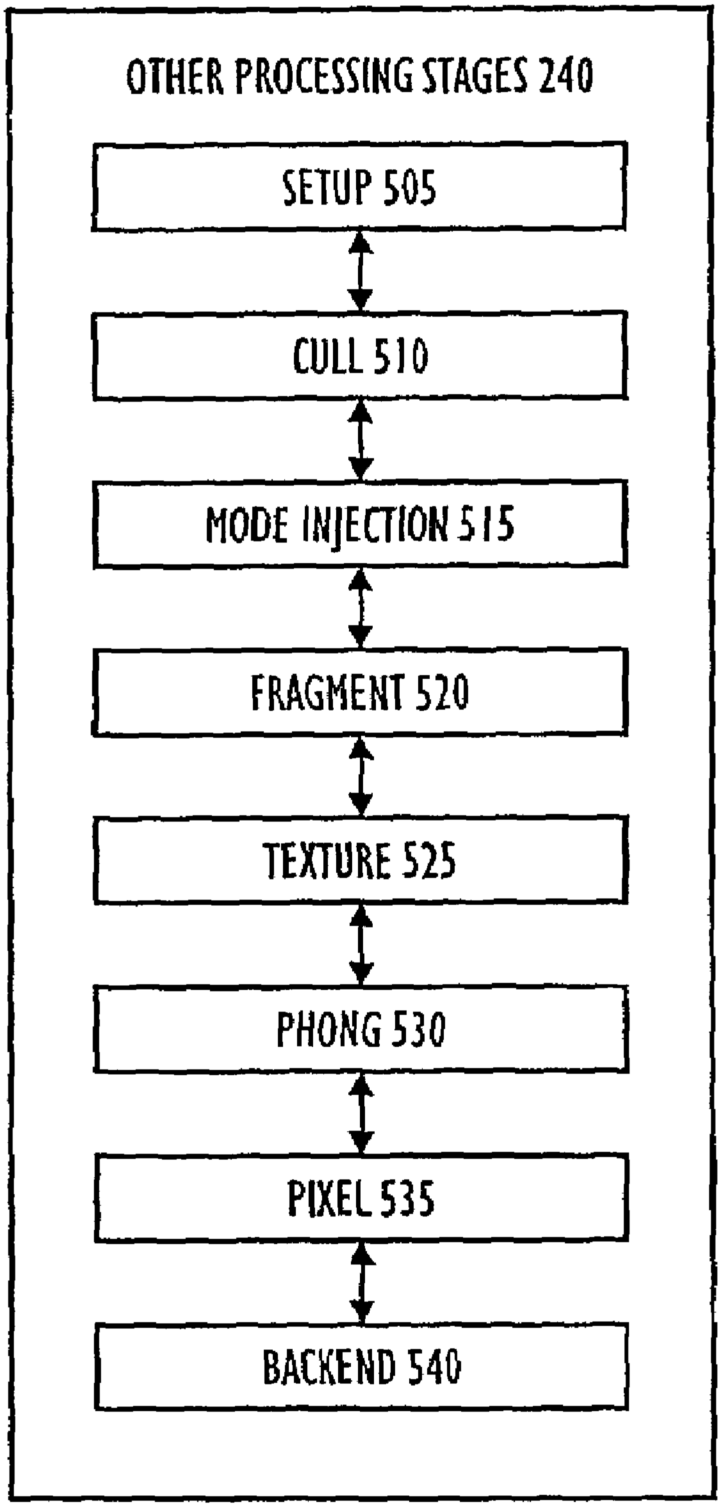
FIG. C5

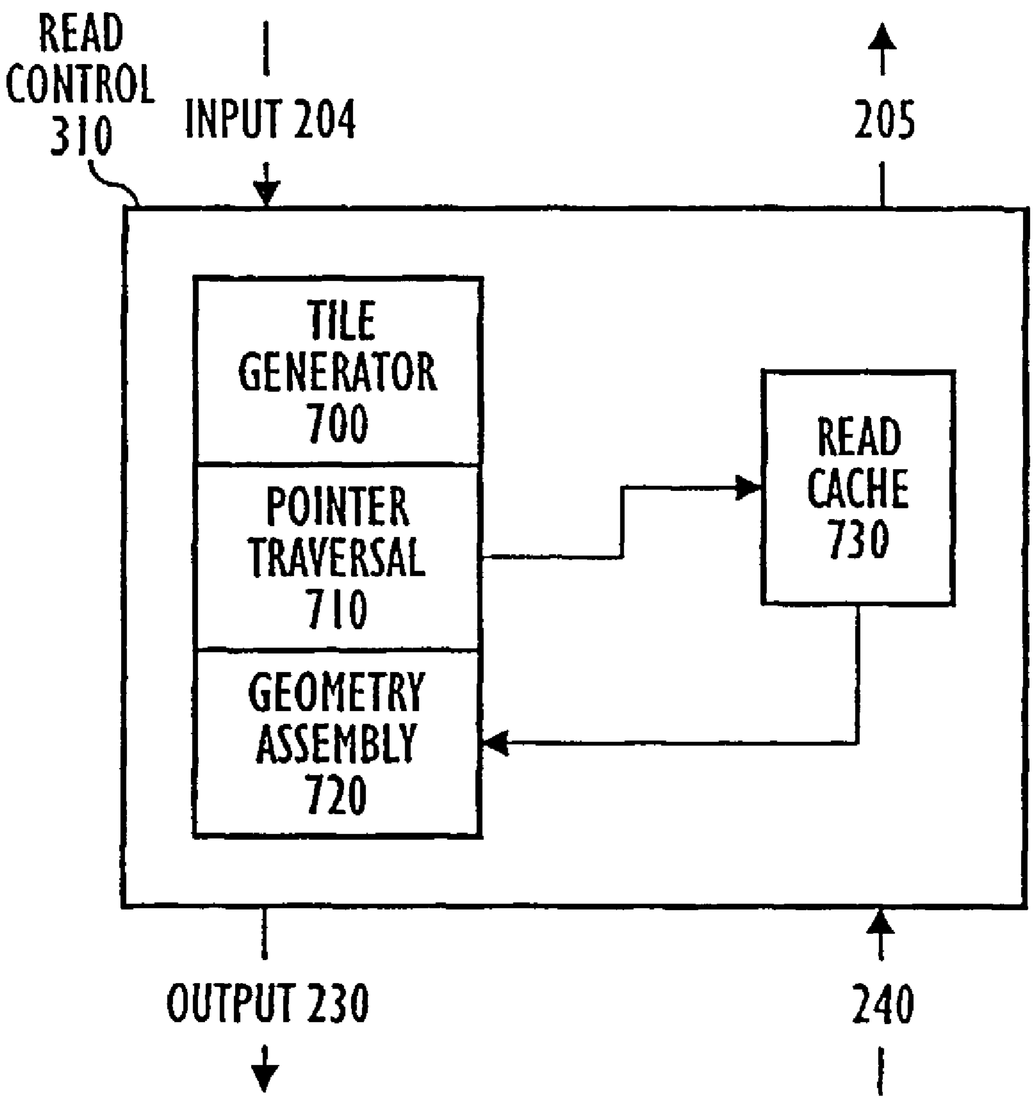
FIG. C7

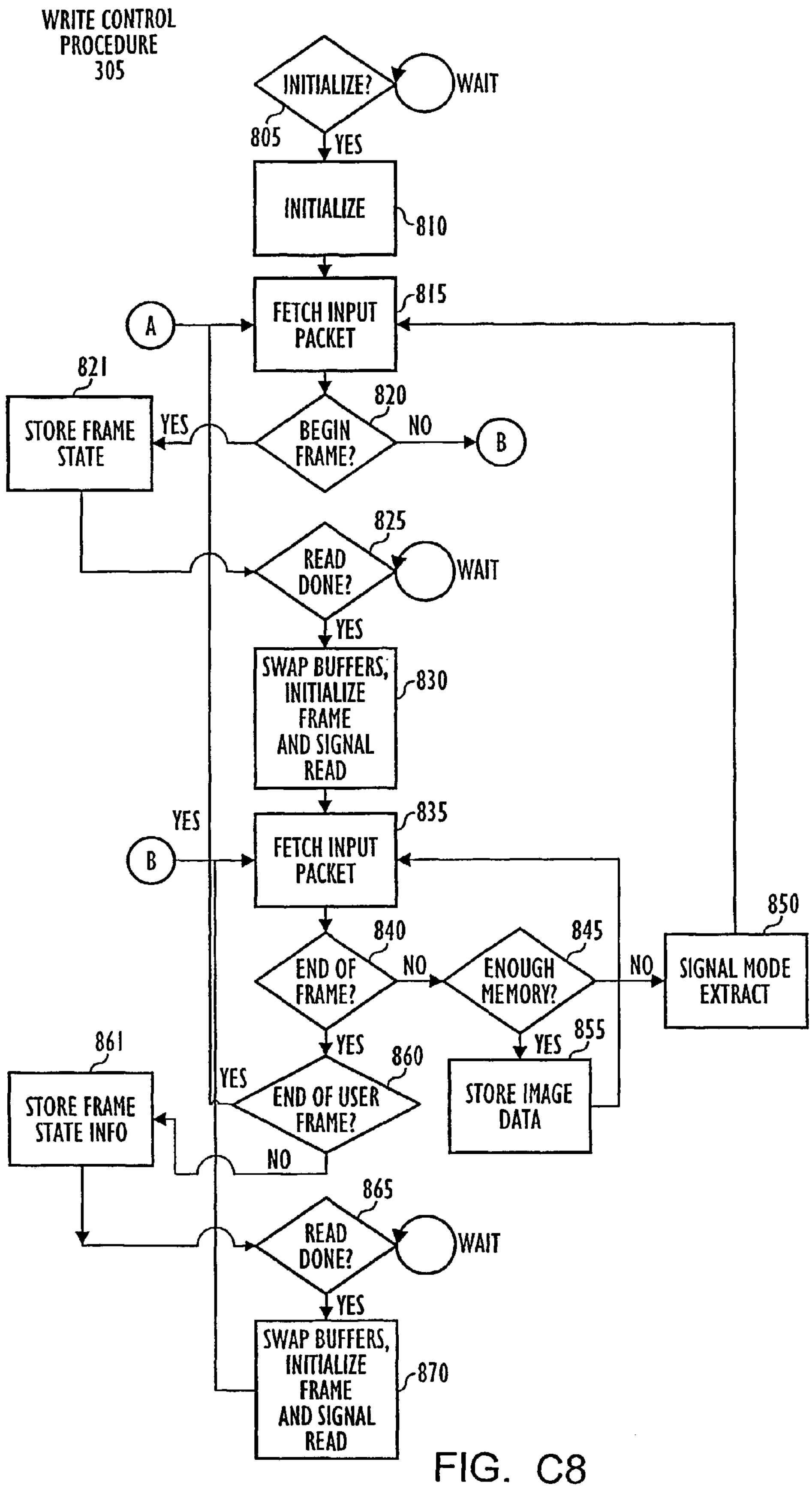
FIG. C8

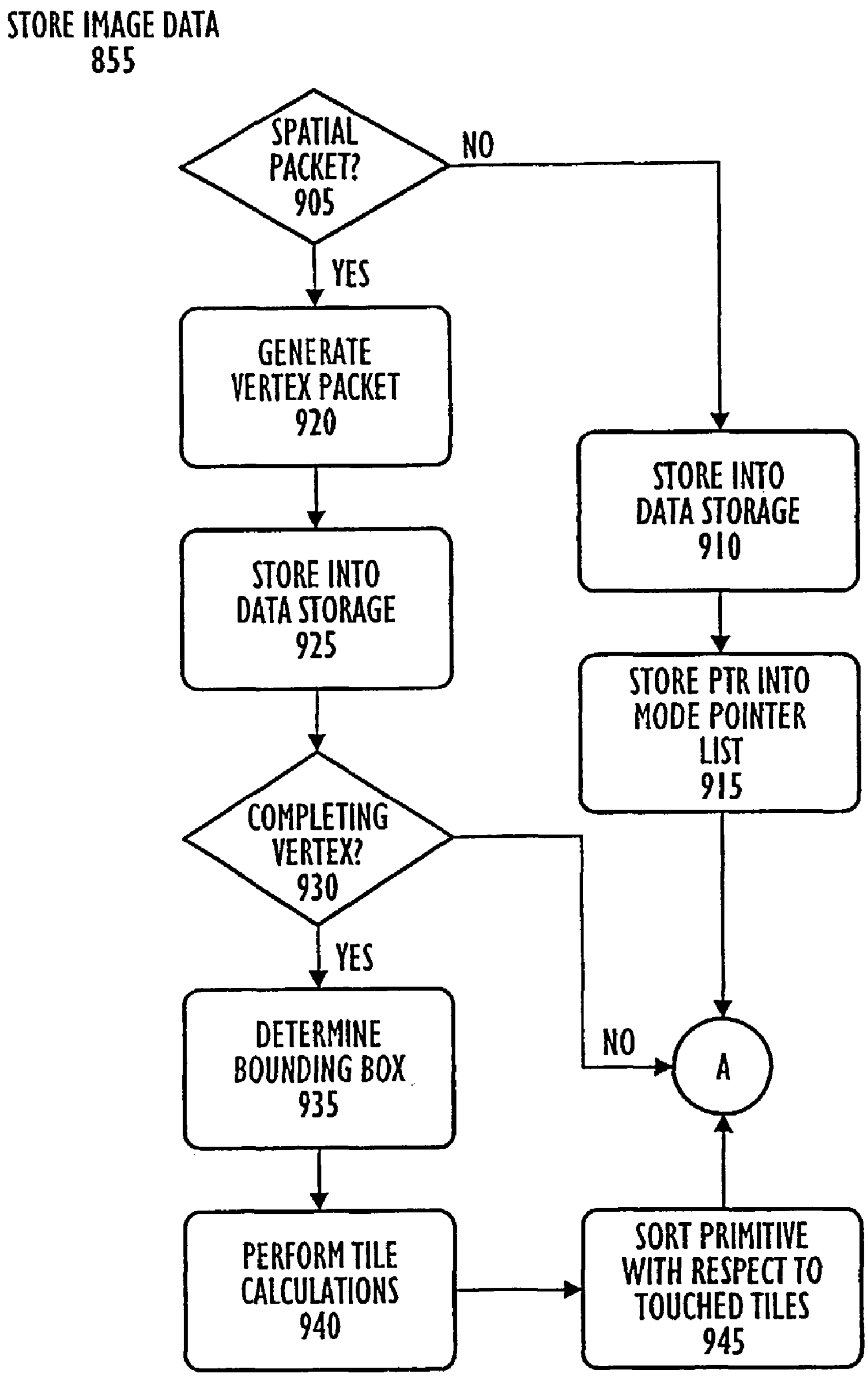
FIG. C9

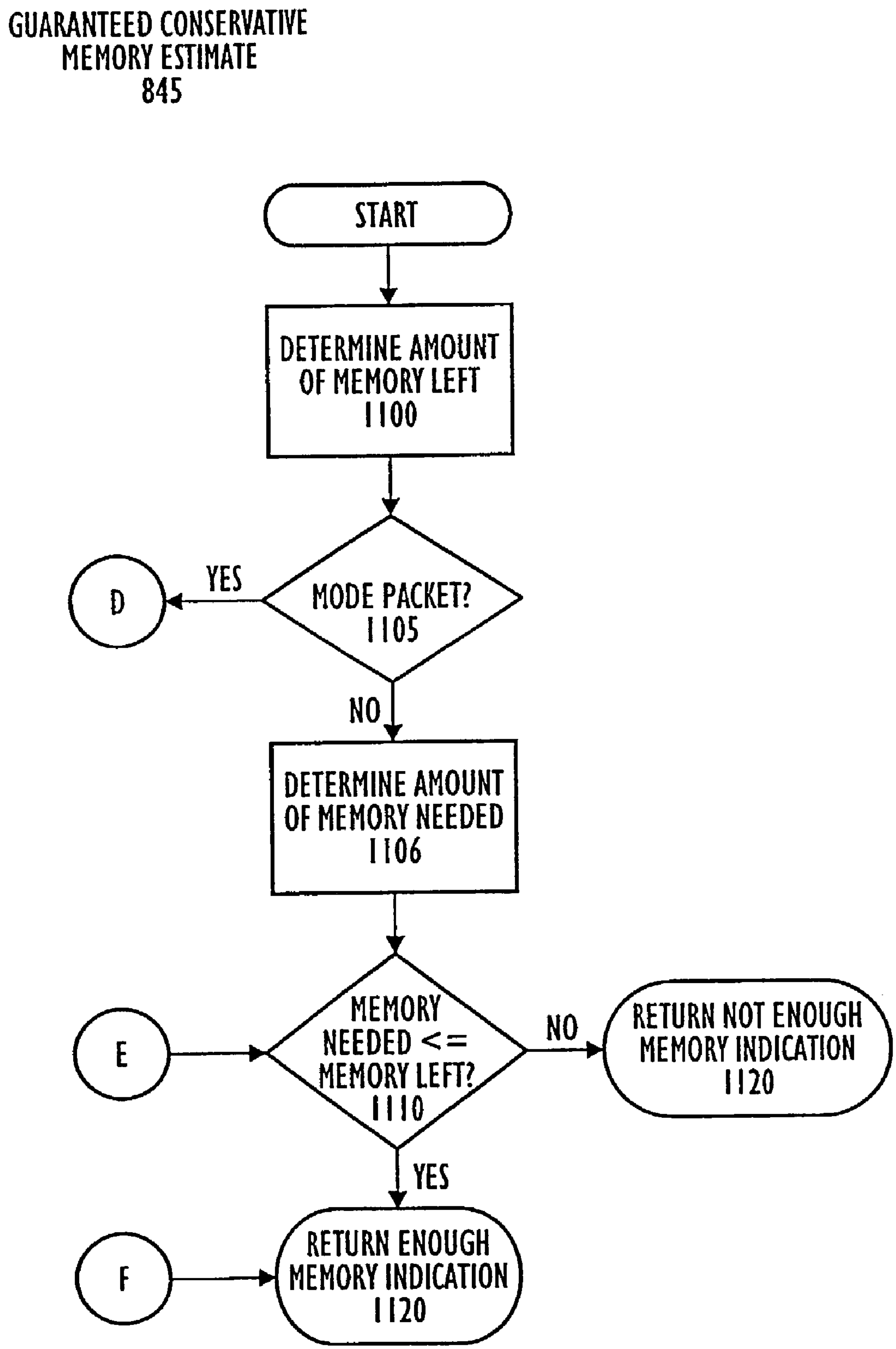
FIG. C11

GUARANTEED CONSERVATIVE MEMORY ESTIMATE 845
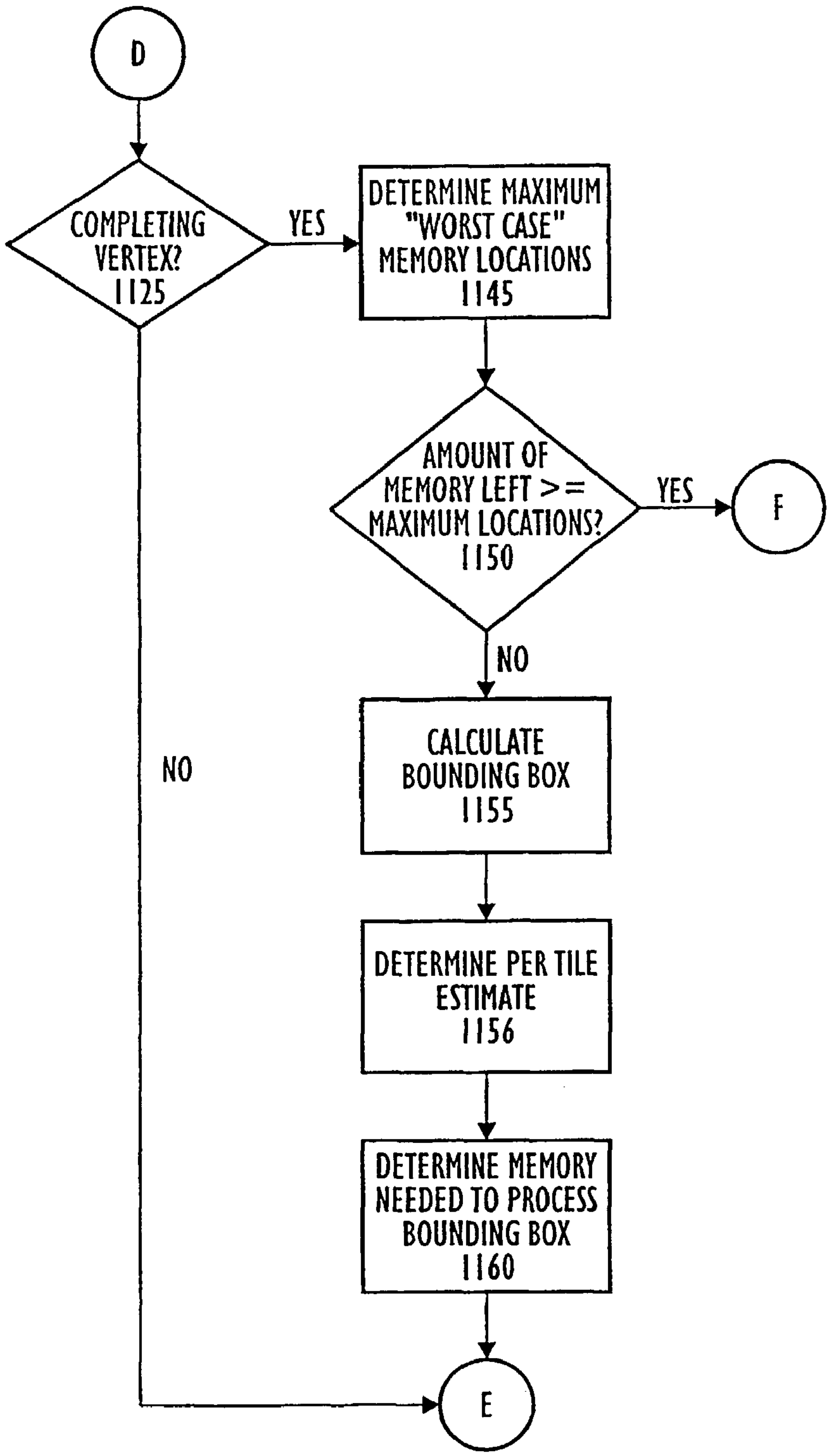
FIG. C12

2D WINDOW WITH BOUNDING BOX CIRCUMSCRIBING A TRIANGLE 1300
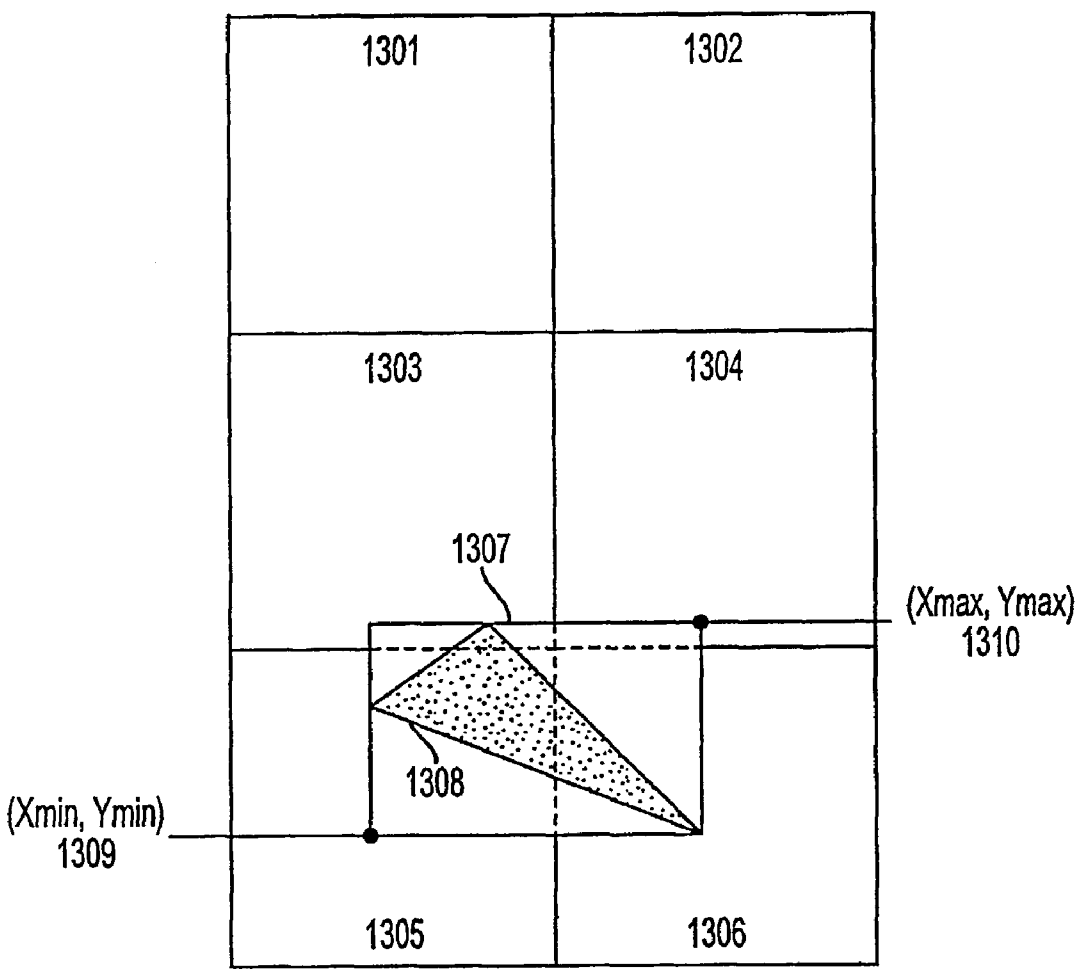
FIG. C13

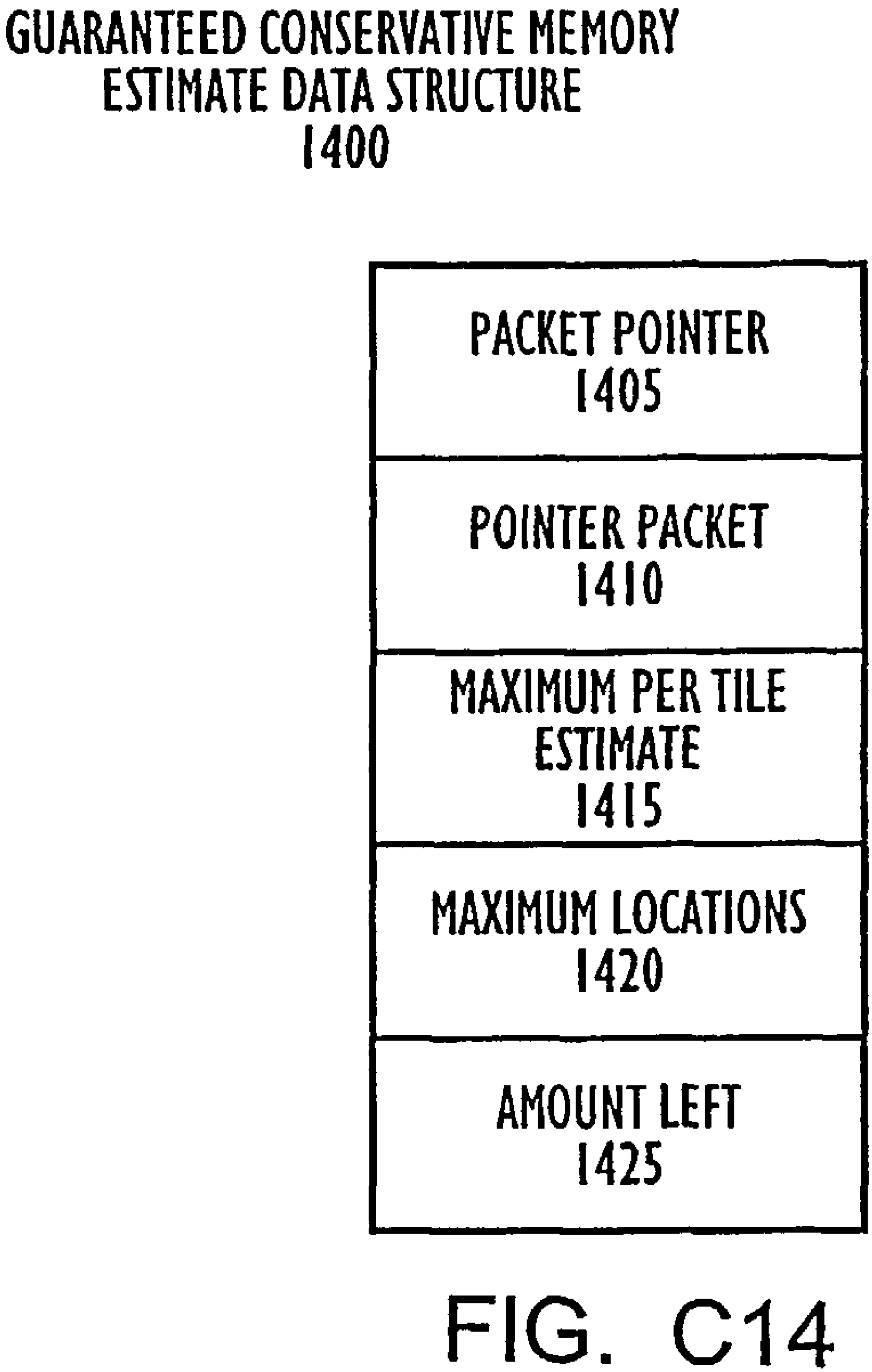
FIG. C14

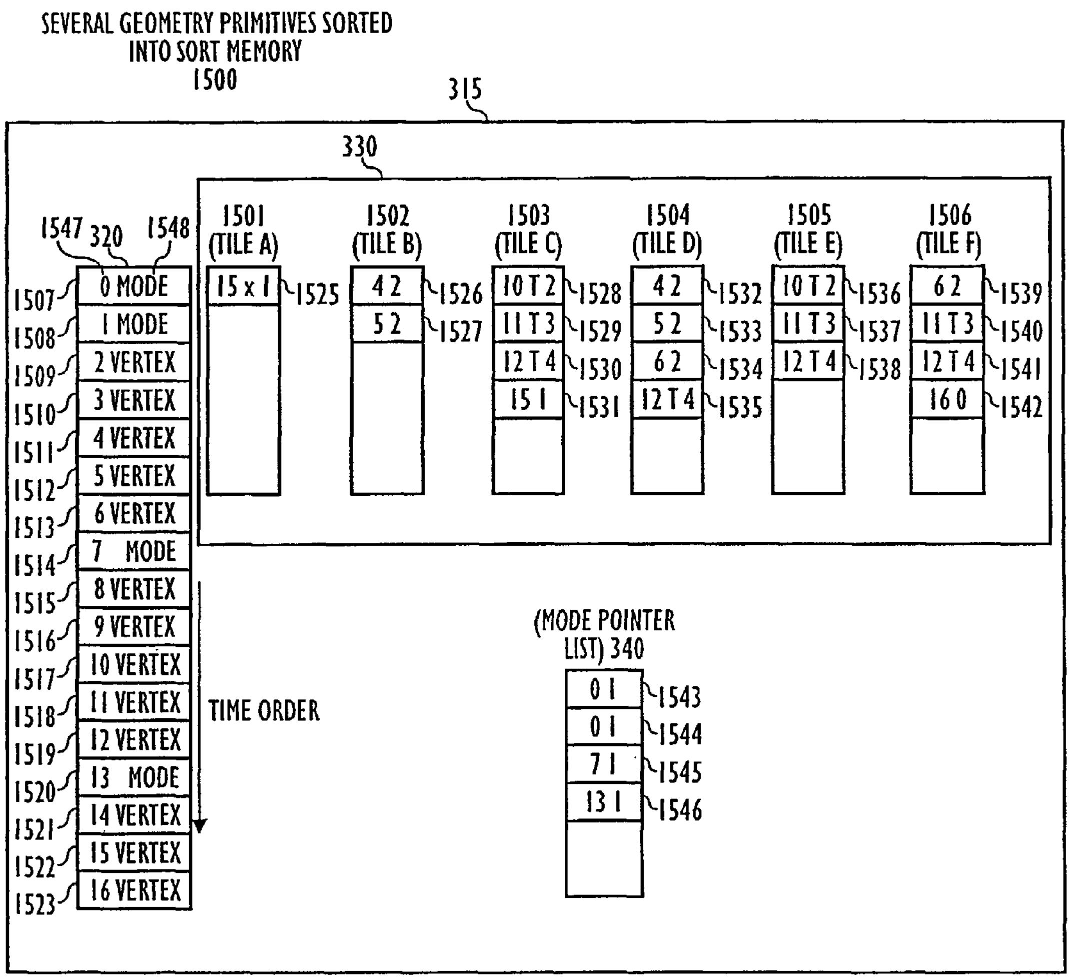
FIG. C15

2-D WINDOW SPATIALLY DEFINED WITH SIX TILES AND INCLUDING GEOMETRY PRIMITIVES 1600
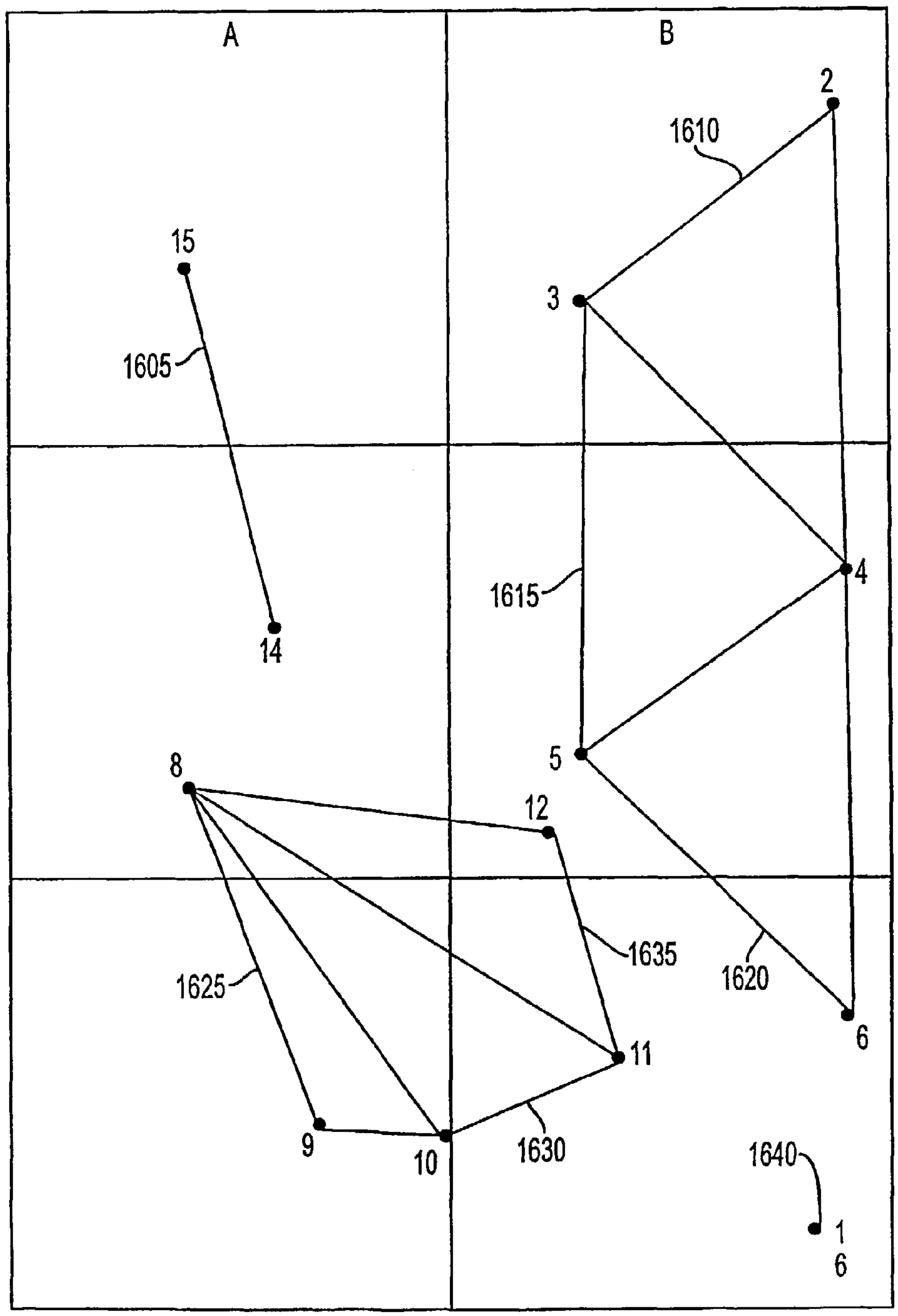
FIG. C16

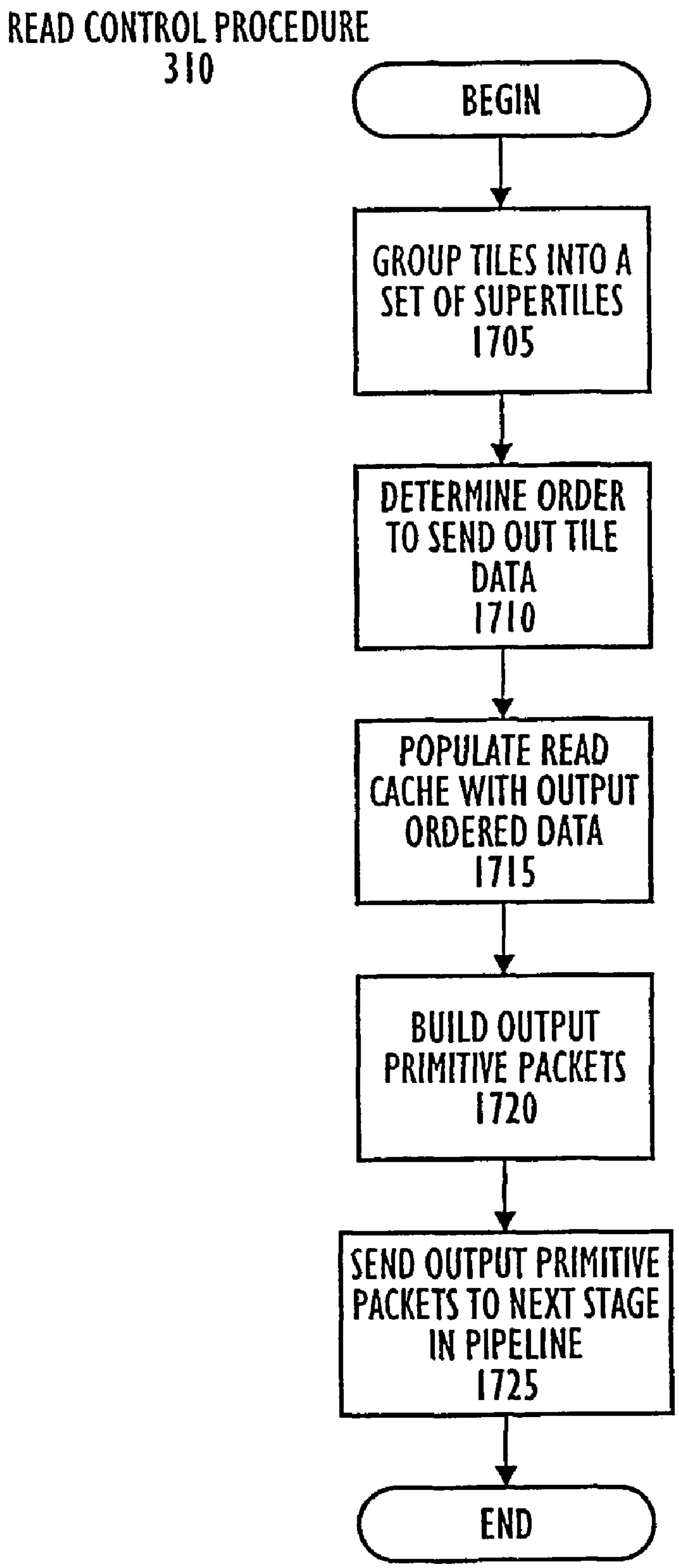
FIG. C17

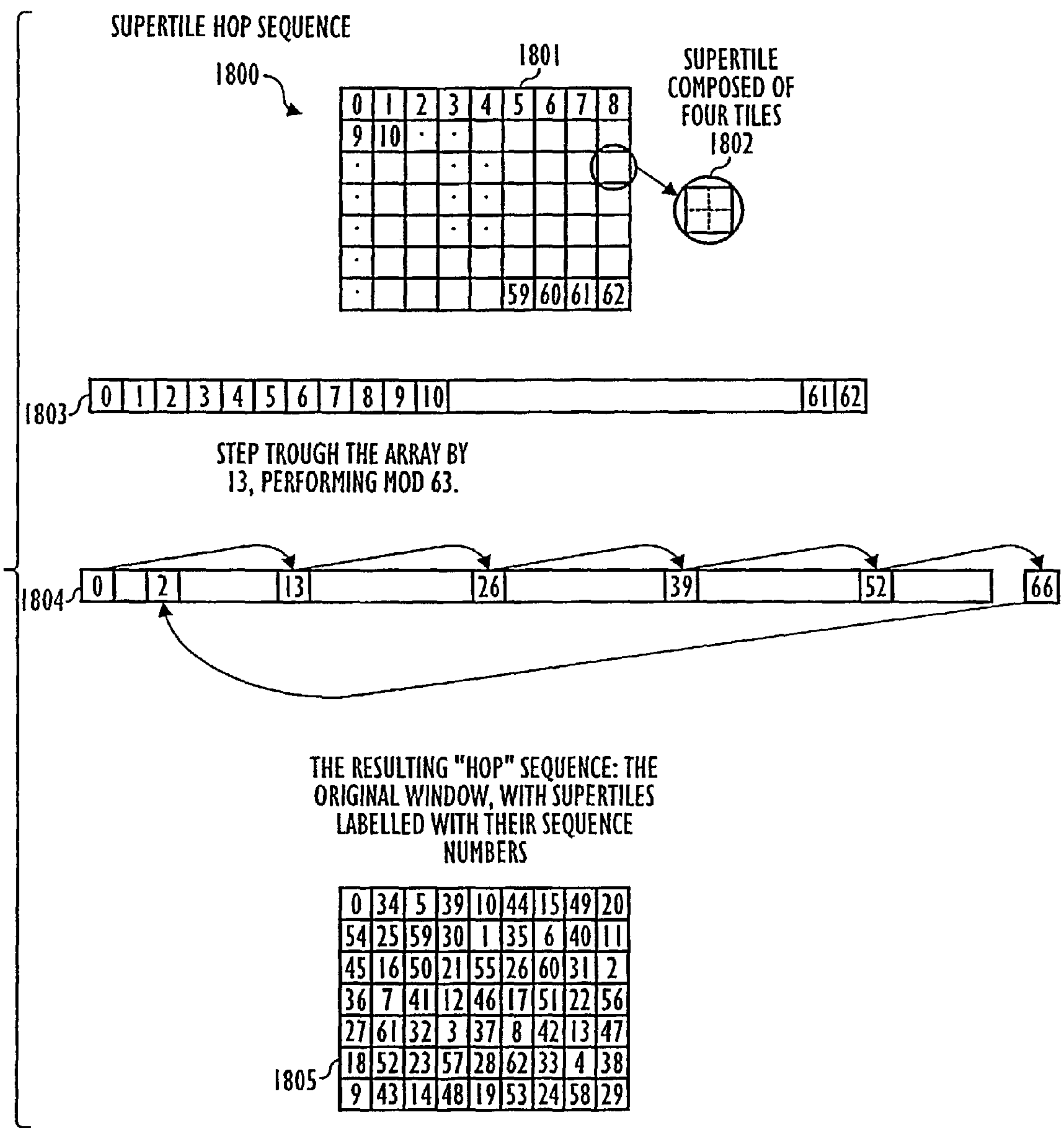
FIG. C18

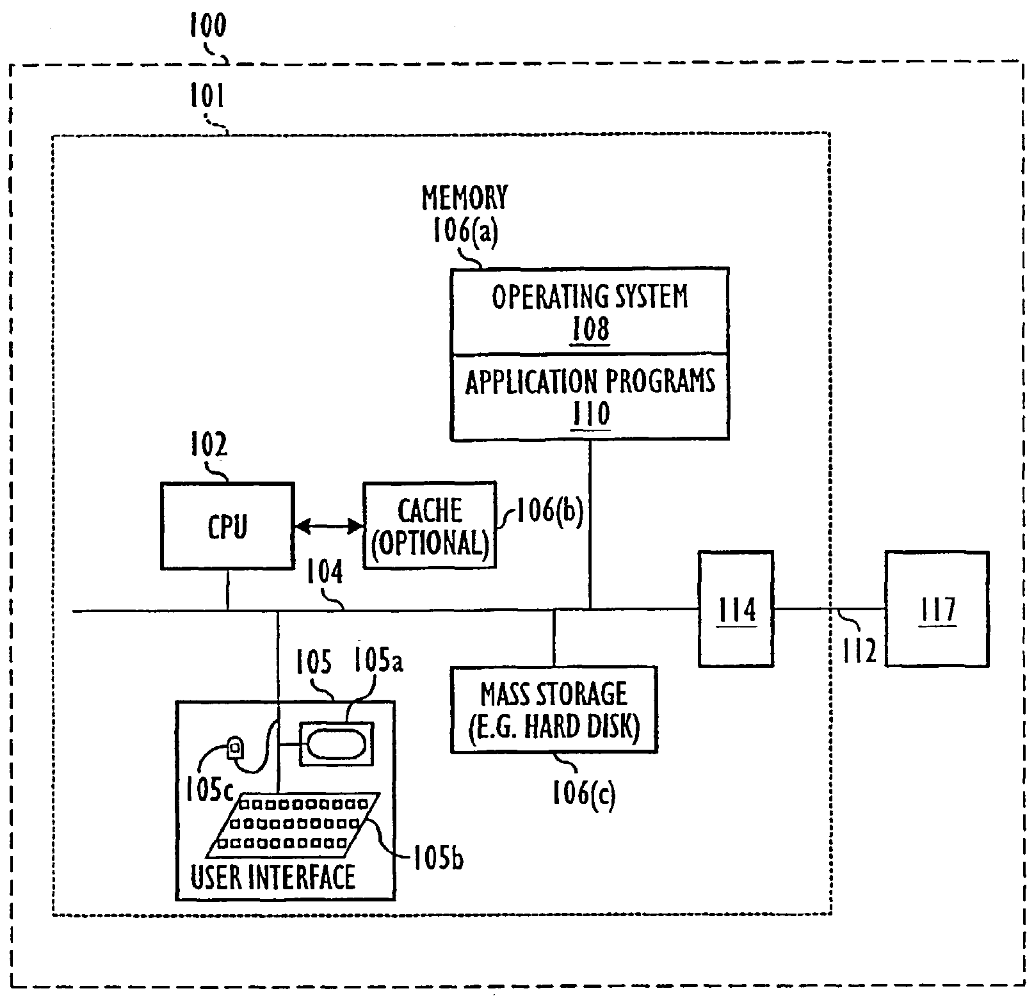
FIG. D1

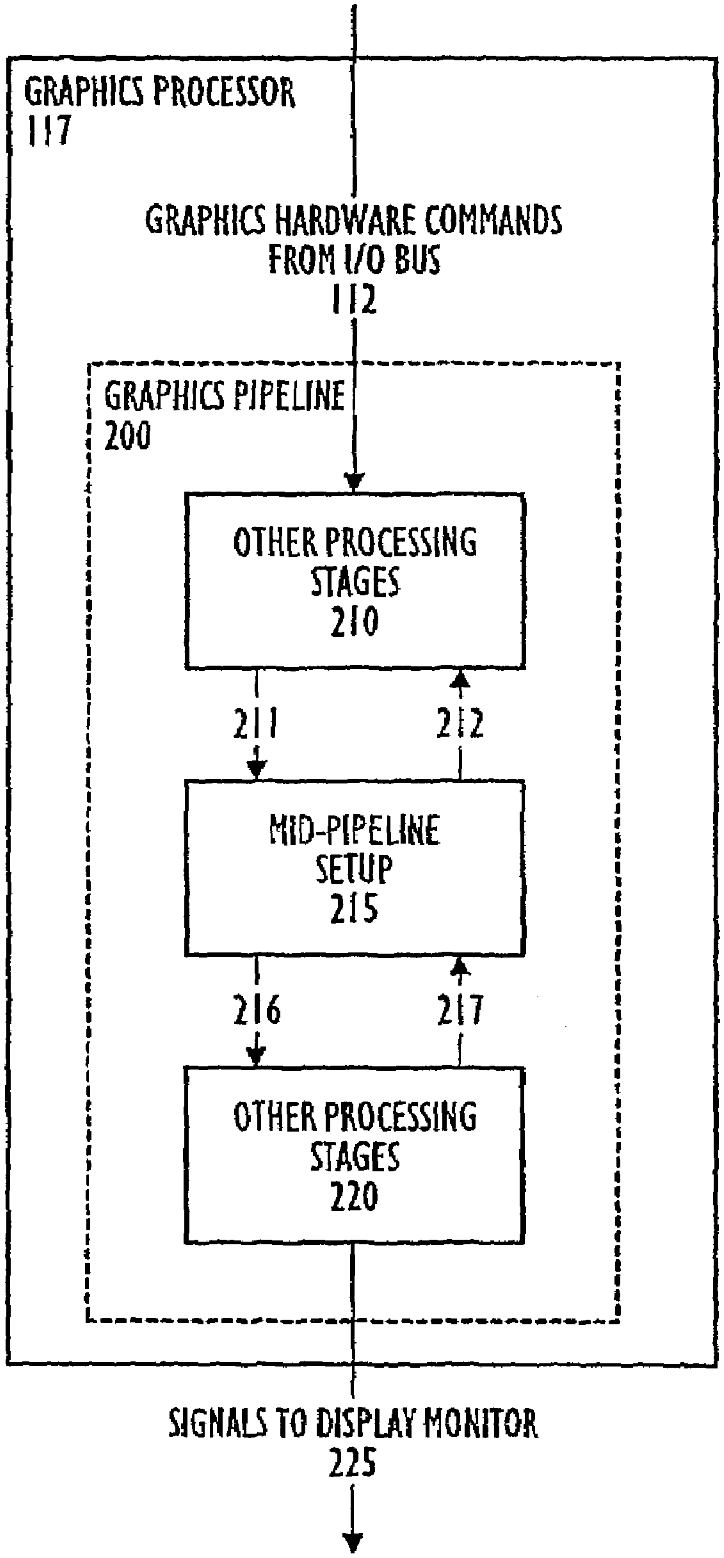
FIG. D2

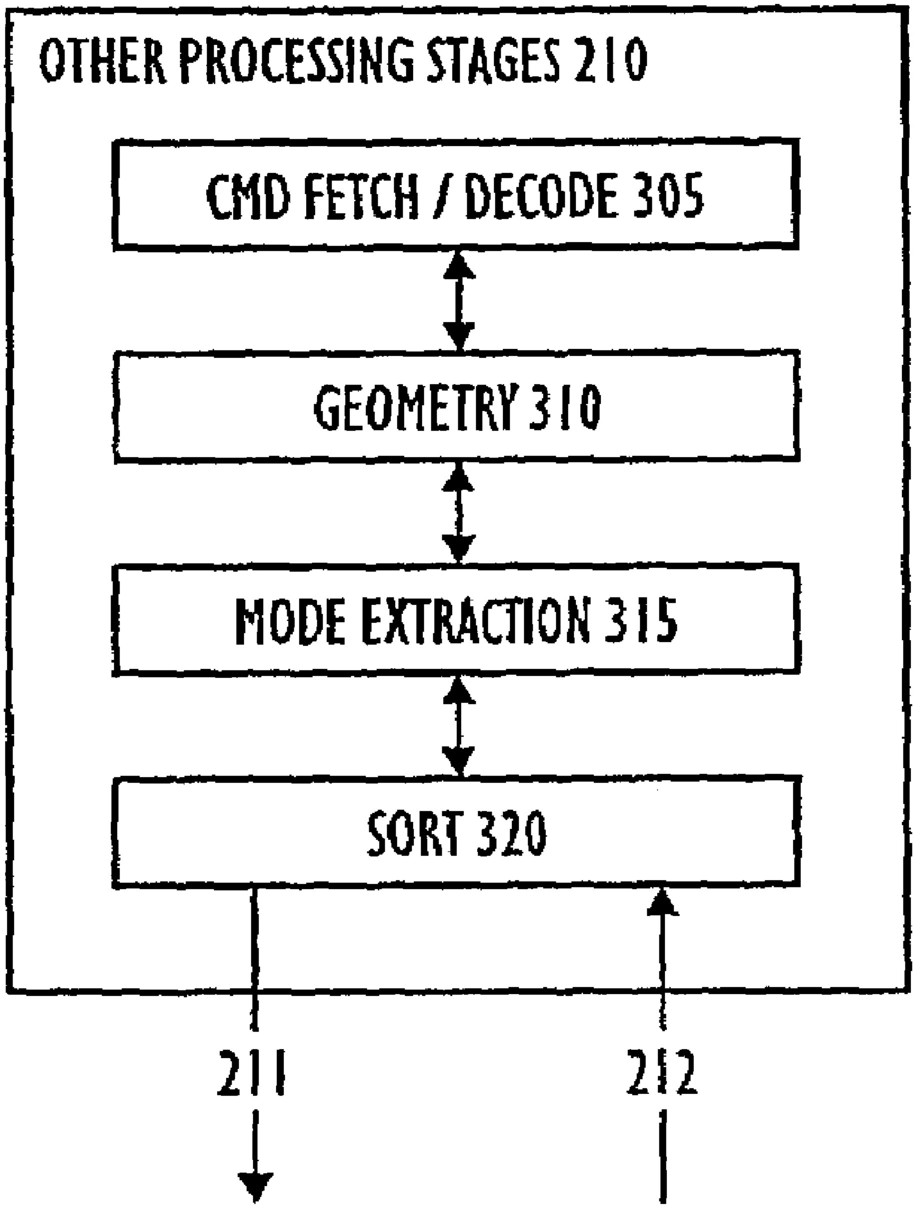
FIG. D3

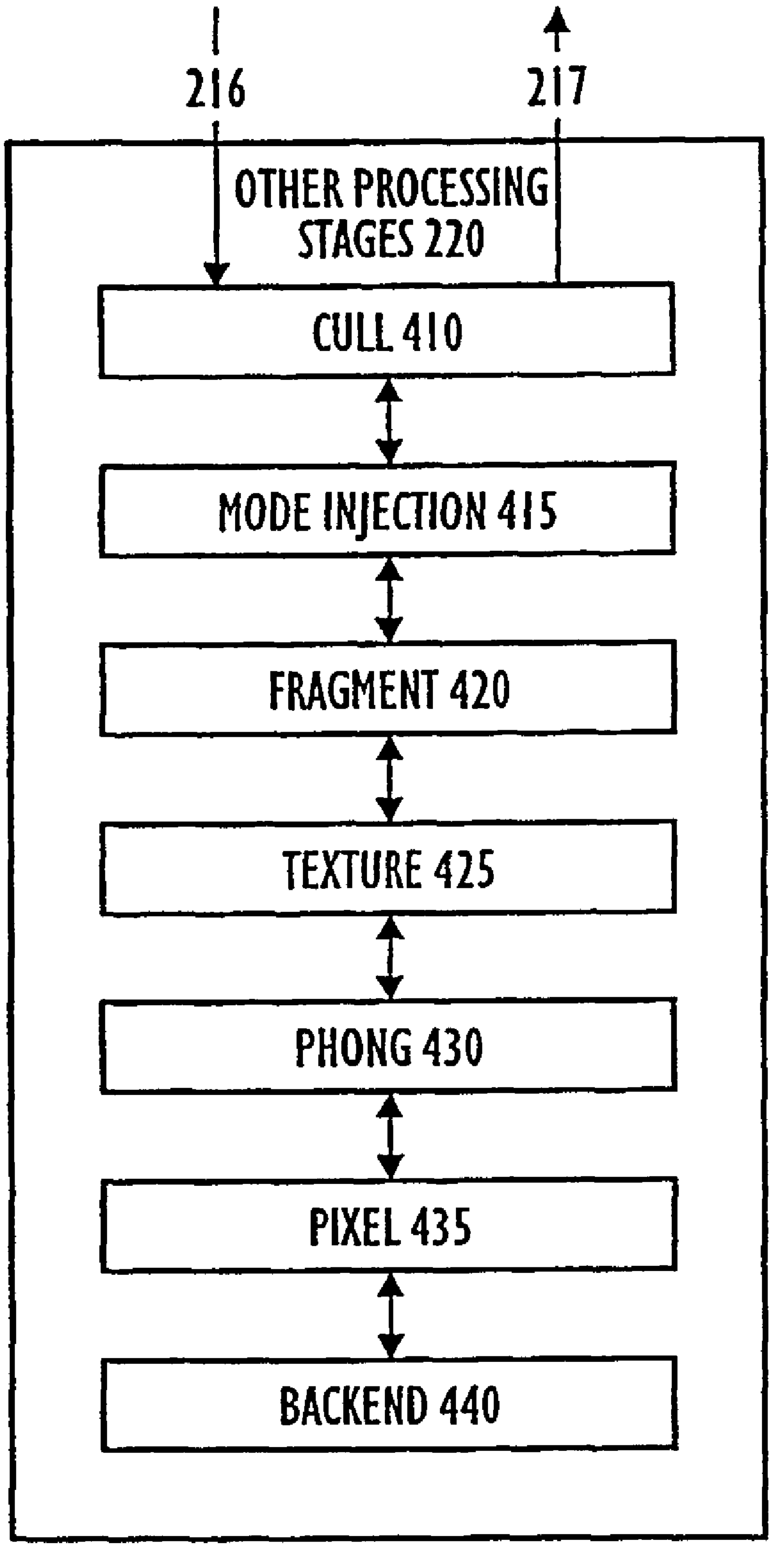
FIG. D4

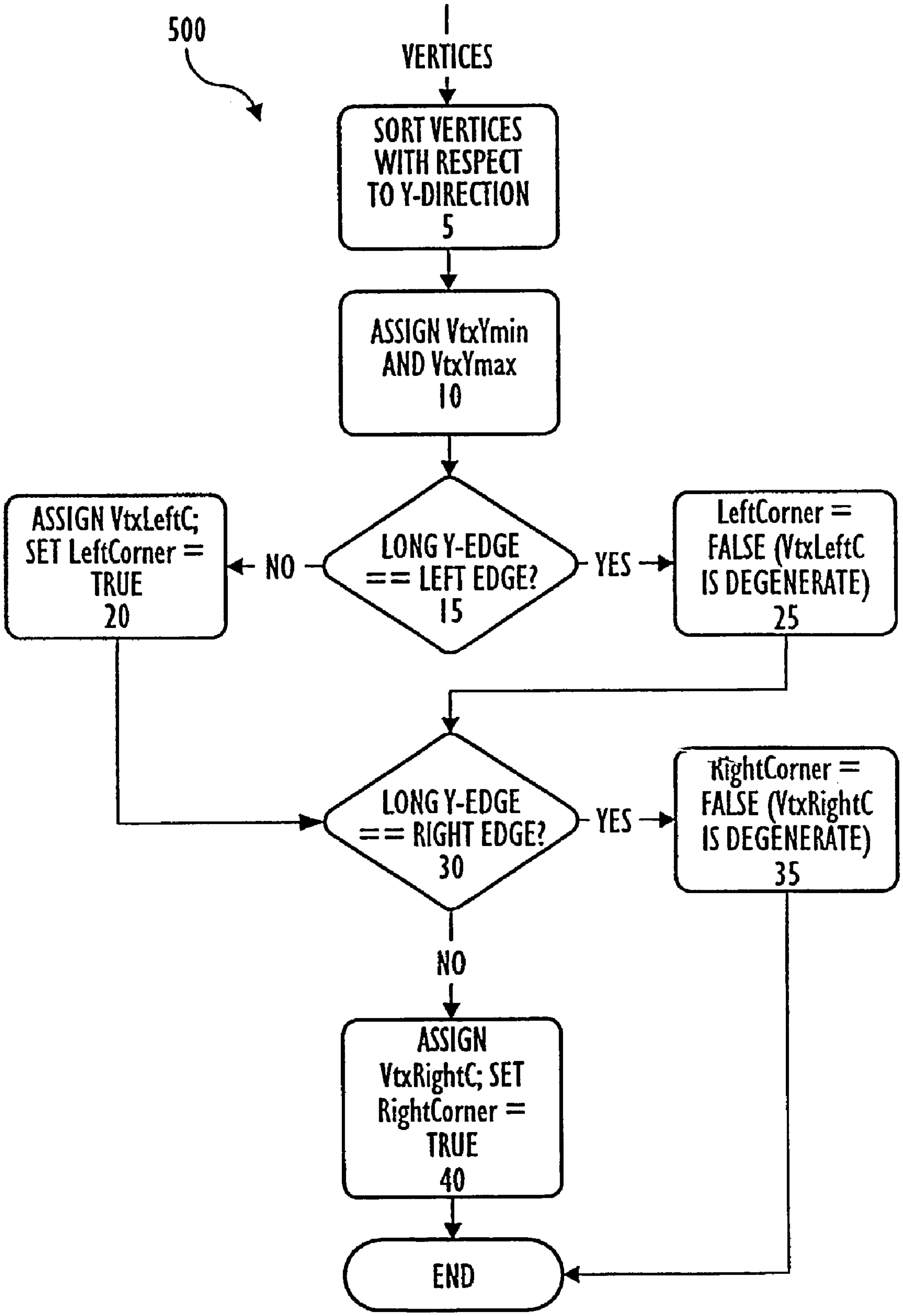
FIG. D5

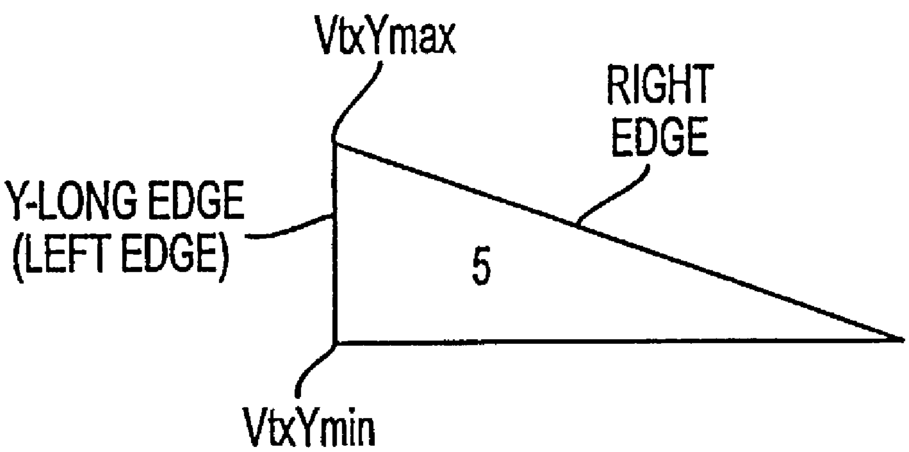
FIG. D6A
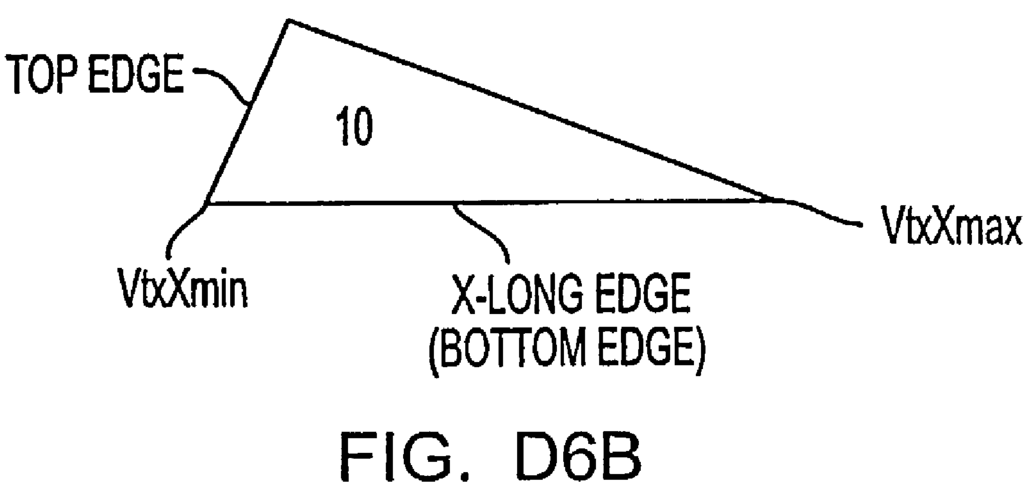
FIG. D6B

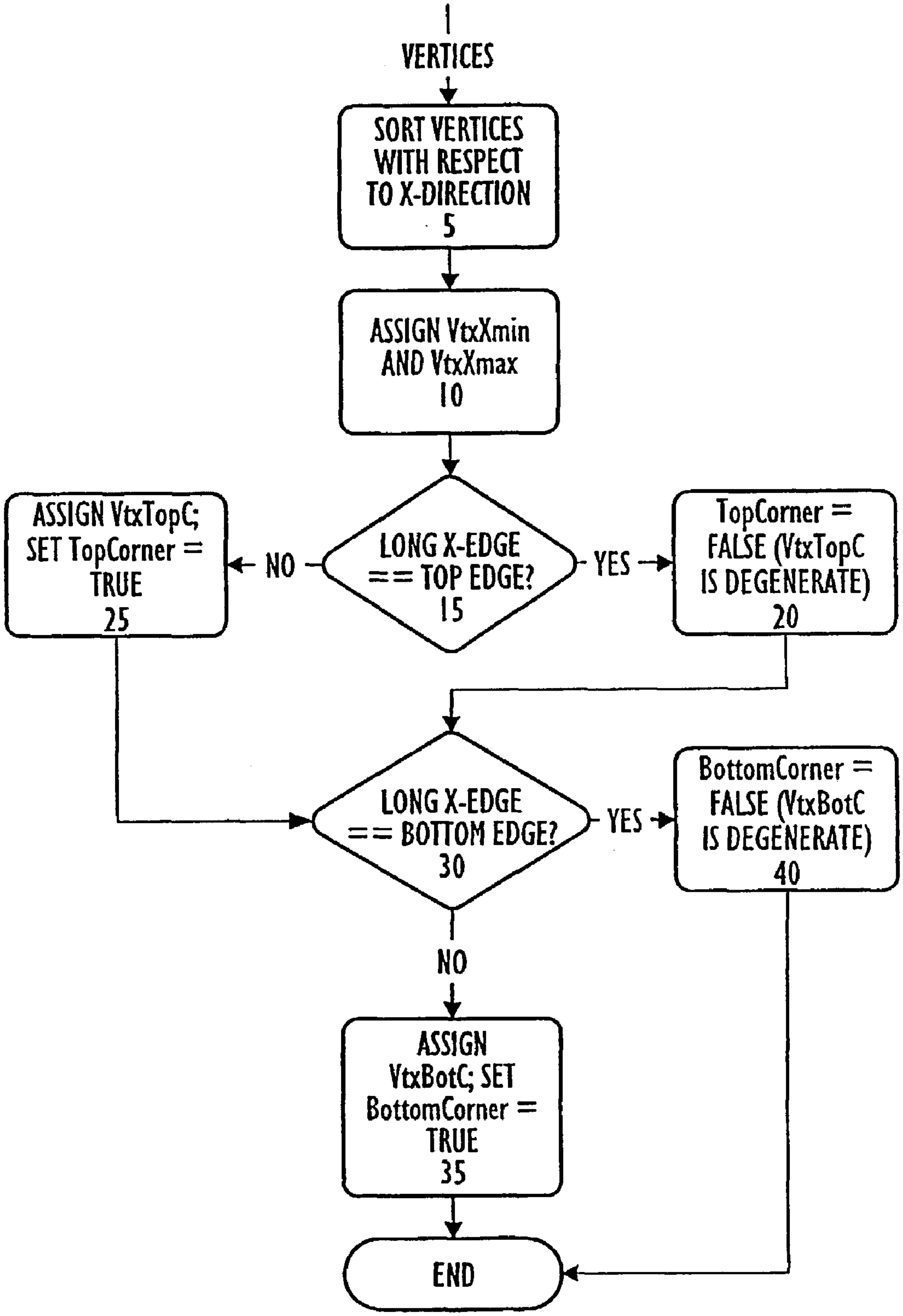
FIG. D7

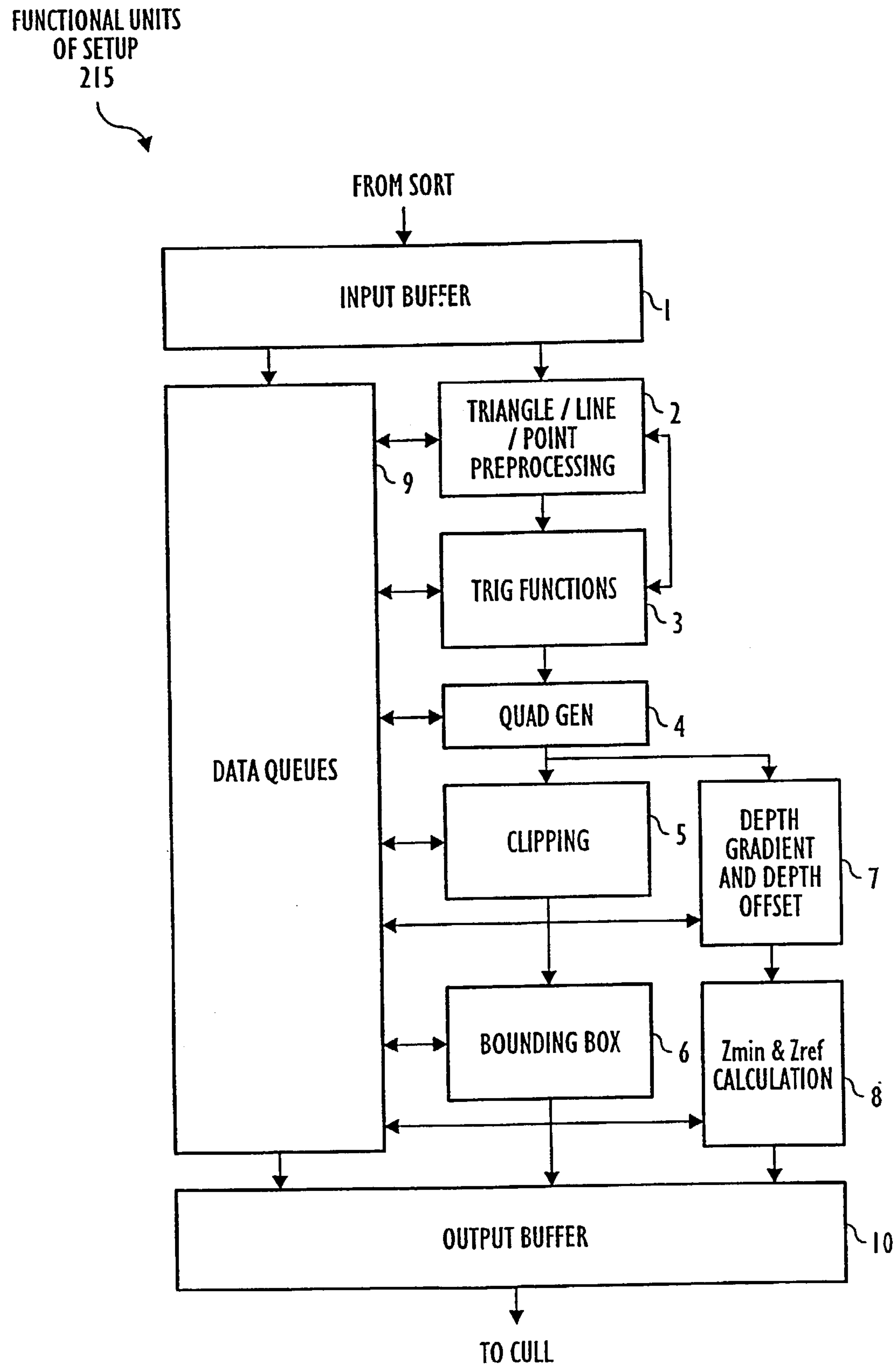
FIG. D8

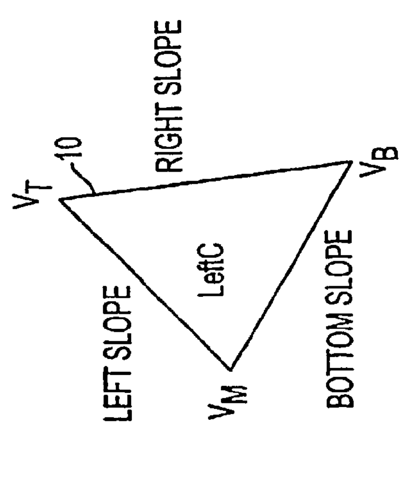
FIG. D9A
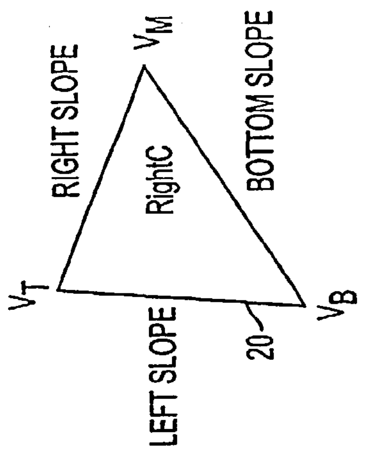
FIG. D9B
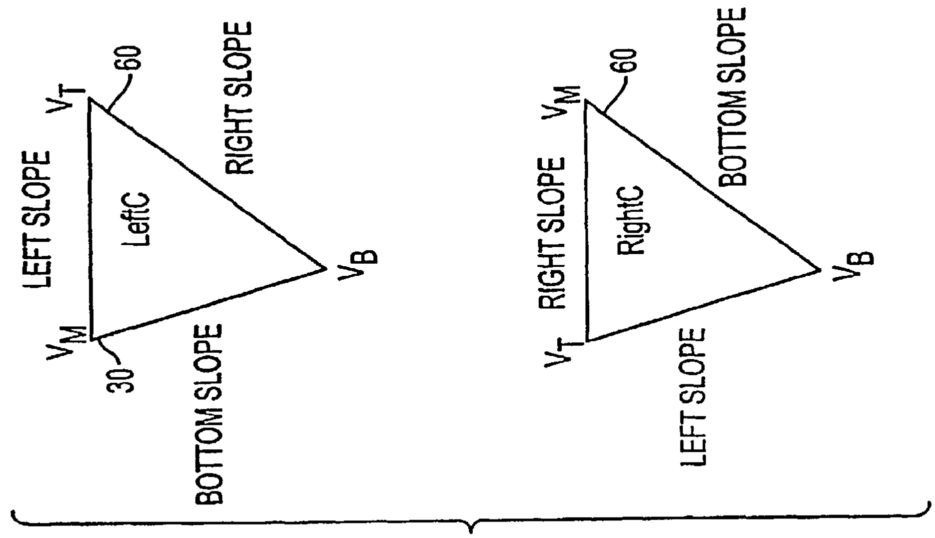
FIG. D9C
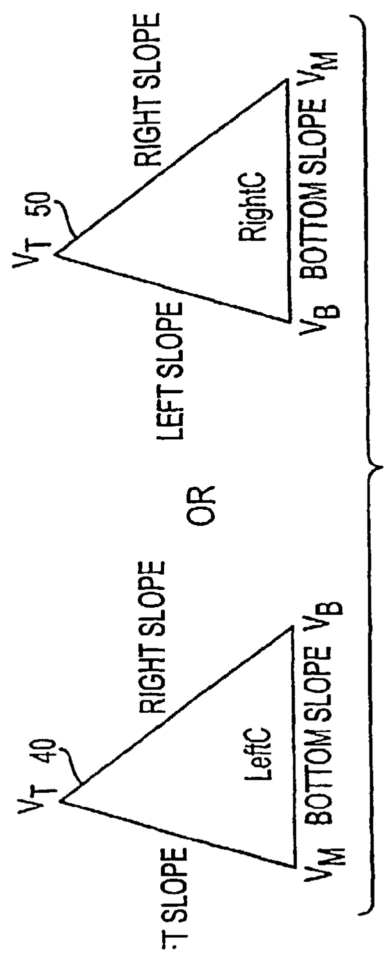
FIG. D9D

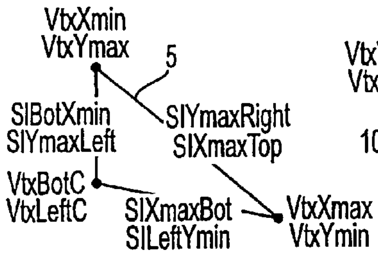
FIG. D10A
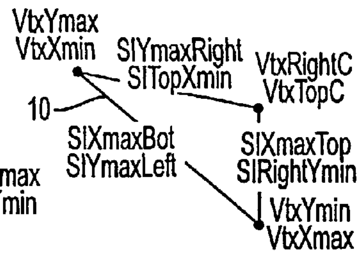
FIG. D10B
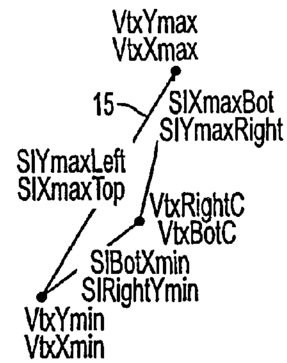
FIG. D10C
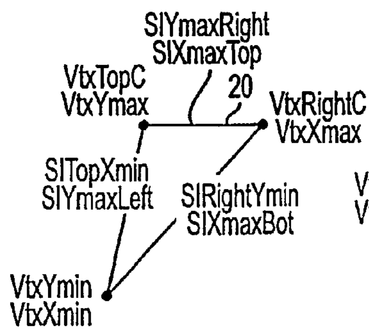
FIG. D10D
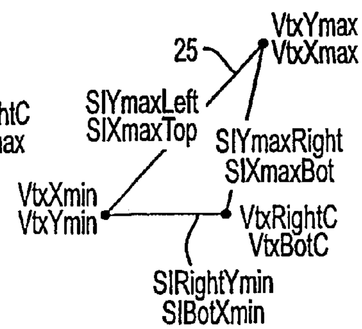
FIG. D10E
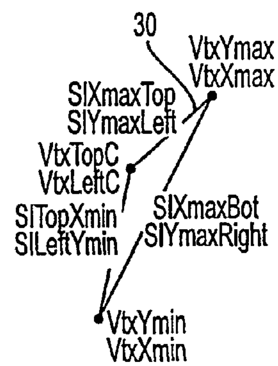
FIG. D10F
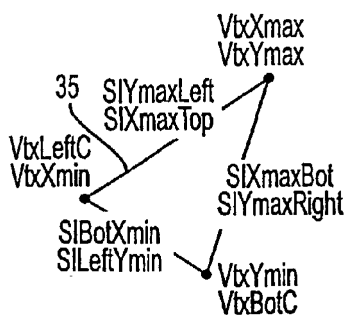
FIG. D10G
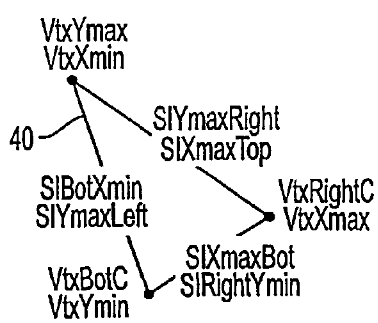
FIG. D10H
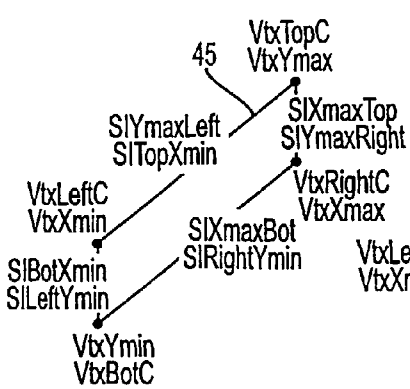
FIG. D10I
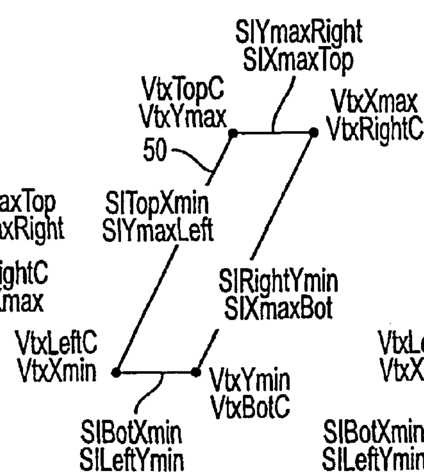
FIG. D10J
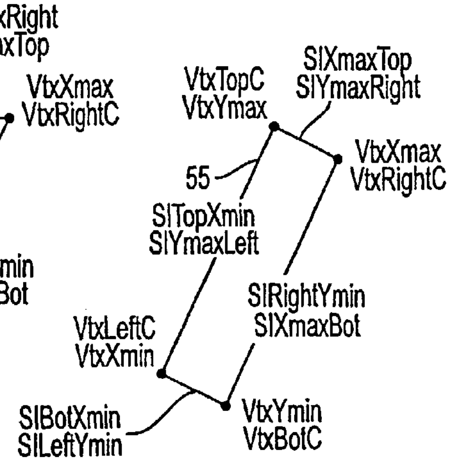
FIG. D10K

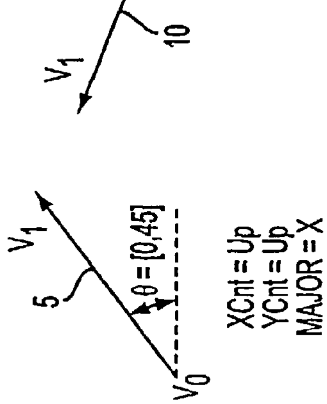
FIG. D11A
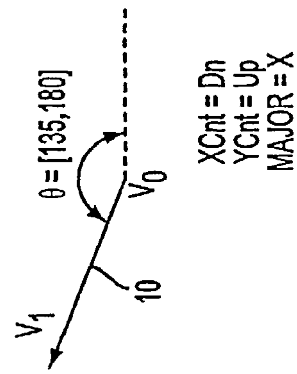
FIG. D11B
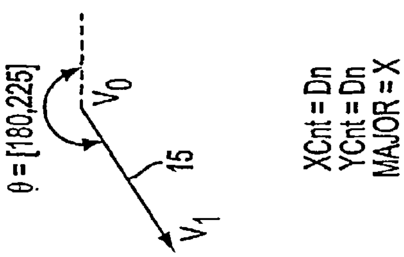
FIG. D11C
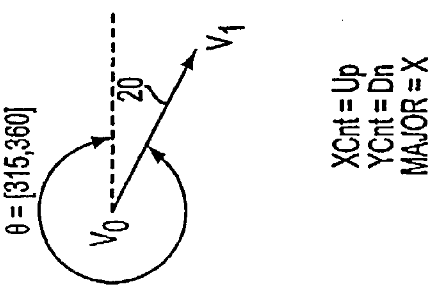
FIG. D11D
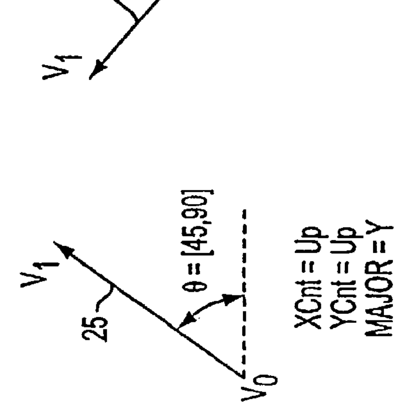
FIG. D11E
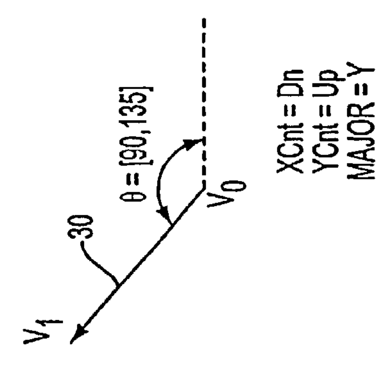
FIG. D11F
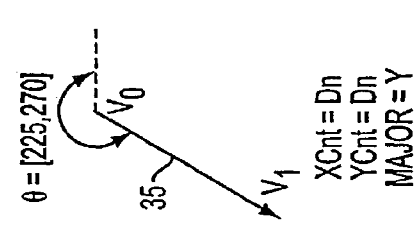
FIG. D11G
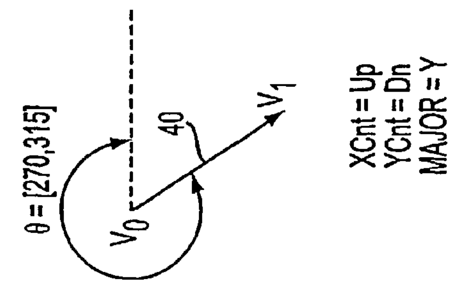
FIG. D11H

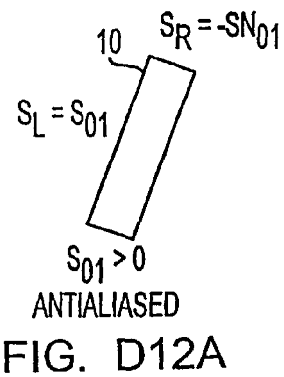
FIG. D12A
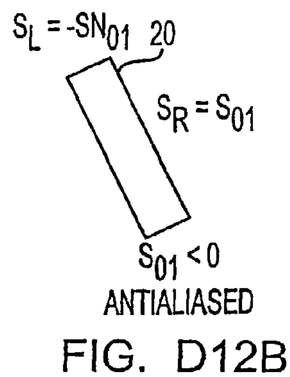
FIG. D12B
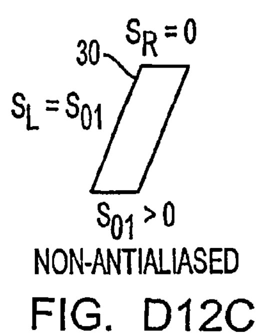
FIG. D12C
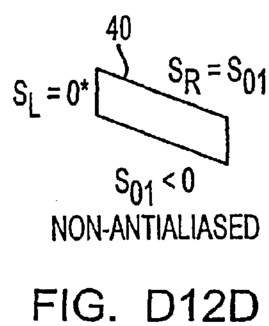
FIG. D12D
* REPRESENTED MAGNITUDES OF INFINITE SLOPES ARE DON'T CARES AND CAN BE SET TO ANY CONVENIENT CORRECTLY SIGNED VALUE

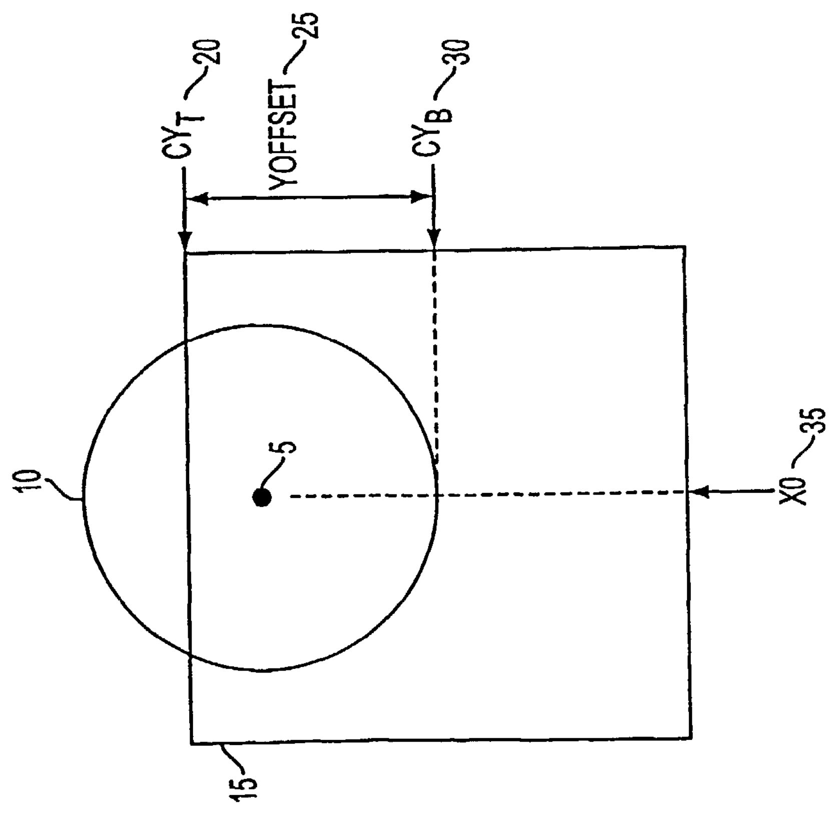
FIG. D13A
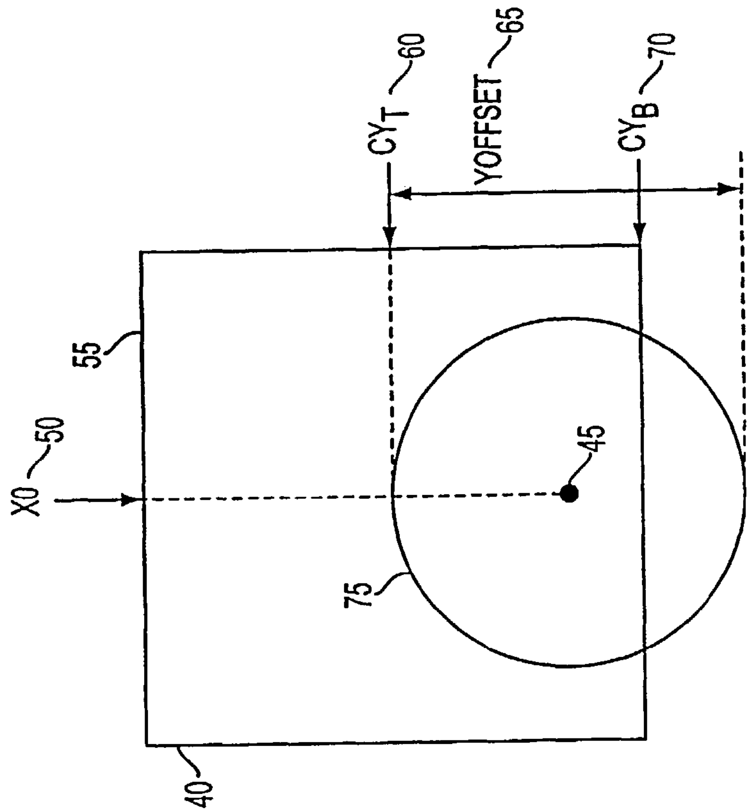
FIG. D13B

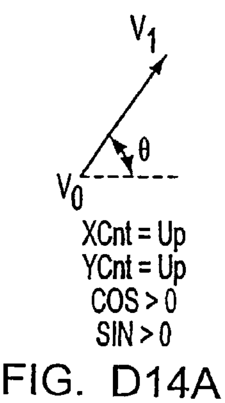
FIG. D14A
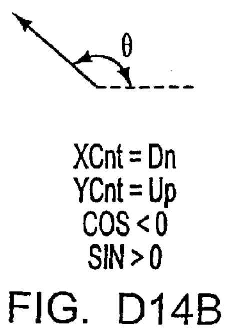
FIG. D14B
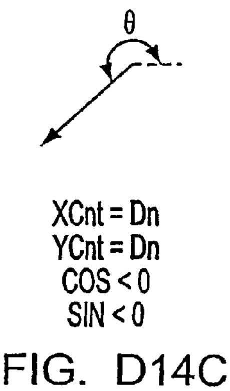
FIG. D14C
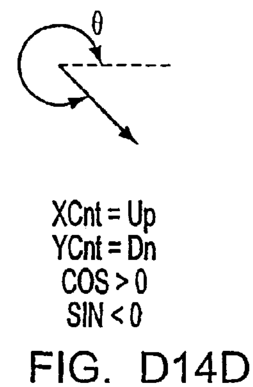
FIG. D14D

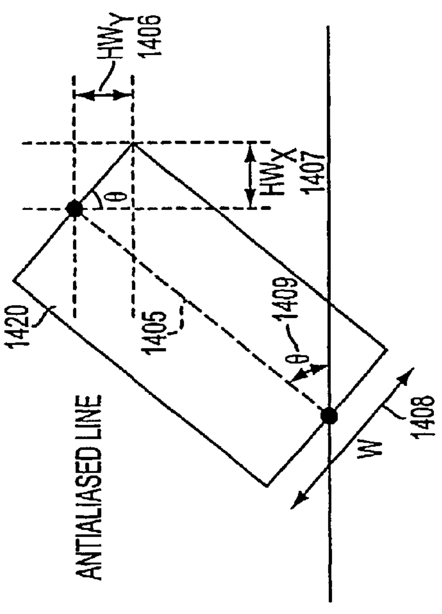
FIG. D15A
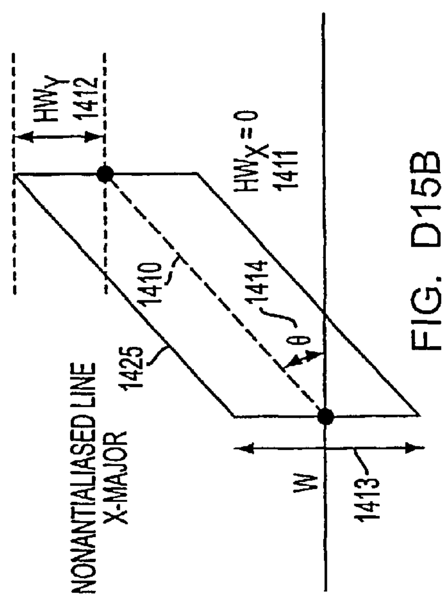
FIG. D15B
$$HW_X = \frac{W}{2}\sin\theta$$
$$HW_Y = \frac{W}{2}\cos\theta$$
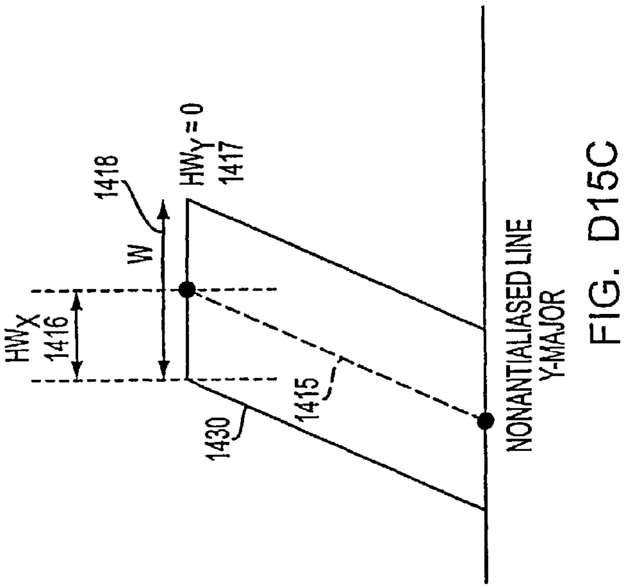
FIG. D15C

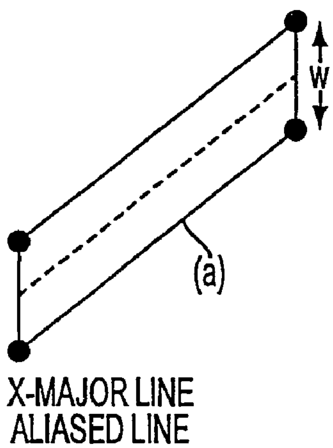
FIG. D16A
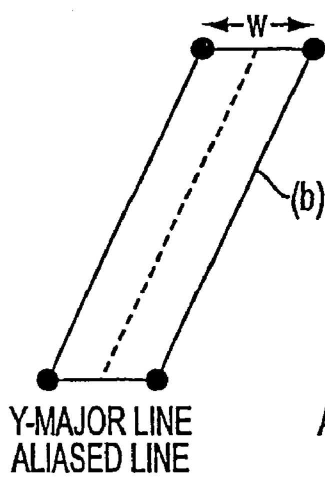
FIG. D16B
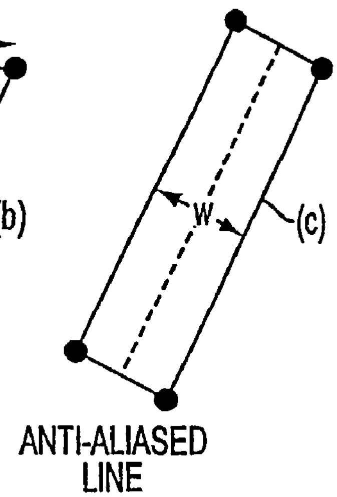
FIG. D16C

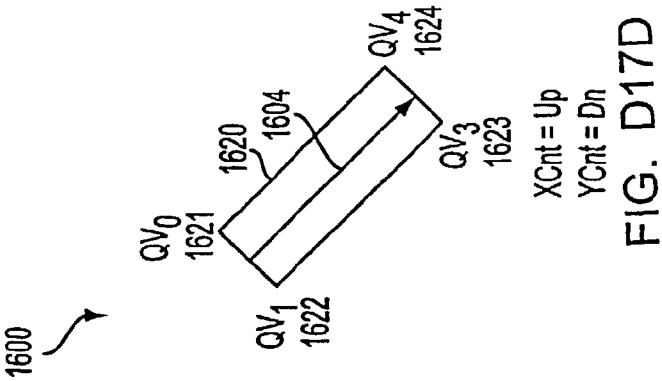
FIG. D17D
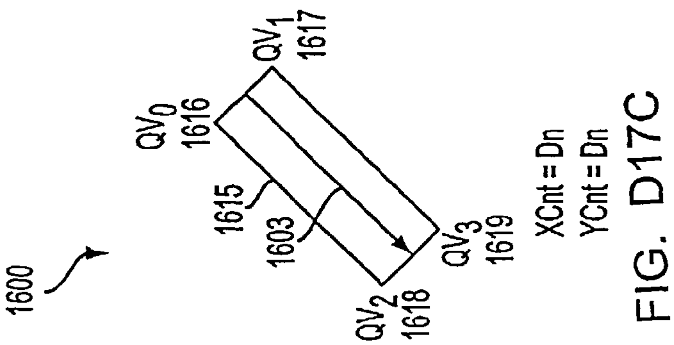
FIG. D17C
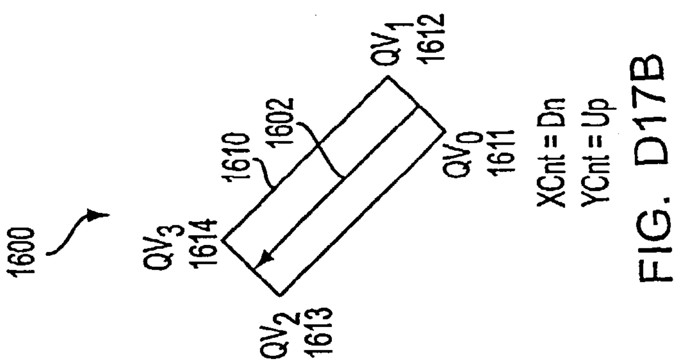
FIG. D17B
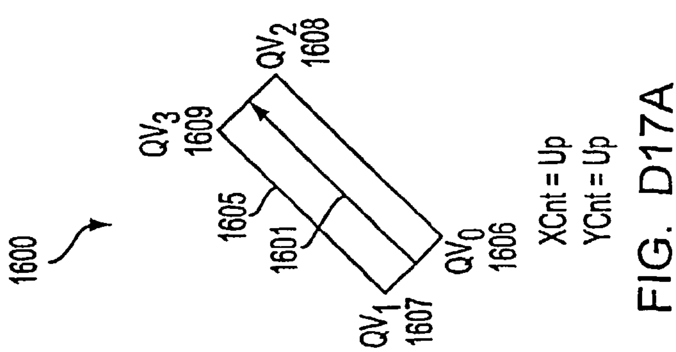
FIG. D17A

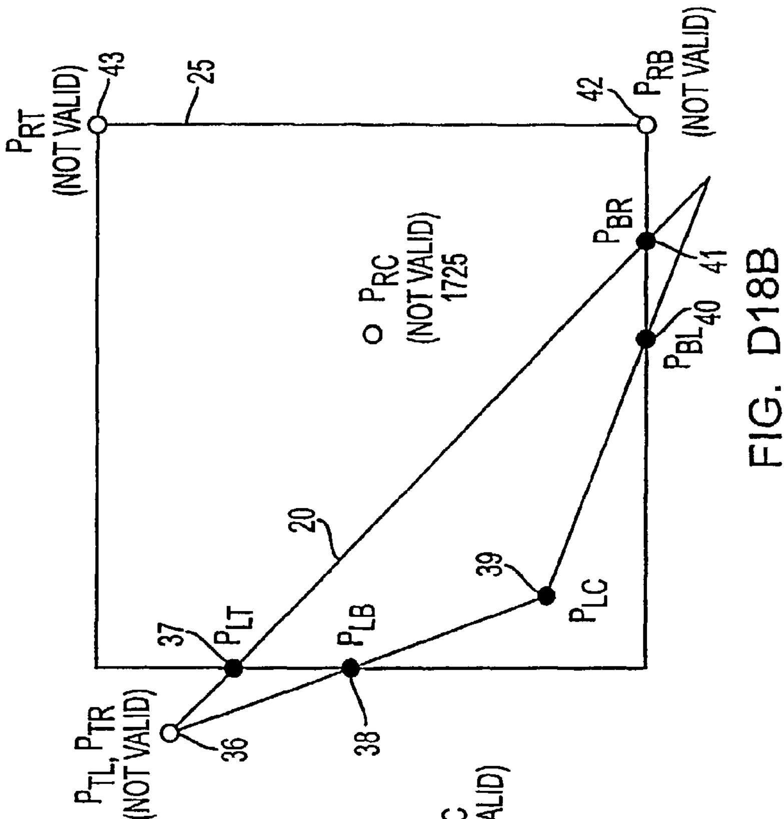
FIG. D18B
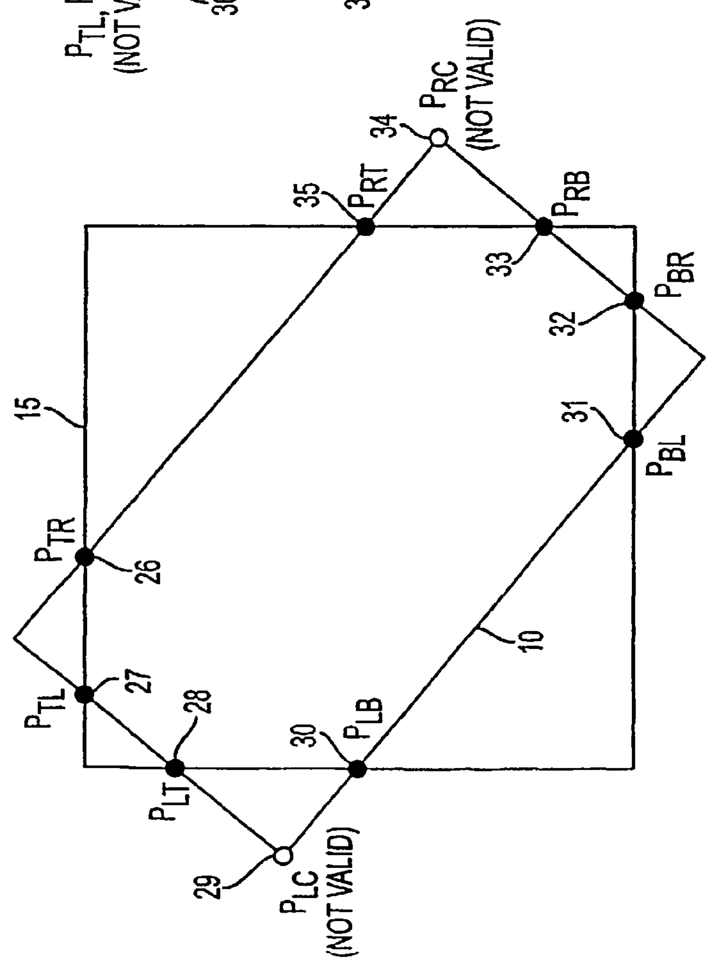
FIG. D18A

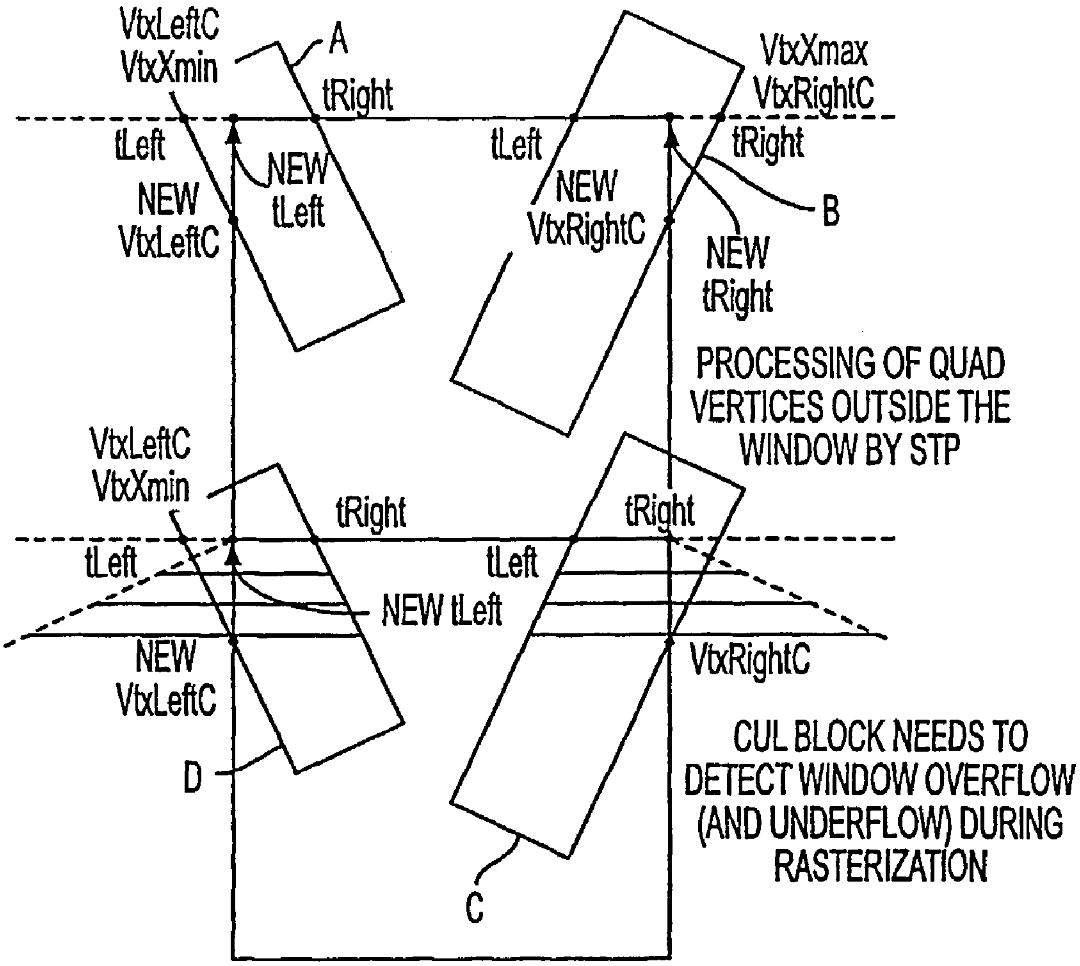
FIG. D19

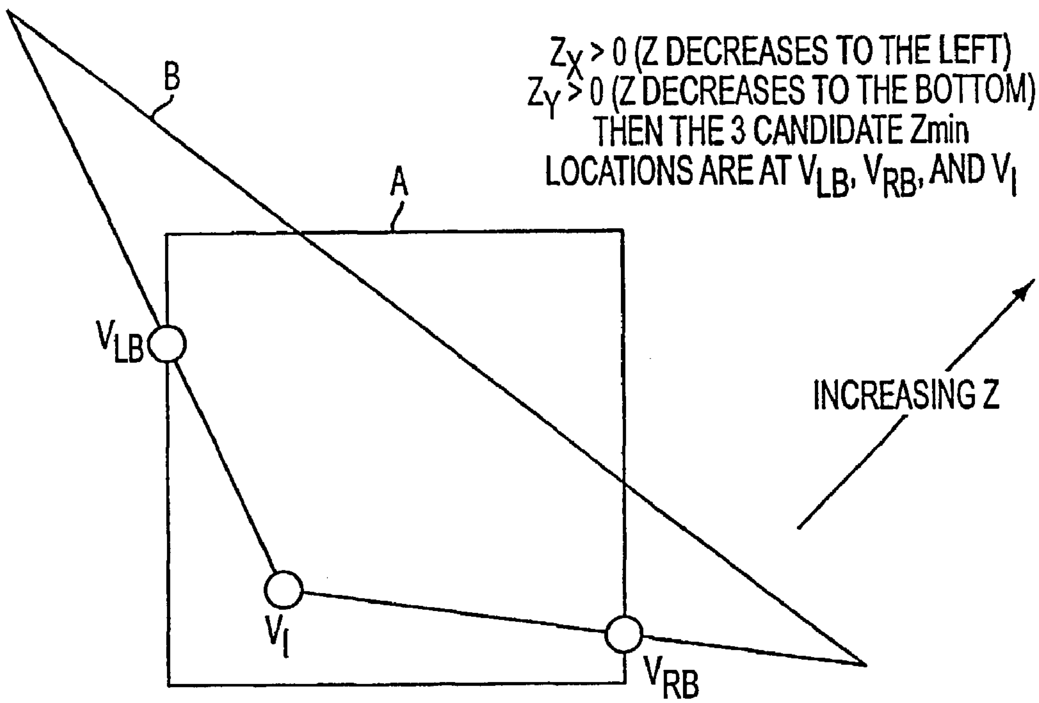
FIG. D20

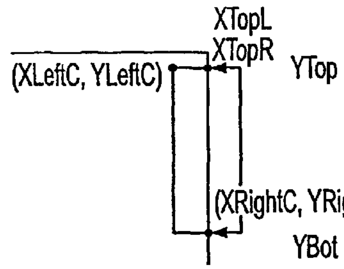
FIG. D21A
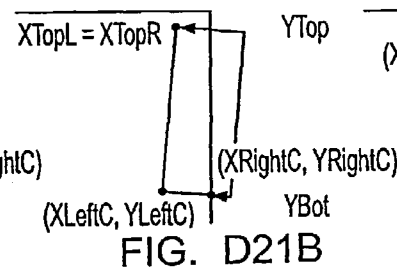
FIG. D21B
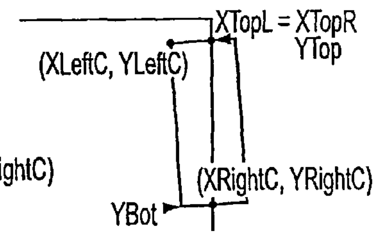
FIG. D21C
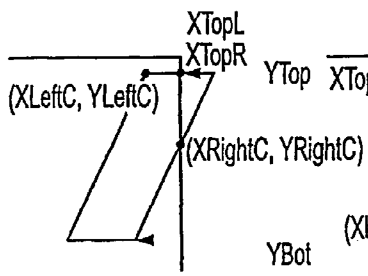
FIG. D21D
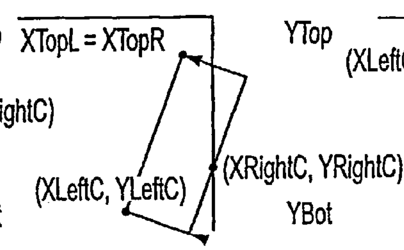
FIG. D21E
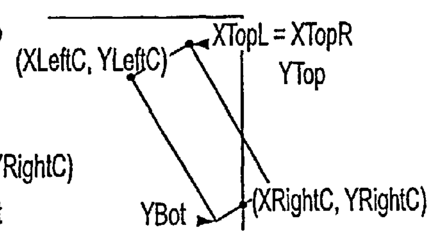
FIG. D21F
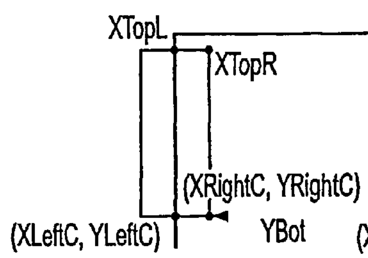
FIG. D21G
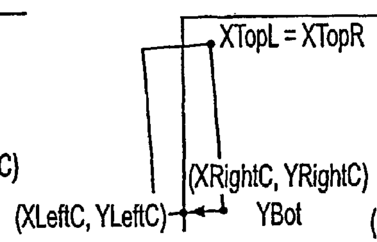
FIG. D21H
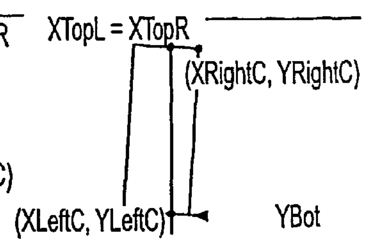
FIG. D21I
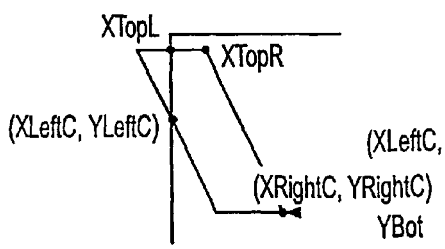
FIG. D21J
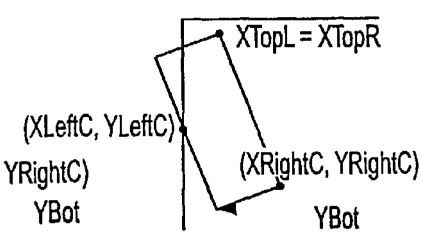
FIG. D21K
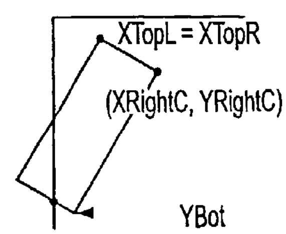
FIG. D21L

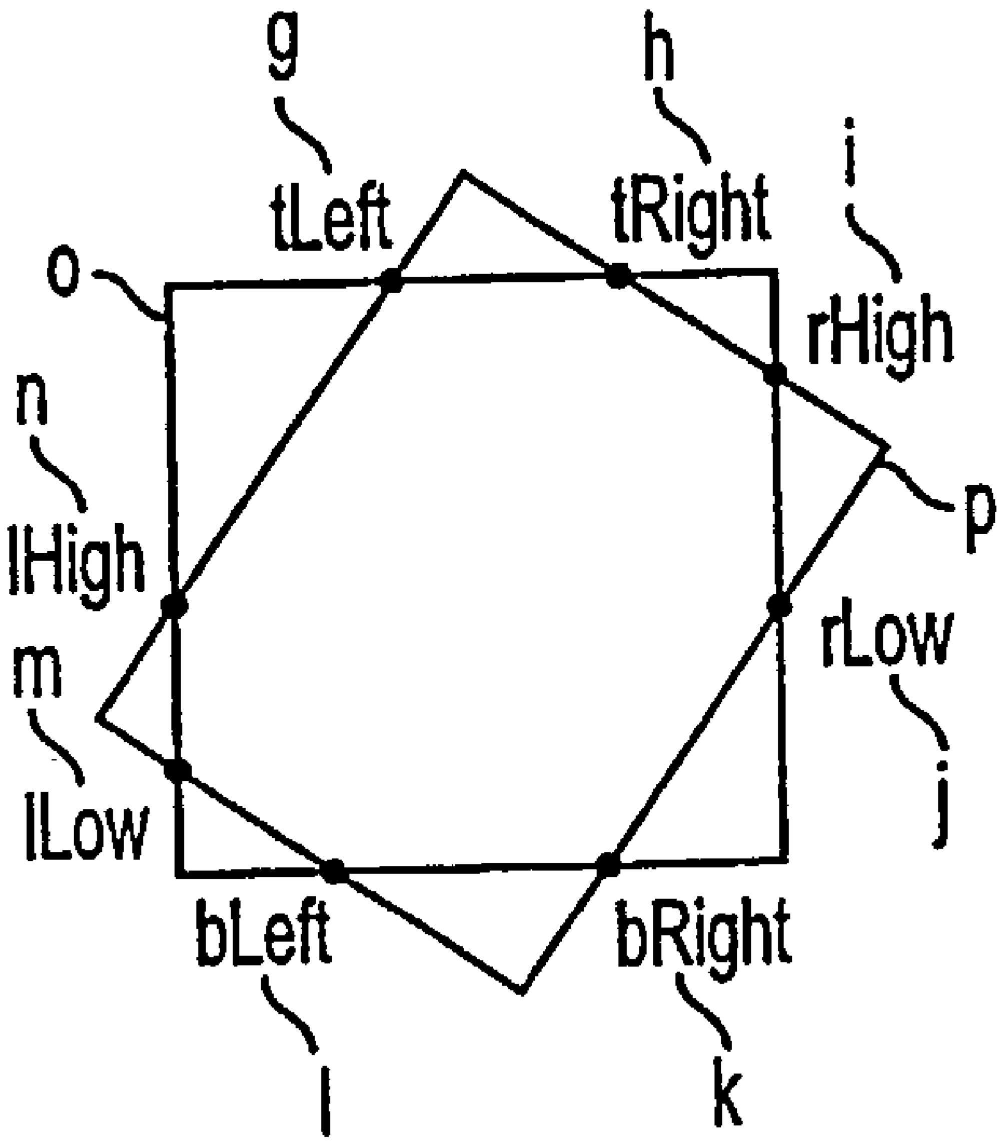
FIG. D22

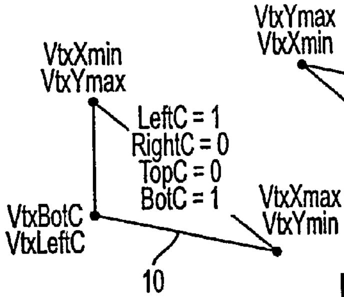
FIG. D23A
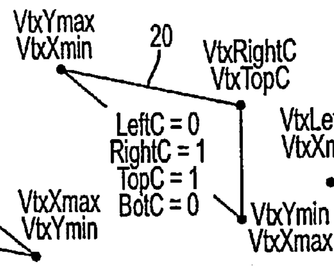
FIG. D23B
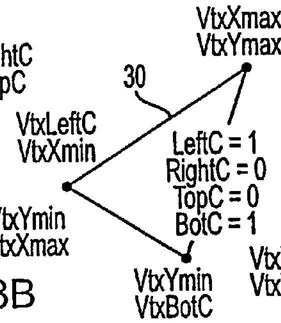
FIG. D23C
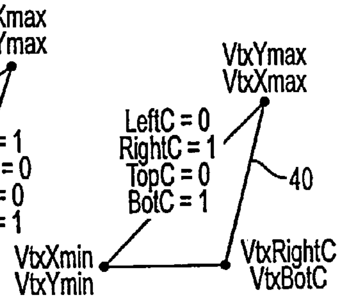
FIG. D23D
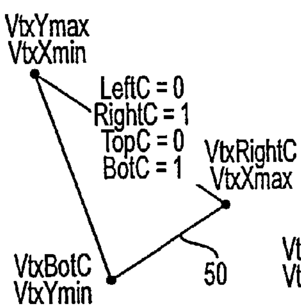
FIG. D23E
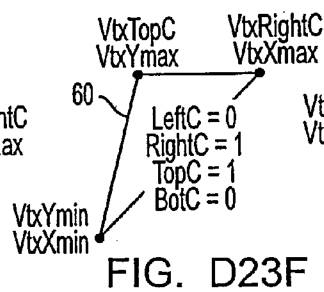
FIG. D23F
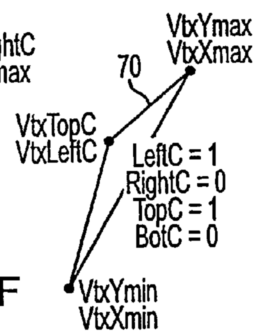
FIG. D23G
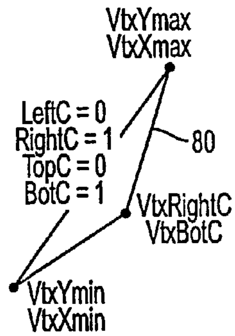
FIG. D23H
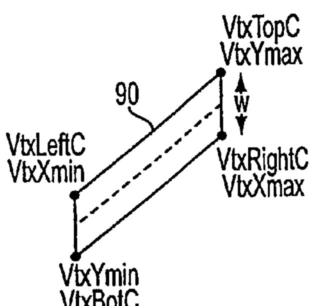
FIG. D23I
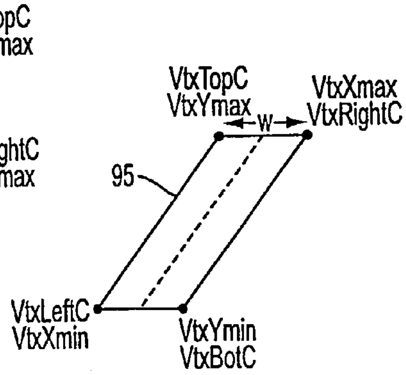
FIG. D23J
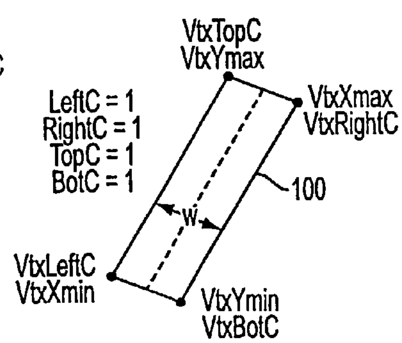
FIG. D23K

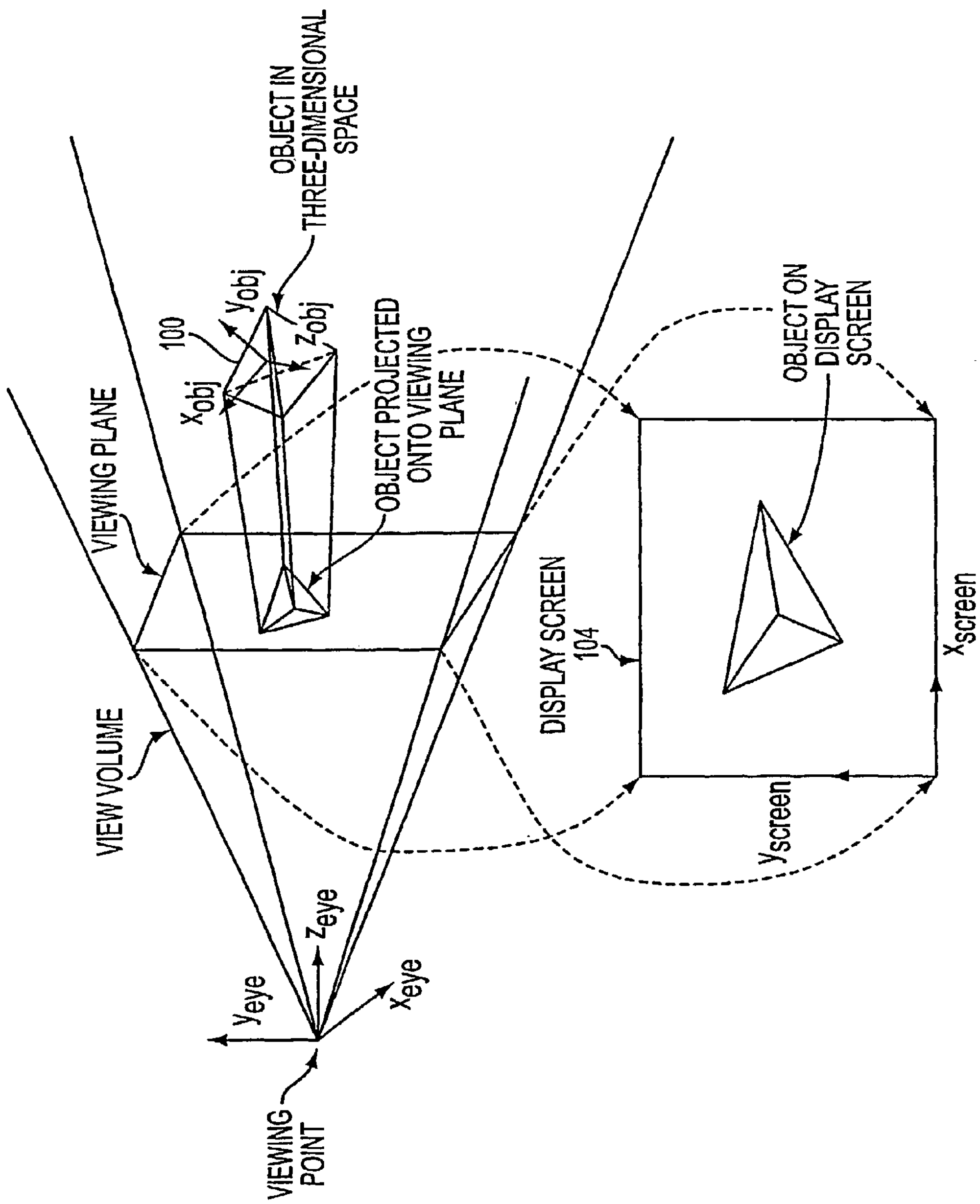
FIG. E1

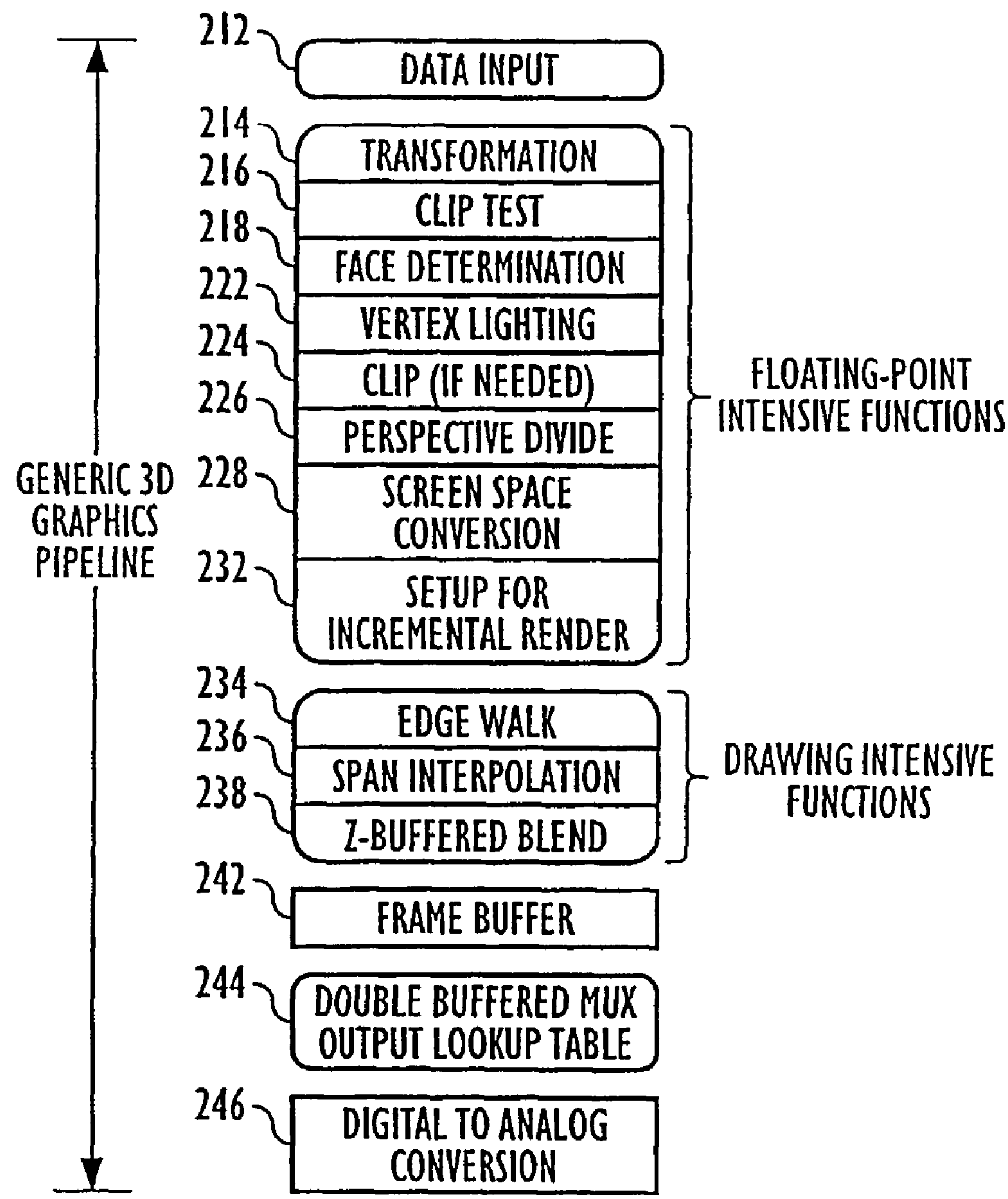
FIG. E2
(PRIOR ART)

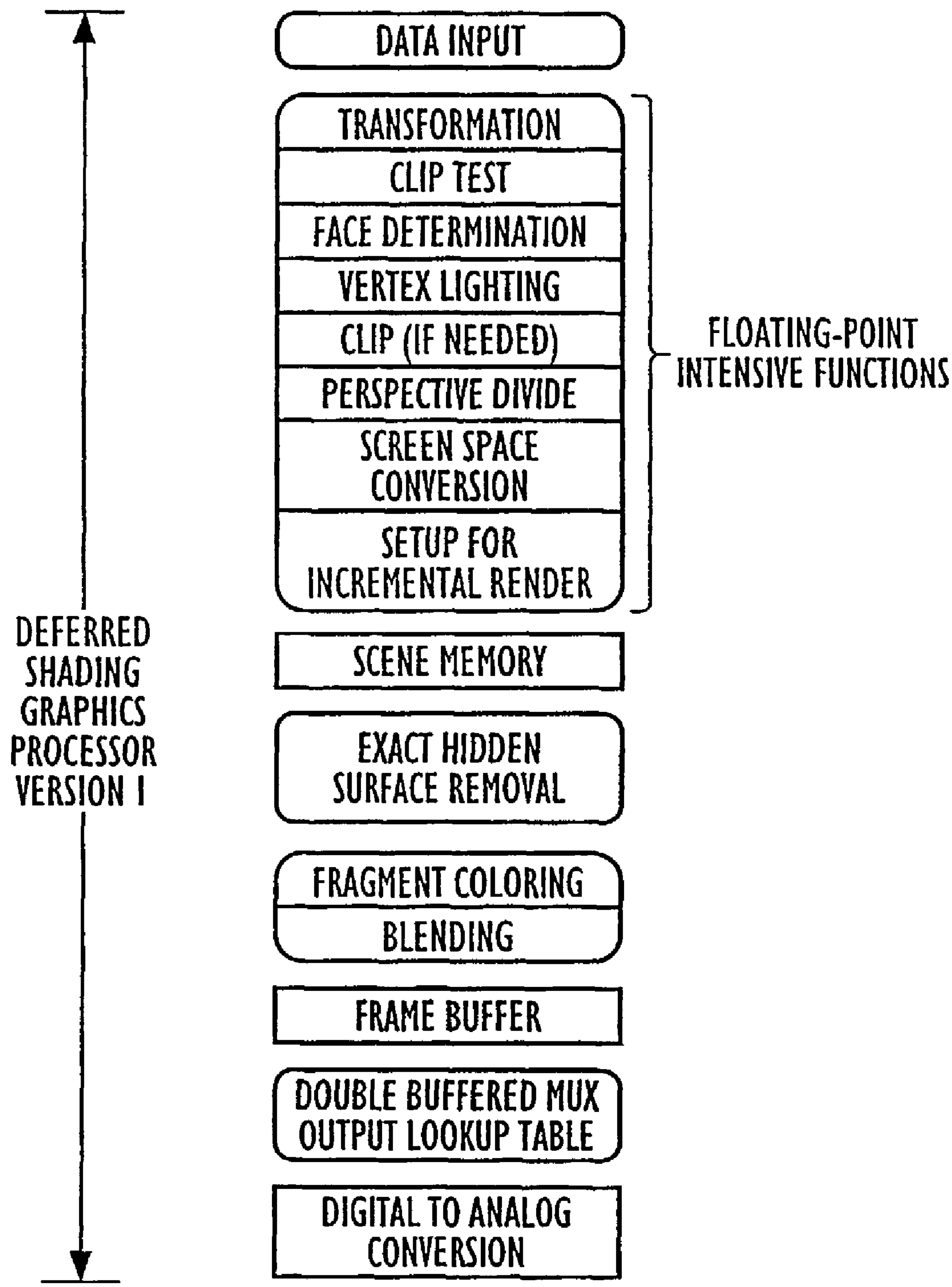
FIG. E3

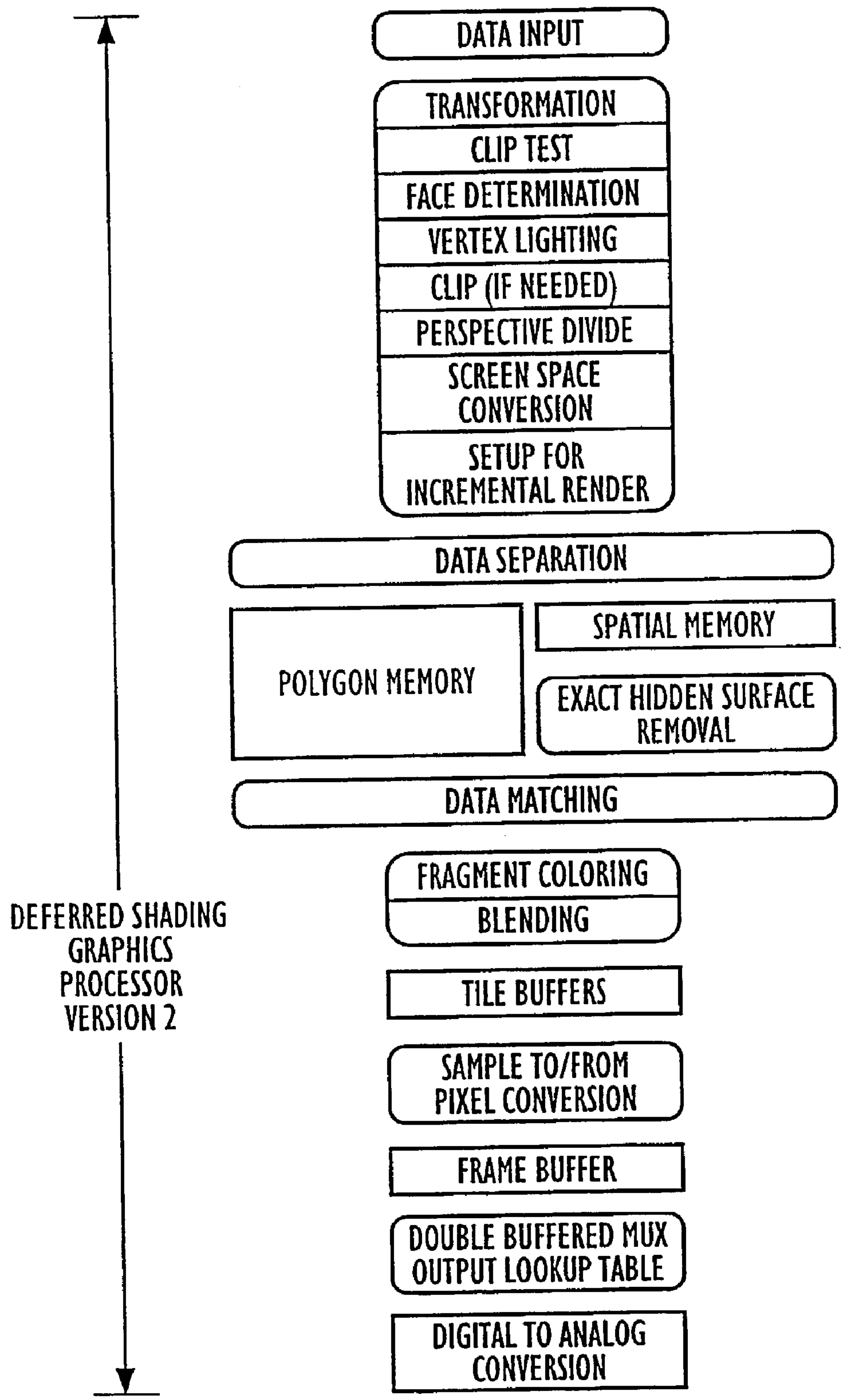
FIG. E4

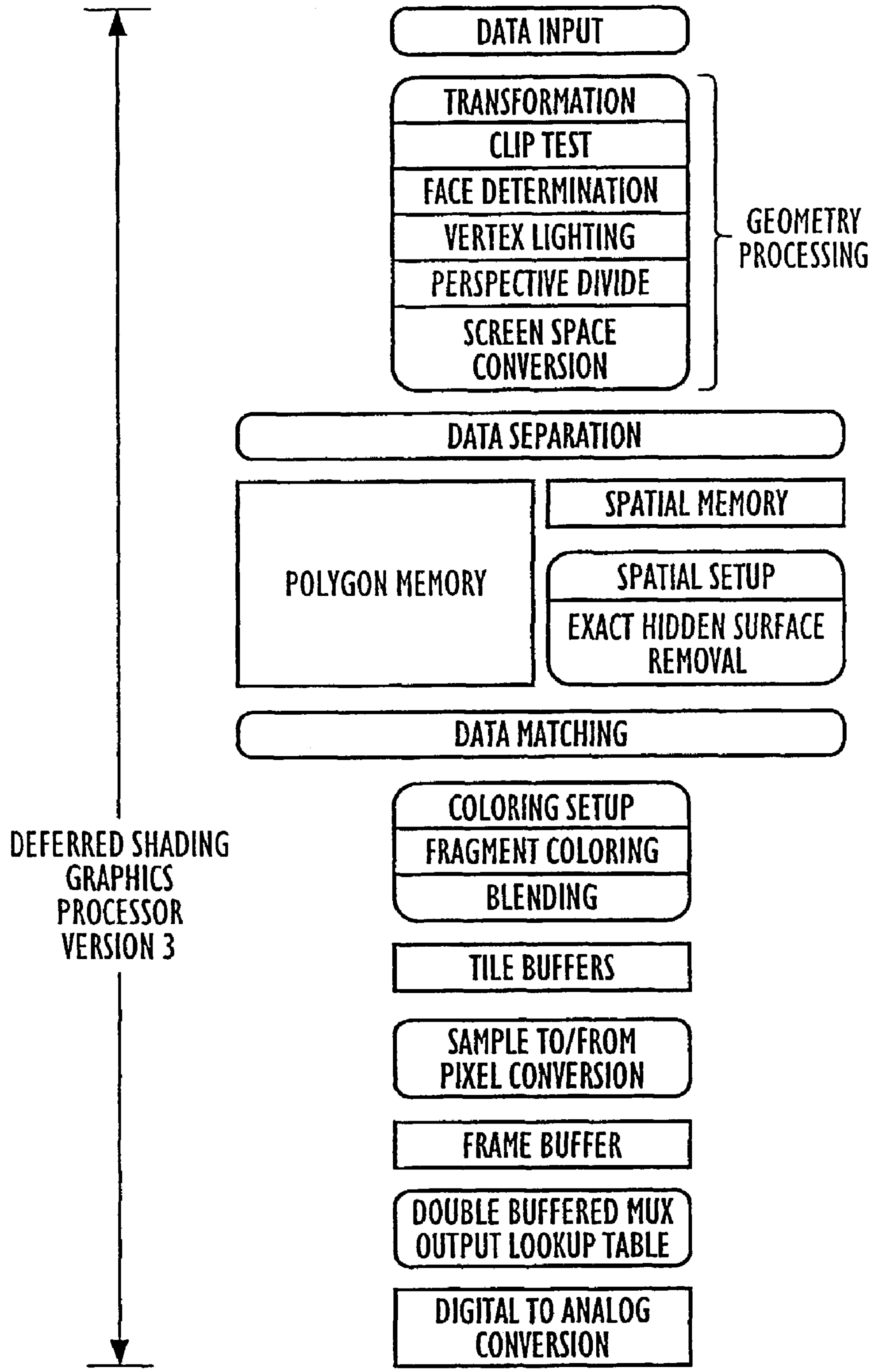
FIG. E5

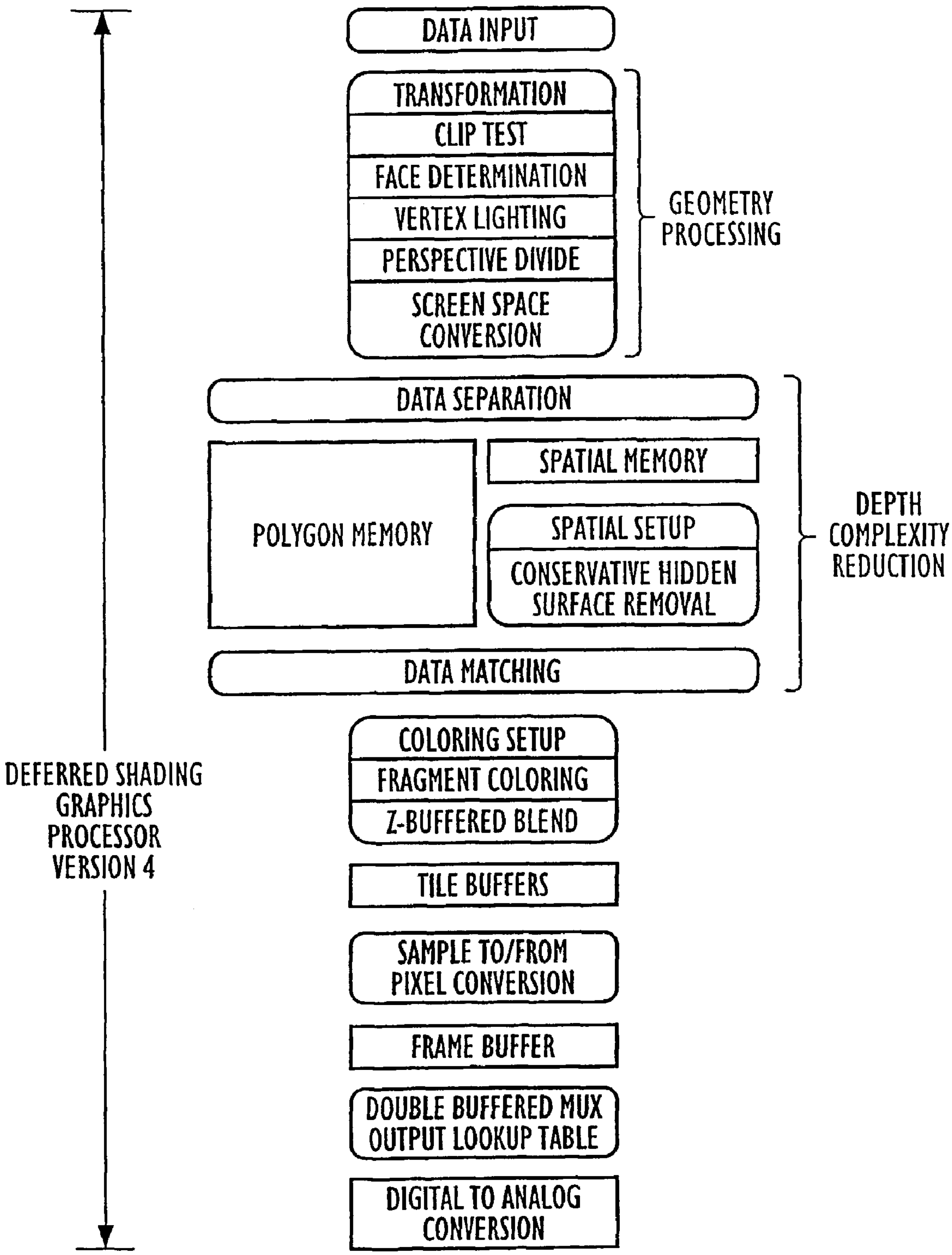
FIG. E6

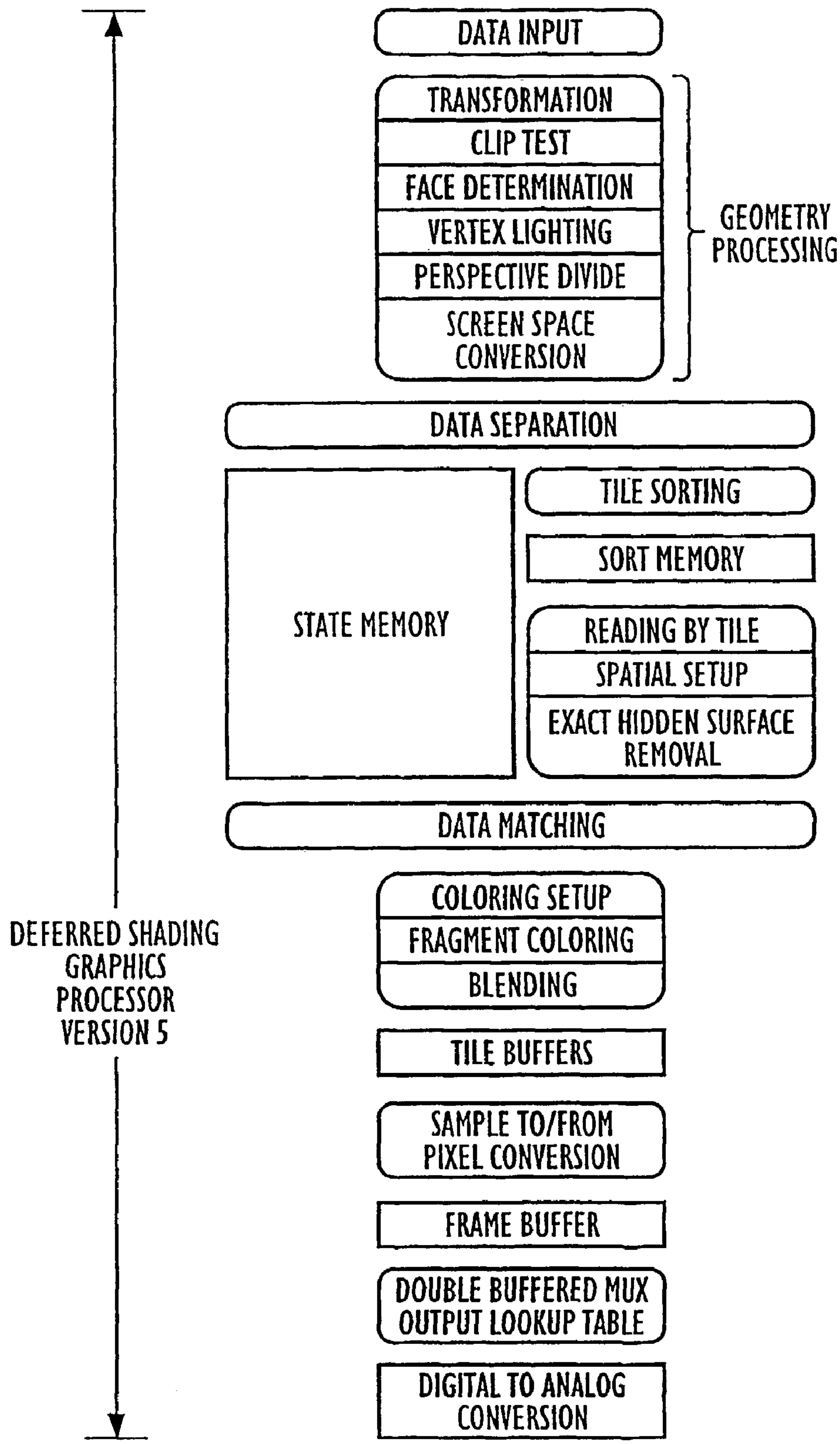
FIG. E7

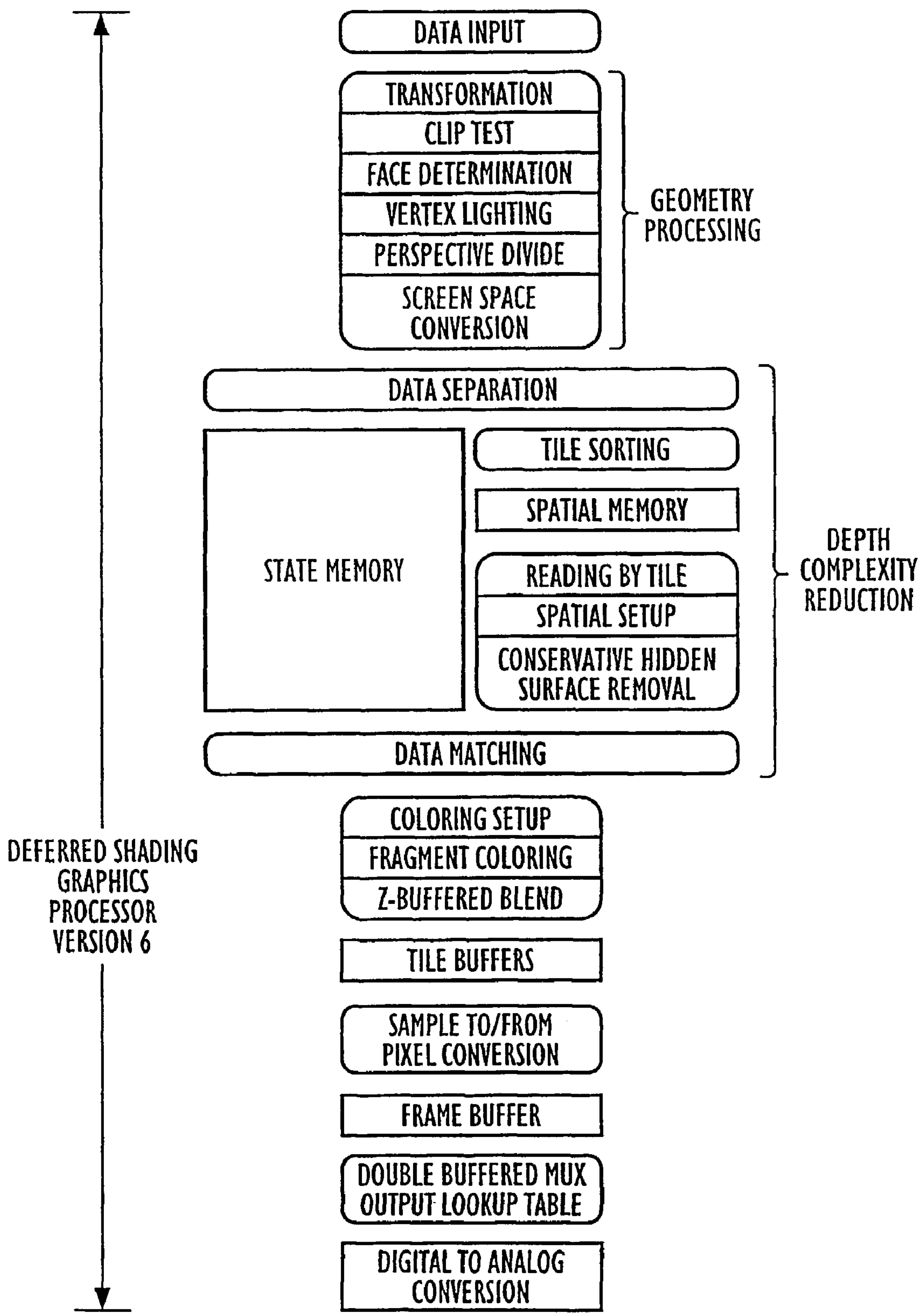
FIG. E8

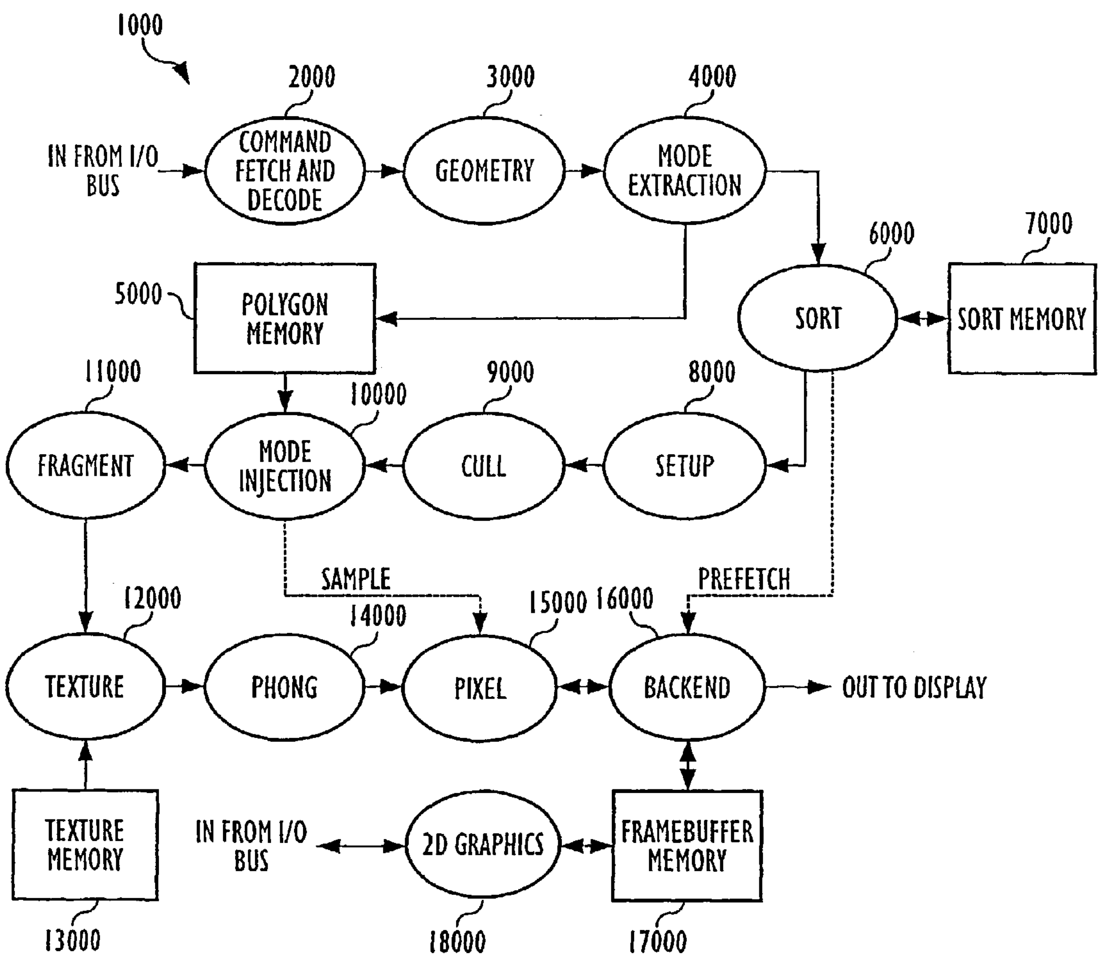
FIG. E9

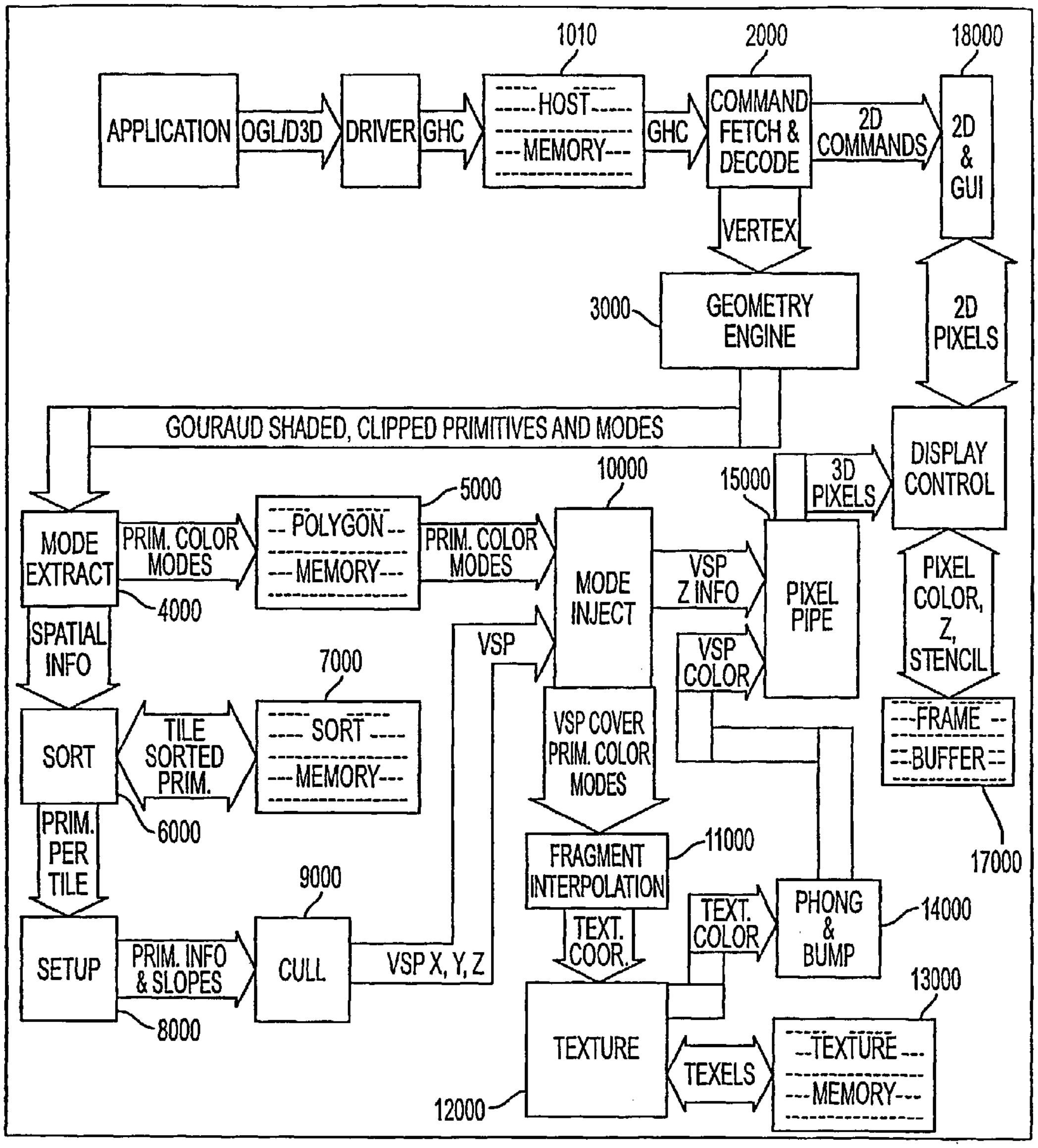
FIG. E10
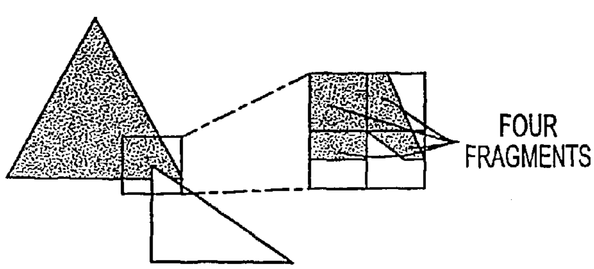
FIG. E11

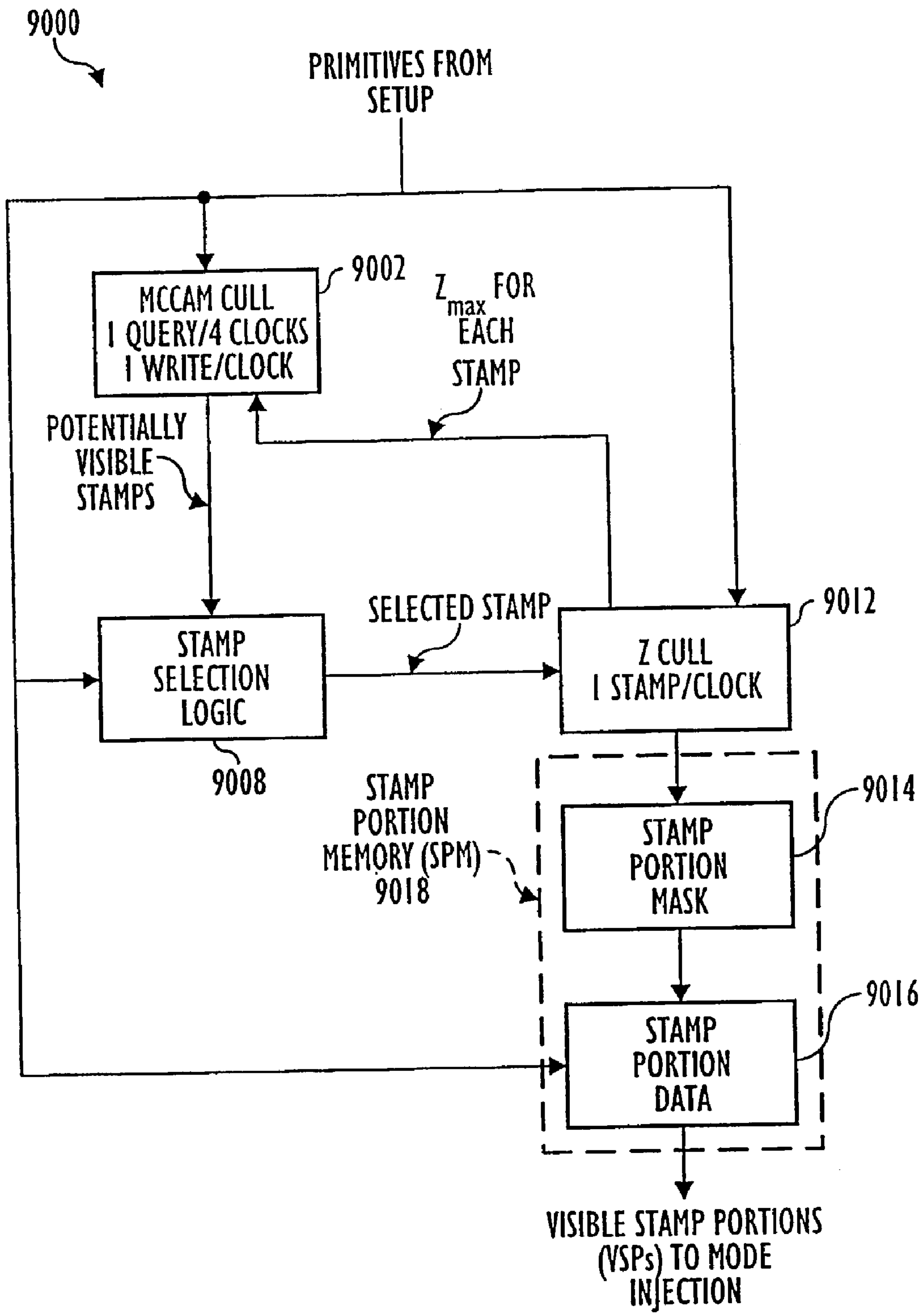
FIG. E12

TILES, STAMPS, AND STAMP PORTIONS
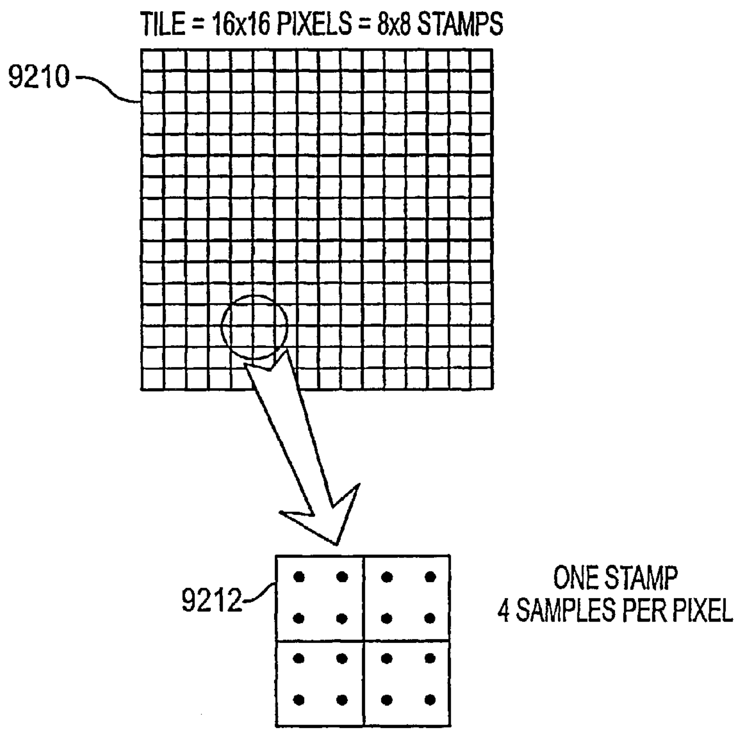
FIG. E13A
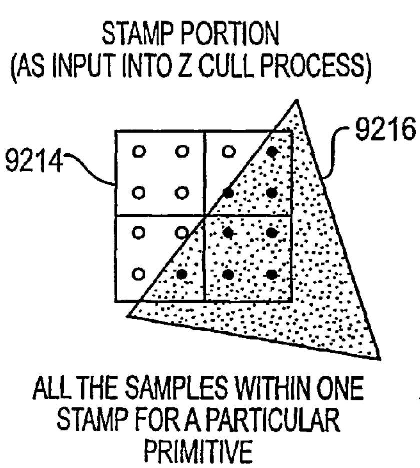
FIG. E13B
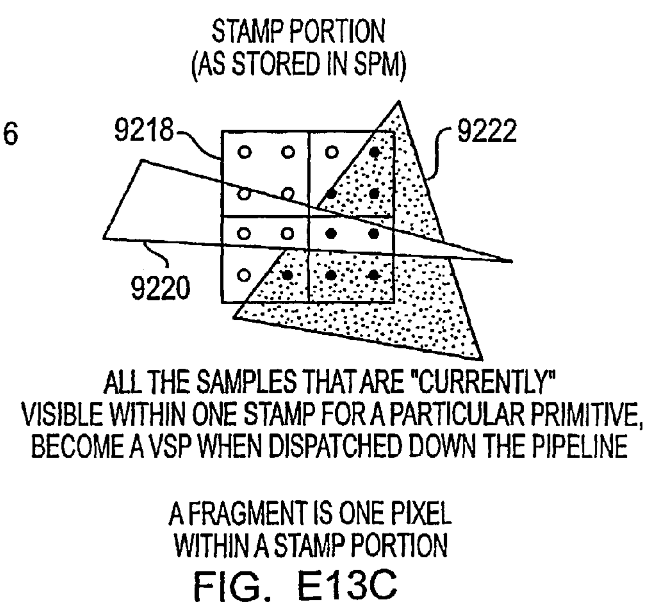
FIG. E13C

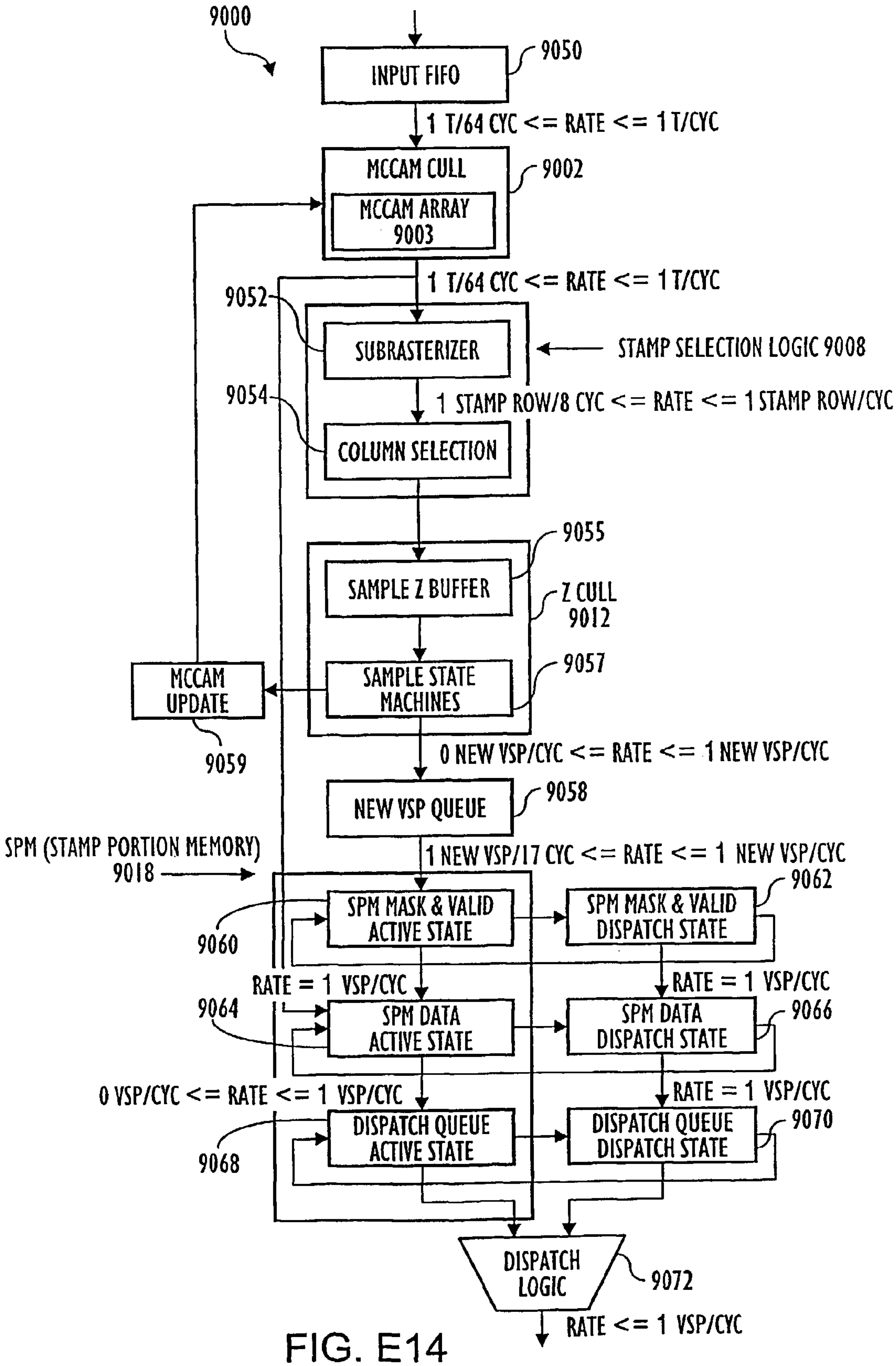
FIG. E14

| NAME | ALSO KNOWN AS | BITS | PRECISION | PURPOSE/DESCRIPTION/OTHER INTERPRETATION |
|---|---|---|---|---|
| PacketType | | 3 | | TO INDICATE THE TYPE OF PACKET |
| PrimType | | 2 | | TO INDICATE TRIANGLE, LINE OR POINT |
| XleftTop | | 16 | 11.5 | IS Xcenter FOR POINT |
| XrightTop | | 16 | 11.5 | IS Xcenter FOR POINT |
| YLRTop | | 8 | 5.3 | |
| XleftCorner | | 16 | 11.5 | |
| YleftCorner | | 8 | 5.3 | |
| XrightCorner | | 16 | 11.5 | |
| YrightCorner | | 8 | 5.3 | IS Yoffset FOR POINT |
| Ybottom | | 8 | 5.3 | |
| SlopeLeft | dxleft/dy | 24 | S14.9 | |
| SlopeRight | dxright/dy | 24 | S14.9 | |
| SlopeBot | dxbottom/dy | 24 | S14.9 | |
| ZslopeX | dz/dx | 35 | S27.7 | |
| ZslopeY | dz/dy | 35 | S27.7 | |
| ZrefTile | | 32 | S28.3 | |
| ZminTile | | 24 | 24.0 | |
| LeftValid | LeftC | 1 | | |
| RightValid | RightC | 1 | | |
| XrefStamp | | 3 | | |
| YrefStamp | | 3 | | |
| XminStamp | | 3 | | |
| XmaxStamp | | 3 | | |
| YminStamp | | 3 | | |
| YmaxStamp | | 3 | | |
| ColorPointer | | 36 | | |
| CullFlushOverlap | | 1 | | |
| DoAlphaTest | | 1 | | |
| DoABlend | | 1 | | |
| DepthFunc | | 3 | | |
| DepthTestEnabled | | 1 | | |
| DepthTestMask | | 1 | | |
| NoColor | | 1 | | |
| PointLineWidth | | 3 | | |
| TOTAL | | 367 | | |

FIG. E15

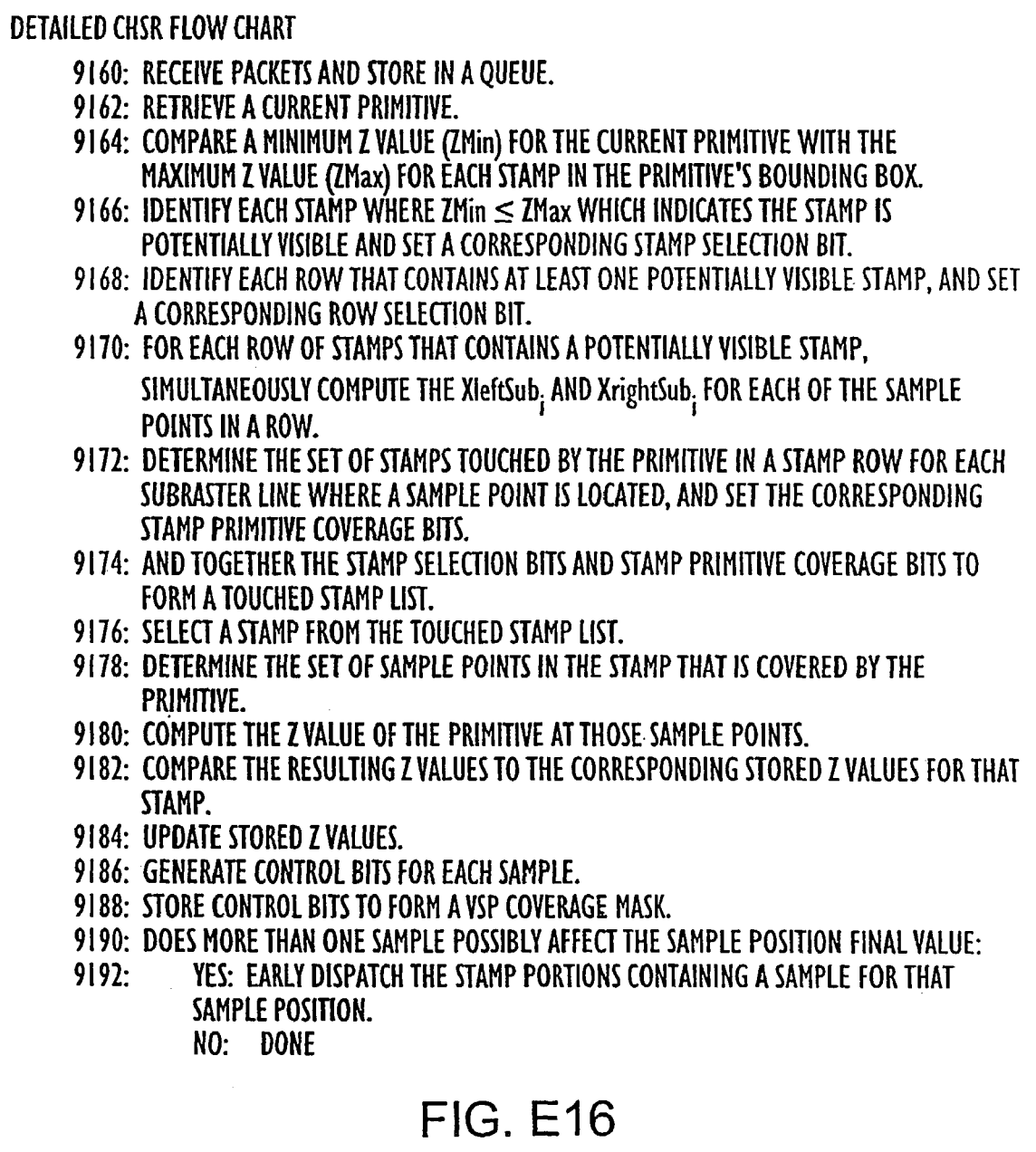

DETAILED CHSR FLOW CHART

9160: RECEIVE PACKETS AND STORE IN A QUEUE.
9162: RETRIEVE A CURRENT PRIMITIVE.
9164: COMPARE A MINIMUM Z VALUE (ZMin) FOR THE CURRENT PRIMITIVE WITH THE MAXIMUM Z VALUE (ZMax) FOR EACH STAMP IN THE PRIMITIVE'S BOUNDING BOX.
9166: IDENTIFY EACH STAMP WHERE ZMin ≤ ZMax WHICH INDICATES THE STAMP IS POTENTIALLY VISIBLE AND SET A CORRESPONDING STAMP SELECTION BIT.
9168: IDENTIFY EACH ROW THAT CONTAINS AT LEAST ONE POTENTIALLY VISIBLE STAMP, AND SET A CORRESPONDING ROW SELECTION BIT.
9170: FOR EACH ROW OF STAMPS THAT CONTAINS A POTENTIALLY VISIBLE STAMP, SIMULTANEOUSLY COMPUTE THE $XleftSub_i$ AND $XrightSub_i$ FOR EACH OF THE SAMPLE POINTS IN A ROW.
9172: DETERMINE THE SET OF STAMPS TOUCHED BY THE PRIMITIVE IN A STAMP ROW FOR EACH SUBRASTER LINE WHERE A SAMPLE POINT IS LOCATED, AND SET THE CORRESPONDING STAMP PRIMITIVE COVERAGE BITS.
9174: AND TOGETHER THE STAMP SELECTION BITS AND STAMP PRIMITIVE COVERAGE BITS TO FORM A TOUCHED STAMP LIST.
9176: SELECT A STAMP FROM THE TOUCHED STAMP LIST.
9178: DETERMINE THE SET OF SAMPLE POINTS IN THE STAMP THAT IS COVERED BY THE PRIMITIVE.
9180: COMPUTE THE Z VALUE OF THE PRIMITIVE AT THOSE SAMPLE POINTS.
9182: COMPARE THE RESULTING Z VALUES TO THE CORRESPONDING STORED Z VALUES FOR THAT STAMP.
9184: UPDATE STORED Z VALUES.
9186: GENERATE CONTROL BITS FOR EACH SAMPLE.
9188: STORE CONTROL BITS TO FORM A VSP COVERAGE MASK.
9190: DOES MORE THAN ONE SAMPLE POSSIBLY AFFECT THE SAMPLE POSITION FINAL VALUE:
9192: YES: EARLY DISPATCH THE STAMP PORTIONS CONTAINING A SAMPLE FOR THAT SAMPLE POSITION.
NO: DONE

FIG. E16

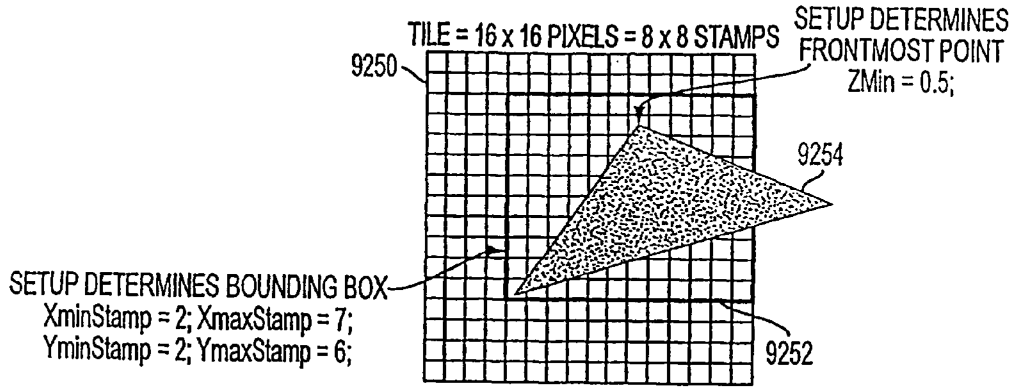
FIG. E17A
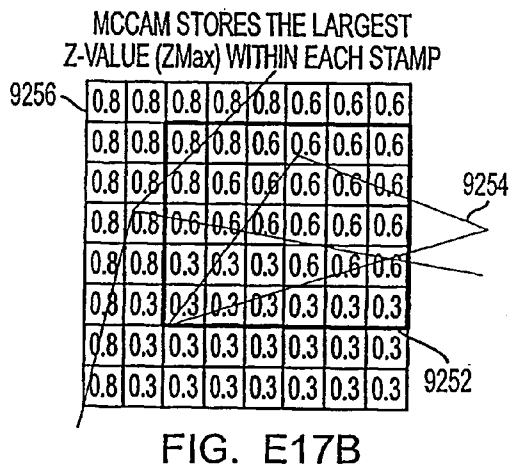
FIG. E17B
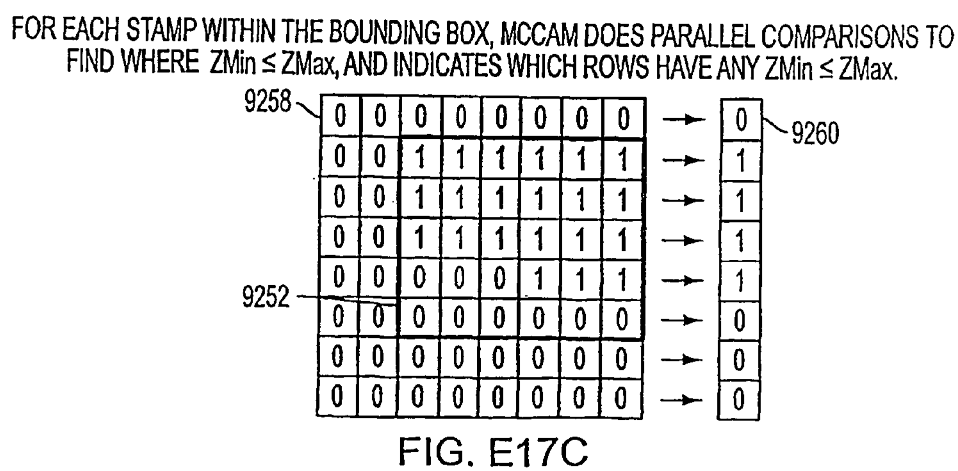
FIG. E17C

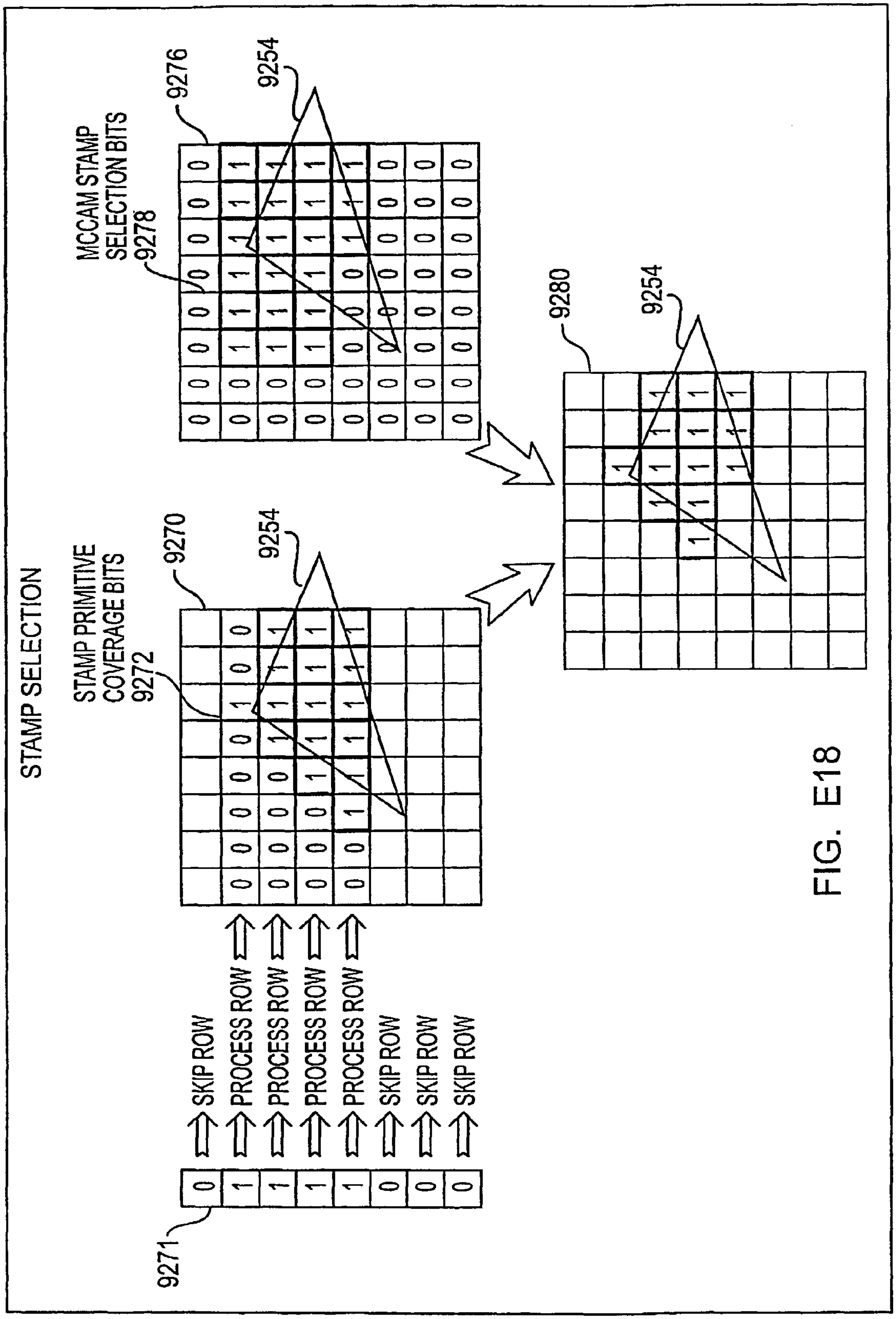
FIG. E18

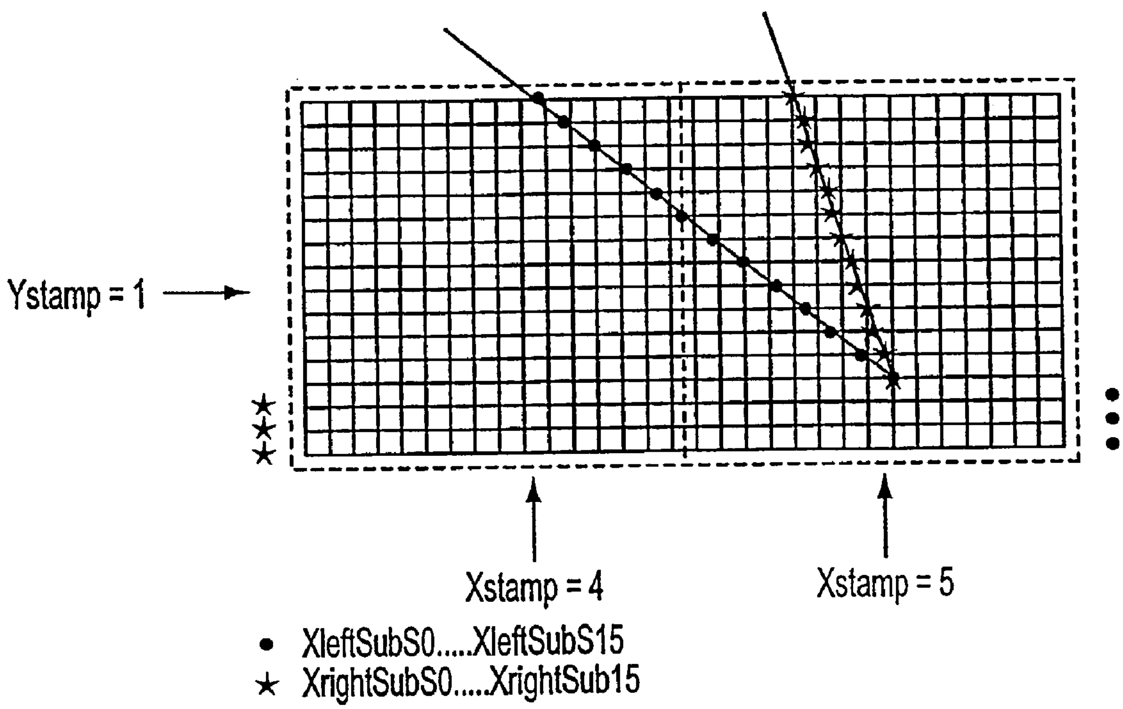
FIG. E19

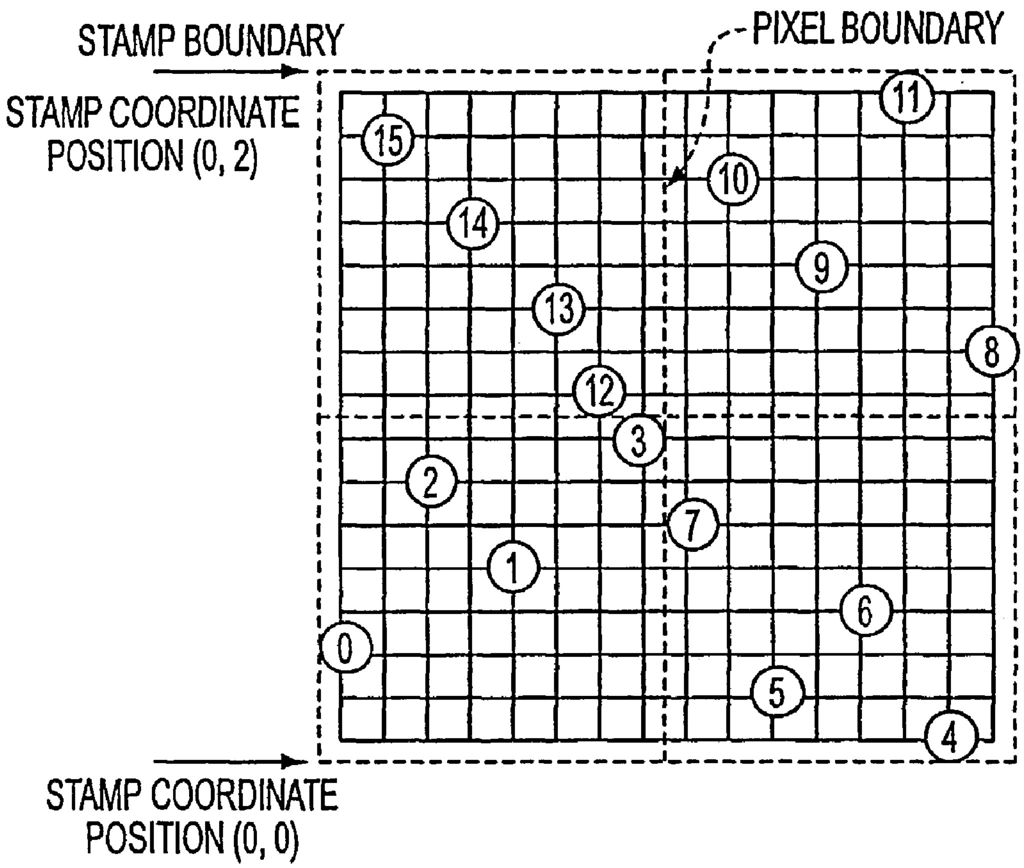
FIG. E20

Z CULL MAINTAINS TWO Z-VALUES FOR EACH SAMPLE, AS WELL AS VARIOUS STATE BITS. Z CULL CONTROLS THE SPM, BUT Z-VALUES AND STATE BITS ARE NOT ASSOCIATED WITH STAMP PORTIONS.

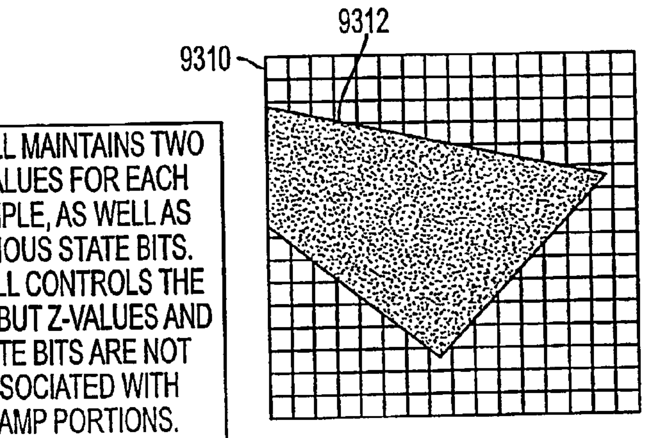

AS THE FIRST PRIMITIVE IN A TILE, Z CULL UPDATES ALL Z-VALUES TOUCHED BY THE PRIMITIVE, AND STORES 35 STAMP PORTIONS INTO SPM.

FIG. E21A

STAMP PORTION MEMORY CAN MAINTAIN 16 SPs PER STAMP, FOR A TOTAL MAXIMUM OF 256 SPs PER TILE.

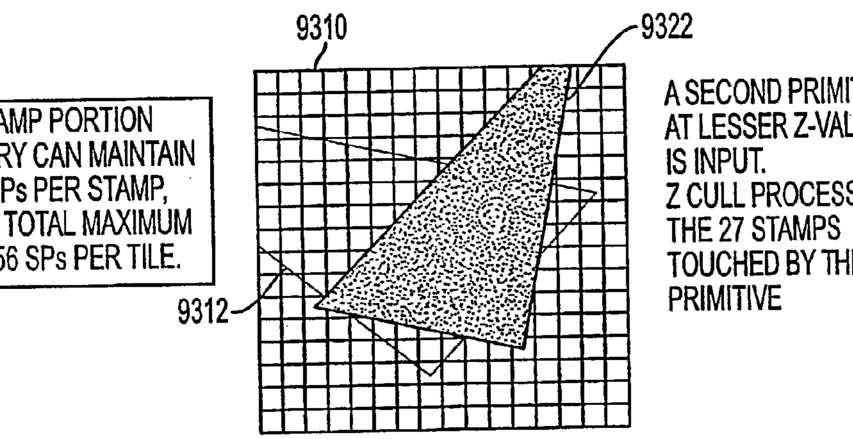

A SECOND PRIMITIVE, AT LESSER Z-VALUES, IS INPUT. Z CULL PROCESSES THE 27 STAMPS TOUCHED BY THE PRIMITIVE

FIG. E21B

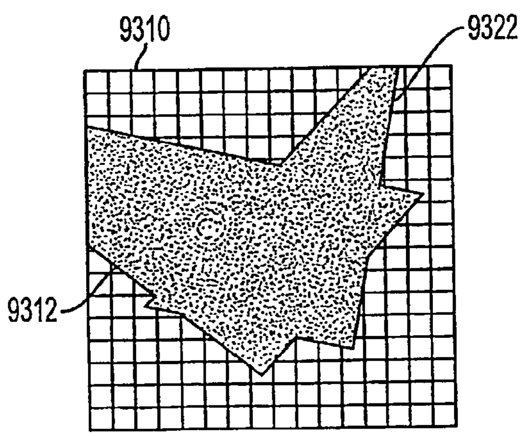

FIG. E21C

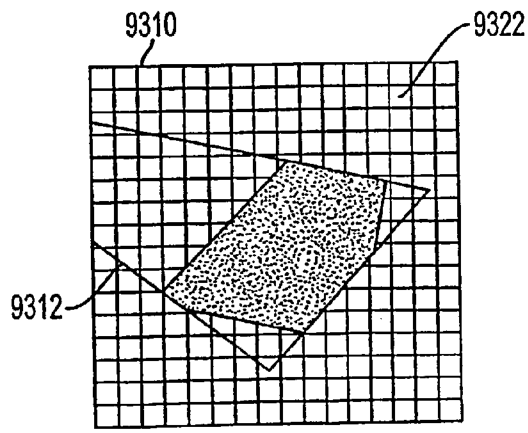

FIG. E21D

STAMP EXAMPLE 1
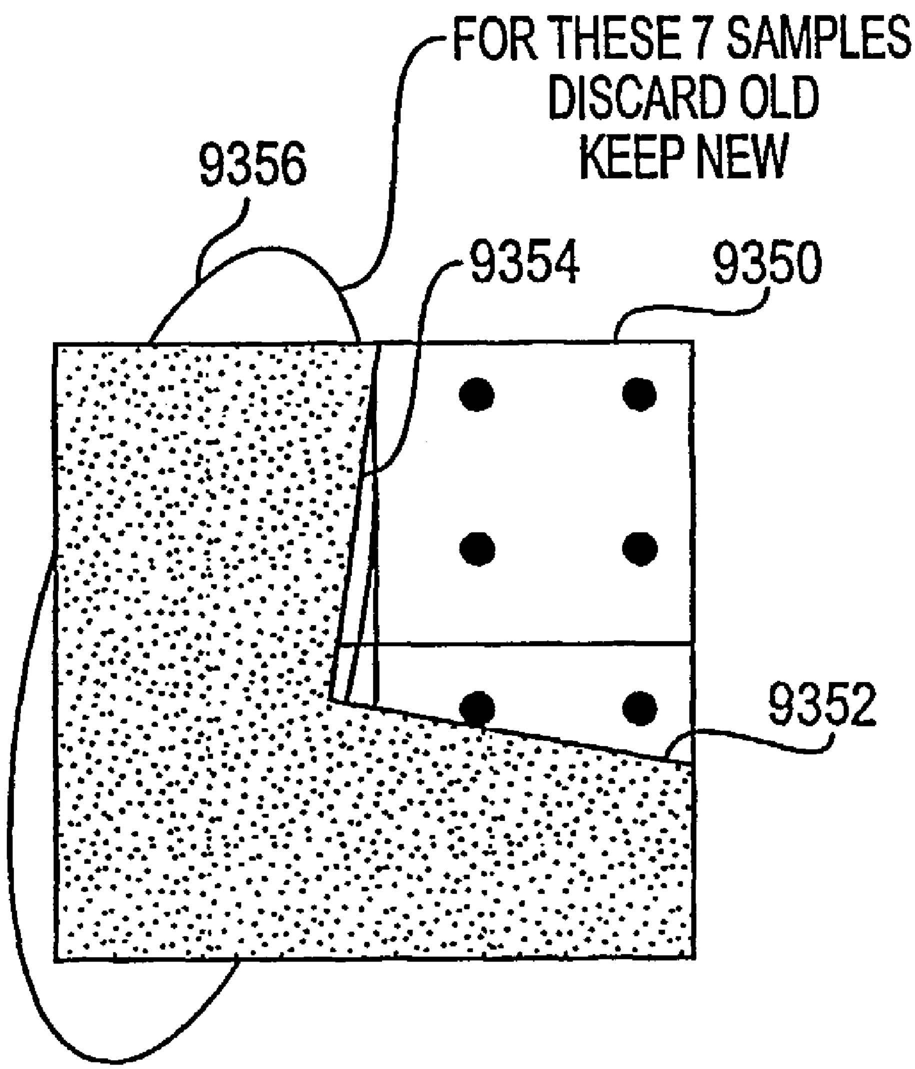
FIG. E22

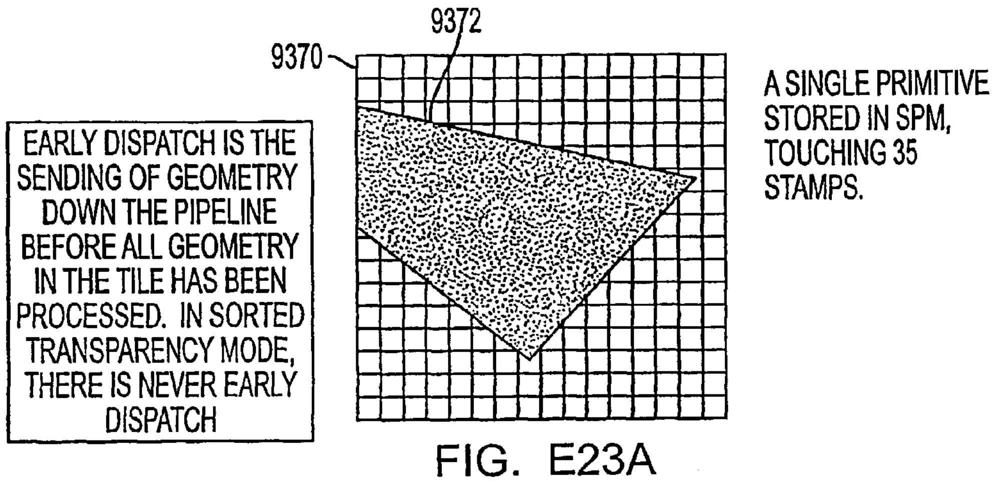
FIG. E23A
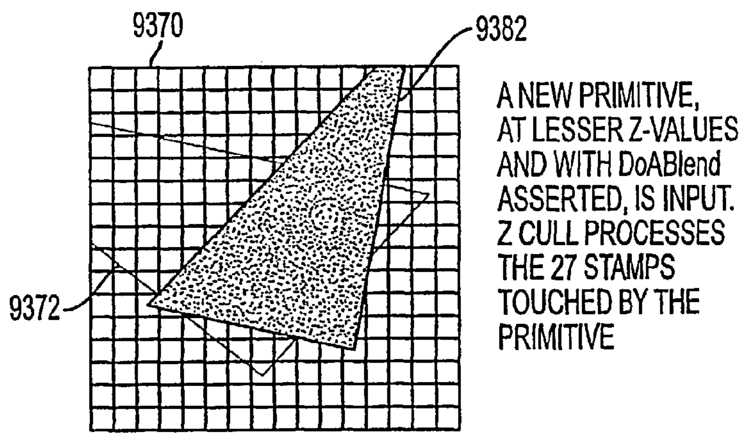
FIG. E23B
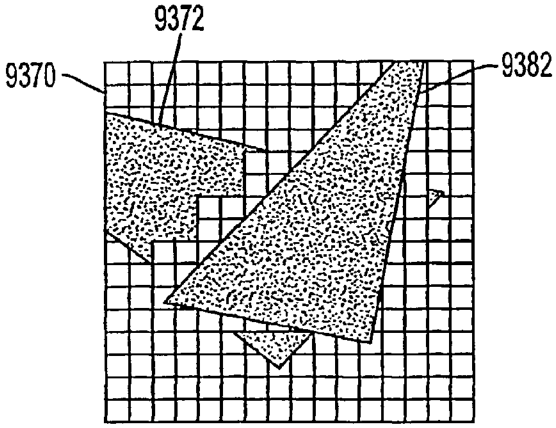
FIG. E23C
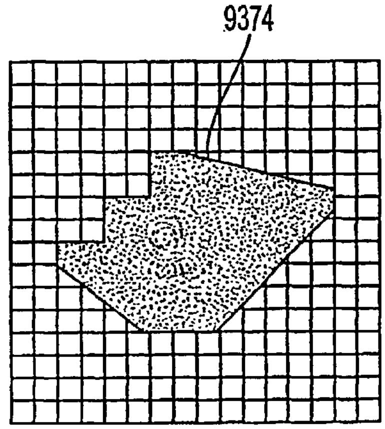
FIG. E23D STAMP EXAMPLE 2
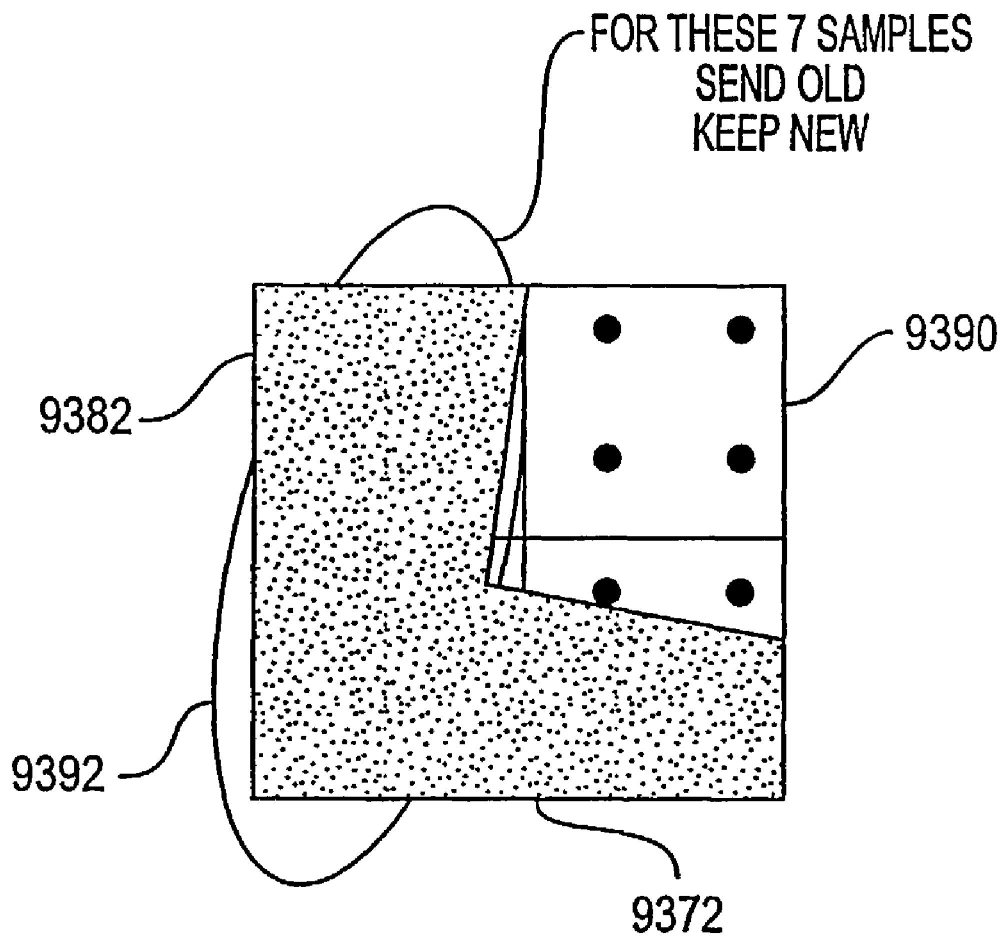
FIG. E24

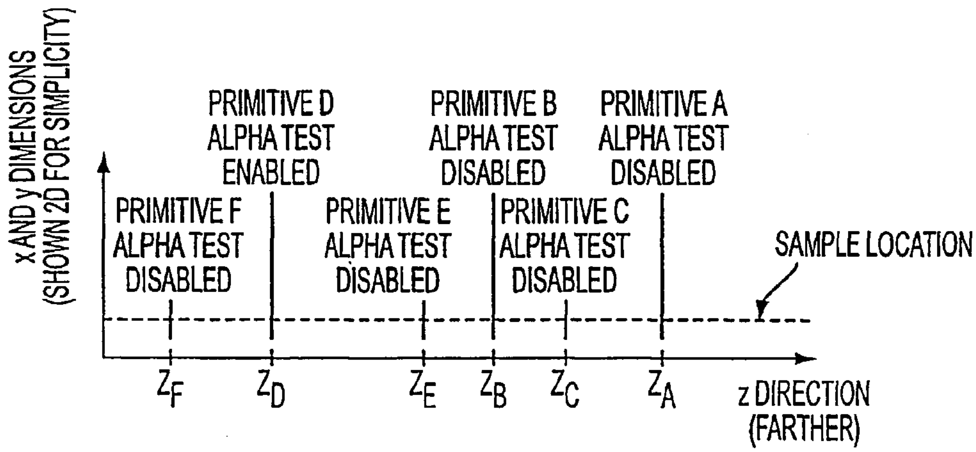
FIG. E25
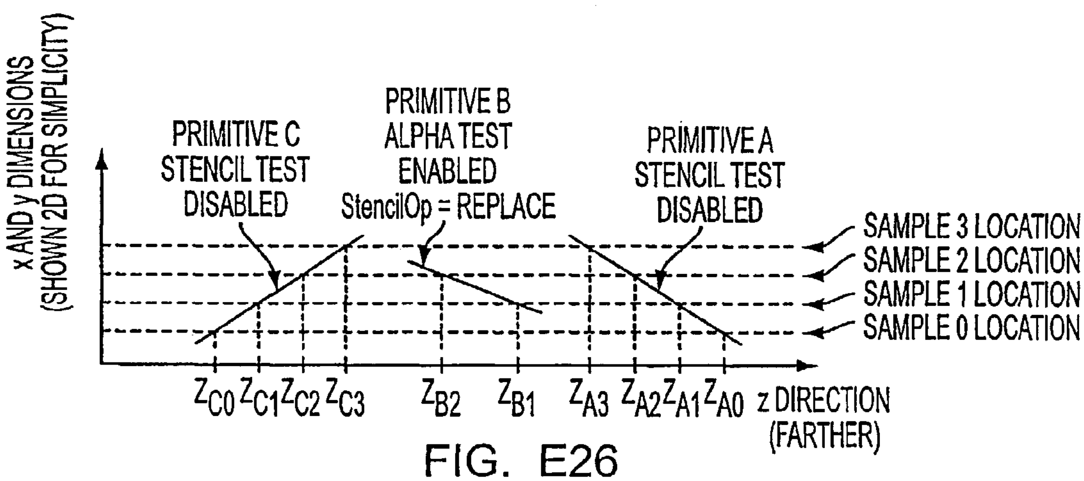
FIG. E26
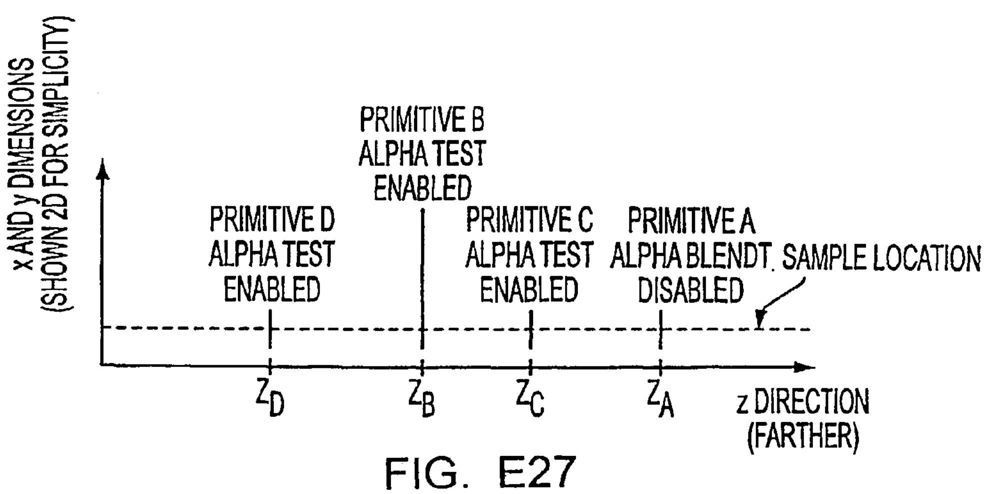
FIG. E27

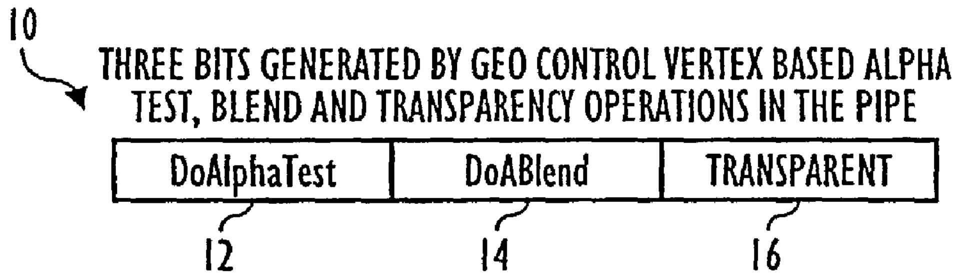
FIG. E28A
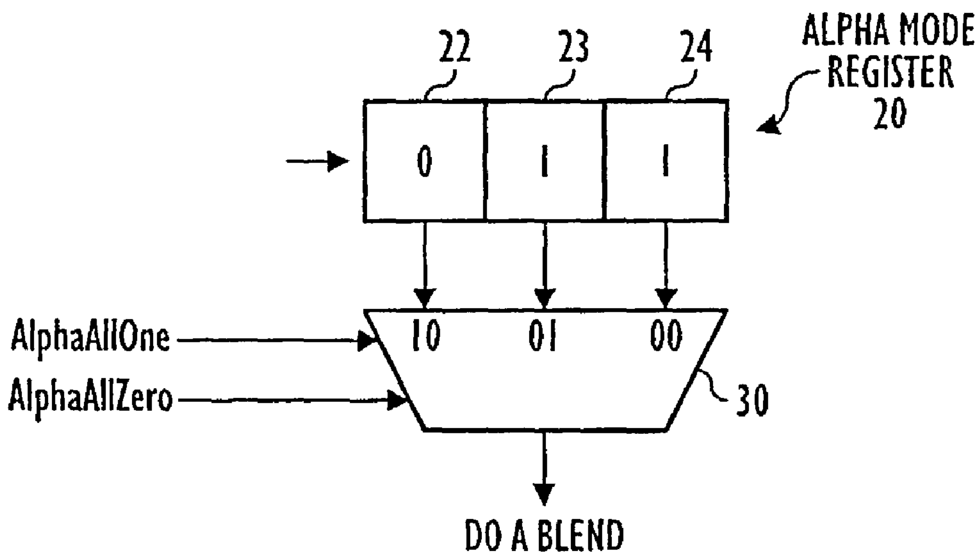
FIG. E28B

SORTED TRANSPARENCY MODE 7.1.1 STORE Z VALUES FOR THE FRONT MOST OPAQUE PRIMITIVE SAMPLES
7.1.2 SET THE FRONT MOST OPAQUE PRIMITIVE SAMPLES' Z VALUES TO BE Zfar VALUES
7.1.3 DISPATCH THE FRONT MOST OPAQUE PRIMITIVE SAMPLES DOWN THE PIPELINE TO BE RENDERED.
7.1.4 SET Znear TO ZERO.
7.1.5 START NEXT PASS
7.1.6 IDENTIFY SAMPLES WITH GREATEST Z VALUES THAT ARE LESS THAN Zfar, DEFINE AS THE NEW Znear VALUES, AND STORE THE CORRESPONDING SAMPLES.
7.1.7 DISPATCH SAMPLES CORRESPONDING TO THE NEW Znear VALUES
7.1.8 SET Zfar TO THE VALUE OF Znear.
7.1.9 [GOTO START NEXT PASS (4)].

FIG. E29

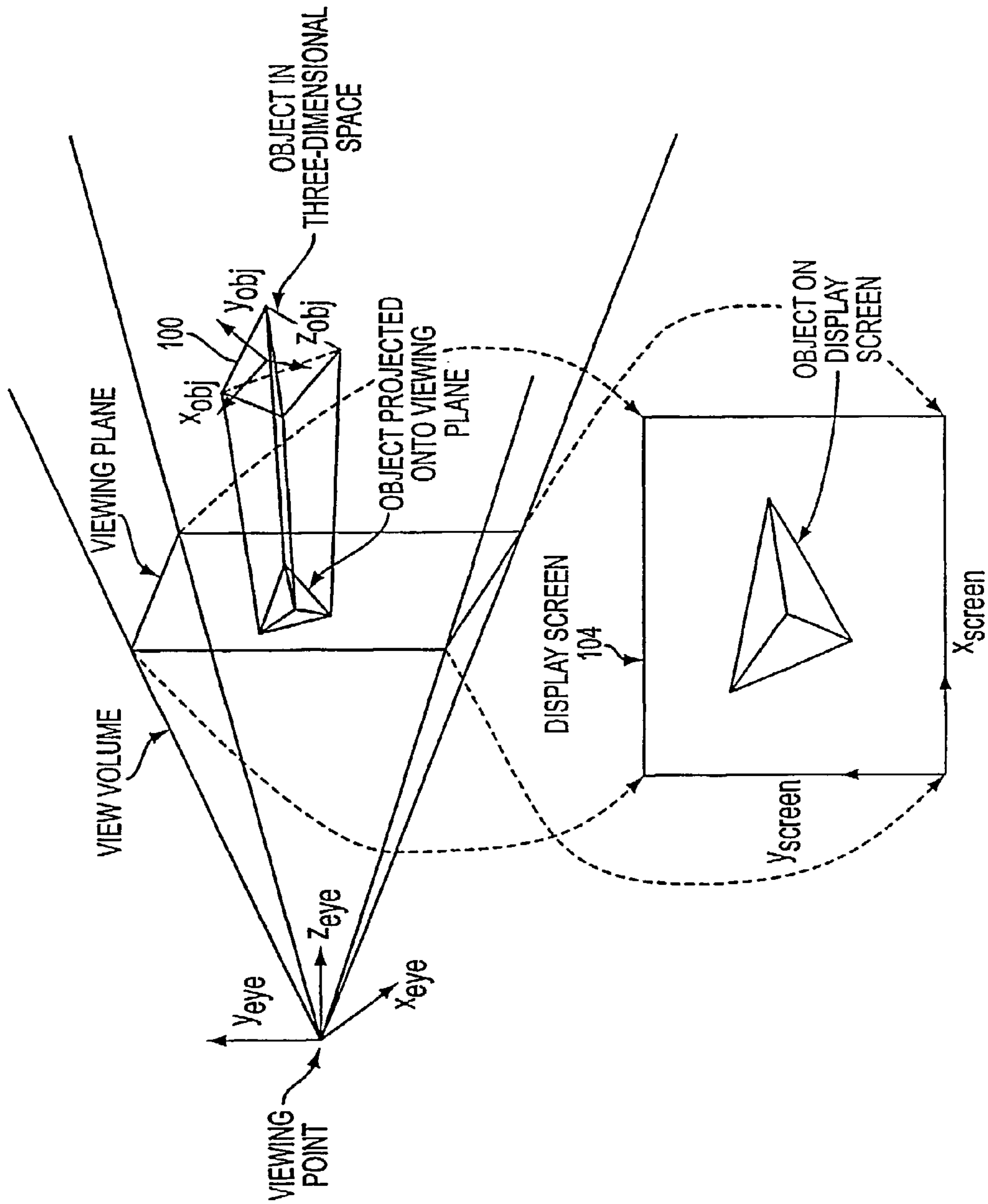
FIG. F1

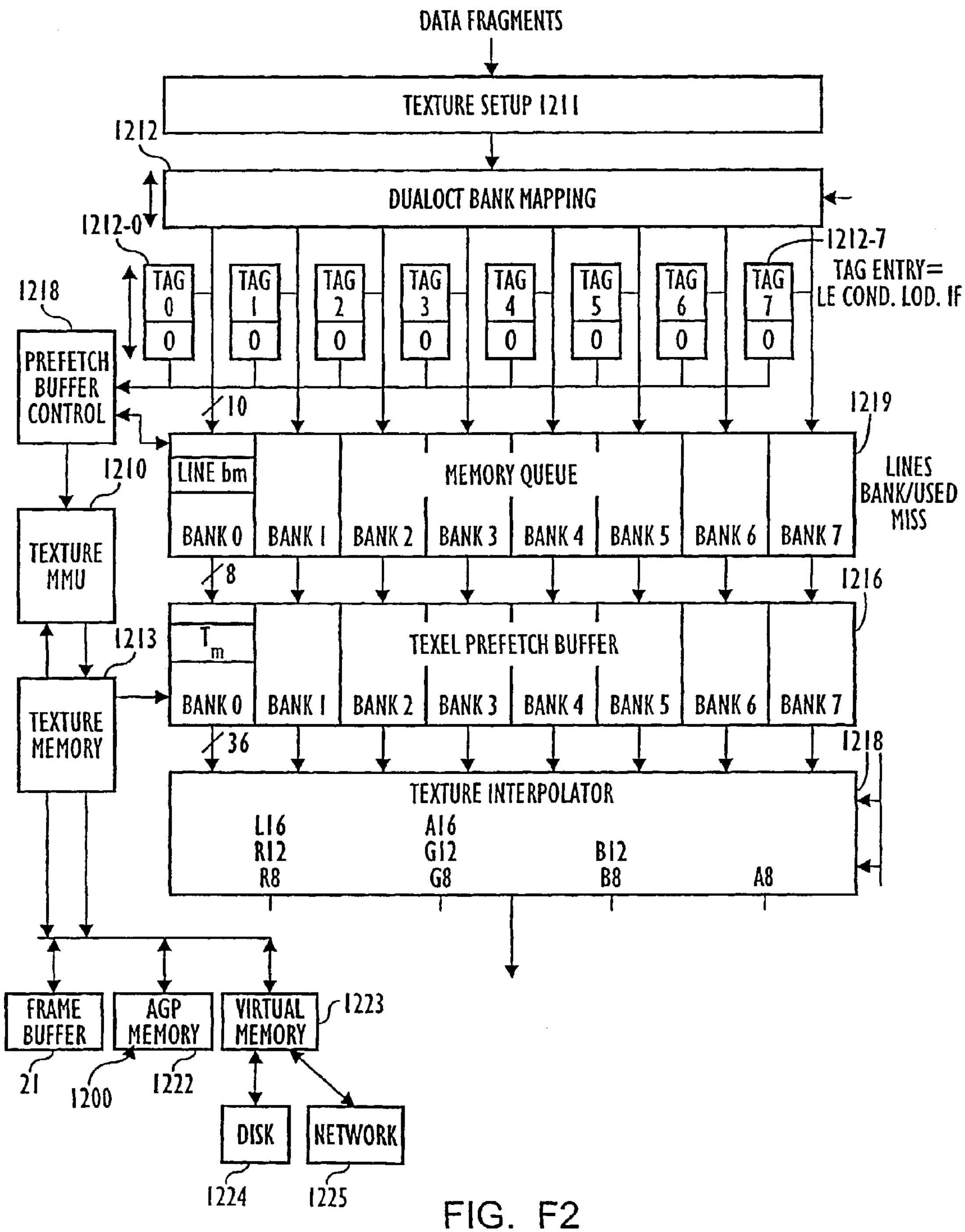
FIG. F2

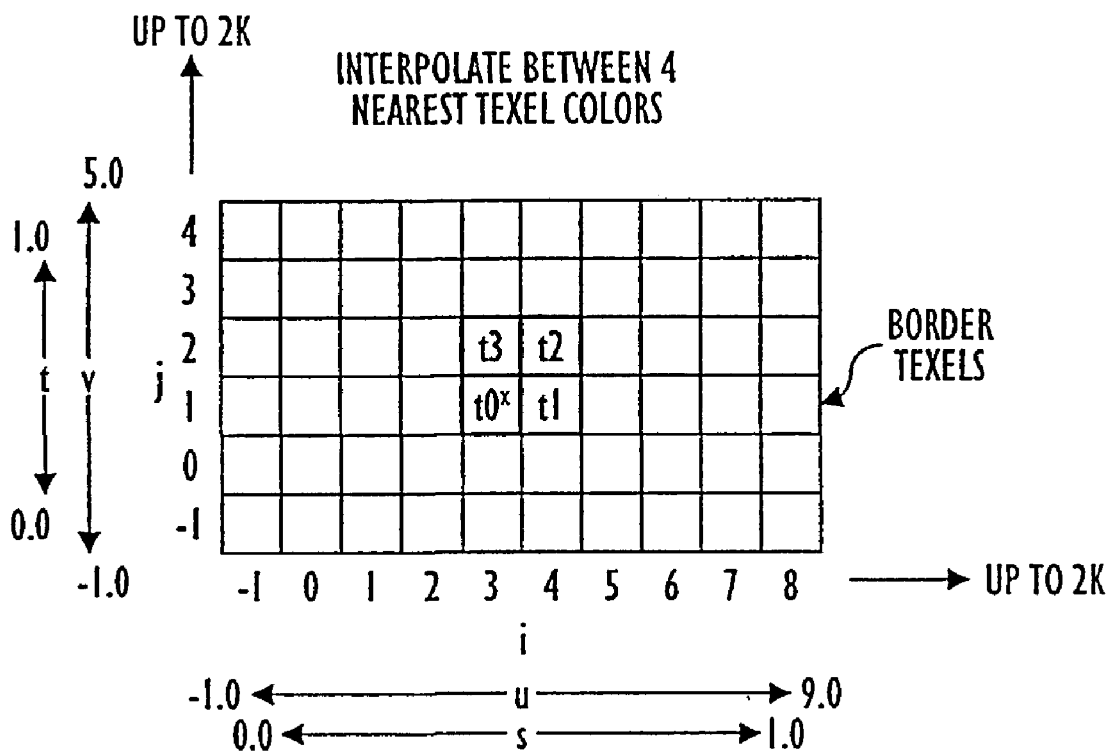
FIG. F3

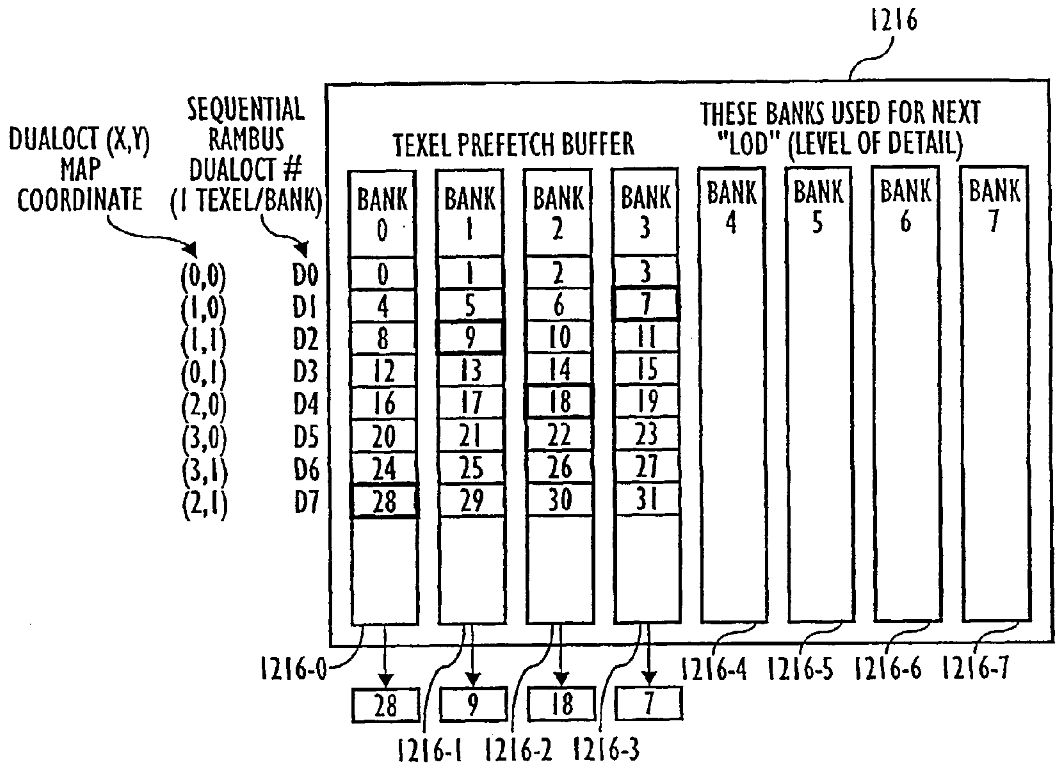
FIG. F4A
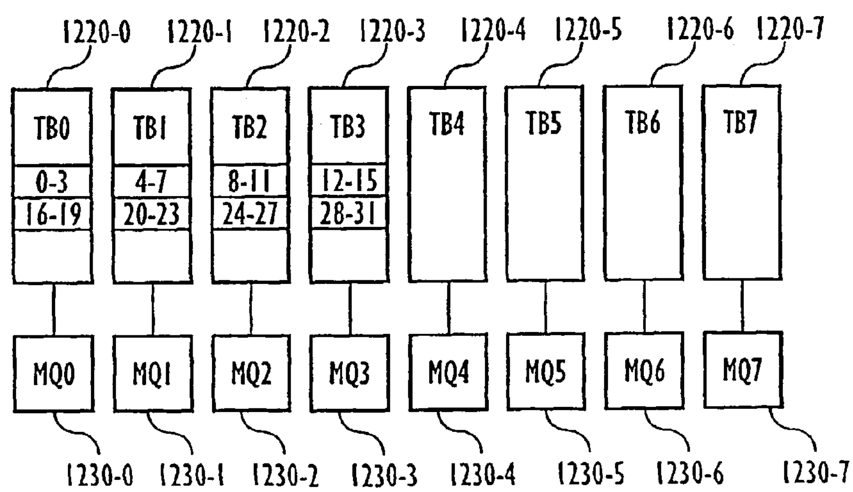
FIG. F4B

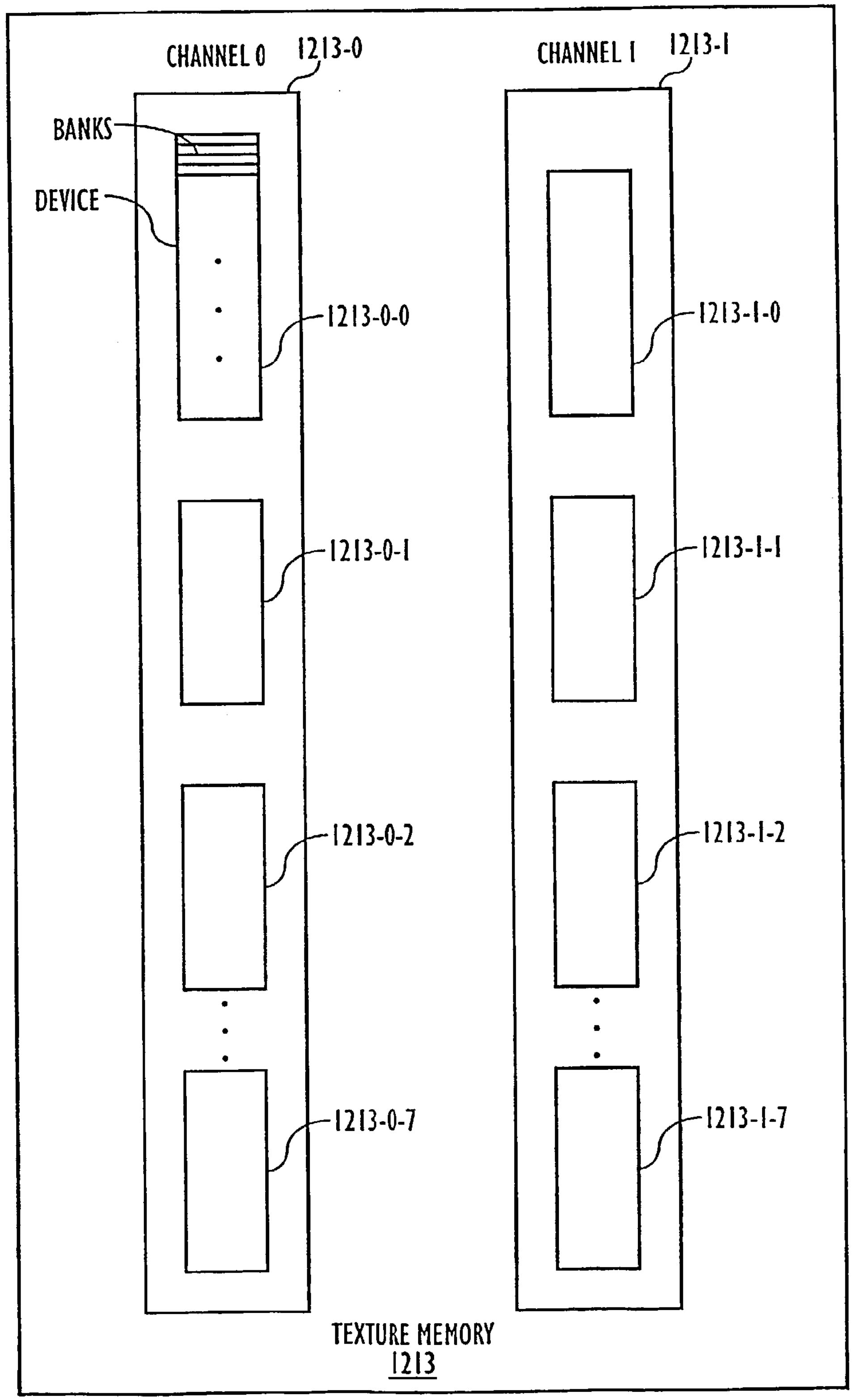
FIG. F5

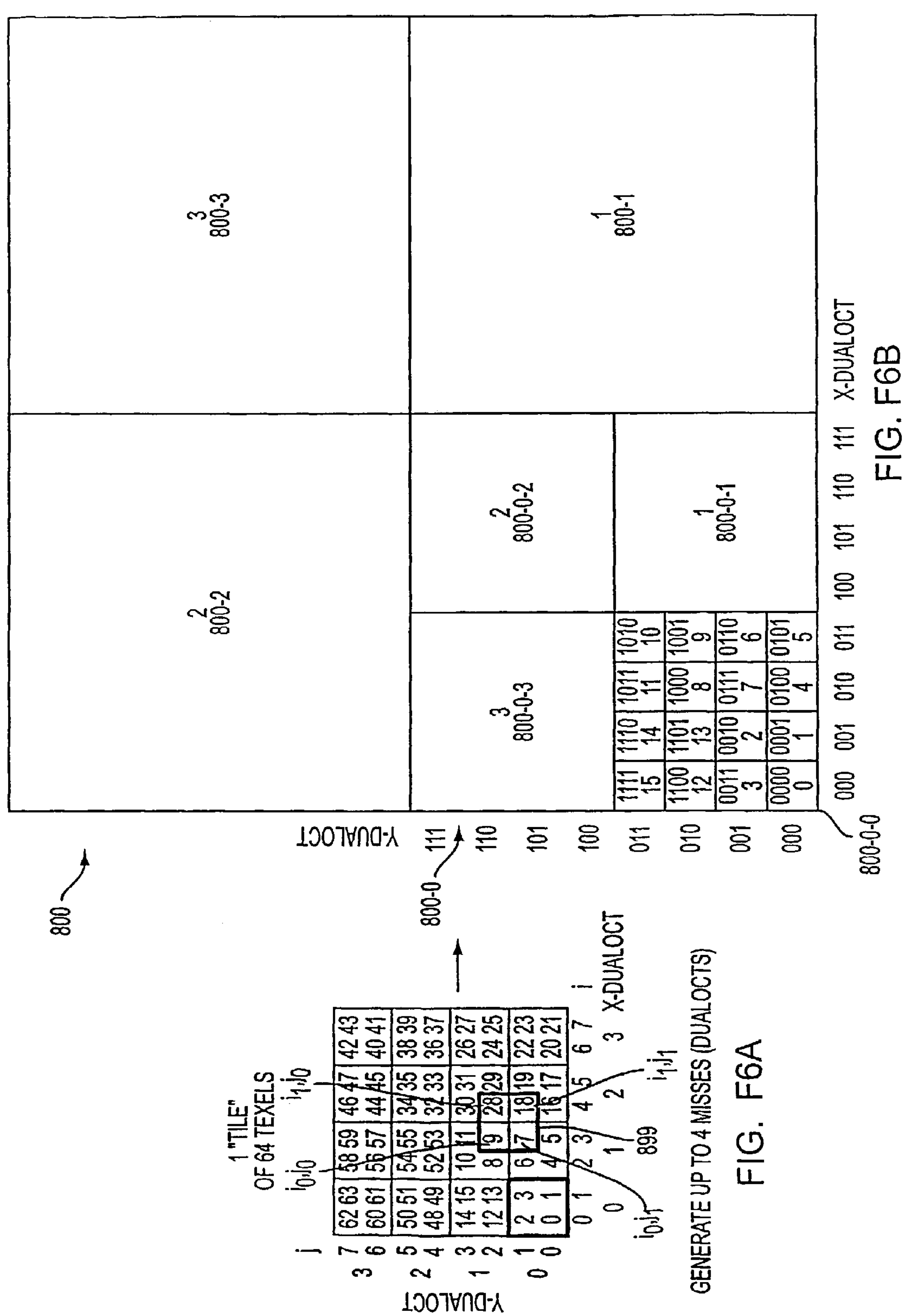
FIG. F6A
FIG. F6B

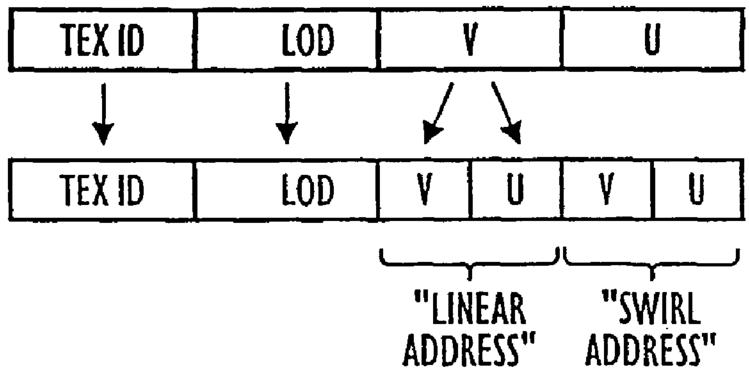
FIG. F6C
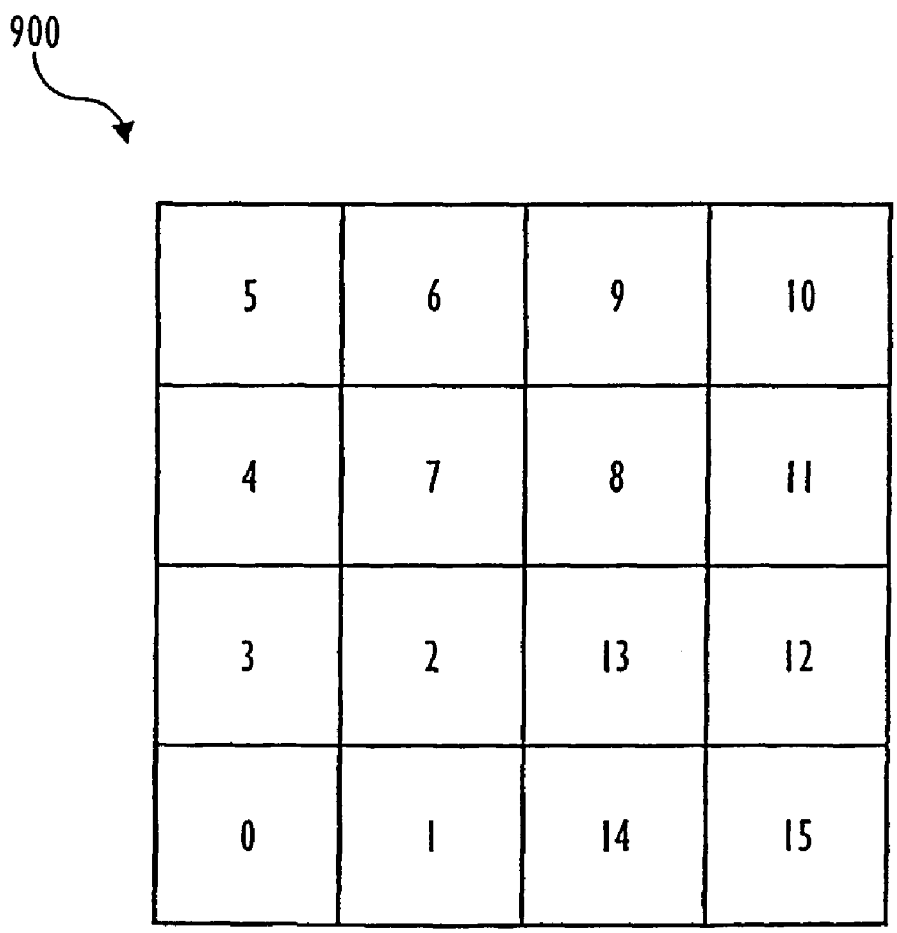
FIG. F7

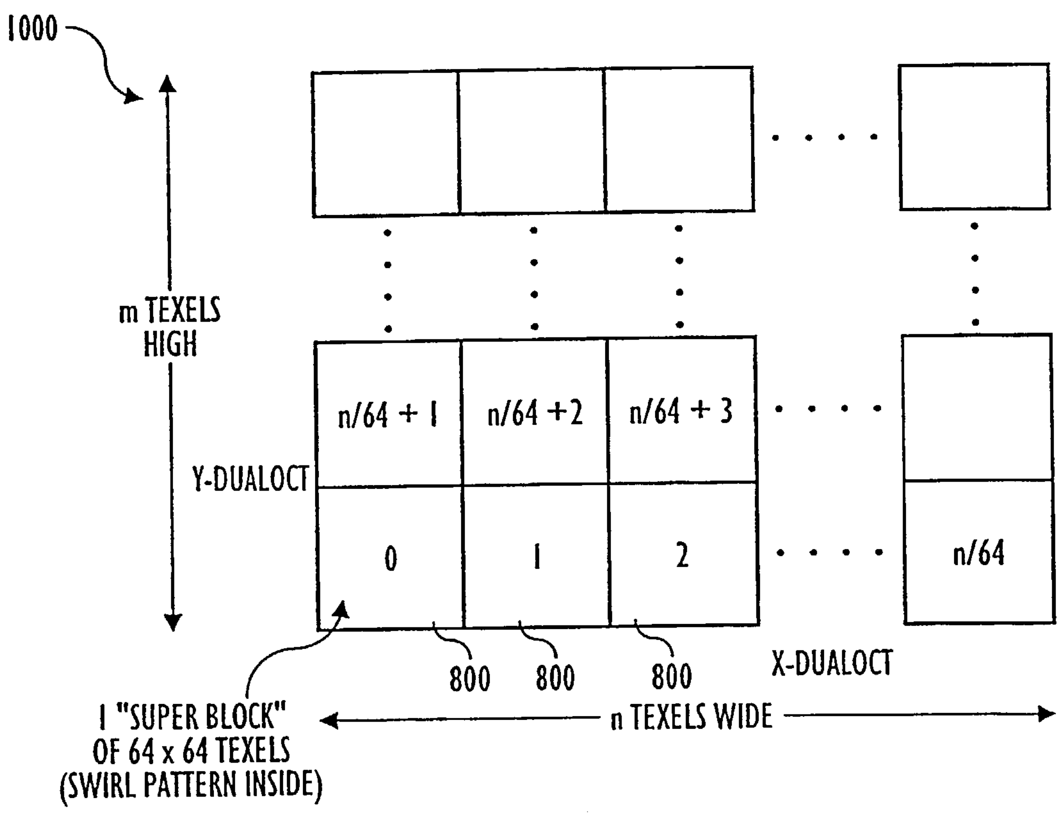
FIG. F8

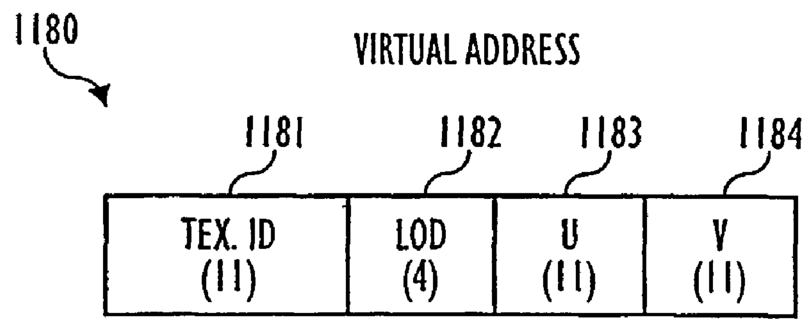
FIG. F9
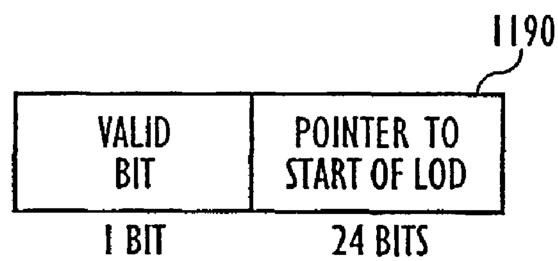
FIG. F10
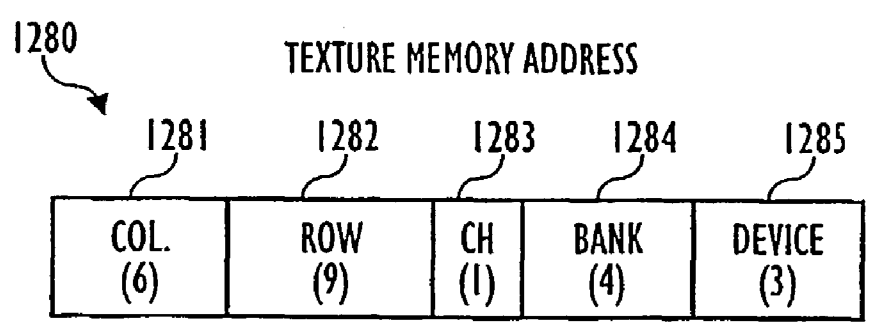
FIG. F11

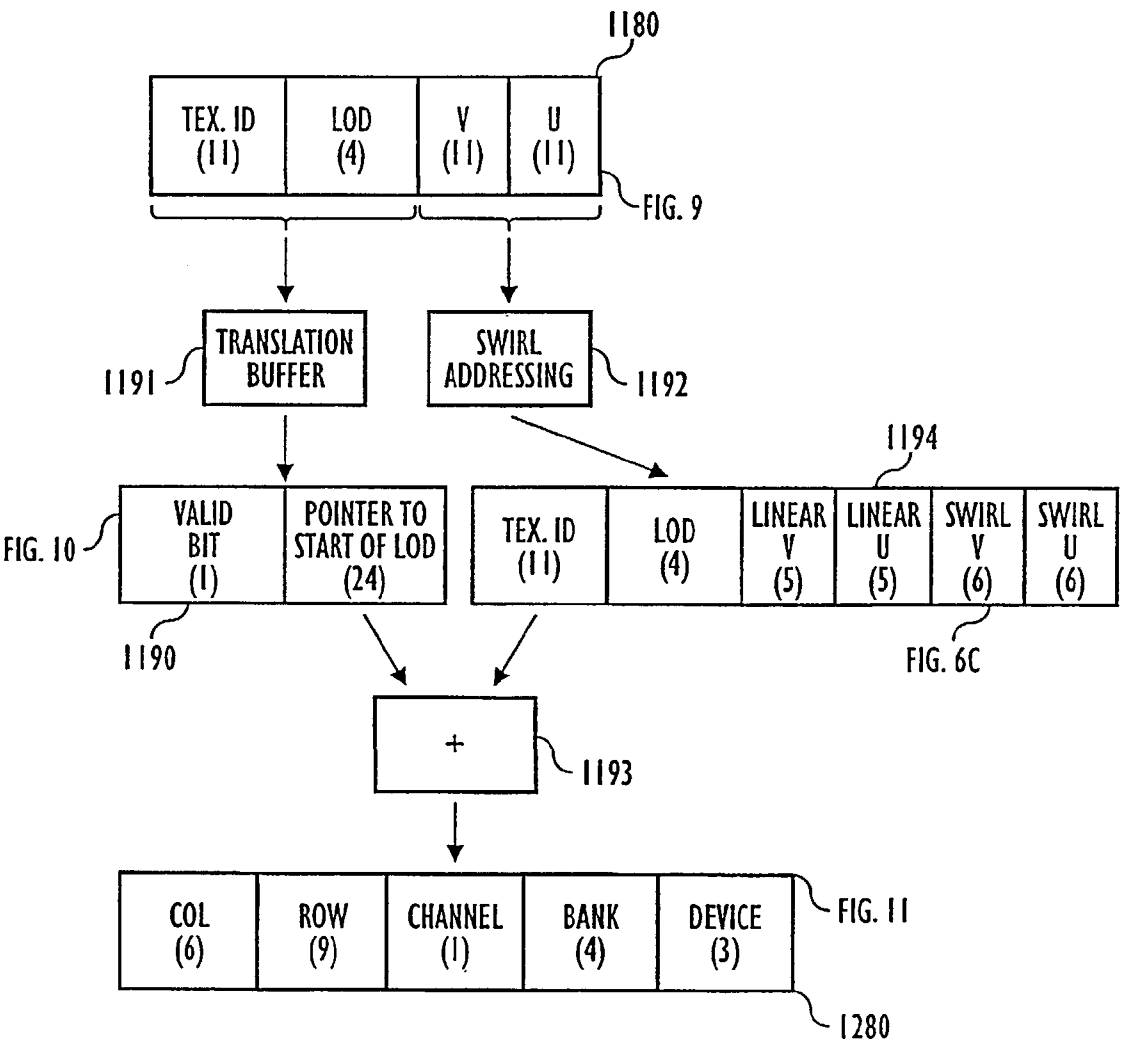
FIG. F12

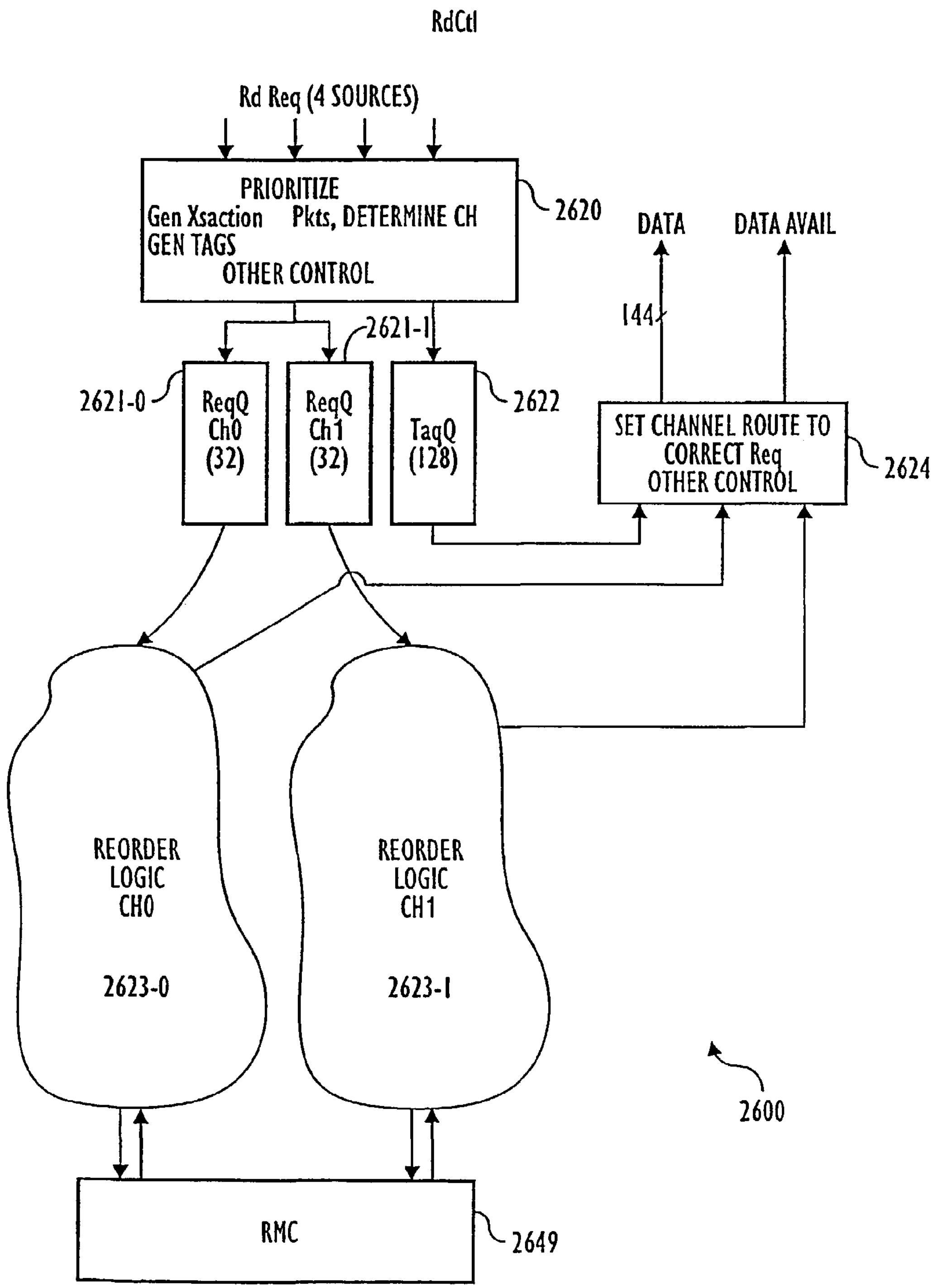
FIG. F13A

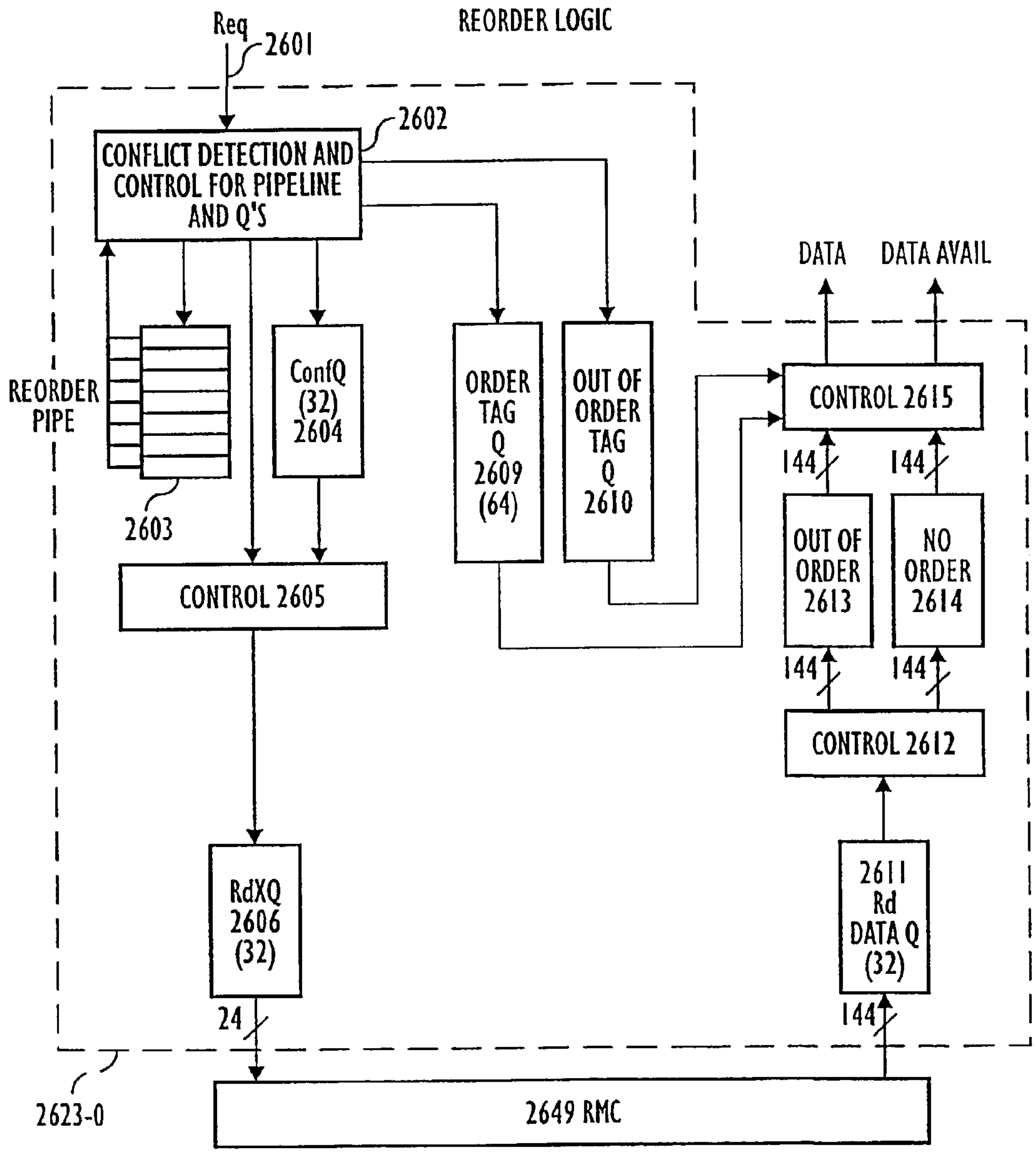
FIG. F13B

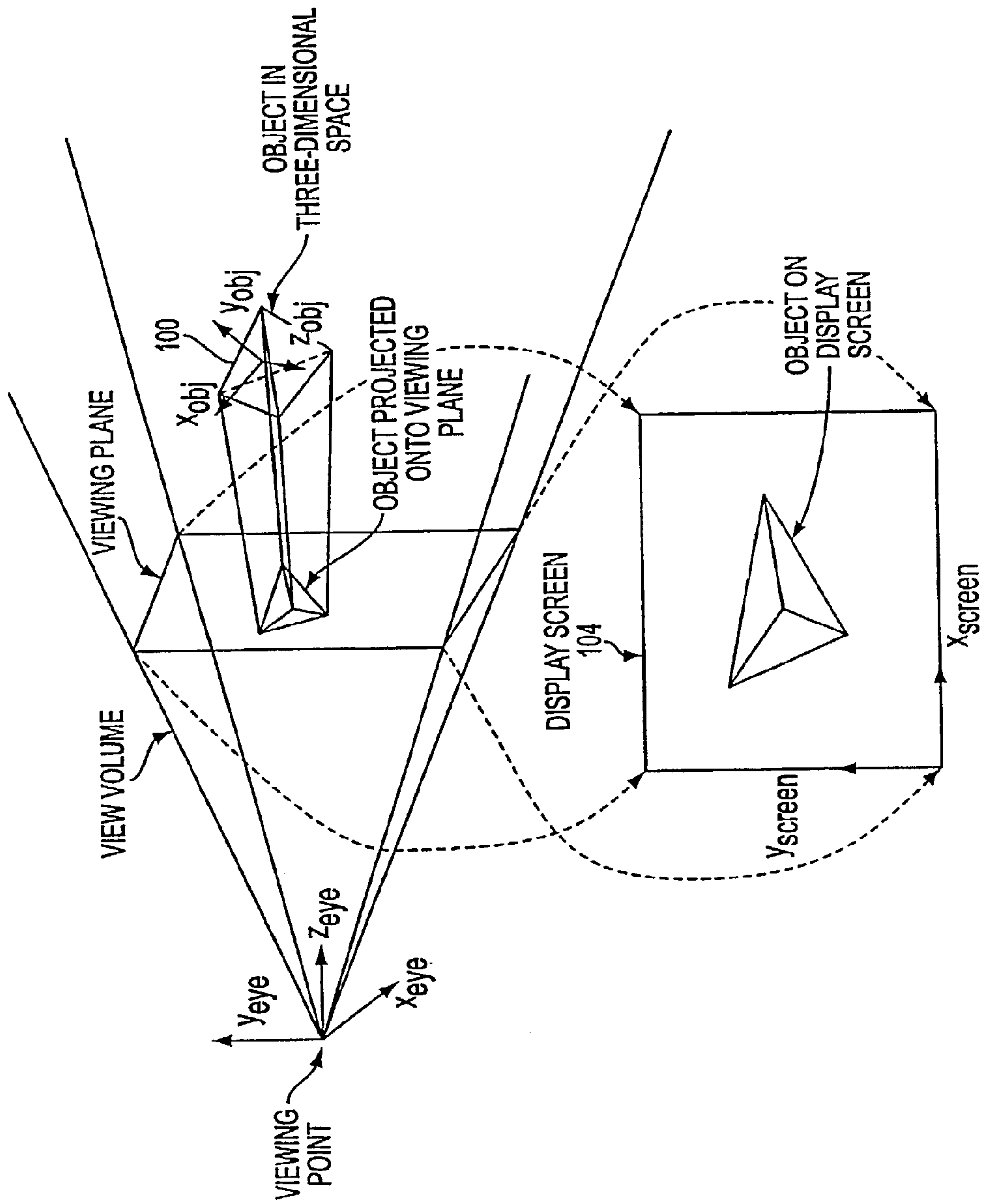
FIG. G1

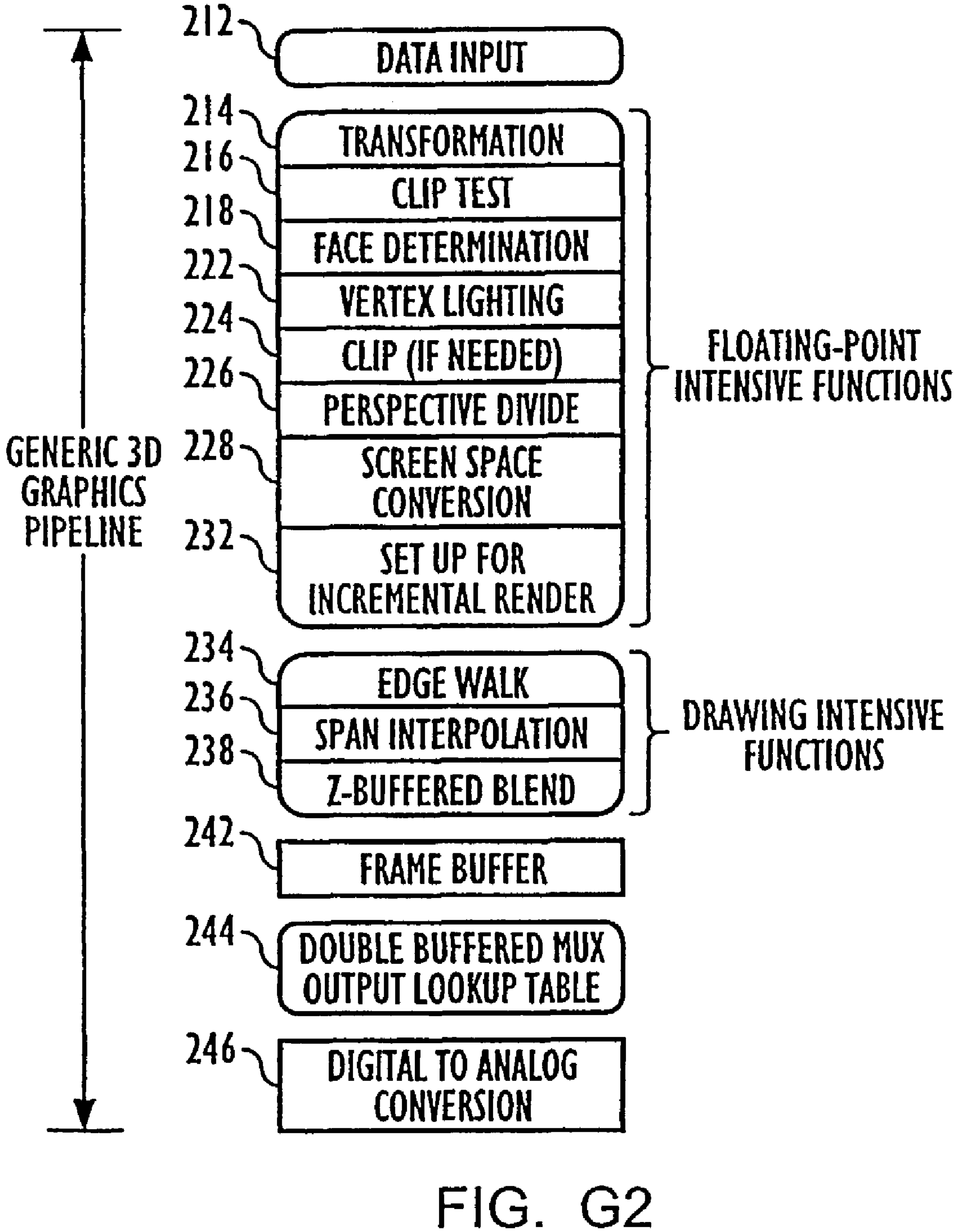
FIG. G2
(PRIOR ART)

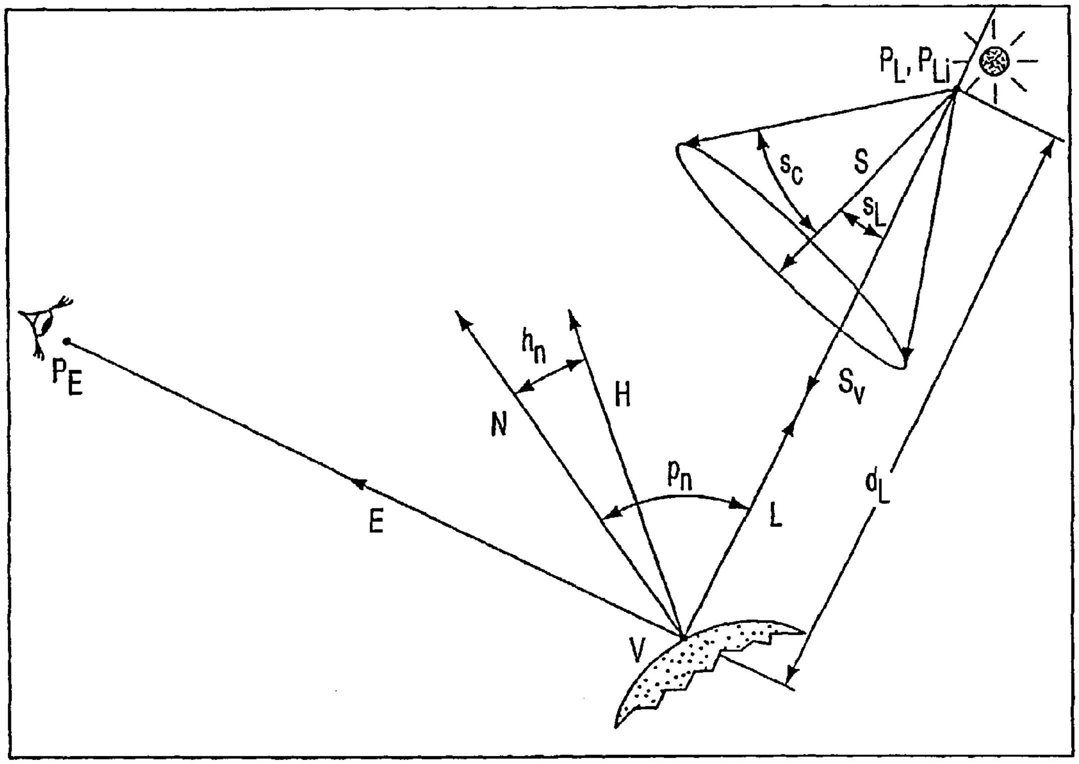
FIG. G3
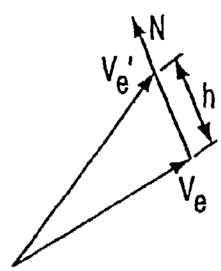
FIG. G4

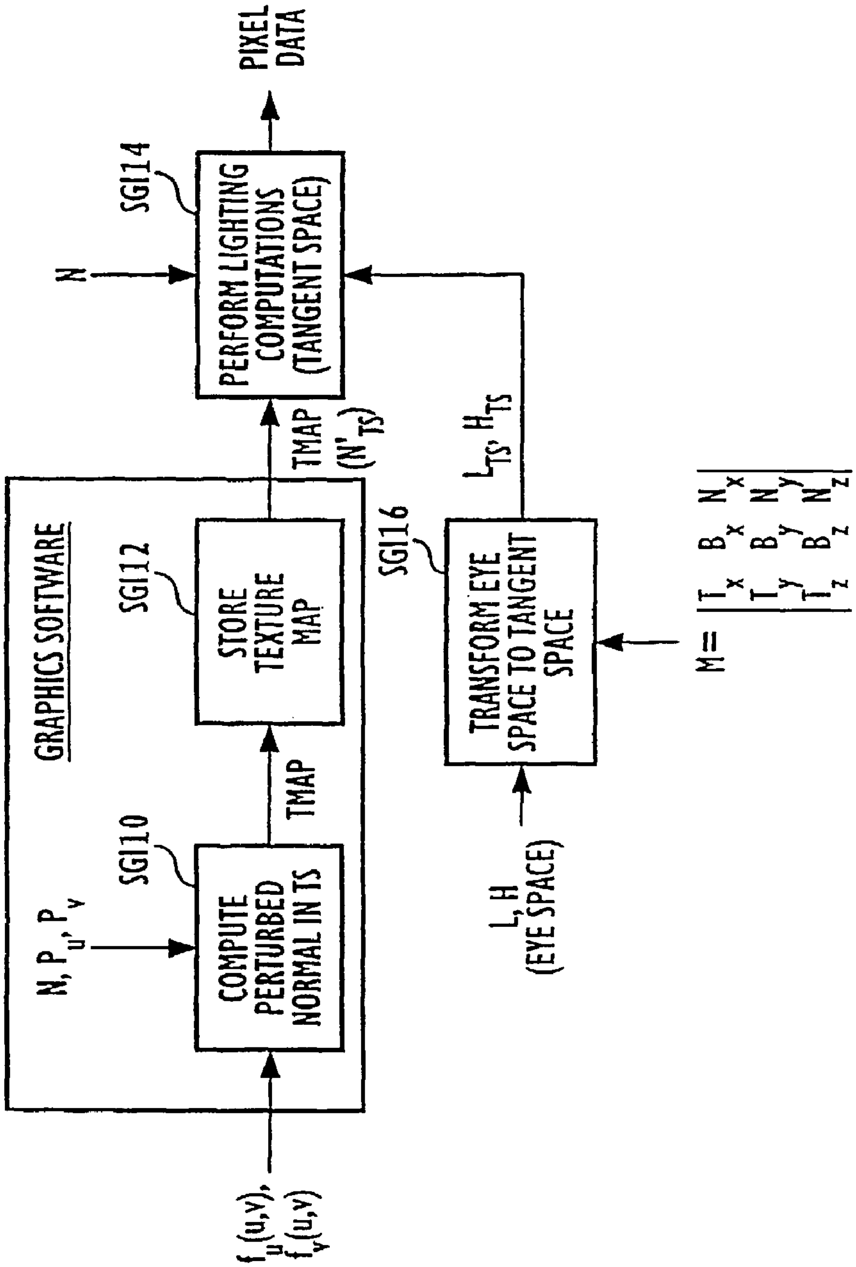
FIG. G5A
(PRIOR ART)

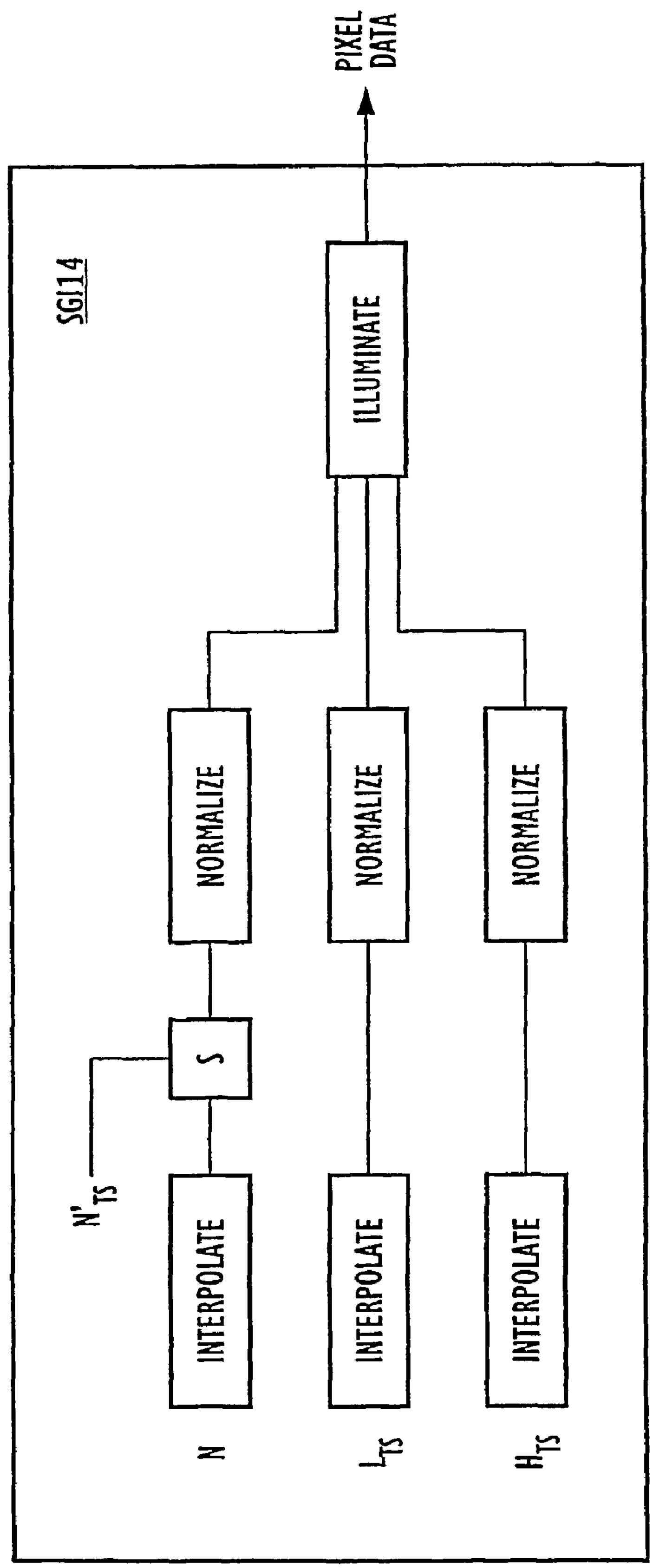
FIG. G5B
(PRIOR ART)

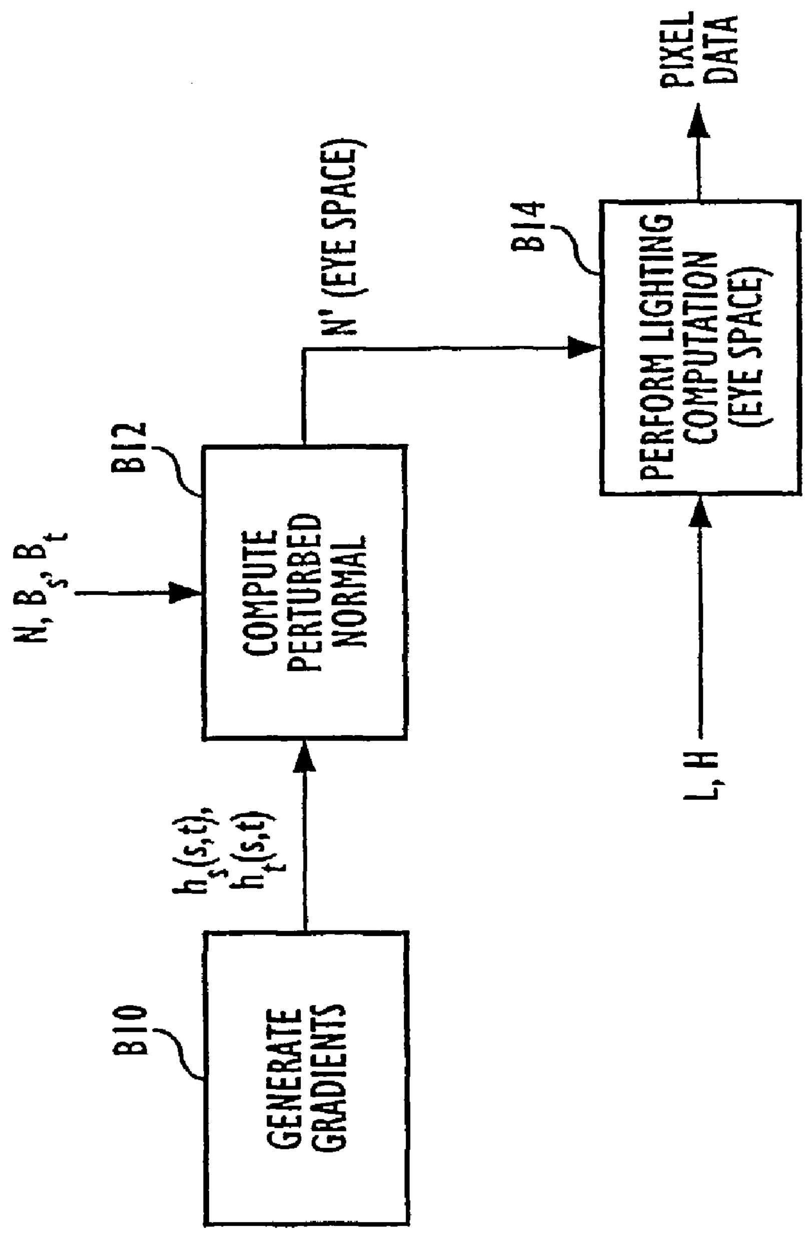
FIG. G6A
(PRIOR ART)

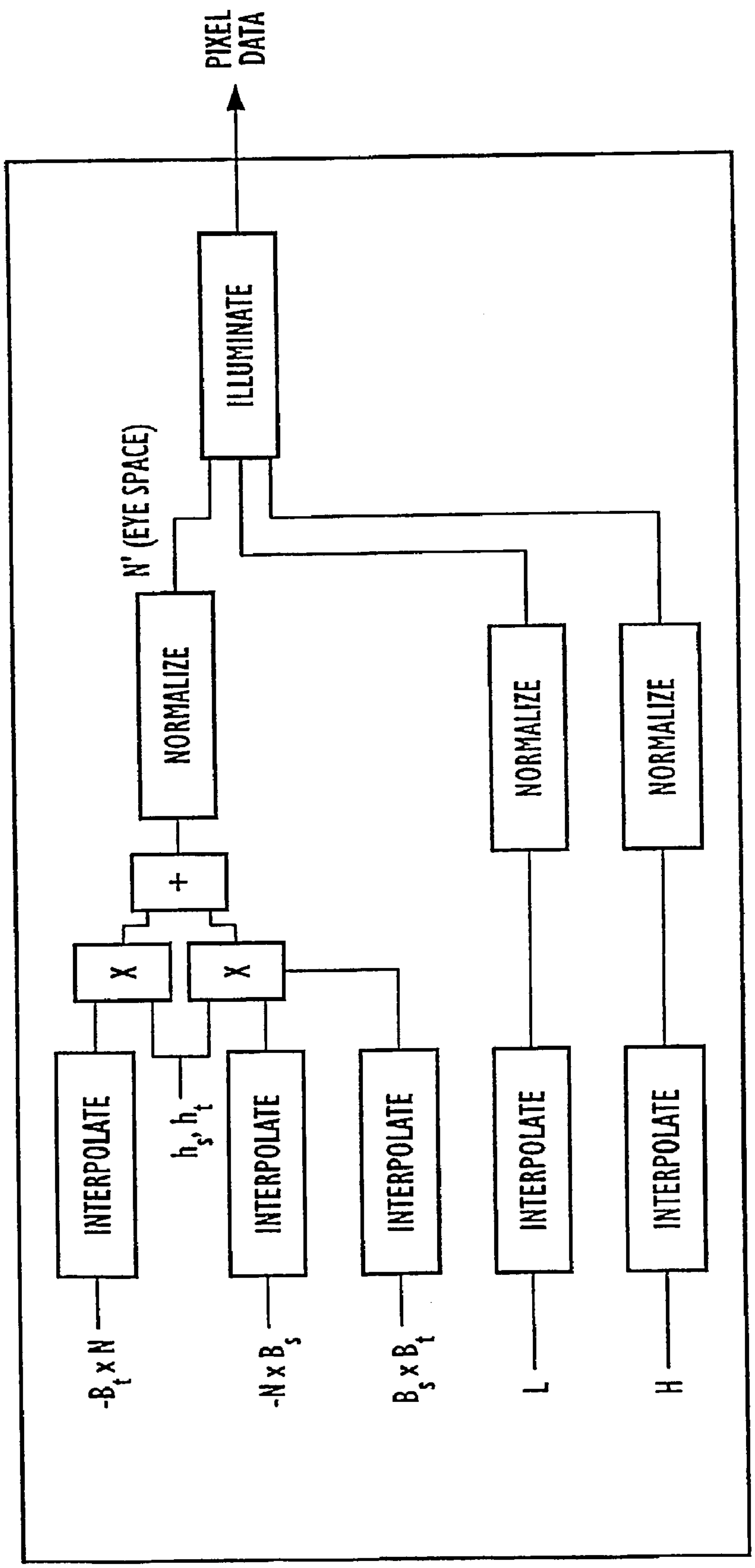
FIG. G6B
(PRIOR ART)

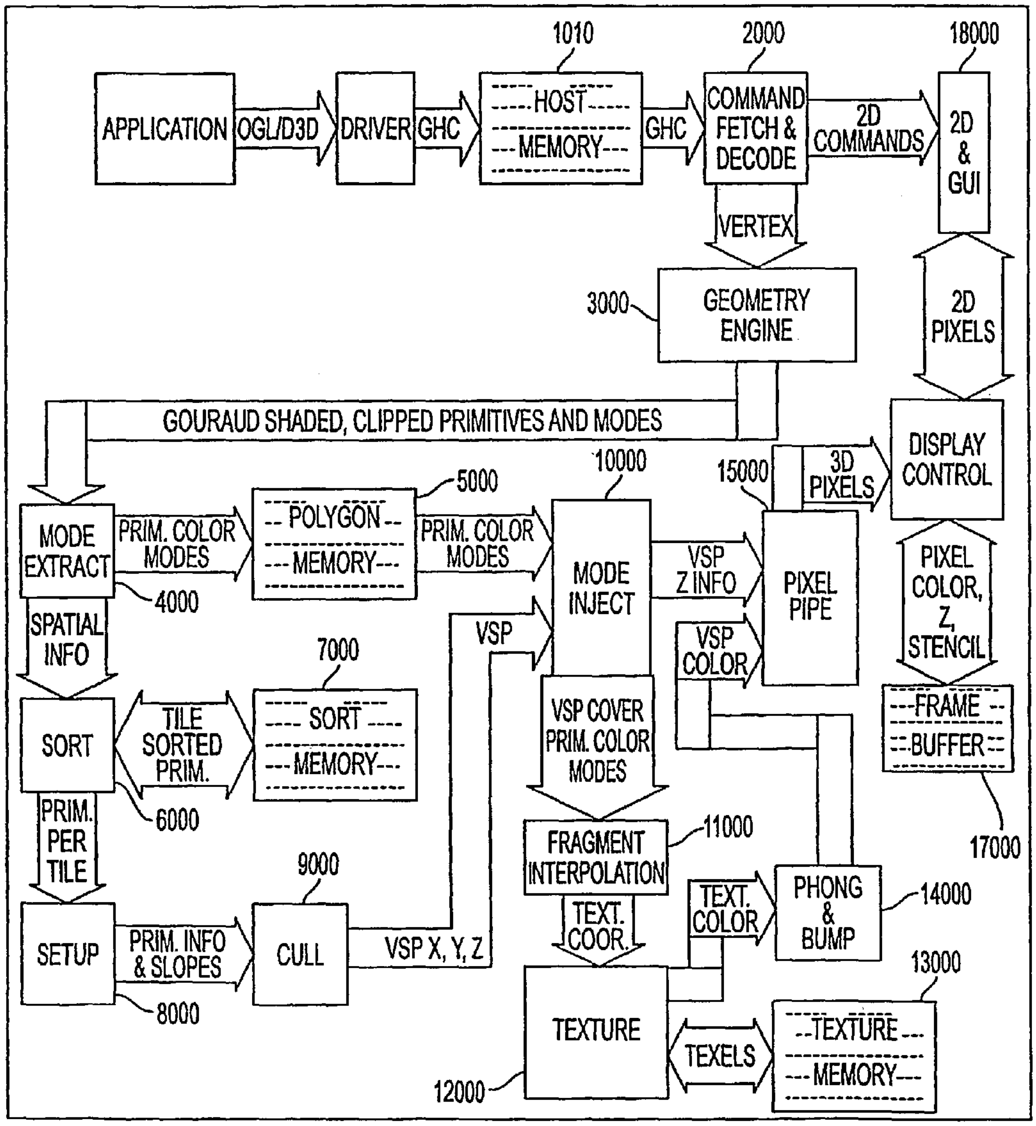
FIG. G7

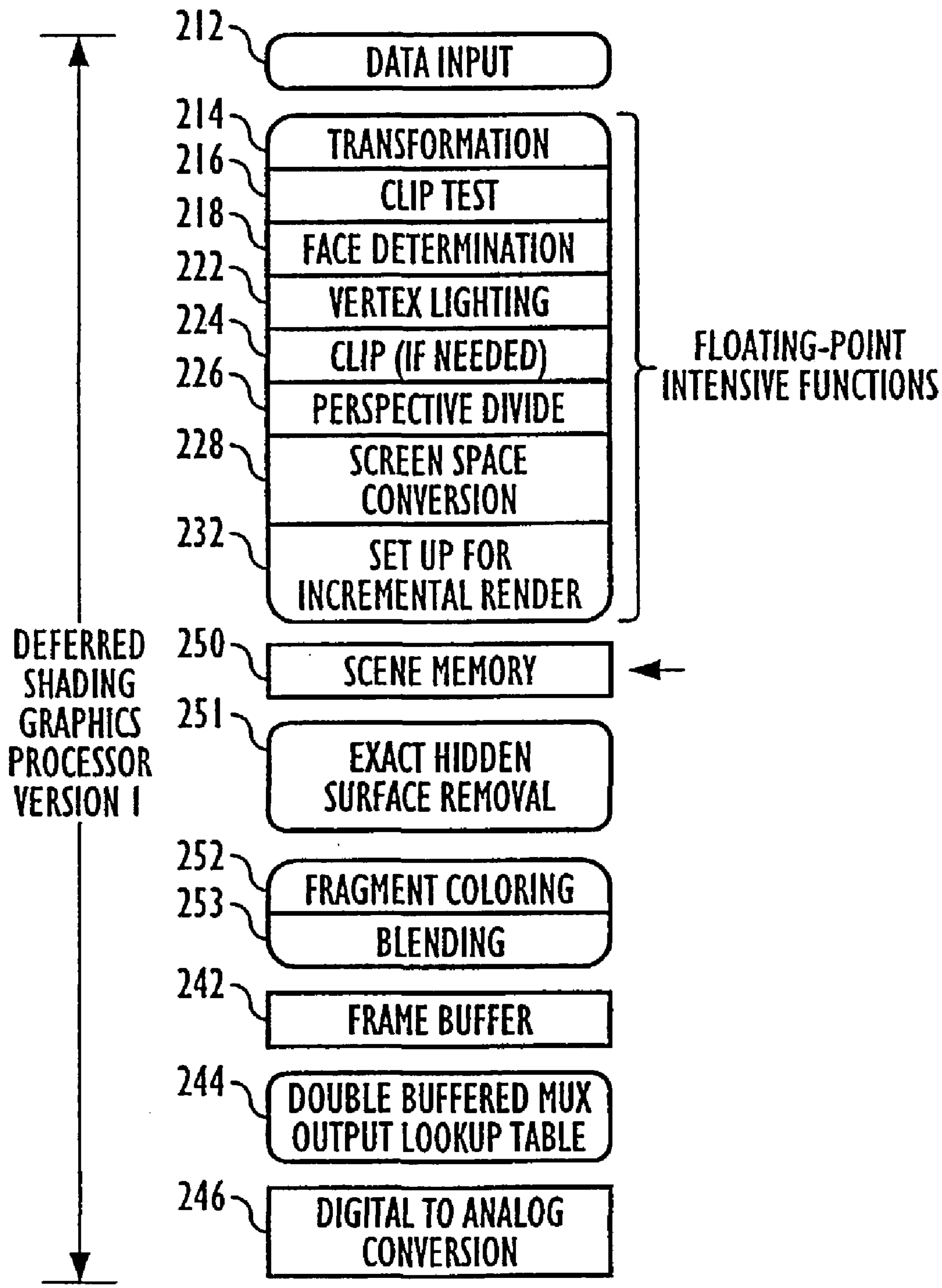
FIG. G8

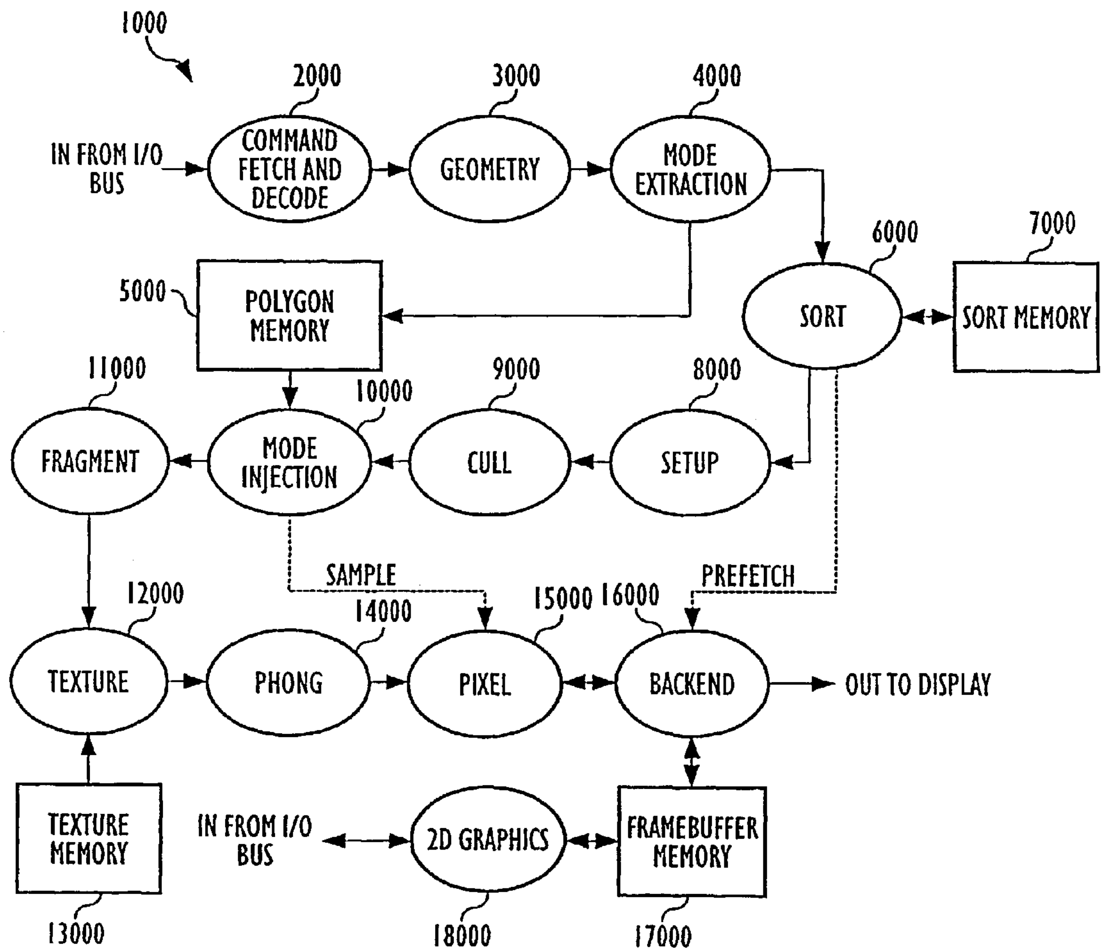
FIG. G9

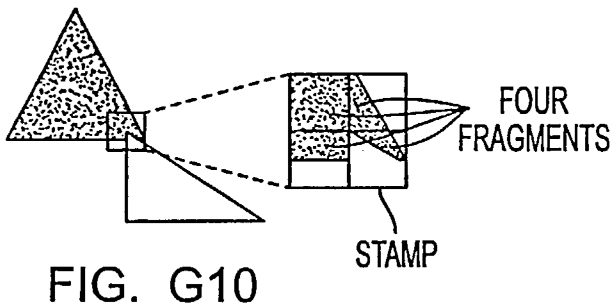
FIG. G10
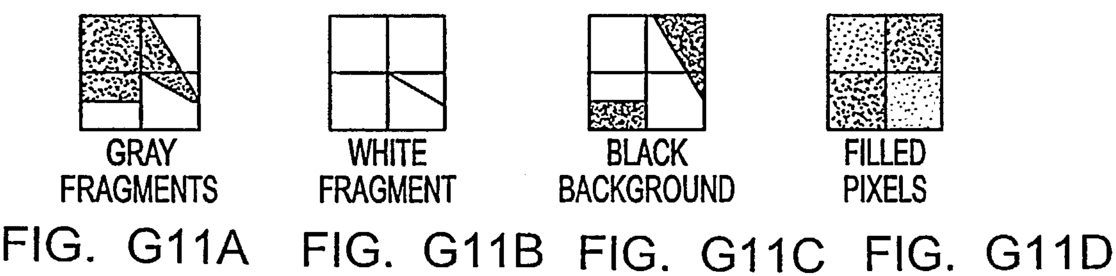
FIG. G11A FIG. G11B FIG. G11C FIG. G11D

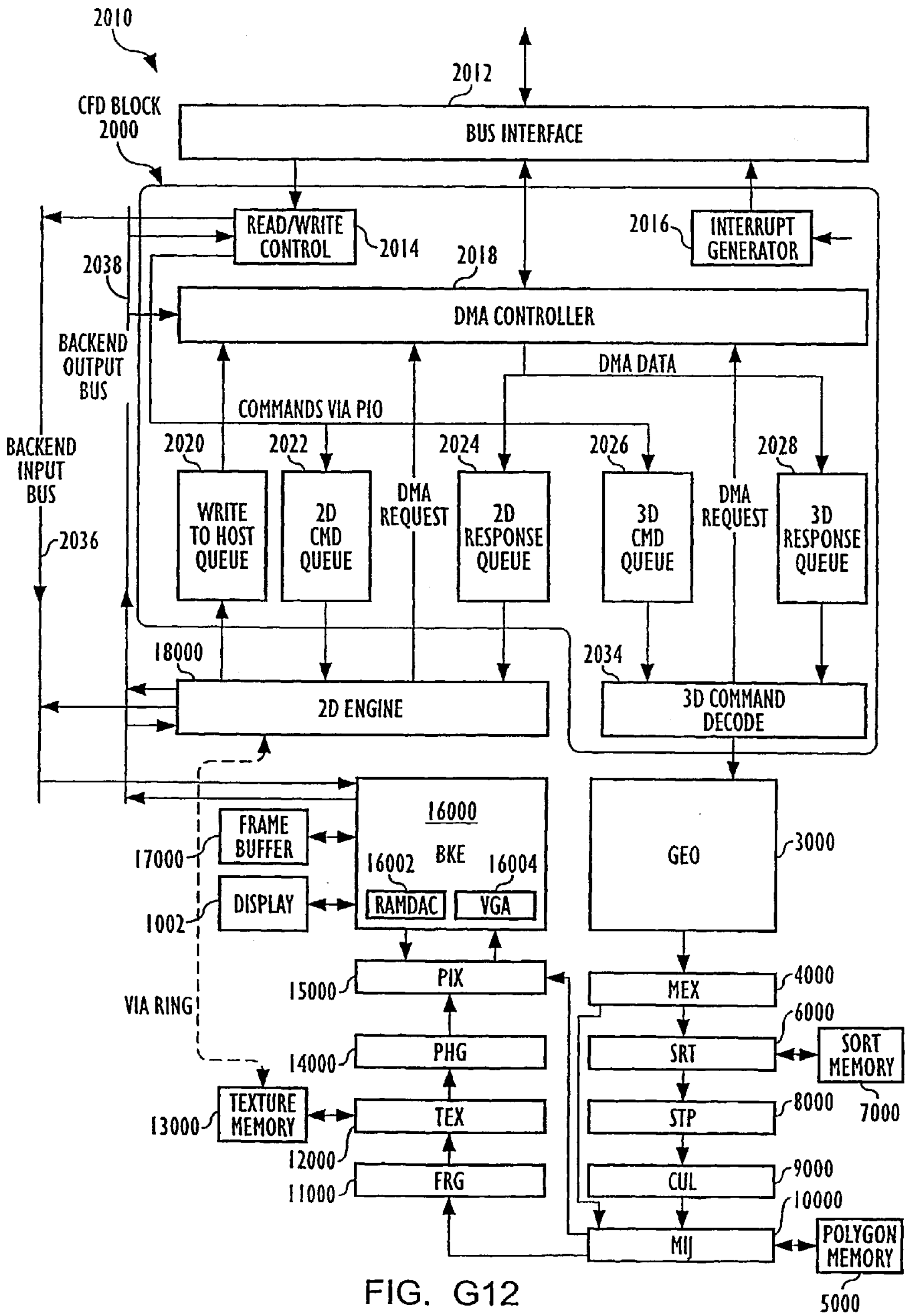
FIG. G12

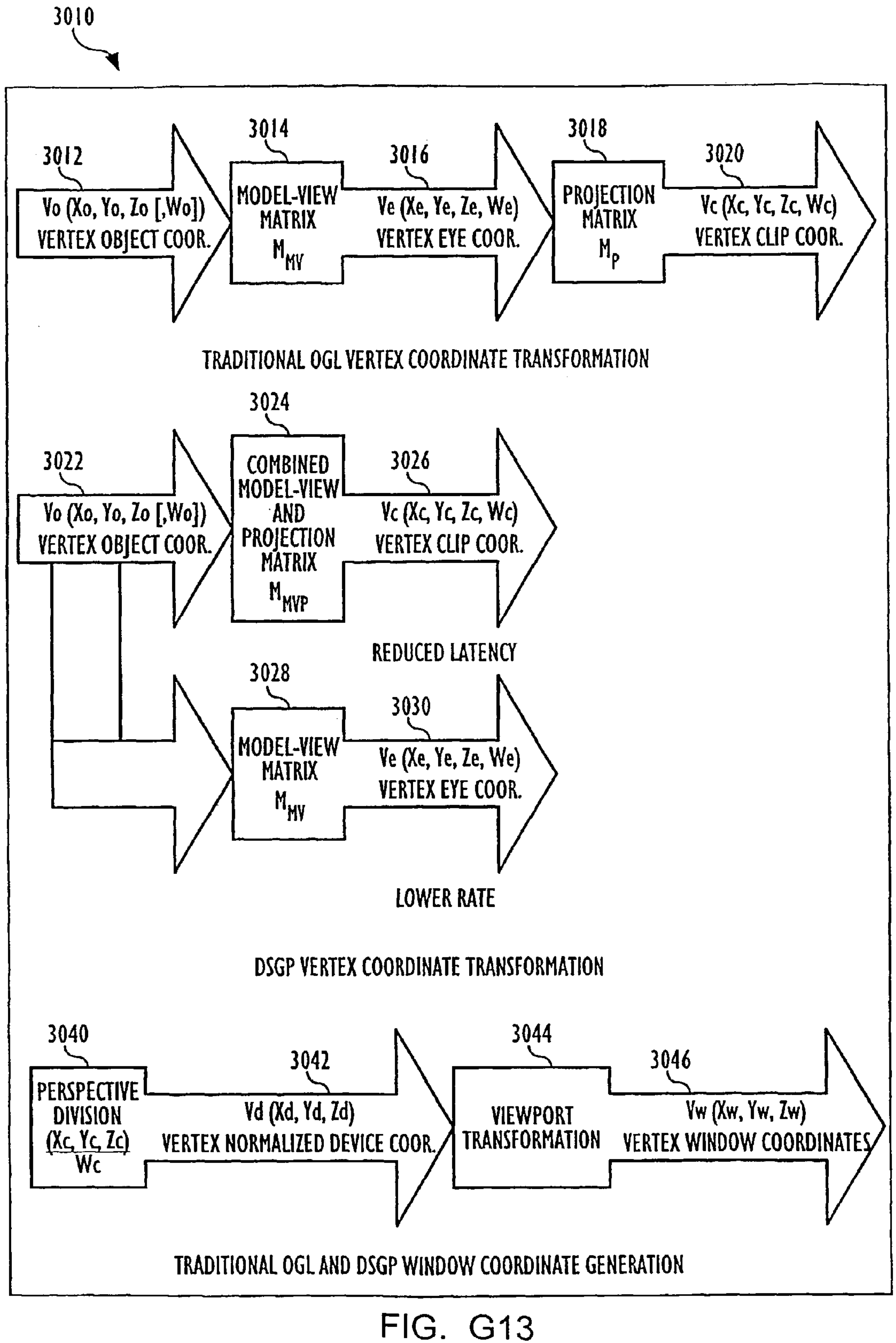
FIG. G13

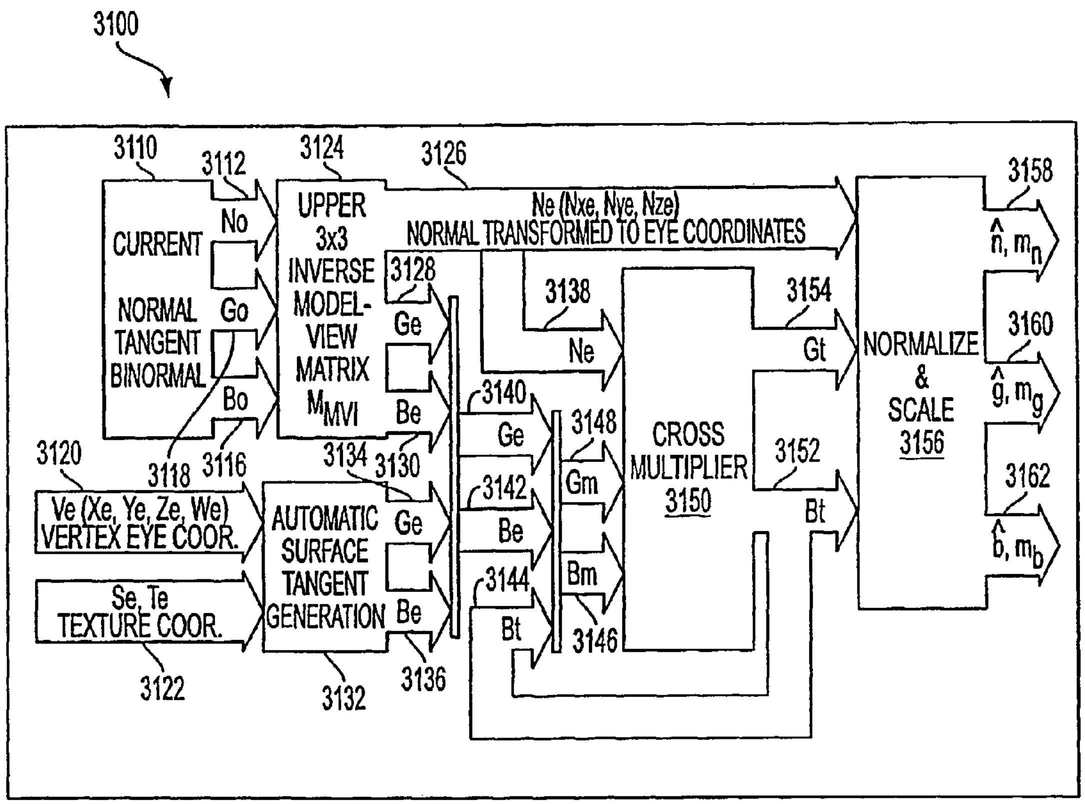
FIG. G14

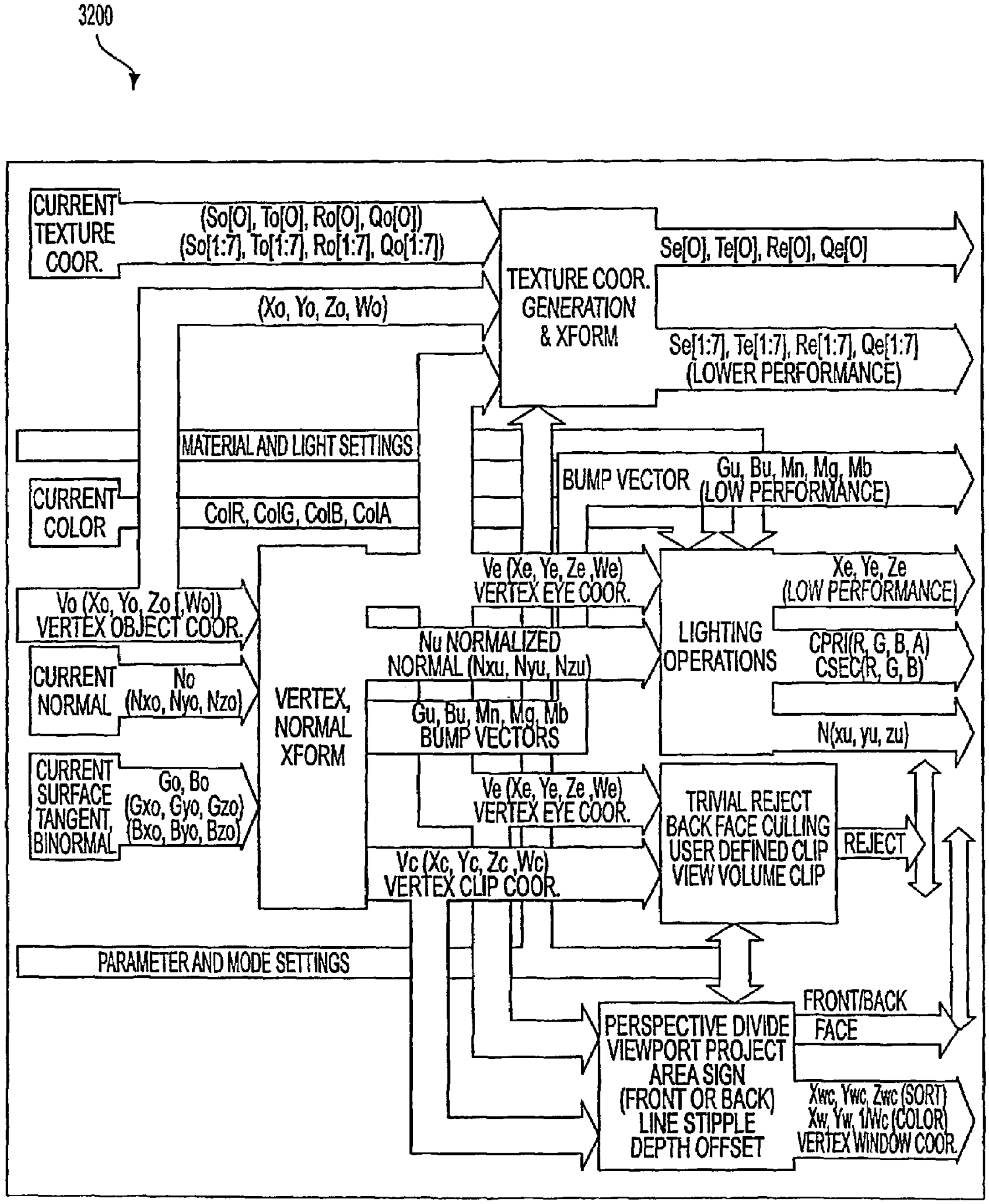
FIG. G15

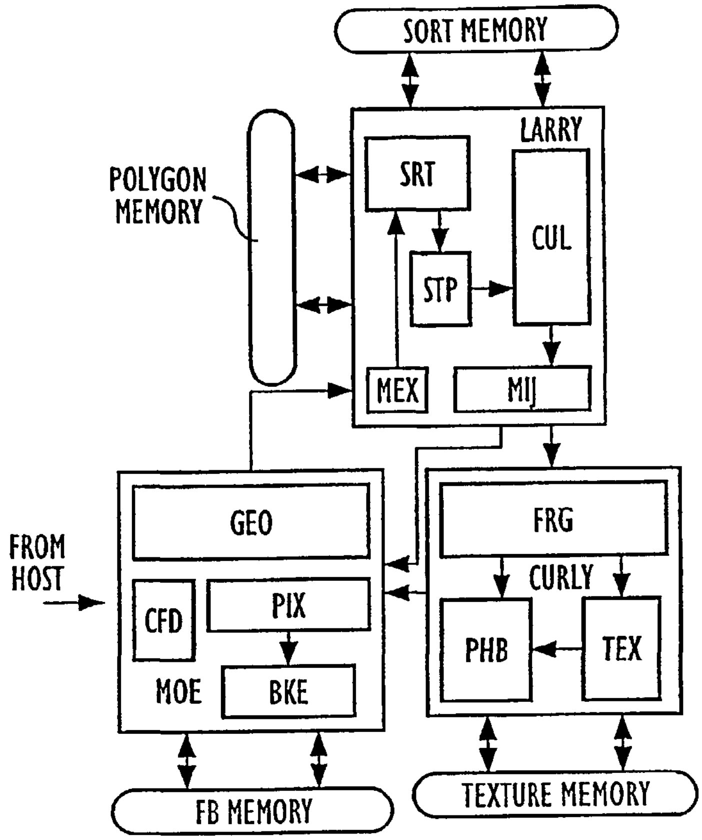
FIG. G16
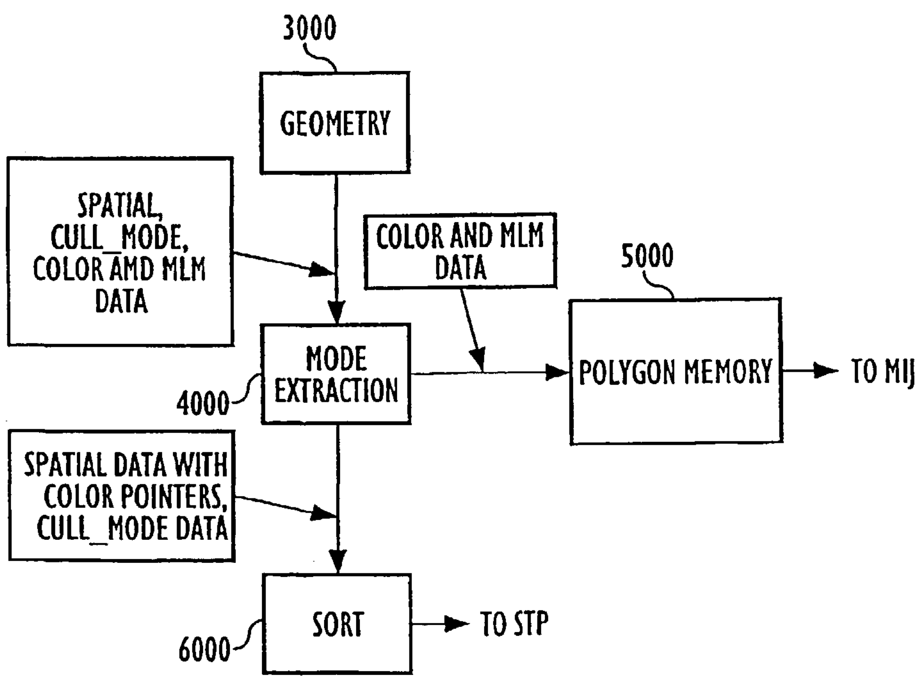
FIG. G17

THE FOLLOWING PACKETS WILL BE SENT TO MEX IN TIME ORDER:

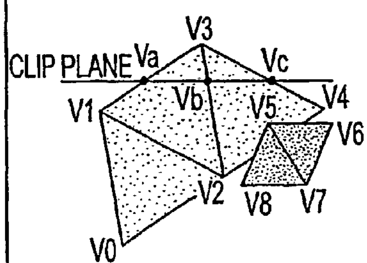

| VERTEX | PACKET | REUSE | TYPE | FRONTFACE |
|---|---|---|---|---|
| | CULLMODE1 | | | |
| | MATFRONT1 | | | |
| | MATBACK1 | | | |
| | PIXMODE1 | | | |
| | VTXMODE | | | |
| V0 | COLOR | M | N | 1 |
| V0 | SORT | M | N | 1 |
| V1 | COLOR | M | N | 1 |
| V1 | SORT | M | N | 1 |
| V2 | COLOR | M | T | 1 |
| | VTXMODE | | | |
| V2 | SORT | M | T | 1 |
| V3 | COLOR | M | T | 1 |
| V1 | SORT | M | N | 1 |
| Va | SORT | M | N | 1 |
| Vb | SORT | O | T | 1 |
| V2 | SORT | O | T | 1 |
| V4 | COLOR | M | T | 1 |
| V2 | SORT | M | N | 1 |
| Vb | SORT | M | N | 1 |
| Vc | SORT | O | T | 1 |
| | CULLMODE2 | | | |
| | MATFRONT2 | | | |
| | TEXAFRONT2 | | | |
| | LIGHT1 | | | |
| V5 | COLOR | O | N | 0 |
| V5 | SORT | O | N | 0 |
| V6 | COLOR | O | N | 0 |
| V6 | SORT | O | N | 0 |
| V7 | COLOR | O | T | 0 |
| V7 | SORT | O | T | 0 |
| V8 | COLOR | M | T | 0 |
| V8 | SORT | M | T | 0 |

M: KEEP MIDDLE
O: KEEP OLDEST

N: NOT COMPLETE
P: POINT L: LINE
T: TRIANGLE

FIG. G18

| STATE PARAMETER SET | DESCRIPTION | APPROXIMATE SIZE (IN 144 BIT WORDS) |
|---|---|---|
| TEXTUREAFRONT | IF THE FRONT (OR BACK) FACING PRIMITIVES ARE NOT CULLED OUT, SOFTWARE MAY CHOOSE TO ATTACH DIFFERENT TEXTURE AND MATERIAL PARAMETER TO THE FRONT AND BACK FACING PRIMITIVES. TEXTUREAFRONT PARTITION OF THE STATE VECTOR CONTAINS THE TEXA STATE APPLICABLE IF THE CURRENT PRIMITIVE IS FRONT FACING. | 2 |
| TEXTUREBFRONT | TEXTUREBFRONT PARTITION OF THE STATE VECTOR CONTAINS THE TEXB STATE APPLICABLE IF THE CURRENT PRIMITIVE IS FRONT FACING. | 6 |
| TEXTUREABACK | TEXTUREABACK PARTITION OF THE STATE VECTOR CONTAINS THE TEXA STATE APPLICABLE IF THE CURRENT PRIMITIVE IS BACK FACING. | 2 |
| TEXTUREBBACK | TEXTUREBBACK PARTITION OF THE STATE VECTOR CONTAINS THE TEXB STATE APPLICABLE IF THE CURRENT PRIMITIVE IS BACK FACING. | 6 |
| MATERIALFRONT | MATERIALFRONT PARTITION OF THE STATE VECTOR CONTAINS THE MATERIAL STATE APPLICABLE IF THE CURRENT PRIMITIVE IS FRONT FACING. | 10 |
| MATERIALBACK | MATERIALBACK PARTITION OF THE STATE VECTOR CONTAINS THE MATERIAL STATE APPLICABLE IF THE CURRENT PRIMITIVE IS BACK FACING. | 10 |
| LIGHT | CONTAINS THE CURRENT LIGHT STATE. | 18 |
| PIXELMODES | CONTAINS THE CURRENT PIXEL MODES. | 2 |
| STIPPLE | CONTAINS CURRENT STIPPLE PATTERN | 8 |
| CULLMODES | CONTAINS CURRENT CULL MODES | 0.33 |

FIG. G19

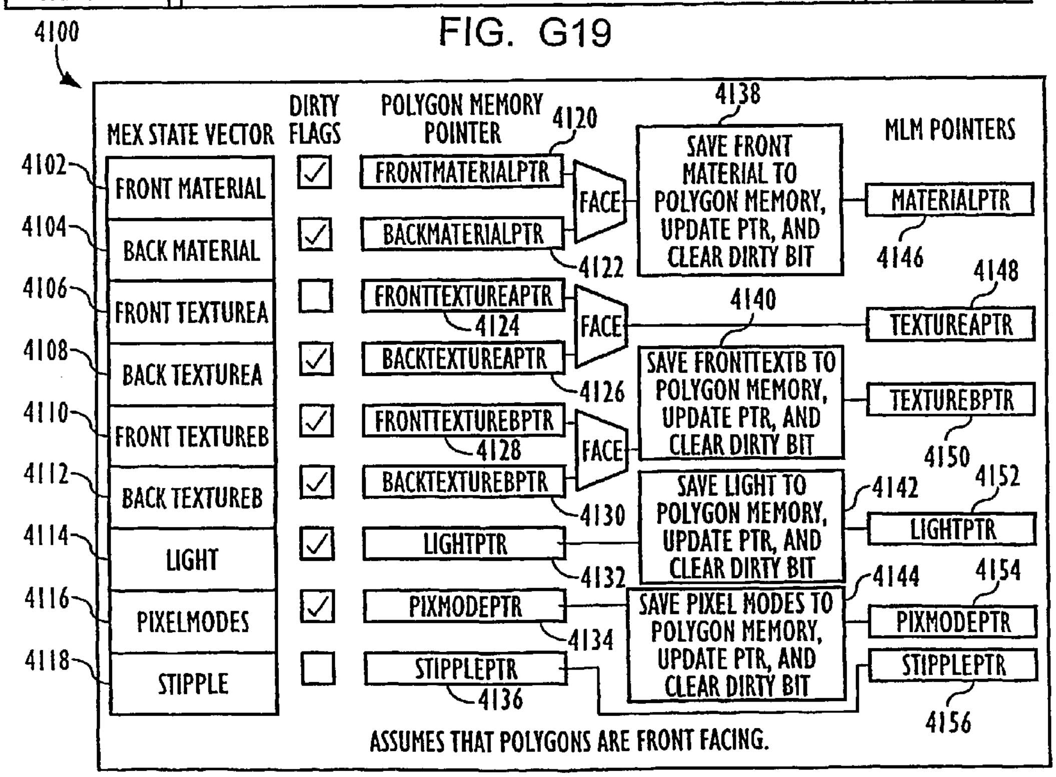

FIG. G20

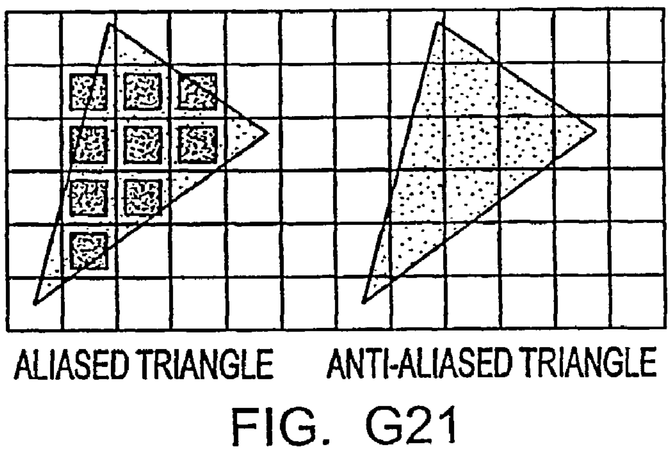
FIG. G21
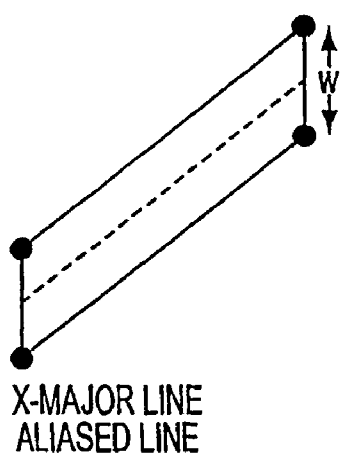
FIG. G22A
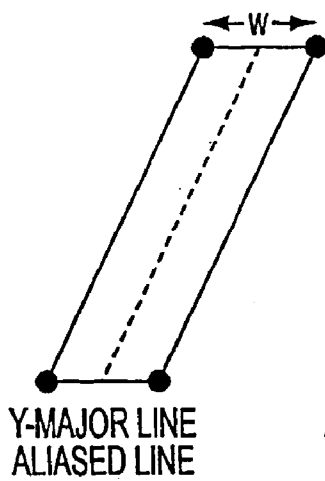
FIG. G22B
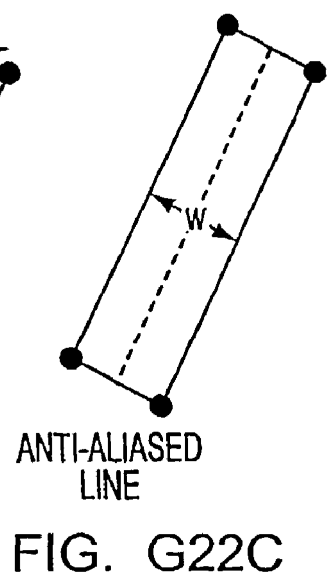
FIG. G22C

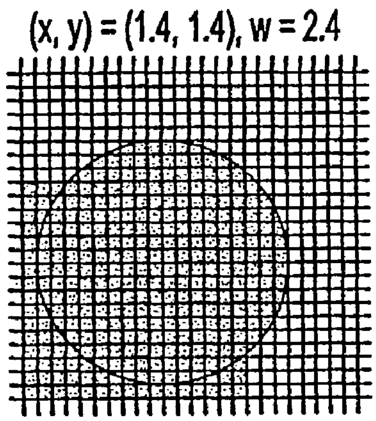
FIG. G23A
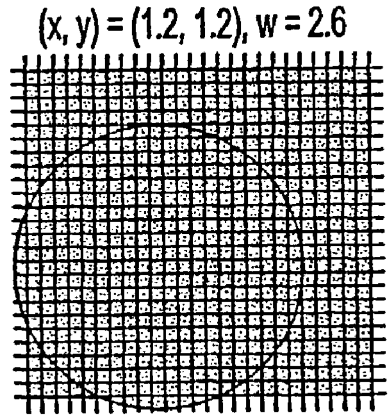
FIG. G23B
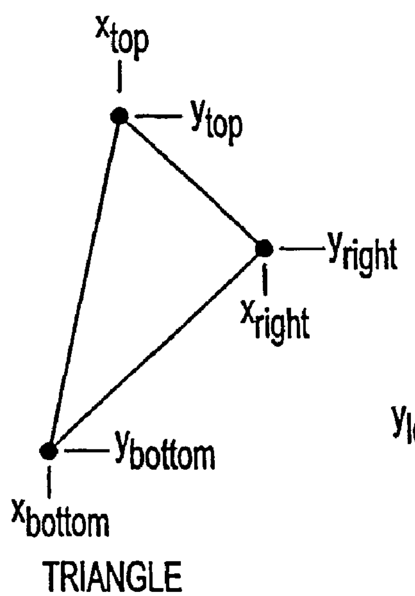
FIG. G24A
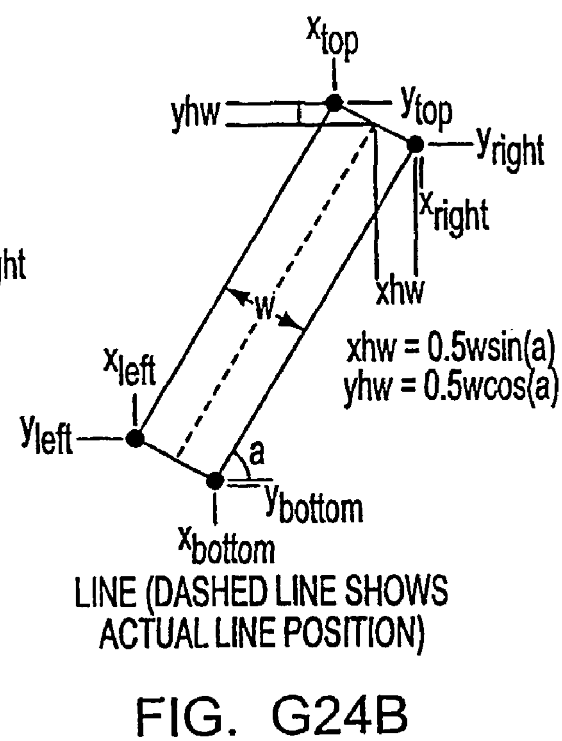
FIG. G24B

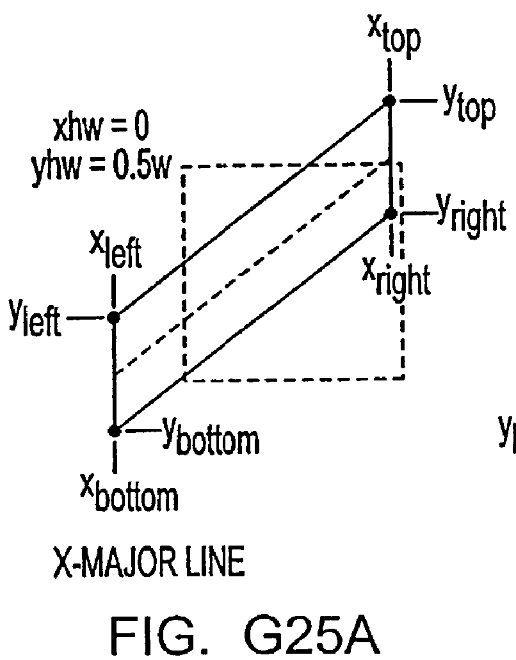
FIG. G25A
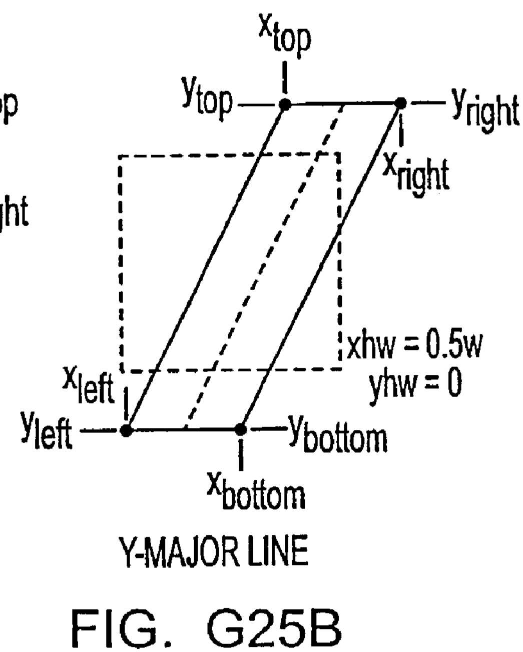
FIG. G25B

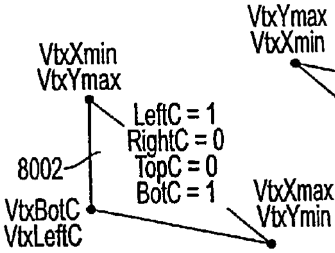
FIG. G26A
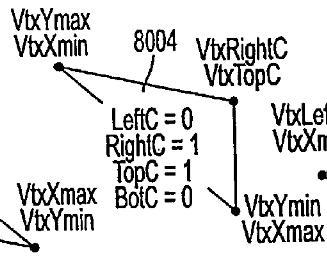
FIG. G26B
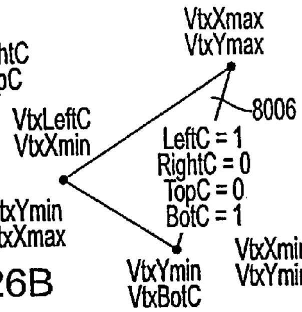
FIG. G26C
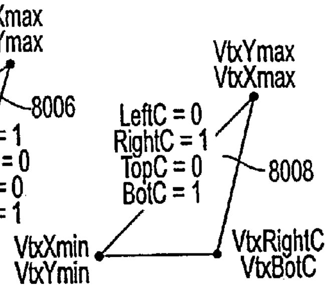
FIG. G26D
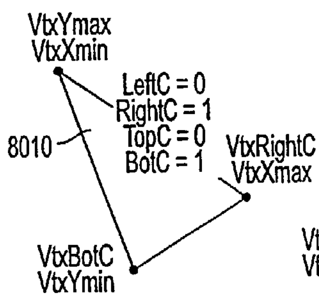
FIG. G26E
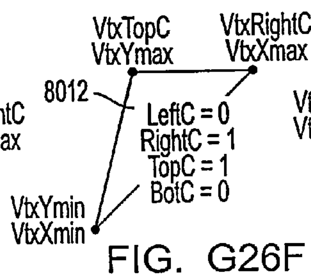
FIG. G26F
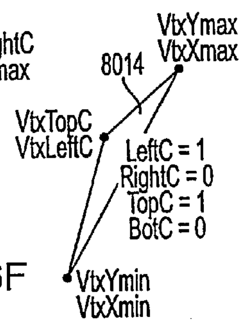
FIG. G26G
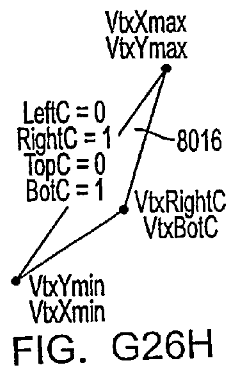
FIG. G26H
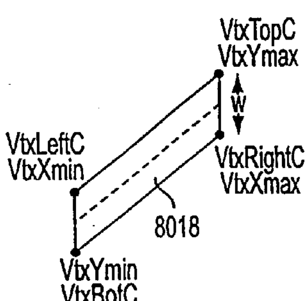
FIG. G26I
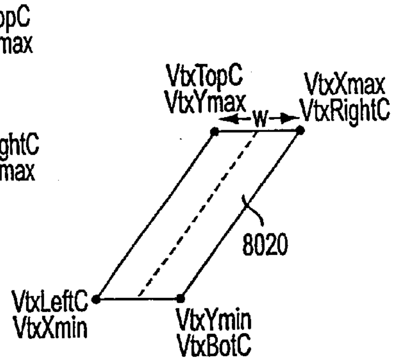
FIG. G26J
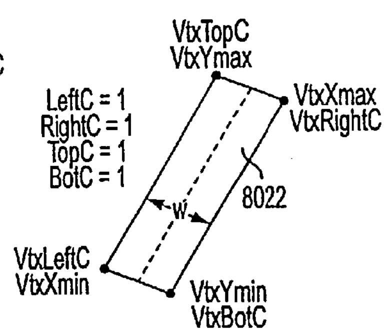
FIG. G26K

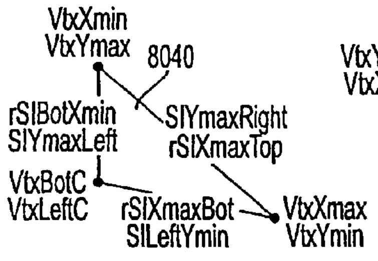
FIG. G27A
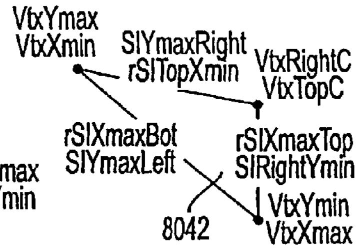
FIG. G27B
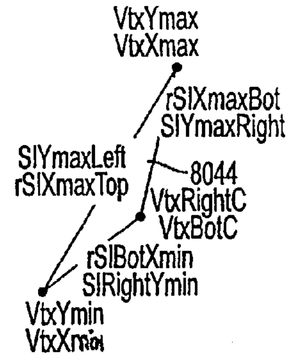
FIG. G27C
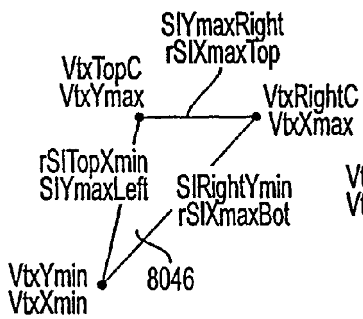
FIG. G27D
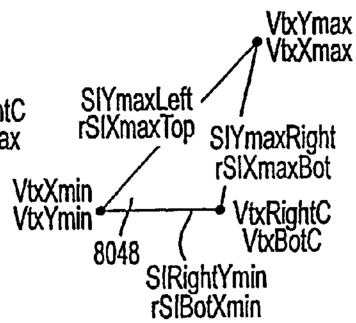
FIG. G27E
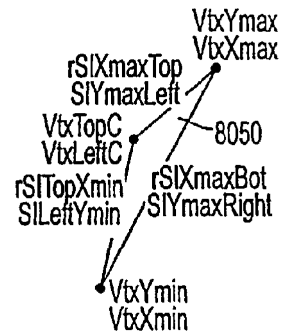
FIG. G27F
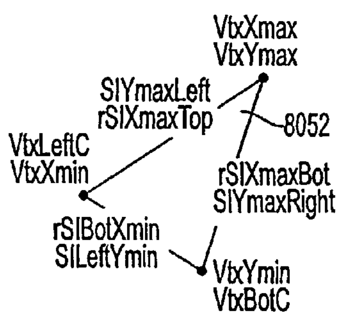
FIG. G27G
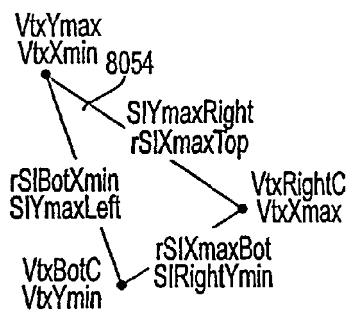
FIG. G27H
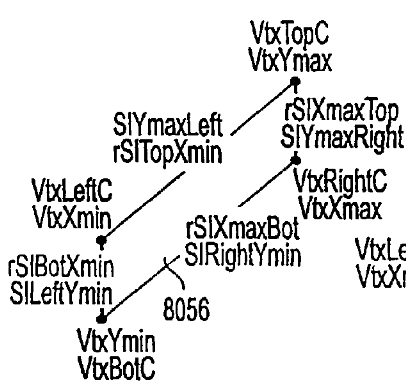
FIG. G27I
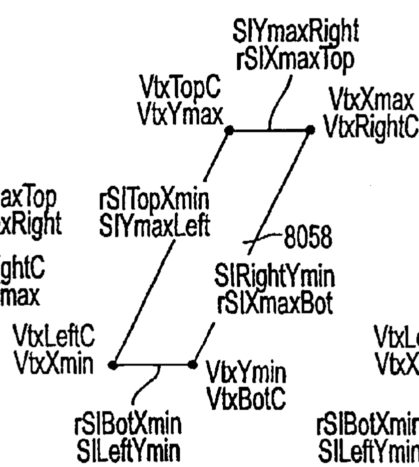
FIG. G27J
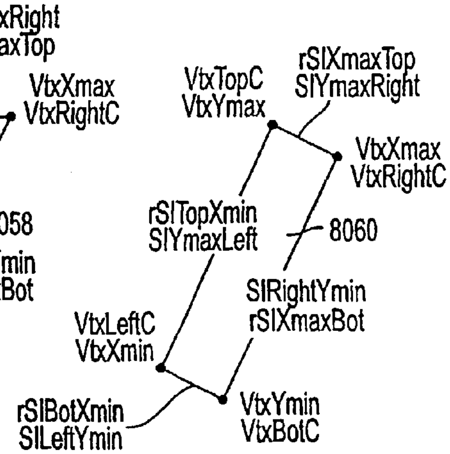
FIG. G27K

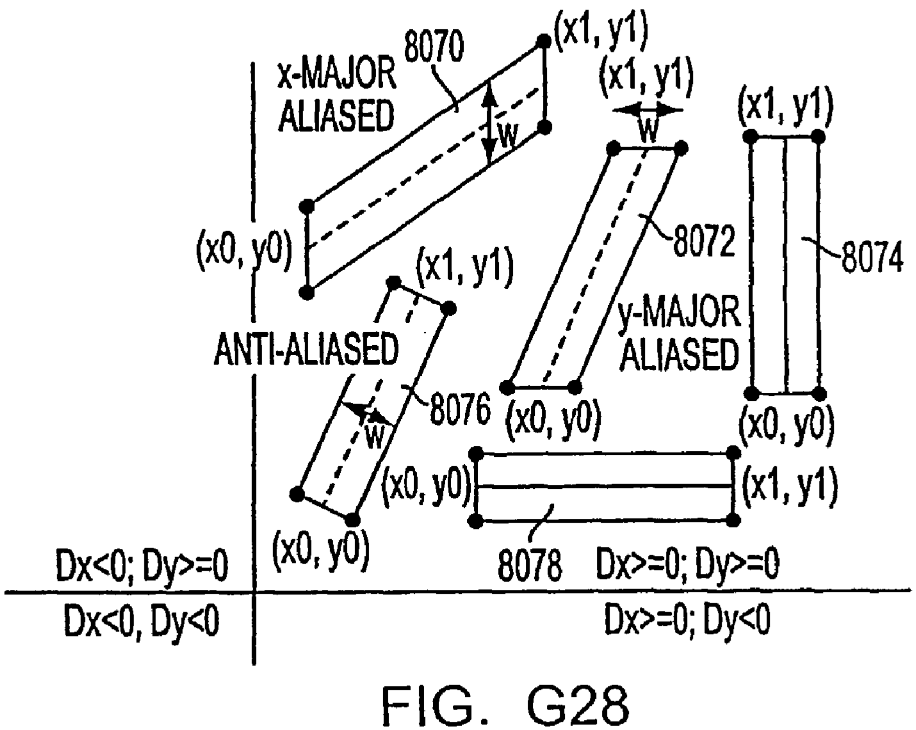
FIG. G28
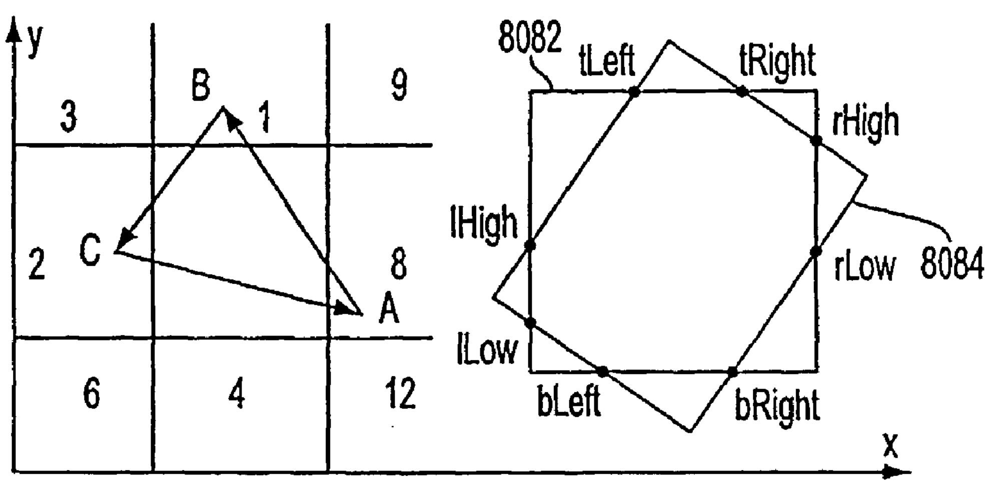
FIG. G29

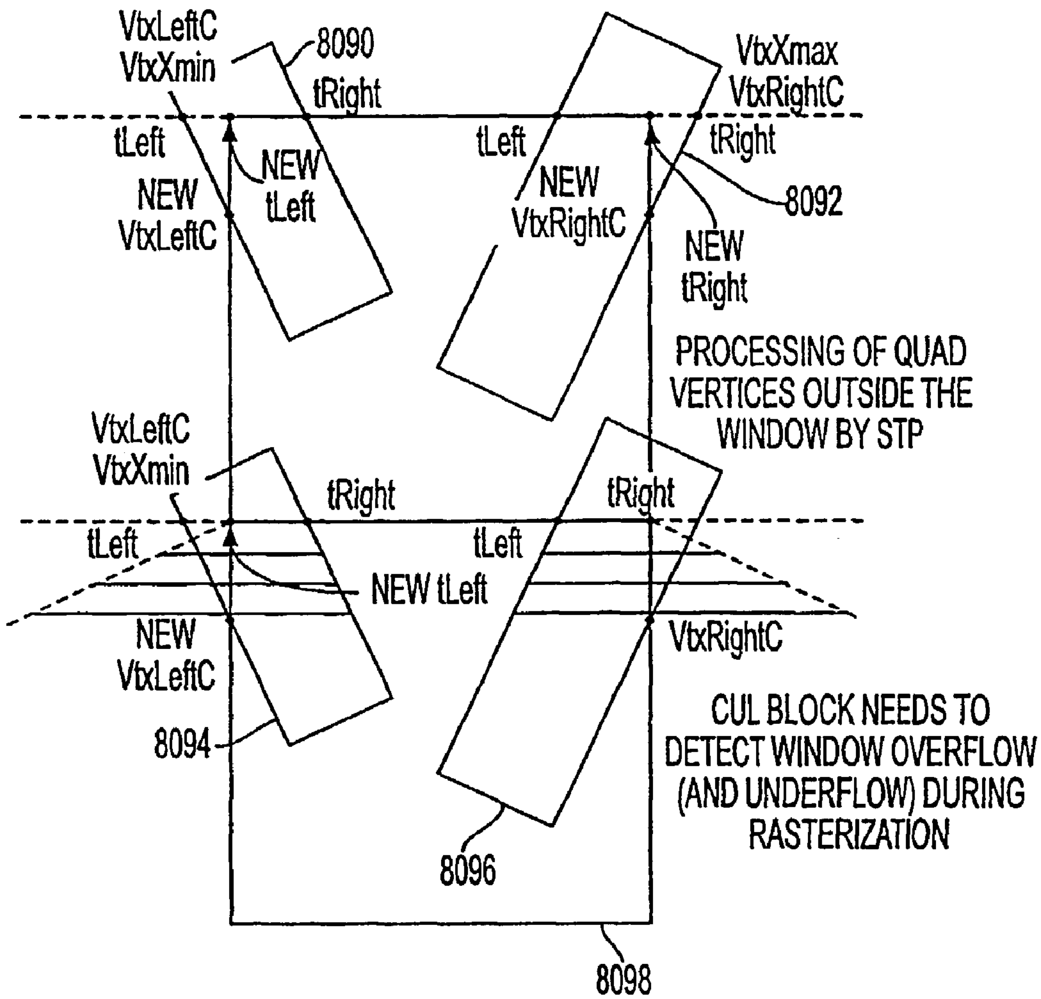
FIG. G30

| | CACHE | BLOCK | # ENTRIES | DATA CACHELINE SIZE IN (DUALOCTS) |
|---|---|---|---|---|
| 10012 | COLORVERTEX | MIJ | .32 | 2 - 9 |
| 10014 | MLM_PTR | MIJ | 32 | 1 |
| 10016 | COLORDATA | FRG | 64 - 256 | 6 - 27 |
| 10018 | TEXTUREA | TEX | 32 | 2 |
| 10020 | TEXTUREB | TEX | 8 | 6 |
| 10022 | MATERIAL | PHG | 32 | 10 |
| 10024 | LIGHT | PHG | 8 | 18 |
| 10026 | PIXELMODE | PIX | 16 | 2 |
| 10028 | STIPPLE | PIX | 4 | 8 |

FIG. G31

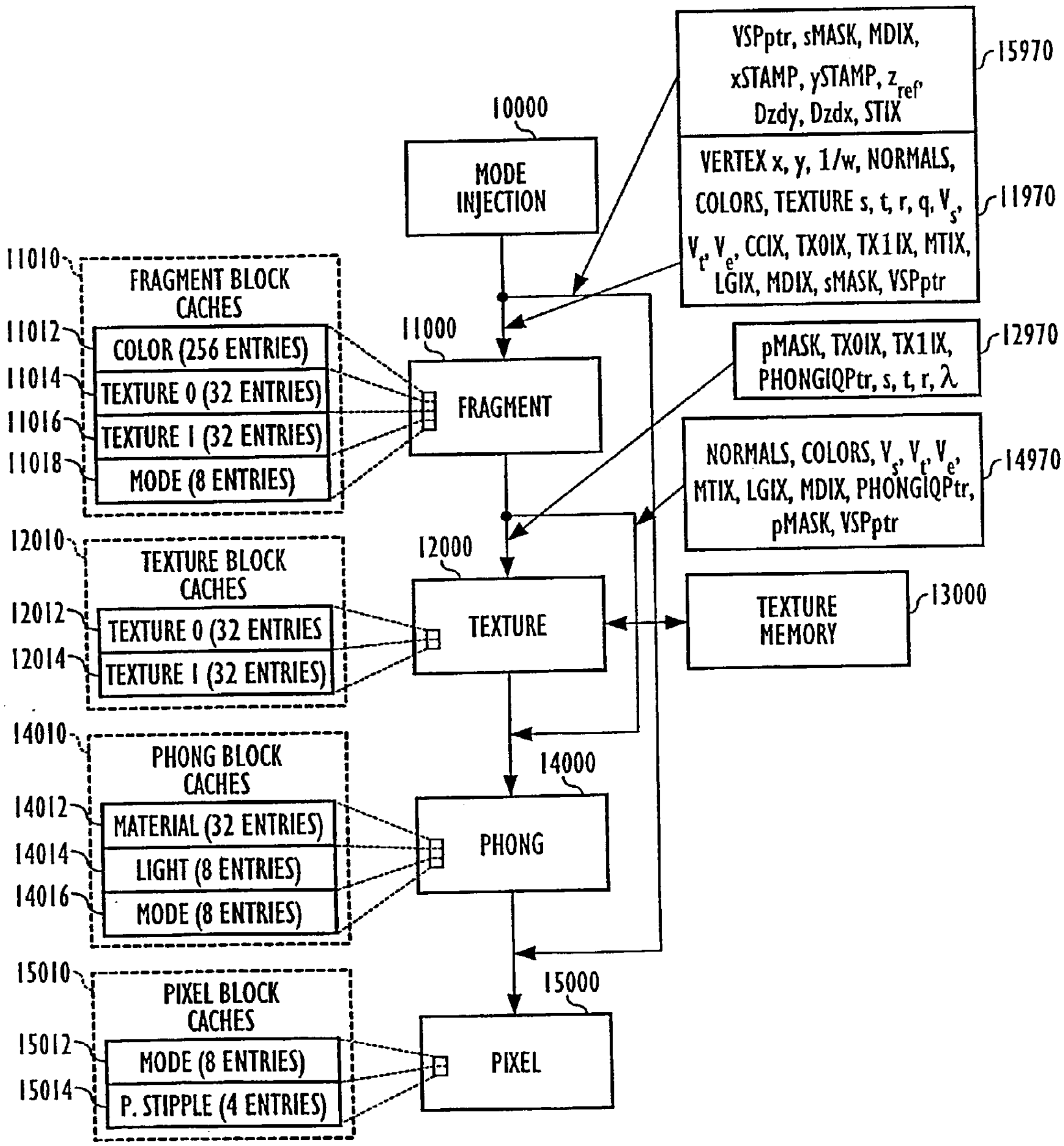
FIG. G32

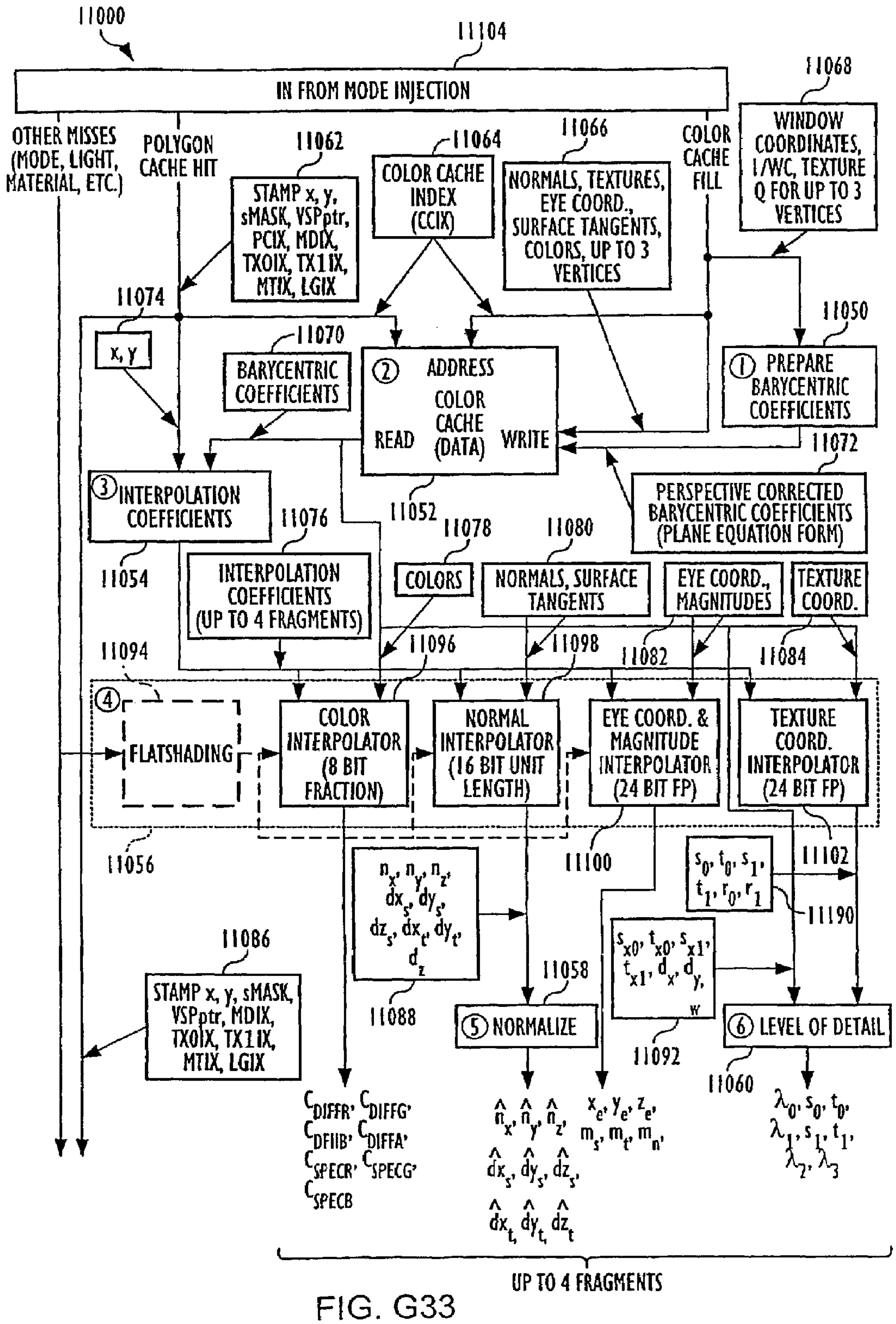
FIG. G33

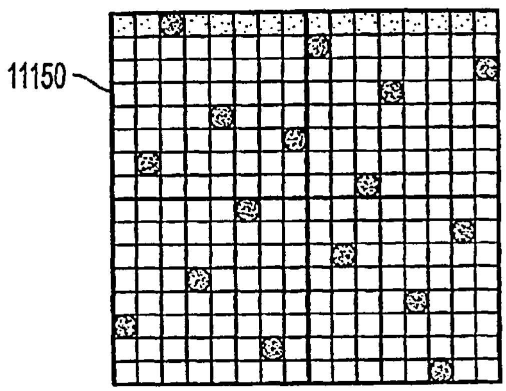
pMASK 1000
sMASK 1000, 0000, 0000, 0000
COVERAGE 1/4. 0. 0. 0
FIG. G34A
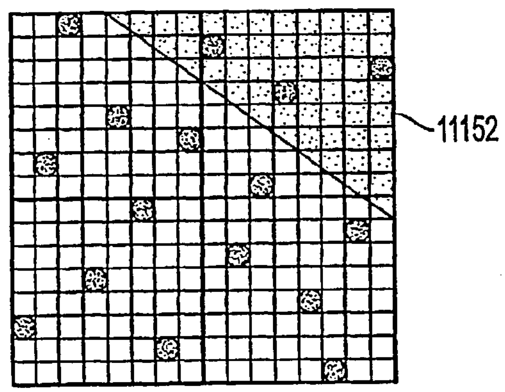
pMASK 0100
sMASK 0000, 1110, 0000, 0000
COVERAGE 0, 3/4, 0, 0
FIG. G34B
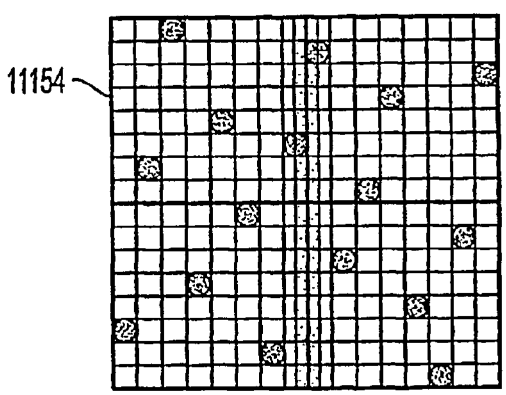
pMASK 1000
sMASK 0010, 0000, 0000, 0000
COVERAGE 1/4, 0, 0, 0
FIG. G34C
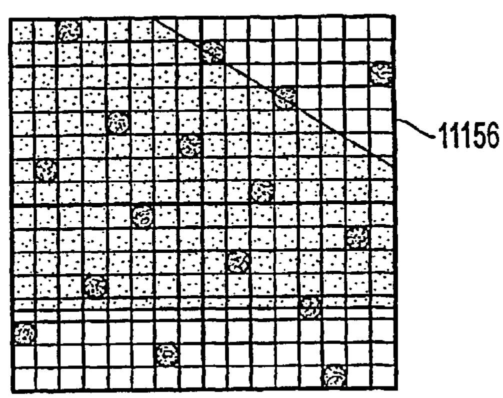
pMASK 1111
sMASK 1111, 0001, 1100, 1100
COVERAGE 1, 1/4, 1/2, 1/2
FIG. G34D

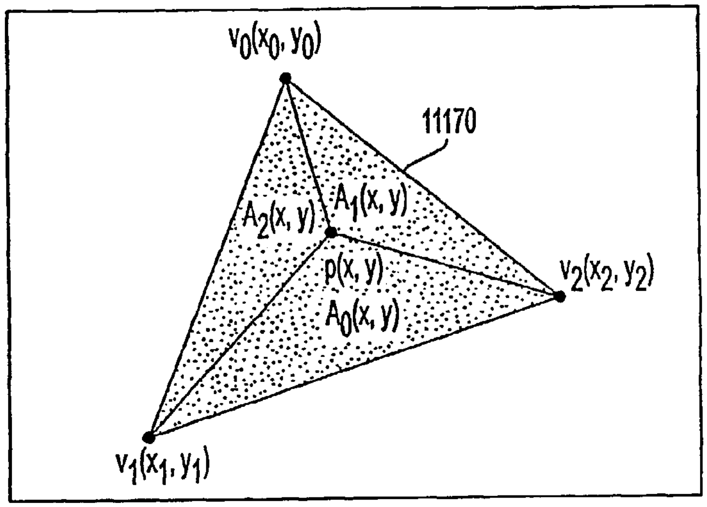
FIG. G35
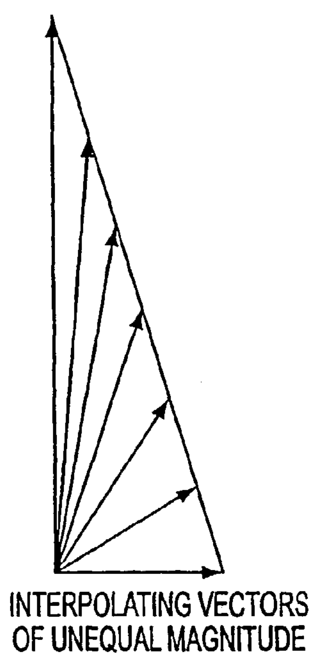
FIG. G36A
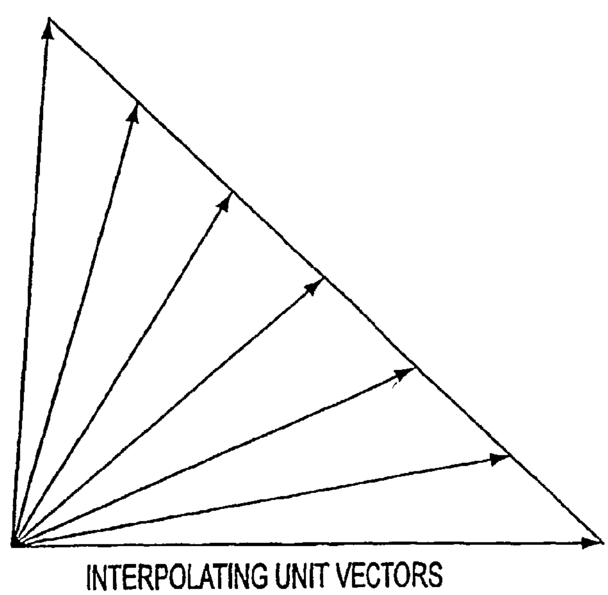
FIG. G36B

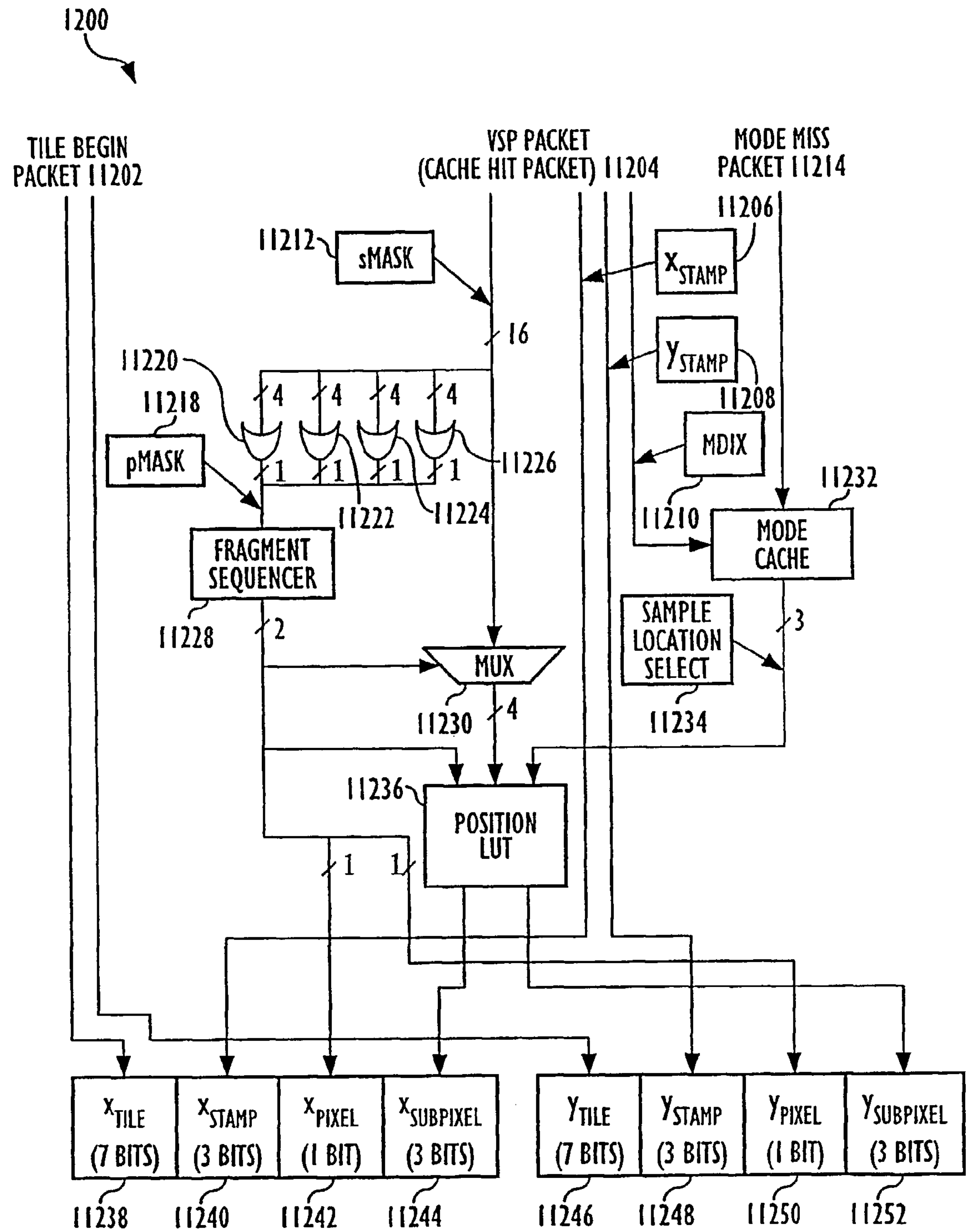
FIG. G37

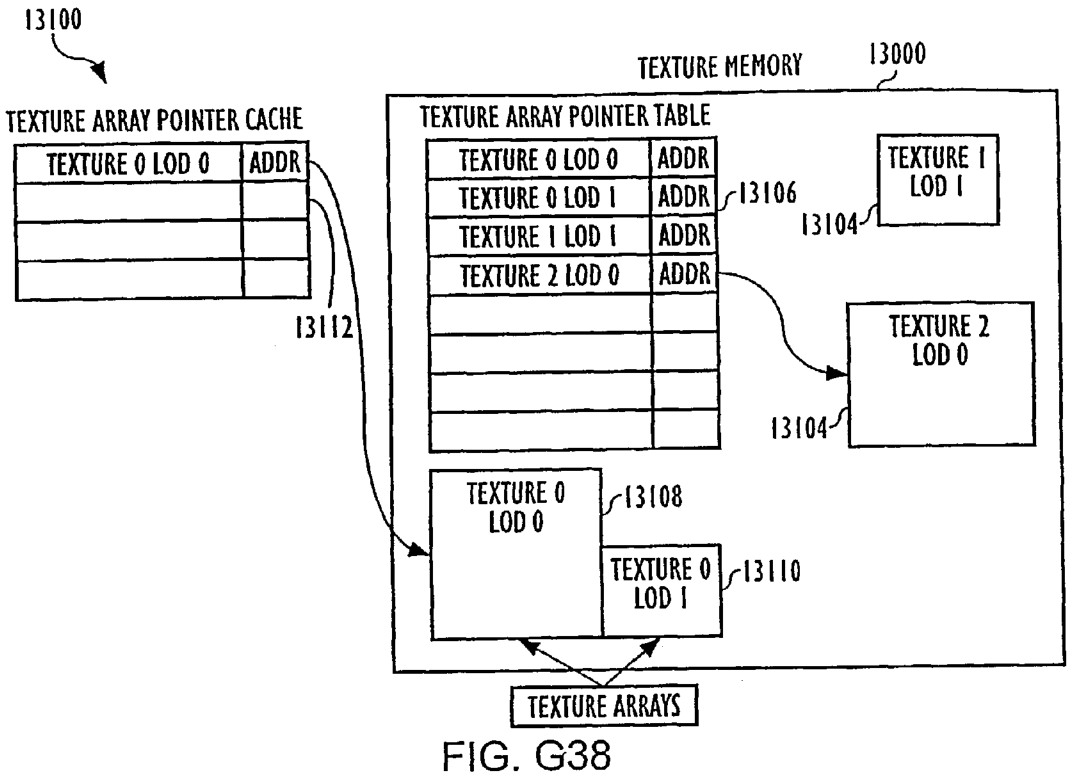
FIG. G38
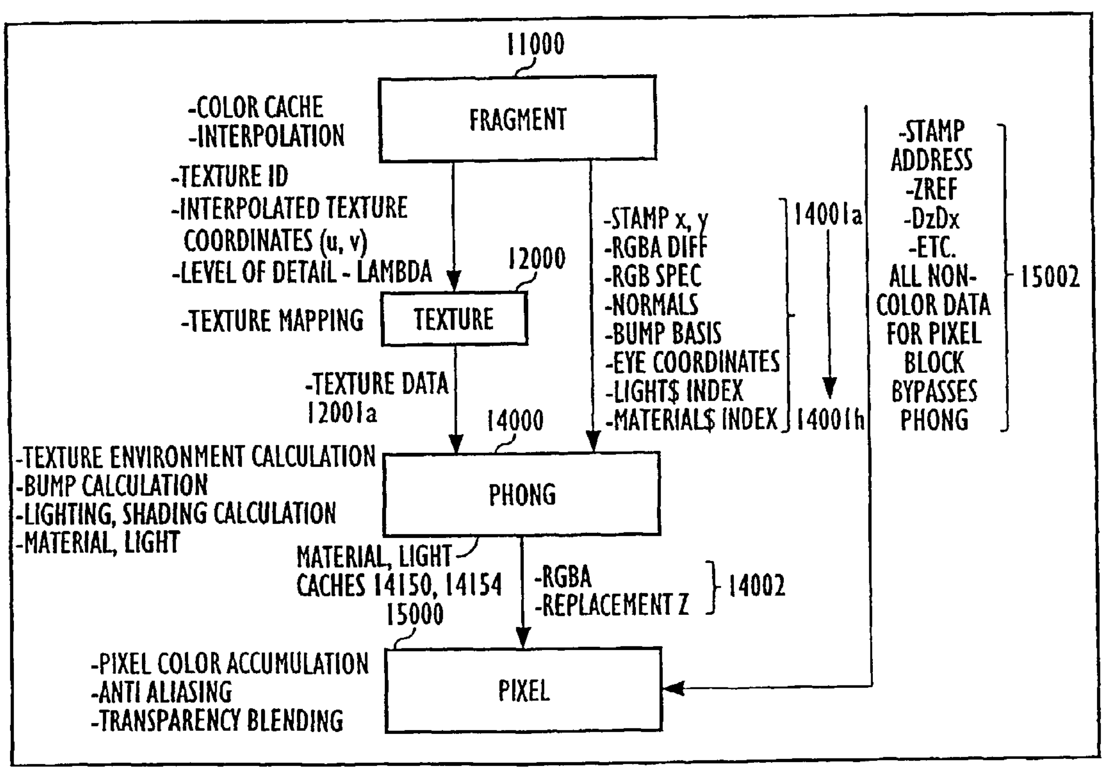
FIG. G39

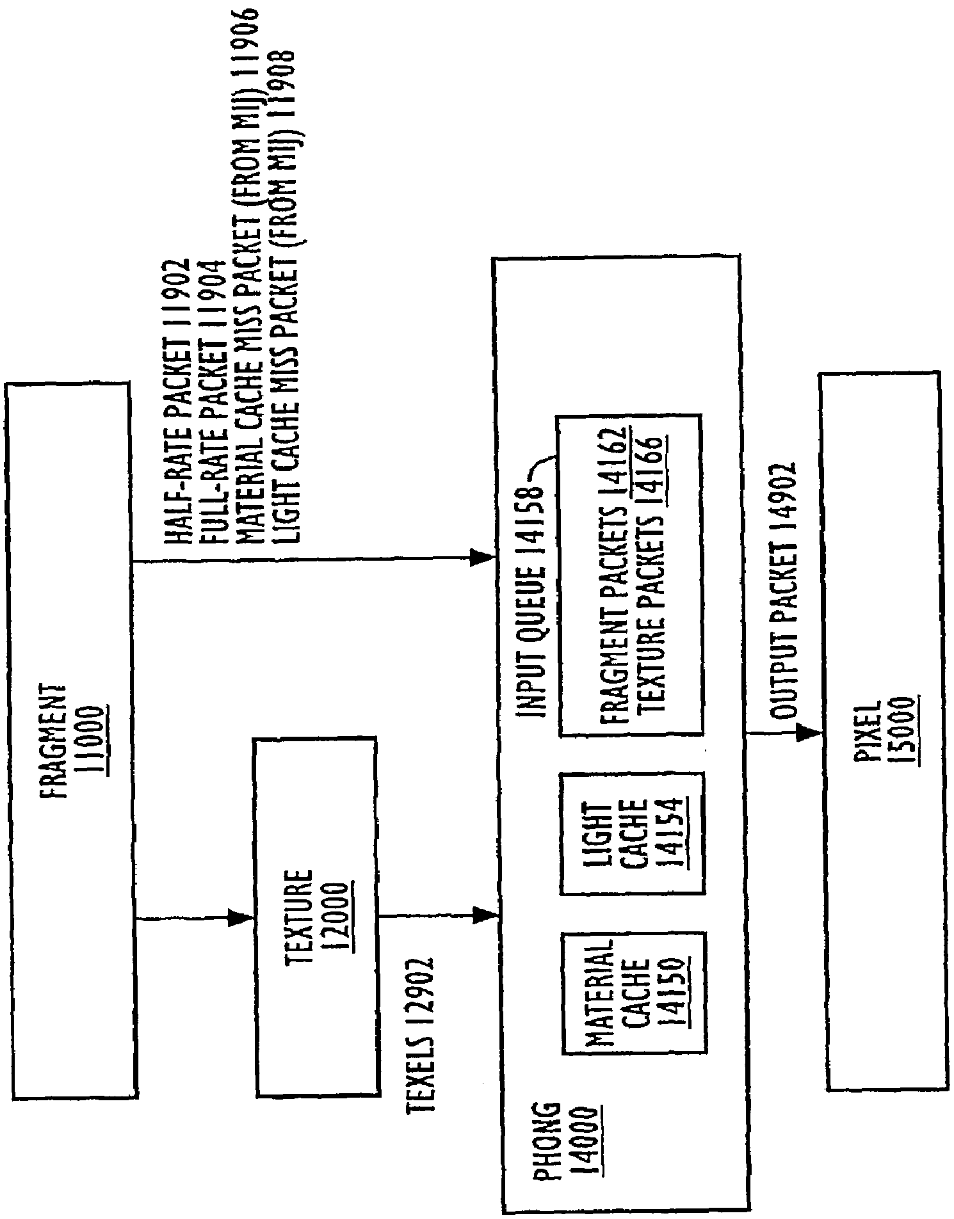
FIG. G40

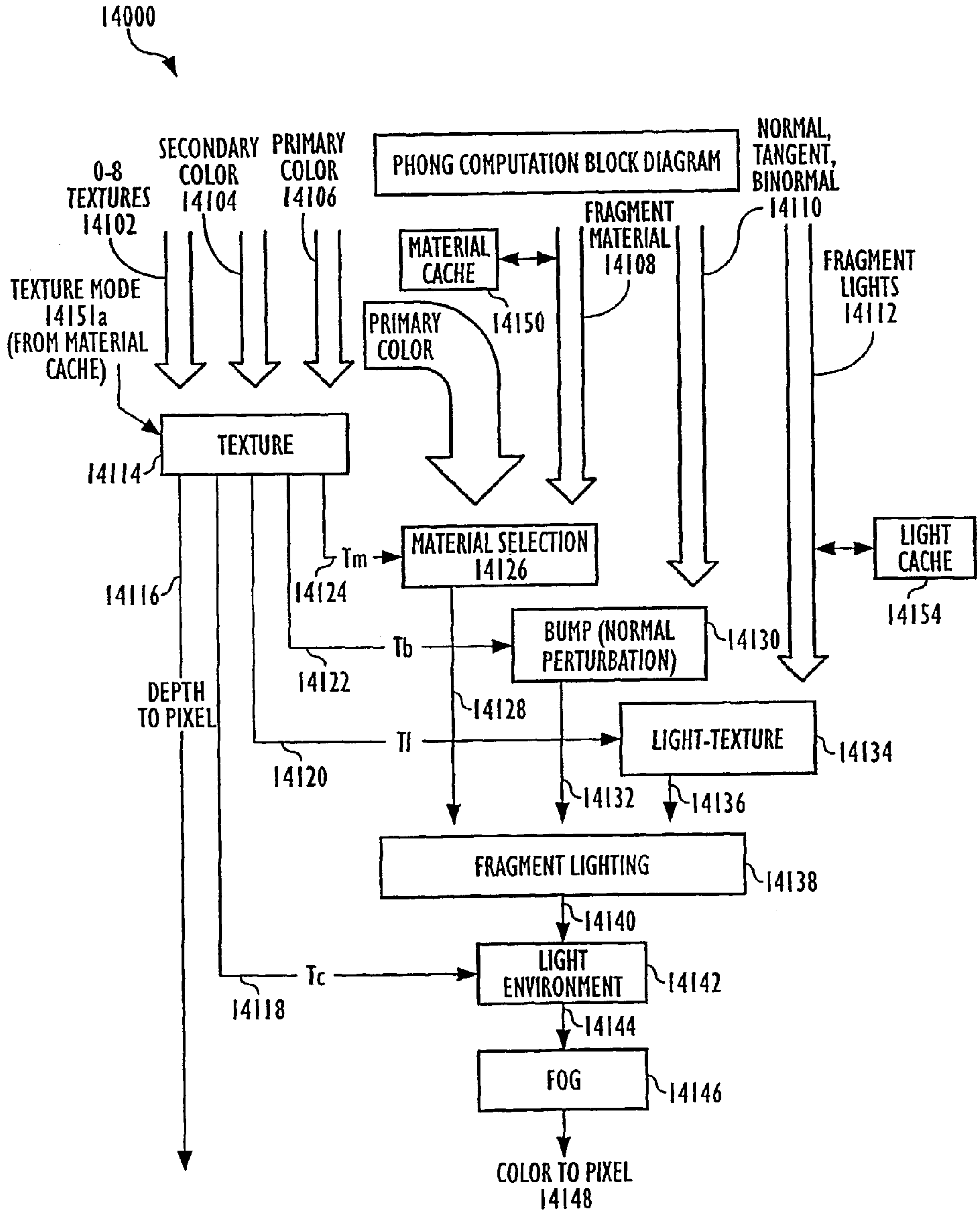
FIG. G41

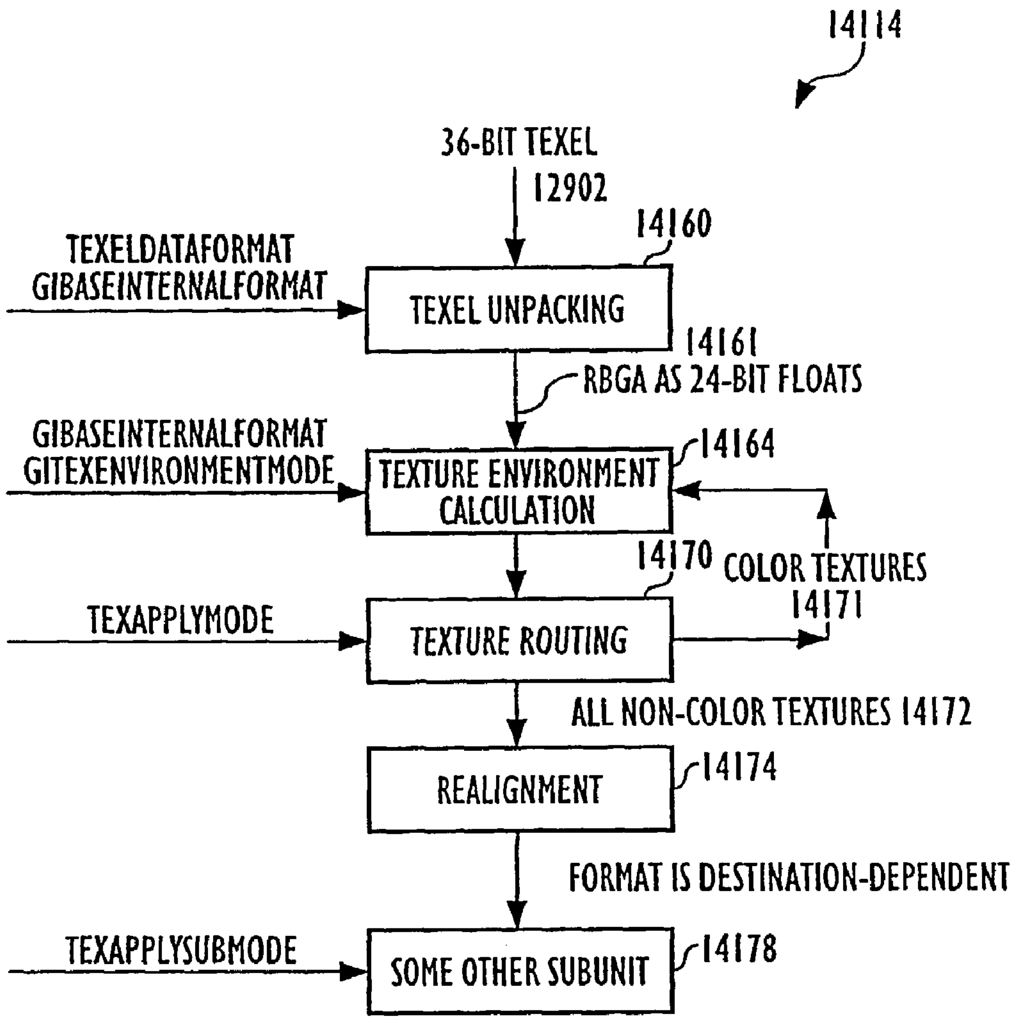
FIG. G42

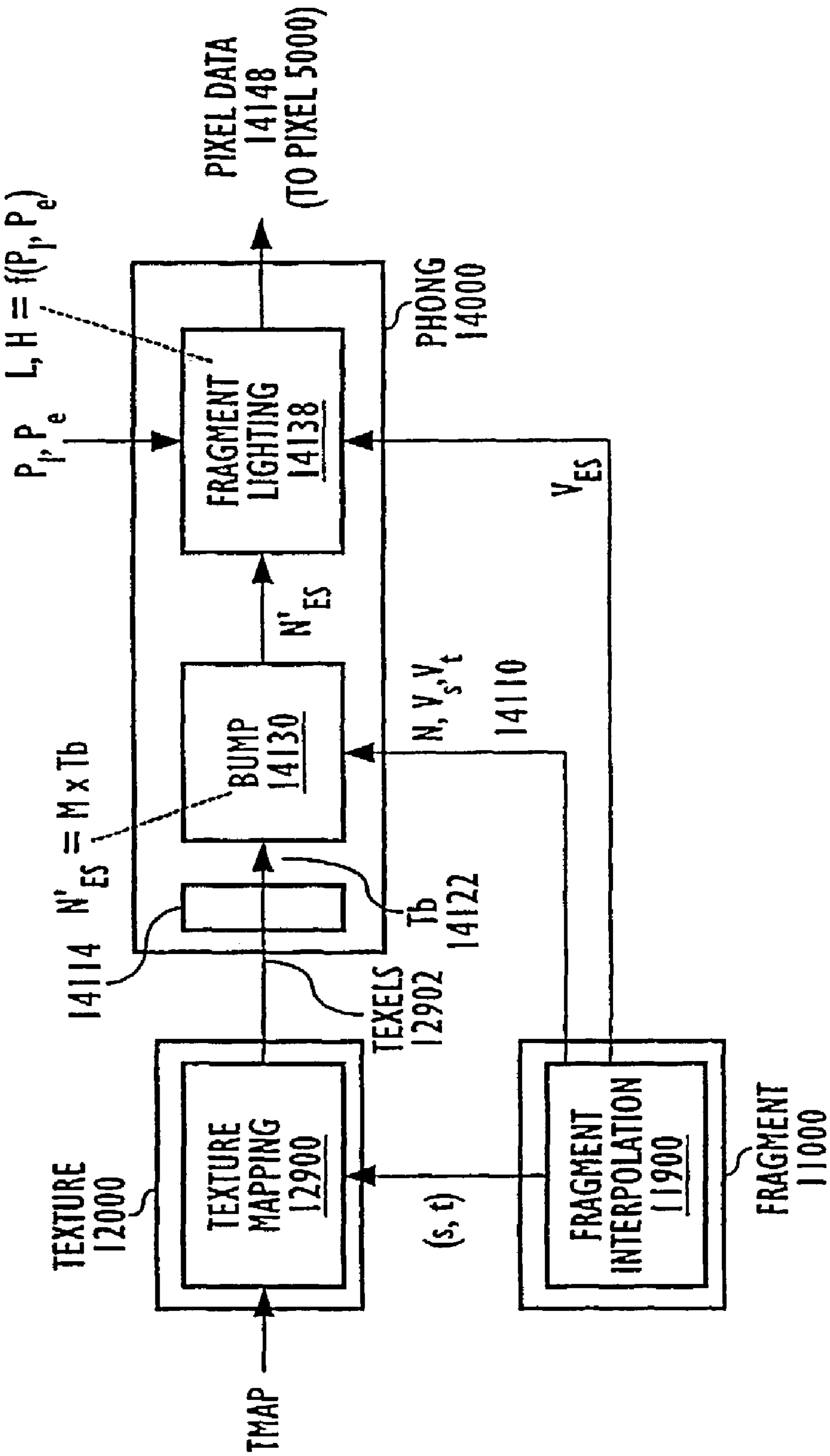
FIG. G43

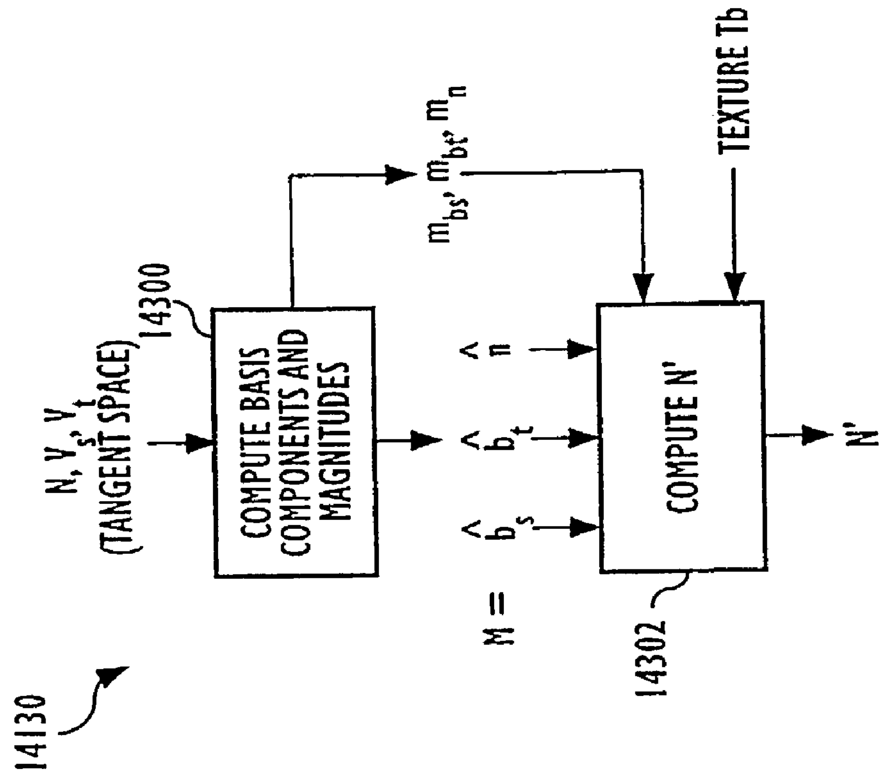
FIG. G44

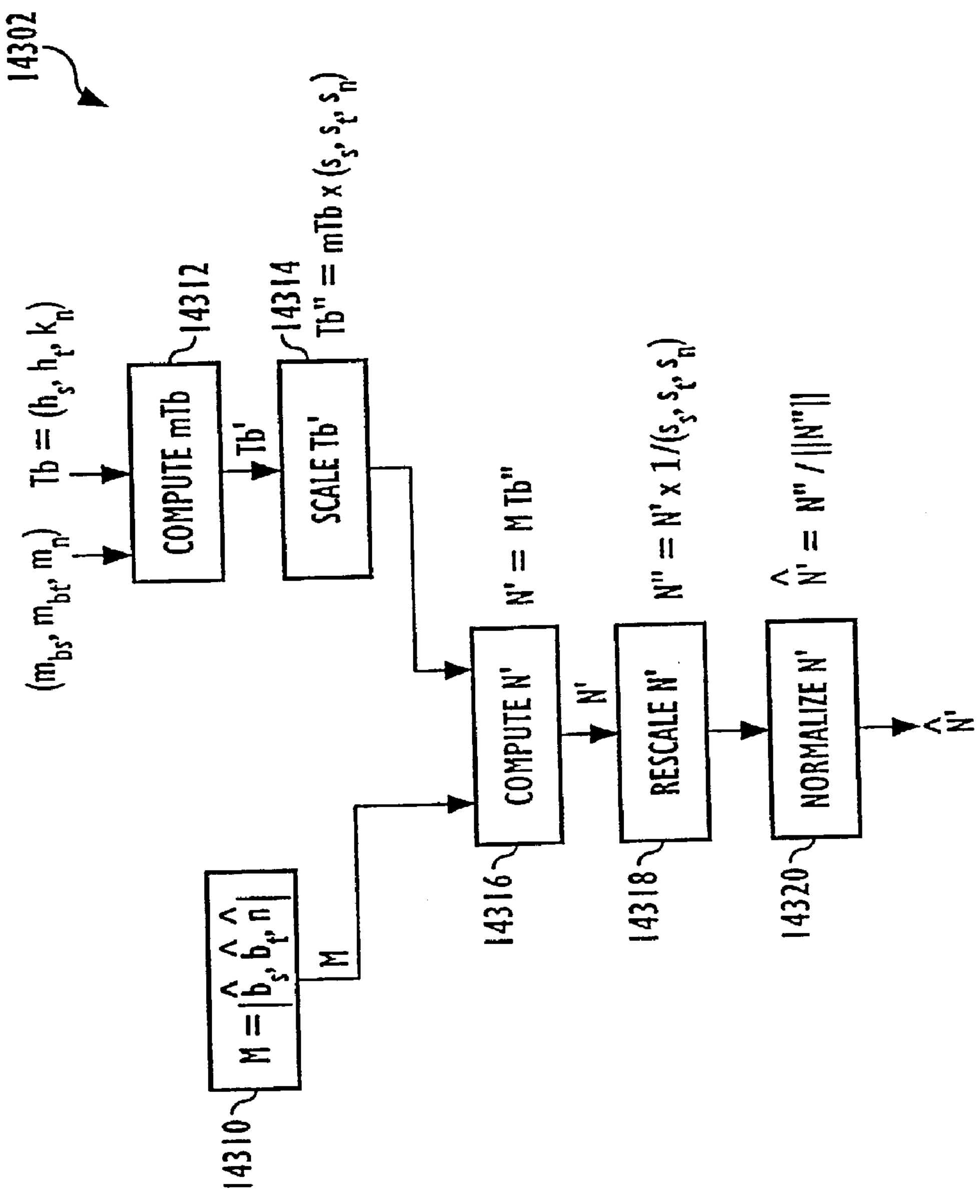
FIG. G45

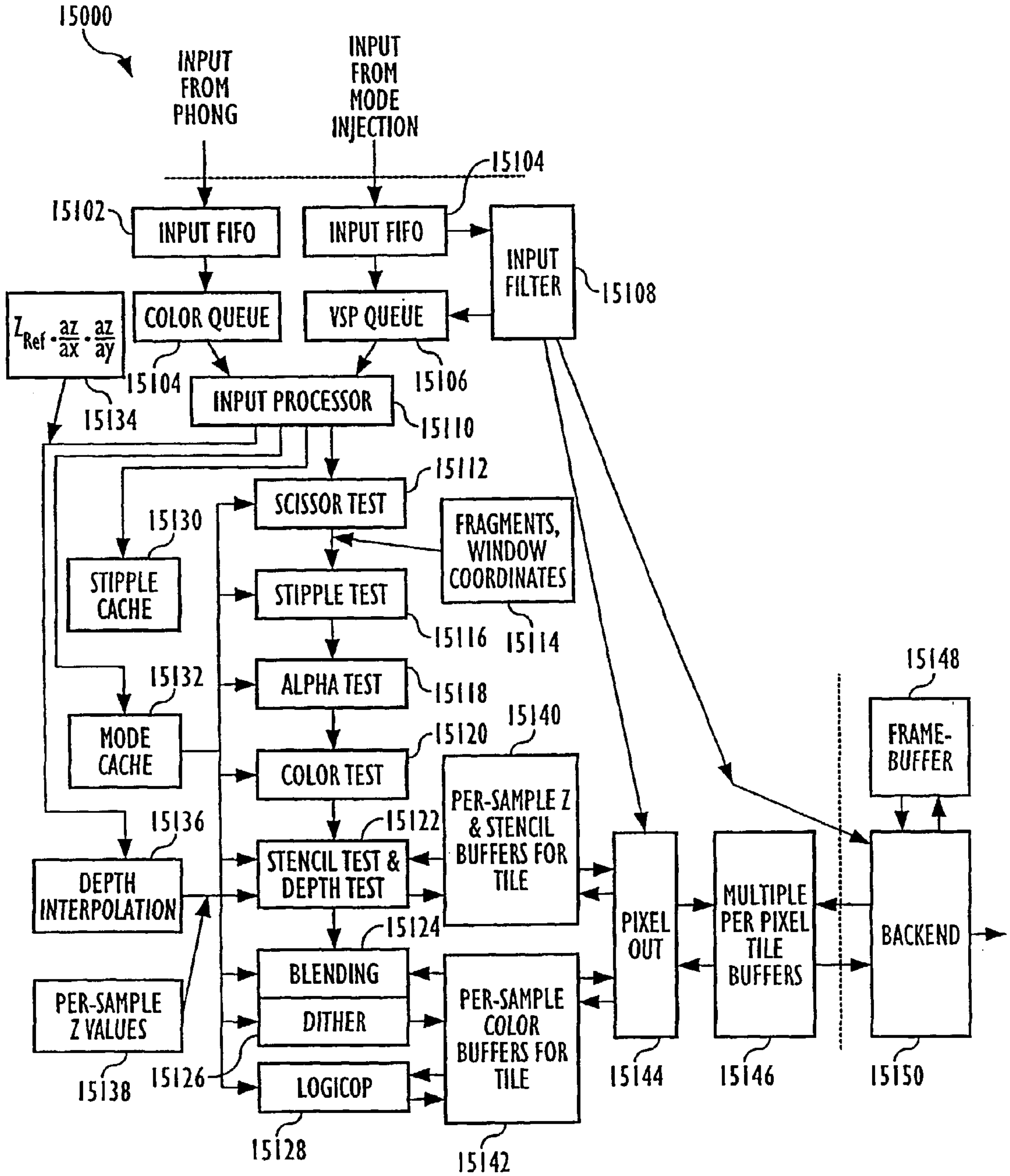
FIG. G46

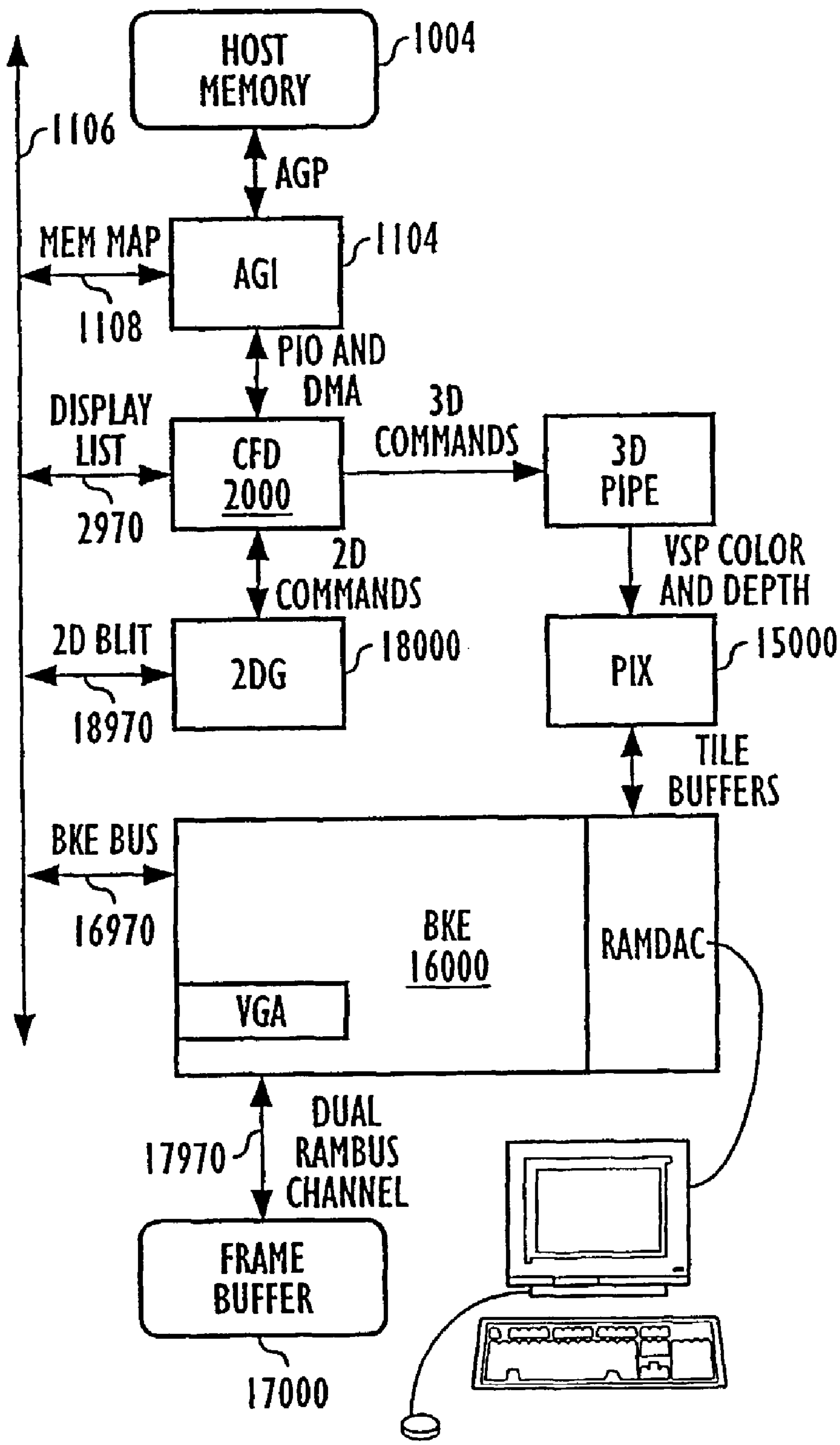
FIG. G47

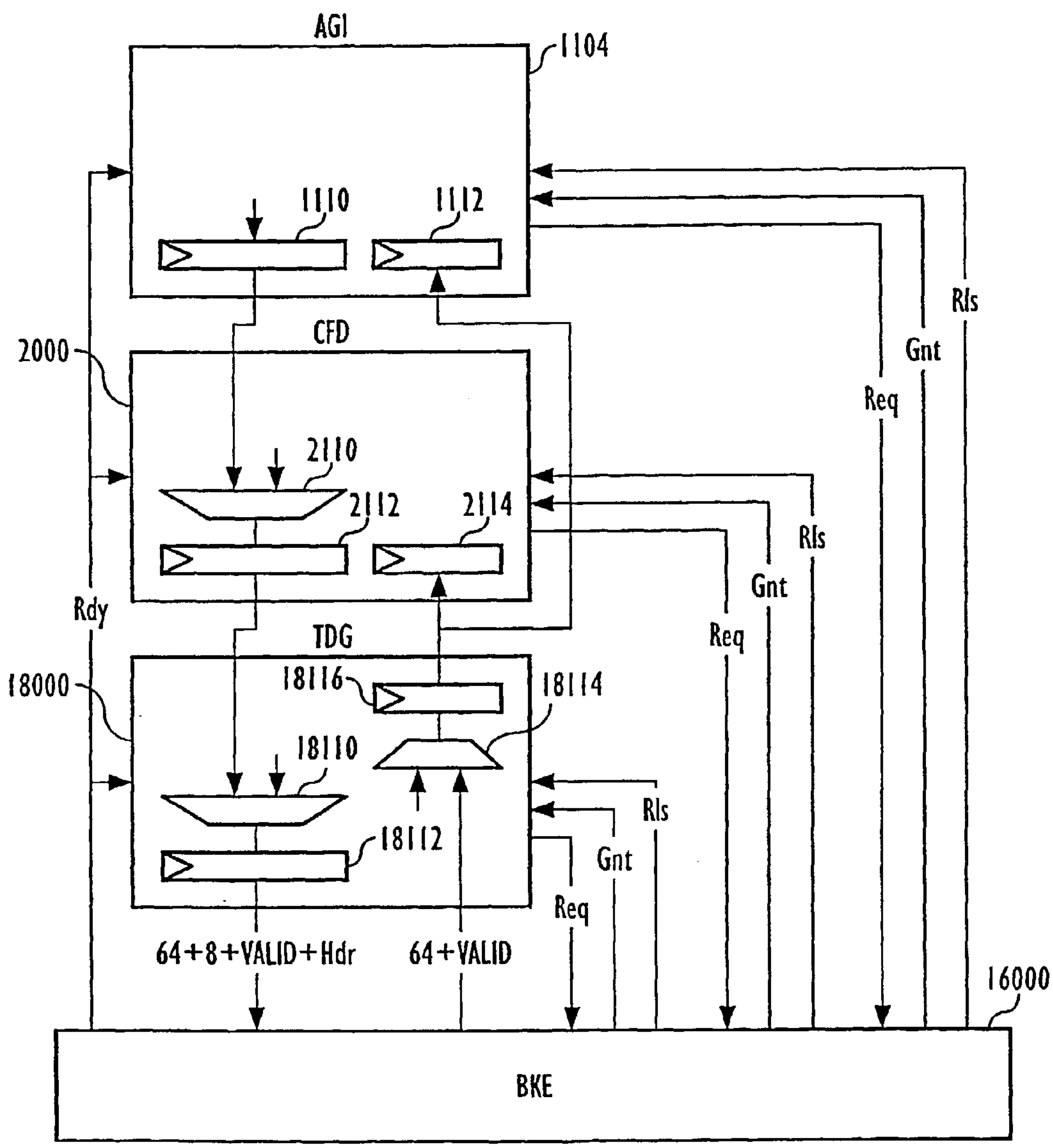
FIG. G48

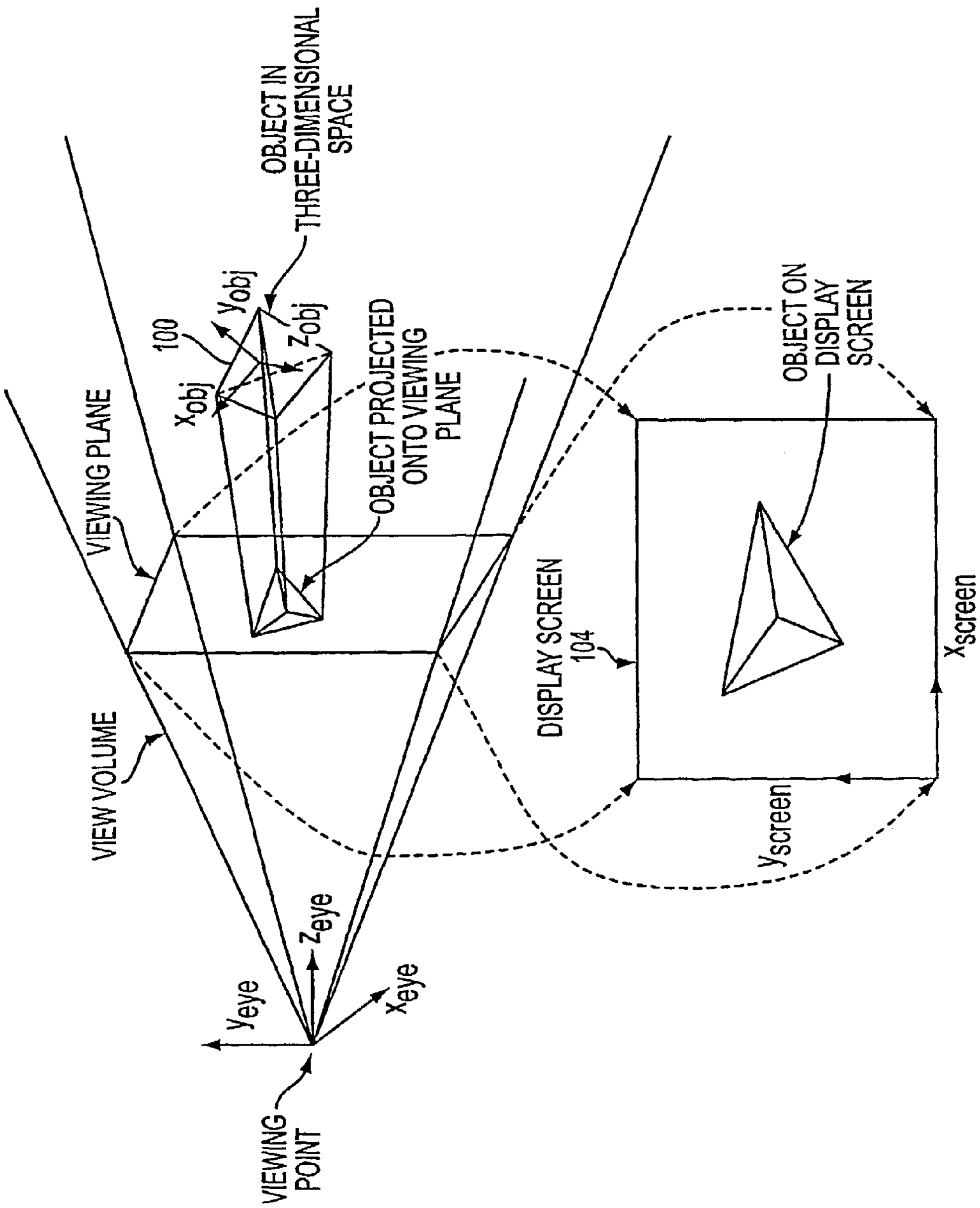
FIG. H1

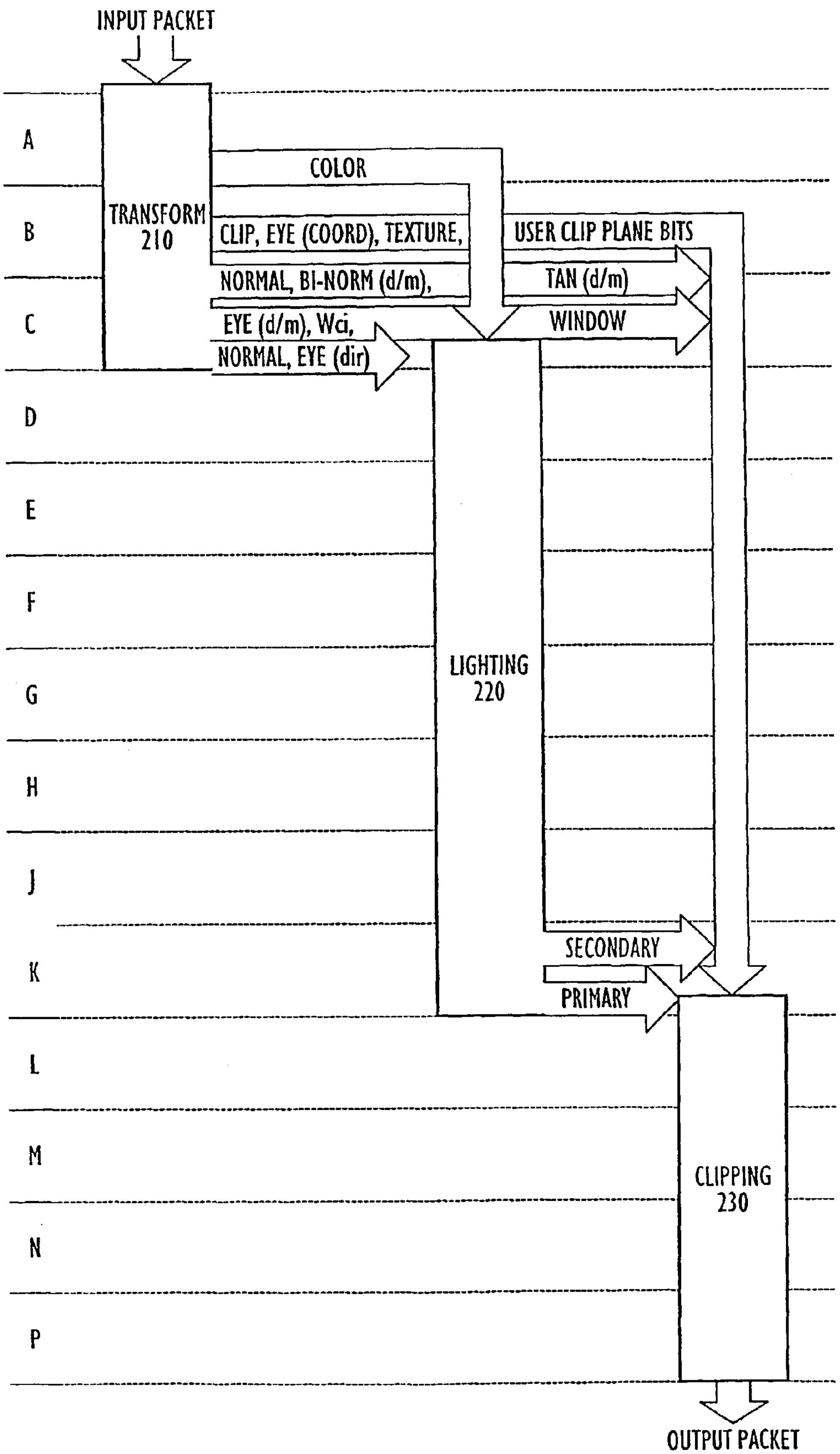
FIG. H2

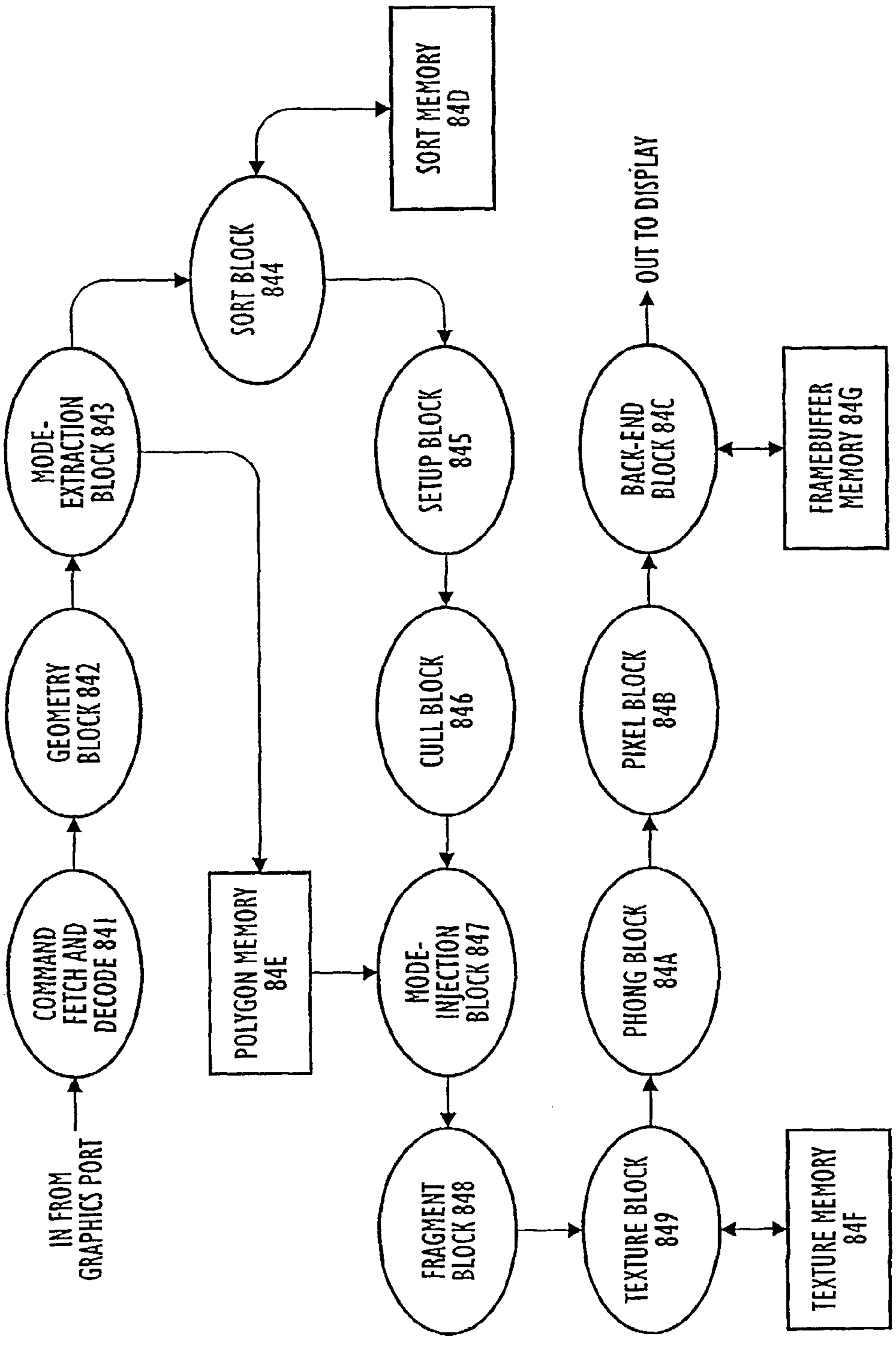
FIG. H3

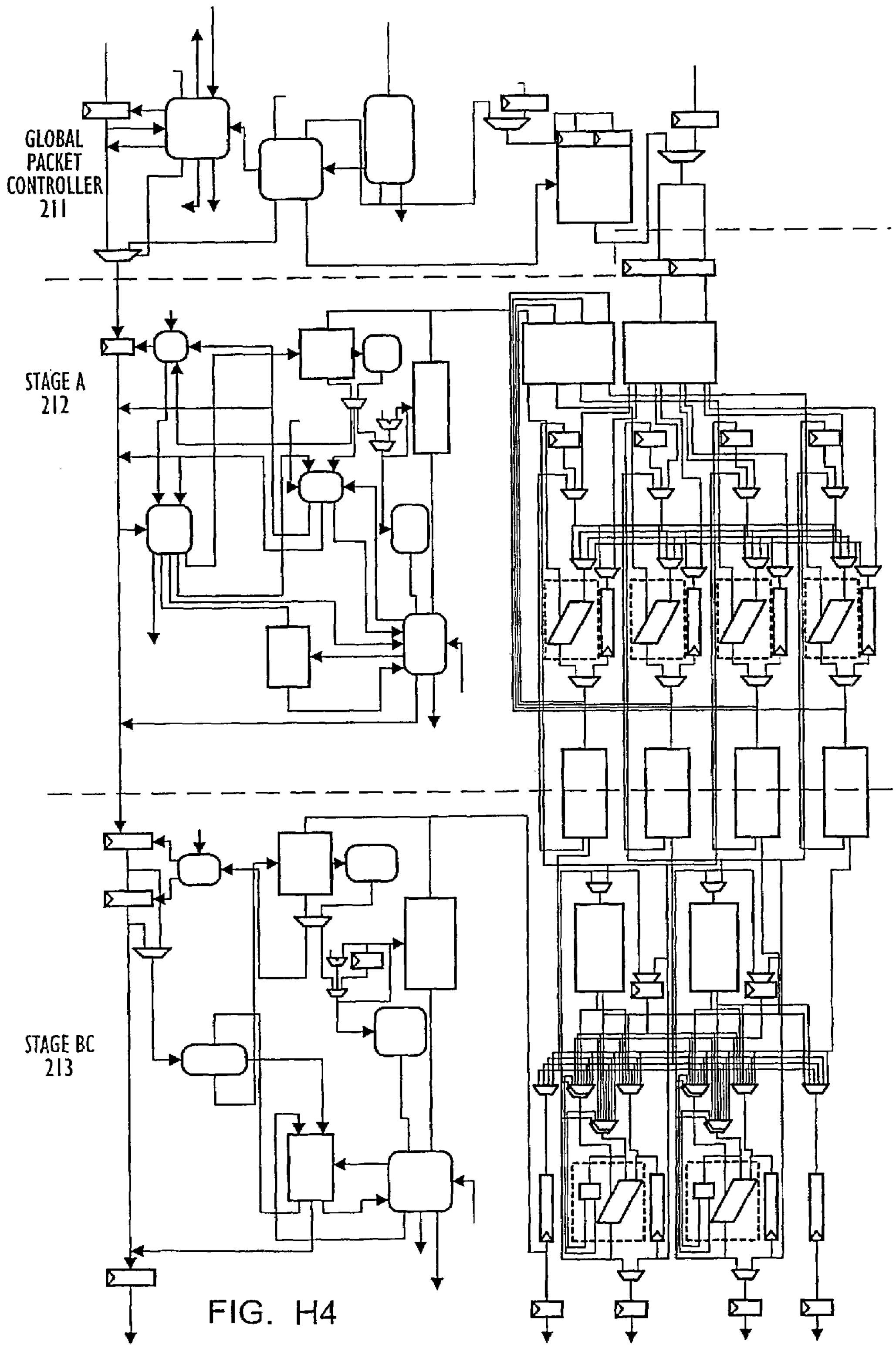
FIG. H4

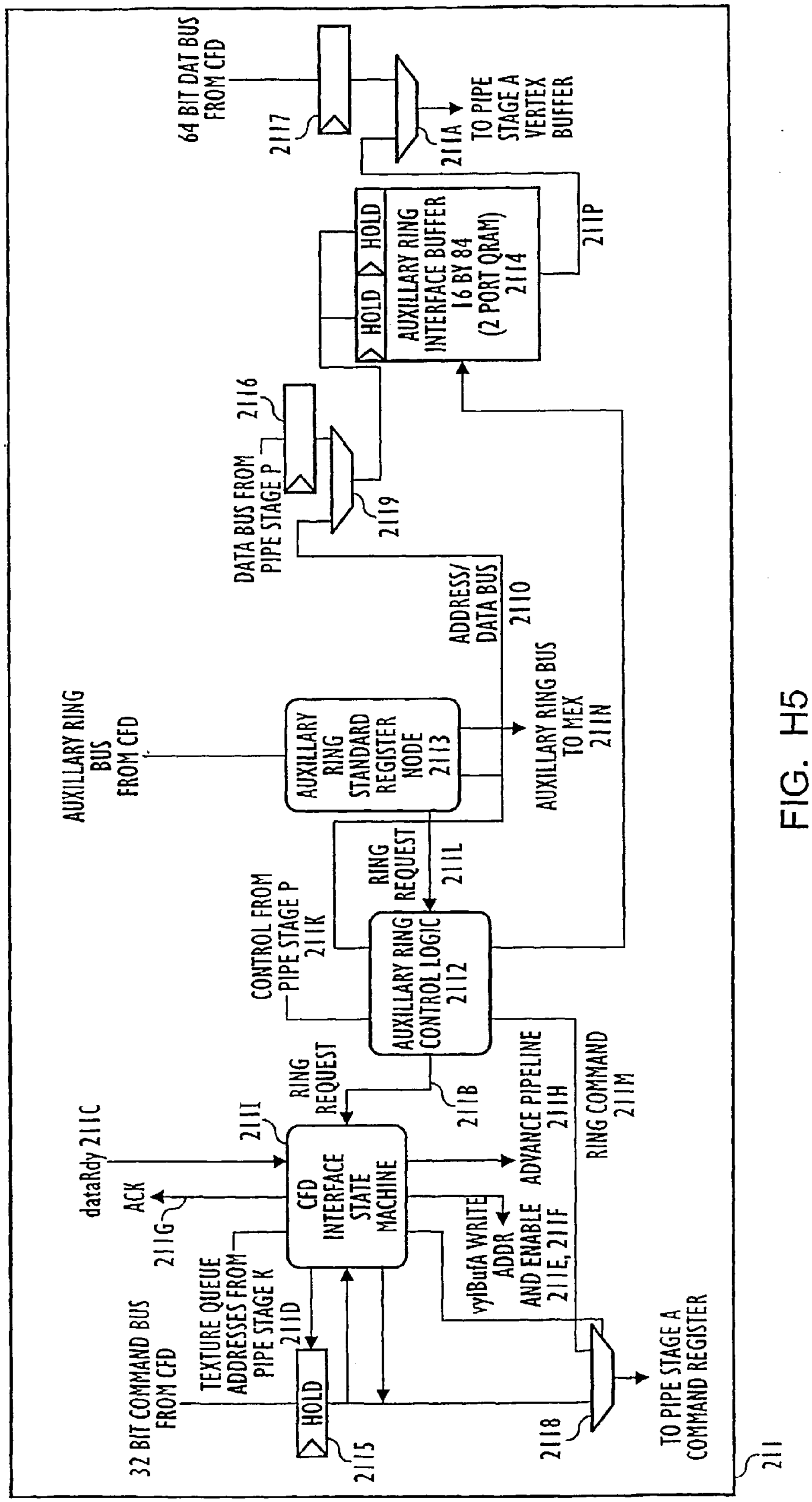
211
FIG. H5

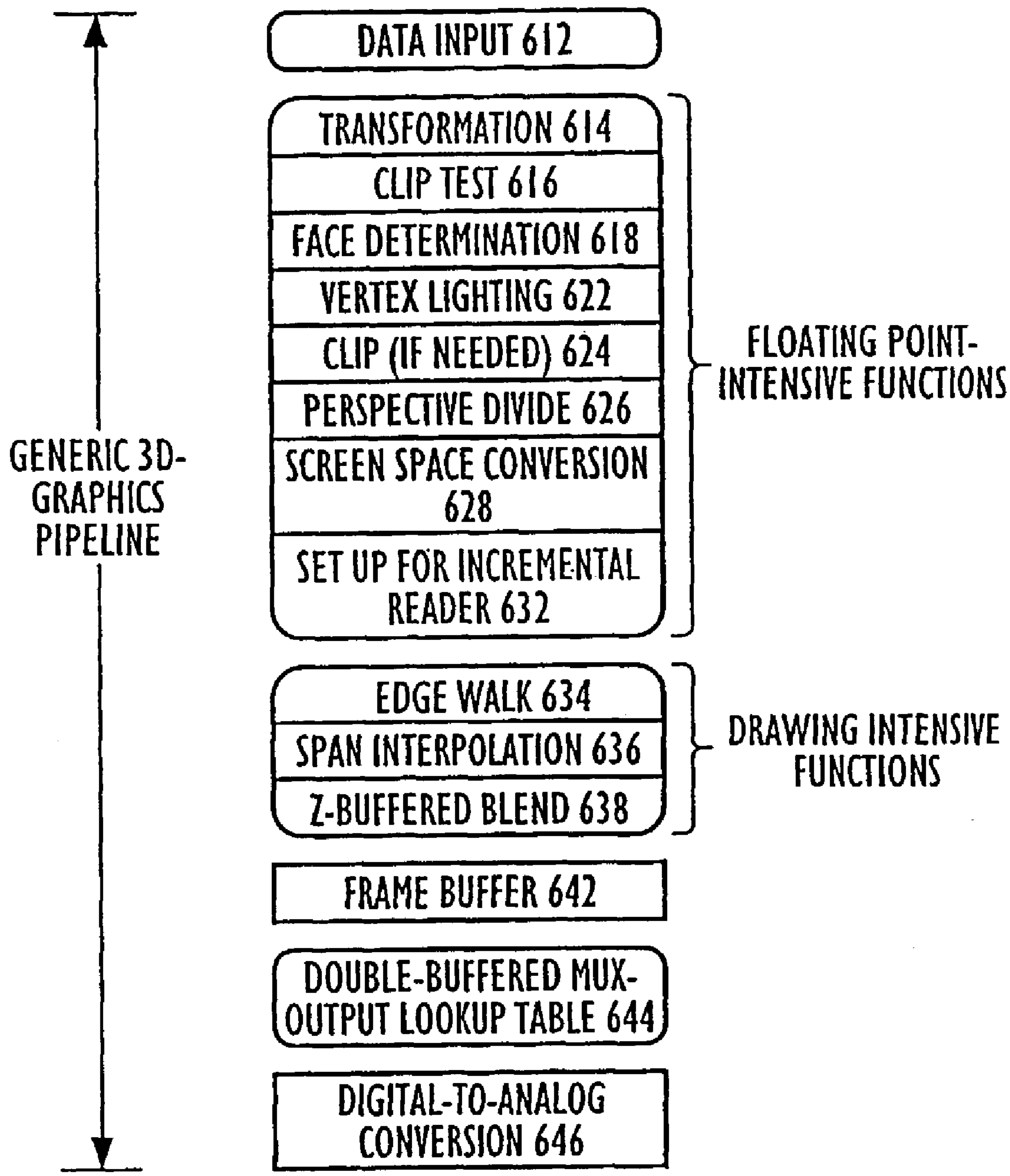
FIG. H6

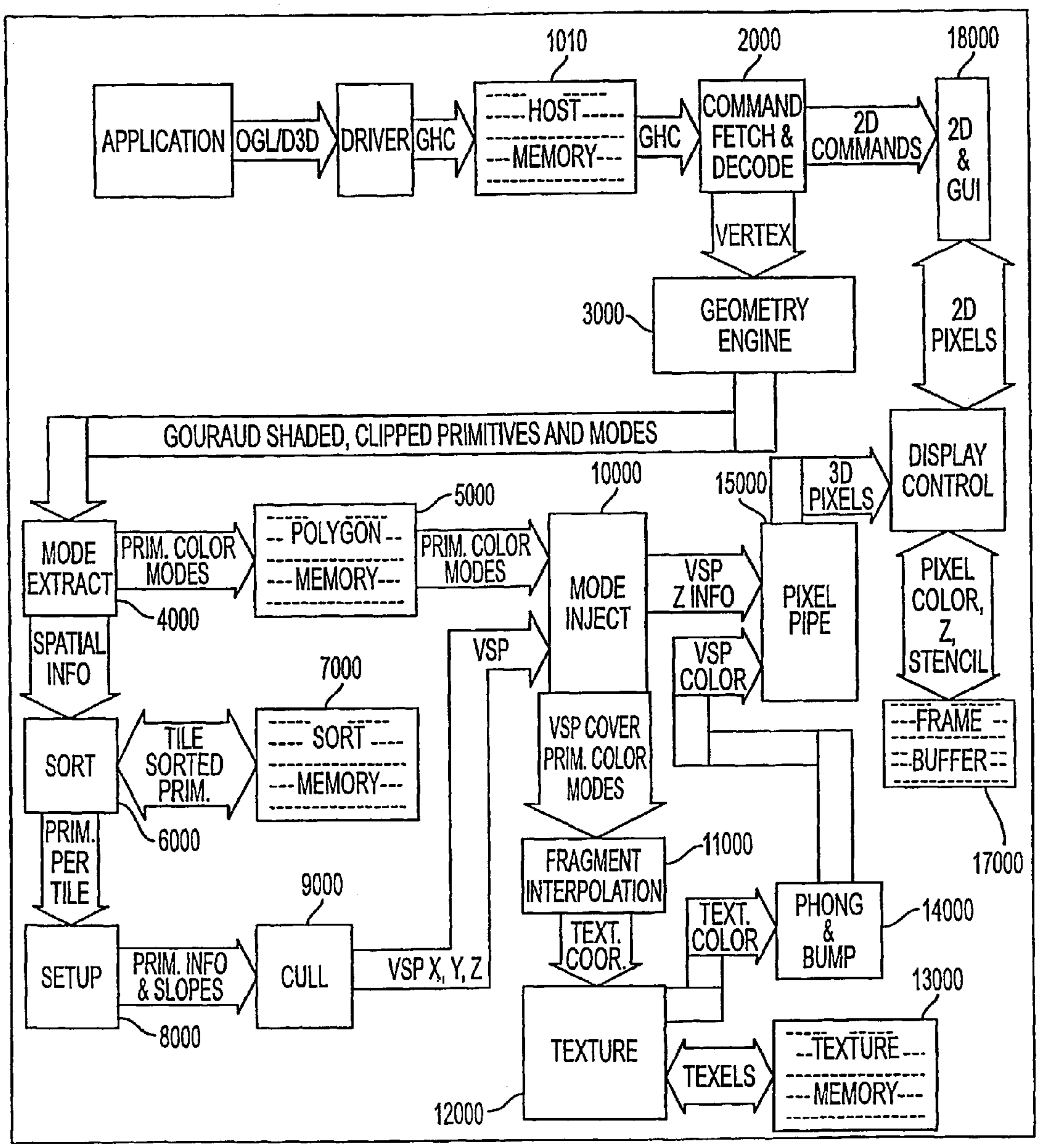
FIG. H7

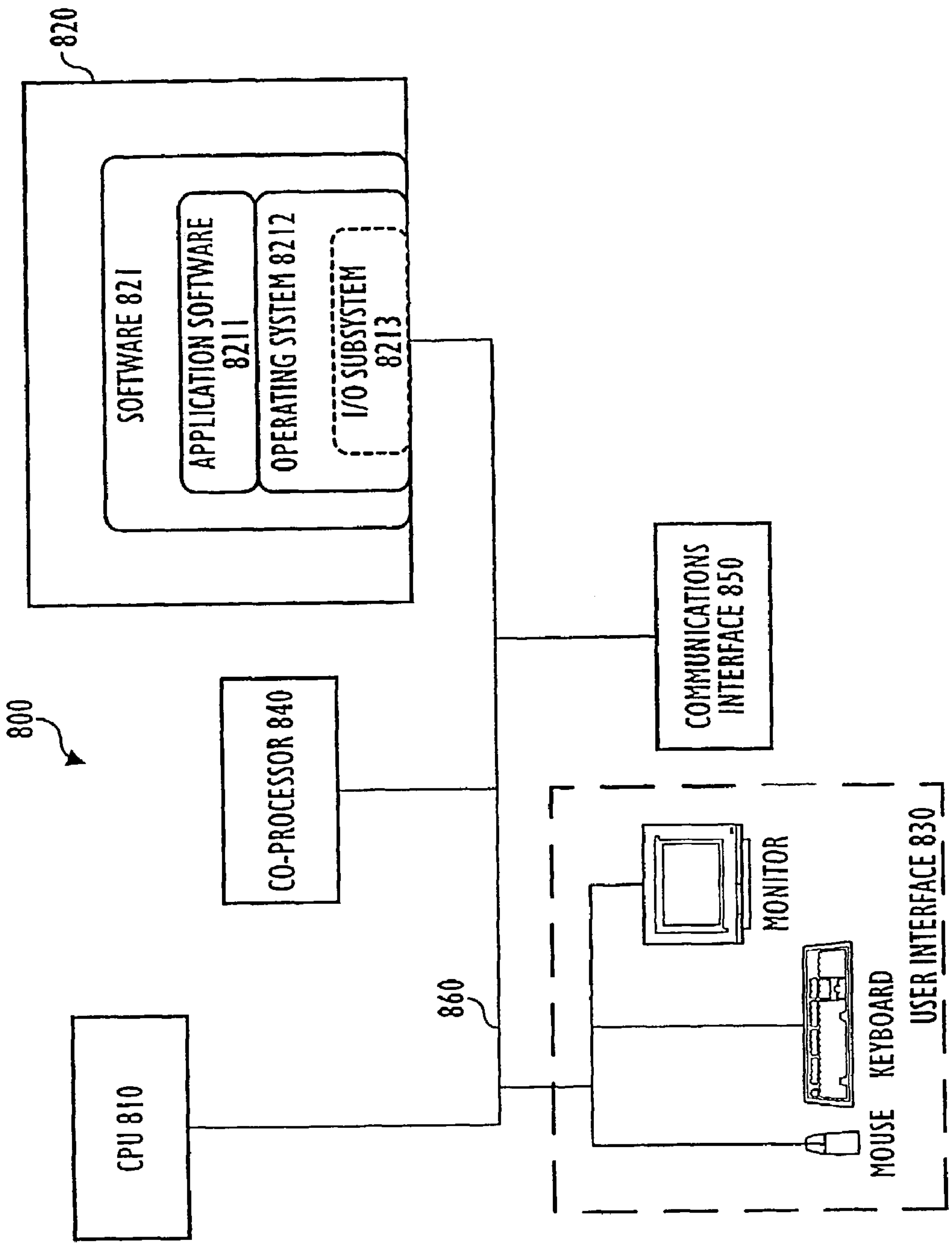
FIG. H8

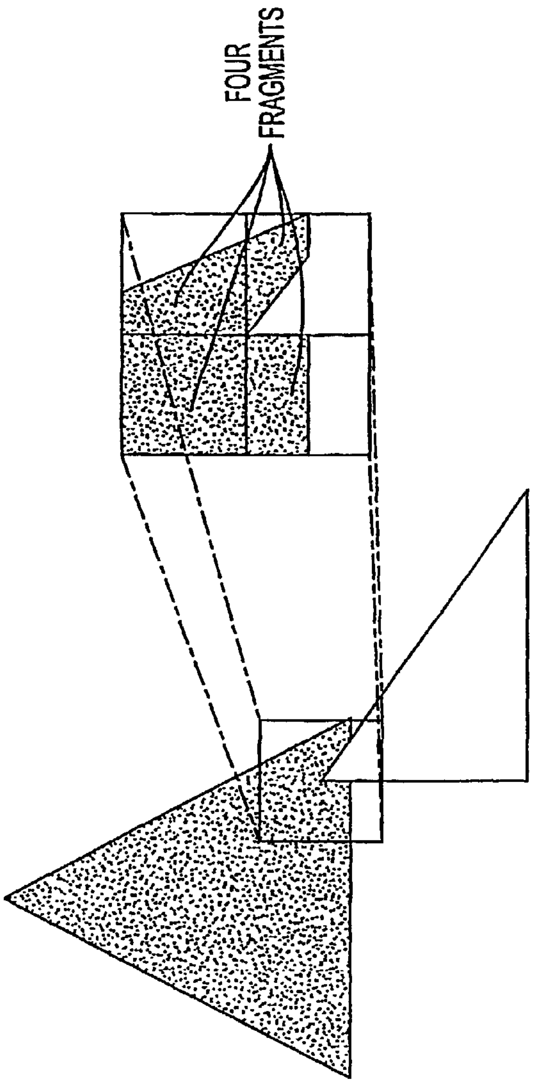
FIG. H9
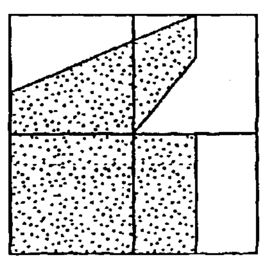
FIG. H10A
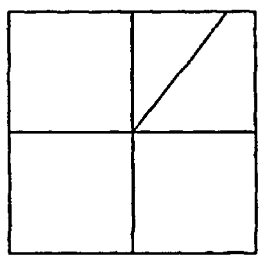
FIG. H10B
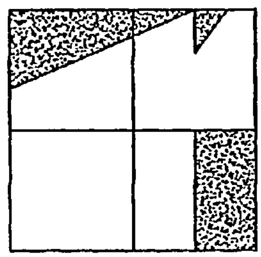
FIG. H10C
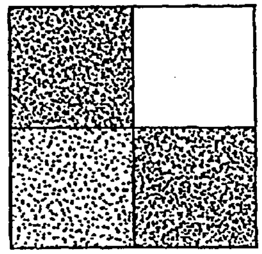
FIG. H10D

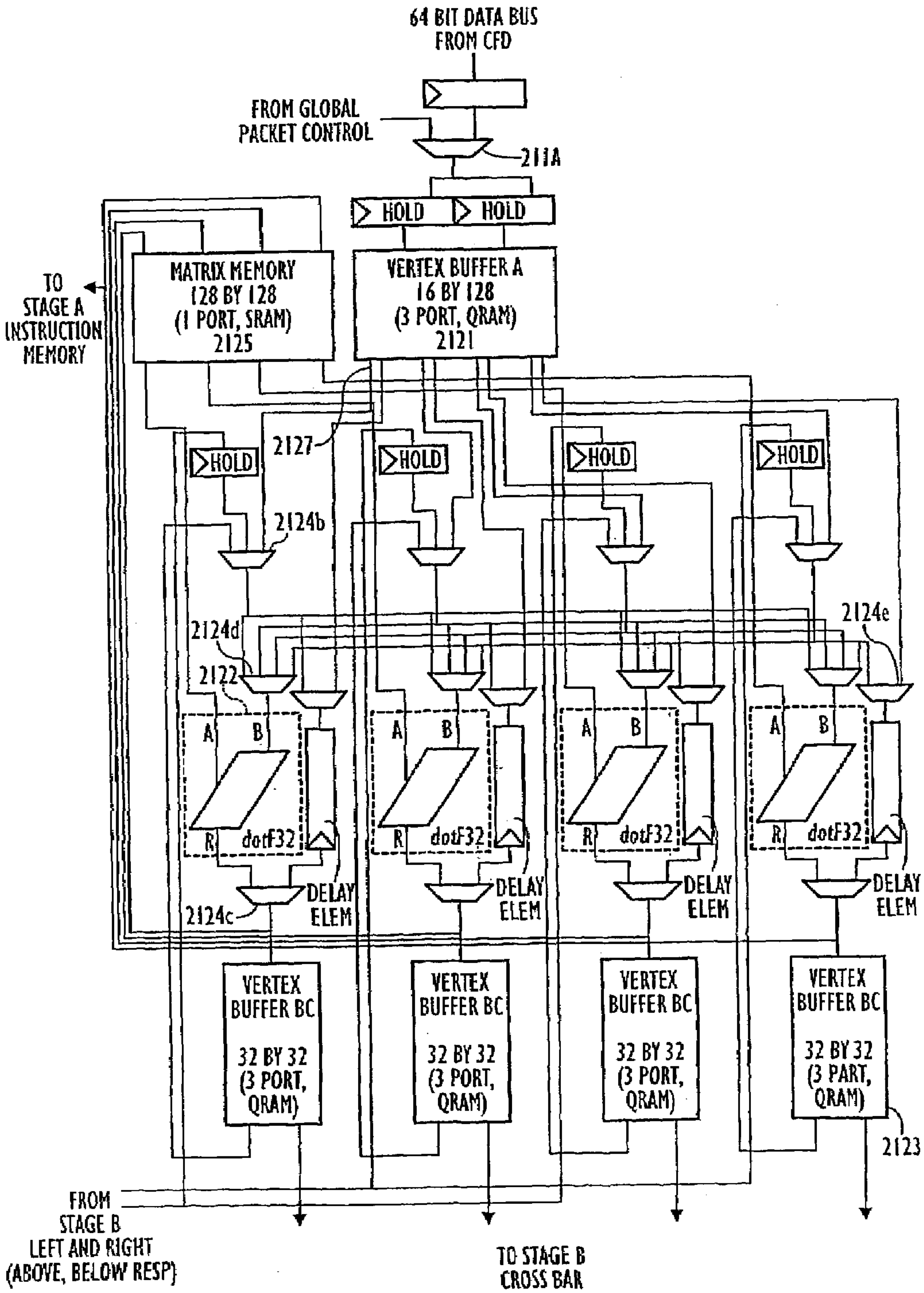
FIG. H11

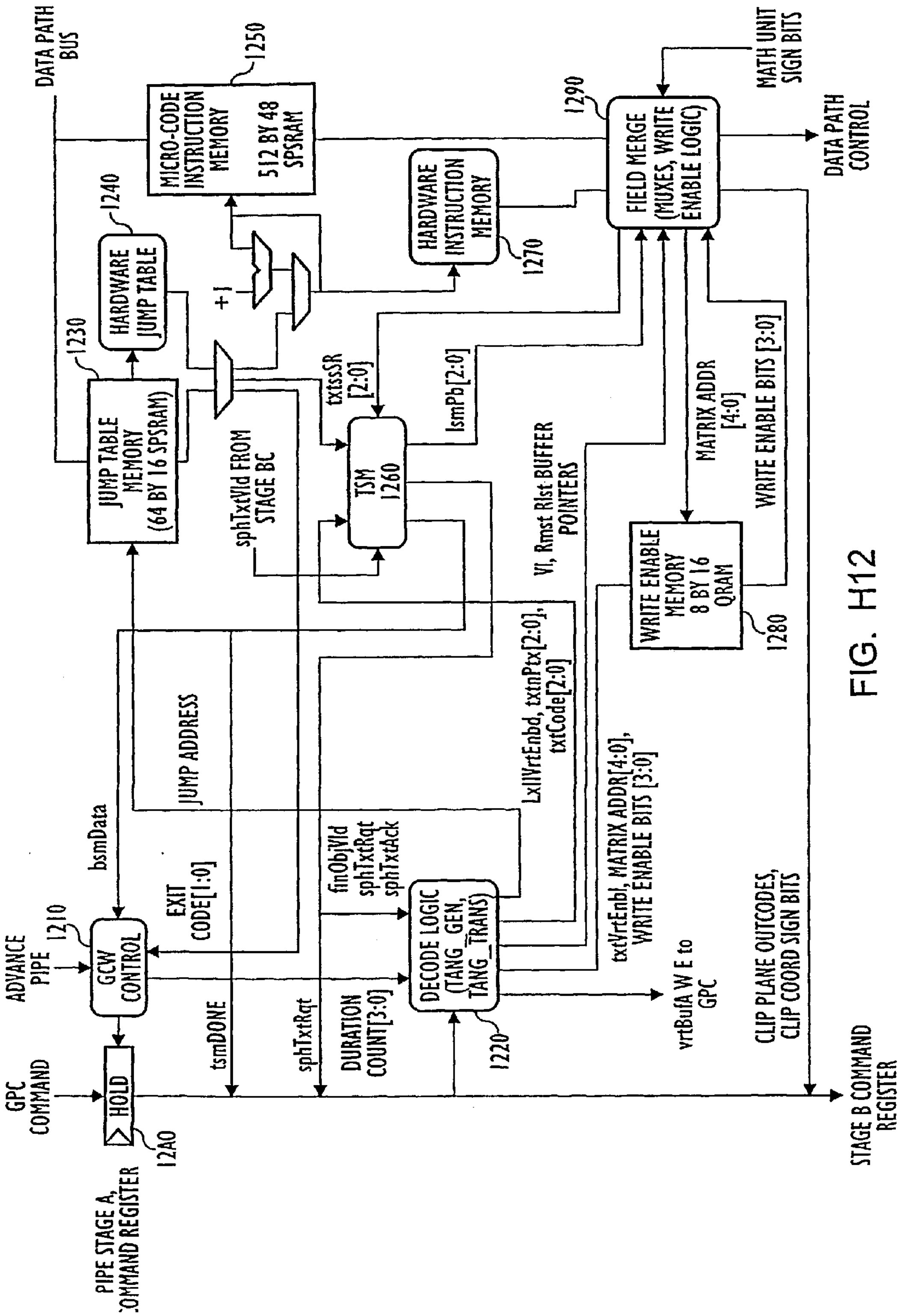
FIG. H12

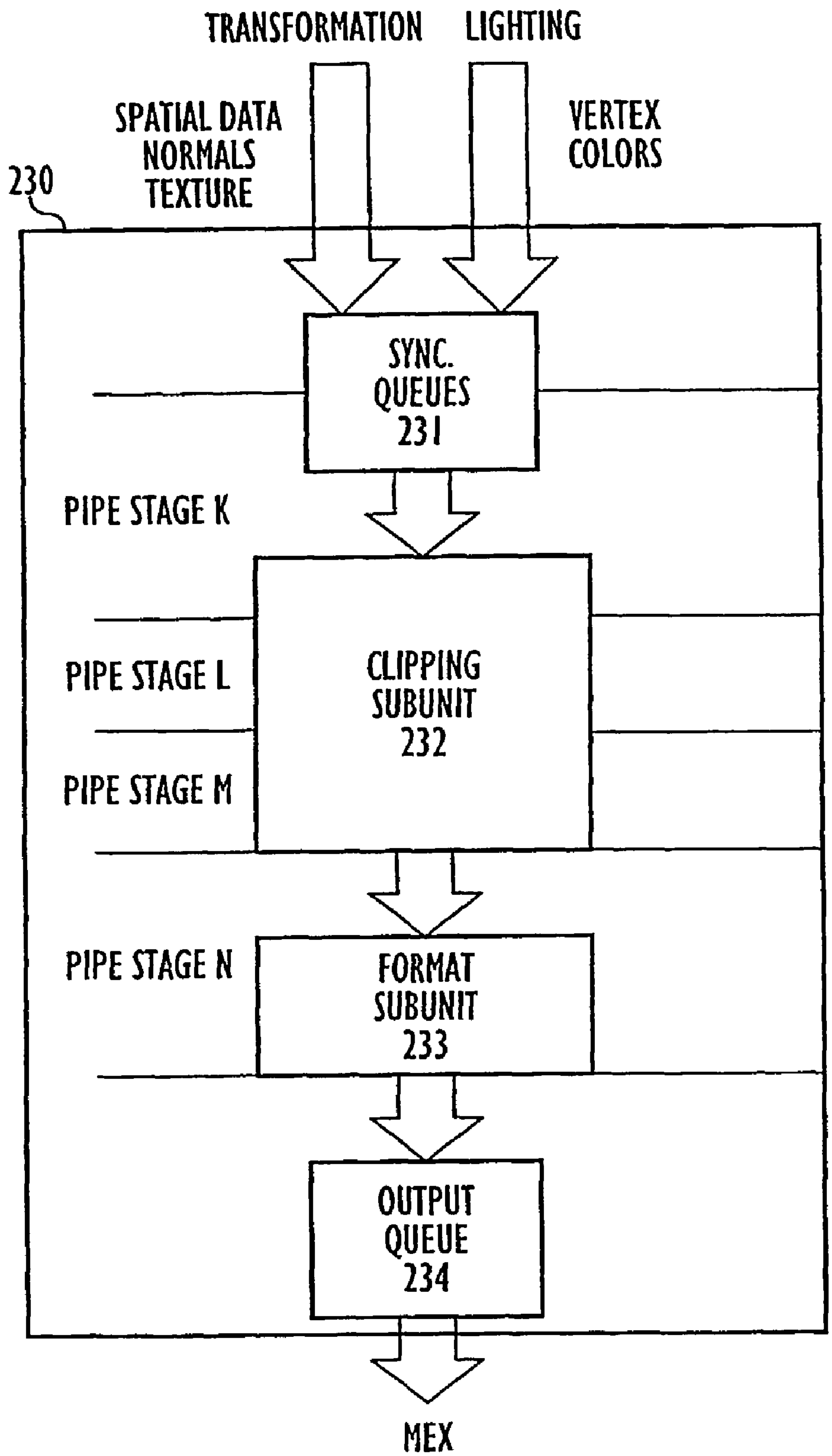
FIG. H13

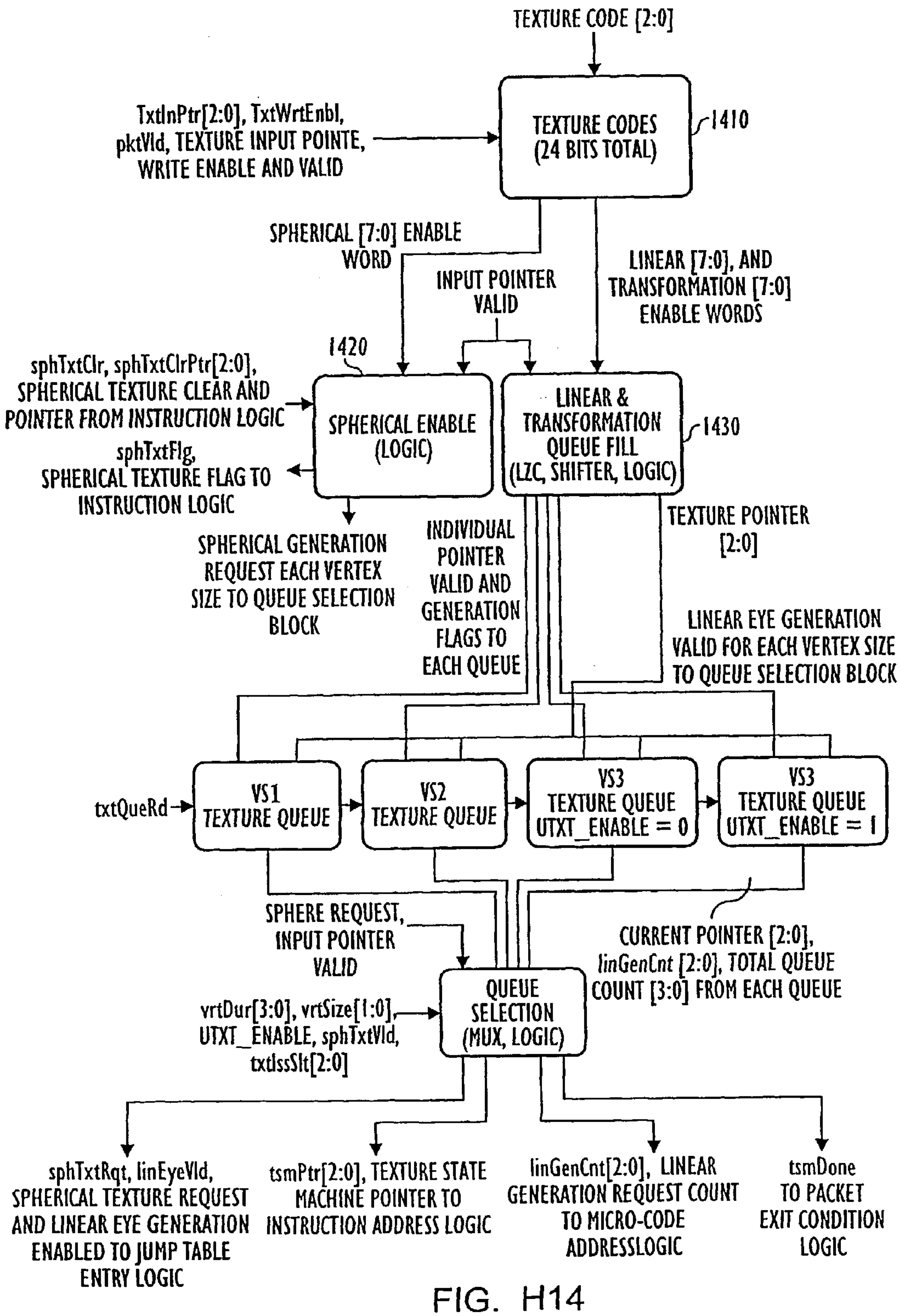
FIG. H14

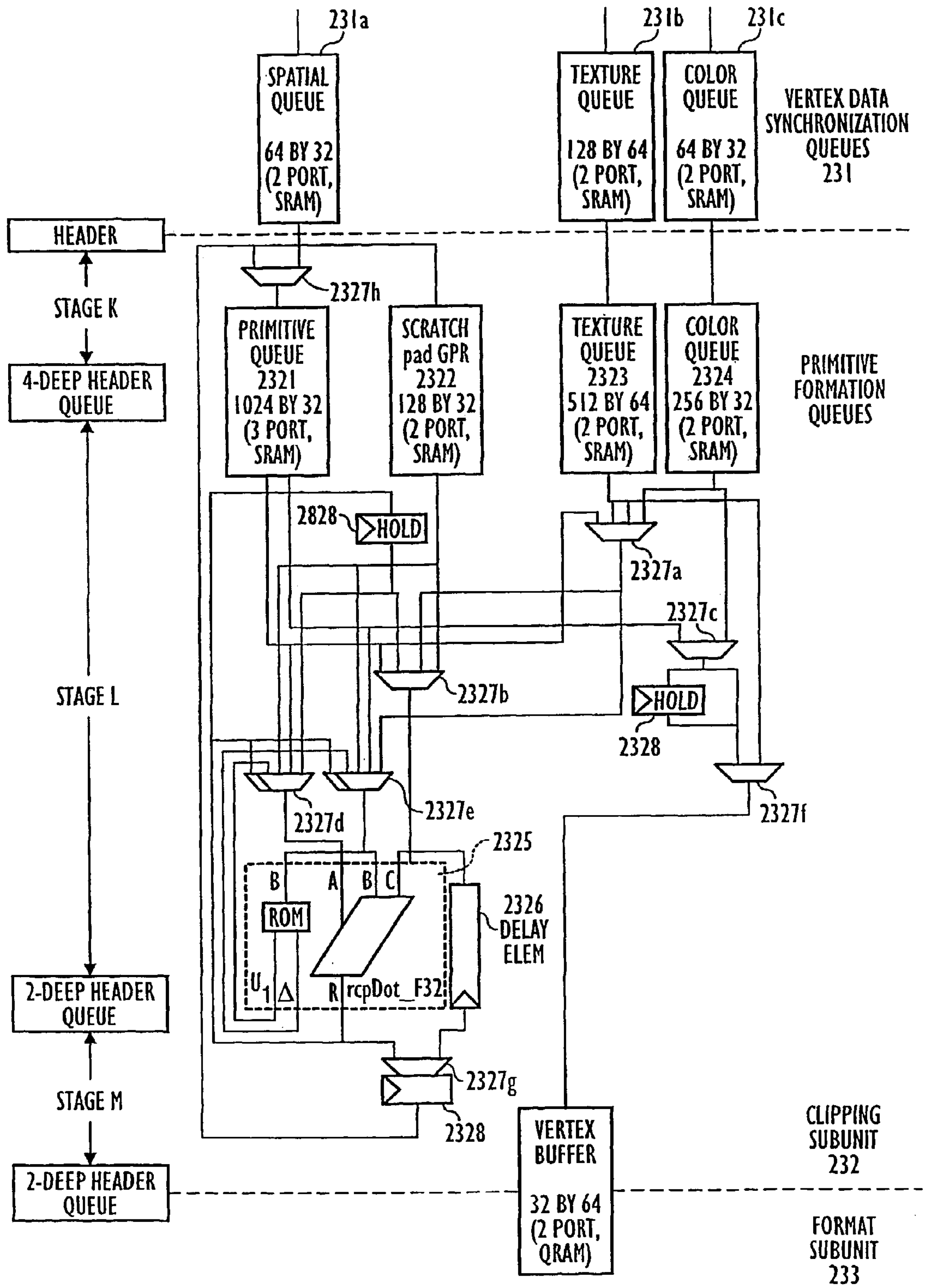
FIG. H15

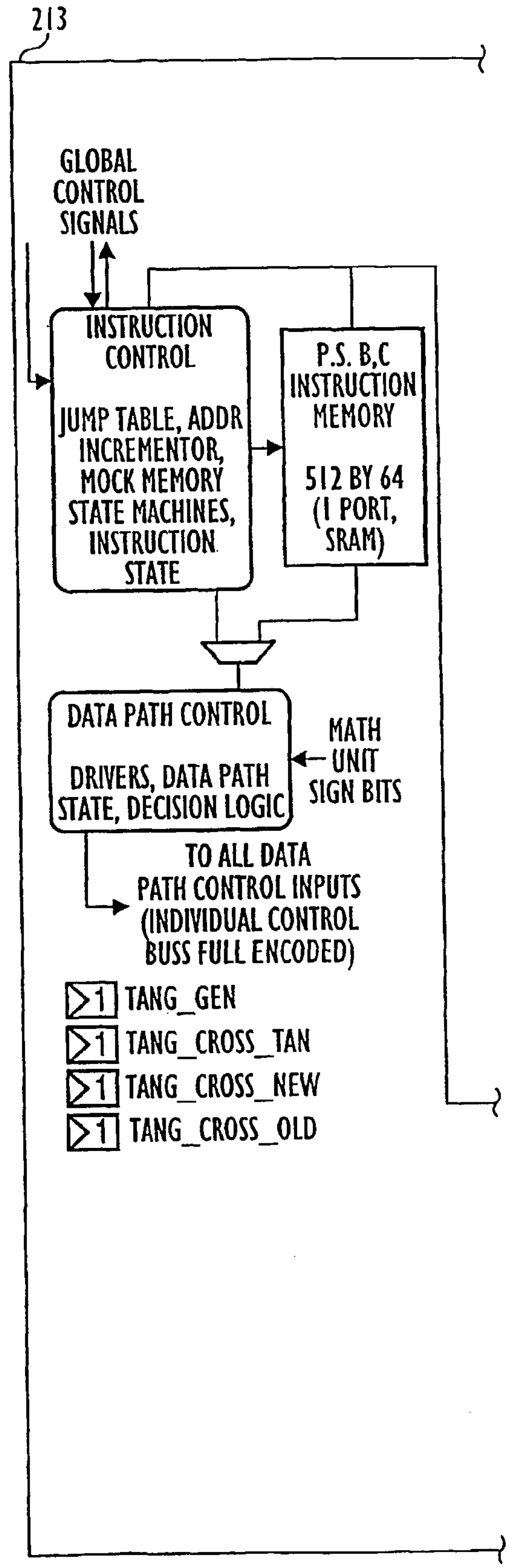
FIG. H16A

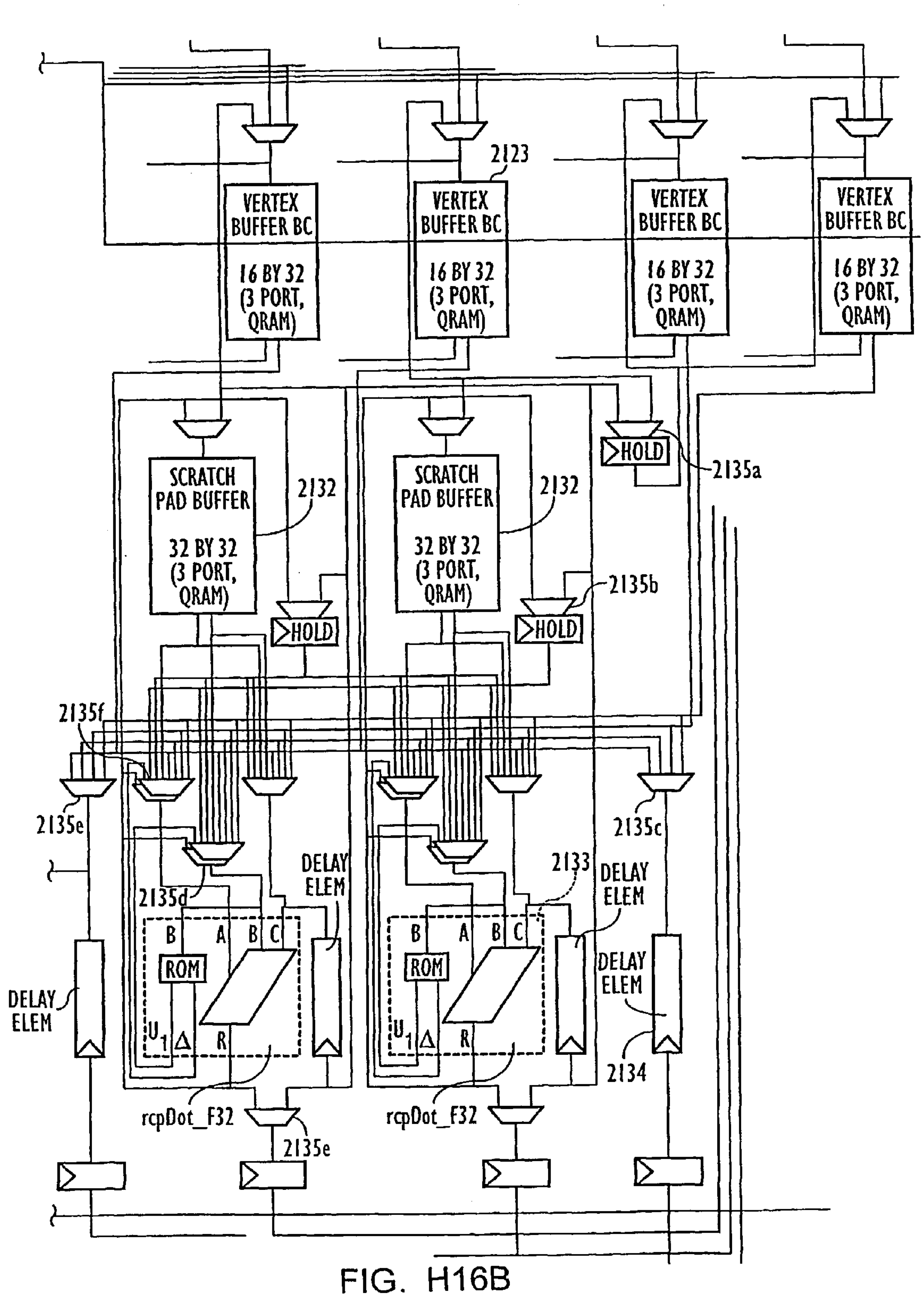
FIG. H16B

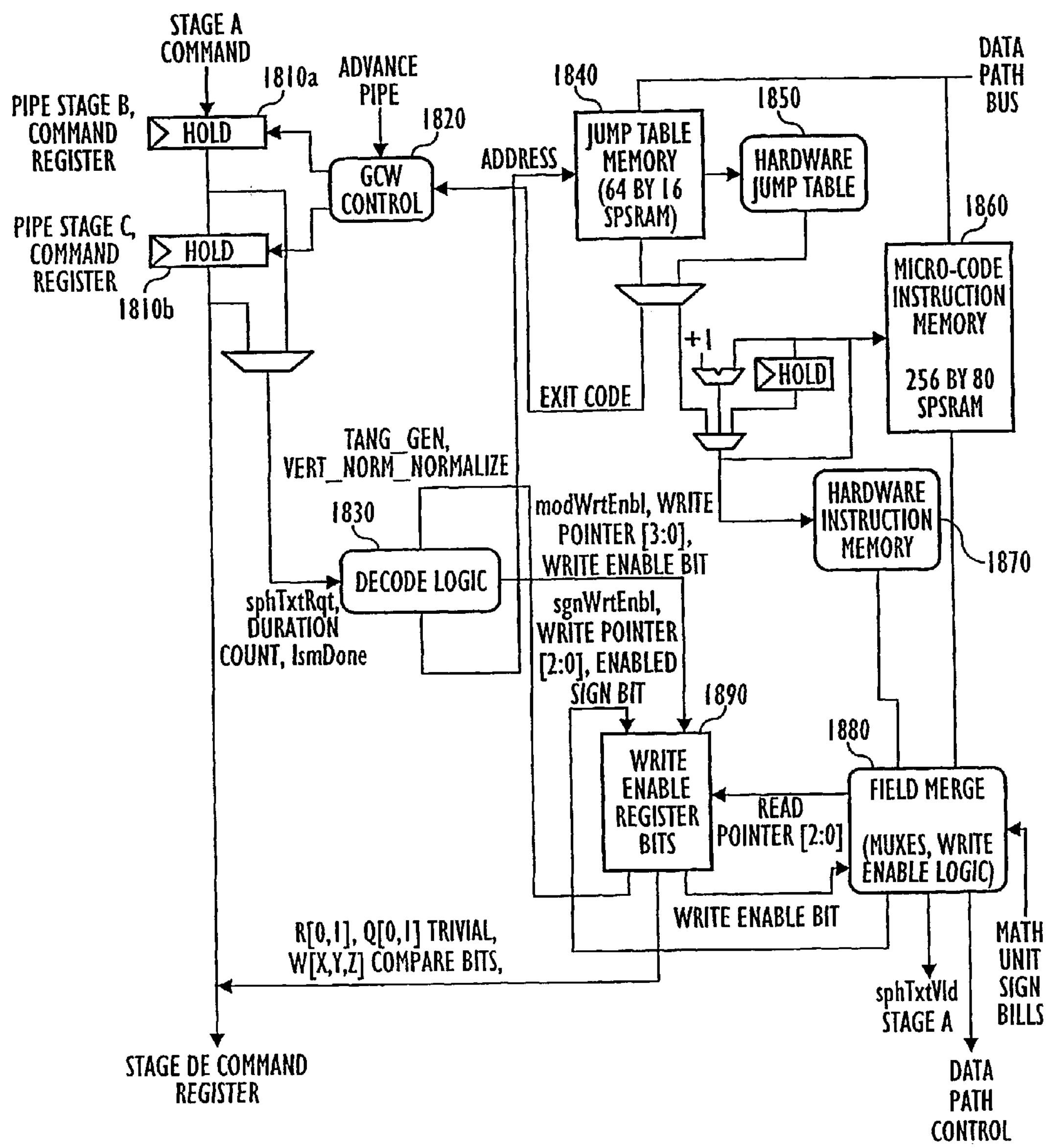
FIG. H17

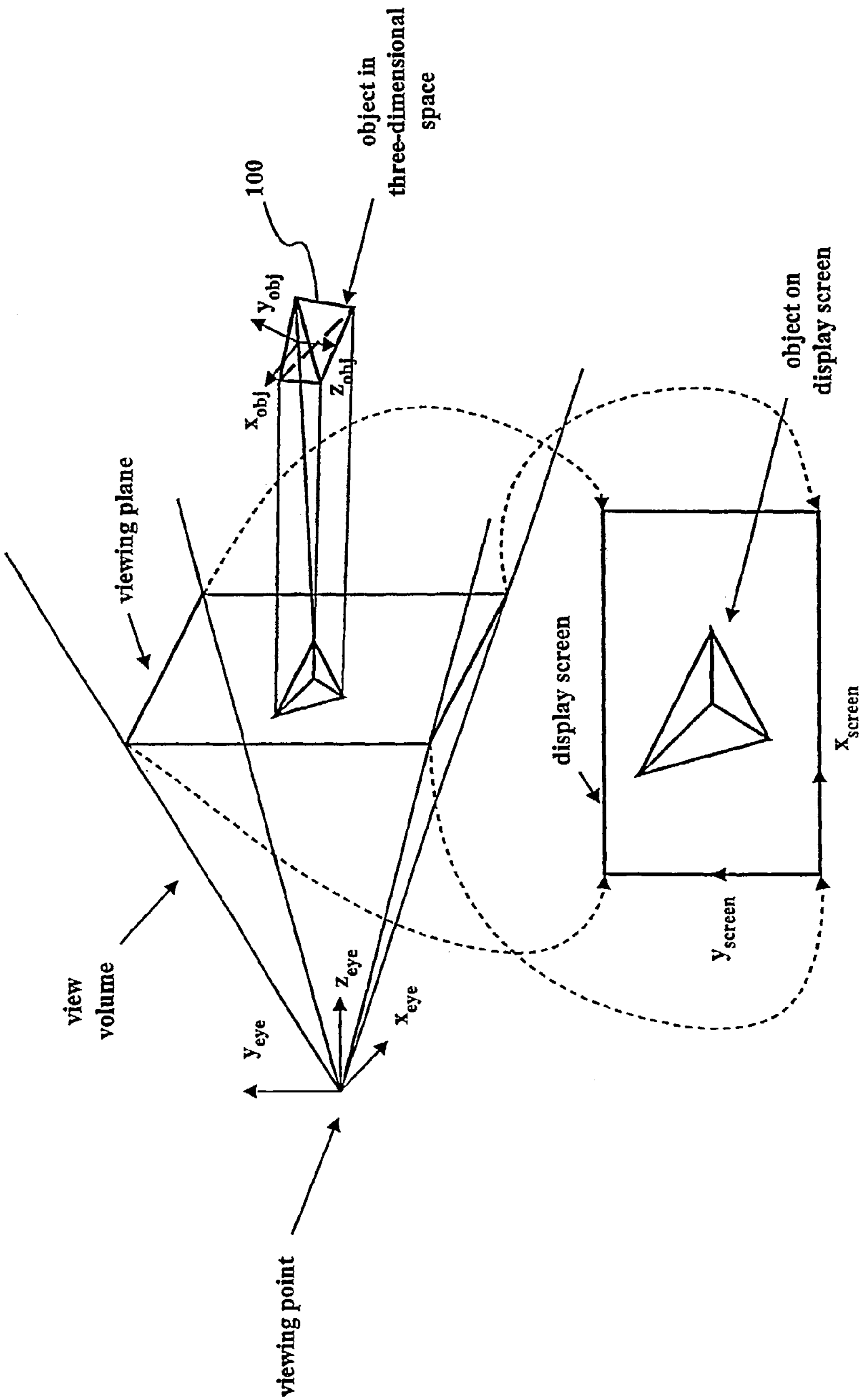
FIG. J1

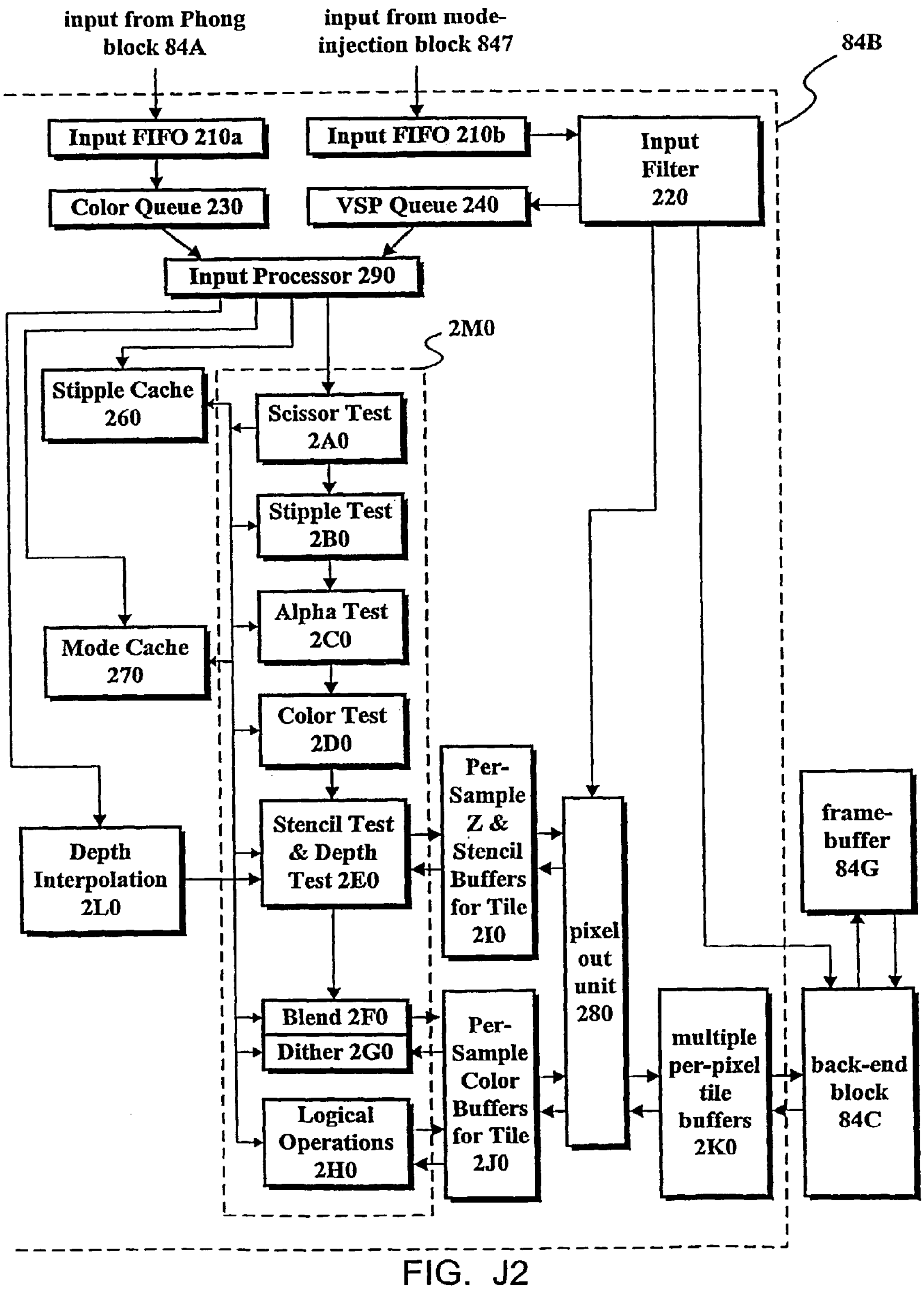
FIG. J2

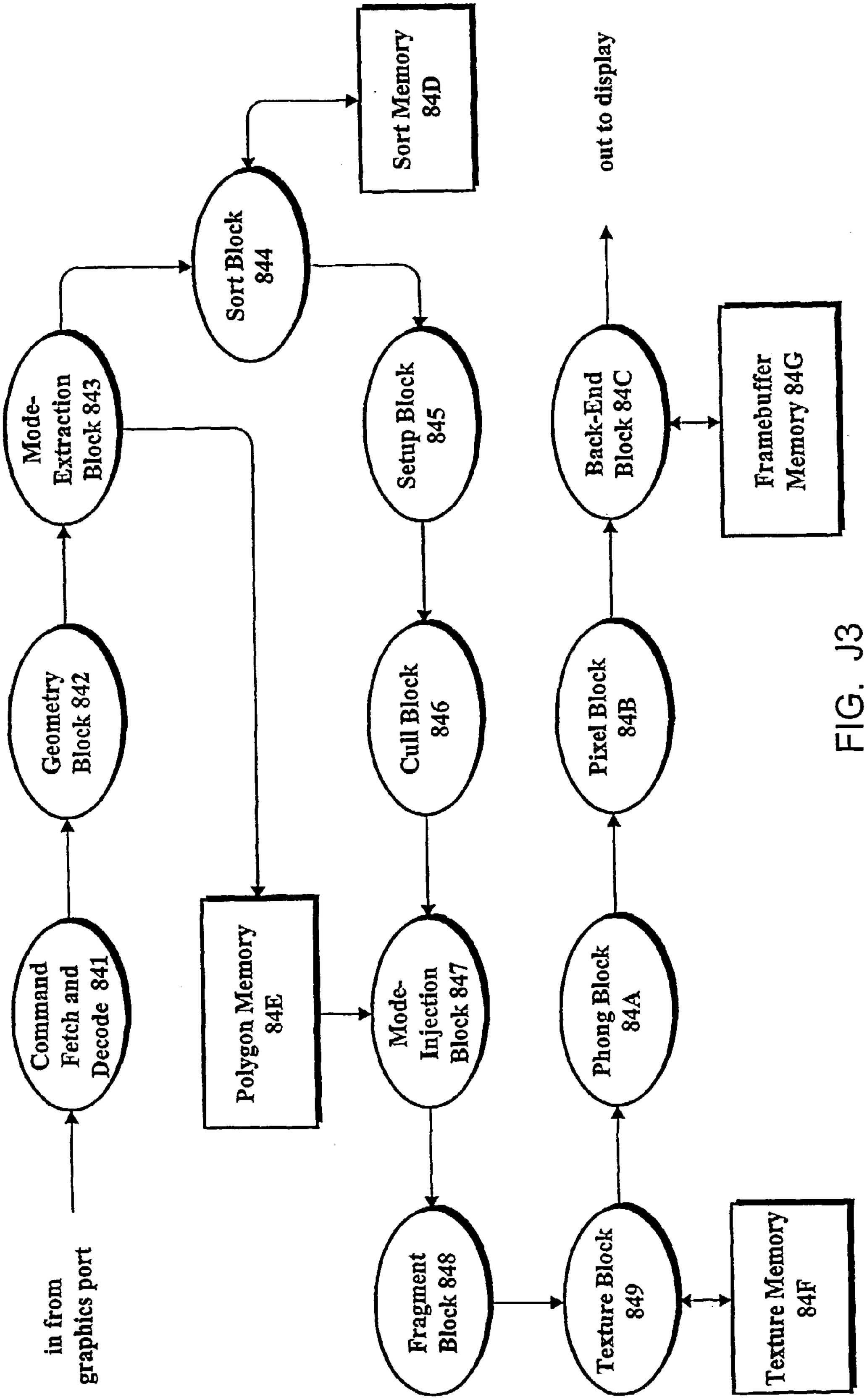
FIG. J3

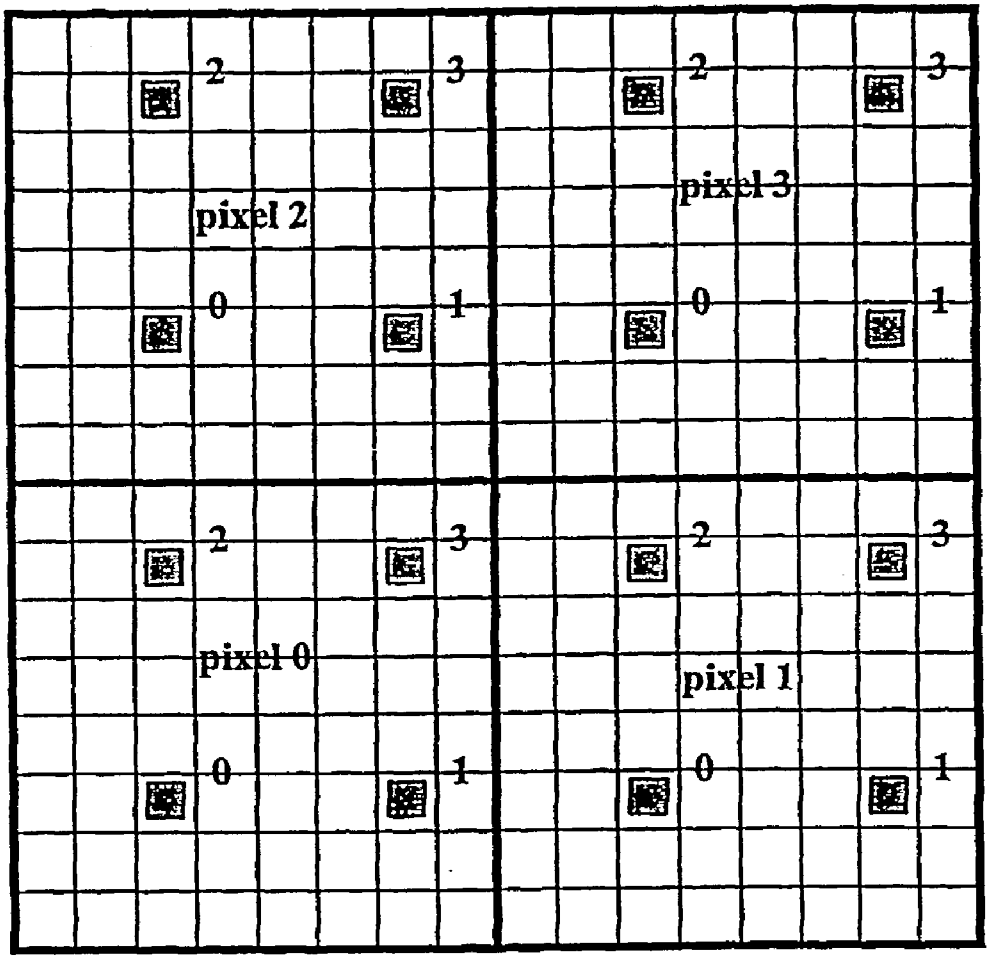
FIG. J4

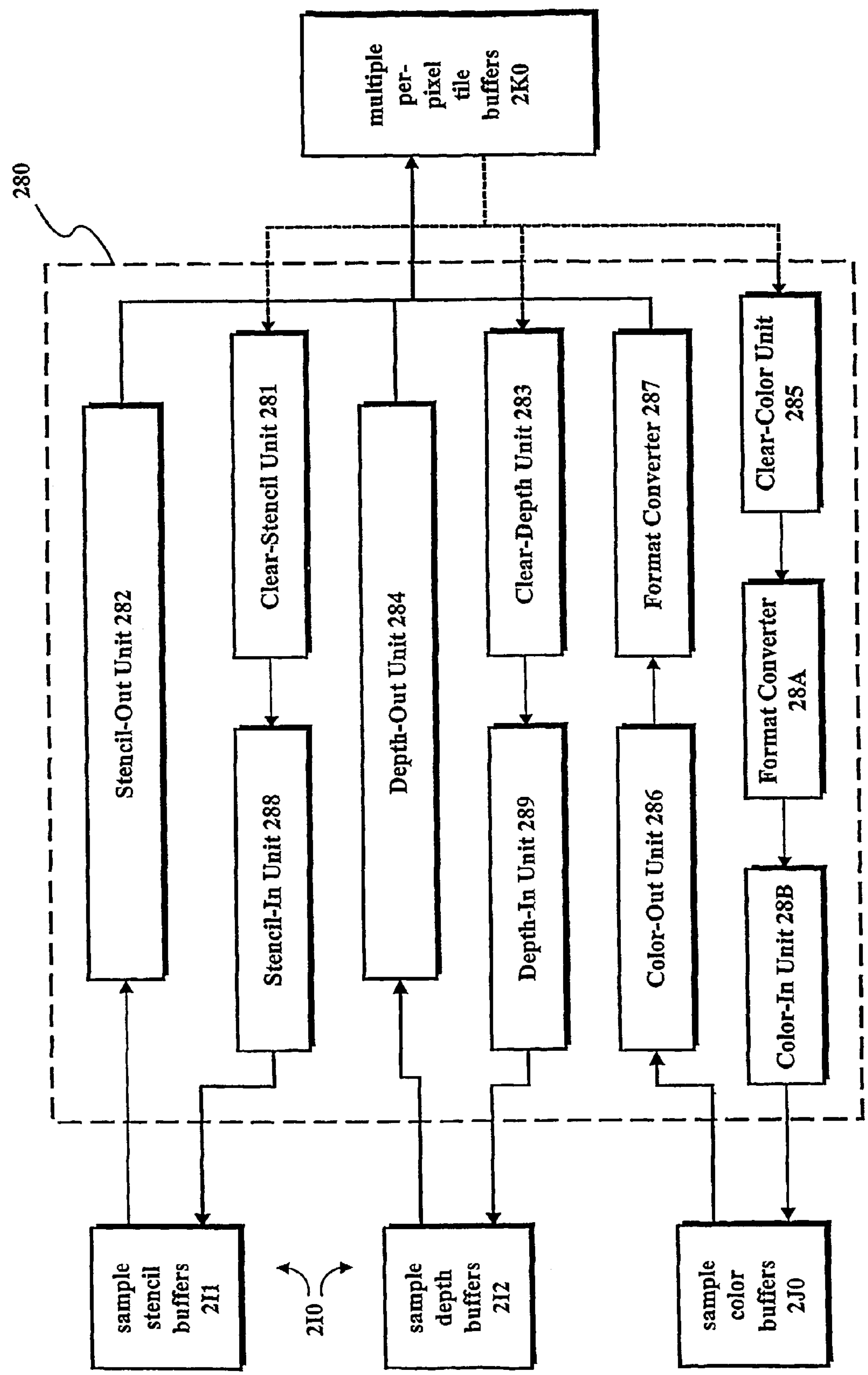
FIG. J5

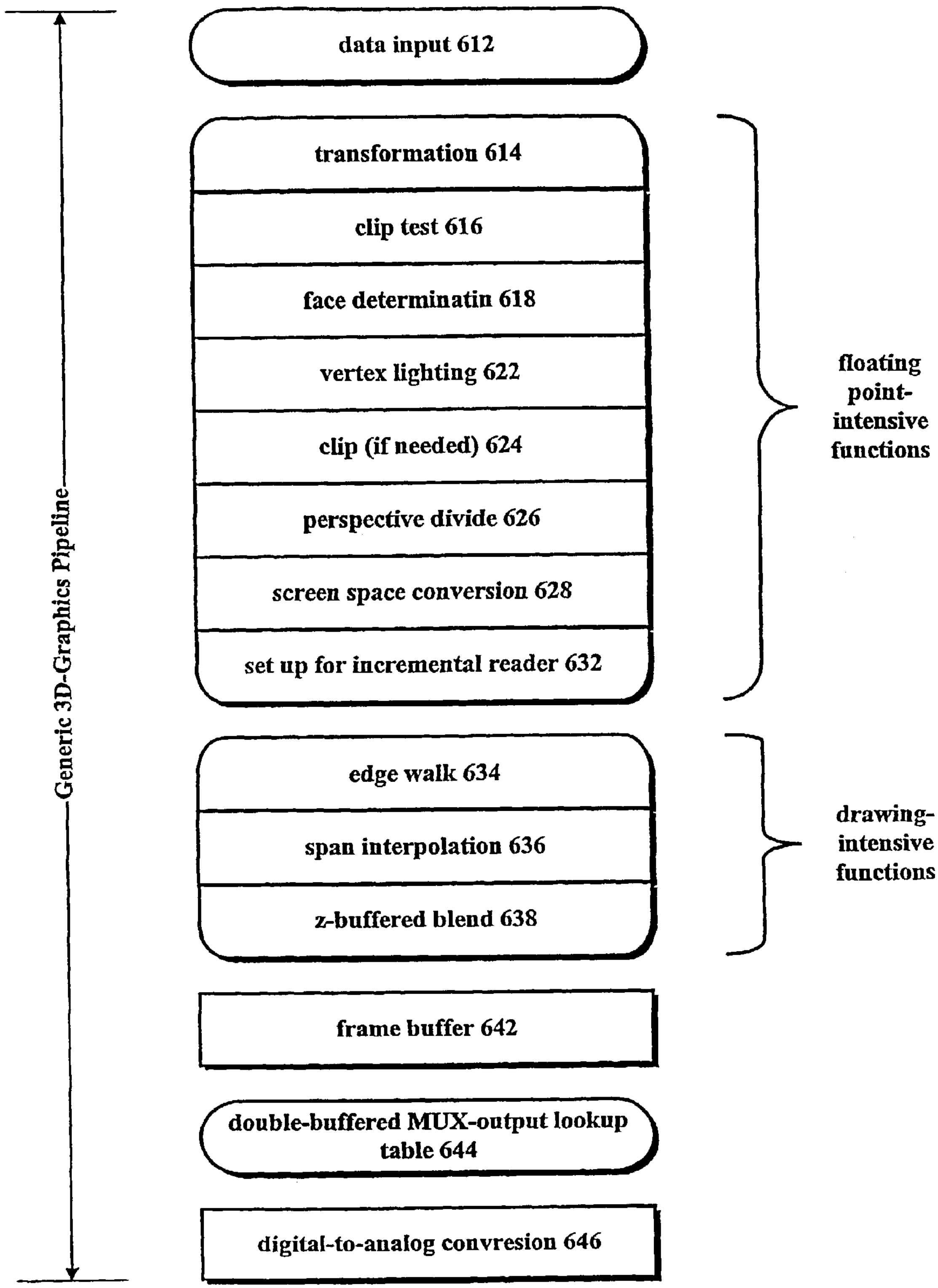
FIG. J6

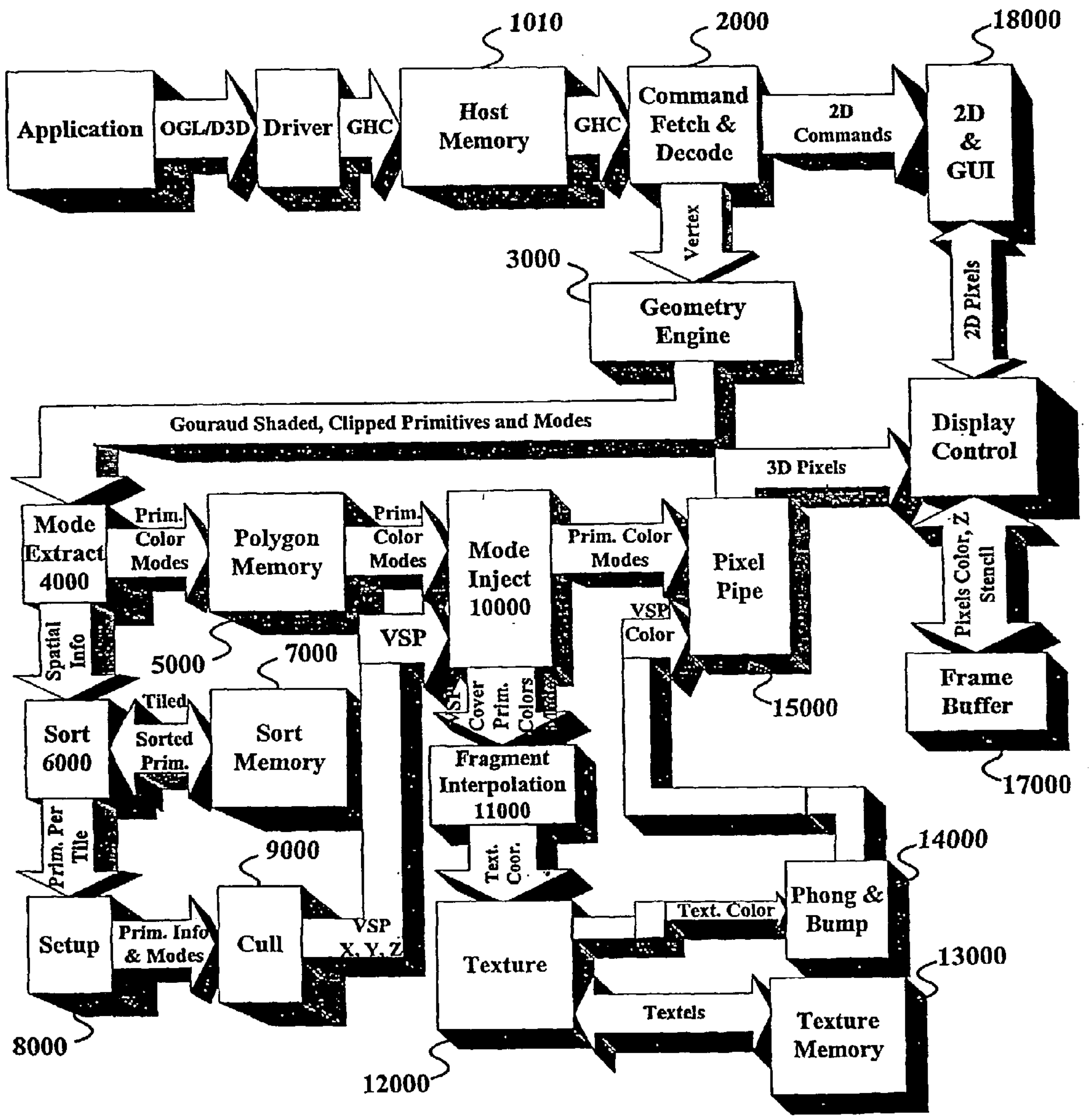
FIG. J7

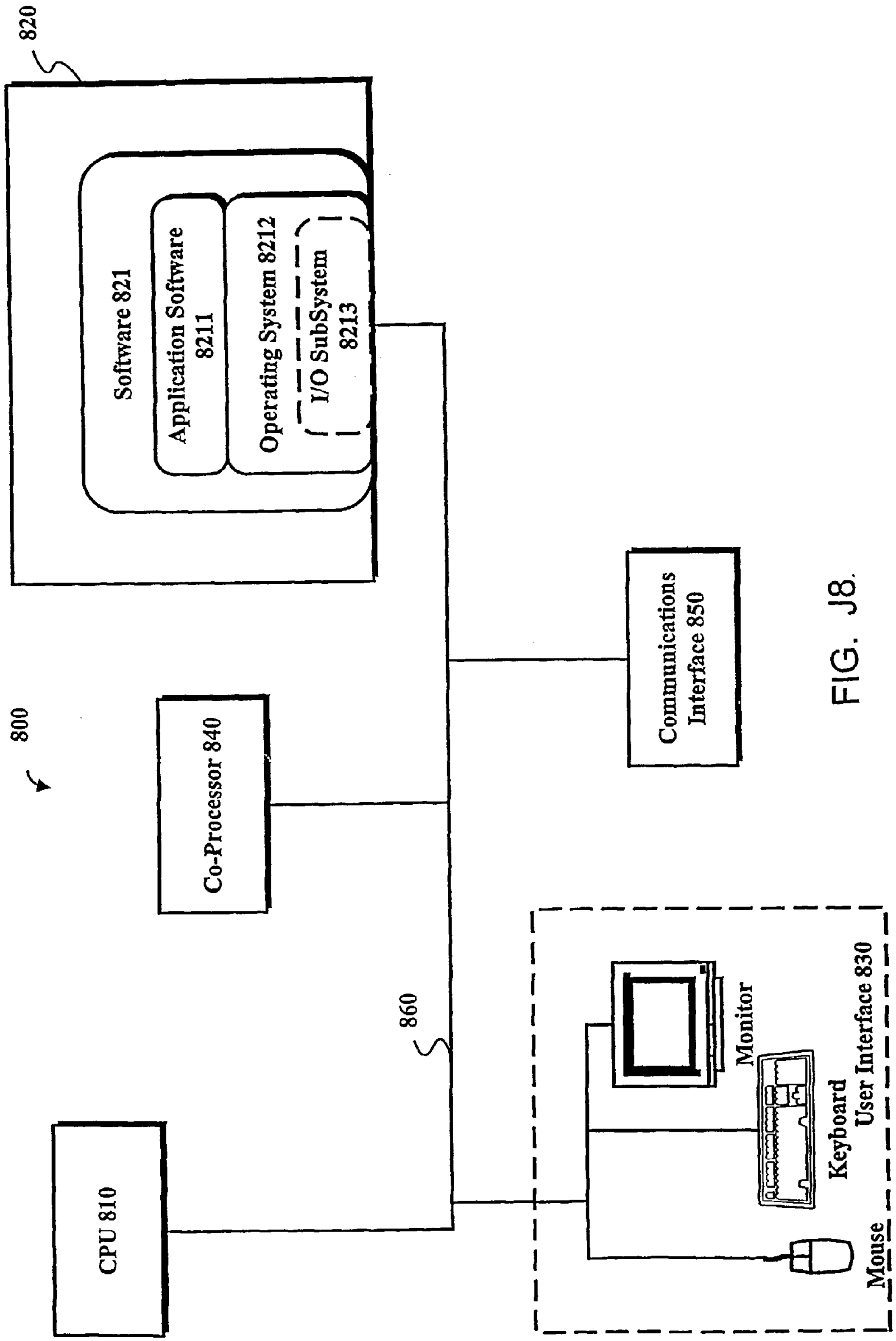
FIG. J8

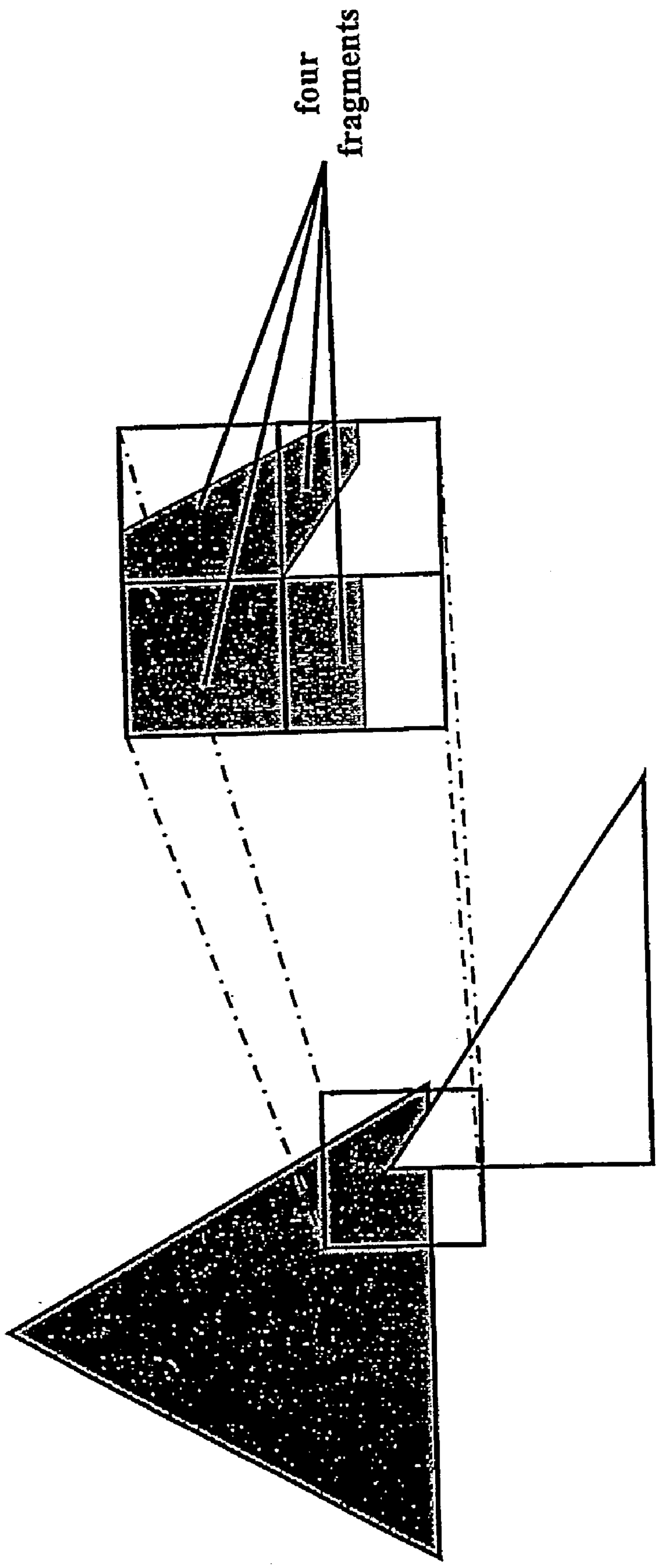
FIG. J9

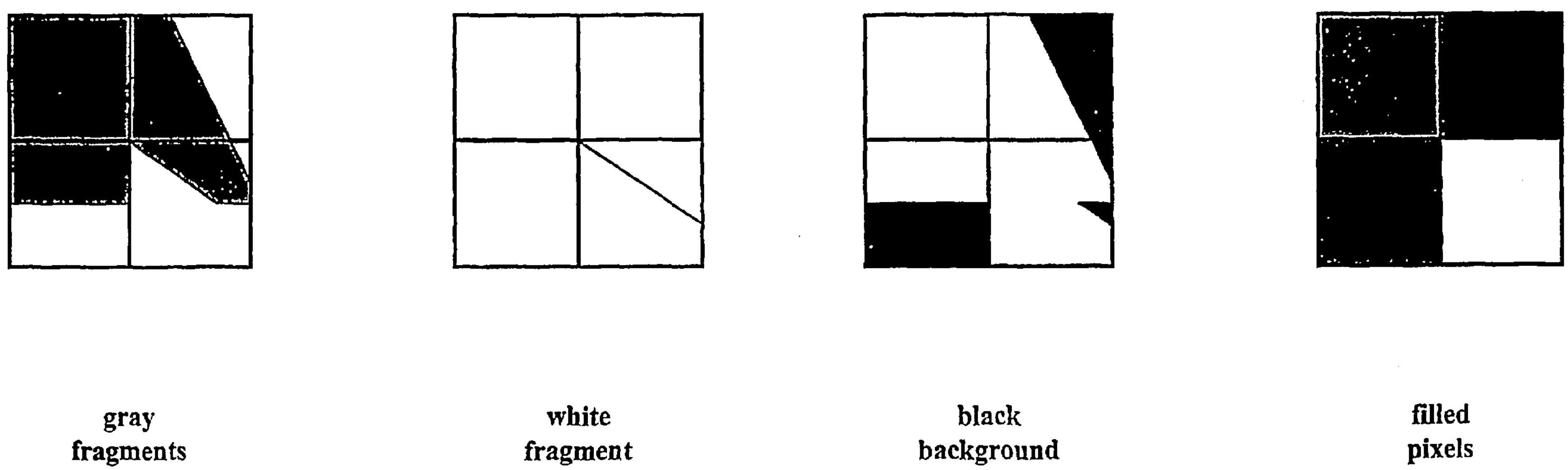
FIG. J10

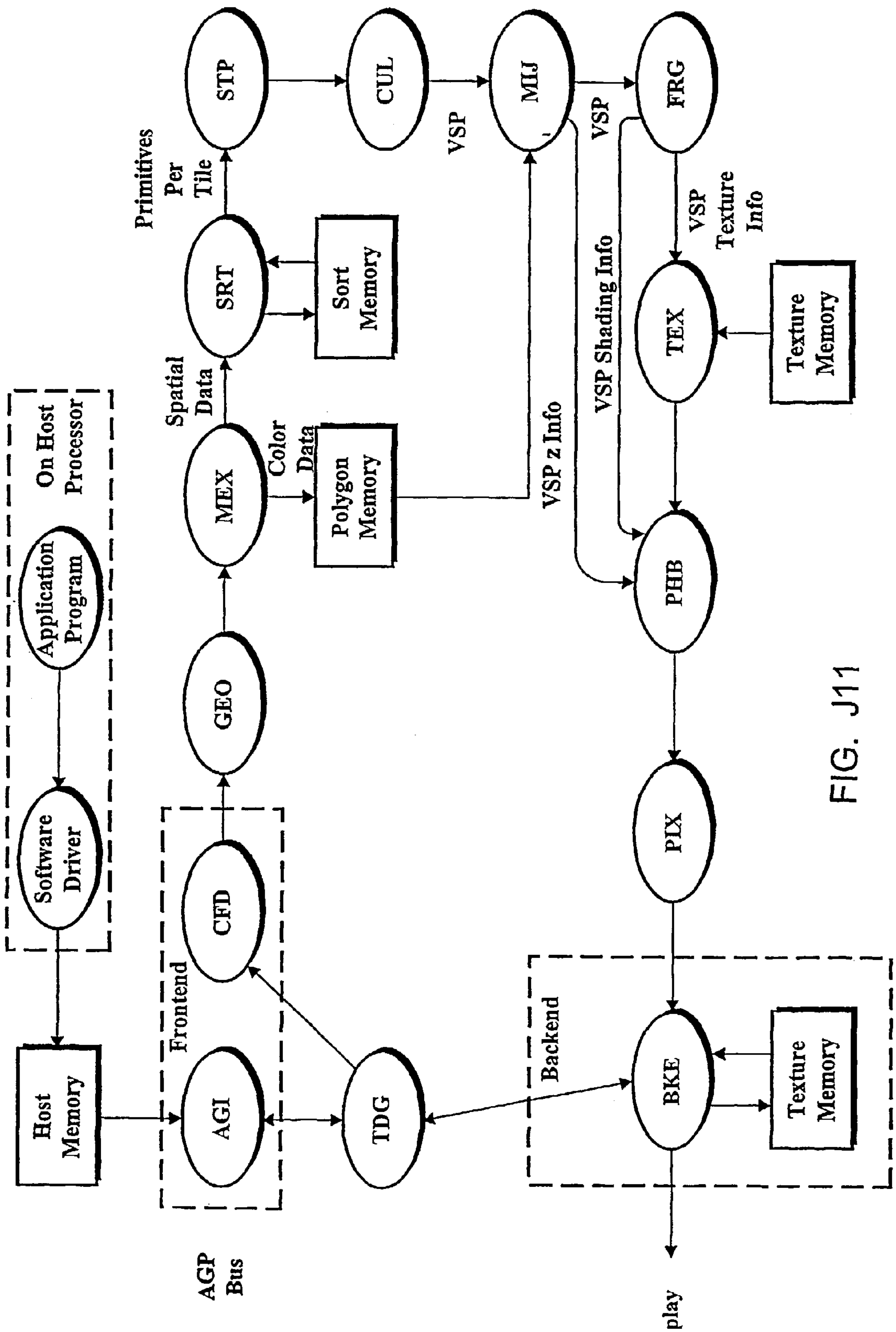
FIG. J11

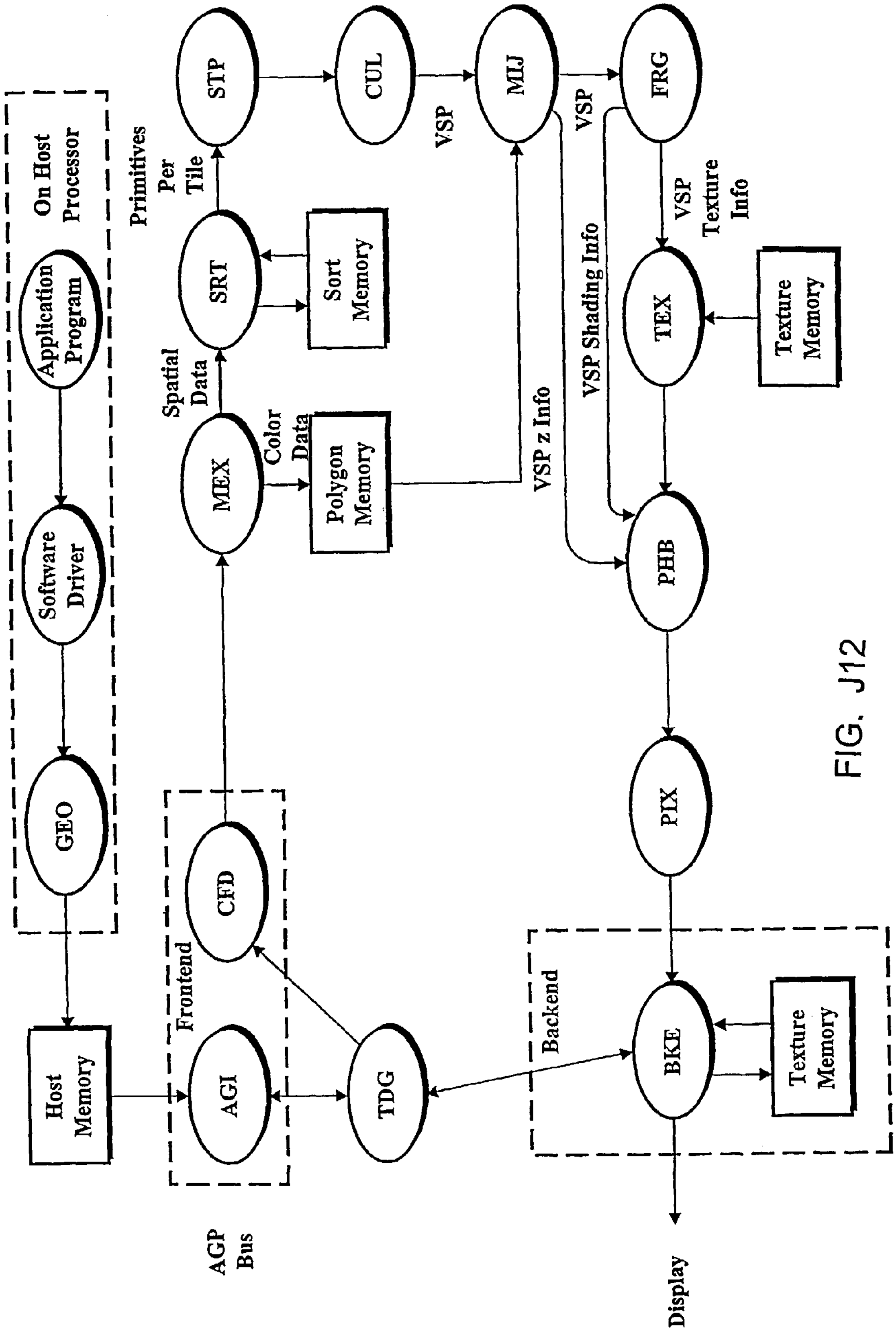
FIG. J12

DEFERRED SHADING GRAPHICS PIPELINE PROCESSOR HAVING ADVANCED FEATURES

RELATED APPLICATIONS

This application is a continuation of U.S. application Ser. No. 09/377,503, filed 20 Aug. 1999, which is hereby incorporated by reference and which claims the benefit under 35 USC Section 119(e) of U.S. Provisional Patent Application Ser. No. 60/097,336 filed 20 Aug. 1998 and entitled GRAPHICS PROCESSOR WITH DEFERRED SHADING; and claims the benefit under 35 USC Section 120 of U.S. patent application Ser. No. 09/213,990 filed 17 Dec. 1998 entitled HOW TO DO TANGENT SPACE LIGHTING IN A DEFERRED SHADING ARCHITECTURE; each of which is hereby incorporated by reference.

This application is also related to the following U.S. patent applications, each of which are incorporated herein by reference:

Ser. No. 09/213,990, filed 17 Dec. 1998, entitled HOW TO DO TANGENT SPACE LIGHTING IN A DEFERRED SHADING ARCHITECTURE;

Ser. No. 09/378,598, filed 20 Aug. 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,633, filed 20 Aug. 1999, now U.S. Pat. No. 6,552,723 entitled SYSTEM, APPARATUS AND METHOD FOR SPATIALLY SORTING IMAGE DATA IN A THREE-DIMENSIONAL GRAPHICS PIPELINE;

Ser. No. 09/378,439, filed 20 Aug. 1999, entitled GRAPHICS PROCESSOR WITH PIPELINE STATE STORAGE AND RETRIEVAL, now U.S. Pat. No. 6,525, 737;

Ser. No. 09/378,408, filed 20 Aug. 1999, entitled METHOD AND APPARATUS FOR GENERATING TEXTURE, now U.S. Pat. No. 6,288,730;

Ser. No. 09/379,144, filed 20 Aug. 1999, entitled APPARATUS AND METHOD FOR GEOMETRY OPERATIONS IN A 3D GRAPHICS PIPELINE;

Ser. No. 09/372,137, filed 20 Aug. 1999, entitled APPARATUS AND METHOD FOR FRAGMENT OPERATIONS IN A 3D GRAPHICS PIPELINE;

Ser. No. 09/378,391, filed 20 Aug. 1999, entitled Method And Apparatus For Performing Conservative Hidden Surface Removal In A Graphics Processor With Deferred Shading, now U.S. Pat. No. 6,476,807;

Ser. No. 09/378,299, filed 20 Aug. 1999, entitled DEFERRED SHADING GRAPHICS PIPELINE PROCESSOR, now U.S. Pat. No. 6,229,553; and Ser. No. 10/358,134, filed 3 Feb. 2003, entitled GRAPHICS PROCESSOR WITH DEFERRED SHADING, hereby incorporated by reference, which is a continuation of Ser. No. 09/378,637, filed 20 Aug. 1999, entitled DEFERRED SHADING GRAPHICS PIPELINE PROCESSOR, hereby incorporated by reference, which claims the benefit of the filing date of U.S. Provisional Application Ser. No. 60/097, 336, filed 20 Aug. 1999.

FIELD OF THE INVENTION

This invention relates to computing systems generally, to three-dimensional computer graphics, more particularly, and more most particularly to structure and method for a three-dimensional graphics processor implementing differed shading and other enhanced features.

BACKGROUND OF THE INVENTION

The Background of the Invention is divided for convenience into several sections which address particular aspects conventional or traditional methods and structures for processing and rendering graphical information. The section headers which appear throughout this description are provided for the convenience of the reader only, as information concerning the invention and the background of the invention are provided throughout the specification.

Three-dimensional Computer Graphics

Computer graphics is the art and science of generating pictures, images, or other graphical or pictorial information with a computer. Generation of pictures or images, is commonly called rendering. Generally, in three-dimensional (3D) computer graphics, geometry that represents surfaces (or volumes) of objects in a scene is translated into pixels (picture elements) stored in a frame buffer, and then displayed on a display device. Real-time display devices, such as CRTs used as computer monitors, refresh the display by continuously displaying the image over and over. This refresh usually occurs row-by-row, where each row is called a raster line or scan line. In this document, raster lines are generally numbered from bottom to top, but are displayed in order from top to bottom.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated (or transformed) from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by precomputing appropriate translation matrices before any translation occurs. Once the geometry is in screen coordinates, it is broken into a set of pixel color values (that is "rasterized") that are stored into the frame buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference), and herein incorporated by reference.

FIG. 1 shows a three-dimensional object, a tetrahedron, with its own coordinate axes ($x_{obj}$,$y_{obj}$,$z_{obj}$). The three-dimensional object is translated, scaled, and placed in the viewing point's coordinate system based on ($x_{eye}$,$y_{eye}$,$z_{eye}$). The object is projected onto the viewing plane, thereby correcting for perspective. At this point, the object appears to have become two-dimensional; however, the object's z-coordinates are preserved so they can be used later by hidden surface removal techniques. The object is finally translated to screen coordinates, based on ($x_{screen}$,$y_{screen}$,$z_{screen}$), where $Z_{screen}$ is going perpendicularly into the page. Points on the object now have their x and y coordinates described by pixel location (and fractions thereof) within the display screen and their z coordinates in a scaled version of distance from the viewing point.

Because many different portions of geometry can affect the same pixel, the geometry representing the surfaces closest to the scene viewing point must be determined. Thus, for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity of ten or twenty. As scene models become more and more complicated, renderers will be required to process scenes of ever increasing depth complexity. Thus, for most renders, the depth complexity of a scene is a measure of the wasted processing. For example, for a scene with a depth complexity of ten, 90% of the computation is wasted on hidden pixels. This wasted computation is typical of hardware renderers that use the simple Z-buffer technique (discussed later herein), generally chosen because it is easily built in hardware. Methods more complicated than the Z Buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: (1) the x-coordinate in pixel units (generally including a fraction); (2) the y-coordinate in pixel units (generally including a fraction); and (3) the z-coordinate of the point in either eye coordinates, distance from the virtual screen, or some other coordinate system which preserves the relative distance of surfaces from the viewing point. In this document, positive z-coordinate values are used for the "look direction" from the viewing point, and smaller values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking and span interpolation. Thus, a z-coordinate value is generally included in each pixel value (along with the color value) as geometry is rendered.

Generic 3D Graphics Pipeline

Many hardware renderers have been developed, and an example is incorporated herein by reference: "Leo: A System for Cost Effective 3D Shaded Graphics", by Deering and Nelson, pages 101 to 108 of SIGGRAPH93 Proceedings, Aug. 1–6, 1993, Computer Graphics Proceedings, Annual Conference Series, published by ACM SIGGRAPH, New York, 1993, Soft-cover ISBN 0-201-58889-7 and CD-ROM ISBN 0-201-56997-3, herein incorporated by references and referred to as the Deering Reference). The Deering Reference includes a diagram of a generic 3D graphics pipeline (i.e., a renderer, or a rendering system) which is reproduced here as FIG. 2.

As seen in FIG. 2, the first step within the floating-point intensive functions of the generic 3D graphics pipeline after the data input (Step 212) is the transformation step (Step 214). The transformation step is also the first step in the outer loop of the flow diagram, and also includes "get next polygon". The second step, the clip test, checks the polygon to see if it is at least partially contained in the view volume (sometimes shaped as a frustum) (Step 216). If the polygon is not in the view volume, it is discarded; otherwise processing continues. The third step is face determination, where polygons facing away from the viewing point are discarded (Step 218). Generally, face determination is applied only to objects that are closed volumes. The fourth step, lighting computation, generally includes the set up for Gouraud shading and/or texture mapping with multiple light sources of various types, but could also be set up for Phong shading or one of many other choices (Step 222). The fifth step, clipping, deletes any portion of the polygon that is outside of the view volume because that portion would not project within the rectangular area of the viewing plane (Step 224). Generally, polygon clipping is done by splitting the polygon into two smaller polygons that both project within the area of the viewing plane. Polygon clipping is computationally expensive. The sixth step, perspective divide, does perspective correction for the projection of objects onto the viewing plane (Step 226). At this point, the points representing vertices of polygons are converted to pixel space coordinates by step seven, the screen space conversion step (Step 228). The eighth step (Step 230), set up for incremental render, computes the various begin, end, and increment values needed for edge walking and span interpolation (e.g.: x, y, and z-coordinates; RGB color; texture map space u- and v-coordinates; and the like).

Within the drawing intensive functions, edge walking (Step 232) incrementally generates horizontal spans for each raster line of the display device by incrementing values from the previously generated span (in the same polygon), thereby "walking" vertically along opposite edges of the polygon. Similarly, span interpolation (Step 234) "walks" horizontally along a span to generate pixel values, including a z-coordinate value indicating the pixel's distance from the viewing point. Finally, the z-buffered blending also referred to as Testing and Blending (Step 236) generates a final pixel color value. The pixel values also include color values, which can be generated by simple Gouraud shading (i.e., interpolation of vertex color values) or by more computationally expensive techniques such as texture mapping (possibly using multiple texture maps blended together), Phong shading (i.e., per-fragment lighting), and/or bump mapping (perturbing the interpolated surface normal). After drawing intensive functions are completed, a double-buffered MUX output look-up table operation is performed (Step 238). In this figure the blocks with rounded corners typically represent functions or process operations, while sharp cornered rectangles typically represent stored data or memory.

By comparing the generated z-coordinate value to the corresponding value stored in the Z Buffer, the z-buffered blend either keeps the new pixel values (if it is closer to the viewing point than previously stored value for that pixel location) by writing it into the frame buffer, or discards the new pixel values (if it is farther). At this step, antialiasing methods can blend the new pixel color with the old pixel color. The z-buffered blend generally includes most of the per-fragment operations, described below.

The generic 3D graphics pipeline includes a double buffered frame buffer, so a double buffered MUX is also included. An output lookup table is included for translating color map values. Finally, digital to analog conversion makes an analog signal for input to the display device.

A major drawback to the generic 3D graphics pipeline is its drawing intensive functions are not deterministic at the pixel level given a fixed number of polygons. That is, given a fixed number of polygons, more pixel-level computation is required as the average polygon size increases. However, the floating-point intensive functions are proportional to the number of polygons, and independent of the average polygon size. Therefore, it is difficult to balance the amount of computational power between the floating-point intensive functions and the drawing intensive functions because this balance depends on the average polygon size.

Prior art Z buffers are based on conventional Random Access Memory (RAM or DRAM), Video RAM (VRAM), or special purpose DRAMs. One example of a special purpose DRAM is presented in "FBRAM: A new Form of Memory Optimized for 3D Graphics", by Deering, Schlapp, and Lavelle, pages 167 to 174 of SIGGRAPH94 Proceedings, Jul. 24–29, 1994, Computer Graphics Proceedings, Annual Conference Series, published by ACM SIGGRAPH, New York, 1994, Soft-cover ISBN 0201607956, and herein incorporated by reference.

Pipeline State

OpenGL is a software interface to graphics hardware which consists of several hundred functions and procedures that allow a programmer to specify objects and operations to produce graphical images. The objects and operations include appropriate characteristics to produce color images of three-dimensional objects. Most of OpenGL (Version 1.2) assumes or requires a that the graphics hardware include a frame buffer even though the object may be a point, line, polygon, or bitmap, and the operation may be an operation on that object. The general features of OpenGL (just one example of a graphical interface) are described in the reference "The OpenGL® Graphics System: A Specification (Version 1.2) edited by Mark Segal and Kurt Akeley, Version 1.2, March 1998; and hereby incorporated by reference. Although reference is made to OpenGL, the invention is not limited to structures, procedures, or methods which are compatible or consistent with OpenGL, or with any other standard or non-standard graphical interface. Desirably, the inventive structure and method may be implemented in a manner that is consistent with the OpenGL, or other standard graphical interface, so that a data set prepared for one of the standard interfaces may be processed by the inventive structure and method without modification. However, the inventive structure and method provides some features not provided by OpenGL, and even when such generic input/output is provided, the implementation is provided in a different manner.

The phrase "pipeline state" does not have a single definition in the prior-art. The OpenGL specification, for example, sets forth the type and amount of the graphics rendering machine or pipeline state in terms of items of state and the number of bits and bytes required to store that state information. In the OpenGL definition, pipeline state tends to include object vertex pertinent information including for example, the vertices themselves the vertex normals, and color as well as "non-vertex" information.

When information is sent into a graphics renderer, at least some object geometry information is provided to describe the scene. Typically, the object or objects are specified in terms of vertex information, where an object is modeled, defined, or otherwise specified by points, lines, or polygons (object primitives) made up of one or more vertices. In simple terms, a vertex is a location in space and may be specified for example by a three-space (x,y,z) coordinate relative to some reference origin. Associated with each vertex is other information, such as a surface normal, color, texture, transparency, and the like information pertaining to the characteristics of the vertex. This information is essentially "per-vertex" information. Unfortunately, forcing a one-to-one relationship between incoming information and vertices as a requirement for per-vertex information is unnecessarily restrictive. For example, a color value may be specified in the data stream for a particular vertex and then not respecified in the data stream until the color changes for a subsequent vertex. The color value may still be characterized as per-vertex data even though a color value is not explicitly included in the incoming data stream for each vertex.

Texture mapping presents an interesting example of information or data which could be considered as either per-vertex information or pipeline state information. For each object, one or more texture maps may be specified, each texture map being identified in some manner, such as with a texture coordinate or coordinates. One may consider the texture map to which one is pointing with the texture coordinate as part of the pipeline state while others might argue that it is per-vertex information.

Other information, not related on a one-to-one basis to the geometry object primitives, used by the renderer such as lighting location and intensity, material settings, reflective properties, and other overall rules on which the renderer is operating may more accurately be referred to as pipeline state. One may consider that everything that does not or may not change on a per-vertex basis is pipeline state, but for the reasons described, this is not an entirely unambiguous definition. For example, one may define a particular depth test to be applied to certain objects to be rendered, for example the depth test may require that the z-value be strictly "greater-than" for some objects and "greater-thanor-equal-to" for other objects. These particular depth tests which change from time to time, may be considered to be pipeline state at that time. Parameters considered to be renderer (pipeline) state in OpenGL are identified in Section 6.2 of the afore referenced OpenGL Specification (Version 1.2, at pages 193–217).

Essentially then, there are two types of data or information used by the renderer: (1) primitive data which may be thought of as per-vertex data, and (ii) pipeline state data (or simply pipeline state) which is everything else. This distinction should be thought of as a guideline rather than as a specific rule, as there are ways of implementing a graphics renderer treating certain information items as either pipeline state or non-pipeline state.

Per-Fragment Operations

In the generic 3D graphics pipeline, the "z-buffered blend" step actually incorporates many smaller "per-fragment" operational steps. Application Program Interfaces (APIs), such as OpenGL (Open Graphics Library) and D3D, define a set of per-fragment operations (See Chapter 4 of Version 1.2 OpenGL Specification). We briefly review some exemplary OpenGL per-fragment operations so that any generic similarities and differences between the inventive structure and method and conventional structures and procedures can be more readily appreciated.

Under OpenGL, a frame buffer stores a set of pixels as a two-dimensional array. Each picture-element or pixel stored in the frame buffer is simply a set of some number of bits. The number of bits per pixel may vary depending on the particular GL implementation or context.

Corresponding bits from each pixel in the frame buffer are grouped together into a bit plane; each bit plane containing a single bit from each pixel. The bit planes are grouped into several logical buffers referred to as the color, depth, stencil, and accumulation buffers. The color buffer in turn includes what is referred to under OpenGL as the front left buffer, the front right buffer, the back left buffer, the back right buffer, and some additional auxiliary buffers. The values stored in the front buffers are the values typically displayed on a display monitor while the contents of the back buffers and auxiliary buffers are invisible and not displayed. Stereoscopic contexts display both the front left and the front right buffers, while monoscopic contexts display only the front left buffer. In general, the color buffers must have the same number of bit planes, but particular implementations of context may not provide right buffers, back buffers, or auxiliary buffers at all, and an implementation or context may additionally provide or not provide stencil, depth, or accumulation buffers.

Under OpenGL, the color buffers consist of either unsigned integer color indices or R, G, B, and, optionally, a number "A" of unsigned integer values; and the number of bit planes in each of the color buffers, the depth buffer (if provided), the stencil buffer (if provided), and the accumulation buffer (if provided), is fixed and window dependent. If an accumulation buffer is provided, it should have at least as many bit planes per R, G, and B color component as do the color buffers.

A fragment produced by rasterization with window coordinates of ($x_w$, $y_w$) modifies the pixel in the frame buffer at that location based on a number of tests, parameters, and conditions. Noteworthy among the several tests that are typically performed sequentially beginning with a fragment and its associated data and finishing with the final output stream to the frame buffer are in the order performed (and with some variation among APIs): 1) pixel ownership test; 2) scissor test; 3) alpha test; 4) Color Test; 5) stencil test; 6) depth test; 7) blending; 8) dithering; and 9) logicop. Note that the OpenGL does not provide for an explicit "color test" between the alpha test and stencil test. Per-Fragment operations under OpenGL are applied after all the color computations.

BRIEF DESCRIPTION OF THE DRAWINGS

For a better understanding of the nature and objects of the invention, reference should be made to the following detailed description taken in conjunction with the accompanying drawings, in which:

FIG. 24 is a diagramatic illustration showing packets sent to and exemplary Mode Extraction Block.

FIG. 25 is a diagramatic illustration showing an embodiment of the on-chip state vector partitioning of the exemplary Mode Extraction Block.

FIG. 26 is a diagrammatic illustration showing aspects of a process for saving information to polygon memory.

FIG. 27 is a diagrammatic illustration showing an exemplary configuration for polygon memory relative to MEX.

FIG. 28 is a diagrammatic illustration showing exemplary bit configuration for color information relative to Color Pointer Generation in the MEX Block.

FIG. 29 is a diagrammatic illustration showing exemplary configuration for the color type field in the MEX Block.

FIG. 30 is a diagrammatic illustration showing the contents of the MLM Pointer packet stored in the first dual-oct of a list of point list, line strip, triangle strip, or triangle fan.

FIG. 36 B is a diagrammatic illustration showing a second relationship between positions of the tile and the triangle for particular relationships between the perpendicular vector and the threshold distance.

FIG. 36 C is a diagrammatic illustration showing a third relationship between positions of the tile and the triangle for particular relationships between the perpendicular vector and the threshold distance.

FIG. 38 B is a diagrammatic illustration showing an exemplary sequence for the SuperTile Hop procedure for N=63 and M=13 in FIG. 38 A.

FIG. 55 is a diagrammatic illustration of exemplary embodiments of tag caches which are fully associative and use Content Addressible Memories (CAMs) for cache tag lookup.

Figure 1:
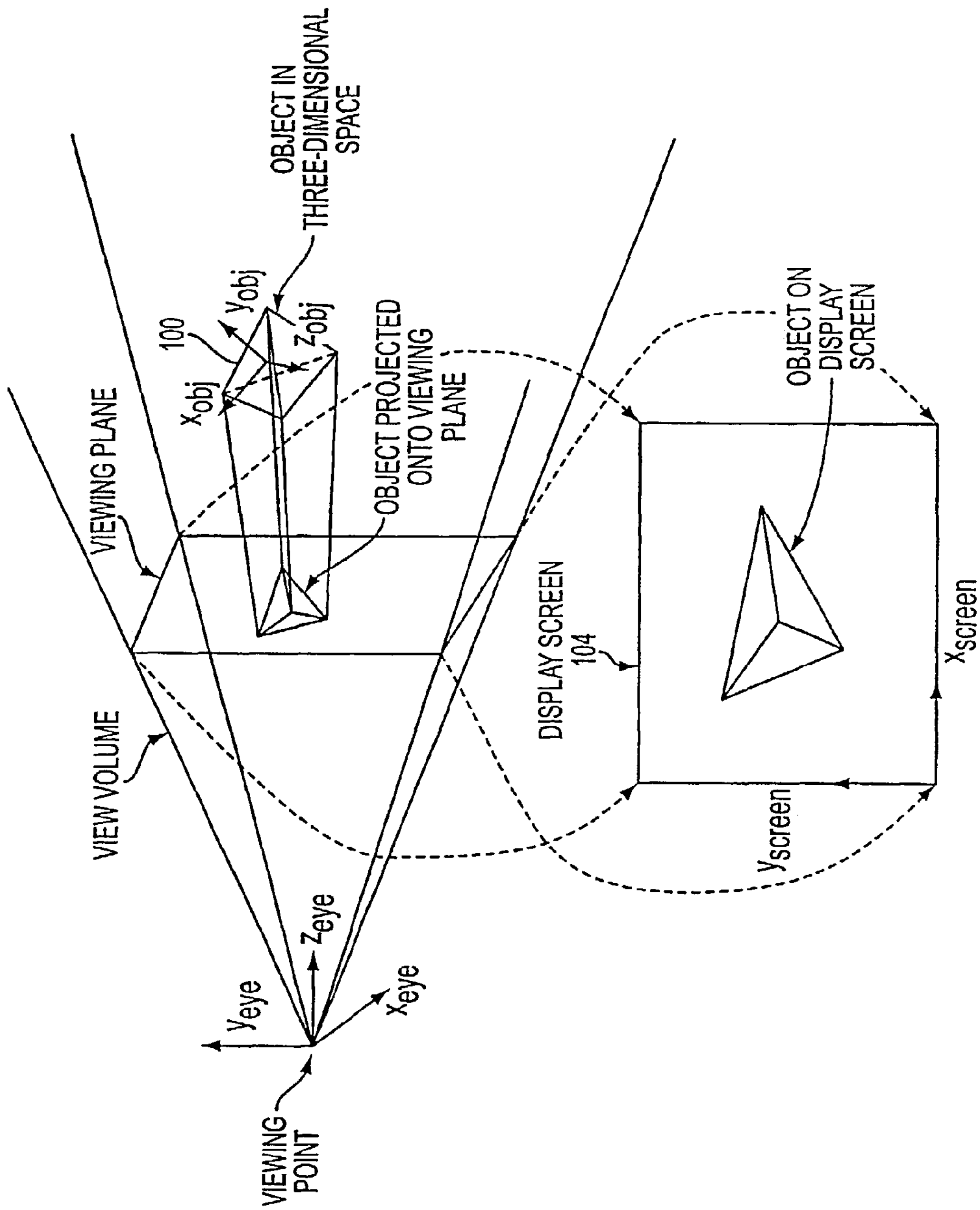
FIG. 1 is a diagrammatic illustration showing a tetrahedron, with its own coordinate axes, a viewing point's coordinate system, and screen coordinates.

FIG. A 1 shows a 3-dimensional object, a tetrahedron, with its own coordinate axes.

FIG. A 2 is a diagrammatic illustration showing an exemplary generic 3D graphics pipeline or renderer.

FIG. A 3 is an illustration showing an exemplary embodiment of the inventive Deferred Shading Graphics Processor (DSGP).

FIG. A 4 is an illustration showing an alternative exemplary embodiment of the inventive Deferred Shading Graphics Processor (DSGP).

FIG. B 1 is a diagrammatic illustration showing a tetrahedron, with its own coordinate axes, a viewing point's coordinate system, and screen coordinates.

FIG. B 2 is a diagrammatic illustration showing the processing path in a typical prior art 3D rendering pipeline.

FIG. B 3 is a diagrammatic illustration showing the processing path in one embodiment of the inventive 3D Deferred Shading Graphics Pipeline, with a MEX step that splits the data path into two parallel paths and a MIJ step that merges the parallel paths back into one path.

FIG. B 4 is a diagrammatic illustration showing the processing path in another embodiment of the inventive 3D Deferred Shading Graphics Pipeline, with a MEX and MIJ steps, and also including a tile sorting step.

FIG. B 5A is a diagrammatic illustration showing an embodiment of the inventive 3D Deferred Shading Graphics Pipeline, showing information flow between blocks, starting with the application program running on a host processor.

FIG. B 5B is an alternative embodiment of the inventive 3D Deferred Shading Graphics Pipeline, showing information flow between blocks, starting with the application program running on a host processor.

FIG. B 6 is a diagrammatic illustration showing an exemplary flow of data through blocks of a portion of an embodiment of a pipeline of this invention.

FIG. B 7 is a diagrammatic illustration showing an another exemplary flow of data through blocks of a portion of an embodiment of a pipeline of this invention, with the STP function occuring before the SRT funciton.

FIG. B 8 is a diagrammatic illustration showing an exemplary configuration of RAM interfaces used by MEX, MIJ, and SRT.

FIG. B 9 is a diagrammatic illustration showing another exemplary configuration of a shared RAM interface used by MEX, MIJ, and SRT.

FIG. B 10 is a diagrammatic illustration showing aspects of a process for saving information to Polygon Memory and Sort Memory.

FIG. B 11 is a diagrammatic illustration showing an exemplary triangle mesh of four triangles and the corresponding six entries in Sort Memory.

FIG. B 12 is a diagrammatic illustration showing an exemplary way to store vertex information V2 into Polygon Memory, including six entries corresponding to the six vertices in the example shown in FIG. B 11.

FIG. B 13 is a diagrammatic illistration depicting one aspect of the present invention in which clipped triangles are turned in to fans for improved processing.

FIG. B 14 is a diagrammatic illustration showing example packets sent to an exemplary MEX block, including node data associated with clipped polygons.

FIG. B 15 is a diagrammatic illustration showing example entries in Sort Memory corresponding to the example packets shown in FIG. B 14.

FIG. B 16 is a diagrammatic illustration showing example entries in Polygon Memory corresponding to the example packets shown in FIG. B 14.

FIG. B 17 is a diagrammatic illustration showing examples of a Clipping Guardband around the display screen.

FIG. B 18 is a flow chart depicting an operation of one embodiment of the Caching Technique of this invention.

FIG. B 19 is a diagrammatic illustration showing the manner in which mode data flows and is cached in portions of the DSGP pipeline.

FIG. C 1 is a block diagram of a system for sorting image data in a tile based graphics pipeline architecture according to an embodiment of the present invention.

FIG. C 2 is a block diagram of a 3-D Graphics Processor according to an embodiment of the present invention.

FIG. C 3 is a block diagram illustrating an embodiment of the Sort Block Architecture.

FIG. C 4 is a block diagram illustrating an example of other processing stages 210 according to one embodiment of the graphics pipeline of the present invention.

FIG. C 5 is a block diagram illustrating an example of other processing stages 220 according to one embodiment of the graphics pipeline of the present invention.

FIG. C 7 is a block diagram of read control 310 according to one embodiment of the present invention.

FIG. C 8 is a flowchart illustrating aspects of write control 305 procedure according to one embodiment of the present invention.

FIG. C 9 is a flowchart illustrating aspects of write control 305 procedure, and in particular FIG. C 9 is a flowchart illustrating aspects of store image data step 855, according to one embodiment of the present invention.

FIG. C 11 is a flowchart illustrating aspects of guaranteed conservative memory estimate procedure according to one embodiment of the present invention.

FIG. C 12 is a flowchart illustrating aspects of guaranteed conservative memory estimate procedure according to one embodiment of the present invention.

FIG. C 13 is a block diagram illustrating aspects of a 2-D window divided into multiple tiles, the 2-D window depicting a a triangle circumscribed by a bounding box.

FIG. C 14 is a block diagram illustrating aspects of a guaranteed conservative memory estimate data structure according to one embodiment of the present invention.

FIG. C 15 is a block diagram illustrate aspects of multiple geometry primitives having been sorted into sort memory by the procedures of the sort block according to one embodiment of the present invention.

FIG. C 16 is a block diagram illustrating aspects of a 2-D window divided by multiple tiles and including multiple geometry primitives according to one embodiment of the teachings of the present invention.

FIG. C 17 is a flowchart illustrating aspects of Reed control 310 procedure according to one embodiment of the present invention.

FIG. C 18 is a block diagram illustrating aspects of a super tile hop sequence for sending tile relative data to a subsequent stage of the graphics pipeline, and for illustrating aspects of a supertile according to one embodiment of the present invention.

FIG. D 1 is a block diagram illustrate aspects of a system according to an embodiment of the present invention, for performing setup operations in a 3-D graphics pipeline using unified primitive descriptors, post tile sorting setup, tile relative y-values, and screen relative x-values.[111]

FIG. D 2 is a block diagram illustrating aspects of a graphics processor according to an embodiment of the present invention, for performing setup operations in a 3-D graphics pipeline using unified primitive descriptors, post tile sorting setup, tile relative y-values, and screen relative x-values.

FIG. D 3 is a block diagram illustrating other processing stages 210 of graphics pipeline 200 according to a preferred embodiment of the present invention.

FIG. D 4 is a block diagram illustrate other processing stages 240 of graphics pipeline 200 according to a preferred embodiment of the present invention.

FIG. D 5 illustrates vertex assignments according to a uniform primitive description according to one embodiment of the present invention, for describing polygons with an inventive descriptive syntax.

FIG. D 6 illustrates a block diagram of functional units of setup 2155 according to an embodiment of the present invention, the functional units implementing the methodology of the present invention.

FIG. D 7 illustrates use of triangle slope assignments according to an embodiment of the present invention.

FIG. D 8 illustrates slope assignments for triangles and line segments according to an embodiment of the present invention.

FIG. D 9 illustrates aspects of line segments orientation according to an embodiment of the present invention.

FIG. D 10 illustrates aspects of line segments slopes according to an embodiment of the present invention.

FIG. D 12 illustrates aspects of point preprocessing according to an embodiment of the present invention.

FIG. D 13 illustrates the relationship of trigonometric functions to line segment orientations.

FIG. D 14 illustrates aspects of line segment quadrilateral generation according to embodiment of the present invention.

FIG. D 15 illustrates examples of x-major and y-major line orientation with respect to aliased and anti-aliased lines according to an embodiment of the present invention.

FIG. D 16 illustrates presorted vertex assignments for quadrilaterals.

FIG. D 17 illustrates a primitives clipping points with respect to the primitives intersection with a tile.

FIG. D 18 illustrates aspects of processing quadrilateral vertices that lie outside of a 2-D window according to and embodiment of the present mention.

FIG. D 19 illustrates an example of a triangle's minimum depth value vertex candidates according to embodiment of the present invention.

FIG. D 20 illustrates examples of quadrilaterals having vertices that lie outside of a 2-D window range.

FIG. D 21 illustrates aspects of clip code vertex assignment according to embodiment of the present invention.

FIG. D 22 illustrates aspects of unified primitive descriptor assignments, including corner flags, according to an embodiment of the present invention.

FIG. E 1 is a diagrammatic illustration showing a tetrahedron, with its own coordinate axes, a viewing point's coordinate system, and screen coordinates.

FIG. E 2 is a diagrammatic illustration showing a conventional generic renderer for a 3D graphics pipeline.

FIG. E 3 is a diagrammatic illustration showing a first embodiment of the inventive 3-Dimensional Deferred Shading Graphics Pipeline.

FIG. E 4 is a diagrammatic illustration showing a second embodiment of the inventive 3-Dimensional Deferred Shading Graphics Pipeline.

FIG. E 5 is a diagrammatic illustration showing a third embodiment of the inventive 3-Dimensional Deferred Shading Graphics Pipeline.

FIG. E 6 is a diagrammatic illustration showing a fourth embodiment of the inventive 3-Dimensional Deferred Shading Graphics Pipeline.

FIG. E 7 is a diagrammatic illustration showing a fifth embodiment of the inventive 3-Dimensional Deferred Shading Graphics Pipeline.

FIG. E 8 is a diagrammatic illustration showing a sixth embodiment of the inventive 3-Dmensional Deferred Shading Graphics Pipeline.

FIG. E 9 is a diagramatic illustration showing an exemplary flow of data through blocks of an embodiment of the pipeline.

FIG. E 10 is a diagrammatic illustration showing an embodiment of the inventive 3-Dimensional graphics pipeline including information passed between the blocks.

FIG. E 11 is a diagramatic illustration showing the manner in which an embodiment of the Cull block produces fragments from a partially obscured triangle.

FIG. E 12 illustrates a block diagram of the Cull block according to one embodiment of the present invention.

FIG. E 13 illustrates the relationships between tiles, pixels, and stamp portions in an embodiment of the invention.

FIG. E 14 illustrates a detailed block diagram of the Cull block according to one embodiment of the present invention.

FIG. E 15 illustrates a Setup Output Primitive Packet according to one embodiment of the present invention.

FIG. E 16 illustrates a flow chart of a conservative hidden surface removal method according to one embodiment of the present invention.

FIG. E 17A illustrates a sample tile including a primitive and a bounding box.

FIG. E 17B shows the largest z values (ZMax) for each stamp in the tile.

FIG. E 17C shows the results of the z value comparisons between the ZMin for the primitive and the ZMaxes for every stamp.

FIG. E 18 illustrates an example of a stamp selection process of the conservative hidden surface removal method according to one embodiment of the present invention.

FIG. E 19 illustrates an example showing a set of the left most and right most positions of a primitive in each subraster line that contains at least one sample point.

FIG. E 20 illustrates a stamp containing four pixels.

FIG. E 21A–21D illustrate an example of the operation of the Z Cull unit.

FIG. E 22 illustrates an example of how samples are processed by the Z Cull unit.

FIG. E 23A–23D illustrate an example of early dispatch.

FIG. E 24 illustrates a sample level example of early dispatch processing.

FIG. E 25 illustrates an example of processing samples with alpha test with a CHSR method according to one embodiment of the present invention.

FIG. E 26 illustrates aspects of stencil testing relative to rendering operations for an embodiment of CHSR.

FIG. E 27 illustrates aspects of alpha blending relative to rendering operations for an embodiment of CHSR.

FIG. E 28A illustrates part of a Spatial Packet containing three control bits: DoAlphaTest, DoABlend and Transparent.

FIG. E 28B illustrates how the alpha values are evaluated to set the DoABlend control bit.

FIG. E 29 illustrates a flow chart of a sorted transparency mode CHSR method according to one embodiment of the present invention.

FIG. F 1 depicts a three dimensional object and its image on a display screen.

FIG. F 2 is a block diagram of one embodiment of a texture pipeline constructed in accordance with the present invention.

FIG. F 3 depicts relations between coordinate systems with respect to graphic images.

FIG. F 4*a* is a block diagram depicting one embodiment of a texel prefetch buffer constructed in accordance with the teachings of this invention.

FIG. F 4*b* is a block diagram depicting texture buffer tag blocks and memory queues associates with the texel prefetch buffer of FIG. F 4*a*.

FIG. F 5 is a diagram depicting texture memory organized into a plurality of channels, each channel containing a plurality of texture memory devices.

FIGS. F 6*a* and 6*b* illustrate a spatially coherent texel mapping for texture memory in accordance with one embodiment of this invention.

FIG. F 6*c* depicts address mapping used in one embodiment of this invention.

FIG. F 7 illustrates a super block of a texture map that is mapped using one embodiment of the present invention.

FIG. F 8 shows a dualoct numbering pattern within each sector in accordance with one embodiment of this invention.

FIG. F 9 is texture tile address structure which serves as a tag for a texel prefetch buffer in accordance with one embodiment of this invention.

FIG. F 10 is a pointer look-up translation tag block used as a pointer to base address within texture memory for the start of the desired texture/LOD in accordance of one embodiment of this invention.

FIG. F 11 is one embodiment of a physical mapping of texture memory address.

FIG. F 12 is a diagram depicting address reconfigurations and process with respect to FIG. F 6*c*, 9, 10, and 11.

FIGS. F 13*a* and 13*b* are block diagrams depicting one embodiment of a re-order system in accordance of the present invention.

FIG. G 1 is a diagrammatic illustration showing a tetrahedron, with its own coordinate axes, a viewing point's coordinate system, and screen coordinates.

FIG. G 2 is a diagrammatic illustration showing a conventional generic renderer for a 3D graphics pipeline.

FIG. G 3 is a diagrammatic illustration showing elements of a lighting computation performed in a 3D graphics system.

FIG. G 4 is a diagrammatic illustration showing elements of a bump mapping computation performed in a 3D graphics system.

FIG. G 5A is a diagrammatic illustration showing a functional flow diagram of portions of a 3D graphics pipeline that performs SGI bump mapping.

FIG. G 5B is a diagrammatic illustration showing a functional block diagram of portions of a 3D graphics pipeline that performs Silicon Graphics Computer Systems.

FIG. G 6A is a diagrammatic illustration showing a functional flow diagram of a generic 3D graphics pipeline that performs "Blinn" bump mapping.

FIG. G 6B is a diagrammatic illustration showing a functional block diagram of portions of a 3D graphics pipeline that performs Blinn bump mapping.

FIG. G 7 is a diagrammatic illustration showing an embodiment of the inventive 3-Dimensional graphics pipeline, particularly showing the relationship of the Geometry Engine 3000 with other functional blocks and the Application executing on the host and the Host Memory.

FIG. G 8 is a diagrammatic illustration showing a first embodiment of the inventive 3-Dimensional Deferred Shading Graphics Pipeline (DSGP).

FIG. G 9 is a diagramatic illustration showing an exemplary block diagram of an embodiment of the pipeline showing the major functional units in the front-end Command Fetch and Decode Block (CFD) 2000.

FIG. G 10 shows the flow of data through one embodiment of the DSGP 1000.

FIG. G 11 shows an example of how the Cull block produces fragments from a partially obscured triangle.

FIG. G 12 demonstrates how the Pixel block processes a stamp's worth of fragments.

FIG. G 13 is a diagramatic illustration highlighting the manner in which one embodiment of the Deferred Shading Graphics Processor (DSGP) transforms vertex coordinates.

FIG. G 14 is a diagramatic illustration highlighting the manner in which one embodiment of the Deferred Shading Graphics Processor (DSGP) transforms normals, tangents, and binormals.

FIG. G 15 is a diagrammatic illustration showing a functional block diagram of the Geometry Block (GEO).

FIG. G 16 is a diagrammatic illustration showing relationships between functional blocks on semiconductor chips in a three-chip embodiment of the inventive structure.

FIG. G 17 is a diagramatic illustration exemplary data flow in one embodiment of the Mode Extraction Block (MEX).

FIG. G 18 is a diagramatic illustration showing packets sent to and exemplary Mode Extraction Block.

FIG. G 19 is a diagramatic illustration showing an embodiment of the on-chip state vector partitioning of the exemplary Mode Extraction Block.

FIG. G 20 is a diagramatic illustration showing aspects of a process for saving information to polygon memory.

FIG. G 21 is a diagramatic illustration showing DSGP triangles arriving at the STP Block and which can be rendered in the aliased or anti-aliased mode.

FIG. G 22 is a diagramatic illustration showing the manner in which DSGP renders lines by converting them into quads and various quads generated for the drawing of aliased and anti-aliased lines of various orientations.

FIG. G 23 is a diagramatic illustration showing the manner in which the user specified point is adjusted to the rendered point in the Geometry Unit.

FIG. G 24 is a diagramatic illustration showing the manner in which anti-aliased line segments are converted into a rectangle in the CUL unit scan converter that rasterizes the parallelograms and triangles uniformly.

FIG. G 25 is a diagrammatic illustration showing the manner in which the end points of aliased lines are computed using a parallelogram, as compared to a rectangle in the case of anti-aliased lines.

FIG. G 26 is a diagrammatic illustration showing an aspect of how Setup represents lines and triangles, including the vertex assignment.

FIG. G 27 is a diagrammatic illustration showing an aspect of how Setup represents lines and triangles, including the slope assignments.

FIG. G 28 is a diagrammatic illustration showing an aspect of how Setup represents lines and triangles, including the quadrant assignment based on the orientation of the line.

FIG. G 29 is a diagrammatic illustration showing how Setup represents lines and triangles, including the naming of the clip descriptors and the assignment of clip codes to verticies.

FIG. G 30 is a diagrammatic illustration showing an aspect of how Setup represents lines and triangles, including aspects of how Setup passes particular values to CUL.

FIG. G 31 is a diagrammatic illustration of exemplary embodiments of tag caches which are fully associative and use Content Addressible Memories (CAMs) for cache tag lookup.

FIG. G 32 is a diagrammatic illustration showing the manner in which mde data flows and is cached in portions of the DSGP pipeline.

FIG. G 33 is a diagrammatic illustration of an exemplary embodiment of the Fragment Block.

FIG. G 34 is a diagrammatic illustration showing examples of VSPs with the pixel fragments formed by various primitives.

FIG. G 35 is a diagrammatic illustration showing aspects of Fragment Block interpolation using perspective corrected barycentric interpolation for triangles.

FIG. G 36 shows an example of how interpolating between vectors of unequal magnitude may result in uneven angular granularity and why the inventive structure and method does not interpolate normals and tangents this way.

FIG. G 37 is a diagrammatic illustration showing how the fragment x and y coordinates used to form the interpolation coefficients in the Fragment Block are formed.

FIG. G 38 is a diagrammatic illustration showing an overview of texture array addressing.

FIG. G 39 is a diagrammatic illustration showing the Phong unit position in the pipeline and relationship to adjacent blocks.

FIG. G 40 is a digrammatic illustration showning the flow of information packets to Phong 14000 from Fragment 11000, Texture 12000 and from Phong to Pixel 15000.

FIG. G 41 is a diagrammatic illustration showing a block diagram of Phong comprising several sub-units.

FIG. G 42 is a diagrammatic illustration showing the a function flow diagram of processing performed by the Texture Computation block 14114 of FIG. G 41.

FIG. G 43 is a diagrammatic illustration of a portion of the inventive DSGP involved with computation of bump and lighting effects, emphasizing computations performed in the Phong block 14000.

FIG. G 44 is a diagrammatic illustration showing the functional flow of a bump computation performed by one embodiment of the bump unit 14130 of FIG. G 43.

FIG. G 45 is a diagrammatic illustration showing the functional flow of a method used to compute a perturbed surface normal within one embodiment of the bump unit 14130 that can be implemented using fixed-point operations.

FIG. G 46 is a diagrammatic illustration showing a block diagram of the PIX block.

FIG. G 47 is a diagrammatic illustration showing the BackEnd Block (BKE) and units interfacing to it.

FIG. G 48 is a diagrammatic illustration showing external client units that perform memory read and write through the BKE.

FIG. H 1 shows a three-dimensional object, a tetrahedron, in various coordinate systems.

FIG. H 2 is a block diagram illustrating the components and data flow in the geometry block.

FIG. H 3 is a high-level block diagram illustrating the components and data flow in a 3D-graphics pipeline incorporating the invention.

FIG. H 4 is a block diagram of the transformation unit.

FIG. H 5 is a block diagram of the global packet controller.

FIG. H 6 is a reproduction of the Deering et al. generic 3D-graphics pipeline.

FIG. H 7 is a method-flow diagram of a preferred implementation of a 3D-graphics pipeline.

FIG. H 8 illustrates a system for rendering three-dimensional graphics images.

FIG. H 9 shows an example of how the cull block produces fragments from a partially obscured triangle.

FIG. H 10 demonstrates how the pixel block processes a stamp's worth of fragments.

FIG. H 11 is a block diagram of the pipeline stage showing data-path elements.

FIG. H 12 is a block diagram of the pipeline stage showing the instruction controller.

FIG. H 13 is a block diagram of the clipping sub-unit.

FIG. H 14 is a block diagram of the texture state machine.

FIG. H 15 is a block diagram of the synchronization queues and the clipping sub-unit.

FIG. H 16 illustrates the pipeline stage BC.

FIG. H 17 is a block diagram of the instruction controller for the pipeline stage BC.

FIG. J 1 shows a three-dimensional object, a tetrahedron, in various coordinate systems.

FIG. J 2 is a block diagram illustrating the components and data flow in the pixel block.

FIG. J 3 is a high-level block diagram illustrating the components and data flow in a 3D-graphics pipeline incorporating the invention.

FIG. J 4 illustrates the relationship of samples to pixels and stamps and the default sample grid, count and locations according to one embodiment.

FIG. J 5 is a block diagram of the pixel-out unit.

FIG. J 6 is a reproduction of the Deering et al. generic 3D-graphics pipeline.

Figure 7:
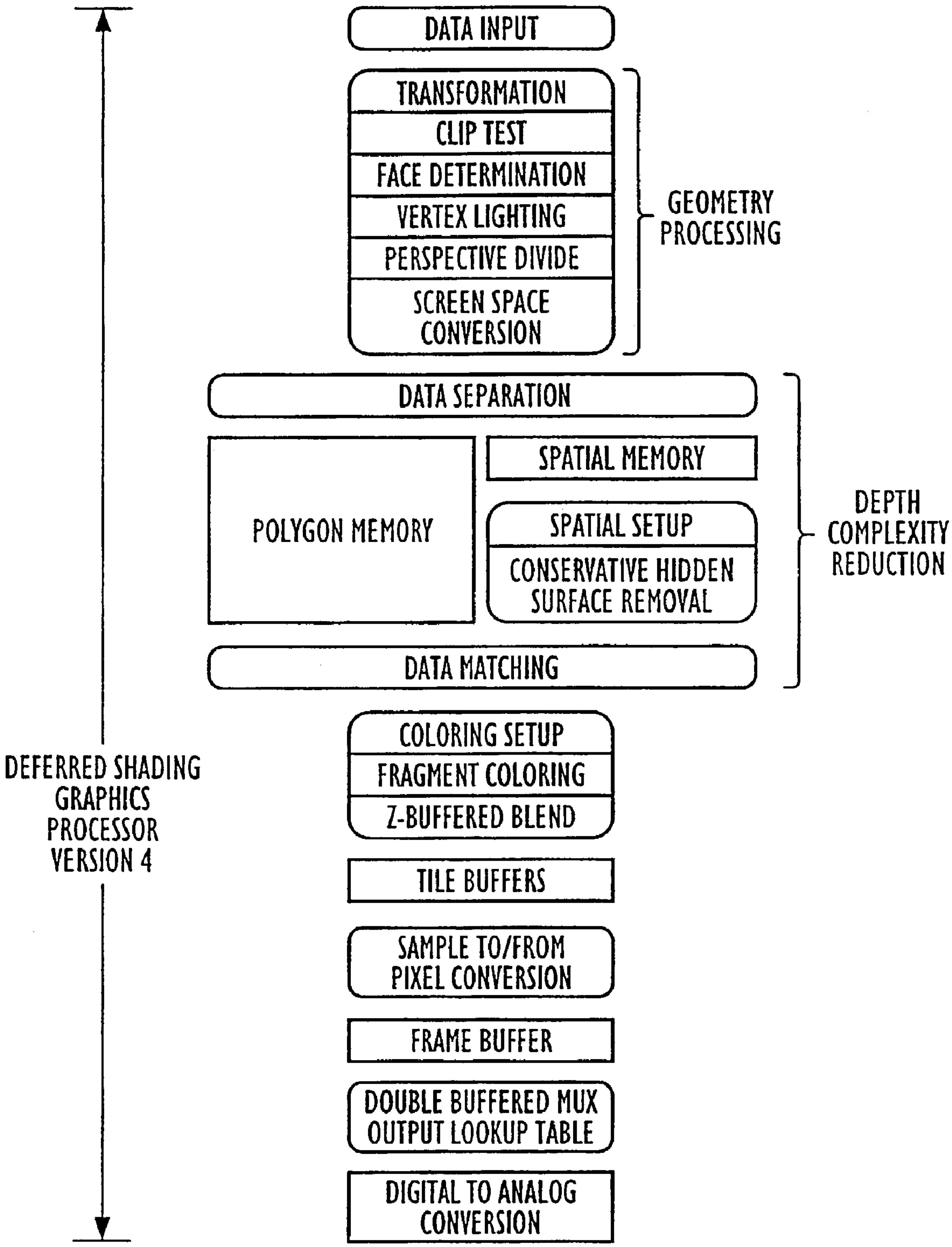
FIG. 7 is a diagrammatic illustration showing a fourth embodiment of the inventive 3-Dimensional Deferred Shading Graphics Pipeline.

FIG. 7 is a method-flow diagram of the pipeline of FIG. J 3.

FIG. J 8 illustrates a system for rendering three-dimensional graphics images.

FIG. J 9 shows an example of how the cull block produces fragments from a partially obscured triangle.

FIG. J 10 demonstrates how the pixel block processes a stamp's worth of fragments.

FIG. J 11 and FIG. J 12 are alternative embodiments of a 3D-graphics pipeline incorporating the invention.

SUMMARY

In one aspect the invention provides structure and method for a deferred graphics pipeline processor. The pipeline processor advantageously includes one or more of a command fetch and decode unit, geometry unit, a mode extraction unit and a polygon memory, a sort unit and a sort memory, setup unit, a cull unit, a mode injection unit, a fragment unit, a texture unit, a Phong lighting unit, a pixel unit, and backend unit coupled to a frame buffer. Each of these units may also be used independently in connection with other processing schemes and/or for processing data other than graphical or image data.

In another aspect the invention provides a command fetch and decode unit communicating inputs of data and/or command from an external computer via a communication channel and converting the inputs into a series of packets, the packets including information items selected from the group consisting of colors, surface normals, texture coordinates, rendering information, lighting, blending modes, and buffer functions.

In still another aspect, the invention provides structure and method for a geometry unit receiving the packets and performing coordinate transformations, decomposition of all polygons into actual or degenerate triangles, viewing volume clipping, and optionally per-vertex lighting and color calculations needed for Gouraud shading.

In still another aspect, the invention provides structure and method for a mode extraction unit and a polygon memory associated with the polygon unit, the mode extraction unit receiving a data stream from the geometry unit and separating the data stream into vertices data which are communicated to a sort unit and non-vertices data which is sent to the polygon memory for storage.

In still another aspect, the invention provides structure and method for a sort unit and a sort memory associated with the sort unit, the sort unit receiving vertices from the mode extraction unit and sorts the resulting points, lines, and triangles by tile, and communicating the sorted geometry by means of a sort block output packet representing a complete primitive in tile-by-tile order, to a setup unit.

In still another aspect, the invention provides structure and method for a setup unit receiving the sort block output packets and calculating spatial derivatives for lines and triangles on a tile-by-tile basis one primitive at a time, and communicating the spatial derivatives in packet form to a cull unit.

In still another aspect, the invention provides structure and method for a cull unit receiving one tile worth of data at a time and having a Magnitude Comparison Content Addressable Memory (MCCAM) Cull sub-unit and a Subpixel Cull sub-unit, the MCCAM Cull sub-unit being operable to discard primitives that are hidden completely by previously processed geometry, and the Subpixel Cull subunit processing the remaining primitives which are partly or entirely visible, and determines the visible fragments of those remaining primitives, the Subpixel Cull sub-unit outputting one stamp worth of fragments at a time.

In still another aspect, the invention provides structure and method for a mode injection unit receiving inputs from the cull unit and retrieving mode information including colors and material properties from the Polygon Memory and communicating the mode information to one or more of a fragment unit, a texture unit, a Phong unit, a pixel unit, and a backend unit; at least some of the fragment unit, the texture unit, the Phong unit, the pixel unit, or the backend unit including a mode cache for cache recently used mode information; the mode injection unit maintaining status information identifying the information that is already cached and not sending information that is already cached, thereby reducing communication bandwidth.

In still another aspect, the invention provides structure and method for a fragment unit for interpolating color values for Gouraud shading, interpolating surface normals for Phong shading and texture coordinates for texture mapping, and interpolating surface tangents if bump maps representing texture as a height field gradient are in use; the fragment unit performing perspective corrected interpolation using barycentric coefficients.

In still another aspect, the invention provides structure and method for a texture unit and a texture memory associated with the texture unit; the texture unit applying texture maps stored in the texture memory, to pixel fragments; the textures being MIP-mapped and comprising a series of texture maps at different levels of detail, each map representing the appearance of the texture at a given distance from an eye point; the texture unit performing tri-linear interpolation from the texture maps to produce a texture value for a given pixel fragment that approximate the correct level of detail; the texture unit communicating interpolated texture values to the Phong unit on a per-fragment basis.

In still another aspect, the invention provides structure and method for a Phong lighting unit for performing Phong shading for each pixel fragment using material and lighting information supplied by the mode injection unit, the texture colors from the texture unit, and the surface normal generated by the fragment unit to determine the fragment's apparent color; the Phong block optionally using the interpolated height field gradient from the texture unit to perturb the fragment's surface normal before shading if bump mapping is in use.

In still another aspect, the invention provides structure and method for a pixel unit receiving one stamp worth of fragments at a time, referred to as a Visible Stamp Portion, where each fragment has an independent color value, and performing pixel ownership test, scissor test, alpha test, stencil operations, depth test, blending, dithering and logic operations on each sample in each pixel; and after accumulating a tile worth of finished pixels, blending the samples within each pixel to antialias the pixels, and communicating the antialiased pixels to a Backend unit.

In still another aspect, the invention provides structure and method for backend unit coupled to the pixel unit for receiving a tile's worth of pixels at a time from the pixel unit, and storing the pixels into a frame buffer.

Overview of Aspects of the Invention—Top Level Summary

Computer graphics is the art and science of generating pictures or images with a computer. This picture generation is commonly referred to as rendering. The appearance of motion, for example in a 3-Dimensional animation is achieved by displaying a sequence of images. Interactive 3-Dimensional (3D) computer graphics allows a user to change his or her viewpoint or to change the geometry in real-time, thereby requiring the rendering system to create new images on-the-fly in real-time. Therefore, real-time performance in color, with high quality imagery is becoming increasingly important.

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor is hereinafter referred to as the DSGP (for Deferred Shading Graphics Processor), or the DSGP pipeline, but is sometimes referred to as the pipeline.

This present invention includes numerous embodiments of the DSGP pipeline. Embodiments of the present invention are designed to provide high-performance 3D graphics with Phong shading, subpixel anti-aliasing, and texture- and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D APIs. The OpenGL specification, entitled "The OpenGL Graphics System: A Specification (Version 1.2)" by Mark Segal and Kurt Akeley, edited by Jon Leech, is included incorporated by reference.

Several exemplary embodiments or versions of a Deferred Shading Graphics Pipeline are now described.

Versions of the Deferred Shading Graphics Pipeline

Several versions or embodiments of the Deferred Shading Graphics Pipeline are described here, and embodiments having various combinations of features may be implemented. Furthermore, features of the invention may be implemented independently of other features. Most of the important features described above can be applied to all versions of the DSGP pipeline.

Tiles, Stamps, Samples, and Fragments

Each frame (also called a scene or user frame) of 3D graphics primitives is rendered into a 3D window on the display screen. A window consists of a rectangular grid of pixels, and the window is divided into tiles (hereinafter tiles are assumed to be 16×16 pixels, but could be any size). If tiles are not used, then the window is considered to be one tile. Each tile is further divided into stamps (hereinafter stamps are assumed to be 2×2 pixels, thereby resulting in 64 stamps per tile, but stamps could be any size within a tile). Each pixel includes one or more of samples, where each sample has its own color values and z-value (hereinafter, pixels are assumed to include four samples, but any number could be used). A fragment is the collection of samples covered by a primitive within a particular pixel. The term "fragment" is also used to describe the collection of visible samples within a particular primitive and a particular pixel.

Deferred Shading

In ordinary Z-buffer rendering, the renderer calculates the color value (RGB or RGBA) and z value for each pixel of each primitive, then compares the z value of the new pixel with the current z value in the Z-buffer. If the z value comparison indicates the new pixel is "in front of" the existing pixel in the frame buffer, the new pixel overwrites the old one; otherwise, the new pixel is thrown away.

Z-buffer rendering works well and requires no elaborate hardware. However, it typically results in a great deal of wasted processing effort if the scene contains many hidden surfaces. In complex scenes, the renderer may calculate color values for ten or twenty times as many pixels as are visible in the final picture. This means the computational cost of any per-pixel operation—such as Phong shading or texture-mapping—is multiplied by ten or twenty. The number of surfaces per pixel, averaged over an entire frame, is called the depth complexity of the frame. In conventional z-buffered renderers, the depth complexity is a measure of the renderer's inefficiency when rendering a particular frame.

In a pipeline that performs deferred shading, hidden surface removal (HSR) is completed before any pixel coloring is done. The objective of a deferred shading pipeline is to generate pixel colors for only those primitives that appear in the final image (i.e., exact HSR). Deferred shading generally requires the primitives to be accumulated before HSR can begin. For a frame with only opaque primitives, the HSR process determines the single visible primitive at each sample within all the pixels. Once the visible primitive is determined for a sample, then the primitive's color at that sample location is determined. Additional efficiency can be achieved by determining a single per-pixel color for all the samples within the same pixel, rather than computing per-sample colors.

For a frame with at least some alpha blending (as defined in the afore referenced OpenGL specification) of primitives (generally due to transparency), there are some samples that are colored by two or more primitives. This means the HSR process must determine a set of visible primitives per sample.

In some APIs, such as OpenGL, the HSR process can be complicated by other operations (that is by operation other than depth test) that can discard primitives. These other operations include: pixel ownership test, scissor test, alpha test, color test, and stencil test (as described elsewhere in this specification). Some of these operations discard a primitive based on its color (such as alpha test), which is not determined in a deferred shading pipeline until after the HSR process (this is because alpha values are often generated by the texturing process, included in pixel fragment coloring). For example, a primitive that would normally obscure a more distant primitive (generally at a greater z-value) can be discarded by alpha test, thereby causing it to not obscure the more distant primitive. A HSR process that does not take alpha test into account could mistakenly discard the more distant primitive. Hence, there may be an inconsistency between deferred shading and alpha test (similarly, with color test and stencil test); that is, pixel coloring is postponed until after hidden surface removal, but hidden surface removal can depend on pixel colors. Simple solutions to this problem include: 1) eliminating non-depth-dependent tests from the API, such as alpha test, color test, and stencil test, but this potential solution might prevent existing programs from executing properly on the deferred shading pipeline; and 2) having the HSR process do some color generation, only when needed, but this potential solution would complicate the data flow considerably. Therefore, neither of these choices is attractive. A third alternative, called conservative hidden surface removal (CHSR), is one of the important innovations provided by the inventive structure and method. CHSR is described in great detail in subsequent sections of the specification.

Figure 4:
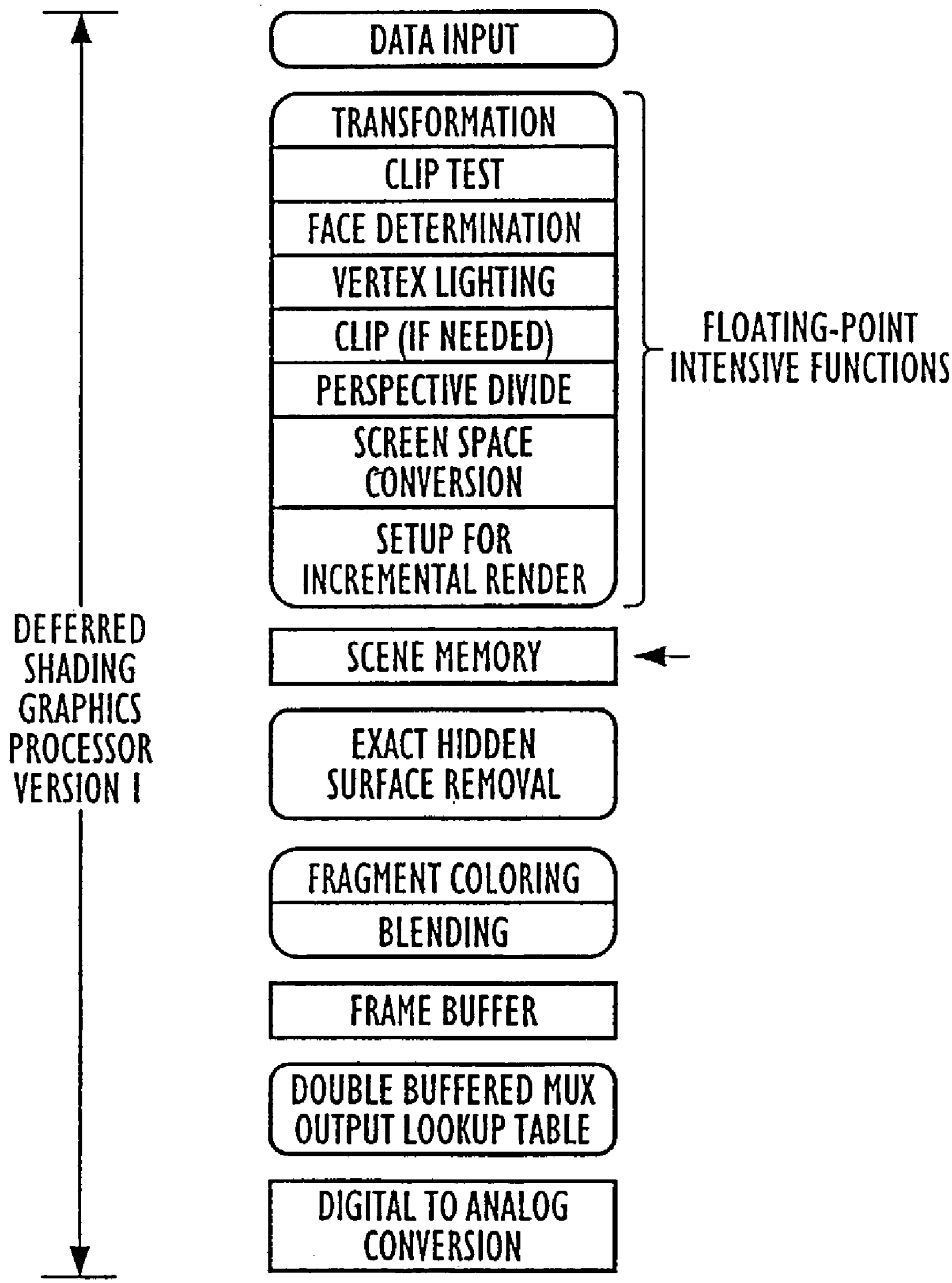
FIG. 4 is a diagrammatic illustration showing a first embodiment of the inventive 3-Dimensional Deferred Shading Graphics Pipeline.

Another complication in many APIs is their ability to change the depth test. The standard way of thinking about 3D rendering assumes visible objects are closer than obscured objects (i.e., at lesser z-values), and this is accomplished by selecting a "less-than" depth test (i.e., an object is visible if its z-value is "less-than" other geometry). However, most APIs support other depth tests such as: greater-than, less-than, greater-than-or-equal-to, equal, less-than-or-equal-to, less-than, not-equal, and the like algebraic, magnitude, and logical relationships. This essentially "changes the rules" for what is visible. This complication is compounded by an API allowing the application program to change the depth test within a frame. Different geometry may be subject to drastically different rules for visibility. Hence, the time order of primitives with different rendering rules must be taken into account. For example, in the embodiment illustrated in FIG. 4, three primitives are shown with their respective depth test (only the z dimension is shown in the figure, so this may be considered the case for one sample). If they are rendered in the order A, B, then C, primitive B will be the final visible surface. However, if the primitives are rendered in the order C, B, then A, primitive A will be the final visible surface. This illustrates how a deferred shading pipeline must preserve the time ordering of primitives, and correct pipeline state (for example, the depth test) must be associated with each primitive.

Deferred Shading Graphics Pipeline, First Embodiment (Version 1)

Figure 2:
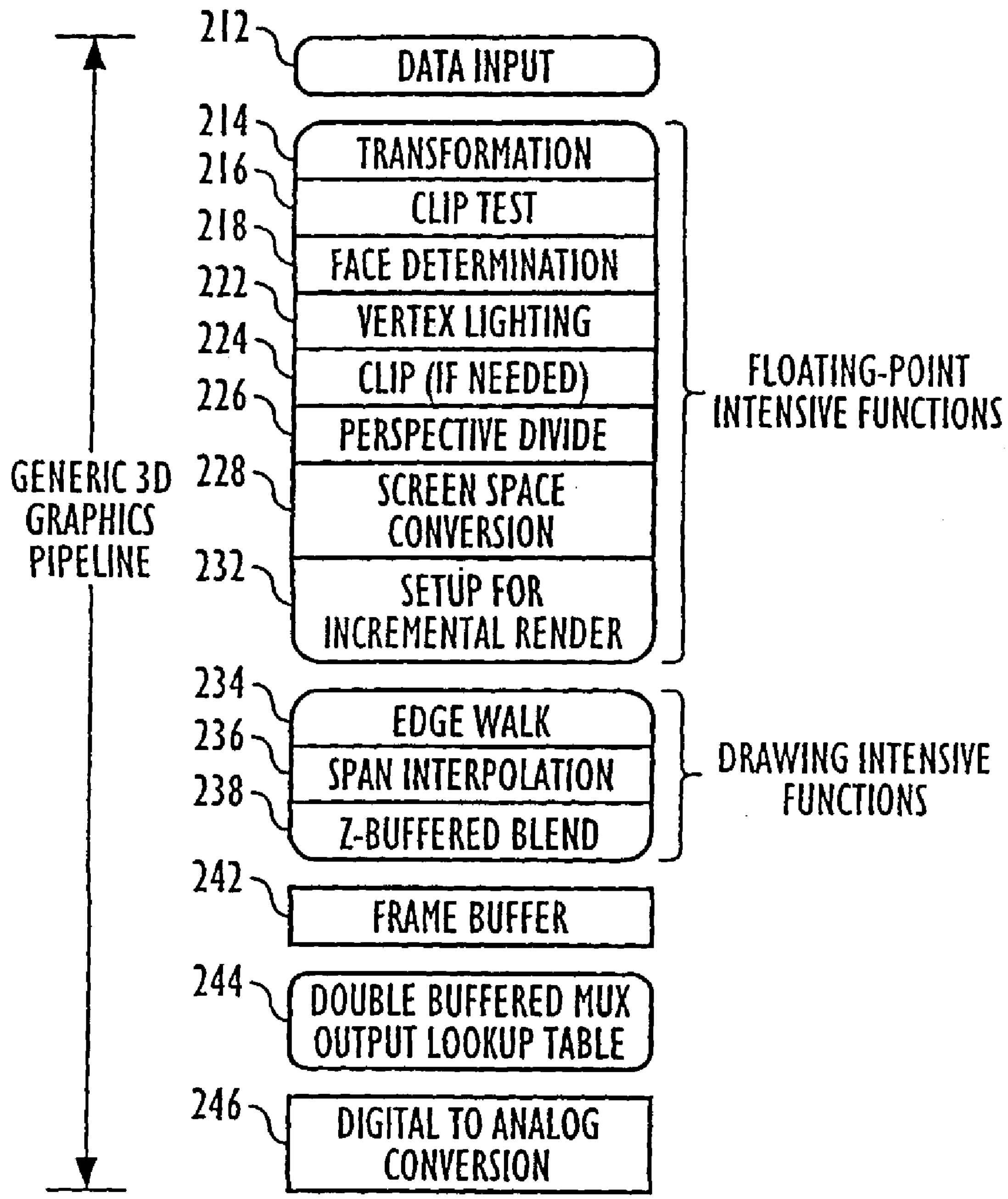
FIG. 2 is a diagrammatic illustration showing a conventional generic renderer for a 3D graphics pipeline.

A conventional 3D graphics pipeline is illustrated in FIG. 2. We now describe a first embodiment of the inventive 3D Deferred Shading Graphics Pipeline Version 1 (hereinafter "DSGPv1"), relative to FIG. 4. It will be observed that the inventive pipeline (FIG. 4) has been obtained from the generic conventional pipeline (FIG. 2) by replacing the drawing intensive functions 231 with: (1) a scene memory 250 for storing the pipeline state and primitive data describing each primitive, called scene memory in the figure; (2) an exact hidden surface removal process 251; (3) a fragment coloring process 252; and (4) a blending process 253.

The scene memory 250 stores the primitive data for a frame, along with their attributes, and also stores the various settings of pipeline state throughout the frame. Primitive data includes vertex coordinates, texture coordinates, vertex colors, vertex normals, and the like In DSGPv1, primitive data also includes the data generated by the setup for incremental render, which includes spatial, color, and edge derivatives.

When all the primitives in a frame have been processed by the floating-point intensive functions 213 and stored into the scene memory 250, then the HSR process commences. The scene memory 250 can be double buffered, thereby allowing the HSR process to perform computations on one frame while the floating-point intensive functions perform computations on the next frame. The scene memory can also be triple buffered. The scene memory could also be a scratchpad for the HSR process, storing intermediate results for the HSR process, allowing the HSR process to start before all primitive have been stored into the scene memory.

In the scene memory, every primitive is associated with the pipeline state information that was valid when the primitive was input to the pipeline. The simplest way to associate the pipeline state with each primitive is to include the entire pipeline state within each primitive. However, this would introduce a very large amount of redundant information because much of the pipeline state does not change between most primitives (especially when the primitives are in the same object). The preferred way to store information in the scene memory is to keep separate lists: one list for pipeline state settings and one list for primitives. Furthermore, the pipeline state information can be split into a multiplicity of sub-lists, and additions to each sub-list occurs only when part of the sub-list changes. The preferred way to store primitives is done by storing a series of vertices, along with the connectivity information to re-create the primitives. This preferred way of storing primitives eliminates redundant vertices that would otherwise occur in polygon meshes and line strips.

The HSR process described relative to DSGPv1 is required to be an exact hidden surface removal (EHSR) because it is the only place in the DSGPv1 where hidden surface removal is done. The exact hidden surface removal (EHSR) process 251 determines precisely which primitives affect the final color of the pixels in the frame buffer. This process accounts for changes in the pipeline state, which introduces various complexities into the process. Most of these complications stem from the per-fragment operations (ownership test, scissor test, alpha test, and the like), as described above. These complications are solved by the innovative conservative hidden surface removal (CHSR) process, described later, so that exact hidden surface removal is not required.

The fragment coloring process generates colors for each sample or group of samples within a pixel. This can include: Gouraud shading, texture mapping, Phong shading, and various other techniques for generating pixel colors. This process is different from edged walk 232 and span interpolation 234 because this process must be able to efficiently generate colors for subsections of primitives. That is, a primitive may be partially visible, and therefore, colors need to be generated for only some of its pixels, and edge walk and span interpolation assume the entire primitive must be colored. Furthermore, the HSR process may generate a multiplicity of visible subsections of a primitive, and these may be interspersed in time amongst visible subsections of other primitives. Hence, the fragment coloring process 252 should be capable of generating color values at random locations within a primitive without needing to do incremental computations along primitive edges or along the x-axis or y-axis.

The blending process 253 of the inventive embodiment combines the fragment colors together to generate a single color per pixel. In contrast to the conventional z-buffered blend process 236, this blending process 253 does not include z-buffer operations because the exact hidden surface removal process 251 as already determined which primitives are visible at each sample. The blending process 253 may keep separate color values for each sample, or sample colors may be blended together to make a single color for the entire pixel. If separate color values are kept per sample and are stored separately into the Frame buffer 240, then final pixel colors are generated from sample colors during the scan out process as data is sent to the digital to analog converter 242.

Deferred Shading Graphics Pipeline, Second Embodiment (Version 2)

As described above for DSGPv1, the scene memory 250 stores: (1) primitive data; and (2) pipeline state. In a second embodiment of the Deferred Shading Graphics Pipeline 260 (Version 2) (DSGPv2),illustrated in FIG. 5, this scene memory 250 is split into two parts: a spatial memory 261 part and polygon memory 262 part. The split of the data is not simply into primitive data and pipeline state data.

In DSGPv2, the part of the pipeline state data needed for HSR is stored into spatial memory 261, while the rest is stored into polygon memory 262. Examples of pipeline state needed for HSR include (as defined, for example, in the OpenGL Specification) are DepthFunc, DepthMask, StencilEnable, etc. Examples of pipeline state not needed for HSR include: BlendEquation, BlendFunc, stipple pattern, etc. While the choice or identification of a particular blending function (for example, choosing $R=R_sA_s+R_0(1-A_s)$) is not needed for HSR, the HSR process must account for whether the primitive is subject to blending, which generally means the primitive is treated as not being able to fully occlude prior geometry. Similarly, the HSR process must account for whether the primitive is subject to scissor test, alpha test, color test, stencil test, and other per-fragment operations.

Primitive data is also split. The part of the primitive data needed for HSR is stored into spatial memory 261, and the rest of the primitive data is stored into polygon memory 262. The part of primitive data needed for HSR includes vertex locations and spatial derivatives (i.e., δz/δx, δz/δy, dx/dy for edges, etc.). The part of primitive data not needed for HSR includes vertex colors, texture coordinates, color derivatives, etc. If per-fragment lighting is performed in the pipeline, the entire lighting equation is applied to every fragment. But in a deferred shading pipeline, only visible fragments require lighting calculations. In this case, the polygon memory may also include vertex normals, vertex eye coordinates, vertex surface tangents, vertex binormals, spatial derivatives of all these attributes, and other per-primitive lighting information.

During the HSR process, a primitive's spatial attributes are accessed repeatedly, especially if the HSR process is done on a per-tile basis. Splitting the scene memory 250 into spatial memory 261 and polygon memory 262 has the advantage of reducing total memory bandwidth.

The output from setup for incremental render 230 is input to the spatial data separation process 263, which stores all the data needed for HSR into spatial memory 261 and the rest of the data into polygon memory 262. The EHSR process 264 receives primitive spatial data (e.g., vertex screen coordinates, spatial derivatives, etc.) and the part of the pipeline state needed for HSR (including all control bits for the per-fragment testing operations).

When visible fragments are output from the EHSR 264, the data matching process 265 matches the vertex state and pipeline state with visible fragments, and tile information is stored in tile buffers 266. The remainder of the pipeline is primarily concerned with the scan out process including sample to/from pixel conversion 267, reading and writing to the frame buffer, double buffered MUX output look-up, and digital to analog (D/A) conversion of the data stored in the frame buffer to the actual analog display device signal values.

Deferred Shading Graphics Pipeline, Third Embodiment (Version 3)

Figure 6:
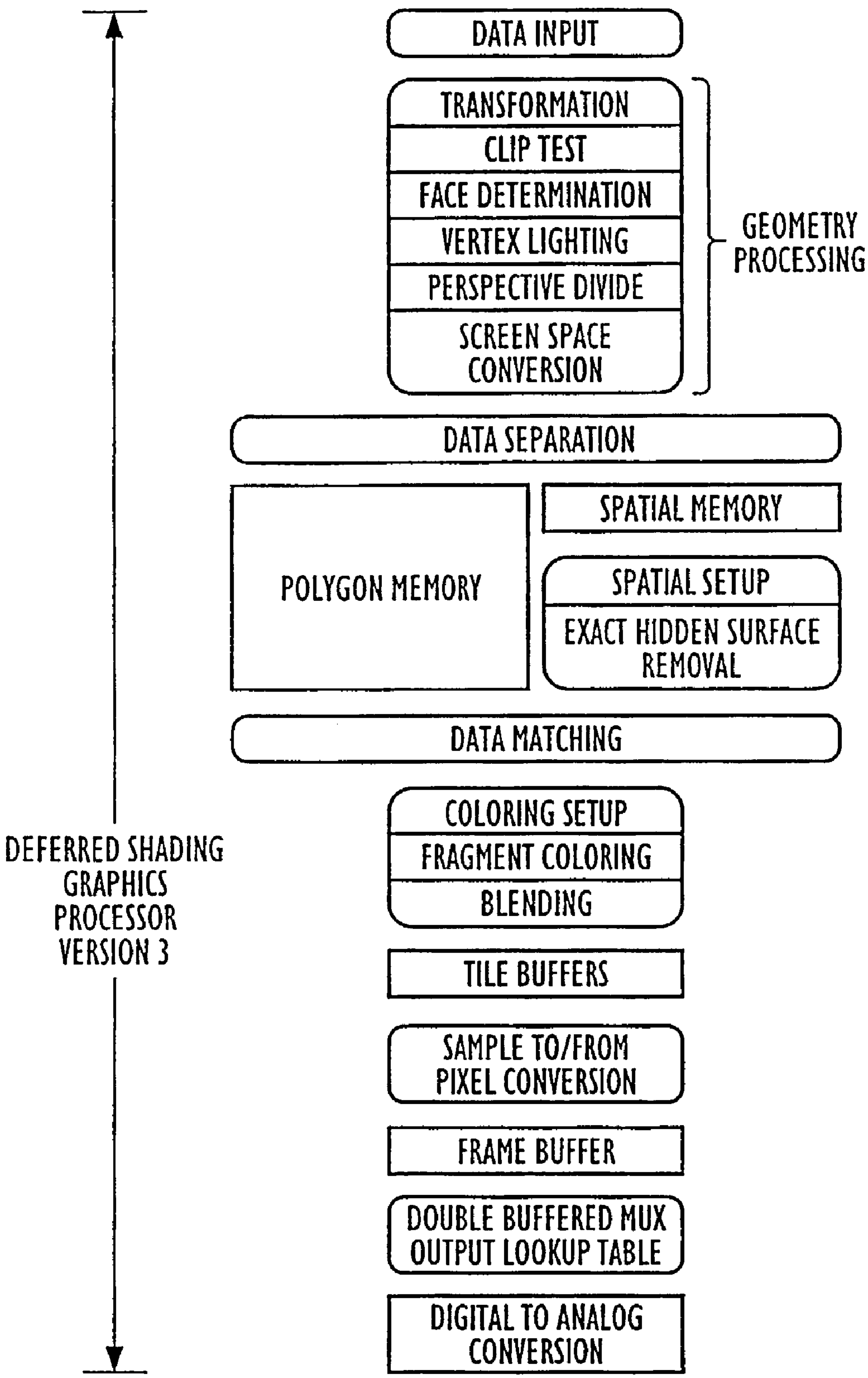
FIG. 6 is a diagrammatic illustration showing a third embodiment of the inventive 3-Dimensional Deferred Shading Graphics Pipeline.

In a third embodiment of the Deferred Shading Graphics Pipeline (Version 3) (DSGPv3), illustrated in FIG. 6, the scene memory 250 is still split into two parts (a spatial memory 261 and polygon memory 262) and in addition the setup for incremental render 230 is replaced by a spatial setup which occurs after data separation and prior to exact hidden surface removal. The remainder of the pipeline structure and processes are unchanged from those already described relative to the first embodiment.

Deferred Shading Graphics Pipeline, Fourth Embodiment (Version 4)

In a fourth embodiment of the Deferred Shading Graphics Pipeline (Version 4) (DSGPv4), illustrated in FIG. 7, the exact hidden surface removal of the third embodiment (FIG. 6) is replace by a conservative hidden surface removal structure and procedure and a down-stream z-buffered blend replaces the blending procedure.

Deferred Shading Graphics Pipeline, Fifth Embodiment (Version 5)

Figure 8:
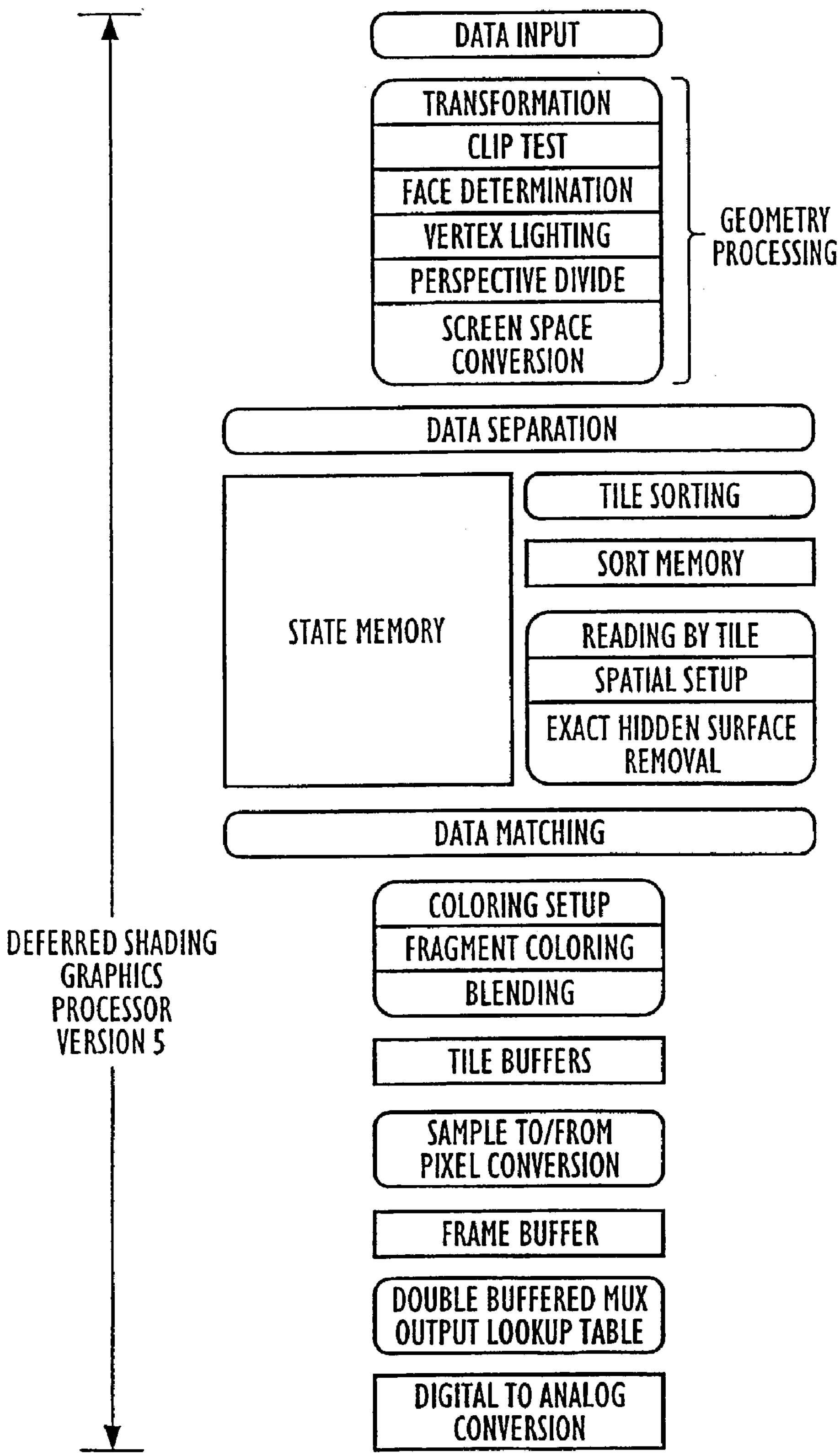
FIG. 8 is a diagrammatic illustration showing a fifth embodiment of the inventive 3-Dimensional Deferred Shading Graphics Pipeline.

In a fifth embodiment of the Deferred Shading Graphics Pipeline (Version 5) (DSGPv5), illustrated in FIG. 8, exact hidden surface removal is used as in the third embodiment, however, the tiling is added, and a tile sorting procedure is added after data separation, and the read is by tile prior to spatial setup. In addition, the polygon memory of the first three embodiments is replaced with a state memory.

Deferred Shading Graphics Pipeline, Sixth Embodiment (Version 6)

Figure 9:
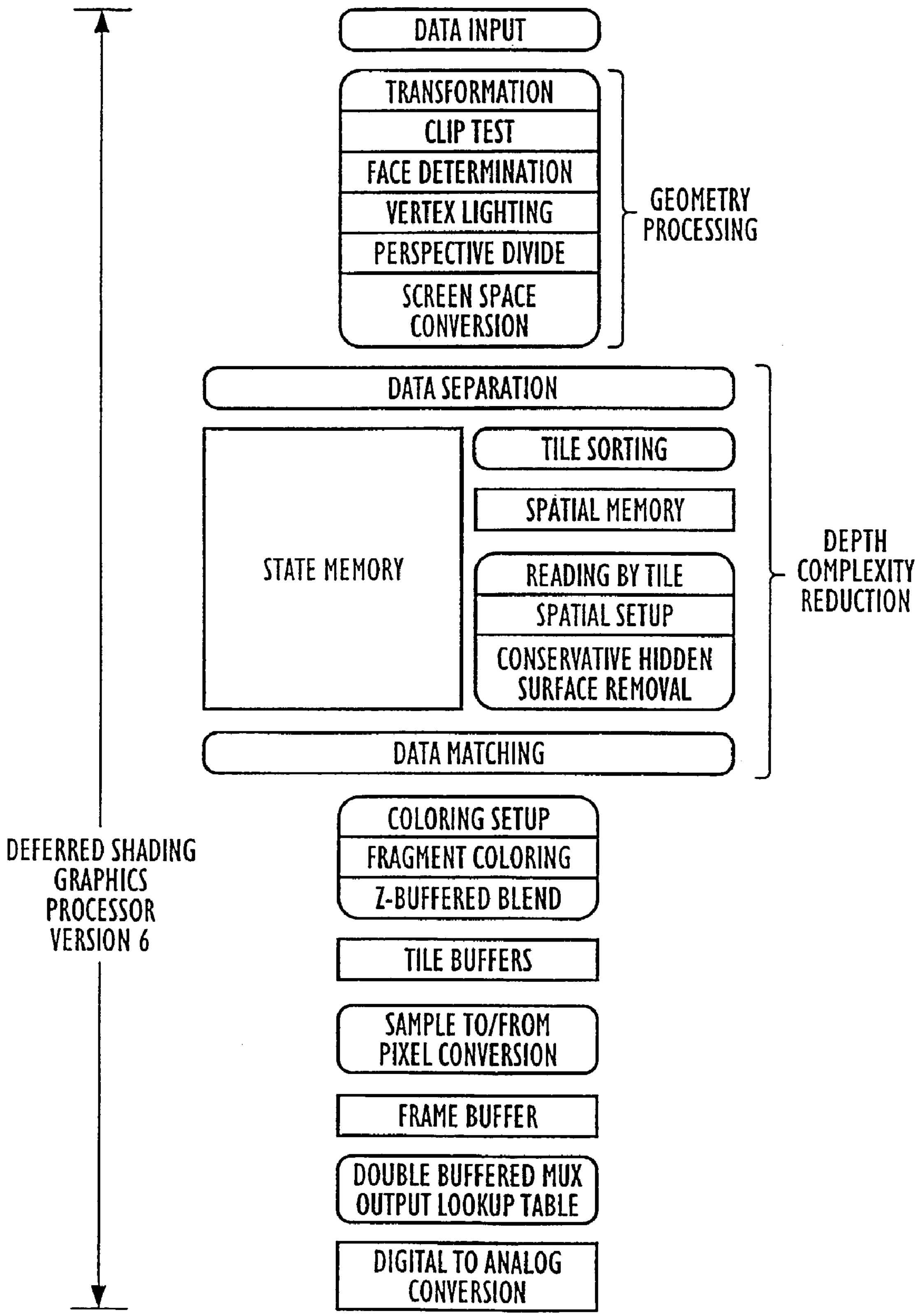
FIG. 9 is a diagrammatic illustration showing a sixth embodiment of the inventive 3-Dimensional Deferred Shading Graphics Pipeline.
Figure 10:
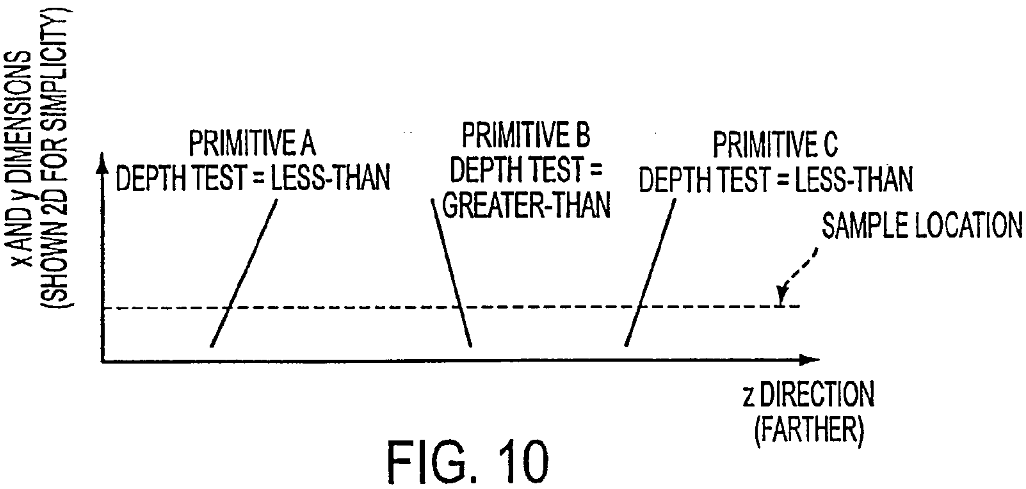
FIG. 10 is a diagrammatic illustration showing considerations for an embodiment of conservative hidden surface removal.

In a sixth embodiment of the Deferred Shading Graphics Pipeline (Version 6) (DSGPv6), illustrated in FIG. 9, the exact hidden surface removal of the fifth embodiment (FIG. 8) is replaced with a conservative hidden surface removal, and the downstream blending of the fifth embodiment is replaced with a z-buffered blending (Testing & Blending). This sixth embodiment is preferred because it incorporates several of the beneficial features provided by the inventive structure and method including: a two-part scene memory, primitive data splitting or separation, spatial setup, tiling and per tile processing, conservative hidden surface removal, and z-buffered blending (Testing & Blending), to name a few features.

Other Possible Embodiments (Versions)

It should be noted that although several exemplary embodiments of the inventive Graphics Pipeline have been shown and described relative to FIGS. 4–9, those workers having ordinary skill in the art in light of the description provided here will readily appreciate that the inventive structures and procedures may be implemented in different combinations and permutations to provide other embodiments of the invention, and that the invention is not limited to the particular combinations specifically identified here.

Overviews of Important Innovations

The pipeline renders primitives, and the invention is described relative to a set of renderable primitives that include: 1) triangles, 2) lines, and 3) points. Polygons with more than three vertices are divided into triangles in the Geometry block, but the DSGP pipeline could be easily modified to render quadrilaterals or polygons with more sides. Therefore, since the pipeline can render any polygon once it is broken up into triangles, the inventive renderer effectively renders any polygon primitive.

To identify what part of a 3D window on the display screen a given primitive may affect, the pipeline divides the 3D window being drawn into a series of smaller regions, called tiles and stamps. The pipeline performs deferred shading, in which pixel colors are not determined until after hidden-surface removal. The use of a Magnitude Comparison Content Addressable Memory (MCCAM) allows the pipeline to perform hidden geometry culling efficiently.

Conservative Deferred Shading

One of the central ideas or inventive concepts provided by the invention pertains to Conservative Hidden Surface Removal (CHSR). The CHSR processes each primitive in time order and, for each sample that a primitive touches, makes conservative decision based on the various API state variables, such at depth test and alpha test. One of the important features of the CHSR process is that color computation does not need to be done during hidden surface removal even though non-depth-dependent tests from the API, such as alpha test, color test, and stencil test can be performed by the DSGP pipeline. The CHSR process can be considered a finite state machine (FSM) per sample. Hereinafter, each per-sample FSM is called a sample finite state machine (SFSM). Each SFSM maintains per-sample data including: (1) z-coordinate information; (2) primitive information (any information needed to generate the primitive's color at that sample or pixel); and (3) one or more sample state bits (for example, these bits could designate the z-value or z-values to be accurate or conservative). While multiple z-values per sample can be easily used, multiple sets of primitive information per sample would be expensive. Hereinafter, it is assumed that the SFSM maintains primitive information for one primitive. The SFSM may also maintain transparency information, which is used for sorted transparencies, described in the next section.

CHSR and Alpha Test

Figure 11:
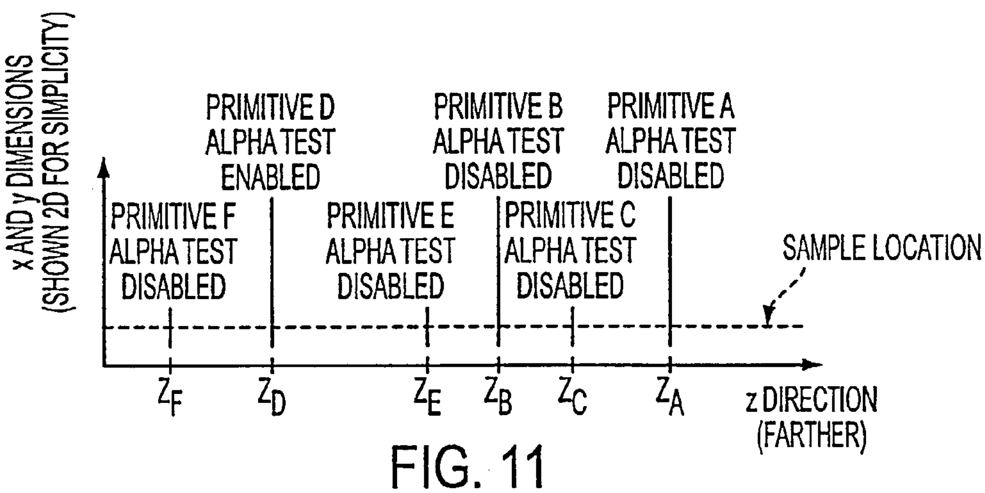
FIG. 11 is a diagrammatic illustration showing considerations for alpha-test and depth-test in an embodiment of conservative hidden surface removal.

As an example of the CHSR process dealing with alpha test, consider the diagrammatic illustration of FIGS. 10–14, particularly FIG. 11. This diagram illustrates the rendering of six primitives (Primitives A, B, C, D, E, and F) at different z-coordinate locations for a particular sample, rendered in the following order (starting with a "depth clear" and with "depth test" set to less-than): primitives A, B, and C (with "alpha test" disabled); primitive D (with "alpha test" enabled); and primitives E and F (with "alpha test" disabled). We note from the illustration that $z_A>z_C>z_B>z_E>z_D>z_F$, such that primitive A is at the greatest z-coordinate distance. We also note that alpha test is enabled for primitive D, but disabled for each of the other primitives.

Recall from the earlier description of CHSR, that the CHSR process may be considered to be a sample finite state machine (SFSM). The steps for rendering these six primitives under the conservative hidden surface removal process with alpha test are as follows:

Step 1: The depth clear causes the following result in each sample finite state machine (SFSM): 1) z-values are initialized to the maximum value; 2) primitive information is cleared; and 3) sample state bits are set to indicate the z-value is accurate.

Step 2: When primitive A is processed by the SFSM, the primitive is kept (i.e., it becomes the current best guess for the visible surface), and this causes the SFSM to store: 1) the z-value $z_A$ as the "near" z-value; 2) primitive information needed to color primitive A; and 3) the z-value ($z_A$) is labeled as accurate.

Step 3: When primitive B is processed by the SFSM, the primitive is kept (its z-value is less-than that of primitive A), and this causes the SFSM to store: 1) the z-value $z_B$ as the "near" z-value ($z_A$ is discarded); 2) primitive information needed to color primitive B (primitive A's information is discarded); and 3) the z-value ($z_B$) is labeled as accurate.

Step 4: When primitive C is processed by the SFSM the primitive is discarded (i.e., it is obscured by the current best guess for the visible surface, primitive B), and the SFSM data is not changed.

Step 5: When primitive D (which has alpha test enabled) is processed by the SFSM, the primitive's visibility can not be determined because it is closer than primitive B and because its alpha value is unknown at the time the SFSM operates. Because a decision can not be made as to which primitive would end up being visible (either primitive B or primitive D) primitive B is sent down the pipeline (to have its colors generated) and primitive D is kept. Hereinafter, this is called "early dispatch" of primitive B. When processing of primitive D has been completed, the SFSM stores: 1) the "near" z-value is $z_D$ and the "far" z-value is $z_b$; 2) primitive information needed to color primitive D (primitive B's information has undergone early dispatch); and 3) the z-values are labeled as conservative (because both a near and far are being maintained). In this condition, the SFSM can determine that a piece of geometry closer than $z_D$ obscures previous geometry, geometry farther than $z_B$ is obscured, and geometry between $z_D$ and $z_B$ is indeterminate and must be assumed to be visible (hence a conservative assumption is made). When an SFSM is in the conservative state and it contains valid primitive information, the SFSM method considers the depth value of the stored primitive information to be the near depth value.

Step 6: When primitive E (which has alpha test disabled) is processed by the SFSM, the primitive's visibility can not be determined because it is between the near and far z-values (i.e., between $z_D$ and 4). However, primitive E is not sent down the pipeline at this time because it could result in the primitives reaching the z-buffered blend (later described as part of the Pixel Block in the preferred embodiment) out of correct time order. Therefore, primitive D is sent down the pipeline to preserve the time ordering. When processing of primitive E has been completed, the SFSM stores: 1) the "near" z-value is $z_D$ and the "far" z-value is $z_B$ (note these have not changed, and $z_E$ is not kept); 2) primitive information needed to color primitive E (primitive D's information has undergone early dispatch); and 3) the z-values are labeled as conservative (because both a near and far are being maintained).

Step 7: When primitive F is processed by the SFSM, the primitive is kept (its z-value is less-than that of the near z-value), and this causes the SFSM to store: 1) the z-value $z_F$ as the "near" z-value ($z_D$ and $z_B$ are discarded); 2) primitive information needed to color primitive F (primitive E's information is discarded); and 3) the z-value ($z_F$) is labeled as accurate.

Step 8: When all the geometry that touches the tile has been processed (or, in the case there are no tiles, when all the geometry in the frame has been processed), any valid primitive information is sent down the pipeline. In this case, primitive F's information is sent. This is the end-of-tile (or end-of-frame) dispatch, and not an early dispatch.

In summary of this exemplary CHSR process, primitives A through F have been processed, and primitives B, D, and F have been sent down the pipeline. To resolve the visibility of B, D, and F, a z-buffered blend (in the Pixel Block in the preferred embodiment) is included near the end of the pipeline. In this example, only the color primitive F is used for the sample.

CHSR and Stencil Test

In the preferred embodiment of the CHSR process, all stencil operations are done near the end of the pipeline (in the z-buffered blend, called the Pixel Block in the preferred embodiment), and therefore, stencil values are not available to the CSHR method (that takes place in the Cull Block of the preferred embodiment) because they are kept in the frame buffer. While it is possible for the stencil values to be transmitted from the frame buffer for use in the CHSR process, this would generally require a long latency path that would reduce performance. The stencil values can not be accurately maintained within the CHSR process because, in APIs such as OpenGL, the stencil test is performed after alpha test, and the results of alpha test are not known to the CHSR process, which means input to the stencil test can not be accurately modeled. Furthermore, renderers maintain stencil values over many frames (as opposed to depth values that are generally cleared at the start of each frame), and these stencil values are stored in the frame buffer. Because of all this, the CHSR process utilizes a conservative approach to dealing with stencil operations. If a primitive can affect the stencil values in the frame buffer, then the primitive is always sent down the pipeline (hereinafter, this is called a "CullFlushOverlap", and is indicated by the assertion of the signal CullFlushOverlap in the Cull Block) because stencil operations occur before the depth test (see OpenGL specification). A CullFlushOverlap condition sets the SFSM to its most conservative state.

As another possibility, if the stencil reference value (see OpenGL specification) is changed and the stencil test is enabled and configured to discard sample values based on the stencil values in the frame buffer, then all the valid primitive information in the SFSMs are sent down the pipeline (hereinafter, this is called a "CullFlushAll", and is indicated by the assertion of the signal CullFlushAll in the Cull Block) and the z-values are set to their maximum value. This "flushing" is needed because changing the stencil reference value effectively changes the "visibility rules" in the z-buffered blend (or Pixel Block)

Figure 12:
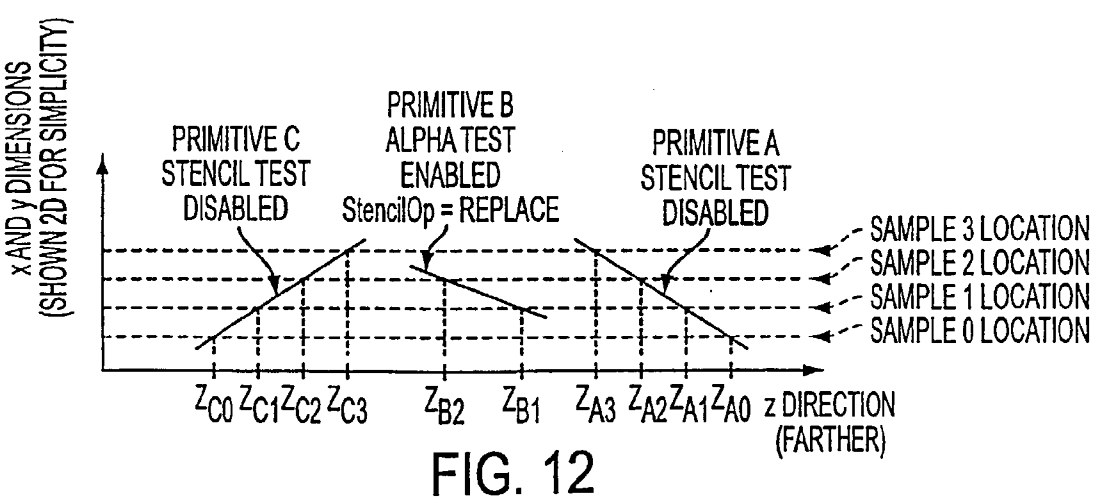
FIG. 12 is a diagrammatic illustration showing considerations for stencil-test in an embodiment of conservative hidden surface removal.

As an example of the CHSR process dealing with stencil test (see OpenGL specification), consider the diagrammatic illustration of FIG. 12, which has two primitives (primitives A and C) covering four particular samples (with corresponding SFSMs, labeled SFSM0 through SFSM3) and an additional primitive (primitive B) covering two of those four samples. The three primitives are rendered in the following order (starting with a depth clear and with depth test set to less-than): primitive A (with stencil test disabled); primitive B (with stencil test enabled and StencilOp set to "REPLACE", see OpenGL specification); and primitive C (with stencil test disabled). The steps are as follows:

Step 1: The depth clear causes the following in each of the four SFSMs in this example: 1) z-values are initialized to the maximum value; 2) primitive information is cleared; and 3) sample state bits are set to indicate the z-value is accurate.

Step 2: When primitive A is processed by each SFSM, the primitive is kept (i.e., it becomes the current best guess for the visible surface), and this causes the four SFSMs to store: 1) their corresponding z-values (either $z_{A0}$, $z_{A1}$, $z_{A2}$, or $z_{A3}$ respectively) as the "near" z-value; 2) primitive information needed to color primitive A; and 3) the z-values in each SFSM are labeled as accurate.

Step 3: When primitive B is processed by the SFSMs, only samples 1 and 2 are affected, causing SFSM0 and SFSM3 to be unaffected and causing SFSM1 and SFSM2 to be updated as follows: 1) the far z-values are set to the maximum value and the near z-values are set to the minimum value; 2) primitive information for primitives A and B are sent down the pipeline; and 3) sample state bits are set to indicate the z-values are conservative.

Step 4: When primitive C is processed by each SFSM, the primitive is kept, but the SFSMs do not all handle the primitive the same way. In SFSM0 and SFSM3, the state is updated as: 1) $z_{C0}$ and $z_{C3}$ become the "near" z-values ($Z_{A0}$ and $Z_{A3}$ are discarded); 2) primitive information needed to color primitive C (primitive A's information is discarded); and 3) the z-values are labeled as accurate. In SFSM1 and SFSM2, the state is updated as: 1) $Z_{C1}$ and $ZC_2$ become the "far" z-values (the near z-values are kept); 2) primitive information needed to color primitive C; and 3) the z-values remain labeled as conservative.

In summary of this example CHSR process, primitives A through C have been processed, and all the primitives were sent down the pipeline, but not in all the samples. To resolve the visibility, a z-buffered blend (in the Pixel Block in the preferred embodiment) is included near the end of the pipeline. Multiple samples were shown in this example to illustrate that CullFlushOverlap "flushes" selected samples while leaving others unaffected.

CHSR and Alpha Blending

Alpha blending is used to combine the colors of two primitives into one color. However, the primitives are still subject to the depth test for the updating of the z-values.

Figure 13:
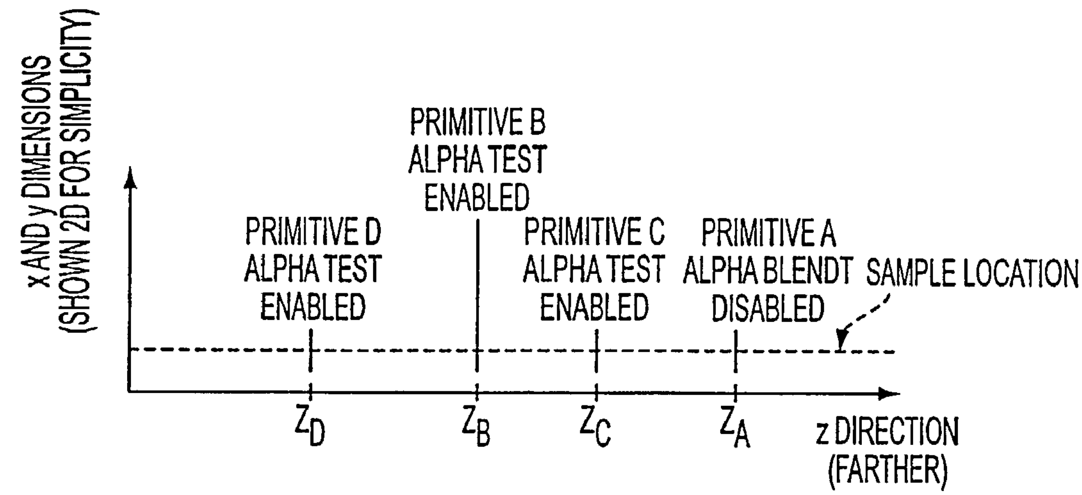
FIG. 13 is a diagrammatic illustration showing considerations for alpha-blending in an embodiment of conservative hidden surface removal.
Figure 14:
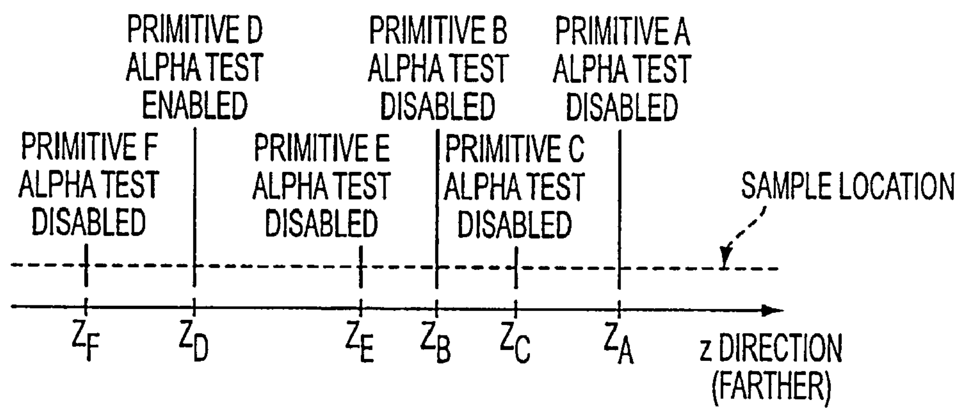
FIG. 14 is a diagrammatic illustration showing additional considerations for an embodiment of conservative hidden surface removal.

As an example of the CHSR process dealing with alpha blending, consider FIG. 13, which has four primitives (primitives A, B, C, and D) for a particular sample, rendered in the following order (starting with a depth clear and with depth test set to less-than): primitive A (with alpha blending disabled); primitives B and C (with alpha blending enabled); and primitive D (with alpha blending disabled). The steps are as follows:

Step 1: The depth clear causes the following in each CHSR SFSM: 1) z-values are initialized to the maximum value; 2) primitive information is cleared; and 3) sample state bits are set to indicate the z-value is accurate.

Step 2: When primitive A is processed by the SFSM, the primitive is kept (i.e., it becomes the current best guess for the visible surface), and this causes the SFSM to store: 1) the z-value $z_A$ as the "near" z-value; 2) primitive information needed to color primitive A; and 3) the z-value is labeled as accurate.

Step 3: When primitive B is processed by the SFSM, the primitive is kept (because its z-value is less-than that of primitive A), and this causes the SFSM to store: 1) the z-value $z_B$ as the "near" z-value ($z_A$ is discarded); 2) primitive information needed to color primitive B (primitive A's information is sent down the pipeline); and 3) the z-value ($z_B$) is labeled as accurate. Primitive A is sent down the pipeline because, at this point in the rendering process, the color of primitive B is to be blended with primitive A. This preserves the time order of the primitives as they are sent down the pipeline.

Step 4: When primitive C is processed by the SFSM, the primitive is discarded (i.e., it is obscured by the current best guess for the visible surface, primitive B), and the SFSM data is not changed. Note that if primitives B and C need to be rendered as transparent surfaces, then primitive C should not be hidden by primitive B. This could be accomplished by turning off the depth mask while primitive B is being rendered, but for transparency blending to be correct, the surfaces should be blended in either front-to-back or back-to-front order.

If the depth mask (see OpenGL specification) is disabled, writing to the depth buffer (i.e., saving z-values) is not performed; however, the depth test is still performed. In this example, if the depth mask is disabled for primitive B, then the value $z_B$ is not saved in the SFSM. Subsequently, primitive C would then be considered visible because its z-value would be compared to $z_A$.

In summary of this example CHSR process, primitives A through D have been processed, and all the primitives were sent down the pipeline, but not in all the samples. To resolve the visibility, a z-buffered blend (in the Pixel Block in the preferred embodiment) is included near the end of the pipeline. Multiple samples were shown in this example to illustrate that CullFlushOverlap "flushes" selected samples while leaving others unaffected.

CHSR and Greater-than Depth Test

Implementation of the Conservative Hidden Surface Removal procedure, advantageously maintains compatibility with other standard APIs, such as OpenGL. Recall that one complication of many APIs is their ability to change the depth test. Recall that the standard way of thinking about 3D rendering assumes visible objects are closer than obscured objects (i.e., at lesser z-values), and this is accomplished by selecting a "less-than" depth test (i.e., an object is visible if its z-value is "less-than" other geometry). Recall also, however, that most APIs support other depth tests, which may change within a frame, such as: greater-than, less-than, greater-than-or-equal-to, equal, less-than-or-equal-to, less-than, not-equal, and the like algebraic, magnitude, and logical relationships. This essentially dynamically "changes the rules" for what is visible, and as a result, the time order of primitives with different rendering rules must be taken into account.

In the case of the inventive conservative hidden surface removal, different or additional procedures are advantageously implemented for reasons described below, to maintain compatibility with other standard APIs when a "greater-than" depth test is used. Those workers having ordinary skill in the art will also realize that analogous changes may advantageously be employed if the depth test is greater-than-or-equal-to, or other functional relationship that would otherwise result in the anomalies described.

We note further that with a conventional non-deferred shader, one executes a sequence of rules for every geometry item and then look to see the final rendered result. By comparison, in embodiments of the inventive deferred shader, that conventional paradigm is broken. The inventive structure and method anticipate or predict what geometry will actually affect the final values in the frame buffer without having to make or generate all the colors for every pixel inside of every piece of geometry. In principle, the spatial position of the geometry is examined, and a determination is made for any particular sample, the one geometry item that affects the final color in the z-buffer, and then generate only that color.

Additional Considerations for the CHSR Process

Samples are done in parallel, and generally all the samples in all the pixels within a stamp are done in parallel. Hence, if one stamp can be processed per clock cycle (and there are 4 pixels per stamp and 4 samples per pixel), then 16 samples are processed per clock cycle. A "stamp" defines the number of pixels and samples processed at one time. This per-stamp processing is generally pipelined, with pipeline stalls injected if a stamp needs to be processed again before the same stamp (from a previous primitive) has completed (that is, unless out-of-order stamp processing can be handled).

If there are no early dispatches are needed, then only end-of-tile dispatches are needed. This is the case when all the geometry in a tile is opaque and there are no stencil tests or operations and there are no alpha tested primitives that could be visible.

The primitive information in each SFSM can be replaced by a pointer into a memory where all the primitive information is stored. As described in later in the preferred embodiment, the Color Pointer is used to point to a primitive's information in Polygon Memory.

As an alternative, only the far z-value could be kept (the near z-value is not kept), thereby reducing data storage, but requiring the sample state bits to remain "conservative" after primitive F and also causing primitive E to be sent down the pipeline because it would not be known whether primitive E is in front or behind primitive F.

As an alternative to maintaining both a near z-value and a far z-value, only the far z-value could be kept, thereby reducing data storage, but requiring the sample state bits to remain "conservative" when they could have been labeled "accurate", and also causing additional samples to be dispatched down the pipeline. In the first CHSR example above (the one including alpha test), the sample state bits would remain "conservative" after primitive F, and also, primitive E would be sent down the pipeline because it would not be known whether primitive E is in front or behind primitive F due to the lack of the near z-value.

Processing stamps has greater efficiency than simply allowing for SFSMs to operate in parallel on a stamp-by-stamp basis. Stamps are also used to reduce the number of data packets transmitted down the pipeline. That is, when one sample within a stamp is dispatched (either early dispatch or end-of-tile dispatch), other samples within the same stamp and the same primitive are also dispatched (such a joint dispatch is hereinafter called a Visible Stamp Portion, or VSP). In the second CHSR example above (the one including stencil test), if all four samples were in the same stamp, then the early dispatching of samples 1 and 2 would cause early dispatching of samples 0 and 3. While this causes more samples to be sent down the pipeline and appear to increase the amount of color computation, it does not (in general) cause a net increase, but rather a net decrease in color computation. This is due to the spatial coherence within a pixel (i.e., samples within the same pixel tend to be either visible together or hidden together) and a tendency for the edges of polygons with alpha test, color test, stencil test, and/or alpha blending to potentially split otherwise spatially coherent stamps. That is, sending additional samples down the pipeline when they do not appreciably increase the computational load is more than offset by reducing the total number of VSPs that need to be sent. In the second CHSR example above, if all the samples are in the same stamp, then the same number of VSPs would be generated.

In the case of alpha test, if alpha values for a primitive arise only from the alpha values at the vertices (not from other places such as texturing), then a simplified alpha test can be done for entire primitives. That is, the vertex processing block (called GEO in later sections) can determine when any interpolation of the vertex alpha values would be guaranteed to pass the alpha test, and for that primitive, disable the alpha test. This can not be done if the alpha values can not be determined before CHSR is performed.

If a frame does not start with depth clear, then the SFSMs are set to their most conservative state (with near z-values at the minimum and far z-values at the maximum).

In the preferred embodiment, the CHSR process is performed in the Cull Block.

Hardware Sorting by Tile, including Pipeline State Information

In the inventive structure and method, we note that time-order is preserved within each tile, including preserving time-order of pipeline state information. Clear packets are also used. In embodiments of the invention, the sorting is performed in hardware and RAMBUS memories advantageously permit dualoct storage of one vertex. For sorted transparency mode, guaranteed opaque geometry (that is, geometry that is known to obscure more distant geometry) is read out of Sort Memory in the first pass. In subsequent passes, the rest of the geometry is read once in each subsequent pass. In the preferred embodiment, the tile sorting method is performed in the Sort Block.

All vertices and relevant mode packets or state information packets are stored as a time order linear list. For each tile that's touched by a primitive, a pointer is added to the vertex in that linear list that completes the primitive. For example, a triangle primitive is defined by 3 vertices, and a pointer would be added to the (third) vertex in the linear list to complete the triangle primitive. Other schemes that use the first vertex rather than the third vertex may alternatively be implemented.

In essence, a pointer is used to point to one of the vertices in the primitive, with adequate information for finding the other vertices in the primitive. When it's time to read these primitives out, the entire primitive can be reconstructed from the vertices and pointers. Each tile is a list of pointers that point to vertices and permit recreation of the primitive from the list. This approach permits all of the primitives to be stored, even those sharing a vertex with another primitive, yet only storing each vertex once.

In one embodiment of the inventive procedure, one list per tile is maintained. We do not store the primitive in the list, but instead the list stores pointers to the primitives. These pointers are actually pointing to one of the primitives, and is a pointer into one of the vertices in the primitive, and the pointer also includes information adequate to find the other vertices in the same primitive. This sorting structure is advantageously implemented in hardware using the structure comprising three storage structures, a data storage, a tile pointer storage, and a mode pointer storage. For a given tile, the goal is to recreate the time-order sequence of primitives that touch the particular tile being processed, but ignore the primitives that don't touch the tile. We earlier extracted the modes and stored them separately, now we want to inject the mode packets into this stream of primitives at the right place. We note further that it is not enough to simply extract the mode packet at one stage and then reinject it at another stage, because the mode packet will be needed for processing the primitive, which may overly more than one tile. Therefore, the mode packets must be reassociated with all of the relevant tiles at the appropriate times.

One simple approach would be to write a pointer to the mode packet into every tile list. During subsequent reads of this list, it would be easy to access the mode packet address and read the appropriate mode data. However, this approach is disadvantageous because of the cost associated with writing the pointer to all or the tiles. In the inventive procedure, during processing of each tile, we read an entry from the appropriate tile pointer list and if we have read (fetched) the mode data for that vertex and sent it along, we merely retrieve the vertex from the data storage and send it down the pipeline; however, in the even that the mode data has changed between the last vertex retrieved and the next sequential vertex in the tile pointer list, then the mode data is fetched from the data storage and sent down the pipeline before the next vertex is sent so that the appropriate mode data is available when the vertex arrives. We note that entries in the mode pointer list identify at which vertex the mode changes. In one embodiment, entries in the mode pointer store the first vertex for which the mode data pertains, however, alternative procedures, such as storing the last vertex for which the mode data applies could be used so long as consistent rules are followed.

Two Modes of DSGP Operation

The DSGP can operate in two distinct modes: 1) Time Order Mode, and 2) Sorted Transparency Mode. Time Order Mode is described above, and is designed to preserve, within any particular tile, the same temporal sequence of primitives. The Sorted Transparency mode is described immediately below. In the preferred embodiment, the control of the pipeline operating mode is done in the Sort Block.

The Sort Block is located in the pipeline between a Mode Extraction Unit (MEX) and Setup (STP) unit. Sort Block operates primarily to take geometry scattered around the display window and sort it into tiles. Sort Block also manages the Sort Memory, which stores all the geometry from the entire scene before it is rasterized, along with some mode information. Sort memory comprises a double-buffered list of vertices and modes. One page collects a scene's geometry (vertex by vertex and mode by mode), while the other page is sending its geometry (primitive by primitive and mode by mode) down the rest of the pipeline.

When a page in sort memory is being written, vertices and modes are written sequentially into the sort memory as they are received by the sort block. When a page is read from sort memory, the read is done on a tile-by-tile basis, and the read process operates in two modes: (1) time order mode, and (2) sorted transparency mode.

Time-Ordered Mode

In time ordered mode, time order of vertices and modes are preserved within each tile, where a tile is a portion of the display window bounded horizontally and vertically. By time order preserved, we mean that for a given tile, vertices and modes are read in the same order as they are written.

Sorted Transparency Mode

In sorted transparency mode, reading of each tile is divided into multiple passes, where, in the first pass, guaranteed opaque geometry is output from the sort block, and in subsequent passes, potentially transparent geometry is output from the sort block. Within each sorted transparency mode pass, the time ordering is preserved, and mode date is inserted in its correct time-order location. Sorted transparency mode by be performed in either back-to-front or front-to-back order. In the preferred embodiment, the sorted transparency method is performed jointly by the Sort Block and the Cull Block.

Multiple-step Hidden Surface Removal

Conventionally hidden surfaces are removed using either an "exact" hidden surface removal procedure, or using z-buffers. In one embodiment of the inventive structure and method, a two-step approach is implemented wherein a (i) "conservative" hidden surface removal is followed by (ii) a z-buffer based procedure. In a different embodiment, a three-step approach is implemented: (i) a particular spatial Cull procedure, (ii) conservative hidden surface removal, and (iii) z-buffer. Various embodiments of conservative hidden surface removal (CHSR) has already been described elsewhere in this disclosure.

Pipeline State Preservation and Caching

Each vertex includes a color pointer, and as vertices are received, the vertices including the color pointer are stored in sort memory data storage. The color pointer is a pointer to a location in the polygon memory vertex storage that includes a color portion of the vertex data. Associated with all of the vertices, of either a strip or a fan, is an Material-Lighting-Mode (MLM) pointer set. MLM includes six main pointers plus two other pointers as described below. Each of the six main pointers comprises an address to the polygon memory state storage, which is a sequential storage of all of the state that has changed in the pipeline, for example, changes in the texture, the pixel, lighting and so forth, so that as a need arises any time in the future, one can recreate the state needed to render a vertex (or the object formed from one or more vertices) from the MLM pointer associated with the vertex, by looking up the MLM pointers and going back into the polygon memory state storage and finding the state that existed at the time.

The Mode Extraction Block (MEX) is a logic block between Geometry and Sort that collects temporally ordered state change data, stores the state in Polygon memory, and attaches appropriate pointers to the vertex data it passes to Sort Memory. In the normal OpenGL pipeline, and in embodiments of the inventive pipeline up to the Sort block, geometry and state data is processed in the order in which it was sent down the pipeline. State changes for material type, lighting, texture, modes, and stipple affect the primitives that follow them. For example, each new object will be preceded by a state change to set the material parameters for that object.

In the inventive pipeline, on the other hand, fragments are sent down the pipeline in Tile order after the Cull block. The Mode Injection Block figures out how to preserve state in the portion of the pipeline that processes data in spatial (Tile) order instead of time order. In addition to geometry data, Mode Extraction Block sends a subset of the Mode data (cull_mode) down the pipeline for use by Cull. Cull_mode packets are produced in Geometry Block. Mode Extraction Block inserts the appropriate color pointer in the Geometry packets.

Pipeline state is broken down into several categories to minimize storage as follows: (1) Spatial pipeline state includes data headed for Sort that changes every vertex; (2) Cull_mode state includes data headed for Cull (via Sort) that changes infrequently; (3) Color includes data headed for Polygon memory that changes every vertex; (4) Material includes data that changes for each object; (5) TextureA includes a first set of state for the Texture Block for textures 0&1; (6) TextureB includes a second set of state for the Texture Block for textures 2 through 7; (7) Mode includes data that hardly ever changes; (8) Light includes data for Phong; (9) Stipple includes data for polygon stipple patterns. Material, Texture, Mode, Light, and Stipple data are collectively referred to as MLM data (for Material, Light and Mode). We are particularly concerned with the MLM pointers fir state preservation.

State change information is accumulated in the MEX until a primitive (Spatial and Color packets) appears. At that time, any MLM data that has changed since the last primitive, is written to Polygon Memory. The Color data, along with the appropriate pointers to MLM data, is also written to Polygon Memory. The spatial data is sent to Sort, along with a pointer into Polygon Memory (the color pointer). Color and MLM data are all stored in Polygon memory. Allocation of space for these records can be optimized in the micro-architecture definition to improve performance.

All of these records are accessed via pointers. Each primitive entry in Sort Memory contains a Color Pointer to the corresponding Color entry in Polygon Memory. The Color Pointer includes a Color Address, Color Offset and Color Type that allows us to construct a point, line, or triangle and locate the MLM pointers. The Color Address points to the final vertex in the primitive. Vertices are stored in order, so the vertices in a primitive are adjacent, except in the case of triangle fans. The Color Offset points back from the Color Address to the first dualoct for this vertex list. (We will refer to a point list, line strip, triangle strip, or triangle fan as a vertex list.) This first dualoct contains pointers to the MLM data for the points, lines, strip, or fan in the vertex list. The subsequent dualocts in the vertex list contain Color data entries. For triangle fans, the three vertices for the triangle are at Color Address, (Color Address−1), and (Color Address−Color Offset+1). Note that this is not quite the same as the way pointers are stored in Sort memory.

State is a time varying entity, and MEX accumulates changes in state so that state can be recreated for any vertex or set of vertices. The MIJ block is responsible for matching state with vertices down stream. Whenever a vertex comes into MEX and certain indicator bits are set, then a subset of the pipeline state information needs to be saved. Only the states that have changed are stored, not all states, since the complete state can be created from the cumulative changes to state. The six MLM pointers for Material, TextureA, TextureB, Mode, Light, and Stipple identify address locations where the most recent changes to the respective state information is stored. Each change in one of these state is identified by an additional entry at the end of a sequentially ordered state storage list stored in a memory. Effectively, all state changes are stored and when particular state corresponding to a point in time (or receipt of a vertex) is needed, the state is reconstructed from the pointers.

This packet of mode that are saved are referred to as mode packets, although the phrase is used to refer to the mode data changes that are stored, as well as to larger sets of mode data that are retrieved or reconstructed by MIJ prior to rendering.

We particularly note that the entire state can be recreated from the information kept in the relatively small color pointer.

Polygon memory vertex storage stores just the color portion. Polygon memory stores the part of pipeline stat that is not needed for hidden surface removal, and it also stores the part of the vertex data which is not needed for hidden surface removal (predominantly the items needed to make colors.)

Texel Reuse Detection and Tile Based Processing

The inventive structure and method may advantageously make use of trilinear mapping of multiple layers (resolutions) of texture maps.

Texture maps are stored in a Texture Memory which may generally comprise a single-buffered memory loaded from the host computer's memory using the AGP interface. In the exemplary embodiment, a single polygon can use up to four textures. Textures are MIP-mapped. That is, each texture comprises a series of texture maps at different levels of detail or resolution, each map representing the appearance of the texture at a given distance from the eye point. To produce a texture value for a given pixel fragment, the Texture block performs tri-linear interpolation from the texture maps, to approximate the correct level of detail. The Texture block can alternatively performs other interpolation methods, such as anisotropic interpolation.

The Texture block supplies interpolated texture values (generally as RGBA color values) to the Phong block on a per-fragment basis. Bump maps represent a special kind of texture map. Instead of a color, each texel of a bump map contains a height field gradient.

The multiple layers are MIP layers, and interpolation is within and between the MIP layers. The first interpolation ii within each layer, then you interpolate between the two adjacent layers, one nominally having resolution greater than required and the other layer having less resolution than required, so that it is done 3-dimensionally to generate an optimum resolution.

The inventive pipeline includes a texture memory which includes a texture cache really a textured reuse register because the structure and operation are different from conventional caches. The host also includes storage for texture, which may typically be very large, but in order to render a texture, it must be loaded into the texture cache which is also referred to as texture memory. Associated with each VSP are S and T's. In order to perform trilinear MIP mapping, we necessarily blend eight (8) samples, so the inventive structure provides a set of eight content addressable (memory)

caches running in parallel. n one embodiment, the cache identifier is one of the content addressable tags, and that's the reason the tag part of the cache and the data part of the cache is located are located separate from the tag or index. Conventionally, the tag and data are co-located so that a query on the tag gives the data. In the inventive structure and method, the tags and data are split up and indices are sent down the pipeline.

The data and tags are stored in different blocks and the content addressable lookup is a lookup or query of an address, and even the "data" stored at that address in itself and index that references the actual data which is stored in a different block. The indices are determined, and sent down the pipeline so that the data referenced by the index can be determined. In other words, the tag is in one location, the texture data is in a second location, and the indices provide a link between the two storage structures.

In one embodiment of the invention Texel Reuse Detection Registers (TRDR) comprise a multiplicity of associate memories, generally located on the same integrated circuit as the texel interpolator. In the preferred embodiment, the texel reuse detection method is performed in the Texture Block.

In conventional 3-D graphics pipelines, an object in some orientation in space is rendered. The object has a texture map on it, and its represented by many triangle primitives. The procedure implemented in software, will instruct the hardware to load the particular object texture into a DRAM. Then all of the triangles that are common to the particular object and therefore have the same texture map are fed into the unit and texture interpolation is performed to generate all of the colored pixels need to represent that particular object. When that object has been colored, the texture map in DRAM can be destroyed since the object has been rendered. If there are more than one object that have the same texture map, such as a plurality of identical objects (possibly at different orientations or locations), then all of that type of object may desirably be textured before the texture map in DRAM is discarded. Different geometry may be fed in, but the same texture map could be used for all, thereby eliminating any need to repeatedly retrieve the texture map from host memory and place it temporarily in one or more pipeline structures.

In more sophisticated conventional schemes, more than one texture map may be retrieved and stored in the memory, for example two or several maps may be stored depending on the available memory, the size of the texture maps, the need to store or retain multiple texture maps, and the sophistication of the management scheme. Each of these conventional texture mapping schemes, spatial object coherence is of primary importance. At least for an entire single object, and typically for groups of objects using the same texture map, all of the triangles making up the object are processed together. The phrase spatial coherency is applied to such a scheme because the triangles form the object and are connected in space, and therefore spatially coherent.

In the inventive deferred shader structure and method we do not necessarily rely on or derive appreciable benefit from this type of spatial object coherence. Embodiments of the inventive deferred shader operate on tiles instead. Any given tile might have an entire object, a plurality of objects, some entire objects, or portions of several objects, so that spatial object coherence over the entire tile is typically absent.

Well we break that conventional concept completely because the inventive structure and method are directed to a deferred shader. Even if a tile should happen to have an entire object there will typically be different background, and the inventive Cull Block and Cull procedure will typically generate and send VSPs in a completely jumbled and spatially incoherent order, even if the tile might support some degree of spatial coherency. As a result, the pipeline and texture block are advantageously capable of changing the texture map on the fly in real-time and in response to the texture required for the object primitive (e.g. triangle) received. Any requirement to repeatedly retrieve the texture map from the host to process the particular object primitive (for example, single triangle) just received and then dispose of that texture when the next different object primitive needing a different texture map would be problematic to say the least and would preclude fast operation.

In the inventive structure and method, a sizable memory is supported on the card. In one implementation 128 megabytes are provided, but more or fewer megabytes may be provided. For example, 34 Mb, 64 Mb, 256 Mb, 512 Mb, or more may be provided, depending upon the needs of the user, the real estate available on the card for memory, and the density of memory available.

Rather that reading the 8 textels for every visible fragment, using them, and throwing them away so that the 8 textels for the next fragment can be retrieved and stored, the inventive structure and method stores and reuses them when there is a reasonable chance they will be needed again.

It would be impractical to read and throw away the eight textels every time a visible fragment is received. Rather, it is desirable to make reuse of these textels, because if you're marching along in tile space, your pixel grid within the tile (typically processed along sequential rows in the rectangular tile pixel grid) could come such that while the same texture map is not needed for sequential pixels, the same texture map might be needed for several pixels clustered in a n area of the tile, and hence needed only a few process steps after the first use. Desirably, the invention uses the textels that have been read over and over, so when we need one, we read it, and we know that chances are good that once we have seem one fragment requiring a particular texture map, chances are good that for some period of time afterward while we are in the same tile, we will encounter another fragment from the same object that will need the same texture. So we save those things in this cache, and then on the fly we look up from the cache (texture reuse register) which ones we need. If there is a cache miss, for example, when a fragment and texture map are encountered for the first time, that texture map is retrieved and stored in the cache.

Texture Map retrieval latency is another concern, but is handled through the use of First-In-First-Out (FIFO) data structures and a look-ahead or predictive retrieval procedure. The FIFO's are large and work in association with the CAM. When an item is needed, a determination is made as to whether it is already stored, and a designator is also placed in the FIFO so that if there is a cache miss, it is still possible to go out to the relatively slow memory to retrieve the information and store it. In either event, that is if the data was in the cache or it was retrieved from the host memory, it is placed in the unit memory (and also into the cache if newly retrieved).

Effectively, the FIFO acts as a sort of delay so that once the need for the texture is identified (prior to its actual use) the data can be retrieved and reassociated, before it is needed, such that the retrieval does not typically slow down the processing. The FIFO queues provide and take up the slack in the pipeline so that it always predicts and looks ahead. By examining the FIFO, non-cached texture can be identified, retrieved from host memory, placed in the cache and in a special unit memory, so that it is ready for use when a read is executed.

The FIFO and other structures that provide the look-ahead and predictive retrieval are provided in some sense to get around the problem created when the spatial object coherence typically used in per-object processing is lost in our per-tile processing. One also notes that the inventive structure and method makes use of any spatial coherence within an object, so that if all the pixels in one object are done sequentially, the invention does take advantage of the fact that there's temporal and spatial coherence.

Packetized Data Transfer Protocol

The inventive structure and method advantageously transfer information (such as data and control) from block to block in packets. We refer to this packetized communication as packetized data transfer and the format and/or content of the packetized data as the packetized data transfer protocol (PDTP). The protocol includes a header portion and a data portion.

One benefit of the PDTP is that all of the data can be sent over one bus from block to block thereby alleviating any need for separate busses for different data types. Another advantage of PDTP is that packetizing the information assists in keeping the ordering, which is important for proper rendering. Recall that rendering is sensitive to changes in pipeline state and the like so that maintaining the time order sequence is important generally, and with respect to the MIJ cache for example, management of the flow of packets down the pipeline is especially important.

The transfer of packets is sequential, since the bus is effectively a sequential link wherein packets arrive sequentially in some time order. If for example, a "fill packet" arrives in a block, it goes into the block's FIFO, and if a VSP arrives, it also goes into the block's FIFO. Each processor block waits for packets to arrive at its input, and when a packet arrives looks at the packet header to determine what action to take if any. The action may be to send the packet to the output (that is just pass it on without any other action or processing) or to do something with it. The packetized data structure and use of the packetized data structure alone and in conjunction with a bus, FIFO or other buffer or register scheme have applications broader than 3D graphics systems and may be applied to any pipeline structure where a plurality of functional or processing blocks or units are interconnected and communicate with each other. Use of packetized transfer is particularly beneficial where maintain sequential or time order is important.

In one embodiment of the PDTP each packet has a packet identifier or ID and other information. There are many different types of packets, and every different packet type has a standard length, and includes a header that identifies the type of packet. The different packets have different forms and variable lengths, but each particular packet type has a standard length.

Advantageously, each block includes a FIFO at the input, and the packets flow through the FIFOs where relevant information is accumulated in the FIFO by the block. The packet continues to flow through other or all of the blocks so that information relevant to that blocks function may be extracted.

In one embodiment of the inventive structure and method, the storage cells or registers within the FIFO's has some predetermined width such that small packets may require only one FIFO register and bigger packets require a larger number of registers, for example 2, 3, 5, 10, 20, 50 or more registers. The variable packet length and the possibility that a single packet may consume several FIFO storage registers do not present any problem as the first portion of the packet identifies the type of packet and either directly, or indirectly by virtue of knowing the packet type, the size of the packet and the number of FIFO entries it consumes. The inventive structure and method provide and support numerous packet types which are described in other sections of this document.

Fragment Coloring

Fragment coloring is performed for two-dimensional display space and involves an interpolation of the color from for example the three vertices of a triangle primitive, to the sampled coordinate of the displayed pixel. Essentially, fragment coloring involves applying an interpolation function to the colors at the three fragment vertices to determine a color for a location spatially located between or among the three vertices. Typically, but optionally, some account will be taken of the perspective correctness in performing the interpolation. The interpolation coefficients are cached as are the perspective correction coefficients.

Interpolation of Normals

Various compromises have conventionally be accepted relative to the computation of surface normals, particularly a surface normal that is interpolated between or among other surface normals, in the 3D graphics environment. The compromises have typically traded-off accuracy for computational ease or efficiency. Ideally, surface normals should be interpolated angularly, that is based on the actual angular differences in the angles of the surface normals on which the interpolation is based. In fact such angular computation is not well suited to 3D graphics applications.

Therefore, more typically, surface normals are interpolated based on linear interpolation of the two input normals. For low to moderate quality rendering, linear interpolation of the composite surface normals may provide adequate accuracy; however, considering a two-dimensional interpolation example, when one vector (surface normal) has for example a larger magnitude that the other vector, but comparable angular change to the first vector, the resultant vector will be overly influenced by the larger magnitude vector in spite of the comparable angular difference between the two vectors. This may result in objectionable error, for example, some surface shading or lighting calculation may provide an anomalous result and detract from the output scene.

While some of these problems could be minimized even if a linear interpolation was performed on a normalized set of vectors, this is not always practical, because some APIs support non-normalized vectors and various interpolation schemes, including, for example, three-coordinate interpolation, independent x, y, and z interpolations, and other schemes.

In the inventive structure and method the magnitude is interpolated separately from the direction or angle. The interpolated magnitude are computed then the direction vectors which are equal size. The separately interpreted magnitudes and directions are then recombined, and the direction is normalized.

While the ideal angular interpretation would provide the greatest accuracy, however, the interpolation involves three points on the surface of a sphere and various great-circle calculations. This sort of mathematical complexity is not well suited for real-time fast pipeline processing. The single step linear interpolation is much easier but is susceptible to greater error. In comparison to each of these procedures, the inventive surface normal interpolation procedure has greater accuracy than conventional linear interpolation, and lower computational complexity that conventional angular interpolation.

Spatial Setup

In a preferred embodiment of the invention, spatial setup is performed in the Setup Block (STP). The Setup (STP) block receives a stream of packets from the Sort (SRT) block. These packets have spatial information about the primitives to be rendered. The output of the STP block goes to the Cull (CUL) block. The primitives received from SRT can be filled triangles, line triangles, lines, stippled lines, and points. Each of these primitives can be rendered in aliased or anti-aliased mode. The SRT block sends primitives to STP (and other pipeline stages downstream) in tile order. Within each tile the data is organized in time order or in sorted transparency order. The CUL block receives data from the STP block in tile order (in fact in the order that STP receives primitives from SRT), and culls out parts of the primitives that definitely do not contribute to the rendered images. This is accomplished in two stages. The first stage allows detection of those elements in a rectangular memory array whose content is greater than a given value. The second stage refines on this search by doing a sample by sample content comparison. The STP block prepares the incoming primitives for processing by the CUL block. STP produces a tight bounding box and minimum depth value Zmin for the part of the primitive intersecting the tile for first stage culling, which marks the stamps in the bounding box that may contain depth values less than Zmin. The Z cull stage takes these candidate stamps, and if they are a part of the primitive, computes the actual depth value for samples in that stamp. This more accurate depth value is then used for comparison and possible discard on a sample by sample basis. In addition to the bounding box and Zmin for first stage culling, STP also computes the depth gradients, line slopes, and other reference parameters such as depth and primitive intersection points with the tile edge for the Z cull stage. The CUL unit produces the VSPs used by the other pipeline stages.

In the preferred embodiment of the invention, the spatial setup procedure is performed in the Setup Block. Important aspects of the inventive spatial setup structure and method include: (1) support for and generation of a unified primitive, (2) procedure for calculating a $Z_{min}$ within a tile for a primitive, (3) the use of tile-relative y-values and screen-relative x-values, and (4) performing a edge hop (actually performed in the Cull Block) in addition to a conventional edge walk which also simplifies the down-stream hardware.

Under the rubric of a unified primitive, we consider a line primitive to be a rectangle and a triangle to be a degenerate rectangle, and each is represented mathematically as such. Setup converts the line segments into parallelograms which consists of four vertices. A triangle has three vertices. Setup describes the each primitive with a set of four points. Note that not all values are needed for all primitives. For a triangle, Setup uses top, bottom, and either left or right corner, depending on the triangle's orientation. A line segment is treated as a parallelogram, so Setup uses all four points. Note that while the triangle's vertices are the same as the original vertices, Setup generates new vertices to represent the lines as quads. The unified representation of primitives uses primitive descriptors which are assigned to the original set of vertices in the window coordinates. In addition, there are flags which indicate which descriptors have valid and meaningful values.

For triangles, VtxYmin, VtxYmax, VtxLeftC, VtxRightC, LeftCorner, RightCorner descriptors are obtained by sorting the triangle vertices by their y coordinates. For line segments these descriptors are assigned when the line quad vertices are generated. VtxYmin is the vertex with the minimum y value. VtxYmax is the vertex with the maximum y value. VtxLeftC is the vertex that lies to the left of the long y-edge (the edge of the triangle formed by joining the vertices VtxYmin and VtxYmax) in the case of a triangle, and to the left of the diagonal formed by joining the vertices VtxYmin and VtxYmax for parallelograms. If the triangle is such that the long y-edge is also the left edge, then the flag LeftCorner is FALSE (0) indicating that the VtxLeftC is invalid. Similarly, VtxRightC is the vertex that lies to the right of the long y-edge in the case of a triangle, and to the right of the diagonal formed by joining the vertices VtxYmin and VtxYmax for parallelograms. If the triangle is such that the long edge is also the right edge, then the flag RightCorner is FALSE (0) indicating that the VtxRightC is invalid. These descriptors are used for clipping of primitives on top and bottom tile edge. Note that in practice VtxYmin, VtxYmax, VtxLeftC, and VtxRightC are indices into the original primitive vertices.

For triangles, VtxXmin, VtxXmax, VtxTopC, VtxBotC, TopCorner, BottomCorner descriptors are obtained by sorting the triangle vertices by their x coordinates. For line segments these descriptors are assigned when the line quad vertices are generated. VtxXmin is the vertex with the minimum x value. VtxXmax is the vertex with the maximum x value. VtxTopC is the vertex that lies above the long xedge (edge joining vertices VtxXmin and VtxXmax) in the case of a triangle, and above the diagonal formed by joining the vertices VtxXmin and VtxXmax for parallelograms. If the triangle is such that the long x-edge is also the top edge, then the flag TopCorner is FALSE (O) indicating that the VtxTopC is invalid. Similarly, VtxBotC is the vertex that lies below the long x-axis in the case of a triangle, and below the diagonal formed by joining the vertices VtxXmin and VtxXmax for parallelograms. If the triangle is such that the long x-edge is also the bottom edge, then the flag BottomCorner is FALSE (0) indicating that the VtxBotC is invalid. These descriptors are used for clipping of primitives on the left and right tile edges. Note that in practice VtxXmin, VtxXmax, VtxTopC, and VtxBotC are indices into the original primitive vertices. In addition, we use the slopes (∂x/∂y) of the four polygon edges and the inverse of slopes (θxy∂x).

All of these descriptors have valid values for quadrilateral primitives, but all of them may not be valid for triangles. Initially, it seems like a lot of descriptors to describe simple primitives like triangles and quadrilaterals. However, as we shall see later, they can be obtained fairly easily, and they provide a nice uniform way to setup primitives.

Treating lines as rectangles (or equivalently interpreting rectangles as lines) involves specifying two end points in space and a width. Treating triangles as rectangles involves specifying four points, one of which typically y-left or y-right in one particular embodiment, is degenerate and not specified. The goal is to find Zmin inside the tile. The x-values can range over the entire window width while the y-values are tile relative, so that bits are saved in the calculations by making the y-values tile relative coordinates.

Object Tags

A directed acyclical graph representation of 3D scenes typically assigns an identifier to each node in the scene graph. This identifier (the object tag) can be useful in graphical operations such as picking an object in the scene, visibility determination, collision detection, and generation of other statistical parameters for rendering. The pixel pipeline in rendering permits a number of pixel tests such as alpha test, color test, stencil test, and depth test. Alpha and color test are useful in determining if an object has transparent pixels and discarding those values. Stencil test can be used for various special effects and for determination of object intersections in CSG. Depth test is typically used for hidden surface removal.

In this document, a method of tagging objects in the scene and getting feedback about which objects passed the predetermined set of visibility criteria is described.

A two level object assignment scheme is utilized. The object identifier consists if two parts a group (g) and a member tag (t). The group "g" is a 4 bit identifier (but, more bits could be used), and can be used to encode scene graph branch, node level, or any other parameter that may be used grouping the objects. The member tag (t) is a 5 bit value (once again, more bits could be used). In this scheme, each group can thus have up to 32 members. A 32-bit status word is used for each group. The bits of this status word indicate the member that passed the test criteria. The state thus consists of: Object group; Object Tag; and TagTestID {DepthTest, AlphaTest, ColorTest, StencilTest}. The object tags are passed down the pipeline, and are used in the z-buffered blend (or Pixel Block in the preferred embodiment). If the sample is visible, then the object tag is used to set a particular bit in a particular CPU-readable register. This allows objects to be fed into the pipeline and, once rendering is completed, the host CPU (that CPU or CPUs which are running the application program) can determine which objects were at least partially visible.

As an alternative, only the member tag (t) could be used, implying only one group.

Object tags can be used for picking, transparency determination, early object discard, and collision detection. For early object discard, an object can be tested for visibility by having its bounding volume input into the rendering pipeline and tested for "visibility" as described above. However, to prevent the bounding volume from being rendered into the frame buffer, the color, depth, and stencil masks should be cleared (see OpenGL specification for a description of these mask bits).

Single Visibility Bit

As an alternative to the object tags described above, a single bit can be used as feedback to the host CPU. In this method, the object being tested for "visibility" (i.e., for picking, transparency determination, early object discard, collision detection, etc) is isolated in its own frame. Then, if anything in the frame is visible, the single "visibility bit" is set, otherwise it is cleared. This bit is readable by the host CPU. The advantage of this method is its simplicity. The disadvantage is the need to use individual frames for each separate object (or set of objects) that needs to be tested, thereby possibly introducing latency into the "visibility" determination.

Supertile Hop Sequence

When rendering 3D images, there is often a "horizon effect" where a horizontal swath through the picture has much more complexity than the rest of the image. An example is a city skyline in the distance with a simple grass plane in the foreground and the sky above. The grass and sky have very few polygons (possibly one each) while the city has lots of polygons and a large depth complexity. Such horizon effects can also occur along non-horizontal swaths through a scene. If tiles are processed in a simple top-to-bottom and left-to-right order, then the complex tiles will be encountered back-to-back, resulting in a possible load imbalance within the pipeline. Therefore, it would be better to randomly "hop" around the screen when going from tile to tile. However, this would result in a reduction in spatial coherency (because adjacent tiles are not processed sequentially), reducing the efficiency of the caches within the pipeline and reducing performance. As a compromise between spatially sequential tile processing and a totally random pattern, tiles are organized into "SuperTiles", where each SuperTile is a multiplicity of spatially adjacent tiles, and a random pattern of SuperTiles is then processed. Thus, spatial coherency is preserved within a SuperTile, and the horizon effect is avoided. In the preferred embodiment, the SuperTile hop sequence method is performed in the Sort Block Normalization During Scanout Normalization during output is an inventive procedure in which either consideration is taken of the prior processing history to determine the values in the frame buffer, or the values in the frame buffer are otherwise determined, and the range of values in the screen are scaled or normalized to that the range of values can be displayed and provide the desired viewing characteristic. Linear and non-linear scalings may be applied, and clipping may also be permitted so that dynamic range is not unduly taken up by a few relatively bright or dark pixels, and the dynamic range fits the conversion range of the digital-to-analog converter.

Some knowledge of the manner in which output pixel values are generated provides greater insight into the advantages of this approach. Sometimes the output pixel values are referred to as intensity or brightness, since they ultimately are displayed in a manner to simulate or represent scene brightness or intensity in the real world.

Advantageously, pixel colors are represented by floating point number so that they can span a very large dynamic range. Integer values though suitable once scaled to the display may not provide sufficient range given the manner the output intensities are computed to permit resealing afterward. We note that under the standard APIs, including OpenGL, that the lights are represented as floating point values, as are the coordinate distances. Therefore, with conventional representations it is relatively easy for a scene to come out all black (dark) or all white (light) or skewed toward a particular brightness range with usable display dynamic range thrown away or wasted.

Under the inventive normalization procedure, the computations are desirable maintained in floating point representations throughout, and the final scene is mapped using some scaling routine to bring the pixel intensity values in line with the output display and D/A converter capability. Such scaling or normalization to the display device may involve operations such as an offset or shift of a range of values to a different range of values without compression or expansion of the range, a linear compress or expansion, a logarithmic compression, an exponential or power expansion, other algebraic or polynomial mapping functions, or combinations of these. Alternatively, a look-up table having arbitrary mapping transfer function may be implemented to perform the output value intensity transformation. When it's time to buffer swap in order to display the picture when it's done, one logarithmically (or otherwise) scale during scanout.

Desirably, the transformation is performed automatically under a set of predetermined rules. For example, a rule specifying pixel histogram based normalization may be implemented, or a rule specifying a Gaussian distribution of pixels, or a rule that linearly scales the output intensities with or without some optional intensity clipping. The variety of mapping functions provided here are merely examples, of the many input/output pixel intensity transformations known in the computer graphics and digital image processing arts.

This approach would also permit somewhat greater leeway in specifying lighting, object color, and the like and still render a final output that was visible. Even if the final result was not esthetically perfect, it would provide a basis for tuning the final mapping, and some interactive adjustment may desirably but optionally be provided as a debugging, fine-tuning, or set-up operation.

Stamp-based z-value Description

When a VSP is dispatched, it corresponds to a single primitive, and the z-buffered blend (i.e., the Pixel Block) needs separate z-values for every sample in the VSP. As an improvement over sending all the per-sample z-values within a VSP (which would take considerable bandwidth), the VSP could include a z-reference-value and the partial derivatives of z with respect to x and y (mathematically, a plane equation for the z-values of the primitive). Then, this information is used in the z-buffered blend (i.e., the Pixel Block) to reconstruct the per-sample z-values, thereby saving bandwidth. Care must be taken so that z-values computed for the CHSR process are the same as those computer in the z-buffered blend (i.e., the Pixel Block) because inconsistencies could cause rendering errors.

In the preferred embodiment, the stamp-based z-value description method is performed in the Cull Block, and per-sample z-values are generated from this description in the Pixel Block.

Object-based Processor Resource Allocation in Phong Block

The Phong Lighting Block advantageously includes a plurality of processors or processing elements. During fragment color generation a lot of state is needed, fragments from a common object use the same state, and therefore desirably for at least reasons of efficiency a minimizing caching requirements, fragments from the same object should be processed by the same processor.

In the inventive structure and method, all fragments that originate from the same object are sent to the same processors (or if there is sever loading to the same plurality of processors). This reduces state caching in the Phong block.

Recall that preferred embodiments of the inventive structure and method implement per-tile processing, and that a single time may include multiple objects. The Phong block cache will therefore typically store state for more than one object, and send appropriate state to the processor which is handling fragments from a common object. Once state for a fragment from a particular object is sent to a particular processor, it is desirable that all other fragments from that object also be directed to that processor.

In this connection, the Mode Injection Unit (MIJ) assigns an object or material, and MIJ allocates cache in all down stream blocks. The Phong unit keeps track of which object data has been cached in which Phong unit processor, and attempts to funnel all fragments belonging that same object to the same processor. The only optional exception to this occurs if there is a local imbalance, in which case the fragments will be allocated to another processor.

This object-tag-based resource allocation (alternatively referred to as material-tag-based resource allocation in other portions of the description) occurs relative to the fragment processors or fragment engines in the Phong unit.

Dynamic Microcode Generation as Pipeline State

The Phong unit is responsible for performing texture environment calculations and for selecting a particular processing element for processing fragments from an object. As described earlier, attempts are made to direct fragments from a common object to the same phong processor or engine. Independent of the particular texture to be applied, properties of the surfaces, colors, or the like, there are a number of choices and as a result changes in the processing environment. While dynamic microcode generation is described here relative to the texture environment and lighting, the incentive structure and procedure may more widely be applied to other types of microcode, machine state, and processing generally.

In the inventive structure and method, each time processing of a triangle strip is initiated, a change material parameters occurs, or a change almost anything that touches the texture environment happens, a microcode engine in the phong unit generates microcode and this microcode is treats as a component of pipeline state. The microcode component of state is an attribute that gets cached just like other pipeline state. Treatment of microcode generated in this manner as machine state generally, and as pipeline state in a 3D graphics processor particularly, as substantial advantages.

For example, the Phong unit includes multiple processors or fragment engines. (Note that the term fragment engines here describes components in the Phong unit responsible for texture processing of the fragments, a different process than the interpolation occurring in the Fragment Block.) The microcode is downloaded into the fragment engines so that any other fragment that would come into the fragment engine and needs the same microcode (state) has it when needed.

Although embodiments of each of the fragment engines in the Phong Block are generically the same, the presence of the downloadable microcode provides a degree of specialization. Different microcode may be downloaded into each one dependent on how the MIJ caching mechanism is operating. Dynamic microcode generation is therefore provided for texture environment and lighting Variable Scale Bump Maps Generating variable scale bump maps involves one or both of two separate procedures: automatic basis generation and automatic gradient field generation. Consider a gray scale image and its derivative in intensity space. Automatic gradient filed takes a derivative, relative to gray scale intensity, of a gray scale image, and uses that derivative as a surface normal perturbation to generate a bump for a bump map. Automatic basis generation saves computation, memory storage in polygon memory, and input bandwidth in the process.

For each triangle vertex, an s,t and surface normal are specified. But the s and t aren't color, rather they are two-dimensional surface normal perturbations to the texture map, and therefore a texture bump map. The s and t are used to specify the directions in which to perturb the surface normals in order to create a usable bump map. The s,t give us an implied coordinate system and reference from which we can specify perturbation direction. Use of the s,t coordinate system at each pixel eliminates any need to specify the surface tangent and the bi-normal at the pixel location. As a result, the inventive structure and method save computation, memory storage and input bandwidth.

Tile Buffer and Pixel Buffers

A set of per-pixel tile staging buffers exists between the PixelOut and the BKE block. Each of these buffers has three state bits Empty, BkeDoneForPix, and PixcDoneForBke associated with it. These bits regulate (or simulate) the handshake between the PixelOut and Backend for the usage of these buffer. Both the backend and the PixelOut unit maintain current InputBuffer and OutputBuffer pointers which indicate the staging buffer that the unit is reading from or writing to.

For preparing the tiles for rendering by PIX, the BKE block takes the next Empty buffer and reads in the data from the frame buffer memory (if needed, as determined by the RGBAClearMask, DepthMask, and StencilMask—if a set of bit planes is not cleared it is read into). After Backend is done with reading in the tile, it sets the BkeDoneForPix bit. PixelOut looks at the BkeDoneForPix bit of the InputTile. If this bit is not set, then pixelOut stalls, else it clears the BkeDoneForPix bit, and the color, depth, and/or stencil bit planes (as needed) in the pixel tile buffer and transfers it to the tile sample buffers appropriately.

On output, the PixelOut unit resolves the samples in the rendered tile into pixels in the pixel tile buffers. The backend unit (BKE) block transfers these buffers to the frame buffer memory. The Pixel buffers are traversed in order by the PixelOut unit. PixelOut emits the rendered sample tile to the same pixel buffer that it came from. After the tile output to the pixel tile buffer is completed, the PixelOut unit sets the PixDoneForBke bit. The BKE block can then take the pixel tile buffer with PixDoneForBke set, clears that bit and transfer it to the frame buffer memory. After the transfer is complete, the Empty bit is set on the buffer.

Windowed Pixel Zooming During Scanout

The Backend Unit is responsible for sending data and or signals to the CRT or other display device and includes a Digital-to-Analog (D/A) converter for converting the digital information to analog signals suitable for driving the display. The backend also includes a bilinear interpolator, so that pixels from the frame buffer can be interpolated to change the spatial scale of the pixels as they are sent to the CRT display. The pixel zooming during scanout does not involve rerendering it just scales or zooms (in or out) resolution on the fly. In one embodiment, the pixel zooming is performed selectively on a per window basis, where a window is a portion of the overall desktop or display area.

Virtual Block Transfer (VBLT) During Scanout

Conventional structures and methods provide an on-screen memory storage and an off-screen memory storage, each having for example, a color buffer, a z-buffer, and some stencil. The 3D rendering process renders to these off-screen buffers. The one screen memory corresponds to the data that is shown on the display. When the rendering has completed to the off-screen memory, the content of the off-screen memory is copied to the on-screen memory in what is referred to as a block transfer (BLT).

In order to save memory bandwidth and realize other benefits described elsewhere in this description, the inventive structure and method perform a "virtual" block transfer or virtual BLT by splicing the data in or reading the data from an alternate location.

Token Insertion for Vertex Lists

A token in this context is an information item interposed between other items fed down the pipeline that tell the pipeline what the entries that follow correspond to. For example, if the x,y,z coordinates of a vertex are fed into the pipeline and they are 32-bit quantities, the tokens are inserted to inform the pipeline that the numbers that follow are vertex x,y,z values since there are no extra bits in the entry itself for identification. The tokens that tell the pipeline hardware how to interpret the data that's being sent in.

DETAILED DESCRIPTION OF EMBODIMENTS OF THE INVENTION

This description is divided into several parts for the convenience of the reader and to assist in understanding the constituent elements, including optional elements, as well as the inventive pipeline structure and method as a whole. We begin with a description of an embodiment of the overall deferred shading graphical processor or graphics engine, then describe numerous inter-block interfaces and signals, where it is understood that in at least one embodiment of the invention, at least some signals communicated between functional blocks and within functional blocks advantageously use packetized communications (packets). Having described inter-block communication, we then describe structure, operation, and method of individual functional blocks.

I. Overview of Deferred Shading Graphics Processor (DSGP) 1000

Am embodiment of the inventive Deferred Shading Graphics Processor (DSGP) 1000 is illustrated in FIG. A 3 and described in detail hereinafter. An alternative embodiment of the invention is illustrated in FIG. A 4. The detailed description which follows is with reference to FIG. A3 and FIG. A 4, without further specific reference. Computer graphics is the art and science of generating pictures or images with a computer. This picture generation is commonly referred to as rendering. The appearance of motion, for example in a 3-Dimensional animation is achieved by displaying a sequence of images. Interactive 3-Dimensional (3D) computer graphics allows a user to change his or her viewpoint or to change the geometry in real-time, thereby requiring the rendering system to create new images on-the-fly in real-time. Therefore, real-time performance in color, with high quality imagery is becoming increasingly important.

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor is hereinafter referred to as the DSGP (for Deferred Shading Graphics Processor), or the DSGP pipeline, but is sometimes referred to as the pipeline.

This present invention includes numerous embodiments of the DSGP pipeline. Embodiments of the present invention are designed to provide high-performance 3D graphics with Phong shading, subpixel anti-aliasing, and texture- and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D APIs. The OpenGL specification, entitled "The OpenGL Graphics System: A Specification (Version 1.2)" by Mark Segal and Kurt Akeley, edited by Jon Leech, is included incorporated by reference.

The inventive structure and method provided for packetized communication between the functional blocks of the pipeline.

The term "Information" as used in this description means data and/or commands, and further includes any and all protocol handshaking, headers, address, or the like. Information may be in the form of a single bit, a plurality of bits, a byte, a plurality of bytes, packets, or any other form. Data also used synonymously with information in this application. The phase "information items" is used to refer to one or more bits, bytes, packets, signal states, addresses, or the like. Distinctions are made between information, data, and commands only when it is important to make a distinction for the particular structure or procedure being described. Advantageously, embodiments of the inventive processor provides unique physical addresses for the host, and supports packetized communication between blocks.

II. Deferred Shading Graphics Processor Functional Blocks and Communication and Interaction With Fucntional Blocks and External Devices and Systems Host Processor (HOST)

The host, not an element of the inventive graphics processor (except at the system level) but providing data and commands to it in a system, may be any general purpose computer, workstation, specialized processor, or the like, capable of sending commands and data to the Deferred Shading Graphics Processor. The AGP bus connects the Host to the AGI which communicates with the AGP bus. AGI implements AGP protocols which are known in the art and not described in detail here.

CFD communicates with AGI to tell it to get more data when more data can be handled, and sometimes CFD will receive a command that will stimulate it to go out and get additional commands and data from the host, that is it may stimulate AGI to fetch additional Graphics Hardware Commands (GHC).

Advanced Graphics Interface (AGI)

The AGI block is responsible for implementing all the functionality mandated by the AGP and/or PCI specifications in order to send and receive data to host memory or the CPU. This block should completely encapsulate the asynchronous boundary between the AGP bus and the rest of the chip. The AGI block should implement the optional Fast Write capability in the AGP 2.0 specification in order to allow fast transfer of commands. The AGI block is connected to the Read/Write Controller, the DMA Controller and the Interrupt Control Registers on CFD.

Command Fetch & Decode (CFD) 2000

Command Fetch and Decode (CFD) 2000 handles communication with the host computer through the AGI I/O bus also referred to as the AGP bus. CFD is the unit between the AGP/AGI interface and the hardware that actually draws pictures, and receives an input consisting of Graphics Hardware Commands (GHC) from Advanced Graphics Interface (AGI) and converts this input into other steams of data, usually in the form of a series of packets, which it passes to the Geometry (GEO) block 3000, to the 2-Dimensional Graphics Engine block (TDG) 18000, and to Backend (BKE) 16000. In one embodiment, each of the AGI, TDG, GEO, and CFD are co-located on a common integrated circuit chip. The Deferred Shading Graphics Processor (DSGP) 1000 (also referred to as the "graphics pipeline" or simply as "pipeline" in this document) is largely, though not exclusively, packet communication based. Most of what the CFD does is to route data for other blocks. A stream of data is received from the host via AGI and this stream may be considered to be simply a steam of bits which includes command and control (including addresses) and any data associated with the commands or control. At this stage, these bits have not been categorized by the pipeline nor packetized, a task for which CFD is primarily responsible. The commands and data come across the AGP bus and are routed by CFD to the blocks which consume them. CFD also does some decoding and unpacking of received commands, manages the AGP interface, and gets involved in Direct Memory Access (DMA) transfers and retains some state for context switches. Context switches (in the form of a command token) include may be received by CFD and in simple terms identify a pipeline state switching event so that the pipeline (or portions thereof can grab the current (old) state and be ready to receive new state information. CFD identifies and consumes the context switch command token.

Most of the input stream comprises commands and data. This data includes geometrical object data. The descriptions of these geometrical objects can include colors, surface normals, texture coordinates, as well as other descriptors as described in greater detail below. The input stream also contains rendering information, such as lighting, blending modes, and buffer functions. Data routed to 2DG can include texture and image data.

In this description, it will be realized that certain signals or packets are generated in a unit, other signals or packets are consumed by a unit (that is the unit is the final destination of the packet), other signals or packets are merely passed through a unit unchanged, while still others are modified in some way. The modification may for example include a change in format, a splitting of a packet into other packets, a combining of packets, a rearrangement of packets, or derivation of related information from one or more packets to form a new packet. In general, this description identifies the packet or signal generator block and the signal or packet consuming block, and for simplicity of description may not describe signals or packets that merely pass through or are propagated through blocks from the generating unit to the consuming unit. Finally, it will be appreciated that in at least one embodiment of the invention, the functional blocks are distributed among a plurality of chips (three chips in the preferred embodiment exclusive of memory) and that some signal or packet communication paths are followed via paths that attempt to get a signal or packet onto or off of a particular chip as quickly as possible or via an available port or pin, even though that path does not pass down the pipeline in "linear" manner. These are implementation specific architectural features, which are advantageous for the particular embodiments described, but are not features or limitations of the invention as a whole. For example, in a single chip architecture, alternate paths may be provided.

We now describe the CFD-TDG Interface 2001 in terms of information communicated (sent and/or received) over the interface with respect to the list of information items identified in Table 1. CFD-TDG Interface 2001 includes a 32-bit (31:0) command bus and a sixty-four bit (63:0) data bus. (The data bus may alternatively be a 32-bit bus and sequential write operations used to communicate the data when required.) The command bus communicates commands atomically written to the AGI from the host (or written using a DMA write operation). Data associated with a command will or may come in later write operations over the data bus. The command and the data associated with the command (if any) are identified in the table as "command bus" and "data bus" respectively, and sometimes as a "header bus". Unless otherwise indicated relative to particular signals or packets, command, data, and header are separately communicated between blocks as an implementation decision or because there is an advantage to having the command or header information arrive separately or be directed to a separate sub-block within a pipeline unit. These details are described in the detailed description of the particular pipeline blocks in the related applications.

CFD sends packets to GEO. A Vertex_1 packet is output to GEO when a vertex is read by CFD and GEO is operating in full performance vertex mode, a Vertex_2 packet is output when GEO is operating in one-half performance vertex mode, a Vertex_3 packet is output when GEO is operating in one-third performance vertex mode. These performance modes are described in greater detail relative to GEO below. Reference to an action, process, or step in a major functional block, such as in CFD, is a reference to such action, process, or step either in that major block as a whole or within a portion of that major block. Propagated Mode refers to propagation of signals through a block. Consumed Mode refers to signals or packets that are consumed by the receiving unit. The Geometry Mode Packet (GMD) is sent whenever a Mode Change command is read by CFD. The Geometry Material Packet (MAT) is sent whenever a Material Command is detected by CFD. The ViewPort Packet (VP) is sent whenever a ViewPort Offset is detected by CFD. The Bump Packet (BMP) and Matrix Packet (MTX) are also sent by CFD. The Light Color Packet (LITC) is sent whenever a Light Color Command is read by CFD. The Light State Packet (LITS) is sent whenever a Light State Command is read by CFD.

There is also a communication path between CFD and BKE. The stream of bits arriving at CFD from AGI are either processed by CFD or directed unprocessed to 2DG based on the address arriving with the input. This may be thought of as an almost direct communication path or link between AGI and 2DG as the amount of handling by CFD for 2DG bound signals or packets is minimal and without interpretation.

More generally, in at least one embodiment of the invention, the host can send values to or retrieve values from any unit in the pipeline based on a source or destination address. Furthermore, each pipeline unit has some registers or memory areas that can be read from or written to by the host. In particular the host can retrieve data or values from BKE. The backend bus (BKE bus) is driven to a large extent by 2DG which can push or pull data. Register reads and writes may also be accomplished via the multi-chip communication loop.

TABLE 1

CFD->GEO Interface

| Ref. # | | |
|---|---|---|
| 2002 | Vertex_1 Command Bus | Full performance vertex cmd. |
| 2003 | Vertex_1 Data Bus | Full performance vertex data |
| 2004 | Vertex_2 Command Bus | Half performance vertex cmd. |
| 2005 | Vertex_2 Data Bus | Half performance vertex data |
| 2006 | Vertex_3 Command Bus | Third performance vertex cmd. |
| 2007 | Vertex_3 Data Bus | Third performance vertex data |
| 2008 | Consumed Mode - Geometry Mode (GMD) Command Bus | Mode Change cmd. |
| 2009 | Consumed Mode - Geometry Mode (GMD) Data Bus | |
| 2010 | Consumed Mode - Material Packet (MAT) Command Bus | Material cmd. |
| 2011 | Consumed Mode - Material Packet (MAT) Data Bus | Material data |
| 2012 | Consumed Mode - ViewPort Packet (VP) Command Bus | |
| 2013 | Consumed Mode - ViewPort Packet (VP) Data Bus | |
| 2014 | Consumed Mode - Bump Packet (BMP) Command Bus | |
| 2015 | Consumed Mode - Bump Packet (BMP) Data Bus | |
| 2016 | Consumed Mode - Light Color Packet (LITC) Command Bus | |
| 2017 | Consumed Mode - Light Color Packet (LITC) Data Bus | |
| 2018 | Consumed Mode - Light State Packet (LITS) Command Bus | |
| 2019 | Consumed Mode - Light State Packet (LITS) Data Bus | |
| 2020 | Consumed Mode - Matrix Packet (MTX) Command Bus | |
| 2021 | Consumed Mode - Matrix Packet (MTX) Data Bus | |
| 2022 | Propagated Mode Command Bus | |
| 2023 | Propagated Mode Data Bus | |
| 2024 | Propagated Vertex Command Bus | |
| 2025 | Propagated Vertex Data Bus | |

Geometry (GEO) 3000

The Geometry block (GEO) 3000 is the first computation unit at the front end of DSGP and receives inputs primarily from CFD over the CFD-GEO Interface 2001. GEO handles four major tasks: transformation of vertex coordinates and normals; assembly of vertices into triangles, lines, and points; clipping; and per-vertex lighting calculations needed for Gouraud shading. First, the Geometry block transforms incoming graphics primitives into a uniform coordinate space, the so called “world space”. Then it clips the primitives to the viewing volume, or frustum. In addition to the six planes that define the viewing volume (left, right, top, bottom, front, and back), DSGP 1000 provides six user-definable clipping planes. After clipping, the GEO breaks polygons with more than three vertices into sets of triangles, to simplify processing. Finally, if there is any Gouraud shading in the frame, GEO calculates the vertex colors that the FRG 11000 uses to perform the shading.

DSGP can operate in maximum performance mode when only a certain subset of its operational features are in use. In performance mode (P-mode), GEO carries out only a subset of all possible operations for each primitive. As more operational features are selectively enabled, the pipeline moves through a series of lower-performance modes, such as half-performance (½P-mode), one-third performance (⅓P-mode), one-fourth performance (¼P-mode), and the like. GEO is organized to provide so that each of a plurality of GEO computational elements may be used for required computations. GEO reuses the available computational elements to process primitives at a slower rate for the non-performance mode settings.

The DSGP front end (primarily AGI and CFD) deals with fetching and decoding the Graphics Hardware Commands (GHC), and GEO receives from CFD and loads the necessary transform matrices (Matrix Packet (MTX)), material and light parameters (e.g. Geometry Material Packet (MAT), Bump Packet (BMP), Light Color Packet (LITC), Light State Packet (LITS)) and other mode settings (e.g. Geometry Mode (GMD), ViewPort Packet (VP)) into GEO input registers.

At its output, GEO sends transformed vertex coordinates (e.g. Spatial Packet), normals, generated and/or transformed texture coordinates (e.g. TextureA, TextureB Packets), and per-vertex colors, including generated or propagated vertex (e.g. Color Full, Color Half, Color Third, Color Other, Spatial), to the Mode Extraction block (MEX) 4000 and to the Sort block (SRT) 6000. MEX stores the color data (which actually includes more than just color) and modes in the Polygon memory (PMEM) 5000. SRT organizes the per-vertex "spatial" data by tile and writes it into the Sort Memory (SMEM) 7000. Certain of these signals are fixed length while others are variable length and are identified in the GEO-MEX Interface 3001 in Table 2.

GEO operates on vertices that define geometric primitives: points, lines, triangles, quadralaterals, and polygons. It performs coordinate transformations and shading operations on a per-vertex basis. Only during a primitive assembly procedural phase does GEO group vertices together into lines and triangles (in the process, it breaks down quadrilaterals and polygons into sets of triangles). It performs clipping and surface tangent generation for each primitive.

For the Begin Frame, End Frame, Clear, Cull Modes, Spatial Modes, Texture A Front/Back, Texture B Front/Back, Material Front/Back, Light, PixelModes, and Stipple packets indicated as being Propagated Mode from CFD to GEO to MEX, these packets are propagated from CFD to GEO to MEX. Spatial Packet, Begin Frame, End Frame, Clear, and Cull Modes are also communicated from MEX to SRT. The bits that will form the packets arrive over the AGP, CFD interprets them and forms them into packets. GEO receives them from CFD and passes them on (propagates them) to MEX. MEX stores them into memory PMEM 5000 for subsequent use. The Color Full, Color Half, Color Third, and Color Other identify what the object or primitive looks like and are created by GEO from the received Vertex_1, Vertex 2, or Vertex_3. The Spatial Packet identifies the location of the primitive or object. Table 2 identifies signals and packets communicated over the MEX-PMEM-MIJ Interface. Table 3 identifies signals and packets communicated over the GEO->MEX Interface.

TABLE 2

| MEX-PMEM-MIJ Interface | |
|---|---|
| Color Full | Generated or propagated vertex |
| Color Half | Generated or propagated vertex |
| Color Third | Generated or propagated vertex |
| Color Other | Generated or propagated vertex |
| Spatial Modes | Propagated Mode from CFD |
| Texture A | Propagated Mode from CFD (variable Length) |
| Texture B | Propagated Mode from CFD (variable Length) |
| Material | Propagated Mode from CFD (variable Length) |
| Light | Propagated Mode from CFD (variable Length) |
| PixelModes | Propagated Mode from CFD (variable Length) |
| Stipple | Propagated Mode from CFD (variable Length) |

TABLE 3

| GEO->MEX Interface | |
|---|---|
| Color Full | Generated by GEO - Generated or propagated vertex |
| Color Half | Generated by GEO - Generated or propagated vertex |
| Color Third | Generated by GEO - Generated or propagated vertex |
| Color Other | Generated by GEO - Generated or propagated vertex |
| Spatial Packet | Generated by GEO - Generated or propagated vertex |
| Begin Frame | Propagated Mode from CFD to GEO to MEX |
| End Frame | Propagated Mode from CFD to GEO to MEX |
| Clear | Propagated Mode from CFD to GEO to MEX |
| Cull Modes | Propagated Mode from CFD to GEO to MEX |
| Spatial Modes | Propagated Mode from CFD to GEO to MEX |
| Texture A Front/Back | Propagated Mode from CFD to GEO to MEX (variable Length) |
| Texture B Front/Back | Propagated Mode from CFD to GEO to MEX (variable Length) |
| Material Front/Back | Propagated Mode from CFD to GEO to MEX (variable Length) |
| Light | Propagated Mode from CFD to GEO to MEX (variable Length) |
| PixelModes | Propagated Mode from CFD to GEO to MEX (variable Length) |
| Stipple | Propagated Mode from CFD to GEO to MEX (variable Length) |

Mode Extraction (MEX) 4000 and Polygon Memory (PMEM) 5000

The Mode Extraction block 4000 receives an input information stream from GEO as a sequence of packets. The input information stream includes several information items from GEO, including Color Full, Color Half, Color Third, Color Other, Spatial, Begin Frame, End Frame, Clear, Spatial Modes, Cull Modes, Texture A Front/Back, Texture B Front/Back, Material Front/Back, Light, PixelModes, and Stipple, as already described in Table 2 for the GEO-MEX Interface 3100. The Color Full, Color Half, Color Third, Color Other packets are collectively referred to as Color Vertices or Color Vertex.

MEX separates the input stream into two parts: (i) spatial information, and (ii) shading information. Spatial information consist of the Spatial Packet, Begin Frame, End Frame, Clear, Cull Modes packets, and are sent to SRT 6000. Shading information includes lights (e.g. Light Packet), colors (e.g. Color Full, Color Half, Color Third, Color Other packets), texture modes (e.g. Texture A Front/Back, Texture B Front/Back packets), and other signals and packets (e.g. Spatial Modes, Material Front/Back, PixelModes, and Stipple packets), and is stored in a special buffer called the Polygon Memory (PMEM) 5000, where it can be retrieved by Mode Injection (MIJ) block 10000. PMEM is desirably double buffered, so MIJ can read data for one frame, while the MEX is storing data for the next frame.

The mode data (e.g. PixelMode, Spatial Mode) stored in PMEM conceptually may be placed into three major categories: per-frame data (such as lighting and including the Light packet), per-primitive data (such as material properties and including the Material Front/Back, Stipple, Texture A Front/Back, and Texture B Front/Back packets) and per-vertex data (such as color and including the Color Full, Color Half, Color Third, Color Other packets). In fact, in the preferred embodiment, MEX makes no actual distinction between these categories as although some types of mode data has a greater likelihood of changing frequently (or less frequently), in reality any mode data can change at any time.

For each spatial packet MEX receives, it repackages it with a set of pointers into PMEM. The set of pointers includes a color Address, a colorOffset, and a colorType which are used to retrieve shading information from PMEM. The Spatial Packet also contains fields indicating whether the vertex represents a point, the endpoint of a line, or the corner of a triangle. The Spatial Packet also specifies whether the current vertex forms the last one in a given object primitive (i.e., "completes" the primitive). In the case of triangle "strips" or "fans", and line "strips" or "loops", the vertices are shared between adjacent primitives. In this case, the packets indicate how to identify the other vertices in each primitive.

MEX, in conjunction with the MIJ, is responsible for the management of shaded graphics state information. In a traditional graphics pipeline the state changes are typically incremental; that is, the value of a state parameter remains in effect until it is explicitly changed. Therefore, the applications only need to update the parameters that change. Furthermore, the rendering of primitives is typically in the order received. Points, lines, triangle strips, triangle fans, polygons, quads, and quad strips are examples of graphical primitives. Thus, state changes are accumulated until the spatial information for a primitive is received, and those accumulated states are in effect during the rendering of that primitive.

In DSGP, most rendering is deferred until after hidden surface removal. Visibility determination may not be deferred in all instances. GEO receives the primitives in order, performs all vertex operations (transformations, vertex lighting, clipping, and primitive assembly), and sends the data down the pipeline. SRT receives the time ordered data and bins it by the tiles it touches. (Within each tile, the list is in time order.) The Cull (CUL) block 9000 receives the data from SRT in tile order, and culls out parts of the primitives that definitely (conservative culling) do not contribute to the rendered images. CUL generates Visible Stamp Portions (VSPs), where a VSP corresponds to the visible portion of a polygon on the stamp as described in greater detail relative to CUL. The Texture (TEX) block 12000 and the Phong Shading (PHG) block 14000 receive the VSPs and are respectively responsible for texturing and lighting fragments. The Pixel (PIX) block 15000 consumes the VSPs and the fragment colors to generate the final picture.

A primitive may touch many tiles and therefore, unlike traditional rendering pipelines, may be visited many times (once for each tile it touches) during the course of rendering the frame. The pipeline must remember the graphics state in effect at the time the primitive entered the pipeline (rather than what may be referred to as the current state for a primitive now entering the pipeline), and recall that state every time it is visited by the pipeline stages downstream from SRT. MEX is a logic block between GEO and SRT that collects and saves the temporally ordered state change data, and attaches appropriate pointers to the primitive vertices in order to associate the correct state with the primitive when it is rendered. MIJ is responsible for the retrieval of the state and any other information associated with the state pointer (referred to here as the MLM Pointer, or MLMP) when it is needed. MIJ is also responsible for the repackaging of the information as appropriate. An example of the repackaging occurs when the vertex data in PMEM is retrieved and bundled into triangle input packets for FRG.

The graphics shading state affects the appearance of the rendered primitives. Different parts of the DSGP pipeline use different state information. Here, we are only concerned with the pipeline stages downstream from GEO. DSGP breaks up the graphics state into several categories based on how that state information is used by the various pipeline stages. The proper partitioning of the state is important. It can affect the performance (by becoming bandwidth and access limited), size of the chips (larger caches and/or logic complications), and the chip pin count.

MEX block is responsible for the following functionality: (a) receiving data packets from GEO; (b) performing any reprocessing needed on those data packets; (c) appropriately saving the information needed by the shading portion of the pipeline in PMEM for retrieval later by MIJ; (d) attaching state pointers to primitives sent to SRT, so that MIJ knows the state associated with this primitive; (d) sending the information needed by SRT, Setup (STP), and CUL to SRT, SRT acting as an intermediate stage and propagating the information down the pipeline; and (e) handling PMEM and SMEM overflow. The state saved in PMEM is partitioned and used by the functional blocks downstream from MIJ, for example by FRG, TEX, PHG, and PIX. This state is partitioned as described elsewhere in this description.

The SRT-STP-CUL part of the pipeline converts the primitives into VSPs. These VSPs are then textured and lit by the FRG-TEX-PHG part of the pipeline. The VSPs output from CUL to MIJ are not necessarily ordered by primitives. In most cases, they will be in the VSP scan order on the tile, i.e. the VSPs for different primitives may be interleaved. The FRG-TEX-PHG part of the pipeline needs to know which primitive a particular VSP belongs to. MIJ decodes the color pointer, and retrieves needed information from the PMEM. The color pointer consists of three parts, the colorAddress, colorOffset, and colorType.

MEX thus accumulates any state changes that have happened since the last state save. and keeps a state vector on chip. The state changes become effective as soon as a vertex is encountered. MEX attaches a colorPointer (or color address), a colorOffset, and a colorType with every primitive vertex sent to SRT. The colorPointer points to a vertex entry in PMEM. The colorOffset is the number of vertices separating the vertex at the colorPointer to the dual-oct that is used to store the MLMP applicable to this primitive.

The colorType tells the MIJ how to retrieve the complete primitive from the PMEM. Vertices are stored in order, so the vertices in a primitive are adjacent, except in the case of triangle fans. For points, we only need the vertex pointed to by the colorPointer. For lines we need the vertex pointed to by ColorPointer and the vertex before this. For triangle strips, we need the vertex at colorpointer and two previous vertices. For triangle fans we need the vertex at colorPointer, the vertex before that, and the first vertex after MLMP.

MEX does not generally need to know the contents of most of the packets received by it. It only needs to know their type and size. There are some exceptions to this generalization which are now described.

For certain packets, including colorFull, colorHalf, colorThird, colorOther packets, MEX needs to know the information about the primitive defined by the current vertex. In particular, MEX needs to know its primitive type (point, line, triangle strip, or triangle fan) as identified by the colPrimType field, and if a triangle—whether it is front facing or back facing. This information is used in saving appropriate vertex entries in an on-chip storage to be able to construct the primitive in case of a memory overflow. This information is encapsulated in a packet header sent by GEO to MEX.

MEX accumulates material and texture data for both front and back faces of the triangle. Only one set of state is written to PMEM based on the Front bit or flag indicator contained in the colorFull, colorHalf, colorThird, colorOther, TextureA, TextureB, and Material packets. Note that the front/back orientation does not change in a triangle strip or triangle fan. The Front bit is used to associate correct TextureA, TextureB parameters and Material parameters with the primitive. If a mesh changes orientation somewhere within the mesh, GEO will break that mesh into two or more meshes such that each new mesh is either entirely front facing or entirely back facing.

Similarly, for the Spatial Modes packet, MEX needs to be able to strip away one of the LineWidth and PointWidth attributes of the Spatial Mode Packet depending on the primitive type. If the vertex defines a point then LineWidth is thrown away and if the vertex defines a line, then PointWidth is thrown away. MEX passes down only one of the line or point width to SRT in the form of a LinePointWidth in the MEX-SRT Spatial Packet.

In the case of Clear control packets, MEX examines to see if SendToPixel flag is set. If this flag is set, then MEX saves the PixelMode data received in the PixelMode Packet from GEO in PMEM (if necessary) and creates an appropriate ColorPointer to attach to the output clear packet so that it may be retrieved by MIJ when needed. Table 4 identifies signals and packets communicated over the MEX-SRT Interface.

TABLE 4

| MEX->SRT Interface |
|---|
| MEX->SRT Interface - Spatial |
| MEX->SRT Interface - Cull Modes |
| MEX->SRT Interface - Begin Frame |
| MEX->SRT Interface - End Frame |
| MEX->SRT Interface - Clear |

Sort (SRT) 6000 and Sort Memory (SMEM) 7000

The Sort (SRT) block 6000 receives several packets from MEX, including Spatial, Cull Modes, EndFrame, BeginFrame, and Clear Packets. For the vertices received from MEX, SRT sorts the resulting points, lines, and triangles by tile. SRT maintains a list of vertices representing the graphic primitives, and a set of Tile Pointer Lists, one list for each tile in the frame, in a desirably double-buffered Sort Memory (SMEM) 7000. SRT determines that a primitive has been completed. When SRT receives a vertex that completes a primitive (such as the third vertex in a triangle), it checks to see which tiles the primitive touches. For each Tile a primitive touches, SRT adds a pointer to the vertex to that tile's Tile Pointer List. When SRT has finished sorting all the geometry in a frame, it sends the primitive data (Primftive Packet) to STP. Each SRT output packet (Primitive Packet) represents a complete primitive. SRT sends its output in: (i) tile-by-tile order: first, all of the primitives that touch a given tile; then, all of the primitives that touch the next tile; and so on; or (ii) in sorted transparency mode order. This means that SRT may send the same primitive many times, once for each tile it touches. SRT also sends to STP CullMode, BeginFrame, EndFrame, BeginTile, and Clear Packets.

SRT is located in the pipeline between MEX and STP. The primary function of SRT is to take in geometry and determine which tiles that geometry covers. SRT manages the SMEM, which stores all the geometry for an entire scene before it is rasterized, along with a small amount of mode information. SMEM is desirably a double buffered list of vertices and modes. One SMEM page collects a scene's geometry (vertex-by-vertex and mode-by-mode), while the other SMEM page is sending its geometry (primitive by primitive and mode by mode) down the rest of the pipeline. SRT includes two processes that operate in parallel: (a) the Sort Write Process; and (b) the Sort Read Process. The Sort Write Process is the "master" of the two, because it initiates the Sort Read Process when writing is completed and the read process is idle. This also advantageously keeps SMEM from filling and overflowing as the write process limits the number of reads that may otherwise fill the SMEM buffer. In one embodiment of the invention SMEM is located on a separate chip different from the chip on which SRT is located, however, they may advantageously located on the same chip or substrate. For this reason, the communication paths between SRT and SMEM are not described in detail here, as in at least one embodiment, the communications would be performed within the same functional block (e.g. the Sort block). The manner in which SRT interacts with SMEM are described in the related applications.

An SRT-MIJ interface is provided to propagates Prefetch Begin Frame, Prefetch End Frame, and Prefetch Begin Tile. In fact these packets are destined to BKE via MIJ and PIX, and the provision of this SRT-MIJ-PIX-BKE communication path is used because MIJ represents the last block on the chip on which SRT is located. Prefetch packets go around the pipleline so BKE can do read operations from the Frame Buffer ahead of time, that is earlier than if the same packets were to propagate through the pipeline. MIJ has a convenient communication channel to the chip that contains BKE, and PIX is located on the same chip as BKE, the ultimate consumer of the packet. Therefore, sending the packet to MIJ is an implementation detail rather than a item of architectural design. On the other hand, the use of alternative paths described to facilitate communications between blocks on different physical chips is beneficial to this embodiment. Table 5 identifies signals and packets communicated over the SRT-MIJ-PIX-BKE Interface, and Table 6 identifies signals and packets communicated over the SRT-STP Interface.

TABLE 5

| SRT-MIJ-PIX-BKE Interface |
|---|
| SRT-MIJ Interface - Prefetch Begin Tile |
| SRT-MIJ Interface - Prefetch End Frame |
| SRT-MIJ Interface - Prefetch Begin Frame |

TABLE 6

| SRT->STP Interface |
|---|
| SRT->STP Interface - Primitive Packet |
| SRT->STP Interface - Cull Modes |
| SRT->STP Interface - Begin Frame |
| SRT->STP Interface - End Frame |
| SRT->STP Interface - Begin Tile |
| SRT->STP Interface - Clear |

Setup (STP) 8000

The Setup (STP) block 8000 receives a stream of packets (Primitive Packet, Cull Modes, Begin Frame, End Frame, Begin Tile, and Clear Packets) from SRT. These packets have spatial information about the primitives to be rendered. The primitives and can be filled triangles, line triangles, lines, stippled lines, and points. Each of these primitives can be rendered in aliased or anti-aliased mode. STP provides unified primitives descriptions for triangles and line segments, post tile sorting setup and tile relative y-values and screen relative x-values. SRT sends primitives to STP (and other pipeline stages downstream) in tile order. Within each tile the data is organized in either "time order" or "sorted transparency order". STP processes one tile's worth of data, one primitive at a time. When it's done with a primitive, it sends the data on to CUL in the form of a Primitive Packet. CUL receives data from STP in tile order (in fact in the same order that STP receives primitives from SRT), and culls out or removes parts of the primitives that definitely do not contribute to the rendered images. (It may leave some parts of primitives if it cannot determine for certain that they will not contribute to the rendered image.) STP also breaks stippled lines into separate line segments (each a rectangular region), and computes the minimum z value for each primitive within the tile. Each Primitive Packet output from STP represents one primitive: a triangle, line segment, or point. The other inputs to STP including CullModes, BeginFrame, EndFrame, BeginTile, and Clear. Some packets are not used by STP but are merely propagated or passed through to CUL.

STP prepares the incoming primitives from SRT for processing (culling) by CUL. The CUL culling operation is accomplished in two stages. We briefly describe culling here so that the preparatory processing performed by STP in anticipation of culling may be more readily understood. The first stage, a magnitude comparison content addressable memory based culling operation (M-Cull), allows detection of those elements in a rectangular memory array whose content is greater than a given value. In one embodiment of the invention a magnitude comparison content addressable type memory is used. (By way of example but not limitation, U.S. Pat. No. 4,996,666, by Jerome F. Duluk Jr., entitled "Content-Addressable Memory System Capable of Fully Parallel Magnitude Comparisons", granted Feb. 26, 1991 herein incorporated by reference describes a structure for a particular magnitude comparison content addressable type memory.) The second stage (S-Cull) refines on this search by doing a sample-by-sample content comparison. STP produces a tight bounding box and minimum depth value Zmin for the part of the primitive intersecting the tile for M-Cull. The M-Cull stage marks the stamps in the bounding box that may contain depth values less than Zmin. The S-Cull stage takes these candidate stamps, and if they are a part of the primitive, computes the actual depth value for samples in that stamp. This more accurate depth value is then used for comparison and possible discard on a sample by sample basis. In addition to the bounding box and Zmin for M-Cull, STP also computes the depth gradients, line slopes, and other reference parameters such as depth and primitive intersection points with the tile edge for the S-Cull stage. CUL produces the VSPs used by the other pipeline stages.

STP is therefore responsible for receiving incoming primitives from SRT in the form of Primitive Packets, and processing these primitives with the aid of information received in the CullModes, BeginFrame, EndFrame, BeginTile, and Clear packets; and outputting primitives (Primitive Packet), as well as CullModes, BeginFrame, EndFrame, BeginTile, and Clear packets. Table 7 identifies signals and packets communicated over the STP-CUL Interface.

TABLE 7

| STP->CUL Interface |
|---|
| STP->CUL Interface - Primitive Packet |
| STP->CUL Interface - Cull Modes |
| STP->CUL Interface - Begin Frame |
| STP->CUL Interface - End Frame |
| STP->CUL Interface - Begin Tile |
| STP->CUL Interface - Clear |

Cull (CUL) 9000

The Cull (CUL) block 9000 performs two main high-level functions. The primary function is to remove geometry that is guaranteed to not affect the final results in the frame buffer (i.e., a conservative form of hidden surface removal). The second function is to break primitives into units of stamp portions, where a stamp portion is the intersection of a particular primitive with a particular stamp. The stamp portion amount is determined by sampling. CUL is one of the more complex blocks in DSGP 1000, and processing within CUL is divided primarily into two steps: magnitude comparison content addressable memory culling (M-Cull), and Subpixel Cull (S-Cull). CUL accepts data one tile's worth at a time. M-Cull discards primitives that are hidden completely by previously processed geometry. S-Cull takes the remaining primitives (which are partly or entirely visible), and determines the visible fragments. S-Cull outputs one stamp's worth of fragments at a time, called a Visible Stamp Portion (VSP), a stamp based geometry entity. In one embodiment, a stamp is a 2×2 pixel area of the image. Note that a Visible Stamp Portion produced by CUL contains fragments from only a single primitive, even if multiple primitives touch the stamp. Colors from multiple touching VSPs are combined later, in the Pixel (PIX) block. Each pixel in a VSP is divided up into a number of samples to determine how much of the pixel is covered by a given fragment. PIX uses this information when it blends the fragments to produce the final color for the pixel.

CUL is responsible for: (a) pre-shading hidden surface removal; and (b) breaking down primitive geometry entities (triangles, lines and points) into stamp based geometry entities (VSPs). In general, CUL performs conservative culling or removal of hidden surfaces. CUL can only conservatively remove hidden surfaces, rather than exactly removing hidden surfaces, because it does not handle some "fragment operations" such as alpha test and stencil test, the results of which may sometimes be required to make such exact determination. CUL's sample z-buffer can hold two depth values, but CUL can only store the attributes of one primitive per sample. Thus, whenever a sample requires blending colors from two pieces of geometry, CUL has to send the first primitive (using time order) down the pipeline, even though there may be later geometry that hides both pieces of the blended geometry.

CUL receives STP Output Primitive Packets that each describe, on a per tile basis, either a triangle, a line or a point. SRT is the unit that bins the incoming geometry entities to tiles. Recall that STP pre-processed the primitives to provide more detailed geometric information in order to permit CUL to do the hidden surface removal. STP pre-calculates the slope value for all the edges, the bounding box of the primitive within the tile, (front most) minimum depth value of the primitive within the tile, and other relevant data, and sends this data to CUL in the form of packets. Recall that prior to SRT, MEX has already extracted the information of color, light, texture and related mode data and placed it in PMEM for later retrieval by MIJ, CUL only gets the mode data that is relevant to CUL and colorPointer (or colorAddress), that points to color, light, and texture data stored in PMEM.

CUL sends one VSP (Vsp Packet) at a time to MIJ, and MIJ reconnects the VSP with its color, light and texture data retrieved from PMEM and sends both the VSP and its associated color, light and texture data in the form of a packet to FRG and later stages in the pipeline. Associated color is stored in PMEM. CUL outputs Vsps to MIJ and included with the Vsps is a pointer into polygon memory (PMEM) so that the associated color, light, and texture data for the Vsp can be retrieved from the memory. Table 8 identifies signals and packets communicated over thee CUL-MIJ Interface.

TABLE 8

CUL->MIJ Interface

| Description |
| --- |
| CUL-MIJ Interface - Vsp (Visible Stamp Portion) |
| CUL-MIJ Interface - Begin Tile |
| CUL-MIJ Interface - Begin Frame |
| CUL-MIJ Interface - End Frame |
| CUL-MIJ Interface - Clear |

Mode Injection (MIJ) 10000

The Mode injection (MIJ) block 10000 in conjunction with MEX is responsible for the management of graphics state related information. MIJ retrieves mode information—such as colors, material properties, and so on—earlier stored in PMEM by MEX, and injects it into the pipeline to pass downstream as required. To save bandwidth, individual downstream blocks cache recently used mode information so that when cached there is no need use bandwidth to communicated the mode information from MIJ to the destination needing it. MIJ keeps track of what information is cached downstream, and by which block, and only sends information as necessary when the needed information is not cached.

MIJ receives VSP packets from the CUL block. Each VSP packet corresponds to the visible portion of a primitive on the 2×2 pixel stamp. The VSPs output from the Cull block to MIJ block are not necessarily ordered by primitives. In most cases, they will be in the VSP scan order on the tile, that is, the VSPs for different primitives may be interleaved. In order to light, texture and composite the fragments in the VSPs, the pipeline stages downstream from the MIJ block need information about the type of the primitive (i.e. point, line, triangle, line-mode triangle); its geometry such as window and eye coordinates, normal, color, and texture coordinates at the vertices of the primitive; and the rendering state such as the PixelModes, TextureA, TextureB, Light, Material, and Stipple applicable to the primitive. This information is saved in the polygon memory by MEX.

MEX also attaches ColorPointers (ColorAddress, ColorOffset, and ColorType) to each primitive sent to SRT, which is in turn passed on to each of the VSPs of that primitive. MIJ decodes this pointer to retrieve the necessary information from the polygon memory. MIJ starts working on a frame after it receives a BeginFrame packet from CUL. The VSP processing for the frame begins when CUL is done with the first tile in the frame and MIJ receives the first VSP for that tile. The color pointer consists of three parts, the ColorAddress, ColorOffset, and ColorType. The ColorAddress points to the ColorVertex that completes the primitive. ColorOffset provides the number of vertices separating the ColorAddress from the dualoct that contains the MLM_Pointer. The MLM_Pointer (Material Light Mode Pointer) is periodically generated by MEX and stored into PMEM and provides a series of pointers to find the shading modes that are used for a particular primitive. ColorType contains information about the type of the primitive, size of each ColorVertex, and the enabled edges for line mode triangles. The ColorVertices making up the primitive may be 2, 4, 6, or 9 dualocts long. MIJ decodes the ColorPointer to obtain addresses of the dualocts containing the MLM_Pointer, and all the ColorVertices that make up the primitive. The MLM_Pointer (MLMP) contains the dualoct address of the six state packets in polygon memory.

MIJ is responsible for the following: (a) Routing various control packets such as BeginFrame, EndFrame, and Begin Tile to FRG and PIX; (b) Routing prefetch packets from SRT to PIX; (c) Determining the ColorPointer for all the vertices of the primitive corresponding to the VSP; (d) Determining the location of the MLMP in PMEM and retrieving it; (e) Determining the location of various state packets in PMEM; (f) Determining which packets need to be retrieved; (g) Associating the state with each VSP received from CUL; (h) Retrieving the state packets and color vertex packets from PMEM; (i) Depending on the primitive type of the VSP, MIJ retrieves the required vertices and per-vertex data from PMEM and constructs primitives; (j) Keeping track of the contents of the Color, TexA, TexB, Light, and Material caches (for FRG, TEX, and PHG) and PixelMode and Stipple caches (for PIX) and associating the appropriate cache pointer to each cache miss data packet; and (k) Sending data to FRG and PIX.

MIJ may also be responsible for (l) Processing stalls in the pipeline, such as for example stalls caused by lack of PMEM memory space; and (m) Signaling to MEX when done with stored data in PMEM so that the memory space can be released and used for new incoming data. Recall that MEX writes to PMEM and MIJ reads from PMEM. A communication path is provided between MEX and MIJ for memory status and control information relative to PMEM usage and availability. MIJ thus deals with the retrieval of state as well as the per-vertex data needed for computing the final colors for each fragment in the VSP. MIJ is responsible for the retrieval of the state and any other information associated with the state pointer (MLMP) when it is needed. It is also responsible for the repackaging of the information as appropriate. An example of the repackaging occurs when the vertex data in PMEM is retrieved and bundled into primitive input packets for FRG. In at least one embodiment of the invention, the data contained in the VSP communicated from MIJ to FRG may be different than the data in the VSP communicated between MIJ and PIX. The VSP communicated to FRG also includes an identifier added upstream in the pipeline that identifies the type of a Line (VspLin), Point (VspPnt), or Triangle (VspTri). The Begin Tile packet is communicated to both PIX and to FRG from MIJ. Table 9 identifies signals and packets communicated over the MIJ-PIX Interface, and Table 10 identifies signals and packets communicated over the MIJ-FRG Interface.

TABLE 9

| MIJ->PIX Interface |
|---|
| MIJ-PIX Interface - Vsp |
| MIJ-PIX Interface - Begin Tile |
| MIJ-PIX Interface - Begin Frame |
| MIJ-PIX Interface - End Frame |
| MIJ-PIX Interface - Clear |
| MIJ-PIX Interface - PixelMode Fill |
| MIJ-PIX Interface - Stipple Fill |
| MIJ-PIX Interface - Prefetch Begin Tile |
| MIJ-PIX Interface - Prefetch End Frame |
| MIJ-PIX Interface - Prefetch Begin Frame |

TABLE 10

| MIJ->FRG Interface |
|---|
| MIJ-FRG Interface - Vsp (VspTri, VspLin, VspPnt) |
| MIJ-FRG Interface - Begin Tile |
| MIJ-FRG Interface - Color Cache Fill 0 (CCFill0) |
| MIJ-FRG Interface - Color Cache Fill 1 (CCFill1) |
| MIJ-FRG Interface - Color Cache Fill 2 (CCFill2) |
| MIJ-FRG Interface - TexA Fill Packet |
| MIJ-FRG Interface - TexB Fill Packet |
| MIJ-FRG Interface - Material Fill Packet |
| MIJ-FRG Interface - Light Fill Packet |

Fragment (FRG) 11000

The Fragment (FRG) block 11000 is primarily responsible for interpolation. It interpolates color values for Gouraud shading, surface normals for Phong shading, and texture coordinates for texture mapping. It also interpolates surface tangents for use in the bump mapping algorithm, if bump maps are in use. FRG performs perspective corrected interpolation using barycentric coefficients in at least one embodiment of the invention.

FRG is located after CUL and MIJ and before TEX, and PHG (including BUMP when bump mapping is used). In one embodiment, FRG receives VSPs that contain up to four fragments that need to be shaded. The fragments in a particular VSP always belong to the same primitive, therefore the fragments share the primitive data defined at vertices, including all the mode settings. FRG's main function is the receipt of VSPs (Vsp Packets), and interpolation of the polygon information provided at the vertices for all active fragments in a VSP. For this interpolation task it also utilizes packets received from other blocks.

At the output of FRG we still have VSPs. VSPs contain fragments. FRG can perform the interpolations of a given fragment in parallel, and fragments within a particular VSP can be done in an arbitrary order. Fully interpolated VSPs are forwarded by FRG to the TEX, and PHG in the same order as received by FRG. In addition, part of the data sent to TEX may include Level-of-Detail (LOD or %) values. In one embodiment, FRG interpolates values using perspective corrected barycentric interpolation.

PHG receives full and not full performance VSP (Vsp-FullPerf, Vsp-NotFullPerf), Texture-B Mode Cache Fill Packet (TexBFil), light cache Fill packet (LtFill), Material Cache Fill packet (MtFill), and Begin Tile Packet (BeginTile) from FRG over header and data busses. Note that here, full performance and not-full performance Vsp are communicated. At one level of the pipeline, four types are supported (e.g. full, ½, ⅓, and ¼ performance), and these are written to PMEM and read back to MIJ. However, in one embodiment, only three types are communicated from MIJ to FRG, and only two types from FRG to PHB. Not full performance here refers to ½ performance or less. These determinations are made based on available bandwidth of on-chip communication and off-chip communications and other implementation related factors.

We note that in one embodiment, FRG and TEX are coupled by several busses, a 48-bit (47:0) Header Bus, a 24-bit (23:0) R-Data Interface Bus, a 48-bit (47:0) ST-Data Interface Bus, and a 24-bit (23:0) LOD-Data Interface Bus. VSP data is communicated from FRG to TEX over each of these four busses. A TexA Fill Packet, a TexB Fill Packet, and a Begin Tile Packet are also communicated to TEX over the Header Bus. Multiple busses are conveniently used; however, a single bus, though not preferred, may alternatively be used. Table 11 identifies signals and packets communicated over the FRG-PHG Interface, and Table 12 identifies signals and packets communicated over the FRG-TEX Interface.

TABLE 11

| FRG->PHG Interface |
|---|
| FRG->PHB Full Performance Vsp |
| FRG->PHB Not Full Performance Vsp (½, ⅓, etc.) |
| FRG->PHB Begin Tile |
| FRG->PHB Material Fill Packet |
| FRG->PHB Light Fill Packet |
| FRG->PHB TexB Fill Packet |
| FRG->PHB Begin Tile |

TABLE 12

| FRG->TEX Interface |
|---|
| FRG->TEX Header Bus - Vsp |
| FRG->TEX ST-Data Bus - Vsp |
| FRG-TEX R-Data Bus - Vsp |
| FRG-TEX LOD-Data Bus - Vsp |
| FRG->TEX Header Bus - Begin Tile |
| FRG->TEX Header Bus - TexA Cache Fill Packet |
| FRG->TEX Header Bus - TexB Cache Fill Packet |

Texture (TEX) 12000 and Texture Memory (TMEM) 13000

The Texture block 12000 applies texture maps to the pixel fragments. Texture maps are stored in the Texture Memory (TMEM) 13000. TMEM need only be single-buffered. It is loaded from the host (HOST) computer's memory using the AGP/AGI interface. A single polygon can use up to four textures. Textures are advantageously mip-mapped, that is, each texture comprises a plurality or series of texture maps at different levels of detail, each texture map representing the appearance of the texture at a given magnification or minification. To produce a texture value for a given pixel fragment, TEX performs tri-linear interpolation (though other interpolation procedures may be used) from the texture maps, to approximate the correct level of detail for the viewing distance. TEX also performs other interpolation methods, such as anisotropic interpolation. TEX supplies interpolated texture values (generally as RGBA color values) in the form of Vsp Packets to the PHG on a per-fragment basis. Bump maps represent a special kind of texture map. Instead of a color, each texel of a bump map contains a height field gradient.

Polygons are used in 3D graphics to define the shape of objects. Texture mapping is a technique for simulating surface textures by coloring polygons with detailed images or patterns. Typically, a single texture map will cover an entire object that consists of many polygons. A texture map consists of one or more nominally rectangular arrays of RGBA color. In one embodiment of the invention, these rectangular arrays are about 2 kB by 2 kB in size. The user supplies coordinates, either manually or automatically in GEO, into the texture map at each vertex. These coordinates are interpolated for each fragment, the texture values are looked up in the texture map and the color assigned to the fragment.

Because objects appear smaller when they're farther from the viewer, texture maps must be scaled so that the texture pattern appears the same size relative to the object being textured. Scaling and filtering a texture image for each fragment is an expensive proposition. Mip-mapping allows the renderer to avoid some of this work at run-time. The user provides a series of texture arrays at successively lower resolutions, each array representing the texture at a specified level of detail (LOD or λ). Recall that FRG calculates a level of detail value for each fragment, based on its distance from the viewer, and TEX interpolates between the two closest mip-map arrays to produce a texture value for the fragment. For example, if a fragment has I=0.5, TEX interpolates between the available arrays representing I=0 and I=1. TEX identifies texture arrays by virtual texture number and LOD.

In addition to the normal path between TMEM and TEX, there is a path from host (HOST) memory to TMEM via AGI, CFD, 2DG to TMEM which may be used for both read and write operations. TMEM stores texture arrays that TEX is currently using. Software or firmware procedures manage TMEM, copying texture arrays from host memory into TMEM. It also maintains a table of texture array addresses in TMEM. TEX sends filtered texels in a VSP packet to PHG and PHG interprets these. Table 13 identifies signals and packets communicated over the TEX-PHG Interface.

TABLE 13

| TEX->PHG Interface |
|---|
| TEX->PHB Interface - Vsp |

Phong Shading (PHG or PHB) 14000

The Phong (PHG or PHB) block 14000 is located after TEX and before PIX in DSGP 1000 and performs Phong shading for each pixel fragment. Generic forms of Phong shading are known in the art and the theoretical underpinnings of Phong shading are therefore not described here in detail, but rather are described in the related applications. PHG may optionally but desirably include Bump Mapping (BUMP) functionality and structure. TEX sends only texel data contained within Vsp Packets and PHG receives Vsp Packets from TEX, in one embodiment this occurs via a 36-bit (35:0) Textel-Data Interface bus. FRG sends per-fragment data (in VSPs) as well as cache fill packets that are passed through from MIJ. It is noted that in one embodiment, the cache fill packets are stored in RAM within PHG until needed. Fully interpolated stamps are forwarded by FRG to PHG (as well as to TEX and BUMP within PHG) in the same order as received by FRG. Recall that PHG receives full performance VSP (Vsp-FullPerf) and not full performance VSP (Vsp-NotFullPerf) packets as well as Texture-B Mode Cache Fill Packet (TexBFill), Light Cache Fill packet (LtFill), Material Cache Fill packet (MtFill), and Begin Tile Packet (BeginTile) from FRG over header and data busses. Recall also that MIJ keeps track of the contents of the Color, TexA, TexB, Light, and Material caches for PHG (as well as for FRG and TEX) and associates the appropriate cache pointer to each cache miss data packet.

PHG uses the material and lighting information supplied by MIJ, the texture colors from TEX, and the interpolated data generated by FRG, to determine a fragment's apparent color. PHG calculates the color of a fragment by combining the color, material, geometric, and lighting information received from FRG with the texture information received from TEX. The result is a colored fragment, which is forwarded to PIX where it is blended with any color information already residing in the frame buffer (FRM). PHG is primarily geometry based and does not care about the concepts of frames, tiles, or screen-space.

PHG has three internal caches: the light cache (Lt Cache Fill Packet from MIJ), the material cache (Material Cache Fill Packet from MIJ), and the textureB (TexB) cache.

Only the results produced by PHG are sent to PIX. These include a packet that specifies the properties of a fragment (Color Packet), a packet that specifies the properties of a fragment (Depth_Color Packet), a packet that specifies the properties of a fragment (Stencil_Color Packet), a packet that specifies the properties of a fragment (ColorIndex Packet), a packet that specifies the properties of a fragment (Depth_ColorIndex Packet), and a packet that specifies the properties of a fragment (Stencil_ColorIndex Packet). Table 14 identifies signals and packets communicated over the PHG-PIX Interface,

TABLE 14

| PHG->PIX Interface |
|---|
| PHB->PIX Interface - Color |
| PHB->PIX Interface - Depth_Color |
| PHB->PIX Interface - Stencil_Color |
| PHB->PIX Interface - ColorIndex |
| PHB->PIX Interface - Depth_ColorIndex |
| PHB->PIX Interface - Stencil_ColorIndex |

Pixel (PIX) 15000

The Pixel (PIX) block 15000 is the last block before BKE in the 3D pipeline and receives VSPs, where each fragment has an independent color value. It is responsible for graphics API per-fragment and other operations including scissor test, alpha test, stencil operations, depth test, blending, dithering, and logic operations on each sample in each pixel (See for example, OpenGL Spec 1.1, Section 4.1, "Per-Fragment Operations," herein incorporated by reference). The pixel ownership test is a part of the window system (See for example Ch. 4 of the OpenGL 1.1 Specification, herein incorporated by reference) and is done in the Backend. When PIX has accumulated a tile's worth of finished pixels, it blends the samples within each pixel (thereby performing antialiasing of pixels) and sends them to the Backend (BKE) block 16000, to be stored in the frame buffer (FRM) 17000. In addition to this blending, the PIX performs stencil testing, alpha blending, and antialiasing of pixels. When it accumulates a tile's worth of finished pixels, it sends them to BKE to be stored in the frame buffer FRM. In addition to these operations, Pixel performs sample accumulation for antialiasing.

The pipeline stages before PIX convert the primitives into VSPs. SRT collects the primitives for each tile. CUL receives the data from SRT in tile order, and culls out or removes parts of the primitives that definitely do not contribute to the rendered images. CUL generates the VSPs. TEX and PHG also receive the VSPs and are responsible for the texturing and lighting of the fragments respectively.

PIX receives VSPs (Vsp Packet) and mode packets (Begin Tile Packet, BeginFrame Packet, EndFrame Packet, Clear Packet, PixelMode Fill Packet, Stipple Fill Packet, Prefetch Begin Tile Packet, Prefetch End Frame Packet, and Prefetch Begin Frame Packet) from MIJ, while fragment colors (Color Packet, Depth_Color Packet, Stencil_Color Packet, ColorIndex Packet, Depth_ColorIndex Packet, and Stencil_ColorIndex Packet) for the VSPs are received from PHG. PHG can also supply per-fragment z-coordinate and stencil values for VSPs.

Fragment colors (Color Packet, Depth_Color Packet, Stencil_Color Packet, ColorIndex Packet, Depth_ColorIndex Packet, and Stencil_ColorIndex Packet) for the VSPs arrive at PIX in the same order as the VSPs arrive. PIX processes the data for each visible sample according to the applicable mode settings. A pixel output (PixelOut) subunit processes the pixel samples to generate color values, z values, and stencil values for the pixels. When PIX finishes processing all stamps for the current Tile, it signals the pixel out subunit to output the color buffers, z-buffers, and stencil buffers holding their respective values for the Tile to BKE.

BKE prepares the current tile buffers for rendering of geometry (VSPs) by PIX. This may involve loading the existing color values, z values, and stencil values from the frame buffer. BKE includes a RAM (RDRAM) memory controller for the frame buffer.

PIX also receives some packets bound for BKE from MIJ. An input filter appropriately passes these packets on to a BKE Prefetch Queue, where they are processed in the order received. It is noted that several of the functional blocks, including PIX, have an "input filter" that selectively routes packets or other signals through the unit, and selectively "captures" other packets or signals for use within the unit.

Some packets are also sent to a queue in the pixel output subunit. As described herein before, PIX receives inputs from MIJ and PHG. There are two input queues to handle these two inputs. The data packets from MIJ go to the VSP queue and the fragment Color packets and the fragment depth packets from PHG go to the Color queue. PIX may also receive some packets bound for BKE. Some of the packets are also copied into the input queue of the pixel output subunit.

BKE and the pixel output subunit process the data packets in the order received. MIJ places the data packets in a PIX input First-In-First-Out (FIFO) buffer memory. A PIX input filter examines the packet header, and sends the data bound for BKE to BKE, and the data packets needed by PIX to the VSP queue. The majority of the packets received from MIJ are bound for the VSP queue, some go only to BKE, and some are copied into the VSP queue as well as sent to BKE and pixel output subunit of PIX.

Communication between PIX and BKE occurs via control lines and a plurality of tile buffers, in one embodiment the tile buffers comprise eight RAMs. Each tile buffer is a 16×16 buffer which BKE controls. PIX requests tile buffers from BKE via the control lines, and BKE either acquires the requested memory from the Frame buffer (FRM) or allocates it directly when it is available. PIX then informs BKE when it is finished with the tile buffers via the control lines.

Backend (BKE) 16000

The Backend (BKE) 16000 receives pixels from PIX, and stores them into the frame buffer (FRM) 17000. Communication between BKE and PIX is achieved via the control lines and tile buffers as described above, and not packetized. BKE also (optionally but desirable) sends a tile's worth of pixels back to PIX, because specific Frame Buffer (FRM) values can survive from frame to frame and there is efficiency in reusing them rather than recomputing them. For example, stencil bit values can be constant over many frames, and can be used in all those frames.

In addition to controlling FRM, BKE performs 2D drawing and sends the finished frame to the output devices. It provides the interface between FRM and the Display (or computer monitor) and video output.

BKE mostly interacts with PIX to read and write 3D tiles, and with the 2D graphics engine (TDG) 18000 to perform Blit operations. CFD uses the BKE bus to read display lists from FRM. The BKE Bus (including a BKE Input Bus and a BKE Output Bus) is the interconnect that interfaces BKE with the Two-Dimensional Graphics Engine (TDG) 18000, CFD, and AGI, and is used to read and write into the FRM Memory and BKE registers. AGI reads and writes BKE registers and the Memory Mapped Frame Buffer data. External client units (AGI, CFD and TDG) perform memory read and write through the BKE. The main BKE functions are: (a) 3D Tile read, (b) 3D Tile write using Pixel Ownership, (c) Pixel Ownership for write enables and overlay detection, (d) Scanout using Pixel Ownership, (e) Fixed ratio zooms, (f) 3D Accumulation Buffer, (g) Frame Buffer read and writes, (h) Color key to Windows ID (winid) map, (i) VGA, and (j) RAMDAC.

The 3D pipeline's interaction with BKE is driven by BeginFrame, BeginTile, and EndFrame packets. Prefetch versions of these packets are sent directly from SRT to the BKE so that the tiles can be prefetched into the PIX-BKE pixel buffers.

BKE interfaces with PIX using a pixBus and a prefetch queue. The pixBus is a 64-bit bus at each direction and is used to read and write the pixel buffers. There are up to 8 pixel buffers, each holding 32 bit color or depth values for a single tile. If the window has both color and depth planes enabled then two buffers are allocated. BKE read or writes to a single buffer at a time. BKE first writes the color buffer and then if needed the depth buffer values. PIX receives BeginFrame and BeginTile packets from the prefetch queue. These packets bypass the 3D pipeline units to enable prefetching of the tile buffers. The packets are duplicated for this purpose, the remaining units receiving them ordered with other VSP and mode packets. In addition to BeginFrame and BeginTile packets, BKE receives End of Frame packets that mainly is used to send a programmable interrupt. A pixel ownership unit (POBox) performs all necessary pixel ownership functions. It provides the pixel write mask for 3D tile writes. It also determines if there is an overlay (off-screen) buffer on scan out. It includes the window ID table that holds the parameters of 64 windows. A set of 16 bounding boxes (BB) and an 8-bit WinID map per-pixel mechanisms are used in determining the pixel ownership. Pixel ownership for up to 16 pixels at time can be performed as a single operation. The 2DG and AGI can perform register read and writes using the bkeBus. These registers are typically 3D independent registers. Register updates in synchronization with the 3D pipe are performed as mode operations or are set in Begin or End packets. CFD reads Frame Buffer resident compiled display lists and interleaved vertex arrays using the bkeBus. CFD issues read requests of four dualocts (64 Bytes) at a time when reading large lists. TDG reads and writes the Frame Buffer for 2D Blits. The source and destination could be the host memory, the Frame Buffer, the auxiliary ring for the Texture Memory and context switch state for the GEO and CFD.

In one embodiment, the BkeBus is a 72-bit input and 64-bit output bus with few handshaking signals. Arbitration is performed by BKE. Only one unit can own the bus at a time. The bus is fully pipelined and multiple requests can be on the fly at any given cycle. The external client units that perform memory read and write through the BKE are AGI and TDG, and CFD reads from the Frame Buffer via AGI's bkeBus interface. A MemBus is the internal bus used to access the Frame Buffer memory.

BKE effectively owns or controls the Frame Buffer and any other unit that needs to access (read from or write to) the frame buffer must communicate with BKE. PIX communicates with BKE via control signals and tile buffers as already described. BKE communicates with FRM (RAMBUS RDRAM) via conventional memory communication means. The 2DG block communicates with BKE as well, and can push data into the frame buffer and pull data out of the frame buffer and communicate the data to other locations.

Frame Buffer (FRM) 17000

The Frame Buffer (FRM) 17000 is the memory controlled by BKE that holds all the color and depth values associated with 2D and 3D windows. It includes the screen buffer that is displayed on the monitor by scanning-out the pixel colors at refresh rate. It also holds off-screen overlay and buffers (p-buffers), display lists and vertex arrays, and accumulation buffers. The screen buffer and the 3D p-buffers can be dual buffered. In one embodiment, FRM comprises RAMBUS RD random access memory.

Two-Dimensional Graphics (TDG or 2DG) 18000

The Two-Dimensional Graphics (TDG or 2DG) Block 18000 is also referred to as the two-dimensional graphics engine, and is responsible for two-dimensional graphics (2D graphics) processing operations. TDG is an optional part of the inventive pipeline, and may even be considered to be a different operational unit for processing two-dimensional data.

The TDG mostly talks to the bus interface AGI unit, the front end CFD unit and the backend BKE unit. In most desired cases (PULL), all 2D drawing commands are passed through from the CFD unit (AGP master or faster write). In low performance cases (PUSH), the commands can be programmed from AGI (in PIO mode from PCI slave). The return data from register or memory read is passed to the AGI. One the other side, to write or read the memory, the TDG passes memory request packets (including the address, data and byte enable) to the BKE or receives the memory read return data from the BKE. To process the auxiliary ring command, TDG also talks to everybody else on the ring.

We first describe certain input packets to BKE. The 2D source request and data return packet received as an input from AGI is used to handle the 2D data pull-in/push-out from/to the AGP memory. The PCI packet received as an input from AGI is used to handle all slave mode memory or I/O read or write accesses. The 2D command packet received as an input from CFD is used to pass formatted commands. The frame buffer write request acknowledge and read return data packet received as an input from BKE is used to pass the DRDRAM data returned from the BKE, in response to an earlier frame buffer read request. The auxiliary ring input packet received as an input from BKE moves uni-directionally from unit to unit. TDG receives it from BKE, takes proper actions and then deliver this packet or a new packet to the next unit AGI.

The 2D AGP data request and data out packet sent to AGI is used to send the AGP master read/write request to AGI and follow the write request, the data output packet to the AGI. The PCI write acknowledge and read return data packet sent to AGI is used to acknowledge the reception of PCI memory or I/O write data, and also handles the return of PCI memory or I/O read data. The auxiliary ring output packet sent to AGI moves uni-directionally from unit to unit; TDG receives it from BKE, takes proper actions and then deliver this packet or a new packet to the next unit AGI. The 2D command acknowledge packet sent to CFD is used to acknowledge the reception of the command data from CFD. The frame buffer read/write request and read data acknowledge packet sent to BKE passes the frame buffer read or write command to the BKE. For read, both address and byte enable lines are used, and for write command data lines are also meaningful.

In one particular embodiment of the invention, support of a "2D-within-3D" implementation is conveniently provided using pass-thru 2D commands (referred to as "Tween" Packets) from BKE unit. The 2D pass-thru command (tween) packet received as an input from BKE is used to pass formatted 2D drawing command packets that is in the 3D pipeline. The 2D command pass-thru (tween) acknowledge packet sent to BKE is used to acknowledge the reception of the command data from BKE.

Display (DIS)

The Display (DIS) may be considered a separate monitor or display device, particularly when the signal conditioning circuitry for generating analog signals from the final digital input are provided in BKE/FRM.

Multi-Chip Architecture

In one embodiment the inventive structure is disposed on a set of three separate chips (Chip 1, Chip 2, and Chip 3) plus additional memory chips. Chip 1 includes AGI, CFD, GEO, PIX, and BKE. Chip 2 includes MEX, SRT, STP, and CULL. Chip 3 includes FRG, TEX, and PHG. PMEM, SMEM, TMEM, and FRM are provided on seprate chips. An inter-chip communication ring is provided to couple the units on the chips for communication. In other embodiments of the invention, all functional blocks are provided on a single chip (common semiconductor substrate) which may also include memory (PMEM, SMEM, TMEM, and the like) or memory may be provided on a separate chip or set of chips.

III. Detailed Description of the Command Fetch & Decode Functional Block (CFD)

Overview

The CFD block is the unit between the AGP interface and the hardware that actually draws pictures. There is a lot of control and data movement units, with little to no math. Most of what the CFD block does is to route data for other blocks. Commands and textures for the 2D, 3D, Backend, and Ring come across the AGP bus and are routed by the front end to the units which consume them. CFD does some decoding and unpacking of commands, manages the AGP interface, and gets involved in DMA transfers and retains some state for context switches. It is one of the least glamorous, but most essential components of the DSGP system.

Figure 18:
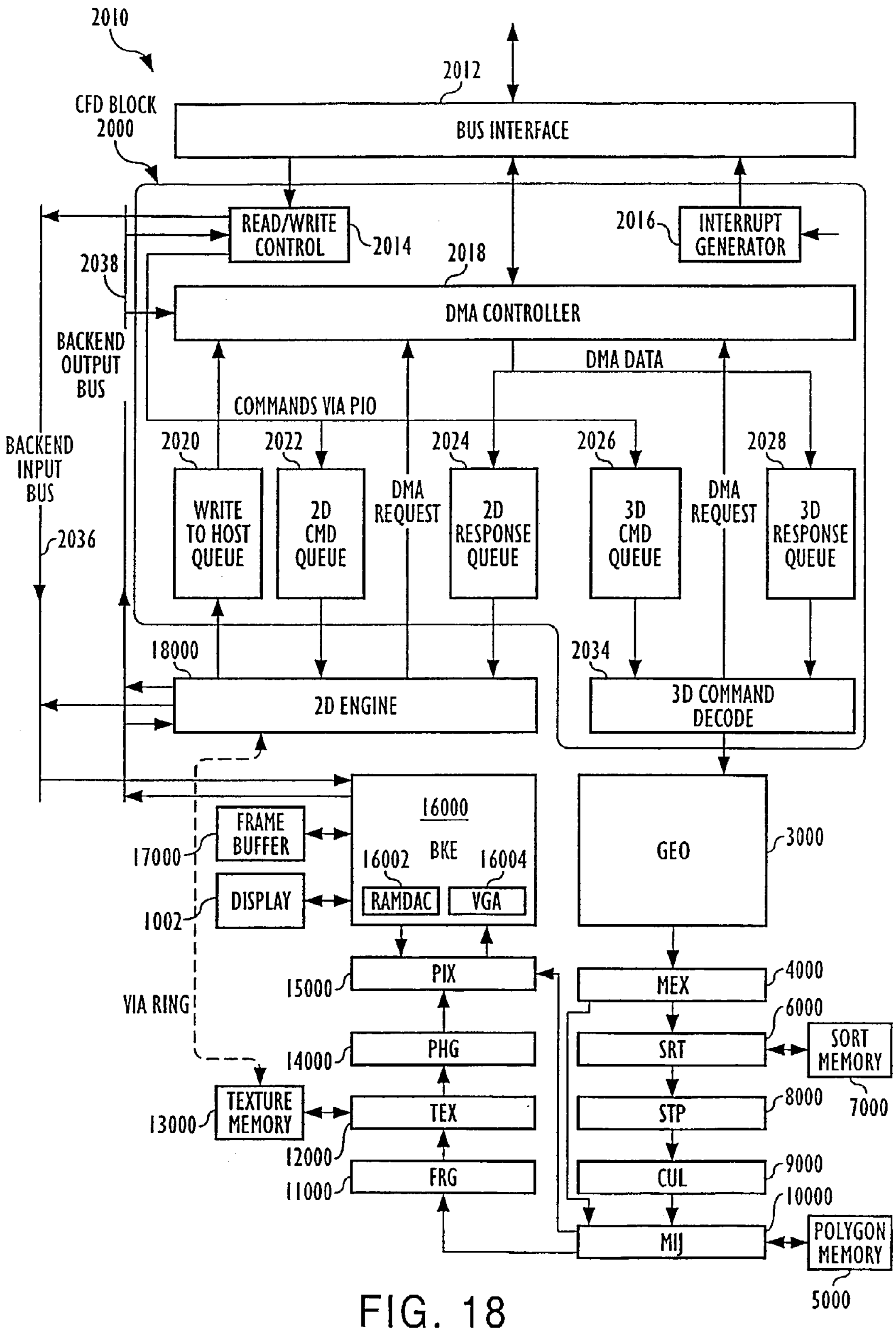
FIG. 18 is a diagramatic illustration showing an exemplary block diagram of an embodiment of the pipeline showing the major functional units in the front-end Command Fetch and Decode Block (CFD) 2000.
Figure 19:
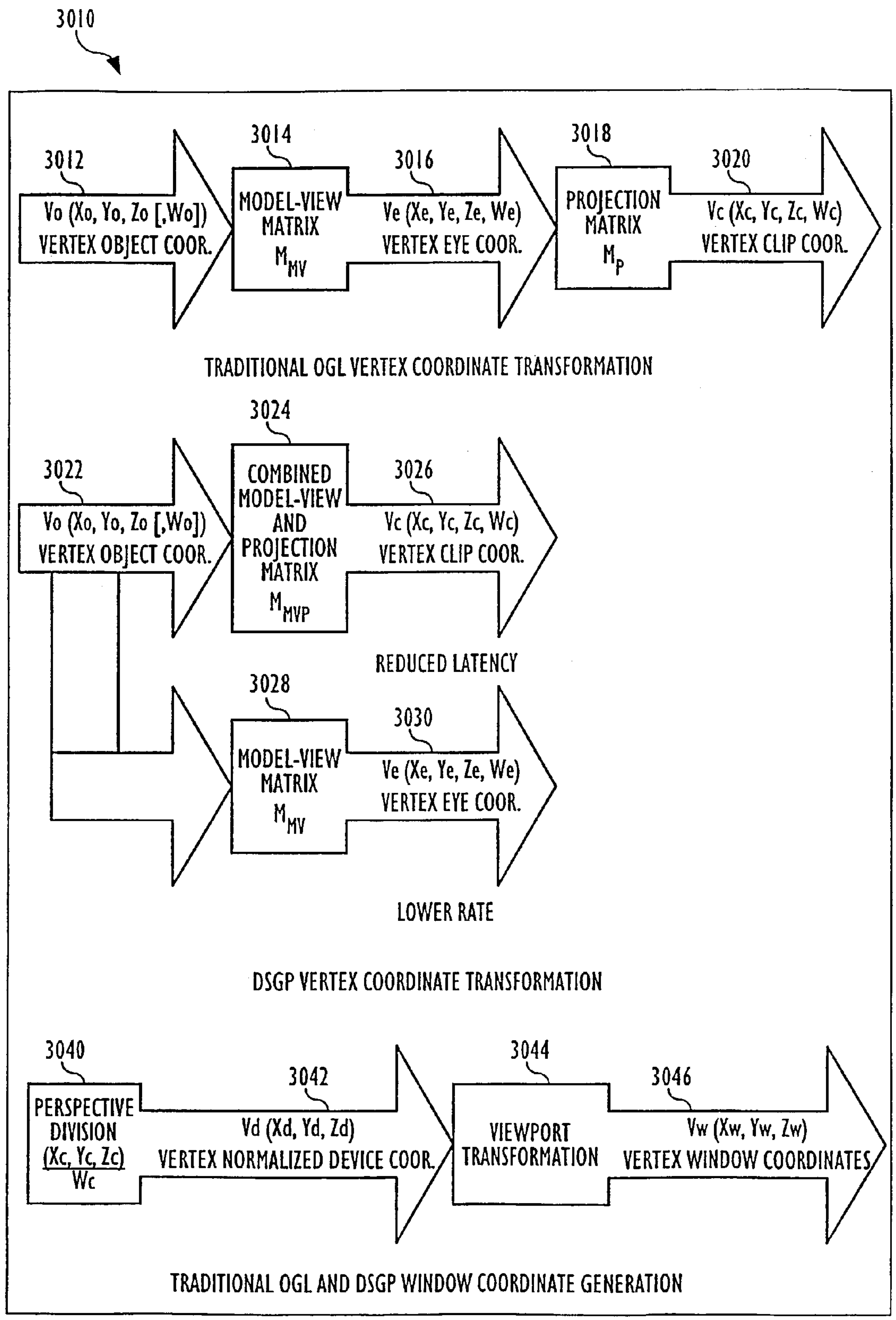
FIG. 19 is a diagramatic illustration hightlighting the manner in which one embodiment of the Deferred Shading Graphics Processor (DSGP) transforms vertex coordinates.

FIG. 18 shows a block diagram of the pipeline showing the major functional units in the CFD block 2000. The front end of the DSGP graphics system is broken into two sub-units, the AGI block and the CFD block. The rest of this section will be concerned with describing the architecture of the CFD block. References will be made to AGI, but they will be in the context of requirements which CFD has in dealing with AGI.

Sub-block Descriptions

Read/Write Control

Once the AGI has completed an AGP or PCI read/write transaction, it moves the data to the Read/Write Control 2014. In the case of a write this functional unit uses the address that it receives to multiplex the data into the register or queue corresponding to that physical address (see the Address Space for details). In the case of a read, the decoder multiplexes data from the appropriate register to the AGI Block so that the read transaction can be completed.

The Read/Write Control can read or write into all the visible registers in the CFD address space, can write into the 2D and 3D Command Queues 2022, 2026 and can also transfer reads and writes across the Backend Input Bus 2036.

If the Read/Write Decoder receives a write for a register that is read only or does not exist, it must send a message to the Interrupt Generator 2016 which requests that it trigger an access violation interrupt. It has no further responsibilities for that write, but should continue to accept further reads and writes.

If the Read/Write Decoder receives a read for a register which is write only or does not exist, it must gracefully cancel the read transaction. It should then send a message to the Interrupt Generator to request an access violation interrupt be generated. It has no further responsibilities for that read, but should continue to accept reads and writes.

2D Command Queue

Because commands for the DSGP graphics hardware have variable latencies and are delivered in bursts from the host, several kilobytes of buffering are required between AGI and 2D. This buffer can be several times smaller than the command buffer for 3D. It should be sized such that it smooths out inequalities between command delivery rate across AGI and performance mode command execution rate by 2D.

This queue is flow controlled in order to avoid overruns. A 2D High water mark register exists which is programmed by the host with the number of entries to allow in the queue. When this number of entries is met or exceeded, a 2D high water interrupt is generated. As soon as the host gets this interrupt, it disables the high water interrupt and enables the low water interrupt. When there are fewer entries in the queue than are in the 2D low water mark register, a low water interrupt is generated. From the time that the high water interrupt is received to the time that the low water is received, the driver is responsible for preventing writes from occurring to the command buffer which is nearly full.

3D Command Queue

Several kilobytes of buffering are also required between AGI and 3D Command Decode 2034. It should be sized such that it smooths out inequalities between command delivery rate across AGI and performance mode command execution rate by the GEO block.

This queue is flow controlled in order to avoid overruns. A 3D High water mark register exists which is programmed by the host with the number of entries to allow in the queue. When this number of entries is met or exceeded, a 3D high water interrupt is generated. As soon as the host gets this interrupt, it disables the high water interrupt and enables the low water interrupt. When there are fewer entries in the queue than are in the 3D low water mark register, a low water interrupt is generated. From the time that the high water interrupt is received to the time that the low water is received, the driver is responsible for preventing writes from occurring to the command buffer which is nearly full.

3D Command Decode

The command decoder 2034 is responsible for reading and interpreting commands from the 3D Cmd Queue 2026 and 3D Response Queue 2028 and sending them as reformatted packets to the GEO block. The decoder performs data conversions for "fast" commands prior to feeding them to the GEO block or shadowing the state they change. The 3D Command Decode must be able to perform format conversions. The input data formats include all those allowed by the API (generally, al those allowed in the C language, or other programming language). The output formats from the 3D Command Decode are limited to those that can be processed by the hardware, and are generally either floating point or "color" formats. The exact bit definition of the color data format depends on how colors are represented through the rest of the pipeline.

The Command Decode starts at power up reading from the 3D Command Queue. When a DMA command is detected, the command decoder sends the command and data to the DMA controller 2018. The DMA controller will begin transferring the data requested into the 3D response queue. The 3D Command Decoder then reads as many bytes as are specified in the DMA command from the 3D Response Queue, interpreting the data in the response queue as a normal command stream. When it has read the number of bytes specified in the DMA command, it switches back to reading from the regular command queue. While reading from the 3D Response Queue, all DMA commands are considered invalid commands.

This 3D command decoder is responsible for detecting invalid commands. Any invalid command should result in the generation of an Invalid Command Interrupt (see Interrupt Control for more details).

The 3D Command Decode also interprets and saves the current state vector required to send a vertex packet when a vertex command is detected in the queue. It also remembers the last 3 completed vertices inside the current "begin" (see OpenGL specification) and their associated states, as well as the kind of "begin" which was last encountered. When a context switch occurs, the 3D Command Decode must make these shadowed values available to the host for readout, so that the host can "re-prime the pipe" restarting the context later.

DMA Controller

The CFD DMA Controller 2018 is responsible for starting and maintaining all DMA transactions to or from the DSGP card. DSGP is always the master of any DMA transfer, there is no need for the DMA controller to be a slave. The 2D Engine and the 3D Command Decode contend to be master of the DMA Controller. Both DMA writes and DMA reads are supported, although only the 2D block can initiate a DMA write. DSGP is always master of a DMA.

A DMA transfer is initiated as follows. A DMA command, along with the physical address of the starting location, and the number of bytes to transfer is written into either the 2D or 3D command queue. When that command is read by the 3D Command Decoder or 2D unit, a DMA request with the data is sent to the DMA Controller. In the case of a DMA write by 2D, the 2D unit begins to put data in the Write To Host Queue 2020. Once the DMA controller finishes up any previous DMA, it acknowledges the DMA request and begins transferring data. If the DMA is a DMA write, the controller moves data from the Write To Host Queue either through AGI to system memory or through the Backend Input Bus to the framebuffer. If the DMA is a DMA read, the controller pulls data either from system memory through AGI or from the backend through the Backend Output Bus 2038 into either the 2D Response Queue or 3D Response Queue. Once the controller has transferred the required number of bytes, it releases the DMA request, allowing the requesting unit to read the next command out of its Command Queue.

The DMA Controller should try to maximize the performance of the AGP Logic by doing non-cache line aligned read/write to start the transaction (if necessary) followed by cache line transfers until the remainder of the transfer is less than a cache line (as recommended by the Maximizing AGP Performance white paper).

2D Response Queue

The 2D Response queue is the repository for data from a DMA read initiated by the 2D block. After the DMA request is sent, the 2D Engine reads from the 2D Response Queue, treating the contents the same as commands in the 2D Command Queue. The only restriction is if a DMA command is encountered in the response queue, it must be treated as an invalid command. After the number of bytes specified in the current DMA command are read from the response queue, the 2D Engine returns to reading commands from the 2D Command Queue.

3D Response Queue

The 3D Response queue is the repository for data from a DMA read initiated by 3D Command Decode. After the DMA request is sent, the command decode reads from the 3D Response Queue, treating the contents the same as commands in the 3D Command Queue. The only restriction is if a DMA command is encountered in the response queue, it must be treated as an invalid command. After the number of bytes specified in the current DMA command are read from the response queue, the 3D Command Decode returns to reading commands from the 3D Command Queue.

Write to Host Queue

The write to host queue contains data which 2D wants to write to the host through DMA. After 2D requests a DMA transfer that is to go out to system memory, it fills the host queue with the data, which may come from the ring or Backend. Having this small buffer allows the DMA engine to achieve peak AGP performance moving the data.

Interrupt Generator

An important part of the communication between the host and the DSGP board is done by interrupts. Interrupts are generally used to indicate infrequently occurring events and exceptions to normal operation. There are two Interrupt Cause Registers on the board that allow the host to read the registers and determine which interrupt(s) caused the interrupt to be generated. One of the Cause Registers is reserved for dedicated interrupts like retrace, and the other is for generic interrupts that are allocated by the kernel. For each of these, there are two physical addresses that the host can read in order to access the register. The first address is for polling, and does not affect the data in the Interrupt Cause Register. The second address is for servicing of interrupts and atomically clears the interrupt when it is read. The host is then responsible for servicing all the interrupts that that read returns as being on. For each of the Interrupt Cause Registers, there is an Interrupt Mask Register which determines whether an interrupt is generated when that bit in the Cause makes a 0 Þ1 transition.

DSGP supports up to 64 different causes for an interrupt, a few of which are fixed, and a few of which are generic. Listed below are brief descriptions of each.

Retrace

The retrace interrupt happens approximately 85–120 times per second and is raised by the Backend hardware at some point in the vertical blanking period of the monitor. The precise timing is programmed into the Backend unit via register writes over the Backend Input Bus.

3D FIFO high water

The 3D FIFO high water interrupt rarely happens when the pipe is running in performance mode but may occur frequently when the 3D pipeline is running at lower performance. The kernel mode driver programs the 3D High Water Entries register that indicates the number of entries which are allowed in the 3D Cmd Buffer. Whenever there are more entries than this are in the buffer, the high water interrupt is triggered. The kernel mode driver is then required to field the interrupt and prevent writes from occurring which might overflow the 3D buffer. In the interrupt handler, the kernel will check to see whether the pipe is close to draining below the high water mark. If it is not, it will disable the high water interrupt and enable the low water interrupt.

3D FIFO Low Water

When the 3D FIFO low water interrupt is enabled, an interrupt is generated if the number of entries in the 3D FIFO is less than the number in the 3D Low Water Entries register. This signals to the kernel that the 3D FIFO has cleared out enough that it is safe to allow programs to write to the 3D FIFO again.

2D FIFO High Water

This is exactly analogous to the 3D FIFO high water interrupt except that it monitors the 2D FIFO. The 2D FIFO high water interrupt rarely happens when the pipe is running in performance mode but may occur frequently when the 2D pipeline is running at lower performance. The kernel mode driver programs the 2D High Water Entries register that indicates the number of entries which are allowed in the 2D Cmd Buffer. Whenever there are more entries than this are in the buffer, the high water interrupt is triggered. The kernel mode driver is then required to field the interrupt and prevent writes from occurring which might overflow the 2D buffer. In the interrupt handler, the kernel will check to see whether the pipe is close to draining below the high water mark. If it is not, it will disable the high water interrupt and enable the low water interrupt.

2D FIFO Low Water

When the 2D FIFO low water interrupt is enabled, an interrupt is generated if the number of entries in the 2D FIFO is less than the number in the 2D Low Water Entries register. This signals to the kernel that the 2D FIFO has cleared out enough that it is safe to allow programs to write to the 2D FIFO again.

Access Violation

This should be triggered whenever there is a write or read to a nonexistent register.

Invalid Command

This should be triggered whenever a garbage command is detected in a FIFO (if possible) or if a privileged command is written into a FIFO by a user program. The kernel should field this interrupt and kill the offending task.

Texture Miss

This interrupt is generated when the texture unit tries to access a texture that is not loaded into texture memory. The texture unit sends the write to the Interrupt Cause Register across the ring, and precedes this write with a ring write to the Texture Miss ID register. The kernel fields the interrupt and reads the Texture Miss ID register to determine which texture is missing, sets up a texture DMA to download the texture and update the texture TLB, and then clears the interrupt.

Generic Interrupts

The rest of the interrupts in the Interrupt Cause register are generic. Generic interrupts are triggered by software sending a command which, upon completion, sends a message to the interrupt generator turning on that interrupt number. All of these interrupts are generated by a given command reaching the bottom of the Backend unit, having come from either the 2D or 3D pipeline. Backend sends a write through dedicated wires to the Interrupt Cause Register (it is on the same chip, so using the ring would be overkill).

IV. Detailed Description of the Mode Extraction (MEX) and Mode Injection (MIJ) Functional Blocks

DETAILED DESCRIPTION

Provisional U.S. patent application serial No. 60/097,336, hereby incorporated by reference, assigned to Raycer, Inc. pertains to a novel graphics processor. In that patent application, it is described that pipeline state data (also called "mode" data) is extracted and later injected, in order to provide a highly efficient pipeline process and architecture. That patent application describes a novel graphics processor in which hidden surfaces may be removed prior to the rasterization process, thereby allowing significantly increased performance in that computationally expensive per-pixel calculations are not performed on pixels which have already been determined to not affect the final rendered image.

System Overview

In a traditional graphics pipeline, the state changes are incremental; that is, the value of a state parameter remains in effect until it is changed, and changes simply overwrite the older value because they are no longer needed. Furthermore, the rendering is linear; that is, primitives are completely rendered (including rasterization down to final pixel colors) in the order received, utilizing the pipeline state in effect at the time each primitive is received. Points, lines, triangles, and quadrilaterals are examples of graphical primitives. Primitives can be input into a graphics pipeline as individual points, independent lines, independent triangles, triangle strips, triangle fans, polygons, quads, independent quads, or quad strips, to name the most common examples. Thus, state changes are accumulated until the spatial information for a primitive (i.e., the completing vertex) is received, and those accumulated states are in effect during the rendering of that primitive.

In contrast to the traditional graphics pipeline, the pipeline of the present invention defers rasterization (the system is sometimes called a deferred shader) until after hidden surface removal. Because many primitives are sent into the graphics pipeline, each corresponding to a particular setting of the pipeline state, multiple copies of pipeline state information must be stored until used by the rasterization process. The innovations of the present invention are an efficient method and apparatus for storing, retrieving, and managing the multiple copies of pipeline state information. One important innovation of the present invention is the splitting and subsequent merging of the data flow of the pipeline, as shown in FIG. B 3. The separation is done by the MEX step in the data flow, and this allows for independently storing the state information and the spatial information in their corresponding memories. The merging is done in the MIJ step, thereby allowing visible (i.e., not guaranteed hidden) portions of polygons to be sent down the pipeline accompanied by only the necessary portions of state information. In the alternative embodiment of FIG. B 4, additional steps for sorting by tile and reading by tile are added. As described later, a simplistic separation of state and spatial information is not optimal, and a more optimal separation is described with respect to another alternative embodiment of this invention.

An embodiment of the invention will now be described. Referring to FIG. B 5, the GEO (i.e., "geometry") block is the first computation unit at the front of the graphical pipeline. The GEO block receives the primitives in order, performs vertex operations (e.g., transformations, vertex lighting, clipping, and primitive assembly), and sends the data down the pipeline. The Front End, composed of the AGI (i.e., "advanced graphics interface") and CFD (i.e., "command fetch and decode") blocks deals with fetching (typically by PIO, programmed input/output, or DMA, direct memory access) and decoding the graphics hardware commands. The Front End loads the necessary transform matrices, material and light parameters and other pipeline state settings into the input registers of the GEO block. The GEO block sends a wide variety of data down the pipeline, such as transformed vertex coordinates, normals, generated and/or pass-through texture coordinates, per-vertex colors, material setting, light positions and parameters, and other shading parameters and operators. It is to be understood that FIG. B 5 is one embodiment only, and other embodiments are also envisioned. For example, the CFD and GEO can be replaced with operations taking place in the software driver, application program, or operating system.

The MEX (i.e., "mode extraction") block is between the GEO and SRT blocks. The MEX block is responsible for saving sets of pipeline state settings and associating them with corresponding primitives. The Mode Injection (MIJ) block is responsible for the retrieval of the state and any other information associated with a primitive (via various pointers, hereinafter, generally called Color Pointers and material, light and mode (MLM) Pointers) when needed. MIJ is also responsible for the repackaging of the information as appropriate. An example of the repackaging occurs when the vertex data in Polygon Memory is retrieved and bundled into triangle input packets for the FRG block.

The MEX block receives data from the GEO block and separates the data stream into two parts: 1) spatial data, including vertices and any information needed for hidden surface removal (shown as V1, S2a, and S2b in FIG. B 6); and 2) everything else (shown as V2 and S3 in FIG. B6).

Spatial data are sent to the SRT (i.e., "sort") block, which stores the spatial data into a special buffer called Sort Memory. The "everything else"—light positions and parameters and other shading parameters and operators, colors, texture coordinates, and so on—is stored in another special buffer called Polygon Memory, where it can be retrieved by the MIJ (i.e., "mode injection") block. In one embodiment, Polygon Memory is multi buffered, so the MIJ block can read data for one frame, while the MEX block is storing data for another frame. The data stored in Polygon Memory falls into three major categories: 1) per-frame data (such as lighting, which generally changes a few times during a frame), 2) per-object data (such as material properties, which is generally different for each object in the scene); and 3) per-vertex data (such as color, surface normal, and texture coordinates, which generally have different values for each vertex in the frame). If desired, the MEX and MIJ blocks further divide these categories to optimize efficiency. An architecture may be more efficient if it minimizes memory use or alternatively if it minimizes data transmission. The categories chosen will affect these goods.

For each vertex, the MEX block sends the SRT block a Sort packet containing spatial data and a pointer into the Polygon Memory. (The pointer is called the Color Pointer, which is somewhat misleading, since it is used to retrieve information in addition to color.) The Sort packet also contains fields indicating whether the vertex represents a point, the endpoint of a line, or the corner of a triangle. To comply with order-dependent APIs (Application Program Interfaces), such as OpenGL and D3D, the vertices are sent in a strict time sequential order, the same order in which they were fed into the pipeline. (For an order independent API, the time sequential order could be perturbed.) The packet also specifies whether the current vertex is the last vertex in a given primitive (i.e., "completes" the primitive). In the case of triangle strips or fans, and line strips or loops, the vertices are shared between adjacent primitives. In this case, the packets indicate how to identify the other vertices in each primitive.

The SRT block receives vertices from the MEX block and sorts the resulting points, lines, and triangles by tile (i.e., by region within the screen). In multi-buffered Sort Memory, the SRT block maintains a list of vertices representing the graphic primitives, and a set of Tile Pointer Lists, one list for each tile in the frame. When SRT receives a vertex that completes a primitive (such as the third vertex in a triangle), it checks to see which tiles the primitive touches. For each tile a primitive touches, the SRT block adds a pointer to the vertex to that tile's Tile Pointer List. When the SRT block has finished sorting all the geometry in a frame (i.e. the frame is complete), it sends the data to the STP (i.e., "setup") block. For simplicity, each primitive output from the SRT block is contained in a single output packet, but an alternative would be to send one packet per vertex. SRT sends its output in tile-by-tile order: all of the primitives that touch a given tile, then all of the primitives that touch the next tile, and so on. Note that this means that SRT may send the same primitive many times, once for each tile it touches.

The MIJ block retrieves pipeline state information—such as colors, material properties, and so on—from the Polygon Memory and passes it downstream as required. To save bandwidth, the individual downstream blocks cache recently used pipeline state information. The MIJ block keeps track of what information is cached downstream, and only sends information as necessary. The MEX block in conjunction with the MIJ block is responsible for the management of graphics state related information.

The SRT block receives the time ordered data and bins it by tile. (Within each tile, the list is in time order.) The CUL (i.e., cull) block receives the data from the SRT block in tile order, and performs a hidden surface removal method (i.e., "culls" out parts of the primitives that definitely do not contribute to the final rendered image). The CUL block outputs packets that describe the portions of primitives that are visible (or potentially visible) in the final image. The FRG (i.e., fragment) block performs interpolation of primitive vertex values (for example, generating a surface normal vector for a location within a triangle from the three surface normal values located at the triangle vertices). The TEX block (i.e., texture) block and PHB (i.e., Phong and Bump) block receive the portions of primitives that are visible (or potentially visible) and are responsible for generating texture values and generating final fragment color values, respectively. The last block, the PIX (i.e., Pixel) block, consumes the final fragment colors to generate the final picture.

In one embodiment, the CUL block generates VSPs, where a VSP (Visible Stamp Portion) corresponds to the visible (or potentially visible) portion of a polygon on a stamp, where a "stamp" is a plurality of adjacent pixels. An example stamp configuration is a block of four adjacent pixels in a 2×2 pixel subarray. In one embodiment, a stamp is configured such that the CUL block is capable of processing, in a pipelined manner, a hidden surface removal method on a stamp with the throughput of one stamp per clock cycle.

A primitive may touch many tiles and therefore, unlike traditional rendering pipelines, may be visited many times during the course of rendering the frame. The pipeline must remember the graphics state in effect at the time the primitive entered the pipeline, and recall it every time it is visited by the pipeline stages downstream from SRT.

The blocks downstream from MIJ (i.e., FRG, TEX, PHB, and PIX) each have one or more data caches that are managed by MIJ. MIJ includes a multiplicity of tag RAMs corresponding to these data caches, and these tag RAMs are generally implemented as fully associative memories (i.e., content addressable memories). The tag RAMs store the address in Polygon Memory (or other unique identifier, such as a unique part of the address bits) for each piece of information that is cached downstream. When a VSP is output from CUL to MIJ, the MIJ block determines the addresses of the state information needed to generate the final color values for the pixels in that VSP, then feeds these addresses into the tag RAMs, thereby identifying the pieces of state information that already reside in the data caches, and therefore, by process of elimination, determines which pieces of state information are missing from the data caches. The missing state information is read from Polygon Memory and sent down the pipeline, ahead of the corresponding VSP, and written into the data caches. As VSPs are sent from MIJ, indices into the data caches (i.e., the addresses into the caches) are added, allowing the downstream blocks to locate the state information in their data caches. When the VSP reaches the downstream blocks, the needed state information is guaranteed to reside in the data caches at the time it is needed, and is found using the supplied indices. Hence, the data caches are always "hit".

FIG. B 6 shows the GEO to FRG part of the pipeline, and illustrates state information and vertex information flow (other information flow, such as BeginFrame packets, EndFrame packets, and Clear packets are not shown) through one embodiment of this invention. Vertex information is received from a system processor or from a Host Memory (FIG. B 5) by the CFD block. CFD obtains and performs any needed format conversions on the vertex information and passes it to the GEO block. Similarly, state information, generally generated by the application software, is received by CFD and passed to GEO. State information is divided into three general types:

S1. State information which is consumed in GEO. This type of state information typically comprises transform matrices and lighting and material information that is only used for vertex-based lighting (e.g. Gouraud shading).

S2. State information which is needed for hidden surface removal (HSR), which in turn consists of two sub-types:

S2a) that which can possibly change frequently, and is thus stored with vertex data in Sort Memory, generally in the same memory packet: In this embodiment, this type of state information typically comprises the primitive type, type of depth test (e.g., OpenGL "DepthFunc"), the depth test enable bit, the depth write mask bit, line mode indicator bit, line width, point width, per-primitive line stipple information, frequently changing hidden surface removal function control bits, and polygon offset enable bit.

S2b) that which is not likely to change much, and is stored in Cull Mode packets in Sort Memory. In this embodiment, this type of state information typically comprises scissor test settings, antialiasing enable bit(s), line stipple information that is not per-primitive, infrequently changing hidden surface removal function control bits, and polygon offset information.

S3. State information which is needed for rasterization (per Pixel processing) which is stored in Polygon Memory. This type of state typically comprises the per-frame data and per-object data, and generally includes pipeline mode selection (e.g., sorted transparency mode selection), lighting parameter setting for a multiplicity of lights, and material properties and other shading properties. MEX stores state information S3 in Polygon Memory for future use.

Note that the typical division between state information S2a and S2b is implementation dependent, and any particular state parameter could be moved from one sub-type to the other. This division may also be tuned to a particular application.

As shown in FIG. B 6, GEO processes vertex information and passes the resultant vertex information V to MEX. The resultant vertex information V is separated by GEO into two groups:

V1. Any per-vertex information that is needed for hidden surface removal, including screen coordinate vertex locations. This information is passed to SRT, where it is stored, combined with state information S2a, in Sort Memory for later use.

V2. Per-vertex state information that is not needed for hidden surface removal, generally including texture coordinates, the vertex location in eye coordinates, surface normals, and vertex colors and shading parameters. This information is stored into Polygon Memory for later use.

Other packets that get sent into the pipeline include: the BeginFrame packet, that indicates the start of a block of data to be processed and stored into Sort Memory and Polygon Memory; the EndFrame packet, that indicates the end of the block of data; and the Clear packet, that indicates one or more buffer clear operations are to be performed.

An alternate embodiment is shown in FIG. B 7, where the STP step occurs before the SRT step. This has the advantage of reducing total computation because, in the embodiment of FIG. B 6, the STP step would be performed on the same primitive multiple times (once for each time it is read from Sort Memory). However, the embodiment of FIG. B 7 has the disadvantage of requiring a larger amount of Sort Memory because more data will be stored there.

In one embodiment, MEX and MIJ share a common memory interface to Polygon Memory RAM, as shown in FIG. B 8, while SRT has a dedicated memory interface to Sort memory. As an alternative, MEX, SRT, and MIJ can share the same memory interface, as shown in FIG. B 9. This has the advantage of making more efficient use of memory, but requires the memory interface to arbitrate between the three units. The RAM shown in FIG. B 8 and FIG. B 9 would generally be dynamic memory (DRAM) that is external to the integrated circuits with the MEX, SRT, and MIJ functions; however imbedded DRAM could be used. In the preferred embodiment, RAMBUS DRAM (RDRAM) is used, and more specifically, Direct RAMBUS DRAM (DRDRAM) is used.

System Details—Mode Extraction (MEX) Block

The MEX block is responsible for the following: (1) Receiving packets from GEO; (2) Performing any reprocessing needed on those data packets; (3) Appropriately saving the information needed by the shading portion of the pipeline (for retrieval later by MIJ) in Polygon Memory; (4) Attaching state pointers to primitives sent to SRT, so that MIJ knows the state associated with this primitive; (5) Sending the information needed by SRT, STP, and CUL to the SRT block; and (6) Handling Polygon Memory and Sort Memory overflow.

The SRT-STP-CUL part of the pipeline determines which portions of primitives are not guaranteed to be hidden, and sends these portions down the pipeline (each of these portions are hereinafter called a VSP). VSPs are composed of one or more pixels which need further processing, and pixels within a VSP are from the same primitive. The pixels (or samples) within these VSPs are then shaded by the FRG-TEX-PHB part of the pipeline. (Hereinafter, "shade" will mean any operations needed to generate color and depth values for pixels, and generally includes texturing and lighting.) The VSPs output from the CUL block to MIJ block are not necessarily ordered by primitive. If CUL outputs VSPs in spatial order, the VSPs will be in scan order on the tile (i.e., the VSPs for different primitives may be interleaved because they are output across rows within a tile). The FRG-TEX-PHB part of the pipeline needs to know which primitive a particular VSP belongs to; as well as the graphics state at the time that primitive was first introduced. MEX associates a Color Pointer with each vertex as the vertex is sent to SRT, thereby creating a link between the vertex information V1 and the corresponding vertex information V2. Color Pointers are passed along through the SRT-STP-CUL part of the pipeline, and are included in VSPs. This linkage allows MIJ to retrieve, from Polygon Memory, the vertex information V2 that is needed to shade the pixels in any particular VSP. MIJ also locates in Polygon Memory, via the MLM Pointers, the pipeline state information S3 that is also needed for shading of VSPs, and sends this information down the pipeline.

MEX thus needs to accumulate any state changes that have occurred since the last state save. The state changes become effective as soon as a vertex or in a general pipeline a command that indicates a "draw" command (in a Sort packet) is encountered. MEX keeps the MEX State Vector in on-chip memory or registers. In one embodiment, MEX needs more than 1 k bytes of on-chip memory to store the MEX State Vector. This is a significant amount of information needed for every vertex, given the large number of vertices passing down the pipeline. In accordance with one aspect of the present invention, therefore, state data is partitioned and stored in Polygon Memory such that a particular setting for a partition is stored once and recalled a minimal number of times as needed for all vertices to which it pertains.

System Details—MIJ (Mode Injection) Block

The Mode Injection block resides between the CUL block and the rest of the downstream 3D pipeline. MIJ receives the control and VSP packets from the CUL block. On the output side, MIJ interfaces with the FRG and PIX blocks.

The MIJ block is responsible for the following: (1) Routing various control packets such as BeginFrame, EndFrame, and BeginTile to FRG and PIX units. (2) Routing prefetch packets from SRT to PIX. (3) Using Color Pointers to locate (generally this means generating an address) vertex information V2 for all the vertices of the primitive corresponding to the VSP and to also locate the MLM Pointers associated with the primitive. (4) Determining whether MLM Pointers need to be read from Polygon Memory and reading them when necessary. (5) Keeping track of the contents of the State Caches. In one embodiment, these state caches are: Color, TexA, TexB, Light, and Material caches (for the FRGt, TEX, and PHB blocks) and PixelMode and Stipple caches (for the PIX block) and associating the appropriate cache pointer to each cache miss data packet. (6) Determining which packets (vertex information V2 and/or pipeline state information S2b) need to be retrieved from Polygon Memory by determining when cache misses occur, and then retrieving the packets. (7) Constructing cache fill packets from the packets retrieved from Polygon Memory and sending them down the pipeline to data caches. (In one embodiment, the data caches are in the FRG, TEX, PHB, and PIX blocks.). (8) Sending data to the fragment and pixel blocks. (10) Processing stalls in the pipeline. (11) Signaling to MEX when the frame is done. (12) Associating the state with each VSP received from the CUL block.

MIJ thus deals with the retrieval of state as well as the per-vertex data needed for computing the final colors for each fragment in the VSP. The entire state can be recreated from the information kept in the relatively small Color Pointer.

MIJ receives VSP packets from the CUL block. The VSPs output from the CUL block to MIJ are not necessarily ordered by primitives. In most cases, they will be in the VSP scan order on the tile, i.e. the VSPs for different primitives may be interleaved. In order to light, texture and composite the fragments in the VSPs, the pipeline stages downstream from the MIJ block need information about the type of the primitive (e.g., point, line, triangle, line-mode triangle); its vertex information V2 (such as window and eye coordinates, normal, color, and texture coordinates at the vertices of the primitive); and the state information S3 that was active when the primitive was received by MEX. State information S2 is not needed downstream of MIJ.

MIJ starts working on a frame after it receives a BeginFrame packet from CUL. The VSP processing for the frame begins when CUL outputs the first VSP for the frame.

The MEX State Vector

For state information S3, MEX receives the relevant state packets and maintains a copy of the most recently received state information S3 in the MEX State Vector. The MEX State Vector is divided into a multiplicity of state partitions. FIG. B 10 shows the partitioning used in one embodiment, which uses nine partitions for state information S3. FIG. B 10 depicts the names the various state packets that update state information S3 in the MEX State Vector. These packets are: MatFront packet, describing shading properties and operations of the front face of a primitive; MatBack packet, describing shading properties and operations of the back face of a primitive; TexAFront packet, describing the properties of the first two textures of the front face of a primitive; TexABack packet, describing the properties and operations of the first two textures of the back face of a primitive; TexBFront packet, describing the properties and operations of the rest of the textures of the front face of a primitive; TexBBack packet, describing the properties and operations of the rest of the textures of the back face of a primitive; Light packet, describing the light setting and operations; PixMode packet, describing the per-fragment operation parameters and operations done in the PIX block; and Stipple packet, describing the stipple parameters and operations. When a partition within the MEX State Vector has changed, and may need to be saved for later use, its corresponding one of Dirty Flag D1 through D9 is, in one embodiment, asserted, indicating a change in that partition has occurred. FIG. B 10 shows the partitions within the MEX State Vector that have Dirty Flags.

The Light partition of the MEX State Vector contains information for a multiplicity of lights used in fragment lighting computations as well as the global state affecting the lighting of a fragment such as the fog parameters and other shading parameters and operations, etc. The Light packet generally includes the following per-light information: light type, attenuation constants, spotlight parameters, light positional information, and light color information (including ambient, diffuse, and specular colors). In this embodiment, the light cache packet also includes the following global lighting information: global ambient lighting, fog parameters, and number of lights in use.

When the Light packet describes eight lights, the Light packet is about 300 bytes, (approximately 300 bits for each of the eight lights plus 120 bits of global light modes). In one embodiment, the Light packet is generated by the driver or application software and sent to MEX via the GEO block. The GEO block does not use any of this information.

Rather than storing the lighting state as one big block of data, an alternative is to store per-light data, so that each light can be managed separately. This would allow less data to be transmitted down the pipeline when there is a light parameter cache miss in MIJ. Thus, application programs would be provided "lighter weight" switching of lighting parameters when a single light is changed.

For state information S2, MEX maintains two partitions, one for state information S2a and one for state information S2b. State information S2a (received in VrtxMode packets) is always saved into Sort Memory with every vertex, so it does not need a Dirty Flag. State information S2b (received in CullMode packets) is only saved into Sort Memory when it has been changed and a new vertex is received, thus it requires a Dirty Flag (D10). The information in CullMode and VrtxMode packets is sent to the Sort-Setup-Cull part of the pipeline.

The packets described do not need to update the entire corresponding partition of the MEX State Vector, but could, for example, update a single parameter within the partition. This would make the packets smaller, but the packet would need to indicate which parameters are being updated.

When MEX receives a Sort packet containing vertex information V1 (specifying a vertex location), the state associated with that vertex is the copy of the most recently received state (i.e., the current values of vertex information V2 and state information S2a, S2b, and S3). Vertex information V2 (in Color packets) is received before vertex information V1 (received in Sort packets). The Sort packet consists of the information needed for sorting and culling of primitives, such as the window coordinates of the vertex (generally clipped to the window area) and primitive type. The Color packet consists of per-vertex information needed for lighting, texturing, and shading of primitives such as the vertex eye-coordinates, vertex normals, texture coordinates, etc. and is saved in Polygon Memory to be retrieved later. Because the amount of per-vertex information varies with the visual complexity of the 3D object (e.g., there is a variable number of texture coordinates, and the need for eye coordinate vertex locations depends on whether local lights or local viewer is used), one embodiment allows Color packets to vary in length. The Color Pointer that is stored with every vertex indicates the location of the corresponding Color packet in Polygon Memory. Some shading data and operators change frequently, others less frequently, these may be saved in different structures or may be saved in one structure.

In one embodiment, in MEX, there is no default reset of state vectors. It is the responsibility of the driver/software to make sure that all state is initialized appropriately. To simplify addressing, all vertices in a mesh are the same size.

Dirty Flags and MLM Pointer Generation

MEX keeps a Dirty Flag and a pointer (into Polygon Memory) for each partition in the state information S3 and some of the partitions in state information S2. Thus, in the embodiment of FIG. B 10, there are 10 Dirty Flags and 9 mode pointers, since CullMode does not get saved in the Polygon Memory and therefore does not require a pointer. Every time MEX receives an input packet containing pipeline state, it updates the corresponding portions of the MEX State Vector. For each state partition that is updated, MEX also sets the Dirty Flag corresponding to that partition.

When MEX receives a Sort packet (i.e. vertex information V1), it examines the Dirty Flags to see if any part of the state information S3 has been updated since the last save. All state partitions that have been updated (indicated by their Dirty Flags being set) and are relevant (i.e., the correct face) to the rendering of the current primitive are saved to the Polygon Memory, their pointers updated, and their Dirty Flags are cleared. Note that some partitions of the MEX State Vector come in a back-front pair (e.g., MatBack and MatFront), which means only one of the two of more in the set are relevant for a particular primitive. For example, if the Dirty Bits for both TexABack and TexAFront are set, and the primitive completed by a Sort packet is deemed to be front facing, then TexAFront is saved to Polygon Memory, the FrontTextureAPtr is copied to the TextureAPtr pointer within the set of six MLM Pointers that get written to Polygon Memory, and the Dirty Flag for TexAFront is cleared. In this example, the Dirty Flag for TexABack is unaffected and remains set. This selection process is shown schematically in FIG. B 10 by the “mux” (i.e., multiplexor) operators.

Each MLM Pointer points to the location of a partition of the MEX State Vector that has been stored into Polygon Memory. If each stored partition has a size that is a multiple of some smaller memory block (e.g. each partition is a multiple of a sixteen byte memory block), then each MLM Pointer is the block number in Polygon Memory, thereby saving bits in each MLM Pointer. For example, if a page of Polygon Memory is 32 MB (i.e. $2^{25}$ bytes), and each block is 16 bytes, then each MLM Pointer is 21 bits. All pointers into Polygon Memory and Sort Memory can take advantage of the memory block size to save address bits.

In one embodiment, Polygon Memory is implemented using Rambus Memory, and in particular, Direct Rambus Dynamic Random Access Memory (DRDRAM). For DRDRAM, the most easily accessible memory block size is a “dualoct”, which is sixteen nine-bit bytes, or a total of 144 bits, which is also eighteen eight-bit bytes. With a set of six MLM Pointer stored in one 144-bit dualoct, each MLM Pointer can be 24 bits. With 24-bit values for an MLM Pointer, a page of Polygon Memory can be 256 MB. In the following examples, MLM Pointers are assumed to be 24-bit numbers.

MLM Pointers are used because state information S3 can be shared amongst many primitives. However, storing a set of six MLM Pointers could require about 16 bytes, which would be a very large storage overhead to be included in each vertex. Therefore, a set of six MLM Pointers is shared amongst a multiplicity of vertices, but this can only be done if the vertices share the exact same state information S3 (that is, the vertices would have the same set of six MLM Pointers). Fortunately, 3D application programs generally render many vertices with the same state information S3. If fact, most APIs require the state information S3 to be constant for all the vertices in a polygon mesh (or, line strips, triangle strips, etc.). In the case of the OpenGL API, state information S3 must remain unchanged between “glBegin” and “glEnd” statements.

Color Pointer Generation

There are many possible variations to design the Color Pointer function, so only one embodiment will be described. FIG. B 11 shows an example triangle strip with four triangles, composed of six vertices. Also shown in the example of FIG. B 11 is the six corresponding vertex entries in Sort Memory, each entry including four fields within each Color Pointer: ColorAddress; ColorOffset; ColorType; and ColorSize. As described earlier, the Color Pointer is used to locate the vertex information V2 within Polygon Memory, and the ColorAddress field indicates the first memory block (in this example, a memory block is sixteen bytes). Also shown in FIG. B 11 is the Sort Primitive Type parameter in each Sort Memory entry; this parameter describes how the vertices are joined by SRT to create primitives, where the possible choices include: tri_strip (triangle strip); tri_fan (triangle fan); line_loop; line_strip; point; etc. In operation, many parameters in a Sort Memory entry are not needed if the corresponding vertex does not complete a primitive. In FIG. B 11, these unneeded parameters are in $V_{10}$ and $V_{11}$, and the unused parameters are: Sort Primitive Type; state information S2a; and all parameters within the Color Pointer. FIG. B 12 continues the example in FIG. B 11 and shows two sets of MLM Pointers and eight sets of vertex information V2 in Polygon Memory.

The address of vertex information V2 in Polygon Memory is found by multiplying the ColorAddress by the memory block size. As an example, let us consider $V_{12}$ as described in FIG. B11 and FIG. B 12. Its ColorAddress, 0x001041, is multiplied by 0×10 to get the address of 0x0010410. This computed address is the location of the first byte in the vertex information V2 for that vertex. The amount of data in the vertex information V2 for this vertex is indicated by the ColorSize parameter; and, in the example, ColorSize equals 0x02, indicating two memory blocks are used, for a total of 32 bytes. The ColorOffest and ColorSize parameters are used to locate the MLM Pointers by the formula (where B is the memory block size):

$$(\text{Address of } MLM \text{ Pointers})=(\text{ColorAddress}*B)-(\text{ColorSize}*\text{ColorOffset}+1)*B$$

The ColorType parameter indicates the type of primitive (triangle, line, point, etc.) and whether the primitive is part of a triangle mesh, line loop, line strip, list of points, etc. The ColorType is needed to find the vertex information V3 for all the vertices of the primitive.

The Color Pointer included in a VSP is the Color Pointer of the corresponding primitive's completing vertex. That is, the last vertex in the primitive, which is the $3^{rd}$ vertex for a triangle, $2^{nd}$ for a line, etc.

In the preceding discussion, the ColorSize parameter was described as binary coded number. However, a more optimal implementation would have this parameter as a descriptor, or index, into a table of sizes. Hence, in one embodiment, a 3-bit parameter specifies eight sizes of entries in Polygon Memory, ranging, for example, from one to fourteen memory blocks.

The maximum number of vertices in a mesh (in MEX) depends on the number of bits in the ColorOffset parameter in the Color Pointer. For example, if the ColorOffset is eight bits, then the maximum number of vertices in a mesh is 256. Whenever an application program specifies a mesh with more than the maximum number of vertices that MEX can handle, the software driver must split the mesh into smaller meshes. In one alternative embodiment, MEX does this splitting of meshes automatically, although it is noted that the complexity is not generally justified because most application programs do not use large meshes.

Clear Packets and Clear Operations

In addition to the packets described above, Clear Packets are also sent down the pipeline. These packets specify buffer clear operations that set some portion of the depth values, color values, and/or stencil values to a specific set of values. For use in CUL, Clear Packets include the depth clear value. Note that Clear packets are also processed similarly, with MEX treating buffer clear operations as a "primitive" because they are associated with pipeline state information stored in Polygon Memory. Therefore, the Clear Packet stored into Sort Memory includes a Color Pointer, and therefore is associated with a set of MLM Pointers; and, if Dirty Flags are set in MEX, then state information S3 is written to Polygon Memory.

In one embodiment, which provides improved efficiency for Clear Packets, all the needed state information S3 needed for buffer clears is completely contained within a single partition within the MEX State Vector (in one embodiment, this is the PixMode partition of the MEX State Vector). This allows the Color Pointer in the Clear Packet to be replaced by a single MLM Pointer (the PixModePtr). This, in turn, means that only the Dirty Flag for the PixMode partition needs to be examined, and only that partition is conditionally written into Polygon Memory. Other Dirty Flags are left unaffected by Clear Packets.

In another embodiment, Clear Packets take advantage of circumstances where none of the data in the MEX State Vector is needed. This is accomplished with a special bit, called "SendToPixel", included in the Clear packet. If this bit is asserted, then the clear operation is known to uniformly affect all the values in one or more buffers (i.e., one or more of: depth buffer, color buffer, and/or the stencil buffer) for a particular display screen (i.e., window). Specifically, this clear operation is not affected by scissor operations or any bit masking. If SendToPixel is asserted, and no geometry has been sent down the pipeline yet for a given tile, then the clear operation can be incorporated into the Begin Tile packet (not send along as a separate packet from SRT), thereby avoiding frame buffer read operations usually performed by BKE.

Polygon Memory Management

For the page of Polygon Memory being written, MEX maintains pointers for the current write locations: one for vertex information V2; and one for state information S3. The VertexPointer is the pointer to the current vertex entry in Polygon Memory. VertexCount is the number of vertices saved in Polygon Memory since the last state change. VertexCount is assigned to the ColorOffset. VertexPointer is assigned to the ColorPointer for the Sort primitives. Previous vertices are used during handling of memory overflow. MIJ uses the ColorPointer, ColorOffset and the vertex size information (encoded in the ColorType received from GEO) to retrieve the MLM Pointers and the primitive vertices from the Polygon Memory.

Alternate Embodiments

In one embodiment, CUL outputs VSPs in primitive order, rather than spatial order. That is, all the VSPs corresponding to a particular primitive are output before VSPs from another primitive. However, if CUL processes data tile-by-tile, then VSPs from the same primitive are still interleaved with VSPs from other primitives. Outputting VSPs in primitive order helps with caching data downstream of MIJ.

In an alternate embodiment, the entire MEX State Vector is treated as a single memory, and state packets received by MEX update random locations in the memory. This requires only a single type of packet to update the MEX State Vector, and that packet includes an address into the memory and the data to place there. In one version of this embodiment, the data is of variable width, with the packet having a size parameter.

In another alternate embodiment, the PHB and/or TEX blocks are microcoded processors, and one or more of the partitions of the MEX State Vector include microcode. For example, in one embodiment, the TexAFront, TexABack, TexBFront, and TexBBack packets contain the microcode. Thus, in this example, a 3D object has its own microcode that describes how its shading is to be done. This provides a mechanism for more complex lighting models as well as user-coded shaders. Hence, in a deferred shader, the microcode is executed only for pixels (or samples) that affect the final picture.

In one embodiment of this invention, pipeline state information is only input to the pipeline when it has changed. Specifically, an application program may use API (Application Program Interface) calls to repeatedly set the pipeline state to substantially the same values, thereby requiring (for minimal Polygon Memory usage) the driver software to determine which state parameters have changed, and then send only the changed parameters into the pipeline. This simplifies the hardware because the simple Dirty Flag mechanism can be used to determine whether to store data into Polygon Memory. Thus, when a software driver performs state change checking, the software driver maintains the state in shadow registers in host memory. When the software driver detects that the new state is the same as the immediately previous state, the software driver does not send any state information to the hardware, and the hardware continues to use the same state information. Conversely, if the software driver detects that there has been a change in state, the new state information is stored into the shadow registers in the host, and new state information is sent to hardware, so that the hardware may operate under the new state information.

In an alternate embodiment, MEX receives incoming pipeline state information and compares it to values in the MEX State Vector. For any incoming values are different than the corresponding values in the MEX State Vector, appropriate Dirty Flags are set. Incoming values that are not different are discarded and do not cause any changes in Dirty Flags. This embodiment requires additional hardware (mostly in the form of comparitors), but reduces the work required of the driver software because the driver does not need to perform comparisons.

In another embodiment of this invention, MEX checks for certain types of state changes, while the software driver checks for certain other types of hardware state changes. The advantage of this hybrid approach is that hardware dedicated to detecting state change can be minimized and used only for those commonly occurring types of state change, thereby providing high speed operation, while still allowing all types of state changes to be detected, since the software driver detects any type of state change not detected by the hardware. In this manner, the dedicated hardware is simplified and high speed operation is achieved for the vast majority of types of state changes, while no state change can go unnoticed, since software checking determines the other types of state changes not detected by the dedicated hardware.

In another alternative embodiment, MEX first determines if the updated state partitions to be stored in Polygon Memory already exist in Polygon Memory from some previous operation and, if so, sets pointers to point to the already existing state partitions stored in Polygon Memory. This method maintains a list of previously saved state, which is searched sequentially (in general, this would be slower), or which is searched in parallel with an associative cache (i.e., a content addressable memory) at the cost of additional hardware. These costs may be offset by the saving of significant amounts of Polygon Memory.

In yet another alternative embodiment, the application program is tasked with the requirement that it attach labels to each state, and causes color vertices to refer to the labeled state. In this embodiment, labeled states are loaded into Polygon Memory either on an as needed basis, or in the form of a pre-fetch operation, where a number of labeled states are loaded into Polygon Memory for future use. This provides a mechanism for state vectors to be used for multiple rendering frames, thereby reducing the amount of data fed into the pipeline.

In one embodiment of this invention, the pipeline state includes not just bits located within bit locations defining particular aspects of state, but pipeline state also includes software (hereinafter, called microcode) that is executed by processors within the pipeline. This is particularly important in the PHB block because it performs the lighting and shading operation; hence, a programmable shader within a 3D graphics pipeline that does deferred shading greatly benefits from this innovation. This benefit is due to eliminating (via the hidden surface removal process, or CUL block) computationally expensive shading of pixels (or pixel fragments) that would be shaded in a conventional 3D renderer. Like all state information, this microcode is sent to the appropriate processing units, where it is executed in order to effect the final picture. Just as state information is saved in Polygon Memory for possible future use, this microcode is also saved as part of state information S3. In one embodiment, the software driver program generates this microcode on the fly (via linking pre-generated pieces of code) based on parameters sent from the application program. In a simpler embodiment, the driver software keeps a pre-compiled version of microcode for all possible choices of parameters, and simply sends appropriate versions of microcode (or pointers thereto) into the pipeline as state information is needed. In another alternative embodiment, the application program supplies the microcode.

As an alternative, more pointers are included in the set of MLM Pointers. This could be done to make smaller partitions of the MEX State Vector, in the hopes of reducing the amount of Polygon Memory required. Or, this is done to provide pointers for partitions for both front-facing and back-facing parameters, thereby avoiding the breaking of meshes when the flip from front-facing to back-facing or visa versa.

In Sort Memory, vertex locations are either clipped to the window (i.e., display screen) or not clipped. If they are not clipped, high precision numbers (for example, floating point) are stored in Sort Memory. If they are clipped, reduced precision can be used (fixed-point is generally sufficient), but, in prior art renderers, all the vertex attributes (surface normals, texture coordinates, etc.) must also be clipped, which is a computationally expensive operation. As an optional part of the innovation of this invention, clipped vertex locations are stored in Sort Memory, but unclipped attributes are stored in Polygon Memory (along with unclipped vertex locations). FIG. B13A shows a display screen with a triangle strip composed of six vertices; these vertices, along with their attributes, are stored into Polygon Memory. FIG. B 13B shown the clipped triangles that are stored into Sort Memory. Note, for example, that triangle $V_{30}$-$V_{31}$-$V_{32}$ is represented by two on-display triangles: $V_{30}$-$V_A$-$V_B$ and $V_{30}$-$V_B$-$V_{32}$, where $V_A$ and $V_B$ are the vertices created by the clipping process. In one embodiment, Front Facing can be clipped or unclipped attributes, or if the "on display" vertices are correctly ordered "facing" can be computed.

A useful alternative provides two ColorOffset parameters in the Color Pointer, one being used to find the MLM Pointers; the other being used to find the first vertex in the mesh. This makes it possible for consecutive triangle fans to share a single set of MLM Pointers.

For a low-cost alternative, the GEO function of the present invention is performed on the host processor, in which case CFD, or host computer, feeds directly into MEX.

As a high-performance alternative, multiple pipelines are run in parallel. Or, parts of the pipeline that are a bottleneck for a particular type of 3D data base are further paralyzed. For example, in one embodiment, two CUL blocks are used, each working on different contiguous or non-contiguous regions of the screen. As another example, subsequent images can be run on parallel pipelines or portions thereof.

In one embodiment, multiple MEX units are provided so as to have one for each process on the host processor that was doing rendering or each graphics Context. This results on "zero overhead" context switches possible.

Example of MEX Operation

In order to understand the details of what MEX needs to accomplish and how it is done, let us consider an example shown in FIG. B 14, FIG. B 15, and FIG. B 16. These figures show an example sequence of packets (FIG. B 14) for an entire frame of data, sent from GEO to MEX, numbered in time-order from 1 through 55, along with the corresponding entries in Sort Memory (FIG. B 15) and Polygon Memory (FIG. B 16). For simplicity, FIG. B 15 does not show the tile pointer lists and mode pointer list that SRT also writes into Sort Memory. Also, in one preferred embodiment, vertex information V2 is written into Polygon Memory starting at the lowest address and moving sequentially to higher addresses (within a page of Polygon Memory); while state information S3 is written into Polygon Memory starting at the highest address and moving sequentially to lower addresses. Polygon Memory is full when these addresses are too low to write additional data.

Referring to the embodiment of FIG. B 14, the frame begins with a BeginFrame packet that is a demarcation at the beginning of frames, and supplies parameters that are constant for the entire frame, and can include: source and target window IDs, framebuffer pixel format, window offsets, target buffers, etc. Next, the frame generally includes packets that affect the MEX State Vector, are saved in MEX, and set their corresponding Dirty Flags; in the example shown in the figures, this is packets 2 through 12. Packet 13 is a Clear packet, which is generally supplied by an application program near the beginning of every frame. This Clear packet causes the CullMode data to be written to Sort Memory (starting at address 0x0000000) and PixMode data to be written to Polygon Memory (other MEX State Vector partitions have their Dirty Flags set, but Clear packets are not affected by other Dirty Bits). Packets 14 and 15 affect the MEX State Vector, but overwrite values that were already labeled as dirty. Therefore, any overwritten data from packets 3 and 5 is not used in the frame and is discarded. This is an example of how the invention tends to minimize the amount of data saved into memories.

Packet 16, a Color packet, contains the vertex information V2 (normals, texture coordinates, etc.), and is held in MEX until vertex information V1 is received by MEX. Depending on the implementation, the equivalent of packet 16 could alternatively be composed of a multiplicity of packets. Packet 17, a Sort packet, contains vertex information V1 for the first vertex in the frame, $V_0$. When MEX receives a Sort Packet, Dirty Flags are examined, and partitions of the MEX State Vector that are needed by the vertex in the Sort Packet are written to Polygon Memory, along with the vertex information V2. In this example, at the moment packet 17 is received, the following partitions have their Dirty Flags set: MatFront, MatBack, TexAFront, TexABack, TexBFront, TexBBack, Light, and Stipple. But, because this vertex is part of a front-facing polygon (determined in GEO), only the following partitions get written to Polygon Memory: MatFront, TexAFront, TexBFront, Light, and Stipple (shown in FIG. B 16 as occupying addresses 0xFFFFF00 to 0xFFFFFEF). The Dirty Flags for MatBack, TexABack, and TexBBack remain set, and the corresponding data is not yet written to Polygon Memory. Packets 18 through 23 are Color and Sort Packets, and these complete a triangle strip that has two triangles. For these Sort Packets (packets 19, 21, and 23), the Dirty Flags are examined, but none of the relevant Dirty Flags are set, which means they do not cause writing of any state information S3 into Polygon Memory.

Packets 24 and 25 are MatFront and TexAFront packets. Their data is stored in MEX, and their corresponding Dirty Flags are set. Packet 26 is the Color packet for vertex $V_4$. When MEX receives packet 27, the MatFront and TexAFront Dirty Flags are set, causing data to be written into Polygon Memory at addresses 0xFFFFED0 through 0xFFFFEFF. Packets 28 through 31 describe $V_5$ and $V_6$, thereby completing the triangle $V_4$-$V_5$-$V_6$.

Packet 31 is a color packet that completes the vertex information V2 for the triangle $V_4$-$V_5$-$V_6$, but that triangle is clipped by a clipping plane (e.g. the edge of the display screen). GEO generates the vertices $V_A$ and $V_B$, and these are sent in Sort packets 34 and 35. As far as SRT is concerned, triangle $V_5$-$V_6$-$V_7$ does not exist; that triangle is replaced with a triangle fan composed of $V_5$-$V_A$-$V_B$ and $V_5$-$V_B$-$V_6$. Similarly, packets 37 through 41 complete $V_6$-$V_7$-$V_8$ for Polygon Memory and describe a triangle fan of $V_6$-$V_B$-$V_C$ and $V_6$-$V_C$-$V_8$ for Sort Memory. Note that, for example, the Sort Memory entry for $V_B$ (starting at address 0x00000B0 has a Sort Primitive Type of tri_fan, but the ColorOffset parameter in the Color Pointer is set to tri_strip.

Packets 42 through 46 set values within the MEX State Vector, and packets 47 through 54 describe a triangle fan. However, the triangles in this fan are backfacing (backface culling is assumed to be disabled), so the receipt of packet 48 triggers the writing into Polygon Memory of the MatBack, TexABack, and TexBBack partitions of the MEX State Vector because their Dirty Flags were set (values for these partitions were input earlier in the frame, but no geometry needed them). The Light partition also has its Dirty Flag set, so it is also written to Polygon Memory, and CullMode is written to Sort Memory.

The End Frame packet (packet 55) designates the completion of the frame. Hence, SRT can mark this page of Sort Memory as complete, thereby handing it off to the read process in the SRT block. Note that the information in packets 43 and 44 was not written to Polygon Memory because no geometry needed this information (these packets pertain to front-facing geometry, and only back-facing geometry was input before the End Frame packet).

Memory Multi-Buffering and Overflow

In some rare cases, Polygon Memory can overflow. Polygon memory and/or Sort Memory will overflow if a single user frame contains too much information. The overflow point depends on the size of Polygon Memory; the frequency of state information S3 changes in the frame; the way the state is encapsulated and represented; and the primitive features used (which determines the amount of vertex information V2 is needed per vertex). When memory fills up, all primitives are flushed down the pipe and the user frame finished with another fill of the Polygon Memory buffer (hereinafter called a "frame break"). Note that in an embodiment where SRT and MEX have dedicated memory, Sort Memory overflow triggers the same overflow mechanism. Polygon Memory and Sort Memory buffers must be kept consistent. Any skid in one memory due to overflow in the other must be backed out (or, better yet, avoided). Thus in MEX, a frame break due to overflow may result due to a signal from SRT that a Sort memory overflow occurred or due to memory overflow in MEX itself. A Sort Memory overflow signal in MEX is handled in the same way as an overflow in MEX Polygon Memory itself.

Note that the Polygon Memory overflow can be quite expensive. In one embodiment, the Polygon Memory, like Sort Memory, is double buffered. Thus MEX will be writing to one buffer, while MIJ is reading from the other. This situation causes a delay in processing of frames, since MEX needs to wait for MIJ to be done with the frame before it can move on to the next (third) frame. Note that MEX and SRT are reasonably well synchronized. However, CUL needs (in general) to have processed a tile's worth of data before MIJ can start reading the frame that MEX is done with. Thus, for each frame, there is a possible delay or stall. The situation can become much worse if there is memory overflow. In a typical overflow situation, the first frame is likely to have a lot of data and the second frame very little data. The elapsed time before MEX can start processing the next frame in the sequence is (time taken by MEX for the full frame+CUL tile latency+MIJ frame processing for the full frame) and not (time taken by MEX for the full frame+time taken by MEX for the overflow frame). Note that the elapsed time is nearly twice the time for a normal frame. In one embodiment, this cost is reduced by minimizing or avoiding overflow by having software get an estimate of the scene size, and break the frame in two or more roughly equally complex frames. In another embodiment, the hardware implements a policy where overflows occur when one or more memories are exhausted.

In an alternative embodiment, Polygon Memory and Sort Memory are each multi-buffered, meaning that there are more than two frames available. In this embodiment, MEX has available additional buffering and thus need not wait for MIJ to be done with its frame before MEX can move on to its next (third) frame.

In various alternative embodiments, with Polygon Memory and Sort Memory multi-buffered, the size of Polygon Memory and Sort Memory is allocated dynamically from a number of relatively small memory pages. This has advantages that, given memory size, containing a number of memory pages, it is easy to allocate memory to plurality of windows being processed in a multi-tasking mode (i.e., multiple processes running on a single host processor or on a set of processors), with the appropriate amount of memory being allocated to each of the tasks. For very simple scenes, for example, significantly less memory may be needed than for complex scenes being rendered in greater detail by another process in a multi-tasking mode.

MEX needs to store the triangle (and its state) that caused the overflow in the next pages of Sort Memory and Polygon Memory. Depending on where we are in the vertex list we may need to send vertices to the next buffer that have already been written to the current buffer. This can be done by reading back the vertices or by retaining a few vertices. Note that quadrilaterals require three previous vertices, lines will need only one previous vertex while points are not paired with other vertices at all. MIJ sends a signal to MEX when MIJ is done with a page of Polygon Memory. Since STP and CUL can start processing the primitives on a tile only after MEX and SRT are done, MIJ may stall waiting for the VSPs to start arriving.

MLM Pointer and Mode Packet Caching

Like the color packets, MIJ also keeps a cache of MLM pointers. Since the address of the MLM pointer in Polygon Memory uniquely identifies the MLM pointer, it is also used as the tag for the cache entries in the MLM pointer cache. The Color Pointer is decoded to obtain the address of the MLM pointer.

MIJ checks to see if the MLM pointer is in the cache. If a cache miss is detected, then the MLM pointer is retrieved from the Polygon Memory. If a hit is detected, then it is read from the cache. The MLM pointer is in turn decoded to obtain the addresses of the six state packets, namely, in this embodiment, light, material, textureA, textureB, pixel mode, and stipple. For each of these, MIJ determines the packets that need to be retrieved from the Polygon Memory. For each state address that has its valid bit set, MIJ examines the corresponding cache tags for the presence of the tag equal to the current address of that state packet. If a hit is detected, then the corresponding cache index is used, if not then the data is retrieved from the Polygon Memory and the cache tags updated. The data is dispatched to FRG or PXL block as appropriate, along with the cache index to be replaced.

Guardband Clipping

The example of MEX operation, described above, assumed the inclusion of the optional feature of clipping primitives for storing into Sort Memory and not clipping those same primitives's attributes for storage into Polygon Memory. FIG. B 17 shows an alternate method that includes a Clipping Guardband surrounding the display screen. In this embodiment, one of the following clipping rules is applied: a) do not clip any primitive that is completely within the bounds of the Clipping Guardband; b) discard any primitive that is completely outside the display screen; and c) clip all other primitives. The clipping in the last rule can be done using either the display screen (the preferred choice) or the Clipping Guardband; FIG. B 17 assumes the former. In this embodiment it may also be done in other units, such as the HostCPU. The decision on which rule to apply, as well as the clipping, is done in GEO.

Some Parameter Details

Given the texture id, its (s, t, r, q) coordinates, and the mipmap level, the TEX block is responsible for retrieving the texels, unpacking and filtering the texel data as needed. FRG block sends texture id, s, t, r, L.O.D., level, as well as the texture mode information to TEX. Note that s, t, and r (and possibly the mip level) coming from FRG are floating point values. For each texture, TEX outputs one texel value (e.g., RGB, RGBA, normal perturbation, intensity, etc.) to PHG. TEX does not combine the fragment and texture colors; that happens in the PHB block. TEX needs the texture parameters and the texture coordinates. Texture parameters are obtained from the two texture parameter caches in the TEX block. FRG uses the texture width and height parameters in the L.O.D. computation. FRG may use the TextureDimension field (a parameter in the MEX State Vector) to determine the texture dimension and if it is enabled and TexCoordSet (a parameter in the MEX State Vector) to associate a coordinate set with it.

Similarly, for CullModes, MEX may strip away one of the LineWidth and PointWidth attributes, depending on the primitive type. If the vertex defines a point, then LineWidth is thrown away and if the vertex defines a line, then PointWidth is thrown away. Mex passes down only one of the line or point width to the SRT.

Processor Allocation in PHB Block

As tiles are processed, there are generally a multiplicity of different 3D object visible within any given tile. The PHB block data cache will therefore typically store state information and microcode corresponding to more than one object. But, the PHB is composed of a multiplicity of processing units, so state information from the data cache may be temporarily copied into the processing units as needed. Once state information for a fragment from a particular object is sent to a particular processor, it is desirable that all other fragments from that object also be directed to that processor. PHB keeps track of which object's state information has been cached in which processing unit within the block, and attempts to funnel all fragments belonging that same object to the same processor. Optionally, an exception to this occurs if there is a load imbalance between the processors or engines in the PHB unit, in which case the fragments are allocated to another processor. This object-tag-based resource allocation occurs relative to the fragment processors or fragment engines in the PHG.

Data Cache Management in Downstream Blocks

The MIJ block is responsible for making sure that the FRG, TEX, PHB, and PIX blocks have all the information they need for processing the pixel fragments in a VSP, before the VSP arrives at that stage. In other words, the vertex information V2 of the primitive (i.e., of all its vertices), as well as the six MEX State Vector partitions pointed to by the pointers in the MLM Pointer, need to be resident in their respective blocks, before the VSP fragments can be processed. If MIJ was to retrieve the MLM Pointer, the state packets, and ColorVertices for each of the VSPs, it will amount to nearly 1 KB of data per VSP. For 125M VSPs per second, this would require 125 GB/sec of Polygon Memory bandwidth for reading the data, and as much for sending the data down the pipeline. It is not desirable to retrieve all the data for each VSP, some form of caching is desirable.

It is reasonable to think that there will be some coherence in VSPs and the primitives; i.e. we are likely to get a sequence of VSPs corresponding to the same primitive. We could use this coherence to reduce the amount of data read from Polygon Memory and transferred to Fragment and Pixel blocks. If the current VSP originates from the same primitive as the preceding VSP, we do not need to do any data retrieval. As pointed out earlier, the VSPs do not arrive at MIJ in primitive order. Instead, they are in the VSP scan order on the tile, i.e. the VSPs for different primitives crossing the scan-line may be interleaved. Because of this reason, the caching scheme based on the current and previous VSP alone will cut down the bandwidth by approximately 80% only.

In accordance with this invention, a method and structure is taught that takes advantage of primitive coherence on the entire region, such as a tile or quad-tile. (A 50 pixel triangle on average will touch 3 tiles, if the tile size is 16×16. For a 32×32 tile, the same triangle will touch 1.7 tiles. Therefore, considering primitive coherence on the region will significantly reduce the bandwidth requirement.) This is accomplished by keeping caches for MLM Pointers, each of state partitions, and the color primitives in MIJ. The size of each of the caches is chosen by their frequency of incidence on the tile. Note that while this scheme can solve the problem for retrieving the data from the Polygon Memory, we still need to deal with data transfer from MIJ to FRG and PXL blocks every time the data changes. We resolve this in the following way.

Decoupling of Cached Data and Tags

The data retrieved by MIJ is consumed by other blocks. Therefore, we store the cache data within those blocks. As depicted in FIG. B 18, each of the FRG, TEX, PHB, and PIX blocks have a set of caches, each having a size determined independently from the others based upon the expected number of different entries to avoid capacity misses within one tile (or, if the caches can be made larger, to avoid capacity misses within a set tiles, for example a set of four tiles). These caches hold the actual data that goes in their cache-line entries. Since MIJ is responsible for retrieving the relevant data for each of the units from Polygon Memory and sending it down to the units, it needs to know the current state of each of the caches in the four aforementioned units. This is accomplished by keeping the tags for each of the caches in MIJ and having MIJ to do all the cache management. Thus data resides in the block that needs it and the tags reside in MIJ for each of the caches. With MIJ aware of the state of each of the processing units, when MIJ receives a packet to be sent to one of those units, MIJ determines whether the processing unit has the necessary state to process the new packet. If not, MIJ first sends to that processing unit packets containing the necessary state information, followed by the packet to be processed. In this way, there is never a cache miss within any processing unit at the time it receives a data packet to be to be processed. A flow chart of this mode injection operation is shown in FIG. B 19.

MIJ manages multiple data caches—one for FRG (ColorCache) and two each for the TEX (TexA, TexB), PHG (Light, Material, Shading), and PIX (PixMode and Stipple) blocks. For each of these caches the tags are cached in MIJ and the data is cached in the corresponding block. MIJ also maintains the index of the data entry along with the tag. In addition to these seven caches, MIJ also maintains two caches internally for efficiency, one is the Color dualoct cache and the other is the MLM Pointer cache; for these, both the tag and data reside in MIJ. In this embodiment, each of these nine tag caches are fully associative and use CAMs for cache tag lookup, allowing a lookup in a single clock cycle.

In one embodiment, these caches are listed in the table below.

| Cache | Block | # entries |
|---|---|---|
| Color dualoct | MIJ | 32 |
| Mlm_ptr | MIJ | 32 |
| ColorData | FRG | 128 |
| TextureA | TEX | 32 |
| TextureB | TEX | 16 |
| Material | PHG | 32 |
| Light | PHG | 8 |
| PixelMode | PIX | 16 |
| Stipple | PIX | 4 |

In one embodiment, cache replacement policy is based on the First In First Out (FIFO) logic for all caches in MIJ.

Color Caching in FRG

"Color" caching is used to cache color packet. Depending on the extent of the processing features enabled, a color packet may be 2, 4, 5, or 9 dualocts long in the Polygon Memory. Furthermore, a primitive may require one, two or three color vertices depending on if it is a point, a line, or a filled triangle, respectively. Unlike other caches, color caching needs to deal with the problem of variable data sizes in addition to the usual problems of cache lookup and replacement. The color cache holds data for the primitive and not individual vertices.

In one embodiment, the color cache in FRG block can hold 128 full performance color primitives. The TagRam in MIJ has a 1-to-1 correspondence with the Color data cache in the FRG block. A ColorAddress uniquely identifies a Color primitive. In one embodiment the 24 bit Color Address is used as the tag for the color cache.

The color caching is implemented as a two step process. On encountering a VSP, MIJ first checks to see if the color primitive is in the color cache. If a cache hit is detected, then the color cache index (CCIX) is the index of the corresponding cache entry. If a color cache miss is detected, then MIJ uses the color address and color type to determine the dualocts to be retrieved for the color primitives. We expect a substantial number of "color" primitives to be a part of the strip or fans. There is an opportunity to exploit the coherence in colorVertex retrieval patterns here. This is done via "Color Dualoct" caching. MIJ keeps a cache of 32 most recently retrieved dualocts from the color vertex data. For each dualoct, MIJ keeps a cache of 32 most recently retrieved dualocts from the color vertex data. For each dualoct, MIJ checks the color dualoct cache in the MIJ block to see if the data already exists. RDRAM fetch requests are generated for the missing dualocts. Each retrieved dualoct updates the dualoct cache.

Once all the data (dualocts) corresponding to the color primitive have been obtained, MIJ generates the color cache index (CCIX) using the FIFO or other load balancing algorithm. The color primitive data is packaged and sent to the Fragment block and the CCIX is incorporated in the VSP going out to the Fragment block.

MIJ sends three kinds of color cache fill packets to the FRG block. The Color Cache Fill 0 packets correspond to the primitives rendered at full performance and require one cache line in the color cache. The Color Cache Fill 1 packets correspond to the primitives rendered in half performance mode and fill two cache lines in the color cache. The third type of the color cache fill packets correspond to various other performance modes and occupy 4 cache lines in the fragment block color cache. Assigning four entries to all other performance modes makes cache maintenance a lot simpler than if we were to use three color cache entries for the one third rate primitives.

While the present invention has been described with reference to a few specific embodiments, the description is illustrative of the invention and is not to be construed as liming the invention. Various modifications may occur to those skilled in the art without departing from the true spirit and scope of the invention as defined by the appended claims.

V. Detailed Description of the Sort Functional Block (SRT)

The invention will now be described in detail by way of illustrations and examples for purposes of clarity and understanding. It will be readily apparent to those of ordinary skill in the art in light of the teachings of this invention that certain changes and modifications may be made thereto without departing from the spirit or scope of the appended claims. We first provide a top-level system architectural description. Section headings are provided for convenience and are not to be construed as limiting the disclosure, as all various aspects of the invention are described in the several sections that were specifically labeled as such in a heading.

Overview

The present invention sorts objects/primitives in the middle of a graphics pipeline, after they have been transformed into a common coordinate system, that is, from object coordinates to eye coordinates and then to screen coordinates. This is beneficial because it eliminates the need for a software application executing on a host computer to sort primitives at the beginning of a graphics pipeline before they have been transformed. In this manner, the present invention does not increase the bandwidth requirements of graphics pipeline.

Additionally, the present invention spatially sorts image data before the end of the pipeline and sends only those image data that represent the visible portions of a window to subsequent processing stages of the graphics pipeline, while discarding those image data, or fictional image data that do not contribute to the visible portions of the window.

The present invention provides a computer structure and method for efficiently managing finite memory resources in a graphics pipeline, such that a previous stage of a graphics pipeline is given an indication that certain image data will not fit into a memory without overflowing the memory's storage capacity.

The present invention provides a structure and method for overcoming effects of scene complexity and horizon complexity in subsequent stages of a 3-D graphics pipeline, by sending image data to subsequent stages of the graphics pipeline in a manner that statistically balances the image data across the subsequent rendering resources.

Referring to FIG. C 1, there is shown one embodiment of a system 100 for spatially sorting image data in a graphics pipeline, illustrating how various software and hardware elements cooperate with each other. For purposes of the present invention, spatial sorting refers to sorting image data with respect to multiple regions of a 2-D window. System 100, utilizes a programmed general-purpose computer 101, and 3-D graphics processor 117. Computer 101 is generally conventional in design, comprising: (a) one or more data processing units ("CPUs") 102; (b) memory 106*a*, 106*b* and 106*c*, such as fast primary memory 106*a*, cache memory 106*b*, and slower secondary memory 106*c*, for mass storage, or any combination of these three types of memory; (c) optional user interface 105, including display monitor 105*a*, keyboard 105*b*, and pointing device 105*c*; (d) graphics port 114, for example, an advanced graphics port ("AGP"), providing an interface to specialized graphics hardware; (e) 3-D graphics processor 117 coupled to graphics port 114 across I/O bus 112, for providing high-performance 3-D graphics processing; and (e) one or more communication busses 104, for interconnecting CPU 102, memory 106, specialized graphics hardware 114, 3-D graphics processor 117, and optional user interface 105.

I/O bus 112 can be any type of peripheral bus including but not limited to an advanced graphics port bus, a Peripheral Component Interconnect (PCI) bus, Industry Standard Architecture (ISA) bus, Extended Industry Standard Architecture (EISA) bus, Microchannel Architecture, SCSI Bus, and the like. In a preferred embodiment, I/O bus 112 is an advanced graphics port pro.

The present invention also contemplates that one embodiment of computer 101 may have a command buffer (not shown) on the other side of graphics port 114, for queuing graphics hardware I/O directed to graphics processor 117.

Memory 106*a* typically includes operating system 108 and one or more application programs 110, or processes, each of which typically occupies a separate address space in memory 106 at runtime. Operating system 108 typically provides basic system services, including, for example, support for an Application Program Interface ("API") for accessing 3-D graphics. API's such as Graphics Device Interface, DirectDraw/Direct3-D and OpenGLR. DirectDraw/Direct 3-D, and OpenGLR are all well-known APIs, and for that reason are not discussed in greater detail herein. The application programs 110 may, for example, include user level programs for viewing and manipulating images.

It will be understood that a laptop dedicated game console, or other type of portable computer, can also be used in connection with the present invention, for sorting image data in a graphics pipeline. In addition, a workstation on a local area network connected to a server can be used instead of computer 101 for sorting image data in a graphics pipeline. Accordingly, it should be apparent that the details of computer 101 are not particularly relevant to the present invention. Personal computer 101 simply serves as a convenient interface for receiving and transmitting messages to 3-D graphics processor 117.

Referring to FIG. C 2, there is shown an exemplary embodiment of 3-D graphics processor 117, which may be provided as a separate PC Board within computer 101, as a processor integrated onto the motherboard of computer 101, or as a stand-alone processor, coupled to graphics port 114 across I/O bus 112, or other communication link.

Spatial sorting stage 215, hereinafter, often referred to as "sort 215," is implemented as one processing stage of multiple processing stages in graphics processor 117. Sort 215 is connected to other processing stages 210 across internal bus 211 and signal line 212. Sort 215 is connected to other processing stages 220 across internal bus 216 and signal line 217.

The image data and signals sent respectively across internal bus 211 and signal line 212 between sort 215 and a previous stage of graphics pipeline 200 are described in great detail below in reference to the interface between spatial sorting 215 and mode extraction 415. The image data and signals sent respectively across internal bus 216 and signal line 217 between sort 215 and a subsequent stage of graphics pipeline 200 are described in great detail below in reference to interface between spatial sorting 215 and setup 505.

Internal bus 211 and internal bus 216 can be any type of peripheral bus including but not limited to a Peripheral Component Interconnect (PCI) bus, Industry Standard Architecture (ISA) bus, Extended Industry Standard Architecture (EISA) bus, Microchannel Architecture, SCSI Bus, and the like.

Other Processing Stages 210

In one embodiment of the present invention, other processing stages 210 (see FIG. C 2) can include, for example, any other graphics processing stages as long as a stage previous to sort 215 provides sort 215 with spatial data.

Referring to FIG. C 4, there is shown an example of a preferred embodiment of other processing stages 210, including, command fetch and decode 405, geometry 410, and mode extraction 415. We will now briefly discuss each of these other processing stages 210.

Cmd Fetch/Decode 405, or "CFD 405" handles communications with host computer 101 through graphics port 114. CFD 405 sends 2-D screen based data, such as bitmap blit window operations, directly to backend 440 (see FIG. C 4, backend 440), because 2-D data of this type does not typically need to be processed further with respect to the other processing stage in other processing stages 210 or other processing stages 240. All 3-D operation data (e.g., necessary transform matrices, material and light parameters and other mode settings) are sent by CFD 405 to the geometry 410.

Geometry 410 performs calculations that pertain to displaying frame geometric primitives, hereinafter, often referred to as "primitives," such as points, line segments, and triangles, in a 3-D model. These calculations include transformations, vertex lighting, clipping, and primitive assembly. Geometry 410 sends "properly oriented" geometry primitives to mode extraction 415.

Mode extraction 415 ("MEX") separates the input data stream from geometry 410 into two parts: (1) spatial data, such as frame geometry coordinates, and any other information needed for hidden surface removal; and, (2) non-spatial data, such as color, texture, and lighting information. Spatial data are sent to sort 215. The non-spatial data are stored into polygon memory (not shown). (Mode injection 515 (see FIG. C 5) later retrieves the non-spatial data and re-associates it with graphics pipeline 200).

The details of processing stages 210 is not necessary to practice the present invention, and for that reason other processing stages 210 are not discussed in further detail here.

Spatial Sorting 215

Sort 215's I/O subsystem architecture is designed around the need to spatially sort image data according to which of multiple, equally sized regions that define the limits of a 2-D window are touched by polygons identified by the image data. Sort 215 is additionally designed around a need to efficiently send the spatially sorted image data in a tile-by-tile manner across I/O bus 216 to a next stage in graphics pipeline 200, or pipeline 200.

Top Level Architecture

Referring to FIG. C 3, there is shown an example of a preferred embodiment of sort 215, for illustrating an exemplary structure as well as data storage and data flow relationships. To accomplish the above discussed goals, sort 215 utilizes two basic control units, write control 305 and read control 310, that are designed to operate in parallel. The basic idea is that write control 305 spatially sorts image data received from a previous page of the graphics pipeline into sort memory 315, and subsequently notifies read control 310 to send the sorted spatial data from sort memory 315 to a next stage in the graphics pipeline. For a greater detailed description of write control 305 and read control 310, refer respectively to FIGS. C 8 C 9 and C 18.

The present invention overcomes the shortcomings of the state of the art by providing structure and method to send only those image data that represent the visible portions of a window down stages of a graphics pipeline, while discarding those image data, or fictional image data that do not contribute to the visible portions of the window. This embodiment is described in greater detail below in reference to read control 310 and scissor windows.

In yet another preferred embodiment of the present invention, write control 305 performs a guaranteed conservative memory estimate to determine whether there is enough sort memory 315 left to sort image data from a previous process in graphics pipeline 200 into sort memory 315, or whether a potential sort memory 315 buffer overflow condition exists. The guaranteed conservative memory estimate is discussed in greater detail below in reference to FIGS. C 11 and C12.

In yet another preferred embodiment of the present invention, read control 310 sends the spatially sorted image data to a next to process (see FIG. C 5) in graphics pipeline 200 in a balanced manner, such that the rendering resources of subsequent status of graphics pipeline 200 are efficiently utilized, meaning that one stage of pipeline 200 is not overloaded with data while another stage of pipeline 200 is starved for data. Instead, this preferred embodiment, the odds are increased that data flow across multiple subsequent stages will be balanced. This process is discussed in greater detail below in reference to the tile hop sequence, an example of which is illustrated in FIG. C 18.

Interface Between Spatial Sorting 215 and Mode Extraction 415

We will now describe various packets sent to sort 215 from a previous stage of pipeline 200, for example, mode extraction 415. For each packet type, a table of all the parameters in the packet is shown. For each parameter, the number of bits is shown.

Referring to table 1, there is shown an example of spatial packet 1000. The majority of the input to sort 215 from a previous stage of pipeline 200 are spatial packets that include, for example, a sequence of vertices that are grouped into sort primitives. Vertices describe points in 3-D space, and contain additional information for assembling primitives. Each spatial packet 1000 causes one sort memory vertex packet to be written into data storage by write control 305 to an input buffer in sort memory 315 buffer, for example, buffer 0.

Spatial packet 1000 includes, for example, the following elements: transparent 1020, line flags 1030, window X 1040, window Y 1050, window Z 1060, primitive type 1070, vertex reuse 1080, and LinePointWidth 1010. Each of these elements are discussed in greater detail below as they are utilized in by either write control 305 or read control 310.

LinePointWidth element 1010 identifies the width of the geometry primitive if the primitive is a line or a point.

Primitive type 1070 is used to determine if the vertex completes a triangle, a line, a point, or does not complete the primitive. Table 7 lists the allowed values 7005 for each respective primitive type 1070, each value's 7005 corresponding implied primitive type 7010, and the number of vertices 7015 associated with each respective implied primitive type. Values 7005 of three ("3") are used to indicate a vertex that does not complete a primitive. An example of this is the first two vertices in a triangle; only the third vertex completes the triangle primitive. Values 7005 other than three indicate that the vertex is a completing vertex. Primitive type 1070 "0" is used for points. Primitive type 1070 "1" is used for lines. And, Primitive type 1070 "2" is used for triangles, even if they are to be rendered as lines, or line mode triangles.

Referring to Table 2, there is shown an example of a began frame packet 2000. The beginning of a user frame of image data is designated by reception of such a begin frame packet 2000 by sort 215. A user frame is all of the data necessary to draw one complete image, whereas an animation consist of many sequential images. Begin frame packets 2000 are passed down pipeline 200 to sort 215 by a previous processing stage of pipeline 200, for example, mode extraction 415 (see FIG. C 4).

PixelsVert 2001 and PixelsHoriz 2002 are used by write control 305 to determine the size of the 2-D window, or user frame. In a preferred embodiment of the present invention, SuperTileSize 2003, and SuperTileStep 2004 elements are used by read control 310 to output the spatially sorted image data in an inventive manner, called a "SuperTile Hop Sequence" to a subsequent stage of graphics pipeline 200, for example setup 405. The SuperTile Hop Sequence is discussed in greater detail below in reference to FIG. C 18, and read control 310.

Sort transparent mode element 2005 is used by read control 310, as discussed in greater detail below in reference to read control 310 and output modes used to determine an order that spatially sorted image data are output to a subsequent stage of pipeline 200, for example, setup 505

Sort 215 does not store begin frame packet 2000 into sort memory 315, but rather sort 215 saves the frame data into frame state buffer 350 (see FIG. C 3). Such frame data includes, for example, screen size (X, Y) Tile hop value (M) buffers enabled (front, back, left, and right), and transparency mode.

Referring to Table 3, there is shown an example of end frame packet 3000, for designating either: (a) an end of a user frame of image data; (b) a forced end of user frame instantiated by an application program executing in, for example, memory 106*a* of computer 101; or, (c) for designating an end of a frame of image data caused by a need to split a frame of image data into multiple frames because of a memory overflow.

When a forced end of user frame is sent by an application program, end frame packet 3000 will have the SoftEndFrame 3010 element set to "1." A forced end of user frame indication is simply a request instantiated by an application executing on, for example, computer 101 (see FIG. C 1), for the current image frame to end.

BufferOverflow Occurred 3015 is used by write control 305 to indicate that this end of frame packet 3000 is being received as a result of a memory buffer overflow event. For more information regarding sort memory 315 overflow, refer to write control 305, FIG. C 8, step 845.

Referring to table 4, there is shown an example of a clear packet 4000 and a cull mode packet 4500. Hereinafter, a clear packet 4000 and/or a cull mode packet 4500 are often referred to in combination or separately as "mode packets." Mode packets typically contain information that effects multiple vertices. Receipt of mode packets, 4000 or 4500, by sort 215 results in each respective mode packet being written into sort memory 315.

A graphics application, during the course or rendering a frame, can clear one or more buffers, including, for example, a color buffer, a depth buffer, and/or a stencil buffer. Color buffers, depth buffers, and stencil buffers are known, and for this reason are not discussed in greater detail herein. An application typically only performs a buffer clear at the very beginning of a frame rendering process. That is, before any primitives are rendered. Such buffer clears are indicated by receipt by sort 215 of clear packets 4000 (see Table 4). Clear packets 4000 are not used by sort 215, but are accumulated into sort memory 315 in-time order, as they are received, and output during read control 310.

Sort 215 also receives cull packet 4500 from a previous stage in pipeline 2000, such as, for example, mode extraction 415 (see FIG. C 4). A scissor window is a rectangular portion of the 2-D window. SortScissorEnable 4504, if set to "1" indicates that a scissor window is enabled with respect to the 2-D window. The scissor window coordinates are givent by the following elements in cull packet 4500: SortScissorXmin 4505, SortScissorXmax 4506, SortScissorYmin 4507 and SortScissorYmax 4508. In one embodiment of the present invention, scissor windows are used both by write control 305 (see FIG. C 8, step 855) and read control 310 (see FIG. C 17, step 1715).

Interface Signals

Referring to table 15, there are shown interface signals sent between sort 215 and mode extraction 415. The interface from sort 215 to mode extraction 415 is a simple handshake mechanism across internal data bus 211. Mode extraction 415 waits until sort 215 sends a ready to send signal, srtOD_ok2Send 1520, indicating that sort 215 is ready to receive another input packet. After receiving the sort okay to send signal from sort 215, mode extraction 415 places a new packet onto internal input bus 211 and indicates via a data ready signal, mexOB_dataReady 1505, that the data on is a valid packet.

In response to receiving the data ready signal, if the last packet sent by mode extraction 415 will not fit into sort memory 315, sort 215 sends mode extraction 415 a sort buffer overflow signal, srtOD_srtOverflow 1525, over signal line 212 (see FIG. C 2) to indicate that the last input packet to sort 215 from mode extraction 415 could cause sort memory overflow. Receipt of a sort buffer overflow signal indicates to mode extraction 415 that it needs to swap sort memory 315 buffers. Swapping simply means only that "writes" are to be directed only at the memory previously designated for "reads," and vice versa. The process of swapping sort memory 315 buffers is discussed in greater detail below with reference to write control 305, as illustrated in FIG. C 8, step 845.

If the last data packet sent by mode extraction 415 will fit into sort memory 315, sort 215 sends two signals to mode extraction 415. The first signal, a will fit into memory signal, or srtOD_lastVertexoK 1515, indicates that the last packet sent by mode extraction 415 will fit into sort memory 315. The second signal, the sort okay to send signal, indicates that sort 215 is ready to receive another packet from mode extraction 415.

It can be appreciated that the specific values selected to represent each of the above signals are not necessary to practice the present invention. It is only important that each signal has such a unique value with respect to another signal that each signal can be differentiated from each other signal by sort 215 and mode extraction 415.

Sort Memory Structure and Organization

Sort Memory 315 is comprised of a field upgradable block of memory, such as PC RAM. In one embodiment of the present invention, sort memory is single buffered, and write control 305 spatially sorts image data into the single buffer until either sort memory 315 overflows, sort 215 receives an indication from an application executing on, for example, computer 101 (see FIG. C 1) to stop writing data into memory, or write control 305 receives an end of frame packet 3000 from a previous processing stage in pipeline 200 (see Table 3). Memory overflow occurs when either sort memory 315 or another memory (not shown), such as, for example, polygon memory (not shown) fills up.

In such a situation, write control 305 will signal read control 310 across signal line 311 indicating that read control 310 can begin to read the spatially sorted image data from sort memory 315, and send the spatially sorted image data across I/O bus 216 to a next stage in graphics pipeline 200.

In a preferred embodiment of the present invention, sort memory 315 is double buffered, including a first buffer, buffer 0, and a second buffer, buffer 1, to provide simultaneous write access to write control 305, and read access to read control 310. In this preferred embodiment, write control 305 and read control 310 communicate across signal line 311, and utilize information stored in various queues in sort memory 315, frame state 350 and tail memory 360, to allow their respective execution units to operate asynchronously, in parallel, and independently.

Either of the two buffers, 0 or 1, may at times operate as the input or output buffer. Each buffer 0 and 1 occupies a separate address space in sort memory 315. The particular buffer (one of either of the two buffers) that, at any one time, is being written into by write control 305, is considered to be the input buffer. The particular buffer (the other one of two buffers) where data is being read out of it by read control 310, is considered to be the output buffer.

To illustrate this preferred embodiment, consider the following example, where write control 305 spatially sorts image data into one of the two buffers in sort memory 315, for example, buffer 0. When buffer 0 fills, or in response to write control 305 receiving of end frame packet 3000 (see Table 3) from a previous stage of graphics pipeline 200, write control 305 will swap sort memory 315 buffer 0 with sort memory 315 buffer 1, such that read control 310 can begin reading spatially sorted image data out of sort memory 315 buffer 0 to a next stage of graphics pipeline 200, while, in parallel, write control 305 continues to spatially sort unsorted image data received from a previous processing stage in graphics pipeline 200, into empty sort memory 315 buffer 1.

Sort 215 receives image data corresponding to triangles after they have been transformed, culled and clipped from a previous date in pipeline 200. For greater detailed description of the transformed, culled and clipped image data that sort 215 receives, refer above to “other processing stages 210.”

To spatially sort image data, sort 215 organizes the image data into a predetermined memory architecture. Image data, includes, for example, polygon coordinates (vertices), mode information (see Table 4, clear packet 4000 and cull packet 4500), etc. . . . In a preferred embodiment of the present invention, the memory architecture includes, for example, the following data structures mirrored across each memory buffer, for example, buffer 0 and buffer 1: (a) a data storage, for example, data storage 320; (b) a set of tile pointer lists, for example, title pointers lists 330; and, (c) a mode pointer list, for example, mode pointer list 340.

For each frame of image data that sort 215 receives from a previous stage of pipeline 200, sort 215 stores three types of packets in the order that the packets are received (hereinafter, this order is referred to as “in-time order”) into data storage 320, including: (1) sort memory vertex packets 8000 (see Table 8), which contain only per-vertex information; (2) sort memory clear packets 4000 (see Table 4), which causes buffer clears; and (3) sort memory cull packets 4500 (see Table 4), which contain scissor window draw buffer selections).

These three packet types fall into two categories: (1) vertex packets, including vertex packet type 8000 packets, for describing points in 3-D space; and, (2) mode packets, including sort memory clear buffer 4000 packets and sort memory cull packets 4500. We will now discuss how these three packet types and other related information are stored by sort 215 into sort memory 315.

Referring to Table 5, there are shown examples of sort 215 pointers, including vertex pointer 5005, clear mode packet pointer 5015, cull mode packet pointer 5020, and link address packet 5025.

Vertex pointers 5005 point to vertex packets 8000, and are stored by sort 215 into respective tile pointer lists (see, for example, FIG. C 3, tile pointer list 330), in-time order, as vertex packets 8000 are received and stored into data storage (see, for example, FIG. C 3, data storage 320). Packet address pointer 5006 points to the address in data storage of the last vertex packet 8000 of a primitive that covers part of a corresponding tile.

As discussed above, the last vertex completes the primitive (hereinafter, such a vertex is referred to as a “completing vertex”). Packet address pointer 5006 in combination with offset 5007 are used by write control 305 and read control 310 in certain situations to determine any other coordinates (vertices) for the primitive (such situations are described in greater detail below in reference to write control 305 and read control 310). We will now describe a procedure to determine the coordinates of a primitive from its corresponding vertex pointer 5005.

Offset 5007 is used to identify each of the particular primitives other vertices, if any. If offset 5007 is “0,” the primitive is a point. If offset 5007 is “1”, the primitive is a line, and the other vertex of the line is always the vertex at the immediately preceding address of packet address pointer 5006. If offset 5007 is 2 or more, then the primitive is a triangle, the corresponding vertex packet 8000 (pointed to by packet address pointer 5006) contains the coordinates for the triangle’s completing vertex, the second vertex is always the immediately prior address to packet address pointer 5006, and the first vertex is determined by subtracting the offset from the address of packet address pointer 5006.

Transparent flag 5008 corresponds to the value of transparent element 1020 contained in spatial packet 1000.

Clear mode packet pointer 5015 points to clear mode packet's stored by a sort 215 in time order, as they are received, into data storage 320. Clear mode packet pointers 5015 are stored by sort 215 in-time order, as they are received, into mode pointer list 340.

For each mode packet received by sort 215, a mode pointer (see Table 5000, depending on the type of mode packet, either a clear mode packet pointer 5015 or a cull mode packet pointer 5020) is added to a mode pointer list (see FIG. C 3). These pointers, either 5015 or 5020, also contain an address, either 5016 or 5021, where the mode packet is stored, plus bits, either 5017 or 5022, to tell read control 310 the particular mode packets type (clear 4000 or cull 4500), and an indication, either 5018 or 5023, of whether the mode packet could cause a sub-frame break in sorted transparency mode (described greater detail below with respect to read control 310).

Write control 305 stores pointers to the polygon information stored in data storage 320 into a set of tile pointer lists 330 according to the tiles, that are intersected by a respective polygon, for example, a triangle, line segment, or point. (A triangle is formed by the vertex that is the target of the pointer along with the two previous vertices in data storage 320.) This is accomplished by building a linked list of pointers per tile, wherein each pointer in a respective tile pointer list 330, corresponds to the last vertex packet for a primitive that covers part of the corresponding tile.

To illustrate storage of image data into memory, refer to FIG. C 3, and in particular into a tile pointer list 330, consider the following example. If a triangle touches four tiles, for example, tile 0 331, tile 1 332 tile 2 333, and tile N 334, a vertex pointer 5005 to the third vertex, or the last vertex of the triangle is added to each tile pointer list 330 corresponding to each of those four touched tiles. In other words, a vertex pointer 5005 referencing the last vertex of the triangle is added to each of the following tile pointer lists 330: (a) tile 0 tile pointer list 331; tile 1 tile pointer list 332; tile 2 tile pointer list 333; and, (d) tile three tile pointless to 333; and, (e) tile N tile pointer list 334.

Line segments are similarly sorted into a tile pointer list, for example tile pointer list 320, according to the tiles that the line segment intersects. It can be appreciated that lines, line mode trianges, and points have an associated width. To illustrate this, consider that a point, if situated at the intersection of 4 tiles, could touch all four tiles.

As a further illustration, refer to FIG. C 15, where there is shown spatial data and mode data organized into a sort memory 315 buffer, for example buffer 0 (see, FIG. C 3), with respect to eight geometry primitives 1605, 1610, 1615, 1620, 1625, 1630, 1635, and 1640, each of which is shown in FIG. C 16. In this example, one tile pointer list 1501, 1502, 1503, 1504, 1505 or 1506, is constructed for each respective tile A, B, C, D, E, and F, in a 2-D window as illustrated in FIG. C16. For the purposes of this example, each data storage 320 entry 1507–1523 includes an address, for example, address 1547 and a type of data indication, for example, type of data indication 1548. The first image data packet, a mode packet (either a clear packet 4000 or a cull packet 4500) received by write control 305 is stored at address 0 1547.

Each vertex pointer 1525–1542 references vertex packets 1509–1513, 1515–1519, and 1521–1523 (see Table 8, vertex packet 8000) that contain a completing vertex to a corresponding primitive that covers part of the tile represented by a respective tile pointer list 1501–1506.

In a preferred embodiment of the present invention only vertex pointers X to vertex packets 8000 that contain a completing vertex are stored by write control 305 into a tile pointer lists.

With further reference to FIG. C 16, line segment 1605, including vertices 14 and 15, touches tiles A and C, and is completed by vertex 15. As a matter of convention, for complex polygons, those having more than one vertex, the last vertex in the pipeline is considered to be the completing vertex. However, the present invention also contemplates that another ordering is possible, for example, where the first vertex in the pipeline is the completing vertex.

Write control 305 writes first pointer 1525 and first pointer 1531 (see FIG. C 15), each referencing the packet 1522 (containing completing vertex 15), into corresponding tile pointer lists 1501 and 1503, that represent tiles A and C respectively.

Triangle 1610, identified by vertices 2, 3, and 4, touches tiles B and D, and is completed by vertex 4 write control 305 writes first pointers 1526 and 1532 (see FIG. C 15), referencing packet 1511 (containing completing vertex 4), into the corresponding tile pointer lists 1502 and 1504, that represent tiles B and D respectively.

Triangle 1615, identified by vertices 3, 4, and 5, touches tiles B and D, and is completed by vertex 5.write control 305 writes first pointers 1527 and 1533, referencing packet 1512 (containing completing vertex 5), into the corresponding Tile Pointer Lists 1502 and 1504, that represent tiles B and D respectively.

Triangle 1620, identified by vertices 4, 5, and 6, touches tiles D and F, and is completed by vertex 6.write control 305 writes first pointers 1534 and 1539, referencing packet 1513 (containing completing vertex 6), into the corresponding Tile Pointer Lists 1504 and 1506, that represent tiles D and F respectively.

Triangle 1625, identified by vertices 8, 9 and 10, touches tiles C and E, and is completed by vertex 10. Write control 305 writes first pointers 1528 and 1536, referencing packet 1517 (containing completing vertex 10), into the corresponding Tile Pointer Lists 1503 and 1505, that represent tiles C and E respectively.

Each of the remaining geometry primitives in 2-D window 600, including triangles 1630 and 1635, as well as point 1640, are sorted according to the same algorithm discussed in detail above with respect to the sorted line segment 1605, and triangles 1610, 1615, 1620 and 1625.

In one embodiment of the present invention, as Mode Packets 4000 and/or 4500, for example, packets 1507, 1508,1514 and 1520, are received by write control 305 they are stored in-time order into an input buffer in data storage. For each mode packet 4000 and/or 4500 that is received, a corresponding mode pointer (depending on the type of mode packet, clear mode packet pointer 5015 or cull mode packet pointer 5020), for example pointers 1543, 1544, 1545 and 1546, is written into a mode pointer list 170.

In yet another embodiment of the present invention, if a geometry primitive is a line mode triangle, it is sorted according to the tiles its edges touch, and a line mode triangle having multiple edges in the same tile only causes one entry per tile.

Frame State

As frames of image data are written into sort memory 315 by write control 305, and subsequently read out of sort memory 315 by read control 310, to keep track of the various frame state information, frame state information is kept stored at numerous different levels in frame state register 350. Such information includes, for example, a number of regions that horizontally and the vertically divide the 2-D display window, and whether the data in the frame buffer is in "time order mode" or "sorted transparency mode" (both of these modes are discussed in detail below in reference to read control 310, and FIG. C 17).

In one embodiment of the present invention frame state register buffer 350 comprises a single set of registers 351. However, in a preferred embodiment of the present invention frame state register 350 comprises two sets of registers, including, one set of input registers, either 351 or 352, and one set of output registers, either 351 or 352. Either of the two sets of state registers, 351 or 352, may at times operate as the input or output register. The particular register (one of either of the two registers) that, at any one time, is being written into by write control 305, is considered to be the input register. The particular register (the other one of two registers) where data is being read out of it by read control 310, is considered to be the output register.

When sort memory 315 buffer 0 is swapped with buffer 1, frame state register buffer 351 is also copied into with frame state 352 register.

We will now discuss the particular information stored by write control into the various registers that are used to store frame state information in frame state registers 350.

Input buffer frame state register, either one of 351 or 352, depending on which is the input register at the time, is loaded with the frame state from the begin frame packet 2000. Signals are used by write control 305 to determine and set the operating mode of the write pipeline. Such operating modes include, for example, in-time order operating mode and sorted transparency operating mode, both of which are described in greater detail below in reference to write control 310.

Input buffer frame state 350 register EndFrame register (not shown) is loaded from end of frame packet 3000. Data that is included in EndFrame register includes, for example, soft overflow indication.

Input buffer frame state 350 register FrameHasClears register (not shown) is set by write control 305 for use by read control 310. Write control 305 sets this register in response to receiving a clear packet 4000 for the application. As will be described below in greater detail in reference to read control 310, and FIG. C 17, read control 310 will immediately discard tiles that do not have any geometry in frames having no clears (e.g. clear packets 4000 associated with the geometry).

MaxMem register (not shown) is loaded by write control 305 during initialization of sort 215, and is used for pointer initialization at the beginning of the frame. For example, it is typically initialized to the size of sort memory buffer 315.

Tail Memory 360

In a preferred embodiment of the present invention, certain data structures in sort memory 315 are implemented as linked list data structures, for example, tile pointer lists (for example, referring to FIG. C 3, tile 0 tile pointer list 331, tile 1 tile pointer list 332, tile 2 tile pointer list 333, and tile N tile pointer list 334) and mode pointer lists (for example, mode pointer list 340). Linked list data structures, and the operation of linked list data structures (adding and deleting elements from a linked list data structure) are known, for this reason the details of linked list data structures are not described further herein.

Typically, adding elements to a linked list data structure, results in a read/modify write operation. For example, if adding an element to the end of a linked list, the last element's next pointer in the linked list must be read, and then modified to equal the address of a newly added element. Performing a single read/modify write takes processor 117 (see FIG. C 2) bandwidth. Performing enough read/modify writes in a row can take away a significant amount of processor 117 bandwidth. While sorting primitives into sorts memory 315, write control 305 is adding elements to link lists, for example, tile pointer lists, and mode pointer lists (see FIG. C 3). It is desirable to minimize the number of read/modify write operations so that processor bandwidth can be used for other graphic pipeline 200 operations, such as, for example, setup 505 and cull 510 (see FIG. C 5). What is needed is a structure and method for reducing the number of read/modify rights and thereby increase processor bandwidth.

A preferred embodiment of the present invention reduces the number of read/modify writes that write control 305 must perform to add elements to a linked list data structure. Referring to FIG. C 3, there is shown tail memory 360, used by write control 305 and read control 310 to reduces the number of read/modify writes. Referring to Table 6, there is shown in example of an entry 6000 in tail memory 360, including: (a) addr head 6005, for pointing to be beginning of a link list data structure; (b) addr tail 6010, for pointing to the end of the linked list data structure; and, (c) no. entries 1015, for indicating the number of entries in the linked list data structure.

In a preferred embodiment of the present invention, each linked list data structure in sort memory 315 has an associated entry 6000 in tail memory 360. This preferred embodiment will allocate two memory locations each time that it allocates memory to add an element to a linked list data structure. At this time, the "next element" pointer (not shown) in the current last element in the link list data structure is updated to equal the address of the first allocated element's memory location. Next, the first allocated element's "next element" pointer (not shown) is updated to equal the second allocated element's memory location. In this manner, the number of read/modify writes that write control 305 must perform to add an element to a link data list is reduced to "writes".

When write control 305 has completed spatially sorting image data into sort memory 315, read control 310 will use tail memory 360 to identify those tiles that do not have any of a frame's geometry sorted into them. This procedure is described in greater detail below in reference to read control 310 and FIG. C 17.

In one embodiment of sort 215, tail memory 360 comprises one buffer, for example, buffer 361. In a preferred embodiment of the present invention, tail memory 360 includes one input buffer 361 and one output buffer 362 (input/output is hereinafter referred to as "i/o"). Either of the two buffers, 361 or 362, may at times operate as the input or output buffer. Each buffer, 361 or 362, occupies a separate address space in tail memory 360 The particular buffer (one of either of the two buffers) that, at any one time, is being written into by write control 305, is considered to be the input buffer. The particular buffer (the other one of two buffers) where data is being read out of it by read control 310, is considered to be the output buffer. When write control 305 swaps sorted memory 315, buffer 361 is also swapped with buffer 362. Swapping sort memory 315 is discussed in greater detail below with respect to write control 305, step 845, FIG. C 8.

In yet another preferred embodiment of the present invention, after read control 310 finishes reading all of the geometry corresponding to a tile for the last time, ADDR HEAD 6005 is set to equal the start address of its respective linked list and ADDR TAIL 6010 is set to equal ADDR HEAD 6005 (see table 6).

Write Control 305

In one embodiment of the present invention, write control 305 performs a number of tasks, including, for example: (a) fetching image data from a previous stage of graphics pipeline 200, for example, mode extraction 415; (b) sorting image data with respect to regions in a 2-D window; (c) storing the spatial relationships and other information facilitating the spatial sort into sort memory 315.

In a preferred embodiment of the present invention, write control, in addition to performing the above tasks, provides a previous stage of graphics pipeline 200, for example, mode extraction 415, a guaranteed conservative memory estimate of whether enough memory in a sort memory 315 buffer is left to spatially sort the image data into sort memory 315. In this preferred embodiment, write control 305 also cooperates with the previous stage of pipeline 200 to manage new frames of image data and memory overflows as well, by sequencing sort memory 315 buffer swaps with read control 310. We will now discuss each of these various embodiments in detail.

To illustrate write control 305, please refer to the exemplary structure in FIG. C 3 and the exemplary embodiment of the inventive procedure of write control 305 in FIG. C 8. At step 810, sort 215 initializes tail memory 360 to contain an entry 6000 (see Table 6) for each linked list data structure in sort memory 315, such that Addr head 6005 equals Addr tail 6010 which equals the address of the beginning of each respective linked list data structure, and number of entries 6015 is set to equal zero.

Write control 305 procedure continues at step 815, where it fetches image data from a previous stage and pipeline 200, for example, mode extraction 415. Image data includes those packets that respectively designate either the beginning of a user frame, or the end of a "user frame" (including, begin frame packet 2000 (see Table 2) and end frame packet t 3000 (see Table 3), hereinafter, often collectively referred to as a "frame control packets"), mode packets (including clear packets 4000 and cull packets 4500 (see Table 4)), and spatial packets 6000 (see Table 6).

At step 820, write control 305 procedure determines whether a begin frame packet 2000 was received (step 815).

If write control 305 received a begin frame packet 2000 (step 815), it means that a new frame of image data packets are going to follow. In light of this, frame state parameters are stored into input I/O buffer, for example, buffer 351 or buffer 352, in frame state 350 (see FIG. C 3). Such frame parameters are discussed in greater detail above.

Write control procedure 800 continues at step 825, where it is determined whether or not read control 310 is busy sending previously spatially sorted image data to a next stage in graphics pipeline 200. Write control 305 and read control 310 accomplish this by sending simple handshake signals over signal line 311 (see FIG. C 3). If read control 310 is busy, then write control procedure 800 will continue waiting until read control 310 has completed.

At step 830, if read control 310 is idle, write control procedure 800 swaps the following: (a) buffers 0 and 1 in sort memory 315; (c) frames state registers 351 and 352; and, (c) buffers 361 and 362 in tail memory 360. After execution of step 830, read control 310 can begin reading the spatially sorted image data out of, what was the input buffer, but is now the output buffer, while in parallel, and write control 305 can begin to spatially sort new image data into, what was the output buffer, but is now the input buffer. (In one embodiment of the present invention, read control 310 will zero-out the contents of the buffer that it has finished using.)

In a preferred embodiment of the present invention, memory is swapped by exchanging pointer addresses respectively to read and write memory buffers. For example, in one embodimant, write control 305 sets a first pointer that references a read memory buffer (for example, buffer 1 (see FIG. C 3)) to equal a start address of a first memory buffer that write control 305 was last sorting image data into (for example, buffer 0 (see FIG. C 3)); and, (b) write control 305 sets a second pointer that references a write memory buffer (in this example, buffer 0) to equal a start address of a second memory buffer that read control 310 was last reading sorted image data from to a subsequent stage of pipeline 200 (in this example, buffer 1).

Step 835, write control process 800 retrieves another packet of image data from a previous processing stage in pipeline 200, for example, mode extraction 415. (As discussed above with respect to step 820, if the previously fetched image packet was not a begin frame packet 2000 (step 820), write control procedure 800 also continues here, at step 835).

At step 840, it is determined whether the packet is an end of frame packet 3000 (see Table 3), for designating and end of frame of image data. This end of frame packet 3000 may have been sent as the result of a natural end of frame of image data (SoftEndFrame 3010), a forced end of frame, or as a result of a memory buffer overflow (BufferOverflowOccurred 3015), known as a split frame of image data.

In line with this, if the end of image frame was not a soft end of frame or user end of frame, write control 305 procedure continues at step 860, it is determined whether the packet is an end of user frame. An end of user frame means that the application has finished an image. An end of user frame is different from a "overflow" end of frame (or soft end of frame), because in an overflow frame the next frame will need to 'composite' with this frame (this is accomplished in a subsequent stage of pipeline 200). In light of this, write control 305 procedure continues at step 815 where another image packet is fetched from a previous stage of pipeline 200, because there is more spatial data in this user frame.

At step 865, it is determined if read control 310 is busy sending image data that was already spatially sorted by write control 305 to a next stage in graphics pipeline 200. If read control 310 is busy, then write control 305 procedure will continue waiting until read control 310 has completed.

At step 870, if read control 310 is idle (not sending spatially sorted image data from an output sort memory 315 buffer to a subsequent stage and pipeline 200), write control 305 procedure swaps input memory buffers with output memory buffers, and input data registers with output the registers, including, for example, the following: (a) buffers 0 and 1 in sort memory 315; (c) frames state registers 351 and 352; and, (c) buffers 361 and 362 in tail memory 360.

After execution of step 830, read control 310 can: (a) begin reading the spatially sorted image data out of, what was the input buffer, but is now the output buffer; (b) determine the output frame of image data's state from what was the input set of frame state registers, but is now the output set of frame state registers; and, (c) manage the output memory buffers linked list data structures from what was the input tail memory buffer, but is now the output tail memory buffer. While, in parallel, and write control 305 continues at step 815, where it can begin to spatially sort new image data into, what was the output sort memory 315 buffer, but is now the input buffer.

At step 845 (the image packet received from the previous stage of pipeline 200 was not an end of frame packet 3000, see step 840), write control 305 uses a guaranteed conservative memory estimate procedure to approximate whether there is enough sort memory 315 to store the image data packet received from the previous stage of the pipeline, along with any other necessary information (step 835), for example, vertex pointers 5005, or mode pointers 5015 or 5020. Guaranteed conservative memory estimate procedure 845 is described in greater detail below in reference to FIG. C 11. Using this procedure 845, write control 305 avoids any problems that may have been caused by backing up pipeline 200 due to sort memory 315 overflows, such as, for example, loss of data.

If there's not enough memory (step 845) for write control 305 to spatially sort the image data, at step 850, write control 305 signals the previous stage of pipeline 200 over signal line 212 (see FIG. C 2 or FIG. C 3) to temporarily stop sending image data to write control 305 due to a buffer overflow condition. An example of a buffer overflow signal (srtOD_srtOverflow 1525) used by write control 305 is described in greater detail above in table 15 and in reference to section interface signals and the interface between sort 215 and mode extraction 415.

The previous stage of pipeline 200 may respond to the buffer overflow indication (step 850) with an end frame packet 3000 (see FIG. C 3) that denotes that the current user frame is being split into multiple frames. In one embodiment of present invention, this is accomplished by setting BufferOverflowed 3015 to "1".

Sort 215 responds to this indication by: swapping sort memory 315 I/O buffers, for example, buffer 0 and buffer 1 (see FIG. C 3); (b) frame state registers, for example, frame state registers 361 and frame state registers 362; and, (c) tail memory buffers, for example, tail memory buffer 351 and tail memory buffer 352.

In yet another embodiment of the present invention, where sort 215 is single buffered, it is the responsibility of a software application executing on, for example, computer 101 (see FIG. C1) to cause an end-of-frame to occur in the input data stream, preferably before sort memory 315 fills (step 845). In such a situation, write control 305 depends on receiving a hint from the software application, the hint indicating that sort 215 should empty its input buffer.

If there is enough memory to spatially sort the image data (step 845), write control performs the following steps to store the image data as illustrated at step 905, in FIG. C 9. Referring to FIG. C 9, at step 905 it determined whether the packet is a spatial packet 1000 (see Table 8), and if it is not, at step 910, the packet must be a mode packet (either clear packet 4000 or cull packet 4500, see Table 4), the mode packet is stored into data storage input buffer, for example, data storage 320. At step 915, a pointer referencing the location of the mode packet in data storage is stored into mode pointer list input buffer, for example, mode pointer list 340.

If the packet was a spatial packet (step 905), at step 920, a vertex packet 8000 (see Table 8) is generated from the information in spatial packet 1000 (see Table 1). The value of each element in vertex packet 8000 correlates with the value of a similar element in spatial packet 1000. At step 925, the vertex packet 8000 is stored into a data storage input buffer, for example, data storage 320.

At step 930, it is determined whether the spatial packet 1000 (step 905) contains a completing vertex (the last vertex in the primitive). If the spatial packet 1000 contains a completing vertex (step 930), at step 935, to minimize bandwidth, write control 305 does a tight, but always conservative, computation of which tiles of the 2-D window are touched by the primitive by calculating the dimensions of a bounding box that circumscribes the primitive. The benefits of step 935 in this preferred embodiment, become evident in the next step, step 940. Bounding boxes are described below in greater detail in reference to FIG. C 13.

At step 940, write control 305 performs touched tile calculations to identify those tiles identified by the bounding box (step 935) that are actually intersected by the primitive. Utilizing a bounding box to limit the number of tiles used in the touched tile calculations is beneficial as compared to the existing art, where touched tile calculations are performed for each tile in the 2-D window.

Not taking into consideration the notion of using a trivial reject and/or a trivial accept of tiles prior to the use of the touched tile calculations (use of a bounding box) (step 935), the notion of touched tile calculations per se are known in the art, and one particular set of touched tile calculations are included in Appendix A for purposes of completeness, and out of an abundance of caution to provide an enabling disclosure. These conventional touched tile procedures may be used in conjunction with the inventive structure and method of the present invention.

At step 945, for each tile that was intersected by the primitive (step 940), a vertex pointer 5005 (see Table 5) pointing to the vertex packet 8000 stored into data storage (step 925) is stored into each input buffer tile pointer list that corresponds to each tile that was intersected by the primitive (determined in step 935), for example, tile pointer list buffer 330, and tile 0 tile pointer list 331, and tile 1 tile pointer list 332. A greater detailed description of the procedures used to store packets and any associated pointers into sort memory 315 is given above in reference to section sort memory structure and organization, and FIG. C 15.

Bounding Box Calculation

The present invention utilizes bounding boxes to provide faster tile computation processing (see step 940, FIG. C 9) and to further provide memory use estimates to a previous processing stage of pipeline 200 (memory use it estimates are discussed in greater detail below in reference to guaranteed conservative memory estimate procedure.). We will now describe a procedure to build a bounding box that circumscribes a primitive, wherein the bounding box comprises at least one tile of a 2-D window divided into equally sized tiles.

To illustrate the idea of a bounding box, please refer to FIG. C 13, where there is shown a 2-D window 1300 with a bounding box 1307 circumscribing a triangle 1308. In this example, the 2-D window 1300 is divided horizontally and vertically into six tiles 1301, 1302, 1303, 1304, 1305, and 1306. The bounding box 1307 has dimensions including (Xmin, Ymin) 1309, and (Xmax, Ymax) 1310, that are used by write control 305 to determine a group of tiles in 2-D window 1300 that may be touched by the triangle 1308.

In this example, bounding box 1307 includes, or "touches" four tiles 1303, 1304, 1305, and 1306 of the six tiles 1301, 1302, 1303, 1304, 1305 and 1306, because the triangle 1308 lies on, or within each of the tiles 1303, 1304, 1305, and 1306. Bounding box 1307 provides a conservative estimate of the tiles that primitive 1308 intersects, because, as is shown in this example, the dimensions of bounding box 1307 includes a tile (in this example, tile 1304) that is not "touched" by geometry primitive 1308, even though tile 1304 is part of bounding box 1307.

Referring to Table 5, and in particular to vertex pointer 5005, we will now determine the coordinates of a primitive from its corresponding vertex pointer 5005, and second, determining dimensions of bounding box 1307 from the coordinates of the primitive. A procedure for determining the coordinates of a primitive from its corresponding vertex pointer 5005 is described in greater detail above with respect to vertex pointer 5005, and Table 5.

Having determined the coordinates (vertices) of the primitive, the magnitude of the vertices are used to define the dimensions of a bounding box circumscribing the primitive. To accomplish this, write control 305 compares the magnitudes of the primitive's vertices to identify bounding box's 1307 (Xmin and Ymin) 1309 and (Xmax and Ymax) 1310.

The use of a bounding box is beneficial for several reasons, including, for example, it over estimates the memory requirements, but it takes less computation then it would to calculate which tiles a primitive actually intersects.

Lines, line mode triangles, and points have a width that may cause a primitive to touch adjacent tiles and thus have an affect on bounding box calculations. For example, a single point can touch as many as four tiles. In a preferred embodiment of the present invention, before determining dimensions of bounding box 1307, one-half of the primitive's stated line width, as given by LinePointWidth 1010 (see Table 1), is added to the primitive's dimensions to more clearly approximate the tiles that the primitive may touch.

Guaranteed Conservative Memory Estimate

Guaranteed is used because we know an upper bound on the number of tiles, and we know how much memory a primitive requires for storing respective pointers and vertex data. Hereinafter, guaranteed conservative estimate procedure 845 is referred to as "GCE 845."

GCE 845 is desirable because sort memory 315 is allocated by write control 305 as image data is received from a previous stage of pipeline 200, for example, mode extraction stage 415. Because sort memory 315 is an arbitrary but fixed size, it is conceivable that sort memory 315 could overflow while storing image data.

Referring to FIG. C 14, there is shown a block diagram of an exemplary memory estimate data structure ("MEDS") 1400, that in one embodiment of the present invention, provides data elements that GCE 845 uses in its estimating procedure. MEDS can be stored in sort memory 315, or other memory (not shown). Packet pointer element 1405 references a first insertion point into a memory, the memory in this example is sort memory 315, to store a first incoming data element, in this example the incoming data element is either a vertex packet 8000 or a mode packet 4000 or 4500 from mode extraction 415. Pointer pointer element 1410 keeps track of a second insertion point into the memory to store any other incoming data elements, in this example, the other incoming data elements are vertex pointers 5005, or mode pointers 5010 that may be associated with the vertex packet 8000 or mode packet 4000 or 4500.

Maximum per tile estimate element 1415 represents a value that corresponds to a "worst case," or maximum number of memory locations necessary to store the largest primitive that could occupy the 2-D window. This largest primitive would touch every tile in the 2-D window. Memory left element 1425 represents the actual amount of sort memory 315 that remains for use by write control 305.

In yet another embodiment of the present invention, write control 305 uses memory estimate data structure 1400 to provide the information to respond to inquiries from a software application procedure, such as a 3-D graphics processing application procedure, concerning current memory status information, such as pointer write addresses.

Referring to FIG. C 11, there is shown an embodiment of GCE 845. At step 1100, the actual amount of sort memory 315 that remains for use by write control 305 is calculated. We will now describe how this is accomplished. In one embodiment of the present invention, any pointers that may be associated with image data, such as vertex pointers 5005, are inserted into sort memory 315 at a first insertion point, or first address, that grows from the bottom up as new pointers are added to sort memory 315. Also, in this embodiment, packets associated with the image data, such as mode packets 4000 or 4500, and/or vertex packets 8000, are inserted into sort memory 315 at a second insertion point, or second address, that decreases from the top down as packets are added to sort memory 315, or vice versa.

The difference between the magnitudes of the first address and the second address identifies how much sort memory 315 remains. Hereinafter, the result of this calculation is referred to as memory left 1425.

In this example, at step 1105, GCE 845 determines if the input data packet is a mode packet 4000 or 4500, and if so, at step 1106, GCE 845 identifies the amount of sort memory 315 that is necessary to store a mode packet 4000 or 4500 into an input buffer of data storage (see FIG. C 3), and an associated mode pointer (depending on the type of mode packet, either a clear mode packet pointer 5015 or a cull mode packet pointer 5020), into an input buffer mode pointer list, this amount is referred to as "memory needed." In one embodiment, memory needed is equivalent to the number of bytes of the packet, in this example, the packet is either a clear mode packet 4000 or a cull mode packet 4500, plus to number of bytes required to store and associated pointer, in this example a mode pointer (see Table 5, depending on the type of mode packet, either a clear mode packet pointer 5015 or a cull mode packet pointer 5020), into sort memory 315. (Sizes of packets and pointers are given in their respective tables. See Table 8 for vertex packets, Table 4 for mode packets, and Table 5 for each pointer type.)

Referring back to FIG. C 11, at step 1110, GCE 845 compares memory needed to Memory Left 1425, and if memory needed is greater than memory left 1425, at step 3150, GCE 845 returns a not enough memory indication, for example, a boolean value of "false," so that the write control 305 can, for example, send a buffer overflow indication (see interface signals above) to a previous stage of the graphics pipeline, such as mode extraction 415. Otherwise, at step 1120, GCE 845 sets an enough memory indication for the write control 305, for example, returning a boolean value of "true".

If the image data was not a mode packet 4000 or 4500 (step 1105), then GCE 845 continues at step 1145, as illustrated in FIG. C 12. Referring to FIG. C 12, at step 1145, GCE 845 determines if the image data is a spatial packet 8000 that contains a completing vertex. To illustrate a Spatial Packet, please refer to Table 1, where there is shown an example of a Spatial Packet 1000.

If spatial packet 1000 contains a completing vertex (step 1125), at step 1145, GCE 845 determines the value of the maximum memory locations 1420 as discussed in greater detail above. At step 1150, if it is determined that memory left 1425 is greater than, or equal to maximum memory locations 1420, then the GCE 845 continues at F, as illustrated in FIG. C 11, where at step 1120, GCE 845 sets an indication that there is for certain enough memory for the write control 305 to store the image data and any associated pointers into sort memory 315.

Otherwise, at step 1155 (FIG. C 12), GCE 845 performs an approximation of the amount of sort memory 315 that may be required to process the input data packet 201 by determining the dimensions of a bounding box circumscribing the geometry primitive. A greater detailed description of bounding boxes is provided above in references to section Bounding Boxes.

At step 1156, GCE 845 determines Maximum Per Tile Estimate 1415 as discussed in greater detail above. At step 1160, the Maximum Per Tile Estimate 1415 is multiplied by the group of tiles identified by the bounding box 1307, to determine an estimate of the "memory needed" for write control 305 to store the spatial data and associated pointers for the geometry primitive. In an embodiment of the present invention, memory needed, with respect to this example, is equal to the number of bytes in a Vertex Packet 8000 plus the number of bytes in a corresponding Vertex pointer 5005. Next, GCE 845 continues at E, as illustrated in FIG. C 11, where at step 1110, if memory needed is less than or equal to Memory Left 1425, then at step 1120 an "enough memory" indication is returned to the calling procedure, for example, write control 305 procedure (see FIG. 8). The indication shows that there is for certain enough memory for write control 305 to store the spatial data and associated pointers into sort memory 315. As discussed above, this indication can be as simple as returning a boolean value of "true". Otherwise, at step 1110, if memory needed is greater than memory left 1425, at step 1115, an indication is set showing that sort memory 315 could possibly overflow while storing the spatial data and associated pointers corresponding to this geometry primitive.

Other Processing Stages 240

In one embodiment of the present invention, other processing stages 240 (see FIG. C 2) includes, for example, any other graphics processing stages as long as a next other processing stage 240 can receive image data that sorted with respect to regions of a 2-D window on a region-by-region basis.

Referring to FIG. C 5, there is shown an example of a preferred embodiment of other processing stages 220, including, setup 505, cull 510, mode injection 515, fragment 520, texture 525, Phong Lighting 530, pixel 535, and backend 540. The details of each of the processing stages in other processing stages 240 is not necessary to practice the present invention. However, for purposes of completeness, we will now briefly discuss each of these processing stages.

Setup 505 receives sorted spatial data and mode data, on a region-by region basis from sort 215. Setup 505 calculates spatial derivatives for lines and triangles one region and one primitive at a time.

Cull 510 receives data from a previous stage in the graphics pipeline, such as setup 505, in region-by-region order, and discards any primitives, or parts of primitives that definitely do not contribute to the rendered image. Cull 510 outputs spatial data that are not hidden by previously processed geometry.

Mode injection 515 retrieves mode information (e.g., colors, material properties, etc . . . ) from polygon memory, such as other memory 235, and passes it to a next stage in graphics pipeline 200, such as fragment 520, as required. Fragment 520 interprets color values for Gouraud shading, surface normals for Phong shading, texture coordinates for texture mapping, and interpolates surface tangents for use in a bump mapping algorithm (if required).

Texture 525 applies texture maps, stored in a texture memory, to pixel fragments. Phong 530 uses the material and lighting information supplied by mode injection 525 to perform Phong shading for each pixel fragment. Pixel 535 receives visible surface portions and the fragment colors and generates the final picture. And, backend 139 receives a tile's worth of data at a time from pixel 535 and stores the data into a frame display buffer.

In a preferred embodiment of the present invention, sort 215 is situated between mode extraction 415 (see FIG. C 3) and setup 505 (see FIG. C 5).

Interface Between Spatial Sorting 215 and Setup 405

Referring to Table 13, there is shown an example of primitive packet 13000. The majority of output from sort 215 to a subsequent stage of pipeline 200, is a sequence of primitive packets 13000 that contain sets of 1, 2, or 3 vertices.

Sort 215 also sends clear packets 4000 to a subsequent stage in pipeline 200. Clear packets 4000 is described in greater detail above in reference to the interface between sort 215 and mode extraction 415.

Referring to Table 11, there is shown in example of an output cull packet 11000. Read control 310 send all cull packet down stream unless its after the last vertex packet 8000 or clear packet 4000 in the tile.

Referring to Table 9, there is shown in example of begin tile packet 9000. Read control 310 may make multiple passes with regard to the image data corresponding to a particular tile because of: (a) multiple target draw buffers—for example front as well as back or left as well as right in a stereo frame buffer, and/or, (b) it may contain transparent geometry while pipeline 200 is operating in sorted transparency mode. Sorted transparency mode is discussed in greater detail below in reference to read control 310 procedure.

Sort 215 outputs this packet type for every tile in the 2-D window that has some activity, meaning that this packet type is output for every 2-D window that either has an associated buffer clear (see Table 4, clear packet 4000), or rendered primitives.

Referring to Table 10, there is shown an example of an end tile packet 10000 for designating that all of the image data corresponding to a particular tile has been sent.

Interface Signals

Referring to Table 18, there is shown interface signals and packets between sort 215 and setup 405, including srtOD_writeData signal 1805, indicating that data on mode extraction 415 data out bus 211 is a valid packet.

StpOD_stall signal 1815 indicates that setup 505's input queue is full, and that sort 215 should stop sending data to setup 505. Signal stpOD_transEnd 1820 indicates that sort 215 should stop re-sending a transparency sub-tile in sorted transparency mode. Setup 405 sends the signal because a downstage culling unit of pipeline 200 has determined that it has finished with all transparent primitives in the tile. Sorted transparency mode is described in greater detail below with regard to read control 310.

It can be appreciated that the specific values selected to represent each of the immediately above discussed signals are not necessary to practice the present invention. It is only important that each signal has such a unique value with respect to another signal that each signal can be differentiated from each other signal by sort 215 and setup 405.

Read Control 310

At this point, write control 305 has processed either an entire frame, or a split frame, of spatial and mode data, and spatially sorted that image data, vertex by vertex and mode by mode, on a tile-by-tile basis, in time-order, into sort memory 315. We will now discuss a number of embodiments of read control 310, used by sort 215 to output the spatially sorted image data to a subsequent process of pipeline 200. We will first discuss how read control 310 balances the effects of scene and horizon complexity, such that loads across the subsequent stages of pipeline 200 are more evenly balanced, resulting in more efficient pipeline 200 processing. This pipeline 200 load balancing discussion will introduce several new concepts, including, for example, the concepts of "SuperTile tile organization" and a "SuperTile Hop Sequence".

Next, we will describe how a preferred embodiment of read control 310 builds primitive packets 13000 from the spatially sorted image data in sort memory 315. Next, we will discuss a number of different modes that the spatially sorted image data can be sent down pipeline 200 according to the teachings of the present invention, for example, in-time order mode and sorted transparency mode. Finally, we will discuss an embodiment of a read control 310 procedure used to send the image data to a subsequent stage of pipeline 200.

Graphics Pipeline Load Balancing

As discussed above in reference to the background, significant problems are presented by outputting image data to a next stage of a graphic pipeline using a first-in first-out (FIFO), row-by-row, or column-by-column strategy. Outputting image data in such a manner does not take into account how scene complexity and/or horizon complexity across different portions of an image may place differing loads on subsequent stages of a graphics pipeline, possibly resulting in bottlenecks in the pipeline, and therefore, less efficient pipeline processing of the image data. It is desirable to balance these scene and horizon complexity effects across the subsequent rendering resources of pipeline 200, (for example, see FIG. C 5).

To accomplish the goal of balancing rendering resources across pipeline 200, a preferred embodiment of read control 310: (a) organizes the tiles of the 2-D window (according to which write control 305 spatially sorted the image data) into a SuperTile based tile organization; and, (2) sends the SuperTiles to a subsequent stage in pipeline 200 in a spatially staggered sequence, called the "SuperTile Hop Sequence." Such load balancing also has an additional benefit of permitting a subsequent texture stage of pipeline 200, for example, texture 525 (see FIG. C 5), to utilize a degree of texture cache reuse optimization.

SuperTiles

To illustrate the idea of a SuperTile, refer to FIG. C 18, where there is shown an example of a SuperTile, and in particular, a block diagram of a 2×2 SuperTile 1802 composed of four tiles. A SuperTile 1802 can be one tile, or any number of tiles. The number of SuperTiles 1802 in a SuperTile row 1803 in an array of SuperTiles 1801, need not be the same as the number of tiles in a SuperTile column 806.

In one embodiment of the present invention, the number of tiles per SuperTile 1802 is selectable, and the number of tiles in a SuperTile 1802 may be selected to be either a 1×1, a 2×2, or a 4×4 group of tiles. The number of tiles in a SuperTile 1802 is selected by either a graphics device driver or application, for example, a 3-D graphics application executing on computer 101 (see FIG. C 1). The number of tiles in a SuperTile 1802 can also be preselected to match typical demands of a target application space.

In a preferred embodiment the number of tiles in a SuperTile is 2×2. For example, the present invention contemplates that the number of tiles in a SuperTile is selected such that the complexity of an image is balanced. Depending on the particular image, or target application space, if SuperTiles contain too many tiles they will contain simple as well as complex regions of the image. If a SuperTile size does not contain enough tiles, the setup cost for rendering a tile is not amortized by subsequent stages of pipeline 200. Such amortization includes, for example, texture map reuse and pixel blending concerns.

SuperTile Hop Sequence

In a preferred embodiment of the present invention, read control 310 reads SuperTiles 1801 out of sort memory 315 is a spatially staggered sequence, hereinafter referred to as the "Super Tile Hop Sequence," or "SHS," to better balance the complexity of sub-sequences of tiles being sent to subsequent stages of pipeline 200. In other words, in this embodiment, read control 310 does not send image data from sort memory 315 to a subsequent stage in pipeline 200 in such a manner that SuperTiles 1801 fall in a straight line across the computer display window, as illustrated by tile order, on either a row-by-row or a column-by-column basis. The exact order in the spatially staggered sequence is not important, as long as it balances scene and horizon complexity.

Referring to FIG. C 18, SuperTile array 1801 is a 9 row×7 column array of 2×2 tile SuperTiles. Because, in this example, the SuperTile size is 2×2 tiles, SuperTile array 1801 contains 63 SuperTiles, or an 18×14 array of tiles, or 1605 tiles. Read control 310 converts SuperTile array 1801 into a linear list 1803 by numbering the SuperTiles 1802 in a row-by-row manner starting in a corner of the 2-D window of tiles, for example, the lower left or the upper left of the SuperTile matrix 1801. In a preferred embodiment, the numbering starts in the upper left of a 2-D window of SuperTiles.

Next, read control 310 defines the sequence of SuperTile processing as:

$$T_0=0,$$

$$T_{n+1}=\mathrm{mod}_N(T_n+M),$$

The requirement of "M" is that it be relatively prime with respect to N. It is not required that M be less than N. In this example, "M" is 13, because it a relatively prime number with respect to N in this example, or 63. Where N=number of SuperTiles in a window, M=the SuperTile step, and Tn=nth SuperTile to be processed, where 0<=n<=N−1. In this example N=63 (length & width), and M=13. This results in the sequence: $T_0=0$, $T_1=13$, $T_2=26$, $T_3=39$, $T_4=52$, $T_5=2$, $T_6=15$, as illustrated in tile order 1804, which shows the resulting SuperTile Hop Sequence.

This algorithm, the SuperTile Hop Sequence, creates a pseudo-random sequence of tiles, whereas scene and horizon complexity tends towards the focal point of the image, or the horizon.

This iterative SuperTile Hop Sequence procedure will hit every SuperTile 1802 in a 2-D window as long as N and M are relatively prime (that is, their greatest common factor is 1). Neither N nor M need to be prime numbers, but if M is always selected to be a prime number, then every Super Tile will be hit. When one or both of N or M are not prime, then portions of the scene would never be rendered by subsequent stages of pipeline 200. For example, if "N" were set equal to 10 and "M" were set to equal 12, no odd numbered SuperTiles would be rendered.

In a preferred embodiment, a SuperTiles array is larger than needed to cover an entire 2-D window, and is assumed to be $2^a \times 2^b = 2^{2a+b}$, where "a" and "b" are positive integers, and where "a" can equal "b", thus guaranteeing the total number of SuperTiles in the SuperTile array to be an integer power of two. Having the total number of SuperTiles be an integer power of two simplifies implementation of the Modulus operation in a finite hardware architecture where numbers are represented in base 2.

This makes it possible to do "$mod_N$" calculation simply by throwing away high order bits. Using this approach, nonexistent, or fictitious SuperTiles 1802 will be included in the SHS and, in a preferred embodiment of the invention, they are detected and skipped during Read control 310, because there is no frame geometry within the tiles. Detecting such non-existent, or fictitious SuperTiles 1802 can be done through the use of scissor windows where the dimensions of the scissor window equals the actual dimensions of the 2-D window. In such a situation read control 310, discussed in greater detail below, does not output those tiles, or SuperTiles that fall completely outside the scissor window.

Referring to FIG. C 7, there is shown an illustration of an exemplary read control 310 circuit, for reading data out of sort memory 315. Read control 310 may be configured to include the following circuits: (a) Tile Generator Circuit 700, for grouping tiles into SuperTiles and determining a SuperTile Hop Sequence order that the SuperTiles should be sent out to a next stage in the graphics pipeline, such as setup 505; (b) Pointer Traversal Circuit 710, for traversing a 2-D windows' mode pointer lists and tail pointer lists to populate read cache 730 on a tile-by-tile basis, wherein each tiles' spatial data is stored in time-order; and (c) geometry assembly circuit 720, for constructing output primitive packets 13000 (see Table 13), and accumulating clear mode packets 4000 (see Table 4) before sending the spatial and mode data, on a tile-by-tile basis to the next stage in graphics pipeline 200. the functionality of each of these circuits 700, 710, 720 and 730 are discussed in greater detail below with reference to FIG. C 17.

Read Control Procedure

In operation, read control 310: (a) selects the next tile to be sent to a subsequent processing stage of pipeline 200; (b) reads the final vertex pointer 5005 address from current tail memory 360 for the chosen tile; (c) tests the final vertex pointer 5005 and mode pointer X to determine if the tile can be discarded except; (d) if the tile is not discarded, read control 310 proceeds to traverse the current tile pointer list to find the addresses of the vertices of the primitives that touch the tile; (e) the vertex data are read as needed, and primitives are assembled into primitive 13000 (see Table 13) packets and passed to a subsequent processing stage of pipeline 200. In a preferred embodiment of the present invention, the subsequent processing stage is setup 505 (see FIG. C 5).

In one embodiment of the present invention, image data corresponding to tiles are re-sent to a subsequent stage of pipeline 200 if primitives are rendered to both front and back buffers, such as, for example, when the user or 3-D graphics application executing on, for example, computer 101 (see FIG. C 1), requests this.

In a preferred embodiment of the present invention, image data corresponding to tiles are re-sent to a subsequent processing stage of pipeline 200, under some circumstances, for example, when pipeline 200 is in sorted transparency mode. Sorted transparency mode is discussed in greater detail below.

In yet another embodiment of the present invention, read control 310 performs two primary optimizations. The first, tiles that are not intersected by any primitive or clear packet 4000 are not sent to the subsequent stage of pipeline 200. Second, the address of the current vertex is compared to the address of the current mode packet to determine if the mode packet should be merged into the output stream, in this manner, clear buffer events that occur before any geometry are compressed where possible. This is beneficial because it reduces the bandwidth of image data to subsequent stages of pipeline 200.

In yet another preferred embodiment if the present invention, read control 310 starts reading spatially sorted image data from a buffer in sort memory 315 that was immediately prior to read control 310's step of beginning to read, designated for writes by write cotnrol 305.

Figures 17A, 17B, 17C, 17D:
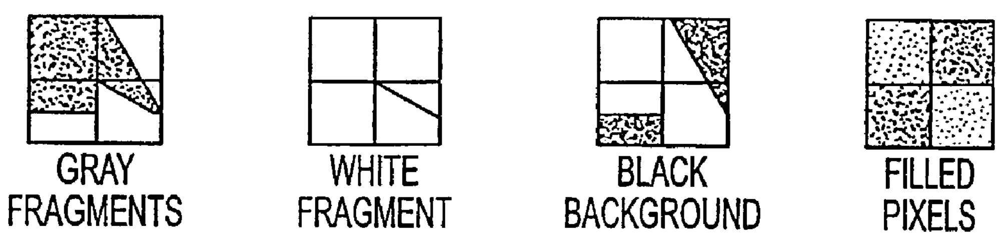
FIG. 17 is a diagramatic illustration showing the manner in which an embodiment of the Pixel block processes a stamp's worth of fragments.

Referring to FIG. 17, we will now describe an example of read control 310 procedure. At step 1705, the array of tiles representing the spatial area of the 2-D window are grouped into an array of SuperTiles 1803. Supertiles 1802 are discussed in greater detail above in reference to FIG. 18. At step 1710, the SuperTile Hop Sequence order for sending out the SuperTiles to a next stage in graphics pipeline 200 is determined. The Supertile Hop Sequence is described in greater detail above in reference to FIG. C 18.

At step 1715, read control 310 (1) orders packets (vertex packets X and mode packets 4000 and 4500), on a tile-by-tile basis, in an in-time order manner, from sort memory 315; and, (2) writes them, into a queue, read cache 730.

To order the packets in an output sort memory buffer, for example, buffer 1 (see FIG. C 3), the following must be taken into consideration. A single mode packet 4000 or 4500 may affect multiple tiles, as well as multiple primitives within any one particular tile. Any one buffer in sort memory 315, for example, buffer 0 or buffer 1 (see FIG. C 3), contains a single mode pointer list, for example, mode pointer list 340. Mode packets X are not sorted by write control 305 into sort memory 315 on a tile-by-tile basis, but only in an in-time order into an input data storage buffer, for example, data storage 320 (see FIG. C 3). Thus, a single mode packet X may affect multiple tiles, as well as multiple primitives within any one particular tile. It is desirable that read control 310 map each particular mode packet X to those tiles that it effects, and that read control 310 only output a mode packet that effects the primitives in a particular tile, only once per that particular tile, as compared to outputting a mode packet that effects the primitives in a tile once per primitive per tile.

To achieve this goal and to populate read cache 730 (step 1715), read control 310 compares the address of each vertex pointer 5005 (in each input buffer tile pointer list) to the address of each mode pointer 4000 or 4500 in the single input buffer mode pointer list. (Referring to FIG. C 3, the input buffer tile pointer lists could be, for example, tile 0 tile pointer list 331, tile 1 tile pointer list 332, tile 2 tile pointer list 333, and tile N tile pointer list 334. The input buffer mode pointer list could be, for example, mode pointer list 340). If the address of a mode pointer 4000 or 4500 is greater than the address of a vertex pointer 5005, the mode pointer 4000 or 4500 came before vertex pointer 5005. If the address of a vertex pointer 5005 is greater than the address of a mode pointer 4000 or 4500, the vertex pointer 5005 came before the mode pointer 4000 or 4500. Whichever pointer was written into sort memory 315 first, indicates that the pointer's corresponding packet in the input data storage buffer (for example, see FIG. C 3, data storage 320), either a vertex packet 5005 or mode packet 4000 or 4500, should be sent out of read control 310 to a subsequent processing stage of pipeline 200 before the packet that was determined to have been written into the input data storage buffer subsequent. Using this procedure, each mode packet 4000 or 4500 that affects a tile is output only one time, for the tile that it effects.

This explanation assumes that pointers are written by write control 305 into sort memory 315 from the bottom of sort memory 315 towards the top of sort memory 315 pointers are written by write control 305 from the top-down, the reverse of the above explanation applies.

In a preferred embodiment of the present invention, to write the packets into read cache 730, in preferred embodiment of the present invention, read control 310 will try to minimize the amount of extraneous data sent to subsequent stages of pipeline 200 by not sending out tiles that are empty of primitives. To accomplish this, read control 310 uses the output tail memory 360 buffer, either 361 or 362 (see FIG. C 2), to identify those tiles in the 2-D window that do not contain primitives. For example, if an address of an output buffer tile pointer list (see ADDR HEAD 6005, FIG. C 6), equals the address of a corresponding tail address X (see ADDR TAIL 6010, Table 6) in tail memory 360, then that particular tile does not have any primitives sorted into it by write control 305 (it is empty of any frame geometry). Therefore, read control 310 will not any data for that particular tile to subsequent stages of pipeline 200.

In yet another preferred embodiment of the present invention, read control 310 will minimize the amount of extraneous data set to subsequent stages of pipeline 200 by not sending our fictitious files. A fictitious tile is a tile that is empty of frame geometry that was previously created by read control 310 during SuperTile tile organization discussed in great detail above, wherein the number of tiles and the 2-D window may be have been increased by power of two.

To accomplish this goal, read control 310 will create a scissor window having the actual coordinates of the 2-D window. Referring to Table 14, there is shown in example of a scissor window data structure, for storing the coordinates of the scissor window.

Enable 1405 designates whether read control 310 should the scissor window. Enable 1405 set to equal "1" designates that read control 310 should use the scissor window defined therein. Xmin 1410, Xmax 1415, Ymin 1420, and Ymax 1425 are used to define the minimum and maximum coordinates defining the dimensions of the scissor window. In a preferred embodiment of the present invention, scissor window data structure 14000 is stored in, for example, sort memory 315 (see FIG. C 3), or other memory (not shown).

In yet another preferred embodiment of the present invention, read control 310 will minimize the amount of extraneous data set to subsequent stages of pipeline 200 by not sending out fictitious files. A fictitious tile is a tile that is empty of frame geometry that was previously created by read control 310 during SuperTile tile organization discussed in great detail above, wherein the number of tiles and the 2-D window may have been increased by power of two.

To accomplish this goal, read control 310 will create a scissor window having the actual coordinates of the 2-D window. Referring to table. 14, there is shown in example of a scissor window data structure, for storing the coordinates of the scissor window.

Enable 1405 designates whether read control 310 should the scissor window. Enable 1405 set to equal "1" designates that read control 310 should use the scissor window defined therein. Xmin 1410. Xmax 1415, Ymin 1420, and Y max 1425 are used to define the minimum and maximum coordinates defining the dimensions of the scissor window. In a preferred embodiment of the present invention, scissor window data structure 14000 is stored in, for example, sort memory 315 (see FIG. C 3), or other memory (not shown).

In this preferred embodiment, read control 310 will discard any tiles that lie completely outside of this scissor window. Those tiles that are situated partially inside and outside of the scissor window are not discarded.

In yet another embodiment of the present invention, scissor window data structure 14000 includes link 1430, for pointing to a next scissor window data structure 14000. In this embodiment, read control 310 utilizes a singly linked list of scissor window data structures 14000 to define multiple scissor windows. Linked list data structures and the operation of linked list in structures are known, and for that reason are not discussed in greater detail herein.

Is contemplated that these multiple scissor windows are utilized to discern which tiles comprising the 2-D window need to be rendered and which do not, thereby enabling the present invention to send only those image data that represent the visible portions of a window down stages of a graphics pipeline, while discarding those image data, or fictional image data that do not contribute to the visible portions of the window.

When read control 310 determines that the vertex data corresponding to vertex pointer 5005 should be stored into read cache 703, read control 310 generates pointer references to any vertex packets 5005 in Data Storage that may be necessary to assemble the complete geometry primitive, and stores the pointer references into read cache 703. The procedure for identifying each of a primitive's remaining vertices, if any, from vertex pointer 5005 is described in greater detail above in reference to vertex pointers 5005 and Table 5.

In light of that procedure, read control 310 generates pointer references to store into read cache 703 according to the following rules, if offset 5007 represents a point, no additional vertices are needed to describe the primitive, thus read control 310 only writes the address of a single vertex pointer 5005 into read cache 703. If the offset 5007 represents a line segment, another vertex is needed to describe the line segment and read control 310 first writes vertex pointer 5005 with the address of vertex pointer 5005 minus 1 into read cache 703, then writes the address of vertex pointer 5005 into read cache 703 If the offset 5007 represents a triangle, two more vertices are needed to describe the triangle, and read control 310 first writes the following pointers into read cache 703, in this order: (1) the address of vertex pointer 5005 minus the value of the offset; (2) the address of vertex pointer 5005 minus 1; and, (3) the address of vertex pointer 5005.

As read control 310 populates read cache 703 with each tiles' respective image data, the order that each primitive in the tile is read into Read Cache 703 is governed according to whether read control 310 is operating in either "Time Order Mode," or "Sorted Transparency Mode." In Time Order Mode (the default mode for one embodiment of the present invention), Read control 310 preserves the time order of receipt of the vertices and modes within each tile as the data is stored. That is, for a given tile, vertices and modes are read into Read Cache 703 in the same order as they were written into sort memory 315 by write control 305.

Sorted Transparency Mode

In sorted transparency mode, read control 310 reads each tile's data in multiple passes into read cache 703. In the first pass, read control 310 outputs "guaranteed opaque" geometry. In this context, guaranteed opaque means that the geometry primitive completely obscures more distant geometry that occupies the same area in the window. In subsequent passes, read control 310 outputs potentially transparent geometry. Potentially transparent geometry is any geometry that is not guaranteed opaque. As discussed above, within each pass, the geometry's time-ordering is preserved and mode data (contained in the mode packets) are inserted into their correct time-order location.

In one embodiment of the present invention, each vertex pointer 5005 includes the transparent element 5008 (see Table X). Transparent element 5008 is a single bit, where "0" represents that the primitive is guaranteed to be opaque, and where "1", represents that the corresponding primitive is treated as possibly transparent.

Clear packet 4000 includes an indication, SortTransparentMode 4010 (see Table 4), of whether the read control 310 will operate in time order mode, or sorted transparency mode. In one embodiment of the present invention, if SortTransparentMode 4010 is set to equal "1", then read control 310 will operate in time order mode. In this embodiment, if SortTransparentMode 4010 is set to "0", then read control 310 will operate in sorted transparency mode.

Referring to FIG. C 17, at step 1720, read control 310 uses each vertex pointer 5005 and each mode pointer (depending on the type of mode packet, either a clear mode packet pointer 5015 or a cull mode packet pointer 5020) stored in read cache 703 to access each particular pointer's respectively referenced packet in data storage.

In the process of reading the pointers out of read cache 703, read control 310 accumulates each clear packet 4000 that it encounters. The process of accumulating clear mode packets 4000 is advantageous because it reduces the image data bandwidth to subsequent stages of pipeline 200, such as, for example, those operations stages identified in FIG. C 5. Clear packets 4000 are accumulated until either a vertex pointer 5005 referencing a completing vertex is read from read cache 703, or a particular clear packet 4000 includes a "send now" field (SendToPixel 4008) that is set to, for example, "1," and indicates that particular packet needs to be sent immediately. When read control 310 encounters either one of these two situations, read control 310 sends any accumulated clear packets 4000 to a next stage in the graphics pipeline, for example setup 505.

In one embodiment of the present invention, multiple adjacent sort output cull packets 11000 (see table 11) are compressed into one sort output cull packet by a cull register (not shown). In essence, the cull register logically ors each CullFlushAll bits 11010 from the multiple output cull packets 11000, and uses the last packets for all other parameters. This is beneficial because it allows a subsequent stage of pipeline 200, for example cull 510 to be turned off for some geometry without affecting the subsequent status process with respect to tiles that do not contain the geometry.

Referring to Table 13, there is shown an example of an exemplary output primitive packet 13000, for sending to a next stage in the graphics pipeline. For each vertex pointer 5005 read out of read cache 703, read control 310 generates an output primitive packet 13000. To accomplish this, read control 310 will accumulate each primitive's vertices, where each vertex is stored in a corresponding vertex packet 5005 in data storage, into a respective output primitive packet 13000. As discussed above, each vertex pointer 5005 that contains a completing vertex, is written as the last vertex pointer 5005 into the read cache 703. The procedures for assembling each of a primitive's vertices from a vertex pointer 5005 is discussed in greater detail above with respect to Table 5 and vertex pointer 5005.

At step 1725, read control 310 sends the packets to the next stage in the graphics pipeline, such as setup 405, on a tile-by-tile basis. At the beginning of outputting each tile's respective image data, an output begin tile packet 9000 is output including all per-tile parameters needed by downstream blocks in a graphics pipeline. Referring to Table 9, there is shown an example of an output begin tile packet 9000 that includes per-tile parameters, such as the location (in pixels) within the 2-D window of the lower left hand corner of the given tile. Referring to Table 9.5, there is shown an example of an output end tile packet 9500. Read control 310 includes the following packets with every tile that is output to the next stage in the graphics pipeline: (1) output cull mode packet 11000; (2) any accumulated clear packets 4000; and, (3) each of the given tile's output primitive packets 13000; and (4) an Output End Tile packet 9500.

Optional Enhancements and Alternative Embodiments

Line Mode Flags

Recall that each spatial packet 1000 has a LineFlags element 1030. This element 1030 indicates whether a line segment has already been rendered, and thus, does not need to be rendered again. This is particularly important for rendering line mode triangles with shared edges.

Referring to FIG. C 16, where there is shown a window 1600 with six tiles A, B, C, D, E and F, and eight geometry primitives 1605, 1610, 1615, 1620, 1625, 1630, 1635 and 1640. In this example, a triangle fan includes triangles 1625, 1630, and 1635. Triangle 1625, identified by vertices 8,9, and 10, share a line segment identified by vertices 8 and 10 with triangle 1630, identified by vertices 8,10 and 11. In this alternate embodiment, if the LineFlag element 1030 is set, such shared line segments will only be rendered once.

Sort Memory: Triple Buffered

With only two pages of sort memory 315, read control 310 and write control 305 are in lockstep and either one of these processes. For example, when the write control 305 is sorting image data for frames that alternate from having complex geometry to having sparse geometry, the read control 310 and write control 305 may operate on significantly different quantities of image data at any one time. Recall that sort memory 315 is swapped when either a complete frame's worth of image data has been processed, a sort memory 315 buffer overflow error occurs, or on a forced end of frame indication sent by an application. Therefore, a process, for example either write control 305 or read control 310, that completes first, has to wait until the other process is complete before it can begin processing a next frame of image data.

Sort Memory: Dynamic Memory Management

In an alternative embodiment of the present invention, sort memory 315 is at least triple buffered. A first, or front buffer is for collecting a scene's geometry. A second, or back buffer is for sending the sorted geometry down the graphics pipeline. A third, or overflow buffer is for storing a frame's geometry when the front buffer has overflowed, or for holding the holds a complete series of spatially sorted image data unitl the back buffer has has finished being emptied. Such an implementation would enable both the read and write process to work relatively independently of one another. For example, frame size stalls on the input side will be isolated from the output side; the only reason write process 200 would stall is if it ran out of memory or data.

In another embodiment, sort memory 315 is managed with a dynamic memory management system, for allocating and deallocating pages of sort memory on an as needed basis. Dynamic memory management systems are known in the art on all non-dedicated hardware platforms. The present invention contemplates use of a dynamic memory manager operating in a processing stage, for example, sort 215, on a dedicated 3-D processor, for example, 3-D processor 117 (see FIGS. C 1 and C 2).

In one embodiment of the present invention, sort 215 allocates memory blocks from a memory pool, for example, sort memory 315, on an as needed basis. To illustrate this, consider the following example: write control 305 allocates a first memory buffer to sort a frame of image data into. Either at: (a) the end of the image frame; (b) upon receipt, by write control 305, of a forced end of frame indication from a software application executing on, for example, computer 101 (see FIG. C 1); or, (c) upon an indication from guaranteed conservative memory estimate 845 (see, FIG. C 8) of a possible memory buffer overflow, write control 305 signals read control 310 to begin reading the sorted image data out of the first memory buffer.

At this point, write control 305 allocates a second memory buffer to sort a frame of image data into. Upon happening of any of the above listed events (a), (b), or (c), write control 305 checks to see if read control 310 has completed reading the sorted image data to a subsequent stage pipeline 200. If read control 310 has not finished, write control 305 allocates a third memory buffer to begin sorting a next frame of image data into. Write control 305 additionally, signals read control 310 that the second memory buffer is available for read control 310 to begin reading the sorted image data out of as soon as read control 310 finishes with its current buffer, the first memory buffer.

Upon completion, read control 310 releases the first memory buffer, and returns the memory resource to the memory pool. Additionally, at this point, read control 310 begins to read sorted image data from the second memory buffer. In this manner, write control 305 and read control 310 are able to work relatively independently of one another. Frame size stalls on the input side will be isolated from the output side. Although this example only uses three memory buffers, is contemplated that more than memory buffers can be used.

A Computer Program Product

The present invention can be implemented as a computer program product that includes a computer program mechanism embedded in a computer readable storage medium. For instance, the computer program product would contain the write process and read control program modules shown in FIGS. C 8 and C 9. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

VI. Detailed Description of the Setup Functional Block (STP)

A tiled architecture is a graphic pipeline architecture that associates image data, and in particular geometry primitives, with regions in a 2-D window, where the 2-D window is divided into multiple equally size regions. Tiled architectures are beneficial because they allow a graphics pipeline to efficiently operate on smaller amounts of image data. In other words, a tiled graphics pipeline architecture presents an opportunity to utilize specialized, higher performance graphics hardware into the graphic pipeline.

Those graphics pipelines that do have tiled architectures do not perform mid-pipeline sorting of the image data with respect to the regions of the 2-D window. Conventional graphics pipelines typically sort image data either, in software at the beginning of a graphics pipelines, before any image data transformations have taken place, or in hardware the very end of the graphics pipeline, after rendering the image into a 2-D grid of pixels.

Significant problems are presented by sorting image data at the very beginning of the graphics pipelines. For example, sorting image data at the very beginning of the graphics pipelines, typically involves dividing intersecting primitives into smaller primitives where the primitives intersect, and thereby, creating more vertices. It is necessary for each of these vertices to be transformed into an appropriate coordinate space. Typically this is done by subsequent stage of the graphics pipeline.

Vertex transformation is computationally intensive. Because none of these vertices have yet been transformed into an appropriate coordinate space, each of these vertices will need to be transformed by a subsequent vertex transformation stage of the graphics pipeline into the appropriate coordinates space. Coordinate spaces are known. As noted above, vertex transformation is computationally intensive. Increasing the number of vertices by subdividing primitives before transformation, slows down the already slow vertex transformation process.

Significant problems are also presented by spatially sorting image data at the end of a graphics pipeline (in hardware). For example, sorting image data at the end of a graphic pipeline typically slows image processing down, because such an implementation typically "texture maps" and rasterizes image data that will never be displayed. To illustrate this, consider the following example, where a first piece of geometry is spatially located behind a second piece of opaque geometry. In this illustration, the first piece of geometry will never be displayed.

Removing primitives or parts of primitives that will not be visible in a displayed image frame because, for example, the primitive may be completely or partially hidden behind another primitive is beneficial because it optimizes a graphic pipeline by processing only those image data that will be visible. The process of removing hidden image data is called culling.

Those tiled graphics pipelines that do have tiled architectures do not perform culling operations. Because, as discussed in greater detail above, it is desirable to sort image data mid-pipeline, after image data coordinate transformations have taken place, and before the image data has been texture mapped and/or rasterized, it is also desirable to remove hidden pixels from the image data before the image data has been texture mapped and/or rasterized. Therefore, what is also needed is a tiled graphics pipeline architecture that performs not only, mid-pipeline sorting, but mid-pipeline culling.

In a tile based graphics pipeline architecture, it is desireable to provide a culling unit with accurate image data information on a tile relative basis. Such image data information includes, for example, providing the culling unit those vertices defining the intersection of a primitive with a tile's edges. To accomplish this, the image data must be clipped to a tile. This information should be sent to the mid-pipeline culling unit. Therefore, because a mid-pipeline cull unit is novel and its input requirements are unique, what is also needed, is a structure and method for a mid-pipeline host file sorting setup unit for setting up image data information for the mid pipeline culling unit.

It is desireable that the logic in a mid-pipeline culling unit in a tiled graphics pipeline architecture be as high performance and streamlined as possible. The logic in a culling unit can be optimized for high performance by reducing the number of branches in its logical operations. For example, conventional culling operations typically include logic, or algorithms to determine which of a primitive's vertices lie within a tile, hereinafter referred to as a vertices/tile intersection algorithm. Conventional culling operations typically implement a number of different vertices/tile intersection algorithms to accomplish this, one algorithm for each primitive type.

A culling unit having only one such algorithm to determine whether a line segments or a triangles vertices lie within a tile, as compared to a culling unit having two such algorithms, one for each primitive type, would have fewer branches in its logical operations. In other words, it would be advantageous if, for example, triangles and lines were described using a common set of primitive descriptors. That way, a cull operation could share one algorithm/set of equations/set of hardware to determine whether vertices of triangles and line segments lie within a tile.

A common set of primitive descriptors would allow for the reduction of the number of such vertices/tile intersection algorithms needed to be supported by a culling unit. Such a common set of primitive descriptors would also benefit other stages of a graphic pipeline. For example, a stage setting up indicate information for the culling unit if using a unified primitive description of triangles and lines could also share the same algorithms/set of equations/set of hardware for calculating a primitives minimum depth values and other information. Therefore, what is needed is a unified set of primitive descriptors for describing different primitive types, such that algorithms/sets of equations/sets of hardware may be shared within a stage of the graphics pipeline.

In conventional tile based graphics pipeline architectures, geometry primitive vertices, or x-coordinates and y-coordinates, are typically stored in screen based values. This means that, each vertices' x-coordinates and y-coordinates are typically stored as fixed point numbers with a limited number of fractional bits (sub pixel bits). Usually the representation has to be integer with a certain number of fractional bits.

Because it is desirable to architect a tile based graphics pipeline architecture to be as streamlined as possible, it would be beneficial to represent x-coordinates and y-coordinates in a smaller amount of memory. Therefore, what is needed is a structure and method for representing x-coordinates and y-coordinates in a tile based graphics pipeline architecture, such that memory requirements are reduced.

SUMMARY OF THE INVENTION

Heretofore, graphics pipeline architectures have been limited by sorting image data either prior to the graphics pipeline or in hardware at the end of the graphics pipeline, no tile based graphics pipeline architecture culling units, no mid-pipeline post tile sorting setup units for culling operations, and larger vertices memory storage requirements.

The present invention overcomes the limitations of the state-of-the-art by providing structure and method in a tile based graphics pipeline architecture for: (a) a mid-pipeline post tile sorting setup unit, where the setup unit supplies a mid-pipeline cull unit with tile relative image data information; (b) a unified primitive descriptor language for representing triangles and line segments as quadrilaterals and thereby reducing the edge walking logic architectural requirements of a mid-pipeline culling unit; and, (c) reducing the amount of memory required to accurately, and efficiently represent a primitive's vertices by representing each of a primitive's vertices in tile relative y-values and screen relative x-values.to

5 DETAILED DESCRIPTION OF PREFERRED EMBODIMENTS

The invention will now be described in detail by way of illustrations and examples for purposes of clarity and understanding. Occasionally pseudocode examples are presented to illustrate procedures of the present invention. The pseudocode used is, essentially, a computer language using universal computer language conventions. While the pseudocode employed in this description has been invented solely for the purposes of this description, it is designed to be easily understandable by any computer programmer skilled in the art.

It will be readily apparent to those of ordinary skill in the art in light of the teachings of this invention that certain changes and modifications may be made thereto without departing from the spirit or scope of the appended claims. We first provide a top-level system architectural description. Section headings are provided for convenience and are not to be construed as limiting the disclosure, as all various aspects of the invention are described in the several sections that were specifically labeled as such in a heading.

For purposes of explanation, the numerical precision of the calculations of the present invention is/are based on the precision requirements of previous and subsequent stages of the graphics pipeline. The numerical precision selected depends on a number of factors. Such factors include, for example, the order of operations, the number of operations, the screen size, tile size, buffer depth, sub pixel precision, and precision of the data. Numerical precision issues are known, and for this reason will not be described in greater detail herein.

5.1 System Overview

Important aspects of the structure and method of the present invention include: (1) a mid-pipeline post tile sorting setup—this is beneficial because it supports a mid-pipeline sorting unit and supports a mid-pipeline culling unit; (2) a unified primitive representation for uniformly representing line segments and triangles—this is beneficial because it allows different types of primitives to share common algorithms and hardware elements in subsequent stages of the graphics pipeline; and, (3) tile-relative y-values and screen-relative x-values—this is beneficial because it allows representing spatial data on a region by region bases that is efficient and feasible for a tiled architecture.

Referring to FIG. D 1, there is shown an embodiment of system 100, for performing setup operations in a 3-D graphics pipeline using unified primitive descriptors, post tile sorting setup, tile relative x-values, and screen relative y-values. In particular, FIG. D 1 illustrates how various software and hardware elements cooperate with each other. System 100, utilizes a programmed general-purpose computer 101, and 3-D graphics processor 117. Computer 101 is generally conventional in design, comprising: (a) one or more data processing units ("CPUs") 102; (b) memory 106*a*, 106*b* and 106*c*, such as fast primary memory 106*a*, cache memory 106*b*, and slower secondary memory 106*c*, for mass storage, or any combination of these three types of memory; (c) optional user interface 105, including display monitor 105*a*, keyboard 105*b*, and pointing device 105*c*; (d) graphics port 114, for example, an advanced graphics port ("AGP"), providing an interface to specialized graphics hardware; (e) 3-D graphics processor 117 coupled to graphics port 114 across I/O bus 112, for providing high-performance 3-D graphics processing; and (e) one or more communication busses 104, for interconnecting CPU 102, memory 106, specialized graphics hardware 114, 3-D graphics processor 117, and optional user interface 105.

I/O bus 112 can be any type of peripheral bus including but not limited to an advanced graphics port bus, a Peripheral Component Interconnect (PCI) bus, Industry Standard Architecture (ISA) bus, Extended Industry Standard Architecture (EISA) bus, Microchannel Architecture, SCSI Bus, and the like. In a preferred embodiment, I/O bus 112 is an advanced graphics port pro.

The present invention also contemplates that one embodiment of computer 101 may have a command buffer (not shown) on the other side of graphics port 114, for queuing graphics hardware I/O directed to graphics processor 117.

Memory 106*a* typically includes operating system 108 and one or more application programs 110, or processes, each of which typically occupies a separate address space in memory 106 at runtime. Operating system 108 typically provides basic system services, including, for example, support for an Application Program Interface ("API") for accessing 3-D graphics API's such as Graphics Device Interface, DirectDraw/Direct3-D and OpenGL. DirectDraw/Direct 3-D, and OpenGL are all well-known APIs, and for that reason are not discussed in greater detail herein. The application programs 110 may, for example, include user level programs for viewing and manipulating images.

It will be understood that a laptop or other type of portable computer, can also be used in connection with the present invention, for sorting image data in a graphics pipeline. In addition, a workstation on a local area network connected to a server can be used instead of computer 101 for sorting image data in a graphics pipeline. Accordingly, it should be apparent that the details of computer 101 are not particularly relevant to the present invention. Personal computer 101 simply serves as a convenient interface for receiving and transmitting messages to 3-D graphics processor 117.

Referring to FIG. D 2, there is shown an exemplary embodiment of 3-D graphics processor 117, which may be provided as a separate PC Board within computer 101, as a processor integrated onto the motherboard of computer 101, or as a stand-alone processor, coupled to graphics port 114 across I/O bus 112, or other communication link.

Setup 215 is implemented as one processing stage of multiple processing stages in graphics processor 117. (Setup 215 correlates with "setup stage 8000," as illustrated in U.S. Provisional Patent Application Ser. No. 60/097,336).

Setup 215 is connected to other processing stages 210 across internal bus 211 and signal line 212. Setup 215 is connected to other processing stages 220 across internal bus 216 and signal line 217.

Internal bus 211 and internal bus 216 can be any type of peripheral bus including but not limited to a Peripheral Component Interconnect (PCI) bus, Industry Standard Architecture (ISA) bus, Extended Industry Standard Architecture (EISA) bus, Microchannel Architecture, SCSI Bus, and the like. In a preferred embodiment, internal bus 211 is a dedicated on-chip bus.

5.1.1 Other Processing Stages 210

Referring to FIG. D 3, there is shown an example of a preferred embodiment of other processing stages 210, including, command fetch and decode 305, geometry 310, mode extraction 315, and sort 320. We will now briefly discuss each of these other processing stages 210.

Cmd Fetch/Decode 305, or "CFD 305" handles communications with host computer 101 through graphics port 114. CFD 305 sends 2-D screen based data, such as bitmap blit window operations, directly to backend 440 (see FIG. D 4), because 2-D data of this type does not typically need to be processed further with respect to the other processing stage in other processing stages 210 or other processing stages 240. All 3-D operation data (e.g., necessary transform matrices, material and light parameters and other mode settings) are sent by CFD 405 to the geometry 410.

Geometry 410 performs calculations that pertain to displaying frame geometric primitives, hereinafter, often referred to as "primitives," such as points, line segments, and triangles, in a 3-D model. These calculations include transformations, vertex lighting, clipping, and primitive assembly. Geometry 410 sends "properly oriented" geometry primitives to mode extraction 415.

Mode extraction 315 separates the input data stream from geometry 310 into two parts: (1) spatial data, such as frame geometry coordinates, and any other information needed for hidden surface removal; and, (2) non-spatial data, such as color, texture, and lighting information. Spatial data are sent to setup 215. The non-spatial data are stored into polygon memory (not shown). (Mode injection 415 (see FIG. D 4) with pipeline 200).

Sort 320 sorts vertices and mode information with respect multiple regions in a 2-D window. Source 320 outputs the spatially sorted vertices and mode information on a region-by-region basis to setup 215.

The details of processing stages 210 are not necessary to practice the present invention, and for that reason other processing stages 210 are not discussed in further detail here.

5.1.2 Other Processing Stages 240

Referring to FIG. D 4, there is shown an example of a preferred embodiment of other processing stages 220, including, cull 410, mode injection 415, fragment 420, texture 425, Phong Lighting 430, pixel 435, and backend 440. The details of each of the processing stages in other processing stages 240 is not necessary to practice the present invention. However, for purposes of completeness, we will now briefly discuss each of these processing stages.

Cull 410 receives data from a previous stage in the graphics pipeline, such as setup 405, in region-by-region order, and discards any primitives, or parts of primitives that definitely do not contribute to the rendered image. Cull 410 outputs spatial data that are not hidden by previously processed geometry.

Mode injection 415 retrieves mode information (e.g., colors, material properties, etc . . . ) from polygon memory, such as other memory 235, and passes it to a next stage in graphics pipeline 200, such as fragment 420, as required. Fragment 420 interprets color values for Gouraud shading, surface normals for Phong shading, texture coordinates for texture mapping, and interpolates surface tangents for use in a bump mapping algorithm (if required).

Texture 425 applies texture maps, stored in a texture memory, to pixel fragments. Phong 430 uses the material and lighting information supplied by mode injection 425 to perform Phong shading for each pixel fragment. Pixel 435 receives visible surface portions and the fragment colors and generates the final picture. And, backend 139 receives a tile's worth of data at a time from pixel 435 and stores the data into a frame display buffer.

5.2 Setup 215 Overview

Setup 215 receives a stream of image data from a previous processing stage of pipeline 200 In a preferred embodiment of the present invention the previous processing stage is sort 320 (see FIG. D 3). These image data include spatial information about geometric primitives to be rendered by pipeline 200. The primitives received from sort 320 can be filled triangles, line triangles, lines, stippled lines, and points. These image data also include mode information.

Mode information is information that does not necessarily apply to any one particular primitive, but rather, probably applies to multiple primitives. For example, a 3-D graphics application executing on, for example, computer 101 (see FIG. D 1), during the course or rendering a frame, can clear one or more buffers, including, for example, a color buffer, a depth buffer, and/or a stencil buffer. Color buffers, depth buffers, and stencil buffers are known, and for this reason are not discussed in greater detail herein. An application typically only performs a buffer clear at the very beginning of a frame rendering process. To indicate such buffer clear mode information, a previous stage of pipeline 200 will send the mode information down pipeline 200.

By the time that setup 215 receives the primitives sent by Sort 320, the primitives have already been sorted, by sort 320, on an image frame-by-image frame basis, spatially with respect to multiple regions in a 2-D window. Setup 215 receives each primitive and any corresponding mode information from sort 320 on a region-by-region basis. That is to say, that setup 215 receives all primitives that touch a respective region of a frame of a 2-D window, along with any corresponding mode information, before receiving all of the primitives that touch a different respective region of the 2-D window, along with any of that different respective regions corresponding mode information. In a preferred embodiment of the present invention, each region of the 2-D window is a rectangular tile.

Within each region, the image data is organized in "time order" or in "sorted transparency order." In time order, the time order of receipt by all previous processing stages of pipeline 200 of the vertices and modes within each tile is preserved. That is, for a given tile, vertices and modes are read out of previous stages of pipeline 200 just as they were received, with the exception of when sort 320 is in sorted transparency mode.

In sorted transparency mode, "guaranteed opaque" primitives are received by setup 215 first, before setup 215 receives potentially transparent geometry. In this context, guaranteed opaque means that a primitive completely obscures more distant primitives that occupies the same spatial area in a window. Potentially transparent geometry is any geometry that is not guaranteed opaque.

Setup 215 prepares the incoming image data for processing by cull 410. Cull 410 produces the visible stamp portions, or "VSPs" used by subsequent processing stages in pipeline 200. For purposes of explanation, a stamp is a region two pixels by two pixels in dimension. One pixel contains four sample points. One tile has 16 stamps (8×8). We briefly describe culling here so that the preparatory processing performed by setup 215 in anticipation that culling may be more readily understood.

Cull 410 receives image data from setup 215 in region order (in fact in the order that setup 215 receives the image data from sort 320), and culls out those primitives and parts of primitives that definitely do not contribute to a rendered image. Cull 410 accomplishes this in two stages, the MCCAM cull 410 stage and the Z cull 410 stage. MCCAM cull 410, allows detection of those memory elements in a rectangular, spatially addressable memory array whose "content" (depth values) are greater than a given value. Spatially addressable memory is known.

Z cull 410 refines the work performed by MCCAM cull 410, by doing a sample-by-sample content comparison. A sample-by-sample content comparison means that for each possibly visible stamp, a z-value (depth value), is calculated at each sample within that stamp. The sample-by-sample content comparison refines the work performed by the first stage because busy value at each sample point that is covered by the primitive is compared to a Z-buffer memory to determine which sample points are visible. Z-buffer memory holds the nearest depth value for each sample point and is updated accordingly.

To prepare the incoming image data for processing by MCCAM cull, setup 215, for each primitive: (a) determines the dimensions of a tight bounding box around that part of the primitive that intersects the tile; and, (b) computes a minimum depth value "Zmin," for that part of the primitive that intersects the tile. This is beneficial because MCCAM cull 410 uses the dimensions of the bounding box and the minimum depth value to determine which of multiple "stamps," each stamp lying within the dimensions of the bounding box, may contain depth values less than Zmin. The procedures for determining the dimensions of a bounding box and the procedures for producing a minimum depth value are described in greater detail below.

For purposes of simplifying the description, those stamps that lie within the dimensions of the bounding box are hereinafter referred to as "candidate stamps."

Z cull 410 refines the process of determining which samples are visible by taking these candidates stamps, and if they are part of the primitive, computing the actual depth value for samples in that stamp. This more accurate depth value is then compared, on a sample-by-sample basis, to the z-values stored in the z-buffer memory in cull 410 to determine if the sample is visible. A sample-by-sample basis simply means that each sample is compared individually, as compared to the step where a whole bounding box is compared at once.

Setup 215 also computes depth gradients, line slopes, other reference parameters, and primitive intersection points with respect to a tile edge for cull 410. As discussed above, the minimum depth value and a bounding box are utilized by MCCAM cull 410. The zref and depth gradients are used by Z-cull 410. Line (edge) slopes, intersections, and corners (top and bottom) are used by Z-cull 410 for edge walking.

For those primitives that are lines and triangles, setup 215 calculates spatial derivatives. A spatial derivative is a partial derivative of the depth value. Spatial derivatives are also known as Z-slopes, or depth gradients.

5.2.1 Interface I/O with Other Processing Stages of the Pipeline

Setup 215 interfaces with a previous stage of pipeline 200, for example, sort 320 (see FIG. D 3), and a subsequent stage of pipeline 200, for example, cull 410 (see FIG. D 4). We now discuss sort 320 output packets.

5.2.1.1 Sort 320 Setup 215 Interface

Referring to table 1, there is shown a begin frame packet 1000, for delimiting the beginning of a frame of image data. Begin frame packet 1000 is received by setup 215 from sort 320. Referring to table 2, there is shown an example of a begin tile packet 2000, for delimiting the beginning of that particular tile's worth of image data.

Referring to table 4, there a shown an example of a clear packet 4000, for indicating a buffer clear event. Referring to table 5, there is shown an example of a cull packet 5000, for indicating, among other things the packet type 5010. Referring to table 6, there is shown an example of an end frame packet 6000, for indicating by sort 320, the end of a frame of image data. Referring to table 7, there is shown an example of a primitive packet 7000, for identifying information with respect to a primitive. Sort 320 sends one primitive packet 7000 to setup 215 for each primitive.

5.2.1.2 Setup 215 Cull 410 Interface

Referring to table 8, there is shown an example of setup output primitive packet 8000, for indicating to a subsequent stage of pipeline 200, for example, cull 410, a primitive's information as determined by setup 215. Such information is discussed in greater detail below.

5.2.2 Setup Primitives

To set the context of the present invention, we briefly describe setup primitives, including, for example, polygons, lines, and points.

5.2.2.1 Polygons

Polygons arriving at setup 215 are essentially triangles, either filled triangles or line mode triangles. A filled triangle is expressed as three vertices. Whereas, a line mode triangle is treated by setup 215 as three individual line segments. Setup 215 receives window coordinates (x, y, z) defining three triangle vertices for both line mode triangles and for filled triangles. Note that the aliased state of the polygon (either aliased or anti-aliased) does not alter the manner in which filled polygon setup is performed by setup 215. Line mode triangles are discussed in greater detail below.

5.2.2.2 Lines

Setup 215 converts lines into quadralaterals, or "quads." FIG. D 15 shows example of quadrilaterals generated for line segments. Note that the quadrilaterals are generated differently for aliased and anti-aliased lines. For aliased lines a quadrilateral's vertices also depend on whether the line is x-major or y-major. Setup 215 does not modify the incoming line widths. (See, primitive packet 6000, table 6). Quadrilateral generation is discussed in greater detail below in reference to the quadrilateral generation functional unit.

In a preferred embodiment of the present invention, a line's width is determined prior to setup 215. For example, it can be determined on a 3-D graphics processing application executing on computer 101 (see FIG. D 1).

5.2.2.3 Points

Pipeline 200 renders anti-aliased points as circles and aliased points as squares. Both circles and squares have a width. In a preferred embodiment of the present invention, the determination of a point's size and position are determined in a previous processing stage of pipeline 200, for example, geometry 310.

5.3 Unified Primitive Description

Under the rubric of a unified primitive, we consider a line primitive to be a rectangle and a triangle to be a degenerate rectangle, and each is represented mathematically as such. In other words, setup 215 describes each primitive with a set of four vertices. Note that not all vertex values are needed to describe all primitives. A line segment is treated as a parallelogram, so setup 215 uses all four vertices. To describe a triangle, setup 215 uses a triangle's top vertex, bottom vertex, and either left corner vertex or right corner vertex, depending on the triangle's orientation.

For example, referring to FIG. D 5, where there is shown an example of vertex assignments according to the unified primitive description of the present invention. (FIG. D 5 correlates with FIG. 47 in U.S. Provisional Patent Application Ser. No. 60/097,336) Triangle 505 is described by setup 215 using the triangle's 505 top vertex (X-Top 510, Y-Top 515), bottom vertex (X-Bottom 520, Y-Bottom 525), and right corner vertex (X-Right drive 30, Y-Right 535). Triangle 540 is described by setup 215 using the triangle's 540 top vertex (X-Top 545, Y-Top 550), bottom vertex (X-Boftom 555, Y-Bottom 560,), and left corner vertex (X-Left 565, Y-Left 570).

For purposes of simplifying the disclosure, the following naming convention is adopted: (a) "VT" represents (X-TOP, Y-TOP); (b) "VM" represents (X-MIDDLE, Y-MIDDLE) where X-MIDDLE is either X-RIGHT or X-LEFT, depending on the orientation of the triangle (discussed in greater detail above), and Y-MIDDLE is either Y-RIGHT or Y-LEFT, depending on the orientation of the triangle; and, (c) "VB" represents (X-BOTTOM,Y-BOTTOM).

For purposes of illustrating this convention, the vertices of triangle 505 are mapped to this convention. In this example, VT represents (X-TOP 510,Y-TOP 515); "VM" represents (X-RIGHT 530, Y-RIGHT 535) (VtxLeftC in this example is degenerate); and, "VB" represents (X-BOTTOM 520, Y-BOTTOM 525).

A line segment, is treated as a parallelogram, so setup 215 uses all four vertices to describe a line segment. Note also that while a triangle's vertices are the same as its original vertices, setup 215 generates new vertices to represent a line segment as a parallelogram.

The unified representation of primitives uses two sets of descriptors to represent a primitive. The first set includes vertex descriptors, each of which are assigned to the original set of vertices in window coordinates. Vertex descriptors include, VtxYMin, VtxYmax, VtxXmin and VtxXmax. The second set of descriptors are flag descriptors, or corner flags, used by setup 215 to indicate which vertex descriptors have valid and meaningful values. Flag descriptors include, VtxLeftC, VtxRightC, LeftCorner, RightCorner, VtxTopC, VtxBotC, TopCorner, and BottomCorner. FIG. D 22 illustrates aspects of unified primitive descriptor assignments, including corner flags.

All of these descriptors have valid values for quadrilateral primitives, but all of them may not be valid for triangles. Treating triangles as rectangles according to the teachings of the present invention, involves specifying four vertices, one of which (typically y-left or y-right in one particular embodiment) is degenerate and not specified. To illustrate this, refer to FIG. D 5, and triangle 505, where a left corner vertex is degenerate, or not defined. With respect to triangle 540, a right corner vertex is degenerate. Using primitive descriptors according to the teachings of the present invention to describe triangles and line segments as rectangles provides a nice, uniform way to setup primitives, because the same (or similar) algorithms/equations/calculations/hardware can be used to operate on different primitives, thus allowing an efficient implementation. We now describe the primitive descriptors and how they are used.

We will now described how VtxYmin, VtxYmax, VtxLeftC, VtxRightC, LeftCorner, RightCorner descriptors are obtained. For line segments these descriptors are assigned when the line quad vertices are generated. However, for triangles, setup 215 sorts the triangle's vertices according to their y coordinates. VtxYmin is the vertex with the minimum y value. VtxYmax is the vertex with the maximum y value. VtxLeftC is the vertex that lies to the left of the edge of the triangle formed by joining the vertices VtxYmin and VtxYmax (hereinafter, also referred to as the "long y-edge") in the case of a triangle, and to the left of the diagonal formed by joining the vertices VtxYmin and VtxYmax for parallelograms.

If the triangle is such that the long y-edge is also the left edge, then the flag LeftCorner is FALSE ("0") indicating that the VtxLeftC is degenerate, or not defined. VtxRightC is the vertex that lies to the right of the long y-edge in the case of a triangle, and to the right of the diagonal formed by joining the vertices VtxYmin and VtxYmax for parallelograms. If the triangle is such that the long edge is also the right edge, then the flag RightCorner is FALSE ("0") indicating that the VtxRightC is degenerate, or not defined. A triangle has exactly two edges that share a top most vertex (VtxYmax). Of these two edges, the one edge with an end point furthest left is the left edge. Analogous to this, the one edge with an end point furthest to the right is the right edge.

Note that in practice VtxYmin, VtxYmax, VtxLeftC, and VtxRightC are indices into the original primitive vertices. Setup 215 uses VtxYMin, VtxYmax, VtxLeftC, VtxRightC, LeftCorner, and RightCorner to clip a primitive with respect to the top and bottom edges of the tile.

We now describe how VtxXmin, VtxXmax, VtxTopC, VtxBotC, TopCorner, Bottom Corner descriptors are obtained. For line segments these descriptors are assigned when the line quad vertices are generated. VtxXmin is the vertex with the minimum x value. VtxXmax is the vertex with the maximum x value. VtxTopC is the vertex that lies above the edge joining vertices VtxXmin and VtxXmax (hereinafter, this edge is often referred to as the "long x-edge") in the case of a triangle, and above the diagonal formed by joining the vertices VtxXmin and VtxXmax for parallelograms.

If the triangle is such that the long x-edge is also the "top edge," then the flag TopCorner is FALSE ("0") indicating that the VtxTopC is not defined. Similarly, VtxBotC is the vertex that lies below the long x-axis in the case of a triangle, and below the diagonal formed by joining the vertices VtxXmin and VtxXmax for parallelograms. The top edge is a triangle has to edges that share the maximum x-vertex (VtxXmax). The topmost of these two edges is the "top edge." analogous to disk, the bottom most of these two edges is the "bottom edge."

If the triangle is such that the long x-edge is also the "bottom edge," then the flag BottomCorner is FALSE ("0") indicating that the VtxBotC is not defined. Referring to FIG. D 23, there is shown aspects of mapping long x-edge, long y-edge, top edge, bottom edge, right edge, and left edge.

Note, that in practice VtxXmin, VtxXmax, VtxTopC, and VtxBotC are indices into the original triangle primitive. Setup 215 uses VtxXmin, VtxXmax, VtxTopC, VtxBotC, TopCorner, and BottomCorner to clip a primitive with respect to the left and right edges of a tile. Clipping will be described in greater detail below.

To illustrate the use of the unified primitive descriptors of the present invention, refer to 6, where there is shown an illustration of multiple triangles and line segments described using vertex descriptors and flag descriptors according to a preferred embodiment of the unified primitive description of the present invention.

5.4 High Level Functional Unit Architecture

Setup's 215 I/O subsytem architecture is designed around the need to process primitive and mode information received from sort 315 (see FIG. D 3) in a manner that is optimal for processing by cull 410 (see FIG. D 4). Such primitives include, filled triangles, line triangles, anti-aliased solid lines, aliased solid lines, stippled lines, and aliased and anti-aliased points.

To accomplish this task, setup 215 performs a number of procedures to prepare information about a primitive with respect to a corresponding tile for cull 410. As illustrated in FIG. D6, an examination of these procedures yields the following functional units which implement the corresponding procedures of the present invention: (a) triangle preprocessor 2, for generating unified primitive descriptors, calculating line slopes and reciprocal slopes of the three edges, and determining if a triangle has a left or right corner; (b) line preprocessor 2, for determining the orientation of a line, calculating the slope of the line and the reciprocal, identifying left and right slopes and reciprocal slopes, and discarding end-on lines; (c) point preprocessor 2, for calculating a set of spatial information required by a subsequent culling stage of pipeline 200; (d) trigonometric unit 3, for calculating the half widths of a line, and trigonometric unit for processing anti-aliased lines by increasing a specified width to improved image quality; (d) quadrilateral generation unit 4, for converting lines into quadrilaterals centered around the line, and for converting aliased points into a square of appropriate width; (d) clipping unit 5, for clipping a primitive (triangle or quadrilateral) to a tile, and for generating the vertices of the new clipped polygon; (e) bounding box unit 6, for determining the smallest box that will enclose the new clipped polygon; (f) depth gradient and depth offset unit 7, for calculating depth gradients (dz/dx & dz/dy) of lines or triangles—for triangles, for also determining the depth offset; and, (g) Zmin and Zref unit 8, for determining miimum depth values by selecting a vertex with the smallest Z value, and for calculating a stamp center closest to the Zmin location.

In a preferred embodiment of the present invention triangle preprocessor unit and line preprocessor unit are the same unit.

Figure 3:
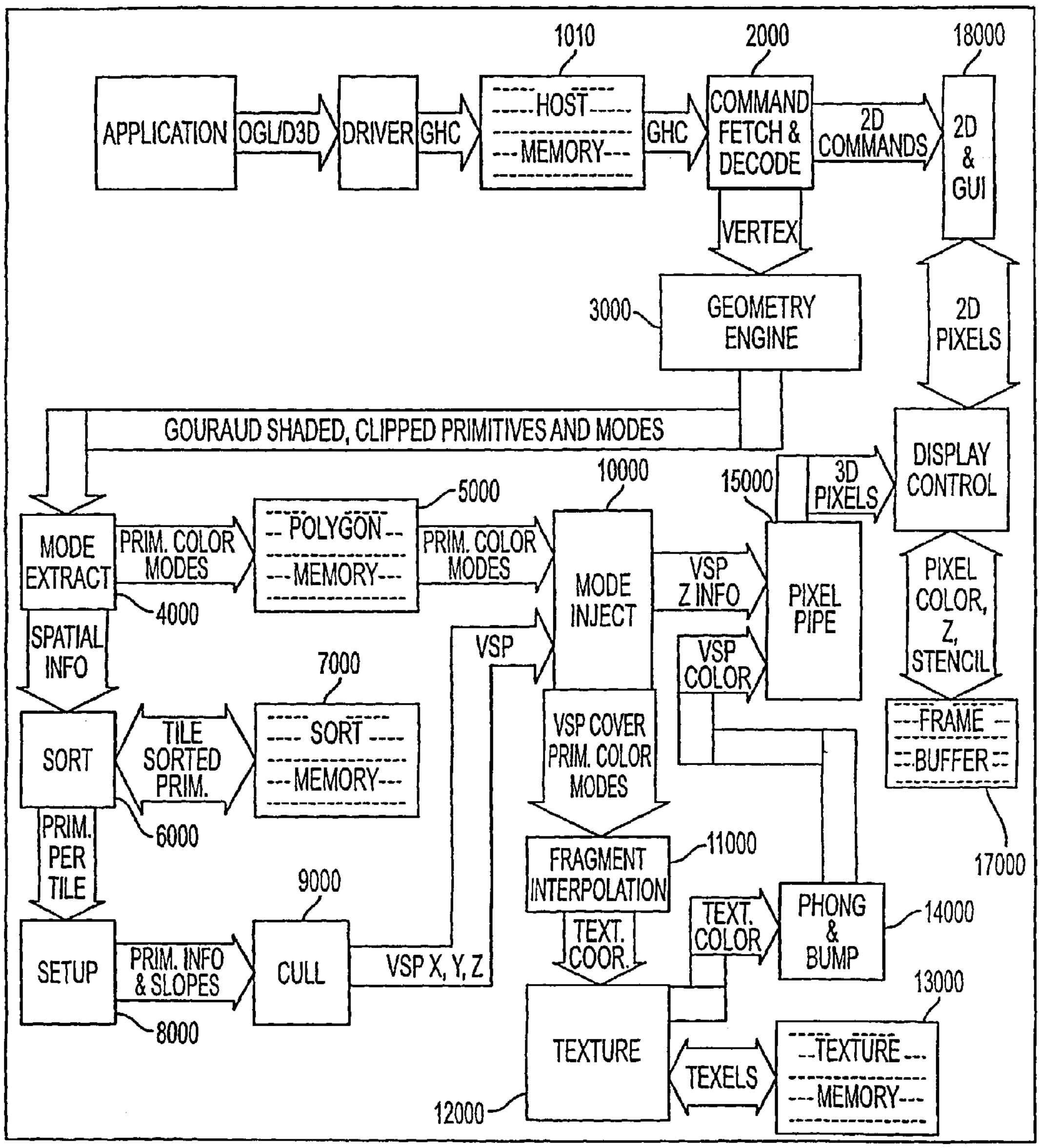
FIG. 3 is a diagrammatic illustration showing an embodiment of the inventive 3-Dimensional graphics pipeline, particularly showing th relationship of the Geometry Engine 3000 with other functional blocks and the Application executing on the host and the Host Memory.

In one embodiment of the present invention, input buffer 1 comprises a queue and a holding buffer. In a preferred embodiment of the present invention, the queue is approximately 32 entries deep by approximately 140 bytes wide. Input data packets from a subsequent process in pipeline 200, for example, sort 320, requiring more bits then the queue is widewill be split into two groups and occupy two entries in the queue. The queue is used to balance the different data rates between sort 320 (see FIG. 3) and setup 215. The present invention contemplates that sort 320 and setup 215 cooperate if input queue 1 reaches capacity. The holding buffer holds vertex information read from a triangle primitive embrace the triangle into the visible edges for line mode triangles.

Output buffer 10 is used by setup 215 to queue image data processed by setup 215 for delivery to a subsequent stage of pipeline 200, for example, cull 410.

FIG. D 6 also illustrates the data flow between the functional units that implement the procedures of the present invention.

The following subsections detail the architecture of each of these functional units.

5.4.1 Triangle Preprocessing

For triangles, Setup starts with a set of vertices, (x0, y0, z0), (x1, y1, z1), and (x2, y2, z2). Setup 215 assumes that the vertices of a filled triangle fall within a valid range of window coordinates, that is to say, that a triangle's coordinates have been clipped to the boundaries of the window. This procedure can be performed by a previous processing stage of pipeline 200, for example, geometry 310 (see FIG. D 3).

The triangle preprocessor: (1) sorts the three vertices in the y direction, to determine the top-most vertex (VtxYmax), middle vertex (either, VtxRightC or VtxLeftC), and bottom-most vertex (VtxYmin); (2) calculates the slopes and reciprocal slopes of the triangles three edges; (3) determines if the y-sorted triangle has a left corner (LeftCorner) or a right corner (RightCorner); (5) sorts the three vertices in the x-direction, to determine the right-most vertex (VtxXmax), middle vertex, and left-most vertex (VtxXmin); and, (6) identifies the slopes that correspond to x-sorted Top (VtxTopC), Bottom (VtxBotC), or Left.

5.4.1.1 Sort With Respect to the Y Axis

The present invention sorts the filled triangles vertices in the y-direction using, for example, the following three equations.

$$Y_1GeY_0=(Y_1>Y_0)|((Y1==Y0)\&(X1>X0))$$

$$Y_2GeY_1=(Y_2>Y_1)|((Y2==Y1)\&(X2>X1))$$

$$Y_0GeY_2=(Y_0>Y_2)|((Y0==Y2)\&(X0>X2))$$

With respect to the immediately above three equations: (a) "Ge" represents a greater than or equal to relationship; (b) the "|" symbol represents a logical "or"; and, (c) the "&" symbol represents a logical "and."

Y1GeY0, Y2GeY1, and Y0GeY2 are Boolean values.

The time ordered vertices are V0, V1, and V2, where V0 is the oldest vertex, and V2 is the nose vertex. Pointers are used by setup 215 to identify which time-ordered vertex corresponds to which Y-sorted vertex, including, top (VtxYmax), middle (VtxLeftC or VtxRightC), and bottom (VtxYmin). For example, $$\text{YsortTopSrc}=\{Y_2GeY_1\&!Y_0GeY_2,\ Y_1GeY_0\ \&\ !Y_2GeY_1,\ !Y_1GeY_0\&Y_1GeY_2\}$$

$$\text{YsortMidSrc}=\{Y_2GeY_1\ \text{Å}!Y_0GeY_2,\ Y_1GeY_0\oplus!Y_2GeY_1,\ !Y_1GeY_0\ \oplus Y_0GeY_2\}$$

$$\text{YsortBotSrc}=\{!Y_2GeY_1\&Y_0GeY_2,\ !Y_1GeY_0\&Y_2GeY_1,\ Y_1GeY_0\&!Y_0GeY_2\}$$

YsortTopSrc represents three bit encoding to identify which of the time ordered vertices is VtxYmax. YsortMidSrc represents three bit encoding to identify which of the time ordered vertices is VtxYmid. YsortBotSrc represents three bit encoding to identify which of the time ordered vertices is VtxYmin.

Next, pointers to identify the destination of time ordered data to y-sorted order are calculated. This is done because these pointers are needed to map information back and forth from y-sorted to time ordered, time ordered to y-sorted, and the like. Analogous equations are used to identify the destination of time ordered data to x-sorted order.

$$\text{Ysort0dest}=\{!Y_1GeY_0\&Y_0GeY_2,\ !Y_1GeY_0\oplus Y_0GeY_2,\ Y_1GeY_0\&!Y_0GeY_2\}$$

$$\text{Ysort1dest}=\{Y_1GeY_0\&!Y_2GeY_1,\ Y_1GeY_0\oplus!Y_2GeY_1,\ !Y_1GeY_0\&Y_2GeY_1\}$$

$$\text{Ysort2dest}=\{Y_2GeY_1\&!Y_0GeY_2,\ Y_2GeY_1\oplus!Y_0GeY_2,\ !Y_2GeY_0\&Y_0GeY_2\}$$

The symbol "!" represents a logical "not." Ysort0dest represents a pointer that identifies that V0 corresponds to which y-sorted vertex.Ysortl dest represents a pointer that identifies that V1 corresponds to which y-sorted vertex. Ysort2dest represents a pointer that identifies that V2 corresponds to which y-sorted vertex.

Call the de-referenced sorted vertices: $V_T=(X_T, Y_T, Z_T)$, $V_B=(X_B, Y_B, Z_B)$, and $V_M=(X_M, Y_M, Z_M)$, where $V_T$ has the largest Y and $V_B$ has the smallest Y. The word de-referencing is used to emphasize that pointers are kept. $V_T$ is VtxYmax, $V_B$ is VtxYmin, and $V_M$ is VtxYmid.

Reciprocal slopes (described in greater detail below) need to be mapped to labels corresponding to the y-sorted order, because V0, V1 and V2 part-time ordered vertices. S01, S12, and S20 are slopes of edges respectively between: (a) V0 and V1; (b) V1 and V2; and, (c) V2 and V0. So after sorting the vertices with respect to y, we will have slopes between $V_T$ and $V_M$, $V_T$ and $V_B$, and $V_M$ abd $V_B$. In light of this, pointers are determined accordingly.

A preferred embodiment of the present invention maps the reciprocal slopes to the following labels: (a) YsortSTMSrc represents STM ($V_T$ and $V_M$) corresponds to which time ordered slope; (b) YsortSTBSrc represents STB ($V_T$ and $V_B$) corresponds to which time ordered slope; and, (c) YsortSMBSrc represents SMB ($V_M$ and $V_B$) corresponds to which time ordered slope.

```
//Pointers to identify the source of the slopes (from time ordered to y-sorted)
//encoding is 3bits, "one-hot" {S12, S01, S20}. One hot means that only one bit can be a //"one."
//1,0,0 reoresents S12; 0,1,0 represens S01; 0,0,1 represents S20.
YsortSTMSrc = {          !Ysort1dest[0] & !Ysort2dest[0],
       !Ysort0dest[0] &  !Ysort1dest[0],
       !Ysort2dest[0] &  !Ysort0dest[0] }
YsortSTBSrc = {          !Ysort1dest[1] & !Ysort2dest[1],
       !Ysort0dest[1] &  !Ysort1dest[1],
       !Ysort2dest[1] &  !Ysort0dest[1] }
```

-continued

| | |
|---|---|
| YsortSMBSrc = { | !Ysort1dest[2] & !Ysort2dest[2], |
| !Ysort0dest[2] & | !Ysort1dest[2], |
| !Ysort2dest[2] & | !Ysort0dest[2] } |

The indices refer to which bit is being referenced.

Whether the middle vertex is on the left or the right is determined by comparing the slopes dx2/dy of line formed by vertices v[i2] and v[i1], and dx0/dy of the line formed by vertices v[i2] and v[i0]. If (dx2/dy>dx0/dy) then the middle vertex is to the right of the long edge else it is to the left of the long edge. The computed values are then assigned to the primitive descriptors. Assigning the x descriptors is similar. We thus have the edge slopes and vertex descriptors we need for the processing of triangles.

5.4.1.2 Slope Determination

The indices sorted in ascending y-order are used to compute a set of (dx/dy) derivatives. And the indices sorted in ascending x-order used to compute the (dy/dx) derivatives for the edges. The steps are (1) calculate time ordered slopes S01, S12, and, S20; (2) map to y-sorted slope STM, SMB, and STB; and, (3) do a slope comparison to map slopes to SLEFT, SRIGHT, and SBOTTOM.

The slopes are calculated for the vertices in time order. That is, (X0, Y0) represents the first vertex, or "V0" received by setup 215, (X1, Y1) represents the second vertex, or "V2" received by setup 215, and (X2, Y2) represents the third vertex, or V3 received by setup 215.

$$S_{01} = \left[\frac{dy}{dx}\right]_{01} = \frac{y_1 - y_0}{x_1 - x_0} \quad \text{(Slope between } V1 \text{ and } V0.\text{)}.$$

$$S_{12} = \left[\frac{dy}{dx}\right]_{12} = \frac{y_2 - y_1}{x_2 - x_1} \quad \text{(Slope between } V2 \text{ and } V1.\text{)}.$$

$$S_{20} = \left[\frac{dy}{dx}\right]_{20} = \frac{y_0 - y_2}{x_0 - x_2} \quad \text{(Slope between } V0 \text{ and } V2.\text{)}.$$

In other processing stages 240 in pipeline 200, the reciprocals of the slopes are also required, to calculate intercept points in clipping unit 5 (see FIG. D 6). In light of this, the following equations are used by a preferred embodiment of the present invention, to calculate the reciprocals of slopes, S01, S12, and S20:

$$SN_{01} = \left[\frac{dx}{dy}\right]_{01} = \frac{x_1 - x_0}{y_1 - y_0} \quad \text{(Reciprocal slope between } V1 \text{ and } V0.\text{)}.$$

$$SN_{12} = \left[\frac{dx}{dy}\right]_{12} = \frac{x_2 - x_1}{y_2 - y_1} \quad \text{(Reciprocal slope between } V2 \text{ and } V1.\text{)}.$$

$$SN_{01} = \left[\frac{dx}{dy}\right]_{01} = \frac{x_1 - x_0}{y_1 - y_0} \quad \text{(Reciprocal slope between } V0 \text{ and } V2.\text{)}.$$

Referring to FIG. D 7, there are shown examples of triangle slope assignments. A left slope is defined as slope of dy/dx where "left edge" is defined earlier. A right slope is defined as slope of dy/dx where "right edge" is defined earlier. A bottom slope is defined as the slope of dy/dx where the y-sorted "bottom edge" is defined earlier. (There is also an x-sorted bottom edge.)

5.4.1.3 Determine Y-sorted Left Corner or Right Corner

Call the de-referenced reciprocal slopes SNTM (reciprocal slope between VT and VM), SNTB (reciprocal slope between VT and VB) and SNMB (reciprocal slope between VM and VB). These de-referenced reciprocal slopes are significant because they represent the y-sorted slopes. That is to say that they identify slopes between y-sorted vertices.

Referring to FIG. D 8, there is shown yet another illustration of slope assignments according to one embodiment of the present invention for triangles and line segments. We will now describe a slope naming convention for purposes of simplifying this detailed description.

For example, consider slope "SlStrtEnd," "Sl" is for slope, "Strt" is first vertex identifier and "End" is the second vertex identifier of the edge. Thus, SlYmaxLeft represents the slope of the left edge—connecting the VtxYMax and VtxLeftC. If leftC is not valid then, SlYmaxLeft is the slope of the long edge. The letter r in front indicates that the slope is reciprocal. A reciprocal slope represents (y/x) instead of (x/y).

Therefore, in this embodiment, the slopes are represented as {SlYmaxLeft, SlYmaxRight, SlLeftYmin, SlRightYmin} and the inverse of slopes (y/x) {rSlXminTop, rSlXminBot, rSlTopXmax, rSlBotXmax}.

In a preferred embodiment of the present invention, setup 215 compares the reciprocal slopes to determine the LeftC or RightC of a triangle. For example, if YsortSNTM is greater than or equal to YsortSNTB, then the triangle has a left corner, or "LeftC" and the following assignments can be made: (a) set LeftC equal to true ("1"); (b) set RightC equal to false ("0"); (c) set YsortSNLSrc equal to YsortSNTMSrc (identify pointer for left slope); (d) set YsortSNRSrc equal to YsortSNTBSrc (identify pointer for right slope); and, (e) set YsortSNBSrc equal to YsortSNMBSrc (identify pointer bottom slope).

However, if YsortSNTM is less than YsortSNTB, then the triangle has a right corner, or "RightC" and the following assignments can be made: (a) set LeftC equal to false ("0"); (b) RightC equal to true ("1"); (c) YsortSNLSrc equal to YsortSNTBSrc (identify pointer for left slope); (d) sortSNRSrc equal to YsortSNTMSrc (identify pointer for right slope); and, (e) set YsortSNBSrc equal to YsortSNMBSrc (identify pointer bottom slope).

5.4.1.4 Sort Coordinates with Respect to the X Axis

The calculations for sorting a triangle's vertices with respect to "y" also need to be repeated for the triangles vertices with respect to "x," because an algorithm used in the clipping unit 5 (see FIG. D 6) needs to know the sorted order of the vertices in the x direction. The procedure for sorting a triangle's vertices with respect to "x" is analogous to the procedure's used above for sorting a triangle's vertices with respect to "y," with the exception, of course, that the vertices are sorted with respect to "x," not "y." however for purposes of completeness and out of an abundance of caution to provide an enabling disclosure the equations for sorting a triangles vertices with respect to "x" are provided below.

For the sort, do six comparisons, including, for example:

$$X_1GeX_0=(X_1>X_0)|((X1==X0)\&(Y1>Y0))$$

$$X_2GeX_1=(X_2>X_1)|((X2==X1)\&(Y2>Y1))$$

$$X_0GeX_2=(X_0>X_2)|((X0==X2)\&(Y0>Y2))$$

The results of these comparisons are used to determine the sorted order of the vertices. Pointers are used to identify which time-ordered vertex corresponds to which Y-sorted vertex. In particular, pointers are used to identify the source (from the time-ordered (V0, V1 and V2) to X-sorted ("destination" vertices VL, VR, and VM)).

$$XsortRhtSrc=\{X_2GeX_1\&!X_0GeX_2,\ X_1GeX_0\&!X_2GeX_1,\ !X_1GeX_0\&X_0GeX_2\}$$

$$XsortMidSrc=\{X_2GeX_1\text{Å}!X_0GeX_2,\ X_1GeX_0\oplus!X_2GeX_1,\ !X_1GeX_0\oplus X_0GeX_2\}$$

$$XsortLftSrc=\{!X_2GeX_1\&X_0GeX_2,\ !X_1GeX_0\&X_2GeX_1,\ X_1GeX_0\&!X_0GeX_2\}$$

Next, setup 215 identifies pointers to each destination (time-ordered to X-sorted).

Xsort0dest={!X1GeX0&X0GeX2, !X1GeX0 X0GeX2, X1GeX0&!X0GeX2}.

Xsort1dest={X1GeX0&!X2GeX1, X1GeX0 !X2GeX1, X1GeX0&X2GeX1}.

Xsort2dest={X2GeX1&!X0GeX2, X2GeX1 !X0GeX2, !X2GeX0&X0GeX2}.

Call the de-referenced sorted vertices VR=(XR, YR, ZR), VL=(XL, YL, ZL), and VM=(XM, YM, ZM), where VR has the largest X and VL has the smallest X. Note that X sorted data has no ordering information available with respect to Y or Z. Note also, that X, Y, and Z are coordinates, "R" equals "right," "L"="left," and "M" equals "middle." Context is important: y-sorted VM is different from x-sorted VM.

The slopes calculated above, need to be mapped to labels corresponding to the x-sorted order, so that we can identify which slopes correspond to which x-sorted edges. To accomplish this, one monument of the present invention determines pointers to identify the source of the slopes (from time ordered to x-sorted). For example, consider the following equations:

$$\begin{aligned}XsortSRMSrc = \{&!\,Xsort1dest[0]\ \&\,!Xsort2dest[0],\\ &!\,Xsort0dest[0]\ \&\,!Xsort1dest[0],\\ &!\,Xsort2dest[0]\ \&\,!Xsort0dest[0];\\ XsortSRLSrc = \{&!\,Xsort1dest[1]\ \&\,!Xsort2dest[1],\\ &!\,Xsort0dest[1]\ \&\,!Xsort1dest[1],\\ &!\,Xsort2dest[1]\ \&\,!Xsort0dest[1]\};\ \text{and,}\\ XsortSMLSrc = \{&!\,Xsort1dest[2]\ \&\,!Xsort2dest[2],\\ &!\,Xsort0dest[2]\ \&\,!Xsort1dest[2],\\ &!\,Xsort2dest[2]\ \&\,!Xsort0dest[2]\},\end{aligned}$$

where, XsortSRMSrc represents the source (V0, V1, and V2) for SRM slope between VR and VM; XsortSRLSrc represents the source for SRL slope, and XsortSMLSrc represents the source for SML slope.

Call the de-referenced slopes XsortSRM (slope between VR and VM), XsortSRL (slope between VR and VL) and XsortSML (slope between VM and VL).

5.4.1.5 Determine X Sorted Top Corner or Bottom Corner and Identify Slopes

Setup 215 compares the slopes to determine the bottom corner (BotC or BottomCorner) or top corner (TopC or TopCorner) of the x-sorted triangle. To illustrate this, consider the following example, where SRM represents the slope between x-sorted VR and VM, and SRL represents the slope coming x-sorted VR and VL. If SRM is greater than or equal to SRL, then the triangle has a BotC and the following assignments can be made: (a) set BotC equal to true ("1"); (b) set TopC equal to false ("0"); (c) set XsortSBSrc equal to XsortSRMSrc (identify x-sorted bot slope); (d) set XsortSTSrc equal to XsortSRLSrc (identify x-sorted top slope); and, (e) set XsortSLSrc equal to XsortSMLSrc (identify x-sorted left slope).

However, if SRM is less than SRL, then the triangle has a top corner (TopCorner or TopC) and the following assignments can be made: (a) set BotC equal to false; (b) set TopC equal to true; (c) set XsortSBSrc equal to XsortSRLSrc (identify x-sorted bot slope); (d) set XsortSTSrc equal to XsortSRMSrc (identify x-sorted top slope); and, (e) set XsortSLSrc equal to XsortSMLSrc (identify x-sorted left slope).

V0, V1, and V2 are time ordered vertices. S01, S12, and S20 are time ordered slopes. X-sorted VR, VL, and VM are x-sorted right, left and middle vertices. X-sorted SRL, SRM, and SLM are slopes between the x-sorted vertices. X-sorted ST, SB, and SL are x-sorted top, bottom, and left vertices. "Source" simply emphasizes that these are pointers to the data. BotC, if true means that there is a bottom corner, likewise for TopC and top corner.

5.4.2 Line Segment Preprocessing

The object of line preprocessing unit 2 (see FIG. D 6) is to: (1) determine orientation of the line segment (a line segment's orientation includes, for example, the following: (a) a determination of whether the line is X-major or Y-major; (b) a determination of whether the line segment is pointed right or left (Xcnt); and, (c) a determination of whether the line segment is pointing up or down (Ycnt).), this is beneficial because Xcnt and Ycnt represent the direction of the line, which is needed for processing stippled line segments; and (2) calculating the slope of the line and reciprocal slope, this is beneficial because the slopes are used to calculate the tile intersection pointed also passed to cull 410 (see FIG. D 4). We will now discuss how this sub unit of the present invention determines a line segment's orientation with respect to a corresponding tile of the 2-D window.

5.4.2.1 Line Orientation

Referring to FIG. D 9, there is shown an example of aspects of line orientation according to one embodiment of the present invention. We now discuss an exemplary procedure used by setup 215 for determining whether a line segment pointing to the right or pointing to the left.

$$DX01=X1-X0.$$

If DX01 is greater than zero, then setup 215 sets XCnt equal to "up," meaning that the line segment is pointing to the right. In a preferred embodiment of the present invention, "up" is represented by a "1," and down is represented by a "0." Otherwise, if DX01 is less than or equal to zero, setup 215 sets XCnt equal to down, that is to say that the line segment is pointing down. DX01 is the difference between X1 and X0.

Determine if the line pointing up or down?

$DY01=Y1-Y0$

If DY01>0

Then Ycnt=up, that is to say that the line is pointing up.
Else Ycnt=dn, that is to say that the line is pointing down.

//Determine Major=X or Y (Is line Xmajor or Ymajor?)

If |DX01|>=|DY01|

Then Major=X
Else Major=Y 5.4.2.2 Line Slopes

Calculation of line's slope is beneficial because both slopes and reciprocal slopes are used in calculating intercept points to a tile edge in clipping unit 5. The following equation is used by setup 215 to determine a line's slope.

$$S_{01}=\left[\frac{dy}{dx}\right]_{01}=\frac{y_1-y_0}{x_1-x_0}$$

The following equation is used by setup 215 to determine a line's reciprocal slope.

$$SN_{01}=\left[\frac{dx}{dy}\right]_{01}=\frac{x_1-x_0}{y_1-y_0}$$

FIG. D 10 illustrates aspects of line segment slopes. Setup 215 now labels a line's slope according to the sign of the slope ($S_{01}$) and based on whether the line is aliased or not. For non-antialiased lines, setup 215 sets the slope of the ends of the lines to zero. (Infinite dx/dy is discussed in greater detail below).

If $S_{01}$ is greater than or equal to 0: (a) the slope of the line's left edge ($S_L$) is set to equal $S_{01}$; (b) the reciprocal slope of the left edge ($SN_L$) is set to equal $SN_{01}$; (c) if the line is anti-aliased, setup 215 sets the slope of the line's right edge ($S_R$) to equal $-S_{01}$, and setup 215 sets the reciprocal slope of the right edge ($SN_R$) to equal $-S_{01}$; (d) if the line is not antialiased, the slope of the lines right edge, and the reciprocal slope of right edge is set to equal zero (infinite dx/dy); (e) LeftCorner, or LeftC is set to equal true ("1"); and, (f) RightCorner, or RightC is set to equal true.

However, if $S_{01}$ less than 0: (a) the slope of the line's right edge ($S_R$) is set to equal $S_{01}$; (b) the reciprocal slope of the right edge ($SN_R$) is set to equal $SN_{01}$; (c) if the line is anti-aliased, setup 215 sets the slope of the line's left edge ($SN_L$) to equal $-S_{01}$, and setup 215 sets the reciprocal slope of the left edge ($SN_L$) to equal $-S_{01}$; (d) if the line is not antialiased, the slope of the lines left edge, and the reciprocal slope of left edge is set to equal zero; (e) LeftCorner, or LeftC is set to equal true ("1"); and, (f) RightCorner, or RightC is set to equal true.

Note the commonality of data:(a) SR/SNR; (b) SUSNR; (c) SB/SNB (only for triangles);(d) LeftC/RightC; and, (e) the like.

To discard end-on lines, or line that are viewed end-on and thus, are not visible, setup 215 determines whether ($y_1-y_0=0$) and ($x_1-x_0=0$), and if so, the line will be discarded.

5.4.2.3 Line Mode Triangles

For drawing the triangles in line mode, the Setup 215 unit receives edge flags in addition to window coordinates (x, y, z) for the three triangle vertices. Referring to table 6, there is shown edge flags (LineFlags) 5, having edge flags. These edge flags 5 tell setup 215 which edges are to be drawn. Setup 215 also receives a "factor" (see table 6, factor (ApplyOffsetFactor) 4) used in the computation of polygon offset. This factor is factor "f" and is used to offset the depth values in a primitive. Effectively, all depth values are to be offset by an amount equal to offset equals max [|Zx|,|Zy|] plus factor. Factor is supplied by user. Zx is equal to dx/dz. Zy is equal to dy/dz. The edges that are to be drawn are first offset by the polygon offset and then drawn as ribbons of width w (line attribute). These lines may also be stippled if stippling is enabled.

For each line polygon, setup 215: (1) computes the partial derivatives of z along x and y. (Note that these z gradients are for the triangle and are needed to compute the z offset for the triangle. These gradients do not need to be computed if >factor=is zero.); (2) computes the polygon offset, if polygon offset computation is enabled, and adds the offset to the z value at each of the three vertices; (3) traverses the edges in order. If the edge is visible, then draws the edge using line attributes such as the width and stipple (setup 215 processes one triangle edge at a time); (4) draw the line based on line attributes such as anti-aliased or aliased, stipple, width, and the like; and, (5) assign appropriate primitive code to the rectangle depending on which edge of the triangle it represents and send it to CUL. A "pPrimitive code" it is an encoding of the primitive type, for example, 01 equals a triangle, 10 equals a line, and 11 equals a point.

5.4.2.4 Stippled Line Processing

Given a line segment, stippled line processing utilizes "stipple information," and line orientation information (see section 5.2.5.2.1 Line Orientation) to reduce unnecessary processing by setup 215 of quads that lie outside of the current tile's boundaries. In particular, stipple preprocessing breaks up a stippled line into multiple individual line segments. Stipple information includes, for example, a stipple pattern (LineStipplePattern) 6 (see table 6), stipple repeat factor (LineStippleRepeatFactor) r 8, stipple start bit (StartLineStippleBit1 and StartLineStippleBit1), for example stipple start bit 12, and stipple repeat start (for example, StartStippleRepeatFactor0) 23 (stplRepeatStart)).

In a preferred embodiment of pipeline 200, Geometry 315 is responsible for computing the stipple start bit 12, and stipple repeat start 23 offsets at the beginning of each line segment. We assume that quadrilateral vertex generation unit 4 (see FIG. D 6) has provided us with the half width displacements.

Stippled Line Preprocessing will break up a stippled line segment into multiple individual line segments, with line lengths corresponding to sequences of 1 bits in a stipple pattern, starting at stplStart bit with a further repeat factor start at stplRepeatStart for the first bit. To illustrate this, consider the following example. If the stplStart is 14, and stplRepeat is 5, and stplRepeatStart is 4, then we shall paint the 14th bit in the stipple pattern once, before moving on to the 15th, i.e. the last bit in the stipple pattern. If both bit 14 and 15th are set, and the 0th stipple bit is nor set, then the quad line segment will have a length of 6.

In a preferred embodiment of the present invention, depth gradients, line slopes, depth offsets, x-direction widths (xhw), and y-direction widths (yhw) are common to all stipple quads if a line segment, and therefore need to be generated only once.

Line segments are converted by Trigonometric Functions and Quadrilateral Generation Units, described in greater detail below (see sections 5.2.5.X and 5.2.5.X, respectively)

into quadrolaterals, or "quads." For antialiased lines the quads are rectangles. For non-antialiased lines the quads are parallelograms.

5.4.3 Point Preprocessing

Referring to FIG. D 12, there is shown an example of an unclipped circle 5 intersecting parts of a tile 15, for illustrating the various data to be determined.

$CY_T$ 20 represents circle's 5 topmost point, clipped by tile's 15 top edge, in tile coordinates. $CY_B$ 30 represents circle's 10 bottom most point, clipped by tile's 15 bottom edge, in tile coordinates. $Y_{offset}$ 25 represents the distance between $CY_T$ 20 and $CY_B$ 30, the bottom of the unclipped circle 10. X0 35 represents the "x" coordinate of the center 5 of circle 10, in window coordinates. This information is required and used by cull 410 to determine which sample points are covered by the point.

This required information for points is obtained with the following calculations:

$V_0=(X_0, Y_0, Z_0)$ (the center of the circle and the Zmin);

$Y_T=Y_0+\text{width}/2$;

$Y_B=Y_0-\text{width}/2$;

$DY_T=Y_T-bot$ (convert to tile coordinates);

$DY_B=Y_B-bot$ (convert to tile coordinates);

$Y_TGtTOP=DYT>='d16$ (check the msb);

$Y_BLtBOt=DY_T<'d0$ (check the sign);

if ($Y_T$GtTop) then $CY_T$=tiletop, else $CY_T=[DY_T]_{8bits}$ (in tile coordinates);

if ($Y_B$LtBot) then, $CY_B$=tilebot, else $CY_B=[D_Y]_{8bits}$ (in tile coordinates); and, $Yoffset=CY_T-DY_B$.

5.4.4 Trigonometric Functions Unit

As discussed above, setup 215 converts all lines, including line triangles and points, into quadrilaterals. To accomplish this, the trigonometric function unit calculates a x-direction half-width and a y-direction half-width for each line and point. (Quadrilateral generation for filled triangles is discussed in greater detail above in reference to triangle preprocessing). Their procedures for generating vertices for line in point quadrilaterals are discussed in greater detail below in reference to the quadrilateral generation unit 4 (see FIG. D 6).

Before the trigonometric-function unit can determine a primitive half-width, it must first calculate the trigonometric functions tan θ, cos θ, sin θ. In a preferred embodiment of the present invention, setup 215 determines the trigonometric functions cos θ and sin θ using the line's slope that was calculated in the line preprocessing functional unit described in great detail above. For example:

$$\tan\theta = S_{10} \quad \sin\theta = \pm\frac{\tan\theta}{\sqrt{1+\tan^2\theta}} \quad \cos\theta = \pm\frac{1}{\sqrt{1+\tan^2\theta}}$$

In yet another embodiment of the present invention the above discussed trigonometric functions are calculated using lookup table and iteration method, similar to rsqrt and other complex math functions. Rsqrt stands for the reciprocal square root.

Referring to FIG. D 13, there is shown an example of the relationship between the orientation of a line and the sign of the resulting cos θ and sin θ. As is illustrated, the signs of the resulting cos θ and sin θ will depend on the orientation of the line.

We will now describe how setup 215 uses the above determined cos θ and sin θ to calculate a primitive's "x" direction half-width ("HWX") and a primitive's "y" direction half width ("HWY"). For each line, the line's half width is offset distance in the x and y directions from the center of the line to what will be a quadrilateral's edges. For each point, the half width is equal to one-half of the point's width. These half-width's are magnitudes, meaning that the x-direction half-widths and the y-direction half-width's are always positive.

For purposes of illustration, refer to FIG. D 14, where there is shown three lines, an antialiased line 1405, a non-aliased x-major line 1410, and a non-aliased y-major line 1415, and their respective associated quadrilaterals, 1420, 1425, and 1430. Each quadrilateral 1420, 1425 and 1430 has a width (W), for example, W 1408, W1413, and W 1418. In a preferred embodiment of the present invention, this width "W" is contained in a primitive packet 6000 (see table 6). (Also, refer to FIG. D 15, where there are shown examples of x-major and -major aliased lines in comparison to an anti-aliased line.).

To determine an anti-aliased line's half width, setup 215 uses the following equations:

$$HWX = \frac{W}{2}|\sin\theta|$$

$$HWY = \frac{W}{2}|\cos\theta|$$

To determine the half width for an x-major, non-antialiased line, setup 215 uses the following equations:

$$HWX = 0$$

$$HWY = \frac{W}{2}$$

To determine the half width for a y-major, non-antialiased line, setup 215 uses the following equations:

$$HWX = \frac{W}{2}$$

$$HWY = 0$$

To determine the half-width for a point, setup 215 uses the following equations:

$$HWX = \frac{W}{2}$$

$$HWY = \frac{W}{2}$$

5.4.5 Quadrilateral Generation Unit The quadrilateral generation functional unit 4 (see FIG. D 6): (1) generates a quadrilateral centered around a line or a point; and, (2) sorts a set of vertices for the quadrilateral with respect to a quadrilateral's top vertex, bottom vertex, left vertex, and right vertex. With respect to quadrilaterals, quadrilateral generation functional unit 4(*a*) converts anti-aliased lines into rectangles; (b) converts non-anti-aliased lines into parallelograms; and, (c) converts aliased points into squares centered around the point. (For filled triangles, the vertices are just passed through to the next functional unit, for example, clipping functional unit 5 (see FIG. D 6)). We now discuss an embodiment of a procedure that quadrilateral generation functional unit 4 takes to generate a quadrilateral for a primitive.

With respect to line segments, a quadrilateral's vertices are generated by taking into consideration: (a) a line segments original vertices (a primitive's original vertices are sent to setup 215 in a primitive packet 6000, see table 6, WindowX0 19, WindowY0 20, WindowZ0 21, WindowX1 14, WindowY1 15, WindowZ1 16, WindowX2 9, WindowY2 10, and, WindowZ2 11); (b) a line segment's orientation (line orientation is determined and discussed in greater detail above in section 5.2.5.2.1); and, (c) a line segment's x-direction half-width and y-direction half-width (half-widths are calculated and discussed in greater detail above in section 5.2.5.4). In particular, a quadrilateral vertices are generated by adding, or subtracting, a line segment's half-widths to the line segment's original vertices.

If a line segment is pointing to the right (Xcnt>0) and the line segment is pointing up (Yxnt>0) then setup 215 performs the following set of equations to determine a set of vertices defining a quadrilateral centered on the line segment:

$$QY0=Y0-HWY\ QX0=X0+HWX$$

$$QY1=Y0+HWY\ QX1=X0-HWX$$

$$QY2=Y1-HWY\ QX2=X1+HWX$$

$$QY3=Y1+HWY,\text{ and }QX3=X1-HWX,\text{ where: QV0, VQV1,}$$

VQV1, QV2, and QV3 are a quadrilateral vertices. The quadrilateral vertices are, as of yet un-sorted, but the equations were chosen, such that they can easily be sorted based on values of Ycnt and Xcnt.

To illustrate this please refer to FIG. D 16, illustrating aspects of pre-sorted vertex assignments for quadrilaterals according to an embodiment of the present invention. In particular, quadrilateral 1605 delineates a line segment that points right and up, having vertices QV0 1606, QV1 1607, QV2 1608, and QV3 1609.

If a line segment is pointing to the left (Xcnt<0) and the line segment is pointing up, then setup 215 performs the following set of equations to determine set of vertices defining a quadrilateral centered on the line segment:

$$QY0=Y0+HWY\ QX0=X0-HWX$$

$$QY1=Y0-HWY\ QX1=X0+HWX$$

$$QY2=Y1+HWY\ QX2=X1-HWX$$

$$QY3=Y1-HWY,\text{ and }QX3=X1+HWX$$

To illustrate this, consider that quadrilateral 1610 delineates a line segment that points left and up, having vertices QV0 1611, QV1 1612, QV2 1613, and QV3 1614.

If a line segment is pointing to the left (Xcnt<0) and the line segment is pointing down (Ycnt<0), then setup 215 performs the following set of equations to determine a set of vertices defining a quadrilateral centered on the line segment:

$$QY0=Y0+HWY\ QX0=X0+HWX$$

$$QY1=Y0-HWY\ QX1=X0-HWX$$

$$QY2=Y1+HWY\ QX2=X1+HWX$$

$$QY3=Y1-HWY,\text{ and }QX3=X1-HWX$$

To illustrate this, consider that quadrilateral 1615 delineates a line segment that points left and down, having vertices QV0 1616, QV1 1617, QV2 1618, and QV3 1619.

If a line segment is pointing right and the line segment is pointing down, then setup 215 performs the following set of equations to determine a set of vertices defining a quadrilateral centered on the line segment:

$$QY0=Y0-HWY\ QX0=X0-HWX$$

$$QY1=Y0+HWY\ QX1=X0+HWX$$

$$QY2=Y1-HWY\ QX2=X1-HWX$$

$$QY3=Y1+HWY,\text{ and }QX3=X1+HWX$$

To illustrate this, consider that quadrilateral 1620 delineates a line segment that points right and down, having vertices QV0 1621, QV1 1622, QV2 1623, and QV3 1624.

In a preferred embodiment of the present invention, a vertical line segment is treated as the line segment is pointing to the left and top. A horizontal line segment is treated as if it is pointing right and up. A point is treated as a special case, meaning that it is treated as if it were a vertical line segment.

These vertices, QX0, QX1, QX2, QX3, QY0, QY1, QY2, AND QY3, for each quadrilateral are now reassigned to top (QXT, QYT, QZT), bottom (QXB, QYB, QZB), left (QXL, QYL, QZL), and right vertices (QXR, QYR, QZR) by quadrilateral generation functional unit 4 to give the quadrilateral the proper orientation to sort their vertices so as to identify the top list, bottom, left, and right most vertices, where the Z-coordinate of each vertex is the original Z-coordinate of the primitive.

To accomplish this goal, quadrilateral generation functional unit xxx uses the following logic. If a line segment is pointing up, then the top and bottom vertices are assigned according to the following equations: (a) vertices (QXT, QYT, QZT) are set to respectively equal (QX3, QY3, Z1); and, (b) vertices (QXB, QYB, QZB) are set to respectively equal (QX0, QY0, Z0). If a line segment is pointing down, then the top and bottom vertices are assigned according to the following equations: (a) vertices (QXT, QYT, QZT) are set to respectively equal (QX0, QY0, Z0); and, (b) vertices (QXB, QYB, QZB) are set to respectively equal (QX3, QY3, Z1).

If a line segment is pointing right, then the left and right vertices are assigned according to the following equations: (a) vertices (QXL, QYL, QZL) are set to respectively equal (QX1, QY1, Z0); and, vertices (QXR, QYR, QZR) are set to respectively equal (QX2, QY2, Z1). Finally, if a line segment is pointing love, the left and right vertices are assigned according to the following equations: (a) vertices (QXL, QYL, QZL) are set to respectively equal (QX2, QY2, Z1); and, (b) vertices (QXR, QYR, QZR) are set to respectively equal (QX1, QY1, Z0).

5.4.6 Clipping Unit

For purposes of the present invention, clipping a polygon to a tile can be defined as finding the area of intersection between a polygon and a tile. The clip points are the vertices of this area of intersection.

To find a tight bounding box that encloses parts of a primitive that intersect a particular tile, and to facilitate a subsequent determination of the primitive's minimum depth value (Zmin), clipping unit 5 (see FIG. D 6), for each edge of a tile: (1) selects a tile edge from a tile (each tile has four edges), to determine which, if any of a quadrilateral's edges, or three triangle edges, cross the tile edge; (b) checks a clip codes (discussed in greater detail below) with respect to the selected edge; (c) computes the two intersection points (if any) of a quad edge or a triangle edge with the selected tile edge; (d) compare computed intersection points to tile boundaries to determine validity and updates the clip points if appropriate.

The "current tile" is the tile currently being set up for cull 410 by setup 215. As discussed in greater detail above, a previous stage of pipeline 200, for example, sort 320, sorts each primitive in a frame with respect to those regions, or tiles of a window (the window is divided into multiple tiles) that are touched by the primitive. These primitives were sent in a tile-by-tile order to setup 215. It can be appreciated, that with respect to clipping unit 5, setup 215 can select an edge in an arbitrary manner as long as each edge is eventually selected. For example, in one embodiment of clipping unit 5 can first select a tile's top edge, next the tile's right edge, next the tile's bottom edge, and finally the tiles left edge. In yet another embodiment of clipping unit 5, the tile edges may be selected in a different order.

Sort 320 (see FIG. D 3) provides setup 215 the x-coordinate for the current tile's left tile edge, and the y-coordinate for the bottom right tile edge via a primitive packet 6000 (see FIG. D 6). These values are respectively labeled tile x and tile y. To identify a coordinate location for each edge of the current tile, clipping unit 5 sets the left edge of tile equal to tile x, which means that left tile edge x-coordinate is equal to tile x+0. The current tile's right edge is set to equal the tiles left edge plus the width of the tile. The current tile's bottom edges set to equal tile y, which means that this y-coordinate is equal to tile y+0. Finally, the tile's top edge is set to equal and the bottom tile edge plus the height of the tile in pixels.

In a preferred embodiment of the present invention, the width and height of a tile is 16 pixels. However, and yet other embodiments of the present invention, the dimensions of the tile can be any convenient size.

5.4.6.1 Clip Codes

Clip codes are used to determine which edges of a polygon (if any) that touches the current tile (A previous stage of pipeline 200 has sorted each primitive with respect to those tiles of a 2-D window that each respective primitive touches. In one embodiment of the present invention, clip codes are Boolean values, wherein "0" represents false and "1" represents true. A clip code value of false indicates that a primitive does not need to be clipped with respect to the edge of the current tile that that particular clip code represents. Whereas, a value of true indicates that a primitive does need to be clipped with respect to the edge of the current tile that that particular clip code represents.

To illustrate how one embodiment of the present invention determines clip codes for a primitive with respect to the current tile, consider the following pseudocode, wherein there is shown a procedure for determining clip codes. As noted above, the pseudocode used is, essentially, a computer language using universal computer language conventions. While the pseudocode employed here has been invented solely for the purposes of this description, it is designed to be easily understandable by any computer programmer skilled in the art.

In one embodiment of the present invention, clip codes are obtained as follows for each of a primitives vertices.

```
C[i]=((v[i].y>tile_ymax)<<3)||((v[i].x<tile_xmin)<<2)||((v[i].y<tile_ymin)<<1)||(v[i].x>tile_xmax)),
```

where, for each vertex of a primitive: (a) C[i] represents a respective clip code; (b) v[i].y represents a y vertex; (c) tile_ymax represents the maximum y-coordinate of the current tile; (d) v[i].x represents an x vertex of the primitive; (e) tile_xmin represents the minimum x-coordinate of the current tile; (f) tile_ymin represents the minimum y-coordinates of the current tile; and, (g) tile_xmax represents the maximum x-coordinate of the current tile. In this manner, the boolean values corresponding to the clip codes are produced.

In yet another embodiment of the present invention, clip codes are obtained using the following set of equations: (1) in case of quads then use the following mapping, where "Q" represents a quadrilaterals respective coordinates, and TileRht, TileLft, TileTop and TileBot respectively represent the x-coordinate of a right tile edge, the x-coordinate of a left tile edge, the y-coordinate of a top tile edge, and the y-coordinate of a bottom tile edge.

```
(X0, Y0)=(QXBot, QYBot); (X1,Y1)=(QXLft, QYLft);
(X2,Y2)=(QXRht, QYRht); (X3,Y3)=(QXTop, QYTop);
//left
ClpFlagL[3:0]={(X3<=TileLft), (X2<=TileLft),
  (X1<=TileLft), (X0<=TileLft)}
//right
ClpFlagR[3:0]={(X3>=TileRht), (X2>=TileRht),
  (X1>=TileRht), (X0>=TileRht)}
//down
ClpFlagD[3:0]={(Y3<=TileBot), (Y2<=TileBot),
  (Y1<=TileBot), (Y0<=TileBot)}
//up
ClpFlagU[3:0]={(Y3>=TileTop), (Y2>=TileTop),
  (Y1>=TileTop), (Y0>=TileTop)}
```

(ClpFlag[3] for triangles is don't care.). ClpFlagL[1] asserted means that vertex 1 is clipped by the left edge of the tile (the vertices have already been sorted by the quad generation unit 4, see FIG. D 6). ClpFlagR[2] asserted means that vertex2 is clipped by right edge of tile, and the like. Here are "clipped" means that the vertex lies outside of the tile.

5.4.6.2 Clipping Points

After using the clip codes to determine that a primitive intersects the boundaries of the current tile, clipping unit 5 clips the primitive to the tile by determining the values of nine possible clipping points. A clipping point is a vertex of a new polygon formed by clipping (finding area of intersection) the initial polygon by the boundaries of the current tile. There are nine possible clipping points because there are eight distinct locations were a polygon might intersect a tile's edge. For triangles only, there is an internal clipping point which equals y-sorted VtxMid. Of these nine possible clipping points, at most, eight of them can be valid at any one time.

For purposes of simplifying the discussion of clipping points in this specification, the following acronyms are adopted to represent each respective clipping point: (1) clipping on the top tile edge yields left (PTL) and right (PTR) clip vertices; (b) clipping on the bottom tile edge is performed identically to that on the top tile edge. Bottom edge clipping yields the bottom left (PBL) and bottom right (PBR) clip vertices; (c) clipping vertices sorted with respect to the x-coordinate yields left high/top (PLT) and left low/bottom (PLB) vertices; (d) clipping vertices sorted with respect to the y-coordinate yields right high/top (PRT) and right low/bottom (PRB); and, (e) vertices that lie inside the tile are assigned to an internal clipping point (PI). Referring to FIG. 17, there is illustrated clipping points for two polygons, a rectangle 10 and a triangle 10 intersecting respective tiles 15 and 25.

5.4.6.3 Validation of Clipping Points

Clipping unit 5 (see FIG. D 6) now validates each of the computed clipping points, making sure that the coordinates of each clipping point are within the coordinate space of the current tile. For example, points that intersect the top tile edge may be such that they are both to the left of the tile. In this case, the intersection points are marked invalid.

In a preferred embodiment of the present invention, each clip point has an x-coordinate, a y-coordinate, and a one bit valid flag. Setting the flag to "0" indicates that the x-coordinate and the y-coordinate are not valid. If the intersection with the edge is such that one or both off a tile's edge corners (such corners were discussed in greater detail above in section are included in the intersection, then newly generated intersection points are valid.

A primitive is discarded if none of its clipping points are found to be valid.

The pseudo-code for an algorithm for determining clipping points according to one embodiment of the present invention, is illustrated below:

Notation Note: P=(X, Y), eg. PT=(XT, YT);

Line (P1,P0) means the line formed by endpoints P1 and P0;

```
//Sort the Clip Flags in X
XsortClpFlagL[3:0]=LftC & RhtC ? ClpFlagL[3:0]:
ClpFlagL[XsortMidSrc,XsortRhtSrc,XsortLftSrc,Xsort-
  MidSrc], where indices of clip flags 3:0 referred to
  vertices. In particular. 0 represents bottom; 1 represents
  left; 2 represents right; and 3 represents top. For example,
  ClipFlagL[2] refers to time order vertex 2 is clipped by
  left edge. XsortClipFlagL[2] refers to right most vertex.
XsortClpFlagR[3:0]=LftC & RhtC ? CIpFlagR[3:0]:
ClpFlagR[XsortMidSrc,XsortRhtSrc,XsortLftSrc,Xsort-
  MidSrc]
XsortClpFlagD[3:0]=LftC & RhtC ? CIpFlagD[3:0]:
ClpFlagD[XsortMidSrc,XsortRhtSrc,XsortLftSrc,Xsort-
  MidSrc]
XsortClpFlagU[3:0]=LftC & RhtC ? CIpFlagU[3:0]:
CipFlagU[XsortMidSrc,XsortRhtSrc,XsortLftSrc,Xsort-
  MidSrc]
//Sort the Clip Flags in Y
YsortClpFlagL[3:0]=LftC & RhtC ? ClpFlagL[3:0]:
ClpFlagL[YsortTopSrc,YsortMidSrc,YsortMidSrc,Ysort-
  BotSrc]
YsortClpFlagR[3:0]=LftC & RhtC ? CIpFlagR[3:0]:
ClpFlagR[YsortTopSrc,YsortMidSrc,YsortMidSrc,Ysort-
  BotSrc]
YsortClpFlagD[3:0]=LftC & RhtC ? CIpFlagD[3:0]:
ClpFlagD[YsortTopSrc,YsortMidSrc,YsortMidSrc,Ysort-
  BotSrc]
YsortClpFlagU[3:0]=LftC & RhtC ? ClpFlagU[3:0]:
ClpFlagU[YsortTopSrc,YsortMidSrc,YsortMidSrc,Ysort-
  BotSrc]
```

```
// Pass #1 Clip to Left Tile edge using X-sorted primitive
// For LeftBottom: check clipping flags, dereference vertices and slopes
If (XsortClipL[0])                // bot vertex clipped by TileLeft)
Then
        Pref =     (quad)     ? P2
BotC    ? XsortRhtSrc-mux(P0, P1, P2)
TopC    ? XsortRhtSrc-mux(P0, P1, P2)
        Slope = (quad)? SL:     BotC     ? XsortSBTopC ? XsortSB
Else
        Pref =     (quad)     ? P0:
BotC    ? XsortMidSrc ®mux(P0, P1, P2)
TopC    ? XsortRhtSrc
        Slope =                   (quad)   ? SR:
BotC    ? XsortSL
TopC    ? XsortSB
EndIf
YLB = Yref + slope * (TileLeft − Xref)
// For LeftBottom: calculate intersection point, clamp, and check validity
IntYLB = (XsortClpFlgL[1])     ?    Yref + slope * (TileLeft − Xref):
                                    XsortLftSrc-mux(Y0, Y1, Y2)
ClipYLB = (intYLB < TileBot) ?      TileBot:
IntXBL
ValidYLB = (intYBL <= TileTop)
//For LeftTop: check clipping flags, dereference vertices and slopes
If (XsortClpFlagL[3])             // Top vertex clipped by TileLeft)
Then
        Pref =     (quad)     ? P2:
BotC    ? XsortRhtSrc-mux(P0, P1, P2):
TopC    ? XsortRhtSrc-mux(P0, P1, P2):
        Slope =    (quad)     ? SR:
                   BotC       ? XsortST
                   TopC       ? XsortST
Else
        Pref =     (quad)     ? P3:
                   BotC       ? XsortRhtSrc-mux(P0, P1, P2)
                   TopC       ? XsortMidSrc-mux(P0, P1, P2)
        Slope =               (quad)     ? SL:
                   BotC       ? XsortST:
                   TopC       ? XsortSL
EndIf
YLT = Yref + slope * (TileLeft − Xref)
// For LeftTop: calculate intersection point, clamp, and check validity
IntYLT = (XsortClpFlgL[1])     ?    Yref + slope * (TileLeft − Xref)
                                    XsortLftSrc-mux(Y0, Y1, Y2)
ClipYLT = (intYLT > TileTop) ?      TileTop:
                                    IntYLT
ValidYLT = (intYLT >= TileBot)
// The X Left coordinate is shared by the YLB and YLT
ClipXL = (XsortClpFlg1[1])     ?    TileLeft:
                                    XsortLftSrc-mux(X0, X1, X2)
ValidClipLft = ValidYLB & VaIidYLT
// Pass #2 Clip to Right Tile edge using X-sorted primitive
//For RightBot: check clipping flags, dereference vertices and slopes
If (XsortClpFlagR[0])             //Bot vertex clipped by TileRight
Then
        Pref =     (quad)     ? P0:
BotC    ? XsortMidSrc-mux(P0, P1, P2)
TopC    ? XsortRhtSrc-mux(P0, P1, P2)
        Slope =               (quad)     ? SR:
BotC    ? XsortSL
TopC    ? XsortSB
Else
        Pref =     (quad)     ? P2:
BotC    ? XsortRhtSrc-mux(P0, P1, P2)
TopC    ? XsortRhtSrc-mux(P0, P1, P2)
        Slope =               (quad)     ? SL:
                   BotC       ? XsortSB
                   TopC       ? XsortSB
EndIf
// For RightBot: calculate intersection point, clamp, and check validity
IntYRB = (XsortClpFlgR[2]) ?        Yref + slope * (TileRight − Xref):
                                      XsortRhtSrc-mux(Y0, Y1, Y2)
ClipYRB = (intYRB < TileBot) ?        TileBot:
IntYRB
ValidYRB = (intYRB <= TileTop)
```

-continued

```
//For RightTop: check clipping flags, dereference vertices and slopes
If (XsortClpFlagR[3])           // Top vertex clipped by TileRight
Then
        Pref =      (quad)      ? P3:
BotC    ? XsortRhtSrc-mux(P0, P1, P2)
                    TopC  ? XsortMidSrc-mux(P0, P1, P2)
        Slope =             (quad)     ? SL:
                    BotC        ? XsortST:
                    TopC        ? XsortSL
Else
        Pref =      (quad)      ? P2:
BotC    ? XsortRhtSrc-mux(P0, P1, P2)
Topc    ? XsortRhtSrc-mux(P0, P1, P2)
        Slope =     (quad)      ? SR:
                    BotC        ? XsortST
                    TopC        ? XsortST
EndIf
YRT = Yref + slope * (TileRight − Xref)
// For RightTop: calculate intersection point, clamp, and check validity
IntYRT = (XsortClpFlgR[2]) ?         Yref + slope * (TileRight − Xref)
                                        XsortRhtSrc-mux(Y0, Y1, Y2)
ClipYRT = (intYRT > TileTop) ?          TileTop:
                                        IntYRT
Valid YRT = (intYRT >= TileBot)
// The X right coordinate is shared by the YRB and YRT
ClipXR = (XsortClpFlgR[2]) ?         TileRight:
                                        XsortRhtSrc-mux(X0, X1, X2)
ValidClipRht = ValidYRB & ValidYRT
// Pass #3 Clip to Bottom Tile edge using Y-sorted primitive
// For BottomLeft: check clipping flags, dereference vertices and slopes
If (YsortClpFlagD[1])           // Left vertex clipped by TileBot
Then
        Pref =      (quad)      ? P3:
LeftC   ? YsortTopSrc-mux(P0, P1, P2)
RhtC    ? YsortTopSrc-mux(P0, P1, P2)
        Slope =             (quad)     ? SNL:
                    LeftC       ? YsortSNL
                    RightC      ? YsortSNL
Else
        Pref =      (quad)      ? P1:
                    LeftC       ? YsortMidSrc-mux(P0, P1, P2)
                    RhtC        ? YsortTopSrc-mux(P0, P1, P2)
        Slope =             (quad)     ? SNR:
LeftC   ? YsortSNB
RightC  ? YsortSNL
EndIf
// For BottomLeft: calculate intersection point, clamp, and check validity
IntXBL = (YsortClpFlgD[0]) ?         Xref + slope * (TileBot − Yref):
                                        YsortBotSrc-mux(X0, X1, X2)
ClipXBL = (intXBL < TileLeft) ?         TileLeft:
IntXBL
ValidXBL = (intXBL <= TileRight)
//For BotRight: check clipping flags, dereference vertices and slopes
If (YsortClpFlagD[2])           // Right vertex clipped by TileBot)
Then
        Pref =      (quad)      ? P3:
LeftC   ? YsoftTopSrc-mux(P0, P1, P2)
RhtC    ? YsoftTopSrc-mux(P0, P1, P2)
        Slope =     (quad)      ? SNR:
                    LeftC       ? YsortSNR
                    RightC      ? YsortSNR
Else
        Pref =      (quad)      ? P2:
LeftC   ? YsortTopSrc-mux(P0, P1, P2)
RhtC    ? YsortMidSrc-mux(P0, P1, P2)
        Slope =             (quad)     ? SNL:
                    LeftC       ? YsortSNR:
                    RightC      ? YsortSNB
EndIf
// For BotRight: calculate intersection point, clamp, and check validity
IntXBR = (YsortClpFlgD[0]) ?         Xref + slope * (TileBot − Yref)
                                        YsortBotSrc-mux(X0, X1, X2)
ClipXBR = (intXBR > TileRight) ?        TileRight:
                                        IntXTR
ValidXBR = (intXBR >= TileLeft)
// The Y bot coordinate is shared by the XBL and XBR
ClipYB = (YsortClpFlgD[0]) ?         TileBot:
                                        YsortBotSrc-mux(Y0, Y1, Y2)
ValidClipBot = ValidXBL & ValidXBR
```

-continued

```
// Pass #4 Clip to Top Tile edge using Y-sorted primitive
//For TopLeft: check clipping flags, dereference vertices and slopes
If (ClpFlagU[1])                //Left vertex clipped by TileTop
Then
        Pref =      (quad)      ? P1:
LftC    ? YsortMidSrc-mux(P0, P1, P2)
RhtC    ? YsortTopSrc-mux(P0, P1, P2)
        Slope =             (quad)     ? SNR:
LeftC   ? YsortSNB
RightC  ? YsortSNL
Else
        Pref =      (quad)      ? P3:
LftC    ? YsortTopSrc-mux(P0, P1, P2)
RhtC    ? YsortTopSrc-mux(P0, P1, P2)
        Slope =             (quad)     ? SNL:
                    LeftC       ? YsortSNL
                    RightC      ? YsortSNL
EndIf
// For topleft: calculate intersection point, clamp, and check validity
IntXTL = (YsortClpFlgU[3]) ?         Xref + slope * (TileTop − Yref):
                                        YsortTopSrc-mux(X0, X1, X2)
ClipXTL = (intXTL < TileLeft) ?         TileLeft:
IntXTL
ValidXTL = (intXTL <= TileRight)
//For TopRight: check clipping flags, dereference vertices and slopes
If (YsortClpFlagU[2])           // Right vertex clipped by TileTop
Then
        Pref =      (quad)      ? P2:
LftC    ? YsortTopSrc-mux(P0, P1, P2)
RhtC    ? YsortMidSrc-mux(P0, P1, P2)
        Slope =             (quad)     ? SNL:
                    LeftC       ? YsortSNR:
                    RightC      ? YsortSNB
Else
Pref =                  (quad)      ? P3:
LftC    ? YsoftTopSrc-mux(P0, P1, P2)
RhtC    ? YsoftTopSrc-mux(P0, P1, P2)
        Slope =             (quad)     ? SNR:
                    LeftC       ? YsortSNR:
                    RightC      ? YsortSNR
EndIf
// For TopRight: calculate intersection point, clamp, and check validity
IntXTR = (YsortClpFlgU[3]) ?         Xref + slope * (TileTop − Yref)
                                        YsortTopSrc-mux(X0, X1, X2)
ClipXTR = (intXTR > TileRight) ?        TileRight:
                                        IntXTR
Valid XTR = (intXTR >= TileLeft)
// The Y top coordinate is shared by the XTL and XTR
ClipYT = (YsortClpFlgU[3]) ?         TileTop:
                                        YsortTopSrc-mux(Y0, Y1, Y2)
ValidClipTop = ValidXTL & ValidXTR
```

The 8 clipping points identifed so far can identify points clipped by the edge of the tile and also extreme vertices (ie topmost, bottommost, leftmost or rightmost) that are inside of the tile. One more clipping point is needed to identify a vertex that is inside the tile but is not at an extremity of the polygon (ie the vertex called VM)

```
// Identify Internal Vertex
(ClipXI, ClipYI) = YsortMidSrc-mux(P0, P1, P2)
ClipM = XsortMidSrc-mux(Clip0, Clip1, Clip2)
ValidClipI =     !(ClpFlgL[YsortMidSrc]) & !(ClpFlgR[YsortMidSrc])
            &    !(ClpFlgD[YsortMidSrc]) & !(ClpFlgU[YsortMidSrc])
```

Geometric Data Required By CUL

Furthermore, some of the geometric data required by Cull Unit is determined here. Geometric data required by cull:

CullXTL and CullXTR. These are the X intercepts of the polygon with the line of the top edge of the tile. They are different from the PTL and PTR in that PTL and PTR must be within or at the tile boundaries, while CullXTL and CullXTR may be right or left of the tile boundaries. If YT lies below the top edge of the tile then CullXTL=CullXTR=XT.

CullYTLR: the Y coordinate shared by CullXTL and CullXTR (CullXL, CullYL): equal to PL, unless YL lies above the top edge. In which case, it equals (CullXTL, CullYTLR)

(CullXR, CullYR): equal to PR, unless YR lies above the top edge. In which case, it equals (CullXTR, CullYTLR)

```
// CullXTL and CullXTR (clamped to window range)
CullXTL = (IntXTL < MIN) ?MIN:          IntXTL
CullXTR = (IntXTR > MAX) ?MAX :IntXTR
// (CullXL, CullYL) and (CullXR, CullYR)
VtxRht =                (quad)       ?P2 :YsortMidSrc-mux(P0, P1, P2)
VtxLft = (quad) ?P1:                YsortMidSrc-mux(P0, P1, P2)
(CullXL, CullYL)temp = (YsortClipL clipped by TileTop) ?(IntXTL, IntYT) :VtxLft
(CullXL, CullYL) = (CullXLtemp < MIN) ?     (ClipXL, ClipYLB) :CullXLtemp
(CullXR, CullYR)temp = (YsortClipR clipped by TileTop) ?(IntXTR, IntYT) :VtxRht
(CullXR, CullYR) = (CullXRtemp > MAX) ?(ClipXR, ClipYRB) :CullXRtemp
// Determine Cull Slopes
```

CullSR, CullSL, CullSB=cvt(YsortSNR, YsortSNL, YsortSNB)

5.4.6.4 Quadrilateral Vertices Outside of Window

Figure 51:
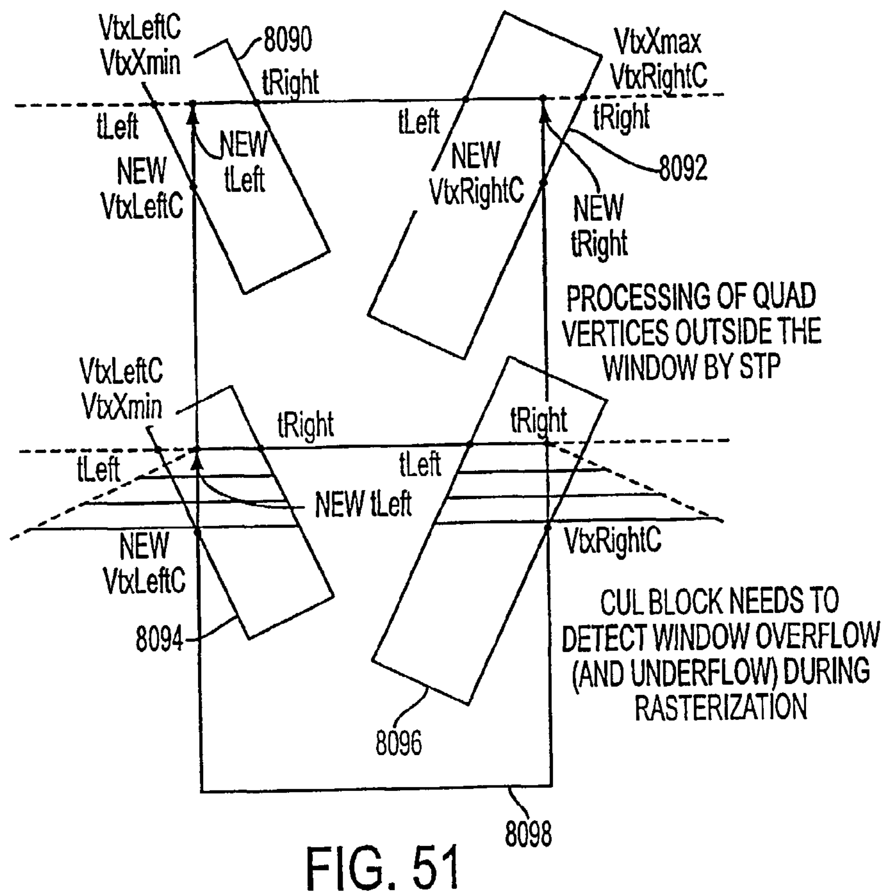
FIG. 51 is a diagrammatic illustration showing an aspect of how Setup represents lines and triangles, including aspects of how Setup passes particular values to CUL.
Figure 52A:
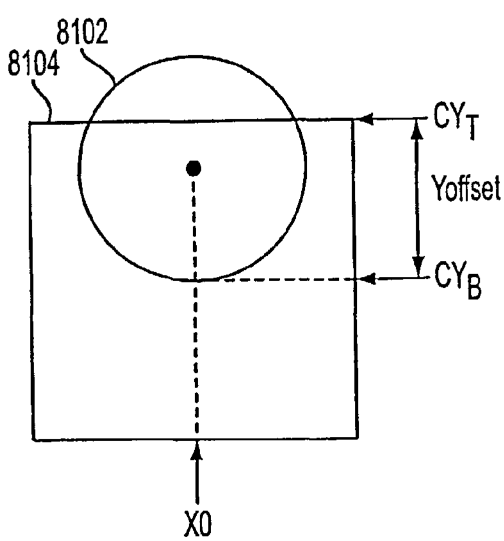
FIG. 52 is a diagrammatic illustration showing determination of tile coordinates in conjunction with point processing.
Figure 52B:
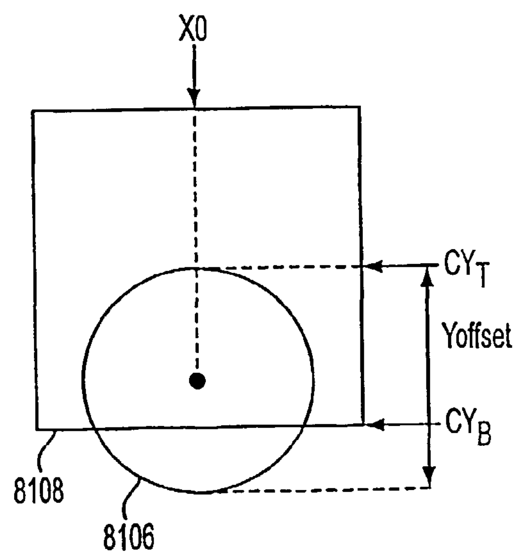
Figure 53:
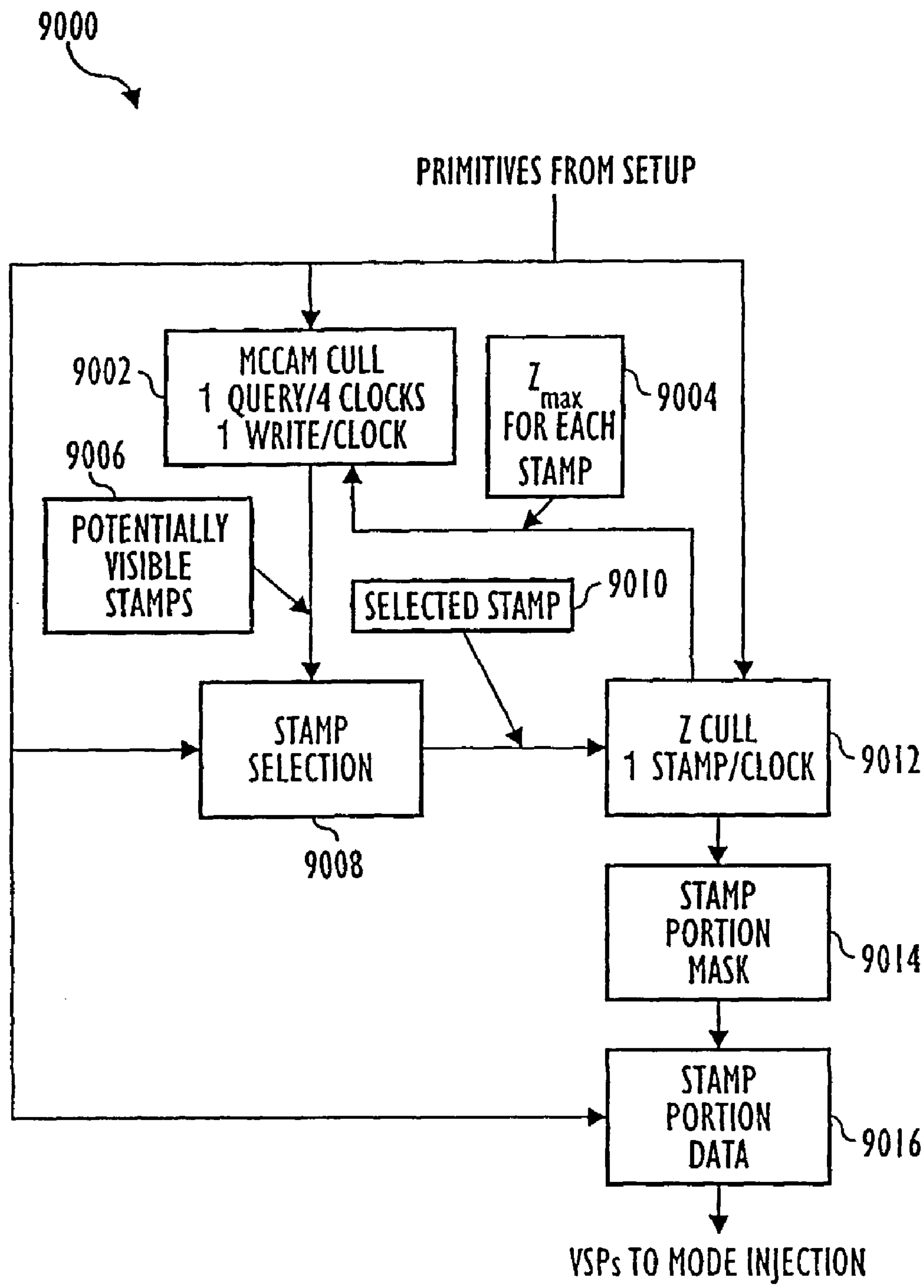
FIG. 53 is a diagrammatic illustration of an exemplary embodiment of the Cull Block.
Figure 54:
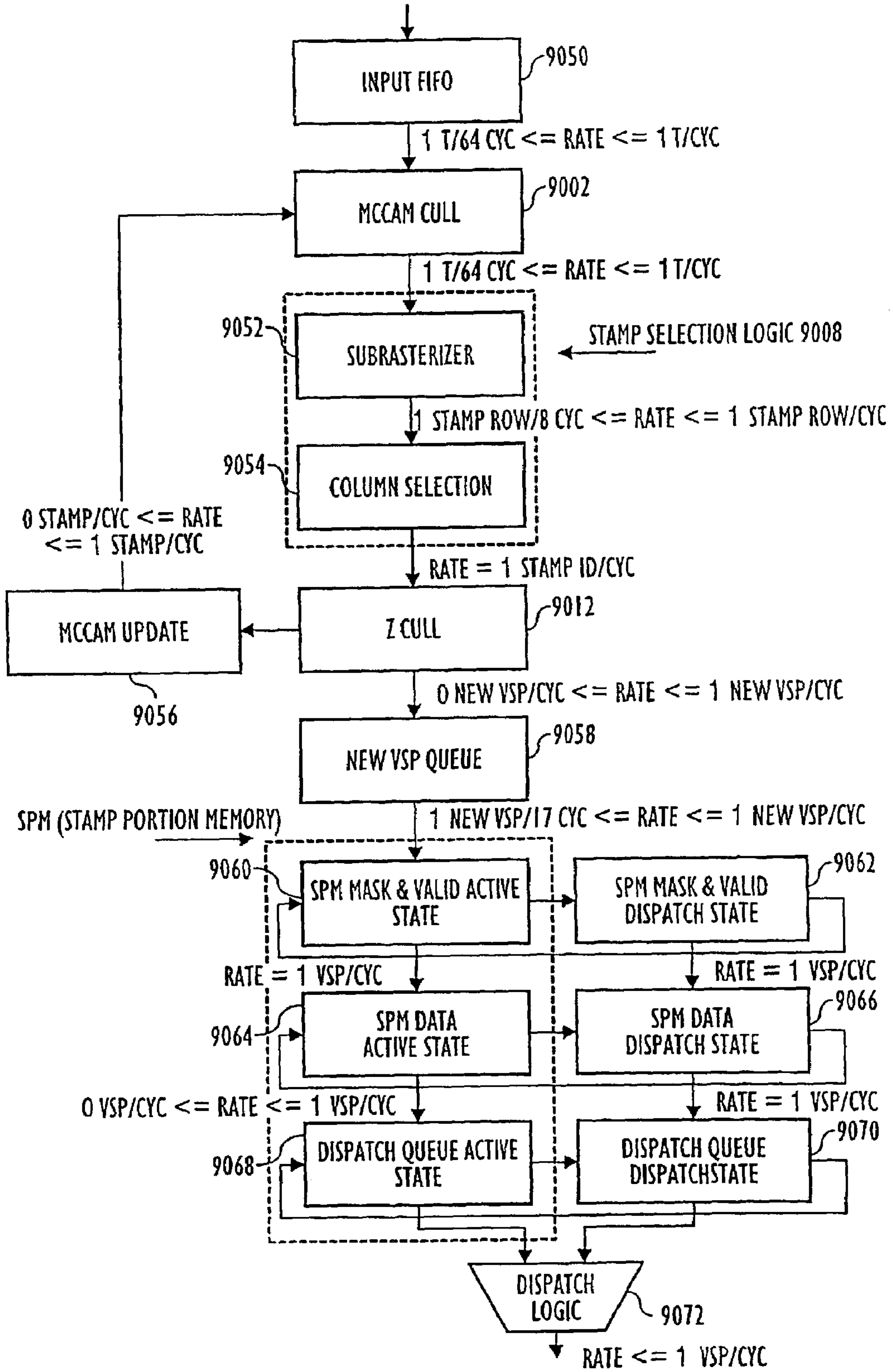
FIG. 54 is a diagrammatic illustration of exemplary embodiments of the Cull Block sub-units.

With wide lines on tiles at the edge of the window, it is possible that one or more of the calculated vertices may lie outside of the window range. Setup can handle this by carrying 2 bits of extra coordinate range, one to allow for negative values, one to increase the magnitude range. The range and precision of the data sent to the CUL block (14.2 for x coordinates) is just enough to define the points inside the window range. The data that the CUL block gets from Setup includes the left and right corner points. In cases where a quad vertex falls outside of the window range, Setup will pass the following values to CUL: (1) If tRight.x is right of the window range then clamp to right window edge; (2) If tLeft.x is left of window range then clamp to left window edge; (3) If v[VtxRightC].x is right of window range then send vertex rLow (that is, lower clip point on the right tile edge as the right corner); and, (4) If v[VtxLeftC].x is left of window range then send lLow (that is, the lower clip point on the left tile edge as the left corner). This is illustrated in FIG. D 18, where there is shown an example of processing quadrilateral vertices outside of a window. (FIG. D 18 correlates with FIG. 51 in U.S. Provisional Patent Application Ser. No. 60/097,336). FIG. D 21 illustrates aspects of clip code vertex assignment.

Note that triangles are clipped to the valid window range by a previous stage of pipeline 200, for example, geometry 310. Setup 215, in the current context, is only concerned with quads generated for wide lines. Cull 410 (see FIG. D 4) needs to detect overflow and underflow when it calculates the span end points during the rasterization, because out of range x values may be caused during edge walking. If an overflow or underflow occurs then the x-range should be clamped to within the tile range.

We now have determined a primitive's intersection points (clipping points) with respect to the current tile, and we have determined the clip codes, or valid flags. We can now proceed to computation of bounding box, a minimum depth value (Zmin), and a reference stamp, each of which will be described in greater detail below.

5.4.7 Bounding Box

The bounding box is the smallest box that can be drawn around the clipped polygon. The bounding box of the primitive intersection is determined by examining the clipped vertices (clipped vertices, or clipping points are described in greater detail above). We use these points to compute dimensions for a bounding box.

The dimensions of of the bounding box are identified by BXL (the left most of valid clip points), BXR (the right most of valid clip points), BYT (the top most of valid clip points), BYB (the bottom most of valid clip points) in stamps.here, stamp refers to the resolution we want to determine the bounding box to.

Finally, setup 215 identifies the smallest Y (the bottom most y-coordinate of a clip polygon). This smallest Y is required by cull 410 for its edge walking algorithm.

To illustrate a procedure, according to one embodiment of present invention, we now describe pseudocode for determining such dimensions of a bounding box. The valid flags for the clip points are as follows: ValidClipL (needs that clip points PLT and PLB are valid), ValidClipR, ValidClipT, and ValidClipB, correspond to the clip codes described in greater detail above in reference to clipping unit 5 (see FIG. D 6). "PLT" refers to "point left, top." PLT and (ClipXL, ClipyLT) are the same.

BXLtemp=min valid(ClipXTL, ClipXBL);
BXL=ValidClipL ? ClipXL: BXLtemp;
BXRtemp=max valid(ClipXTR, ClipXBR);
BXR=ValidClipR ? ClipXR: BXRtemp;
BYTtemp=max valid(ClipYLT, ClipYRT);
BYT=ValidClipT ? ClipYT: BYTtemp;
BYBtemp=min valid(ClipYLB, ClipYRB);
BYB=ValidClipB ? ClipYB: BYBtemp;
CullYB=trunc(BYB)subpixels (CullYB is the smallest Y value);
//expressed in subpixels—8×8 subpixels=1 pixel; 2×2 pixels =1 stamp.

We now have dimensions for a bounding box that circumscribes those parts of a primitive that intersect the current tile. These xmin (BXL), xmax (BXR), ymin (BYB), ymax (BYT) pixel coordinates need to be converted to the stamp coordinates. This can be accomplished by first converting the coordinates to tile relative values and then considering the high three bits only (i.e. shift right by 1 bit). This works; except when xmax (and/or ymax) is at the edge of the tile. In that case, we decrement the xmax (and/or ymax) by 1 unit before shifting.

//The Bounding box is expressed in stamps
BYT=trunc(BYT−1 subpixel)stamp;
BYB=trunc(BYB)stamp;
BXL=trunc(BXL)stamp; and,
BXR=trunc(BXR−1 subpixel)stamp.

5.4.8 Depth Gradients and Depth Offset Unit

The object of this functional unit is to:

Calculate Depth Gradients Zx=dz/dx and Zy=dz/dy

Calculate Depth Offset O, which will be applied in the Zmin & Zref subunit

Determine if triangle is x major or y major

Calculate the ZslopeMjr (z gradient along the major edge)

Determine ZslopeMnr (z gradient along the minor axis)

In case of triangles, the input vertices are the time-ordered triangle vertices (X0, Y0, Z0), (X1, Y1, Z1), (X2, Y2, Z2). For lines, the input vertices are 3 of the quad vertices produced by Quad Gen (QXB, QYB, ZB), (QXL, QYL, ZL), (QXR, QYR, ZR). In case of stipple lines, the Z partials are calculated once (for the original line) and saved and reused for each stippled line segment. In case of line mode triangles, an initial pass through this subunit is taken to calculate the depth offset, which will be saved and applied to each of the triangle's edges in subsequent passes. The Depth Offset is calculated only for filled and line mode triangles and only if the depth offset calculation is enabled.

5.4.8.1 Depth Gradients

The vertices are first sorted before being inserted in to the equation to calculate depth gradients. For triangles, the sorting information is was obtained in the triangle preprocessing unit described in greater detail above. (The information is contained in the pointers YsortTopSrc, YsortMidSrc, and YsortBotSrc.). For quads, the vertices are already sorted by Quadrilateral Generation unit described in greater detail above. Note: Sorting the vertices is desirable so that changing the input vertex ordering will not change the results.

We now describe pseudocode for sorting the vertices:

If triangles:

X'0=YsortBotSrc→mux(x2,x1,x0); Y'0=YsortBotSrc–mux(y2,y1,y0);

X'1=YsortMidSrc→mux(x2,x1,x0); Y'0=YsorMidSrc–mux(y2,y1,y0);

X'2=YsortTopSrc→mux(x2,x1,x0); Y'0=YsortTopSrc–mux(y2,y1,y0)

To illustrate the above notation, consider the following example where X'=ptr->mux(x2, x1, x0) means: if ptr==001, then X'=x0; if ptr==010, then X'=x1; and, if ptr==100, then X'=x2.

If Quads:

X'0=QXB Y'0=QYB

X'1=QXL Y'1=QYL

X'2=QXR Y'2=QYR

The partial derivatives represent the depth gradient for the polygon. They are given by the following equation:

$$Z_X = \frac{\delta z}{\delta x} = \frac{(y_2' - y_0')(z_1' - z_0') - (y_1' - y_0')(z_2' - z_0')}{(x_1' - x_0')(y_2' - y_0') - (x_2' - x_0')(y_1' - y_0')}$$

$$Z_Y = \frac{\delta z}{\delta y} = \frac{(x_1' - x_0')(z_2' - z_0') - (x_2' - x_0')(z_1' - z_0')}{(x_1' - x_0')(y_2' - y_0') - (x_2' - x_0')(y_1' - y_0')}$$

5.4.8.2 Depth Offset 7 (see FIG. D 6)

The depth offset for triangles (both line mode and filled) is defined by OpenGL® as:

$O=M$*factor+$Res$*units, where:

M=max(|ZX|, |ZY|) of the triangle;

Factor is a parameter supplied by the user;

Res is a constant; and,

Units is a parameter supplied by the user.

The "Res*units" term has already been added to all the Z values by a previous stage of pipeline 200, for example, geometry Geometry 310. So Setup's 215 depth offset component becomes:

$O=M$*factor*8, Clamp O to lie in the range (−224, +224)

The multiply by 8 is required to maintain the units. The depth offset will be added to the Z values when they are computed for Zmin and Zref later.

In case of line mode triangles, the depth offset is calculated once and saved and applied to each of the subsequent triangle edges.

5.4.8.2.1 Determine X Major for Triangles

In the following unit (Zref and Zmin Subunit) Z values are computed using an "edge-walking" algorithm. This algorithm requires information regarding the orientation of the triangle, which is determined here.

YT=YsortTopSrc→mux(y2,y1,y0);

YB=YsortBotSrc→mux(y2,y1,y0);

XR=XsortRhtSrc→mux(x2,x1,x0);

XL=XsortLftSrc→mux(x2,x1,x0);

DeltaYTB=YT→YB;

DeltaXRL=XR−XL;

If triangle:

Xmajor=|DeltaXRL|>=|DeltaYTB|

If quad

Xmajor=value of Xmajor as determined for lines in the TLP subunit.

An x-major line is defined in OpenGL® specification. In setup 215, an x-major line is determined early, but conceptually may be determined anywhere it is convenient.

5.4.8.2.2 Compute ZslopeMjr and ZslopeMnr (Z min and Z ref SubUnit) are the ZslopeMjr (Z derivative along the major edge), and ZslopeMnr (the Z gradient along the minor axis). Some definitions: (a) Xmajor Triangle: If the triangle spans greater or equal distance in the x dimension than the y dimension, then it is an Xmajor triangle, else it is a Ymajor triangle; (b) Xmajor Line: if the axis of the line spans greater or equal distance in the x dimension than the y dimension, then it is an Xmajor line, else it is a Ymajor line; (c) Major Edge (also known as Long edge). For Xmajor triangles, it is the edge connecting the Leftmost and Rightmost vertices. For Ymajor triangles, it is the edge connecting the Topmost and Bottommost vertices. For Lines, it is the axis of the line. Note that although, we often refer to the Major edge as the "long edge" it is not necessarily the longest edge. It is the edge that spans the greatest distance along either the x or y dimension; and, (d) Minor Axis: If the triangle or line is Xmajor, then the the minor axis is the y axis. If the triangle or line is Ymajor, then the minor axis is the x axis.

To compute ZslopeMjr and ZslopeMnr:

If Xmajor Triangle:

ZslopeMjr=(ZL−ZR)/(XL−XR) ZslopeMnr=ZY

If Ymajor Triangle:

ZslopeMjr=(ZT−ZB)/(YT−YB) ZslopeMnr=ZX

If Xmajor Line & (xCntUp==yCntUp)

ZslopeMjr=(QZR−QZB)/(QXR−QXB) ZslopeMnr=ZY

If Xmajor Line & (xCntUp !=yCntUp)

ZslopeMjr=(QZL−QZB)/(QXL−QXB) ZslopeMnr=ZY

If Ymajor Line & (xCntUp==yCntUp)

ZslopeMjr=(QZR−QZB)/(QYR−QYB) ZslopeMnr=ZX

If Ymajor Line & (xCntUp !=yCntUp)
 ZslopeMjr=(QZL−QZB)/(QYL−QYB) ZslopeMnr=ZX 5.4.8.2.3 Special Case for Large Depth Gradients It is possible for triangles to generate arbitrarily large values of Dz/Dx and Dz/Dy. Values that are too large present two problems:

1. Cull has a fixed point datapath that is capable of handling Dz/Dx and Dz/Dy of no wider than 35b. These 35b are used to specify a value that is designated T27.7 (a two's complement number that has a magnitude of 27 integer bits and 7 fractional bits) Hence, the magnitude of the depth gradients must be less than 2ˆ27.
2. Computation of Z at any given (X,Y) coordinate would be subject to large errors. If the depth gradients were large, even a small error in X or Y will be magnified by the depth gradient.

The following is done in case of large depth gradients:

GRMAX is the threshold for the largest allowable depth gradient.

It is set via the auxiliary ring (determined and set via software executing on, for example, computer 101 (see FIG. D 1)).

If ((|Dz/Dx|>GRMAX) or (|Dz/Dy|>GRMAX))

Then
 If Xmajor Triangle or Xmajor Line
 Set ZslopeMnr=0;
Set Dz/Dx=ZslopeMjr;
 Set Dz/Dy=0;
 If Ymajor Triangle or Ymajor Line
 Set ZslopeMnr=0;
 Set Dz/Dx=0; and,
 Set Dz/Dy=ZslopeMjr.

5.4.8.2.4 Discarding Edge-On Triangles

Edge-on triangles are detected in depth gradient unit 7 (see FIG. D 6). Whenever the Dz/Dx or Dz/Dy is infinite (overflows) the triangle is invalidated. However, edge-on Line mode triangles are not discarded. Each of the visible edges are to be rendered. The depth offset (if turned on) for such a triangle will however overflow, and be clamped to +/−2ˆ24.

5.4.8.2.5 Infinite dx/dy

An infinite dx/dy implies that an edge is perfectly horizontal. In the case of horizontal edges, one of the two end-points has got to be a corner vertex (VtxLeftC or VtxRightC). With a primitive whose coordinates lie within the window range, Cull 410 (see FIG. 14) will not make use of an infinite slope. This is because with Cull's 410 edge walking algorithm, it will be able to tell from the y value of the left and/or right corner vertices that it has turned a corner and that it will not need to walk along the horizontal edge at all.

In this case, Cull's 410 edge walking will need a slope. Since the start point for edge walking is at the very edge of the window, any X that edge walking calculates with a correctly signed slope will cause an overflow (or underflow) and X will simply be clamped back to the window edge. So it is actually unimportant what value of slope it uses as long as it is of the correct sign.

A value of infinity is also a don't care for setup's 215 own usage of slopes. Setup uses slopes to calculate intercepts of primitive edges with tile edges. The equation for calculating the intercept is of the form $X=X_0+\_Y*dx/dy$. In this case, a dx/dy of infinity necessarily implies a _Y of zero. If the implementation is such that zero plus any number equals zero, then dx/dy is a don't care.

Setup 215 calculates slopes internally in floating point format. The floating point units will assert an infinity flag should an infinite result occur. Because Setup doesn't care about infinite slopes, and Cull 410 doesn't care about the magnitude of infinite slopes, but does care about the sign, setup 215 doesn't need to express infinity. To save the trouble of determining the correct sign, setup 215 forces an infinite slope to ZERO before it passes it onto Cull 410.

5.4.9 Z min and Z ref

We now compute minimum z value for the intersection of the primitive with the tile. The object of this subunit is to: (a) select the 3 possible locations where the minimum Z value may be; (b) calculate the Z's at these 3 points, applying a correction bias if needed; (c) sSelect he minimum Z value of the polygon within the tile; (d) use the stamp center nearest the location of the minimum Z value as the reference stamp location; (e) compute the Zref value; and, (f) apply the Z offset value.

There are possibly 9 valid clipping points as determined by the Clipping subunit. The minimum Z value will be at one of these points. Note that depth computation is an expensive operation, and therefore is desirable to minimize the number of depth computations that need to be carried out. Without pre-computing any Z values, it is possible to reduce the 9 possible locations to 3 possible Z min locations by checking the signs of ZX and ZY (the signs of the partial z derivatives in x and y).

Clipping points (Xmin0, Ymin0, Valid), (Xmin1, Ymin1, Valid), (Xmin2, Ymin2, Valid) are the 3 candidate Zmin locations and their valid bits. It is possible that some of these are invalid. It is desirable to remove invalid clipping points from consideration. To accomplish this, setup 215 locates the tile corner that would correspond to a minimum depth value if the primitive completely covered the tile. Once setup 215 has determined that tile corner, then setup 215 need only to compute the depth value at the two nearest clipped points. These two values along with the z value at vertex i1 (Clip Point PI) provide us with the three possible minimum z values. Possible clip points are PTL, PTR, PLT, PLB, PRT, PRB, PBR, PBL, and PI (the depth value of PI is always depth value of y-sorted middle (ysortMid)). The three possible depth value candidates must be compared to determine the smallest depth value and its location. We now know the minimum z value and the clip vertex it is obtained from. In a preferred embodiment of the present mentioned, Z-value is clamped to 24 bits before sending to CUL.

To to illustrate the above, referred to the pseudocode below for identifying those clipping point that are minimum depth value candidates:

Notational Note:

ClipTL=(ClipXTL, ClipYT, ValidClipT), ClipLT=(ClipXL, YLT, ValidClipL), etc

```
If (ZX>0) &(ZY>0) // Min Z is toward the bottom left
Then            (Xmin0, Ymin0) =          ValidClipL       ? ClipLB
ValidClipT      ? ClipTL
                :ClipRB
Zmin0Valid =    ValidClipL | ValidClipT | ValidClipR
                (Xmin1, Ymin1) =          ValidClipB       ? ClipBL
ValidClipR      ? ClipRB
                :ClipTL
Zmin1Valid =    ValidClipL | ValidClipB | ValidClipT
                (Xmin2, Ymin2) = Clip1
                Zmin2Valid = (PrimType == Triangle)
```

-continued

```
If (ZX>0) & (ZY<0) // Min Z is toward the top left
Then
              (Xmin0, Ymin0) =          ValidClipL      ? ClipLT
ValidClipB    ? ClipBL
              :ClipRT
Zmin0Valid =  ValidClipL | ValidClipB | ValidClipR
              (Xmin1, Ymin1) =          ValidClipT      ? ClipTL
ValidClipR    ? ClipRT
              :ClipBL
Zmin1Valid =  ValidClipT | ValidClipR | ValidClipB
              (Xmin2, Ymin2) = ClipI
              Zmin2Valid = (PrimType == Triangle)
If (ZX<0) & (ZY>0) // Min Z is toward the bottom right
Then          (Xmin0, Ymin0) =          ValidClipR      ? ClipRB
ValidClipT    ? ClipTR
              :ClipLB
Zmin0Valid =  ValidClipR | ValidClipT | ValidClipL
              (Xmin1, Ymin1) =          ValidClipB      ? ClipBR
ValidClipL    ? ClipLB
              :ClipTR
Zmin1Valid =  ValidClipB | ValidClipL | ValidClipT
              (Xmin2, Ymin2) = ClipI
              Zmin2Valid = (PrimType == Triangle)
If (ZX<0) & (ZY<0) // Min Z is toward the top right
Then          (Xmin0, Ymin0) =          ValidClipR      ? ClipRT
ValidClipB    ? ClipBR
              :ClipLT
Zmin0Valid =  ValidClipR | ValidClipB | ValidClipL
              (Xmin1, Ymin1) =          ValidClipT      ? ClipTR
ValidClipL    ? ClipLT
              :ClipBR
Zmin1Valid =  ValidClipT | ValidClipL | ValidClipB
              (Xmin2, Ymin2) = ClipI
              Zmin2Valid = (PrimType == Triangle)
Referring to FIG. D19, there is shown in example of Zmin candidates.
```

5.4.9.1 The Z Calculation Algorithm

A straight forward approach to computing a Z value at any point on a triangle would be to use the following equation: Zdest=(Xdest−X0)*ZX+(Ydest−Y0)*ZY+Z0+offset. However, this equation would suffer from two problems in the Apex implementation: (1) Because the equation would be implemented using limited precision floating point units, the equation suffers from massive cancellation errors, causing loss of accuracy; and, (2) A subsequent processing stage 240 in pipeline 200, in particular, Cull 410, is unable to handle Zx or Zy values of greater than 2ˆ27. The above equation does not provide an easy route for combating these problems.

Conceptually, the problem with the above equation is that the path of computation involves walking outside of the triangle. The two product terms can be large and produce intermediate Z values far outside the range of 2ˆ24. The final Z value will be less than 2ˆ24 but it is arrived at by subtracting two very large numbers that are nearly equal but opposite in sign to obtain a relatively small number. Doing such an operation using floating point numbers that have limited bits in the mantissa may suffer loss of accuracy by a process called massive cancellation.

An algorithm by which the path of computation stays within the triangle will produce intermediate Z values that will stay within the range of 2ˆ24 and will not suffer as severely from massive cancellation. For a Y major triangle:

Zdest=+(Ydest−Ytop)*ZslopeMjr (1)

+(Xdest−((Ydest−Ytop)*DX/Dylong+Xtop))*ZslopeMnr (2)

+Ztop (3)

+offset (4)

Line (1) represents the change in Z as you walk along the long edge down to the appropriate Y coordinate. Line (2) is the change in Z as you walk in from the long edge to the destination X coordinate.

For an X major triangle the equation is analogous:

Zdest+(Xdest−Xright)*ZslopeMjr (1)

+(Ydest−((Xdest−Xright)*Dy/Dxlong+Yright))*ZslopeMnr (2)

+Ztop (3)

+offset (4)

For dealing with large values of depth gradient, the values specified in special case for large depth gradients (discussed in greater detail above) are used.

5.4.9.2 Compute Z's for Zmin Candidates

The 3 candidate Zmin locations have been identified (discussed above in greater detail). Remember that a flag needs to be carried to indicate whether each Zmin candidate is valid or not.

Compute: If Ymajor triangle:

Zmin0=+(Ymin0−Ytop)*ZslopeMjr+(Xmin0−((Ymin0−Ytop)*DX/Dylong+Xtop))*ZslopeMnr (note that Ztop and offset are NOT yet added).

If Xmajor triangle:

Zmin0=+(Xmin0−Xright)*ZslopeMjr+(Ymin0−((Xmin0−Xright)*DX/Dylong+Xtop))*ZslopeMnr (note that Zright and offset are NOT yet added).

A correction to the zmin value may need to be applied if the xminO or ymino is equal to a tile edge. Because of the limited precision math units used, the value of intercepts (computed above while calculating intersections and determining clipping points) have an error less than +/−1/16 of a pixel. To guarantee then that we compute a Zmin that is less than what would be the infinitely precise Zmin, we apply a Bias to the zmin that we compute here.

If xmin0 is on a tile edge, subtract |dZ/dY|/16 from zmin0;

If ymin0 is on a tile edge, subtract |dZ/dX|/16 from zmin1;

If xmin0 and ymin0 are on a tile corner, don't subtract anything; and,

If neither xmin0 nor ymin0 are on a tile edge, don't subtract anything.

The same equations are used to compute Zmin1 and Zmin2

5.4.9.3 Determine Zmin

The minimum valid value of the three Zmin candidates is the Tile's Zmin. The stamp whose center is nearest the location of the Zmin is the reference stamp. The pseudocode for selecting the Zmin is as follows:

ZminTmp=(Zmin1<Zmin0) & Zmin1Valid|!Zmin0Valid ? Zmin1: Zmin0;

ZminTmpValid=(Zmin1<Zmin0) & Zmin1Valid|!Zmin0Valid ? Zmin1Valid: Zmin0Valid; and, Zmin=(ZminTmp<Zmin2) & ZminTmpValid|!Zmin2Valid ? ZminTmp: Zmin2.

The x and y coordinates corresponding to each Zmin0, Zmin1 and Zmin2 are also sorted in parallel along with the determination of Zmin. So when Zmin is determined, there is also a corresponding xmin and ymin.

5.4.10 Reference Stamp and Z ref

Instead of passing Z values for each vertex of the primitive, Setup passes a single Z value, representing the Z value at a specific point within the primitive. Setup chooses a reference stamp that contains the vertex with the minimum z. The reference stamp is identified by adding the increment values to the x and y coordinates of the clip vertex and finding the containing stamp by truncating the x and y values to the nearest even value. For vertices on the right edge, the x-coordinates is decremented and for the top edge the y-coordinate is decremented before the reference stamp is computed.

Logic Used to Identify the Reference Stamp

The reference Z value, "Zref" is calculated at the center of the reference stamp. Setup 215 identifies the reference stamp with a pair of 3 bit values, xRefStamp and yRefStamp, that specify its location in the Tile. Note that the reference stamp is identified as an offset in stamps from the corner of the Tile. To get an offset in screen space, the number of subpixels in a stamp are multiplied. For example: x=x tile coordinate multiplied by the number of pixels in the width of a tile plus xrefstamp multiplied by two. This gives us an x-coordinate in pixels in screen space.

The reference stamp must touch the clipped polygon. To ensure this, choose the center of stamp nearest the location of the Zmin to be the reference stamp. In the Zmin selection and sorting, keep track of the vertex coordinates that were ultimately chosen. Call this point (Xmin, Ymin).

If Zmin is located on rht tile edge, then clamp Xmin=tileLft+7stamps

If Zmin is located on top tile edge, then clamp:

Ymin=tileBot+7stamps;

Xref=trunc(Xmin)stamp+1 pixel (truncate to snap to stamp resolution); and,

Yref=trunc(Ymin)stamp+1 pixel (add 1 pixel to move to stamp center).

Calculate Zref using an analogous equation to the zMin calculations. Compute:

If Ymajor triangle:

Zref=+(Yref−Ytop)*ZslopeMjr+(Xref−((Yref−Ytop)*DX/Dylong+Xtop))*ZslopeMnr (note that Ztop and offset are NOT yet added).

If Xmajor triangle: Zref=+(Xref−Xright)*ZslopeMjr+(Yref−((Xref−Xright)*DX/Dylong+Xtop))*ZslopeMnr (note that Zright and offset are NOT yet added).

5.4.10.1 Apply Depth Offset

The Zmin and Zref calculated thus far still need further Z components added.

If Xmajor:

(a) Zmin=Zmin+Ztop+Zoffset;

(b) Clamp Zmin to lie within range (−2^24, 2^24); and (c) Zref=Zref+Ztop+Zoffset.

If Ymajor:

(a) Zmin=Zmin+Zright+Zoffset;

(b) clamp Zmin to lie within range (−2^24, 2^24); and, (c) Zref=Zref+Zright+Zoffset.

5.4.11× and Y Coordinates Passed to CUL

Setup calculates Quad vertices with extended range. (s12.5 pixels). In cases where a quad vertex does fall outside of the window range, Setup will pass the following values to CUL:

If XTopR is right of window range then clamp to right window edge

If XTopL is left of window range then clamp to left window edge

If XrightC is right of window range then pick RightBot Clip Point

If XleftC is left of window range then pick LeftBot Clip Point

Ybot is always the min Y of the Clip Points

Figure 20:
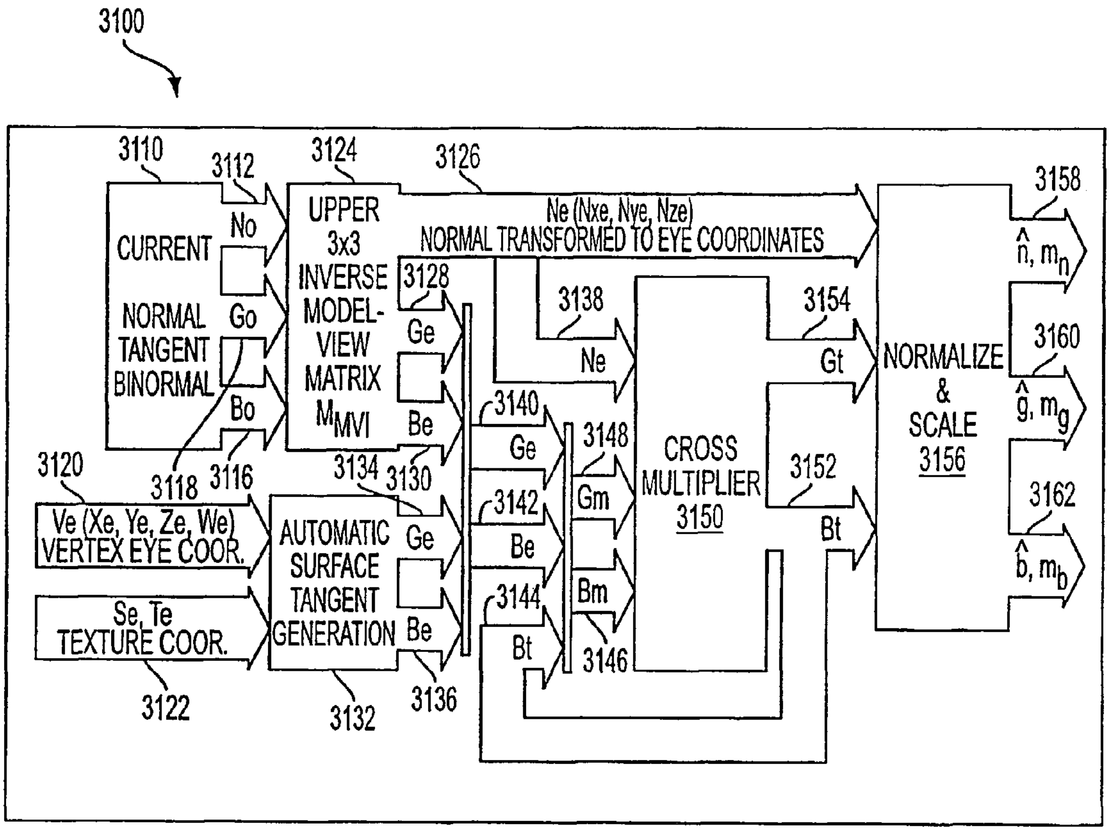
FIG. 20 is a diagramatic illustration hightlighting the manner in which one embodiment of the Deferred Shading Graphics Processor (DSGP) transforms normals, tangents, and binormals.
Figure 21:
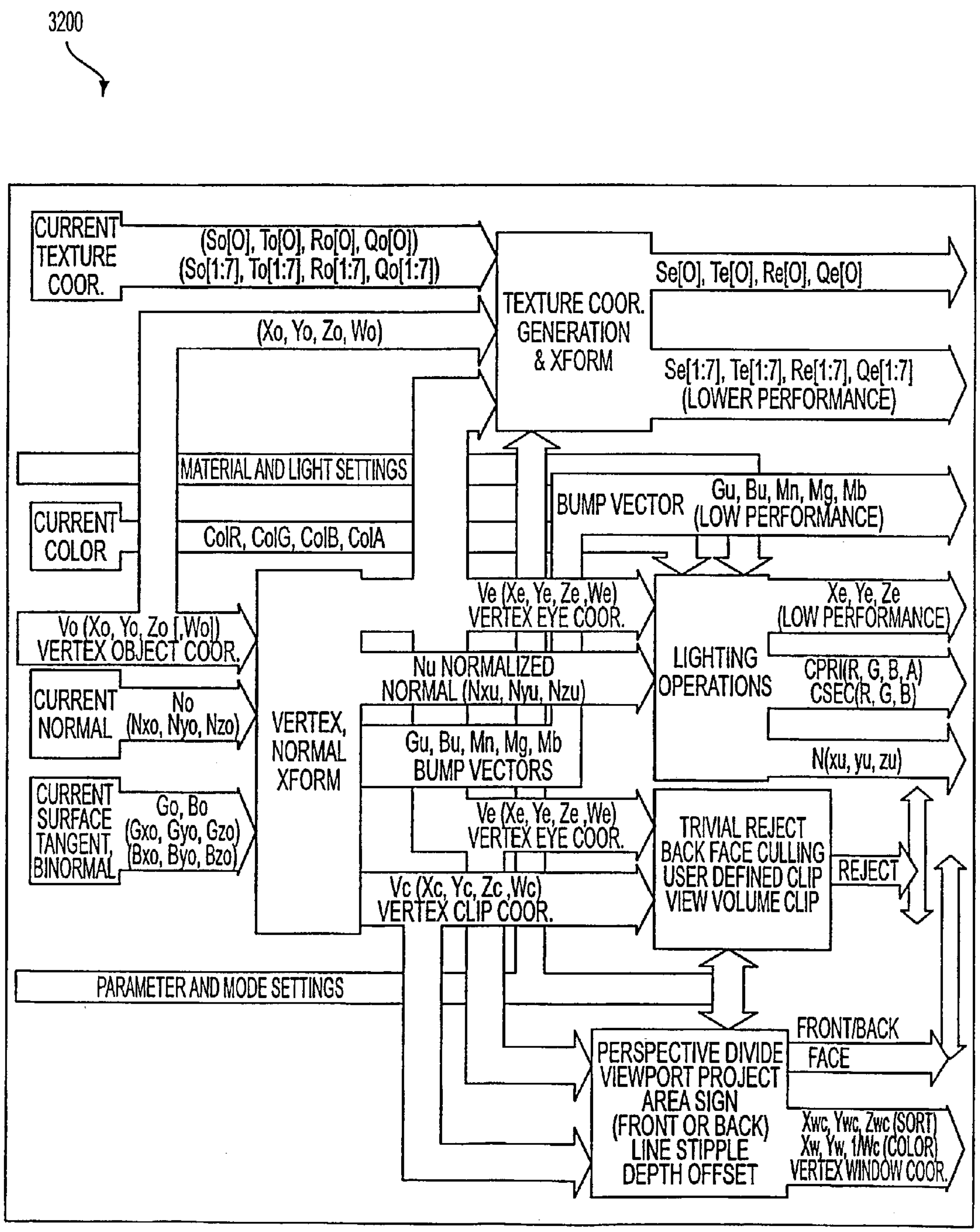
FIG. 21 is a diagrammatic illustration showing a functional block diagram of the Geometry Block (GEO).
Figure 22:
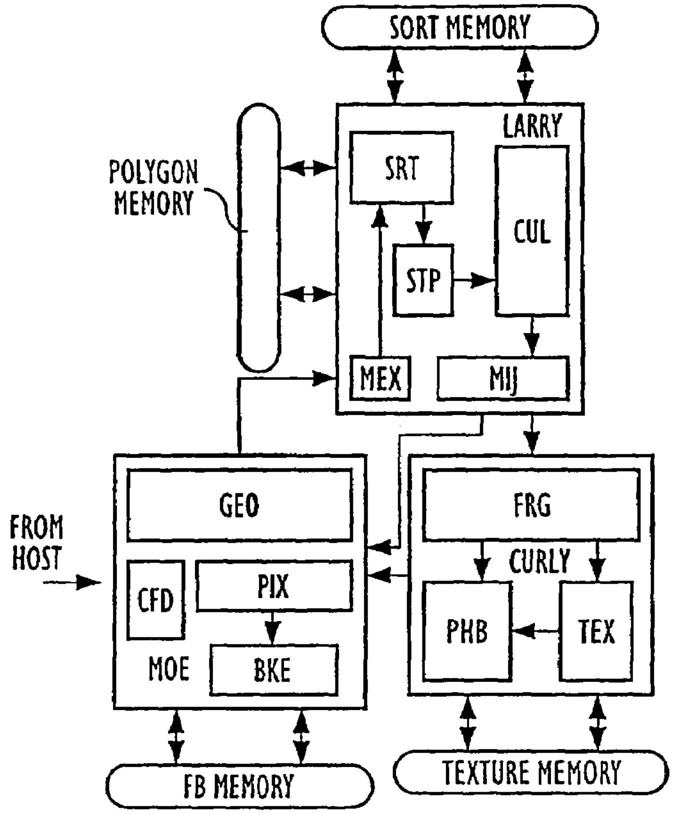
FIG. 22 is a diagrammatic illustration showing relationships between functional blocks on semiconductor chips in a three-chip embodiment of the inventive structure.
Figure 23:
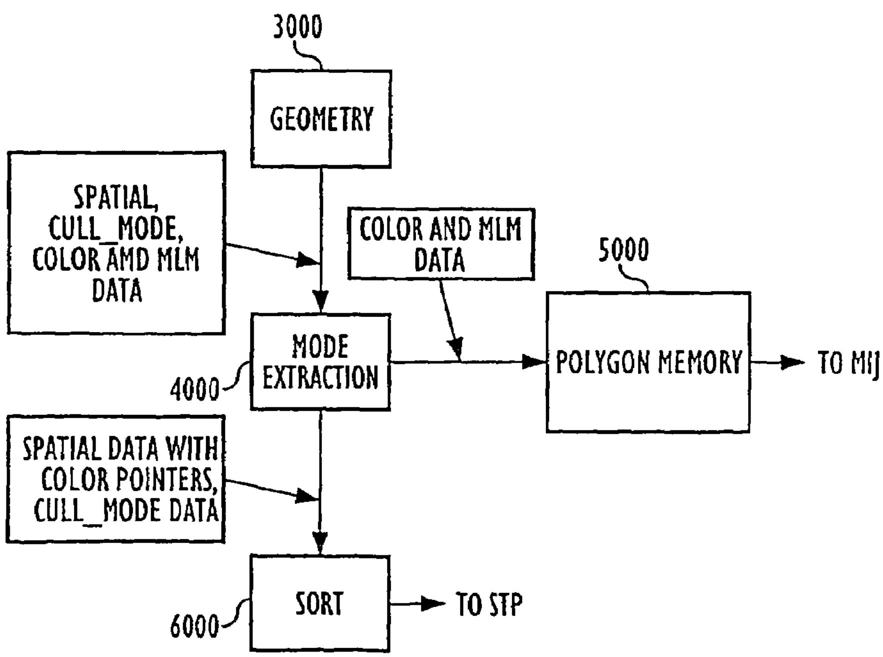
FIG. 23 is a diagramatic illustration exemplary data flow in one embodiment of the Mode Extraction Block (MEX).
Figure 31B:
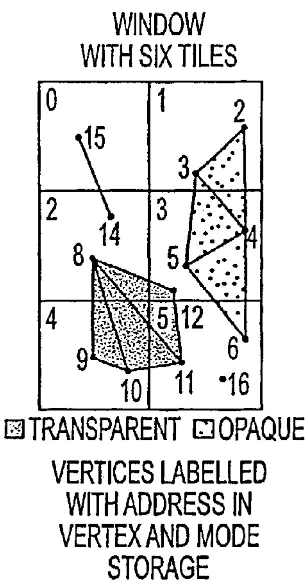
FIG. 31 shows a exemplary embodiment of the manner in which data is stored into a Sort Memory Page including the manner in which it is divided into Data Storage and Pointer Storage.
Figure 31A:
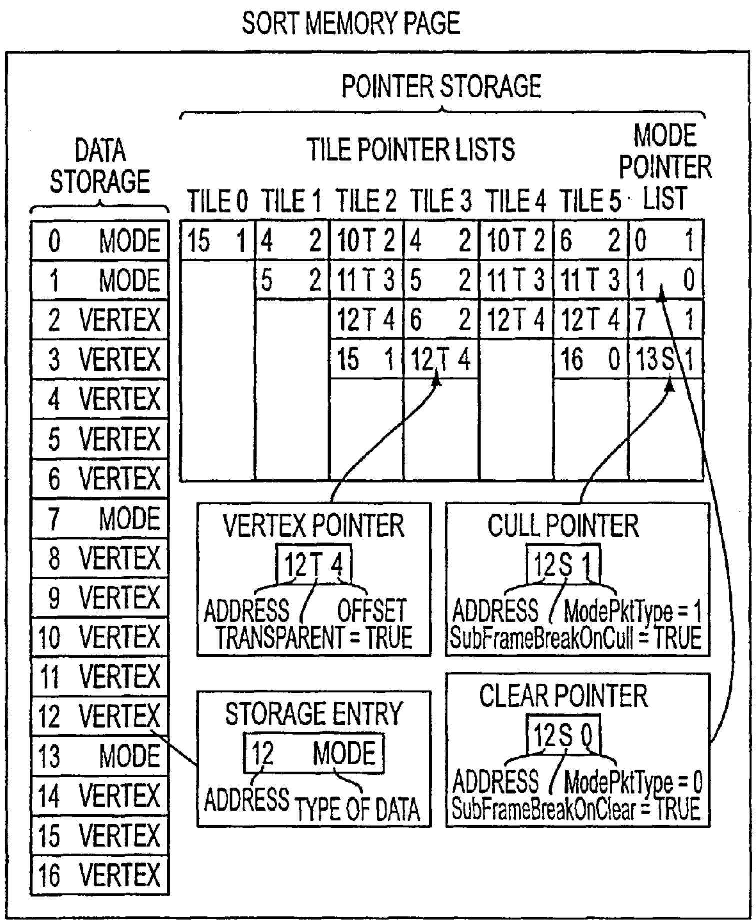
Figure 32:
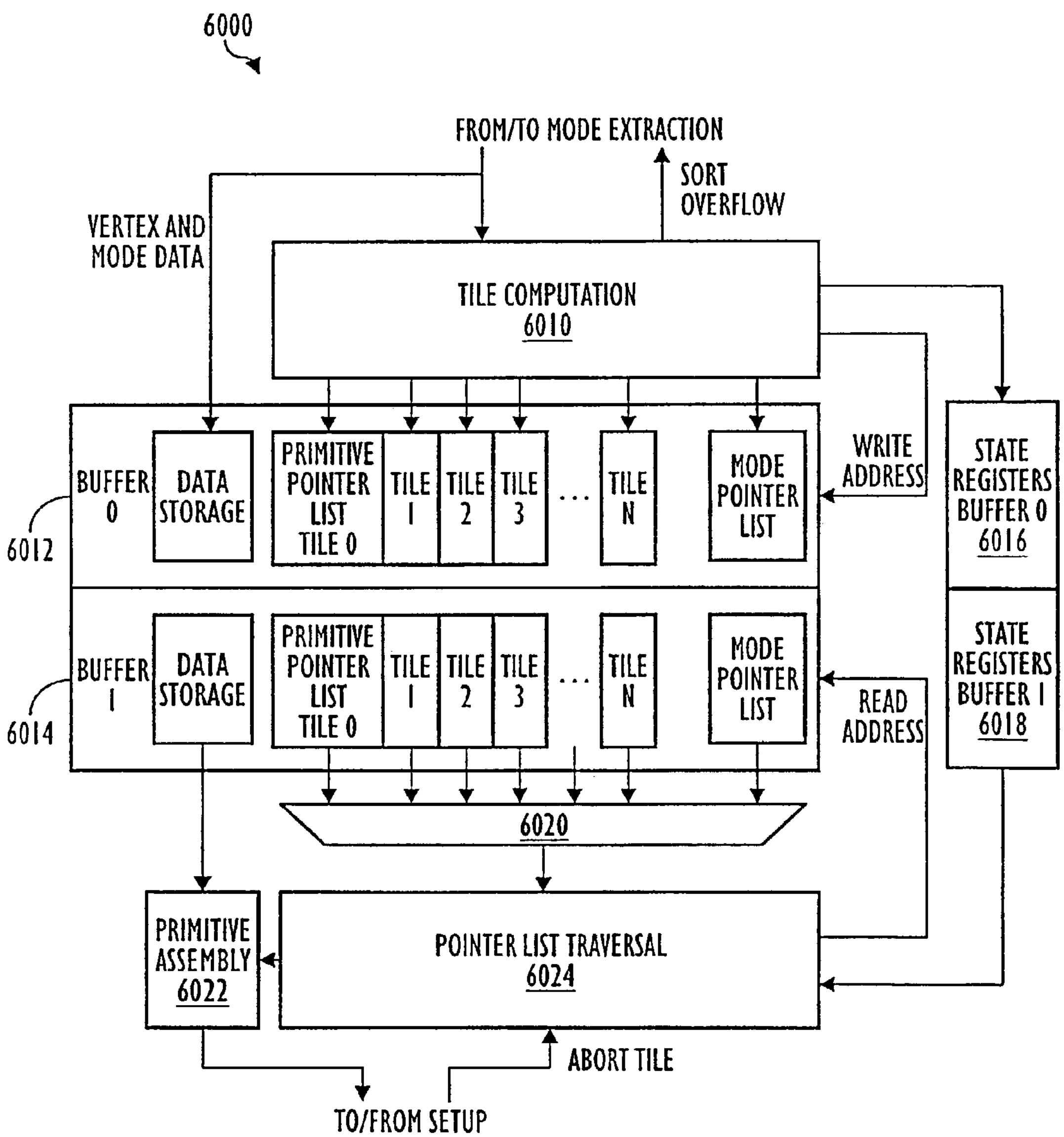
FIG. 32 shows a simplified block diagram of an exemplary embodiment of the Sort Block.
Figure 33:
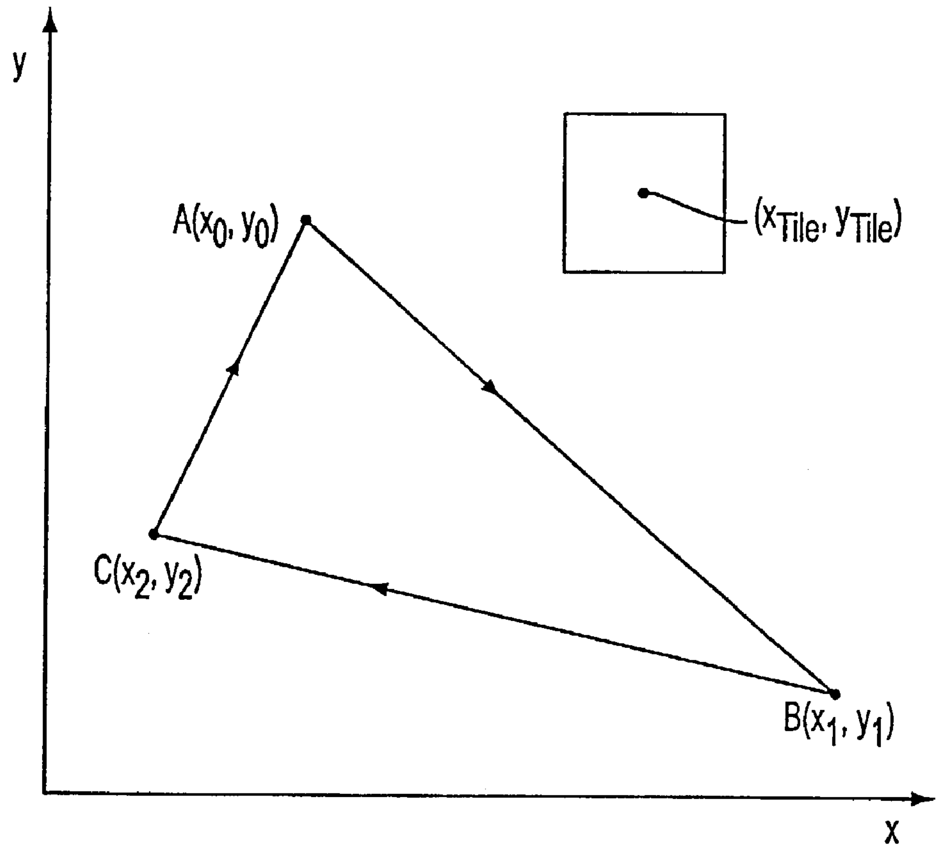
FIG. 33 is a diagrammatic illustration showing aspects of the Touched Tile calculation procedure for a tile ABC and a tile ceneterd at ($x_{Tile}$, $y_{Tile}$).

Referring to FIG. 20, there are shown example of out of range quad vertices.

5.4.12 Infinite dx/dy

An infinite dx/dy implies that an edge is perfectly horizontal. With a primitive whose coordinates lie within the window range, Cull will not make use of an infinite slope. This is because with Cull's edge walking algorithm, it will be able to tell from the YleftC (or YrightC) parameter that it has turned a corner and that it will not need to walk along the horizontal edge at all. Unfortunately, when quad vertices fall outside of the window range we run into slight problems, particularly with non-antialiased lines. Consider the case of a non-antialiased line whose top right corner is outside of the window range. RightC is then moved onto the RightBot Clip Point, and Cull's edge walking will not think to turn a corner on the horizontal edge and it will try to calculate an X projected from XtopR. (See FIG. D 43 above). In this case, Cull's edge walking will need a slope. Since the primitive is at the very edge of the window, any X that edge walking calculates with a correctly signed slope will cause an overflow (or underflow) and X will simply be clamped back to the window edge. So it is actually unimportant what value of slope it is uses as long as it is of the correct sign. A value of infinity is also a don't care for setup's own usage of slopes. Setup uses slopes to calculate intercepts of primitive edges with tile edges. The equation for calculating the intercept is of the form X=X0+DY*dx/dy. In this case, a dx/dy of infinity necessarily implies a DY of zero. Hence, the value of dx/dy is a don't care. Setup calculates slopes internally in floating point format. The floating point units will assert an infinity flag should an infinite result occur. Because Setup doesn't care about infinite slopes, and Cull doesn't care about the magnitude of infinite slopes, but does care about the sign, we don't really need to express infinity. To save the trouble of determining the correct sign, Setup will force an infinite slope to ZERO before it passes it onto Cull.

TABLE 1

Example of begin frame packet 1000

| BeginFramePacket parameter Header | bits/ packet 5 | Starting bit | Source send unit | Destination/ Value |
|---|---|---|---|---|
| Block3DPipe | 1 | 0 | SW | BKE |
| WinSourceL | 8 | 1 | SW | BKE |
| WinSourceR | 8 | 9 | SW | BKE |
| WinTargetL | 8 | 17 | SW | BKE |
| WinTargetR | 8 | 25 | SW | BKE |
| WinXOffset | 8 | 33 | SW | BKE |
| WinYOffset | 12 | 41 | SW | BKE |
| PixelFormat | 2 | 53 | SW | BKE |
| SrcColorKeyEnable3D | 1 | 55 | SW | BKE |
| DestColorKeyEnable3D | 1 | 56 | SW | BKE |
| NoColorBuffer | 1 | 57 | SW | PIX, BKE |
| NoSavedColorBuffer | 1 | 58 | SW | PIX, BKE |
| NoDepthBuffer | 1 | 59 | SW | PIX, BKE |
| NoSavedDepthBuffer | 1 | 60 | SW | PIX, BKE |
| NoStencilBuffer | 1 | 61 | SW | PIX, BKE |
| NoSavedStencilBuffer | 1 | 62 | SW | PIX, BKE |
| StencilMode | 1 | 63 | SW | PIX |
| DepthOutSelect | 2 | 64 | SW | PIX |
| ColorOutSelect | 2 | 66 | SW | PIX |
| ColorOutOverflowSelect | 2 | 68 | SW | PIX |
| PixelsVert | 11 | 70 | SW | SRT,BKE |

TABLE 1-continued

Example of begin frame packet 1000

| BeginFramePacket parameter Header | bits/ packet 5 | Starting bit | Source send unit | Destination/ Value |
|---|---|---|---|---|
| PixelsHoriz | 11 | 81 | SW | SRT |
| SuperTileSize | 2 | 92 | SW | SRT |
| SuperTileStep | 14 | 94 | SW | SRT |
| SortTranspMode | 1 | 108 | SW | SRT, CUL |
| DrawFrontLeft | 1 | 109 | SW | SRT |
| DrawFrontRight | 1 | 110 | SW | SRT |
| DrawBackLeft | 1 | 111 | SW | SRT |
| DrawBackRight | 1 | 112 | SW | SRT |
| StencilFirst | 1 | 113 | SW | SRT |
| BreakPointFrame | 1 | 114 | SW | SRT |
| | 120 | | | |

TABLE 2

Example of begin tile packet 2000

| BeginTilePacket parameter PktType | bits/ packet 5 | Starting bit 0 | Source | Destination |
|---|---|---|---|---|
| FirstTileInFrame | 1 | 0 | SRT | STP to BKE |
| BreakPointTile | 1 | 1 | SRT | STP to BKE |
| TileRight | 1 | 2 | SRT | BKE |
| TileFront | 1 | 3 | SRT | BKE |
| TileXLocation | 7 | 4 | SRT | STP,CUL,PIX, BKE |
| TileYlocation | 7 | 11 | SRT | STP,CUL,PIX, BKE |
| TileRepeat | 1 | 18 | SRT | CUL |
| TileBeginSubFrame | 1 | 19 | SRT | CUL |
| BeginSuperTile | 1 | 20 | SRT | STP to BKE |
| OverflowFrame | 1 | 21 | SRT | PIX,BKE |
| WriteTileZS | 1 | 22 | SRT | BKE |
| BackendClearCalor | 1 | 23 | SRT | PIX, BKE |
| BackendClearDepth | 1 | 24 | SRT | CUL, PIX, BKE |
| BackendClearStencil | 1 | 25 | SRT | PIX,BKE |
| ClearColorValue | 32 | 26 | SRT | PIX |
| ClearDepthValue | 24 | 58 | SRT | CUL, PIX |
| ClearStencilValue | 8 | 82 | SRT | PIX |
| | 95 | | | |

TABLE 3

Example of clear packet 3000

| Srt2StpClear parameter | bits/ packet | Starting bit | Source | Destination/ Value |
|---|---|---|---|---|
| Header | 5 | 0 | | |
| PixelModeIndex | 4 | 0 | | |
| ClearColor | 1 | 4 | SW | CUL, PIX |
| ClearDepth | 1 | 5 | SW | CUL, PIX |
| ClearStencil | 1 | 6 | SW | CUL, PIX |
| ClearColorValue | 32 | 7 | SW | SRT, PIX |
| ClearDepthValue | 24 | 39 | SW | SRT, CUL, PIX |
| ClearStencilValue | 8 | 63 | SW | SRT, PIX |
| SendToPixel | 1 | 71 | SW | SRT, CUL |
| | | 72 | | |
| ColorAddress | 23 | 72 | MEX | MIJ |
| ColorOffset | 8 | 95 | MEX | MIJ |
| ColorType | 2 | 103 | MEX | MIJ |
| ColorSize | 2 | 105 | MEX | MIJ |
| | 112 | | | |

TABLE 4

Example of cull packet 4000

| parameter | bits/packet | Starting Bit | Source | Destination |
|---|---|---|---|---|
| SrtOutPktType | 5 | | SRT | STP |
| CullFlushAll | 1 | 0 | SW | CUL |
| reserved | 1 | 1 | SW | CUL |
| OffsetFactor | 24 | 2 | SW | STP |
| | 31 | | | |

TABLE 5

Example of end frame packet 5000

| EndFramePacket parameter | bits/packet | Starting bit | Source | Destination/ Value |
|---|---|---|---|---|
| Header | 5 | 0 | | |
| InterruptNumber | 6 | 0 | SW | BKE |
| SoftEndFrame | 1 | 6 | SW | MEX |
| BufferOverflowOccurred | 1 | 7 | MEX | MEX,SRT |
| | 13 | | | |

TABLE 6

Example of primitive packet 6000

| parameter | bits/packet | Starting Address | Source | Destination |
|---|---|---|---|---|
| SrtOutPktType | 5 | 0 | SRT | STP |
| ColorAddress | 23 | 5 | MEX | MU |
| ColorOffset | 8 | 28 | MEX | MIJ |
| ColorType | 2 | 36 | MEX | MIJ, STP |
| ColorSize | 2 | 38 | MEX | MIJ |
| LinePointWidth | 3 | 40 | MEX | STP |
| Multisample | 1 | 43 | MEX | STP, CUL, PIX |
| CullFlushOverlap | 1 | 44 | SW | CUL |
| DoAlphaTest | 1 | 45 | GEO | CUL |
| DoABlend | 1 | 46 | GEO | CUL |

TABLE 6-continued

Example of primitive packet 6000

| parameter | bits/packet | Starting Address | Source | Destination |
| --- | --- | --- | --- | --- |
| DepthFunc | 3 | 47 | SW | CUL |
| DepthTestEnabled | 1 | 50 | SW | CUL |
| DepthMask | 1 | 51 | SW | CUL |
| PolygonLineMode | 1 | 52 | SW | STP |
| ApplyOffsetFactor | 1 | 53 | SW | STP |
| LineFlags | 3 | 54 | GEO | STP |
| LineStippleMode | 1 | 57 | SW | STP |
| LineStipplePattern | 16 | 58 | SW | STP |
| LineStippleRepeatFactor | 8 | 74 | SW | STP |
| WindowX2 | 14 | 82 | GEO | STP |
| WindowY2 | 14 | 96 | GEO | STP |
| WindowZ2 | 26 | 110 | GEO | STP |
| StartLineStippteBit2 | 4 | 136 | GEO | STP |
| StartStippleRepeatFactor2 | 8 | 140 | GEO | STP |
| WindowX1 | 14 | 148 | GEO | STP |
| WindowY1 | 14 | 162 | GEO | STP |
| WindowZ1 | 26 | 176 | GEO | STP |
| StartLineStippleBit1 | 4 | 202 | GEO | STP |
| StartStippleRepeatFactor1 | 8 | 206 | GEO | STP |
| WindowX0 | 14 | 214 | GEO | STP |
| WindowY0 | 14 | 228 | GEO | STP |
| WindowZ0 | 26 | 242 | GEO | STP |
| StartLineStippleBit0 | 4 | 268 | GEO | STP |
| StartStippleRepeatFactor0 | 8 | 272 | GEO | STP |
| | 280 | | | |

TABLE 7

Example of setup output primitive packet 7000

| Parameter | Bits | Starting bit | Source | Destination | Comments |
| --- | --- | --- | --- | --- | --- |
| StpOutPktType | 5 | | STP | CUL | |
| ColorAddress | 23 | 0 | MEX | MIJ | |
| ColorOffset | 8 | 23 | MEX | MIJ | |
| ColorType | 2 | 31 | MEX | MIJ | 0 = strip 1 = fan 2 = line 3 = point |
| ColorSize | 2 | 33 | MEX | MIJ | These 8 bits of colortype, colorsize, and colorEdgeId are encoded as EESSTT. |
| ColorEdgeId | 2 | 35 | STP | CUL | 0 = filled, 1 = v0v1, 2 = v1v2, 3 = v2v0 |
| LinePointWidth | 3 | 37 | GEO | CUL | |
| Multisample | 1 | 40 | SRT | CUL, FRG, PIX | |
| CullFlushOverlap | 1 | 41 | GEO | CUL | |
| DoAlphaTest | 1 | 42 | GEO | CUL | |
| DoABlend | 1 | 43 | GEO | CUL | |
| DepthFunc | 3 | 44 | SW | CUL | |
| DepthTestEnable | 1 | 47 | SW | CUL | |
| DepthMask | 1 | 48 | SW | CUL | |
| dZdx | 35 | 49 | STP | CUL | z partial along x; T27.7 (set to zero for points) |
| dZdy | 35 | 84 | STP | CUL | z partial along y; T27.7 (set to zero for points) |
| PrimType | 2 | 119 | STP | CUL | 1 => triangle 2 => line, and 3 => point This is in addition to ColorType and ColorEdgeID. This is incorporated so that CUL does not have to decode ColorType. STP creates unified packets for triangles and lines. But they may have different aliasing state. So CUL needs to know whether the packet is point, line, or triangle. |
| LeftValid | 1 | 121 | STP | CUL | LeftCorner valid? (don't care for points) |
| RightValid | 1 | 122 | STP | CUL | RightCorner valid? (don't care for points) |
| XleftTop | 24 | 123 | STP | CUL | Left and right intersects with top tile edge. Also contain xCenter for point. Note that these points are used to start edge walking on the left and right edge respectively. So these may actually be outside the edges of the tile. (11.13) |
| XrightTop | 24 | 147 | STP | CUL | |
| YLRTop | 8 | 171 | STP | CUL | Bbox Ymax. Tile relative. 5.3 |
| XleftCorner | 24 | 179 | STP | CUL | x window coordinate of the left corner (unsigned fixed point 11.13). (don't care for points) |
| YleftCorner | 8 | 203 | STP | CUL | tile-relative y coordinate of left corner (unsigned 5.3). (don't care for points) |
| XrightCorner | 24 | 211 | STP | CUL | x window coordinate of the right corner, unsigned fixed point 11.13. (don't care for points) |

TABLE 7-continued

Example of setup output primitive packet 7000

| Parameter | Bits | Starting bit | Source | Destination | Comments |
|---|---|---|---|---|---|
| YrightCorner | 8 | 235 | STP | CUL | tile-relative y coordinate of right corner 5.3; also contains Yoffset for point |
| YBot | 8 | 243 | STP | CUL | Bbox Ymin. Tile relative. 5.3 |
| DxDyLeft | 24 | 251 | STP | CUL | slope of the left edge. T14.9 (don't care for points) |
| DxDyRight | 24 | 275 | STP | CUL | slope of the right edge, T14.9 (don't care for points) |
| DxDyBot | 24 | 299 | STP | CUL | slope of the bottom edge. T14.9 (don't care for points) |
| XrefStamp | 3 | 323 | STP | CUL | ref stamp x index on tile (set to zero for points) |
| YrefStamp | 3 | 326 | STP | CUL | ref stamp y index on tile (set to zero for points) |
| ZRefTile | 32 | 329 | STP | CUL | Ref z value, s28.3 |
| XmaxStamp | 3 | 361 | STP | CUL | Bbox max stamp x index |
| XminStamp | 3 | 364 | STP | CUL | Bbox min stamp x index |
| YmaxStamp | 3 | 367 | STP | CUL | Bbox min stamp y index |
| YminStamp | 3 | 370 | STP | CUL | Bbox max stamp y index |
| ZminTile | 24 | 373 | STP | CUL | min z of the prim on tile |
| | 402 | | | | |

VII. Detailed Description of the Cull Functional Block (CUL)

The inventive apparatus and method provide conservative hidden surface removal (CHSR) in a deferred shading graphics pipeline (DSGP). The pipeline renders primitives, and the invention is described relative to a set of renderable primitives that include: 1) triangles, 2) lines, and 3) points. Polygons with more than three vertices are divided into triangles in the Geometry block (described hereinafter), but the DSGP pipeline could be easily modified to render quadrilaterals or polygons with more sides. Therefore, since the pipeline can render any polygon once it is broken up into triangles, the inventive renderer effectively renders any polygon primitive. The invention advantageously takes into account whether and in what part of the display screen a given primitive may appear or have an effect. To identify what part of a 3D window on the display screen a given primitive may affect, the pipeline divides the 3D window being drawn into a series of smaller regions, called tiles and stamps. The pipeline performs deferred shading, in which pixel colors are not determined until after hidden-surface removal. The use of a Magnitude Comparison Content Addressable Memory (MCCAM) advantageously allows the pipeline to perform hidden geometry culling efficiently.

Implementation of the inventive Conservative Hidden Surface Removal procedure, advantageously maintains compatibility with other standard APIs, such as OpenGL®, including their support of dynamic rule changes for the primitives (e.g. changing the depth test or stencil test during a scene). In embodiments of the inventive deferred shader, the conventional rendering paradigm, wherein non-deferred shaders typically execute a sequence of rules for every geometry item and then check the final rendered result, is broken. The inventive structure and method anticipate or predict what geometry will actually affect the final values in the frame buffer without having to make or generate all the colors for every pixel inside of every piece of geometry. In principle, the spatial position of the geometry is examined, and a determination is made for any particular sample, the one geometry item that affects the final color in the z buffer, and then generates only that color.

In one embodiment, the CHSR processes each primitive in time order and, for each sample that a primitive touches, CHSR makes conservative decision based on the various Application Program Interface (API) state variables, such as depth test and alpha test. One of the advantageous features of the CHSR process is that color computation does not need to be done during hidden surface removal even though non-depth-dependent tests from the API, such as alpha test, color test, and stencil test can be performed by the DSGP pipeline. The CHSR process can be considered a finite state machine (FSM) per sample. Hereinafter, each per-sample FSM is called a sample finite state machine. Each sample FSM maintains per-sample data including: (1) z coordinate information; (2) primitive information (any information needed to generate the primitive's color at that sample or pixel, or a pointer to such information); and (3) one or more sample state bits (for example, these bits could designate the z value or z values to be accurate or conservative). While multiple z values per sample can be easily used, multiple sets of primitive information per sample would be expensive. Hereinafter, it is assumed that the sample FSM maintains primitive information for one primitive. Each sample FSM may also maintain transparency information, which is used for sorted transparencies.

The DSGP can operate in two distinct modes: 1) time order mode, and 2) sorted transparency mode. Time order mode is designed to preserve, within any particular tile, the same temporal sequence of primitives. In time order mode, time order of vertices and modes are preserved within each tile, where a tile is a portion of the display window bounded horizontally and vertically. By time order preserved, we mean that for a given tile, vertices and modes are read in the same order as they are written. In sorted transparency mode, the process of reading geometry from a tile is divided into multiple passes. In the first pass, the opaque geometry (i.e., geometry that can completely hide more distant geometry) is processed, and in subsequent passes, potentially transparent geometry is processed. Within each sorted transparency mode pass, the time ordering is preserved, and mode data is inserted in its correct time-order location. Sorted transparency mode can spatially sort (on a sample-by-sample basis) the geometry into either back-to-front or front-to-back order, thereby providing a mechanism for the visible transparent objects to be blended in spatial order (rather than time order), resulting in a more correct rendering. In a preferred embodiment, the sorted transparency method is performed jointly by the Sort block and the Cull block.

The inventive structure and method may be implemented in various embodiments. In one aspect, the invention provides structure and method for performing hidden surface removal wherein the structure is advantageously implemented as a computer graphics pipeline and wherein the inventive hidden surface removal method includes the following steps or procedures. First, an object primitive (current primitive) is selected from a group of primitives, each primitive comprising a plurality of stamps. Next, stamps in the current primitive are compared to stamps from previously evaluated primitives in the group of primitives, and a first stamp is selected from the current primitive by the stamp selection process as a current stamp (CS), and optionally by the SAM for performance reasons. CS is compared to a second stamp or a CPVS selected from previously evaluated stamps that have not been discarded. The second stamp is discarded when no part of the second stamp would affect a final graphics display image based on the comparison with the CS. If part, but not all, of the second stamp would not affect the final image based on the comparison with the CS, then the part of second stamp that would not affect the final image is deleted from the second stamp. The CS is discarded when no part of the second stamp would affect a final graphics display image based on the comparison with the second stamp. If part, but not all, of the CS would not affect the final image based on the comparison with the second stamp, then the part of CS that would not affect the final image is deleted from the CS. When all stamps in all primitives within a region of the display screen have been evaluated, the stamps that have not been discarded have their pixels, or samples, colored by the part of the pipeline downstream from these first steps in performing hidden surface removal. In one embodiment, the set of non-discarded stamps can be limited to one stamp per sample. In this embodiment, when the second stamp and the CS include the same sample and both can not be discarded, the second stamp is dispatched and the CS is kept in the list of non-discarded stamps. Also for this alternate embodiment, when the visibility of the second stamp and the CS depends on parameters evaluated later in the computer graphics pipeline, the second stamp and the CS are dispatched. As an alternate embodiment, the selection of the first stamp by for example the SAM and the stamp selection process, as a current stamp (CS) is based on a relationship test of depth states of samples in the first stamp with depth states of samples of previously evaluated stamps; and an aspect of the inventive apparatus simultaneously performs the relationship test on a multiplicity of stamps.

In another aspect of the inventive structure and method for performing hidden surface removal, a set of currently potentially visible stamps (CPVSs) is maintained separately from the set of current depth values (CDVs), wherein the inventive hidden surface removal method includes the following steps or procedures. First, an object primitive (current primitive) is selected from a group of primitives, each primitive comprising a plurality of stamps. Next, a first stamp from the current primitive is selected as a currently stamp (CS). Next, a currently potentially visible stamp (CPVS) is selected from the set of CPVSs such that the CPVS overlaps the CS. For each sample that is overlapped by both the selected CPVS and the CS, the depth value of the CS is compared to the corresponding value in the set of CDVs, and this comparison operation takes into account the pipeline state and updates the CDVs. Samples in the selected CPVS that are determined to be not visible are deleted for the selected CPVS. If all samples in the selected CPVS are deleted, the selected CPVS is deleted from the set of CPVS's. If any sample in the CS is determined to be visible, the CS is added to the set of the CPVS's with only its visible samples included. If for any sample both the CS and selected CPVS are visible, then at least those visible samples in the selected CPVS are sent down the pipeline for color computations. If the visibility of a sample included in both the CS and CPVS depend on parameters evaluate later in the computer graphics pipeline, at least those samples are sent down the pipeline for color computations. The invention provides structure and method for processing in parallel all CPVS's that overlap the CS. Furthermore, the parallel processing is pipelined such that a CS can be processed at the rate of one CS per clock cycle. Also multiple CS's can be processed in parallel.

In another aspect, the invention provides structure and method for a hidden surface removal system for a deferred shader computer graphics pipeline, wherein the pipeline includes a Magnitude Comparison Content Addressable Memory (MCCAM) Cull unit for identifying a first group of potentially visible samples associated with a current primitive; a Stamp Selection unit, coupled to the MCCAM cull unit, for identifying, based on the first group and a perimeter of the primitive, a second group of potentially visible samples associated with the primitive; a Z-Cull unit, coupled to the stamp selection unit and the MCCAM cull unit, for identifying visible stamp portions by evaluating a pipeline state, and comparing depth states of the second group with stored depth state values; and a Stamp Portion Memory unit, coupled to the Z-Cull unit, for storing visible stamp portions based on control signals received from the Z-Cull unit, wherein the Stamp Portion Memory unit dispatches stamps having a visibility dependent on parameters evaluated later in the computer graphics pipeline.

In yet another aspect, the invention provides structure and method of rendering a graphics image including the steps of: receiving a plurality of primitives to be rendered; selecting a sample location; rendering a front most opaque sample at the selected sample location, and defining the z value of the front most opaque sample as Zfar; comparing z values of a first plurality of samples at the selected sample location; defining to be Znear a first sample, at the selected sample location, having a z value which is less than Zfar and which is nearest to Zfar of the first plurality of samples; rendering the first sample; setting Zfar to the value of Znear; comparing z values of a second plurality of samples at the selected sample location; defining as Znear the z value of a second sample at the selected sample location, having a z value which is less than Zfar and which is nearest to Zfar of the second plurality of samples; and rendering the second sample.

Embodiments

Cull Block Overview

FIG. E 12 illustrates a block diagram of Cull block 9000. The Cull block is responsible for: 1) pre-shading hidden surface removal; and 2) breaking down primitive geometry entities (triangles, lines and points) to stamp based geometry entities called Visible Stamp Portions (VSPs). The Cull block does, in general, a conservative culling of hidden surfaces. To facilitate the conservative hidden surface removal process Cull block 9000 does not handle some "fragment operations" such as alpha test and stencil test. Z Cull 9012 can store two depth values per sample, but Z Cull 9012 only stores the attributes of one primitive per sample. Thus, whenever a sample requires blending colors from two pieces of geometry, the Cull block sends the first primitive (using time order) down the pipeline, even though there may be later geometry that hides both pieces of the blended geometry.

The Cull block receives input in the form of packets from the Setup block 8000. One type of packet received by the Cull block is a mode packet. Mode packets provide the Cull block control information including the start of a new tile, a new frame, and the end of a frame. Cull block 9000 also receives Setup Output Primitive Packets. The Setup Output Primitive Packets each describe, on a per tile basis, either a triangle, a line or a point. The data field in Setup Output Primitive Packets contain bits to indicate the primitive type (triangle, line or point). The interpretation of the rest of the geometry data field depends upon the primitive type. A non-geometry data field contains the Color Pointer and mode bits that control the culling mode that can be changed on a per primitive bases. Mode packets include mode bits that indicate whether alpha test is on, whether Z buffer write is enabled, whether culling is conservative or accurate, whether depth test is on, whether blending is on, whether a primitive is anti-aliased and other control information.

Sort block 6000 bins the incoming geometry entities to tiles. Setup block 8000 pre-processes the primitives to provide more detailed geometric information for the Cull block to do the hidden surface removal. Setup block 8000 pre-calculates the slope value for all the edges, the bounding box of the primitive within the tile, minimum depth value (front most) of the primitive within the tile, and other relevant data. Prior to Sort, Mode Extraction block 4000 has already extracted the color, light, texture and related mode data, the Cull block only gets the mode data that is relevant to the Cull block and a pointer, called Color Pointer, that points to color, light and texture data stored in Polygon Memory 5000.

The Cull block performs two main functions. The primary function is to remove geometry that is guaranteed to not affect the final results in Frame Buffer 17000 (i.e., a conservative form of hidden surface removal). The second function is to break primitives into units of Visible Stamp Portions (VSP). A stamp portion is the intersection of a primitive with a given stamp. A VSP is a visible portion of a geometry entity within a stamp. In one embodiment, each stamp is comprised of four pixels, and each pixel has four predetermined sample points. Thus each stamp has 16 predetermined sample points. The stamp portion "size" is then given by the number and the set of sample points covered by a primitive in a given stamp.

The Cull block sends one VSP at a time to the Mode Injection block 10000. Mode Injection block 10000 reconnects the VSP with its color, light and texture data and sends it to Fragment 11000 and later stages in the pipeline.

The Cull block processes primitives one tile at a time. However, for the current frame, the pipeline is in one of two modes: 1) time order mode; or 2) sorted transparency mode. In time order mode, the time order of vertices and modes are preserved within each tile, and the tile is processed in a single pass through the data. That is, for a given tile, vertices and modes are read in the same order as they are written, but are skipped if they do not affect the current tile. In sorted transparency mode, the processing of each tile is divided into multiple passes, where, in the first pass, guaranteed opaque geometry is processed (the Sort block only sends non-transparent geometry for this pass). In subsequent passes, potentially transparent geometry is processed (the Sort block repeatedly sends all the transparent geometry for each pass). Within each pass, the time ordering is preserved, and mode data is inserted in its correct time-order location.

In time order mode, when there is only "simple opaque geometry" (i.e. no scissor testing, alpha testing, color testing, stencil testing, blending, or logicop) in a tile, the Cull block will process all the primitives in the tile before dispatching any VSPs to Mode Injection. This is because the Cull block hidden surface removal method can unambiguously determine, for each sample, the single primitive that covers (i.e., colors) that sample. The case of "simple opaque geometry" is a typically infrequent special case.

In time order mode, when the input geometry is not limited to "simple opaque geometry" within a tile, this may cause early dispatch of VSPs (an entire set of VSPs or selected VSPs). However, without exception all the VSPs of a given tile are dispatched before any of the VSPs of a different tile can be dispatched. In general, early dispatch is performed when more than one piece of geometry could possibly affect the final tile values (determined by Pixel block 15000) for any sample.

In sorted transparency mode, each tile is processed in multiple passes (assuming there is at least some transparent geometry in the tile). In each pass, there is no early dispatch of VSPs.

If the input packet is a Setup Output Primitive Packet, a PrimType parameter indicates the primitive type (triangle, line or point). The spatial location of the primitive (including derivatives, etc.) is done using a "unified description". That is, the packet describes the primitive as a quadrilateral (not screen aligned), and triangles and points are degenerate cases. This "unified description" is described in more detail in the provisional patent application entitled "Graphics Processor with Deferred Shading," filed Aug. 20, 1998, which is hereby incorporated by reference. The packet includes a color pointer, used by Mode Injection. The packet also includes several mode bits, many of which can change primitive by primitive. The following are considered to be "mode bits", and are input to state machines in Z Cull 9012: CullFlushOverlap, DoAlphaTest; DoABlend, DepthFunc, DepthTestEnabled, DepthTestMask, and NoColor.

In addition to Setup Output Primitive Packets, Cull block 9000 receives the following packet types: Setup Output Clear Packet, Setup Output Cull Packet, Setup Output Begin Frame Packet, Setup Output End Frame Packet, Setup Output Begin Tile Packet, and Setup Output Tween Packet. Each of these packet types is described in detail in the Detailed Description of Cull Block section. But, collectively, these packets are referred to as "mode packets."

In operation, when Cull block 9000 receives a primitive, Cull attempts to eliminate it by querying the Magnitude Comparison Content Addressable Memory (MCCAM) Cull 9002, shown in FIG. E 12, with the primitive's bounding box. If MCCAM Cull 9002 indicates that a primitive is completely hidden within the tile, then the primitive is eliminated. If MCCAM Cull 9002 cannot reject the primitive completely, it will generate a stamp list, each stamp in the list may contain a portion of the primitive that may be visible. This list of potentially visible stamps is sent to the Stamp Selection Logic 9008 of Cull block 9000. Stamp Selection Logic 9008 uses the geometry data of the primitive to determine the set of stamps within each stamp row of the tile that are actually touched by the primitive. Combined with the stamp list produced by MCCAM Cull 9002, the Stamp Selection Logic unit dispatches one potentially visible stamp 9006 at a time to the Z Cull block 9012. Each stamp is divided into a grid of 16 by 16 sub-pixels. Each horizontal grid line is called a subraster line. Each of the 16 sample points per stamp has to fall (for antialiased primitives) at the center of one of the 256 possible sub-pixel locations. Each pixel has four sample points within its boundary, as shown with stamp 9212 in FIG. E 13A. (FIG. E 13B and FIG. E 13C illustrate the manner in which the Stamp Portion is input into the Z-Cull process and as stored in SPM, respectively.) Sample locations within pixels can be made programmable. With programmable sample locations, multiple processing passes can be made with different sample locations thereby increasing the effective number of samples per pixel. For example, four passes could be performed with four different sets of sample locations, thereby increasing the effective number of samples per pixel to fourteen.

The display image is divided into tiles to more efficiently render the image. The tile size as a fraction of the display size can be defined based upon the graphics pipeline hardware resources.

The process of determining the set of stamps within a stamp row that is touched by a primitive involves calculating the left most and right most positions of the primitive in each subraster line that contains at least one sample point. These left most and right most subraster line positions are referred to as $XleftSubS_i$ and $XrightSubS_i$ which stands for x left most subraster line for sample i and x right most subraster line for sample i respectively. Samples are numbered from 0 to 15. The determination of $XleftSubS_i$ and $XrightSubS_i$ is typically called the edge walking process. If a point on an edge (x0, y0) is known, then the value of x1 corresponding to the y position of y1 can easily be determined by:

$$x1 = x0 + (y1 - y0) * \frac{dx}{dy}$$

In addition to the stamp number, the set of 16 pairs of $XleftSubS_i$ and $XrightSubS_i$ is also sent by the Stamp Selection Logic unit to Z Cull 9012.

Z Cull unit 9012 receives one stamp number (or StampID) at a time. Each stamp number contains a portion of a primitive that may be visible as determined by MCCAM Cull 9002. The set of 16 pairs of $XleftSubS_i$ and $XrightSubS_i$ are used to determine which of the 16 sample points are covered by the primitive. Sample i is covered if $Xsample_i$, the x coordinate value of sample i satisfies:

$$XleftSubS_i \leqq Xsample_i < XrightSubS_i$$

For each sample that is covered, the primitive's z value is computed at that sample point. At the same time, the current z values and z states for all 16 sample points are read from the Sample Z buffer 9055.

Each sample point can have a z state of "conservative" or "accurate". Alpha test, and other tests, are performed by pipeline stages after Cull block 9000. Therefore, for example, a primitive that may appear to affect the final color in the frame buffer based on depth test, may in fact be eliminated by alpha test before the depth test is performed, and thus the primitive does not affect the final color in the frame buffer. To account for this, the Cull block 9000 uses conservative z values. A conservative z value defines the outer limit of a z value for a sample based on the geometry that has been processed up to that point. A conservative z value means that the actual z value is either at that point or at a smaller z value. Thus the conservative z is the maximum z value that the point can have. If the depth test is render if greater than, then the conservative z value is a minimum z value. Conversely, if the depth test is render if less than, then the conservative z value is a maximum z value. For a render if less than depth test, any sample for a given sample location, with a z value less than the conservative z is thus a conservative pass because it is not known at that point in the processes whether it will pass.

An accurate z value is a value such that the surface which that z represents is the actual z value of the surface. With an accurate z it is known that the z value represents a surface that is known to be visible and anything in front of it is visible and everything behind it is obscured, at that point in the process. The status of a sample is maintained by a state machine, and as the process continues the status of a sample may switch between accurate and conservative. In one embodiment, a single conservative z value is used. In another embodiment, two z values are maintained for each sample location, a near z value (Znear) and a far z value (Zfar). The far z value is a conservative z value, and the near z value is an optimistic z value. Using two z values allows samples to be determined to be accurate again after being labeled as conservative. This improves the efficiency of the pipeline because an accurate z value can be used to eliminate more geometry than a conservative z value. For example, if a sample is received that is subject to alpha test, in the Cull block it is not known whether the sample will be eliminated due to alpha test. In an embodiment where only one z value is stored, the z value may have to be made conservative if the position of the sample subject to alpha test would pass the depth test. The sample that is subject to alpha test is then sent down the pipeline. Since, the sample subject to alpha test is not kept, the z value of the stored sample cannot later be converted back to accurate. By contrast, in an embodiment where two z values are stored, the sample subject to alpha test can, depending on its relative position, be stored as the Zfar/Znear sample. Subsequent samples can then be compared with the sample subject to alpha test as well as the second stored sample. If the Cull block determines, based on the depth test, that one of the subsequent samples, such as an opaque sample in front of the sample subject to alpha test, renders the sample subject to alpha test not visible, then that subsequent sample can be labeled as accurate.

In OpenGL® primitives are processed in groups. The beginning and ending of a group of pimitives are identified by the commands, begin and end respectively. The depth test is defined independently for each group of primitives. The depth test is one component of the pipeline state.

Each sample point has a Finite State Machine (FSM) independent of other samples. The z state combined with the mode bits received by Cull drive the sample FSMs. The sample FSMs control the comparison on a per sample basis between the primitive's z value and the Z Cull 9012 z value. The result of the comparison is used to determine whether the new primitive is visible or hidden at each sample point that the primitive covers. The maximum of the 16 sample points' z value is used to update the MCCAM Cull 9002.

A sample's FSM also determines how the Sample Z Buffer in Z Cull 9012 should be updated for that sample, and whether the sample point of the new VSP should be dispatched early. In addition, the sample FSM determines if any old VSP that may contain the sample point should be destroyed or should be dispatched early. For each sample Z Cull 9012 generates four control bits that describe how the sample should be processed, and sends them to the Stamp Portion Mask unit 9014. These per sample control bits are: SendNew, KeepOld, SendOld, and NewVSPMask. If the primitive contains a sample point that is visible, then a NewVSPMask control bit is asserted which causes Stamp Portion Memory (SPM) 9018 to generate a new VSP coverage mask. The remaining three control bits determine how SPM 9018 updates the VSP coverage mask for the primitive.

In sorted transparency mode, geometry is spatially sorted on a per-sample basis, and, within each sample, is rendered in either back-to-front or front-to-back order. In either case, only geometry that is determined to be in front of the front-most opaque geometry needs to be send down the pipeline, and this determination is done in Cull 9012.

In back-to-front sorted transparency mode, transparent primitives are rasterized in spatial order starting with the layer closest to the front most opaque layer instead of the regular mode of time order rasterization. Two z values are used for each sample location, Zfar and Znear. In sorted transparency mode the transparent primitives go through Z Cull unit 9012 several times. In the first pass, Sort block 6000, illustrated in FIG. E 9, sends only the opaque primitives. The z values are updated as described above. The z values for opaque primitives are referred to as being of type Zfar. At the end of the pass, the opaque VSPs are dispatched. The second time Sort block 6000 only sends the transparent primitives for the tile to Cull block 9000. Initially the Znear portion of the Sample Z Buffer are preset to the smallest z value possible. A sample point with a z value behind Zfar is hidden, but a z value in front of Zfar and behind Znear is closer to the opaque layer and therefore replaces the current Znear's z value. This pass determines the z value of the layer that is closest to the opaque layer. The VSPs representing the closest to opaque layer are dispatched. The roles of Znear and Zfar are then switched, and Z Cull receives the second pass of transparent primitives. This process continues until Z Cull determines that it has processed all possible layers of transparent primitives. Z Cull in sorted transparent mode is also controlled by the sample finite state machines.

In back-to-front sorted transparency mode, for any particular tile, the number of transparent passes is equal to the number of visible transparent surfaces. The passes can be done as:

a) The Opaque Pass (there is only one Opaque Pass) does the following: the front-most opaque geometry is identified (labeled Zfar) and sent down the pipeline.

b) The first Transparent Pass does the following: 1) at the beginning of the pass, keep the Zfar value from the Opaque Pass, and set Znear to zero; 2) identifies the back-most transparent surface between Znear (initialized to zero at the start of the pass) and Zfar; 2) determine the new Znear value; and, 3) at the end of the pass, send this back-most transparent surface down the pipeline.

c) The subsequent passes (second Transparent Pass, etc.) do the following: 1) at the beginning of the pass, set the Zfar value to the Znear value from the last pass, and set Znear to zero; 2) identify the next farthest transparent surface between Znear and Zfar; 3) determine the new Znear value; and, 4) at the end of the pass, send this backmost transparent surface down the pipeline.

In front-to-back sorted transparency mode, for any particular tile, the number of transparent passes can be limited to a preselected maximum, even if the number of visible transparent surfaces at a sample is greater. The passes can be done as:

a) In the First Opaque Pass (there are two opaque passes, the other one is the Last Opaque Pass), the front-most opaque geometry is identified (labeled Zfar), but this geometry is not sent down the pipeline, because, only the z-value is valuable in this pass. This Zfar value is the boundary between visible transparent layers and hidden transparent layers. This pass is done with the time order mode sample FSM.

b) The next pass, the first Transparent Pass, renders the front-most transparent geometry and also counts the number of visible transparencies at each sample location. This pass does the following: 1) at the beginning of the pass, set the Znear value to the Zfar value from the last pass, set Zfar to the maximum z-value, and initialize the NumTransp counter in each sample to zero; 2) test all transparent geometry and identify the front-most transparent surface by finding geometry that is in front of both Znear and Zfar; 3) as geometry is processed, determine the new Zfar value, but don't change the Znear value; 4) count the number of visible transparent surfaces by incrementing NumTransp when geometry that is in front of Znear is encountered; and, 5) at the end of the pass, send this front-most transparent surface down the pipeline. NOTE: concpetually, this pass is defined in an unusual way, because, at the end, Zfar is nearer than Znear; but this allows the rule, "set the Znear value to the Zfar value from the last pass, and set Zfar to the maximum z-value" to be true for every transparent pass. If this is confusing, the definition of Znear and Zfar can be swapped, but this changes the definition of the second transparent pass.

c) Subsequent Transparent Passes determine progressively farther geometry, and the maximum number of transparent passes is specified by the MaxTranspPasses parameter. Each of these passes does the following: 1) at the beginning of the pass, set the Znear value to the Zfar value from the last pass, set Zfar to the maximum z-value, and the NumTransp counter in each sample is not changed; 2) test all transparent geometry and identify the next-front-most transparent surface by finding the front-most geometry that is between Znear and Zfar, but discard all the transparent geometry if all of the visible transparent layers have been found for this sample (i.e., NumTranspPass>NumTransp); 3) as geometry is processed, determine the new Zfar value, but don't change the Znear value; and, 4) at the end of the pass, send this second-most transparent surface down the pipeline.

d) For the Last Opaque Pass, the front-most opaque geometry is again identified, but this time, the geometry is sent down the pipeline. This pass does the following: 1) at the beginning of the pass, set Zfar to the maximum z-value (Znear is not used), and the NumTransp counter in each sample is not changed; 2) test all opaque geometry and identify the front-most geometry, using the time order mode sample FSM; 3) as geometry is processed, determine the new Zfar value, but discard the geometry if SkipopaqueIfMaxTransp is TRUE and the maximum number of transparent layers was found (i.e., MaxTranspPasses=NumTransp); and 4) at the end of the pass, send this front-most opaque surface down the pipeline.

The efficiency of CUL is increased (i.e., fewer fragments sent down the pipeline) in front-to-back sorted transparency mode, especially when there are lots of visible depth complexity for transparent surfaces. Also, this may enhance image quality by allowing the user to discern the front-most N transparencies, rather than all those in front of the front-most opaque surface.

The stamp portion memory block 9018 contains the VSP coverage masks for each stamp in the tile. The maximum number of VSPs a stamp can have is 16. The VSP masks should be updated or dispatched early when a new VSP comes in from Z Cull 9012. The Stamp Portion Mask unit performs the mask update or dispatch strictly depending on the SendNew, KeepOld and SendOld control bits. The update should occur at the same time for a maximum of 16 old VSPs in a stamp because a new VSP can potentially modify the coverage mask of all the old VSPs in the stamp. The Stamp Portion Data unit 9016 contains other information associated with a VSP including but not limited to the Color Pointer. The Stamp Portion Data memory also needs to hold the data for all VSPs contained in a tile. Whenever a new VSP is created, its associated data need to be stored in the Stamp Portion Data memory. Also, whenever an old VSP is dispatched, its data need to be retrieved from the Stamp Portion Data memory.

Detailed Description of Cull Block

FIG. E 14 illustrates a detailed block diagram of Cull block 9000. Cull block 9000 is composed of the following components: Input FIFO 9050, MCCAM Cull 9002, Subrasterizer 9052, Column Selection 9054, MCCAM Update 9059, Sample Z buffer 9055, New VSP Queue 9058, Stamp Portion Memory Masks 9060 and 9062, Stamp Portion Memory Data units 9064 and 9066, Dispatch Queues 9068 and 9070, and Dispatch Logic 9072.

Mode and Data Packets

The operation of the Cull components is determined by the packets received by the Cull block. The following describes the mode packets:

A Setup Output Clear Packet indicates some type of buffer clear is to be performed. However, buffer clears that occur at the beginning of a user frame (and not subject to scissor test) are included in a Begin Tile packet.

The Setup Output Cull Packet is a packet of mode bits. This packet includes: 1) bits for enabling/disabling the MCCAM Cull and Z Cull processes; 2) a bit, CullFlushAll, that causes a flush of all the VSPs from the Cull block; and 3) the bits: AliasPolys, AliasLines, and AliasPoints, which disable antialiasing for the three types of primitives.

The Setup Output Begin Frame Packet tells Cull that a new frame is starting. The next packet will be a Sort Output Begin Tile Packet. The Setup Output Begin Frame Packet contains all the per-frame information that is needed throughout the pipeline.

The Setup Output End Frame Packet indicates the frame has ended, and that the current tile's input has been completed.

The Setup Output Begin Tile Packet tells the Cull block that the current tile has ended and that the processed data should be flushed down the pipeline. Also, at the same time, the Cull block should start to process the new tile's primitives. If a tile is to be repeated due to the pipeline being in sorted transparency mode, then this requires another Setup Output Begin Tile Packet. Hence, if a particular tile needs an opaque pass and four transparent passes, then a total of five begin tile packets are sent from the Setup block. This packet specifies the location of the tile within the window.

The Setup Output Tween Packet can only occur between (hence 'tween) frames, which, of course is between tiles. Cull treats this packet as a black box, and just passes it down the pipeline. This packet has only one parameter, TweenData, which is 144 bits.

In addition to the mode packets, the Cull block also receives Setup Output Primitive Packets, as illustrated in FIG. E 15.

The Setup Output Primitive Packets each describe, on a per tile basis, either a triangle, a line, or a point. More particularly, the data field in Setup Output Primitive Packets contain bits to indicate the primitive type (triangle, line, or point). The interpretation of the rest of the geometry data field depends upon the primitive type.

If the input packet is a Setup Output Primitive Packet, a PrimType parameter indicates the primitive type (triangle, line or point). The spatial location of the primitive (including derivatives, etc.) is specified using a unified description. That is, the packet describes the primitive as a quadrilateral (non-screen aligned), no matter whether the primitive is a quadrilateral, triagle, or point, and triangles and points are treated as degenerate cases of the quadralateral. The packet includes a color pointer, used by the Mode Injection unit. The packet also includes several mode bits, many of which can change state on a primitive by primitive basis. The following are considered to be "mode bits", and are input to state machines in Z Cull 9012: CullFlushOverlap, DoAlphaTest; DoABlend, DepthFunc, DepthTestEnabled, DepthTestMask, and NoColor.

The Cull components are described in greater detail in the following sections.

Input FIFO

Figure 16:
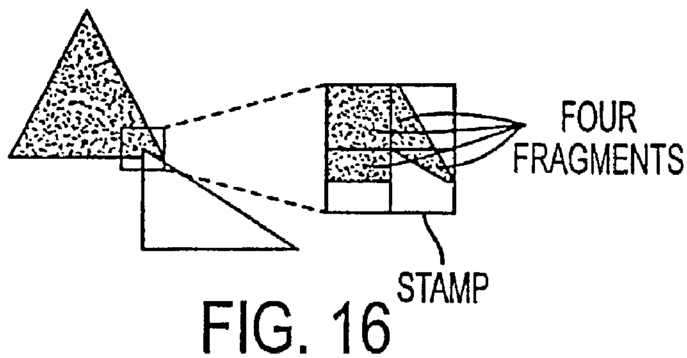
FIG. 16 is a diagramatic illustration showing the manner in which an embodiment of the Cull block produces fragments from a partially obscured triangle.

FIG. 16 illustrates a flow chart of a conservative hidden surface removal method using the Cull block 9000 components shown in the FIG. E 14 detailed block diagram. Input FIFO unit 9050 interfaces with the Setup block 8000. Input FIFO 9050 receives data packets from Setup and stores each packet in a queue, step 9160. The number of FIFO memory locations needed is between about sixteen and about 32, in one embodiment the depth is assumed to be sixteen.

MCCAM Cull

The MCCAM Cull unit 9002 uses an MCCAM array 9003 to perform a spatial query on a primitive's bounding box to determine the set of stamps within the bounding box that may be visible. The Setup block 8000 determines the bounding box for each primitive, and determines the minimum z value of the primitive inside the current tile, which is referred to as ZMin. FIG. E 17A illustrates a sample tile including a primitive 9254 and a bounding box 9252 in MCCAM. MCCAM Cull 9002 uses ZMin to perform z comparisons. MCCAM Cull 9002 stores the maximum z value per stamp of all the primitives that have been processed. MCCAM Cull 9002 then compares in parallel ZMin for the primitive with all the ZMaxes for every stamp. Based on this comparison, MCCAM Cull determines (a) whether the whole primitive is hidden, based on all the stamps inside the simple bounding box; or (b) what stamps are potentially visible in that bounding box, step 9164. FIG. E 17B shows the largest z values (ZMax) for each stamp in the tile. FIG. E17C shows the results of the comparison. Stamps where ZMin≦ZMax are indicated with a one, step 9166. These are the potentially visible stamps. MCCAM Cull also identifies each row which has a stamp with ZMin≦ZMax, step 9168. These are the rows that the Stamp Selection Logic unit 9008 needs to process. Stamp Selection Logic unit 9008 skips the rows that are identified with a zero.

MCCAM Cull can process one primitive per cycle from the input FIFO 9050. Read operations from the FIFO occur when the FIFO is not empty and either the last primitive removed is completely hidden as determined by MCCAM Cull or the last primitive is being processed by the Subrasterizer unit 9052. In other words, MCCAM Cull does not "work ahead" of the Subrasterizer. Rather, MCCAM Cull only gets the next primitive that the Subrasterizer needs to process, and then waits.

In an alternative embodiment, Cull block 9000 does not include an MCCAM Cull unit 9002. In this embodiment, the Stamp Selection Logic unit 9008 processes all of the rows.

Subrasterizer Within the Stamp Selection Logic

Subrasterizer 9052 is the unit that does the edge walking (actually, the computation is not iterative, as the term "walking" would imply). Each cycle, Subrasterizer 9052 obtains a packet from MCCAM Cull 9002. One type of packet received by the Cull block is the Setup Output Primitive Packet, illustrated in FIG. E 15. Setup Output Primitive Packets include row numbers and row masks generated by MCCAM Cull 9002 which indicate the potentially visible stamps in each row. Subrasterizer 9052 also receives the vertex and slope data it needs to compute the the left most and right most positions of the primitive in each subraster line that contains at least one sample point, $XleftSubS_i$ and $XrightSubS_i$. Subrasterizer 9052 decodes the PrimitiveType field in the Setup Output Primitive Packet to determine if a primitive is a triangle, a line or a point, based on this information Subrasterizer 9052 determines whether the primitive is anti-aliased. Referring to FIG. E 18, for each row of stamps that MCCAM Cull indicates is potentially visible (using the row selection bits 9271), Subrasterizer 9052 simultaneously computes the $XleftSub_i$ and $XrightSub_i$ for each of the sample points in the stamp, in a preferred embodiment there are 16 samples per stamp, step 9170. Each pair of $XleftSub_i$ and $XrightSub_i$ define a set of stamps in the row that is touched by the primitive, which are referred to as a sample row mask. For example, FIG. E 19 illustrates a set of $XleftSub_i$ and $XrightSub_i$.

Referring to FIG. E 18, each stamp in the potentially visible rows that is touched by the primitive is indicated by setting the corresponding stamp coverage bit 9272 to a one ('1"), as shown in tile 9270. Subrasterizer 9052 logically OR's the sixteen row masks to get the set of stamps touched by the primitive. Subraster 9052 then ANDs the touched stamps with the stamp selection bits 9278, as shown in tile 9276, to form one touched stamp list, which is shown in tile 9280, step 9172. The Subrasterizer passes a request to MCCAM Cull for each stamp row, and receives a potentially visible stamp list from MCCAM Cull. The visible stamp list is combined with the touched stamp list, to determine the final potentially visible stamp set in a stamp row, step 9174. For each row, the visible stamp set is sent to the Column Selection block 9054 of Stamp Selection Logic unit 9008. The Subrasterizer can process one row of stamps per cycle. If a primitive contains more than one row of stamps then the Subrasterizer takes more than one cycle to process the primitive and therefore will request MCCAM to stall the removal of primitives from the Input FIFO. The Subrasterizer itself can be stalled if a request is made by the Column Selection unit.

FIG. E 20 illustrates a stamp 9291, containing four pixels 9292, 9293, 9294 and 9295. Each pixel is divided into 8×8 subraster grid. The grid shown in FIG. E 20 shows grid lines located at the mid-point of each subraster step. In one embodiment, samples are located at the center of a unit grid, as illustrated by samples 0–15 in FIG. E 20 designated by the circled numbers (e.g. (1)). Placing the samples in this manner, off grid by one half of a subraster step, avoids the complications of visibility rules that apply to samples on the edge of a polygon. In this embodiment, polygons can be defined to go to the edge of a subraster line or pixel boundary, but samples are restricted to positions off of the subraster grid. In a further embodiment, two samples in adjacent pixels are placed on the same subraster. This simplifies sample processing by reducing the number of $XleftSub_i$ and $XrightSub_i$ by a factor of two.

Column Selection Within Stamp Selection Logic

Tthe Column Selection unit 9054, shown in FIG. E 14, tells the Z Cull unit 9012 which stamp to process in each clock cycle. If a stamp row contains more than one potentially visible stamp, the Column Selection unit requests that the Subrasterizer stall.

Z Cull

The Z Cull unit 9012 contains the Sample Z Buffer unit 9055 and Z Cull Sample State Machines 9057, shown in FIG. E 14. The Sample Z Buffer unit 9055 stores all the data for each sample in a tile, including the z value for each sample, and all the the sample FSM state bits. To enable the Z Cull Sample State Machines 9057 to process one stamp per cycle, Z Cull unit 9012 accesses the z values for all 16 sample points in a stamp in parallel and also computes the new primitive's z values at those sample points in parallel.

Z Cull unit 9012 determines whether a primitive covers a particular sample point i by comparing the sample point x coordinate, $Xsample_i$, with the $XlefSub_i$ and $XrightSub_i$ values computed by the Subrasterizer. Sample i is covered if and only if $XlefSub_i \leqq Xsample < XrightSub_i$, step 9178. Z Cull unit 9012 then computes the z value of the primitive at those sample points, step 9180, and compares the resulting z values to the corresponding z values stored in the Sample Z Buffer for that stamp, step 9182. Generally if the sample point z value is less than the z value in the Z Buffer then the sample point is considered to be visible. However, an API can allow programmers to specify the comparison function (>, ≧, <, ≦, always, never). Also, the z comparison can be affected by whether alpha test or blending is turned on, and whether the pipeline is in sorted transparency mode.

The Z Cull Sample State Machines 9057 includes a per-sample FSM for each sample in a stamp. In an embodiment where each stamp consists of 16 samples, there are 16 Z Cull Sample State Machines 9057 that each determine in parallel how to update the z value and sample state for the sample in the Z buffer it controls, and what action to take on the previously processed VSPs that overlap the sample point. Also in sorted transparency mode the Z Cull Sample State Machines determine whether to perform another pass through the transparent primitives.

Based on the results of the comparison between the z value of the primitive at the sample points and the corresponding z values stored in the Sample Z Buffer for that stamp, the current Cull mode bits and the states of the sample state machines, the Sample Z Buffer is updated, step 9184. For each sample, the sixteen Z Cull Sample State Machines output the control bits: KeepOld, SendOld, NewVSPMask, and SendNew, to indicate how a sample is to be processed, step 9186. The set of NewVSPMask bits (16 of them) constitute a new stamp portion (SP) coverage mask, step 9188. The new stamp portion is dispatched to the New VSP Queue. In the event that the primitive is not visible at all in the stamp (all NewVSPMask bits are FALSE), then nothing is sent to the New VSP Queue. If more than one sample may affect the final sample position final value, then the stamp portions containing a sample for the sample position are early dispatched, step 9192. All of the control bits for the 16 samples in a stamp are provided to Stamp Portion Memory 9018 in parallel.

Samples are sent down the pipeline in VSPs, e.g. as part of a group comprising all of the currenity visible samples in a stamp. When one sample within a stamp is dispatched (either early dispatch or end-of-tile dispatch), other samples within the same stamp and the same primitive are also dispatched as a VSP. While this causes more samples to be sent down the pipeline, it generally causes a net decrease in the amount of color computation. This is due to the spatial coherence within a pixel (i.e., samples within the same pixel tend to be either visible together or hidden together) and a tendency for the edges of polygons with alpha test, color test, stencil test, and/or alpha blending to potentially split otherwise spatially coherent stamps. That is, sending additional samples down the pipeline when they do not appreciably increase the computational load is more than offset by reducing the total number of VSPs that need to be sent.

FIGS. E 21A–E 21D illustrate an example of the operation of an embodiment of Z Cull 9012. As illustrated in FIG. E 21A primitive 9312 is the first primitive in tile 9310. Z Cull 9012 therefore updates all the z values touched by the primitive and stores 35 stamp portions into Stamp Portion Memory 9018. In FIG. E 21B a second primitive 9322 is added to tile 9310. Primitive 9322 has lower z values than primitive 9312. Z-Cull 9012 processes the 27 stamps touched by primitive 9322. FIG. E 21C illustrates the 54 stamp portions stored in Stamp Portion Memory 9018 after primitive 9322 is processed. The 54 stamp portions are the sum of the stamps touched by primitives 9312 and 9322 minus eight stamp portions from primitive 9312 that are completely removed. Region 9332 in FIG. E 21D indicates the eight stamp portions that are removed, which are the stamp portions wherein the entire component of the stamp portion touched by primitive 9312 is also touched by primitive 9322 which has lesser Z values.

In one embodiment, Z Cull 9012 maintains one z value for each sample, as well as various state bits. In another embodiment, Z Cull 9012 maintains two z values for each sample, the second z value improves the efficiency of the conservative hidden surface removal process. Z Cull 9012 controls Stamp Portion Memory 9018, but z values and state bits are not associated with stamp portions. Stamp Portion Memory 9018 can maintain 16 stamp portions per stamp, for a total of 256 stamp portions per tile.

Z Cull 9012 outputs the four bit control signal (SendNew, KeepOld and SendOld and NewVSPMask) to Stamp Portion Memory 9018 that controls how the sample is processed. KeepOld indicates that the corresponding sample in Stamp Portion Memory 9018 is not invalidated. That is, if the sample is part of a stamp portion in Stamp Portion Memory 9018, it is not discarded. SendOld is the early dispatch indicator. If the sample corresponding to a SendOld bit belongs to a stamp portion in Stamp Portion Memory 9018, then this stamp portion is sent down the pipeline. SendOld is only asserted when KeepOld is asserted. NewVSPMask is asserted, when the Z Cull 9012 process determines this sample is visible (at that point in the processing) and a new stamp portion needs to be created for the new primitive, which is done by Stamp Portion Memory 9018 when it receives the signal. SendNew is asserted when the Z Cull 9012 process determines the sample is visible (at that point in the processing) and needs to be sent down the pipeline. SendNew causes an early dispatch of a stamp portion in the new primitive.

FIG. E 22 illustrates an example of how samples are processed by Z Cull 9012. Primitive 9352 is processed in tile 9350 before primitive 9354. Primitive 9354 has lesser z values than primitive 9352 and is therefore in front of primitive 9352. For the seven samples in oval region 9356 Z Cull 9012 sets the KeepOld control bits to zero, and the NewVSPMask control bits to one.

FIGS. E 23A–E 23D illustrate an example of early dispatch. Early dispatch is the sending of geometry down the pipeline before all geometry in the tile has been processed. In sorted transparency mode early dispatch is not used. First a single primitive 9372, illustrated in FIG. E 23A is processed in tile 9370. Primitive 9370 touches 35 stamps, and these are stored in Stamp Portion Memory 9018. A second primitive, 9382, with lesser z values is then added with the mode bit DoABlend asserted. The DoABlend mode bit indicates that the colors from the overlapping stamp portions should be blended. Z Cull 9012 then processes the 27 stamps touched by primitive 9382. Z Cull 9012 can be designed so that samples from up to N primitives can be stored for each stamp. In one embodiment samples from only one primitive are stored for each stamp. FIG. E 23C illustrates the stamp portions in Stamp Portion Memory 9018 after primitive 9382 is processed. FIG. E 23D illustrates the 20 visible stamp portions touched by region 9374 that are dispatched early from primitive 9372 because the stamp portion z values were replaced by the lesser z values from primitive 9382.

FIG. E 24 illustrates a sample level example of early dispatch processing. Stamp 9390 includes part of primitive 9382 and part of primitive 9372, both of which are shown in FIG. E 23B. The samples in region 9392 all are touched by primitive 9382 which has lesser z values than primitive 9372. Therefore, for these seven samples Z Cull 9012 outputs the control signal SendOld. In one embodiment, if Z Cull 9012 determines that one sample in a stamp should be sent down the pipeline then Z Cull 9012 sends all of the samples in that stamp down the pipeline so as to preserve spatial coherency. This is also minimizes the number of fragments that are sent down the pipeline. In another embodiment this approach is applied at a pixel level, wherein if Z Cull 9012 determines that any sample in a pixel should be sent down the pipeline all of the samples in the pixel are sent down the pipeline.

In a cull process where everything in a scene is an opaque surface, after all the surfaces have been processed, only the stamp portions that are visible are left in Stamp Portion Memory 9018. The known visible stamp portions are then sent down the pipeline. However, when an early dispatch occurs, the early dispatch stamp portions are sent down the pipeline right away.

For each stamp a reference called Zref is generated. In one embodiment, the Zref is placed at the center of the stamp. The values ∂z/∂x and ∂z/∂y at the Zref point are also computed. These three values are sent down the pipeline to Pixel block 15000. Pixel block 15000 does a final z test. As part of the final z test, Pixel block 15000 re-computes the exactly equivalent z values for each sample using the Zref value and the ∂z/θx and ∂z/∂y values using the equation:

$$z_1 = Zref + \frac{\partial z}{\partial y}(y_1 - y_{ref}) + \frac{\partial z}{\partial x}(x_1 - x_{ref})$$

Computing the z values rather than sending the 16 z values in every stamp down the pipeline significantly reduces the bandwith used. Furthermore, only the z values of potentially visible samples are determined. To ensure that Z Cull 9012 and Pixel block 15000 use exactly the same z values, Z Cull 9012 performs the same computations that Pixel block does to determine the z value for each stamp so as to avoid introducing any artifacts. To improve the computational efficiency a small number of bits can be used to express the delta x and delta y values, since the distances are only fractions of a pixel. For example, in one embodiment a 24 bit derivative and 4 bit delta values are used.

MCCAM Update

MCCAM Update unit 9059, shown in FIG. E 14, determines the maximum of the sixteen updated z values for the sixteen sample points in each stamp and sends it to the MCCAM Cull unit to update the MCCAM array 9003.

New VSP Queue

Each clock cycle, Z Cull unit 9012 generates the four sets of four control bits (KeepOld, SendOld, NewVSPMask, and SendNew) per stamp portion. Thus Z Cull 9012 processes one stamp per primitive per cycle, but not all of the stamps processed are visible, only the Visible Stamp Portions (VSPs) are sent into New VSP Queue 9058. The input rate to New VSP Queue 9058 is therefore variable. Under "ideal" circumstances, the SPM Mask and Valid unit 9060 can store one new stamp portion every clock cycle. However, the SPM Mask and Valid unit 9060 requires multiple clocks for a new stamp portion when early dispatch of VSPs occurs. When VSPs are dispatched early, New VSP Queue 9058 stores the new stamp portions, thus allowing Z Cull 9012 to proceed without stalling. One new VSP may cause the dispatch of up to 16 old VSPs, so the removal rate from the New VSP Queue is also variable.

In one embodiment, New VSP Queue 9058 is only used with early dispatches. The SPM Mask and Valid unit handles one VSP at a time. The New VSP Queue ensures stamp portions are available for Z Cull 9012 when an early dispatch involves more than one VSP. Based upon performance analysis, typically about 450 stamps are expected to be touched in a tile. The depth complexity of a scene refers to the average number-of times a pixel in the scene needs to be rendered. With a depth complexity of two, 225 VSPs would be expected to be provided as output from Z Cull 9012 per tile. Therefore on average about four VSPs are expected per stamp. A triangle with blend turned on covering a 50 pixel area can touch on average three tiles, and the number of stamps it touches within a tile should be less than eight. Therefore, in one embodiment, the New VSP Queue depth is set to be 32.

The link between Z Cull unit 9012 and Stamp Portion Memory 9018 through New VSP Queue 9058 is unidirectional. By avoiding using a feedback loop New VSP Queue 9058 is able to process samples in each cycle.

SPM Mask and Valid

The active Stamp Portion Memory (SPM) Mask and Valid unit 9060 stores the VSP coverage masks for the tile. Each VSP entry includes a valid bit to indicate if there is a valid VSP stored there. The valid bits for the VSPs are stored in a separate memory. The Stamp Portion Memory Mask and Valid unit 9060 is double buffered (i.e. there are two copies 9060 and 9062) as shown in FIG. E 14. The Memory Mask and Valid Active State unit 9060 contains VSPs for the current tile while the Memory Mask and Valid Dispatch State unit page 9062 contains VSPs from the previous tile (currently being dispatched). As a new VSP is removed from the New VSP Queue, the active state SPM Mask and Valid unit 9060 updates the VSP Mask for the VSPs that already exist in its mask memory and adds the new VSP to the memory content. When color blending or other conditions occur that require early dispatch, the active state SPM Mask and Valid unit dispatches VSPs through the active SPM Data unit 9064 to the dispatch queue. The operations performed in the mask update or early dispatch are controlled by the KeepOld, SendOld, SendNew and NewVSPMask control bits generated in Z Cull 9012. In sorted transparency mode, the SendOld and SendNew mask bits are off. VSP coverage masks are mutually exclusive, therefore if a new VSP has a particular coverage mask bit turned on, the corresponding bit for all the previously processed VSPs in the stamp have to be turned off.

The state transition from active to dispatch and vice versa is controlled by mode packets. Receiving a packet signaling the end of a tile (Begin Tile, End Frame, Buffer Clear, or Cull Packet with CullFlushAll set to TRUE) causes the active state Stamp Portion Memory to switch over to dispatch state and vice versa. The page in dispatch state cycles through each stamp and sends all VSPs to the SPM Data unit, which forwards them to the dispatch queue. In an alternative embodiment, the Stamp Portion Memory Mask and Valid unit 9060 is triple buffered.

The SPM Data

The active Stamp Portion Memory Data unit 9064 stores the Zstamp, dz/dx, dz/dy and the Color Pointer for every VSP in the tile. The Stamp Portion Memory Data unit is also double buffered. The SPM Mask and Valid unit 9060 sends new VSP information to the SPM Data unit 9064. The VSP information includes control signals that instruct the SPM Data unit 9064 to either send the new VSP or save the new VSP to its memory. If the new VSP should be saved, the SPM Mask and Valid unit control signals also determine which location among the 16 possible slots the new VSP should occupy. In addition, for the case of early dispatch, the SPM Data unit also gets a list of old VSP locations and the associated VSP Masks that need early dispatch. The SPM Data unit first checks to see if there are any old VSPs that need to be dispatched. If the SPM Data unit finds any, it will read the VSP data from its memory, merge the VSP data with the VSP Mask sent from the SPM Mask and Valid unit, and put the old VSPs into the dispatch queue. The SPM Data unit then checks if the new VSP should also be sent, and if it is affirmative, then it passes the new VSP data to the dispatch queue 9068. If the new VSP should not be sent, then the SPM Data unit writes the new VSP data into its memory.

The Dispatch Queue and Dispatch Logic

The Dispatch Logic unit 9072 sends one entry's worth of data at a time from one of the two SPM dispatch queues 9068, 9070 to the Mode Injection unit 10000. The Dispatch Logic unit 9072 requests dispatch from the dispatch state SPM unit first. After the dispatch state SPM unit has exhausted all of its VSPs, the Dispatch Logic unit 9072 requests dispatch from the active state SPM dispatch queue.

Alpha Test

Alpha test compares the alpha value of a given pixel to an alpha reference value. The alpha reference value is often used to indicate the transparency value of a pixel. The type of comparison may be specified, so that for example the comparison may be a greater-than operation, a less-than operation, or other arithmetic, algebraic, or logical comparison, and so forth. If the comparison is a greater-than operation, then a pixel's alpha value has to be greater than the reference to pass the alpha test. For instance, if a pixel's alpha value is 0.9, the reference alpha is 0.8, and the comparison is greater-than, then that pixel passes the alpha test. Any pixel not passing the alpha test is discarded.

Alpha test is a per-fragment operation and in a preferred embodiment is performed by the Pixel block after all of the fragment coloring calculations, lighting operations and shading operations are completed. FIG. E 25 illustrates an example of processing samples with alpha test with a CHSR method. This diagram illustrates the rendering of six primitives (Primitives A, B, C, D, E, and F) at different z coordinate locations for a particular sample, rendered in the following order (starting with a "depth clear" and with "depth test" set to less-than): primitives A, B, and C (with "alpha test" disabled); primitive D (with "alpha test" enabled); and primitives E and F (with "alpha test" disabled). Note from the illustration that $z_A>z_C>z_B>z_E>z_D>z_F$, such that primitive A is at the greatest z coordinate distance. Also note that alpha test is enabled for primitive D, but disabled for each of the other primitives.

The steps for rendering these six primitives under a conservative hidden surface removal process with alpha test are as follows:

Step 1: The depth clear causes the following result in each sample finite state machine: 1) z values are initialized to the maximum value; 2) primitive information is cleared; and 3) sample state bits are set to indicate the z value is accurate.

Step 2: When primitive A is processed by the sample FSM, the primitive is kept (i.e., it becomes the current best guess for the visible surface), and this causes the sample FSM to store: 1) the z value $z_A$ as the "near" z value; 2) primitive information needed to color primitive A; and 3) the z value ($z_A$) is labeled as accurate.

Step 3: When primitive B is processed by the sample FSM, the primitive is kept (its z value is less-than that of primitive A), and this causes the sample FSM to store: 1) the z value $z_B$ as the "near" z value ($z_A$ is discarded); 2) primitive information needed to color primitive B (primitive A's information is discarded); and 3) the z value ($z_B$) is labeled as accurate.

Step 4: When primitive C is processed by the sample FSM the primitive is discarded (i.e., it is obscured by the current best guess for the visible surface, primitive B), and the sample FSM data is not changed.

Step 5: When primitive D (which has alpha test enabled) is processed by the sample FSM, the primitive's visibility cannot be determined because it is closer than primitive B and because its alpha value is unknown at the time the sample FSM operates. Because a decision cannot be made as to which primitive would end up being visible (either primitive B or primitive D) primitive B is early dispatched down the pipeline (to have its colors generated) and primitive D is kept. When processing of primitive D has been completed, the sample FSM stores: 1) the "near" z value is $z_D$ and the "far" z value is $z_B$; 2) primitive information needed to color primitive D (primitive B's information has undergone early dispatch); and 3) the z values are labeled as conservative (because both a near and far are being maintained). In this condition, the sample FSM can determine that a piece of geometry closer than $z_D$ obscures previous geometry, geometry farther than $z_B$ is obscured, and geometry between $z_D$ and $z_B$ is indeterminate and must be assumed to be visible (hence a conservative assumption is made). When a sample FSM is in the conservative state and it contains valid primitive information, the sample FSM method considers the depth value of the stored primitive information to be the near depth value.

Step 6: When primitive E (which has alpha test disabled) is processed by the sample FSM, the primitive's visibility cannot be determined because it is between the near and far z values (i.e., between $z_D$ and $z_B$). However, primitive E is not sent down the pipeline at this time because it could result in the primitives reaching the z buffered blend (part of the Pixel block in a preferred embodiment) out of correct time order. Therefore, primitive D is sent down the pipeline to preserve the time ordering. When processing of primitive E has been completed, the sample FSM stores: 1) the "near" z value is $z_D$ and the "far" z value is $z_B$ (note these have not changed, and $z_E$ is not kept); 2) primitive information needed to color primitive E (primitive D's information has undergone early dispatch); and 3) the z values are labeled as conservative (because both a near and far are being maintained).

Step 7: When primitive F is processed by the sample FSM, the primitive is kept (its z value is less-than that of the near z value), and this causes the sample FSM to store: 1) the z value $z_F$ as the "near" z value ($z_D$ and $z_B$ are discarded); 2) primitive information needed to color primitive F (primitive E's information is discarded); and 3) the z value ($z_F$) is labeled as accurate.

Step 8: When all the geometry that touches the tile has been processed (or, in the case there are no tiles, when all the geometry in the frame has been processed), any valid primitive information is sent down the pipeline. In this case, primitive F's information is sent. This is the end-of-tile (or end-of-frame) dispatch, and not an early dispatch.

In summary in this CHSR process example involving alpha test, primitives A through F are processed, and primitives B, D, and F are sent down the pipeline. The Pixel block resolves the visibility of B, D, and F in the final z buffer blending stage. In this example, only the color primitive F is used for the sample.

Stencil Test

In OpenGL® stencil test conditionally discards a fragment based on the outcome of a comparison between a value stored in a stencil buffer at location ($x_w$, $y_w$) and a reference value. Several stencil comparison functions are permitted such that whether the stencil test passes can depend upon whether the reference value is less than, less than or equal to, equal to, greater than or equal to, greater than, or not equal to the masked stored value in the stencil buffer. In OpenGL®, if the stencil test fails, the incoming fragment is discarded. The reference value and the comparison value can have multiple bits, typically 8 bits so that 256 different values may be represented. When an object is rendered into Frame Buffer 17000, a tag having the stencil bits is also written into the frame buffer. These stencil bits are part of the pipeline state. The type of stencil test to perform can be specified at the time the geometry is rendered.

The stencil bits are used to implement various filtering, masking or stenciling operations, to generate, for example, effects such as shadows. If a particular fragment ends up affecting a particular pixel in the frame buffer, then the stencil bits can be written to the frame buffer along with the pixel information.

In a preferred embodiment of the CHSR process, all stencil operations are done near the end of the pipeline in the Pixel block in a preferred embodiment. Therefore, the stencil values are stored in the Frame Buffer and as a result the stencil values are not available to the CHSR method performed in the Cull block. While it is possible for the stencil values to be transferred from the Frame Buffer for use in the CHSR process, this would generally require a long latency path that would reduce performance. In APIs such as OpenGL®, the stencil test is performed after alpha test, and the results of alpha test are not known to the CHSR process. Furthermore, renderers typically maintain stencil values over many frames (as opposed to depth values that are generally cleared at the start of each frame). Hence, the CHSR process utilizes a conservative approach to dealing with stencil operations. If a primitive can affect the stencil values in the frame buffer, then the VSPs in the primitive are always sent down the pipeline by the Cull block asserting the control bit CullFlushOverlap, shown in FIG. E 15. Primitves that can affect the stencil values are sent down the pipeline because stencil operations are performed by pipeline stages after Cull block 9000 (see OpenGL® specification). A CullFlushOverlap condition sets the sample FSM to its most conservative state. Generally the stencil test is defined for a group of primitives. When Cull block 9000 processes the first sample in a primtive with a new stencil test, control software sets the CullFlushAll bit in the corresponding Setup Output Cull Packet. CullFlushAll causes all of the VSPs from the Cull block to be sent to Pixel block 15000, and clears the z values in Stamp Portion Memory 9018. This "flushing" is needed because changing the stencil reference value effectively changes the "visibility rules" in the z buffered blend (or Pixel block). Pixel block 15000 compares the stencil values of the samples for a given sample location and determines which samples affect the final frame buffer color based on the stencil test. For example, for one group of samples corresponding to a sample location, the stencil test may be render if the stencil bit is equal to one. Pixel block 15000 then discards each of the samples for that sample in this group that have a stencil bit value not equal to one.

As an example of the CHSR process dealing with stencil test (see OpenGL® specification), consider the diagrammatic illustration of FIG. E 26, which has two primitives (primitives A and C) covering four particular samples (with corresponding sample FSMs, referred to as SFSM0 through SFSM3) and an additional primitive (primitive B) covering two of those four samples. The three primitives are rendered in the following order (starting with a depth clear and with depth test set to less-than): primitive A (with stencil test disabled); primitive B (with stencil test enabled and StencilOp set to "REPLACE", see OpenGL® specification); and primitive C (with stencil test disabled). The steps are as follows:

Step 1: The depth clear causes the following in each of the four sample FSMs in this example: 1) z values are initialized to the maximum value; 2) primitive information is cleared; and 3) sample state bits are set to indicate the z value is accurate.

Step 2: When primitive A is processed by each sample FSM, the primitive is kept (i.e., it becomes the current best guess for the visible surface), and this causes the four sample FSMs to store: 1) their corresponding z values (either $z_{A0}$, $z_{A1}$, $z_{A2}$, or $z_{A3}$ respectively) as the "near" z value; 2) primitive information needed to color primitive A; and 3) the z values in each sample FSM are labeled as accurate.

Step 3: When primitive B is processed by the sample FSMs, only samples 1 and 2 are affected, causing SFSM0 and SFSM3 to be unaffected and causing SFSM1 and SFSM2 to be updated as follows: 1) the far z values are set to the maximum value and the near z values are set to the minimum value; 2) primitive information for primitives A and B are sent down the pipeline; and 3) sample state bits are set to indicate the z values are conservative.

Step 4: When primitive C is processed by each sample FSM, the primitive is kept, but the sample FSMs do not all handle the primitive the same way. In SFSM0 and SFSM3, the state is updated as: 1) $z_{C0}$ and $z_{C3}$ become the "near" z values ($z_{A0}$ and $z_{A3}$ are discarded); 2) primitive information needed to color primitive C (primitive A's information is discarded); and 3) the z values are labeled as accurate. In SFSM1 and SFSM2, the state is updated as: 1) $z_{C1}$ and $z_{C2}$ become the "far" z values (the near z values are kept); 2) primitive information needed to color primitive C; and 3) the z values remain labeled as conservative.

In summary in this CHSR process example involving stencil test, primitives A through C are processed, and all the primitives are sent down the pipeline, but not all the samples. In a preferred embodiment, the Pixel blocks performs final z buffered blending operations to process the unresolved visibility issues. Multiple samples were shown in this example to illustrate that CullFlushOverlap "flushes" selected samples while leaving others unaffected.

Alpha Blending

Alpha blending is used to combine the colors of two primitives into one color. However, the primitives are still subject to the depth test for the updating of the z values. The amount of color contribution from each of the samples depends upon the transparency values, referred to as the alpha value, of the samples. The blend is performed according to the equation $$C=C_s\alpha_s+C_d(1-\alpha_s)$$

where C is the resultant color, $C_s$ is the source color for an incoming primitive sample, $\alpha_s$ is the alpha value of the incoming primitive sample, and $C_d$ is the destination color at the corresponding frame buffer location. Alpha values are defined at the vertices of primitives, and alpha values for samples are interpolated from the values at the vertices.

As an example of the CHSR process dealing with alpha blending, consider FIG. E 27, which has four primitives (primitives A, B, C, and D) for a particular sample, rendered in the following order (starting with a depth clear and with depth test set to less-than): primitive A (with alpha blending disabled); primitives B and C (with alpha blending enabled); and primitive D (with alpha blending disabled). The steps are as follows:

Step 1: The depth clear causes the following in each CHSR sample FSM: 1) z values are initialized to the maximum value; 2) primitive information is cleared; and 3) sample state bits are set to indicate the z value is accurate.

Step 2: When primitive A is processed by the sample FSM, the primitive is kept (i.e., it becomes the current best guess for the visible surface), and this causes the sample FSM to store: 1) the z value $z_A$ as the "near" z value; 2) primitive information needed to color primitive A; and 3) the z value is labeled as accurate. Step 3: When primitive B is processed by the sample FSM, the primitive is kept (because its z value is less-than that of primitive A), and this causes the sample FSM to store: 1) the z value $z_B$ as the "near" z value ($_A$z is discarded); 2) primitive information needed to color primitive B (primitive A's information is sent down the pipeline); and 3) the z value ($z_B$) is labeled as accurate. Primitive A is sent down the pipeline because, at this point in the rendering process, the color of primitive B is to be blended with primitive A. This preserves the time order of the primitives as they are sent down the pipeline.

Step 4: When primitive C is processed by the sample FSM, the primitive is discarded (i.e., it is obscured by the current best guess for the visible surface, primitive B), and the sample FSM data is not changed. Note that if primitives B and C need to be rendered as transparent surfaces, then primitive C should not be hidden by primitive B. This could be accomplished by turning off the depth mask while primitive B is being rendered, but for transparency blending to be correct, the surfaces should be blended in either front-to-back or back-to-front order.

If the depth mask (see OpenGL® specification) is disabled, writing to the depth buffer (i.e., saving z values) is not performed; however, the depth test is still performed. In this example, if the depth mask is disabled for primitive B, then the value $z_B$ is not saved in the sample FSM. Subsequently, primitive C would then be considered visible because its z value would be compared to $z_4$.

In summary of this example CHSR process example involving alpha blending, primitives A through D are processed, and all the primitives are sent down the pipeline, but not in all the samples. In a preferred embodiment, the Pixel blocks performs final z buffered blending operations to process the unresolved visibility issues. Multiple samples were shown in this example to illustrate that CullFlushOverlap dispatches selected samples without affecting other samples.

Control Bits

FIG. E 28A illustrates part of a Spatial Packet containing three control bits: DoAlphaTest, DoABlend and Transparent. The Transparent bit is set by the Geometry block 3000 and is normally only used in sorted transparency mode. When the Transparent bit is reset the corresponding primitive is only processed in passes for opaque primitives. When the Transparent bit is set the corresponding primitive is only processed in passes for transparent primitives. The Transparent bit is generated in the Geometry block 3000 and is used by the Sort block 6000 to determine whether a particular primitive should be included in an opaque pass or a transparent pass; but, the Cull block 9000 knows the type of pass (i.e. opaque or transparent) by looking at the Begin Tile packet, so there is no need to send the Transparent bit to the Cull block 9000. The DoAlphaTest control bit controls whether Alpha test is performed on the samples in the primitive.

When the DoAlphaTest control bit is set to a one it means that downstream from Cull block 9000 an alpha test will be performed on each fragment. When the alpha values of all of the samples in a stamp exceed a predetermined value, then even though an application program indicates that an alpha test should be performed, a functional block upstream from Cull block 9000 may determine that none of the samples can fail alpha test. DoAlphaTest can then be set to zero which indicates to Cull block 9000 that since all the samples are guaranteed to pass alpha test, it can process the samples as if they were not subject to alpha test. Observe that in an embodiment where one z value is stored, a sample being subject to alpha test can cause the stored sample to be made conservative. Therefore, DoAlphaTest being zero allows Cull to identify more samples as accurate and thereby eliminate more samples. A detailed description of the control of the DoAlphaTest control bit is provided in the provisional patent application entitled "Graphics Processor with Deferred Shading," filed Aug. 20, 1998, which is incorporated by reference.

The DoABlend control bit, generated by the Geometry block 3000, indicates whether a primitive is subject to blending. Blending combines the color values of two samples.

In one embodiment, the Geometry block 3000 checks the alpha values at each vertex. If, given the alpha values, the BlendEquation and the BlendFunc pipeline state information is defined such that the frame buffer color values cannot affect the final color, then blending is turned off for that primitive using the DoABlend control bit. Observe that if blending was always on, and all primitives were treated as transparent, then a hidden surface removal process before lighting and shading might not not remove any geometry.

The following describes the method for evaluating texture data to determine whether blending can be turned off for a render if less than depth test. With a render if less than depth test, if there are two opaque primitives at the same location, the primitive that is in front is rendered. The present invention can also be used with a render if greater than depth test. Blending is turned off when a primitive is opaque and therefore no geometry behind the primitive will contribute to the corresponding final colors in the frame buffer. Whether a primitive is opaque is determined conservatively in that if there is any uncertainty as to whether the final frame buffer colors will be a blend of the current primitive and other primitives with greater z values, then the primitive is treated as transparent. For example, given an appropriately defined texture environment, if the alpha values at all of the vertices of a primitive are equal to one then blending can be turned off for that primitive because that primitive can be treated as opaque. Therefore, the culling method can be applied and more distant geometry can be eliminated.

Whether blending can be turned off for a primitive depends upon the texture type, the texture data, and the texture environment. In one embodiment there are two texture types. The first texture type is RGB texture. In RGB texture each texel (the equivalent of a pixel in texture space) is defined by a red color component value "R," a green color component value "G," and a blue color component value "B." There are no alpha values in this first texture type. The second texture type describes each texel by R, G and B values as well as by an alpha value. The texture data comprise the values of the R, G, B and alpha components. The texture environment defines how to determine the final color of a pixel based on the relevant texture data and properties of the primitive. For example, the texture environment may define the type of interpolation that is used, as well as the lighting equation and when each operation is performed.

FIG. E 28B illustrates how the alpha values are evaluated to set the DoABlend control bit. Alpha mode register stores the Transparent bits for each of the three vertices of a triangular primitive. The Transparent bit defines whether the corresponding vertex is transparent indicated by a one, or opaque indicated by a zero. If all three of the vertices are opaque then blending is turned off, otherwise blending is on. Logic block implements this blending control function. When the AlphaAllOne control signal is asserted and all three of the transparent bits in the alpha mode register are equal to one, logic block sets DoABlend to a zero to turn off blending. The alpha value can also be inverted so that an alpha value of zero indicates that a vertex is opaque. Therefore, in this mode of operation, when the AlphaAllZero control signal is asserted and all three of the transparent bits are zero, the logic block sets DoABlend to a zero ("0") to turn off blending.

Sorted Transparency Mode

The graphics pipeline operates in either time order mode or in sorted transparency mode. In sorted transparency mode, the process of reading geometry from a tile is divided into multiple passes. In the first pass, the Sort block outputs guaranteed opaque geometry, and in subsequent passes the Sort block outputs potentially transparent geometry. Within each sorted transparency mode pass, the time ordering is preserved, and mode data is inserted into its correct time-order location. Sorted transparency mode can be performed in either back-to-front or front-to-back order. In a preferred embodiment, the sorted transparency method is performed jointly by the Sort block and the Cull block.

In back-to-front sorted transparency modes a pixel color is determined by first rendering the front most opaque surface at the sample location. In the next pass the farthest transparent surface, that is in front of the opaque surface is rendered. In the subsequent pass the next farthest transparent surface is rendered, and this process is repeated until all of the samples at the sample location have been rendered or when a predetermined maximum number of samples have been rendered for the sample location.

The following provides a more detailed description of the back-to-front sorted transparency mode rendering method. This method is used with a render if less than depth test. Referring to FIG. E 29, in the first pass the Sort block sends the opaque primitives. Cull block 9000 stores the z values for the opaque primitive samples in MCCAM array 9003 (shown in FIG. E 15) (step 2901). The Sort block sends transparent primitives to the Cull block in the second and subsequent passes. In sorted transparency mode MCCAM array 9003 and Sample Z Buffer 9055 each store two z values (Zfar and Znear) for each corresponding sample. The Zfar value is the z value of the closest opaque sample. The Znear value is the z value of the sample nearest to, and less than, the z value of the opaque layer. One embodiment includes two MCCAM arrays 9003 and two Sample Z Buffers 9055 so as to store the Zfar and Znear values in separate units. First the z values for the front-most non-transparent samples are stored in the MCCAM array 9003 (step 2902). The front-most non-transparent samples are then dispatched down the pipeline to be rendered (step 2903). In one embodiment, a flag bit in every pointer indicates whether the corresponding geometry is transparent or non-transparent. The Znear values for each sample are reset to zero (step 2904) in preparation for the next pass. During each transparent pass the z value for each sample point in the current primitive is compared with both the Zfar and the Znear values for that sample point. If the z value is larger than Znear but smaller than Zfar, then the sample is closer to the opaque layer and its z value replaces the current Znear value. The samples corresponding to the new Znear values are then dispatched down the pipeline to be rendered (step 2907), and Zfar for each such sample is set to the value of Znear (step 2908). This process is then repeated in the next pass.

Cull block 9000 detects that it has finished processing a tile when for each sample point, there is at most one sample that is in front of Zfar. Transparent layer processing is not finished as long as there are two or more samples in front of Zfar for any sample point in the tile.

In front-to-back sorted transparency modes the transparent samples are rendered in order, starting at the front most transparent sample and then the next farther transparent sample in each subsequent cycle is rendered. An advantage of using a front-to-back sorted transparency mode is that if a maximum number of layers is defined, then the front most transparent layers are rendered which thereby provides a more accurate final displayed image.

In one embodiment, the maximum number of layers to render is determined by accumulating the alpha values. The alpha value represents the transparency of the sample location. As each sample is rendered the transparency at that sample location decreases, and the cumulative alpha value increases (where an alpha value of one is defined as opaque). For example, the maximum cumulative alpha value may be defined to be 0.9, when the cumulative alpha value exceeds 0.9 then no further samples at that sample location are rendered.

There are two counters in Sample Z Buffer 9055, shown in FIG. E 15, for every sample. When two samples from different primitives at the same sample location have the same z value, the samples are rendered in the time order that they arrived. The counters are used to determine which sample should be rendered based on the time order. The first counter identifies the primitive that is to be processed in the current pass. For example, in a case where there are five primitives all having a sample in a given sample location with the same z value, in the first pass the first counter is set to one which indicates the first primitive in this group should be rendered. In the second pass this first counter is incremented, to identify the second primitive as the primitive to be rendered.

The second counter maintains a count of the primitive being evaluated within a pass. In the five primitive example, in the third pass, the third primitive has the sample that should be rendered. At the start of the first pass the first counter is equal to three and the second counter is equal to one. The first counter value is compared with the second counter value and because the counter values are not equal the sample from the first primitive is not rendered. The second counter is then incremented, but the counters are still not equal so the sample from the second primitive is not rendered. In the third pass, the first and second counter values are equal, therefore the sample from the third primitive is rendered.

Characteristics of Particular Exemplary Embodiments

We now highlight particular embodiments of the inventive deferred shading graphics processor (DSGP). In one aspect (CULL) the inventive DSGP provides structure and method for performing conservative hidden surface removal. Numerous embodiments are shown and described, including but not limited to:

(1) A method of performing hidden surface removal in a computer graphics pipeline comprising the steps of: selecting a current primitive from a group of primitives, each primitive comprising a plurality of stamps; comparing stamps in the current primitive to stamps from previously evaluated primitives in the group of primitives; selecting a first stamp as a currently potentially visible stamp (CPVS) based on a relationship of depth states of samples in the first stamp with depth states of samples of previously evaluated stamps; comparing the CPVS to a second stamp; discarding the second stamp when no part of the second stamp would affect a final graphics display image based on the stamps that have been evaluated; discarding the CPVS and making the second stamp the CPVS, when the second stamp hides the CPVS; dispatching the CPVS and making the second stamp the CPVS when both the second stamp and the CPVS are at least partially visible in the final graphics display image; and dispatching the second stamp and the CPVS when the visibility of the second stamp and the CPVS depends on parameters evaluated later in the computer graphics pipeline.

(2) The method of (1) wherein the step of comparing the CPVS to a second stamp furthing comprises the steps of: comparing depth states of samples in the CPVS to depth states of samples in the second stamp; and evaluating pipeline state values. (3) The method of (1) wherein the depth state comprises one z value per sample, and wherein the z value includes a state bit which is defined to be accurate when the z value represents an actual z value of a currently visible surface and is defined to be conservative when the z value represents a maximum z value. (4) The method of (1) further comprising the step of dispatching the second stamp and the CPVS when the second stamp potentially alters the final graphics display image independent of the depth state. (5) The method of (1) further comprising the steps of: coloring the dispatched stamps; and performing an exact z buffer test on the dispatched stamps, after the coloring step.

(6) The method of (1) further comprising the steps of: comparing alpha values of a plurality of samples to a reference alpha value; and performing the step of dispatching the second stamp and the CPVS, independent of alpha values when the alpha values of the plurality of samples are all greater than the reference value. (7) The method of (1) further comprising the steps of: determining whether any samples in the current primitive may affect final pixel color values in the final graphics display image; and turning blending off for the current primitive when no samples in the current primitive affect final pixel color values in the final graphics display image. (8) The method of claim 1 wherein the step of comparing stamps in the current primitive to stamps from previously evaluated primitives further comprises the steps of: determining a maximum z value for a plurality of stamp locations of the current primitive; comparing the maximum z value for a plurality of stamp positions with a minimum z value of the current primitive and setting corresponding stamp selection bits; and identifying as a process row a row of stamps wherein the maximum z value for a stamp position in the row is greater than the minimum z value of the current primitive. (9) The method of (8) wherein the step of determining a maximum z value for a plurality of stamp locations of the current primitive further comprises determining a maximum z value for each stamp in a bounding box of the current primitive. (10) The method of (8) wherein the step of comparing stamps in the current primitive to stamps from previously evaluated primitives further comprises the steps of: determining the left most and right most stamps touched by the current primitive in each of the process rows and defining corresponding stamp primitive coverage bits; and combining the stamp primitive coverage bits with the stamp selection bits to generate a final potentially visible stamp set. (11) The method of (10) wherein the step of comparing stamps in the current primitive to stamps from previously evaluated primitives further comprises the steps of: determining a set of sample points in a stamp in the final potentially visible stamp set; computing a z value for a plurality of sample points in the set of sample points; and comparing the computed z values with stored z values and outputting sample control signals. (12) The method of (10) wherein the step of comparing the computed z values with stored z values, further comprises the steps of: storing a first sample at a first sample location as a Zfar sample, if a first depth state of the first sample is the maximum depth state of a visible sample at the first sample location; comparing a second sample to the first sample; and storing the second sample if the second sample is currently potentially visible as a Zopt sample, and discarding the second sample when the Zfar sample hides the second sample. (13) The method of (10) wherein when it is determined that one sample in a stamp should be dispatched down the pipeline, all samples in the stamp are dispatched down the pipeline. (14) The method of (10) wherein when it is determined that one sample in a pixel should be dispatched down the pipeline, all samples in the pixel are dispatched down the pipeline. (15) The method of (10) wherein the step of computing a z value for a plurality of sample points in the set of sample points further comprises the steps of: creating a reference z value for a stamp; computing partial derivatives for a plurality of sample points in the set of sample points; sending down the pipeline the reference z value and the partial derivatives; and computing a z value for a sample based on the reference z value and partial derivatives. (16) The method of (10) further comprising the steps of: receiving a reference z value and partial derivatives; and re-computing a z value for a sample based on the reference z value and partial derivatives. (17) The method of (10) further comprising the step of dispatching the CPVS when the CPVS can affect stencil values. The method of (13) further comprising the step of dispatching all currently potentially visible stamps when a stencil test changes. (19) The method of (10) further comprising the steps of: storing concurrently samples from a plurality of primitives; and comparing a computed z value for a sample at a first sample location with stored z values of samples at the first sample location from a plurality of primitives. (20) The method of (10) wherein each stamp comprises at least one pixel and wherein the pixels in a stamp are processed in parallel. (21) The method of (20) further comprising the steps of: dividing a display image area into tiles; and rendering the display image in each tile independently. (22) The method of (10) wherein the sample points are located at positions between subraster grid lines. (23) The method of (20) wherein locations of the sample points within each pixel are programmable. (24) The method of (23) further comprising the steps of: programming a first set of sample locations in a plurality of pixels; evaluating stamp visibility using the first set of sample locations; programming a second set of sample locations in a plurality of pixels; and evaluating stamp visibility using the second set of sample locations. (25) The method of (10) further comprising the step of eliminating individual stamps that are determined not to affect the final graphics display image. (26) The method of (10) further comprising the step of turning off blending when alpha values at vertices of the current primitive have values such that frame buffer color values cannot affect a final color of samples in the current primitive. (27) The method of (1) wherein the depth state comprises a far z value and a near z value.

(28) A hidden surface removal system for a deferred shader computer graphics pipeline comprising: a magnitude comparison content addressable memory Cull unit for identifying a first group of potentially visible samples associated with a current primitive; a Stamp Selection unit, coupled to the magnitude comparison content addressable memory cull unit, for identifying, based on the first group and a perimeter of the primitive, a second group of potentially visible samples associated with the primitive; a Z Cull unit, coupled to the stamp selection unit and the magnitude comparison content addressable memory cull unit, for identifying visible stamp portions by evaluating a pipeline state, and comparing depth states of the second group with stored depth state values; and a Stamp Portion Memory unit, coupled to the Z Cull unit, for storing visible stamp portions based on control signals received from the Z Cull unit, wherein the Stamp Portion Memory unit dispatches stamps having a visibility dependent on parameters evaluated later in the computer graphics pipeline. (29) The hidden surface removal system of (28) wherein the stored depth state values are stored separately from the visible stamp portions. (30) The hidden surface removal system of (28) wherein the Z Cull unit evaluates depth state and pipeline state values, and compares a currently potentially visible stamp (CPVS) to a first stamp; and wherein the Stamp Portion Memory, based on control signals from the Z Cull unit: discards the first stamp when no part of the first stamp would affect a final graphics display image based on the stamps that have been evaluated; discards the CPVS and makes the first stamp the CPVS, when the first stamp hides CPVS; dispatches the CPVS and makes the first stamp the CPVS when both the first stamp and the CPVS are at least partially visible in the final graphics display image; and dispatches the first stamp and the CPVS when the visibility of the first stamp and the CPVS depends on parameters evaluated later in the computer graphics pipeline. (31) The hidden surface removal system of (28) wherein the MCCAM Cull unit: determines a maximum z value for a plurality of stamp locations of the current primitive; compares the maximum z value for a plurality of stamp positions with a minimum z value of the current primitive and sets corresponding stamp selection bits; and identifies as a process row a row of stamps wherein the maximum z value for a stamp position in the row is greater than the minimum z value of the current primitive. (32) The hidden surface removal system of (31) wherein the Stamp Selection unit: determines the leftmost and right most stamps touched by the current primitive in each of the process rows and defines corresponding stamp primitive coverage bits; and combines the stamp primitive coverage bits with the stamp selection bits to generate a final potentially visible stamp set. (33) The hidden surface removal system of (32) wherein the Z Cull unit: determines a set of sample points in a stamp in the final potentially visible stamp set; computes a z value for a plurality of sample points in the set of sample points; and compares the computed z values with stored z values and outputs control signals. (34) The hidden surface removal system of (33) wherein the Z Cull unit comprises a plurality of Z Cull Sample State Machines, each of the Z Cull Sample State Machines receive, process and output control signals for samples in parallel.

(35) A method of rendering a computer graphics image comprising the steps of: receiving a plurality of primitives to be rendered; selecting a sample location; rendering a front most opaque sample at the selected sample location, and defining the z value of the front most opaque sample as Zfar; comparing z values of a first plurality of samples at the selected sample location; defining to be Znear a first sample, at the selected sample location, having a z value which is less than Zfar and which is nearest to Zfar of the first plurality of samples; rendering the first sample; setting Zfar to the value of Znear; comparing z values of a second plurality of samples at the selected sample location; defining as Znear the z value of a second sample at the selected sample location, having a z value which is less than Zfar and which is nearest to Zfar of the second plurality of samples; and rendering the second sample. (36) The method of 35 further comprising the steps of: when a third plurality of samples at the selected sample location have a common z value which is less than Zfar, and the common z value is the z value nearest to Zfar of the first plurality of samples: rendering a third sample, wherein the third sample is the first sample received of the third plurality of samples; incrementing a first counter value to define a sample render number, wherein the sample render number identifies the sample to be rendered; selecting a fourth sample from the third plurality of samples; incrementing a second counter wherein the second counter defines an evaluation sample number; comparing the sample render number and the evaluation sample number; and rendering a sample when the corresponding evaluation sample number equals the sample render number.

VII. Detailed Description of the Fragment Functional Block (FRG)

Overview

The Fragment block is located after Cull and Mode Injection and before Texture, Phong, and Bump. It receives Visible Stamp Portions (VSPs) that consist of up to 4 fragments that need to be shaded. The fragments in a VSP always belongs to the same primitive, therefore the fragments share the primitive data defined at vertices including all the mode settings. A sample mask, sMask, defines which subpixel samples of the VSP are active. If one or more of the four samples for a given pixel is active. This means a fragment is needed for the pixel, and the vertex-based data for primitive will be interpolated to make fragment-based data. The active subpixel sample locations are used to determine the corresponding x and y coordinates of the fragment.

Figure 56:
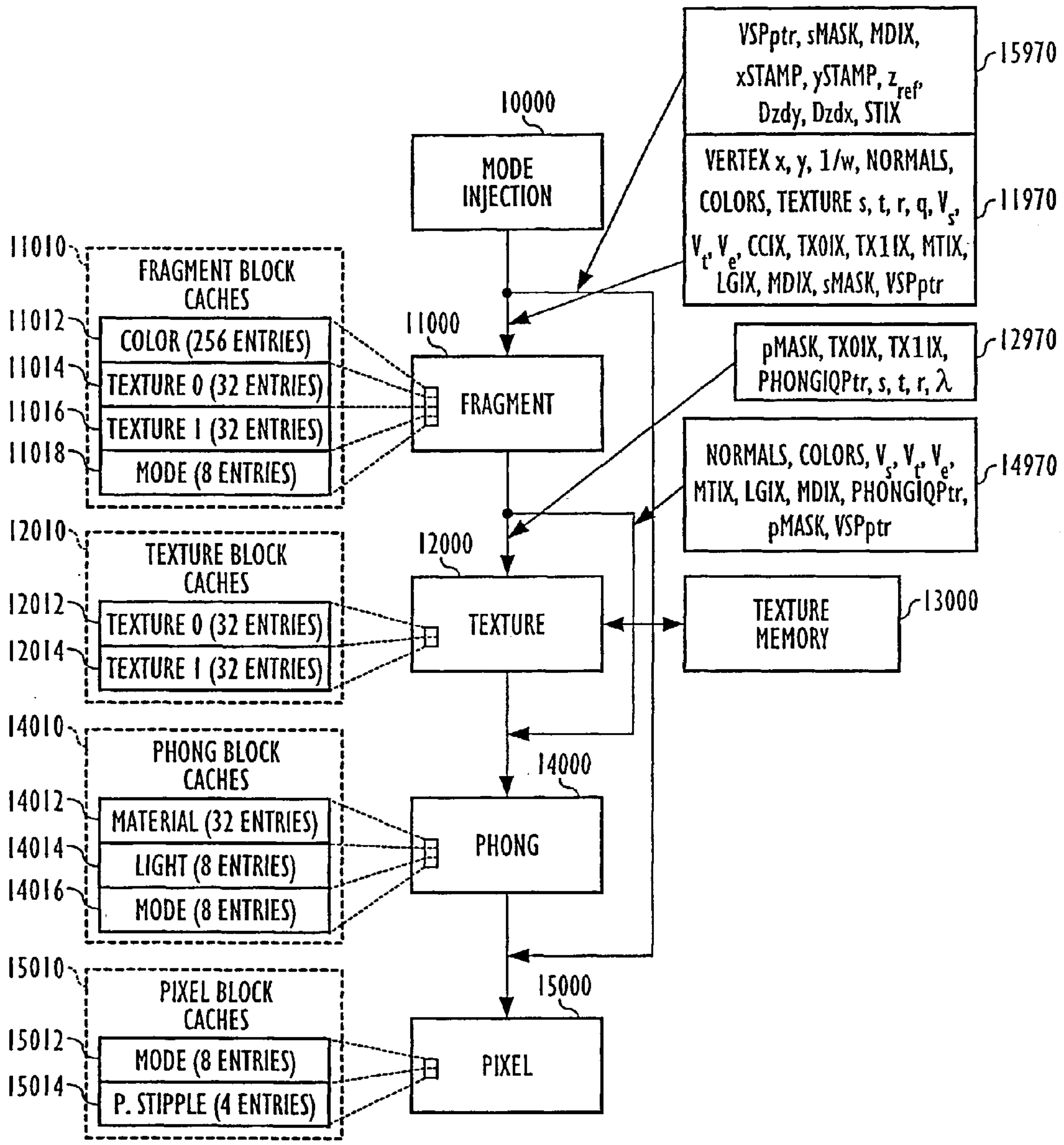
FIG. 56 is a diagrammatic illustration showing the manner in which mde data flows and is cached in portions of the DSGP pipeline.

In order to save bandwidth, the Fragment block caches the color data to be reused by multiple VPSs belonging to the same primitive. Before sending a VSP, Mode Injection identifies if the color cache contains the required data. If it is a hit, Mode Injection sends the VSP, which includes an index into the cache. On a cache miss, Mode Injection replaces an entry from the cache with the new color data, prior to sending the VSP packet with the Color cache index pointing to the new entry. Similarly all modes, materials, texture info, and light info settings are cached in the blocks in which they are used. An index for each of these caches is also included in the VSP packet. In addition to the polygon data, the Fragment block caches some texture and mode info. FIG. 56 shows the flow and caching of mode data in the last half of the DSGP pipeline.

The Fragment block's main function is the interpolation of the polygon information provided at the vertices for all active fragments in a VSP. At the output of the Fragment block we still have stamps, with all the interpolated data per fragment. The Fragment block can perform the interpolations of a given fragment in parallel and fragments within a VSP can be done in an arbitrary order. Fully interpolated stamps are forwarded to the Texture, Phong and Bump blocks in the same order as received. In addition, the Fragment block generates Level of Detail (LOD or λ) values for up to four textures and sends them to the Texture block.

The Fragment block will have an adequately sized FIFO in its input to smooth variable stamp processing time and the Color cache fill latency.

Figure 57:
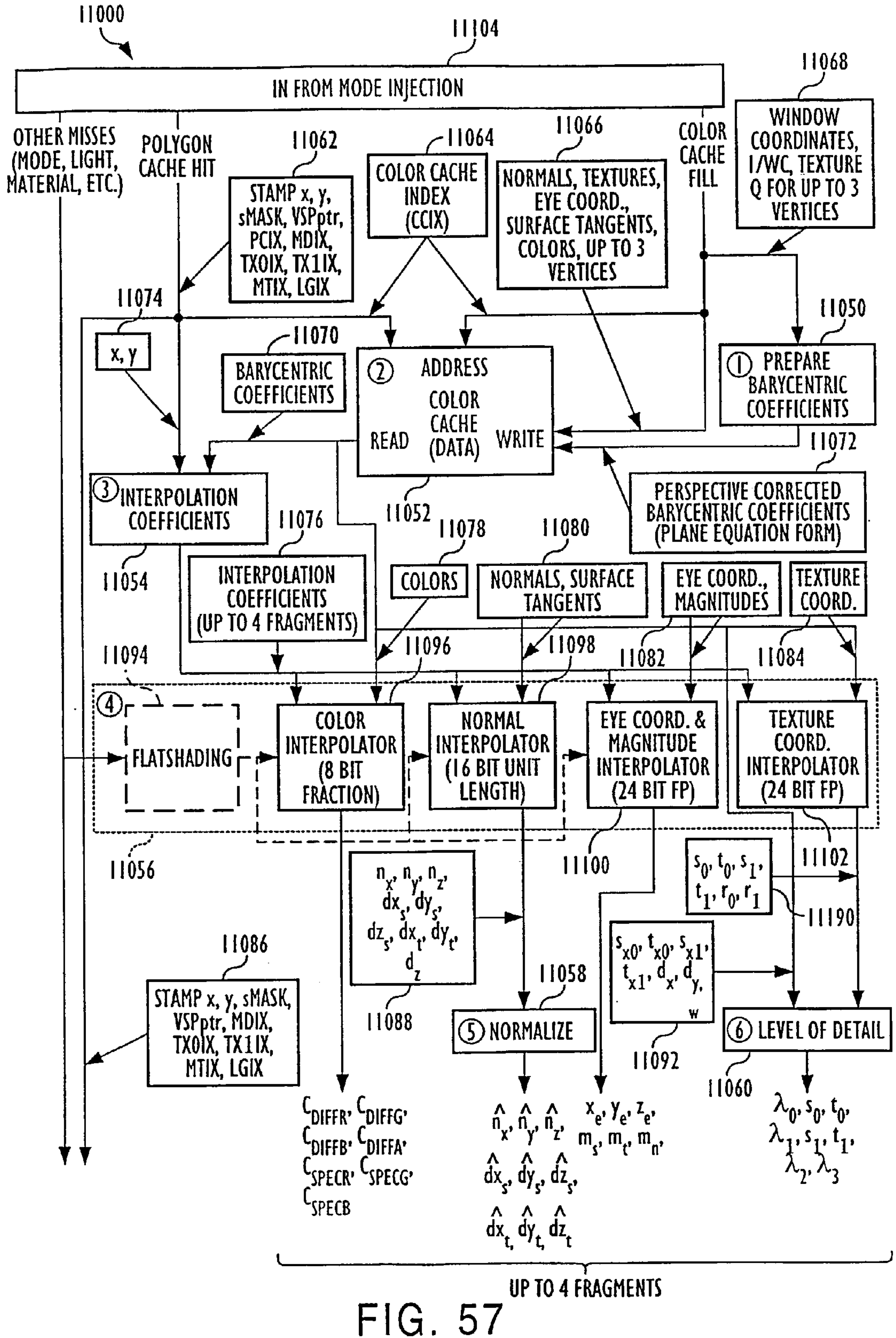
FIG. 57 is a diagrammatic illustration of an exemplary embodiment of the Fragment Block.
Figure 58A:
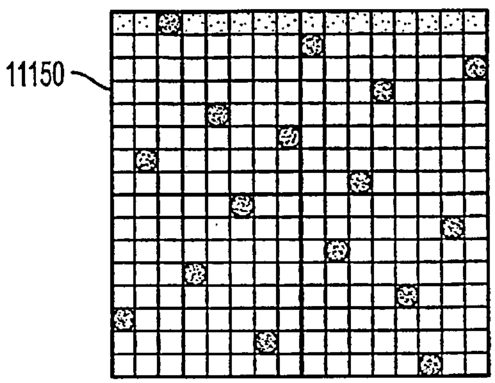
FIG. 58 is a diagrammatic illustration showing examples of VSPs with the pixel fragments formed by various primitives.
Figure 58B:
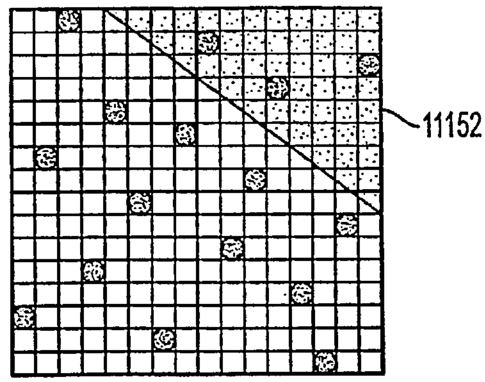
Figure 58C:
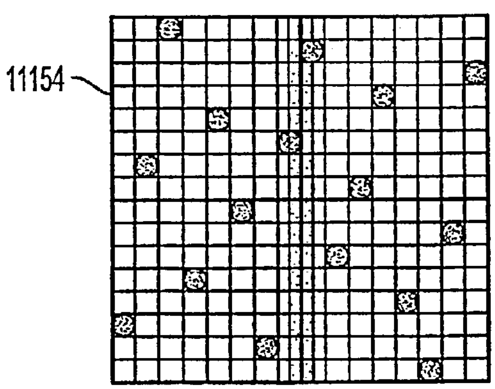
Figure 58D:
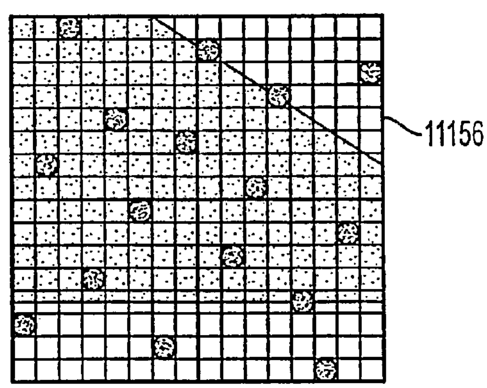

FIG. 57 shows a block diagram of the Fragment block.

The Fragment block can be divided into six sub-blocks. Namely:

1. The cache fill sub-block 11050
2. The Color cache 11052
3. The Interpolation Coefficients sub-block 11054
4. The Interpolation sub-block 11056
5. The Normalization sub-block 11058
6. The LOD sub-block 11060

The first block handles Color cache misses. New polygon data replaces old data in the cache. The Color cache index, CCIX, points to the entry to be replaced. The block doesn't write all of the polygon data directly into the cache. It uses the vertex coordinates, the reciprocal of the w coordinate, and the optional texture q coordinate to calculate the barycentric coefficients. It writes the barycentric coefficients into the cache, instead of the info used to calculate them.

The second sub-block implements the Color cache. When Fragment receives a VSP packet (hit), the cache entry pointed to by CCIX is read to access the polygon data at the vertices and the associated barycentric coefficients.

The third sub-block prepares the interpolation coefficients for the first fragment of the VSP. The coefficients are expressed in plane equation form for the numerator and the denominator to facilitate incremental computation of the next fragment's coefficients. The total area of the triangle divides both the numerator and denominator, therefore can be simplified. Also, since the barycentric coefficients have redundancy built-in (the sum of the fractions are equal to the whole), additional storage and bandwidth is saved by only providing two out of three sets of barycentric coordinates along with the denominator. As a non-performance case, texture coordinates with a q other than 1 will be interpolated using 3 more coefficients for the denominator.

The x and y coordinates given per stamp correspond to the lower left pixel in the stamp. Only the position of the stamp in a tile is determined by these coordinates. A separate packet provides the coordinates of the tile that subsequent stamps belong to. A lookup table is used with the corresponding bits in sMask to determine the lower bits of the fragment x and y coordinates at subpixel accuracy. This choosing of an interpolation location at an active sample location ensures that the interpolation coefficients will always be positive with their sum being equal to one.

The fourth sub-block interpolates the colors, normals, texture coordinates, eye coordinates, and Bump tangents for each covered pixel. The interpolators are divided in four groups according to their precision. The first group interpolates 8 bit fixed point color fractions. The values are between 0 and 1, the binary representation of the value 1 is with all the bits set to one. The second set interpolates sixteen bit, fixed point, unit vectors for the normals and the surface tangent directions. The third set interpolates 24 bit floating point numbers with sixteen bit mantissas. The vertex eye coordinates and the magnitudes of the normals and surface tangents fall into this category. The last group interpolates the texture coordinates which are also 24 bit FP numbers but may have different interpolation coefficients. All interpolation coefficients are generated as 24 bit FP values but fewer bits or fixed point representation can be used when interpolating 8 bit or 16 bit fixed point values.

The fifth sub-block re-normalizes the normal and surface tangents. The magnitudes obtained during this process are discarded. The original magnitudes are interpolated separately before being forwarded to the Phong and Bump block.

The texture map u, v coordinates and Level of Detail (LOD) are evaluated in the sixth sub-block. The barycentric coefficients are used in determining the texture LOD. Up to four separate textures associated with two texture coordinates are supported. Therefore the unit can produce up to four LODs and two sets of s, t coordinates per fragment, represented as 24 bit FP values.

sMask and pMask

FIG. 58 shows examples of VSPs with the pixel fragments formed by various primitives. A copy of the sMask is also sent directly to the Pixel block, bypassing the shading blocks (Fragment, Texture, Phong and Bump). The bypass packet also includes the z values, the Mode and Polygon Stipple Indices and is written in the reorder buffer at the location pointed to by the VSPptr. The pMask is generated in the Fragment block and sent Texture and Phong instead of the sMask. The actual coverage is evaluated in Pixel.

Barycentric Interpolation for Triangles

The Fragment block interpolates values using perspective corrected barycentric interpolation. This section describes the process.

Figure 59:
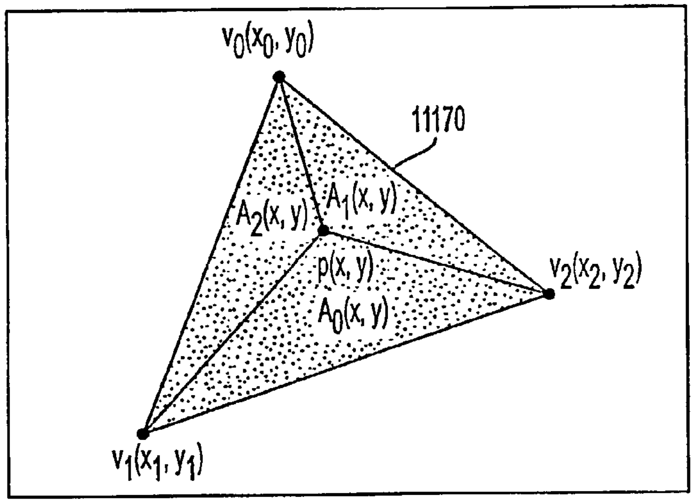
FIG. 59 is a diagrammatic illustration showing aspects of Fragment Block interpolation using perspective corrected barycentric interpolation for triangles.

As for the data associated with each fragment produced by rasterizing a triangle, we begin by specifying how these values are produced for fragments in a triangle. We define barycentric coordinates for a triangle 11170 (FIG. 59). Barycentric coordinates are a set of three numbers, $A_0$, $A_1$, and $A_2$, each in the range of [0,1], with $A_0+A_1+A_2=1$. These coordinates uniquely specify any point p within the triangle or on the triangle's boundary as:

$$p(x, y)=A_0(x, y)\times V_0+A_1(x, y)\times V_1+A_2(x, y)\times V_2$$

where $V_0$, $V_1$, and $V_2$ are the vertices of the triangle. $A_0$, $A_1$, and $A_2$ can be found as:

$$A_0(x, y)=\frac{\text{Area }(p, V_1, V_2)}{\text{Area }(V_0, V_1, V_2)},\ A_1(x, y)=\frac{\text{Area }(p, V_0V_2)}{\text{Area }(V_0, V_1, V_2)},$$

$$A_2(x, y)=\frac{\text{Area }(p, V_0, V_1)}{\text{Area }(V_0, V_1, V_2)}$$

where Area(i,j,k) denotes the area in window coordinates of the triangle with vertices i, j, and k. One way to compute this area is:

$$\text{Area}(V_0, V_1, V_2)=\tfrac{1}{2}(x_{w0}\times y_{w1}-x_{w1}xy_{w0}+x_{w1}\ \mathbf{33}\ y_{w2}-x_{w2}\times y_{w1}+x_{w2}xy_{w0}-x_{w0}\times y_{w2})$$

Denote a datum at $V_0$, $V_1$, and $V_2$ as $f_0$, $f_1$, and $f_2$, respectively. Then the value f(x,y) of a datum at a fragment with window coordinate x and y produced by rasterizing a triangle is given by:

$$f(x, y)=\frac{A_0(x, y)\times f_0/w_{c0}+A_1(x, y)\times f_1/w_{c1}+A_2(x, y)\times f_2/w_{c2}}{A_0(x, y)\times a_0/w_{c0}+A_1(x, y)\times a_1/w_{c1}+A_2(x, y)\times a_2/w_{c2}}$$

where $w_{c0}$, $W_{c1}$, $w_{c2}$, are the clip w coordinates of $V_0$, $V_1$, and $V_2$, respectively. $A_0$, $A_1$, and $A_2$, are the barycentric coordinates of the fragment for which the data are produced.

$$a_0=a_1=a_2=1$$

except for texture s and t coordinates for which:

$$a_0=q_0,\ a_1=q_1,\ a_2=q_2$$

Interpolation for Lines

For interpolation of fragment data along a line a slightly different formula is used:

Let the window coordinates of a produced fragment center be given by $p_r=(x,y)$ and let the $p_2=(x_2,y_2)$ and $p_1=(x_1,y_1)$ the endpoints (vertices) of the line. Set t as the following and note that t=0 at $p_1$ and t=1 at $p_2$:

$$t=\frac{(p_r-p_1)\cdot(p_2-p_1)}{\|p_2-p_1\|^2}$$

$$f(x, y)=\frac{(1-t)\times f_1/_{w_{c1}}+t\times f_2/w_{c2}}{(1-t)\times a_1/_{w_{c1}}+t\times a_2/w_{c2}}$$

Interpolation for Points

If the primitive is a point no interpolation is done. Vertex 2 is assumed to hold the data. In case q is not equal to one the s, t, and r coordinates need to be divided by q.

Vector Interpolation

For bump mapping the normal and surface tangents may have a magnitude associated with directional unit vectors. In this case we interpolate the unit vector components separately from the scalar magnitudes. This apparently gives a better visual result than interpolating the x, y and z components with their magnitudes. This is especially important when the direction and the magnitude are used separately.

Figure 60A:
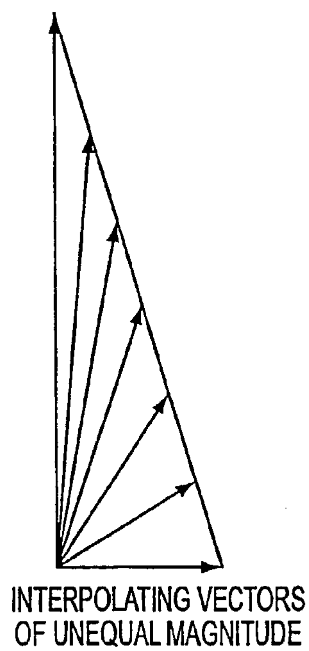
FIG. 60 shows an example of how interpolating between vectors of unequal magnitude may result in uneven angular granularity and why the inventive structure and method does not interpolate normals and tangents this way.
Figure 60B:
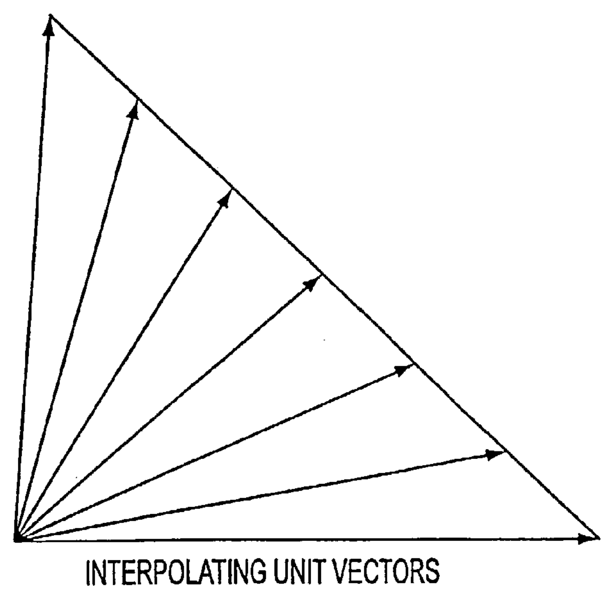

FIG. 60 shows how interpolating between vectors of unequal magnitude results in uneven angular granularity, which is why we do not interpolate normals and tangents this way.

Fragment x and y Coordinates

Figure 61:
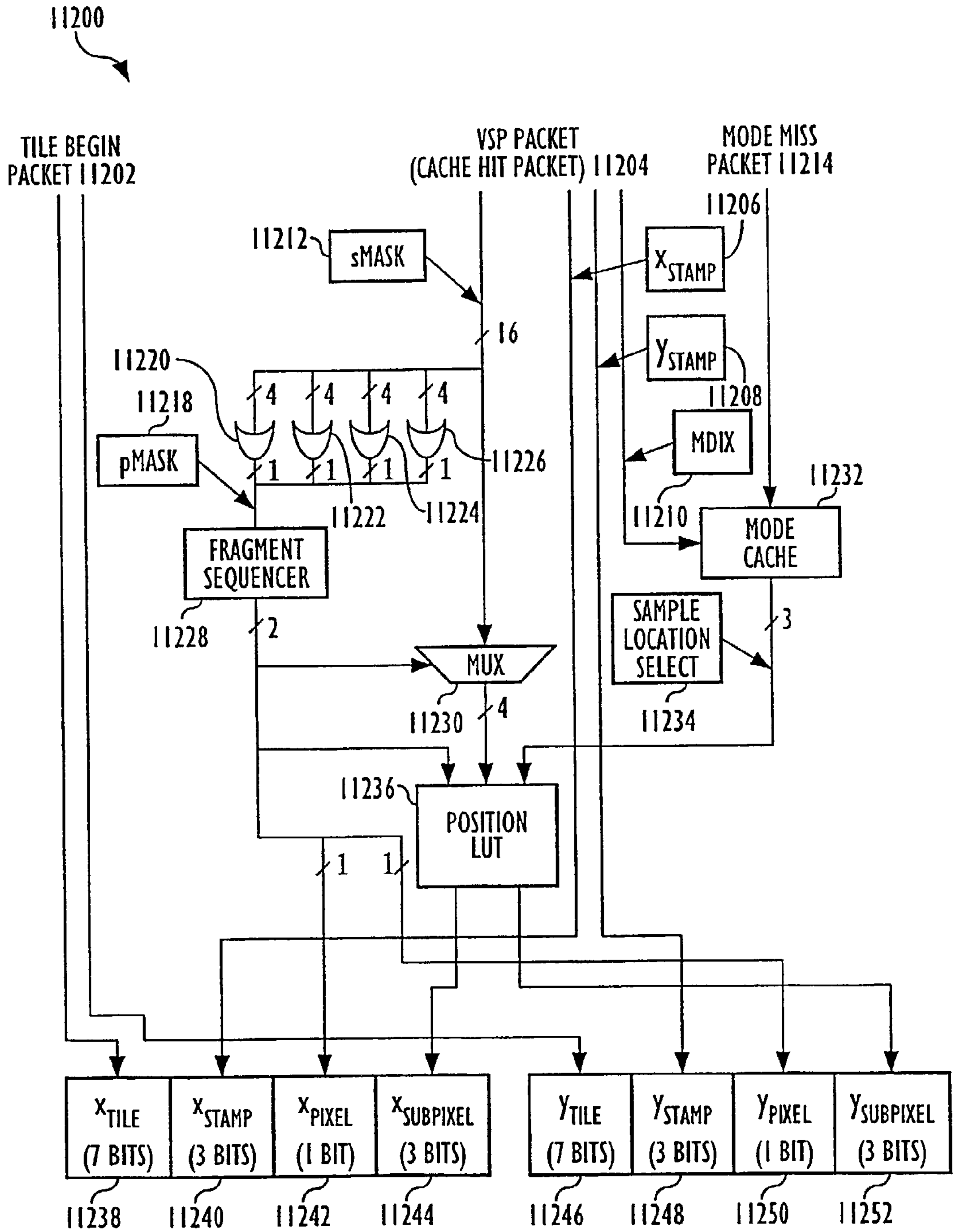
FIG. 61 is a diagrammatic illustration showing how the fragment x and y coordinates used to form the interpolation coefficients in the Fragment Block are formed.
Figure 62:
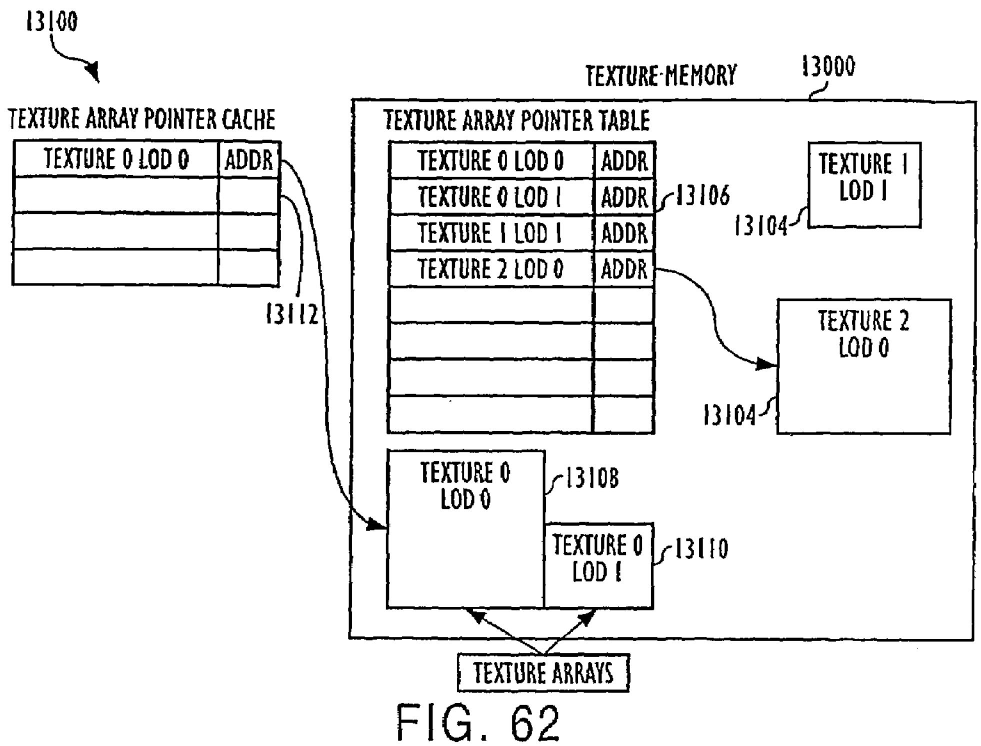
FIG. 62 is a diagrammatic illustration showing an overview of texture array addressing.
Figure 63:
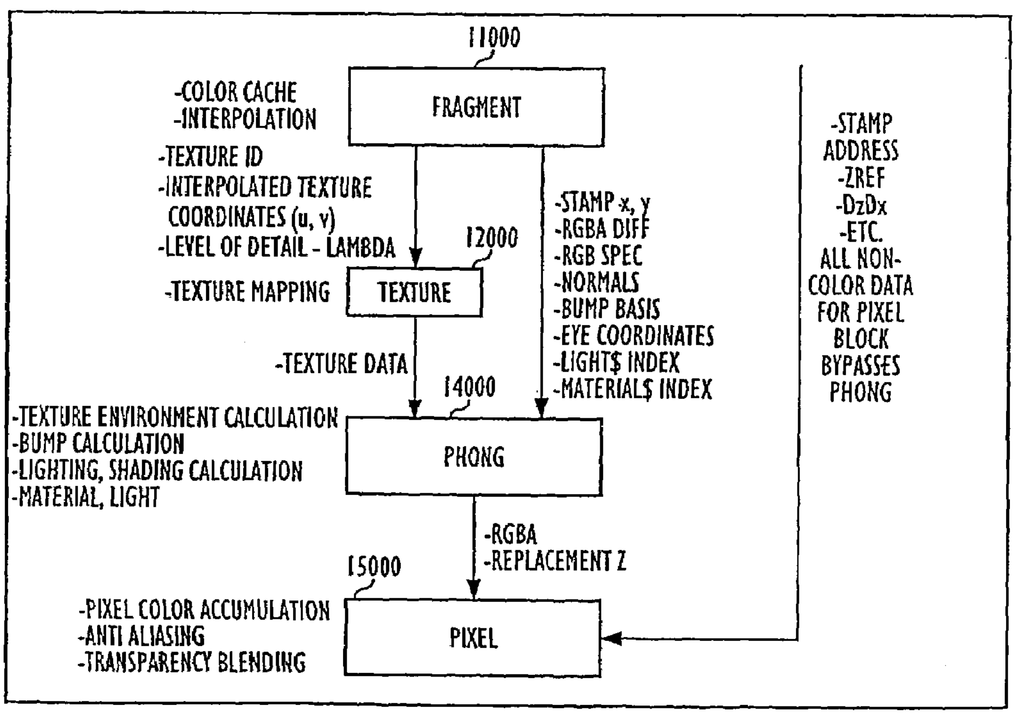
FIG. 63 is a diagrammatic illustration showing the Phong unit position in the pipeline and relationship to adjacent blocks.
Figure 64:
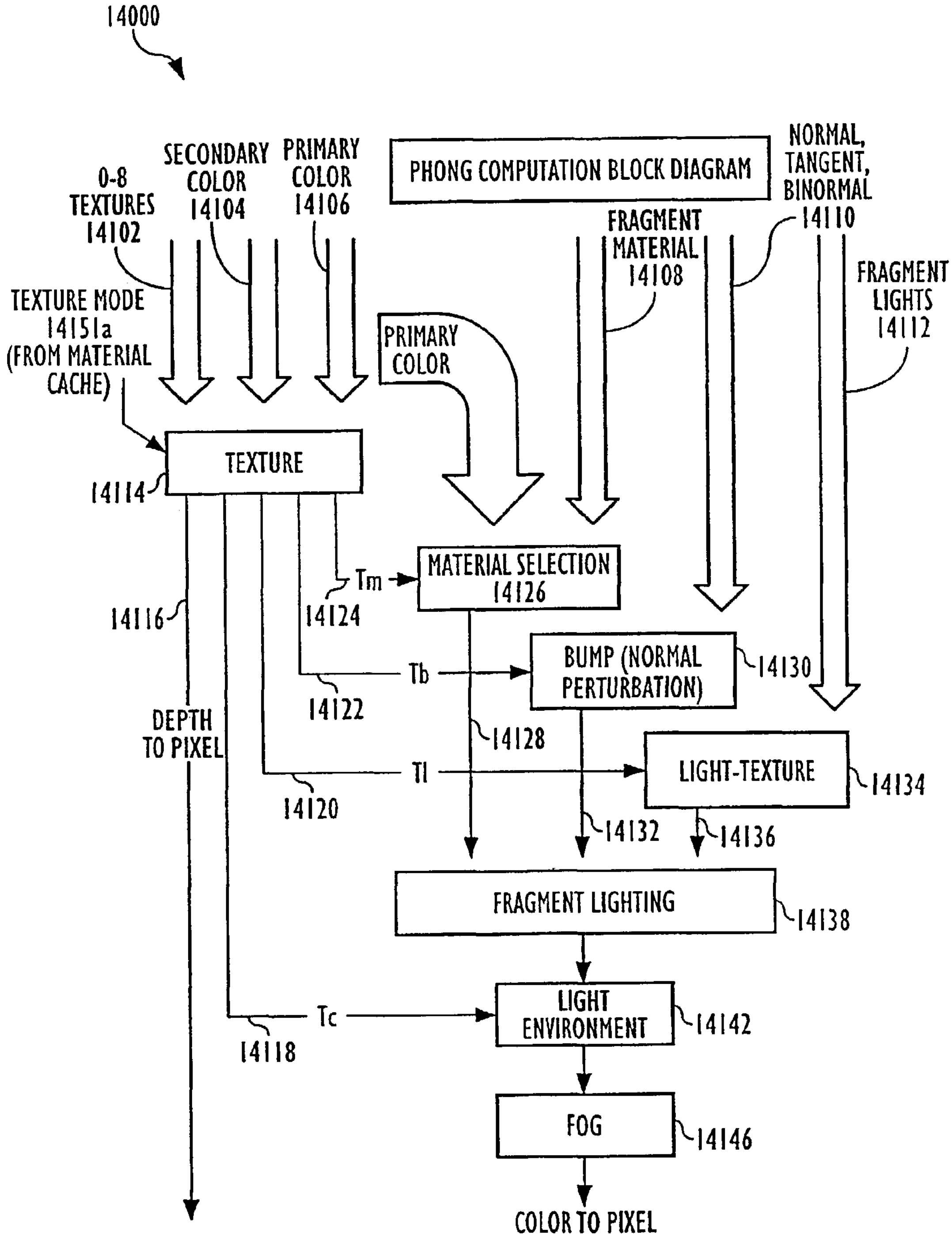
FIG. 64 is a diagrammatic illustration showing a block diagram of Phong comprised of several sub-units.
Figure 65:
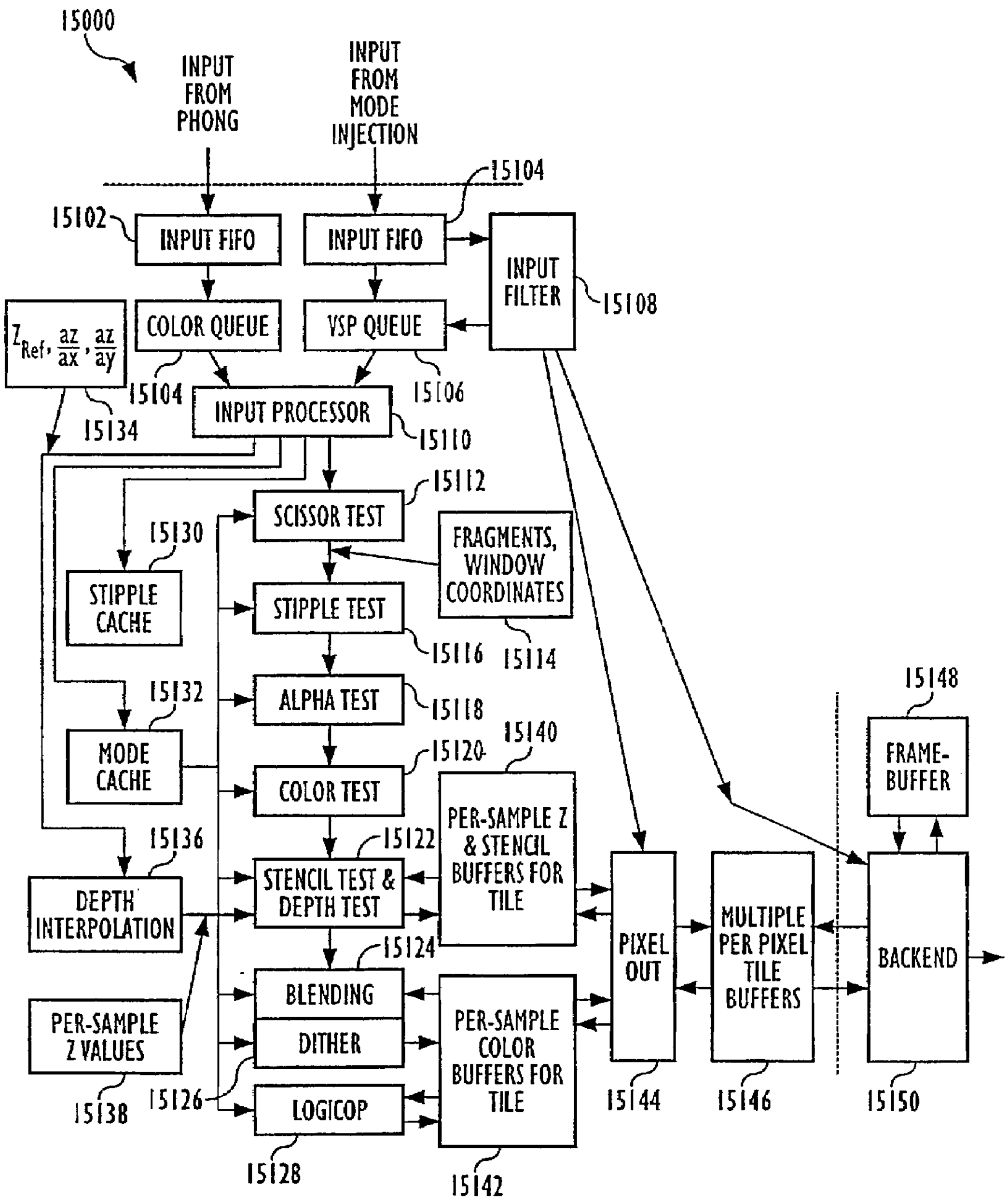
FIG. 65 is a diagrammatic illustration showing a block diagram of the PIX block.

FIG. 61 shows how the fragment x and y coordinates used to form the interpolation coefficients are formed. The tile x and y coordinates, set at the beginning of a tile processing form the most significant bits. The sample mask (sMask) is used to find which fragments need to be processed. A lookup table provides the least significant bits of the coordinates at sub-pixel accuracy. We may be able to reduce the size of the LUT if we can get away with 2 bits of sample location select.

Equations

Cache Miss Calculations

First barycentric coefficients will need to be evaluated in the Fragment Unit on a Color cache miss. For a triangle:

$$b_{x0}=y_{w1}-y_{w2};\ b_{y0}=x_{w2}-x_{w1};\ b_{k0}=x_{w1}\times y_{w2}-x_{w2}\times y_{w1}$$

$$b_{x1}=y_{w2}-y_{w0};\ b_{y1}=x_{w1}-x_{w2};\ b_{k1}=x_{w2}\times y_{w0}-x_{w1}\times y_{w0}$$

$$b_{x2}=y_{w0}\ y_{w1};\ b_{y2}=x_{w1}-x_{w0};\ b_{k2}=x_{w0}\times y_{w1}-x_{w1}\times y_{w0}$$

In the equations above, $x_{w0}$, $x_{w1}$, $x_{w2}$, are the window x-coordinates of the three triangle vertices. Similarly, $y_{w0}$, $y_{w1}$, $y_{w2}$, are the three y-coordinates of the triangle vertices. With the actual barycentric coefficients, all the components need to be divided by the area of the triangle. This is not necessary in our case because of the perspective correction, that forms a denominator with coefficients also divided by the area.

For a line with vertex coordinates $x_{w1}$, $x_{w2}$ and $y_{w1}$, $y_{w2}$:

$$b_{x2}x_{w2}-x_{w1};\ b_{y2}=y_{w2}-y_{w1};\ b_{k2}=-(x_{w1}xb_{x2}+y_{w1}\times b_{y2})$$

$$b_{x1}=-b_{x2};\ b_{y1}=-b_{y2};\ b_{k1}=x_{w2}xb_{x2}+y_{w2}\times b_{y2}$$

$$b_{x0}=0;\ b_{y0}=0;\ b_{k0}=0$$

We now form the perspective corrected barycentric coefficient components:

$$C_{x0}=b_{x0}\times w_{ic0};\ C_{y0}=b_{y0}\times w_{ic0};\ C_{k0}=b_{k0}\times w_{ic0}$$

$$C_{x1}=b_{x1}\times w_{ic1};\ C_{y1}=b_{y1}\times w_{ic1};\ C_{k1}=b_{k1}\times w_{ic1}$$

$$C_{x2}=b_{x2}\times w_{ic2};\ C_{y2}=b_{y2}\times w_{ic2};\ C_{k2}=b_{k2}\times w_{ic2}$$

Where $w_{ic0}$ is the reciprocal of the clip w-coordinate of vertex 0 (reciprocal done in Geometry):

$$w_{ic0}=\frac{1}{w_{c0}};\quad w_{ic1}=\frac{1}{w_{c1}};\quad w_{ic2}=\frac{1}{w_{c2}}$$

The denominator components can be formed by adding the individual constants in the numerator:

$$D_xC_{x0}+C_{x1}+C_{x2};\ D_y=C_{y0}+C_{y1}C_{y2};\ D_k=C_{k0}C_{k1}+C_{k2}$$

The above calculations need to be done only once per triangle. The color memory cache is used to save the coefficients for the next VSP of the same triangle. On a cache miss the coefficients need to be re-evaluated.

Interpolation Coefficients

Next, we prepare the barycentric coordinates for the first pixel of the VSP with coordinates (x,y):

$$(x,y):$$

$$W_i(x,y)=D_x\times x+D_y\times y+D_k$$

$$G_0(x,y)=C_{x0}\times x+C_{y0}\times y+C_{k0}$$

$$G_1(x,y)=C_{x1}\times x+C_{y1}\times y+C_{k1}$$

-continued $$G_2(x,y)=W_i(x,y)-G_0(x,y)-G_1(x,y)$$

$$L_0(x,y)=\frac{G_0(x,y)}{W_i(x,y)};\ L_1(x,y)=\frac{G_1(x,y)}{W_i(x,y)};\ L_2(x,y)=\frac{G_2(x,y)}{W_i(x,y)}$$

Then, for the next pixel in the x direction:

$$W_i(x+1,y)=W_i(x,y)+D_x$$

$$G_0(x+1,y)=G_0(x,y)+C_{x0}$$

$$G_1(x+1,y)=G_1(x,y)+C_{x1}$$

$$G_2(x+1,y)=G_2(x,y)+C_{x2}$$

$$L_0(x+1,y)=\frac{G_0(x+1,y)}{W_i(x+1,y)};\ L_1(x+1,y)=\frac{G_1(x+1,y)}{W_i(x+1,y)};$$

$$L_2(x+1,y)=\frac{G_2(x+1,y)}{W_i(x+1,y)}$$

Or, for the next pixel in the y direction:

$$W_i(x+1,y)=W_i(x,y)+D_x$$

$$G_0(x+1,y)=G_0(x,y)+C_{x0}$$

$$G_1(x+1,y)=G_1(x,y)+C_{x1}$$

$$G_2(x+1,y)=G_2(x,y)+C_{x2}$$

$$L_0(x+1,y)=\frac{G_0(x+1,y)}{W_i(x+1,y)};\ L_1(x+1,y)=\frac{G_1(x+1,y)}{W_i(x+1,y)};$$

$$L_2(x+1,y)=\frac{G_2(x+1,y)}{W_i(x+1,y)}$$

As a non-performance case (half-rate), when texture coordinate $q_n[m]$ is not equal to one, where n is the vertex number (0 to 2) and m is the texture number (0 to 3), an additional denominator for interpolating texture coordinates is evaluated:

$$D_{qx}[m]=C_{x0}\times q_0[m]+C_{x1}\times q_1[m]+C_{x2}\times q_2[m]$$

$$D_{qy}[m]=C_{y0}\times q_g[m]+C_{y1}\times q_1[m]+$$
$$C_{y2}\times q_2[m]\text{ if }q_n[m]\neq 1;\ n=0,1,2;\ m=0,1,2,3$$

$$D_{qz}[m]=C_{z0}\times q_p[m]+C_{z1}\times q_1[m]+C_{z2}\times q_2[m]$$

$$W_{q1}(x,y)[m]=D_{qx}[m]\times x+D_{qy}[m]\times y+D_{qk}[m]$$

$$L_{q0}(x,y)[m]=\frac{G_0(x,y)}{W_{qi}(x,y)[m]};$$

$$L_{q1}(x,y)[m]=\frac{G_1(x,y)}{W_{q1}(x,y)[m]};$$

$$L_{q2}(x,y)[m]=\frac{G_2(x,y)}{W_{q1}(x,y)[m]}$$

When the barycentric coordinates for a given pixel with (x,y) coordinates are evaluated we use them to interpolate. For a line L0 is not needed but is assumed to be zero in the following formulas.

Interpolation Equations

For full performance mode, we interpolate one set of texture coordinates:

$$s[0]=L_0(x,y)\times s_0[0]+L_1(x,y)\times s_1[0]+L_2(x,y)\times s_2[0]$$

$$t[0]=L_0(x,y)\times t_0[0]+L_1(x,y)\times t_1[0]+L_2(x,y)\times t_2[0]$$

Diffuse and specular colors:

$$R_{Diff}=L_0(x,y)\times R_{Diff_0}+L_1(x,y)\times R_{Diff_1}+L_2(x,y)\times R_{Diff_2}$$

$$G_{Diff}=L_0(x,y)\times G_{Diff_0}+L_1(x,y)\times G_{Diff_1}+L_2(x,y)\times G_{Diff_1}$$

$$B_{Diff}=L_0(x,y)\times B_{Diff_0}+L_1(x,y)\times B_{Diff_1}+L_2(x,y)\times B_{Diff_2}$$

$$A_{Diff}=L_0(x,y)\times A_{Diff_0}+L_1(x,y)\times A_{Diff_1}+L_2(x,y)\times A_{Diff_2}$$

$$R_{Spec}=L_0(x,y)\times R_{Spec_0}+L_1(x,y)\times R_{Spec_1}+L_2(x,y)\times R_{Spec_2}$$

$$G_{Spec}=L_0(x,y)\times G_{Spec_0}+L_1(x,y)\times G_{Spec_1}+L_2(x,y)\times G_{Spec_2}$$

$$B_{Spec}=L_0(x,y)\times B_{Spec_0}+L_1(x,y)\times B_{Spec_1}+L_2(x,y)\times B_{Spec_2}$$

Note that the 8-bit color values are actually fraction between 0 and 1 inclusive. By convention, the missing represented number is $1-2^{-8}$. The value one is represented with all the bits set taking the place of the missing representation. When color index is used instead of R, G, B and A, the 8-bit index value replaces the R value of the Diffuse and the Specular component of the color.

And surface normals:

$$n_x=L_0(x,y)\times n_{ux0}+L_1(x,y)\times n_{ux1}+L_2(x,y)\times n_{ux2}$$

$$n_y=L_0(x,y)\times n_{uy0}+L_1(x,y)\times n_{uy1}+L_2(x,y)\times n_{uy2}$$

$$n_z=L_0(x,y)\times n_{uz0}+L_1(x,y)\times n_{uz1}+L_2(x,y)\times n_{uz2}$$

The normal vector has to be re-normalized after the interpolation:

$$\left\|\begin{matrix}0\\h\end{matrix}\right\|^{-1}=\frac{1}{\sqrt{n_x^2+n_y^2+n_z^2}}$$

$$\hat{n}_x=n_x\times\left\|\begin{matrix}0\\h\end{matrix}\right\|^{-1}$$

$$\hat{n}_y=n_y\times\left\|\begin{matrix}0\\h\end{matrix}\right\|^{-1}$$

$$\hat{n}_z=n_x\times\left\|\begin{matrix}0\\h\end{matrix}\right\|^{-1}$$

At half-rate (accumulative) we interpolate the vertex eye coordinate when needed:

$$x_e=L_0(x,y)\times x_{e0}+L_1(x,y)\times x_{e1}+L_2(x,y)\times x_{e2}$$

$$y_e=L_0(x,y)\times y_{e0}+L_1(x,y)\times y_{e1}+L_2(x,y)\times y_{e2}$$

$$z_e=L_0(x,y)\times z_{e0}+L_1(x,y)\times z_{e1}+L_2(x,y)\times z_{e2}$$

At half-rate (accumulative) we interpolate up to four texture coordinates. This is done either using the plane equations or barycentric coordinates. The r-texture coordinates are also interpolated for volume texture rendering but at one third of the full rate.

$$s[1]=L_0(x,y)\times s_0[1]+L_1(x,y)\times s_1[1]+L_2(x,y)\times s_2[1]$$

$$t[1]=L_0(x,y)\times t_0[1]+L_1(x,y)\times t_1[1]+L_2(x,y)\times t_2[1]$$

$$r[0]=L_0(x,y)\times r_0[1]+L_1(x,y)\times r_1[1]+L_2(x,y)\times r_2[0]$$

$$r[1]=L_0(x,y)\times r_0[1]+L_1(x,y)\times r_1[1]+L_2(x,y)\times r_2[1]$$

In case the partials are provided by the user as the bump tangents per vertex, we need to interpolate them. As a simplification the hardware will always interpolate the surface tangents at half rate:

$$\frac{\partial x_e}{\partial s}=L_0(x,y)\times\frac{\partial x_{e0}}{\partial s}+L_1(x,y):$$

$$\frac{\partial x_e}{\partial t}=L_0(x,y)\times\frac{\partial x_{e0}}{\partial t}+L_1(x,y):$$

$$\frac{\partial y_e}{\partial s}=L_0(x,y)\times\frac{\partial y_{e0}}{\partial s}+L_1(x,y):$$

$$\frac{\partial y_e}{\partial t}=L_0(x,y)\times\frac{\partial y_{e0}}{\partial t}+L_1(x,y):$$

$$\frac{\partial z_e}{\partial s}=L_0(x,y)\times\frac{\partial z_{e0}}{\partial s}+L_1(x,y):$$

$$\frac{\partial z_e}{\partial t}=L_0(x,y)\times\frac{\partial z_{e0}}{\partial t}+L_1(x,y):$$

The surface tangents also have to be normalized, like the normals, after interpolation.

We also use the barycentric coefficients to evaluate the partial derivatives of the texture coordinates s and t with respect to window x and y-coordinates:

$$\frac{\partial s}{\partial x}[m]=\frac{\partial L_0(x,y)}{\partial x}\times s_0[m]+\frac{\partial L_1(x,y)}{\partial x}\times s_1[m]+\frac{\partial L_2(x,y)}{\partial x}\times s_2[m]$$

$$\frac{\partial t}{\partial x}[m]=\frac{\partial L_0(x,y)}{\partial x}\times t_0[m]+\frac{\partial L_1(x,y)}{\partial x}\times t_1[m]+\frac{\partial L_2(x,y)}{\partial x}\times t_2[m]$$

$$\frac{\partial s}{\partial y}[m]=\frac{\partial L_0(x,y)}{\partial y}\times s_0[m]+\frac{\partial L_1(x,y)}{\partial y}\times s_1[m]+\frac{\partial L_2(x,y)}{\partial y}\times s_2[m]$$

$$\frac{\partial t}{\partial y}[m]=\frac{\partial L_0(x,y)}{\partial y}\times t_0[m]+\frac{\partial L_1(x,y)}{\partial y}\times t_1[m]+\frac{\partial L_2(x,y)}{\partial y}\times t_2[m]$$

$$\frac{\partial L_0(x,y)}{\partial x}=\frac{C_{x0}-D_x\times L_0(x,y)}{W_i(x,y)}$$

$$\frac{\partial L_1(x,y)}{\partial x}=\frac{C_{x1}-D_x\times L_1(x,y)}{W_i(x,y)}$$

$$\frac{\partial L_2(x,y)}{\partial x}=\frac{C_{x2}-D_x\times L_2(x,y)}{W_i(x,y)}$$

$$\frac{\partial L_0(x,y)}{\partial y}=\frac{C_{y0}-D_y\times L_1(x,y)}{W_i(x,y)}$$

$$\frac{\partial L_1(x,y)}{\partial y}=\frac{C_{y1}-D_y\times L_1(x,y)}{W_i(x,y)}$$

$$\frac{\partial L_2(x,y)}{\partial y}=\frac{C_{y2}-D_y\times L_2(x,y)}{W_i(x,y)}$$

$$\frac{\partial s}{\partial x}[m]=\frac{C_{x0}\times s_0[m]+C_{x1}\times s_1[m]+C_{x2}\times s_2[m]-D_x\times s[m]}{W_i(x,y)}$$

$$\frac{\partial t}{\partial x}[m]=\frac{C_{x0}\times t_0[m]+C_{x1}\times t_1[m]+C_{x2}\times t_2[m]-D_x\times t[m]}{W_i(x,y)}$$

$$\frac{\partial s}{\partial y}[m]=\frac{C_{y0}\times s_0[m]_{cy1}\times s_1[m]+C_{y2}\times s_2[m]-D_y\times s[m]}{W_i(x,y)}$$

$$\frac{\partial t}{\partial y}[m]=\frac{C_{y0}\times t_0[m]+C_{y1}\times t_1[m]+C_{y2}\times t_2[m]-D_y\times t[m]}{W_i(x,y)}$$

In the event of $q_n[m]$ is not equal to one, $W_i(x,y)$ is replaced by $W_{qi}[m](x,y)$.

This is a good introduction for an alternative way of evaluating the interpolated s, t and their partials:

$$s[m] = \frac{S_x[m] \times x + S_y[m] \times y + S_k[m]}{W_i(x, y)}$$

$$s_x[m] = C_{x0} \times s_0[m] + C_{x1} \times s_1[m] + C_{x2} \times s_2[m]$$

$$s_y[m] = C_{y0} \times s_0[m] + C_{y1} \times s_1[m] + C_{y2} \times s_2[m]$$

$$s_k[m] = C_{k0} \times s_0[m] + C_{k1} \times s_1[m] + C_{k2} \times s_2[m]$$

$$\frac{\partial s}{\partial x}[m] = \frac{S_x[m] - D_x \times s[m]}{W_i(x, y)}$$

$$s[m](x+1, y) = \frac{s_n(x, y)[m]_{s_x}(m)}{W_i(x, y) + D_x}$$

$$s_n(x, y)[m] = S_x[m] \times x + S_y[m] \times y + S_k[m]$$

Other terms can be evaluated similarly. Note that all values that need to be interpolated, like colors and normals could be expressed in this plane equation mode and saved in the triangle info cache to reduce the computation requirements with the incremental evaluation approach.

We define:

$$u(x,y)=2^n \times s(x,y)$$

$$v(x,y)=2^m \times t(x,y)$$

$$\rho(x, y) = \max\left\{\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial v}{\partial y}\right)^2}\right\}$$

$$\lambda = \log_2[\rho(x, y)]$$

Here, λ is called the Level of Detail (LOD) and ρ is called the scale factor that governs the magnification or minification of the texture image. n and m are the width and the height of a two dimensional texture map. The partial derivatives of u and v are obtained using the partials of s and t. For one dimension texture map t, v, and the partial derivatives δv/δx and δv/δy are set to zero. For a line the formula is:

$$\Delta x = x_2 - x_1;\ \Delta y = y_2 - y_1$$

The DSGP pipeline supports up to four textures with two sets of texture coordinates. Specifically, for i=0.3 if:

TEXTURE_1D[i]==1 or TEXTURE_2D[i]==1 then we compute λ using the texture coordinates TEXTURE_COORD_SET_SOURCE[i].

The Fragment block passes s, t, r, and λ to the Texture block for each active texture. Note that λ is not the final LOD. The Texture block applies additional rules such as LOD clamping to obtain the final value for λ.

Memory Caching Schemes

Fragment uses three caches to perform the needed operations. The primary cache is the Color cache. It holds the color data for the primitive (triangle, line, or point). The cache miss determination and replacement logic is actually located in the Mode Inject block. The Fragment block normally receives a "hit" packet with an index pointing to the entry that hold the associated Color data. If a miss is detected by the Mode Inject block, a "fill" packet is sent first to replace an entry in the cache with the new data before any "hit" packets are sent to use the new data. Therefore it is important not to change the order of packets sent by Mode Inject, since the cache replacement and use logic assumes that the incoming packets are processed in order.

The Fragment block modifies some of the data before writing in the Color cache during cache fills. This is done to prepare the barycentric coefficients during miss time. The vertex window coordinates, the reciprocal of the clip-w coordinates at the vertices and texture q coordinates at the vertices are used and replaced by the $C_{x[1:0]}$, $C_{y[1:0]}$, $C_{2[1:0]}$, $D_x$, $D_y$, $D_k$ barycentric coefficients. Similarly the $S_x$, $S_y$, $T_x$, and $T_y$, values are evaluated during cache misses and stored along with the other data.

The Color cache is currently organized as a 256 entry, four set associative cache. The microArchitecture of the Mode Inject and Fragment Units may change this organization provided that the performance goals are retained. It assumed that at full rate the Color cache misses will be less than 15% of the average processed VSPs.

The data needed at half rate is stored as two consecutive entries in the Color cache. The index provided in this case will be always be an even number.

For the texture information used in the Fragment block two texture mode caches are used. These are identically organized caches each holding information for two textures. Two texture indices, TX0IX and TX1IX, are provided in every "hit" packet to associate the texture coordinates with up to four textures. Per texture the following data is read from the texture mode caches:

TEXTURE_1D, TEXTURE_2D, TEXTURE_3D are the enable bits for a given texture.

TEXTURE_HIGH, TEXTURE_WIDTH define respectively the m and n values used in the u and v calculations.

TEXTURE_COORD_SET_SOURCE identifies which texture coordinate is bound to a given texture.

The texture mode caches are organized as a 32 entry fully associative cache. The assumed miss rate for texture mode cache 0 is less than 0.2% per VSP.

In addition, modes are also cached in Fragment in a Mode Cache. The Mode Cache is organized as a fully associative, eight-entry cache. The assumed miss rate is 0.001% per VSP (negligible). The following info is cached in the Mode Cache:

SHADE_MODEL (1 bit),
BUMP_NO_INTERPOLATE (1 bit)
SAMPLE_LOCATION_SELECT (3 bits)

Other Considerations

The order of processing of VSPs can also be changed. A reorder buffer before the Pixel block reassembles the stamps. VSPs that share the same x and y coordinates (belonging to separate primitives) need to be presented to Pixel in arrival order. VSPptr accompanies each VSP, indicating the VSP's position in the reorder buffer. The buffer is organized as a FIFO, where the front-most stamp for which the shading has completed is forwarded to the Pixel block.

Another consideration for the VSP processing order is the various mode caches. Mode index assumes that "hit" packets will not cross "miss" packets. This means the "miss" packets form a barrier for the "hit" packets. Obviously the process order can be changed after fetching the corresponding mode cache info, provided the downstream block sees the packets at the same order provided by Mode Injection.

IX. Detailed Description of the Texture Functional Block (TEX)

The invention is directed to a new graphics processor and method and encompasses numerous substructures including specialized subsystems, subprocessors, devices, architectures, and corresponding procedures. Embodiments of the invention may include one or more of deferred shading, a tiled frame buffer, and multiple-stage hidden surface removal processing, as well as other structures and/or procedures. In this document, this graphics processor of this invention is referred to as the DSGP (for Deferred Shading Graphics Processor), and the associated pipeline is referred to as the "DSGP pipeline", or simply "the pipeline".

This present invention includes numerous embodiments of the DSGP pipeline. Embodiments of the present invention are designed to provide high-performance 3D graphics with Phong shading, subpixel anti-aliasing, and texture- and bump-mapping in hardware. The DSGP pipeline provides these sophisticated features without sacrificing performance.

The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL and Direct3D Application Program Interfaces (APIs). The OpenGL specification, entitled "The OpenGL Graphics System: A Specification (Version 1.2)" by Mark Segal and Kurt Akeley, edited by Jon Leech, is included incorporated by reference.

Several exemplary embodiments or versions of a Deferred Shading Graphics Pipeline are described here, and embodiments having various combinations of features may be implemented. Additionally, features of the invention may be implemented independently of other features, and need not be used exclusively in Graphics Pipelines which perform shading in a deferred manner.

Tiles, Stamps, Samples, and Fragments

Each frame (also called a scene or user frame) of 3D graphics primitives is rendered into a 3D window on the display screen. The pipeline renders primitives, and the invention is described relative to a set of renderable primitives that include: 1) triangles, 2) lines, and 3) points. Polygons with more than three vertices are divided into triangles in the Geometry block, but the DSGP pipeline could be easily modified to render quadrilaterals or polygons with more sides. Therefore, since the pipeline can render any polygon once it is broken up into triangles, the inventive renderer effectively renders any polygon primitive. A window consists of a rectangular grid of pixels, and the window is divided into tiles (hereinafter tiles are assumed to be 16×16 pixels, but could be any size). If tiles are not used, then the window is considered to be one tile. Each tile is further divided into stamps (hereinafter stamps are assumed to be 2×2 pixels, thereby resulting in 64 stamps per tile, but stamps could be any size within a tile). Each pixel includes one or more samples, where each sample has its own color value and z-value (hereinafter, pixels are assumed to include four samples, but any number could be used). A fragment is the collection of samples covered by a primitive within a particular pixel. The term "fragment" is also used to describe the collection of visible samples within a particular primitive and a particular pixel.

Deferred Shading

In ordinary Z-buffer rendering, the renderer calculates the color value (RGB or RGBA) and z value for each pixel of each primitive, then compares the z value of the new pixel with the current z value in the Z-buffer. If the z value comparison indicates the new pixel is "in front of" the existing pixel in the frame buffer, the new pixel overwrites the old one; otherwise, the new pixel is thrown away.

Z-buffer rendering works well and requires no elaborate hardware. However, it typically results in a great deal of wasted processing effort if the scene contains many hidden surfaces. In complex scenes, the renderer may calculate color values for ten or twenty times as many pixels as are visible in the final picture. This means the computational cost of any per-pixel operation—such as Phong shading or texture-mapping—is multiplied by ten or twenty. The number of surfaces per pixel, averaged over an entire frame, is called the depth complexity of the frame. In conventional z-buffered renderers, the depth complexity is a measure of the renderer's inefficiency when rendering a particular frame.

In accordance with the present invention, in a pipeline that performs deferred shading, hidden surface removal (HSR) is completed before any pixel coloring is done. The objective of a deferred shading pipeline is to generate pixel colors for only those primitives that appear in the final image (i.e., exact HSR). Deferred shading generally requires the primitives to be accumulated before HSR can begin. For a frame with only opaque primitives, the HSR process determines the single visible primitive at each sample within all the pixels. Once the visible primitive is determined for a sample, then the primitive's color at that sample location is determined. Additional efficiency can be achieved by determining a single per-pixel color for all the samples within the same pixel, rather than computing per-sample colors.

For a frame with at least some alpha blending (as defined in the above referenced OpenGL specification) of primitives (generally due to transparency), there are some samples that are colored by two or more primitives. This means the HSR process must determine a set of visible primitives per sample.

In some APIs, such as OpenGL, the HSR process can be complicated by other operations (that is by operation other than depth test) that can discard primitives. These other operations include: pixel ownership test, scissor test, alpha test, color test, and stencil test (as described elsewhere in this specification). Some of these operations discard a primitive based on its color (such as alpha test), which is not determined in a deferred shading pipeline until after the HSR process (this is because alpha values are often generated by the texturing process, included in pixel fragment coloring). For example, a primitive that would normally obscure a more distant primitive (generally at a greater z-value) can be discarded by alpha test, thereby causing it to not obscure the more distant primitive. A HSR process that does not take alpha test into account could mistakenly discard the more distant primitive. Hence, there may be an inconsistency between deferred shading and alpha test (similarly, with color test and stencil test); that is, pixel coloring is postponed until after HSR, but HSR can depend on pixel colors. Simple solutions to this problem include: 1) eliminating non-depth-dependent tests from the API, such as alpha test, color test, and stencil test, but this potential solution might prevent existing programs from executing properly on the deferred shading pipeline; and 2) having the HSR process do some color generation, only when needed, but this potential solution would complicate the data flow considerably. Therefore, neither of these choices is attractive. A third alternative, called conservative hidden surface removal (CHSR), is one of the important innovations provided by the inventive structure and method. CHSR is described in great detail in subsequent sections of the specification.

Another complication in many APIs is their ability to change the depth test. The standard way of thinking about 3D rendering assumes visible objects are closer than obscured objects (i.e., at lesser z-values), and this is accomplished by selecting a "less-than" depth test (i.e., an object is visible if its z-value is “less-than” other geometry). However, most APIs support other depth tests such as: greater-than, less-than, greater-than-or-equal-to, equal, less-than-or-equal-to, less-than, not-equal, and the like algebraic, magnitude, and logical relationships. This essentially “changes the rules” for what is visible. This complication is compounded by an API allowing the application program to change the depth test within a frame. Different geometry may be subject to drastically different rules for visibility. Hence, the time order of primitives with different rendering rules must be taken into account. If they are rendered in the order A, B, then C, primitive C will be the final visible surface. However, if the primitives are rendered in the order C, B, then A, primitive A will be the final visible surface. This illustrates how a deferred shading pipeline must preserve the time ordering of primitives, and correct pipeline state (for example, the depth test) must be associated with each primitive.

Deferred Shading Graphics Pipeline

Provisional U.S. patent application Ser. No. 60/097,336; filed Aug. 20, 1998, describes various embodiments of novel deferred Shading Graphics Pipelines. The present invention, and its various embodiments, is suitable for use as the Texture Block in the various embodiments of that differed shading graphics pipeline, or for use with other graphics pipelines which do not use differed shading. Details of such graphics pipelines are for convenience not described again herein.

Texture

The Texture Block of a graphics pipeline applies texture maps to the pixel fragments. Texture maps are stored in Texture Memory, which is typically loaded from the host computer’s memory using the AGP interface. In one embodiment, a single polygon can use up to eight textures, although alternative embodiments allow any desired number of textures per polygon.

The inventive structure and method may advantageously make use of trilinear mapping of multiple layers (resolutions) of texture maps. Texture maps are stored in a Texture Memory which may generally comprise a single-buffered memory loaded from the host computer’s memory using the AGP interface. In the exemplary embodiment, a single polygon can use up to eight textures. Textures are MIP-mapped. That is, each texture comprises a series of texture maps at different levels of detail, each map representing the appearance of the texture at a given distance from the eye point. To produce a texture value for a given pixel fragment, the Texture Block performs tri-linear interpolation from the texture maps, to approximate the correct level of detail. The Texture Block can, in conjunction with the Fragment Block, perform other interpolation methods, such as anisotropic interpolation.

The Texture Block supplies interpolated texture values (generally as RGBA color values) to the graphics pipeline shading block on a per-fragment basis. Bump maps represent a special kind of texture map. Instead of a color, each texel of a bump map contains a height field gradient. The multiple layers are MIP layers, and interpolation is within and between the MIP layers. The first interpolation is within each layer, then you interpolate between the two adjacent layers, one nominally having resolution greater than required and the other layer having less resolution than required, so that it is done three-dimensionally to generate an optimum resolution.

Detailed Description of Texture Pipeline

Referring to FIG. F 2, there is shown a block diagram of one embodiment of a texture pipeline constructed in accordance with the present invention. Texture unit 1200 receives texture coordinates for individual fragments, accesses the appropriate texture maps stored in texture memory, and generates a texture value for each fragment. The texture values are sent downstream, for example to a shading block which may then combine the texture value with other image information such as lighting to generate the final color value for a fragment.

Texture Setup 1211 receives data packets, for example, from the Fragment unit of U.S. Provisional Patent application No. 60/097,336. Data packets provide texture LOD data for the texture maps, and potentially visible fragment data for an image to be rendered. The fragment data includes (s, t, r) texture coordinates for each fragment. As shown in FIG. F 3, the (s, t) coordinates are normalized texture space coordinates. For 3D textures, the “r” index is used to indicate texture depth. The s and t coordinates are floating point numbers. Texture setup 1211 translates the s, and t coordinates into i0, i1, j0, j1 (4 bilinear samples) and LODA/LODB (adjacent LODs for trilinear mipmapping) coordinates. The i0, i1, j0, j1 coordinates are 12 bit unsigned integers. LODA and LODB are 4 bit integers, for example with LODA being the stored LOD greater than the actual LOD, and LODB being the stored LOD less than the actual LOD. For 3D textures the r coordinate is converted into a k coordinate. In a trilinear mipmapping embodiment, each fragment has eight texture coordinates associated with it. The i, j, and LOD/k values are all transferred to Dualoct Bank Mapping unit 1212.

The Fragment Unit receives S, T, R coordinates in floating point format. Setup converts these S, T, R coordinates into U, V, W coordinates, which are fixed point coordinates used prior to texture look-up. The Texture Block then performs a texture look-up and provides i, j, k coordinates, which are integer coordinates mapped in normalized space. Thus, u=i×texture width, v=j×texture height, and w=k×texture depth.

Texture Maps

Texture maps are allocated to Texture Memory 1213 and Texel Prefetch Buffer 1216 using methods to minimize memory conflicts and maximize throughput. Dualoct Bank Mapping unit 1212 maps the i, j, and LOD/k coordinates into Texture Memory 1213 and Texel Prefetch Buffer 1216. Dualoct Bank Mapping unit 1212 also generates tags for texels stored in Texel Prefetch Buffer 1216. The tags are stored in the eight Tag Banks 1216-0 through 1216-7. The tags indicate whether a texel is stored in Texel Prefetch Buffer 1216, and the location of the texel in the buffer.

Texture Memory Management Unit (MMU) 1210 controls access to Texture Memory 1213. Texture Memory 1213 stores the active texture maps. If a texel is not found in Texel Prefetch Buffer 1216, then Texture MMU 1210 requests the texel from Texture Memory 1213. If the texel is from a texture map not stored in Texture Memory 1213 then the texture map can be retrieved from another source as is shown in FIG. F 2. Texture memory has, in various embodiments, access to Frame buffer 1221, AGP memory 1222, Virtual memory 1223, with Virtual memory in turn having access to disk 1224 and network 1225. Thus, a variety of locations are available for texture addresses to be received in the event of a miss in order to greatly reduce the instances where a needed texel is ultimately not available at the time it is needed in the pipeline, since there is time between the determination of a texture cache miss and the time that texel is actually needed later on down the pipeline.

After the texels for a given fragment are retrieved, Texture Interpolator 1218 interpolates the texel color values to generate a color value for the fragment. The color value is then inserted into a packet and sent down the pipeline, for example to a shading block.

A texture array is divided into 2×2 texel blocks. Each texel block in an array is represented in Texture Memory. Texturing a given fragment with tri-linear mipmapping requires accessing two to eight of these blocks, depending on where the fragment falls relative to the 2×2 blocks. For trilinear mipmapping for each fragment, up to eight texels must be retrieved from memory. Ideally all eight texels are retrieved in parallel. As shown in FIG. F 4*a*, to provide all eight texels in parallel, Texel Prefetch Buffer 1216 consists of eight independently accessible memory banks 1216-0 through 1216-7. Similarly, as shown in FIG. F 5, Texture Memory 1213 includes a plurality of Texture Memory Devices, organized into a plurality of channels, such as channels 1213-0 and 1213-1. To access all eight texels in parallel from Texel Prefetch Buffer 1216 each texel must be stored in a separate Prefetch Buffer Bank.

Texture Tile Addressing

To maximize the memory throughput the texels in the texture maps are re-mapped into a spatially coherent form using texture tile addresses. The texels required to generate adjacent fragments depend upon the orientation of the object being rendered, and the depth location of the object in the scene. For example, adjacent fragments of a surface of an object at a large skew angle with respect to the viewing point will use texels at farther distances apart in the selected LOD than adjacent fragments of a surface that are approximately perpendicular to the viewing point. However, there is typically some spatial coherence between groups of fragments in close proximity and the texels used to generate texture for the fragments. Therefore, the texture tile addresses for the texels in the texture maps are defined so as to maximize the spatial coherence of the texture maps.

FIGS. F 6*a* and F6*a* illustrate a spatially coherent texel mapping for texture memory 1213, including texture map 800, including texture "super blocks" 800-0 through 800-3. In one embodiment, a RAMBUS™, RAMBUS Corp., Mountain View Calif., memory is used for Texture Memory 1213. The smallest accessible data structure in RAMBUS memory is a "Dualoct" which is 16 bytes. Each texel contains 32 bits of color data in the format RGBA-8, or Lum/Alpha 16. Four texels can therefore be stored in each dualoct. The X and Y axis of FIGS. F 6*a* and F6*b* include dualoct labels. The (X,Y) coordinates correspond to the (i, j) coordinates with the least significant bit of (i, j) dropped. FIG. F 6*a* illustrates how the texels are renumbered within each dualoct. The texels are numbered sequentially starting at the origin of each dualoct and increasing sequentially in a counterclockwise order. FIG. F 6*c* shows how texel locations are remapped from linear addressing to a reconfigured address including a "swirl address" portion.

Referring to FIG. F 6*b*, sector 800-0-0 shows the swirl pattern mapping for 16 dualocts. The four bit labels in each dualoct indicate the dualoct number that is used to generate an address for storing the dualoct in RAMBUS Texture Memory 1213 and Texel Prefetch Buffer 1216. Each dualoct shown in FIG. F 6*b* contains 4 texels arranged as shown in FIG. F 6*a*. Dualocts are renumbered sequentially in groups of four, starting at the origin and moving in a counter-clockwise direction. After renumbering a group of dualocts, the next group of four dualocts are selected moving in a counter clockwise direction around the sector. After all four groups in a sector have been renumbered, the renumbering pattern is repeated for the next sector (i.e., sector 800-0-1) moving counter-clockwise around a dualoct block. For example, after the 16 dualocts in sector 800-0-0, the dualoct numbers continue in sector 800-0-1 which contains dualoct numbers 16–30 which are numbered in the same pattern as sector 800-0-0. This pattern is then repeated in sector 800-0-2 and in sector 800-0-3. Dualoct block 0 (800-0) consists of the four sectors 800-0-0 through 800-0-3. The dualoct block 0 pattern is then repeated in dualoct block 1 (800-1) starting with dualoct number 64, followed by dualoct block 2 (800-2), and dualoct block 3 (800-3). In one embodiment, the recursive swirl pattern stops at the texture super block 0 (800) level.

Alternative spatially coherent patterns are used in alternative embodiments, rather than the recursive swirl pattern illustrated in FIGS. F 6*a* and 6*b*. FIG. F 7 illustrates a super block 900 of a texture map that is mapped using one such alternative pattern. Super block 900 includes sectors 0–15. The dualoct numbering pattern within each sector is the same for the super block 900 pattern as for texture super block 0 (800) shown in FIG. F 8. However, rather than repeating the counter-clockwise swirl pattern at the sector level, the dualoct numbers at the sector level follow the pattern indicated by the sector numbers 0–15 in FIG. F 7, limiting the swirl size to 64×64 texels.

FIG. F 8 illustrates the dualoct numbering pattern at the super block level of a texture map 1000. At the super block level the pattern changes to a simple linear mapping, since in certain embodiments it has been determined that beyond 64×64 texels recursive swirling patterns begin to hurt spatial locality. The swirling is inherently a square operation, implying that it does not work very well at large sizes of rectangular but non-square textures, and textures with border information. Limiting the swirl to 64×64 in certain embodiments of this invention, limits the minimum allocated size to a manageable amount of memory. In accordance with this invention, the swirling scheme provides that, upon servicing a miss request, the four samples fetched will reside in distinct memory banks of the prefetched buffer, thus avoiding bank conflict. Furthermore, the swirling scheme maximizes subsequent hits to the prefetched buffer so that misses are typically spread out, so the memory system can service requests while the texture unit is working on hit data, thus minimizing stalls. The next super block of dualocts after texture super block 0 (800) is located directly to the right of texture super block 0 (800). This linear pattern is repeated until super block n/64, and then a new row of super blocks is started with super block n/64+1, as shown.

The spatially coherent texel mapping patterns illustrated in FIGS. F 8*a*,F8*b* and F9 are designed to maximize the likelihood that the four texels used to generate texture for a fragment will be stored either in separate Texel Prefetch Buffer 1216 banks, or separate Texture Memory 1213 devices.

Memory Addressing

Referring to FIG. F 4*a*, Texel Prefetch Buffer 1216 includes eight Prefetch Buffer Banks 1216-0 through 1216-7. FIG. F 4*a* shows how the numbered dualocts in FIG. F 6*b* map into the eight Prefetch Buffer Banks 1216-0 through 1216-7. Also shown are the four texels fetched for a particular pixel location 899, shown in FIG. F 6*a*, appearing without a memory conflict. FIG. F4*a* shows the texels stored for one LOD. For trilinear mipmapping, Banks 12164 through 1216-7 contain texels for the second LOD.

Referring to FIG. F 5, there is shown a block diagram of one embodiment of Texture Memory 1213. Texture Memory 1213 has two channels 1213-0 and 1213-1. Each channel contains eight devices 1213-0-0 through 1213-0-7 and 1213-1-0 through 1213-1-7, respectively. Each device has an independent set of addresses and independent I/O data lines to allow data to be independently accessed in each of the eight devices. Each device contains sixteen banks, meaning that in this embodiment there are 256 open pages, clearly reducing the likelihood of memory conflict. In one embodiment each channel is a 64 Mbyte memory.

To map the texels in the texture map into a spatially coherent format, Dualoct Bank Mapping unit 1212 generates a texture tile address for each dualoct. FIG. F 9 illustrates a texture tile address data structure 1180 according to one embodiment of the present invention. Texture Field ID 1181 field is an 11 bit field that defines the texture that is being referenced. Up to 2048 different textures can be used in a single display. These textures may be stored in any memory resource. Each fragment may then reference up to eight different textures. When a texture is referenced that is not in Texture Prefetch Buffer 1216, Texture MMU 1210 loads the memory from an external memory resource, and if necessary de-allocates the required Texture Prefetch Buffer 1216 space to load the new texture. The LOD 1182 field is a 4 bit field that defines the LOD to be used in the selected texture map. The U, V fields 1183 and 1184 are 11 bit fields for texture coordinates with a range from 0–2047. The U, V fields for each dualoct are defined to generate the spatially coherent format, such as the format shown in FIGS. F 8*a* and F8*b*. For 3D textures, the 4 LSB's of the Texture field ID 1181 contain the 4 MSB's of the texture R coordinate, which is a texture depth index generated from the k coordinate. Dualoct Bank Mapping unit 1212 provides the four R coordinate bits whenever a 3D texture operation is in the pipeline. Thereafter, 3D texture tile addresses are essentially treated the same as 2D and 1D addresses.

The texture tile address is provided to Texture MMU 1210 which generates a corresponding texture memory address. Texture MMU 1210 performs the texture tile address to texture memory address translation using a linear mapping of the texture tile address into a table of texture memory addresses stored in Texture Memory 1213. This table is maintained by software. FIG. F 10 illustrates a texture memory address data structure 1280 for a RAMBUS™ Texture Memory 1213. Texture memory address data structure 1280 is designed to maximize the likelihood that the dualocts required to generate the texture for a fragment will be stored in different Texture Memory pages, as shown in FIG. F 5. In one embodiment, Device field 1285 consists of the least significant 3 bits of the texture memory address data structure 1280. Device field 1285 defines the texture memory device that a dualoct is stored in. Therefore, each sequential dualoct, as defined by the mapped texture, is stored in a different texture memory device. The Bank field 1284 comprises the next four low order bits, followed by a 1 bit Channel field 1283, a 9 bit Row field 1282 and a 6 bit Column field 1281.

The texture memory address data structure 1280 is also programmable. This allows the texture memory address to accommodate different memory configurations, and to alter the placement of bit fields to optimize the access to the texture data. For example, an alternative memory configuration may have more than eight texture memory devices.

Texels are loaded from Texture Memory 1213 into Texel Prefetch Buffer 1216 to provide higher speed access. When texels are moved into Texel Prefetch Buffer 1216, a corresponding tag is created in one of the eight Prefetch Buffer Tag Blocks 1220-0 through 1220-7, shown in FIG. F4*b*. Each of the eight Tag Blocks 1220-0 through 1220-7 has a corresponding memory Queue 1230-0 through 1230-7. Note that the tags are 64 entries, and the cache SRAM's are 256 entries. This mapping allows each Prefetch Buffer tag entry to map a "line" of 4 texels across four Prefetch Buffer Banks, as shown in Texel Prefetch Buffer 1216 in FIG. F 4*a*. This mapping allows 4 texels to be retrieved from four separate Prefetch Buffer Banks every cycle, thus ensuring maximum texture data access bandwidth. Each Tag Block may receive up to one texture tile address per cycle. The texture tile address points to a particular dualoct of 4 texels. Each Tag Block entry points to one dualoct line of texels in Texel Prefetch Buffer 1216 memory. The incoming texture tile address is checked against the contents of the Tag Block to determine whether the desired dualoct is stored in Texel Prefetch Buffer 1216.

FIG. F 4*a* shows the texels stored for one LOD. For trilinear mipmapping, Banks 1216-4 through 1216-7 contain texels for the second LOD. The Texture ID 1181 bit [26] in the texture tile address is used to control whether an LOD gets mapped to Prefetch Buffer Banks 0–3 (1216-0 through 1216-3) or Banks 4–7 (1216-4 through 1216-7). If Texture ID 1181 bit [26]=0, then the even LOD's (LOD[22]=0) are mapped into Prefetch Buffer Banks 0–3, and the odd LOD's (LOD[22]=1) are mapped into Prefetch Buffer Banks 4–7. Conversely, if Texture ID[26]=1 then the odd LOD's are mapped into Prefetch Buffer Banks 0–3, and the even LOD's are mapped into Prefetch Buffer Banks 4–7. This mapping ensures that all eight tags can be accessed in each cycle, and that texture information is evenly distributed in the caches. Dualoct Bank Mapping unit 1212 also follows this LOD mapping rule when sending texture tile addresses to the corresponding Tag Block 1220-0 through 1220-7, shown in FIG. F 4*b*.

To generate a texture for a fragment, Dualoct Bank Mapping unit 1212 generates up to eight dualoct requests, and sends them to the appropriate Prefetch Buffer Bank. The Prefetch Buffer Tags 1220-0 through 1220-7 are checked for a match. If there is a hit, the request is sent to the appropriate bank of Memory Queue 1219. When the memory request exits Memory Queue 1219, the line number is sent to Texel Prefetch Buffer 1216 to look-up the data. If there is a miss on a given texture tile address, then a miss request is put into the miss queue for the corresponding tag block. The miss address is eventually read out of the miss queue and forwarded to Texture MMU 1210. The miss request is then serviced, the data is retrieved from Texture Memory 1213 or another external memory source, and is ultimately provided to the appropriate Texel Prefetch Buffer Banks 1216-0 through 1216-7.

Each line in Memory Queue 1219 records one memory access for a particular texture operation on one fragment of data. Memory requests are received at the top of Memory Queue 1219, and when they reach the bottom, Texel Prefetch Buffer 1216 is accessed for the data. Miss data is only filled into Texel Prefetch Buffer 1216 when a particular miss request reaches the bottom of the corresponding memory Queue 1230-0 through 1230-7.

Each of the eight memory Queues 1230-0 through 1230-7 hold up to eight pending miss addresses for a particular Prefetch Buffer Bank 1216-0 through 1216-7. If a memory Queue is not empty, then it can be assumed to contain at least one valid address. Every clock cycle Prefetch Buffer Controller 1218 scans the memory Queues 1230-0 through 1230-7 searching for a valid entry. When a miss address is found, it is sent to Texture MMU 1210.

FIG. F 9 is a Texture Tile Address Structure which serves as the tag for Texel Prefetch Buffer 1216. When this tag indicates a Texel Prefetch Buffer miss, a Texture Memory 1213 look-up is needed. The Virtual Address Structure includes an 11 bit texture ID 1181, a four bit LOD 1182, and 11 bit U and V addresses 1183 and 1184. This Virtual Address of FIG. F 9 serves as a tag entry in tag memories 1212-0 through 1212-7 (FIG. F 2). In the event of a miss, a look-up in Texture Memory 1213 is required.

FIG. F 10 depicts pointer look-up translation tag block 1190, which is stored, for example, in a dedicated portion of the texture memory, and is addressed using the 11 bit texture ID and four bit LOD number, forming a 15 bit index to locate the pointer of FIG. F 10. The pointer, once located, points to a base address within texture memory where the start of the desired texture/LOD is stored. This base address is then appended by addresses to be created by the U and V components of the virtual address to create the virtual address of a dualoct, which in turn is mapped to the physical address of RAMBus memory using the address structure of FIG. F 11.

FIG. F 12 is a diagram depicting the address reconfigurations and process for re-configuring the addresses with respect to FIGS. F 6c,F9, F10, and F12. As shown in FIG. F 12, texture tile address structure 1180 (previously discussed with reference to FIG. F 9) serves as a tag for Texel Prefetch Buffer 1216. When this tag indicates a Texel Prefetch Buffer miss, a texture memory 1213 look-up is needed. Translation buffer 1191 uses the 11-bit texture ID and four-bit LOD to form a 15 bit index to pointer look-up translation tag block 1190 (previously discussed with reference to FIG. F 10). Swirl addresses block 1192 remaps the bits from texture tile address data structure 1180 to form the "swirl address" 1194 (previously discussed with respect to FIG. F 6a–6c). Adder 1193 combines the pointer look-up translation tag block 1190 and "swirl address" 1194 to form the physical address 1280 to address RAMBus memory (as previously discussed with respect to FIG. F 11).

Reorder Logic

FIG. F 3a is a block diagram depicting one embodiment of Read Miss Control Circuitry 2600. Read Miss Control Circuity 2600 receives a read miss request from the miss logic shown in FIG. F 2, when the tag mechanism determines that the desired information is not contained in texel prefetch buffer 1216. There are four types of read miss requests: texture look-up (miss), copy texture, read texture, and Auxring read dualoct (a maintenance utility function). The read miss requests received by read control circuitry 2600 are prioritized by prioritization block 2620, for example, in the order listed above. Prioritization block 2620 sends the read request to the appropriate channel based upon the channel bit (FIG. F 8) contained in the texture memory address to be accessed. These addresses are thus sent to request queues 2621-0 and 2621-1, which, in one embodiment, are 32 addresses deep. The addresses stored in request queues 2621-0 and 2621-1 are applied to reorder logic circuity 2623-0 and 2623-1, respectively, which in turn access RAMBus memory controller 2649. Reorder logic 2623-0 and 2623-1 reorder the addresses received from request queues 2621-0 and 2621-1 in order to avoid memory conflict in texture memory, as will be described with respect to FIG. F 13b. Since reorder logic 2623-0 and 2326-1 reorder the memory addresses to be accessed by RAMBus memory controller 2649, tag queue 2622 keeps track of channel and requester information. The accessed data is output to in-order return queue 2624, where the results are placed in the appropriate slots based upon the original order as indicated by queues 2609 and 2610. The data, once stored in proper order in in-order return queue 2624 is then provided to its requestor as data and a data valid signal. In one embodiment, the data is output in a 144 bits wide, which corresponds to a dualoct.

FIG. F 13b is a block diagram of one embodiment of this invention which includes reorder logic 2623-0 (with reorder logic 2623-1 being identical), and showing RAMBus memory controller 2649. The purpose of reorder logic 2623 is to monitor incoming address requests and reorder those requests so as to avoid memory conflicts in RAMBus memory controller 2649. For each memory address received as a request on Bus 2601, conflict detection block 2602 determines if a memory conflict is likely to occur based upon the addresses contained in first level reorder queue 2603. If not, that address is directly forwarded to control block 2605, and is added to first level reorder queue 2603, to allow for conflict checking of subsequently received addresses. On the other hand if a conflict is determined by conflict detection block 2602, the conflicting address request is sent to conflict queue 2604. In one embodiment, in order to prevent conflicting address requests from being utilized too distant from other requests received in the same recent time frame, 32 address requests are received by conflict detection block 2602 and either forwarded to control block 2605 (no conflict), or placed in conflict queue 2604, after which the addresses stored in conflict queue 2604 are output to control circuit 2605. In this manner, the reordered address requests are applied to reordered address queue 2606 to access RAMBus memory controller 2649 with fewer, and often times zero, conflicts, in contrast to the conflict situations which would exist if the original order of the read request were applied directly to RAMBus memory controller 2649 without any reordering.

In-Order tag queue 2609 and out-of-order tag queue 2610 maintains tag information in order to preserve the original address order so that when the results are looked up and output from reorder logic 2623-0 and 2623-1, the desired (original) order is maintained.

Information read from RAMBus memory controller 2649 is stored in read data queue 2611. Through control block 2612, data from queue 2611 is forwarded to either out-of-order queue 2613 or in-order queue 2614. Control block 2615 reassembles data from queues 2613 and 2614 in the original request order and forwards it to the appropriate channel port of block 2614 in order. Control block 2624 receives channel specific data from blocks 2623-0 and 2623-1 which is then re-associated and issued back to the waiting requester.

The inventive pipeline includes a texture memory which includes a prefetch buffer. The host also includes storage for texture, which may typically be very large, but in order to render a texture, it must be loaded into texture memory. Associated with each VSP are S and T's. In order to perform trilinear MIP mapping, we necessarily blend eight (8) samples, so the inventive structure provides a set of eight content addressable (memory) caches running in parallel. In one embodiment, the cache identifier is one of the content addressable tags, and that's the reason the tag part of the cache and the data part of the cache are located separate. Conventionally, the tag and data are co-located so that a query on the tag gives the data. In the inventive structure and method, the tags and data are split up and indices are sent down the pipeline.

The data and tags are stored in different blocks and the content addressable look-up is a look-up or query of an address, and even the "data" stored at that address in itself an index that references the actual data which is stored in a different block. The indices are determined, and sent down the pipeline so that the data referenced by the index can be determined. In other words, the tag is in one location, the texture data is in a second location, and the indices provide a link between the two storage structures.

In one embodiment of the invention, the prefetch buffer comprises a multiplicity of associative memories, generally located on the same integrated circuit as the texel interpolator. In the preferred embodiment, the texel reuse detection method is performed in the Texture Block.

In conventional 3-D graphics pipelines, an object in some orientation in space is rendered. The object has a texture map associated with it, which is represented by many triangle primitives. The procedure implemented in software, will instruct the hardware to load the particular object texture into a Texture Memory. Then all of the triangles that are common to the particular object and therefore have the same texture map are fed into the unit and texture interpolation is performed to generate all of the colored pixels needed to represent that particular object. When that object has been colored, the texture map in DRAM can be destroyed since, for example by a reallocation algorithm, the object has been rendered. If there are more than one object that have the same texture map, such as a plurality of identical objects (possibly at different orientations or locations), then all of that type of object may desirably be textured before the texture map in DRAM is discarded. Different geometry may be fed in, but the same texture map could be used for all, thereby eliminating any need to repeatedly retrieve the texture map from host memory and place it temporarily in one or more pipeline structures.

In more sophisticated conventional schemes, more than one texture map may be retrieved and stored in the memory, for example two or several maps may be stored depending on the available memory, the size of the texture maps, the need to store or retain multiple texture maps, and the sophistication of the management scheme. Each of these conventional texture mapping schemes, spatial object coherence is of primary importance. At least for an entire single object, and typically for groups of objects using the same texture map, all of the triangles making up the object are processed together. The phrase spatial coherency is applied to such a scheme because the triangles form the object and are connected in space, and therefore spatially coherent.

In the inventive structure and method, a sizable memory is supported on the card. In one implementation 128 megabytes are provided, but more or fewer megabytes may be provided. For example, 32 Mb, 64 Mb, 256 Mb, 512 Mb, or more may be provided, depending upon the needs of the user, the real estate available on the card for memory, and the density of memory available.

Rather that reading the eight texels for every visible fragment, using them, and throwing them away so that the eight texels for the next fragment can be retrieved and stored, the inventive structure and method stores and reuses them when there is a reasonable chance they will be needed again.

It would be impractical to read and throw away the eight texels every time a visible fragment is received. Rather, it is desirable to make reuse of these texels, because if you're marching along in tile space, your pixel grid within the tile (typically processed along sequential rows in the rectangular tile pixel grid) could come such that while the same texture map is not needed for sequential pixels, the same texture map might be needed for several pixels clustered in an area of the tile, and hence needed only a few process steps after the first use. Desirably, the invention uses the texels that have been read over and over, so when we need one, we read it, and we know that chances are good that once we have seen one fragment requiring a particular texture map, chances are good that for some period of time afterward while we are in the same tile, we will encounter another fragment from the same object that will need the same texture. So we save those things in this cache, and then on the fly we look-up from the cache (texture reuse register) which ones we need. If there is a cache miss, for example, when a fragment and texture map are encountered for the first time, that texture map is retrieved and stored in the cache.

Texture Map retrieval latency is another concern, but is handled through the use of First-In-First-Out (FIFO) data structures and a look-ahead or predictive retrieval procedure. The FIFO's are large and work in association with the CAM. When an item is needed, a determination is made as to whether it is already stored, and a designator is also placed in the FIFO so that if there is a cache miss, it is still possible to go out to the relatively slow memory to retrieve the information and store it. In either event, that is if the data was in the cache or it was retrieved from the host memory, it is placed in the unit memory (and also into the cache if newly retrieved).

Effectively, the FIFO acts as a sort of delay so that once the need for the texture is identified (prior to its actual use) the data can be retrieved and re-associated, before it is needed, such that the retrieval does not typically slow down the processing. The FIFO queues provide and take up the slack in the pipeline so that it always predicts and looks ahead. By examining the FIFO, non-cached texture can be identified, retrieved from host memory, placed in the cache and in a special unit memory, so that it is ready for use when a read is executed.

The FIFO and other structures that provide the look-ahead and predictive retrieval are provided in some sense to get around the problem created when the spatial object coherence typically used in per-object processing is lost in our per-tile processing. One also notes that the inventive structure and method makes use of any spatial coherence within an object, so that if all the pixels in one object are done sequentially, the invention does take advantage of the fact that there's temporal and spatial coherence.

The Texture Block caches texels to get local reuse. Texture maps are stored in texture memory in 2×2 blocks of RGBA data (16 bytes per block) except for normal vectors, which may be stored in 18 byte blocks.

Virtual Texture Numbers

The user provides a texture number when the texture is passed from user space with OpenGL calls. The user can send some triangles to be textured with one map and then change the texture data associated with the same texture number to texture other triangles in the same frame. Our pipeline requires that all sets of texture data for a frame be available to the Texture Block. The driver assigns a virtual texture number to each texture map.

Texture Memory

Texture Memory stores texture arrays that the Texture Block is currently using. Software manages the texture memory, copying texture arrays from host memory into Texture Memory. It also maintains a table of texture array addresses in Texture Memory.

Texture Addressing

The Texture Block identifies texture arrays by virtual texture number and LOD. The arrays for the highest LODs are lumped into a single record. A texture array pointer table associates a texture array ID (virtual texture number concatenated with the LOD) with an address in Texture Memory. We need to support thousands of texture array pointers, so the texture array pointer table will have to be stored in Texture Memory. We need to map texture array IDs to addresses approximately 500M times per second. Fortunately, adjacent fragments will usually share the same the texture array, so we should get good hit rates with a cache for the texture array pointers. (In one embodiment, the size of the texture array cache is 128 entries, but other sizes, larger or smaller, may be implemented.)

The Texture Block implements a direct map algorithm to search the pointer table in memory. Software manages the texture array pointer table, using the hardware look-up scheme to store table elements.

Texture Memory Allocation

Software handles allocation of texture memory. The Texture Block sends an interrupt to the host when it needs a texture array that is not already in texture memory. The host copies the texture array from main memory frame buffer to texture memory, and updates the texture array pointer table, as described above. The host controls which texture arrays are overwritten by new data.

The host will need to rearrange texture memory to do garbage collection, etc. The hardware will support the following memory copies: (a) host to memory, (b) memory to host, and (c) memory to memory.

X. Detailed Description of the Phong Functional Block (PHG)

Conventional Lighting/Bump Mapping Approaches

The invention described herein is a system and method for performing tangent space lighting in a deferred shading architecture. As documented in the detailed description, in a deferred shading architecture implemented in accordance with the present invention floating point-intensive lighting computations are performed only after hidden surfaces have been removed from the graphics pipeline. This can result in dramatically fewer lighting computations than in the conventional approach described in reference to FIG. G 2, where shading computations (FIG. G 2, 222) are performed for nearly all surfaces before hidden pixels are removed in the z-buffered blending operation (FIG. G 2, 236). To illustrate the advantages of the present invention a description is now provided of a few conventional approaches to performing lighting computations, including bump mapping. One of the described approaches is embodied in 3D graphics hardware sold by Silicon Graphics International (SGI).

The theoretical basis and implementation of lighting computations in conventional 3D graphics systems is well-known and is thoroughly documented in the following publications, which are incorporated herein by reference: (1) Phong, B. T., *Illumination for Computer Generated Pictures*, Communications of the ACM 18, 6 (June 1975), 311–317 (hereinafter referred to as the Phong reference); (2) Blinn, J. F., *Simulation of Wrinkled Surfaces*, In Computer Graphics (SIGGRAPH '78 Proceedings) (August 1978), vol. 12, pp. 286–292 (hereinafter referred to as the Blinn reference); (3) Watt, Alan, *3D Computer Graphics* (2nd ed.), p. 250 (hereinafter referred to as the Watt reference); (4) Peercy, M. et al., *Efficient Bump Mapping Hardware*, In Computer Graphics (SIGGRAPH '97 Proceedings) (July 1997), vol. 8, pp. 303–306 (hereinafter referred to as the Peercy reference).

Generally, lighting computations generate for each pixel of a surface an RGBA color value that accounts for the surface's color, orientation and material properties; the orientation and properties of the surface illumination; and the viewpoint from which the illuminated surface is observed. The material properties can include: fog, emissive color, reflective properties (ambient, diffuse, specular) and bump effects. The illumination properties can include for one or more lights: color (global ambient, light ambient, light diffuse, light specular) and attenuation, spotlight and shadow effects.

There are many different lighting models that can be implemented in a 3D graphics system, including Gouraud shading and Phong shading. In Gouraud shading, lighting computations are made at each vertex of an illuminated surface and the resulting colors are interpolated. This technique is computationally simple but provides many undesirable artifacts, such as mach banding. The most realistic lighting effects are provided by Phong shading, where lighting computations are made at each pixel based on interpolated and normalized vertex normals. Typically, a graphics system supports many different lighting models. However, as a focus of the present invention is to efficiently combine Phong shading and bump mapping, the other lighting models are not further described.

Lighting Computations

Referring to FIG. G 3 there is shown a diagram illustrating the elements employed in the lighting computations of both the conventional approach and the present invention. This figure does not illustrate the elements used in bump mapping calculations, which are shown in FIG. G 4. The elements shown in FIG. G 3 are defined below.

Definitions of Elements of Lighting Computations

V the position of the fragment to be illuminated in eye coordinates ($V_x$, $V_y$, $V_z$).

$\hat{N}$ the unit normal vector at the fragment ($N_x$, $N_y$, $N_z$).

$P_L$ the location of the light source in eye coordinates ($P_{Lx}$, $P_{Ly}$, $P_{Lz}$).

$P_{Li}$ indicates whether the light is located at infinity (0=infinity). If the light is at infinity then $P_L$ represents the coordinates of a unit vector from the origin to the light, $\hat{P}_L$ $P_E$ the location of the viewer (viewpoint). In eye coordinates the viewpoint is at either (0,0,0) or (0,0, ∞). This is specified as a lighting mode.

$\hat{E}$ is the unit vector from the vertex to the viewpoint, $P_E$, and is defined as follows:

$$\hat{E} = \begin{bmatrix} E_x \\ E_y \\ E_z \end{bmatrix} = \begin{cases} \frac{1}{d_E} \cdot [(-V_x)(-V_y)(-V_z)]^T & \text{for } P_E = (0,0,0) \\ [0\ 0\ 1]^T & \text{for } P_E = (0,0,\infty) \end{cases}$$

where $$d_E = \sqrt{V_x^2 + V_y^2 + V_z^2}$$

$\hat{L}$ is the unit vector from the vertex to the light, $P_L$, and is defined as follows:

$$\hat{L} = \begin{bmatrix} L_x \\ L_y \\ L_z \end{bmatrix} = \begin{cases} \frac{1}{d_L} \cdot \begin{bmatrix} (P_{Lx} - V_x) \\ (P_{Ly} - V_y) \\ (P_{Lz} - V_z) \end{bmatrix} & \text{for } P_{Li} = \text{local} \\ \begin{bmatrix} P_{Lx} \\ P_{Ly} \\ P_{Lz} \end{bmatrix} & \text{for } P_{Li} = \infty \end{cases}$$

where $$d_L = \sqrt{(P_{Lx} - V_x)^2 + (P_{Ly} - V_y)^2 + (P_{Lz} - V_z)^2}$$

$\hat{H}$ is the unit vector half way between $\hat{E}$ and $\hat{L}$ and is defined as follows:

$$\hat{H} = \frac{\overset{\omega}{H}}{\left\|\overset{\omega}{H}\right\|}.$$

where $\overset{\omega}{H} = \hat{E} + \hat{L}$ $h_n$ is the cosine of the angle between $\hat{N}$, and the half way vector, $\hat{H}$, and is defined as follows:

$$h_n = \hat{H} \cdot \hat{N} = H_x \cdot N_x + H_y \cdot N_y + H_z \cdot N_z$$

$p_n$ the cosine of the angle between $\hat{N}$, and the vector to the light, $\hat{L}$, and is defined as follows:

$$p_n = \hat{N} \cdot \hat{L}$$

$\hat{S}_D$ the unit vector in the direction of the spotlight. It is a Lighting Source Parameter and is provided as a unit vector.

$s_c$ is the cosine of the angle that defines the spotlight cone. It is a Lighting Source Parameter.

$s_{dv}$ the cosine of the angle between the spotlight direction. $\hat{S}_D$, and the vector from the light to the vertex, $-\hat{L}$, and is defined as follows:

$$s_{dv} = \hat{S}_D \cdot (-L)$$

$d_L$ the distance from the light to the vertex. See $\hat{L}$ above.

Lighting Equation

The "Lighting Color" of each pixel is computed according to the following lighting equation (Eq. (1)):

$$\begin{aligned} LightingColor = {} & EmissiveColor + \\ & GlobalAmbientColor + \sum_{i=0}^{n-1} [Attenuation \cdot SpotLightEffect \cdot \\ & (AmbientColor + DiffuseColor + SpecularColor)] \end{aligned} \quad \text{Eq. (29)}$$

Lighting Equation Terms

The terms used in the lighting equation (Eq. (1)) are defined for the purposes of the present application as follows. These definitions are consistent with prior art usage.

Emissive Color. The color given to a surface by its self illuminating material property without a light.

Ambient Color. The color given to a surface due to a lights ambient intensity and scaled by the materials ambient reflective property. Ambient Color is not dependent on the position of the light or the viewer. Two types of ambient lights are provided, a Global Ambient Scene Light, and the ambient light intensity associated with individual lights.

Diffuse Color. The color given to a surface due to a light's diffuse intensity and scaled by the material's diffuse reflective property and the direction of the light with respect to the surface's normal. Because the diffuse light reflects in all directions, the position of the viewpoint has no effect on a surface's diffuse color.

Specular Color. The color given to a surface due to a light's specular intensity and scaled by the material's specular reflective property and the directions of the light and the iewpoint with respect to the surface's normal. The rate at which a material's specular reflection fades off is an exponential factor and is specified as the material's shininess factor.

Attenuation. The amount that a color's intensity from a light source fades away as a function of the distance from the surface to the light. Three factors are specified per light, a constant coefficient, a linear coefficient, and a quadratic coefficient.

Spotlight. A feature per light source that defines the direction of the light and its cone of illumination. A spotlight has no effect on a surface that lies outside its cone. The illumination by the spotlight inside the cone depends on how far the surface is from the center of the cone and is specified by a spotlight exponent factor.

The meaning and derivation of each of these terms is now described.

Emissive Color

The emissive color is just the emissive attribute of the material ($E_{cm}$). i.e., EmissiveColor=$E_{cm}$ Ambient Effects The ambient attribute of a material, $A_{cm}$, is used to scale the Global Scene Ambient Light, $A_{cs}$, to determine the global ambient effect. i.e., GlobalAmbientColor=$A_{cm} \cdot A_{cs}$ Individual Light Effects Individual lights have an ambient, diffuse, and specular attribute associated with them. These attributes are effected by the ambient, diffuse, and specular attributes of the material, resp. Each light may also have a spotlight attribute and an attenuation factor, which are expressed as follows.

Attenuation

The Attenuation factor is a fraction that reduces the lighting effect from a particular light depending on the distance of the light's position to the position of the vertex, $d_L$. If the light's position is at infinity ($P_{Li}$=0), then the attenuation factor is one and has no effect. Three positive factors are provided per light that determine the attenuation value, $K_c$, $K_i$ and $K_q$. These are the constant, linear, and quadratic effects, resp. Note that eye coordinates of the surface are needed to determine the light's distance. Given these factors, Attenuation is expressed as follows:

$$\text{Attenuation} = \frac{1}{K_c + K_i \cdot d_L + K_q \cdot d_L^2}$$

Spotlight

Each light can be specified to act as a spotlight. The result of a spotlight is to-diminish the effect that a light has on a vertex based upon the distance of the vertex from the direction that the spotlight is pointed. If the light is not a spotlight then there is no effect and the spotlight factor is one. The parameters needed to specify a spotlight are the position of the spotlight, $P_L$, $P_{Li}$, the unit length direction of the spotlight, $\hat{S}_D$ the cosine of the spotlight cutoff angle, $s_c$, and the spotlight exponent, $s_E$. The range of the cutoff angle cosine is 0 to 1. A negative value of $s_c$ indicates no spotlight effect. If the Vertex lies within the spotlight cutoff angle, then it is lit, otherwise, it is not lit. The amount that a vertex is lit is determined by the spotlight exponent, the further the vertex is from the center of the cone the less it is lit.

$s_{dv}$, the cosine of the angle between the spotlight direction and the vector from light to vertex, is used to determine whether the vertex is lit and how far the vertex is from the center of the spotlight cone.

$$s_{dv}=\hat{S}_D\cdot(-\hat{L})$$

If $s_{dv} \geqq s_c$ then the vertex is lit. How much it is lit depends on $(s_{dv})^{sE}$.

To summarize:

$$SpotlightEffect=\begin{cases}1 & \text{, for } s_c=-1,\\ 0 & \text{, for } s_c\neq-1 \text{ and } s_c<s_{dv}\\ (s_{dv})^{sE} & \text{, for } s_c\neq-1 \text{ and } s_c\geq s_{dv}\end{cases}$$

Local Ambient Effect

The ambient effect of local lights is the Local Ambient Light, $A_{cl}$, scaled by the ambient attribute of a material, $A_{cm}$.

$$AmbientCobr=A_{cl}\cdot A_{cm}$$

Diffuse Effect

The diffuse light effect is determined by the position of the light with respect to the normal of the surface. It does not depend on the position of the viewpoint. It is determined by the diffuse attribute of the material, $D_{cm}$, the diffuse attribute of the light, $D_{cl}$, the position of the light, $P_L$, $P_{Li}$, the position of the vertex, V, and the unit vector normal of the vertex, $\hat{N}$.

$\hat{L}$ is the unit length vector from the vertex to the light position. If the light position is at infinity ($P_{Li}$=0), then only the light position is used, $P_L$, and the eye coordinates of the vertex are not needed.

The diffuse effect can be described as $D_{cl}$, the diffuse light, scaled by, $D_{cm}$, the diffuse material, and finally scaled by $p_N$, the cosine of the angle between the direction of the light and the surface normal. This cosine is limited between 0 and 1. If the cosine is negative, then the diffuse effect is 0.

$$DiffuseCobr=\begin{cases}0, & \text{for } p_N\leq 0\\ D_{cl}\cdot D_{cm}\cdot p_N, & \text{for } p_N>0\end{cases}$$

where $$p_N=N\cdot\hat{L}$$

Specular Effect

The specular light effect is determined by the position of the light with respect to the normal of the surface and the position of the viewpoint. It is determined by the specular color of the material, $S_{cm}$, the specular exponent (shininess) of the material, $S_{rm}$, the specular attribute of the light, $S_{cl}$, the position of the light, $P_L$, $P_{Li}$, the unit eye vector $\hat{E}$ (described below), the position of the vertex, V, and the unit vector normal of the vertex, $\hat{N}$.

$\hat{L}$ is the unit length vector from the vertex to the light position. If the light position is at infinity ($P_{Li}$=0), then only the light position, $P_L$, is used and $\hat{L}$ is independent of the vertex's eye coordinates.

$\hat{E}$ is the unit length vector from the vertex to the viewpoint. If the viewpoint position is at infinity, then $\hat{E}=[0\ 0\ 1]^T=\hat{Z}$ and is independent of the vertex's eye coordinates.

$\hat{H}$ is the unit length vector halfway between $\hat{L}$ and $\hat{E}$.

$$\hat{H}=\frac{\overset{\omega}{H}}{\left\|\overset{\omega}{H}\right\|}=\frac{\hat{L}+\hat{E}}{\left\|\hat{L}+\hat{E}\right\|}$$

If the light position is infinite and the viewpoint is infinite, then the halfway vector, $\hat{H}$, is independent of the vertex position and is provided as light parameter.

The specular effect can be described as $S_{cl}$, the diffuse light, scaled by, $S_{cm}$, the diffuse material, and finally scaled by $(h_N)^{S_{rm}}$, the cosine of the angle between the halfway vector and the surface normal raised to the power of the shininess. The cosine is limited between 0 and 1. If the cosine is negative, then the specular effect is 0.

$$SpecularColor=\begin{cases}0, & \text{for } h_N\leq 0\\ S_{cl}\cdot S_{cm}\cdot(h_N)^{S_{rm}}, & \text{for } h_N>0\end{cases}$$

where $$h_N=\hat{N}\cdot\hat{H}$$

Infinite Viewpoint and Infinite Light Effect

In OpenGL, a light's position can be defined as having a distance of infinity from the origin but still have a vector pointing to its position. This definition is used in simplifying the calculation needed to determine the vector from the vertex to the light (in other APIs, which do not define the light's position in this way, this simplification cannot be made). If a light is at infinity, then this vector is independent of the position of the vertex, is constant for every vertex, and does not need the vertex's eye coordinates. This simplification is used for spotlights, diffuse color, and specular color.

The viewpoint is defined as being at the origin or at infinity in the z direction. This is used to simplify the calculation for specular color. If the viewer is at infinity then the vector from the vertex to the viewpoint is independent of the position of the vertex, is constant for every vertex, and does not need the vertex's eye coordinates. This vector is then just the unit vector in the z direction, $\hat{Z}$.

Calculation Cases Summary

The following table (Table 1) summarizes the calculations needed for lighting depending on whether local or infinite light position and viewer are specified.

TABLE 1

| | Infinite Light | | Local Light | |
|---|---|---|---|---|
| | Infinite Viewpoint (0, 0, ∞) | Local Viewpoint (0, 0, 0) | Infinite Viewpoint (0, 0, ∞) | Local Viewpoint (0, 0, 0) |
| Emissive | $E_{CM}$ | | | |
| Global Ambient | $A_{CM} \cdot A_{CS}$ | | | |
| Ambient | $A_{CM} \cdot A_{CL}$ | | | |
| Diffuse | | | | |
| $D_{CM} \cdot D_{CL} \cdot p_N$<br>$p_N = \hat{N} \cdot \hat{L}$ | $\hat{L} = \hat{P}_L$ | | $\hat{L} = \frac{\vec{P}_L - \vec{V}}{d_L}$ | |
| Specular | | | | |
| $S_{cl} \cdot S_{cm} \cdot (h_N)^{S_{mm}}$ | | | $\hat{E} = \hat{Z}$ | |
| $h_N = \hat{N} \cdot \hat{H}$ | $\hat{H}$ | $\hat{E} = \frac{\vec{V}}{\lVert\vec{V}\rVert}$ | $\hat{L} = \frac{\vec{P}_L - \vec{V}}{d_L}$ | $\hat{E} = \frac{\vec{V}}{\lVert\vec{V}\rVert}$ |
| $\hat{H} = \frac{\vec{H}}{\lVert\vec{H}\rVert}$ | $(\vec{H} = \hat{Z} + \hat{P}_L)$ | | | $\hat{L} = \frac{\vec{P}_L - \vec{V}}{d_L}$ |
| $\vec{H} = \hat{E} + \hat{L}$ | | $\hat{L} = \hat{P}_L$ | | |
| Attenuation | No Attenuation | | $\frac{1}{K_c + K_l \cdot d_L + K_q \cdot d_L^2}$ | |
| Spotlight | | | | |
| $(s_{dv})^{S_E}$<br>$s_{dv} = \hat{S}_D \cdot (-\hat{L})$ | $\hat{L} = \hat{P}_L$ | | $\hat{L} = \frac{\vec{P}_L - \vec{V}}{d_L}$ | |

Bump Mapping

In advanced lighting systems, the lighting computations can account for bump mapping effects. As described in the Blinn reference, bump mapping produces more realistic lighting by simulating the shadows and highlights resulting from illumination of a surface on which the effect of a three dimensional texture is imposed/mapped. An example of such a textured surface is the pebbled surface of a basketball or the dimpled surface of a golf ball.

Generally, in a lighting system that supports bump mapping a texture map (e.g., a representation of the pebbled basketball surface) is used to perturb the surface normal (N) used in the fragment-lighting calculation (described above). This gives a visual effect of 3-dimensional structure to the surface that cannot be obtained with conventional texture mapping. It also assumes per-fragment lighting is being performed. Bump mapping requires extensions to the OpenGL standard. The theoretical basis of bump mapping is now described with reference to FIG. G4. This approach is common to both of the most common bump mapping methods: the SGI approach and the Blinn approach.

Referring to FIG. G 4, there are illustrated some of the elements employed in bump mapping computations. The illustrated approach is described at depth in the Blinn reference and is briefly summarized herein.

Bump Mapping Background

Bump Mapping is defined as a perturbation of the Normal Vector, $\vec{N}$ resulting in the perturbed Vector $\vec{N}'$ The perturbed vector can be calculated by defining $\vec{V}'_e$ to be the location of a point, $\vec{V}'_e$, after it has been moved ("bumped") a distance h in the direction of the Normal, $\vec{N}$. Define the unit vector in the Normal direction as, $$\hat{N} = \frac{\vec{N}}{\lVert\vec{N}\rVert}$$

Then, $$\vec{V}'_e = \vec{V}_e + h \cdot \hat{N} \quad [1]$$

Then, $$\vec{V}'_e = \vec{V}_e + h \cdot \vec{N} \quad [1]$$

The surface tangents, $\vec{V}s$ and $\vec{V}t$, are defined as the partial derivatives of $\vec{V}$:

$$\vec{V}_s = \frac{\partial \vec{V}_e}{\partial s},\ \vec{V}_t = \frac{\partial \vec{V}_e}{\partial_t}$$

The Normal Vector can be defined as the cross product of the surface tangents:

$$N=V\times V$$

Then the Perturbed Normal can be defined as the cross product of the surface tangents of the bumped point.

$$N'=V\_'\times V. \quad [2]$$

Expanding the partials from [1] gives:

$$\vec{V}'_s = \vec{V}_s + \frac{\partial h}{\partial s}\cdot\hat{N} + h\cdot\frac{\partial \hat{N}}{\partial s}$$

$$\vec{V}'_t = \vec{V}_t + \frac{\partial h}{\partial t}\cdot\hat{N} + h\cdot\frac{\partial \hat{N}}{\partial t}$$

Since $$\frac{\partial \hat{N}}{\partial s} \text{ and } \frac{\partial \hat{N}}{\partial t}$$

are relatively small, they are dropped.

$$\text{Let } h_s = \frac{\partial h}{\partial s} \text{ and } h_t = \frac{\partial h}{\partial t}$$

be defined as Height Gradients. Then, substituting back into [2], $$\vec{N}'=(\vec{V}_s+h_s\cdot\hat{N})\times(\vec{V}_t+h_t\cdot\hat{N})$$

$$=(\vec{V}_s\times\vec{V}_t)+(\vec{V}_s\times h_t\cdot\hat{N})+(h_s\cdot\vec{N}\times\vec{V}_t)+(h_s\cdot\hat{N}\times h_t\cdot\hat{N})$$

Define Basis Vectors:

$$\vec{b}_s=\hat{N}\times\vec{V}_t,\ \vec{b}=\vec{V}_s\times\hat{N} \quad [3]$$

Then, since $\hat{N}\times\hat{N}=0$, $$\hat{N}'=\hat{N}+h_s\cdot\vec{b}_s+h_t\cdot b_t \quad [4]$$

This equation [4] is used to perturb the Normal, $\vec{N}$, given Height Gradients, $h_s$ and $h_t$, and Basis Vectors, $\vec{b}_s$ and $\vec{b}_t$. How the Height Gradients and Basis Vectors are specified depends on the model used.

Basis Vectors

Basis Vectors can be calculated using [5].

$$b_{xs}=\hat{N}_y z_t-\hat{N}_z y_s\ b_{xt}=\hat{N}_z\cdot y_t-\hat{N}_y\cdot z_s$$

$$b_{ys}=\hat{N}_z x_t-\hat{N}_x\cdot z_t\ b_{ys}=\hat{N}_x\cdot z_s-\hat{N}_x\cdot x_s$$

$$b_{zs}=\hat{N}_x\cdot y_t-\hat{N}_v\cdot x_t\ b_{zt}=\hat{N}_v\cdot x_s-\hat{N}_x\cdot y_s \quad [5]$$

This calculation for Basis Vectors is the one proposed by Blinn and requires Surface Tangents, a unit Normal Vector, and a cross product.

From the diagram, if the Surface Tangents are orthogonal, the Basis can be approximated by:

$$b_{xs}=-x_s\ b_{xt}=-x_t$$

$$b_{ys}=-y_s\ b_{yt=-yt}$$

$$b_{zs}=-z_s\ b_{zt}=-z_t$$

Height Gradients

The Height Gradients, $h_s$ and $h_t$, are provided per fragment by in the conventional approaches.

Surface Tangent Generation

The partial derivatives, $$\vec{V}_s = \frac{\partial \vec{V}_e}{\partial s} \text{ and } \vec{V}_e = \frac{\partial \vec{V}_e}{\partial t}$$

are called Surface Tangents. If the user does not provide the Surface Tangents per Vertex, then they need to be generated. The vertices V1 and V2 of a triangle can be described relative to V0 as:

$$\vec{V}_1 = \vec{V}_0 + \frac{\partial \vec{V}_e}{\partial s}\cdot(s_1-s_0) + \frac{\partial \vec{V}_e}{\partial t}\cdot(t_1-t_0)$$

$$\vec{V}_2 = \vec{V}_0 + \frac{\partial \vec{V}_e}{\partial s}\cdot(s_2-s_0) + \frac{\partial \vec{V}_e}{\partial t}\cdot(t_2-t_0)$$

Let $$\hat{V}_1=\vec{V}_1-\vec{V}_0,\ \hat{x}_1=x_1-x_0,\ \hat{y}_1=y_1-y_0,\ \hat{z}_1=z_1-2$$

$$\hat{V}_2=\vec{V}_2-\vec{V}_0,\ \hat{x}_2=x_2-x_0,\ \hat{y}_2=y_2-y_0,\ \hat{z}_2=z_2-2$$

$$\hat{s}_1=s_1-s_0,\ \hat{t}_1=t_1-t_0$$

$$\hat{s}_2=s_2-s_0,\ \hat{t}_2=t_2-t_0$$

Then, $$\hat{V}_1=\vec{V}_s\cdot\hat{s}_1+\vec{V}_t\cdot\hat{t}_1\ \hat{V}_2=\vec{V}_s\cdot\hat{s}_2+\vec{V}_t\cdot\hat{t}_2$$

Solving for the partials:

$$\vec{V}_s = \frac{\hat{V}_1\cdot\hat{t}_2-\hat{V}_2\cdot\hat{t}_1}{\hat{s}_1\cdot\hat{t}_2-\hat{s}_2\cdot\hat{t}_1},\ \vec{V}_t = \frac{\hat{s}_1\cdot\hat{V}_2}{\hat{s}_1\cdot\hat{t}_2} \text{ or } \begin{matrix} \frac{\partial x_B}{\partial s} = \frac{D_{xt}}{D_{st}}, & \frac{\partial x_B}{\partial t} = \frac{D_{sx}}{D_{st}} \\ \frac{\partial y_B}{\partial s} = \frac{D_{yt}}{D_{st}}, & \frac{\partial y_B}{\partial t} = \frac{D_{sy}}{D_{st}} \\ \frac{\partial z_B}{\partial s} = \frac{D_{zt}}{D_{st}}, & \frac{\partial z_B}{\partial t} = \frac{D_{sz}}{D_{st}} \end{matrix}$$

where:

$$D_{ij}=\hat{\imath}_1\hat{\jmath}_2-\hat{\imath}_2\hat{\jmath}_1$$

Figure 5:
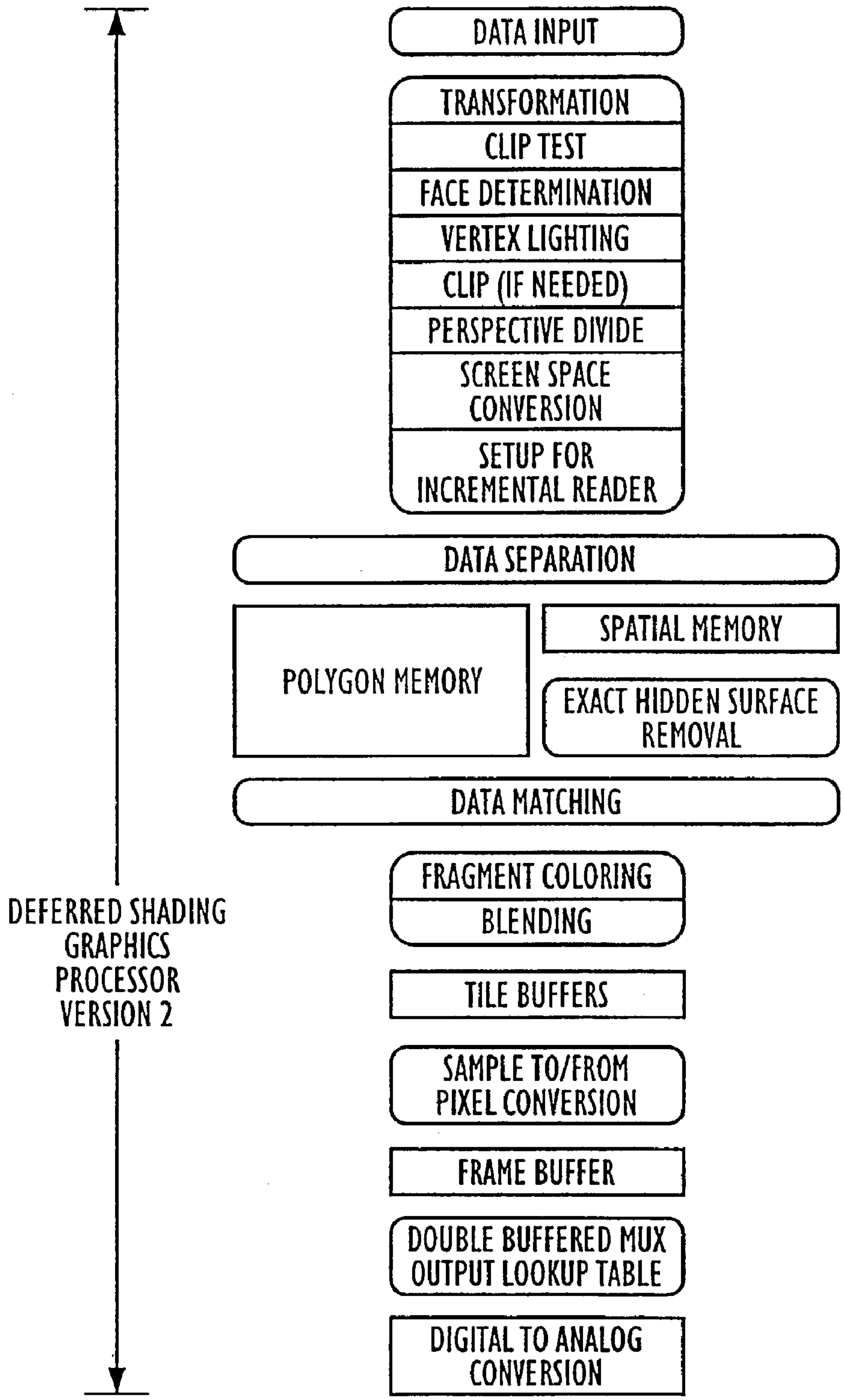
FIG. 5 is a diagrammatic illustration showing a second embodiment of the inventive 3-Dimensional Deferred Shading Graphics Pipeline.

Two different conventional approaches to implementing bump mapping in accordance with the preceding description are now described with reference to FIGS. 5 A, 5 B, 6 A and 6B.

SGI Bump Mapping

Referring to FIG. G 5A, there is shown a functional flow diagram illustrating a bump mapping approach proposed by Silicon Graphics (SGI). The functional blocks include: "compute perturbed normal" SGI10, "store texture map" SGI12, "perform lighting computations" SGI14 and "transform eye space to tangent space" SGI16. In the typical embodiment of this approach the steps SGI10 and SGI12 are performed in software and the steps SGI14 and SGI16 are performed in 3D graphics hardware. In particular, the step SGI16 is performed using the same hardware that is optimized to perform Phong shading. The SGI approach is documented in the Peercy reference.

A key aspect of the SGI approach is that all lighting and bump mapping computations are performed in tangent space, which is a space defined for each surface/object by orthonormal vectors comprising a unit surface normal (N) and two unit surface tangents (T and B). The basis vectors could be explicitly defined at each vertex by an application program or could be derived by the graphics processor from a reference frame that is local to each object. However the tangent space is defined, the components of the basis vectors are given in eye space. A standard theorem from linear algebra states that the matrix used to transform from coordinate system A (e.g., eye space) to system B (e.g., tangent space) can be formed from the coordinates of the basis vectors of system B in system A. Consequently, a matrix M whose columns comprise the basis vectors N, T and B represented in eye space coordinates can be used to transform eye space vectors into corresponding tangent space vectors. As described below, this transformation is used in the SGI pipeline to enable the lighting and bump mapping computations to be done in tangent space.

The elements employed in the illustrated SGI approach include the following:

- u one coordinate of tangent space in plane of surface
- v one coordinate of tangent space in plane of surface
- N surface normal at each vertex of a fragment to be illuminated;
- $P_u$ surface tangent along the u axis at each vertex of a fragment to be illuminated;
- $P_v$ surface tangent along the v axis at each vertex of a fragment to be illuminated;
- $f_u$(u,v) partial derivative along the u axis of the input texture map computed at each point of the texture map (NOTE: according to the OpenGL standard, an input texture map is a 1, 2 or 3-dimensional array of values f(u,v) that define a height field in (u,v) space. In the SGI approach this height field is converted to a collection of partial derivatives $f_u$(u,v), $f_v$(u,v) that gives the gradient in two directions (u and v) for each point of the height field);
- $f_v$(u,v) partial derivative along the v axis of the input texture map computed at each point of the texture map (see discussion of $f_v$(u,v));
- L light vector in eye space;
- H half angle vector in eye space;
- $L_{TS}$ light vector in tangent space;
- $H_{TS}$ half angle vector in tangent space;
- T unit surface tangent along $P_u$;
- B unit surface binormal, defined as the cross product of N and T.

Note: the preceding discussion uses notation from the Peercy paper, other portions of this application (e.g., the remainder of the background and the detailed description) use different notation for similar parameters. The correspondence between the two systems is shown below, with the Peercy notation listed under the column labelled "SGI" and the other notation listed under the column labelled "Raycer".

| SGI | Raycer |
|---|---|
| N | N |
| L | L |
| H | H |
| u | s |
| v | t |
| $\partial h/\partial s$ | $f_u(u,v)$ |
| $\partial h/\partial t$ | $f_v(u,v)$ |
| $P_u$ | $V_s$ |
| $P_v$ | $V_t$ |
| T | T |
| B | B |

In the SGI approach an input texture map comprising a set of partial derivatives $f_u$(u,v), $f_u$(u,v) is used in combination with the surface normal (N) and tangents ($P_u$, $P_v$) and basis vectors B and T to compute the perturbed normal in tangent space ($N'_{TS}$) at each point of the height field according to the following equations (step SGI10):

$$N'_{TS}=(a,b,c)/\sqrt{a^2+b^2+c^2}$$

where:

$$a=-f_u(B\cdot P_v)$$

$$b=-f_v|P_u|-f_u(T\cdot P_v)$$

$$c=|P_u\times P_v|$$

The coefficients a, b and c are the unnormalized components of the perturbed normal $N'_{TS}$ in tangent space (i.e., the coefficient c is in the normal direction and the coefficients a and b represent perturbations to the normal in the u and v directions). In step (SGI12) these coefficients are stored as a texture map TMAP, which is provided to the SGI 3D hardware in a format specified by an appropriate API (e.g, OpenGL).

Using the linear algebra theorem mentioned above, the light and half angle vectors (L, H) are transformed to the tangent space using a matrix M (shown below) whose columns comprise the eye space (i.e, x, y and z) coordinates of the tangent, binormal and normal (T, B, N) (SGI16):

$$M=\begin{vmatrix} T_x & B_x & N_x \\ T_y & B_y & N_y \\ T_z & B_z & N_z \end{vmatrix}$$

Thus, the vectors $L_{TS}$ and $H_{TS}$ are computed as follows:

$$L_{TS}=L\cdot M$$

$$H_{TS}=H\cdot M$$

The resulting tangent space versions $L_{TS}$ and $H_{TS}$ of the light and half angle vectors are output to the Phong lighting and bump mapping step (SGI14) along with the input normal N and the texture map TMAP. In the Phong lighting and bump mapping step (SGI14) the graphics hardware performs all lighting computations in tangent space using the tangent space vectors previously described. In particular, if bump mapping is required the SGI system employs the perturbed vector $N'_{TS}$ (represented by the texture map TMAP components) in the lighting computations. Otherwise, the SGI system employs the input surface normal N in the lighting computations. Among other things, the step SGI14 involves:

1. interpolating the $N'_{TS}$, $L_{TS}$, $H_{TS}$ and $N_{TS}$ vectors for each pixel for which illumination is calculated;
2. normalizing the interpolated vectors;
3. performing the illumination computations.

A disadvantage of the SGI approach is that it requires a large amount of unnecessary information to be computed (e.g., for vertices associated with pixels that are not visible in the final graphics image). This information includes:

$N'_{TS}$ for each vertex of each surface;

$L_{TS}$ for each vertex of each surface;

$H_{TS}$ for each vertex of each surface.

The SGI approach requires extension to the OpenGL specification. In particular, extensions are required to support the novel texture map representation. These extensions are defined in: SGI OpenGL extension: SGIX_fragment_lighting_space, which is incorporated herein by reference.

FIG. G 5B shows a hypothetical hardware implementation of the SGI bump mapping/Phong shading approach that is proposed in the Peercy reference. In this system note that the surface normal N and transformed light and Half-angle vectors $L_{TS}$, $H_{TS}$ are interpolated at the input of the block SGI14. The $L_{TS}$ and $H_{TS}$ interpolations could be done multiple times, once for each of the active lights. The switch S is used to select the perturbed normal $N'_{TS}$ when bump mapping is in effect or the unperturbed surface normal N when bump mapping is not in effect. The resulting normal and interpolated light and half-angle vectors are then normalized and the normalized resulting normalized vectors are input to the illumination computation, which outputs a corresponding pixel value.

Problems with SGI bump mapping include:

1. The cost of transforming the L and H vectors to tangent space, which increases with the number of lights in the lighting computation;
2. It is only suited for use in 3D graphics pipelines where most graphics processing (e.g., lighting and bump mapping) is performed fragment by fragment; in other embodiments, where fragments are processed in parallel, the amount of data that would need to be stored to allow the bump mapping computations to be performed would be prohibitive;
3. Interpolating in the lighting hardware, which is a time consuming operation that also requires all vertex information to be available (this is not possible in a deferred shading environment); and
4. Interpolating whole vectors (e.g., $L_{TS}$, $H_{TS}$) results in approximation errors that result in visual artifacts in the final image.

"Blinn" Bump Mapping

Referring to FIG. G 6A, there is shown a functional flow diagram illustrating the Blinn bump mapping approach. The functional blocks include: generate gradients B10, "compute perturbed normal" B12 and "perform lighting computations" B14. In the typical embodiment of this approach the step B10 is performed in software and the steps B12 and B14 are performed in dedicated bump mapping hardware. The Blinn approach is described in the Blinn and Peercy references.

The elements employed in the illustrated Blinn approach include the following:

s one coordinate of bump space grid t one coordinate of bump space grid

N surface normal at each vertex of a fragment to be illuminated;

$v_s$ surface tangent along the s axis at each vertex of a fragment to be illuminated;

$v_t$ surface tangent along the t axis at each vertex of a fragment to be illuminated;

$h_s(s,t)$ partial derivative along the s axis of the bump height field computed at each point of the height field (NOTE: according to the OpenGL standard, an input texture map is a 1, 2 or 3-dimensional array of values h(s,t) that define a height field in (s,t) space. The API converts this height field to a collection of partial derivatives $h_s(s,t)$, $h_t(s,t)$ that gives the gradient in two directions (s and t) at each point of the height field);

$h_t(s,t)$ partial derivative along the t axis of the bump height field computed at each point of the texture map (see discussion of $h_s(s,t)$);

L light vector in eye space;

H half angle vector in eye space;

$b_s$ basis vector enabling bump gradients $h_s$ to be mapped to eye space;

$b_t$ basis vector enabling bump gradients $h_t$ to be mapped to eye space.

The Blinn approach presumes that a texture to be applied to a surface is initially defined by a height field h(s, t). The Blinn approach does not directly use this height field, but requires that the texture map representing the height field be provided by the API as a set of gradients $h_s(s, t)$ and $h_t(s, t)$ (SGI10). That is, rather than providing the perturbed normal N' (as in the SGI approach), the Blinn texture map provides two scalar values $h_s$, h that represent offsets/perturbations to the normal. For the offsets to be applied to the normal N two basis vectors $b_s$ and $b_t$ are needed that define (in eye space) the reference frame in which the offsets are provided. The two possible sources of these vectors are:

1) Provision of the vectors by the user.
2) Automatic generation by the graphics hardware by forming partial derivatives of the per-vertex texture coordinates with respect to eye space. The justification for this definition can be found in the Watt reference.

In step (B12) the Blinn bump mapping approach perturbs the Normal vector N according to the following equation:

$$N\vec{N}' = \vec{N} + h_s \cdot \vec{b}_s + h_t \cdot \vec{b}_t$$

where $h_s$ and $h_t$ are the height gradients read from texture memory and $\vec{b}_s$ and $\vec{b}_t$ are the basis vectors. See the Watt reference for a derivation of this equation, including derivation of the basis vectors $b_s$ and $b_t$. Computation of the perturbed normal includes:

1. interpolation of elements ($-V_t \times N$, $-N \times V_s$, $V_s \times V_t$) used to compute the perturbed normal N';
2. computation of the perturbed normal N' using the interpolated elements.

Once the perturbed normal N' has been computed the graphics hardware performs the lighting computations (B14). Functions performed in the step B14 include:

1. interpolation of the L and H vectors;
2. normalization of the perturbed normal N' and the L and H vectors; and
3. lighting computations.

FIG. G 6B shows a hypothetical hardware implementation of the Blinn bump mapping approach that is proposed in the Peercy reference. In this system note that the multiple vector cross-products that must be computed and the required number of interpolations and normalizations. The extra operations are required in the Blinn approach to derive the basis vectors at each pixel (i.e., for each illumination calculation). Moreover, the three interpolation operations applied to the cross-products $(B_t \times N)$, $(N \times B_s)$, $(N_s \times B)$ are required to be wide floating point operations (i.e., 32 bit operations) due to the possible large range of the cross-product values.

Summary of Tangent Space Lighting in a Deferred Shading Architecture

The invention provides structure and method for performing lighting in a graphics processor. In one aspect the invention specifcially provides structure and method for performing tangent space lighting in a deferred shading architecture. Embodiments of the invention may also provide variable scale bump mapping, automatic basis generation, automatic gradient-field generation, normal interpolation by doing angle and magnitude computations separately.

In one embodiment, the invention provides a bump mapping method for use in a deferred graphics pipeline processor comprising: receiving for a pixel fragment associated with a surface for which bump effects are to be computed: a surface tangent, binormal and normal defining a tangent space relative to the surface associated with the fragment; and a texture vector representing perturbations to the surface normal in the directions of the surface tangent and binormal caused by the bump effects at the surface position associated with the pixel fragment; computing a set of basis vectors from the surface tangent, binormal and normal that define a transformation from the tangent space to eye space in view of the orientation of the texture vector; computing a perturbed, eye space, surface normal reflecting the bump effects by performing a matrix multiplication in which the texture vector is multiplied by a transformation matrix whose columns comprise the basis vectors, giving a result that is the perturbed, eye space, surface normal; and performing lighting computations for the pixel fragment using the perturbed, eye space, surface normal, giving an apparent color for the pixel fragment that accounts for the bump effects without needing to interpolate and translate light and half-angle vectors (L and H) used in the lighting computations.

In another embodiment automatic basis or vector generation is provided. A variable scale bump mapping method for shading a computer graphics image, the method comprising steps of: receiving for a vertex of polygon associated with a surface to which bump effects are to be mapped geometry vectors $(V_s, V_t, N)$ and a texture vector (Tb); separating the geometry vectors into unit basis vectors $(\bar{b}_s, \bar{b}_t, n)$ and magnitudes $(m_{bs}, m_{bt}, m_{bn})$; multiplying the magnitudes and the texture vector to form a texture-magnitude vector (mTb'); scaling components of the texture-magnitude vector by a vector s to form a scaled texture-magnitude vector (mTb"); and multiplying the scaled texture-magnitude vector and the unit basis vectors to provide a perturbed unit normal (N') in eye space for a pixel location, whereby the need to specify surface tangents and binormal at the pixel location to perform lighting computations to give the pixel fragment bump effects is eliminated.

In another embodiment, this method is further defined such that the step of multiplying the magnitudes and the texture-magnitude vector produces a transformation matrix, which enables fixed point multiplication hardware to be used. In another embodiment, this method is further defined such that the step of multiplying the magnitudes and the texture-magnitude vector produces a transformation matrix that defines a transformation from different tangent space coordinates systems to an eye space coordinate system. In still another variation, this method is performed such that the different tangent space coordinates systems are selected from known coordinate systems, including from the Blinn coordinate system.

In another embodiment, the invention provides automatic gradient field generation. One embodiment of this provides a variable scale bump mapping method for shading a computer graphics image, the method comprising steps of: receiving a gray scale image for which bump effects are to be computed; taking a derivative relative to a gray scale intensity for a pixel fragment associated with the gray scale image; and computing from the derivative a perturbed unit normal in eye space to give the pixel fragment bump effects. This method may also optionally include the step of computing from the derivative a perturbed unit normal in eye space comprises the step of forming a transformation matrix that defines a transformation of the derivative of the gray scale intensity to an eye space coordinate system.

In another embodiment of the invention, structure and method for performing normal interpolation by doing angle and magnitude computations separately are provided. In one particular embodiment of this method, the method for bump mapping for shading a computer graphics image, comprises: receiving for a pixel fragment associated with a surface for which bump effects are to be computed: a magnitude vector (m), and a bump vector (Tb); and a unit transformation matrix (M); multiplying the magnitude vector and the bump vector to form a texture-magnitude vector (mTb'); scaling components of the texture-magnitude vector by a vector s to form a scaled texture-magnitude vector (mTb"); multiplying the scaled texture-magnitude vector and the unit transformation matrix to provide a perturbed normal (N'); re-scaling components of the perturbed normal to form rescaled vector (N"); and normalizing the rescaled vector to provide a unit perturbed normal that is used to perform lighting computations to give the pixel fragment bump effects.

In a variation of this method, the step of scaling the components of the texture-magnitude vector comprises the step of selecting the scalars so the resulting matrix can be represented as a fixed-point vector. In another variation of this method, the vector s comprises scalars $(s_s, s_t, s_n)$, and wherein the step of scaling the components of the texture-magnitude vector comprises the step of multiplying texture-magnitude vector comprising s as follows: $mTb" = (s_s \times m_{bs} h_s, s_t \times m_{bt} h_t, s_n \times m_n k_n)$. In yet another variation of this method, the unit transformation matrix also comprises fixed-point values, and wherein the step of multiplying the scaled texture-magnitude vector and the unit transformation matrix comprises the step of multiplying using fixed-point multiplication hardware. In a further variation of this method, the step of re-scaling components of the perturbed normal comprises the step of multiplying by a reciprocal of vector s $(1/(s_s, s_t, s_n))$ to re-establish a correct relationship between their values.

Other aspects and embodiments of the inventive structure and method are described in the remainder of the specification and in the drawings.

Embodiments

The Phong Block calculates the color of a fragment by combining the color, material, geometric, and lighting information from the Fragment Block with the texture information from the Texture Block. The result is a colored fragment that is forwarded to the Pixel Block where it is blended with any color information already residing in the frame buffer.

Note that Phong does not care about the concepts of frames, tiles, or screen-space.

In accordance with the present invention the Phong Block embodies a number of features for performing tangent space lighting in a deferred shading environment. These features include:

- performing bump mapping in eye space using bump maps represented in tangent space;
- supporting tangent space bump maps without needing to interpolate and translate light and half-angle vectors (L and H) used in the lighting computation;
- performing bump mapping using matrix multiplication;
- performing bump mapping using a fixed point matrix of basis vectors derived by separating each basis vector into a unit vector and a magnitude and combining the magnitudes with respective tangent space bump map components;
- performing bump mapping using fixed point matrix multiplication using the fixed point matrix of basis vectors and a fixed point vector of tangent space bump map components derived by scaling each bump map component by a respective scale factor;
- using the Phong lighting matrix to perform bump mapping calculations;
- compatibility with tangent space bump maps provided in a variety of API formats, including Blinn, SGI and 3D Studio Max;
- deriving the basis vectors differently depending on the format of the provided bump map so the same matrix multiplication can be used to perform bump mapping regardless of the API format of the bump map;
- performing lighting and bump mapping without interpolating partials, normals or basis vectors;
- hardware implementation of Blinn bump mapping;

One feature of the Phong block 14000 is that it does not interpolate partials or normals. Instead, these interpolations are done in the Fragment block 11000, which passes the interpolated results to Phong. The method by which Fragment 11000 performs these interpolations is described above; however, features of this method and its advantages are briefly recited herein:

- Fragment does not interpolate partials or normals of arbitrary magnitude;
- Instead, per-vertex partials and normals are provided to Fragment as unit vectors and associated magnitudes, which Fragment separately interpolates (see discussion above of barycentric interpolation for triangles and other inventive interpolation methods performed by Fragment);
- Fragment normalizes the interpolated partial and normal unit vectors and passes the results to Phong as the fragment unit normals and partials;
- Fragment passes the interpolated magnitudes to Phong as the magnitudes associated with the fragment unit normals and partials;
- Phong performs bump and lighting calculations using the interpolated unit vectors and associated magnitudes.

Another feature of the Phong block 14000 is that it does not interpolate L or H vectors. Instead, Phong receives from the Fragment block 11000 a unit light vector PI and a unit fragment vector V, both defined in eye space coordinates. Phong derives the light vector L without interpolation b y subtracting V from P1. Phong is then able to derive the half-angle vector H from the light vector and a known eye vector E.

Compared to the prior art, advantages of the inventive system for performing tangent space lighting in a deferred shading architecture include:

- lack of distortions due to surface parametrization caused in prior art by interpolation of vectors (i.e., partials, normals, L, H, N) of arbitrary magnitude;
- lack of approximation errors due to triangulation (size of triangles) caused in prior art by interpolation of L and H vectors, especially for local lights;
- reduction of calculations required in the prior art to transform L and H vectors from eye space to tangent space, especially for multiple lights;
- simplification of Phong hardware as a result of recasting the matrix multiplication as multiplication of a fixed point matrix and a fixed point vector;
- efficient use of Phong hardware to perform both lighting calculations and bump mapping in eye space even when the bump maps are defined in tangent space;
- simplification of Phong hardware as a result of eliminating the need to perform vector interpolation in Phong.

Various features of the present invention are now described, first in summary and then at an appropriate higher level of detail.

Color Index Mode

Texture and fragment lighting operations do not take place in color index mode. In this mode the only calculations performed by the Phong Block are the fog calculations. In this case the mantissa of the R value of the incoming fragment color is interpreted as an 8-bit color index varying from 0 to 255, and is routed directly to the fog block for processing.

Pipeline Position

Referring to FIG. G 34, there is shown a block diagram illustrating Phong's position in the pipeline and relationship to adjacent blocks. The Phong Block 14000 is located after Texture 12000 and before Pixel 15000. It receives data from both Texture and Fragment 11000. Fragment sends per-fragment data as well as cache fill data that are passed through from mode injection. Texture sends only texel data 120001*a*. In the illustrated DSGP the data from Fragment 11000 include: stamp x, y 14001*a*; RGBA diffuse data 14001*b*; RGBA spectral data 14001*c*; surface normals 14001*d*; bump basis vectors 14001*e*; eye coordinates 14001*f*; light cache index 14001*g*; and material cache index 14001*h*.

Only the results 14002 produced by Phong are sent to Pixel 15000; all other data 15002 required by Pixel 15000 comes via a separate data path. The Phong Block has two internal caches: the "light" cache 14154, which holds infrequently changing information such as scene lights and global rendering modes, and the "material" cache 14150, which holds information that generally changes on a per-object basis.

Phong Computational Blocks

The Phong procedure is composed of several sub-computations, or blocks, which are summarized here. Pseudocode along with details of required data and state information are described later in this specification. FIG. G 36 shows a block diagram of Phong 14000, showing the various Phong computations.

Texture Computation

Texture computation 14114 accepts incoming texels 14102 from the Texture Block and texture mode information 14151 a from the material cache 14150. This computation applies the texture-environment calculation and merges multiple textures if present. The result is forwarded to the Light-environment subunit 14142 in the case of the conventional use of textures, or to other subunits, such as Bump 14130, in case the texture is to be interpreted as modifying some parameter of the Phong calculation other than color.

Material Computation/Selection

Material computation 14126 determines the source of the material values for the lighting computation. Inputs to Material computation 14126 include material texture values from Texture 14114, fragment material values 14108 from Fragment and a primary color 14106 originating in the Gouraud calculation. Using current material mode bits from the material cache 14150 the Material computation may decide to replace the fragment material 14126 with the texture values 14114 or with the incoming primary color 14106.

Bump Computation

Bump computation 14130 determines the surface normal to be used in the lighting calculation. Inputs to Bump include bump texture information 14122 from Texture 14114 and the surface normal, tangent and binormal 14110 from Fragment 11000. The Bump computation 14130 may simply pass through the normal as interpolated by Fragment, or may use a texel value 14122 in a calculation that involves a 3×3 matrix multiply.

Light-Texture Computation

Inputs to Light-Texture computation 14134 include light texture information 14118 from the Texture computation 14114 and the fragment light information 14112 from Fragment. Light-Texture computation 14134 decides whether any of the components of the lights 14112 should be replaced by a texel 14118.

Fragment Lighting Computation

Fragment lighting computation 14138 performs the actual lighting calculation for this fragment using an equation similar to that used for per-vertex lighting in the GEO block. This equation has been discussed in detail in the Background section. Inputs to Fragment Lighting include material data 14128 from Material selection 14126, surface normal from Bump 14130 and light data from 14136 from Light-Texture 14134.

Light Environment Computation

Light environment computation 14142 blends the result 14410 of the fragment lighting computation with the texture color 14118 forwarded from the Texture Block.

Fog Computation

Fog computation 14146 applies "fog"; modifies the fragment color 14144 using a computation that depends only on the distance from the viewer's eye to the fragment. the final result 14148 from Fog computation 14146 is forwarded to the Pixel Block.

Phong Hardware Details

The previous section has generally described the blocks composing the Phong computation and the data used and generated by those sub-blocks. The blocks can be implemented in hardware or software that meets the requirements of the preceding general description and subsequent detailed descriptions. Similarly, data can be transferred between the Phong blocks and the external units (i.e., Texture, Fragment and Pixel) and among the Phong blocks using a variety of implementations capable of satisfying Phong I/O requirements. While all of these alternative embodiments are within the scope of the present invention, a description is now provided of one preferred embodiment where the Phong blocks are implemented in hardware and data is transferred between top-level units (i.e., Texture, Fragment, Phong and Pixel) using packets. The content of the I/O packets is described first.

I/O Packets

Referring to FIG. G 35, there is shown a block diagram illustrating packets exchanged between Phong 14000, Fragment 11000, Texture 12000 and Pixel 15000 in one embodiment. The packets include:

- a half-rate fragment packet 11902;
- a full-rate fragment packet 11904;
- a material cache miss packet 11906 (from MIJ, relayed by Fragment);
- a light cache mss packet 11908 (from MIJ, relayed by Fragment);
- texture packets, or texels, 12902;
- a pixel output packet 14902.

Each of these packets is now described.

Input Packets From Fragment

The Phong block 14000 receives packets 11902, 11904 from the Fragment block 11000 containing information that changes per-fragment that cannot be cached. Generally, a packet from the Fragment 11000 contains for one fragment:

- pointers to cached information related to lighting and material associated with the fragment;
- one or more color values;
- fragment geometry data (fragment normal and, optionally, tangent and binormal); and
- optionally, eye coordinates for the lighting equation.

In the illustrated embodiment the information from Fragment 11000 is provided as full rate and half rate packets 11904, 11902. Each full-rate packet 11904 includes a reduced set of fragment information that is used by Phong to perform a simplified lighting computation that can be performed at the full DSGP cycle rate in a "full performance mode". Each half rate packet 11902 includes a full set of fragment information that is used by Phong to perform a full lighting computation at the half cycle rate. This distinction between full and half rate information is not an essential feature of the present invention but is useful in hardware and software implementations where it would not be possible to perform the full lighting computation at the half cycle rate. In such an implementation this distinction conserves bandwidth required for communications between the Phong and Fragment units. Specific embodiments of full and half rate Fragment packets are now described.

Full Rate Packet from Fragment

In the full-performance mode, an "infinite viewer" condition is assumed in which:

- the viewer's position is characterized by a direction that is implicit in the definition of the eye coordinate system,
- the lights are at infinity,
- only a single texture can be used, and
- the single texture is not a bump map.

In this case the only data that varies per fragment is the surface normal direction and the Gouraud colors produced by the geometry engine.

In one embodiment, to reduce bandwidth and input queue size per-stamp information is shared among all the pixels of a visible stamp portion. This allows Fragment 11000 to send only one full-rate packet 11904 per VSP that also applies to up to four fragments composing the VSP). In this case, Phong needs to be told how many fragments make up the stamp, but has no need to know the screen space coordinates of the fragment.

In view of these aspects of the full performance mode, among other parameters, the full-rate packet 11904 provides:

- information applicable to the stamp as a whole:
  - the number of fragments in a stamp whose information is provided in the full-rate packet;
  - indices into the material and light caches 14001*g*, 14001*h* (FIG. G 34) applicable to the fragments described by the full-rate packet;
- information for each fragment in the stamp:
  - the fragment's unit normal 14001*d* (FIG. G 34); and
  - the fragment's primary and secondary color.

One embodiment of a full-rate packet 11904 from Fragment is described in Table P1. This table lists for each data item in the packet: item name; bits per item; number of item in packet; bits per packet used for the item; bytes per packet used for the item; shared factor; and bytes per fragment used for the item.

A key subset of the parameters/data items recited in Table P1 are defined below, in the section of the document entitled "Phong Parameter Descriptions". This full-rate packet embodiment is merely exemplary and is not to be construed to limit the present invention.

At the bottom of the table is an estimate of the bandwidth required to transfer the full-rate packets (3,812.50 M bytes per second) shown in Table P1 assuming the DSGP processes 250.00M fragments per second.

Half Rate Packet from Fragment

At half-rate the illustrated Phong embodiment can perform bump mapping and local viewer (i.e., variable eye position) operations. An additional difference over the full-rate operations is that the normal provided by the Fragment block for these operations is not required to be of unit magnitude.

As a result of these differences, in addition to the information provided in the full-rate packet 11904, the half-rate packet 11902 provides for each fragment in a stamp: normal unit vector and associated magnitude 14001*d* (FIG. G 34); surface tangent unit vector and associated magnitude (part of bump basis 14001*e*, FIG. G 34); surface binormal unit vector and associate magnitude (part of bump basis 14001*e*, FIG. G 34); eye coordinates 14001*f*.

As with the full-rate embodiment described above, Fragment 11000 can send one half-rate packet 11902 per VSP that also applies to up to four fragments composing the VSP.

One embodiment of a half-rate packet 11902 from Fragment is described in Table P2. A key subset of the parameters/data items recited in Table P2 are defined below, in the section of the document entitled "Phong Parameter Descriptions". This half-rate packet embodiment is merely exemplary and is not to be construed to limit the present invention.

At the bottom of the table is an estimate of the bandwidth required to transfer the half-rate packets (5,718.75 M bytes per second) of Table P2 assuming the DSGP processes 250.00M fragments per second.

Material Cache Miss Packet from Mode Injection

Figure 34:
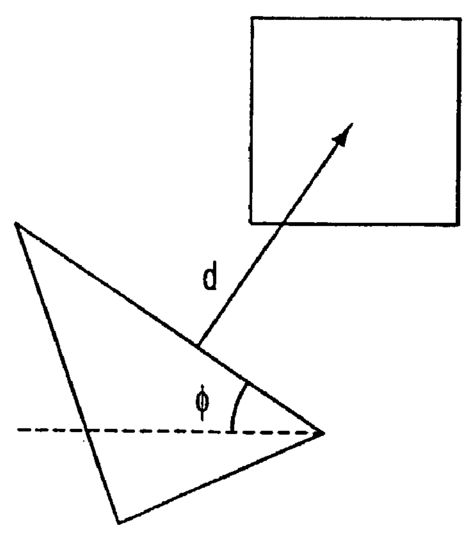
FIG. 34 is a diagrammatic illustration showing aspects of the touched tile calculation procedure.
Figure 35A:
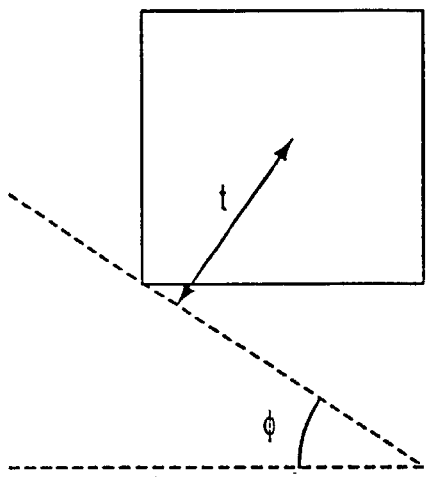
FIGS. 35 A and 35 B are diagrammatic illustrations showing aspects of the threshold distance calculation in the touched tile procedure.
Figure 35B:
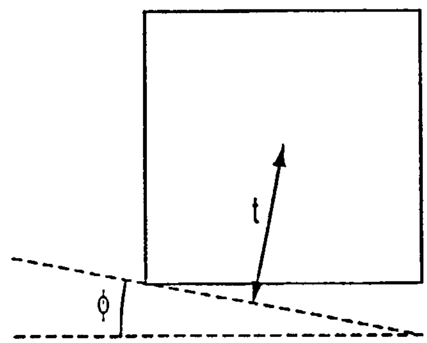
Figure 36A:
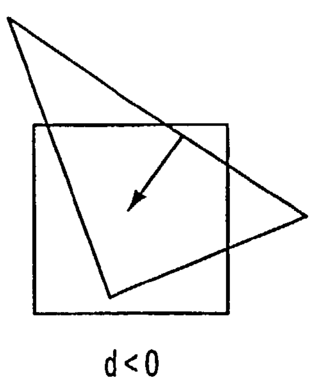
FIG. 36 A is a diagrammatic illustration showing a first relationship between positions of the tile and the triangle for particular relationships between the perpendicular vector and the threshold distance.
Figure 36B:
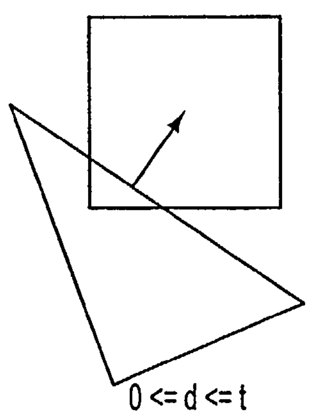
Figure 36C:
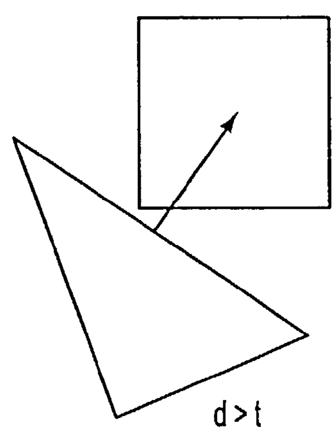
Figure 37:
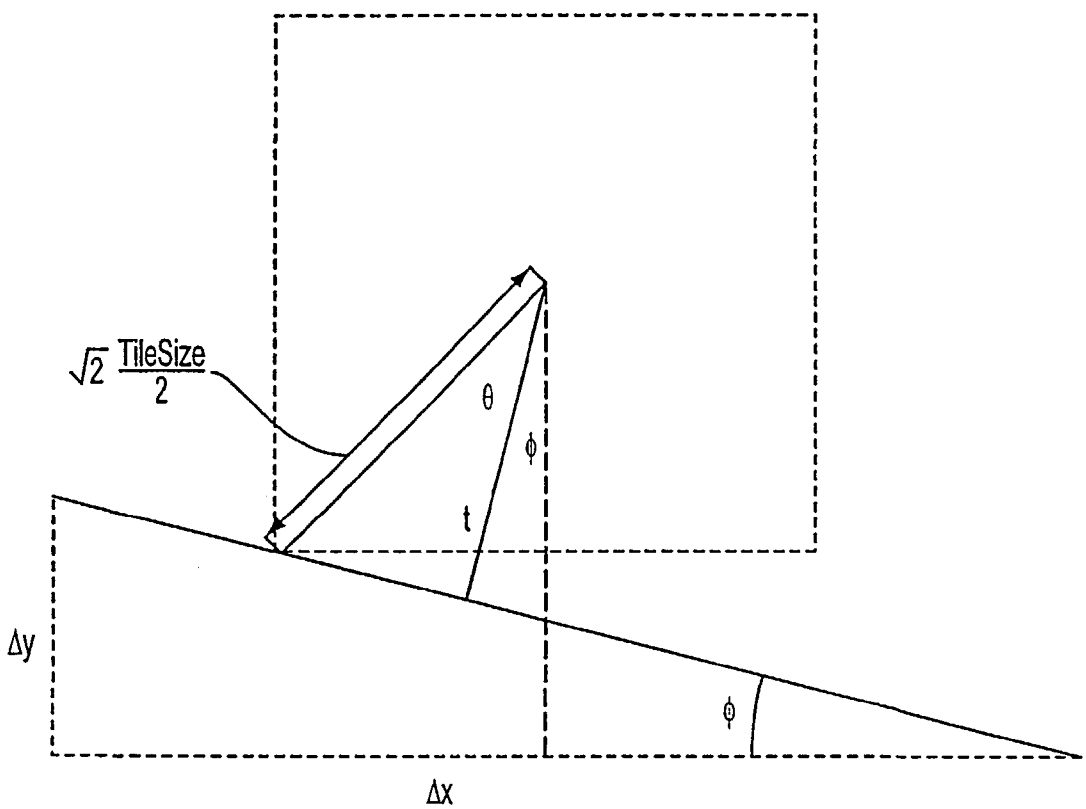
FIG. 37 is a diagrammatic illustration showing elements of the threshold distance determination including the relationship between the angle of the line with respect to one of the sides of the tile.
Figure 38A:
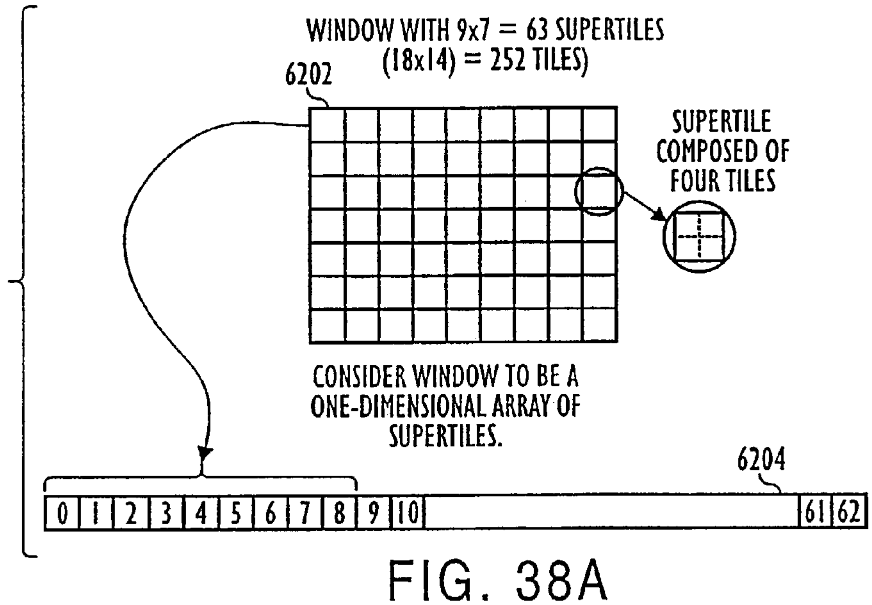
FIG. 38 A is a diagrammatic illustration showing an exemplary embodiment of the SuperTile Hop procedure sequence for a window having 252 tiles in an 18×14 array.
Figure 38B:
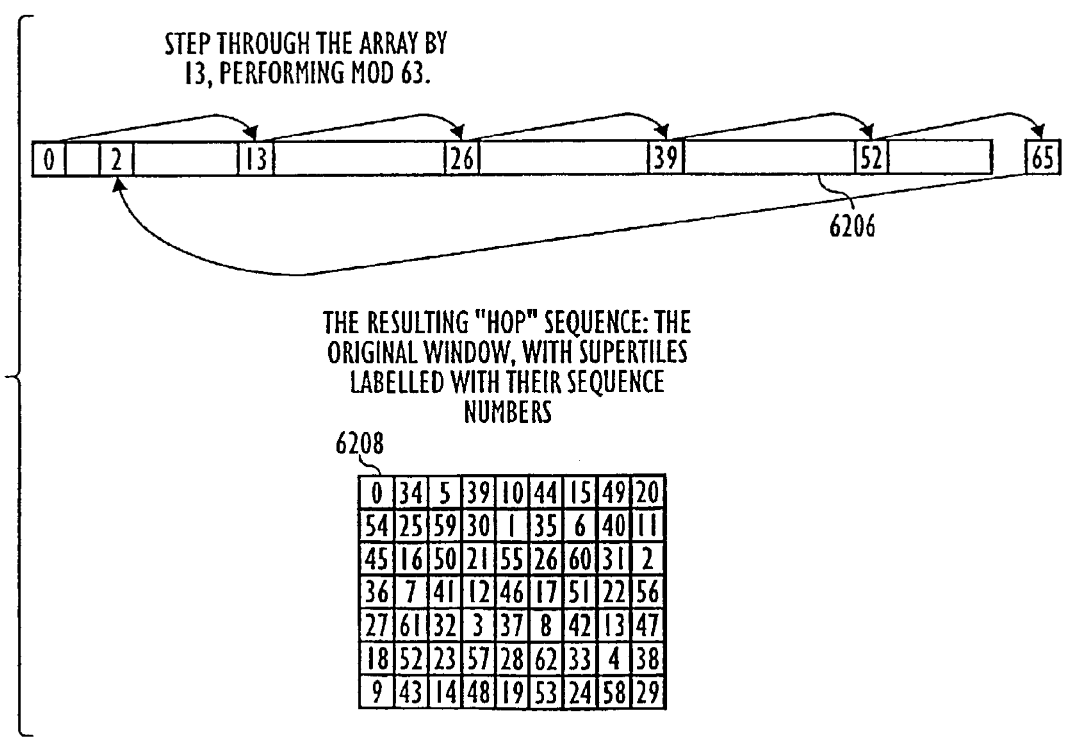
Figure 39:
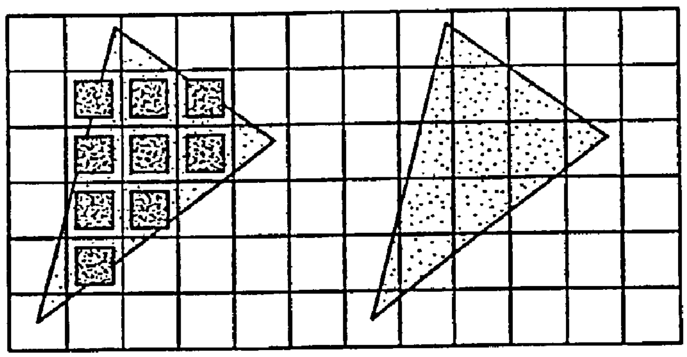
FIG. 39 is a diagrammatic illustration showing DSGP triangles arriving at the STP Block and which can be rendered in the aliased or anti-aliased mode.
Figure 40A:
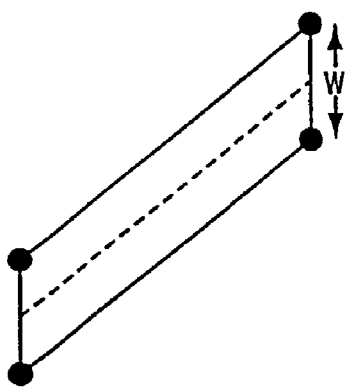
FIG. 40 is a diagrammatic illustration showing the manner in which DSGP renders lines by converting them into quads and various quads generated for the drawing of aliased and anti-aliased lines of various orientations.
Figure 40B:
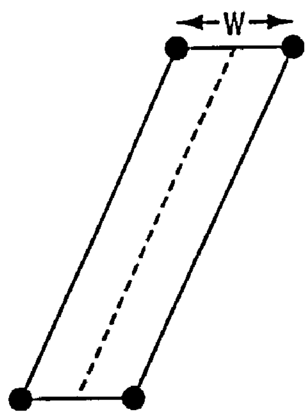
Figure 40C:
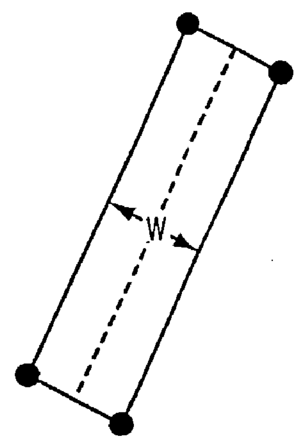
Figure 41A:
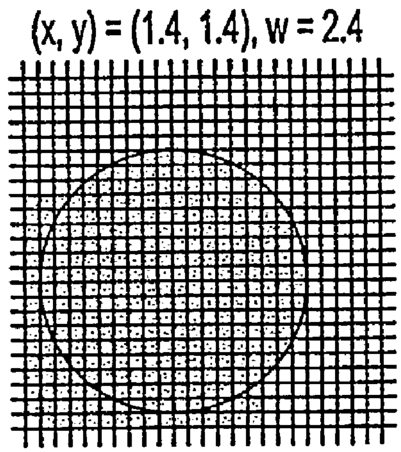
FIG. 41 is a diagrammatic illustration showing the manner in which the user specified point is adjusted to the rendered point in the Geometry Unit.
Figure 41B:
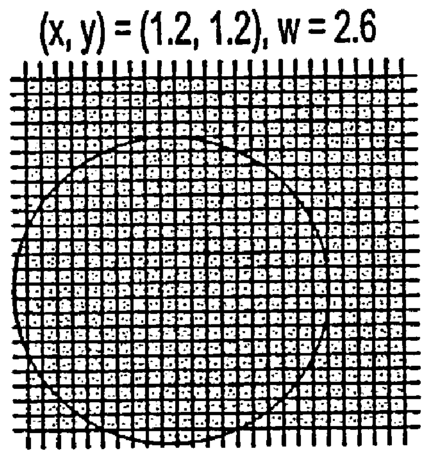
Figure 42A:
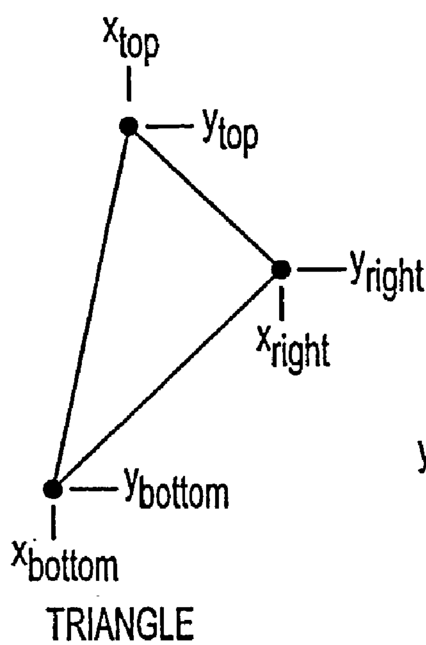
FIG. 42 is a diagrammatic illustration showing the manner in which anti-aliased line segments are converted into a rectangle in the CUL unit scan converter that rasterizes the parallelograms and triangles uniformly.
Figure 42B:
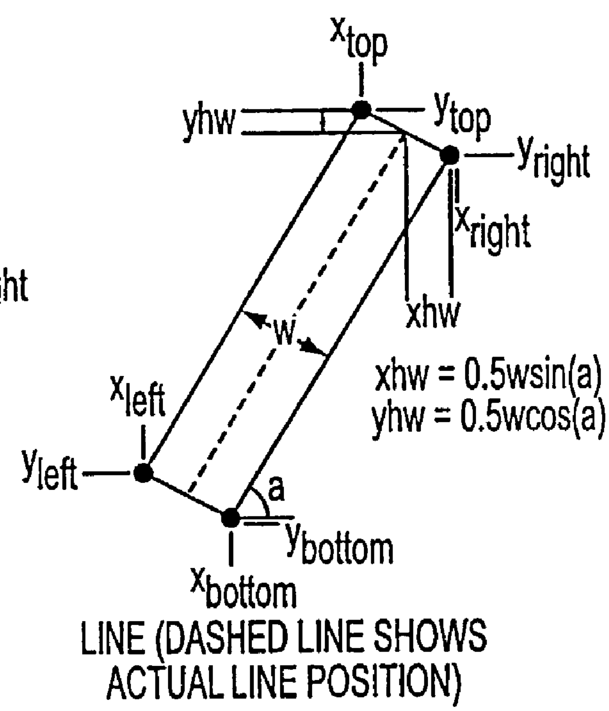
Figure 43A:
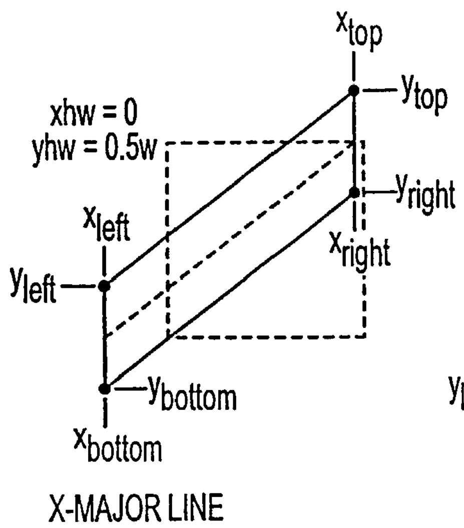
FIG. 43 is a diagrammatic illustration showing the manner in which the end points of aliased lines are computed using a parallelogram, as compared to a rectangle in the case of anti-aliased lines.
Figure 43B:
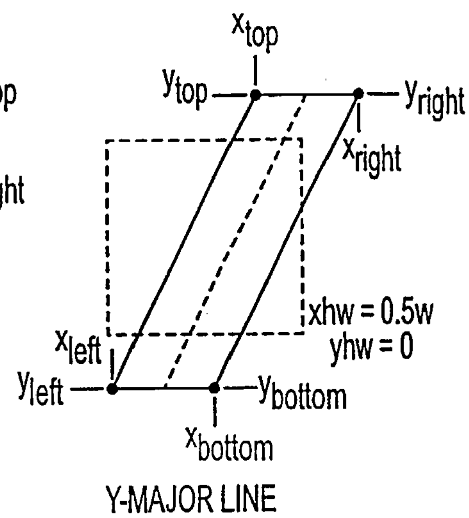
Figure 44:
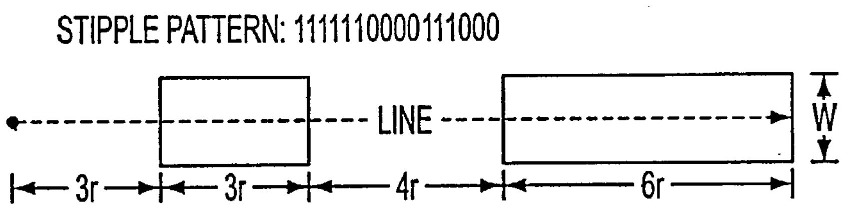
FIG. 44 is a diagrammatic illustration showing the manner in which rectangles represent visible portions of lines.
Figure 45:
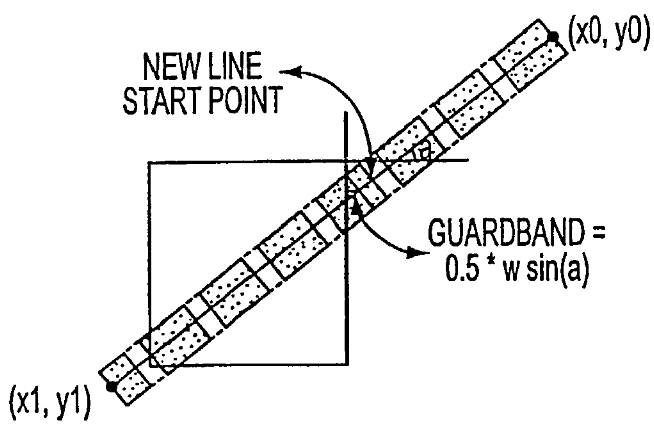
FIG. 45 is a diagrammatic illustration showing the manner in which a new line start-point as well as stipple offset stplStartBit is generated for a clipped point.
Figure 46:
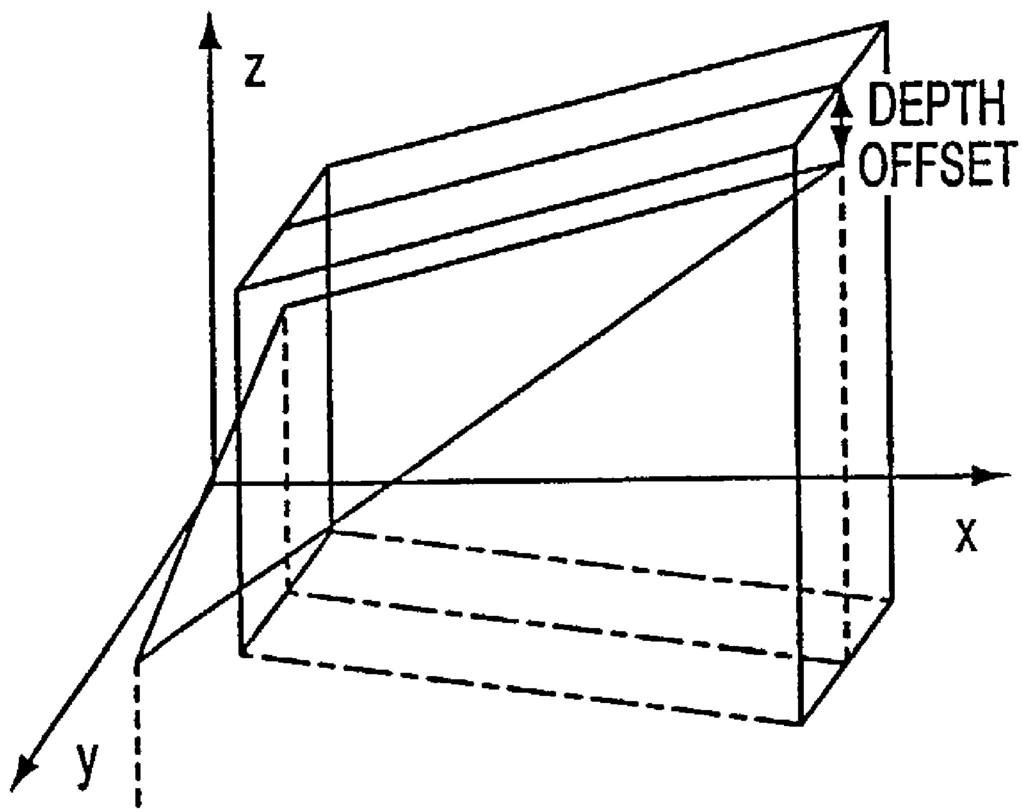
FIG. 46 is a diagrammatic illustration showing the geometry of line mode triangles.
Figure 47A:
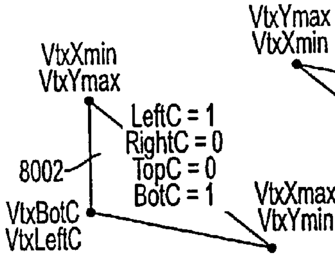
FIG. 47 is a diagrammatic illustration showing an aspect of how Setup represents lines and triangles, including the vertex assignment.
Figure 47B:
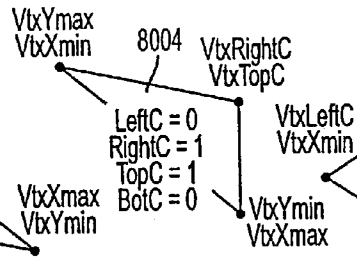
Figure 47C:
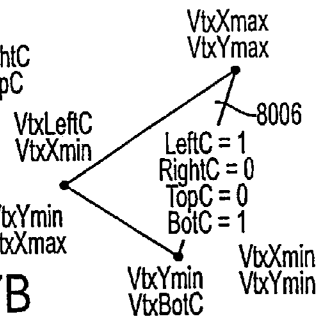
Figure 47D:
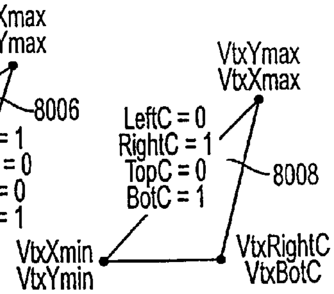
Figure 47E:
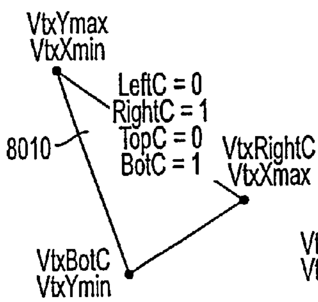
Figure 47F:
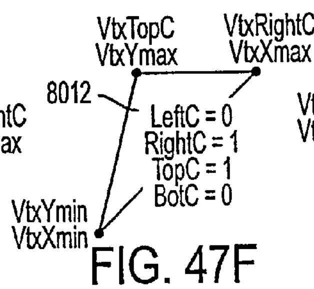
Figure 47G:
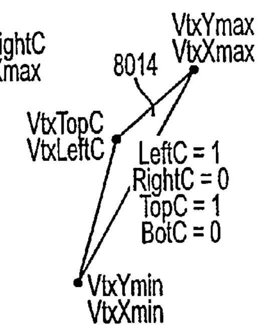
Figure 47H:
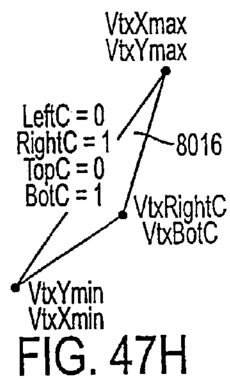
Figure 47I:
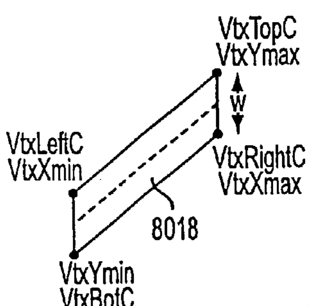
Figure 47J:
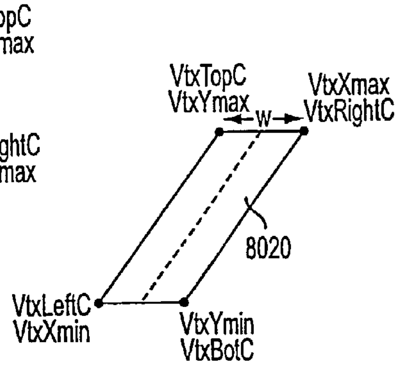
Figure 47K:
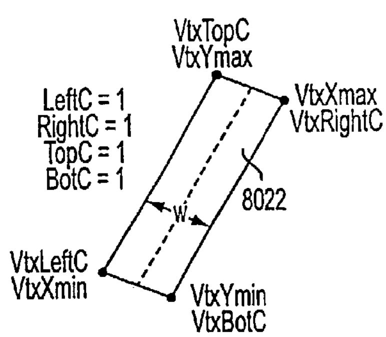
Figure 48A:
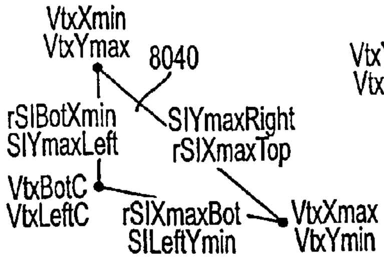
FIG. 48 is a diagrammatic illustration showing an aspect of how Setup represents lines and triangles, including the slope assignments.
Figure 48B:
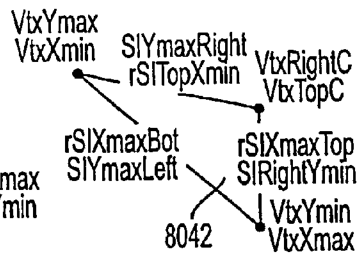
Figure 48C:
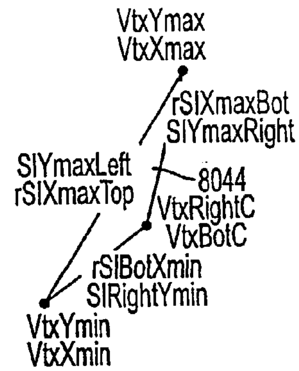
Figure 48D:
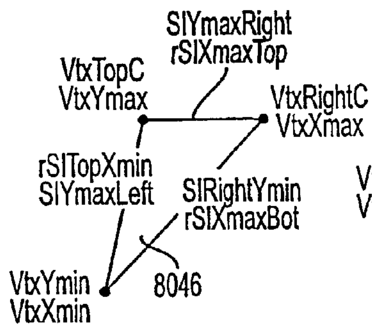
Figure 48E:
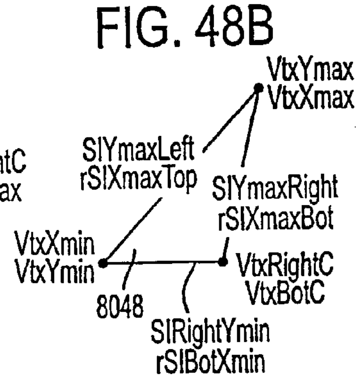
Figure 48F:
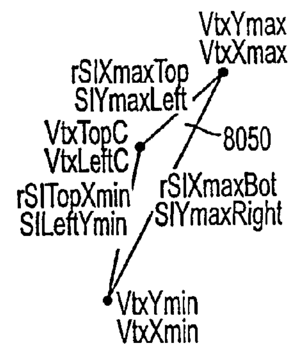
Figure 48G:
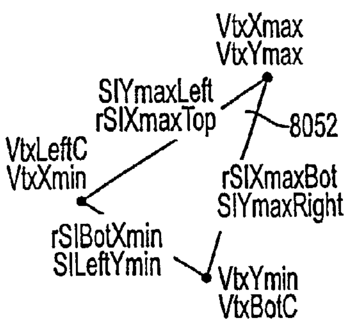
Figure 48H:
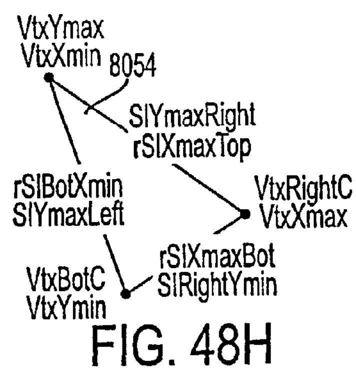
Figure 48I:
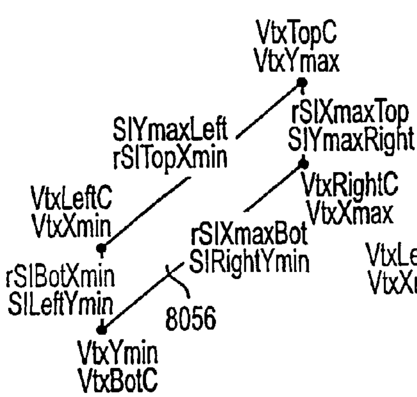
Figure 48J:
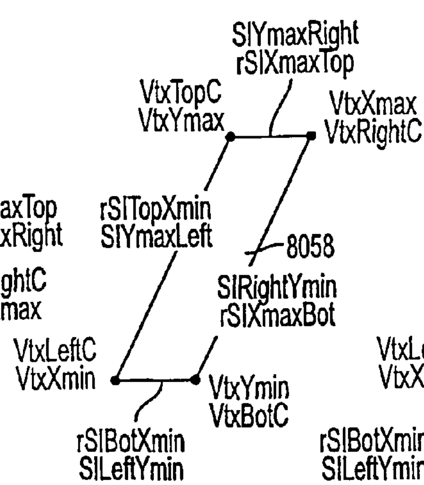
Figure 48K:
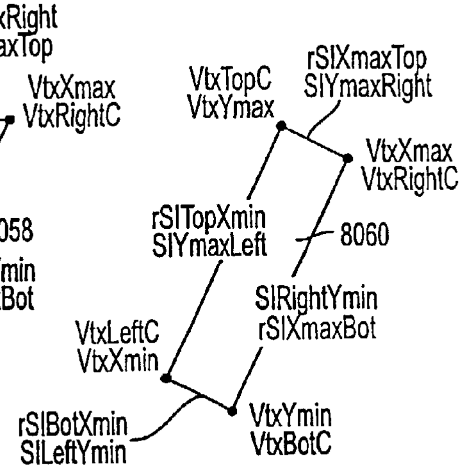
Figure 49:
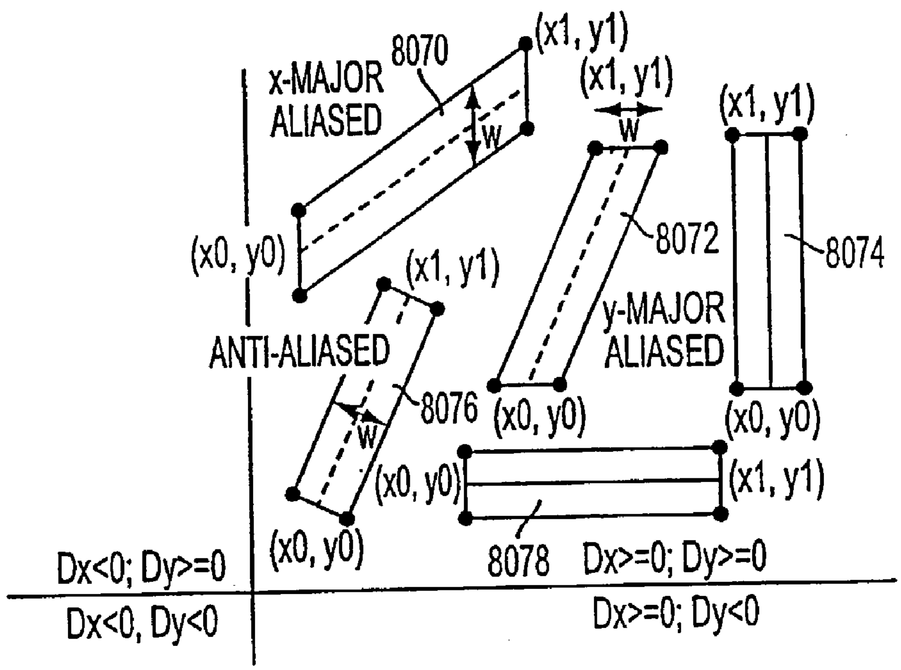
FIG. 49 is a diagrammatic illustration showing an aspect of how Setup represents lines and triangles, including the quadrant assignment based on the orientation of the line.
Figure 50:
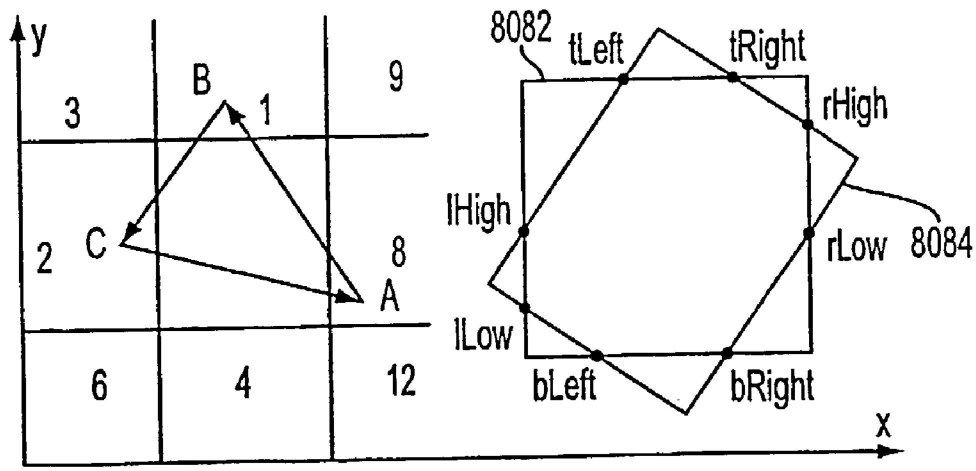
FIG. 50 is a diagrammatic illustration showing how Setup represents lines and triangles, including the naming of the clip descriptors and the assignment of clip codes to verticies.

The Phong block 14000 includes a material cache 14150 (FIGS. 34, 35) that holds material information for one or more objects likely to be an active subject of the illumination computation. This information generally changes per object, thus, when the Phong/Bump computation is to be performed for a new object, it is unlikely that the material characteristics of the new object is resident in the material cache 14150.

In the illustrated embodiment Fragment 11000 provides the material index 14001*h* (FIG. G34) that identifies the particular material information associated with the fragment to be illuminated. In one embodiment this material index is transmitted as part of the half- and full-rate fragment packets 11902, 11904. When the material index 14001*h* does not correspond to information in the material cache 14150, Phong 14000 issues a cache miss message that causes Fragment 11000 to return a material cache miss packet 11906 from Mode Injection 10000. The material cache miss packet 11906 is used by Phong 14000 to fill in the material cache data for the new object.

Generally, the information provided in a material cache miss packet 11906 includes:

- a unique material cache index 14001*h;*
- texture information for each texel associated with the object described by the material cache miss packet describing how to use the texel, including:
  - texel format (how to unpack texel information);
  - texel mode and sub-modes (how to apply the texel information to the associated fragments);
- fragment material information, including:
  - emissive, ambient, diffuse, specular and shininess characteristics for the object;
  - color mode information The format of one embodiment of a material cache miss packet 11906 is described in Table P3. The information shown for the illustrated data items is the same as for Tables P1 and P2, except for the lack of a "shared factor" heading. A key subset of the parameters/data items recited in Table P3 are defined below, in the section of the document entitled "Phong Parameter Descriptions". This material miss packet embodiment is merely exemplary ant is not to be construed to limit the present invention.

At the bottom of the table is an estimate of the bandwidth required to transfer the illustrated material packets. Assuming that material data for 2 new objects are required in each tile, then the number of misses per second is: 7500 tiles per frame*75 frames per sec*2 misses per tile=1.125 Million misses per sec. Assuming each material cache miss packet is 105.25 bytes, the total bandwidth required to transmit material cache miss packets is 118.41 M bytes per second.

Light Cache Miss Packet from Mode Injection

The Phong block 14000 includes a light cache 14154 (FIGS. 34, 35) that holds light information for one or more lights used in the illumination computation. This information typically changes once per frame. Thus, in contrast to the material cache, light cache misses are unlikely. Accordingly, the bandwidth for light cache misses should be negligible.

In the illustrated embodiment Fragment 11000 provides a light index 14001*g* (FIG. G 34) that identifies the particular light information to be used in the illumination computation associated with the fragment to be illuminated. In one embodiment this light index is transmitted as part of the half- and full-rate fragment packets 11902, 11904. When the light index 14001*g* does not correspond to information in the light cache 14154, Phong 14000 issues a message that causes Fragment 11000 to return a light cache miss packet 11908 from Mode Injection 10000 that is written into the light cache 14154.

Generally, the light cache miss packet includes:
- information regarding the general lighting environment that is common to all lights:
  - global ambient color;
  - light index 14001*g*
  - fog mode;and
  - fog color, etc;
- information for each light:
  - light diffuse color;
  - light ambient color;
  - light specular color;
  - attenuation;
  - spotlight direction, etc.

The format of one embodiment of a light cache miss packet 11908 is described in Table P4. The information shown for the illustrated data items is the same as for Tables P1 and P2, except for the lack of a "shared factor" heading. A key subset of the parameters/data items recited in Table P4 are defined below, in the section of the document entitled "Phong Parameter Descriptions". This light miss packet embodiment is merely exemplary and is not to be construed to limit the present invention.

Texture Packet

The Texture Block 12000 emits one texture packet (or texel) 12902 (corresponding to the texture data 12001*a* shown in FIG. G 34) for each texture to be applied to a fragment. The texture packet 12902 can provide a variety of texture information in a variety of formats to accommodate many possible uses of texture. For example, a texture packet can provide RGBA color values, conventional texture data, Blinn bump map data or SGI bump map data. In different embodiments there is no limitation on the number of textures that can be applied to a fragment nor on the type of texture information passed using use of a texture packet and texture information contained therein.

In the illustrated embodiment Phong Processing does not proceed until all textures 12902 (between 0 and 8) for the fragment have been received. Only the actual texel is sent by Texture 12000; all information describing the usage of the texture is held in the material cache 14150 since this usage information changes on a per-object basis rather than a per-fragment basis.

The format of one embodiment of a texel 12902 is described in Table P5. In this embodiment all texels 12902 comprise 36 bits. These 36 bits can be organized according to many different texel data formats to accommodate the different uses of texture in the illustrated embodiment. In one embodiment there are eleven different texel data formats, which are described in Table P11. Among other things, different texel data formats can be associated with different texel data types (e.g., RGBA or RGB) and different data ranges for a given data type. This embodiment is merely exemplary and is not to be construed to limit the present invention.

The bandwith required to transmit the texels 12902 in one embodiment is shown at the bottom right of Table P5. The result (1.13 E+09 bytes per second) presumes that one texel 12902 is sent for each fragment and there are 2.5E+08 fragments sent in the DSGP per second.

Output Packets to Pixel

At the completion of the lighting/bump mapping operation for a stamp the Phong Block 14000 sends a color output packet 14902 (corresponding to the data 14002, FIG. G 34) to Pixel 15000 that includes, for each fragment in the stamp, the final fragment color and a VSP pointer that allows the color to be synchronized with other mode data that comes to Pixel via other data paths.

When Phong has applied a depth-texture to the stamp the Phong Block 14000 can also send to Pixel 15000 a depth output packet 14904 that includes the corresponding Z value and a VSP pointer that allows the new Z value to be synchronized with other mode data. In this case, Pixel 15000 must abort its normal Z calculation and simply use the passed-in Z value for all sub-pixels.

Embodiments of the output packets 14902 and 14904 are described in Tables P6 and P7, respectively. A key subset of the parameters/data items recited in Tables P6 and P7 are defined below, in the section of the document entitled "Phong Parameter Descriptions". Bandwidth estimates for these embodiments are shown at the lower right of each table. That is, assuming 4.625 bytes per color packet and 2.5E+08 fragments per second, the color packet 14902 requires 1.16 E+09 bytes per second. Similarly, assuming 3.625 bytes per color packet and 2.5E+08 fragments per second, the depth packet 14904 requires 9.06 E+08 bytes per second.

These color and depth packet embodiments are merely exemplary and are not to be construed to limit the present invention. For example, in alternative embodiments the depth and color information could be passed in the same packet.

Input Queue

In one embodiment shown in FIG. G 35, Phong 14000 includes an input queue 14158. The input queue 14158 has two sections: an area 14162 containing packets from Fragment 11000 and an area 14166 containing packets from Texture 12000. The Fragment portion 14162 of the input queue must cover the latency through Texture, currently estimated at 150 clocks (150 texels), as well as providing for differing latencies of data paths through Fragment, estimated at another 50 clocks. In one embodiment the Texture portion 14166 of the queue is the same size as the Fragment queue 14162 to avoid ever having stalls in Texture 11000.

In the DSGP of the present invention each extra texture requires an additional clock cycle to process. As a result, the worst case storage size in the queues 14162, 14166 is when a single texture is being used, since, in this case, one fragment per texel must be stored in the Fragment portion 14162 of the queue. Additionally, for the half-rate case significantly more information is stored per fragment that in the full-rate case.

Given all this, an estimate of the input queue size for the full-rate and half-rate cases is shown in Table P8. Note that the maximum number of bytes in the texture input queue for a single VSP is:

8 txls/pixel*4 pixels/stamp*5 bytes/texe.=160 bytes

Caches

Phong maintains cache information of two types: Information that characterizes global rendering mode (the "light" cache 14154), and information characterizing an object (the "material" cache 14150). As mentioned above in the cache miss packet sections, the former is expected to change little during a frame for typical applications and the latter is expected to change on a per-object basis.

Comments on expected cache miss rates are found above with packet bandwidth estimates in the Light and Material Cache Miss Packet discussions.

Light Cache

In the illustrated embodiment the light cache 14154 stores lighting information for all the active lights in the scene so there will not be a cache miss on every fragment. In one embodiment Phong allows 8 fragment lights, the additional lights being used only in the geometry engine. The information stored in the light cache 14154 for each of the 8 lights is shown in Table P9. In this embodiment the light cache 14154 holds the same information as the light cache miss packet described with reference to FIG. G 4P.

Material Cache

The material cache 14150 can store material data for multiple objects. In one embodiment the material cache stores information for only one face (front or back) of a fragment. A front/back face flag stored for the fragment indicates whether the stored material data is for the fragment's front or back face. Mode Injection (MIJ) guarantees that the cache entry contains the correct values for the face of the fragment that is visible. The information stored in one embodiment of the material cache for each of 32 objects is shown in Table P10, which includes the same information as the material cache miss packet described with reference to Table P3.

Phong Block Parameter Descriptions

The following are definitions of parameters employed by Phong 14000. These parameters are mentioned in the Tables accompanying the preceding Packet, Queue and Cache descriptions and are also used in the following pseudocode descriptions of Phong operations.

ColorMaterial enable: Enables replacement of the material value with the incoming Gouraud primary color ColorMaterial front/back flag: Tells whether replacement of the material value with the incoming Gouraud primary color should occur on the front or back face of the fragment.

ColorMaterial mode: Tells which material value is to be replaced with incoming Gouraud primary color.

Depth from texture: Z value, assumed to be in the same units used in the z-buffer, taken from a texel and replacing the z value used in depth compare operations.

Distance cutoff When the distance to a local light becomes too great, its lighting calculation is negligible and the rest of the lighting calculation can be avoided. This value, computed by the driver, is used for this cutoff.

Eye x,y,z: Position of the fragment in eye coordinates.

Fog Color In RGBA mode: an RGB value (A not affected) blended with fragment color if fog is enabled. In color index mode: A 24-bit float used in the color-index form of the fog equation.

Fog Mode, Fog Parameter 1, Fog Parameter 2: Parameters defining the fog calculation. If fog mode is linear, then parameter 1 is end/(end-start) and parameter 2 is 1/(end-start). If fog is exponential parameter 1 is the fog density, and parameter 2 is not used. If fog is exponential squared, parameter 1 is the fog density squared, and parameter 2 is not used.

Fragment ambient, Fragment emissive, Fragment diffuse, Fragment specular, Fragment shininess: Material properties of the incoming fragment, used in the lighting equation.

Fragment front/back flag: Tells if this fragment is from the front or the back of the triangle.

Fragment light enable: Boolean indicating whether the fragment-lighting mechanism is currently enabled by the application.

Fragment color: Final result of the Phong calculation, R,G,B,A value to be sent to Pixel.

Global Ambient Color Constant color value applied uniformly to the scene.

Header: Indicates packet type. Any other information needed to interpret the racket will be contained in a dedicated field.

Kc (constant atten.), Kl (linear atten.), Kq (quadratic atten.): Parameters defining attenuation term in light calculation. See GL spec.

Light ambient color, Light diffuse color, Light specular color Colors for a given light to be used in the different terms in the lighting computation. See GL spec.

Light cache Index: Index into cache holding per-light and global mode information.

Local Viewer enable: Boolean indicating whether the direction to the viewer position must be calculated rather than taken as constant.

Material cache Index: Index into cache holding per-object information.

Normal magnitude: Floating-point magnitude of the unit vector

Normal unit vector: 3 fixed-point components scaled to represent the direction of a normalized vector.

NumFragments: Tells the Phong Block how many fragments are included in this VSP. Needed to allow correlation of incoming textures with fragments.

Num Textures: Tells Phong how many texels per fragment to expect.

Packet Length: Used to facilitate pass-through for packets that are passed through Fragment from upstream.

Pixel Mask: Mask indicating which of the 4 pixels in the VSP are being colored.

Shininess Cutoff: A value computed by the driver which allows us to avoid the exponentiation in the specular component:

Surface tangent s unit vector, Surface tangent t unit vector, Surface tangent s magnitude, Surface tangent t magnitude: Two vectors which, along with the normal, define the basis of a coordinate system which is used for perturbation of the normal vector.

Primary and Secondary Colors: If separate-specular-color is in effect, primary is the diffuse component from the Gouraud calculation and secondary is the specular component. Otherwise, primary contains the sum of the diffuse and specular values and secondary contains zero.

Txtr apply mode: Tells how the texture should be interpreted: Conventional color, bump, texture-material, light-texture, or depth-texture.

Txtr apply sub-mode: Qualifies the texture apply mode when additional detail is required: tells which material component should be replaced by the texture value, which bump-mapping scheme is in effect, and which light-texture mode is used.

Txtr env mode: Tells how textures are to be combined with the incoming color value.

Txtr front/back face flag: Does this texture apply to the front or back of the polygon?

Txtr GL base internal format: Tells how to apply the texture environment equations. Corresponds to the GL base-internal-format information.

Txtr Texel Data Format: Tells how data is to be unpacked from the 36-bit texel to form RGBA values for input to the texture environment.

Sc (spot cutoff, Se (spot exponent): Parameters defining attenuation due to spotlight geometry. See GL spec.

VSP Pointer: Index into input buffer of Pixel Block where more mode info is stored.

Computation Pseudo-code

The calculations performed in each of the above diagrammed subunits are described below using a pseudo-code approach to illustrate the control flow. Additional details of the processing performed in the Bump subunit follows these pseudo-code descriptions.

Texture Computation

The texture computation "gates" all the other computations since all the inputs to the lighting calculation may be modified by a texture value. If the texture subunit finds that there are no incoming textures it will forward a NULL indication to the other computational subunits which are blocked until the go-ahead is received from the texture subunit.

This discussion of texture processing clearly distinguishes between our internal data representation and the "base internal format" parameter defined by GL. The processing of a texel can be broken into 3 operations: unpacking, texture environment calculation and result routing. This processing is controlled by the following parameters (their allowed values are enumerated below), which are provided in the material cache 14150:

TexelDataFormat: This defines the data representation used by the 36-bit texel and specifies how it should be unpacked to form the 24-bit floats RGBA, but says nothing about how it is to be processed.

GlBaseInternalFormat: In the GL spec, this value defines both the number of components in the texture and the row in the table of texture environment equations used to process the texel. Note that although a given value of GlBaseInternalFormat may only make sense with certain values of TexelDataFormat, they are nevertheless distinct parameters.

GlTexEnvMode: This comes from the GL spec and is used to select the column in the table of texture environment functions.

TexApplyMode: This is a Raycer-defined value that determines which functional unit the output of the texture environment is destined for.

TexApplySubMode: This is a Raycer-defined value that determines exactly how the texture is to be used within the functional unit selected by TexApplyMode.

FIG. G 42 is a high level flow diagram that shows the processing flow of the texture computation 14114, which includes: texel unpacking 14160, texture environment calculation 14164, texture routing 14170, realignment 14174 and other subunits 14178. These steps interact with other Phong blocks, including the texture environment calculation 14142 and other sub-units 14178 (e.g., material selection 14126, bump 14130 or light texture 14134.

Based on the TexelDataFormat and the GlBaseInternalFormat the texel unpacking operation 14160 unpacks a 36-bit Texel 12902 to a set of 24-bit, floating point RGBA values 14161. Based on the GlBaseInternalFormat and the GlTexEnvironmentMode the texture environment calculation 14142 then specifies the manner in which the input color (the RGBA value 14161) is blended with the "current color" 14171 from the texture routing step 14166. Based on the value of the TexApplyMode the texture routing step 14170 determines to which Phong computation the incoming texel should be routed. In particular, texture routing 14166 passes color textures directly to the texture environment calculation step 14164 and passes non-dolor textures to the realignment step (14174), which realigns this data and finishes routing the realigned texture data to other subunits 14178. For example, realignment 14174 passes bump textures to the bump subunit, material textures to the material computation unit and depth textures to the light-texture unit 14134.

The allowed data ranges in one embodiment are now described for the texture definition parameters (TexelDataFormat, GlBaseInternalFormat, TexApplyMode, TexApplySubMode). These data ranges are exemplary and are not to be construed to limit the present invention.

Allowed Ranges for Texture Definition Parameters

TexelDataFormat Values

In the illustrated embodiment a texel 12902 (FIG. G 42) is a 36-bit word whose format is defined as follows:

TDF_nv_nd_s_dp where:

nv=Number of data values in the word;

nd=number of bits per value;

s=signed or unsigned;

dp=position of decimal point.

In the illustrated embodiment signed values have a sign-magnitude format rather than two's compliment. When texels are unpacked all 4 RGBA values are generated. In the unpacking operation 14160 values not found in the texel 12902 are filled with zeroes as indicated by the "Unpack To" column in the following table (Table P11), which describes eleven different TexelDataFormats used in one embodiment. Each format is characterized by the number of values it holds, number of bits per value, data range of each value and the information available after unpacking. For example, a texel in the format TDF_2_16_u_0 can be unpacked to two values: R (the first 16 bits of the texel) and A (the second 16 bits). Note that these formats are exemplary and are not be construed to limit the present invention, which can accommodate any number of texel formats.

Note 1) For texels containing a single value, the unpacked value should be routed to A (alpha) if the GlBaseInternalFormat is "Alpha", otherwise it is routed to R.

Note 2) When GlTexEnvMode is REPLACE, the 24 bits must go through untouched, because Pixel will require a true depth value exactly as defined by the texel.

GlBaseInternalFormat Values

The illustrated embodiment supports six different types of color data: Alpha, Luminance, Luminance-Alpha, Intentisty, RGB and RGBA. Each of these different data types is assigned a unique GlBaseInternalFormatValue and is associated with a unique row of the texture environment table:

| Value | Associated row |
|---|---|
| A (Alpha) | Use row 0 of texture environment table |
| L (Luminance) | Use row 1 of texture environment table |
| LA (Luminance-Alpha) | Use row 2 of texture environment table |
| I (Intensity) | Use row 3 of texture environment table |
| RGB | Use row 4 of texture environment table |
| RGBA | Use row 5 of texture environment table |

Other embodiments may may support more or less GlBaseInternalFormats. The texture environment table is described below.

GlTexEnvMode Values

The illustrated embodiment of the texture environment calculation 14164 supports five different color combining operations on the current and new colors 14171, 14161: Replace current with new, Modulate current with new, Decal, Blend current and new, and Add current and new. Each of these different operations is assigned a unique GlTexEnvModeValue and is associated with a unique column of the texture environment table:

| Value | Associated column |
|---|---|
| REPLACE | Use column 0 of texture environment table |
| MODULATE | Use column 1 of texture environment table |
| DECAL | Use column 2 of texture environment table |
| BLEND | Use column 3 of texture environment table |
| ADD | Use column 4 of texture environment table |

Other embodiments may may support more or less GlBaseInternalFormats. The texture environment table is described below.

TexApplyMode Values

The illustrated embodiment supports five types of texture: Color, Bump map data, Material data, Light information and Depth information. The TexApplyMode is set to one of these values in accordance with the type of texture information in the input texel 12902. The texture routing module 14170 routes the information from the texel after unpacking 14160 to an appropriate subunit depending on the value of this parameter. The different TexApplyMode values and the associated routings are as follows:

| | |
|---|---|
| COLOR | Use output to replace fragment color as input to the texture environment calculation 14164 |
| BUMP | Route to Bump subunit 14130, reset fragment color to Gouraud primary color |
| MATERIAL | Route to Material subunit 14126, reset fragment color to Gouraud primary color |
| LIGHT | Route to Light subunit 14138, reset fragment color to Gouraud primary color |
| DEPTH | Route to Pixel Block, reset fragment color to Gouraud primary color |

TexApplySubMode Values

The enumerated values of the TexApplySubMode indicate the specific subtypes of a texel whose general type is provided by the TexApplyMode. Thus, the set of enumerated values of the TexApplySubMode parameter depends on the value of the TexApplySubMode parameter. These enumerated values are now described for the different texel types.

When TexApplyMode=BUMP, the following submodes apply:

| | |
|---|---|
| SGI BUMP | RGB values used as normal vector. |
| BLINN BUMP | RA values used as perturbation to normal vector. |

When TexApplyMode=MATERIAL the following submodes specify which material component to replace: EMISSION, AMBIENT, DIFFUSE, SPECULAR, AMBIENT_AND_DIFFUSE, SHININESS.

When TexApplyMode=LIGHT the following submodes apply:

| | |
|---|---|
| AMBIENT | Replace light ambient value. |
| DIFFUSE | Replace light diffuse value. |
| SPECULAR | Replace light specular value. |
| ATTENUATION__SGIX | Replace light attenuation value. |
| SHADOW__ATTENUATION | Us as additional shadow-attenuation value. |

Additional background information is available in the following materials, which are incorporated herein by reference:

GL 1.1 spec Section 3.8,
SGIS_multitexture,
SGIX_light_texture,
SGIX_fragment_lighting,
separate_specular_color,
SGIX_texture_add_env.

These materials describe extensions to the Open GL specification needed to support SGI bump mapping.

Texture Calculation Pseudo-Code

The following is a pseudo-code description of the one embodiment of texture processing written using C lanuage conventions well known to programmers and engineers and others skilled in the art of computer programming, generally, and computer graphics programming and processor design, specifically. This embodiment is exemplary and is not to be construed to limit the scope of the invention.

```
if (there are no incoming textures) {
    Forward Null colors to all non-color texture destinations.
    Combine primary and secondary colors and forward to
    the Light-Environment computation.
    Done.
}
Set current-color to primary color
("current-color" is the input to the texture environment.)
for (each incoming texture) {
    if (this is a 24-bit depth-texture and the texture environment
        mode is "replace") {
        forward the data to the Pixel Block with no changes.
        with next texture.
    }else{
        Apply TEXTURE ENVIRONMENT EQUATION to generate new
        current-color (see below).
```

-continued

```
        if (this is a fragment-color texture) {
            Retain result as current texture-input-color.
        }else{
            if (this is a bump-texture) {
                Forward the current-color to the bump unit.
                Reset current-color to the original primary color.
            }else if (this is a material-texture) {
                Forward the current-color to the apply-texture-
                material unit.
                Reset current-color to the original primary color.
            }else if (this is a light-texture) {
                Forward the current-color to the apply-texture-
                light unit.
                Reset current-color to the original primary color.
            }else if (this is a depth-texture) {
                Forward the current-color to fragment-lighting
                computation.
                Reset current-color to the original primary color.
            }
        }
    }
}
Add in secondary color.
Forward current texture-input color to light-environment computation.
Done.
```

The following table provides sources and comments for a number of the inputs mentioned in the previous pseudo-code description:

| INPUT | SOURCE | COMMENTS |
|---|---|---|
| Cfs, Afs color | Input packet | Fragment (Gouraud) secondary |
| Cfp, Afp color | Input packet | Fragment (Gouraud) primary |
| Cc, Ac, Cb, Ab | Matrl cache | Texture env color from TexEnv and bias |
| Ct, $At | Input packet | Incoming texture color and alpha |
| Txtr internal format | Matrl cache | |
| Txtr apply mode | Matrl cache | For new texture types |
| Txtr Front/back face bit | Matrl cache | |
| Txtr apply submod | Matrl cache | |
| Txtr env. mode | Matrl cache | |

Texture Environment Equation.

The Texture Environment Equation specifies the manner in which the input color is blended with the "current color" as defined in the pseudocode above. This Equation can be used to perform a wide range of blending operations (e.g., Replace, Modulate, Decal, Blend, Add, etc.) using as inputs a wide variety of color data types (e.g, Alpha (A), Luminance (L), Luminance-Alpha, Intensity (I), RGB (C), RGBA, Luminance, etc.). The wide range of possible equations is efficiently represented in the present invention as cells within a two-dimensional Texture Environment table (Table P12) whose rows correspond to different color data types and whose columns correspond to different color blending operations. These equations use several subscripts (f, t, c, b) in conjunction with the color data type abbreviations. The subscript "f" refers to the current (fragment) color, "t" refers to the texture color, "c" refers to the texture environment color, and "b" refers to "bias", a constant offset to the texture value derived from the GL extension SGIX_texture_add_env. Also used in these equations are values S0, S1, and S2, which are signs, +/−1, that allow for subtraction as well as addition of textures. Note that the luminance (L) and intensity (I) values actually come from the "R" component of the texel.

Material Computation

Referring to FIG. G 41, Material Computation 14126 replaces a material property of a fragment with a new value provided as a texture-material value 14124 (i.e., as a texel) or as a fragment-color-material value 14108 (i.e., as part of a fragment packet). In the illustrated embodiment, consistent with SGI extensions to the GL specification, the fragment-color-material takes precedence over the texture-material. If neither a texture-material or fragment-color-material is provided, material computation 14126 displays the fragment with the material values from the material cache entry identified by the fragment's material cache pointer. The material computation 14126 includes a number of sub-computations.

If a texture-material value 14124 has been forwarded, the first sub-computation compares the fragment's front/back flag to the front/back face attribute of the texture-material 14124 and, if there is a match, proceeds to replace the material property identified by the txtrApplySubMode parameter (either EMISSION, AMBIENT, DIFFUSE, SPECULAR, or AMBIENT_AND_DIFFUSE) with the texture-material value.

The second sub-computation determines whether fragment-color-material operation is enabled. If so, and there is a match between the fragment's front/back flag and the front/back face attribute of the fragment-color-material, this sub-computation replaces a material property of the fragment identified by the txtrApplySubMode parameter with the Gouraud primary color. Additional background information is available in the following materials, which are incorporated herein by reference:

GL 1.1 spec Section 3.8,
SGIX_light_texture,
SGIX_fragment_lighting.

These materials describe extensions to the Open GL specification needed to support SGI bump mapping.

The following is a pseudo-code description of one embodiment of the texture processing written using C lanuage conventions well known to programmers and engineers and others skilled in the art of computer programming, generally, and computer graphics programming and processor design, specifically. This description is exemplary and is not to be construed to limit the present invention.

```
if (a texture-material value has been forwarded) {
    if (the front/back face attribute of the texture matches that of the
    current fragment{
        switch (txtrApplySubMode) {
        case EMISSION:
            replace material EMISSION property
        case AMBIENT:
            replace material AMBIENT property
        case DIFFUSE:
            replace material DIFFUSE property
        case SPECULAR:
            replace material SPECULAR property
        case AMBIENT_AND_DIFFUSE:
            replace material AMBIENT and DIFFUSE properties
        case SHININESS:
            replace the shininess attribute with the the 16-bit
            texel value interpreted in the range 0–128.
        }
    }
}
if (fragment-color-material is enabled) {
    (Note that SGIX_light_texture specifies that fragment-
    color-material takes precedence over texture-material,
    hence the ordering of these two operations.)
    if (the front/back face attribute FragmentColorMaterialSGIX matches
    that of the current fragment{
        Replace a material property with the Gouraud primary color as
follows:
        switch (colorMaterialMode) {
        case EMISSION:
            replace material EMISSION property
        case AMBIENT:
            replace material AMBIENT property
        case DIFFUSE:
            replace material DIFFUSE property
        case SPECULAR:
            replace material SPECULAR property
        case AMBIENT_AND_DIFFUSE:
            replace material AMBIENT and DIFFUSE properties
        }
    }
}
if (neither texture-material nor fragment-color-material is in effect) {
    Use material value from the material cache
}
```

The following table provides sources and comments for a number of the inputs mentioned in the previous pseudo-code description:

| INPUT | SOURCE |
|---|---|
| Material | Matrl cache |
| Fragment Front/back flag | Input packet |
| Txtr apply submode | Matrl cache |
| Txtr apply mode | Matrl cache |
| Txtr Front/back | Matrl cache |
| ColorMaterial enable | Matrl cache |
| ColorMaterial front/back | Matrl cache |
| ColorMaterial mode | Matrl cache |
| Gouraud colors | Input packet |

Bump Computation

Referring to FIG. G 43, there is shown a block diagram of components of the inventive DSGP that play a role in bump computation. These components include a Texture Mapping unit 12900 of the Texture block 12000; a Fragment Interpolation unit 11900 of the Fragment block 11000; and Texture computation, Bump and Fragment Lighting units 14114, 14130, 14138 of the Phong block.

As described in other sections of this document, Texture Mapping 12900 receives from Fragment Interpolation 11900 object space coordinates (s, t) of a fragment in need of texturing. The object space coordinates (s, t) correspond to the coordinate system (referred to as tangent, or object, space) of the texture map TMAP input to Texture 12000. Texture Mapping 12900 determines the texture associated with the coordinates (s, t) and passes the relevant texture information to the Phong block 14000 as a set of texels 12902 (up to 8 texels per stamp in one embodiment). As described above, the Texture computation 14114 unpacks the texels and dispatches the different types of texture information (e.g., texture-bump, texture-light, texture-material) to appropriate Phong units. In particular, Texture computation 14114 passes texture-bump (Tb) data 14122 for a fragment to the Bump unit 14130, which receives from Fragment Interpolation 11900 geometry information 14110 (surface normal N and tangents $V_s$, $V_t$) for the same fragment. Using this information Bump 14130 computes a perturbed, eye space normal $N'_{ES}$ reflecting perturbation of the normal N by the bump data Tb. The Bump unit 14130 outputs the perturbed normal $N'_{ES}$ to Fragment Illumination 14138, which uses the new $norml_{ES}$ N' in conjunction with material and lighting information 14128, 14136, derived light (L) and half-angle (H) vectors, and fragment position V to compute the color 14148 of one pixel corresponding to the fragment. The pixel color 14148 is output to the Pixel block 15000, which can combine that color with other colors for the same pixel.

As already described, bump map information can be specified in the texture map TMAP in a variety of formats (e.g., SGI, Blinn). In the Blinn format the TMAP specifies each point of the bump map using two bump gradients ($h_s$(s, t), $h_t$(s, t)). Texture Mapping 12900 packages this information as two components of an RGB texel. In one embodiment the RBG texel is provided in the texel data format TDF_3_12_s_0 (see Table P11 for definition of texel formats). The Phong Texture computation unit 14114 passes the bump information to Bump 14130 as a tangent space, texture-bump (Tb) vector 14122 whose components are ($h_s$(s, t), $h_t$(s, t), 1.0), where the scalar 1.0 corresponds to the length of a unit surface normal perturbed by the gradients.

In the SGI format the TMAP specifies at each point of the bump map the tangent space components ($n'_x$, $n'_y$, $n'_z$) of the perturbed surface normal $N'_{TS}$. Texture Mapping 12900 packages this information as three components of an RGB texel. In one embodiment the RBG texel is provided in the texel data format TDF_3_12_s_0 (see Table P11 for definition of texel formats). The Phong Texture computation unit 14114 passes this information to Bump 14130 as a tangent space, texture-bump (Tb) vector 14122 whose components are ($n'_x$, $n'_y$, $n'_z$).

Fragment illumination 14138 performs all lighting computations in eye space, which requires the Bump unit 14130 to transform the texture-bump (Tb) data 14122 from tangent space to eye space. In one embodiment the Bump unit does this by multiplying a matrix M whose columns comprise eye space basis vectors ($b_s$, $b_t$, n) by the vector Tb of bump map data. The components of the eye space basis vectors, which constitute a transformation matrix from tangent to eye space, are defined by Bump 14122 so that the multiplication ($M \times Tb$) gives the perturbed normal N' in eye space in accordance with the Blinn bump mapping equation:

$$N'_{ES}=N+b_s h_s+b_t h_t. \quad (51)$$

In particular, when the texture-bump data 14122 is in the SGI format, the Bump unit 14130 computes the basis vectors using: $b_s=-V_s$ and $b_t=-V_t$. When the texture-bump information is in the Blinn format, the Bump unit 14130 computes the basis vectors using: $b_s=\hat{n}\times V_2$ and $b_t=V_s\times\hat{n}$, where $\hat{n}$ is the unit vector in the direction of the surface normal N. Using these definitions, the matrix multiplication ($M\times Tb$) generates the appropriate perturbed surface normal in eye space, $N'_{ES}$. This matrix multiplication can be implemented in either hardware or software.

This approach is much more efficient than the bump mapping approaches of the prior art. For example, in contrast with SGI bump mapping, where the light and half-angle vectors (L, H) are both transformed to tangent space for each of one or more lights, the present invention only needs to transform the texture-bump vector Tb to eye space once, regardless of the number of lights. Moreover, because Fragment 11000 provides interpolated vectors, the illustrated embodiment does not need to interpolate normals or surface tangents, as is done in the prior art.

A high-level flow diagram of one embodiment of the Bump unit 14130 is shown in FIG. G44. In this embodiment the Bump unit first computes unit basis vectors and associated magnitudes from the fragment geometry vectors (N, Vs, Vt) (operation 14300) and then computes the perturbed unit normal $N_{ES}'$ in eye space 14302 using the unit basis vectors and associated magnitudes and information from the tangent space, texture-bump vector Tb (operation 14302).

This embodiment efficiently implements the matrix computation ($M\times Tb$) partly using matrix multiplication hardware. The illustrated embodiment accomplishes this by first recognizing that the Blinn bump mapping equation can be rewritten as follows:

$$N'_{ES}=\hat{n}m_n+\hat{b}_s m_{bs} h_s+\hat{b}_t m_{bt} h_t, \quad (55)$$

where ($\hat{b}_s$, $\hat{b}_t$, $\hat{n}$) and ($m_{bs}$, $m_{bt}$, $m_n$) are, respectively, unit vectors and associated magnitudes composing the basis vectors ($b_s$, $b_t$, n). That is:

$$b_s=m_{bs}\hat{b}_s;\ b_t=m_{bt}\hat{b}_t \text{ and } n=m_n\hat{n}.$$

Applying basic linear algebra principles, the rewritten bump mapping equation can be represented as the following matrix multiplication for the Blinn bump method:

$$N' = \left|\hat{b}_s \quad \hat{b}_t \quad \hat{n}\right| \begin{vmatrix} m_{bs}h_s \\ m_{bt}h_t \\ m_n \end{vmatrix}, \quad (61)$$

where $|\hat{b}_s\ \hat{b}_t\ \hat{n}|=M'$ is expanded as:

$$\begin{vmatrix} \hat{b}_{xs} & \hat{b}_{xt} & \hat{n}_x \\ \hat{b}_{ys} & \hat{b}_{yt} & \hat{n}_y \\ \hat{b}_{zs} & \hat{b}_{zt} & \hat{n}_z \end{vmatrix}.$$

Note that, in this representation:

- the components $\hat{b}_{xs}$, $\hat{b}_{ys}$, $\hat{b}_{zs}$ are the x, y and z components of the surface tangent vector in the s direction;
- the components $\hat{b}_{xt}$, $\hat{b}_{yt}$, $\hat{b}_{zt}$ are the x, y and z components of the surface tangent vector in the s direction; and
- the components $\hat{b}_{xt}$, $\hat{b}_{yt}$, $\hat{b}_{zt}$ are the x, y and z components of the surface normal vector. In one embodiment, the transformation matrix of unit vectors, $M'=|\hat{b}, \hat{b}, \hat{n}|$, can be stored as a 3×3 matrix of fixed-point values, which enables fixed point multiplication hardware to be used at least partially in the Bump unit 14130. Such hardware is far simpler than the floating-point multiplication hardware that would otherwise be required to perform the original, non-normalized matrix multiplication ($M\times Tb$). However, note that floating point hardware can be used in any of the described embodiments for any of computations performed therein.

Similarly, for the SGI bump method, the rewritten bump mapping equation can be represented as the following matrix multiplication:

$$N' = \left|\hat{b}_s \quad \hat{b}_t \quad \hat{n}\right| \begin{vmatrix} m_{bs}n_x \\ m_{bt}n_y \\ m_n n_y \end{vmatrix} \quad (63)$$

In the embodiment of FIG. G 44, Fragment 11000 supports this implementation of bump mapping by providing the surface normal N and surface tangents $V_s$, $V_t$ as groups of unit vectors and associated magnitudes. For example:

- surface normal N is provided as a magnitude $m_n$ and unit vector components ($\hat{n}_x$, $\hat{n}_y$, $\hat{n}_z$);
- surface tangent $V_s$ as a magnitude $m_s$ and unit vector components ($\hat{v}_{xs}$, $\hat{v}_{ys}$, $\hat{v}_{zs}$); and
- surface tangent $V_t$ as a magnitude $m_t$ and unit vector components ($\hat{v}_{xt}$, $\hat{v}_{yt}$, $\hat{v}_{zt}$).

The Bump unit 14130 generates the matrix of unit basis vectors $M'=|\hat{b}_s, \hat{b}_t, \hat{n}|$ and the associated magnitudes $m=(m_{bs}, m_{bt}, m_n)$ from the magnitudes and unit vectors composing the surface normal N and surface tangents $V_s$, Vt in a manner that is consistent with the content of the texels input to the Phong block 14000. In particular, when the texel-bump information is in the SGI format, Bump 14130 derives the unit vectors and associated magnitudes using:

$$\hat{b}_s=-\hat{v}_s,\ m_{bs}=m_{vs} \text{ and } \hat{b}_t=-\hat{v}_t,\ m_{bt}=m_{vt}.$$

When the texel-bump information is in the Blinn format, Bump 14130 derives the unit vectors and associated magnitudes using:

$$b_s=\hat{n}\times\hat{v}_t,\ m_{bs}=m_{vt} \text{ and } b_t=\hat{v}_s\times\hat{n},\ m_{bt}=m_{vs}.$$

Given unit basis vectors and magnitudes derived in this manner the resulting matrix multiplication (M'xmTb) produces the desired eye space perturbed surface normal $N'_{ES}$ for use in the fragment lighting calculation. Stating this another way, the matrix M' defines a transformation from the different tangent space coordinate systems (i.e., Blinn or SGI) to the common eye space coordinate system.

In one version of the embodiment just described the Bump hardware 14130 is able to store each component of the matrix M' as a fixed-point value. However, the vector ($m_{bs}h_s$, $m_{bt}h_t$, $m_n$) by which the matrix M' is multiplied cannot be represented as a fixed point vector. This is because, even though the Tb components (i.e. bump gradients $h_s$, $h_t$ or SGI perturbed normal components $n'_x$, $n'_y$, $n'_z$)

can be fixed-point values, the magnitudes $m_{bs}$, $m_{bt}$, $m_n$ could be any size, necessitating floating point representation of the vector ($m_{bs}h_s$, $m_{bt}h_t$, n). Because this vector is not fixed-point, the multiplication (M'×mTb) cannot be performed entirely with fixed-point hardware. An embodiment that addresses this issue is now described in reference to FIG. G 45.

FIG. G 45 shows an implementation of the operation 14302 from FIG. G 44 that computes the perturbed normal $N'_{ES}$ using only fixed-point hardware. This diagram represents the texture-bump vector generically as ($h_s$, $h_t$, $k_n$), where, in Blinn-bump mapping, $h_s$ and $h_t$ are the bump gradients and $k_n$=1.0; and, in SGI-bump mapping, ($h_s$, $h_t$, $k_n$) equal the components of the perturbed normal ($n'_x$, $n'_y$, $n'_z$). This implementation is based on the idea of scaling each of the components of the vector mTb so that the resulting scaled values can be represented as fixed-point values of a scaled vector mTb'. The matrix multiplication M'×mTb' is then entirely carried out using fixed point hardware, and the result then re-scaled and normalized to account for the different scale factors applies to respective components of the vector mTb. The resulting perturbed normal transmitted to the Fragment Lighting 14138 is a unit normal.

As shown in FIG. G 45, the magnitude vector m=($m_{bs}$, $m_{bt}$, $m_n$) 14310 and the bump vector Tb=($h_s$, $h_t$, $k_n$) are multiplied to form an updated texture-magnitude vector m Tb' (14312). The components of mTb' are then scaled by a vector s of scalars ($s_s$, $s_t$, $s_n$) as follows (14314):

$$mTb''=(s_s \times m_{bs}h_s,\ s_t \times m_{bt}h_t,\ s_n \times m_n k_n).$$

The scalars s are selected so the resulting matrix mTb" can be represented as a fixed-point vector. The scalars can be the same but, in some situations, are likely to be different given the wide range of possible magnitudes m.

The scaled vector mTb" and the unit transformation matrix M', which also comprises fixed-point values, are multiplied entirely using fixed-point multiplication hardware to provide a perturbed normal N' (14316). The components of the perturbed normal N' are then re-scaled (14318) to re-establish the correct relationship between their magnitudes:

$$N''=N' \times 1/(s_s,\ s_t,\ s_n).$$

The rescaled vector N" is then normalized (14320) to provide a unit perturbed normal $\hat{N}'_{xs}$ that is output to Fragment Lighting:

$$\hat{N}'_{xs}=N''/\|N''\|.$$

Alternatively, the magnitude of the perturbed normal could be passed to Fragment Lighting along with the unit perturbed normal.

As in any of the described embodiments, any of the operations, steps or calculations described with reference to FIG. G 9P can be performed entirely in floating-point hardware.

The following is a pseudo-code description of one embodiment of the bump computation processing written using C lanuage conventions well known to programmers and engineers and others skilled in the art of computer programming, generally, and computer graphics programming and processor design, specifically. This description is exemplary and is not to be construed to limit the present invention.

```
if (this is a backside fragment) {
    negate the normal and the basis vectors.
}
if (sgi bump) {
    Combine the normal and basis vectors into a matrix.
    Form a vector from the 3 values in the texel.
    Apply the matrix to the vector to generate a new normal.
    Renormalize (N)
} else if (blinn bump) {
    Combine the normal and basis vectors into a matrix.
    Form a vector from "1.0" and the 2 values in the
    texel (surface gradients).
    Apply the matrix to the vector to generate a new
    normal.
    Renormalize (N)
}
Forward the normal vector to fragment lighting.
In either the Blinn or SGI modes, the net result is a 3x3 matrix
multiply.
```

The following table provides sources and comments for a number of the inputs mentioned in the previous pseudo-code description:

| INPUT | SOURCE |
|---|---|
| Texture apply submode (blinn/sgi) | Matrl Cache |
| Bump Texels | Input packet |
| Normal unit | Input packet |
| Normal magnitude | Input packet |
| Tan, Binorm vectors | Input packet |

Light-Texture Computation

Referring to FIG. G 41, the light-texture computation 14134 replaces a light property of a fragment with a new value provided as a texture-light value 14120 (i.e., as a texel). If a texture-light value 14120 is not provided, the light-texture computation 14134 displays the fragment with the material values from the light cache entry identified by the fragment's light cache pointer.

If a texture-light value 14120 has been forwarded, the texture-light computation replaces the light property identified by the txtrApplySubMode parameter (either EMISSION, AMBIENT, DIFFUSE, SPECULAR, or AMBIENT_AND_DIFFUSE) with the texture-light value 14120. The resulting new light value 14136 is forwarded to the Fragment Lighting computation 14138.

Additional background information is available in the following materials, which are incorporated herein by reference:

GL 1.1 spec Section 3.8,

SGIX_light_texture,

These materials describe extensions to the Open GL specification needed to support SGI bump mapping.

The following is a pseudo-code description of one embodiment of the light-texture computation written using C lanuage conventions well known to programmers and engineers and others skilled in the art of computer programming, generally, and computer graphics programming and processor design, specifically. This description is exemplary and is not to be construed to limit the present invention.

```
if (a texture-light value has been forwarded) {
    switch (texture apply submode) {
    case AMBIENT:
        replace AMBIENT light component with texture value
    case DIFFUSE:
        replace DIFFUSE light component with texture value
    case SPECULAR:
        replace SPECULAR light component with texture value
    case ATTENUATION:
        Forward the attenuation value to the fragment-light unit
    case SHADOW__ATTENUATION
        forward the shadow factor to the fragment-light unit.
    }
  }
Forward the light values to the FRAGMENT-LIGHTING UNIT
```

The following table provides sources for a number of the inputs mentioned in the previous pseudo-code description:

| INPUT | SOURCE |
|---|---|
| Current light values | Light cache |
| Txtr apply mode | Matrl cache |
| Txtr apply submode | Matrl cache |
| Light texture values | Input packet |

Fragment-Lighting Computation

The Fragment-Lighting computation implements the Lighting Equation set out in the Background in a manner that is substantially similar to the method used in the Geometry block to perform per vertex lighting. Additional details common to the prior art and the Fragment Lighting computation are provided in the background section of the present document.

Referring to FIG. G 41, inputs to Fragment Lighting 14138 include the selected material 14128 from Material Selection 114126, the perturbed normal (or, if no bump mapping is performed, the normal passed in by Fragment 11000 in a fragment packet) from Bump 14130 and the selected texture 14136 from Light-Texture 14134. Fragment Lighting 14138 combines this disparate information according to the Lighting Equation using the to generate a pixel color 14140 that is output to the Light-Environment calculation 14142.

Additional background information is available in the following materials, which are incorporated herein by reference:

GL 1.1 spec Section 3.8,

SGIX_fragment_lighting.

These materials describe extensions to the Open GL specification needed to support SGI bump mapping.

The following is a pseudo-code description of one embodiment of the Fragment Lighting computation written using C lanuage conventions well known to programmers and engineers and others skilled in the art of computer programming, generally, and computer graphics programming and processor design, specifically. This pseudo-code example begins with a comment that defines the parameters used in the code that implements the lighting computation, which follows. This description is exemplary and is not to be construed to limit the present invention.

```
Define:
    Nf            =   the number of fragment light sources
    N             =   the fragment normal vector
    L__i          =   the direction vector from the fragment position to the
                      light source for light #i
    H__i          =   the half angle vector for light #i
    n             =   the specular exponent (shininess)
    Shad__i       =   shadow attenuation term, defaults to 1.0
    Pl            =   unit vector towards light.
    E             =   Vector from fragment to eye position
    De            =   Distance from fragment to eye position
    Dl            =   Distance from fragment to light position.
    Am, Dm, Sm      =  Ambient, Diffuse, and specular material components
    Al__i, Dl__i,Sl__i   = Ambient, Diffuse, and specular components of light
#i
Then the fragment lighting equation is:
Cl = Em                                 // emissive
        + Am*As                         // ambient
    SUM{__i = 0 through Nf - 1} {
    +   shad__i *Atten__i*SpotL__i*{    // attenuation
        + Am*Al__i                      // ambient
        + Dm*Dl__i*(N.L__i)             // diffuse
        + Sm*Sl__i*(N.H__i)^n           // specular
        }
    }
Note on the "shininess cutoff factor"
The specular term is:
    Sm*Sl__i(N.H__i)^n
Note that the exponentiation is a waste of time if:
    N.H__i*Sm*Sl__I < 1/(2^8 - 1)
Or:
    N.H__I < 1/((2^8 - 1) *Sm *Sl__I)
This reciprocal is computed by the driver and stored as "shininess
cutoff" for each material.
Pseudocode:
if (fragment lighting is off) {
    Assign the texture computation output to the fragment color.
    done.
}
```

-continued

```
If (local viewer) {
    Set eye vector E to (0, 0, 1)
}else{
    Compute fragment eye vector from:
    E = -V
    renormalize(E), saving magnitude for use by fog calculation.
}
Set accumulated sum to emission term:
Add product of global ambient and material ambient to accumulated sum:
For (each enabled fragment-light) {
    if (light is local) {
        Find the vector from the fragment to the light:
        L = Pl-V
        Renormalize(L), saving the light distance Dl
        for use below.
    }else{
        Use light vector unchanged,
        L = Pl
    }
    if (either viewer or light is non-local) {
        Form the half-angle vector H:
        H = E + L
        renormalize(H)
    }else{
        Use the H vector for this light
        from the light cache.
    }
    if (an attenuation factor has come from light-texture) {
        set the attenuation to the forwarded value
    }else{
        if (the light is local) {
            if (the light is nearer than its cutoff distance) {
                Compute the attenuation denominator from
                d = Kc + Kl*Dl + Kq*Dl*Dl
            Set the attenuation factor to the reciprocal of d.
            }else{
                Skip the remaining calculations for this light.
            }
        }else{
            set the attenuation factor to 1.0
        }
    }
    if (a shadow factor has come from light-texture) {
        multiply the attenuation factor by the shadow factor
    }
    if (the light is a spotlight) {
        Compute the spotlight factor:
        Find the dot product Sdv = -L * S
        if (the dot product is > the spotlight cutoff) {
            Raise Sdv to the power of the spotlight exponent
        }
    }else{
        set the spotlight factor to 1.0
    }
    Compute the ambient term Acm * Acl
    Find the dot product of the Light vector L and surface normal N.
    if (L.N is > 0) {
          Compute the diffuse term:
        Multiply L.N by the material and light diffuse components Dm and
Dl
        Compute the specular term:
        Find the dot product of H and the normal N:
        if (N dot H is greater than the shininess cutoff value) {
            Raise the dot product to the power of the material specular
        }
        Multiply by fragment and light specular coefficients Sm and Sl
    }else{
        Light is behind surface, set diffuse and specular to zero
    }
    Multiply this light's contribution by attenuation factor and
    add to total.
}
Forward final fragment color to Light environment computation.
```

The following table provides sources and comments for a number of the inputs mentioned in the previous pseudo-code description:

| INPUT | SOURCE | COMMENTS |
|---|---|---|
| Fragment lighting enable | Light cache | |
| Fragment Xe, Ye, Ze | Input packet | Eye space coords, |
| Local viewer enable | Light cache | |
| Surface Normal | Bump comp. | |
| Global light info | Light cache | Viewer location, etc. |
| Per-light info | Light-Txtr comp | |
| Frament material info | Material comp. | |

Light-Environment Computation

Referring to FIG. G 41, the Light-environment computation 14142 receives a fragment color (RI,GI,BI,AI) 14140 from Fragment Lighting and a texture-color (Rf,Gf,Bf,Af) 14118 from Texture 14114 and blends the two colors according to the current value of the light-environment mode setting, which may be set to one of REPLACE, MODULATE, or ADD.

Additional background information is available in the following materials, which are incorporated herein by reference:

GL 1.1 spec Section 3.8,
SGIX_fragment_lighting.

These materials describe extensions to the Open GL specification needed to support SGI bump mapping.

The following is a pseudo-code description of one embodiment of the the Light-Environment computation written using C lanuage conventions well known to programmers and engineers and others skilled in the art of computer programming, generally, and computer graphics programming and processor design, specifically. This description is exemplary and is not to be construed to limit the present invention.

PseudoCode:

Blend the fragment light color (RI,GI,BI,AI) with the texture color (Rf,Gf,Bf,Af) according to the current value of the light-environment mode setting, which may be set to one of REPLACE, MODULATE, or ADD . . .

```
REPLACE MODULATE ADD
Rv=RI Rv=Rf*RI Rv=Rf+RI
Gv=GI Gv=Gf*GI Gv=Gf+GI
Bv=BI Bv=Bf*BI Bv=Bf+BI
Av=AI Av=Af*AI Av=Af+AI
```

Replace depth value in output packet if depth-texture was forwarded.

The following table provides sources for a number of the inputs mentioned in the previous pseudo-code description:

| INPUT | SOURCE |
|---|---|
| Light env mode | Matrl cache |
| Texture color | Texture comp. |
| Fragment Color | Fraglight comp. |
| Replacement Z | Txtr comp. |

Fog Computation

Referring to FIG. G 41, the Fog computation 14146 receives the blended color 14144 from the Light-Environment computation 14142 and outputs the final pixel color 14148 to the Pixel block 15000. The Fog computation uses the current value of the fog mode (fogMode) from the light cache 14154 and the associated fog parameters 1 and 2 (fogparm1, fogParm2) and fog color (fogColor). Note that the Fog computation can only be performed in the half-rate mode as it requires eye coordinates, which are only provided in the half-rate fragment packet 11902 (FIG. G40).

The Fog computation modifies the fragment color 14144 using a computation that depends only on the distance from the viewer's eye to the fragment and the fog mode. In a particular embodiment the fog mode includes exponential, exponential squeared and linear. In this embodiment the Fog computation 14146 determines a fog factor that is either an exponential, exponential squared or linear function of the distance from the viewer's eye to the fragment. As described above (see Phong Block Parameter Descriptions), the fog parameters 1 and 2 define aspects of the fog computation that vary depending on the fog mode. For example, if the mode is exponential, then parameter 1 is fog density and parameter 2 is not used; if exponential squared, then parameter 1 is the fog density squared and parameter 2 is not used; if linear, then parameter 1 is end/(end-start) and parameter 2 is 1/(end-start).

The Fog computation 14146 uses the computed factor to blend the fog color (fogcolor) from the light cache 14154 and the color 14144 from Light Environment 14142.

Additional background information is available in the following material, which is incorporated herein by reference: GL 1.1 spec Section 3.9.

The following is a pseudo-code description of one embodiment of the Fog computation 14146 written using C lanuage conventions well known to programmers and engineers and others skilled in the art of computer programming, generally, and computer graphics programming and processor design, specifically. Like the preceding pseudo-code descriptions this example includes clarifying comments, notes and the actual pseudo-code.

```
Comments:
Use the current value of the fog mode to select between the
exponent, exponent squared, and linear fog equations to compute
a scale factor, then use the scale factor to blend the fragment
color (RGBA) with the fog color (RGBA).
Notes:
If fog is enabled, we go to half-rate packets regardless of other
factors since we need eye-space coordinates to find the distance to the
fragment.
Fog requires the distance from the fragment to the eye, which is not
available in the performance case. Possible optimizations:
The gl spec allows the eye-distance to be approximated with the eye-
space z value, but this does have noticeable artifacts.
Eye distance could be approximated with the formula:
De = Abs(Max(Ex, Ey, Ez)) + Abs(remaining term1) / 4. + Abs(remaining
term2) / 4.
Fog could be calculated per-vertex in Geometry and interpolated.
Pseudocode:
If (the distance De from the fragment to the eye has not already been
computed) {
    Compute the distance as 1 / sqrt(Ex*Ex + Ey*Ey * Ez*Ez)
}
switch(mode) {
case EXPONENT:
    factor = exp(−density * De);
case EXPONENT_SQUARED:
    factor = exp(−(density * De)^2);
```

-continued

```
case LINEAR:
    factor = (end − De)/(end − start)
    (We store end/(end−start) and 1/(end − start) in the
    material cache)
}
if (color index mode is true) {
    Replace the color index using:
    I = fragment color index + (1 − factor) * fog color
    Where "fog color index" is stored as a float.
    And "fragment color index" is the lowest 8 bits of the
    Incoming mantissa of the R component of the primary color.
}else{
    Replace color components (but not alpha) using:
    Color = factor * fragment color + (1 − factor) * fog color
}
```

The following table provides sources and comments for a number of the inputs mentioned in the previous pseudo-code description:

| INPUT | SOURCE |
|---|---|
| Fragment color | Light env comp. |
| Fog mode | Light cache |
| Fog start, end, density | Light cache |
| Fog color | Light cache |
| Color index mode | Light cache |

Exceptions

Fragment lighting differs from vertex lighting in that parameters of type "color" are clamped to the range 0–1.0 when specified. This limits overflow scenarios. Dot products must be clamped to zero as mentioned in the GL spec describing the lighting equations, section 2.13. Overflow must be analyzed in the following cases:

Exponentiation

Exponentiation will not result in overflow because in all cases we are raising a value that is less than 1.0 (typically a dot product of normalized vectors) to a given power.

Renormalization of Surface Normal Vector

Set the vector to an arbitrary value, say (0, 0, 1). Zero of this vector is a pathological case. Fragment provides a normalized value for the input, and the transform applied in bump consists either of a rotation or an offset in a plane perpendicular to the normal. It is possible for the user to create inverted or even zero normals through injudicious (i.e. really stupid) choice of the basis vectors. Too Bad.

Renormalization of Fragment-to-eye Vector

Set the vector to (0, 0, 1). Should be impossible because the eye location is excluded from the viewing frustum. The above value is a reasonable failsafe.

Renormalization of Fragment-to-light Vector

Set the vector to (0, 0, 0). This case may in fact occur, but will be limited to a single fragment. The light is coincident with the surface. For immediately adjoining fragments, this vector will be lying within the surface, and so it's dot product with the normal will be zero. Setting this vector to (0,0,0) will force the same result for this fragment, avoiding discontinuities in lighting.

Renormalization of Halfangle Vector

Set the vector to (1, 0, 0). This case may occur if the light vector is parallel to the eye vector. In this case the half angle vector is determined only to lie in a plane perpendicular to the eye vector and (1, 0, 0) is as good as anything.

TABLE P1

| data item | item name | bits/ item | items/ packet | bits/ packet | bytes/ packet | shared factor | bytes/ fragment | notes |
|---|---|---|---|---|---|---|---|---|
| Header=?????? | sHead | 6 | 1 | 6 | 0.75 | 2 | 0.38 | |
| Num Fragments | nFrags | 2 | 1 | 2 | 0.25 | 2 | 0.13 | |
| Num Textures | nTxtrs | 4 | 1 | 4 | 0.5 | 2 | 0.25 | |
| Material Index | MTIX | 5 | 1 | 5 | 0.625 | 2 | 0.31 | |
| Light Index | LDIX | 3 | 1 | 3 | 0.375 | 2 | 0.19 | |
| VSP Pointer | VSPptr | 8 | 1 | 8 | 1 | 2 | 0.50 | |
| Per-fragment data: | | | | | | | | |
| normal unit vector | nx, ny, nz | 16 | 3 | 48 | 6 | 1 | 6.00 | Up to 4 fragments |
| Primary color | cPrim[R, G, B, A] | 8 | 4 | 32 | 4 | 1 | 4.00 | |
| Secondary color | cSec[R, G, B] | 8 | 3 | 24 | 3 | 1 | 3.00 | |
| | | | | 132 | 16.5 | | 14.75 | |
| | | | | | to | | 250.00 M | Fragments/sec |
| | | | | | 55.5 | | 3,687.50 M | Bytes/second |

TABLE P2

| data item | item name | bits/ item | items/ packet | bits/ packet | bytes/ packet | shared factor | bytes/ fragment | notes |
|---|---|---|---|---|---|---|---|---|
| Header=?????? | sHead | 6 | 1 | 6 | 0.75 | 2 | 0.38 | |
| NumFragments | nFrags | 2 | 1 | 2 | 0.25 | 2 | 0.13 | |
| NumTextures | nTxtrs | 4 | 1 | 4 | 0.5 | 2 | 0.25 | |
| Material Index | MTIX | 5 | 1 | 5 | 0.625 | 2 | 0.31 | |
| LightIndex | LDIX | 3 | 1 | 3 | 0.375 | 2 | 0.19 | |
| VSP Pointer | VSPptr | 8 | 1 | 8 | 1 | 2 | 0.50 | |
| Per-fragment data: | | | | | | | | Up to 4 fragments |
| normal unit vector | nx, ny, nz | 16 | 3 | 48 | 6 | 1 | 6.00 | |
| Primary color | cPrim[R, G, B, A] | 8 | 4 | 32 | 4 | 1 | 4.00 | |

TABLE P2-continued

| data item | item name | bits/ item | items/ packet | bits/ packet | bytes/ packet | shared factor | bytes/ fragment | notes |
|---|---|---|---|---|---|---|---|---|
| Secondary color | cSec[R, G, B] | 8 | 3 | 24 | 3 | 1 | 3.00 | |
| normal magnitude | mn | 24 | 1 | 24 | 3 | 1 | 3.00 | |
| surface tangent s unit vector | dxs, dys, dzs | 16 | 3 | 48 | 6 | 1 | 6.00 | |
| surface tangent t unit vector | dxt, dyt, dzt | 16 | 3 | 48 | 6 | 1 | 6.00 | |
| surface tangent s magnitude | ms | 24 | 1 | 24 | 3 | 1 | 3.00 | |
| surface tangent t magnitude | mt | 24 | 1 | 24 | 3 | 1 | 3.00 | |
| eye x, y, z | xe, ye, ze | 24 | 3 | 72 | 9 | 1 | 9.00 | |
| | | | | 372 | 46.5 | | 44.75 | |
| | | | | | to | | 125.00 | M Fragments/sec |
| | | | | | 175.5 | | 5,593.75 | M Bytes/second |

TABLE P3

| data item | Item Name | bits/ item | items/ packet | bits/ packet | bytes/ packet | notes |
|---|---|---|---|---|---|---|
| Header=?????? | sHead | 6 | 1 | 6 | 0.75 | |
| packet length in 16 bits | packLength | 8 | 1 | 8 | 1.00 | |
| Material cache index | MCIX | 5 | 1 | 5 | 0.63 | |
| Texel Data Format | txtrTxlDataFmt | 4 | 8 | 32 | 4.00 | |
| Txtr GL Base Internal format | txtrGlBaseIntFmt | 3 | 8 | 24 | 3.00 | |
| Txtr apply mode | txtrApplyMode | 3 | 8 | 24 | 3.00 | |
| Txtr front/back face flag | txtrFront | 2 | 8 | 16 | 2.00 | |
| Txtr Apply sub-mode | txtrSubMode | 3 | 8 | 24 | 3.00 | 1 |
| Txtr env mode | txtrEnMode | 3 | 8 | 24 | 3.00 | |
| Txtr env color | txtrEnvColor | 32 | 8 | 256 | 32.00 | |
| Txtr env bias | txtrEnvBias | 32 | 8 | 256 | 32.00 | |
| Txtr env sign bits | txtrEnvSigns | 3 | 8 | 24 | 3.00 | |
| Fragment front/back flag | fragFront | 1 | 1 | 1 | 0.13 | |
| Fragment Material . . . | | | | 0 | 0.00 | |
| emmisive | fragMatEmiss | 8 | 3 | 24 | 3.00 | |
| ambient | fragMatAmb | 8 | 3 | 24 | 3.00 | |
| diffuse | fragMatDiff | 8 | 4 | 32 | 4.00 | |
| specular | fragMatSpec | 8 | 3 | 24 | 3.00 | |
| shininess | fragMatShin | 24 | 1 | 24 | 3.00 | |
| Shininess Cutoff | ShinCutoff | 8 | 1 | 8 | 1.00 | |
| ColorMaterial enable | cmEnable | 1 | 1 | 1 | 0.13 | 2 |
| ColorMaterial front/back flag | cmFront | 2 | 1 | 2 | 0.25 | |
| ColorMaterialMode | cmMode | 3 | 1 | 3 | 0.38 | |
| | | | | | 105.25 | |
| | | | | | 1.1250 | M Miss rate per sec |
| | | | | | 118.41 | M Bytes per second |

1 Of these bits, 3 are needed to indicate which light for light-texture cases
2 Color material may be infrequently used, could be put an optional area of a variable length packet if bandwidth becomes an issue.

TABLE P4

| data item | item name | bits/ item | items/ packet | bits/ packet | bytes/ packet | notes |
|---|---|---|---|---|---|---|
| Header=?????? | sHead | 6 | 1 | 6 | 0.75 | |
| packet length in 16 bits | packLength | 8 | 1 | 8 | 1.00 | |
| Light cache index | LCIX | 3 | 1 | 3 | 0.38 | |
| Global mode info . . . | | | | | | |
| Global Ambient Color | glAmb | 8 | 4 | 32 | 4.00 | |
| Fragment light enable | flEnable | 1 | 1 | 1 | 0.13 | |
| Local Viewer enable | lvEnable | 1 | 1 | 1 | 0.125 | |
| FogMode | fogMode | 2 | 1 | 2 | 0.25 | |
| Fog Parameter 1 | fogParm1 | 24 | 1 | 24 | 3 | |
| Fog Parameter 2 | fogParm2 | 24 | 1 | 24 | 3 | |
| Fog Color | fogColor | 8 | 3 | 24 | 3.00 | |

TABLE P4-continued

| data item | item name | bits/ item | items/ packet | bits/ packet | bytes/ packet | notes |
|---|---|---|---|---|---|---|
| ColorIndexMode | colorIndexMode | 1 | 1 | 1 | 0.13 | RGBA (RGBA mode), single float (color index mode) |
| Per-Light info . . . | | | | | | ?? Include ALL lights in the packet? |
| Kc (constant atten.) | kAttenConst | 24 | 1 | 24 | 3 | 1 |
| Kl (linear atten.) | kAttenLin | 24 | 1 | 24 | 3 | 1 |
| Kq (quadratic atten.) | kAttenQuad | 24 | 1 | 24 | 3 | |
| Sc (spot cutoff) | spotCut | 16 | 1 | 162 | | |
| Se (spot exponent) | spotExp | 24 | 1 | 24 | 3 | |
| Spotlight Direction | spotDir | 16 | 3 | 48 | 6 | Unit vector |
| Acl (light ambient color) | cLAmb | 8 | 3 | 24 | 3 | |
| Dcl (light diffuse color) | cLDiff | 8 | 3 | 24 | 3 | |
| Scl (light specular color) | cLSpec | 8 | 3 | 24 | 3 | |
| Distance Cutoff | distCut | 24 | 1 | 24 | 3 | |
| | | | | | 47.75 | |
| | | | | | 75 | Miss rate per sec |
| | | | | | 3581.25 | Bytes per se |

1 For inifinte light, these two fields hold 48-bit halfangle vector.

TABLE P5

| data item | item name | bits/ item | items/ packet | bits/ packet | bytes/ packet | notes |
|---|---|---|---|---|---|---|
| Texel Data | Txl | 36 | 1 | 36 | 4.5 | 1 |
| | | | | | 4.5 | |
| | | | | | 2.50E+08 | Fragments/sec |
| | | | | | 1.13E+09 | bytes/sec. |

1 Interpretation of data depends on flags in material cache. (0–8 textures may be present.)

TABLE P8

| | bytes | | bytes |
|---|---|---|---|
| Single-fragment full rate VSP storage | 17 | Half-rate VSP | 47 |
| Single-texel texture storage | 5 | | 5 |
| Bytes per entry | 22 | | 52 |
| Number of entries | 200 | | 200 |
| Total Size | 4400 | | 10400 |

TABLE P6

| data item | item name | bits/ item | items/ packet | bits/ packet | bytes/ packet | shared factor | bytes/ frag | notes |
|---|---|---|---|---|---|---|---|---|
| Header=?? | sHead | 2 | 1 | 2 | 0.25 | 2 | 0.125 | |
| VSP Pointer | VSPPtr | 8 | 1 | 8 | 1 | 2 | 0.5 | |
| Per fragment data: | | | | | | | | |
| Fragment color | cFrag[R, G, B, A] | 8 | 4 | 32 | 4 | 1 | 4 | |
| | | | | | | | 4.625 | |
| | | | | | | | 2.50E+08 | Frags/sec |
| | | | | | | | 1.16E+09 | Bytes/sec |

TABLE P7

| data item | item name | bits/ item | items/ packet | bits/ packet | bytes/ packet | shared factor | bytes/ frag | notes |
|---|---|---|---|---|---|---|---|---|
| Header=?? | sHead | 2 | 1 | 2 | 0.25 | 2 | 0.125 | |
| VSP Pointer | VSPPtr | 8 | 1 | 8 | 1 | 2 | 0.5 | |
| Depth from texture | ZFrag | 24 | 1 | 24 | 3 | 1 | 3 | |
| | | | | | | | 3.625 | |
| | | | | | | | 2.50E+08 | Frags/sec |
| | | | | | | | 9.06E+08 | Bytes/sec |

TABLE P9

| data item | item name | bits/ item | # items | total bits | total bytes | notes |
|---|---|---|---|---|---|---|
| Global Ambient Color | glAmb | 8 | 4 | 32 | 4.00 | |
| Fragment light enable | flEnable | 1 | 1 | 1 | 0.13 | |
| Local Viewer enable | lvEnable | 1 | 1 | 1 | 0.13 | |
| FogMode | fogMode | 2 | 1 | 2 | 0.25 | |
| Fog parameter 1 | fogParm1 | 24 | 1 | 24 | 3.00 | |
| Fog parameter 2 | fogParm2 | 24 | 1 | 24 | 3.00 | |
| Fog Color | fogColor | 8 | 3 | 24 | 3.00 | RGBA (RGBA mode), single float(color index mode) |
| ColorIndexMode | colorIndexMode | 1 | 1 | 1 | 0.13 | |
| | | | | | 13.63 | Sum of global state |
| Per-Light values . . . | | | | | | |
| Kc (constant atten.) | kAttenConst | 24 | 1 | 24 | 3.00 | |
| Kl (linear atten.) | kAttenLin | 24 | 1 | 24 | 3.00 | |
| Kq (quadratic atten.) | kAttenQuad | 24 | 1 | 24 | 3.00 | |
| Sc (spot cutoff) | spotCut | 16 | 1 | 16 | 2.00 | |
| Se (spot exponent) | spotExp | 24 | 1 | 24 | 3.00 | |
| Spot Direction | spotDir | 16 | 3 | 48 | 6.00 | Unit vector |
| Light Half-angle | H | 16 | 3 | 48 | 6.00 | Unit vector for infinite light/viewer |
| Acl (light ambient color) | cLAmb | 8 | 3 | 24 | 3.00 | |
| Dcl (light diffuse color) | cLDiff | 8 | 3 | 24 | 3.00 | |
| Scl(light specular color) | cLSpec | 8 | 3 | 24 | 3.00 | |
| Distance Cutoff | distCut | 24 | 1 | 24 | 3.00 | |
| | | | | | 38.00 | Sum of per-light state |
| | | | | | 64 | # per-light cache entries |
| | | | | | 2541 | Total storage |

TABLE P10

| data item | Item Name | bits/ item | # items | # bits | # bytes | notes |
|---|---|---|---|---|---|---|
| Txtr environment color | txtrEnvC | 32 | 8 | 256 | 32.00 | 8 textures, 4 color components |
| Texel Data Format | txtrTxlDataFmt | 4 | 8 | 32 | 4.00 | |
| Txtr GL Base Internal format | txtrGlBaseIntlFmt | 2 | 8 | 16 | 2.00 | |
| Txtr apply mode | txtrApplyMode | 3 | 8 | 24 | 3.00 | |
| Txtr front/back face flag | txtrFront | 2 | 8 | 16 | 2.00 | FRONT, BACK, or FRONT_AND_BACK |
| Txtr apply submode | txtrSubMode | 3 | 8 | 24 | 3.00 | 1 |
| Txtr env mode | txtrEnvMode | 3 | 8 | 24 | 3.00 | |
| Txtr env bias | txtrEnvBias | 32 | 8 | 256 | 32.00 | 8 textures, 4 color components |
| Txtr env sign bits | TxtrEnvSigns | 3 | 8 | 24 | 3.00 | |
| Fragment front/back flag | fragFront | 1 | 1 | 1 | 0.13 | |
| Fragment Material . . . | | | | 0 | 0.00 | |
| emmisive | fragMatEmiss | 8 | 3 | 24 | 3.00 | |
| ambient | fragMatAmb | 8 | 3 | 24 | 3.00 | |
| diffuse | fragMatDiff | 8 | 4 | 32 | 4.00 | |
| specular | fragMatSpec | 8 | 3 | 24 | 3.00 | |
| shininess | fragMatShin | 24 | 1 | 24 | 3.00 | |
| Shininess Cutoff | shinCut | 8 | 1 | 8 | 1.00 | |
| ColorMaterial enable | cmEnable | 1 | 1 | 1 | 0.13 | |
| ColorMaterial front/back flag | cmFront | 2 | 1 | 2 | 0.25 | FRONT, BACK, or FRONT_AND_BACK |
| ColorMaterial Mode | cmMode | 3 | 1 | 3 | 0.38 | |
| | | | | 812 | 101.88 | |
| | | | | 32 | 32 | #cache entries |
| | | | | 25984 | 3260 | Total storage |

1 Of these bits, 3 are to select among lights in light-texture cas

TABLE P11

| TexelDataFormat | # values | # bits/ value | Range | Unpack To | Notes |
|---|---|---|---|---|---|
| TDF_4_8_u_0 | 4 | 8 | 0–1.0 | RGBA | |
| TDF_3_8_u_0 | 3 | 8 | 0–1.0 | RGB0 | |
| TDF_3_12_s_0 | 3 | 12 | −1.0–+1.0 | RGB0 | |
| TDF_2_16_u_0 | 2 | 16 | 0–1.0 | R00A | |
| TDF_2_16_s_0 | 2 | 16 | −1.0–+1.0 | R00A | |

TABLE P11-continued

| TexelDataFormat | # values | # bits/ value | Range | Unpack To | Notes |
|---|---|---|---|---|---|
| TDF_1_8_u_0 | 1 | 8 | 0–1.0 | R000 or 000A | 1 |
| TDF_1_12_s_0 | 1 | 12 | −1.0–+1.0 | R000 or 000A | |

TABLE P11-continued

| TexelDataFormat | # values | # bits/ value | Range | Unpack To | Notes |
|---|---|---|---|---|---|
| TDF_1_16_u_0 | 1 | 16 | 0–1.0 | R000 or 000A | |
| TDF_1_16_s_0 | 1 | 16 | −1.0–+1.0 | R000 or 000A | |
| TDF_1_16_u_9 | 1 | 16 | 0–128.0 | R000 or 000A | |
| TDF_1_24_u_0 | 1 | 24 | 0–1.0 | R000 or 000A | 2 |

Pixel Ownership for write enables and overlay detection
Scanout using Pixel Ownership
Fixed ratio zooms
3D Accumulation Buffer
Frame Buffer read and writes
Color key to winid map
VGA
RAMDAC 3D Tile Read BKE receives prefetched Tile Begin commands from PIX. These packets originate at SRT and bypass all 3D units to provide the latency needed to read the content of a tile buffer.

TABLE P12

| Texture Map | Texture Function | | | | |
|---|---|---|---|---|---|
| Base Internal Format | REPLACE | MODULATE | DECAL | BLEND CC | ADD (Cc Ac), (Cb Ab) |
| ALPHA | C = Cf | C = Cf | undefined | C = Cf | C = Cf |
| At | A = At | A = Af At | | A = Af At | A = Af At |
| LUMINANCE | C = Lt | C = Cf Lt | | C = Cf (1 − Lt) + Cc Lt | C = S0 Cf + Si Lt Cc + S2 Cb |
| Lt | A = Af | A = Af | | A = Af | A = Af |
| LUMINANCE_ | C = Lt | C = Cf Lt | | C = Cf (1 − Lt) + Cc Lt | C = S0 Cf + S1 Lt Cc + S2 Cb |
| ALPHA | A = At | A = Af At | | A = Af At | A = Af At |
| Lt, At | | | | | |
| INTENSITY | C = It | C = Cf It | | C = Cf (1 − It) + Cc It | C = S0 Cf + S1 It Cc + S2 Cb |
| It | A = It | A = Af It | | A = Af (1 − It) + Ac It | A = S0 Af + S1 It Ac + S2 Ab |
| RGB | C = Ct | C = Cf Ct | C = Ct | C = Cf (1 − Ct) + Cc Ct | C = S0 Cf + S1 Ct Cc + S2 Cb |
| Ct | A = Af | A = Af | A = Af | A = Af | A = Af |
| RGBA | C = Ct | C = Cf Ct | C = Cf (1 − At) + Ct At | C = Cf (1 − Ct) + Cc Ct | C = S0 Df + S1 Ct Cc + S2 Cb |
| Ct, At | A = At | A = Af At | A = Af | A = Af At | A = Af At |

XI. Detailed Description of the Backend Functional Block (BKE)

Functional Overview

Terminology

The following terms are defined below before they are used to ease the reading of this document. The reader may prefer to skip this section and refer to it as needed.

Pixel Ownership (PO BOX) is a sub-unit that determines for a given pixel on the screen the window ID it belongs. Using this mechanism, scanout determines if there is an overlay window associated with that pixel, and 3D tile write checks the write permission for that pixel.

BKE Bus is the interconnect that interfaces BKE with TDG, CFD and AGI. This bus is used to read and write into the Frame Buffer Memory and BKE registers.

Frame Buffer (FB) is the memory controlled by BKE that holds all the color and depth values associated with 2D and 3D windows. It includes the screen buffer that is displayed on the monitor by scanning-out the pixel colors at refresh rate. It also holds off screen overlay and p-buffers, display lists and vertex arrays, and accumulation buffers. The screen buffer and the 3D p-buffers can be dual buffered.

Main Functions

Figure 15:
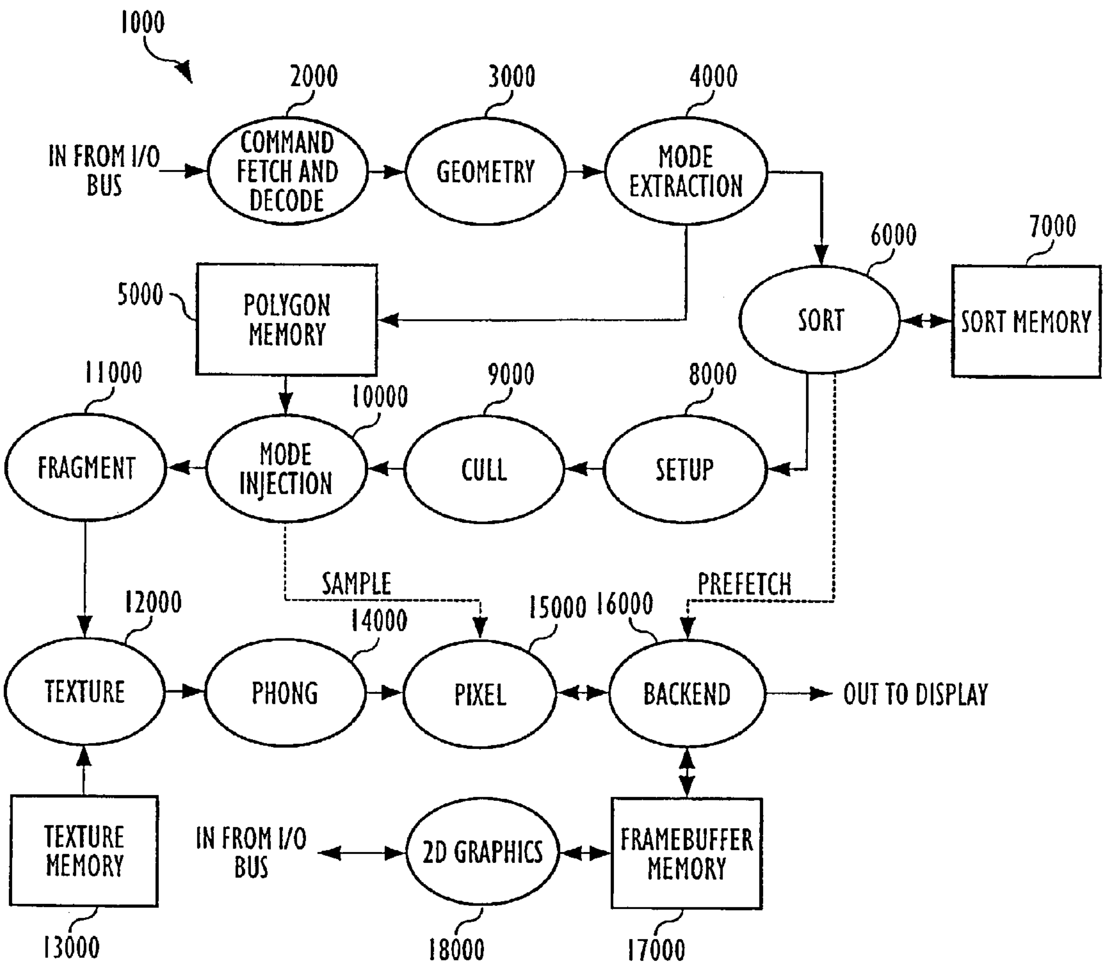
FIG. 15 is a diagramatic illustration showing an exemplary flow of data through blocks of an embodiment of the pipeline.
Figure 66:
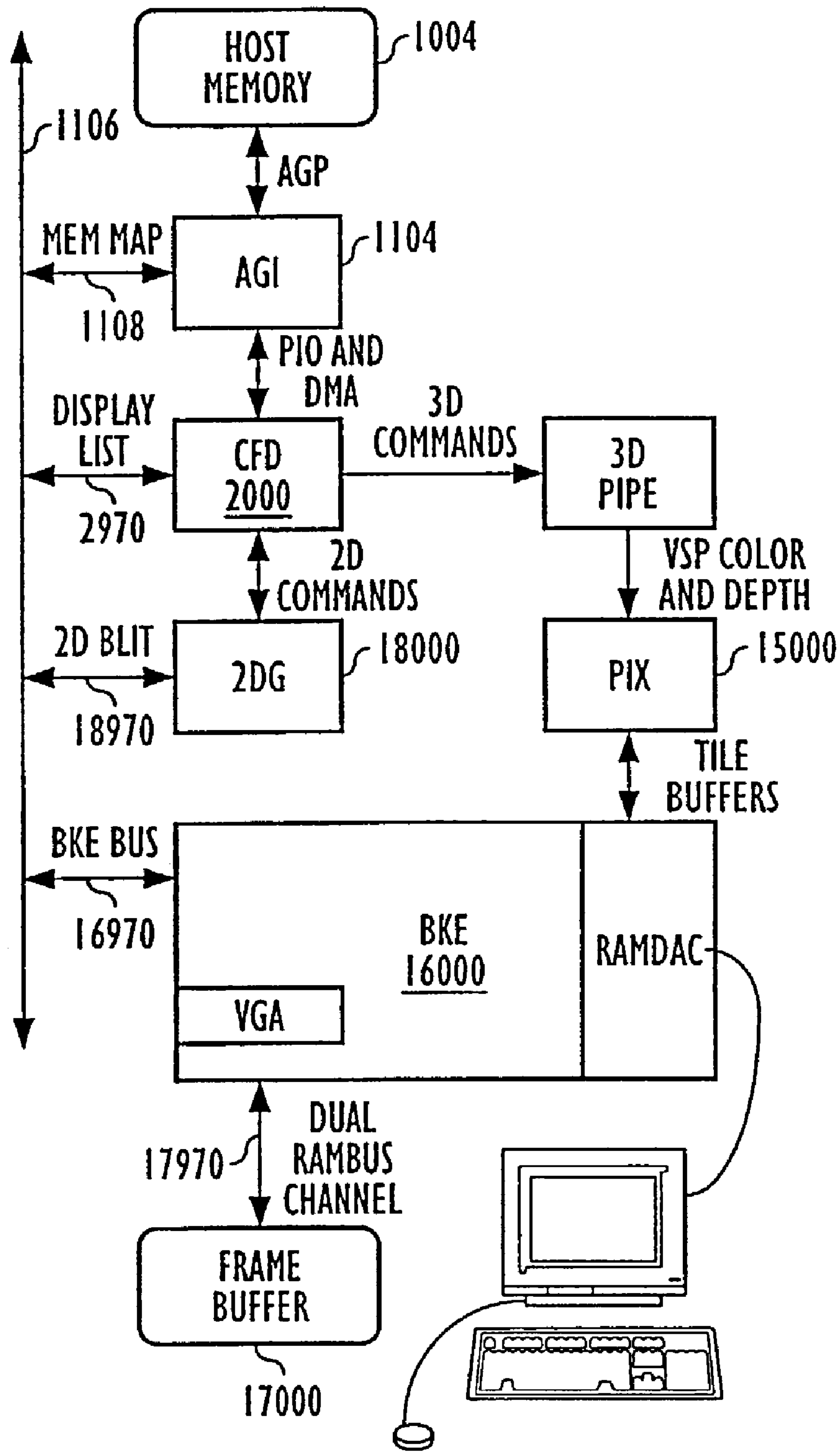
FIG. 66 is a diagrammatic illustration showing the Back-End Block (BKE) and units interfacing to it.

FIG. 66 shows the BackEnd with the units interfacing to it. As it is seen in the diagram, BKE mostly interacts with the Pixel Unit to read and write 3D tiles, and the 2D graphics engine 18000 (illustrated in FIG. 15) to perform Blit operations. The CFD unit uses the BKE bus to read display lists from the Frame Buffer. The AGI Unit 1104 reads and write BKE registers and the Memory Mapped Frame Buffer data.

The main BackEnd functions are:

3D Tile read
3D Tile write using Pixel Ownership

The 3D window characteristics are initialized by the Begin Frame commands received earlier similarly from PIX. These characteristics include addresses for the color and depth surfaces, the enable bits for the planes (alpha, stencil, A and B buffers), the window width, height and stride, the color format, etc.

The pixel addresses are calculated using the window parameters. Taking advantage of tile geometry, 16 pixels are fetched with a single memory read request.

The Pixel Ownership is not consulted for 3D tile reads. If the window is in the main screen, the ownership (which window is on top) is determined during the write process.

Pixels are not extended to 24 bit colors for reduced precision colors, but unpacked into 32 bit pixel words. Depth values are read if needed into separate buffers.

Frequently Begin Tile command may indicate that no tile reading is required because a clear operation will be applied. The tile buffer is still allocated and pixel ownership for tile write will start.

3D Tile Write

3D Tile Write process starts as soon as a 3D tile read is finished. This latency is used to determine the pixel ownership write enables. The tile start memory address is already calculated during the 3D Tile Read process. The write enables are used as write masks for the Rambus Memory based Frame Buffer. The colors are packed as specified by the color depth parameter before written into the Frame Buffer.

Pixel Ownership

Pixel ownership is used to determine write enables to the shared screen and identify overlay windows for scanout reads.

The pixel ownership block include 16 bounding boxes as well as a per pixel window id map with 8 bit window ids. These window ids point to a table describing 64 windows. Separate enable bits for the bounding box and winid map mechanisms allow simultaneous use. Control bits are used to determine which mechanism is applied first.

Pixel ownership uses screen x and y pixel coordinates. Each bounding box specifies the maximum and minimum pixel coordinates that are included in that window. The bounding boxes are ordered such that the top window is specified by the last enabled bounding box. The bounding boxes are easy to set up for rectangular shaped windows. They are mostly intended for 3D windows but when a small number of 2D windows are used this mechanism can also be used to clip 2D windows.

For arbitrary shaped and larger number windows, a more memory intensive mechanism is used. An 8-bit window id map per pixel is optionally maintained to identify the window that a given screen pixel belongs.

For writes, if the window id of the tile matches the pixel id obtained by pixel ownership, the pixel write is enabled. For scanout, transition from screen to overlays and back are detected by comparing the pixel ownership window id with the current scanout window id.

To accelerate the pixel ownership process, the per pixel check is frequently avoided by performing a 16 pixels check. In case an aligned horizontal 16-pixel strip all share the same window id, this can be determined in one operation.

Scanout

Scanout reads the frame buffer color and sends the data to the RAMDAC for display. Scanout is the highest priority operation on the Frame Buffer. Pixels to be scanned out are passed through the read Pixel ownership block to do virtual blits, overlays, etc. A relatively large queue is used at the input to the RAMDAC to smooth out the irregular latencies involved with handling overlays and taking advantage of horizontal blanking periods.

Palette and Gamma corrections are performed by the RAMDAC. A fixed ratio zoom out function is performed by the backend during scanout.

Scanout has to be able to achieve 120 Hz refresh rates for a 1600 by 1200 screen with a reduced 3D performance. At full 3D performance, a minimum of 75 Hz refresh rate is required.

Scanout supports four different pixel color formats per window. All windows on the main screen share the same pixel color format. The supported color formats are:

32-bit RGBA (8-8-8-8)

24-bit RGB (8-8-8)

16-bit RGB (5-6-5)

8-bit color index

Scanout writes always 24 bits into the Scanout Queue (SOQ). No color conversion or unpacking is performed. The lower bits are cleared for 8 and 16-bit colors. Additional two bits are used to indicate the per-pixel color format.

Interlaced scanout is also supported for certain stereo devices.

Real time 3D applications need to speed up rendering by drawing to a small window and zooming the small image to a large window. This zooming with bilinear interpolation is done as the pixels are scanned out.

BKE supports certain fixed ratios for scaling: 16/n, n=1 . . . 15 in each direction. Sample points and interpolation coefficients are downloaded by software prior to the zoom operation.

Up to four window can be zoomed out using the same fixed ratio (same coefficients). Zoom bounding boxes are compared for scanned out pixels to determine if the pixels need to be taken from the zoom function output. The zoom logic is operational continuously to be able to sequence the coefficient table indices. Therefore the zoom output is ignored if the window id of the scanout does not match with the window id of the zoom boxes.

No overlap is allowed for the window zoom boxes.

3D Accumulation Buffers

BKE supports a 64-bit (16 bits per color) accumulation buffer. Accumulation commands are received as tween packets between frames. They perform multiplication and addition functions with the 3D tile colors, accumulation buffer colors and immediate values. The results are written into either the accumulation buffer or the 3D tiles.

When the scissor test is enabled, then only those pixels within the current scissor box are updated by any Accum operation; otherwise all pixels in the window are updated.

When pixels are written back into the 3D tiles, dithering and Color masking is also applied in addition to the scissor test. Accumulation buffers are not used for color index mode.

Frame Buffer Read and Writes

The BKE provides read and write interfaces for all internal sub-units and external units. AGI, CFD and TDG make Frame Buffer read and write requests using the BKE Bus. BKE arbitrates bus requests from these units.

The internal sub-units use the Mem Bus to access the Frame Buffer. 3D tile reads, 3D tile writes, Accumulation buffer read and writes, pixel ownership winid map reads, scanout screen and overlay reads, zoom window reads, and color key winid map writes, all use the Mem Bus to access the Frame Buffer.

Two Rambus Memory Channels with a total 3.2 Gbyte/sec bandwidth capability are used to sustain the performance requirements for the Frame Buffer. The scanout and zoom reads have the highest priority.

Color Key Window ID Map Writes

Window's color key functionality is provided by BKE via the window id map. The pixels that have a special color key will have their corresponding window id map set to point to the window the appropriate window (key_id_on). When writes with window id key_id_on happens only the pixels that are color keyed will be replaced.

BKE includes a special feature that software can use to create window id maps for color keys. The winid for a pixel may be written when a color buffer write occurs in a special window and the colors are in a certain range.

RAMDAC

The RAMDAC is used to convert digital color values into analog signals. A software programmable color palette converts 8 bit color indexes to 24 bit RGB values. The same RAM is also used to perform look-up based gamma correction. The look-up RAM is organized as three 256×10 bit SRAMs, one for each component of the color.

The RAMDAC can operate up to 300 MHz and generates the pixel clocks. It accepts pixels from the VGA core or from the Scanout Queue. The RAMDA777C is acquired as a core from SEI. This document will only specify the interface with the core and basic requirements for its functionality.

VGA

The VGA core is used only during boot time and by full screen compatibility applications running under Windows NT. VGA core interfaces with BKE bus for register read and writes, with the Mem Bus for Frame Buffer read and writes and with RAMDAC for scanout in VGA mode. When the VGA unit is disabled its scanout is ignored.

The VGA core is acquired from Alpin Systems. This document will only specify the interface with the core and basic requirements for its functionality.

The BKE Bus

As described in the CFD description, there is a Backend Input Bus and Backend Output Bus, which together are called the BKE Bus.

Figure 67:
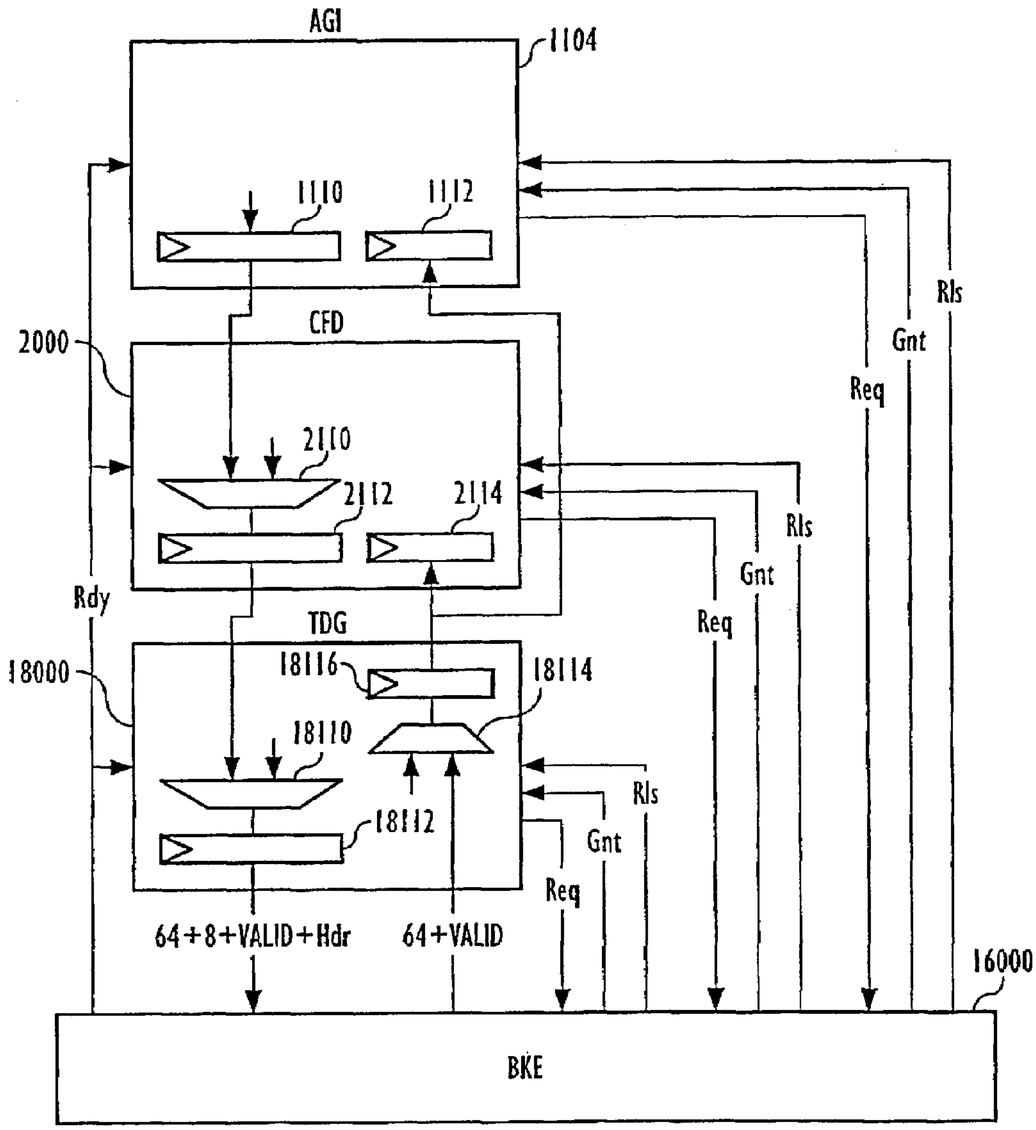
FIG. 67 is a diagrammatic illustration showing external client units that perform memory read and write through the BKE.

The external client units that perform memory read and write through the BKE are AGI, CFD and TDG, see FIG. 67.

These units follow a request/grant protocol to obtain the ownership of the BKE bus. Once a client is granted the bus, it can post read or write packet to the BKE and sample the read data from the BKE.

A client asks for BKE bus ownership by asserting its Req signal. BKE will arbitrate this request versus other conditions. BKE will assert Gnt signal when the requesting client is granted ownership. After finishing its memory access, the current owner can voluntarily release ownership by removing Req, or keep its ownership (park) until receives Rls (Release) signal from BKE. Client usually should relinquish ownership within limited time after receives RIs signal. For example, the client should no longer post new read/write request to BKE. If there is a pending read, the client should release ownership as soon as the last read data is returned.

XII Detailed Description of the Geometry Functional Block (GEO)

Many hardware renderers have been developed. See, for example, Deering et al., "Leo: A System for Cost Effective 3D Shaded Graphics," SIGGRAPH93 Proceedings, 1–6 August 1993, Computer Graphics Proceedings, Annual Conference Series (ACM SIGGRAPH, 1993, Soft-cover ISBN 0-201-58889-7 and CD-ROM ISBN 0-201-56997-3, herein "Deering et al." and incorporated by reference), particularly at pages 101 to 108. Deering et al. includes a diagram of a generic 3D-graphics pipeline (that is to say, a renderer, or a rendering system) that it describes as "truly generic, as at the top level nearly every commercial 3D graphics accelerator fits this abstraction." This pipeline diagram is reproduced here as FIG. H 6. (In this figure, the blocks with rounded corners typically represent functions or process operations, while sharp-cornered rectangles typically represent stored data or memory.)

Such pipeline diagrams convey the process of rendering but do not describe any particular hardware. This document presents a new graphics pipeline that shares some of the steps of the generic 3D-graphics pipeline. Each of the steps in the generic 3D-graphics pipeline is briefly explained here. (Processing of polygons is assumed throughout this document, but other methods for describing 3D geometry could be substituted. For simplicity of explanation, triangles are used as the type of polygon in the described methods.)

As seen in FIG. H 6, the first step within the floating point-intensive functions of the generic 3D-graphics pipeline after the data input (step 612) is the transformation step (step 614), described above. The transformation step also includes "get next polygon."

The second step, the clip test, checks the polygon to see if it is at least partially contained in the view volume (sometimes shaped as a frustum) (step 616). If the polygon is not in the view volume, it is discarded. Otherwise, processing continues.

The third step is face determination, where polygons facing away from the viewing point are discarded (step 618). Generally, face determination is applied only to objects that are closed volumes.

The fourth step, lighting computation, generally includes the set up for Gouraud shading and/or texture mapping with multiple light sources of various types but could also be set up for Phong shading or one of many other choices (step 622).

The fifth step, clipping, deletes any portion of the polygon that is outside of the view volume because that portion would not project within the rectangular area of the viewing plane (step 624). Conventionally, coordinates including color texture coordinates must be created for each new primative. Polygon clipping is computationally expensive.

The sixth step, perspective divide, does perspective correction for the projection of objects onto the viewing plane (step 626). At this point, the points representing vertices of polygons are converted to pixel-space coordinates by step seven, the screen space conversion step (step 628).

The eighth step (step 632), set up for an incremental render, computes the various begin, end and increment values needed for edge walking and span interpolation (e.g.: x, y and z coordinates, RGB color, texture map space, u and v coordinates and the like).

Within the drawing-intensive functions, edge walking (step 634) incrementally generates horizontal spans for each raster line of the display device by incrementing values from the previously generated span (in the same polygon), thereby "walking" vertically along opposite edges of the polygon. Similarly, span interpolation (step 636) "walks" horizontally along a span to generate pixel values, including a z-coordinate value indicating the pixel's distance from the viewing point. Finally, the z-test and/or alpha blending (also referred to as Testing and Blending) (step 638) generates a final pixel-color value. The pixel values also include color values, which can be generated by simple Gouraud shading (that is to say, interpolation of vertex-color values) or by more computationally expensive techniques such as texture mapping (possibly using multiple texture maps blended together), Phong shading (that is to say, per-fragment lighting) and/or bump mapping (perturbing the interpolated surface normal).

After drawing-intensive functions are completed, a double-buffered MUX output look-up table operation is performed (step 644). The generic 3D-graphics pipeline includes a double-buffered framebuffer, so a double-buffered MUX is also included. An output lookup table is included for translating color-map values.

By comparing the generated z-coordinate value to the corresponding value stored in the Z Buffer, the Z-test either keeps the new pixel values (if it is closer to the viewing point than previously stored value for that pixel location) by writing it into the framebuffer or discards the new pixel values (if it is farther).

At this step, antialiasing methods can blend the new pixel color with the old pixel color. The z-buffered blend generally includes most of the per-fragment operations, described below.

Finally, digital-to-analog conversion makes an analog signal for input to the display device.

We now turn our atttention to particular aspects of the invention.

Herein are described apparatus and methods for rendering 3D-graphics images. In one embodiment, the apparatus include a port for receiving commands from a graphics application, an output for sending a rendered image to a display and a geometry-operations pipeline, coupled to the port and to the output, the geometry-operations pipeline including a block for performing transformations. In one embodiment, the block for performing transformations includes a co-extensive logical and first physical stages, as well as a second physical stage including multiple logical stages. The second physical stage includes multiple logical stages that interleave their execution.

Abbreviations

Following are abbreviations which may appear in this description, along with their expanded meaning:

BKE: the back-end block 84C.
CFD: the command-fetch-and-decode block 841.
CUL: the cull block 846.
GEO: the geometry block 842.
MEX: the mode-extraction block 843.
MIJ: the mode-injection block 847.
PHG: the Phong block 84A.
PIX: the pixel block 84B.
PXO: the pixel-out block 280.
SRT: the sort block 844.
TEX: the texture block 849.
VSP: a visible stamp portion.

Overview

The Rendering System

FIG. H 8 illustrates a system 800 for rendering three-dimensional graphics images. The rendering system 800 includes one or more of each of the following: data-processing units (CPUs) 810, memory 820, a user interface 830, a co-processor 840 such as a graphics processor, communication interface 850 and communications bus 860.

Of course, in an embedded system, some of these components may be missing, as is well understood in the art of embedded systems. In a distributed computing environment, some of these components may be on separate physical machines, as is well understood in the art of distributed computing.

The memory 820 typically includes high-speed, volatile random-access memory (RAM), as well as non-volatile memory such as read-only memory (ROM) and magnetic disk drives. Further, the memory 820 typically contains software 821. The software 821 is layered: Application software 8211 communicates with the operating system 8212, and the operating system 8212 communicates with the I/O subsystem 8213. The I/O subsystem 8213 communicates with the user interface 830, the co-processor 840 and the communications interface 850 by means of the communications bus 860.

The user interface 830 includes a display monitor 831.

The communications bus 860 communicatively interconnects the CPU 810, memory 820, user interface 830, graphics processor 840 and communication interface 850.

As noted earlier, U.S. Pat. No. 4,996,666 describes SAMs, which may be used to implement memory portions in the present invention, for example in the graphics unit.

The address space of the co-processor 840 may overlap, be adjacent to and/or disjoint from the address space of the memory 820, as is well understood in the art of memory mapping. If, for example, the CPU 810 writes to an accelerated graphics port at a predetermined address and the graphics co-processor 840 reads at that same predetermined address, then the CPU 810 can be said to be writing to a graphics port and the graphics processor 840 to be reading from such a graphics port.

The graphics processor 840 is implemented as a graphics pipeline, this pipeline itself possibly containing one or more pipelines. FIG. H 3 is a high-level block diagram illustrating the components and data flow in a 3D-graphics pipeline 840 incorporating the invention. The 3D-graphics pipeline 840 includes a command-fetch-and-decode block 841, a geometry block 842, a mode-extraction block 843, a sort block 844, a setup block 845, a cull block 846, a mode-injection block 847, a fragment block 848, a texture block 849, a Phong block 84A, a pixel block 84B, a back-end block 84C and sort, polygon, texture and framebuffer memories 84D, 84E, 84F, 84G. The memories 84D, 84E, 84F, 84G may be a part of the memory 820.

The command-fetch-and-decode block 841 handles communication with the host computer through the graphics port. It converts its input into a series of packets, which it passes to the geometry block 842. Most of the input stream consists of geometrical data, that is to say, vertices that describe lines, points and polygons. The descriptions of these geometrical objects can include colors, surface normals, texture coordinates and so on. The input stream also contains rendering information such as lighting, blending modes and buffer functions.

The geometry block 842 handles four major tasks: transformations, decompositions of all polygons into triangles, clipping and per-vertex lighting calculations for Gouraud shading. Block 842 preferably also generates texture coordinates including bi-normals and tangents.

The geometry block 842 transforms incoming graphics primitives into a uniform coordinate space ("world space"). It then clips the primitives to the viewing volume ("frustum"). In addition to the six planes that define the viewing volume (left, right, top, bottom, front and back), the Subsystem provides six user-definable clipping planes. Preferably vertex color is computed before clipping. Thus, before clipping, geometry block 842 breaks polygons with more than three vertices into sets of triangles, to simplify processing.

Finally, if there is any Gouraud shading in the frame, the geometry block 842 calculates the vertex colors that the fragment block 848 uses to perform the shading.

The mode-extraction block 843 separates the data stream into two parts: vertices and everything else. Vertices are sent to the sort block 844. Everything else (lights, colors, texture coordinates, etc.), it stores in the polygon memory 84E, whence it can be retrieved by the mode-injection block 847. The polygon memory 84E is double buffered, so the mode-injection block 847 can read data for one frame while the mode-extraction block 843 is storing data for the next frame.

The mode data stored in the polygon memory falls into three major categories: per-frame data (such as lighting), per-primitive data (such as material properties) and per-vertex data (such as color). The mode-extraction and mode-injection blocks 843, 847 further divide these categories to optimize efficiency.

For each vertex, the mode-extraction block 843 sends the sort block 844 a packet containing the vertex data and a pointer (the "color pointer") into the polygon memory 84E. The packet also contains fields indicating whether the vertex represents a point, the endpoint of a line or the corner of a triangle. The vertices are sent in a strictly time-sequential order, the same order in which they were fed into the pipeline. Vertice data also encompasses vertices created by clipping. The packet also specifies whether the current vertex forms the last one in a given primitive, that is to say, whether it completes the primitive. In the case of triangle strips ("fans") and line strips ("loops"), the vertices are shared between adjacent primitives. In this case, the packets indicate how to identify the other vertices in each primitive.

The sort block 844 receives vertices from the mode-extraction block 843 and sorts the resulting points, lines and triangles by tile. (A tile is a data structure described further below.) In the double-buffered sort memory 84D, the sort block 844 maintains a list of vertices representing the graphic primitives and a set of tile pointer lists, one list for each tile in the frame. When the sort block 844 receives a vertex that completes a primitive, it checks to see which tiles the primitive touches. For each tile a primitive touches, the sort block adds a pointer to the vertex to that tile's tile pointer list.

When the sort block 844 has finished sorting all the geometry in a frame, it sends the data to the setup block 845. Each sort-block output packet represents a complete primitive. The sort block 844 sends its output in tile-by-tile order: all of the primitives that touch a given tile, then all of the primitives that touch the next tile, and so on. Thus, the sort block 844 may send the same primitive many times, once for each tile it touches.

The setup block 845 calculates spatial derivatives for lines and triangles. The block 845 processes one tile's worth of data, one primitive at a time. When the block 845 is done, it sends the data on to the cull block 846.

The setup block 845 also breaks stippled lines into separate line segments (each a rectangular region) and computes the minimum z value for each primitive within the tile.

Each packet output from the setup block 845 represents one primitive: a triangle, line segment or point.

The cull block 846 accepts data one tile's worth at a time and divides its processing into two steps: SAM culling and sub-pixel culling. The SAM cull discards primitives that are hidden completely by previously processed geometry. The sub-pixel cull takes the remaining primitives (which are partly or entirely visible) and determines the visible fragments. The sub-pixel cull outputs one stamp's worth of fragments at a time, herein a "visible stamp portion." (A stamp is a data structure described further below.)

FIG. H 9 shows an example of how the cull block 846 produces fragments from a partially obscured triangle. A visible stamp portion produced by the cull block 846 contains fragments from only a single primitive, even if multiple primitives touch the stamp. Therefore, in the diagram, the output VSP contains fragments from only the gray triangle. The fragment formed by the tip of the white triangle is sent in a separate VSP, and the colors of the two VSPs are combined later in the pixel block 84B.

Each pixel in a VSP is divided into a number of samples to determine how much of the pixel is covered by a given fragment. The pixel block 84B uses this information when it blends the fragments to produce the final color of the pixel.

The mode-injection block 847 retrieves block-mode information (colors, material properties, etc.) from the polygon memory 84E and passes it downstream as required. To save bandwidth, the individual downstream blocks cache recently used mode information. The mode-injection block 847 keeps track of what information is cached downstream and only sends information as necessary.

The main work of the fragment block 848 is interpolation. The block 848 interpolates color values for Gouraud shading, surface normals for Phong shading and texture coordinates for texture mapping. It also interpolates surface tangents for use in the bump-mapping algorithm if bump maps are in use.

The fragment block 848 performs perspective-corrected interpolation using barycentric coefficients, and preferably also handles texture level of detail manipulations.

The texture block 849 applies texture maps to the pixel fragments. Texture maps are stored in the texture memory 84F. Unlike the other memory stores described previously, the texture memory 84F is single buffered. It is loaded from the memory 820 using the graphics port interface.

Textures are mip-mapped. That is to say, each texture comprises a series of texture maps at different levels of detail, each map representing the appearance of the texture at a given distance from the eye point. To reproduce a texture value for a given pixel fragment, the text block 849 performs tri-linear interpolation from the texture maps, to approximate the correct level of detail. The texture block 849 also performs other interpolation methods, such as anisotropic interpolation.

The texture block 849 supplies interpolated texture values (generally as RGBA color values) to the Phong block 84A on a per-fragment basis. Bump maps represent a special kind of texture map. Instead of a color, each texel of a bump map contains a height field gradient or a normal vector.

The Phong block 84A performs Phong shading for each pixel fragment. It uses the material and lighting information supplied by the mode-injection block 847, the texture colors from the texture block 849 and the surface normal generated by the fragment block 848 to determine the fragment's apparent color. If bump mapping is in use, the Phong block 847 uses the interpolated height field gradient from the texture block 849 to perturb the fragment's surface normal before shading.

The pixel block 84B receives VSPs, where each fragment has an independent color value. The pixel block 84B performs a scissor test, an alpha test, stencil operations, a depth test, blending, dithering and logic operations on each sample in each pixel. When the pixel block 84B has accumulated a tile's worth of finished pixels, it blends the samples within each pixel (thereby performing antialiasing of pixels) and sends then to the back end 84C for storage in the framebuffer 84G.

FIG. H 10 demonstrates how the pixel block 84B processes a stamp's worth of fragments. In this example, the pixel block receives two VSPs, one from a gray triangle and one from a white triangle. It then blends the fragments and the background color to produce the final pixels. The block 84B weights each fragment according to how much of the pixel it covers or, to be more precise, by the number of samples it covers.

(The pixel-ownership test is a part of the window system and is left to the back end 84C.)

The back-end block 84C receives a tile's worth of pixels at a time from the pixel block 84B and stores them into the framebuffer 84G. The back end 84C also sends a tile's worth of pixels back to the pixel block 84B because specific framebuffer values can survive from frame to frame. For example, stencil-bit values can remain constant over many frames but can be used in all of those frames.

In addition to controlling the framebuffer 84G, the back-end block 84C performs pixel-ownership tests, 2D drawing and sends the finished frame to the output devices. The block 84C provides the interface between the framebuffer 84G and the monitor 831 and video output.

The Geometry Block

The geometry block 842 is the first computation unit at the front end of the graphical pipeline 840. The engine 842 deals mainly with per-vertex operations, like the transformation of vertex coordinates and normals. The Frontend deals with fetching and decoding the Graphics Hardware Commands. The Frontend loads the necessary transform matrices, material and light parameters and other mode settings into the input registers of the geometry block 842. The geometry block 842 sends transformed vertex coordinates, normals, generated and/or transformed texture coordinates and per-vertex colors to the mode-extraction and sort blocks 843, 844. The mode-extraction block 843 stores the "color" data and modes in the polygon memory 84E. The sort block 844 organizes the per-vertex "spatial" data by tile and writes it into the sort memory 84D.

FIG. H 2 is a block diagram illustrating the components and data flow in the geometry block 842. The block 842 includes a transformation unit 210, a lighting unit 220 and a clipping unit 230. The transformation unit 210 receives data from the command-fetch-and-decode block 841 and outputs to both the lighting and the clipping units 220, 230. The lighting unit 220 outputs to the clipping unit 230. The clipping unit 230 outputs to the mode-extraction and sort blocks 843, 844.

FIG. H 4 is a block diagram of the transformation unit 210. The unit 210 includes a global packet controller 211 and two physical stages: a pipeline stage A 212 and a pipeline stage BC 213. The global packet controller 211 receives data from the command-fetch-and-decode block 841 and an auxiliary ring (not shown). The unit 212 outputs to the pipeline stage A 212. The pipeline stage A 212 outputs to the pipeline stage BC 213. The stage BC 213 outputs to the lighting and clipping units 220, 230.

FIG. H 13 is a block diagram of the clipping sub-unit 230. The unit 230 includes synchronization queues 231, clipping and formatting sub-units 232, 233 and output queue 234. The synchronization queues 231 receive input from the transformation and lighting units 210, 220 and output to the clipping sub-unit 232. The clipping sub-unit 232 in turn outputs to the format sub-unit 233 that itself in turn outputs to the output queue 234. The queue 234 outputs to the mode-extraction block 843.

FIG. H 13 also gives an overview of the pipeline stages K through N as the clipping sub-unit 230 implements them. The clipping sub-unit 233 includes three logical pipeline stages: K, L and M. The format sub-unit 234 one: N.

The output queue 234 does not work on pipeline stage boundaries. Rather, it sends out packets whenever valid data is in its queue and the mode-extraction block 843 is ready.

FIG. H 5 is a block diagram of the global packet controller 211. The controller 211 includes a CFD interface state machine 2111, an auxiliary-ring control 2112, an auxiliary-ring standard register node 2113, an auxiliary-ring interface buffer 2114, buffers 2115, 2116, 2117 and MUXes 2118, 2119, 211A.

The CFD interface state machine 2111 receives input from the command-fetch-and-decode unit 841 via the CFD command and data bus, from the auxiliary ring controller 2112 via a Ring_Request signal 211B and from a Data_Ready and Texture Queue Addresses from Pipeline Stage K signals 211D, and 211C, where signal 211C is a handshake signal between CFD and GEO. The state machine 2111 generates Write_Address and Write_Enable signals 211E, 211F as control inputs to the MUX 2118, as well as Acknowledgment and Advance_Packet/Pipeline signals 211G, 211H.

The auxiliary-ring controller 2112 receives as input a Ring_Request signal 211L from the node 2113 and Control from Pipeline Stage P 211K. The controller 2112 generates four signals: a Ring_Command 211M as input to the MUX 2118, an unnamed signal 211N as input to the buffer 2114, an Address/Data_Bus 211O as input to the MUX 2119 and the Ring_Request signal 211B input to the state machine 2111.

The auxiliary-ring standard register node 2113 receives as input the auxiliary-ring bus from the command-fetch-and-decode block 841 and the Address/Data_Bus 211O from the controller 2112. The node 2113 generates two signals: the Ring_Request signal 211L to the controller 2112 and the auxiliary-ring bus to the mode-extraction block 843.

The auxiliary-ring interface buffer 2114 receives as input the output of the MUX 2119 and the unnamed signal 211N from the controller 2112 and generates an unnamed input 211P to the MUX 211A.

The dual-input MUX 2118 receives as input the command bus from the command-fetch-and-decode command bus and the Ring_Command signal 211M from the controller 2112. Its output goes to the pipeline stage A command register.

The dual-input MUX 2119 receives as input the data bus from the pipeline stage P and the Address/Data_Bus 211O. Its outputs is the input to the buffer 2114.

The dual-input MUX 211A receives as input the unnamed signal 211P and the Data_Bus from the command-fetch-and-decode block 841. Its output goes to the pipeline stage A vertex buffer 2121.

FIG. H 11 and FIG. H 12 are block diagrams of the pipeline stage A 212. The stage A 212 includes an instruction controller 2126 and data-path elements including: an input buffer 2121, a matrix memory 2125, parallel math functional units 2122, an output buffer 2123 and various MUXes 2124. FIG. H 11 illustrates the stage A 212 data-path elements, and FIG. H 12 illustrates the instruction controller 2126.

The vertex buffer A 2121 receives as input the output of the global packet controller MUX 211A and generates outputs 2127 to the four SerMod_F32 serial dot-product generators 2122 through the MUXes 2124*b* and 2124*d.*

The vertex buffer A 2121 also generates outputs 2126 that, through the MUXes 2124*e*, the delay elements 2127 and the MUXes 2124*c*, form the bus 2125. The bus 2125 feeds the vertex buffers BC 2123 and the matrix memory 2125.

The matrix memory 2125 receives as input the output 2125 of the MUXes 2124*c* and generate as output the A input for the parallel serial dot-product generators 2122.

The serial dot-product generators 2122 receives as their A inputs the output of the matrix memory 2125 and as their B inputs the outputs of the MUXes 2124*d*. The products generated are inputs to the MUXes 2124*c*.

The vertex buffers BC 2123 receive as inputs the bus 2125 output from the MUXes 2124*c* and generate two outputs: an input to the MUXes 2124*b* and an output to the stage B cross bar.

The vertex buffers 2121, 2123 are double buffers, large enough to hold two full-performance-vertex worth of data.

The tri-input MUXes 2124*b* receive as inputs an unnamed signal from stage B, an output from the vertex buffers BC 2123, and the output 2127 from the vertex buffer A 2121. The outputs of the MUXes 2124*b* are inputs to respective MUXes 2124*d.*

Each of the quad-input MUXes 2124*d* receives as inputs the four outputs of the four MUX 2124*b*. The output of a MUX 2124*d* is the B input of a respective serial dot-product generator 2122.

Each of the bi-input MUXes 2124*e* receives as inputs the output of a respective MUX 2124*b* and an output 2126 of the vertex buffer A 2121. The output of a MUX 2124*e* is the input of respective delay element 2127.

The input of a delay element 2127 is the output of a respective MUX 2124*e*, and the output of the element 2127 is an input of a respective MUX 2124*c*.

The inputs of a bi-input MUX 2124*c* are the R output of a respective serial dot-product generator 2122 and the output of a respective delay element 2127.

As illustrated in FIG. H 12, the instruction controller 2126 includes a geometry command word (GCW) controller 1210, a decoder 1220, a jump-table memory 1230, a jump table 1240, a microcode instruction memory 1250, a texture state machine 1260, hardware instruction memory 1270, a write-enable memory 1280, field-merge logic 1290 and a command register 12A0.

FIG. H 16 illustrates the pipeline stage BC 213. The stage BC 213 includes the vertex buffers BC 2123, the scratch-pad memory 2132, the math functional units 2133, as well as the delay elements 2134, the MUXes 2135 and the registers 2136.

FIG. H 15 is a block diagram of the synchronization queues 231 and the clipping sub-unit 232. FIG. H 15 shows the separate vertex-data synchronization queues 231*a*, 231*b* and 231*c* for spatial, texture and color data, respectively.

FIG. H 15 also shows the primitive-formation header queues 2321, 2323, 2324 composing the clipping sub-unit 232. The sub-unit 232 also includes a scratch-pad GPR 2322, a functional math unit 2325, a delay element 2326, MUXes 2327 and registers 2328. The spatial, texture and color queues 231*a–c* feed into the primitive, texture and color queues 2321, 2323, 2324, respectively. (The spatial queue 231 feeds into the primitive queue 2321 through the MUX 2327*h*.)

The primitive queue 2321 receives input from the MUX 2327*h* and outputs to the MUXes 2327*a*, 2327*d* and 2327*e* from a first output and to the MUXes 2327*c* and 2327*e* from a second output.

The text queue 2323 outputs to the MUXes 2327*a* and 2327*f*.

The color queue 2324 outputs to the MUXes 2327*a* and 2327*c*.

The functional math unit 2325 receives input from the MUX 2327*d* at its A input, from the MUX 2327*e* at its B input and from the MUX 2327*b* at its C input. The outputs $U_1$ and Δ feed into the MUXes 2327*d* and 2327*e*, respectively. The output R feeds into the MUXes 2327*g*, 2327*d*, 2327*e* and the MUXes 2327*b* and 2327*d* (again) via a register 2328.

The delay element 2326 receives as input the output of the MUX 2327*b* and generates an output to the MUX 2327*g*.

The quad-input MUX 2327*a* receives input each of the primitive, texture and color queues 2321, 2323, 2324. The MUX 2327*a* outputs to the MUXes 327*b* and 2327*e*.

The quad-input MUX 2327*b* receives input from the primitive queue 2321, the scratch-pad GPR 2322, the MUX 2327*a* and the R output of the functional math unit 2325 via a hold register 2328. The MUX 2327*b* generates an output to (the C input of) the math unit 2325 and the delay element 2326.

The bi-input MUX 2327*c* receives as inputs the second output of the primitive queue 2321 and the output of the color queue 2324. The MUX 2327*c* outputs to the MUX 2327*f* directly and through a hold register 2328.

The quint-input MUX 2327*d* receives as inputs the R output of the math unit 2325, directly and through a hold register 2328, as well as the $U_1$ output of the math unit 2325, the output of the scratch-pad 2322 and the first output of the primitive queue 2321. The MUX 2327*d* generates an output to the A input of the math unit 2325.

The quint-input MUX 2327*e* receives as inputs the R output of the math unit 2325, directly and through a hold register 2328, as well as the Δ output of the math unit 2325, the output of the MUX 2327*a* and the second output of the primitive queue 2321. The MUX 2327*e* generates an output to the B inputs of the math unit 2325.

The bi-input MUX 2327*f* receives as inputs the output of the MUX 2327*c* directly and through a hold register 2328, as well as the output of the texture queue 2323. The MUX 2327*e* generates an output to the vertex buffer 2329 between the clipping and format sub-units 232 233.

The bi-input MUX 2327*g* receives as inputs the R output of the math unit 2325 and the output of the delay element 2326. The MUX 2327*g* generates an output into the MUX 2327*h* and the scratch-pad GPR through a hold register 2328.

The bi-input MUX 2327*h* receives as inputs the output of the MUX 2327*g* (through a hold register 2328) and the output of the spatial queue 231*a*. The output of the MUX 2327*h* feeds into the primitive queue 2321.

The math unit 2325 is an mathFunc-F32 dot-product generator.

FIG. H 17 is a block diagram of the instruction controller 1800 for the pipeline stage BC 213. The instruction controller 1800 includes command registers 1810, a global-command-word controller 1820, a decoder 1830, a jump-table memory 1840, hardware jump table 1850, microcode instruction memory 1860, hardware instruction memory 1870, field-merge logic 1880 and write-enable memory 1890.

FIG. H 14 is a block diagram of the texture state machine.

Protocols

The geometry block 842 performs all spatial transformations and projections, Vertex lighting, texture-coordinates generation and transformation, surface-tangents computations (generation, transformation and cross products), line stipple-pattern wrapping, primitive formation, polygon clipping, and Z offset. Further, the geometry block 842 stores all of the transformation matrices and the Vertex lighting coefficients. The block 842 contains several units: transform 210, lighting 220, and clipping 230.

For a ten million triangles-per-second rate, the geometry block 842 processes vertices at a rate of about 1/20 cycles, assuming that about 90% of the time vertex data is available for processing and that vertices are in the form of triangle strips. Since the pipeline #_840 design is for average-size triangles at this rate, the performance of remainder of the pipeline 840 fluctuates according to the geometry size. The geometry block 842 compensates for this by selecting a maximum rate slightly better than this average rate. There is virtually no latency limitation.

Thus, the geometry block 842 is a series of 20-cycle pipeline stages, with a double or triple buffer between each of the stages. An upstream pipeline stage writes one side of a buffer while the downstream stage reads from the other side data previously written to that side of the buffer.

In addition to vertex data, the geometry block 842 also receives state information. The geometry block 842 could consume this state information or pass it down to blocks later in the graphics pipeline 840. Since a state change does not affect data ahead of it in the pipeline 840, the geometry block 842 handles state as though it were vertex data: It passes it through in order.

The geometry block 842 also controls the data bus connecting itself and the mode-extraction block 843. Using 32-bits wide bus yields slightly better bandwidth than required for the 10 million triangles/second goal (at 333 MHz).

The Transformation Unit

The transformation unit 210 transforms object coordinates ($X_o$, $Y_o$, $Z_o$, $W_o$) to eye coordinates ($X_e$, $Y_e$, $Z_e$, $W_e$), or directly transforms them to clip coordinates (Xc, Yc, Zc, Wc). The transformation unit also calculates window coordinates Xw, Yw, Zw, and further implements stipple repeat-pattern calculations. The transformation unit 210 transforms user-provided texture coordinates (So, To, Ro, Qo) into eye coordinates (Se, Te, Re, Qe) or, if requested by the application it generates them from the spatial data. Effectively, this transforms spatial data in eye (EYE_LINEAR) or object space (OBJECT_LINEAR) into texture coordinates in object space. The transformation unit 210 provides a third type of texture-generation mechanism: namely, namely, generating texture coordinates that preferably access a texture representing the surface of a sphere, e.g., for use in reflection mapping using OpenGL or other methodolgies."

The transformation unit 210 transforms normal-vector object coordinates (Nxo, Nyo, Nzo) into eye coordinates (Nxe, Nye, Nze). The same transformation can apply to bi-normal object coordinates (Bxo, Byo, Bzo) and surface-tangent object coordinates (Gxo, Gyo, Gzo) to generate eye-coordinate representation of these vectors (Bxe, Bye, Bze, and Gxe, Gye, Gze). Similar to the texture coordinates, bi-normal and surface-tangent vectors can be generated from spatial data. Additionally, various options of vector cross-product calculations are possible, depending on the bump-mapping algorithm currently active. Regardless of the method of attaining the normal, bi-normal and surface-tangent vectors, the transformation unit 210 converts the eye coordinates into magnitude and direction form for use in the lighting sub-unit and in the phong unit.

The trivial reject/accept test for both the user defined and the view volume clip planes are performed on each vertex. The results of the test are passed down to the clipping unit 230. The area calculation determining the visibility of the front or the back face of a primitive is also calculated here, and the result is passed down to the clipping unit 230.

The Vertex Lighting Unit

The Vertex lighting unit 220 implements the per-vertex computations for the twenty-four Vertex lights, combining all enabled lights before they leave this unit. The total specular component may not be combined with the remaining light components if the SINGLE_COLOR mode is not set. This allows interpolation of the specular component independent of the rest of the light information later in the pipeline.

The lighting unit 220 also implements the "color material" state and substitutions (Vertex only).

The Polygon-Clipping/Primitive-Formation Unit

The clipping unit 230 has a duplicate copy of the user-defined clip plane, while the view-volume plane (Wc), which is loaded by the aux rng, passes down with vertex data. This unit 230 tests every polygon to determine if the shape is fully inside or fully outside the view volume. A primitive that is neither fully inside or fully outside it clips off until the remaining shape is fully inside the volume. Because interpolation of the data between vertices that are part of a filled primitive occurs later in the pipeline, the original vertex information is retained with the new vertex spatial information. The clipping unit 230 interpolates line primitives at a significant performance cost. This preferred implementation advantageously avoids the necessity to create new spatial data and new texCoords narmals, colors, etc. at verticles that are created in the clipping process.

The OpenGL specification defines ten distinct types of geometric primitives: points, lines, line strips, line loops, triangles, triangle strips, triangle fans, quadrilaterals, quadrilateral strip, and polygons. However, the design of the pipeline 840 is based on processing triangles, so the clipping unit 230 breaks polygons with more than 3 vertices into smaller components. Additionally, the clipping unit 230 implements operations that change the data associated with a shading, for example, vertix flat-type shading.

The geometry block 842 stores data in 32-bit floating-point format. However, the data bus to the mode-extraction block 843 is only 24 bits. Thus, the clipping unit 230 converts, clamps and packs data before its leaving the unit. The bus to the mode-extraction block 843 leaves directly from this unit 230.

Input and Output

The geometry block 842 interfaces with the command-fetch-and-decode block 841, an auxiliary ring and the mode-extraction block 843. The command-fetch-and-decode block 841 is the normal source of input packets to the geometry block 842, and MEX is the normal sink for output packets from The geometry block 842. The auxiliary ring provides special access to the hardware not normally associated with processing geometry, such as micro-code or random access to The geometry block 842 data-path registers.

Normal input to the geometry block 842 is from the command-fetch-and-decode block 841. Special inputs from the auxiliary ring download micro-code instructions and non-pipelined graphics functions like context switching.

The interface to the command-fetch-and-decode block 841 consists of a data bus, command bus, and several control signals. Together these buses and signals move packets from the command-fetch-and-decode block 841 to the geometry block 842.

The command-fetch-and-decode block 841 queues up packet data for the geometry block 842, and when a complete packet and command word exist, it signals by raising the Data_Ready flag. Processed vertices can require multiple packet transfers to transfer an entire vertex, as described further below.

As the geometry block 842 reads a word off of the data bus,_raises the Acknowledge signal for one cycle. (As only complete packets of 24 words are transferred, the acknowledge signal is high for 12 clocks.) Further, the geometry block 842 attempts to transfer a packet only at pipeline-cycle boundaries, and the minimum pipeline cycle length is 16 machine cycles. The packets consist of 12 data-bus words, W0 through W11, and one command-bus word.

The global command word's second and third most significant bits (MSBs) determine how the geometry block 842 processes the packet. The bits are the Passthrough and the Vertex flags. If set (TRUE), the Passthrough flag indicates the packet passes through to the mode-extraction block 843. If clear (FALSE), the flag indicates that the geometry block 842 processes/consumes the packet.

If set, the Vertex flag indicates the packet is a vertex packet. If clear, the flag indicates the packet is a mode packet.

The format of a consumed mode packet is described below. Bit 31 is reserved. Bits 30 and 29 are the Passthrough and Vertex flags. Bits 28–25 form an operation code, while bits 24–0 are Immediate data.

The operation code has any of ten values including: General_Mode, Material, View_Port_Parameters, Bump_State, Light_Color, Light_State, Matrix_Packet and Reserved. The packet and immediate data corresponding to each of these operation codes is described in turn below.

Auxiliary-ring I/O uses a subset of the consumed mode packet operation codes, including Ring_Read_Request, Ring_Write_Request and Microcode_Write. For these packets, the IMMEDIATE data have fields for logical pipeline stage (4-bits), physical memory (4-bits), and address (10-bits) that account for the worst case in each pipeline stage.

A general mode packet delivers the remainder of the mode bits required by the geometry block 842.

A material packet delivers material color and state parameters.

A view-port packet contains view port parameters.

A bump packet delivers all parameters that are associated with surface tangents and bump mapping.

A light-color packet contains specific light color parameters.

A light-state packet contains light model parameters.

A matrix packet delivers matrices for matrix memory. The packet is used for all texture parameters, user clip planes and all spatial matrices.

The format of a processed vertex packet is described below. Bit 31 is reserved. Bits 30 and 29 are the Passthrough and Vertex flags. Bits 28–27 form a vertex size, bits 6–3 form a primitive type, bits 2–1 form a vertex sequence, and bit 0 is an edge flag. Each of these fields is described in turn below.

(Bits 26–7 of a processed-vertex packet are unused.)

The vertex size indicates how many packet exchanges complete the entire vertex transfer: 1, 2 or 3. With vertex size set to 1, the one packet is a full-performance vertex packet that transfers spatial, normal, texture[0] and colors. With vertex size set to 2, each of the two packets is a half-performance vertex packet. The first packet is identical to the full-performance vertex packet. The second packet transfers texture[1], bi-normal and tangent. With vertex size set to 3, each of the three packets is a third-performance vertex packet. The first two packets are identical to the half-performance packets. The third packet transfers texture [2-7].[1]

[1] Actually, there is only one packet ever transferred. Multiple exchanges and multiple transfers can occur per packet, but there is only one packet transferred.

The Primitive Type is a 4-bit field specifying the primitive type formed by the vertex: points, lines, line strips, line loops, triangles, triangle strips, triangel fans, quads, quad strips and polygons.

The Vertex Sequence is a 2-bit field specifying the sequence of the vertex in a primitive: First, Middle, Last or First_and_Last. First specifies the first vertex in a primitive, Middle specifies a vertex in the middle, and Last specifies the last vertex in a primitive. First_and_Last specifies a single point that is both the first and last vertex in a primitive.

The Edge flag specifies that the polygon edge is a boundary edge if the polygon render mode is FILL. If the polygon render mode is LINE, specifies if the edge is visible. Finally, if the polygon render mode is POINT, it specifies that the point is visible.

0—Boundary or visible

1—Non-boundary or invisible

A Size-1 (full-performance) vertex packet delivers a Size-1 vertex in one transfer.

A Size-2 (half-performance) vertex packet delivers a Size-two vertex in two consecutive transfers. The geometry block 842 reads the command bus only once during this packet. Once the transformation unit 210 starts to process a vertex, it does not pause that processing, so the two data transfers occur on consecutive pipeline cycles. (The command-fetch-and-decode block 841 does not assert Data Ready until it can guarantee this.) The position of the parameters in the packet is fixed with the possible exception of texture coordinates. If the tangent generation is enabled (TANG_GEN=1), then the texture specified for use in tangent generation (BUMP_TXT[2:0]) swaps position in the packet with texture zero. BUMP_TXT can only be set to zero or one for size 2 vertices.

A Size-3 (third-performance) vertex packet delivers a Size-3 vertex in three consecutive transfers. As with the Size-2 vertex packet, the geometry block 842 reads the command bus only once during this packet. Once the transformation unit 210 starts to process a vertex, it does not pause that processing, so the three data transfers occur on consecutive pipeline cycles. (The command-fetch-and-decode block 841 does not assert Data Ready until it can guarantee this.) The position of the parameters in the packet is fixed with the possible exception of texture coordinates. If the tangent generation is enabled (TANG_GEN=1), then the texture specified for use in tangent generation (BUMP_TXT [2:0]) swaps position in the packet with texture zero. BUMP_TXT can only be set to zero or seven for size three vertices.

Propagated Mode packets move up to 16 words of data unaltered through the geometry block 842 to the mode-extraction block output bus. A command header is placed on the mode-extraction block bus followed by Length words of data, for a total of LENGTH+1 words.

The format of a Propagated Mode packet is described below. Bit 31 is reserved. Bits 30 and 29 are the Passthrough and Vertex flags. Bits 20-16 form a Length field. (Bits 28-21 and 15-0 are unused.)

Length is a five-bit field specifying the number of (32-bit) words that are in the data portion of the packet. In one embodiment, values range from 0 to 16.

The format of a Propagated Vertex packet is described below. Bit 31 is reserved. Buts 30 and 29 are the Passthrough and Vertex flags. Bits 20-16 form a Length field. (Bits 28-21 and 15-0 are unused.)

A Propagated Vertex packet performs like a Propagated Mode packet except that the geometry block 842 discards the command word as it places the data on the mode-extraction block output bus, for a total of Length words.

The geometry pipeline 840 uses the auxiliary ring as an interface for special packets for controlling the geometry block 842 during startup, initialization and context switching. The packets use consumed mode command words (Passthrough=FALSE, Vertex=FALSE) and thus share the same command word description as the consumed mode command words from the command-fetch-and-decode block 841. The ring controller in the geometry block 842 has access to the command-fetch-and-decode block 841 data and command bus before it enters the first physical pipeline stage in the transformation sub-unit, so the majority of the geometry block 842 has no knowledge of the source of the packet. The command-fetch-and-decode block 841 gets priority, so (for good or bad) it can lock the ring off the bus.

Normal output from the geometry block 842 is to the mode-extraction block 843. Special outputs to the auxiliary ring help effect non-pipelined graphics functions such as context switching.

The interface to the mode-extraction block 843 includes a data bus and two control signals, for example Data Valid. A Data Valid pulse accompanies each valid word of data. The interface hardware controls a queue on the mode-extraction block side. Geometry block 842 is signalled when there are thirty-two entries left to ensure that the current pipeline cycle can finish before the queue is full. Several additional entries compensate for the signal travel time.

The mode-extraction block 843 recognizes the first entry in the queue as a header and decodes it to determine the length of the packet. The block 843 uses this length count to recognize the next header word.

There are four types of packets output from the geometry block 842: color vertex, spatial vertex, propagated mode, and propagated vertex. Each of these packets is described in turn below.

The color vertex and spatial vertex packets are local packets that are the result of processed vertex input packets. The propagated output packets correspond one for one to the propagated input packets.

A Color Vertex packet contains the properties associated with a vertex's position. Every vertex not removed by back face culling or clipped off by volume clip planes (trivial reject or multiply planes exclude complete polygon) produces a single vertex color packet. The size of the packet depends on the size of the input vertex packet and the state at the time the packet is received.

A Spatial Vertex packet contains the spatial coordinates and relationships of a single vertex. Every input vertex packet not removed by back face culling or clipped off by volume clip planes (trivial reject or multiply planes exclude complete polygon) produces a spatial vertex packet corresponding to the exact input vertex coordinates. Additional spatial vertices are formed when a clip plane intersects a polygon or line, and the polygon or line is not completely rejected.

An output Propagated Mode packet is identical to its corresponding input packet.

An output Propagated Vertex packet contains all of the data of its corresponding input packet, but its command word was been stripped off. The geometry block 842 does not output the input command word. Nonetheless, the Length field from the command word sets the number of valid words put on the output bus. Thus, LENGTH=data words for Propagated Vertex packets.

The Geometry Block

The geometry block 842 functions as a complete block from the perspective of the rest of the blocks in the pipeline 840. Internally, however, the block 842 functions as a series of independent units.

The transformation unit 210 regulates the inflow of packets to the geometry block 842. In order to achieve the high-latency requirement of the spherical-texture and surface-tangent computations, the block 842 bypasses operands from the output back to its input across page-swap boundaries. Thus, once a packet (typically, a vertex) starts across the transformation unit 120, it does not pause midway across the unit. A packet advances into the logical pipeline stage A 212 when space exists in the synchronization queues 231 for the entire packet.

The lighting unit 220 also bypasses from the functional unit output to input across page-swap boundaries. To facilitate this, are placed at its input and output buffer the lighting unit 220. The queues work together to ensure that the lighting unit 220 is always ready to process data when the transformation unit 210 has data ready.

Each record entry in the input queue has a corresponding record entry in the output queue. Thus, the lighting unit 220 has room to process data whenever the transformation unit 210 finds room in the synchronization queue. Packets in the synchronization queues become valid only after the lighting unit 220 writes colors into its output queue. When the output queue is written, the command synchronization queue is also written.

The clipping unit 230 waits until there is a valid packet in the synchronization queues. When a packet is valid, the clipping unit 230 moves the packet into the primitive-formation queues 231. The output of the geometry block 842 is a simple double buffer.

The internal units 210, 220, 230 are physical pipeline stages. Each physical pipeline stage has its own independent control mechanism that is synchronized to the rest of the block 842 only on pipeline-stage intervals.

The clipping unit 230 has some rather unique constraints that cause it to stop and start much more erratically than the remainder of the block b842.

At system reset, the pipeline is empty. All of the Full signals are cleared, and the programmable pipeline-cycle counter in the unit controller begins to count down. When the counter decrements past zero, the Advance_Pipeline signal is generated and distributed to all of the pipeline-stage controllers. The counter is reset to the programmed value.

If there is a valid request to the geometry block 842 pending, a packet enters the top of the pipeline from either the command-fetch-and-decode block 841 or the auxiliary ring. (The auxiliary-ring command unit has priority, enabling it to lock out command-fetch-and-decode block auxiliary-ring command requests.)

During the next pipeline cycle, the unit controller analyzes the packet request and prepares the packet for processing by the pipeline stages. This can be a multi-pipeline-cycle process for data coming from the auxiliary ring. (The command-fetch-and-decode block 841 does some of the preparation for the geometry block 842, so this is not the case for requests from the block 841). Further, some packets from the command-fetch-and-decode block 841 are multi-pipeline-cycle packets. The command-fetch-and-decode block 841 does not send a request to the geometry block 841 to process these packets until the block 841 has the complete packet ready to send.

When the pipeline-cycle counter again rolls over and the Advance_Pipeline signal is distributed, the unit controller analyzes its Pipeline_Full input. If the signal is clear, the controller resets the Hold input of the pipeline-stage-A command register to advance the packet to the next stage. Stage A 212 detects the new packet and begins processing.

Stage A 212 could require more than one pipeline cycle to process the packet, depending on the type of packet it is and the state that is set in the stage. If more than one pipeline cycle is required, the stage raises the Pipeline_Full signal. If Pipeline_Full is raised, the unit controller is not allowed to advance the next packet down the pipe. When the stage detects that the packet will complete in the current stage, the Pipeline_Full signal is cleared, and just as the unit controller advanced the command register of stage A, stage A advances the command register of stage B.

As the pipeline fills, the decision-making process for each stage can get more complicated. Since each stage has a different set of operations to perform on any given vertex, some sets of operations can take longer than others. This is particularly true as more complex states are set in the individual pipeline stages. Further, some of the packets in the pipeline can be mode changes rather than vertices. This can alter the way the previous vertex and the next vertex are handled even in an individual pipeline stage.

A unit controller regulates the input of data to the geometry pipeline 842. Commands come from two sources: the auxiliary ring and the command-fetch-and-decode block 841. Auxiliary-ring memory requests are transferred by exception and do not happen during normal operation. The controller decodes the commands and generates a command word. The command word contains information about the packet that determines what the starting instruction is in the next pipeline stage. Further, the unit controller also manages the interface between the command-fetch-and-decode and geometry blocks 841, 842.

The auxiliary-ring commands are either instruction-memory packets (write) or data-memory (read) packets to the various pipeline stages. The read feature reads stipple patterns during context switching, but the read mechanism is generic enough that most memory locations can be read.

The command-fetch-and-decode block commands are of two types: propagated mode (propagated or consumed), or vertex.

The pipeline-stage controllers for each stage are all variations on the same basic design. The controllers are as versatile as possible in order to compensate for hardware bugs and changing algorithms. In one embodiment, they are implemented as programmable micro-code. In fact, all state in the controllers is programmable in some way.

The pipeline-stage control begins with the previous stage (i−1) placing a new command in the command register. The instruction control state machine checks for this event when the Advance_Pipeline signal is pulsed.

Programmable microcode instruction memory drives the geometry block 842. Each physical stage has a dedicated instruction memory. Since each physical stage has slightly different data-path elements, the operation codes for each physical stage are slightly different.

The Pipe Stage A

The logical pipeline stage A 212 primarily transforms vertices with 4-by-4 matrices. Accordingly, its instruction set is comparatively small. In order to add more utility to the unit, a condition code with each matrix-multiplication operation specifies how the result of the operation is used.

The instruction memory 1230 is divided into pages of instructions. Each page contains a "pipeline cycle" worth of operations. The command register 12A0 drives the page selection. The decode logic uses the command and the current mode to select the appropriate jump table address for the current state.

The jump table contains an instruction memory address and page mode. (Page mode is mode that is valid only for the current pipeline cycle.) The instruction-memory address points to the first valid instruction for the current page. All instructions issue in one cycle. Thus, this initial address is incremented continuously for the duration of the pipeline cycle.

The Advance_Pipeline signal 211H tells the GCW controller 1210 to evaluate the state of the current command to determine if it has completed. If it is complete, the controller 1210 removes the hold from the command register 12A0 and a new command enters the pipeline stage.

The command register 12A0 is a hold register for storing the geometry command word. The command word consists of the unaltered command bus data and a valid bit (V) appended as the MSB.

The decoder 1220 is combinatorial logic block that converts the operation-code field of the command word and the current mode into an address for referencing the jump-table memory 1230. The decoder 1220 also generates texture pointers and matrix pointers for the texture state machine 1260, as well as new mode enable flags for the write-enable memory 1280.

The remainder of the state (not in the texture state machine) is also in the instruction controller 2126. In particular, TANG_GEN and TANG_TRNS are stored here. These registers are cleared at reset and set by a Bump_State packet.

The hardware jump table is used during reset and startup before the programmable memories have valid data.

The write-enable memory 1280 stores the write-enable bits associated with each of the matrices stored in the matrix memory 2125. An enable bit exists for each of the data paths for the four functional unit 2122. The operand A address bits [6:2] select the read address to this memory 1280.

Matrix multiply and move instructions can access the write-enable memory 1280. The write enables enable word writes to the vertex buffers BC 2123 and to enable sign-bit writes to the geometry command word.

The memory is filled by Matrix packets in the geometry command word. The packet header (command) contains both the write address and the four enable bits. The instruction field merge logic 1290 is a primarily combinatorial logic that selects which signals control which data-path components. The hardware instruction memory 1270 selects the hardwired or software instructions. Some of the fields that make up the software instruction word are multiplexed.

The texture state machine selects mode of the data-path control fields.

The hardware instruction memory 1250 controls the data path at the startup before the micro-code memory has been initialized.

The geometry command word controller 1210 implements the sequencing of stage A 212. The Advance_Pipeline signal 211H from the global packet controller 211 triggers the evaluation of the exit code. (The exit codes are programmable in the jump-table memory 1240.) The possible exit codes are TRUE, FALSE, and TSM_CONDITIONAL. TSM_CONDITIONAL allows the TSM_Done signal to determine if the current instruction page completes the current packet. If the condition is TRUE, then the next Advance_Pipeline strobe releases the hold on the command register, and a new command enters the pipe.

A duration counter track the time a vertex is in the stage 212. The writing of a new command to the command register 12A0 clears the counter.

The texture state machine 1260 determines the requirements and tracks the state of each of the eight textures and the two user-defined clip-plane sets. The state machine 1260 prioritizes requirements based on the size of the vertex and the current duration. The vertex size limits the maximum texture number for the current vertex. The current duration limits the maximum texture number for the current pipeline cycle.

The state machine 1260 prioritizes in this order: generation, clipping sets, transformations. If textures are not generated, they are moved to the vertex buffer BC. The move operations use the complement of the four-bit generation write-enable mask associated with each texture. This ensures that all enabled textures propagate to the vertex buffer BC.

When micro-coded texture instructions are issued, the state machine 1260 provides the instruction word. When the addresses are used, the state machine 1260 marks that operation as complete and moves on to the next requirement.

The Pipeline Stages Preferably interleaved pipeline stages are used in the presetn invention, e.g., combined single stage BC, although other configurations could instead be used.

The Scratch-Pad Memory

Single logical pipelinestage BC is used to temporarily store data associated with the current vertex in the scratch-pad memory 2132. Logical stage Bc can also store in the memory 2132 current mode information used in the data-path calculations—view-port transformation parameters and bump-scale parameters, for example. Finally, the logical stages B and C store in the memory 2132 the values previous two vertices of the eye, texture, and window coordinates.

Current vertex data preferably are divided into logical stage BC, which can act as though it were a double-buffer section. A new vertex packet switches the buffer pointer, so data computed in stage B can be used in stage C, such that BC may be treated as a single stage.

The previous vertex data is broken into logical M1 and M2 double-buffer sections. The buffer pointer also switches as a new vertex packet propagates down the pipeline. (This is distinct from the "first" and "second" vertex notation dependant on the current geometry and vertex order.)

The Vertex Buffers BC

The vertex buffers BC 2123 stage the vertex data through the math functional units 2133. The vertex buffers BC 2123 serve as a triple buffer between stages A, and BC, where stage A accesses the write side (W) of the buffer, stage B accesses one of the read buffers (R0), and stage C accesses the second read buffer (R1). As a new vertex (SN=1) propagates down the pipeline, it receives additional buffer pointers in the order W, R0, R1. That Even vertex retains possession of each of the pointers until either a second vertex or mode packet follows.

The Math Functional Units

The math functional units 2123 in this stage are math-Func_F32. There are two, and each can execute independent instructions each cycle.

Where the math-functional-unit operation codes are as follows:

| MNEMONIC | FUNCTION |
|---|---|
| MUL | R = A * B |
| NMUL | R = −(A * B) |
| ACC | R = A * B + acc |
| NACC | R = −(A * B) + acc |
| RCPMUL | R = A * B + rom |
| RSQTMUL | R = A * B + rom |
| RCP | A = D, B = U |
| RSQT | A = D, B = U |

a dot-product sequence is simply MUL, ACC, ACC. The reciprocal sequence is RCP, RCPMUL. Likewise, the reciprocal-square-root sequence is RSQT, RSQTMUL.

Since neither data conversion or de-normal numbers are required, forcing the MSB of both mantissas to 1 sets the Implied bit. The output MSB of the mantissa can also be ignored. The overflow and underflow bits preferably go to an error register.

Instruction Control

Controller 1800 controls two instructions streams used by logical stage BC, which stage time-shares control of the data path. It will be appreciated that some duplication may be required, e.g., for command words registers 1810) to enable co-existence of virtual pipeline stages within a common physical stage.

The Command Register

Simple hold registers 1810 store the geometry command word. Each consists of the unaltered command bus data and control bits made by the previous stage.

Stage B and C each have a copy of the command register. Stage B adds comparison bits for determining which view-volume planes were cut by the current geometry.

The Decoder

The decoder 1830 is combinatorial logic that converts the operation-code field of the command word and the current mode into an address for referencing the jump-table memory 1840. The write-enable register 1890 stores write-enable pointers, write-enable bits and mode write-enable strobes.

All components in the decoder are time-shared.

The Hardware Jump Table

The hardware jump table 1850 is used during reset and startup before the programmable memories have valid data.

All components in the hardware jump table are time shared. There is no duplication related to the interleaved stages.

The Write-Enable Register

The write-enable register 1890 stores the write-enable bits for conditional-write instructions.

Each stage has its own unique enable register. The jump table 1850 can be programmed to pass the B register to the C register at any pipeline-cycle boundary.

The Field-Merge Logic

The instruction field merge logic 1880 is a combinatorial block that selects the signals controlling the data-path components. The hardware instruction memory 1870 selects the hardwired or the software instructions. Some of the fields that make up the software instruction word are multiplexed.

The instruction field merge logic 1880 implements the selection of data for the conditional-write instructions.

The Hardware Instruction Memory

The hardware instruction memory 1870 controls the data path at startup before the micro-code memory has been initialized.

The Clipping Unit

The clipping unit 230 is the back end of the geometry block 842. Vertex packets going into the clipping unit 232 have all of their data computed in the transformation and lighting units 210, 220. The lighting unit 220 computes vertices' color while the transformation unit 210 supplies the remaining data. The units 210, 220 write data into several synchronization queues where they are synchronized on entering the clipping unit 232.

The clipping unit 230 is divided into two functional parts: clipping and format sub-units 232, 233. The clipping sub-unit 232 collects vertices, forms primitives, clips primitives and outputs results. The format sub-unit 233 reformats the data from the clipping sub-unit 232 to the desired form and sends the packets out to the mode-extraction block 843 through an output queue 234.

The clipping sub-unit 232 breaks the input geometry into either point, line or triangle-type primitives, clips the resulting primitives against both user-defined clip planes and the view volume planes and sends the clipped primitives to the format sub-unit 233.

Vertex packets pass through clipping sub-unit in three pipeline stages: K, L and M. In stage K, the primitive formation queues 2321, 2322, 2324 store vertex data. Concurrently, primitive formation occurs. If a primitive is formed, the stage K passes on the new primitive to stage L for clipping.

Stage L checks the new primitive for the trivially-accept-or-reject condition. When clipping is necessary, executes microcode to perform the clipping algorithm, as described herein.

After the clipping algorithm completes, the control for stage L moves the clipped result out to stage M.

Stage M extracts the clipped and original primitives and sends them to the format sub-unit 233.

(The depths of header queues to stage L and M are chosen to ensure that the clipping sub-unit 232 does not insert bubbles into the pipeline due to lack of header space. The worst scenario in which a bubble insertion may occur is the processing of trivially accepted geometries.)

The data path of the clipping sub-unit 232 has a 32-bit floating-point math unit 2325 that carries out all the calculations involved in clipping a primitive.

The four memory blocks (the scratch pad GPR 2322 and the primitive, texture and color queues 2321, 2323, 2324. The primitive-queue memory block 2321 and the scratch-pad GPR 2322 support primitive clipping by storing temporary data and new vertices data. The texture- and color-queue memory blocks 2323, 2324 accumulate vertices data for forming primitive and smoothing out variation in latency.

The owner of the scratch-pad GPR 2322 is always stage L. The three stages, K, L and M share ownership of the read and write ports of the other three memory blocks 2321, 2323, 2324. "Ownership" means that the stage "owning" the port provides all the necessary address and control signals.

Specifically, stages K and L share ownership of the write port of the primitive queue 2321. Stage K uses this write port to transfer spatial data into the primitive queue 2321. Stage K has lower ownership priority compared to stage L, but because stage L and K runs independent of each other, stage L has to provide enough bandwidth for stage K to complete the data transfer in any one pipeline stage.

There are two shared ownerships between stage L and M. Stage M can own Read Port 1 (the second output, or the port on the right) of the primitive queue 2321, but it has the lower priority than stage L. Stage M uses this second port to read out the data of new vertices of the clipped primitive. While stage L minimizes its use of the second output port, there are potentially cases when stage M may not have enough bandwidth. Hardware hooks deal with this scenario.

The second shared ownership between stages L and M are on the read ports of the texture and color queues 2323, 2324. In this case, stage M has the highest priority in using a read port. If stage L needs to access data in one of these two queues 2323, 2324, it makes sure that stage M is not using the port. Otherwise, stage L waits for the next pipeline stage and repeats.

This scheme puts stage L at a disadvantage. However, stage L reads from one of the ports for interpolation only, and the interpolation performance is acceptably low.

The invention now being fully described, many changes and modifications that can be made thereto without departing from the spirit or scope of the appended claims will be apparent to one of ordinary skill in the art.

XII. Detailed Description of the Pixel Functional Block (PIX)

Herein are described apparatus and methods for rendering 3D-graphics images with and without anti-aliasing. In one embodiment, the apparatus include a port for receiving commands from a graphics application, an output for sending a rendered image to a display and a fragment-operations pipeline, coupled to the port and to the output, the pipeline including a stage for performing a fragment operation on a fragment on a per-pixel basis, as well as a stage for performing a fragment operation on the fragment on a per-sample basis.

In one embodiment, the stage for performing on a per-pixel basis is one of the following: a scissor-test stage, a stipple-test stage, an alpha-test stage or a color-test stage. The stage for performing on a per-sample basis is one of the following: a Z-test stage, a blending stage or a dithering stage.

In another embodiment, the apparatus programmatically selects whether to perform a stencil test on a per-pixel or a per-sample basis and performs the stencil test on the selected basis.

In another embodiment, the apparatus programmatically selects a set of subdivisions of a pixel as samples for use in the per-sample fragment operation and performs the per-sample fragment operation, using the programmatically selected samples.

In another embodiment, the apparatus programmatically allows primitive based anti-aliasing, i.e. the anti-aliasing may be turned on or off on a per-primitive basis.

In another embodiment, the apparatus programmatically performs several passes through the geometry. The apparatus selects the first set of subdivisions of a pixel as samples for use in the per-sample fragment operation and performs the per-sample fragment operation, using the programmatically selected samples. It then programmatically selects a different set of the pixel subdivisions as samples for use in a second per-sample fragment operation and then performs the second per-sample fragment operation, using the programmatically selected samples.

The color values resulting from the second pass are accumulated with the color values from the first pass. Several passes can be performed to effectively increase the number of samples per pixel. The sample locations for each pass are different and the pixel color values are accumulated with the results of the previous passes.

The apparatus programmatically selects a set of subdivisions of a pixel as samples for use in the per-sample fragment operation, programmatically assigns weights to the samples in the set and performs the per-sample fragment operation on the fragment. The apparatus programmatically determines the method for combining the color values of the samples in a pixel to obtain the resulting color in the framebuffer at the pixel location. In addition, the apparatus programmatically selects the depth value assigned to a pixel in the depth buffer from the depth values of all the samples in the pixel.

The apparatus includes a method to clear the color, depth, and stencil buffers partially or fully, without a read-modify-write operation on the framebuffer.

The apparatus includes a method for considering per-pixel depth values assigned to the polygon as well as the depth values interpolated from those specified at the vertices of the polygon.

The apparatus includes a method for considering per-pixel stencil values assigned to the polygon in stencil test, as well as the specified stencil reference value of the polygon.

The apparatus includes a method for determining if any pixel in the scene is visible on the screen without updating the color buffer.

Abbreviations

Following are abbreviations which may appear in this description, along with their expanded meaning:

BKE: the back-end block 84C.

CUL: the cull unit 846.

MIJ: the mode-injection unit 847.

PHG: the Phong unit 84A.

PIX: the pixel block 84B.

PXO: the pixel-out unit 280.

SRT: the sort unit 844.

TEX: the texture unit 849.

VSP: a visible stamp portion.

Overview

The Rendering System

FIG. J 8 illustrates a system 800 for rendering three-dimensional graphics images. The rendering system 800 includes one or more of each of the following: data-processing units (CPUs) 810, memory 820, a user interface 830, a co-processor 840 such as a graphics processor, communication interface 850 and communications bus 860.

Of course, in an embedded system, some of these components may be missing, as is well understood in the art of embedded systems. In a distributed computing environment, some of these components may be on separate physical machines, as is well understood in the art of distributed computing.

The memory 820 typically includes high-speed, volatile random-access memory (RAM), as well as non-volatile memory such as read-only memory (ROM) and magnetic disk drives. Further, the memory 820 typically contains software 821. The software 821 is layered: Application software 8211 communicates with the operating system 8212, and the operating system 8212 communicates with the I/O subsystem 8213. The I/O subsystem 8213 communicates with the user interface 830, the co-processor 840 and the communications interface 850 by means of the communications bus 860.

The user interface 830 includes a display monitor 831.

The communications bus 860 communicatively interconnects the CPU 810, memory 820, user interface 830, graphics processor 840 and communication interface 850. The memory 820 may include spatially addressable memory (SAM). A SAM allows spatially sorted data stored in the SAM to be retrieved by its spatial coordinates rather than by its address in memory. A single SAM query operation can identify all of the data within a specified spatial volume, performing a large number of arithmetic comparisons in a single clock cycle. For example, U.S. Pat. No. 4,996,666, entitled “Content-addressable memory system capable of full parallel magnitude comparison,” (1991) further describes SAMs and is incorporated herein by reference. The address space of the co-processor 840 may overlap, be adjacent to and/or disjoint from the address space of the memory 820, as is well understood in the art of memory mapping. If, for example, the CPU 810 writes to an accelerated graphics port at a predetermined address and the graphics co-processor 840 reads at that same predetermined address, then the CPU 810 can be said to be writing to a graphics port and the graphics processor 840 to be reading from such a graphics port.

The graphics processor 840 is implemented as a graphics pipeline, this pipeline itself possibly containing one or more pipelines. FIG. J 3 is a high-level block diagram illustrating the components and data flow in a 3D-graphics pipeline 840 incorporating the invention. The 3D-graphics pipeline 840 includes a command-fetch-and-decode block 841, a geometry block 842, a mode-extraction block 843, a sort block 844, a setup block 845, a cull block 846, a mode-injection block 847, a fragment block 848, a texture block 849, a Phong block 84A, a pixel block 84B, a back-end block 84C and sort, polygon, texture and framebuffer memories 84D, 84E, 84F, 84G. The memories 84D, 84E, 84F, 84G may be a part of the memory 820.

FIG. 7 is a method-flow diagram of the pipeline of FIG. J 3. FIGS. J 11 and 12 are alternative embodiments of a 3D-graphics pipeline incorporating the invention.

The command-fetch-and-decode block 841 handles communication with the host computer through the graphics port. It converts its input into a series of packets, which it passes to the geometry block 842. Most of the input stream consists of geometrical data, that is to say, lines, points and polygons. The descriptions of these geometrical objects can include colors, surface normals, texture coordinates and so on. The input stream also contains rendering information such as lighting, blending modes and buffer functions.

The geometry block 842 handles four major tasks: transformations, decompositions of all polygons into triangles, clipping and per-vertex lighting calculations for Gouraud shading.

The geometry block 842 transforms incoming graphics primitives into a uniform coordinate space (“world space”). It then clips the primitives to the viewing volume (“frustum”). In addition to the six planes that define the viewing volume (left, right, top, bottom, front and back), the Subsystem provides six user-definable clipping planes. After clipping, the geometry block 842 breaks polygons with more than three vertices into sets of triangles to simplify processing.

Finally, if there is any Gouraud shading in the frame, the geometry block 842 calculates the vertex colors that the fragment block 848 uses to perform the shading.

The mode-extraction block 843 separates the data stream into two parts: vertices and everything else. Vertices are sent to the sort block 844. Everything else (lights, colors, texture coordinates, etc.), it stores in the polygon memory 84E, whence it can be retrieved by the mode-injection block 847. The polygon memory 84E is double buffered, so the mode-injection block 847 can read data for one frame while the mode-extraction block 843 is storing data for the next frame.

The mode data stored in the polygon memory falls into three major categories: per-frame data (such as lighting), per-primitive data (such as material properties) and per-vertex data (such as color). The mode-extraction and mode-injection blocks 843, 847 further divide these categories to optimize efficiency.

For each vertex, the mode-extraction block 843 sends the sort block 844 a packet containing the vertex data and a pointer (the “color pointer”) into the polygon memory 84E. The packet also contains fields indicating whether the vertex represents a point, the endpoint of a line or the corner of a triangle. The vertices are sent in a strictly time-sequential order, the same order in which they were fed into the pipeline. The packet also specifies whether the current vertex forms the last one in a given primitive, that is to say, whether it completes the primitive. In the case of triangle strips (“fans”) and line strips (“loops”), the vertices are shared between adjacent primitives. In this case, the packets indicate how to identify the other vertices in each primitive.

The sort block 844 receives vertices from the mode-extraction block 843 and sorts the resulting points, lines and triangles by tile. (A tile is a data structure described further below.) In the double-buffered sort memory 84D, the sort block 844 maintains a list of vertices representing the graphic primitives and a set of tile pointer lists, one list for each tile in the frame. When the sort block 844 receives a vertex that completes a primitive, it checks to see which tiles the primitive touches. For each tile a primitive touches, the sort block adds a pointer to the vertex to that tile's tile pointer list.

When the sort block 844 has finished sorting all the geometry in a frame, it sends the data to the setup block 845. Each sort-block output packet represents a complete primitive. The sort block 844 sends its output in tile-by-tile order: all of the primitives that touch a given tile, then all of the primitives that touch the next tile, and so on. Thus, the sort block 844 may send the same primitive many times, once for each tile it touches.

The setup block 845 calculates spatial derivatives for lines and triangles. The block 845 processes one tile's worth of data, one primitive at a time. When the block 845 is done, it sends the data on to the cull block 846.

The setup block 845 also breaks stippled lines into separate line segments (each a rectangular region) and computes the minimum z value for each primitive within the tile.

Each packet output from the setup block 845 represents one primitive: a triangle, line segment or point.

The cull block 846 accepts data one tile's worth at a time and divides its processing into two steps: SAM culling and sub-pixel culling. The SAM cull discards primitives that are hidden completely by previously processed geometry. The sub-pixel cull takes the remaining primitives (which are partly or entirely visible) and determines the visible fragments. The sub-pixel cull outputs one stamp's worth of fragments at a time, herein a "visible stamp portion." (A stamp is a data structure described further below.)

FIG. J 9 shows an example of how the cull block 846 produces fragments from a partially obscured triangle. A visible stamp portion produced by the cull block 846 contains fragments from only a single primitive, even if multiple primitives touch the stamp. Therefore, in the diagram, the output VSP contains fragments from only the gray triangle. The fragment formed by the tip of the white triangle is sent in a separate VSP, and the colors of the two VSPs are combined later in the pixel block 84B.

Each pixel in a VSP is divided into a number of samples to determine how much of the pixel is covered by a given fragment. The pixel block 84B uses this information when it blends the fragments to produce the final color of the pixel.

The mode-injection block 847 retrieves block-mode information (colors, material properties, etc.) from the polygon memory 84E and passes it downstream as required. To save bandwidth, the individual downstream blocks cache recently used mode information. The mode-injection block 847 keeps track of what information is cached downstream and only sends information as necessary.

The main work of the fragment block 848 is interpolation. The block 848 interpolates color values for Gouraud shading, surface normals for Phong shading and texture coordinates for texture mapping. It also interpolates surface tangents for use in the bump-mapping algorithm if bump maps are in use.

The fragment block 848 performs perspective-corrected interpolation using barycentric coefficients.

The texture block 849 applies texture maps to the pixel fragments. Texture maps are stored in the texture memory 84F. Unlike the other memory stores described previously, the texture memory 84F is single buffered. It is loaded from the memory 820 using the graphics port interface.

Textures are mip-mapped. That is to say, each texture comprises a series of texture maps at different levels of detail, each map representing the appearance of the texture at a given distance from the eye point. To reproduce a texture value for a given pixel fragment, the text block 849 performs tri-linear interpolation from the texture maps, to approximate the correct level of detail. The texture block 849 also performs other interpolation methods, such as anisotropic interpolation.

The texture block 849 supplies interpolated texture values (generally as RGBA color values) to the Phong block 84A on a per-fragment basis. Bump maps represent a special kind of texture map. Instead of a color, each texel of a bump map contains a height field gradient.

The Phong block 84A performs Phong shading for each pixel fragment. It uses the material and lighting information supplied by the mode-injection block 847, the texture colors from the texture block 849 and the surface normal generated by the fragment block 848 to determine the fragment's apparent color. If bump mapping is in use, the Phong block 847 uses the interpolated height field gradient from the texture block 849 to perturb the fragment's surface normal before shading.

The pixel block 84B receives VSPs, where each fragment has an independent color value. The pixel bock 84B performs a scissor test, an alpha test, stencil operations, a depth test, blending, dithering and logic operations on each sample in each pixel. When the pixel block 84B has accumulated a tile's worth of finished pixels, it combines the samples within each pixel (thereby performing antialiasing of pixels) and sends then to the back end 84C for storage in the framebuffer 84G.

FIG. J 10 shows a simple example of how the pixel block 84B may process a stamp's worth of fragments. In this example, the pixel block receives two VSPs, one from a gray triangle and one from a white triangle. It then blends the fragments and the background color to produce the final pixels. In this example, the block 84B weights each fragment according to how much of the pixel it covers or, to be more precise, by the number of samples it covers. As mentioned before, this is a simple example. The apparatus performs much more complex blending.

(The pixel-ownership test is a part of the window system and is left to the back end 84C.)

The back-end block 84C receives a tile's worth of pixels at a time from the pixel block 84B and stores them into the framebuffer 84G. The back end 84C also sends a tile's worth of pixels back to the pixel block 84B because specific framebuffer values can survive from frame to frame. For example, stencil-bit values can remain constant over many frames but can be used in all of those frames.

In addition to controlling the framebuffer 84G, the back-end block 84C performs pixel-ownership tests, 2D drawing and sends the finished frame to the output devices. The block 84C provides the interface between the framebuffer 84G and the monitor 831 and video output.

The Pixel Block

The pixel block 84B is the last block before the back end 84C in the 3D pipeline 840. It is responsible for performing per-fragment operations. In addition, the pixel block 84B performs sample accumulation for anti-aliasing.

The pipeline stages before the pixel block 84B convert primitives into VSPs. The sort block 844 collects the primitives for each tile. The cull block 846 receives the data from the sort block in tile order and culls out parts of the primitives that do not contribute to the rendered images. The cull block 846 generates the VSPs. The texture and the Phong block units 849, 84A also receive the VSPs and are responsible for the texturing and lighting of the fragments, respectively.

FIG. J 2 is a block diagram illustrating the components and data flow in the pixel block 84B. The block 84B includes FIFOs 210, an input filter 220 and queues 230, 240. The pixel block 84B also includes an input processor 290, caches 260, 270 and a depth-interpolation unit 2L0. Also in pixel block 84B is a 3D pipeline 2M0 including scissor-, stipple-, alpha-, color- and stencil/Z-test units 2A0, 2B0, 2C0, 2D0, 2E0, as well as blending, dithering and logical-operations units 2F0, 2G0, 2H0. Per-sample stencil and z buffers 2I0, per-sample color buffers 2J0, the pixel-out unit 280 and the per-pixel tile buffers 2KO also help compose the pixel block 84B.

In FIG. J 2, the input FIFOs 210*a* and 201*b* receive inputs from the Phong block 847 and the mode-injection block 847, respectively. The input FIFO 210*a* outputs to the color queue 230, while the input FIFO 210*b* outputs to the input filter 220.

The input filter outputs to the pixel-out unit 280, the back-end block 84C and the VSP queue 240.

The input processor 290 receives inputs from the queues 230, 240 and outputs to the stipple and mode caches 260, 270, as well as to the depth-interpolation unit 2L0 and the 3D pipeline 2M0.

The first stage of the pipeline 2M0, the scissor-test unit 2A0, receives input from the input processor 290 and outputs to the stipple-test unit 2B0. The unit 2B0 outputs to the alpha-test unit 2C0, which outputs to the color-test unit, which outputs to the stencil/z-test unit 2E0, which outputs to the blending/dithering unit 2F0. The stencil/z-test unit 2E0 also communicates with the per-sample z and stencil buffers 2I0, while the blending/dithering unit 2F0 and the logical-operations unit 2H0 both communicate with the per-sample color buffers 2J0.

The components of the pipeline 2M0, the scissor-, stipple-, alpha-, color- and stencil/Z-test units 2A0, 2B0, 2C0, 2D0, 2E0 and the blending, dithering and logical-operations units 2F0, 2G0, 2H0 all receive input from the stipple and mode caches 260, 270. The stencil/Z-test unit 2E0 also receives inputs from the depth-interpolation unit 2L0.

Towards the back-end side, the pixel-out unit 280 communicates with the per-sample z, stencil and color buffers 2I0, 2J0 as well as with the per-pixel buffers 2K0. The per-pixel buffers 2K0 and the back-end block 84C are in communication.

As mentioned above, the pixel block 84B communicates with the Phong, mode-injection and back-end blocks 847, 84A, 84C. More particularly, the pixel block 84B receives input from the mode-injection and Phong blocks 847, 84A. The pixel block 84B receives VSPs and mode data from the mode-injection block 847 and receives fragment colors for the VSPs from the Phong block 84A. (The Phong block 84A may also supply per-fragment depth or stencil values for VSPs.) The fragment colors for the VSPs arrive at the pixel block 84B in the same order as the VSPs.

The pixel block 84B processes the data for each visible sample according to maintained mode settings. When the pixel block 84B finishes processing all stamps for the current tile, it signals the pixel-out unit 280 to output the color, z and stencil buffers for the tile.

The pixel-out unit 280 processes the pixel samples to generate color, z and stencil values for the pixels. These pixel values are sent to the back-end block 84C which has the memory controller for the framebuffer 84G. The back-end block 84C prepares the current tile buffers for rendering of geometry (VSPs) by the pixel block 84B. This may involve loading of the existing color, z C, and stencil values from the framebuffer 84G.

In one embodiment, the on-chip per-sample z, stencil and color buffers 2I0, 2J0 are double buffered. Thus, while the pixel-out unit 280 is sending one tile to the back-end block 84C, the depth and blend units 2E0, 2F0 can write to a second tile. The per-sample color, z- and stencil buffers 2I0, 2J0 are large enough to store one tile's worth of data.

There is also a set of per-pixel z, stencil and color buffers 2K0 for each tile. These per-pixel buffers 2K0 are an intermediate storage interfacing with the back-end block 84C.

The pixel block 84B also receives some packets bound for the back-end block 84C from the mode-injection block 847. The input filter 220 appropriately passes these packets on to (the prefetch queue of) the back end 84C, where they are processed in the order received. Some packets are also sent to (the input queue in) the pixel-out unit 280.

As mentioned before, the pixel block 84B receives input from the mode-injection and Phong blocks 847 and 84A. There are two input queues to handle these two inputs. The data packets from the mode-injection block 847 go to the VSP queue 240 and the fragment color (and depth or stencil if enabled) packets from the Phong block 84A go to the color queue 230. The mode-injection block 847 places the data packets in the input FIFO 210. The input filter 220 examines the packet header and sends the data bound for the back-end block 84C to the back-end block 84C and the data packets needed by the pixel block 84B to the VSP queue 240. The majority of the packets received from the mode-injection block 847 are bound for the VSP queue 240, some go only to the back-end block 84C and some are copied into the VSP queue 240 as well as sent to the back-end and the pixel-out units 84C, 280.

A brief explanation of the need and mechanism for tile preparation follows. A typical rendering sequence may have the following operations: (1) initialize the color, z and stencil buffers 2J0, 210 to their clear values, if needed, (2) bit background image(s) into the buffer(s) 2J0, 210, if needed, (3) render geometry, (4) bit again, (5) render some more geometry, (6) complete and flip. If the bit operation (2) covers the entire window, a clearing operation for that buffer may not be needed. If the bit covers the partial window, a clear may be needed. Furthermore, the initialization and bit (2) operations may happen in reverse order. That is to say, there may be a bit to (perhaps) the whole window followed by a clearing of a part of the window. The pre-geometry bits that cover the entire window do not require a scissor test. Tile alignment and scaling may be carried out by the back-end block 84C as image read back into the tile buffers. The post-geometry bits and the bits that cover part of the window or involve scaling are implemented as textured primitives in the pipeline.

Similarly, the clear operation is broken into two kinds. The pre-geometry entire-window-clear operation is carried out in the pixel-out unit 280, and the clear operation that covers only part of the window (and/or is issued after some geometry has been rendered) is carried out in the pixel-block pipeline. Both the pixel block 84B (the pixel-out unit 280) and the back-end block 84C are aware of the write masks for various buffers at the time the operation is invoked. In fact, the back-end block 84C uses the write masks to determine if it needs to read back the tile buffers. The readback of tile buffers may also arise when the rendering of a frame causes the polygon or sort memory 84E, 84D to overflow.

In some special cases, the pipeline may break a user frame into two or more sequential frames. This may happen due to a context switch or due to polygon or sort memory 84E, 84D to overflow. Thus, for the same user frame, a tile may be visited more than once in the pixel block 84B. The first time a tile is encountered, the pixel block 84B (most likely the pixel-out unit 280) may need to clear the tile buffers 2I0, 2J0 with the "clear values" prior to rendering. For rendering the tiles in subsequent frames, the pixel color, z and stencil values are read back from the framebuffer memory 84G.

Another very likely scenario occurs when the z buffer 2I0 is cleared and the color and stencil buffers 2J0, 2I0 are loaded into tiles from a pre-rendered image. Thus, as a part of the tile preparation, two things happen. The background image is read back from the framebuffer memory 84G into the buffers that are not enabled for clear, and the enabled buffers (corresponding to the color, z and stencil) are cleared. The pipeline stages upstream from the pixel block 84B are aware of these functional capabilities, since they are responsible for sending the clear information.

The pixel block 84B compares the z values of the incoming samples to those of the existing samples to decide which samples to keep. The pixel block 84B also provides the capability to minimize any color bleeding artifacts that may arise from the splitting of a user frame.

Data Structures

Samples, Pixels, Stamps and Tiles

A first data structure is a sample. Each pixel in a VSP is divided into a number of samples. Given a pixel divided into an n-by-m grid, a sample corresponds to one of the n*m subdivisions. FIG. J 4 illustrates the relationship of samples to pixels and stamps in one embodiment.

The choices of n and m, as well as how many and which subdivisions to select as samples are all programmable in the co-processor 840. The grid, sample count and sample locations, however, are fixed until changed. Default n, m, count and locations are set at reset. FIG. J 4 also illustrates the default sample grid, count and locations according to one embodiment.

Each sample has a dirty bit, indicating whether either of the sample's color or alpha value has changed in the rendering process.

A next data structure is a stamp. A stamp is a is a j-by-k multi-pixel grid within an image. In one embodiment, a stamp is a 2×2-pixel area.

A next data structure is a tile. A tile is an h-by-i multi-stamp area within an image. In one embodiment, a tile is an 8×8-stamp area, that is to say, a 16×16-pixel area of an image.

A next data structure is a packet. A packet is a structure for transferring information. Each packet consists of a header followed by packet data. The header indicates the type and format of the data that the packet contains.

Individual packet types as follows are described in detail herein: Begin_Frame, Prefetch Begin Frame, Begin_Tile, Prefetch_Begin_Tile, End_Frame and Prefetch_End_Frame, Clear, pixel-mode Cache_Fill, stipple Cache_Fill, VSP, Color and Depth.

The Begin_Frame and Prefetch_Begin_Frame Packets

Begin_Frame and Prefetch_Begin_Frame packets have the same content except that their headers differ. A Begin_Frame packet signals the beginning of a user frame and goes to the pixel block 84B (the VSP queue 240). The Prefetch_Begin_Frame packet signals the beginning of a frame and is dispatched to the back-end block 84C (the back-end block input queue) and pixel out-block prefetch queues.

For every Begin_Frame packet, there is a corresponding End_Frame packet. However, multiple End_Frame packets may correspond to the same user frame. This can happen due to frame splitting on overflow, for example.

Table 1 illustrates the format in one embodiment of the Begin_Frame and Prefetch_Begin_Frame packets. They contain Blocking_Interrupt. Window_X_Offset, Window_Y_Offset, Pixel_Format, No_Color_Buffer, No_Z_Buffer, No_Saved_Z_Buffer, No_Stencil_Buffer, No_Saved_Stencil_Buffer, Stencil_Mode, Depth_Output_Selection, Color_Output_Selection, Color_Output_Overflow_Selection and Vertical_Pixel_Count fields. A description of the fields follows.

Software uses the Block__3D_Pipe field to instruct the back-end block 84C to generate a blocking interrupt.

The WinSourceL, WinSourceR, WinTargetL and WinTargetR fields identify the window IDs of various buffers. The back end 84C uses them for pixel-ownership tests.

The Window_X_Offset and Window_Y_Offset are also for the back end 84C (for positioning the BLTs and such).

The Pixel_Format field specifies the format of pixels stored in the framebuffer 84G. The pixel block 84B uses this for format conversion in the pixel-out unit 280. One embodiment supports 4 pixel formats, namely 32-bits-per-pixel ARGB, 32-bits-per-pixel RGBA, 16-bits-per-pixel RGB_5_6_5, and 8-bits-per-pixel indexed color buffer formats.

The SrcEqTarL and SrcEqTarR fields indicate the relationship between the source window to be copied as background in the left and right target buffers. The back end 84C uses them.

The No_Color_Buffer flag, if set, indicates that there is no color buffer and, thus, disables color buffer operations (such as blending, dithering and logical operations) and updates.

The No_Saved_Color_Buffer flag, if set, disables color output to the framebuffer 84G. The color values generated in the pixel block 84B are not to be saved in the framebuffer because there is no color buffer for this window in the framebuffer 84G.

The No_Z_Buffer, if set, indicates there is no depth buffer and, thus, disables all depth-buffer operations and updates.

The No_Saved_Z_Buffer flag, if set, disables depth output to the framebuffer 84G. The depth values generated in the pixel block 84B are not to be saved in the framebuffer 84G because there is no depth buffer for this window in the framebuffer 84G.

The No_Stencil_Buffer flag, if set, indicates there is no stencil buffer and, thus, disables all stencil operations and updates.

The No_Saved_Stencil_Bufferfer flag, if set, disables stencil output to the framebuffer 84G. The stencil values generated in the pixel block 84B are not to be saved in the framebuffer 84G because there is no stencil buffer for this window in the framebuffer 84G.

The Stencil_Mode flag, if set, indicates the stencil operations are on a per-sample basis (with 2 bits/sample, according to one embodiment) versus a per-pixel basis (with 8 bits per pixel, according to that embodiment).

The pixel block 84B processes depth values on a per-sample basis but outputs them on a pixel basis. The Depth_Output_Selection field determines how the pixel block 84B chooses the per-pixel depth value from amongst the per-sample depth values.

In one embodiment, the field values are FIRST, NEAREST and FARTHEST. FIRST directs the selection of the depth value of the sample numbered 0 (that is, the first sample, in a zero-indexed counting schema) as the per-pixel depth value. NEAREST directs the selection of the depth value of the sample nearest the viewpoint as the per-pixel depth value. Similarly, FARTHEST directs the selection of the depth value of the sample farthest from the viewpoint as the per-pixel depth value.

When a frame overflow has not occurred, the Color_Output_Selection field determines the criterion for combining the sample colors into pixels for color output. However, when a frame overflow does occur, the Color_Output_Overflow_Selection field determines the criterion for combining the sample colors into pixels for color output. In one embodiment, the Color_Output_Selection and Color_Output_Overflow_Selection state parameters have a value of FIRST_SAMPLE, WEIGHTED, DIRTY_SAMPLES or MAJORITY. FIRST_SAMPLE directs the selection of the color of the first sample as the per-pixel color value. WEIGHTED directs the selection of a weighted average of the pixel's sample colors as the per-pixel color value. DIRTY_SAMPLES directs the selection of the average color of the dirty samples, and MAJORITY directs the selection of (1) the average of the samples' source colors for dirty samples or (2) the average of the samples' buffer colors for non-dirty samples—whichever of the dirty samples and clean samples groups is the more numerous.

The Vertical_Pixel_Count field specifies the number of pixels vertically across the window.

The StencilFirst field determines how the sample stencil values are converted to the stencil value of the pixel. If StencilFirst is set, then the Pixel block assigns the stencil value of the sample numbered 0 (that is, the first sample, in a zero-indexed counting schema) as the per-pixel stencil value. Otherwise, majority rule is used is determining how the pixel stencil value gets updated and assigned.

The End_Frame and Prefetch_End_Frame Packets

End_Frame and Prefetch_End_Frame indicate the end of a frame. The Prefetch_End_Frame packet is sent to the back-end prefetch queue and the End_Frame packet is placed in the VSP queue 240.

Table 2 describes the format in one embodiment of the End_Frame and Prefetch_End_Frame packets. (The packet headers values differ, of course, in order to distinguish the two types of packets.) They contain a packet header, Interrupt_Number, Soft_End_Frame, Buffer_Over_Occurred fields.

The Interrupt_Number is used by the back end 84C.

The SoftEndFrame and Buffer_Over_Occurred fields each independently indicates the splitting of a user frame into multiple frames. Software can cause an end of frame without starting a new user frame by asserting Soft_End_Frame. The effect is exactly the same as with the Buffer_Over_Occurred field, which is set when the mode-extraction unit 843 overflows a memory 84D, 84E.

The Begin_Tile and Prefetch_Begin_Tile Packets

Begin_Tile and Prefetch_Begin_Tile packets indicate the end of the previous tile, if any, and the beginning of a new tile. Each pass through a tile begins with a Begin_Tile packet. The sort block 844 outputs this packet type for every tile in a window that has some activity.

Table 5 describes the format, in one embodiment, of the Begin_Tile and Prefetch_Begin_Tile packets. (The packet header values differ, of course, in order to distinguish the two types of packets.) They contain First_Tile_In_Frame, Breakpoint_Tile, Begin_SuperTile, Tile_Right, Tile_Front, Tile_Repeat, Tile_Begin_SubFrame and Write_Tile_ZS flags, as well as Tile_X_Location and Tile_Y_Location fields. The Begin_Tile and Prefetch_Begin_Tile packets also contain Clear_Color_Value, Clear_Depth_Value, Clear_Stencil_Value, Backend_Clear_Color, Backend_Clear_Depth, Backend_Clear_Stencil and Overflow_Frame fields. A description of the fields follows.

The First_Tile_In_Frame flag indicates that the sort block 844 is sending the data for the first tile in the frame. (Performance counters for the frame can be initialized at this time.) If this tile has multiple passes, the First_Tile_In_Frame flag is asserted only in the first pass.

Breakpoint_Tile indicates the breakpoint mechanism for the pipeline 840 is activated.

Begin_SuperTile indicates that the sort block 844 is sending the data for the first tile in a super-tile quad. (Performance counters related to the super-tile can be initialized at this time.)

(The pixel block 84B does not use the Tile_Right, Tile_Front, Tile_Repeat, Tile_Begin_SubFrame and Write_Tile_ZS flags.)

Tile_X_Location and Tile_Y_Location specify the starting x and y locations, respectively, of the tile within the window. These parameters are specified as tile counts.

Clear_Color Value, Clear_Depth Value and Clear_Stencil_Value specify the values the draw, z- and stencil buffer pixel samples receive on a respective clear operation. The Backend_Clear_Color, Backend_Clear_Depth and Backend_Clear_Stencil flags indicate whether the back-end block 84C is to clear the respective draw, z- and/or stencil buffers. When a flag is TRUE, the back end 84C does not read the respective information from the framebuffer 84G. The pixel block 84B actually performs the clear operation.

Backend_Clear_Color indicates whether the pixel-out unit 280 is to clear the draw buffer. If this flag is set, the back end 84C does not read in the color buffer values. Instead, the pixel-out unit 280 clears the color tile to Clear_Color_Value. Conversely, if the flag is not set, the back-end block 84C reads in the color buffer values.

The Backend_Clear_Depth field indicates whether the pixel-out unit 280 is to clear the z buffer. The pixel-out unit 280 initializes each pixel sample on the tile to the Depth_Clear_Value before the pixel block 84B processes any geometry. If this bit is not set, the back-end block 84C reads in the z values from the framebuffer memory.

The Backend_Clear_Stencil field indicates the stencil-buffer bits that the pixel-out unit 280 is to clear. The back-end block 84C reads the stencil values from the framebuffer memory of this flag is not set. The pixel-out unit 280 clears the stencil pixel buffer to the Clear_Stencil_Value.

The Overflow_Frame flag indicates whether this tile is a result of an overflow in the mode-extraction block 843, that is to say, whether the current frame is a continuation of the same user frame as the last frame. If this bit is set, Color_Output_Overflow_Selection determines how the pixel-color value is output. If the flag is not set, Color_Output_Selection determines how the pixel-color value is output.

Tile_Begin_SubFrame is used to split the data within the tile into multiple sub-frames. The data within each sub-frame may be iteratively processed by the pipeline for sorted transparency, anti-aliasing, or other multi-pass rendering operations.

The Clear Packet

The Clear packet indicates that the pixel block 84B needs to clear a tile. This packet goes to the VSP queue 240.

Table 4 illustrates the format in one embodiment of a Clear packet. It contains Header, Mode_Cache_Index, Clear_Color, Clear_Depth, Clear_Stencil, Clear_Color_Value, Clear_Depth_Value and Clear_Stencil_Value fields.

Clear_Color indicates whether the pixel block 84B is to clear the color buffer, setting all values to Clear_Color_Value or Clear_Index_Value, depending on whether the window is in indexed color mode.

Clear_Depth and Clear _Stencil indicate whether the pixel block 84B is to clear the depth and/or stencil buffer, setting values to Clear_Depth_Value and/or Clear_Stencil_Value, respectively.

The Pixel-Mode Cache_Fill Packet A pixel-mode Cache_Fill packet contains the state information that may change on a per-object basis. While all the fields of an object-mode Cache_Fill packet will seldom change with every object, any one of them can change depending on the object being rendered.

Tables 6 and 7 illustrate the format and content in one embodiment of a pixel-mode Cache_Fill packet. The packet contains Header, Mode_Cache_index, Scissor_Test_Enabled, $x_{Sdssor\_Min}$, $x_{Scissor\_Max}$, $y_{Scissor\_Min}$, $y_{Scissor\_Max}$, Stipple_Test_Enabled, $Function_{ALPHA}$, $alpha_{REFERENCE}$, Alpha_Test_Enabled, $Function_{COLOR}$ $color_{MIN}$, $color_{MAX}$, Color_Test_Enabled, $stencil_{REFERENCE}$, $Function_{STENCIL}$, $Function_{DEPTH\ STENCIL}$mask, Stencil_Test_Failure_, Operation, Stencil_Test_Pass_Z_Test_Failure_Operation, Stencil_and_Z_Tests_Pass_Operation, Stencil_Test_Enabled, $write\_mask_{STENCIL}$, Z_Test_Enabled, Z_Write_Enabled, DrawStencil, $write\_mask_{COLOR}$, Blending_Enabled, $Constant\_Color_{BLEND}$, Source_Color_Factor, Destination_Color_Factor, Source_Alpha_Factor, Destination_Alpha_Factor, Color_LogicBlend_Operation, Alpha_LogicBlend_Operation and Dithering_Enabled fields. A description of the fields follows.

Mode_Cache_Index indicates the index of the entry in the mode cache 270 this packet's contents are to replace.

Scissor_Test_Enabled, Stipple_Test_Enabled, Alpha_Test_Enabled, Color_Test_Enabled, Stencil_Test_Enable and Z_Test_Enabled are the respective enable flags for the scissor, stipple, alpha, color, stencil and depth tests. Dithering_Enabled enables the dithering function.

$x_{Scissor\_Min}$, $x_{Scissor\_Max}$, $y_{ScissorMin}$ and $y_{Scissor\_Max}$ specify the left, right, top and bottom edges, respectively, of the rectangular region of the scissor test.

$Function_{ALPHA}$, $Function_{COLOR}$, $Function_{STENCIL}$ and $Function_{DEPTH}$ indicate the respective functions for the alpha, color, stencil and depth tests.

$alpha_{REFERENCE}$ is the reference alpha value used in alpha test.

$color_{MIN}$ and $color_{MAX}$ are, respectively, the minimum inclusive and maximum inclusive values for the color key.

$stencil_{REFERENCE}$ is the reference value used in The stencil test.

$mask_{STENCIL}$ is the stencil mask to AND the reference and buffer sample stencil values prior to testing.

Stencil_Test_Failure_Operation indicates the action to take on failure of the stencil test. Likewise, Stencil_Test_Pass_Z_Test_Failure_Operation indicates the action to take on passage of the stencil test and failure of the depth test and Stencil_and_Z_Tests_Pass_Operation the action to take on passage of both the stencil and depth tests.

The $write\_mask_{STENCIL}$ field is the stencil mask for the stencil bits in the buffer that are updated.

Z_Write_Enabled is a Boolean value indicating whether writing and updating of the depth buffer is enabled.

The DrawStencil field indicates that the pixel block 84B is to interpret the second data value from the Phong block 84A as stencil data.

$write\_mask_{COLOR}$ is the mask of bitplanes in the draw buffer that are enabled. In color-index mode, the low-order 8 bits are the IndexMask.

Blending_Enabled indicates whether blending is enabled. If blending is enabled then logical operations are disabled.

$Constant\_Color_{BLEND}$ is the constant color for blending.

The Source_Color_Factor and Destination_Color_Factor fields are, respectively, the multipliers for source-derived and destination-derived sample colors. Source_Alpha_Factor is the multiplier for sample alpha values, while Destination_Alpha_Factor is a multiplier for sample alpha values already in the tile buffer.

The Color_LogicBlend_Operation indicates the logic or blend operation for color values, and Alpha_LogicBlend_Operation indicates the logic or blend operation for alpha values.

The Stipple Cache_Fill Packet

An next data structure is the stipple Cache_Fill packet.

Table 10 illustrates the structure and content of a stipple Cache_Fill packet according to one embodiment. The packet contains Stipple_Cache_Index and Stipple_Pattern fields. The Stipple_Cache_Index field indicates which of the stipple cache's entries to replace. The Stipple_Pattern field holds the stipple pattern.

In one embodiment, the stipple cache 260 has four entries, and thus the bit-size of the Stipple_Cache_Index is 2. (OpenGL sets the size of a stipple pattern to 1024 bits.)

The VSP Packet

Each visible stamp in a primitive has a corresponding VSP packet. Table 3 describes the format of a VSP packet according to one embodiment. It contains Mode_Cache_Index, Stipple_Cache_Index, Stamp_X_Index, Stamp_Y_Index, Sample_Coverage_Mask, $Z_{REFERENCE}$, DzDx, DzDy and Is_MultiSample fields, a reference z value, $Z_{REFERENCE}$, and two depth slopes, $\partial z/\partial x$ and $\partial z/\partial y$. A VSP also contains an Is_MultiSample flag. A description of the fields follows.

A VSP packet contains indices for the mode and stipple cache entries in the mode and stipple caches 270, 260 that are currently active: Mode_Cache_Index and Stipple_Cache_Index. (The Phong block 84A separately supplies the color data for the VSP.)

In one embodiment, the stipple cache 270 has four entries, and thus the bit-size of the Stipple_Cache_Index field is two. The mode cache 260 has sixteen entries, and the bit-size of the Mode_Cache_Index field is four.

AVSP packet also contains Stamp_X_Index, Stamp_Y_Index and Is_MultiSample values. The Stamp_X_Index indicates the x index within a tile, while the Stamp_Y_Index indicates the y index within the tile. The Is_MultiSample flag indicates whether the rendering is anti-aliased or non anti-aliased. This allows programmatic control for primitive based anti-aliasing.

In one embodiment, sixty-four stamps compose a (n 8×8-stamp) tile. The bit sizes of the Stamp_X_Index and Stamp_Y_Index are thus three. With 16×16-pixel tiles and 2×2-pixel stamps, for example, the stamp indices range from 0 to 7.

A VSP packet also contains the sample coverage mask for a VSP, Sample_Coverage_Mask. Each sample in a stamp has a corresponding bit in a coverage mask. All visible samples have their bits set in the Sample_Coverage_Mask.

In one embodiment, sixteen samples compose a stamp, and thus the bit size of the Sample_Coverage_Mask is sixteen.

The z value of all samples in a stamp are computed with respect to the $Z_{REFERENCE}$ value, DzDx and DzDy.

In one embodiment, the $Z_{REFERENCE}$ value is a signed fixed point value with 28 integer and 3 fractional bits (s28.3), and DzDx and DzDy are signed fixed point (s27) values. These bit precisions are adequate for resulting 24-bits-per-sample depth values.

The Is_MultiSample flag indicates if the rendering is antialiased or non-antialiased. This field allows primitive-based anti-aliasing.

$Z_{REFERENCE}$, DzDx and DzDy values are passed on to the mode-injection block 847 from the cull block 846. The mode-injection block 847 sends these down to the pixel block 84B. The Pixel Depth packets arriving from the Phong block 84A are written into the color queue 230.

Color Packet

A Color packet gives the color values (that is to say, RGBA values) for a visible pixel in a stamp.

Table 8 illustrates the form and content of a Color packet according to one embodiment. Such a packet includes a Header and a Color field. In one embodiment, a color value has 32 bits distributed evenly over the red, green, blue and alpha values.

Depth/Stencil Information

A Depth packet conveys per-pixel depth or stencil information. Table 9 illustrates the form and content of a Depth packet according to one embodiment. Such a packet contains Header and Z fields. In one embodiment, the Z field is a 24-bit value interpreted as fragment stencil or fragment depth, depending on the setting of the DrawStencil flag in the applicable pixel mode.

State Parameters

The pixel block 84B maintains a number of state parameters that affect its operation. Tables 22 and 23 list the state parameters according to one embodiment. These state parameters correspond to their like-named packet fields. As such, the packet-field descriptions apply to the state parameters, and a repetition of the descriptions is omitted.

The exceptions are SampleLocations, SampleWeights, and EnableFlags. SampleLocations are the locations of the samples in the pixel specified on the 16×16 sub-pixel grid. Sample Weights are the fractional weights assigned to the samples. These weights are used in resolving the sample colors into pixel colors. An alternate embodiment could include these fields in some of the state packets (such as BeginFrame or BeginTile packet) to allow dynamic update of these parameters under software control for synchronous update with other processing.

The Enable_Flags include the Alpha_Test_Enabled, Color_Test_Enabled, Stencil_Test_Enabled, Z_Test_Enabled, Scissor_Test_Enabled, Stipple_Test_Enabled, Blending_Enabled and Dithering_Enabled Boolean values.

Protocols

The mode-injection and Phong blocks 847, 84A send input to the pixel block 84B by writing packets into its input queues 210. The pixel block 84B also communicates with the back-end block 84C, sending completed pixels to the framebuffer 84G and reading pixels back from the framebuffer 84G to blend with incoming fragments. (The pixel block 84B sends and receives a tile's worth of pixels at a time.)

The functional units within the pixel block 84B are described below. As color, alpha and stipple values are per-fragment data, the results of corresponding tests apply to all samples in the fragment. The same is true of the scissor test as well.

The pseudo-code for the data flow for one embodiment based on the per-fragment and per-sample computations is outlined below. This pseudo-code provides an overview of the operations of the pixel block 84B. The pseudo-code includes specific assumptions such as the size of the sub-pixel grid, number of samples etc. These and other fixed parameters are implementation dependent.

```
DoPixel ( ) {
    for each stamp {
        for each pixel in the stamp {
            /* compute sample mask for pixel */
            maskPIXEL = maskSAMPLE & 0xF;
            maskSAMPLE >>= 4;
            if (maskPIXEL == 0)
                /* none of the samples is set */
                break;
            else    if    (Scissor__Test__Enabled    &&
(!Passes__Scissor__Test( )))
                break;
            else    if    (Stipple__Test__Enabled    &&
(!Passes__Stipple__Test( )))
                break;
            else if (Alpha__Test__Enabled && (!Passes__Alpha__Test( )))
                break;
            else if (Color__Test__Enabled && (!Passes__Color__Test( )))
                break;
            else if (Stencil__Test__Enabled && !No__Stencil__Buffer) {
              if (Stencil__Mode) {
                /* per-pixel stencil */
                if (!Passes__Pixel__StencilTest( )) {
                    doPixel__Stencil__Test__Failed__Operation( );
                    break;
                }else {
                    Passes__Pixel__Z__Test( );
                }
            } else {
                /* per-sample stencil */
                for each sample in the pixel {
                    Is__Valid__Sample = maskPIXEL & 0x1;
                    maskPIXEL >>= 1;
```

-continued

```
                    if (Is__Valid__Sample) {
                        if (!Passes__Sample__Stencil__Test( )) {
                            doSample__Stencil__Test__Failed__Operation( );
                            break;
                        } else if (Z__Test__Enabled
                                &&(!Passes__Sample__Z__Test( )))
{
doSampleStencil__Test__Passed__Z__Test__Failed__Operation( );
                            } else {
                                doSampleStencil__and__Z__Tests__Pa
ssed__Operation( );
                            }
                        }
                    }   /* for each sample in pixel */
                }
            } else {
                /* if (!Stencil__Test__Enabled || No__Stencil__Buffer) */
                doPixelDepthTest( );
            }
        }                          /* for each pixel in stamp */
    }                              /* for each stamp */
}                                  /* DoPixel( ) */
doPixelDepthTest( ) {
boolean Is__First__Pass, Is__First__Fail;
    z__Pass__Count = z__Fail__Count = sample__number = 0;
    Is__First__Pass = Is__First__Failure = FALSE;
    for each sample {
        Is__Valid__Sample = mask_PIXEL & 0x1;
        mask_PIXEL >> 1;
        sample__number++;
        if (Is__Valid__Sample) {
            if (Z__Test__Enabled && !No__Z__Buffer) {
                if (doSampleDepthTest( )) {
                    doBlendEtc( );
                    Z__Pass__Count++;
                    if (sample__number == 1)
                        Is__First__Pass = TRUE;
                }else {
                    Z__Fail__Count++;
                    if (sample__number == 1)
                        Is__First__Failure = TRUE;
                }
            } else {
                doBlendEtc( );
                Z__Pass__Count++;
                if (sample__number == 1)
                    Is__First__Pass = TRUE;
            }
        }
    }
    if (Stencil__Test__Enabled && !No__Stencil__Buffer) {
      if (StencilFirst == 1)
        if (Is__First__Pass)
            doPixelStencil__and__Z__Tests__Passed__Operation( );
        else if (Is__First__Failure)
            doPixelStencil__Test__Passed__Z__Test__Failed__Operation( );
    } else {
        if (z__Pass__Count >= z__Fail__Count)
            doPixelStencil__and__Z__Tests__Passed__Operation( );
    else
            doPixelStencil__Test__Passed__Z__Test__Failed__Operation( );
    }
} /* DoPixelDeptTest( ) */
boolean doSampleDepthTest( ) {
    if (!No__Z__Buffer) {
        doComputeDepth ( );
        if (!depthTest)
            /* Compare z values according to depthFunc */
            return FALSE;
        else{
            set Z__Visible bit;
            updateDepthBuffer( );
            doBlendEtc( );
            return TRUE;
        }
    } else
        return TRUE;
}
```

-continued

```
doComputeDepth(index_PIXEL, index_SAMPLE) {      //pixel   and   sample
number are known
/* sub-pixel units per pixel in the X axis in one embodiment */
#define SUBPIXELS_PER_PIXEL_IN_X 16
/* bits to represent SUBPIXELS_PER_PIXEL_IN_X
#define SUBPIXEL_BIT_COUNT_X  log2(SUBPIXELS_PER_PIXEL_IN_X)
/* pixels per stamp in the X axis in one embodiment */
#define PIXELS_PER_STAMP_IN_X      2
/* bits to represent PIXELS_PER_STAMP_IN_X */
#define PIXEL_BIT_COUNT_X        log2 (PIXELS_PER_STAMP_IN_X)
#define SUBPIXELS_PER_PIXEL_IN_Y      16
#define SUBPIXEL_BIT_COUNT_y
log2 (SUBPIXELS_PER_PIXEL_IN_Y)
#define PIXELS_PER_STAMP_IN_Y   2
#define PIXEL_BIT_COUNT_Y            log2 (PIXELS_PER_STAMP_IN_Y)
     /* lower left of the pixel in subpixel units */
     index_X = (index_PIXEL & PIXEL_BIT_COUNT_X) << SUBPIXEL_BIT_COUNT_X;
     index_Y = ((index_PIXEL >>PIXEL_BIT_COUNT_X) & PIXEL_BIT_COUNT_Y)
               << SUBPIXEL_BIT_COUNT_Y;
     if (!Is_MultiSample) {
          /* in aliased mode, the sample position is at the center
of the pixel */
          /* account for Z_REFERENCE at the center of stamp */
          dx = index_X - 8;
          dy = index_X - 8;
     } else {
          dx = index_X + sampleX[index_SAMPLE] - 16;
          dy = index_X + sampleY[index_SAMPLE] - 16;
     }
     Z_SAMPLE = Z_REFERENCE + dZdX * dx + dZdY * dy;
}
```

Input Queuing and Filtering

The mode-injection and Phong blocks 847 and 84A place the data packets in the input FIFOs 210. The data from the Phong block 84A is placed in the fragment color queue 230. For the input packets received from the mode-injection block 847, the input filter 220 looks at the packet header and determines whether the packet is to be passed through to the back-end block 84C, placed in the VSP queue 240, sent to the pixel-out unit 280 or some combination of the three. The pipeline may stall if a packet (bound for the back-end block 84C, VSP queue 240, color queue 230 or the pixel-out input queue) can not be delivered due to insufficient room in the destination queue.

In one embodiment, the VSP queue 240 and the color queue 230 are a series of fixed size records (150 records of 128 bits each for the VSP queue 240 and 128 records of 34 bits each for the color queue 230). The packets received occupy integer number of records. The number of records a packet occupies in a queue depends on its type and, thus, its size.

The pixel block 84B maintains a write pointer and a read pointer for each queue 230, 240 and writes packets bound for a queue into the queue, starting at the record indexed by the write pointer. The pixel block 84B appropriately increments the write pointer, depending on the number of records the packet occupies and accounting for circular queues. If after incrementing a queue write pointer, the pixel block 84B determines that the value held by the write pointer equals that held by the read pointer, it sets the queue's status to "full."

The block 84B retrieves packets from the record indexed by the read pointer and appropriately increments the read pointer, based on the packet type and accounting for circular queues. If after incrementing a queue's read pointer, the pixel block 84B determines the value held by the read pointer equals that held by the write pointer, it sets the input queue's status to "empty."

Subsequent read and write operations on a queue reset the full and empty status bits appropriately.

Input Processing

The pixel block input processor 290 retrieves packets from the VSP and color queues 240 and 230. The input processor 290 stalls if a queue is empty. All packets are processed in the order received. (The VSP queue 240 does not hold only VSP packets but other input packets from the mode-injection block 847 as well—Begin_Tile, Begin_Frame and pixel-mode Stipple packets, for example.)

Before processing a VSP record from the queue 240, the input processor 290 checks to see if it can read the fragment colors (and/or depth/stencil data) corresponding to the VSP record from the color queue 230. If the queue 230 has not yet received the data from the Phong block 847, the input processor 290 stalls until it can read all the color fragments for the VSP record.

Once the required data from the Phong block 84A is received, the input processor 290 starts processing the records in the input queue 240 in order. For each VSP record, it retrieves the color and mode information as needed and passes it on to the pixel pipeline 2M0. If the input processor 290 encounters a pixel-mode or stipple Cache_Fill packet, it uses the cache index supplied with the packet to copy it into the appropriate cache entry.

Scissor Test

The scissor-test unit 2A0 performs the scissor test, the elimination of pixel fragments that fall outside a specified rectangular area. The scissor rectangle is specified in window coordinates with pixel (rather than sub-pixel) resolution. The scissor-test unit 2A0 uses the tile and stamp locations forwarded by the input processor 290 to determine if a fragment is outside the scissor window. The pseudo-code of the logic is given below:

```
boolean Is_valid_Fragment;
boolean Passes_Scissor_Test( ) {
    if (Scissor_Test_Enabled) {
        x_WINDOW = Tile_X_Location + 2 * Stamp_X_Index +
                    index_PIXEL & 0x1;
        y_WINDOW = Tile_Y_Location + 2 * Stamp_Y_Index +
                    (index_PIXEL >> 1) & 0x1;
        Is_Valid_Fragment = (x_WINDOW >= x_SCISSOR_MIN) &&
                    (x_WINDOW =< x_SCISSOR_MAX) &&
                    (y_WINDOW >= y_SCISSOR_MIN) &&
                    (y_WINDOW =< y_SCISSOR_MAX);
        return Is_Valid_Fragment;
    } else {
        return TRUE;
    }
}
```

where $x_{SCISSOR\_MAX}$, $x_{SCISSOR\_MIN}$, $y_{SCISSOR\_MAX}$ and $y_{SCISSOR\_MIN}$ are the maximum and minimum x values and the maximum and minimum y values for valid pixels.

The pixel block 84B discards the fragment if Is_Valid_Fragment is false. Otherwise it passes the fragment on to the next stage of the pipeline. The scissor-test unit 2A0 also sends the ($x_{WINDOW}$, $y_{WINDOW}$) window coordinates to the stipple-test unit 2B0.

This test is done on a per-pixel basis.

Stipple Test

The stipple-test unit 2B0 performs the stipple test if the Stipple_Test_Enabled flag is set (that is to say, is TRUE). Otherwise, the unit 2B0 passes the fragment on to the next stage of the pipeline.

The stipple-test unit 2B0 uses the following logic:

```
boolean Is_Valid_Fragment;
boolean Passes_Stipple_Test( ) {
    if (Stipple_Test_Enabled) {
        /* OpenGL uses 32x32 stipple patterns
            with each bit representing a pixel.*/
        stipple_X_index = (x_WINDOW & 0x1F);
        stipple_Y_index = (y_WINDOW & 0x1F);
        Is_Valid_Fragment = stipple [stipple_Y_index,
                    stipple_X_index] ==
1;
        return Is_Valid_Fragment;
    } else {
        return TRUE;
    }
}
```

The stipple-test unit uses the coordinates (stipple_X_index, stipple_Y_index) to retrieve the stipple bit for the given pixel. If the stipple bit at (stipple_X_index, stipple_Y_index) is not set (that is to say, is FALSE), the stipple test fails, and the pixel block 84B discards the fragment.

The stipple test is a per-fragment operation.

Alpha Test

The alpha-test unit 2C0 keeps or discards an incoming fragment based on its alpha values. The unit 2C0 tests the opacity of the fragment with respect to a reference value, $alpha_{Reference}$, according to a specified alpha test function, $Function_{ALPHA}$. (Table 11 shows the values for $Function_{ALPHA}$ and the associated comparisons according to one embodiment.) If the fragment fails, the alpha-test unit 2C0 discards it. If it passes, the unit 2C0 sends it on to the next stage in the pipeline.

The alpha-test unit 2B0 uses the following logic:

```
boolean Passes_Alpha_Test( ) {
    if (Alpha_Test_Enabled) {
        case (Function_ALPHA) {
            switch NEVER:     return FALSE;
            switch LESS:      return A < alpha_Reference;
            switch EQUAL:     return A == alpha_Reference;
            switch LEQUAL:    return A <= alpha_Reference;
            switch GREATER:   return A > alpha_Reference;
            switch NEQUAL:    return A != alpha_Reference;
            switch GEQUAL:    return A >= alpha_Reference;
            otherwise:        return TRUE;
        }
    } else {
        return TRUE;
    }
}
```

The alpha test is enabled if the Alpha_Test_Enabled flag is set. If the alpha test is disabled, all fragments are passed through. This test applies in RGBA-color mode only. It is bypassed in color-index mode.

Alpha test is a per-fragment operation.

Color Test

Unlike the alpha-test unit and its single reference-value test, the color-test unit 2D0 compares a fragment's RGB value with a range of color values via the keys $color_{MIN}$ and $color_{MAX}$. (The color keys are inclusive of the minimum and maximum values.) If the fragment fails the color test, the unit 2D0 discards it. Otherwise, the unit 2D0 passes it down to the next stage in the pipeline.

The color-test unit 2B0 uses the following logic:

```
boolean Passes_Color_Test( ) {
    if (Color_Test_Enabled) {
        switch (Function_COLOR) {
            case NEVER:     return FALSE;
            case LESS:      return C < color_MIN;
            case EQUAL:     return (C >= color_MIN)
                                & (C <= color_MAX);
            case LEQUAL:    return C <= color_MAX;
            case GREATER:   return C > color_MAX;
            case NEQUAL:    return (C < color_MIN)
                                | (C > color_MAX);
            case GEQUAL:    return C >= color_MIN;
            otherwise:      return TRUE;
        }
    } else {
        return TRUE;
    }
}
```

Table 12 shows the values for $Function_{COLOR}$ and the associated comparisons according to one embodiment. $Function_{COLOR}$ is implemented such that the minimum and maximum inclusiveness in the color keys is accounted for appropriately.

The color test is bypassed if the Color_Test_Enabled flag is not set.

The color test is applied in RGBA mode only. In the color-index mode, it is bypassed. The color-test unit 2D0 applies the color test to each of the R, G and B channels separately. The test results for all the channels are logically ANDed. That is to say, the fragment passes the color test passes only if it passes for every one of the channels.

The color test is a per-fragment operation.

Stencil/Z Test

While the alpha and color tests operate only on fragments passing through the pipeline stages, the stencil test uses the stencil buffer 2I0 to operate on a sample or a fragment. The stencil-test unit 2E0 compares the reference stencil value, $stencil_{Reference}$, with what is already in the stencil buffer 2I0 at that location. The unit 2E0 bitwise ANDs both the $stencil_{Reference}$ and the stencil buffer values with the stencil mask, $mask_{STENCIL}$, before invoking the comparison specified by $Function_{STENCIL}$.

In one embodiment, the $Function_{STENCIL}$ state parameter specifies comparisons parallel to those of $Function_{ALPHA}$ and $Function_{COLOR}$.

If the stencil test fails, the sample is discarded and the stored stencil value is modified according to the Stencil_Test_Failed_Operation state parameter.

If the stencil test passes, the sample is subjected to a depth test. If the depth test fails, the stored stencil value is modified according to the Stencil_Test_Passed_Z_Test_Failed_Operation state parameter.

If both the stencil and depth tests pass, the stored stencil value is modified according to the Stencil_and_Z_Tests_Passed_Operation state parameter.

Table 13 shows the values for the Stencil_Test_Failed_Operation, Stencil_Test_Passed_Z_Test_Failed_Operation and Stencil_and_Z_Tests_Passed_Operation state parameters and their associated functions according to one embodiment.

The unit 2E0 masks the stencil bits with the $write\_mask_{STENCIL}$ state parameter before writing them into the sample tile buffers. The major difference between pixel and sample stencil operations lies in how the stencil value is retrieved from and written into the tile buffer. The $write\_mask_{STENCIL}$ state parameter differs from $mask_{STENCIL}$ in that $mask_{STENCIL}$ affects the stencil values used in the stencil test, whereas $write\_mask_{STENCIL}$ affects the bitplanes to be updated.

Considering the overview pseudo-code given above, the following pseudo-code further describes the logic of the stencil-test unit 2E0:

```
boolean Passes_Stencil_Test() {
boolean Is_Valid;
    if (No_Stencil_Buffer) {
        return TRUE;
    } else if (Stencil_Test_Enabled) {
        Set_Stencil_Buffer_Pointer (pointer);
        source = (*pointer) & mask_STENCIL;
        reference = stencil_REFERENCE & mask_STENCIL;
        switch (Function_STENCIL) {
            case NEVER:      Is_Valid = FALSE;
                             break;
            case LESS:       Is_Valid = source < reference;
                             break;
            case EQUAL:      Is Valid = (source == reference);
                             break;
            case LEQUAL:     Is_Valid = source <= reference;
                             break;
            case GREATER:    Is_Valid = source > reference;
                             break;
            case NEQUAL:     Is_Valid = (source < reference)
                                  | (source > reference);
                             break;
            case GEQUAL:     Is_Valid = source >= reference;
                             break;
            case ALWAYS:
            otherwise:       Is_Valid = TRUE;
        }
        return (Is_Valid);
    } else
        return TRUE;
}
```

-continued

```
doStencil_Test_Failed_Operation () {
    switch (Stencil_Test_Failed_Operation) {
        case ZERO:        value = 0;
                          break;
        case MAX_VALUE:   value = (Stencil_Mode ? 255 : 3);
                          break;
        case REPLACE:     value = stencil_Reference;
                          break;
        case INCR:        value = (*pointer)++;
                          break;
        case DECR:        value = (*pointer)--;
                          break;
        case INCRSAT:     if ((value = (*pointer)++) >
                              (Stencil_Mode ? 255 : 3)) {
                              value = (Stencil_Mode ? 255 : 3);
                          }
                          break;
        case DECRSAT:     if ((value = (*pointer)-- ) < 0) {
                              value = 0;
                          break;
        case INVERT:      value = ~(*pointer);
                          break;
        case KEEP:
        otherwise:
                              value = *pointer;
    }
    if (!No_Saved_Stencil_Buffer) {
        /* write stencil tile */
        *pointer = value & write_mask_STENCIL;
    }
}
doStencil_Test_Passed_Z_Test_Failed_Operation () {
    switch (Stencil_Test_Passed_Z_Test_Failed_Operation) {
    /*  same logic as the switch () {} in
        Stencil_Test_Passed_Operation () */
    }
    if (!No_Save_Stencil_Buffer) {
            /* write stencil tile */
            *pointer = value & write_mask_STENCIL;
    }
}
doStencil_and_Z_Tests_Passed_Operation () {
    switch (Stencil_and_Z_Tests_Passed_Operation) {
    /*  same logic as the switch () {} in
        Stencil_Test_Passed_Operation () */
    }
    if (!No_Save_Stencil_Buffer) {
            /* write stencil tile */
            *pointer = value & write_mask_STENCIL;
    }
}
```

The state parameter Stencil_Mode from a Begin_Frame packet specifies whether the stencil test and save are per-pixel or per-sample operations and, thus, specifies the number of bits involved in the operations (in one embodiment, 2 or 8 bits).

When Stencil_Mode is TRUE, the stencil operations are per pixel, but the depth testing is per sample. For a given pixel, some of the samples may pass the depth test and some may fail the depth test. In such cases, the state parameter StencilFirst from BeginFrame packet determines which of the stencil update operations is carried out. If StencilFirst is TRUE, then depth-test result for the first sample in the pixel determines which of the Stencil_and_Z_Tests_Passed Operation and Stencil_Test_Passed_Z_Test_Failed Operation is invoked. Otherwise majority rule is used to decide the update operation. The overview pseudo-code for pixel-block data flow outlines the interaction between the stencil- and the depth-testing operations.

The stencil test is enabled with the Stencil_Test_Enabled flag. The No_Stencil_Buffer flag passed down with the Begin_Frame packet also affects the behavior of the test.

Table 16 shows the actions of the stencil-test unit 2E0 based on the settings of Stencil_Test_Enabled, No_Stencil_Buffer and No_Saved_Stencil_Buffer flags. As Table 16 shows, the No_Stencil_Buffer flag overrides other stencil-related rendering state parameters.

The stencil test can be performed on a per-fragment or per-pixel basis.

DrawStencil Functionality

Under certain circumstances, the pixel block 84B may receive a per-pixel stencil value from the Phong block 84A. The pixel block 84B treats this per-pixel stencil value in a manner similar to the stencil reference value, $stencil_{Reference}$. If the Stencil_Mode state parameter specifies per-sample operations, the pixel block unit 84B uses the stencil value from the Phong block 84A for all samples of the fragment.

For example, if an application 8211 seeks to copy pixel rectangle into the stencil buffer and per-sample operations are 8-bit operations, the stencil state parameters are set as follows:

-continued

```
            case EQUAL:    Is_Valid = (Z == destination);
                  break;
            case NEQUAL: Is Valid = (Z>destination) | (Z<destination);
                  break;
            case LEQUAL: Is_Valid = Z <= destination;
                  break;
            case GEQUAL: Is Valid = (Z >= destination);
                  break;
            case NEVER:    Is_Valid = FALSE;
                  break;
            case ALWAYS:
            otherwise:          Is_Valid = TRUE;
            }
            return (Is_Valid);
      } else
            return TRUE;
}
```

| | |
|---|---|
| DrawStencil | TRUE |
| Stencil_Test_Enabled | TRUE |
| $Function_{STENCIL}$ | ALWAYS |
| $mask_{STENCIL}$ | 0xff |
| $write\_mask_{STENCIL}$ | 0xff |
| Stencil_Test_Failed_Operation | REPLACE |
| Stencil_Test_Passed_Z_Test_Failed_Operation | REPLACE |
| Stencil_and_Z_Tests_Passed_Operation | REPLACE |
| No_Stencil_Buffer | FALSE |
| No_Saved_Stencil_Buffer | FALSE |
| Stencil_Mode | TRUE (Per-Pixel Operation) |

Depth Test

The depth buffer-test unit 2E0 compares a sample's z value with that stored in the z-buffer 210 and discards the sample if the depth comparison fails.

If the depth test passes and Z_Write_Enabled is TRUE, the depth-test unit 2E0 assigns the buffer at the sample's location the sample Z value clamped to the range $[0, 2^{Z\_VALUE\_BIT\_COUNT}-1]$. (In one embodiment, Z values are 24-bit values, and thus Z_VALUE_BIT_COUNT is set to 24.) The unit 2E0 updates the stencil buffer value according to the Stencil_and_Z_Tests_Passed_Operation state parameter. The unit 2E0 passes the sample on to the blend unit.

If the depth test fails, the unit 2E0 discards the fragment and updates the stencil value at the sample's location according to the Stencil_Test_Passed_Z_Test_Failed_Operation state parameter.

Considering the overview pseudo-code given above, the following pseudo-code further describes the logic of the depth-test unit 2E0 and the interaction between depth-testing and stencil operations.

```
boolean Passes_Z_Test() {
      boolean Is_Valid;
      if (No_Z_Buffer) {
            return TRUE;
      } else if (Z_Test_Enabled) {
            Set_Z_Buffer_Pointer (pointer);
            destination = *pointer;
            switch (Function_DEPTH) {
            case LESS:          Is_Valid = Z < destination;
                  break;
            case GREATER: Is_Valid = Z > destination;
                  break;
```

Five state parameters affect the depth-related operations in the pixel block 84B, namely, Z_Test Enabled, Z_Write_Enabled, No_Z_Buffer, $Function_{DEPTH}$ and No Saved_Z_Buffer. An pixel-mode Cache_Fill packet supplies the current values of the $Function_{DEPTH}$, Z_Test_Enabled and Z_Write_Enabled state parameters, while the Begin_Frame packet supplies the current values of the No_Z_Buffer and No_Saved_Z_Buffer state parameters.

The Z_Test_Enabled flag disables the comparison. With depth testing disabled, the unit 2E0 bypasses the depth comparison and any subsequent updates to the depth-buffer value and passes the fragment on to the next operation. The stencil value, however, is modified as if the depth test passed.

Table 14 further describes the interaction of the four parameters, Z_Test_Enabled, Z_Write_Enabled, No_Z_Buffer and No_Saved_Z_Buffer.

As mentioned elsewhere herein, the depth-buffer operations happen only if No_Z_Buffer is FALSE.

The depth test is a per-sample operation. In the aliased mode (Is_MultiSample is FALSE), the depth values are computed at the center of the fragment and assigned to each sample in the fragment. The cull block 846 appropriately generates the sample coverage mask so that, in the aliased mode, all samples are either on or off depending on whether the pixel center is included in the primitive or not.

Z_Visible

The pixel block 84B internally maintains a software-accessible register 2N0, the Z_Visible register 2N0. The block 84B clears this register 2N0 on encountering a Begin_Frame packet. The block 84B sets its value when it encounters the first visible sample of an object and clears it on read.

Blending

Blending combines a sample's R, G, B and A values with the R, G, B and A values stored at the sample's location in the framebuffer 84G. The blended color is computed as:

$$(\text{Function}_{BLEND})\ (\text{Source\_Color\_Factor}*\text{Color}_{SOURCE},\ \text{Destination\_Color\_Factor}*\text{Color}_{DESTINATION})$$

where $\text{Function}_{BLEND}$ is a state parameter specifying what operation to apply to the two products, and Source_Color_Factor and Destination_Color_Factor are state parameters affecting the color-blending operation. (The sample is the "source" and the framebuffer the "destination.")

Table 18 gives values in one embodiment for $\text{Function}_{BLEND}(x, y)$. The function options include addition, subtraction, reverse subtraction, minimum and maximum.

Source_Color_Factor specifies the multiplicand for the sample color-value multiplication, while Destination_Color_Factor specifies the multiplicand for the framebuffer color-value multiplication. Table 17 gives values in one embodiment for the Source_Color_Factor and Destination_Color_Factor state parameters. (The subscript "S" and "D" terms in Table 17 are abbreviations for "SOURCE" and "DESTINATION." The "f" term in Table 17 is an abbreviation for "MINIMUM ($A_{SOURCE}$, $1-A_{DESTINATION}$).")

The color and alpha results are clamped in the range $[0,2^{COLOR\_VALUE\_BIT\_COUNT}-1]$. In one embodiment, color and alpha values are 8-bit values, and thus COLOR_VALUE_BIT_COUNT is 8.

The Blending_Enabled state parameter enables blending, and blending is enabled only in RGBA-color mode. The Blending_Enabled value comes from a pixel-mode packet.

The $\text{write\_mask}_{RGBA}$ state parameter determines which bitplanes of the red, green, blue and alpha channels are updated.

The No_Color_Buffer and No_Saved_Color_Buffer state parameters also affect the blending operation. Their current values are from a Begin_Frame packet.

Table 15 illustrates the effect of these state parameters on blending in the pipeline.

Alpha values are processed similarly. The Source_Alpha_Factor, Destination_Alpha_Factor and $\text{Function}_{ALPHA}$ state parameters control alpha blending. The $\text{Function}_{ALPHA}$ is similar to $\text{Function}_{COLOR}$, in one embodiment taking the same set of values. Source_Alpha_Factor specifies the multiplicand for the sample alpha-value multiplication, while Destination_Alpha_Factor specifies the multiplicand for the framebuffer alpha-value multiplication. Table 19 lists the possible values in one embodiment for Source_Alpha_Factor and Destination_Alpha_Factor. (The subscript "S" and "D" terms in Table 19 are abbreviations for "SOURCE" and "DESTINATION.")

The sample buffer color and alpha are updated with the new values. The dirty bit for this sample is also set.

The pipeline 840 generates colors and alphas on a per-fragment basis. For blending, the same source color and alpha apply to all covered samples within the fragment.

Either the blend operation or the logical operations can be active at any given time but not both. Also, although OpenGL allows both logical operations and blending to be disabled, the practical effect is the same as if the source values are written into the destination.

Dithering

The pipeline 840 incorporates dithering via three M x M dither matrices, Red_Dither, Green_Dither and Blue_Dither, corresponding to the dithering of each of the red, green and blue components, respectively. The low $\log_2 M$ bits of the pixel coordinate ($x_{WINDOW}$, $y_{WINDOW}$) index into each color-component dither matrix. The indexed matrix element is added to the blended color value. The computed red, green and blue values are truncated to the desired number of bits on output.

(Dithering does not alter the alpha values.)

The following pseudo-code outlines the processing:

```
m_int Red_Dither [M, M];
m_int Green_Dither [M, M];
m_int Blue_Dither [M, M];
#define mask (M - 1)
xDITHER = xWINDOW & mask;
yDITHER = yWINDOW & mask;
red += Red_Dither [xDITHER, yDITHER]
green += Green_Dither [xDITHER, yDITHER]
blue += Blue_Dither [xDITHER, yDITHER]
```

The Dithering_Enabled state parameter enables the dithering of blended colors. Therefore, if blending is disabled, dithering is disabled as well. Since blending is disabled in color-index mode, dithering is also disabled in color-index mode. Table 20 illustrates the effects of the Dithering_Enabled and Blending_Enabled flags.

The specifics of one embodiment are as follow: The rendering pipeline 840 has 8 bits for each color component. The output pixel formats may need to be dithered down to as little as 4 bits per color component. The matrices size M is then 4, and each matrix element is an unsigned 4-bit integer.

In most cases, having one dither matrix applied to all color components may be adequate. However, in some cases, such as converting from RGB888 to RGB565 formats, separate dither matrices for the red, green and blue channels may be desirable. For this reason, the pipeline 840 uses separate dither matrices for red, green and blue components.

Four-bit elements suffice to dither the 8-bit color component values down to 4 bits per color component. If the target pixel format has fewer bits per color channel, dither elements may need more bits.

In one embodiment, the dither matrices are programmable with zero as the default value for all elements. (This disables dithering.) The responsibility then falls on the using software 8211 to appropriately load these matrices.

The described framework will suffice for most applications. Dithering is a per-fragment operation.

Logical Operations

Like the blend unit 2F0, the logical-operations unit 2H0 computes a new color value based on the incoming value and the value stored in the framebuffer 84G. Logical operations for each color component value (red, green, blue and alpha) are independent of each other. Table 21 shows the available logical operations in one embodiment. (The "s" and "d" terms in Table 21 are abbreviations for "SOURCE" and "DESTINATION.")

Logical operations are enabled if blending is disabled, that is to say, if Blending_Enabled is FALSE. Unlike blending, the logical operations may be invoked in color-index as well as RGBA mode, and the dithering does not apply if logical operations are enabled.

Tile Input and Output

The pixel-out unit 280 prepares tiles for output by the back end 84C and for rendering by the pixel block 84B. In preparing tiles for output, the pixel-out unit 280 performs sample-to-pixel resolution on the color, depth and stencil values, as well as pixel-format conversion as needed. In preparing tiles for rendering, the pixel-out unit 280 gets the pixel color, depth and stencil values from the back-end block 84C and does format conversion from the input pixel format (specified by the Pixel_Format state parameter) to the output pixel format (in one embodiment, RGBA8888) before the start of geometry rendering on the tiles.

The pixel-out unit 280 also performs clears.

FIG. J 5 is a block diagram of the pixel-out unit 280. The pixel-out unit 280 includes stencil-out, depth-out and color-out units 282, 284 and 286 receiving input from the sample stencil, depth and color buffers 2I1,2I2 and 2J0, respectively. The stencil-out and depth-out units 282 and 284 both output to the per-pixel tile buffers 2K0. The color-out unit 286 outputs to a format converter 287 that itself outputs to the buffers 2K0.

The pixel-out unit 280 also includes clear-stencil, clear-depth and clear-color units 281, 283 and 285, all receiving input from the tile buffers 2K0. The clear units implement single-clock flash clear. The communication between clear units and the input units (for example the clear_stencil 281 and stencil-in unit 288) happens via a handshake. The clear-color unit 285 signals the format converter unit 28A that itself outputs to a color-in unit 28B. The stencil-in, depth-in and color-in units 288, 289 and 28B output to the sample stencil, depth and color buffers 211, 212 and 2J0, respectively.

The stencil-out, depth-out and color-out blocks 282, 284 and 286 convert from sample values to, respectively, pixel stencil, depth and color values as described herein. The stencil-in, depth-in and color-in blocks 288, 289 and 28B convert from pixel to sample values. The format converters 287 and 28A convert between the output pixel format (RGBA8888, in one embodiment) and the input pixel format (specified by the Pixel_Format state parameter, in one embodiment.)

Tile Input

A set of per-pixel tile staging buffers 2K0*a*, 2K0*b*, 2K0*c*, . . . , (generically and individually, 2K0α, and, collectively, 2K0) exists between the pixel-out block 280 and the back-end block 84C. Each of these buffers 2K0 has three associated state bits (Empty, BackEnd_Done and Pixel_Done) that regulate (or simulate) the handshake between the pixel-out and back-end blocks 280, 84C for the use of these buffers 2K0. Both the back-end and the pixel-out units 84C, 280 maintain respective current input and output buffer pointers indicating the staging buffer 2K0α from which the respective unit is reading or to which the respective unit is writing.

The pixel block 84B and the pixel-out unit 280 initiate and complete tile output using a handshake protocol. When rendering to a tile is completed, the pixel block 84B signals the pixel-out unit 280 to output the tile. The pixel-out unit 280 sends color, z and stencil values to the pixel buffers 2K0 for transfer by the back end 84C to the framebuffer 84G. The framebuffer 84G stores the color and z values for each pixel, while the pixel block 84B maintains values for each sample. (Stencil values for both framebuffer 84G and the pixel block 84B are stored identically.) The pixel-out unit 280 chooses which values to store in the framebuffer 84G.

In preparing the tiles for rendering by the pixel block 84B, the back-end block 84C takes the next Empty buffer 2K0α (clearing its Empty bit), step 1105, and reads in the data from the framebuffer memory 84G as needed, as determined by its Backend_Clear_Color, Backend_Clear_Depth and Backend_Clear_Stencil state parameters set by a Begin_Tile packet, step 1110. (The back-end block 84C either reads into or clears a set of bitplanes.) After the back-end block 84C finishes reading in the tile, it sets the BackEnd_Done bit, step 1115.

The input filter 220 initiates tile preparation using a sequence of commands to the pixel-out unit 280. This command sequences is typically: Begin_Tile, Begin_Tile, Begin_Tile . . . Each Begin_Tile signals the pixel-out unit 280 to find the next BackEnd_Done pixel buffer. The pixel-out unit 280 looks at the BackEnd_Done bit of the input tile buffer 2KOa, step 1205. If the BackEnd_Done bit is not set, step 1210, the pixel-out unit 280 stalls, step 1220. Otherwise, it clears the BackEnd_Done bit, clears the color, depth and/or stencil bitplanes (as needed) in the pixel tile buffer 2K0α and appropriately transfers the pixel tile buffer 2K0α to the tile sample buffers 2I1,2I2 and 2J0, step 1215. When done, the pixel block 240 marks the sample tile buffer as ready for rendering (sets the Pixel_Done bit).

Tile Output

On output, the pixel-out unit 280 resolves the samples in the rendered tile into pixels in the pixel tile buffers 2K0. The pixel-out unit 280 traverses the pixel buffers 2K0 in order and emits a rendered sample tile to the same pixel buffer 2K0α whence it came. After completing the tile output to the pixel tile buffer 2K0α, the pixel-out unit 280 sets the Pixel_Done bit.

On observing a set Pixel_Done bit, step 1125, the back-end block 84C sets its current input pointer to the associated pixel tile buffer 2K0α, clears the Pixel_Done bit (step 1130) and transfers the tile buffer 2K0α to the framebuffer memory 84G. After completing the transfer, the back-end block 84C sets the Empty bit on the buffer 2K0α, step 1135.

Depth Output

The pixel-out unit 280 sends depth values to the pixel buffer 2K0α if the corresponding Begin_Frame packet has cleared the No_Saved_Depth_Buffer state parameter. The Depth_Output_Selection state parameter determines the selection of the sample's z value. The following pseudo-code illustrates the effect of the Depth_Output_Selection state parameter:

```
int SAMPLES_PER_PIXEL = 4;
int sorted_sample_depths [SAMPLES_PER_PIXEL];
if (Depth_Output_Selection == FIRST) {
    /* first sample */
    Sample_to_Output = 0;
} else {
    /* sort sample depths into sorted_sample_depths [] */
    Order_Sample_Depth_Values ();
    Sample_to_Output = sorted_sample_depths [
        (Depth_Output_Selection == NEAREST) ?
                                    0 : SAMPLES_PER_PIXEL - 1];
}
```

Color Output

The pixel block 84B sends color values to the pixel buffers 2K0 if the corresponding Begin_Frame packet has cleared the No_Saved_Color_Buffer state parameter. The color value output depends on the setting of the Overflow_Frame, Color Output_Selection and Color_Output_Overflow_Selected state parameters. The following pseudo-code outlines the logic for processing colors on output:

```
int SAMPLES_PER_PIXEL = 4;
color_selected = (Overflow_Frame) ?
        Color_Output Overflow_Selected :
                                Color_Output_Selection;
```

-continued

```
switch (color_selected) {
    case WEIGHTED:
        colorPIXEL = Compute_Weighted_Average ();
        break;
    case FIRST:
        colorPIXEL = first_Sample_Color;
        break;
    case DIRTY:
        fcolor = (0, 0, 0);
        number_of_samples = 0;
        for (count = 0; count < SAMPLES_PER_PIXEL; count++) {
            if (Sample_Is_Dirty) {
                fcolor += sampleSrcColor;
                number_of_samples++;
            }
        }
        if (number_of_samples > 0)
            colorPIXEL = fcolor/number_of_samples;
        break;
    case MAJORITY:
        numFgnd = numBgnd = 0;
        fcolor = bcolor = (0, 0, 0);
        for (count = 0; count < SAMPLES_PER_PIXEL; count++) {
            if (Sample_Is_Dirty) {
                numFgnd++;
                fcolor += sample_Source_Color;
            } else {
                numBgnd++;
                bcolor += sample_Buffer_Color;
            }
        }
        color = (numFgnd >= numBgnd) ? fcolor/numFgnd:
                                       bcolor/numBgnd;
        break;
}
```

This computed color is assigned to the pixel.

For some options, like DIRTY_SAMPLES, the color may not be blended between passes. This may cause some aliasing artifacts but prevents the worse artifacts of background colors bleeding through at abutting polygon edges in the case of an overflow of the polygon or sort memory. In any case, the application 8211 has substantial control over combining the color samples prior to output.

The sample weights used in computation of the weighted average are programmable. They are 8-bit quantities in one embodiment. These eight bit quantities are represented as 1.7 numbers (i.e. 1 integer bit followed by 7 fraction bits in fixed point format). This allows specification of each of the weights to be in the range 0.0 to a little less than 2.0. For uniform weighting of 4 samples in the pixel, the specified weight for each sample should be 32. The weight of the samples will thus add up to 128, which is equal to 1.0 in the fixed point format used in the embodiment.

Stencil Output

The pixel-out unit 280 sends stencil values to the pixel buffer 2K0 if the No_Saved_Stencil_Buffer flag is not set in the corresponding Begin_Frame packet. The stencil values may need to be passed from one frame to the next and used in frame clearing operations. Because of this, keeping sample-level precision for stencils may be necessary. (The application 8211 may choose to use either 8 bits per-pixel or 2 bits per-sample for each stencil value). The Stencil_Mode bit in a Begin_Frame determines if the stencil is per-pixel or per-sample. In either case, the sample-level-precision bits (8, in one embodiment) of stencil information per pixel are sent out.

Pixel-Format Conversion

Pixel format conversion happens both at tile output and at tile preparation for rendering. Left or right shifting the pixel color and alpha components by the appropriate amount converts the pipeline format RGBA8888 to the target format (herein, one of ARGB8888, RGB565 and INDEX8).

Stencil Output

The pixel-out unit 280 sends stencil values to the pixel buffer 2K0 if the No_Saved_Stencil_Buffer flag is not set in the corresponding Begin Frame packet. The stencil values may need to be passed from one frame to the next and used in frame clearing operations. Because of this, keeping sample-level precision for stencils may be necessary. (The application 8211 may choose to use either 8 bits per-pixel or 2 bits per-sample for each stencil value). The Stencil_Mode bit in a Begin_Frame determines if the stencil is per-pixel or per-sample. In either case, the sample-level-precision bits (8, in one embodiment) of stencil information per pixel are sent out.

Pixel-Format Conversion

Pixel format conversion happens both at tile output and at tile preparation for rendering. Left or right shifting the pixel color and alpha components by the appropriate amount converts the pipeline format RGBA8888 to the target format (herein, one of ARGB8888, RGB565 and INDEX8).

TABLE 1

Begin_Frame and Prefetch_Begin_Frame Packets

| Data Item | Bits/Item | Source | Destination |
|---|---|---|---|
| Header | 5 | MIJ | |
| Blocking_Interrupt | 1 | SW | BKE |
| WinSourceL | 8 | SW | BKE |
| WinSourceR | 8 | SW | BKE |
| WinTargetL | 8 | SW | BKE |
| WinTargetR | 8 | SW | BKE |
| Window_X_Offset | 8 | SW | BKE |
| Window_Y_Offset | 12 | SW | BKE |
| Pixel_Format | 2 | SW | PIX, BKE |
| SrcEqTarL | 1 | SW | SRT, BKE |
| SrcEqTarR | 1 | SW | SRT, BKE |
| No_Color_Buffer | 1 | SW | PIX, BKE |
| No_Saved_Color_Buffer | 1 | SW | PIX, BKE |
| No_Z_Buffer | 1 | SW | PIX, BKE |
| No_Saved_Z_Buffer | 1 | SW | PIX, BKE |
| No_Stencil_Buffer | 1 | SW | PIX, BKE |
| No_Saved_Stencil_Buffer | 1 | SW | PIX, BKE |
| Stencil_Mode | 1 | SW | PIX |
| Depth_Output_Selection | 2 | SW | PIX |
| Color_Output_Selection | 2 | SW | PIX |
| Color_Output_Overflow_Selection | 2 | SW | PIX |
| Vertical_Pixel_Count | 11 | SW | BKE |
| StencilFirst | 1 | SW | PIX |
| Total Bits | 87 | | |

TABLE 2

End_Frame and Prefetch_End_Frame Packets

| Data Item | Bits/Item | Source | Destination |
|---|---|---|---|
| Header | 5 | MIJ | |
| Interrupt_Number | 6 | SW | BKE |
| Soft_End_Frame | 1 | SW | MEX |
| Buffer_Over_Occurred | 1 | MEX | SRT, PIX |
| Total Bits | 13 | | |

TABLE 3

VSP Packet

| Data Item | Bits | Description |
|---|---|---|
| Header | 5 | |
| Mode_Cache_Index | 4 | Index of mode information in mode cache. |
| Stipple_Cache_Index | 2 | Index of stipple information in stipple cache. |
| Stamp_X_Index | 3 | X-wise index of stamp in tile. |
| Stamp_Y_Index | 3 | Y-wise index of stamp in tile. |
| Sample_Coverage_Mask | 16 | Mask of visible samples in stamp. |
| $Z_{REFERENCE}$ | 32 | The reference value with respect to which all Z reference values are computed. |
| dZdX | 28 | Partial derivative of z along the x direction. |
| dZdY | 28 | Partial derivative of z along the y direction. |
| Is_MultiSample | 1 | Flag indicating anti-aliased or non-anti-aliased rendering. |
| Total Bits | 122 | |

TABLE 4

Clear Packet

| Data Item | Bits/Item | Source | Destination |
|---|---|---|---|
| Header | 5 | SW | PIX |
| Mode_Cache_Index | 4 | MIJ | PIX |
| Clear_Color | 1 | SW | PIX |
| Clear_Depth | 1 | SW | PIX |
| Clear_Stencil | 1 | SW | PIX |
| Clear_Color_Value | 32 | SW | PIX |
| Clear_Depth_Value | 24 | SW | PIX |
| Clear_Stencil_Value | 8 | SW | PIX |
| Total Bits | 75 | | |

TABLE 5

Tile_Begin and Prefetch_Tile_Begin Packets

| Data Item | Bits/Item |
|---|---|
| Header | 5 |
| First_Tile_In_Frame | 1 |
| Breakpoint_Tile | 1 |
| Tile_Right | 1 |
| Tile_Front | 1 |
| Tile_X_Location | 7 |
| Tile_Y_Location | 7 |
| Tile_Repeat | 1 |
| Tile_Begin_SubFrame | 1 |
| Begin_SuperTile | 1 |
| Overflow_Frame | 1 |
| Write_Tile_ZS | 1 |
| Backend_Clear_Color | 1 |
| Backend_Clear_Depth | 1 |
| Backend_Clear_Stencil | 1 |
| Clear_Color_Value | 32 |
| Clear_Depth_Value | 24 |
| Clear_Stencil_Value | 8 |
| Total Bits | 95 |

TABLE 6

Pixel-Mode Cache_Fill Packet (Part 1 of 2)

| Data Item | Bits | Description |
|---|---|---|
| Header | 5 | |
| Mode_Cache_Index | 4 | Index of the cache entry to replace. |
| Scissor_Test_Enabled | 1 | Scissor test enable flag. |
| $x_{Scissor\_Min}$ | 11 | Scissor window definition: $x_{MIN}$ |
| $x_{Scissor\_Max}$ | 11 | Scissor window definition: $x_{MAX}$ |
| $y_{Scissor\_Min}$ | 11 | Scissor window definition: $x_{MIN}$ |
| $y_{Scissor\_Max}$ | 11 | Scissor window definition: $X_{MAX}$ |
| Stipple_Test_Enabled | 1 | Stipple test enable flag. |
| $Function_{ALPHA}$ | 3 | Function for the alpha test. |
| $alpha_{REFERENCE}$ | 8 | Reference value used in alpha test. |
| Alpha_Test_Enabled | 1 | Alpha test enable flag. |
| $Function_{COLOR}$ | 3 | Color-test function. |
| $color_{MIN}$ | 24 | Minimum inclusive value of the color key. |
| $color_{MAX}$ | 24 | Maximum inclusive value for the color key. |
| Color_Test_Enabled | 1 | Color test enable flag. |
| $stencil_{REFERENCE}$ | 8 | Reference value used in The stencil test. |
| $Function_{STENCIL}$ | 3 | Stencil-test function. |
| $Function_{DEPTH}$ | 3 | Depth-test function. |
| $mask_{STENCIL}$ | 8 | Stencil mask to AND the reference and buffer sample stencil values prior to testing. |

TABLE 6-continued

Pixel-Mode Cache_Fill Packet (Part 1 of 2)

| Data Item | Bits | Description |
|---|---|---|
| Stencil_Test_Failure_Operation | 4 | Action to take on failure of the stencil test. |
| Stencil_Test_Pass_Z_Test_Failure_Operation | 4 | Action to take on passage of the stencil test and failure of the depth test. |
| Stencil_and_Z_Tests_Pass_Operation | 4 | Action to take on passage of both the stencil and depth tests. |
| Stencil_Test_Enabled | 1 | Stencil test enable flag. |
| $write\_mask_{STENCIL}$ | 8 | Stencil mask for the stencil bits in the buffer that are updated. |

TABLE 7

Pixel-Mode Cache_Fill Packet (Part 2 of 2)

| Data Item | Bits | Description |
|---|---|---|
| Z_Test_Enabled | 1 | Depth test enable flag. |
| Z_Write_Enabled | 1 | Depth write enable flag. |
| DrawStencil | 1 | Flag to interpret the second data value from the Phong block 84A as stencil data. |
| $write\_mask_{COLOR}$ | 32 | Mask of bitplanes in the draw buffer that are enabled. (In color-index mode, the low-order 8 bits are the IndexMask.) |
| Blending_Enabled | 1 | Flag indicating that blending is enabled. |
| $Constant\_Color_{BLEND}$ | 32 | Constant color for blending. |
| Source_Color_Factor | 4 | Multiplier for source-derived sample colors. |
| Destination_Color_Factor | 4 | Multiplier for destination-derived sample colors. |
| Source_Alpha_Factor | 3 | Multiplier for sample alpha values. |
| Destination_Alpha_Factor | 3 | Multiplier for sample alpha values already in the tile buffer. |
| Color_LogicBlend_Operation | 4 | Logic or blend operation for color values. |
| Alpha_LogicBlend_Operation | 4 | Logic or blend operation for alpha values. |
| Dithering_Enabled | 1 | Dither test enable flag. |
| TOTAL | 253 | |

TABLE 8

Color Packet

| Data Item | Bits | Description |
|---|---|---|
| Header | 1 | |
| Color | 32 | RGBA data. |
| TOTAL | 33 | |

TABLE 9

Depth Packet

| Data Item | Bits | Description |
|---|---|---|
| Header | 1 | |
| Z | 32 | Fragment stencil or depth data. |
| TOTAL | 33 | |

TABLE 10

Stipple Cache_Fill Packet

| Data Item | Bits | Description |
|---|---|---|
| Header | 1 | |
| Stipple_Cache_Index | 2 | Index of cache entry to replace. |
| Stipple_Pattern | 1024 | Stipple pattern. |
| TOTAL | 1031 | |

TABLE 11

Alpha-Test Functions

| FunctionALPHA | Value | Comparison |
|---|---|---|
| LESS | 0x1 | $(A < alpha_{Reference})$ |
| LEQUAL | 0x3 | $(A <= alpha_{Reference})$ |
| EQUAL | 0x2 | $(A == alpha_{Reference})$ |
| NEQUAL | 0x5 | $(A != alpha_{Reference})$ |
| GEQUAL | 0x6 | $(A >= alpha_{Reference})$ |
| GREATER | 0x4 | $(A > alpha_{Reference})$ |
| ALWAYS | 0x7 | (TRUE) |
| NEVER | 0x0 | (FALSE) |

TABLE 12

| Color-Test Functions | | |
|---|---|---|
| $\text{Function}_{COLOR}$ | Value | Comparison |
| LESS | 0x1 | $(C < \text{color}_{MIN})$ |
| LEQUAL | 0x3 | $(C =< \text{color}_{MAX})$ |
| EQUAL | 0x2 | $(C >= \text{color}_{MIN})$ & $(C =< \text{color}_{MAX})$ |
| NEQUAL | 0x5 | $(C < \text{color}_{MIN}) \mid (C > \text{color}_{MAX})$ |
| GEQUAL | 0x6 | $(C >= \text{color}_{MIN})$ |
| GREATER | 0x4 | $(C > \text{color}_{MAX})$ |
| ALWAYS | 0x7 | TRUE |
| NEVER | 0x0 | FALSE |

TABLE 13

| Stencil Operations | | |
|---|---|---|
| Operation | Value | Action |
| KEEP | 0x0 | Keep stored value |
| ZERO | 0x1 | Set value to zero |

TABLE 13-continued

| Stencil Operations | | |
|---|---|---|
| Operation | Value | Action |
| MAX_VAL | 0x2 | Set to the maximum allowed. For pipeline 840 maximum stencil value is 255 in the per-pixel mode and 3 in the per-sample mode. |
| REPLACE | 0x3 | Replace stored value with reference value |
| INCR | 0x4 | Increment stored value |
| DECR | 0x5 | Decrement stored value |
| INCRSAT | 0x6 | Increment stored value, clamp to max on overflow. This is equivalent to the INCR operation in OpenGL. |
| DECRSAT | 0x7 | Decrement stored value; clamp to 0 on underflow. This is equivalent to the DECR operation in OpenGL. |
| INVERT | 0x8 | Bitwise invert stored value |

TABLE 14

| Depth-Test Flag Effects | | | | |
|---|---|---|---|---|
| No_Z_ Buffer | No_ Saved_Z_ Buffer | Z_Test_ Enabled | Z_Test_ Write_Enabled | Action |
| TRUE | TRUE | X | X | The depth-test, -update and -output operations are all bypassed regardless of the value of other parameters. (Such a situation might arise when a pre-sorted scene is being rendered.) Stencil values are updated as if the depth test passed. No_Saved_Z_Bufferfer is TRUE if No_Z_Buffer is TRUE. |
| FALSE | X | FALSE | FALSE | It is as if the depth test always passes but the z-buffer values on chip are not updated for the current object (a decal or a sorted transparency, for example). Depth tile buffer is output to the framebuffer memory only if No_Saved_Z_Buffer is FALSE. |
| FALSE | X | FALSE | TRUE | It is as if the depth test always passes. Tile depth buffer values are updated. The depth buffer is written out to framebuffer memory on output only if No_Saved_Z_Buffer is FALSE. |
| FALSE | X | TRUE | FALSE | Depth test is conducted but the tile depth buffer is not updated for this object. (Again, examples are multi-pass rendering and transparency.) Depth buffer is sent to the framebuffer memory on output only if No_Saved_Z_Buffer is FALSE. |
| FALSE | X | TRUE | TRUE | Everything is enabled. Depth buffer is sent to the framebuffer memory on output only if No_Saved_Z_Buffer is FALSE. |

TABLE 15

| Blend Flag Effects | | | |
|---|---|---|---|
| No_ Color_ Buffer | Blending_ Enabled | No_ Saved_ Color_ Buffer | Action |
| TRUE | X | TRUE | Color operations such as blending, dithering and logical operations are disabled. Color buffer is also not sent to framebuffer memory on output. (Such a situation may arise during creation of a depth map.) No_Saved_Color_Buffer is TRUE if No_Color_Buffer is TRUE. |
| FALSE | FALSE | X | Blending is disabled. Logic op setting may determine how the color is combined with the tile buffer value. Tile color buffer is sent to framebuffer memory on output only if No_Saved_Color_Buffer is FALSE. |
| FALSE | TRUE | X | Blending is enabled. Tile color buffer is sent to framebuffer memory on output only if No_Saved_Color_Buffer is FALSE. |

TABLE 16

| Stencil Test Flag Effects | | | |
|---|---|---|---|
| No_ Stencil_ Buffer | Stencil_ Test_ Enabled | No_ Saved_ Stencil_ Buffer | Action |
| TRUE | X | X | The stencil-test, -update and -output operations are all bypassed regardless of the value of Stencil_Test_Enabled and No_Saved_Stencil_Buffer. If DrawStencil is TRUE, the stencil value received from the Phong block 84A is also ignored. (No_Saved_Stencil_Buffer is TRUE if No_Stencil_Buffer is TRUE. |
| FALSE | FALSE | FALSE | It is as if the stencil test always passes and all stencil operations are KEEP, effectively a NoOp. The stencil tile buffer is output to the framebuffer memory. If DrawStencil is TRUE, the stencil value received from the Phong block 84A is also ignored. |
| FALSE | FALSE | TRUE | It is as if the stencil test always passes and all stencil operations are KEEP, effectively a NoOp. The stencil tile buffer is not output either. If DrawStencil is TRUE, the stencil value received from the Phong block 84A is also ignored. |
| FALSE | TRUE | FALSE | The stencil test is performed and the stencil tile is written out. If DrawStencil is TRUE, the stencil value received from the Phong block 84A is used instead of $stencil_{REFERENCE}$ in tests and updates. |
| FALSE | TRUE | TRUE | The Stencil test is performed, but the stencil buffer is not written out. If DrawStencil is TRUE, the stencil value received from the Phong block 84A is used instead of $stencil_{REFERENCE}$ in tests and updates. |

TABLE 17

Color Blend Factors

| Value | Encoding | Blend Factors |
|---|---|---|
| ZERO | 0x8 | (0, 0, 0) |
| ONE | 0x0 | (1, 1, 1) |
| SOURCE_COLOR | 0x1 | $(R_S, G_S, B_S)$ |
| ONE_MINUS_SOURCE_COLOR | 0x9 | $(1, 1, 1) - (R_S, G_S, B_S)$ |
| DESTINATION_COLOR | 0x3 | $(R_D, G_D, B_D)$ |
| ONE_MINUS_DESTINATION_COLOR | 0xB | $(1, 1, 1) - (R_D, G_D, B_D)$ |
| SOURCE_ALPHA | 0x4 | $(A_S, A_S, A_S)$ |
| ONE_MINUS_SOURCE_ALPHA | 0xC | $(1, 1, 1) - (A_S, A_S, A_S)$ |
| DESTINATION_ALPHA | 0x6 | $(A_D, A_D, A_D)$ |
| ONE_MINUS_DESTINATION_ALPHA | 0xE | $(1, 1, 1) - (A_D, A_D, A_D)$ |
| SOURCE_ALPHA_SATURATE | 0xF | (f, f, f) |
| CONSTANT_COLOR | 0x2 | $(R_C, G_C, B_C)$ |
| ONE_MINUS_CONSTANT_COLOR | 0xA | $(1, 1, 1) - (R_C, G_C, B_C)$ |
| CONSTANT_ALPHA | 0x5 | $(A_C, A_C, A_C)$ |
| ONE_MINUS_CONSTANT_ALPHA | 0xD | $(1, 1, 1) - (A_C, A_C, A_C)$ |

TABLE 18

$Function_{BLEND}$ Values

| Value | Encoding | Operation |
|---|---|---|
| ADD (x, y) | 0x0 | x + y |
| SUBTRACT (x, y) | 0x1 | x − y |
| REVERSE_SUBTRACT (x, y) | 0x2 | y − x |
| MINIMUM (x, y) | 0x3 | minimum(x, y) |
| MAXIMUM (x, y) | 0x4 | maximum(x, y) |

TABLE 19

Source and Destination Alpha Blend Factors

| Value | Encoding | Blend Factors |
|---|---|---|
| ZERO | 0x4 | (0, 0, 0, 0) |
| ONE | 0x0 | (1, 1, 1, 1) |
| SOURCE_ALPHA | 0x1 | $A_s$ |
| ONE_MINUS_SOURCE_ALPHA | 0x5 | $(1 - A_s)$ |
| DESTINATION_ALPHA | 0x3 | $A_d$ |
| ONE_MINUS_DESTINATION_ALPHA | 0x7 | $(1 - A_s)$ |
| CONSTANT_ALPHA | 0x2 | $A_c$ |
| ONE_MINUS_CONSTANT_ALPHA | 0x6 | $(1 - A_c)$ |

TABLE 20

Effects of Blending_Enabled and Dithering_Enabled State Parameters

| Blending_Enabled | Dithering_Enabled | Operation |
|---|---|---|
| TRUE | TRUE | Blending and dithering are enabled. Logical operations are disabled. |
| TRUE | FALSE | Blending is enabled. Dithering and logical operations are disabled. |
| FALSE | TRUE | Blending and dithering are disabled. Logical operations are enabled. |
| FALSE | FALSE | Blending and dithering are disabled. Logical operations are enabled. |

TABLE 21

Logical Operations

| Value | Encoding | Operation |
|---|---|---|
| CLEAR | 0x0 | 0 |
| COPY | 0x3 | s |
| NOOP | 0x5 | d |
| SET | 0xf | all 1's |
| AND | 0x1 | s Λ d |
| AND_REVERSE | 0x2 | s Λ ¬d |
| AND_INVERTED | 0x4 | ¬s Λ d |
| XOR | 0x6 | s xor d |
| OR | 0x7 | s V d |
| NOR | 0x8 | ¬(s V d) |
| EQUIVAENT | 0x9 | ¬(s xor d) |
| INVERT | 0xa | ¬d |
| OR_REVERSE | 0xb | s V ¬d |
| COPY_INVERTED | 0xc | ¬s |
| OR_INVERTED | 0xd | ¬s V d |
| NAND | 0xe | ¬(s Λ d) |

TABLE 22

State Parameters (Part 1 of 2)

| Parameter |
|---|
| Stipple_Pattern |
| Pixel_Format |
| No_Saved_Stencil_Buffer |
| No_Stencil_Buffer |
| No_Z_Buffer |
| No_Saved_Z_Buffer |
| No_Color_Buffer |
| No_Saved_Color_Buffer |
| Color_Output_Selection |
| Color_Output_Overflow_Selection |
| DrawStencil |
| SampleLocations |
| SampleWeights |
| Depth_Output_Selection |
| Stencil_Mode |
| Tile_X_Location |
| Tile_Y_Location |
| Clear_Color_Value |
| Clear_Depth_Value |
| Clear_Stencil_Value |
| DepthClearMask |
| $write\_mask_{STENCIL}$ |
| Overflow_Frame |
| Enable_Flags |
| Is_MultiSample |
| $write\_mask_{RGBA}$ |
| $Function_{ALPHA}$ |
| $alpha_{Reference}$ |

TABLE 23

State Parameters (Part 2 of 2)

| Parameter |
|---|
| $Function_{COLOR}$ |
| $Constant\_Color_{BLEND}$ |
| $color_{MIN}$ |
| $color_{MAX}$ |
| $Function_{DEPTH}$ |
| $Function_{STENCIL}$ |
| Stencil_Test_Failed_Operation |
| Stencil_Test_Passed_Z_Test_Failed_Operation |
| Stencil_and_Z_Tests_Passed_Operation |
| Source_Color_Factor |
| Destinaton_Color_Factor |
| Color_LogicBlend_Operation |
| Source_Alpha_Factor |
| Destination_Alpha_Factor |
| $stencil_{REFERENCE}$ |
| $mask_{STENCIL}$ |
| $X_{Scissor\_Min}$ |
| $x_{Scissor\_Max}$ |
| $y_{Scissor\_Min}$ |
| $y_{Scissor\_Max}$ |

Highlights of Particular Embodiments

We now highlight particular embodiments of the inventive deferred shading graphics processor (DSGP). In one aspect (CULL) the inventive DSGP provides structure and method for performing conservative hidden surface removal. Numerous embodiments are shown and described, including but not limited to:

(1) A method of performing hidden surface removal in a computer graphics pipeline comprising the steps of: selecting a current primitive from a group of primitives, each primitive comprising a plurality of stamps; comparing stamps in the current primitive to stamps from previously evaluated primitives in the group of primitives; selecting a first stamp as a currently potentially visible stamp (CPVS) based on a relationship of depth states of samples in the first stamp with depth states of samples of previously evaluated stamps; comparing the CPVS to a second stamp; discarding the second stamp when no part of the second stamp would affect a final graphics display image based on the stamps that have been evaluated; discarding the CPVS and making the second stamp the CPVS, when the second stamp hides the CPVS; dispatching the CPVS and making the second stamp the CPVS when both the second stamp and the CPVS are at least partially visible in the final graphics display image; and dispatching the second stamp and the CPVS when the visibility of the second stamp and the CPVS depends on parameters evaluated later in the computer graphics pipeline.

(2) The method of (1) wherein the step of comparing the CPVS to a second stamp furthing comprises the steps of: comparing depth states of samples in the CPVS to depth states of samples in the second stamp; and evaluating pipeline state values. (3) The method of (1) wherein the depth state comprises one z value per sample, and wherein the z value includes a state bit which is defined to be accurate when the z value represents an actual z value of a currently visible surface and is defined to be conservative when the z value represents a maximum z value. (4) The method of (1) further comprising the step of dispatching the second stamp and the CPVS when the second stamp potentially alters the final graphics display image independent of the depth state. (5) The method of (1) further comprising the steps of: coloring the dispatched stamps; and performing an exact z buffer test on the dispatched stamps, after the coloring step. (6) The method of (1) further comprising the steps of: comparing alpha values of a plurality of samples to a reference alpha value; and performing the step of dispatching the second stamp and the CPVS, independent of alpha values when the alpha values of the plurality of samples are all greater than the reference value. (7) The method of (1) further comprising the steps of: determining whether any samples in the current primitive may affect final pixel color values in the final graphics display image; and turning blending off for the current primitive when no samples in the current primitive affect final pixel color values in the final graphics display image. (8) The method of claim 1 wherein the step of comparing stamps in the current primitive to stamps from previously evaluated primitives further comprises the steps of: determining a maximum z value for a plurality of stamp locations of the current primitive; comparing the maximum z value for a plurality of stamp positions with a minimum z value of the current primitive and setting corresponding stamp selection bits; and identifying as a process row a row of stamps wherein the maximum z value for a stamp position in the row is greater than the minimum z value of the current primitive. (9) The method of (8) wherein the step of determining a maximum z value for a plurality of stamp locations of the current primitive further comprises determining a maximum z value for each stamp in a bounding box of the current primitive. (10) The method of (8) wherein the step of comparing stamps in the current primitive to stamps from previously evaluated primitives further comprises the steps of: determining the left most and right most stamps touched by the current primitive in each of the process rows and defining corresponding stamp primitive coverage bits; and combining the stamp primitive coverage bits with the stamp selection bits to generate a final potentially visible stamp set. (11) The method of (10) wherein the step of comparing stamps in the current primitive to stamps from previously evaluated primitives further comprises the steps of: determining a set of sample points in a stamp in the final potentially visible stamp set; computing a z value for a plurality of sample points in the set of sample points; and comparing the computed z values with stored z values and outputting sample control signals. (12) The method of (10) wherein the step of comparing the computed z values with stored z values, further comprises the steps of: storing a first sample at a first sample location as a Zfar sample, if a first depth state of the first sample is the maximum depth state of a visible sample at the first sample location; comparing a second sample to the first sample; and storing the second sample if the second sample is currently potentially visible as a Zopt sample, and discarding the second sample when the Zfar sample hides the second sample. (13) The method of (10) wherein when it is determined that one sample in a stamp should be dispatched down the pipeline, all samples in the stamp are dispatched down the pipeline. (14) The method of (10) wherein when it is determined that one sample in a pixel should be dispatched down the pipeline, all samples in the pixel are dispatched down the pipeline. (15) The method of (10) wherein the step of computing a z value for a plurality of sample points in the set of sample points further comprises the steps of: creating a reference z value for a stamp; computing partial derivatives for a plurality of sample points in the set of sample points; sending down the pipeline the reference z value and the partial derivatives; and computing a z value for a sample based on the reference z value and partial derivatives. (16) The method of (10) further comprising the steps of: receiving a reference z value and partial derivatives; and re-computing a z value for a sample based on the reference z value and partial derivatives. (17) The method of (10) further comprising the step of dispatching the CPVS when the CPVS can affect stencil values. The method of (13) further comprising the step of dispatching all currently potentially visible stamps when a stencil test changes. (19) The method of (10) further comprising the steps of: storing concurrently samples from a plurality of primitives; and comparing a computed z value for a sample at a first sample location with stored z values of samples at the first sample location from a plurality of primitives. (20) The method of (10) wherein each stamp comprises at least one pixel and wherein the pixels in a stamp are processed in parallel. (21) The method of (20) further comprising the steps of: dividing a display image area into tiles; and rendering the display image in each tile independently. (22) The method of (10) wherein the sample points are located at positions between subraster grid lines. (23) The method of (20) wherein locations of the sample points within each pixel are programmable. (24) The method of (23) further comprising the steps of: programming a first set of sample locations in a plurality of pixels; evaluating stamp visibility using the first set of sample locations; programming a second set of sample locations in a plurality of pixels; and evaluating stamp visibility using the second set of sample locations. (25) The method of (10) further comprising the step of eliminating individual stamps that are determined not to affect the final graphics display image. (26) The method of (10) further comprising the step of turning off blending when alpha values at vertices of the current primitive have values such that frame buffer color values cannot affect a final color of samples in the current primitive. (27) The method of (1) wherein the depth state comprises a far z value and a near z value.

(28) A hidden surface removal system for a deferred shader computer graphics pipeline comprising: a magnitude comparison content addressable memory Cull unit for identifying a first group of potentially visible samples associated with a current primitive; a Stamp Selection unit, coupled to the magnitude comparison content addressable memory cull unit, for identifying, based on the first group and a perimeter of the primitive, a second group of potentially visible samples associated with the primitive; a Z Cull unit, coupled to the stamp selection unit and the magnitude comparison content addressable memory cull unit, for identifying visible stamp portions by evaluating a pipeline state, and comparing depth states of the second group with stored depth state values; and a Stamp Portion Memory unit, coupled to the Z Cull unit, for storing visible stamp portions based on control signals received from the Z Cull unit, wherein the Stamp Portion Memory unit dispatches stamps having a visibility dependent on parameters evaluated later in the computer graphics pipeline. (29) The hidden surface removal system of (28) wherein the stored depth state values are stored separately from the visible stamp portions. (30) The hidden surface removal system of (28) wherein the Z Cull unit evaluates depth state and pipeline state values, and compares a currently potentially visible stamp (CPVS) to a first stamp; and wherein the Stamp Portion Memory, based on control signals from the Z Cull unit: discards the first stamp when no part of the first stamp would affect a final graphics display image based on the stamps that have been evaluated; discards the CPVS and makes the first stamp the CPVS, when the first stamp hides CPVS; dispatches the CPVS and makes the first stamp the CPVS when both the first stamp and the CPVS are at least partially visible in the final graphics display image; and dispatches the first stamp and the CPVS when the visibility of the first stamp and the CPVS depends on parameters evaluated later in the computer graphics pipeline. (31) The hidden surface removal system of (28) wherein the MCCAM Cull unit: determines a maximum z value for a plurality of stamp locations of the current primitive; compares the maximum z value for a plurality of stamp positions with a minimum z value of the current primitive and sets corresponding stamp selection bits; and identifies as a process row a row of stamps wherein the maximum z value for a stamp position in the row is greater than the minimum z value of the current primitive. (32) The hidden surface removal system of (31) wherein the Stamp Selection unit: determines the leftmost and right most stamps touched by the current primitive in each of the process rows and defines corresponding stamp primitive coverage bits; and combines the stamp primitive coverage bits with the stamp selection bits to generate a final potentially visible stamp set. (33) The hidden surface removal system of (32) wherein the Z Cull unit: determines a set of sample points in a stamp in the final potentially visible stamp set; computes a z value for a plurality of sample points in the set of sample points; and compares the computed z values with stored z values and outputs control signals. (34) The hidden surface removal system of (33) wherein the Z Cull unit comprises a plurality of Z Cull Sample State Machines, each of the Z Cull Sample State Machines receive, process and output control signals for samples in parallel.

(35) A method of rendering a computer graphics image comprising the steps of: receiving a plurality of primitives to be rendered; selecting a sample location; rendering a front most opaque sample at the selected sample location, and defining the z value of the front most opaque sample as Zfar; comparing z values of a first plurality of samples at the selected sample location; defining to be Znear a first sample, at the selected sample location, having a z value which is less than Zfar and which is nearest to Zfar of the first plurality of samples; rendering the first sample; setting Zfar to the value of Znear; comparing z values of a second plurality of samples at the selected sample location; defining as Znear the z value of a second sample at the selected sample location, having a z value which is less than Zfar and which is nearest to Zfar of the second plurality of samples; and rendering the second sample. (36) The method of 35 further comprising the steps of: when a third plurality of samples at the selected sample location have a common z value which is less than Zfar, and the common z value is the z value nearest to Zfar of the first plurality of samples: rendering a third sample, wherein the third sample is the first sample received of the third plurality of samples; incrementing a first counter value to define a sample render number, wherein the sample render number identifies the sample to be rendered; selecting a fourth sample from the third plurality of samples; incrementing a second counter wherein the second counter defines an evaluation sample number; comparing the sample render number and the evaluation sample number; and rendering a sample when the corresponding evaluation sample number equals the sample render number.

In another aspect (SORT) the inventive DSGP provides structure and method for performing conservative hidden surface removal. Numerous embodiments are shown and described, including but not limited to:

(1) A method for sending image data to a next stage in a graphics pipeline in a spatially staggered sequence, the image data including a plurality of spatial data, each spatial datum of the spatial data including a vertex to at least one of a plurality of geometry primitives, each geometry primitive having been sorted by a previous stage in a graphics pipeline with respect to a first plurality of regions that divide a first 2-D window, the method comprising steps of: rounding up a horizontal pixel width and a vertical pixel height, by read control, by a power of two, to define a second 2-D window that is larger than a first 2-D window, the first 2-D window having a width corresponding to the horizontal pixel width, and a height corresponding to the vertical pixel height; dividing, by read control, the second 2-D window into a second plurality of regions, each region corresponding to a unique one region of the second 2-D window, each of the second plurality of tiles including a region covered by at least one region of the first plurality of regions; numbering each region of the plurality of regions in a row-by-row manner, such that a first row corresponds to a region situated from a list consisting of an upper left corner of the 2-D window, a lower left corner, an upper right corner, or a lower right corner region of the 2-D window; defining a random sequence of tile processing; and, reading the image data out of the memory to the next stage, in a region-by-region manner according to the random sequence of tile processing, wherein each region in the region-by region manner is selected from the second plurality of regions.

(2) The method of (1), wherein the step of defining, the reandom sequence of tile processing is defined according to the following rule: $T_0=0$, $T_{n+1}=\mathrm{mod}_N(T_n+M)$, where N=the number of regions in the the second plurality of regions, M=a relatively prime number in relation to the horizontal pixel width multiplied by the vertical pixel height, and wherin M represents a region step, and Tn=nth tile of the second plurality of tiles to be processed, where $0<=n<=N-1$. (3) The method according to (1), further comprising the step of dividing the second plurality of tiles into a plurality of SuperTiles, wherein each SuperTile consists of a configurable number of tiles of the second plurality of tiles, and wherein if the configurable number of tiles is greater than one, each of the configurable number of tiles in a unique one SuperTile is an adjacent tile or a diagonal tile to each of the other tiles in the unique one SuperTile with respect to each of the configurable number of tiles original location in the second plurality of tiles. (4) The method of (3), wherein the step of dividing, the configurable number of tiles is selected from a group consisting of 1 row×1 column, 2 rows×2 columns, 3 rows×3 columns, or 4 rows×4 columns.

In yet another aspect (Texture) the inventive DSGP provides structure and method for performing conservative hidden surface removal. Numerous embodiments are shown and described, including but not limited to:

(1) A deferred graphics pipeline processor comprising: a texture unit and a texture memory associated with the texture unit; the texture unit applying texture maps stored in the texture memory, to pixel fragments; the textures being MIP-mapped and comprising a series of texture maps at different levels of detail, each map representing the appearance of the texture at a given distance from an eye point; the texture unit performing tri-linear interpolation from the texture maps to produce a texture value for a given pixel fragment that approximates the correct level of detail; the texture memory having texture data stored and accessed in a manner which reduces memory access conflicts and thus improves throughput of the texture unit.

In yet another aspect (Mode Injection and Mode Extraction) the inventive DSGP provides structure and method for performing conservative hidden surface removal. Numerous embodiments are shown and described, including but not limited to:

(1) A deferred graphics pipeline processor comprising: a mode extraction unit and a Polygon Memory associated with the polygon unit, the mode extraction unit receiving a data stream from the geometry unit and separating the data stream into vertices data, and non-vertices data which is sent to the Polygon Memory for storage; a mode injection unit receiving inputs from the Polygon Memory and communicating the mode information to one or more other processing units; the mode injection unit maintaining status information identifying the information that is already cached and not sending information that is already cached, thereby reducing communication bandwidth.

In yet another aspect (Phong Lighting) the inventive DSGP provides structure and method for performing conservative hidden surface removal. Numerous embodiments are shown and described, including but not limited to:

(1) A bump mapping method for use in a deferred graphics pipeline processor comprising: receiving for a pixel fragment associated with a surface for which bump effects are to be computed: a surface tangent, binormal and normal defining a tangent space relative to the surface associated with the fragment; and a texture vector representing perturbations to the surface normal in the directions of the surface tangent and binormal caused by the bump effects at the surface position associated with the pixel fragment; computing a set of basis vectors from the surface tangent, binormal and normal that define a transformation from the tangent space to eye space in view of the orientation of the texture vector; computing a perturbed, eye space, surface normal reflecting the bump effects by performing a matrix multiplication in which the texture vector is multiplied by a transformation matrix whose columns comprise the basis vectors, giving a result that is the perturbed, eye space, surface normal; and performing lighting computations for the pixel fragment using the perturbed, eye space, surface normal, giving an apparent color for the pixel fragment that accounts for the bump effects without needing to interpolate and translate light and half-angle vectors (L and H) used in the lighting computations.

(2) A variable scale bump mapping method for shading a computer graphics image, the method comprising steps of: receiving for a vertex of polygon associated with a surface to which bump effects are to be mapped geometry vectors ($v_s$,$v_t$, N) and a texture vector (Tb); separating the geometry vectors into unit basis vectors ($\hat{b}_s$, $\hat{b}_t$, n) and magnitudes ($m_{bs}$, $m_{bt}$, $m_{bn}$); multiplying the magnitudes and the texture vector to form a texture-magnitude vector (mTb'); scaling components of the texture-magnitude vector by a vector s to form a scaled texture-magnitude vector (mTb"); and multiplying the scaled texture-magnitude vector and the unit basis vectors to provide a perturbed unit normal (N') in eye space for a pixel location, whereby the need to specify surface tangents and binormal at the pixel location to perform lighting computations to give the pixel fragment bump effects is eliminated. (3) A method according to (2) wherein the step of multiplying the magnitudes and the texture-magnitude vector produces a transformation matrix, which enables fixed point multiplication hardware to be used. (4) A method according to (2) wherein the step of multiplying the magnitudes and the texture-magnitude vector produces a transformation matrix that defines a transformation from different tangent space coordinates systems to an eye space coordinate system. (5) A method according to (4) wherein the different tangent space coordinates systems is selected from a group consisting of Blinn,SGI, or other conventional coordinate systems.

(6) A variable scale bump mapping method for shading a computer graphics image, the method comprising steps of: receiving a gray scale image for which bump effects are to be computed; taking a derivative relative to a gray scale intensity for a pixel fragment associated with the gray scale image; and computing from the derivative a perturbed unit normal in eye space to give the pixel fragment bump effects. (7) A method according to (6) wherein the step of computing from the derivative a perturbed unit normal in eye space comprises the step of forming a transformation matrix that defines a transformation of the derivative of the gray scale intensity to an eye space coordinate system.

(8) A method for bump mapping for shading a computer graphics image, the method comprising steps of: receiving for a pixel fragment associated with a surface for which bump effects are to be computed: a magnitude vector (m), and a bump vector (Tb); and a unit transformation matrix (M); multiplying the magnitude vector and the bump vector to form a texture-magnitude vector (mTb'); scaling components of the texture-magnitude vector by a vector s to form a scaled texture-magnitude vector (mTb"); multiplying the scaled texture-magnitude vector and the unit transformation matrix to provide a perturbed normal (N'); re-scaling components of the perturbed normal to form rescaled vector (N"); and normalizing the rescaled vector to provide a unit perturbed normal that is used to perform lighting computations to give the pixel fragment bump effects. (9) A method according to (8) wherein the step of scaling the components of the texture-magnitude vector comprises the step of selecting the scalars so the resulting matrix can be represented as a fixed-point vector. (10) A method according to (8) wherein the vector s comprises scalars ($s_s$, $s_t$, $s_n$), and wherein the step of scaling the components of the texture-magnitude vector comprises the step of multiplying texture-magnitude vector comprising s as follows: $mTb''=(s_s \times m_{bs}h_s, s_t \times m_{bt}h_t, s_n \times m_n k_n)$. (11) A method according to (8) wherein the unit transformation matrix also comprises fixed-point values, and wherein the step of multiplying the scaled texture-magnitude vector and the unit transformation matrix comprises the step of multiplying using fixed-point multiplication hardware. (12) A method according to (8) wherein the step of re-scaling components of the perturbed normal comprises the step of multiplying by a reciprocal of vector s ($1/(s_s, s_t, s_n)$) to re-establish a correct relationship between their values.

(13) A method for rendering graphical information, comprising: performing tangent space lighting in a deferred shading architecture. (14) A method for rendering graphical information, comprising: performing variable scale bump mapping. (15) A method for rendering graphical information, comprising: performing automatic basis generation. (16) A method for rendering graphical information, comprising: performing automatic gradient-field generation. (17) A method for rendering graphical information, comprising: performing normal interpolation by doing angle and magnitude computations independently. (18) A graphics rendering engine comprising: a tangent space lighting computation unit. (19) A graphics rendering engine comprising: a tangent space lighting computation unit.

In yet another aspect (PIX) the inventive DSGP provides structure and method for performing conservative hidden surface removal. Numerous embodiments are shown and described, including but not limited to:

(1) A method for rendering a graphics image, the method comprising: performing a fragment operation on a fragment on a per-pixel basis; and performing a fragment operation on the fragment on a per-sample basis. (2) The method of (1), wherein the step of performing on a per-pixel basis comprises performing one of the following fragment operations on a per-pixel basis: scissor test, stipple test, alpha test, color test. (3) The method of (1), wherein the step of performing on a per-sample basis comprises performing one of the following fragment operations on a per-sample basis: Z test, blending, dithering. (4) The method of (1), further comprising the step of: programmatically selecting whether to perform a stencil test on a per-pixel or a per-sample basis, and wherein between the steps, the following step is performed: performing the stencil test on the selected basis. (5). The method of (1), wherein the step of performing on a per-sample basis comprises programmatically selecting a set of subdivisions of a pixel as samples for use in the fragment operation on a per-sample basis, and wherein the method further comprises then programmatically selecting a different set of subdivisions of a pixel as samples for use in a second fragment operation on a per-sample basis; and then performing the second fragment operation on a fragment on a per-sample basis, using the programmatically selected samples. (6) The method of (1), wherein the step of performing on a per-sample basis comprises programmatically selecting a set of subdivisions of a pixel as samples for use in the fragment operation on a per-sample basis; programmatically assigning different weights to two samples in the set; and performing the fragment operation on the fragment on a per-sample basis, using the programmatically selected and differently weighted samples.

(7) A method for rendering a graphics image, the method comprising: performing one of the following fragment operations on a fragment on a per-pixel basis: scissor test, stipple test, alpha test, color test; programmatically selecting whether to perform a stencil test on a per-pixel or a per-sample basis, and performing the stencil test on the selected basis; and programmatically selecting a set of subdivisions of a pixel as samples for use in a fragment operation on a per-sample basis; programmatically assigning different weights to two samples in the set; and performing one of the following fragment operations on a per-sample basis, using the programmatically selected and differently weighted samples: Z test, blending, dithering;

then programmatically selecting a different set of subdivisions of a pixel as samples for use in a second fragment operation on a per-sample basis; and then performing the second fragment operation on a fragment on a per-sample basis, using the programmatically selected samples.

(8) A method for rendering a graphics image, the method comprising: programmatically selecting whether to perform a stencil test on a per-pixel or a per-sample basis, and performing the stencil test on the selected basis.

(9) A computer-readable medium for data storage wherein is located a computer program for causing a graphics-rendering system to render an image by performing a fragment operation on a fragment on a per-pixel basis; and performing a fragment operation on the fragment on a per-sample basis.

(10) A computer-readable medium for data storage wherein is located a computer program for causing a graphics-rendering system to render an image by performing one of the following fragment operations on a fragment on a per-pixel basis: scissor test, stipple test, alpha test, color test; programmatically selecting whether to perform a stencil test on a per-pixel or a per-sample basis, and performing the stencil test on the selected basis; and programmatically selecting a set of subdivisions of a pixel as samples for use in a fragment operation on a per-sample basis, performing one of the following fragment operations on a per-sample basis, using the programmatically selected samples: Z test, blending, dithering; then programmatically selecting a different set of subdivisions of a pixel as samples for use in a second fragment operation on a per-sample basis; and then performing the second fragment operation on a fragment on a per-sample basis, using the programmatically selected samples.

(11) A computer-readable medium for data storage wherein is located a computer program for causing a graphics-rendering system to render an image by programmatically selecting whether to perform a stencil test on a per-pixel or a per-sample basis, and performing the stencil test on the selected basis. (12) A system for rendering graphics images, the system comprising: a port for receiving commands from a graphics application; an output for sending a rendered image to a display; and a fragment-operations pipeline, coupled to the port and to the output, the fragment-operations pipeline comprising a stage for performing a fragment operation on a fragment on a per-pixel basis; and a stage for performing a fragment operation on the fragment on a per-sample basis. (13) The apparatus of (12), wherein the stage for performing on a per-pixel basis comprises one of the following: a scissor-test stage, a stipple-test stage, an alpha-test stage, a color-test stage.

The apparatus of (12), wherein the stage for performing on a per-pixel basis comprises one of the following: a Z-test stage, a blending stage, a dithering stage. (15) A system for rendering graphics images, the system comprising: a port for receiving commands from a graphics application; an output for sending a rendered image to a display; the medium of claim 11; and a CPU, coupled to the port, the output and the medium, for executing the computer program in the medium.

In yet another aspect (Geometry) the inventive DSGP provides structure and method for performing conservative hidden surface removal. Numerous embodiments are shown and described, including but not limited to: (1) An apparatus for performing geometry operations in a 3D-graphics pipeline, the apparatus comprising: a transformation unit comprising a co-extensive logical and physical stage; and a physical stage including multiple logical stages; a lighting unit, receiving input from the transformation unit; and a clipping unit, receiving input from the transformation and lighting units. (2) The apparatus of (1), wherein the physical stage comprises multiple logical stages that interleave their execution.

Additional Description

The invention provides numerous innovative structures, methods, and procedures. The structures take many forms including individual circuits, including digital and circuits, computer architectures and systems, pipeline architectures and processor connectivity. Methodologically, the invention provides a procedure for deferred shading and numerous other innovative procedures for use with a deferred shader as well as having applicability to non-deferred shaders and data processors generally. Those workers having ordinary skill in the art will appreciate that although the numerous inventive structures and procedures are described relative to a three-dimensional graphical processor, that many of the innovations have clear applicability to two-dimensional processing, and to data processing and manipulation are involved generally. For example, many of the innovations may be implemented in the context of general purpose computing devices, systems, and architectures. It should also be understood that while some embodiments may require or benefit from hardware implementation, at least some of the innovations are applicable to either hardware or software/firmware implementations and combinations thereof.

A brief list of some of the innovative features provided by the above described inventive structure and method is provided immediately below. This list is exemplary, and should not be interpreted as a limitation. It is particularly noted that the individual structures and procedures described herein may be combined in various ways, and that these combinations have not been individually listed. Furthermore, while this list focuses on the application of the innovations to a three-dimensional graphics processor, the innovations may readily be applied to a general purpose computing machine having the structures and/or operation described in this specification and illustrated in the figures.

The invention described herein provides numerous inventive structures and methods, included, but not limited to structure and procedure for: Three-Dimensional Graphics Deferred Shader Architecture; Conservative Hidden Surface Removal; Tile Prefetch; Context Switching; Multipass by SRT for Better Antialiasing; Selection of Sample Locations; Sort Before Setup; Tween Packets; Packetized Data Transfer; Alpha Test, Blending, Stippled Lines, and the like; Chip Partitioning; Object Tags (especially in Deferred Shading Architecture); Logarithmic Normalization in Color Space (Floating Point Colors); Backend Microarchitecture; Pixel Zooming During Scanout; Virtual Block Transfer (BLT) on Scanout; Pixel Ownership; Window ID; Blocking and Nonblocking Interrupt Mechanism; Queuing Mechanisms; Token Insertion for Vertex Lists; Hidden Surface Removal; Tiled Content Addressable Z-buffer; three-stage Z-buffer Process; dealing with Alpha Test and Stencil in a Deferred Shader; Sending Stamps Downstream with Z Ref and Dz/dx and Dx/dy; Stamp Portion Memory Separate from the Z-buffer Memory; Sorted Transparency Algorithm; Finite State Machine per Sample; a SAM Implementation; Fragment Microarchitecture; GEO Microarchitecture; Pipestage Interleaving; Polygon Clipping Algorithm; 2-Dimensional Block Microarchitecture; Zero-to-one Inclusive Multiplier (Mul-18p); Integer-floating-integer (Ifi) Match Unit; Taylor Series Implementation; Math Block Construction Method; Multi-chip Communication Ring Graphics; How to Deal with Modes in a Deferred Shader; Mode Catching; MLM Pointer Storage; Clipped Polygons in Sort Whole in Polygon Memory; Phong/bump Microarchitecture; Material-tag-based Resource Allocation of Fragment Engines; Dynamic Microcode Generation for Texture Environment and Lighting; How to Do Tangent Space Lighting in a Deferred Shading Architecture; Variable Scale Bump Maps; Automatic Basis Generation; Automatic Gradient-field Generation Normal Interpolation by Doing Angle and Magnitude Separately; Post-tile-sorting Setup Operations in Deferred Shader; Unified Primitive Description; Tile-relative Y-values and Screen Relative X-values; Hardware Tile Sorting; Enough Space Look ahead Mechanism; Touched Tile Implementation; Texture Re-use Matching Registers (Including Deferred Shader); Samples Expanded to Pixels (Texture Miss Handling); Tile Buffers and Pixel Buffers (Texture Microarchitecture); and packetized data transfer in a processor.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. A method for rendering a graphics image, said method comprising:

performing a fragment operation on a fragment on a per-pixel basis;

performing a fragment operation on said fragment on a per-sample basis;

determining if a pixel corresponding to the fragment is visible on a screen without updating a color buffer;

programmatically selecting whether to perform a stencil test on a per-pixel or a per-sample basis;

rendering the pixel in response to a positive determination; wherein between said steps, the following step is performed: performing said stencil test on said selected basis.

2. The method of claim 1, wherein said step of performing on a per-pixel basis comprises performing one of the following fragment operations on a per-pixel basis scissor test, stipple test, alpha test, color test.

3. The method of claim 1, wherein said step of performing on a per-sample basis comprises performing one of the following fragment operations on a per-sample basis: Z test, blending, dithering.

4. A method for rendering a graphics image, said method comprising:

performing a fragment operation on a fragment on a per-pixel basis;

performing a fragment operation on said fragment on a per-sample basis;

determining if a pixel corresponding to the fragment is visible on a screen without updating a color buffer;

wherein said step of performing on a per-sample basis comprises programmatically selecting a set of subdivisions of a pixel as samples for use in said fragment operation on a per-sample basis, and wherein said method further comprises then programmatically selecting a different set of subdivisions of a pixel as samples for use in a second fragment operation on a per-sample basis; and then performing said second fragment operation on a fragment on a per-sample basis, using said programmatically selected samples.

5. A method for rendering a graphics image, said method comprising:

performing a fragment operation on a fragment on a per-pixel basis;

performing a fragment operation on said fragment on a per-sample basis;

determining if a pixel corresponding to the fragment is visible on a screen without updating a color buffer;

wherein said step of performing on a per-sample basis comprises programmatically selecting a set of subdivisions of a pixel as samples for use in said fragment operation on a per-sample basis; programmatically assigning different weights to two samples in said set; and performing said fragment operation on said fragment on a per-sample basis, using said programmatically selected and differently weighted samples.

6. A computer-readable medium for data storage wherein is located a computer program for causing a graphics-rendering system to render an image by the following method:

performing a fragment operation on a fragment on a per-pixel basis;

performing a fragment operation on said fragment on a per-sample basis;

determining if a pixel corresponding to the fragment is visible on a screen without updating a color buffer;

programmatically selecting whether to perform a stencil test on a per-pixel or a per-sample basis;

rendering the pixel in response to a positive determination; wherein between said steps, the following step is performed: performing said stencil test on said selected basis.

7. A method for rendering a graphics image, said method comprising:

processing a first primitive;

for each sample touched by the first primitive, conservatively determining whether the sample is hidden, said determination at least partially based on a state variable;

delaying a color computation for said sample until after determining whether the sample is hidden;

rendering each non-hidden sample;

storing a z-coordinate for said sample;

storing primitive color information for said sample;

storing a sample state bit; wherein said operation of conservatively determining whether the sample is hidden employs at least one of said z-coordinate, primitive color information, and sample state bit.

8. The method of claim 7, wherein the state variable is the outcome of a depth test.

9. The method of claim 7, wherein the sate variable is the outcome of an alpha test.

10. The method of claim 7, further comprising:

processing a second primitive;

for each sample touched by the second primitive, conservatively determining whether the sample is hidden, said determination at least partially based on a state variable; and delaying a color computation for said sample until after determining whether the sample is hidden;

displaying each sample not determined to be hidden; wherein said first and second primitives are processed in time order.

* * * * *

UNITED STATES PATENT AND TRADEMARK OFFICE

CERTIFICATE OF CORRECTION

PATENT NO. : 7,167,181 B2 Page 1 of 1
APPLICATION NO. : 10/458493
DATED : January 23, 2007
INVENTOR(S) : Duluk, Jr. et al.

It is certified that error appears in the above-identified patent and that said Letters Patent is hereby corrected as shown below:

Column 346, at line 18, please delete “sate” and insert --state--.

Signed and Sealed this

Third Day of April, 2007

JON W. DUDAS

*Director of the United States Patent and Trademark Office*

UNITED STATES PATENT AND TRADEMARK OFFICE

CERTIFICATE OF CORRECTION

PATENT NO. : 7,167,181 B2
APPLICATION NO. : 10/458493
DATED : January 23, 2007
INVENTOR(S) : Duluk, Jr. et al.

It is certified that error appears in the above-identified patent and that said Letters Patent is hereby corrected as shown below:

On the Title page, in column 2, under "Related U.S. Application Data", after "6,717,576", please insert --which is a continuation-in-part of Application No. 09/213,990, filed on Dec. 17, 1998, now Pat. No. 6,771,264.--

Signed and Sealed this

Twenty-fourth Day of March, 2009

JOHN DOLL
*Acting Director of the United States Patent and Trademark Office*